(12) United States Patent
Ebrahimi Afrouzi

(10) Patent No.: US 12,547,189 B2
(45) Date of Patent: Feb. 10, 2026

(54) STATIONARY SERVICE APPLIANCE FOR A POLY FUNCTIONAL ROAMING DEVICE

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 19/001,207

(22) Filed: Dec. 24, 2024

(65) Prior Publication Data

US 2025/0278096 A1    Sep. 4, 2025

Related U.S. Application Data

(63) Continuation of application No. 18/503,093, filed on Nov. 6, 2023, now Pat. No. 12,282,342.
(Continued)

(51) Int. Cl.
*A47L 9/28* (2006.01)
*A47L 9/00* (2006.01)
(Continued)

(52) U.S. Cl.
CPC .......... *G05D 1/6485* (2024.01); *A47L 9/0063* (2013.01); *A47L 9/2826* (2013.01); *A47L 9/2842* (2013.01); *A47L 9/2847* (2013.01); *A47L 9/2857* (2013.01); *A47L 9/2873* (2013.01); *A47L 11/30* (2013.01); *A47L 11/4011* (2013.01); *A47L 11/4069* (2013.01); *A47L 11/4083* (2013.01);
(Continued)

(58) Field of Classification Search
CPC .... G05D 1/6485; G05D 1/223; G05D 1/2285; G05D 1/661; G05D 2105/10; G05D 2111/10; A47L 9/0063; A47L 9/2826; A47L 9/2842; A47L 9/2847; A47L 9/2857; A47L 9/2873; A47L 11/30; A47L 11/4011; A47L 11/4069; A47L 11/4083; A47L 11/4086; A47L 11/4088; A47L 11/4091; A47L 2201/022; A47L 2201/024; A47L 2201/026; A47L 2201/028; A47L 2201/04; G06V 20/58; G01S 17/931
USPC ........................................................ 701/25
See application file for complete search history.

(56) References Cited

U.S. PATENT DOCUMENTS 6,883,201 B2    4/2005  Jones
7,474,941 B2    1/2009  Kim
(Continued)

*Primary Examiner* — B M M Hannan

(57) ABSTRACT

A method for autonomously servicing a first cleaning component of a battery-operated mobile device, including: inferring, with a processor of the mobile device, a value of at least one environmental characteristic based on sensor data captured by a sensor disposed on the mobile device; actuating, with a controller of the mobile device, a first actuator interacting with the first cleaning component to at least one of: turn on, turn off, reverse direction, and increase or decrease in speed such that the first cleaning component engages or disengages based on the value of at least one environmental characteristic or at least one user input received by an application of a smartphone paired with the mobile device; and dispensing, by a maintenance station, water from a clean water container of the maintenance station for washing the first cleaning component when the mobile device is docked at the maintenance station.

28 Claims, 347 Drawing Sheets

Related U.S. Application Data

(60) Provisional application No. 63/461,306, filed on Apr. 23, 2023, provisional application No. 63/446,840, filed on Feb. 18, 2023, provisional application No. 63/424,716, filed on Nov. 11, 2022.

(51) Int. Cl.
  *A47L 11/30* (2006.01)
  *A47L 11/40* (2006.01)
  *G05D 1/223* (2024.01)
  *G05D 1/2285* (2024.01)
  *G05D 1/648* (2024.01)
  *G05D 1/661* (2024.01)
  *G06V 20/58* (2022.01)
  *G01S 17/931* (2020.01)
  *G05D 105/10* (2024.01)
  *G05D 111/10* (2024.01)

(52) U.S. Cl.
  CPC ....... *A47L 11/4086* (2013.01); *A47L 11/4088* (2013.01); *A47L 11/4091* (2013.01); *G05D 1/223* (2024.01); *G05D 1/2285* (2024.01); *G05D 1/661* (2024.01); *G06V 20/58* (2022.01); *A47L 2201/022* (2013.01); *A47L 2201/024* (2013.01); *A47L 2201/026* (2013.01); *A47L 2201/028* (2013.01); *A47L 2201/04* (2013.01); *G01S 17/931* (2020.01); *G05D 2105/10* (2024.01); *G05D 2111/10* (2024.01)

(56) References Cited

U.S. PATENT DOCUMENTS

| | | |
|---|---|---|
| 7,937,800 B2 | 5/2011 | Yan |
| 8,209,053 B2 | 6/2012 | Kim |
| 8,671,507 B2 | 3/2014 | Jones |
| 2005/0156562 A1 | 7/2005 | Cohen |
| 2006/0080785 A1* | 4/2006 | Nero ................. C11D 1/32 8/137 |
| 2006/0190146 A1 | 8/2006 | Morse |
| 2009/0210211 A1 | 8/2009 | Honda |
| 2014/0184144 A1 | 7/2014 | Henricksen |
| 2015/0314453 A1 | 11/2015 | Witelson |
| 2020/0121153 A1* | 4/2020 | Letsky .............. A47L 9/2873 |
| 2021/0244254 A1* | 8/2021 | Dalal ............... A47L 9/2894 |
| 2022/0386840 A1* | 12/2022 | Sun ................ A47L 11/4072 |
| 2024/0041289 A1* | 2/2024 | Dodgson ............ A47L 13/50 |

* cited by examiner

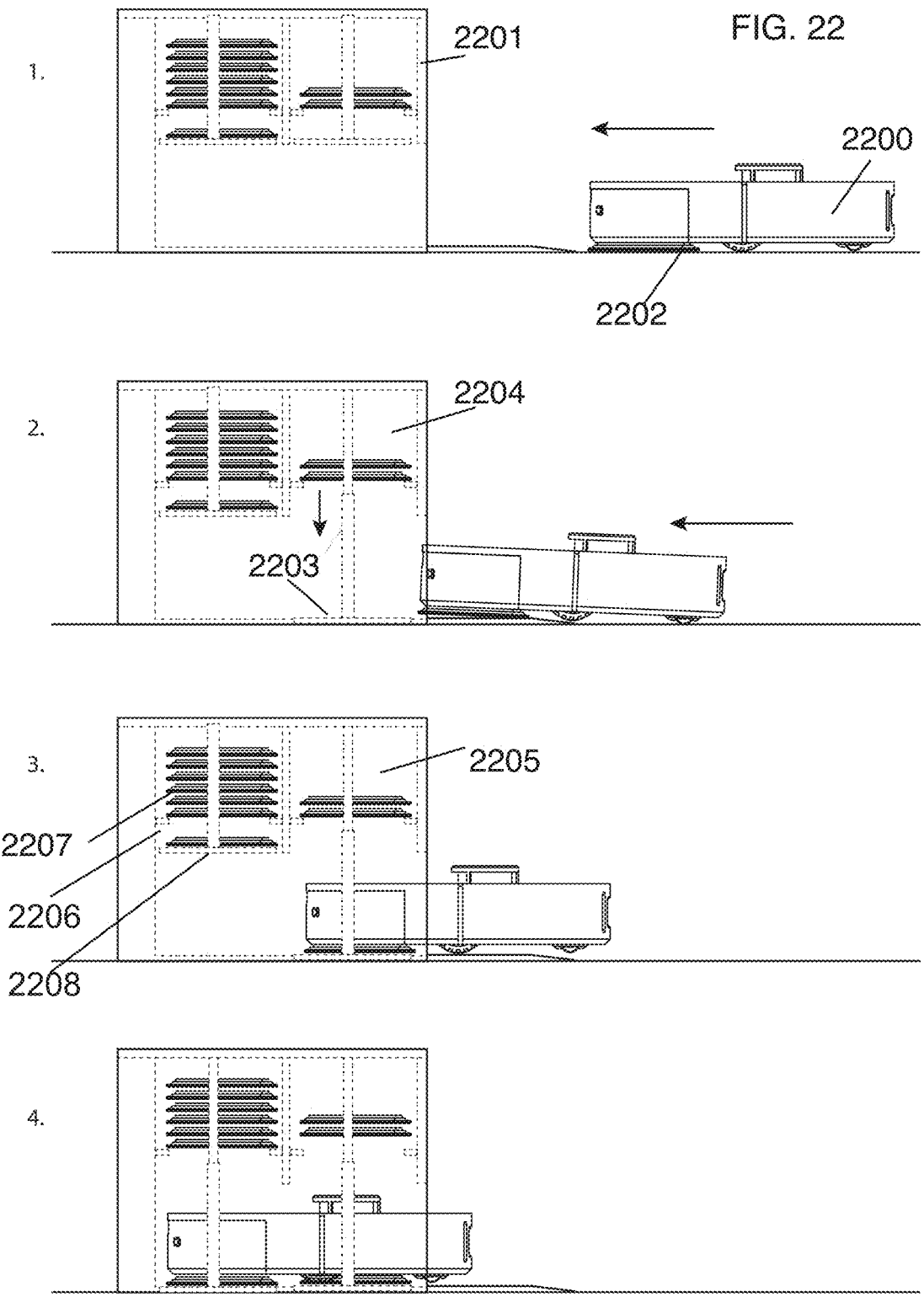

5.
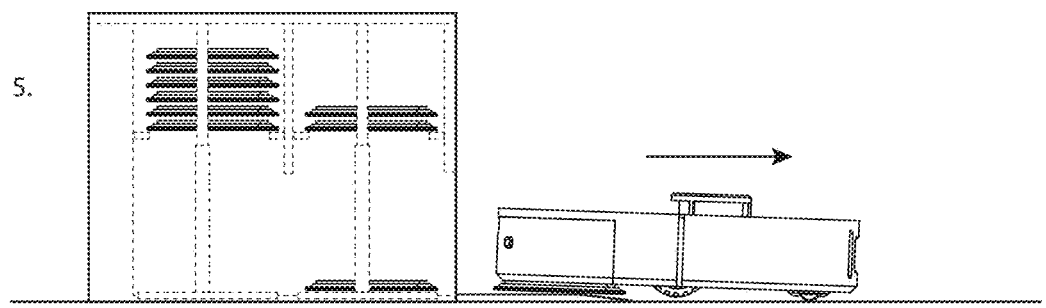
6.
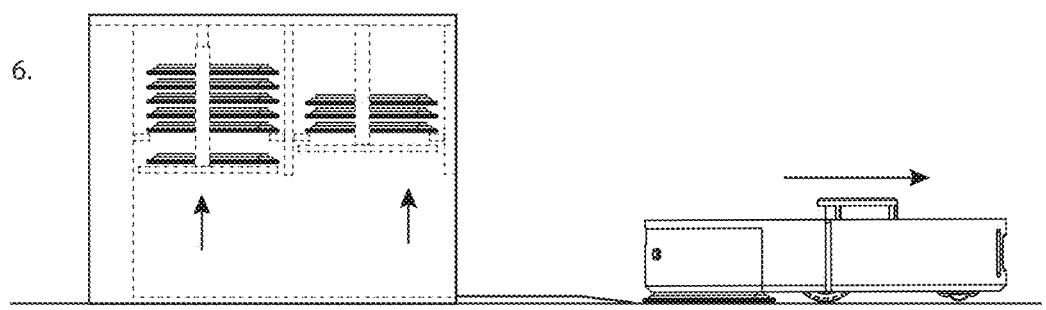
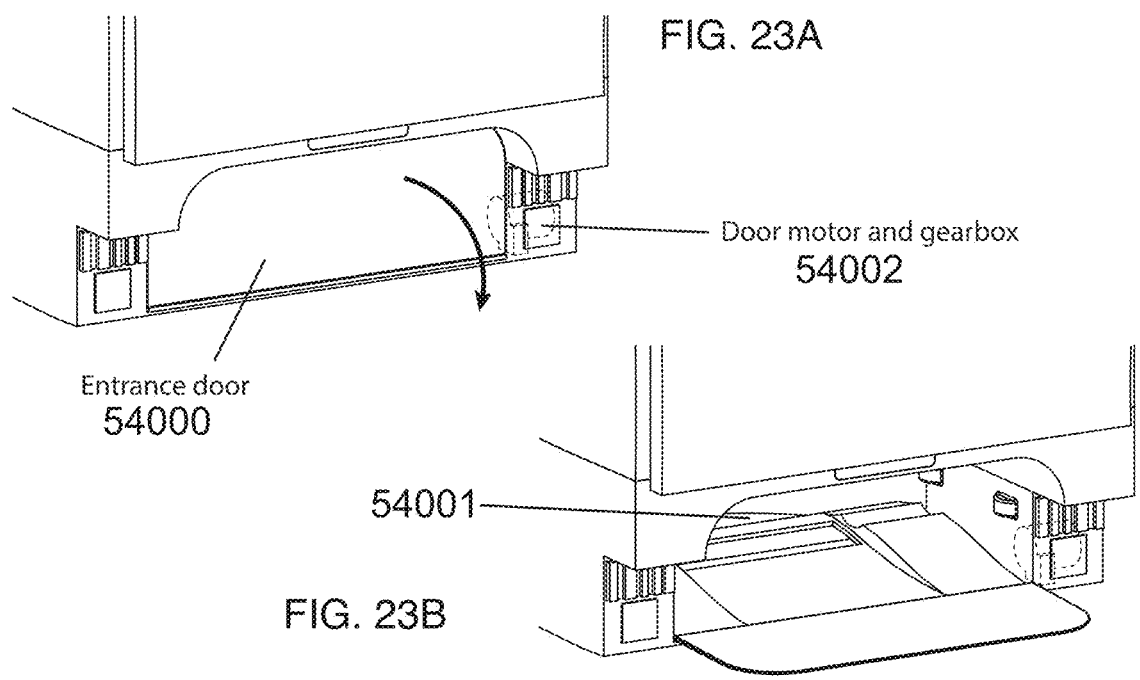
FIG. 23A
Door motor and gearbox
54002
Entrance door
54000
54001
FIG. 23B

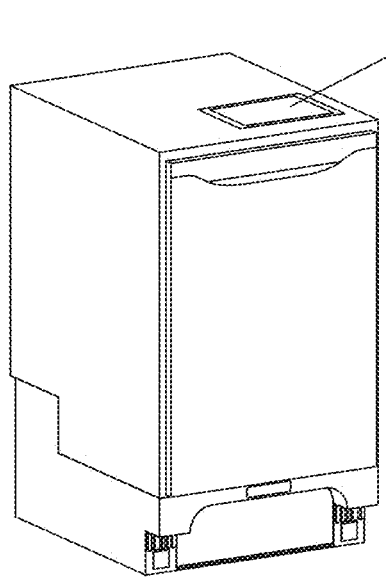
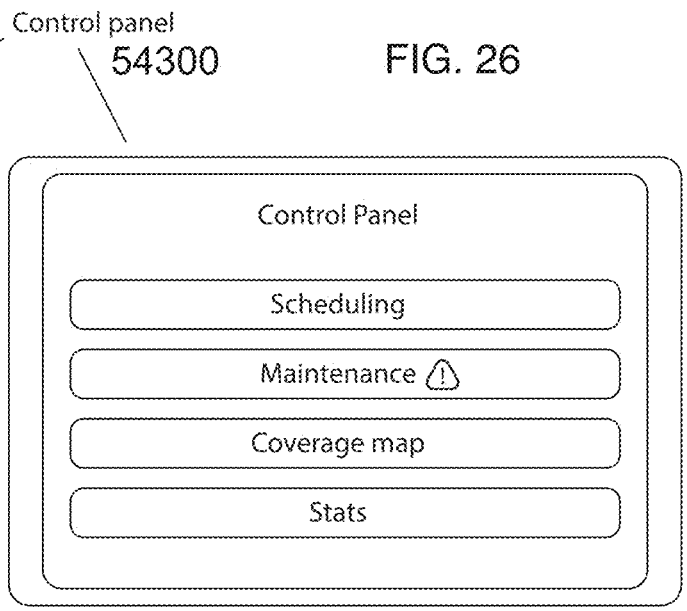
FIG. 26
FIG. 27A
FIG. 27B

54500

54600

54700

All sub-systems combined together

42900

42902 attachement with mechanical and electrical connections

42901

FIG. 41
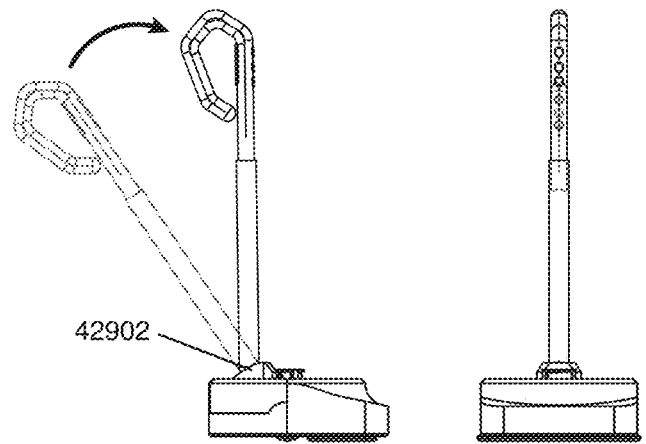
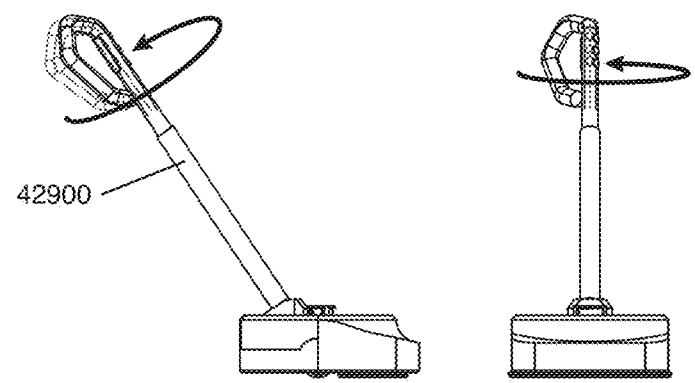
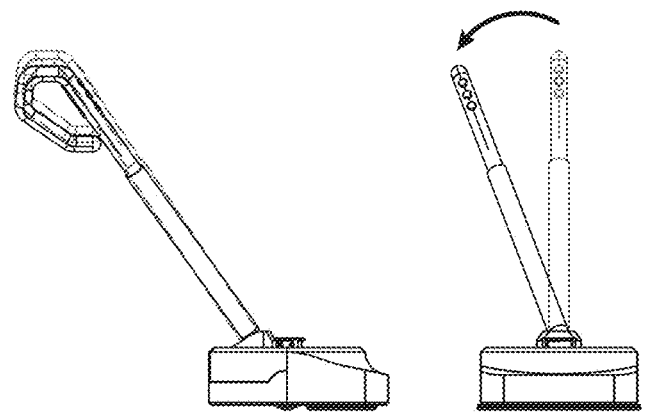

All sub-systems combined together

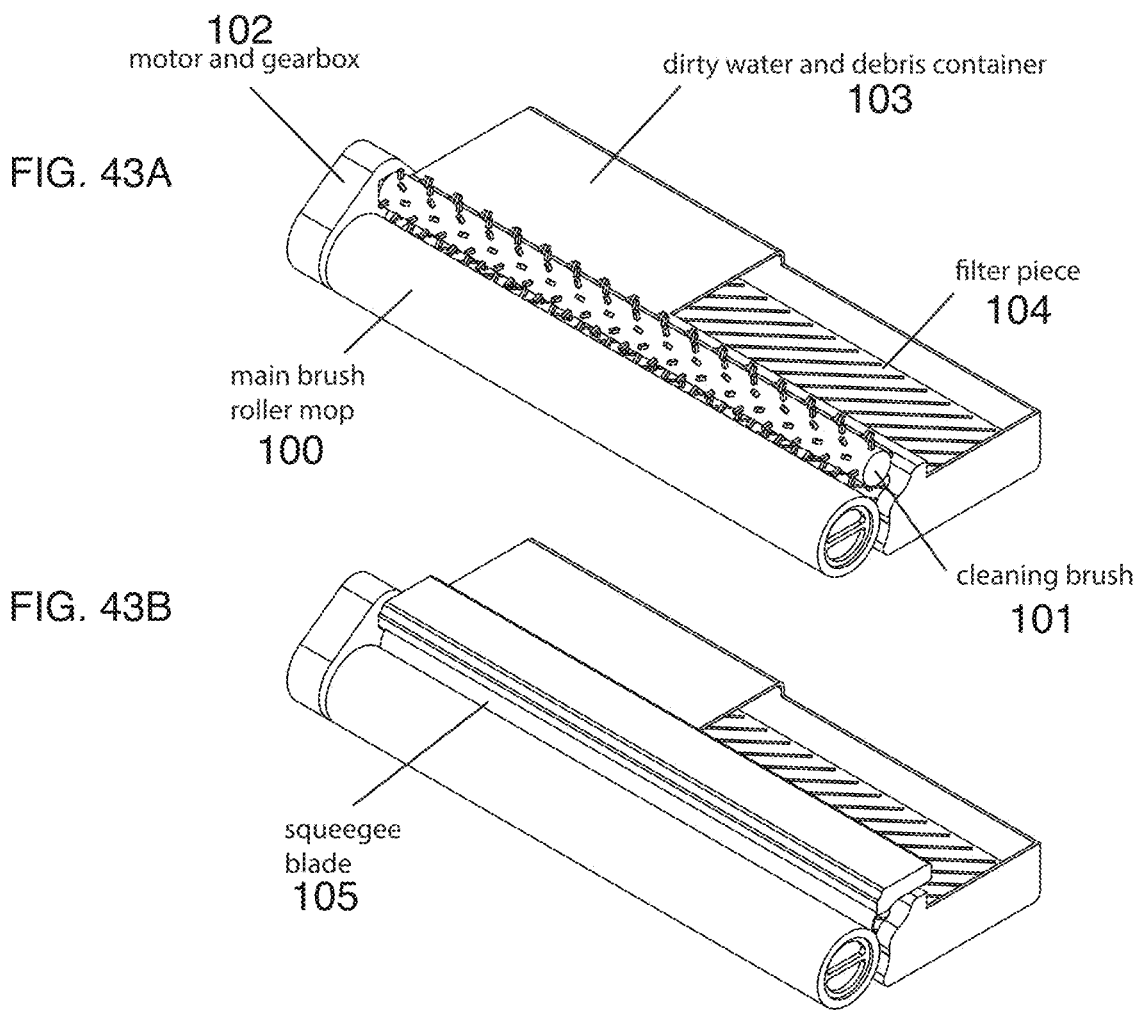
FIG. 43A
FIG. 43B
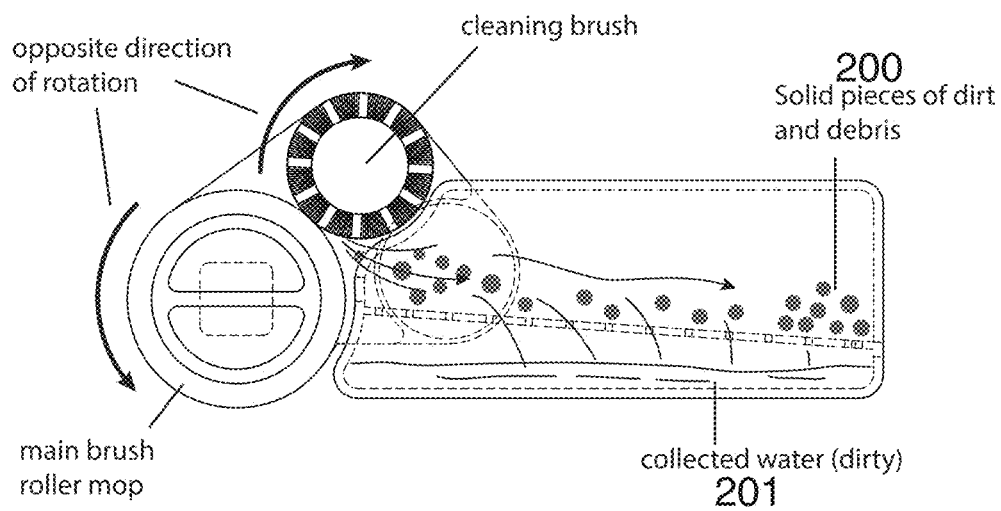
FIG. 44A

FIG. 61
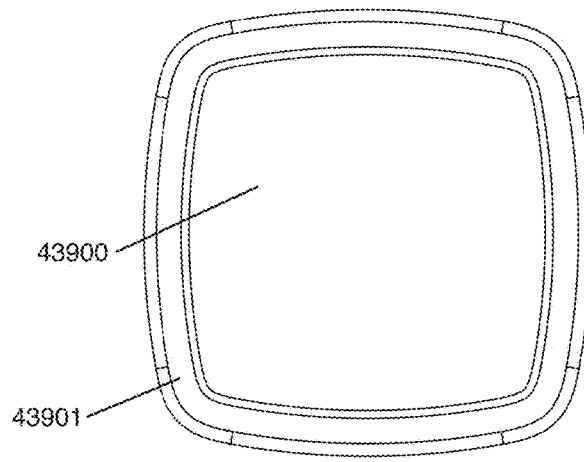
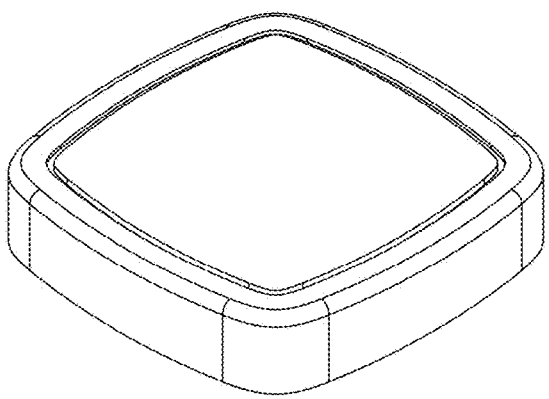
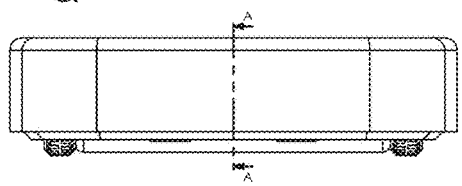
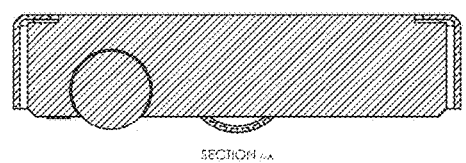
FIG. 62
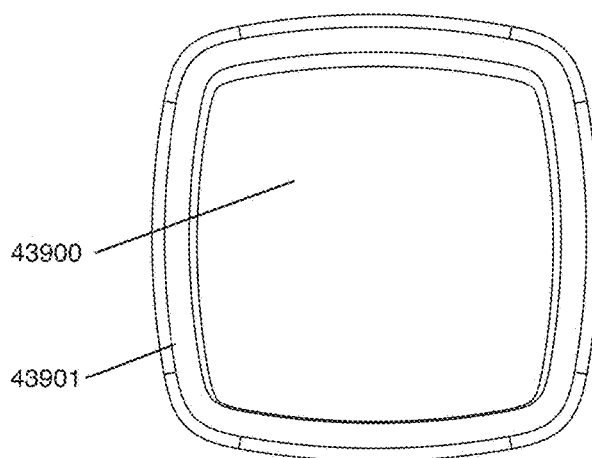
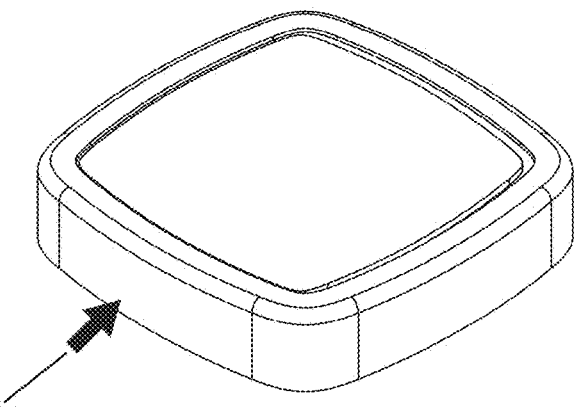
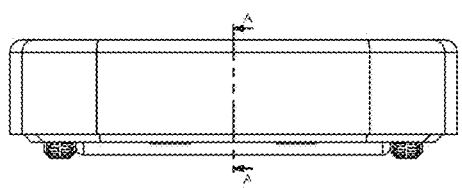
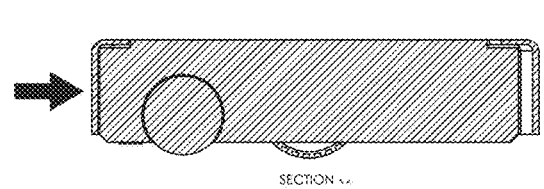

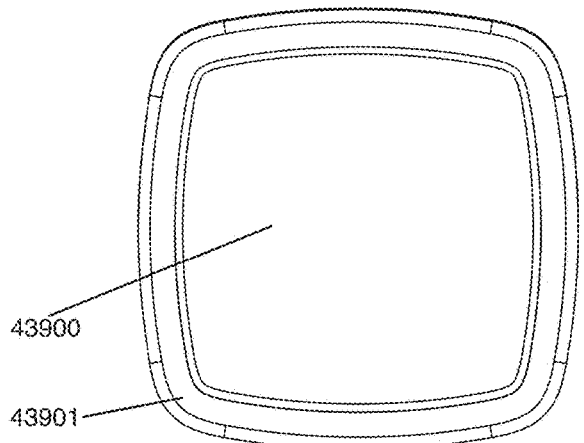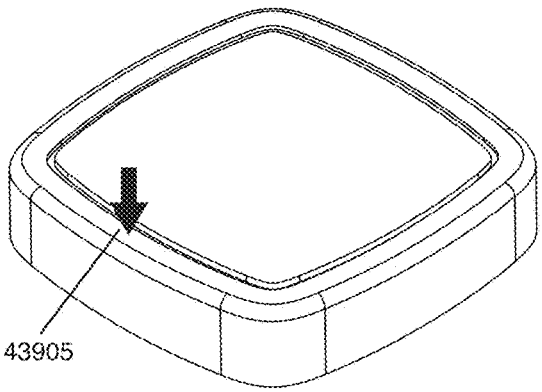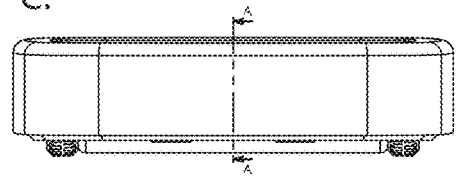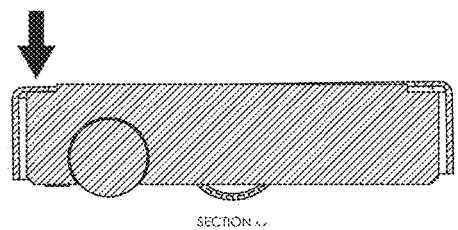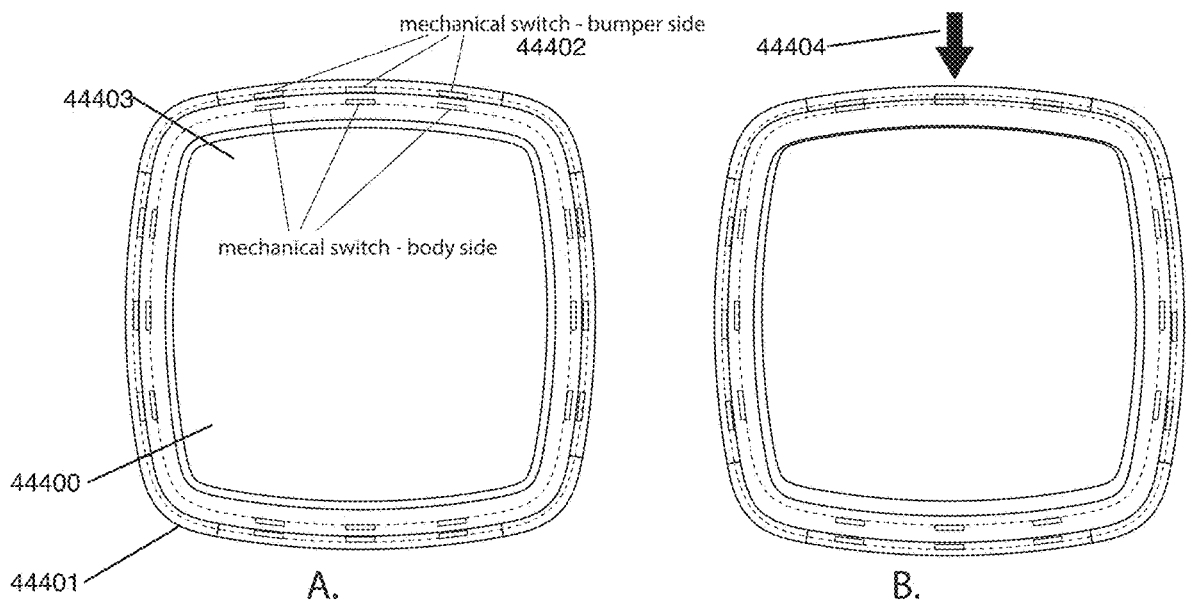

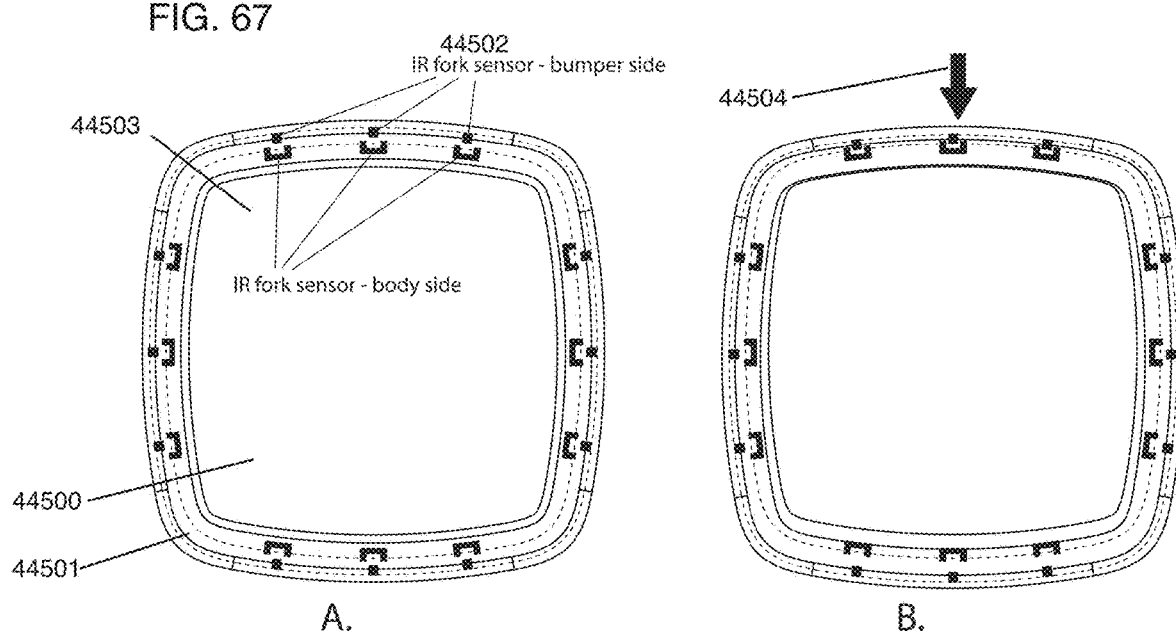
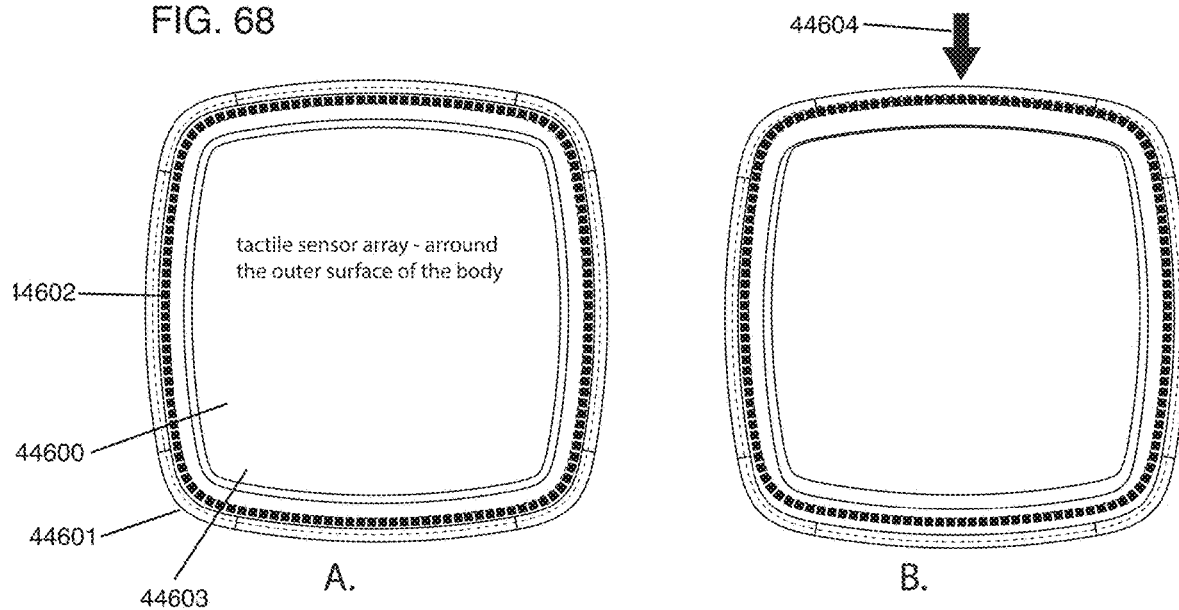

FIG. 76
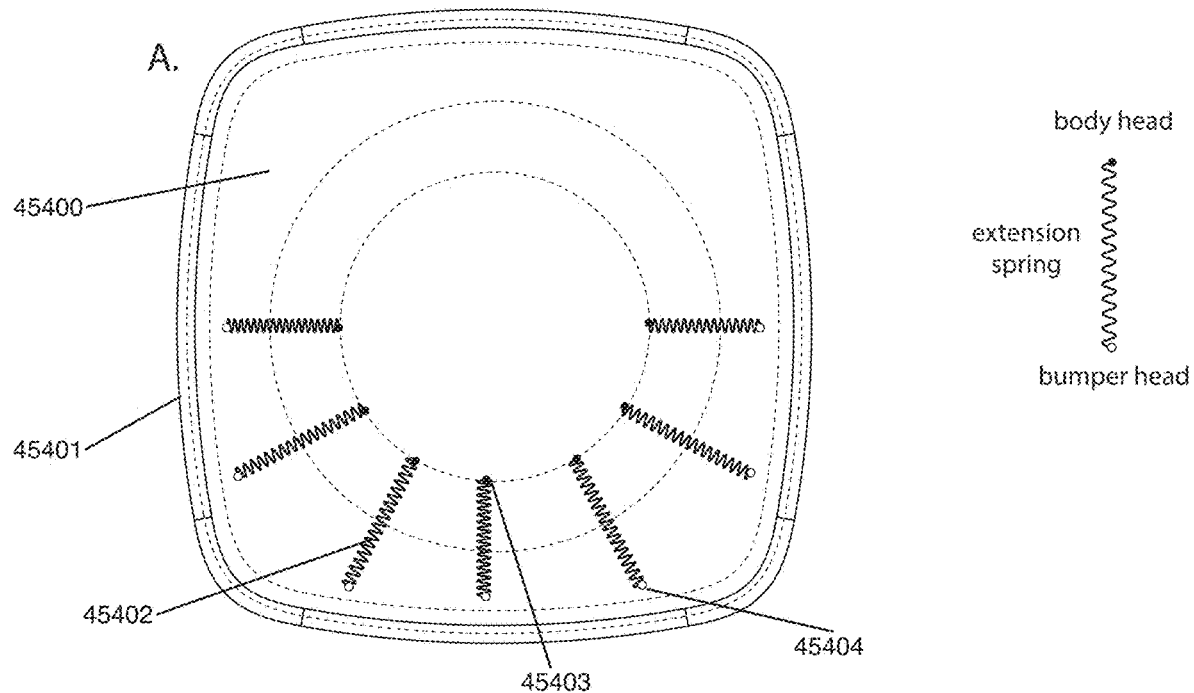
A.
45400
45401
45402
45403
45404
body head
extension spring
bumper head
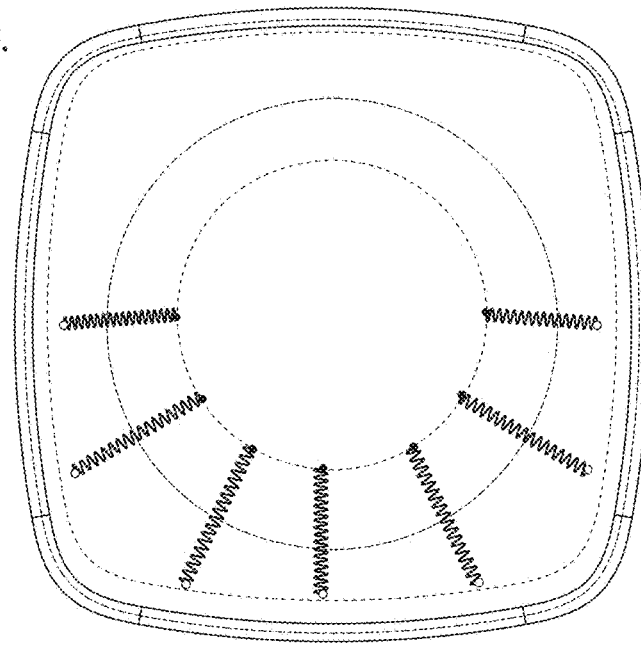
B.

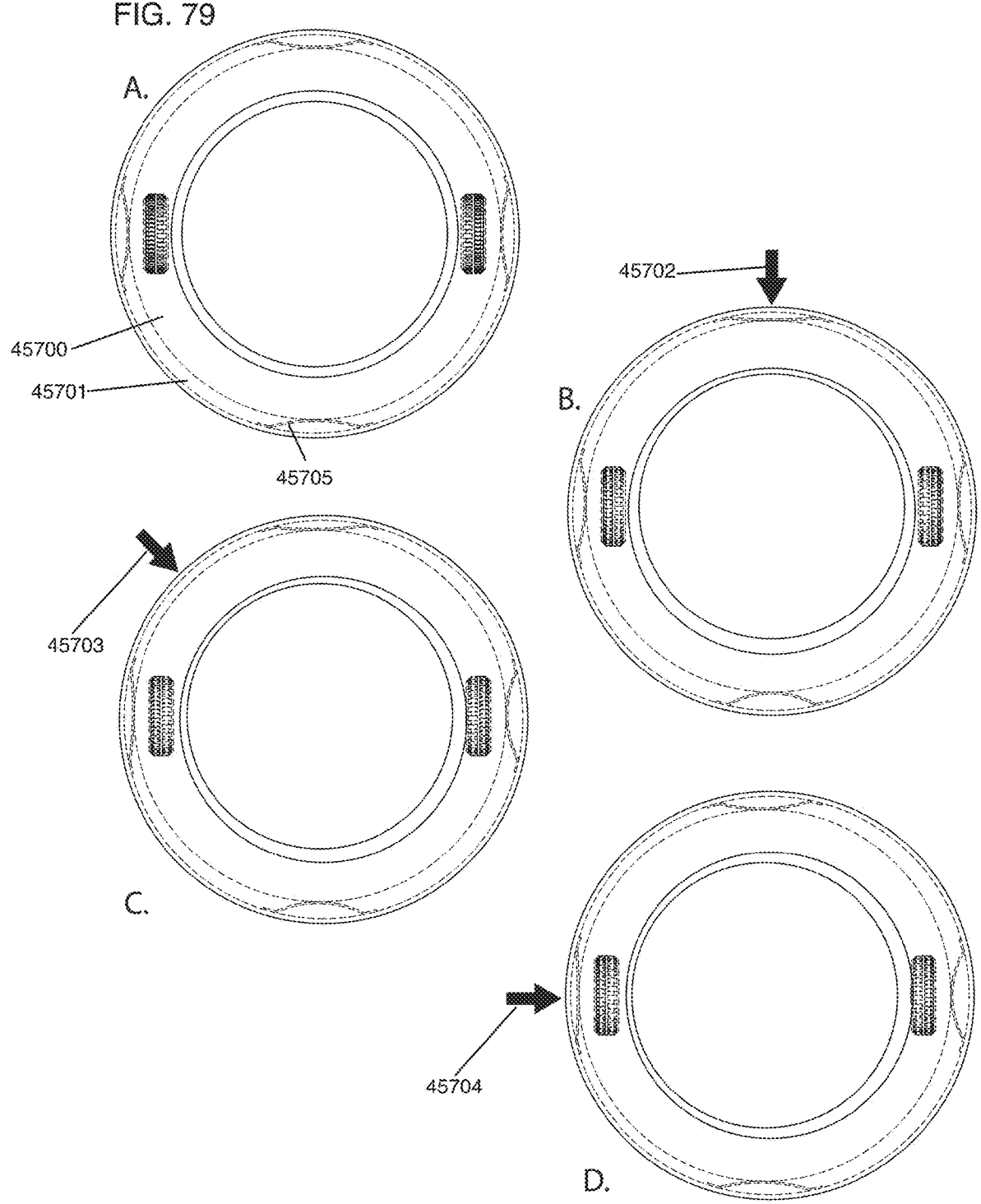

In robot with LIDAR (especially 2D LIDARS), LIDAR component usually will be places on top of the robot which is above the bumper. There will be cover to protect the LIDAR. However, this raised height will cause a vertical blind spot especially on sudden impacts.

FIG. 80B
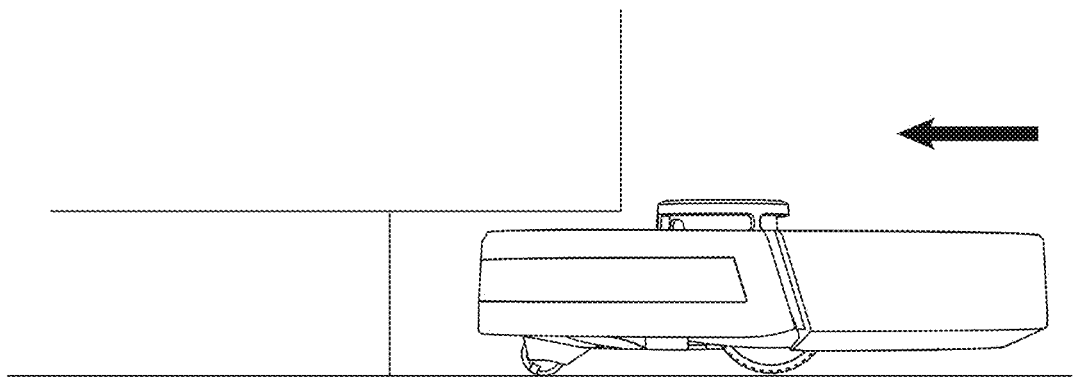
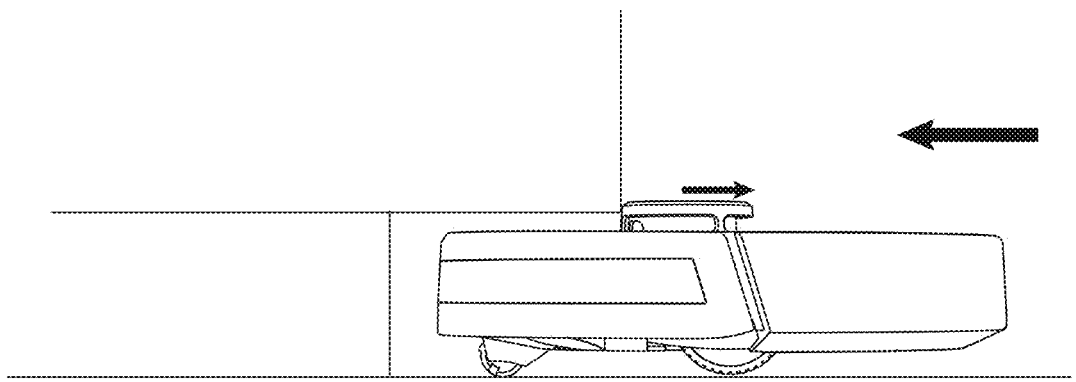
In this design we reimagined the LIDAR cover as a secondary bumper
to protect the LIDAR FIG. 80C
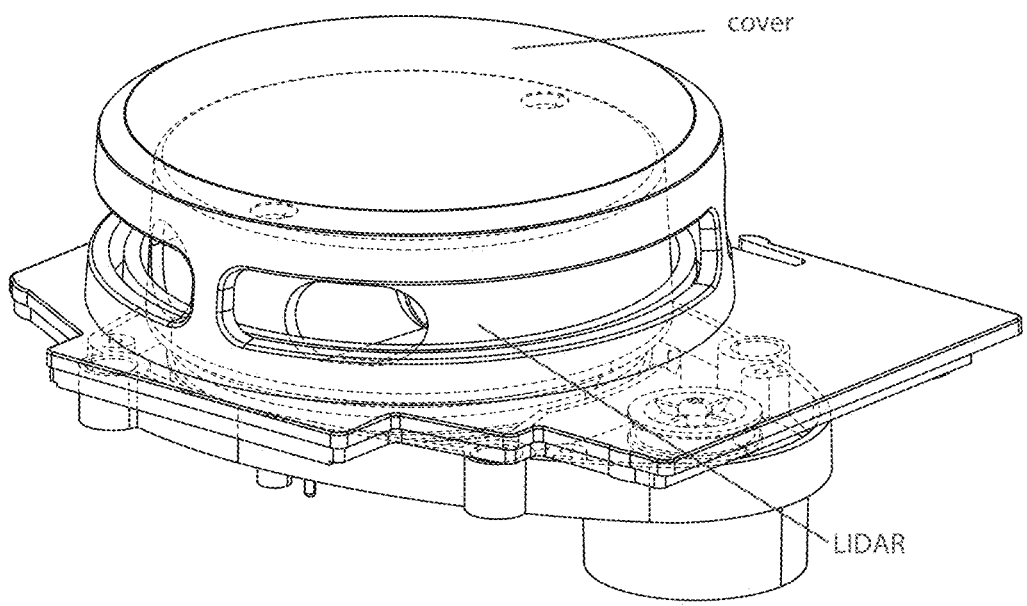
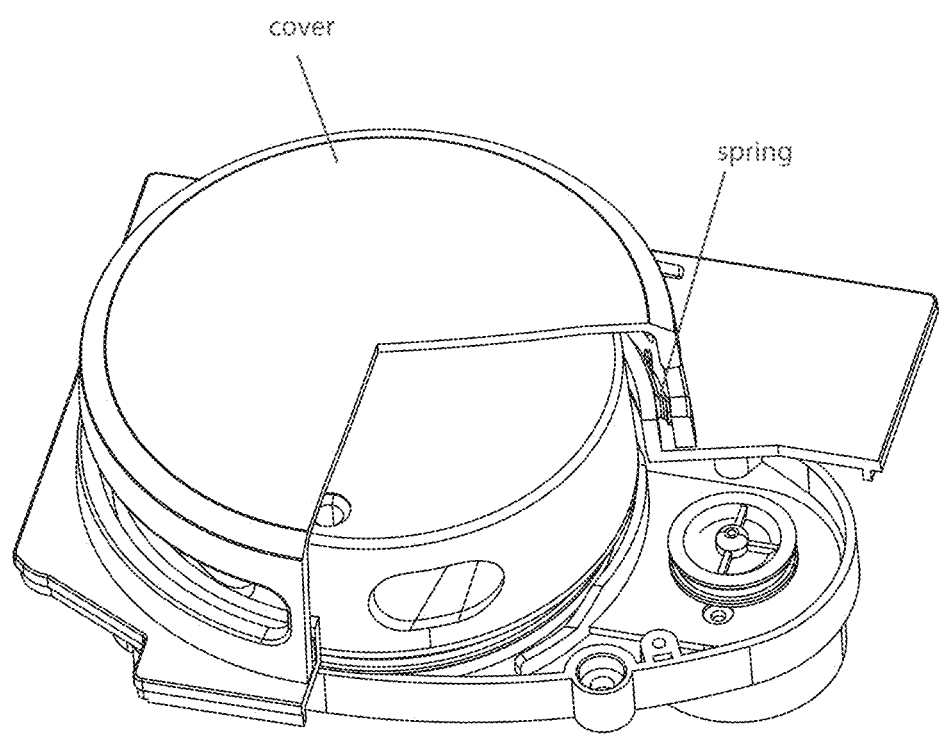
Here LIDAR is consisted of two separat parts with flat springs between them to cover (top) part can move slightly if any force applied to it.

FIG. 80D
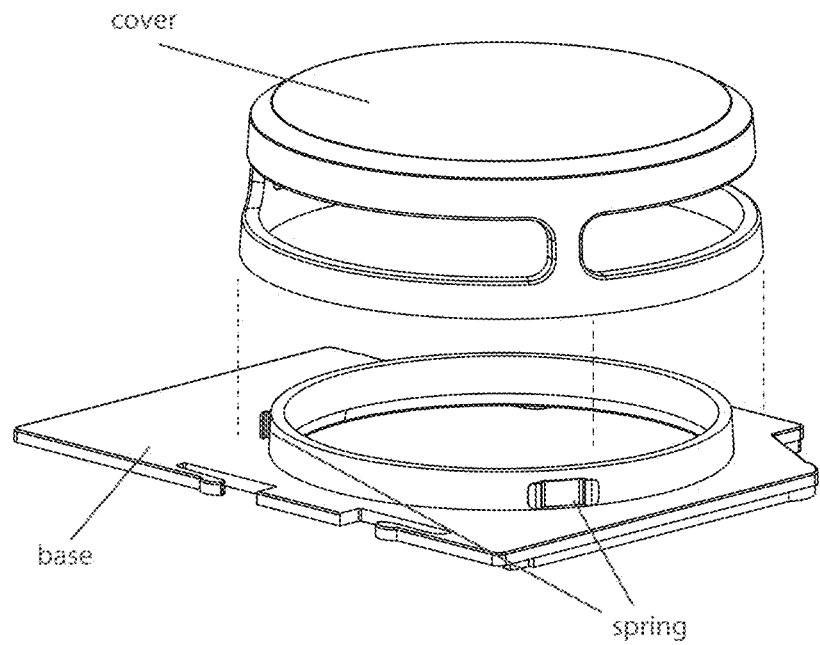
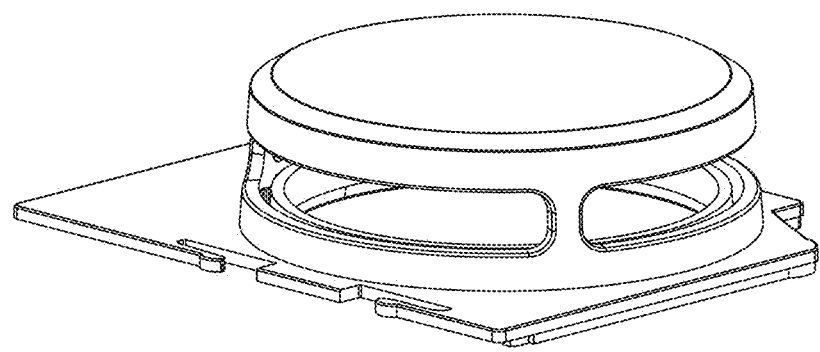

FIG. 80E
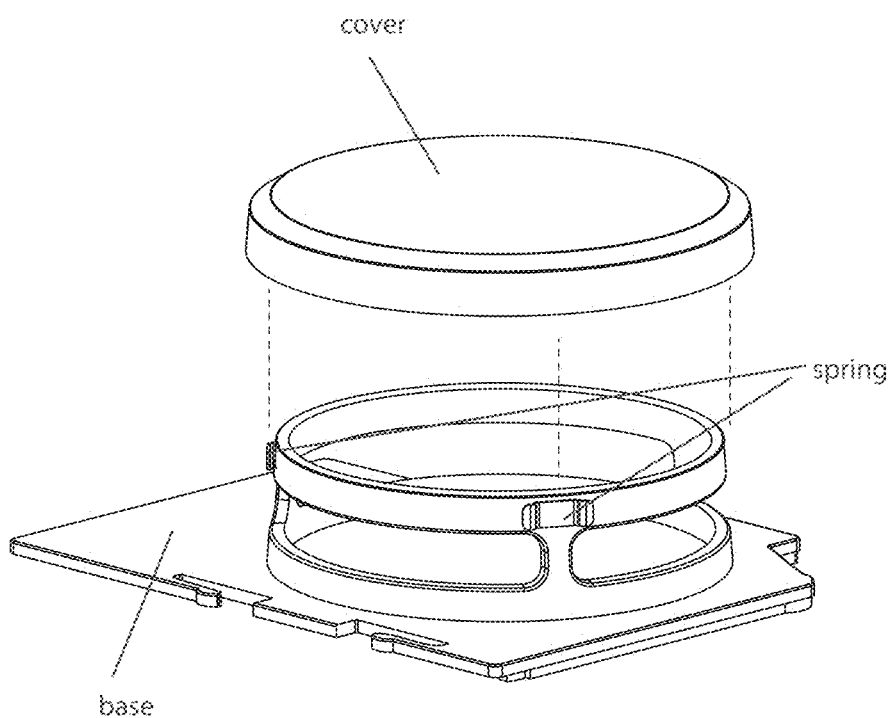
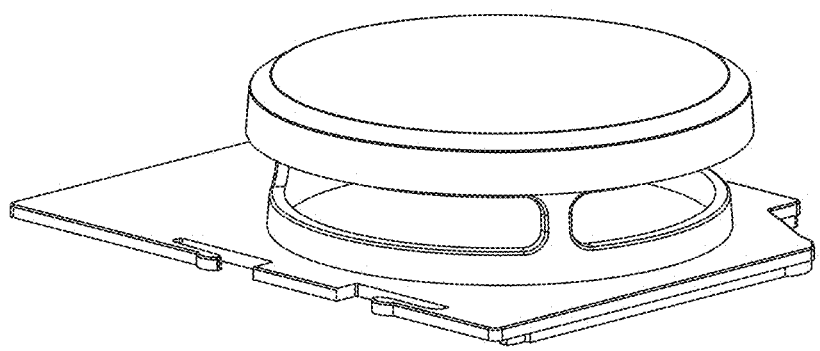

Columns in front of the LIDAR have to be opaque, however there is a freedom on material change on the top part of the cover. Therefore the top part itself can be devided into two parts FIG. 80G
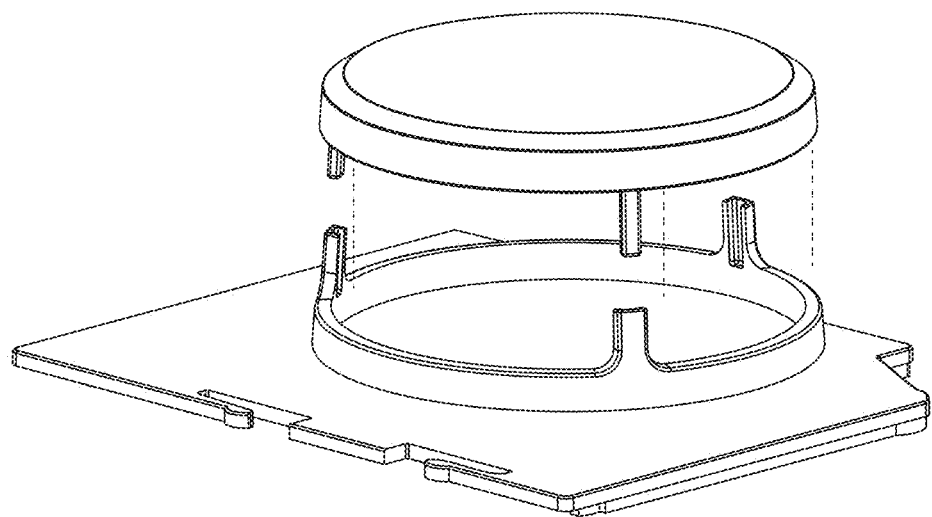
This concept can be applied to both regular LIDAR cover
and LIDAR cover as a bumper
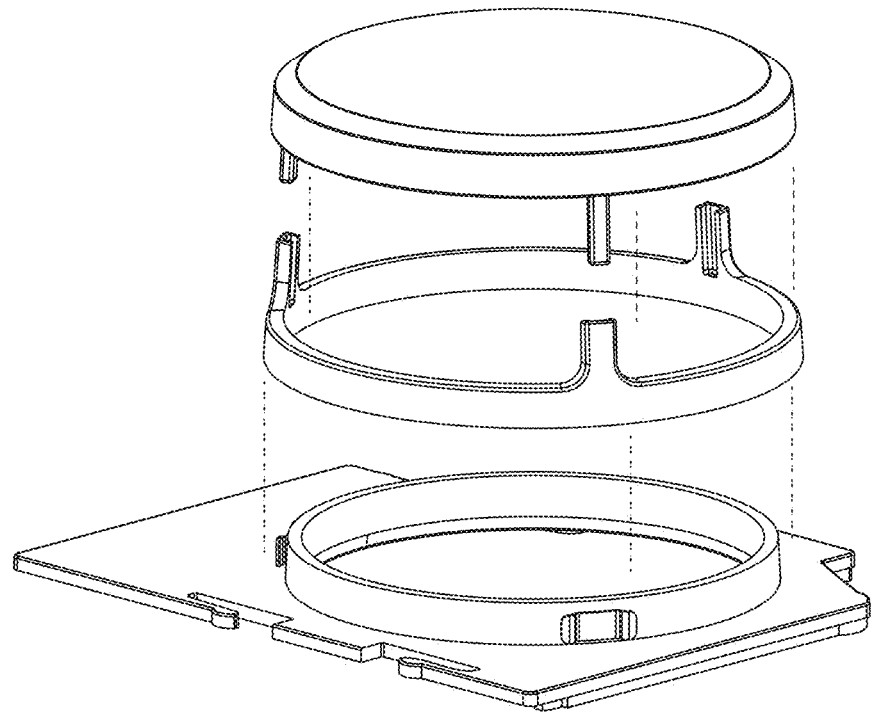

Alternatively we can cover up the columns with sleeves made of opaque material

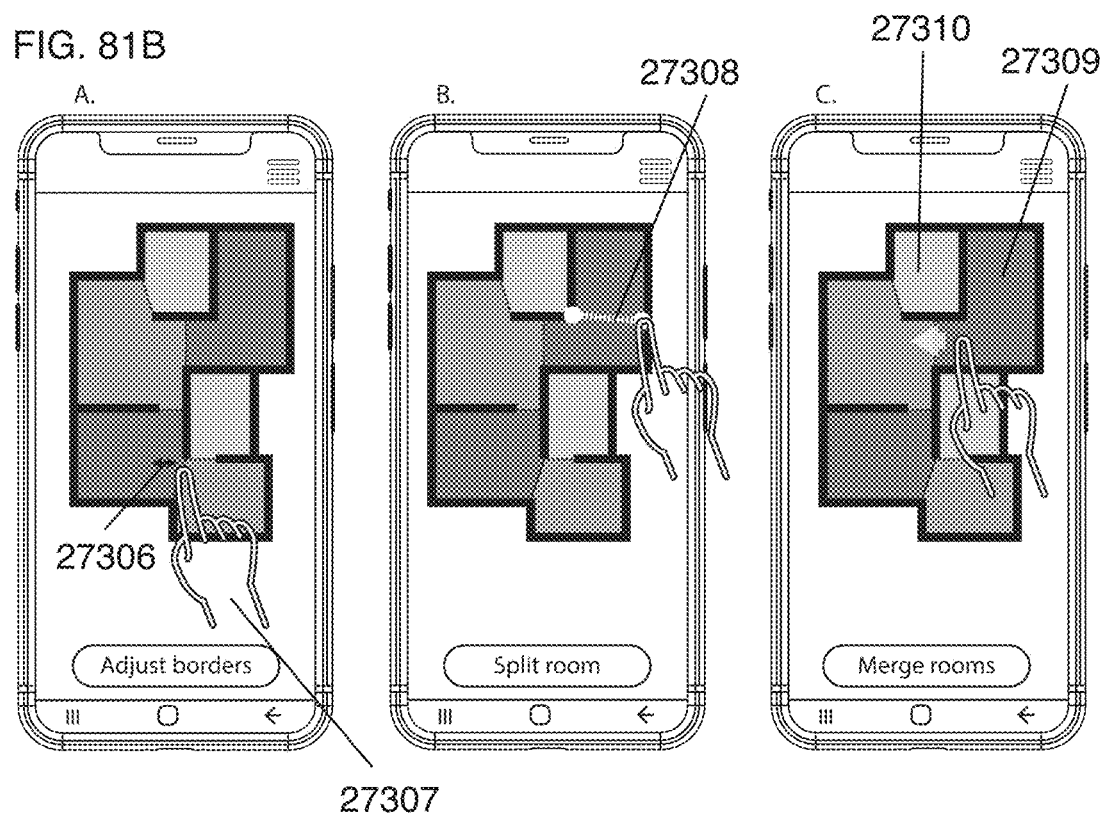

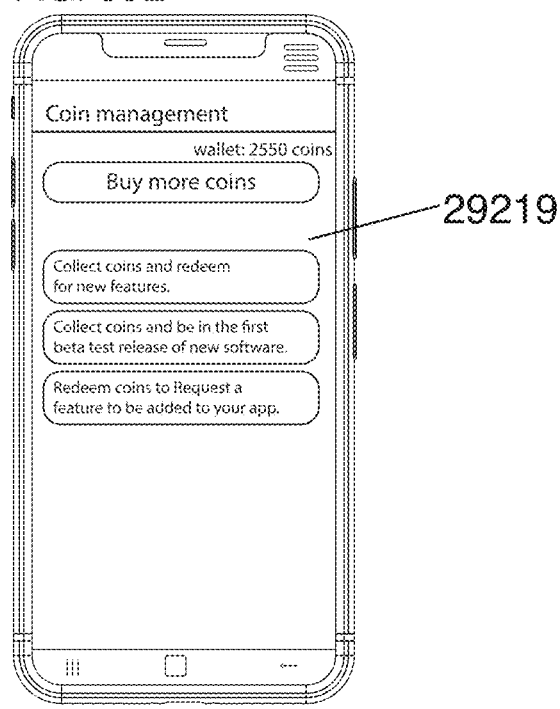

FIG. 91
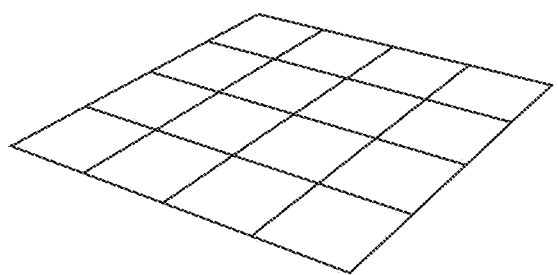
29800 — ◉ create virtual surface
○ floating? ($10)
◉ with legs? 29801
   ○ 1
   ○ 2
   ○ 3
   ◉ 4
◉ Straight legs 
○ Crossed  29802
○ Curved 
○ Classic 
○ add decorative gold trim! ($2)

FIG. 92
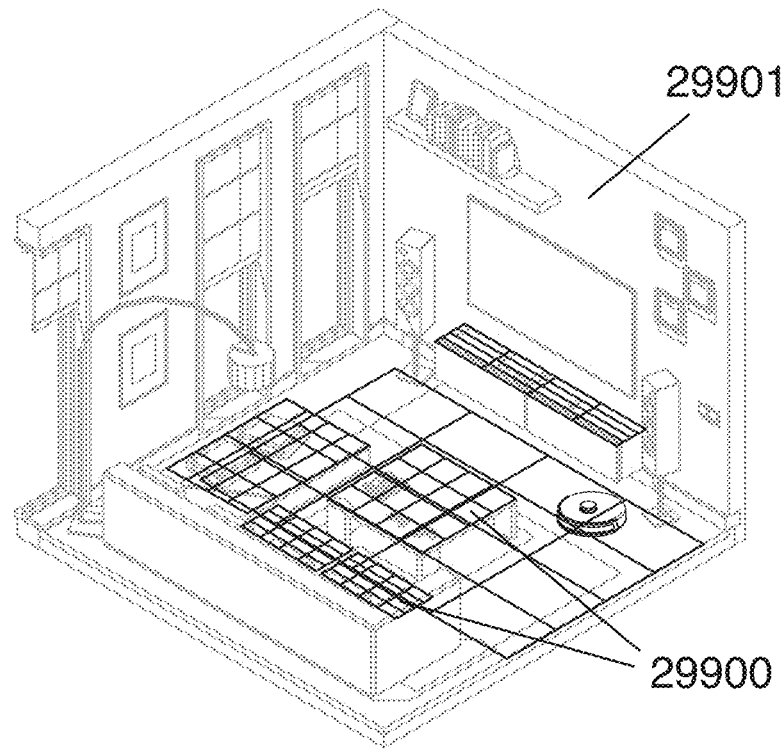
29901
29900
virtual teddy bear
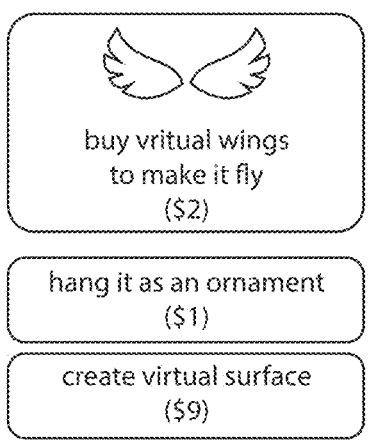
buy vritual wings
to make it fly
($2)
hang it as an ornament
($1)
create virtual surface
($9)
29903
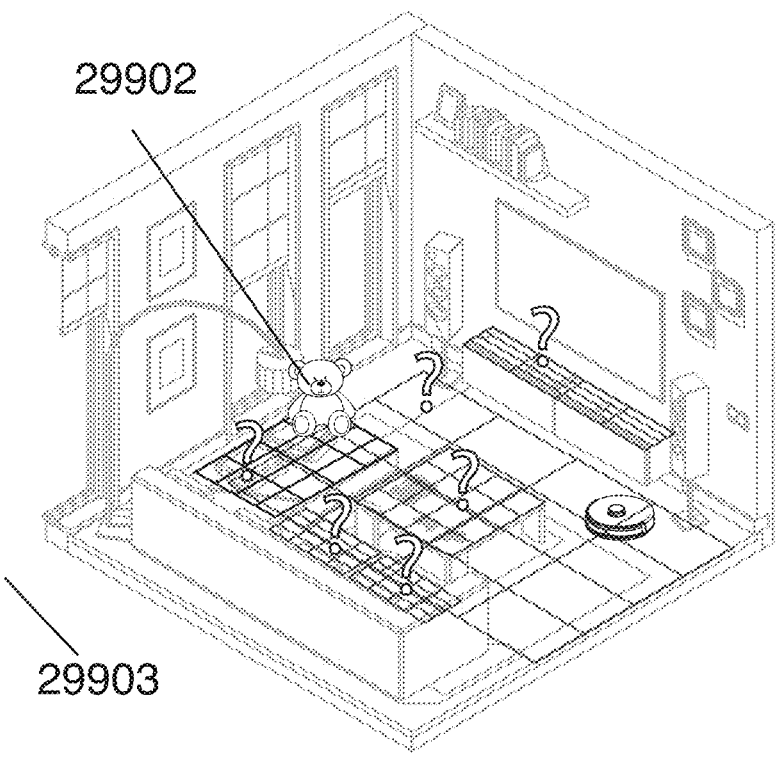
29902

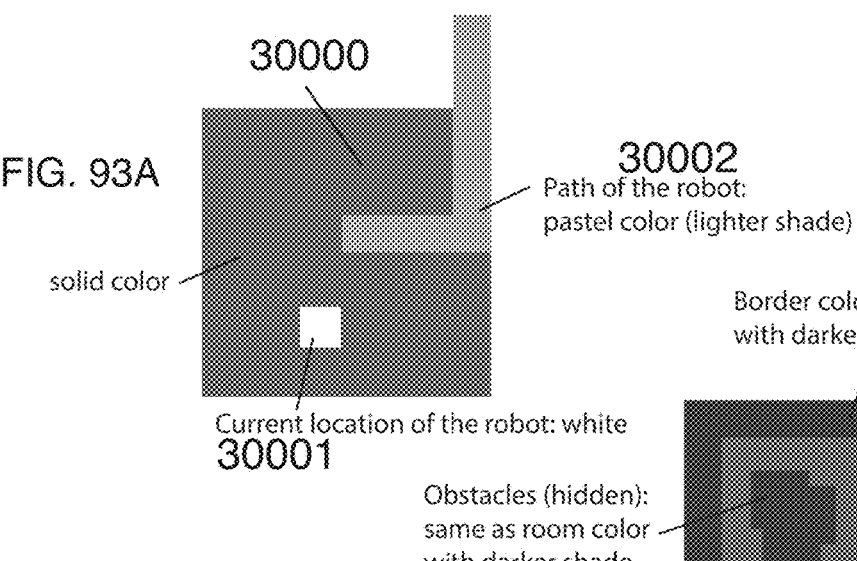
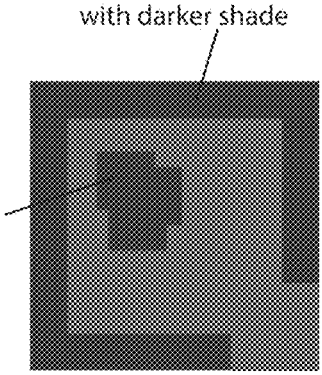
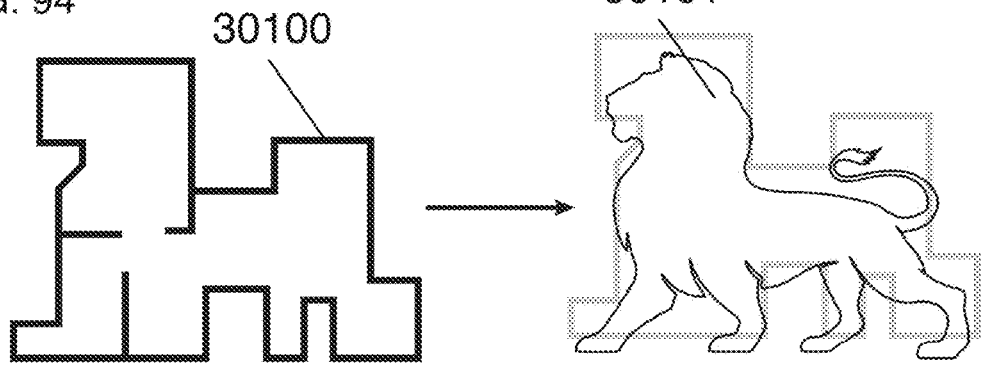

29300

29401

29400

29800
29801

29900

29901

FIG. 107
A.
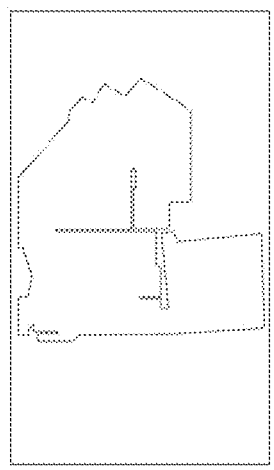
B.
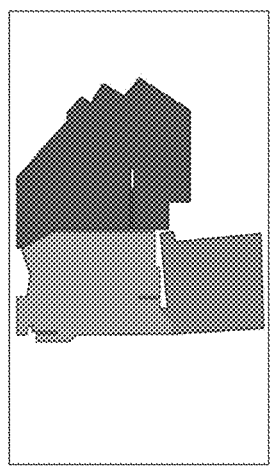
C.
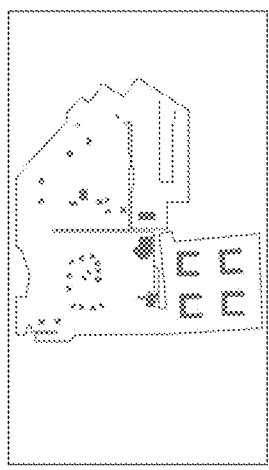
D.
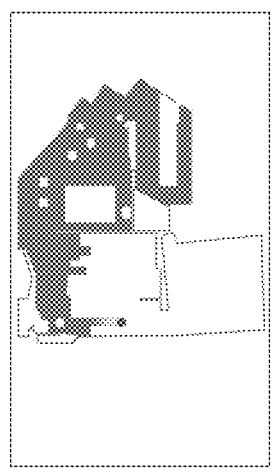
E.
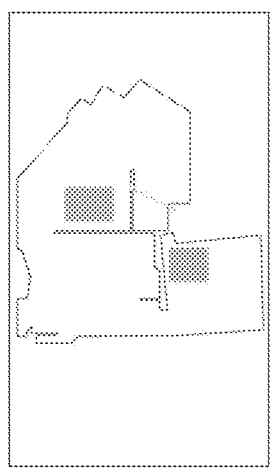
F.
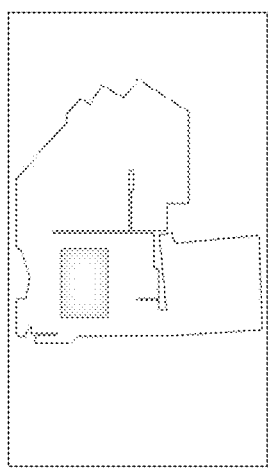
G.
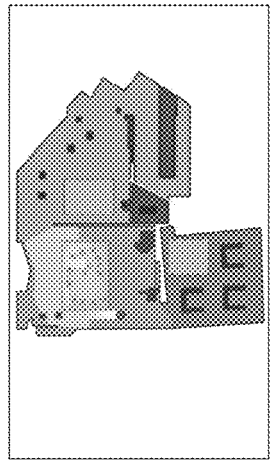

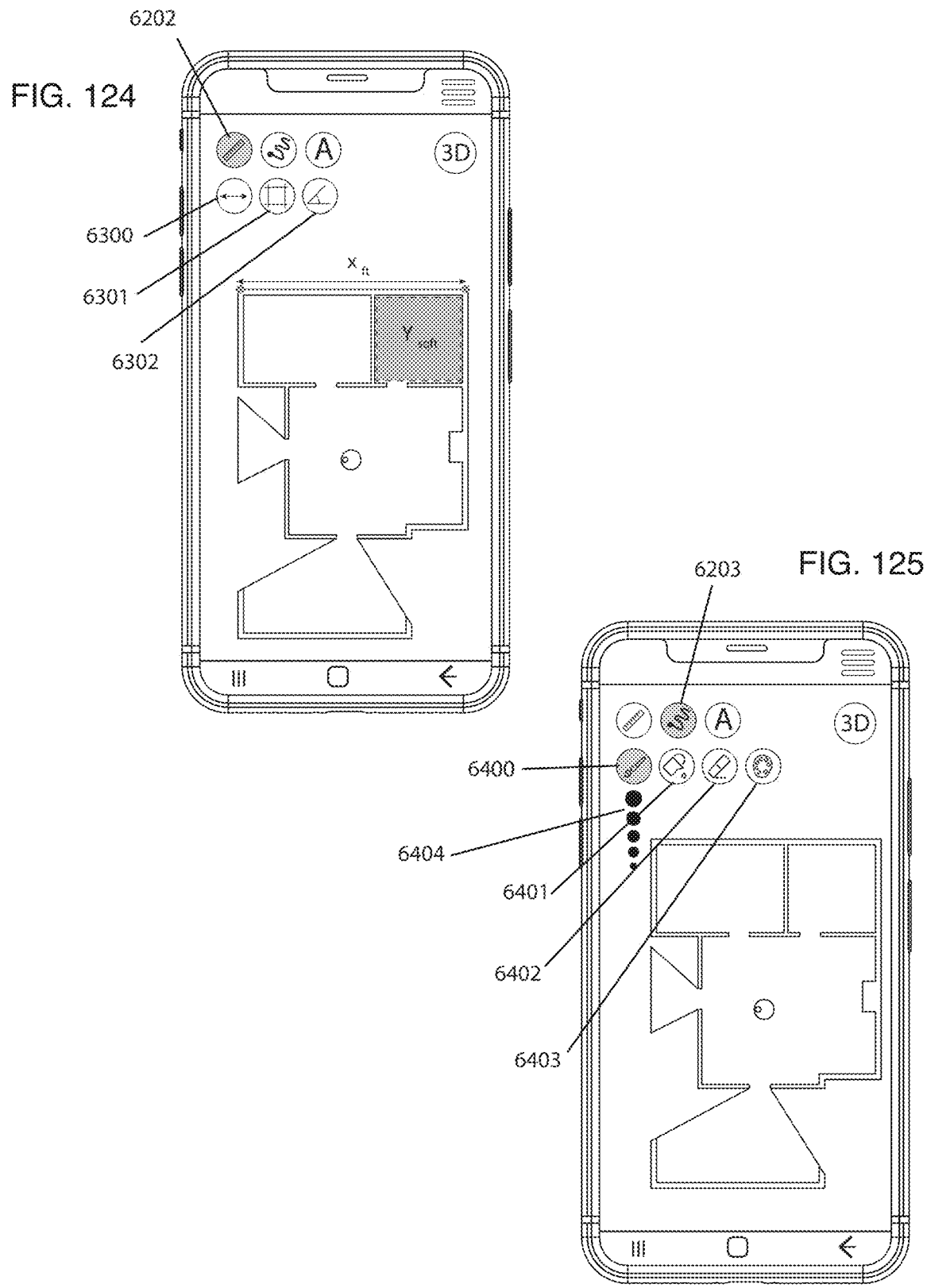

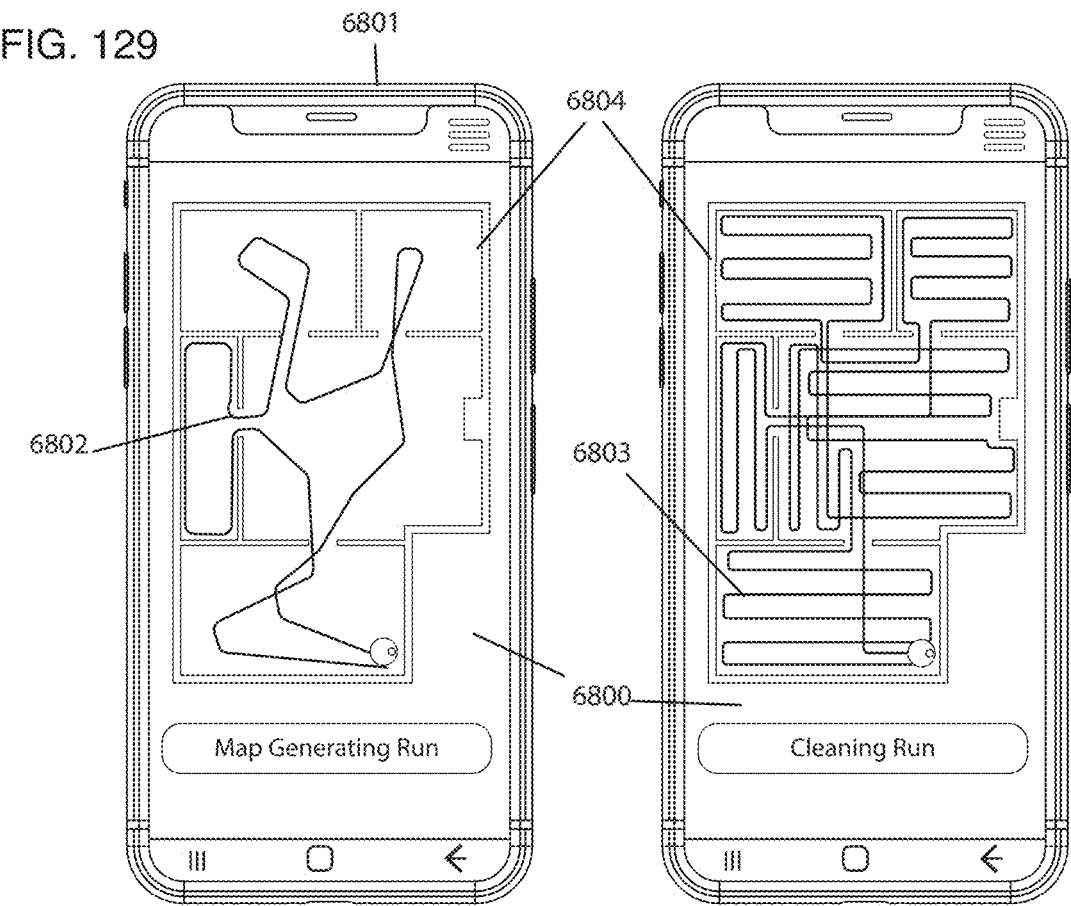
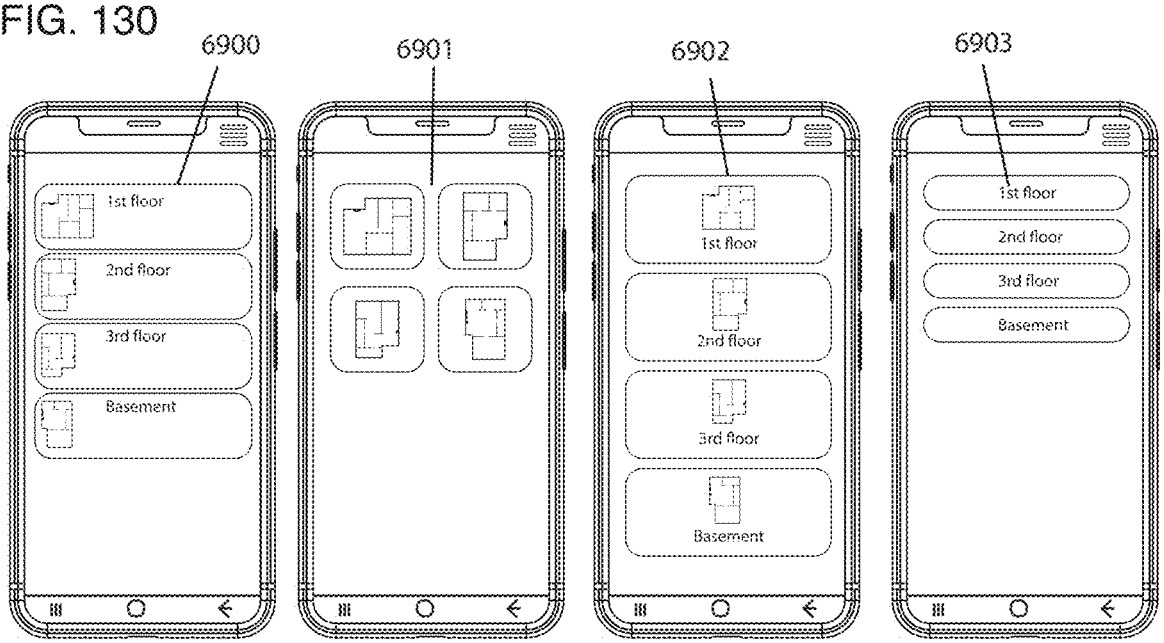

FIG. 151A 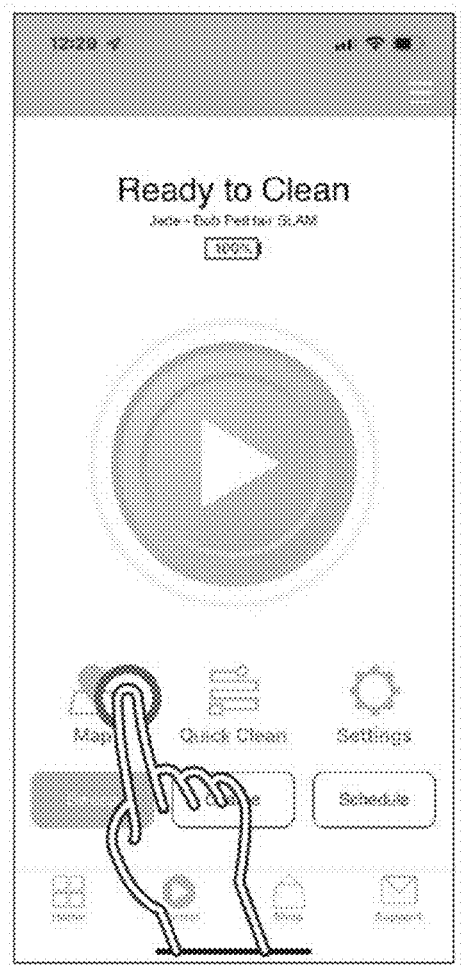 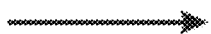 FIG. 151B 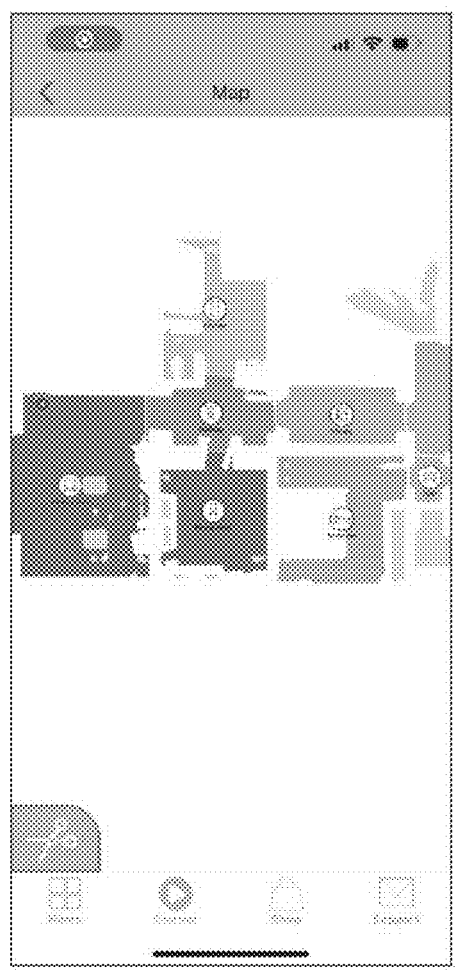

saved NoSweep zone saved NoSweep line

FIG. 165A
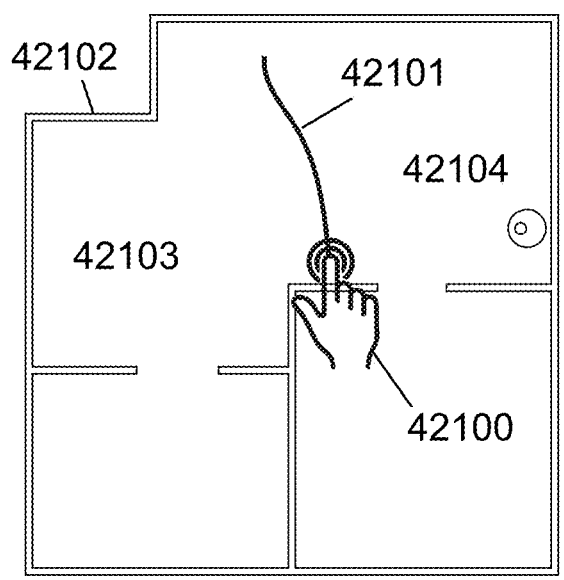
User may draw lines in the app to split the map into separate sections.
These lines will automatically become straight and will be extended to closest walls
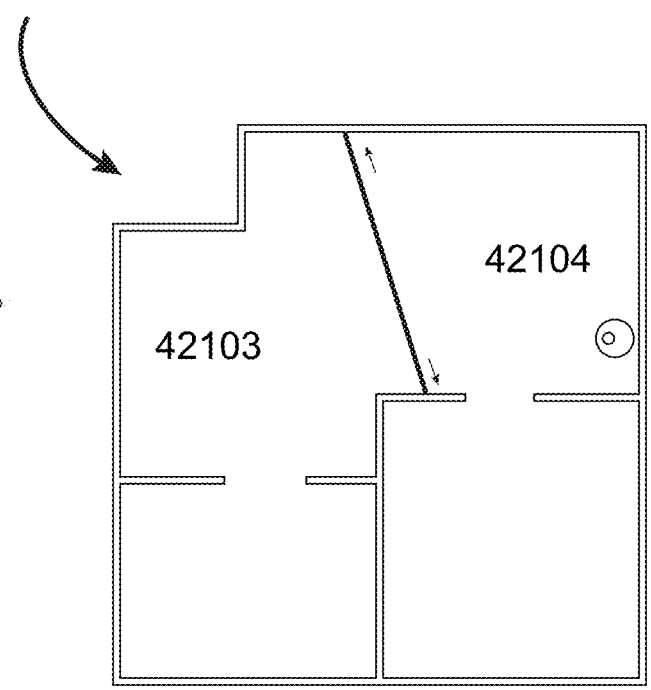

FIG. 165B
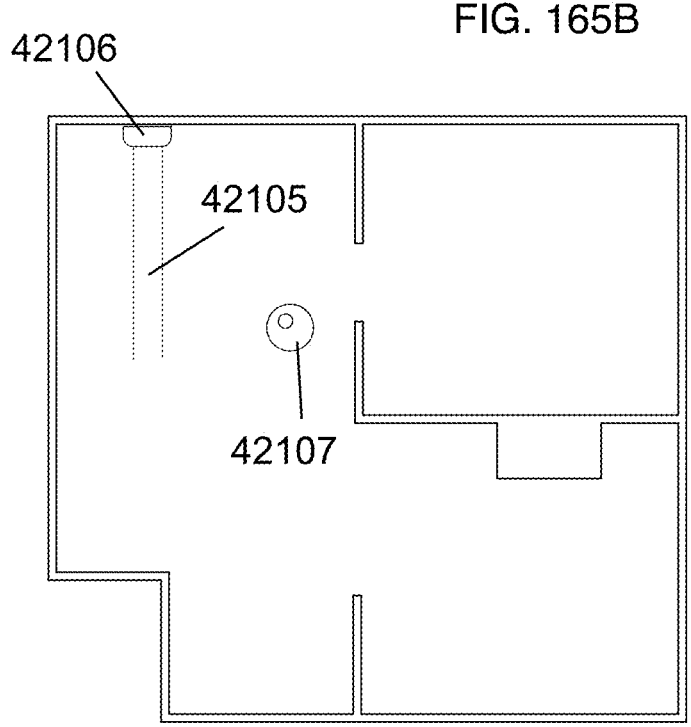
In the app charging station 'zone' may be drawn by colored or dotted lines indicating the IR beams emmiting from the station. User may guide the robot to this zone for it to find the station
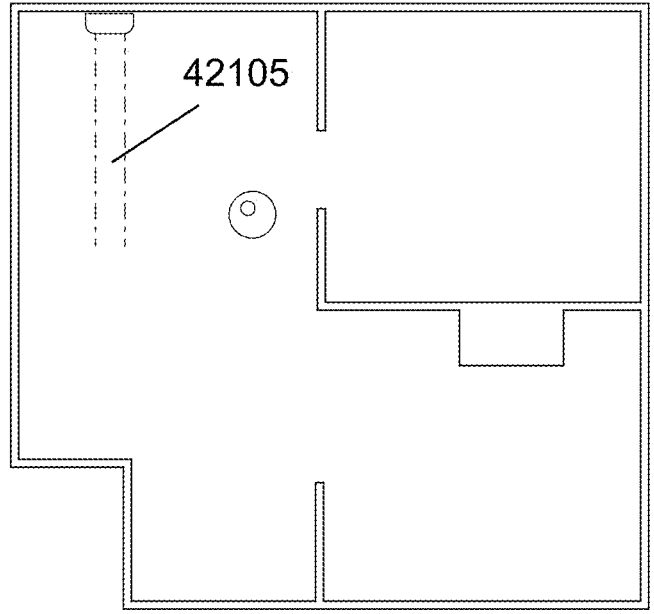

FIG. 165D
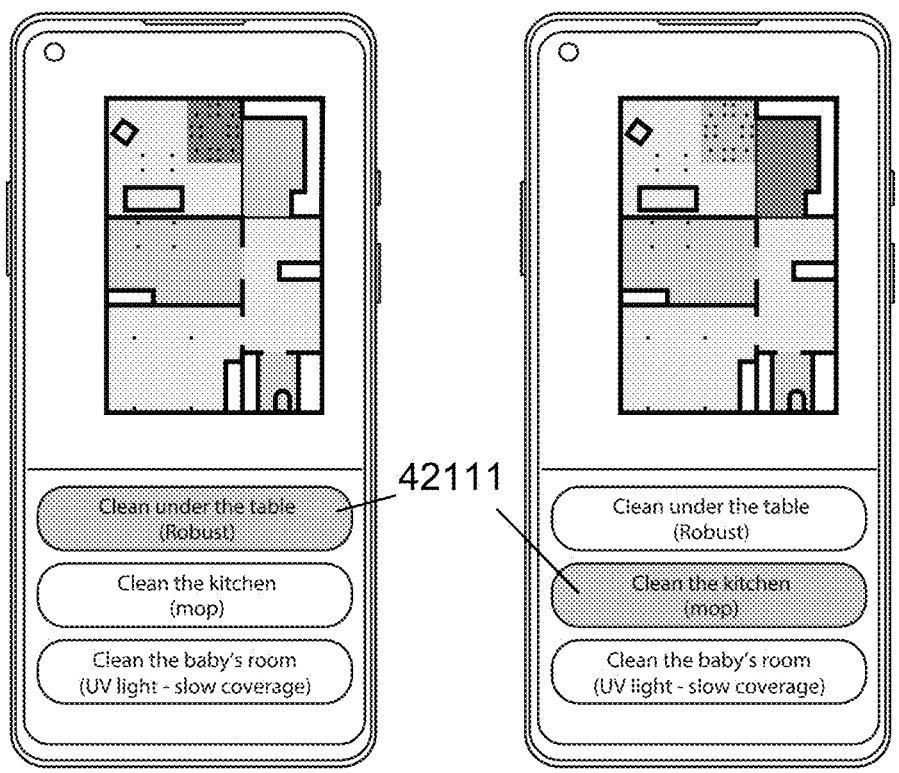
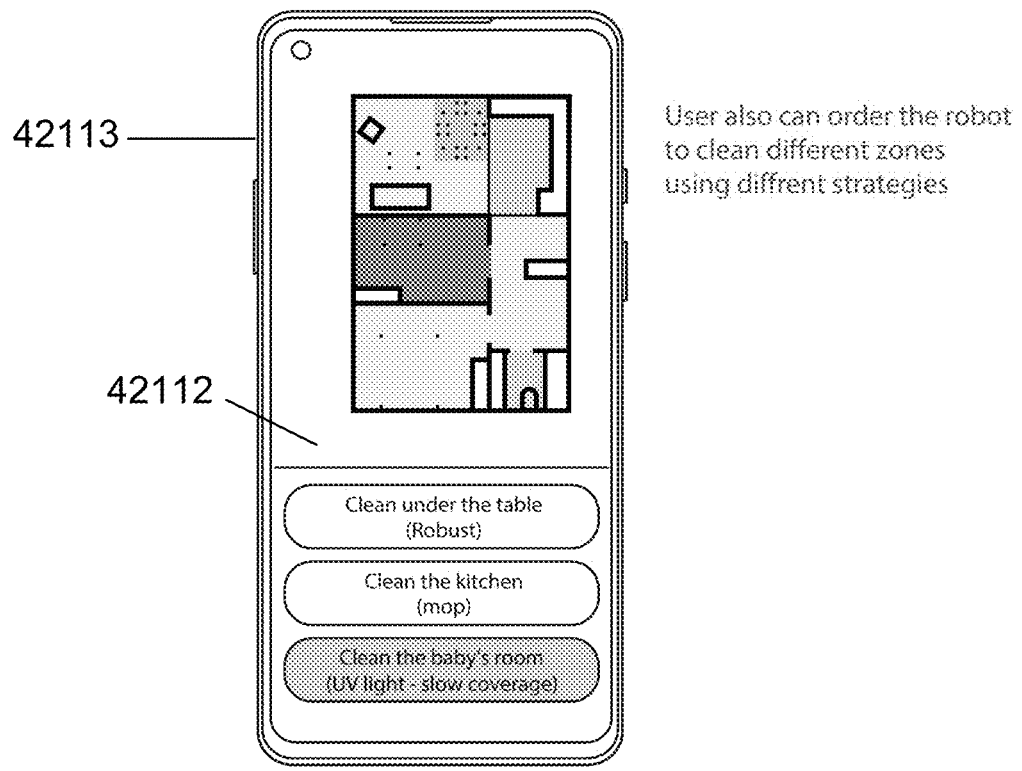

FIG. 166
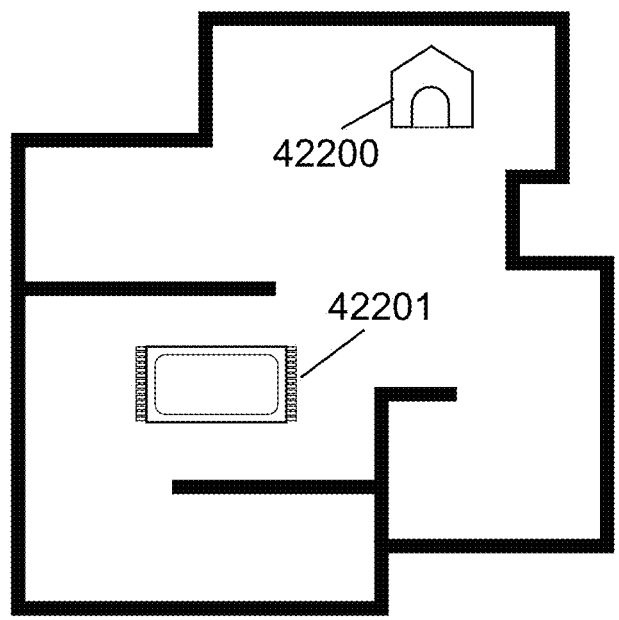
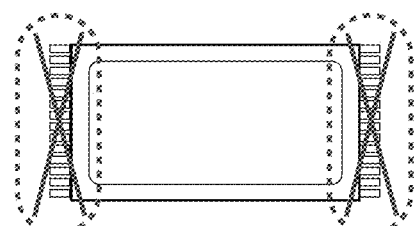
FIG. 167A
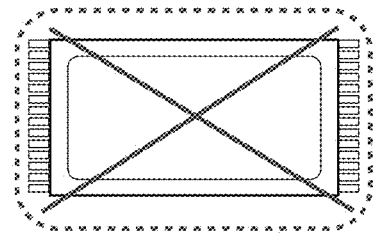
FIG. 167B
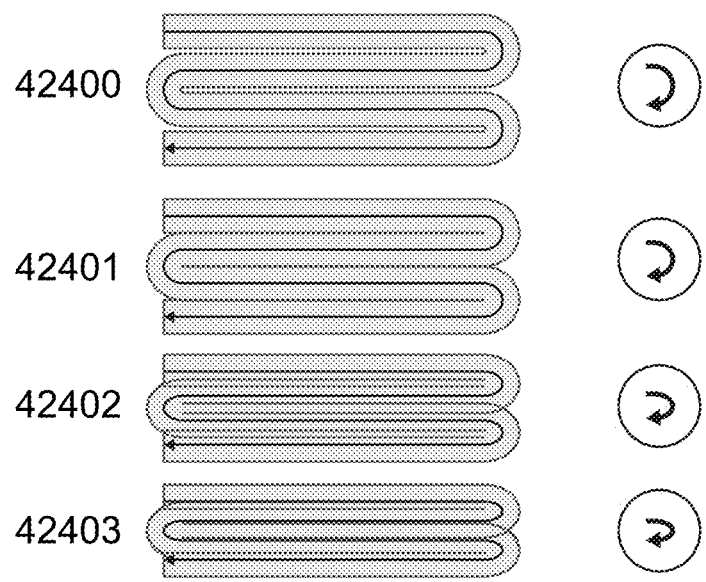
FIG. 168

FIG. 177
A.
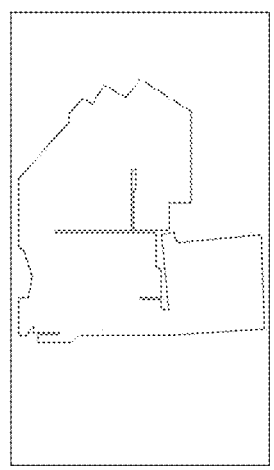
B.
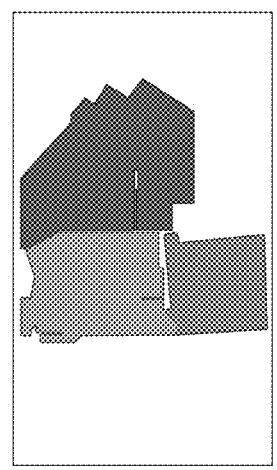
C.
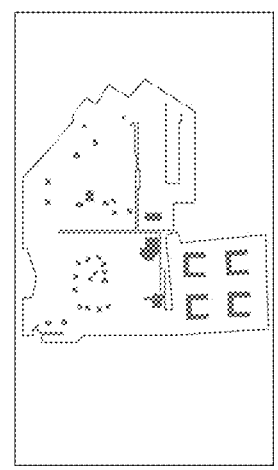
D.
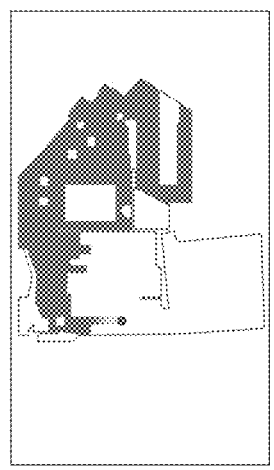
E.
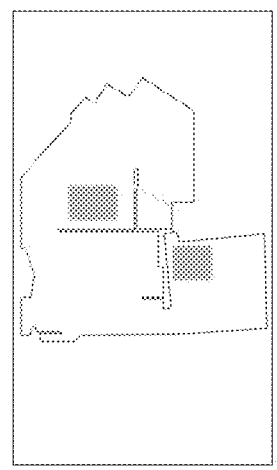
F.
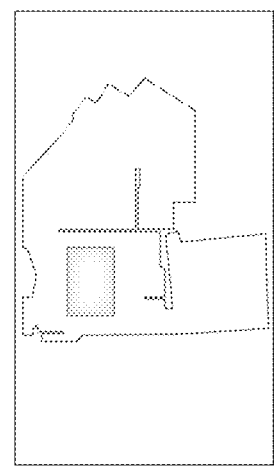
G.
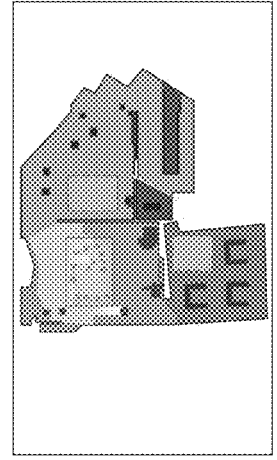

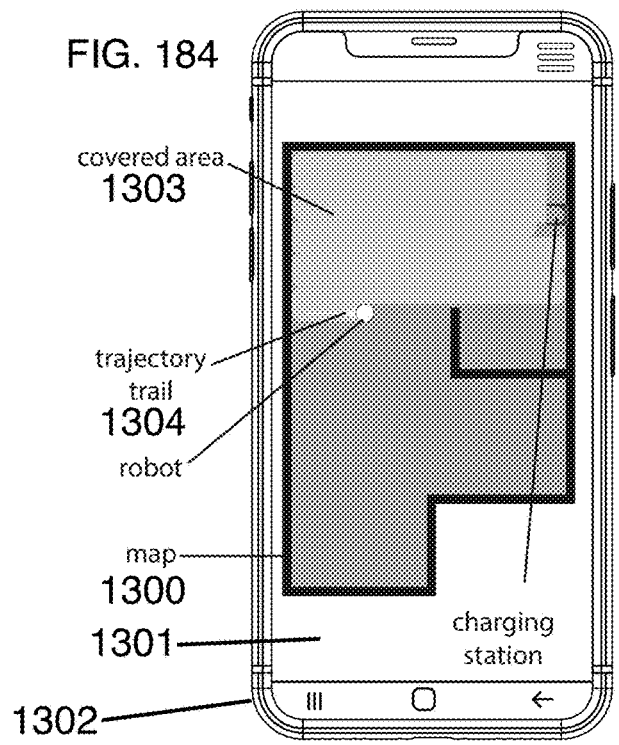
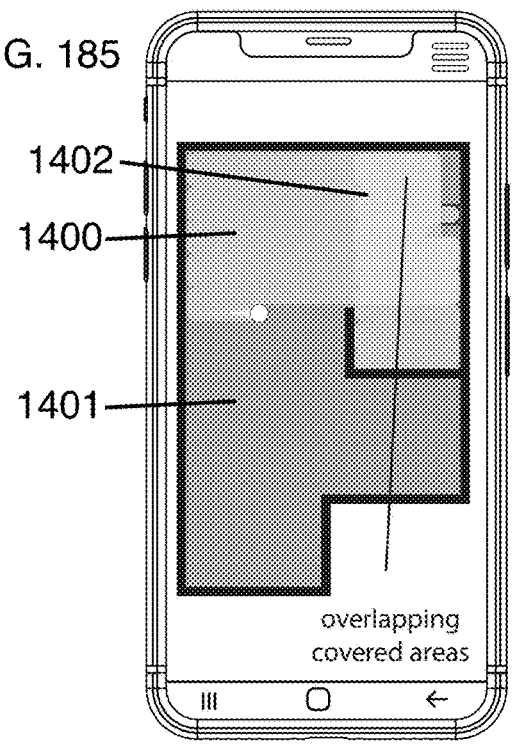
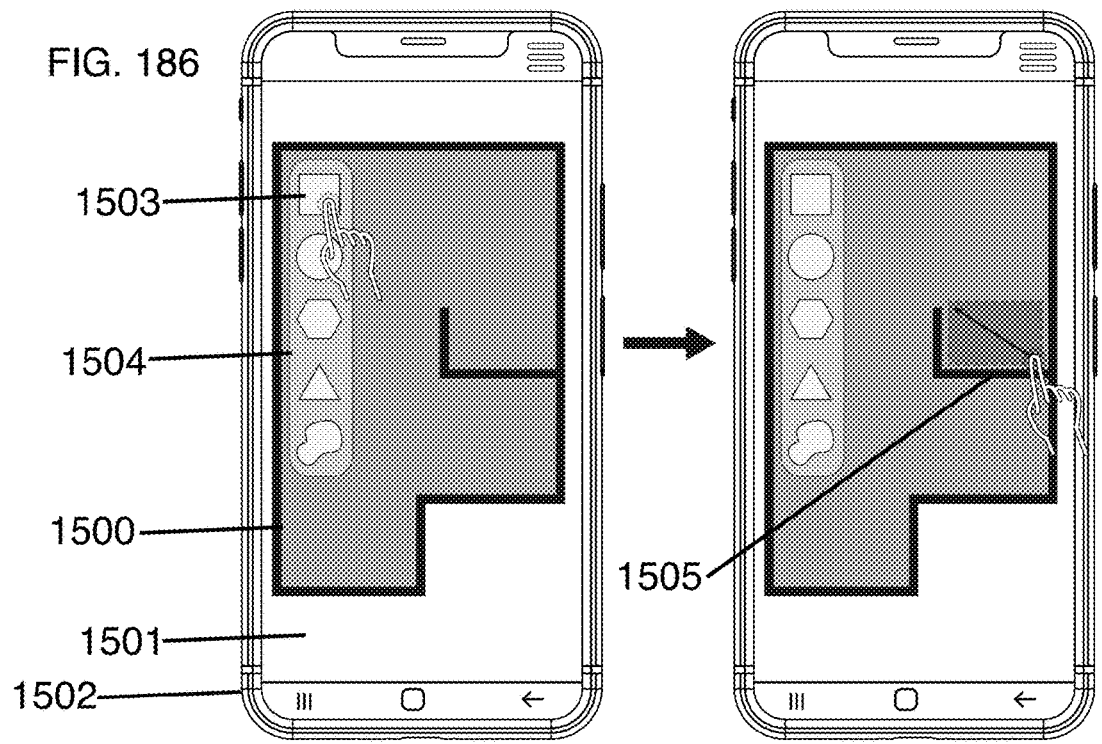

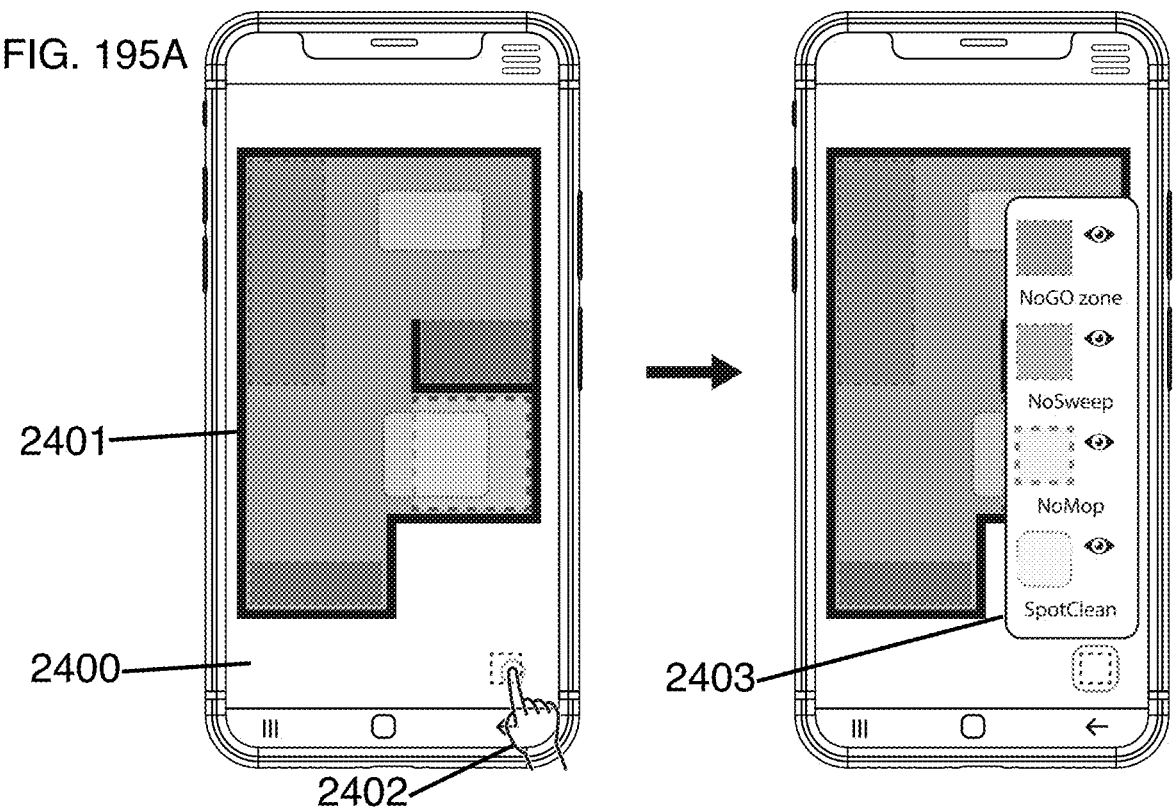
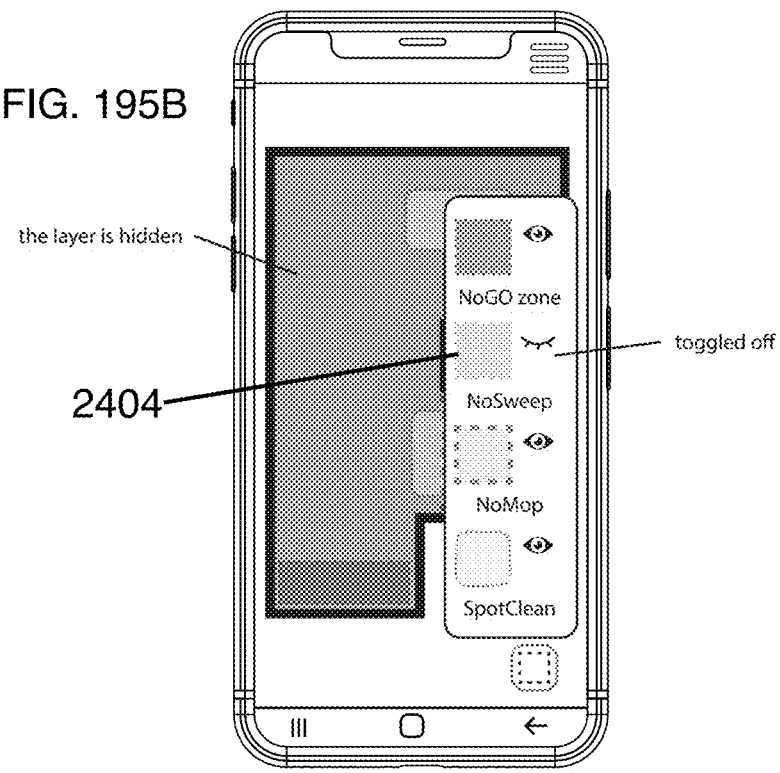
FIG. 195A
FIG. 195B voice capture signature schematics

FIG. 214
Representations:
1 - temporal
2 - temporal on grid
3 - stitched
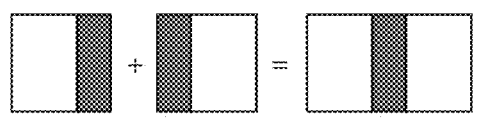
4 - reconstructed 3D mesh
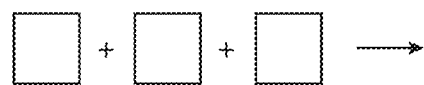
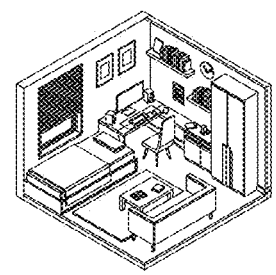
5 - immersive
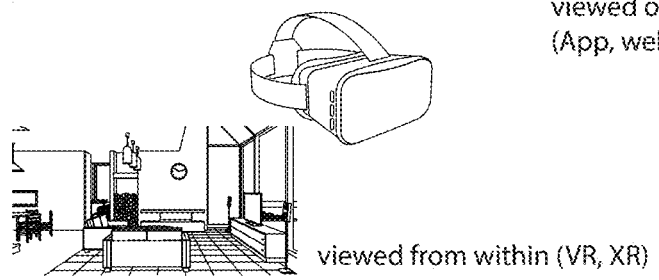
viewed from within (VR, XR)
viewed on flat screen
(App, web page)
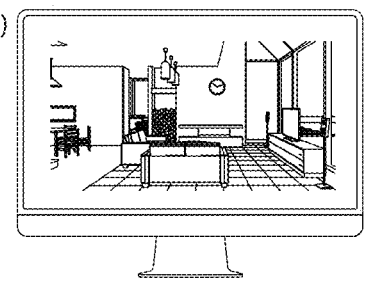

FIG. 215A
FIG. 215B
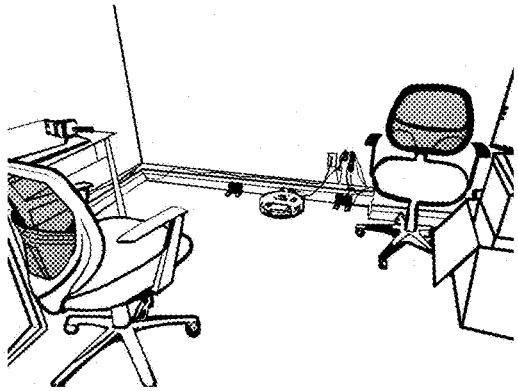
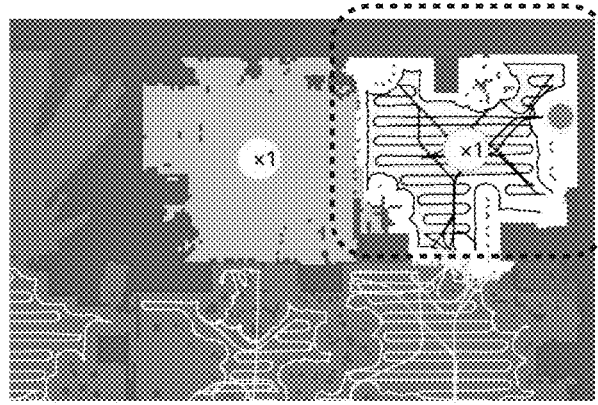
FIG. 216
0 represents cable. 1 represents shoe. 2 represents sock. 3 represents chair

6300

A.

B.

C.

FIG. 226
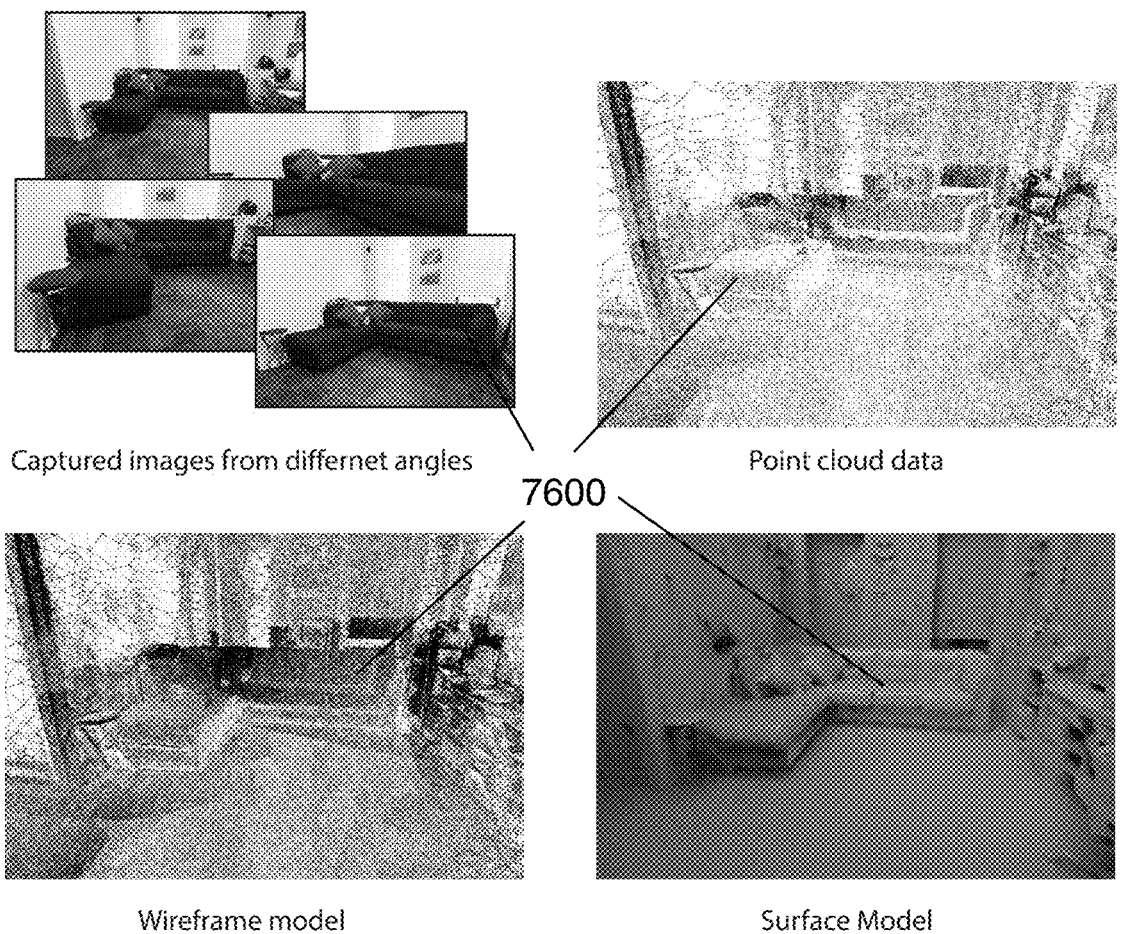
Captured images from differnet angles
Point cloud data
Wireframe model
Surface Model
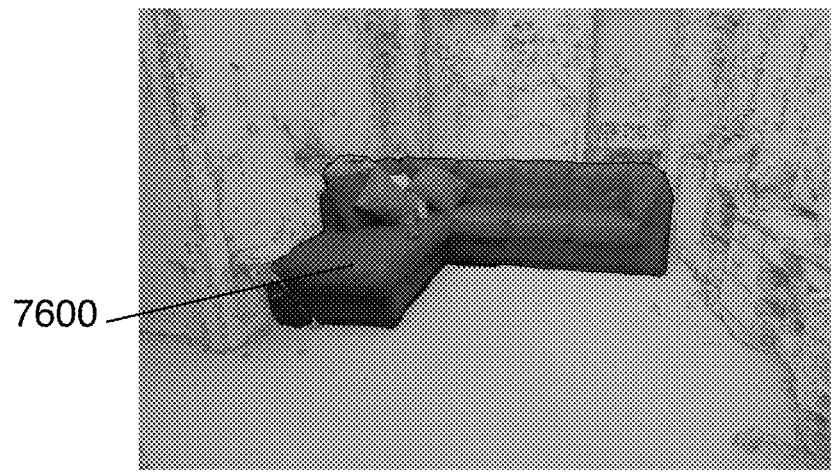
Detected and reconstructed 3D object by combining data

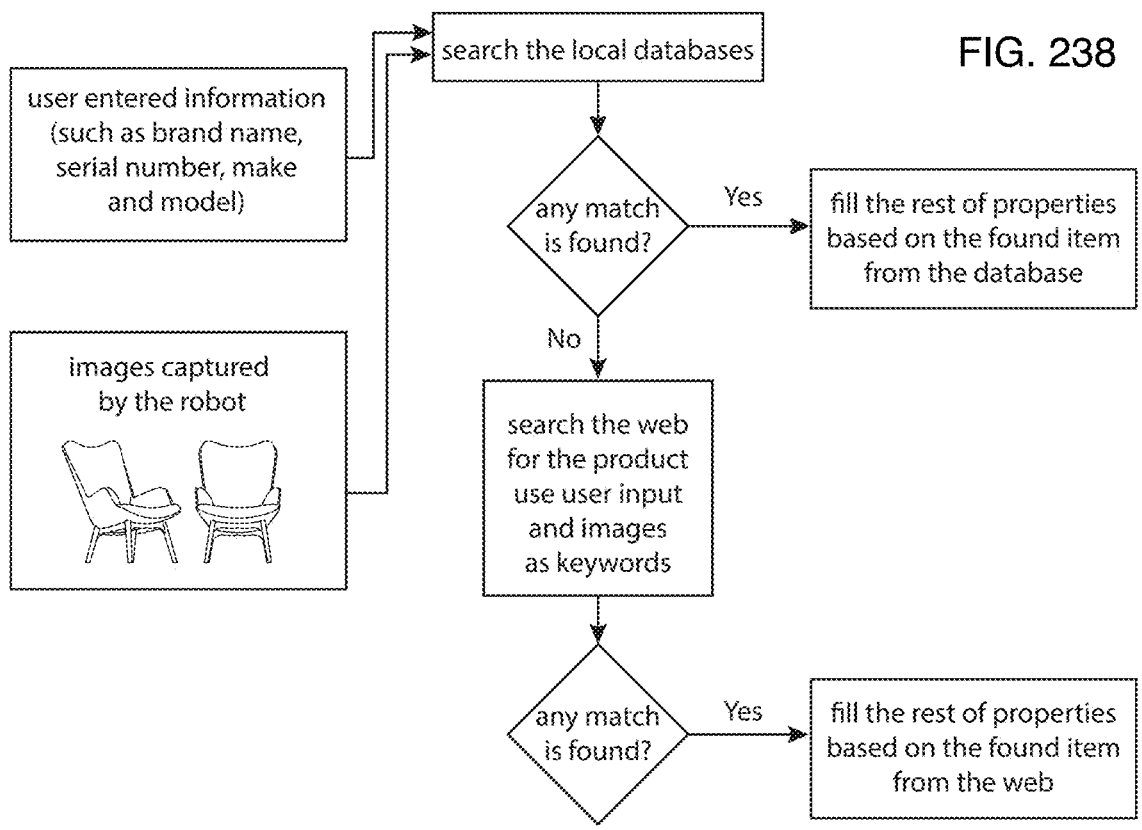
FIG. 238
FIG. 239
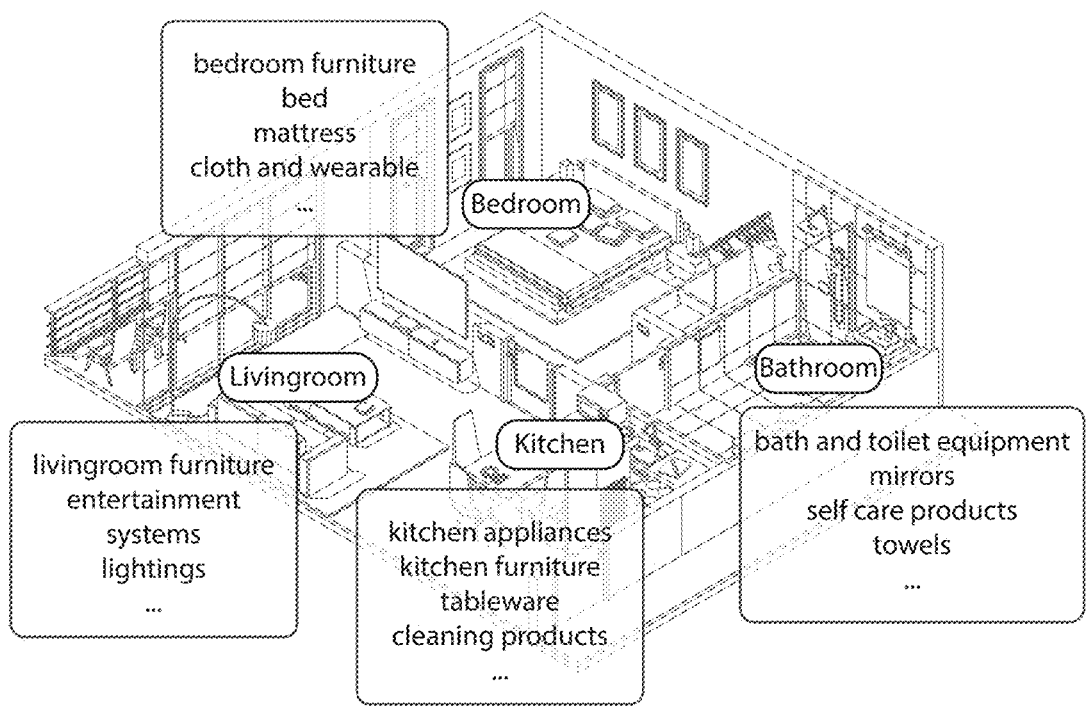

FIG. 240
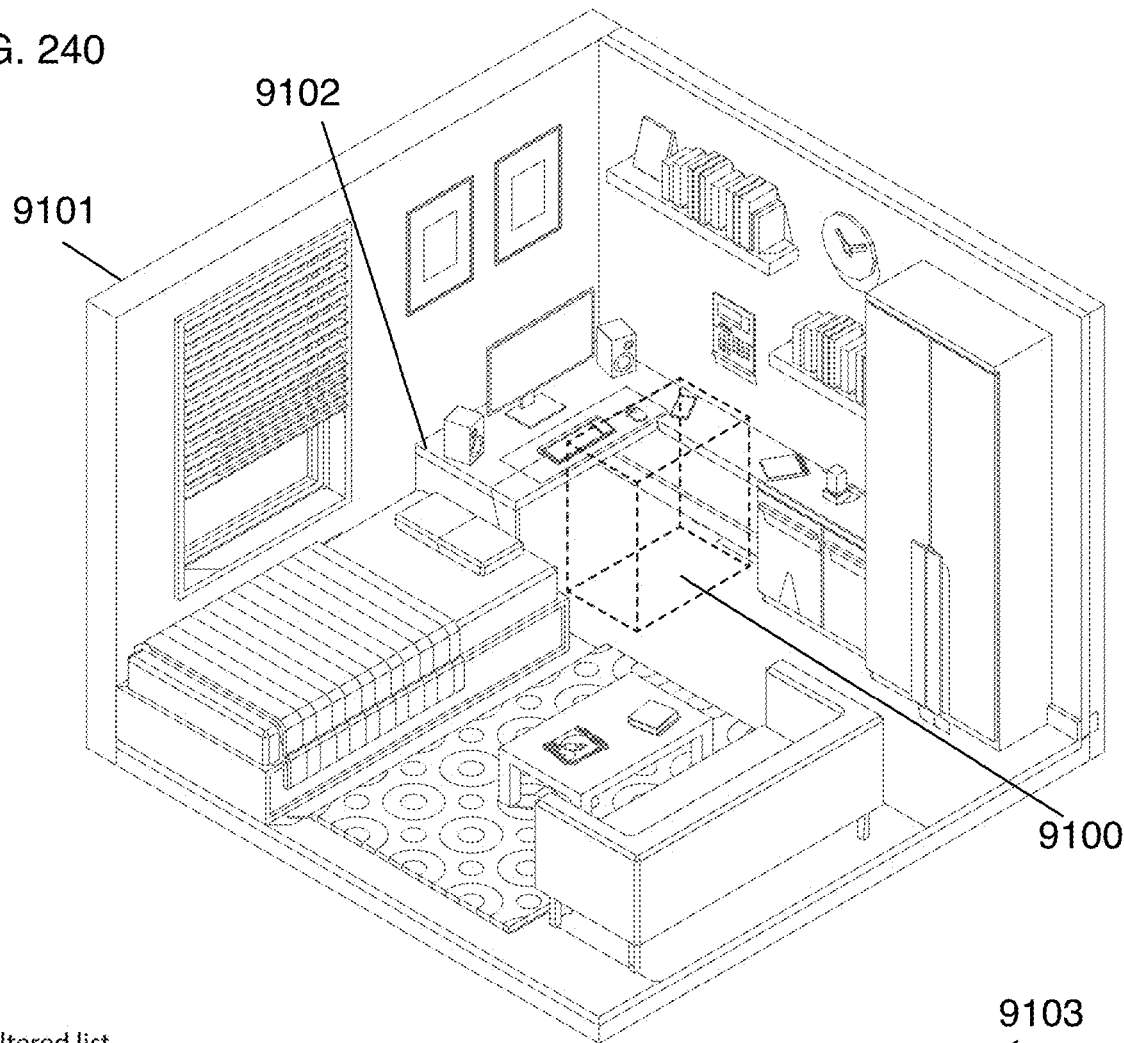
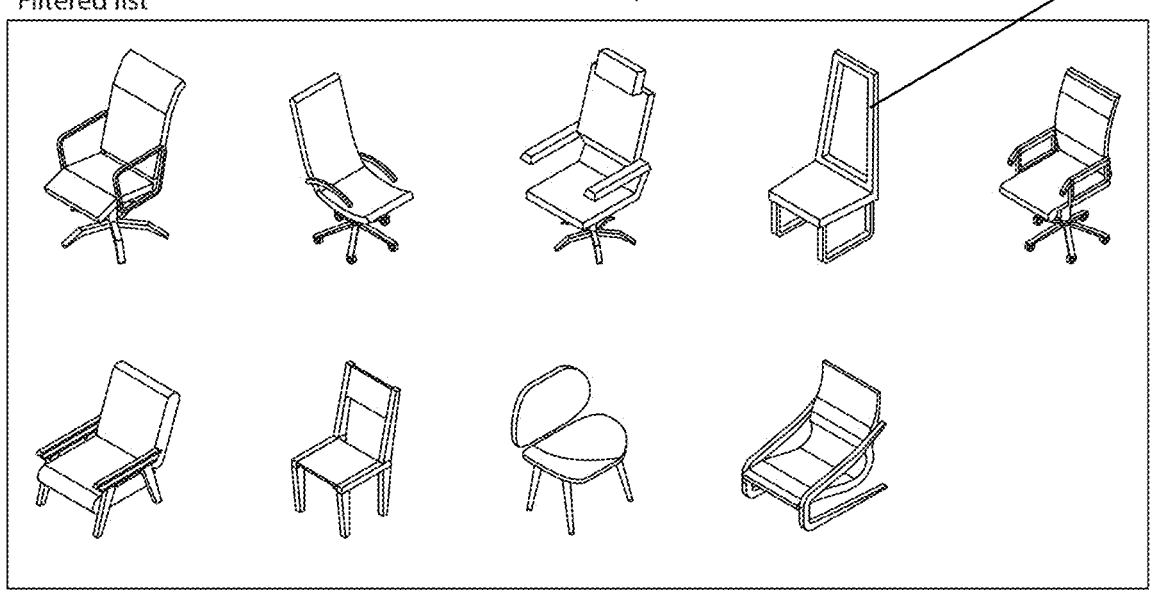
Filtered list

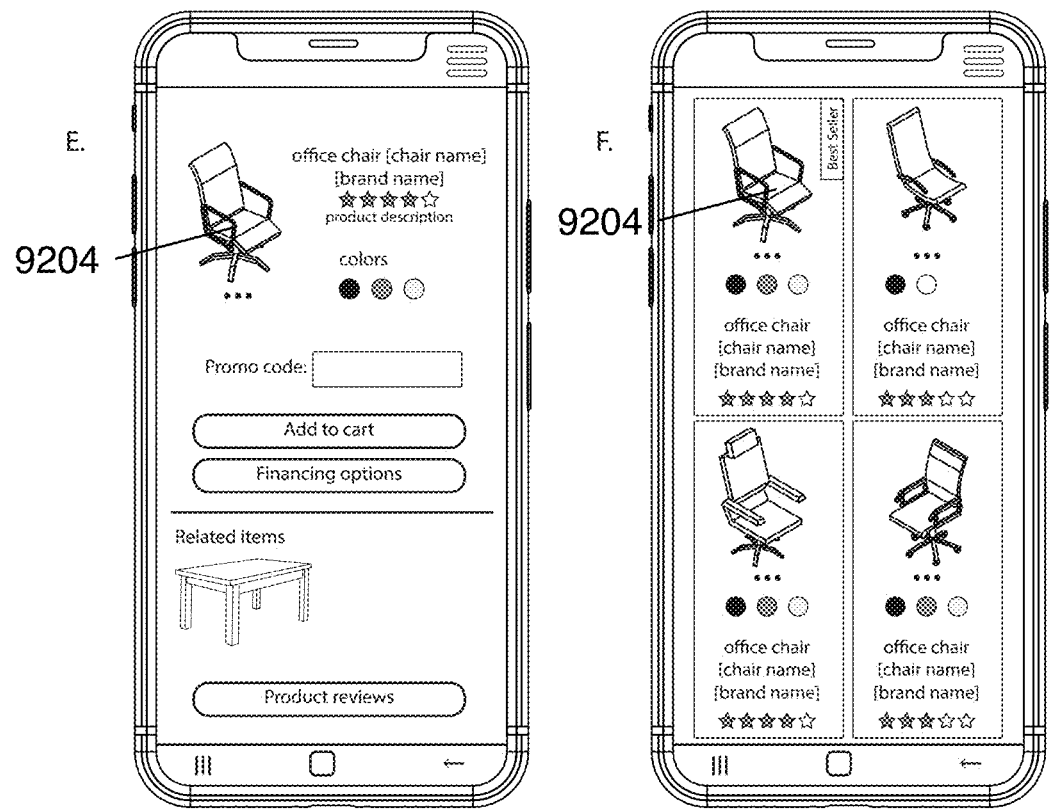
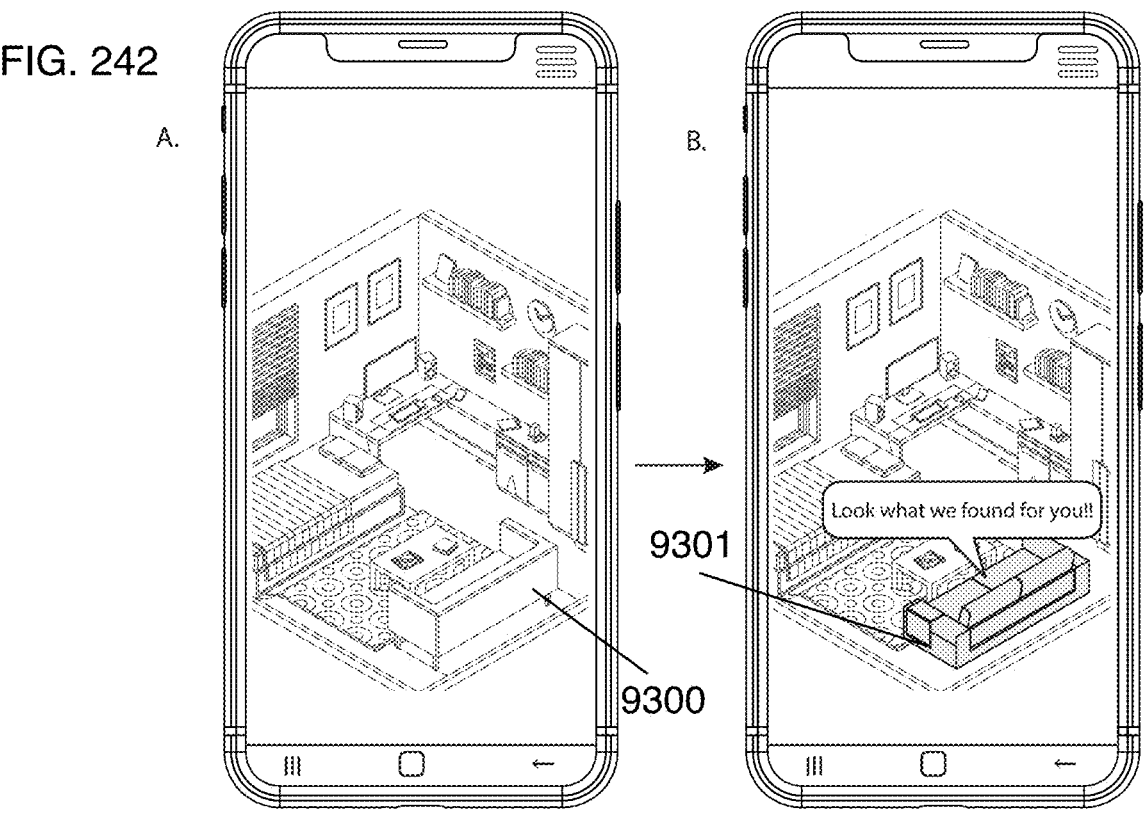
FIG. 242

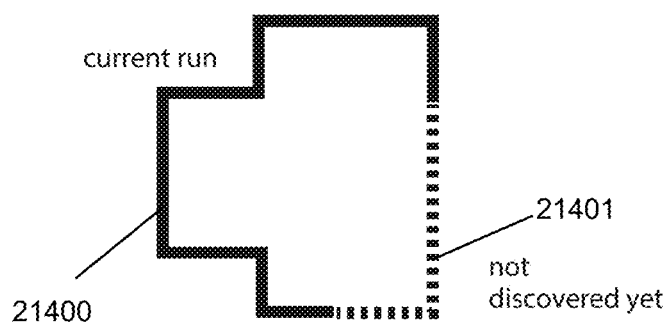
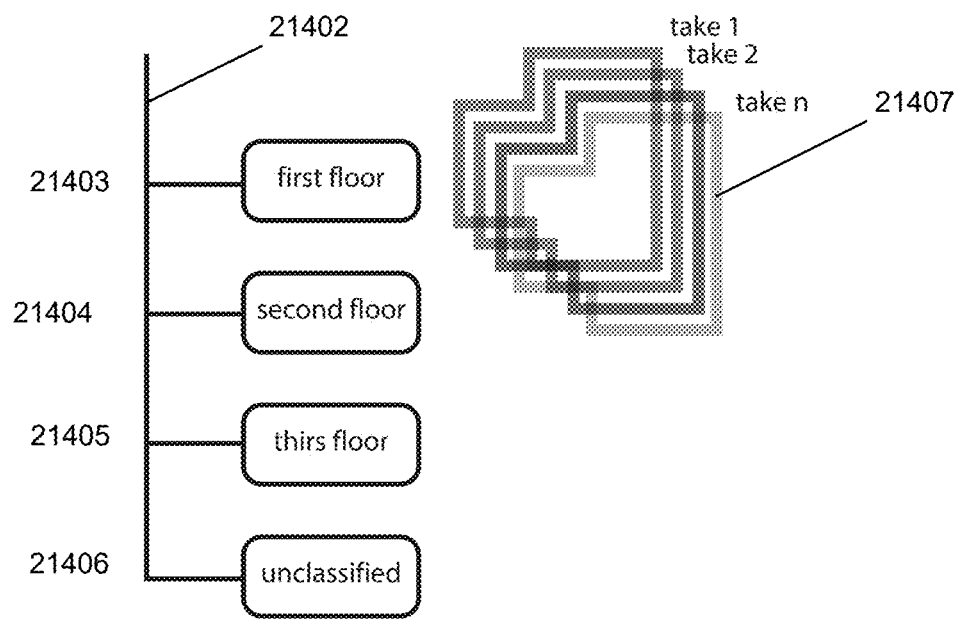
FIG. 246

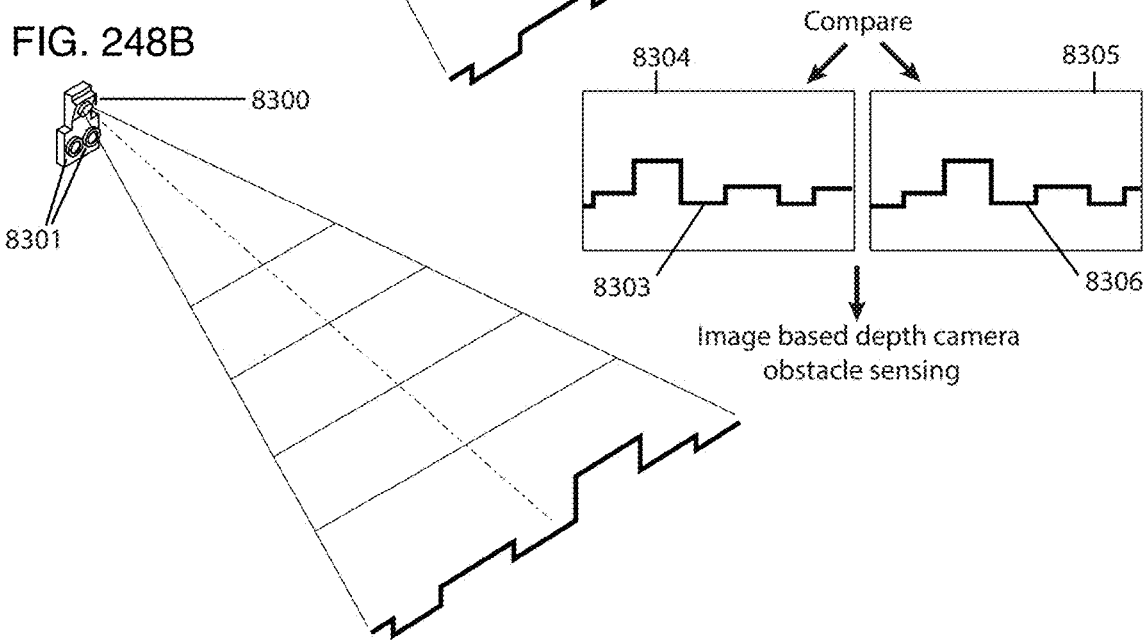
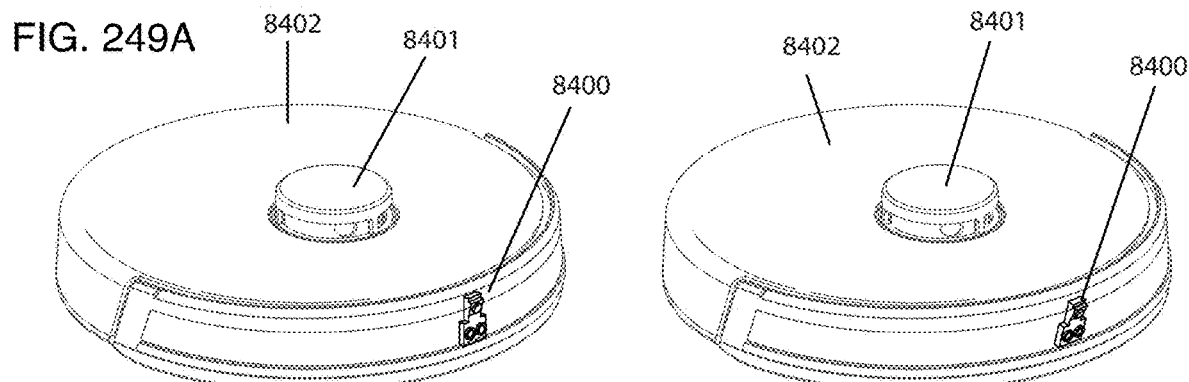

FIG. 250
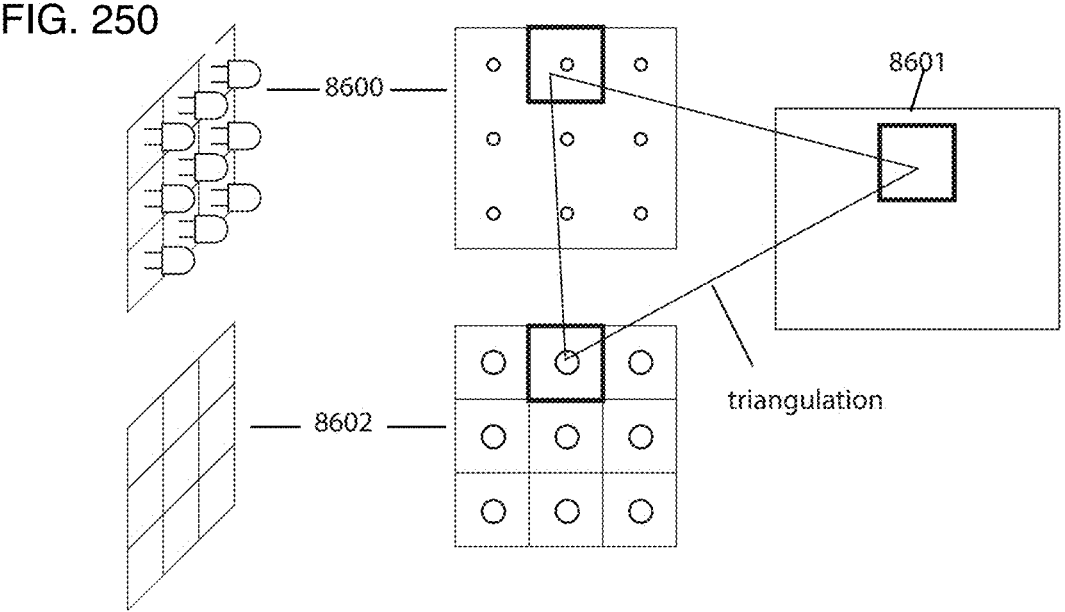
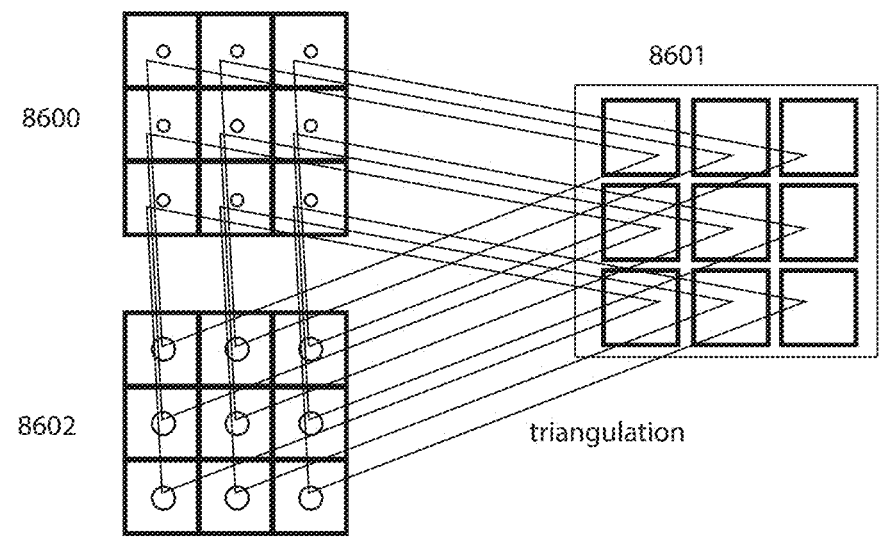

for the point
of incident for the points derived
through triangulaltion

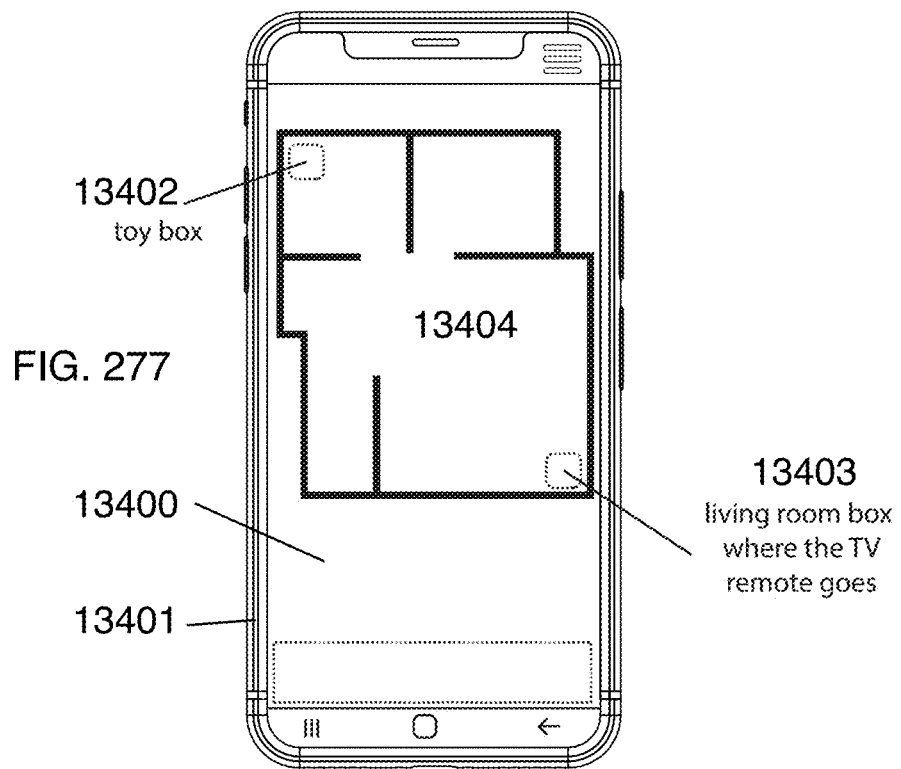
FIG. 277
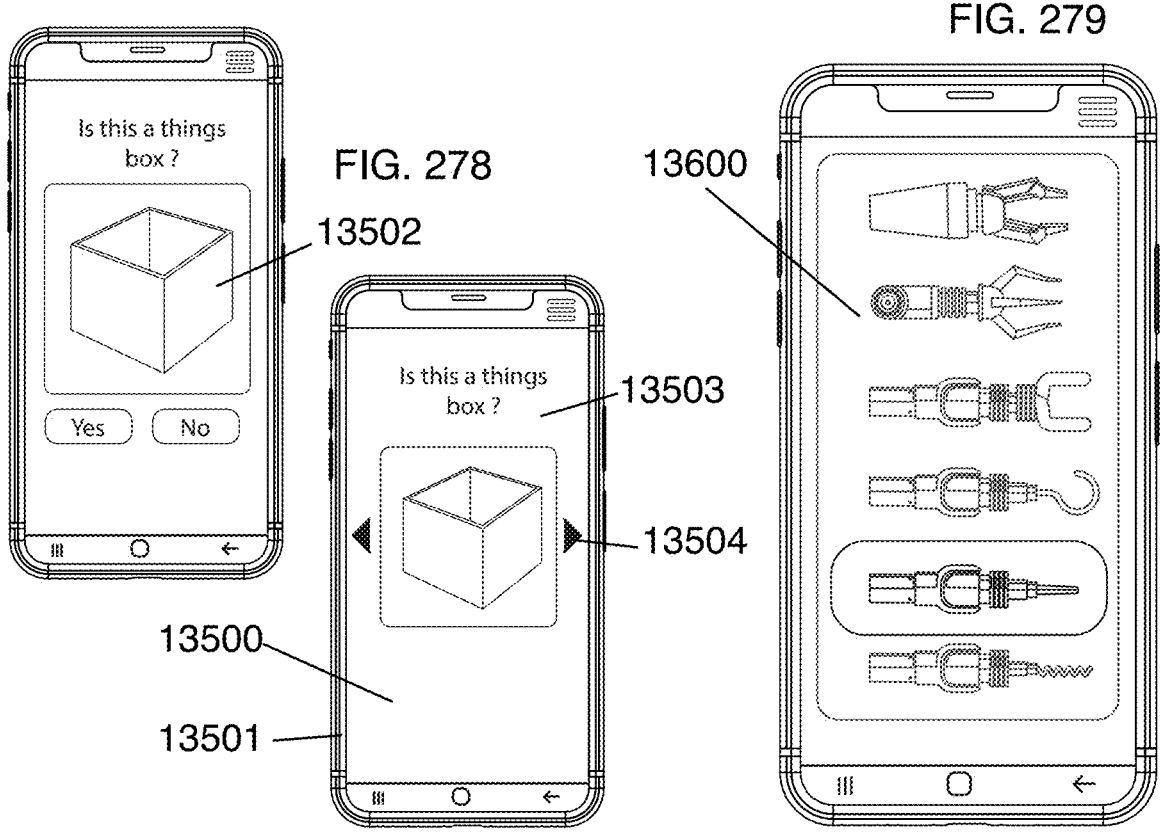
FIG. 278
FIG. 279

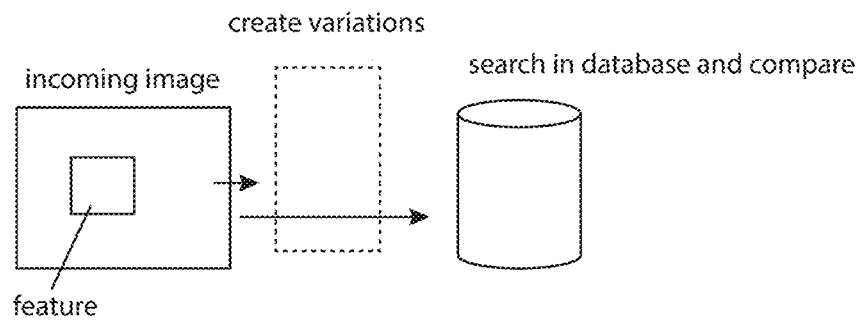
FIG. 292
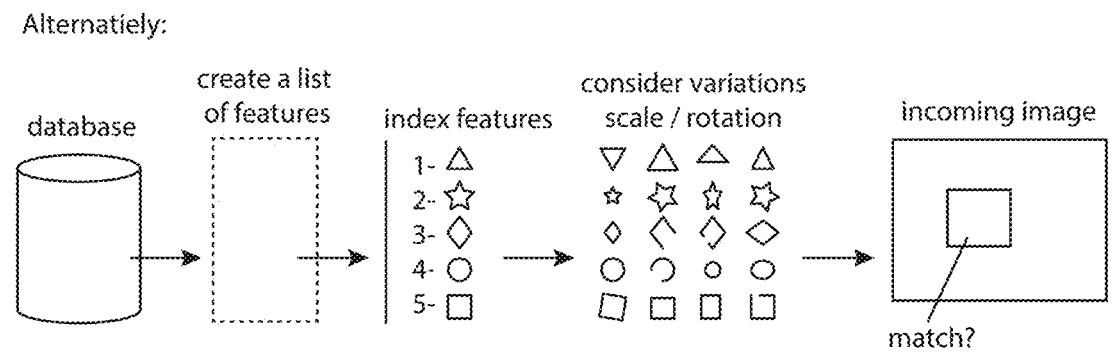
FIG. 293A
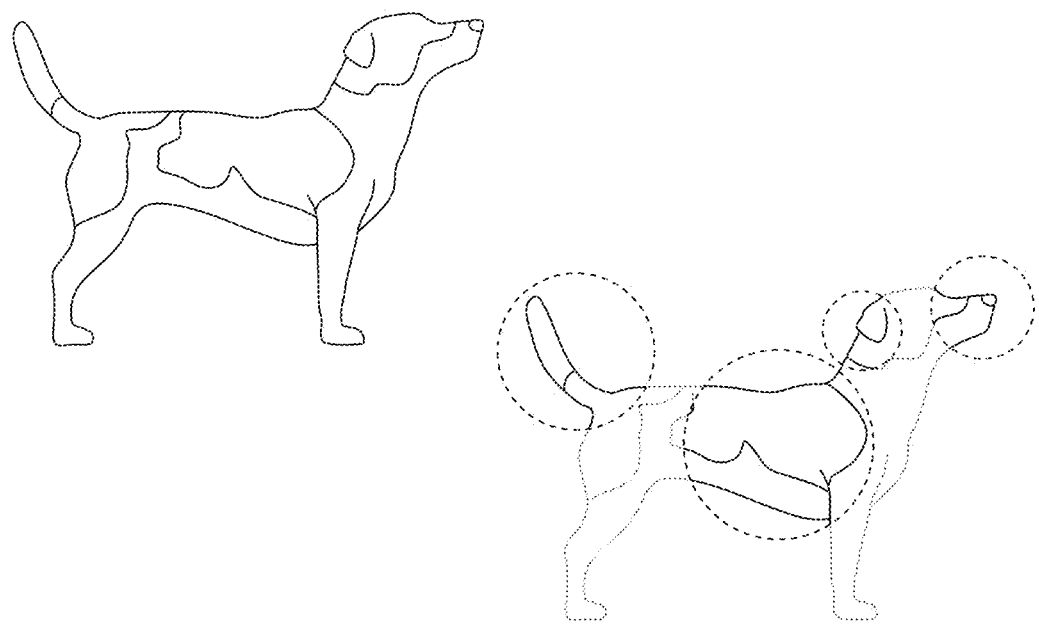

FIG. 298
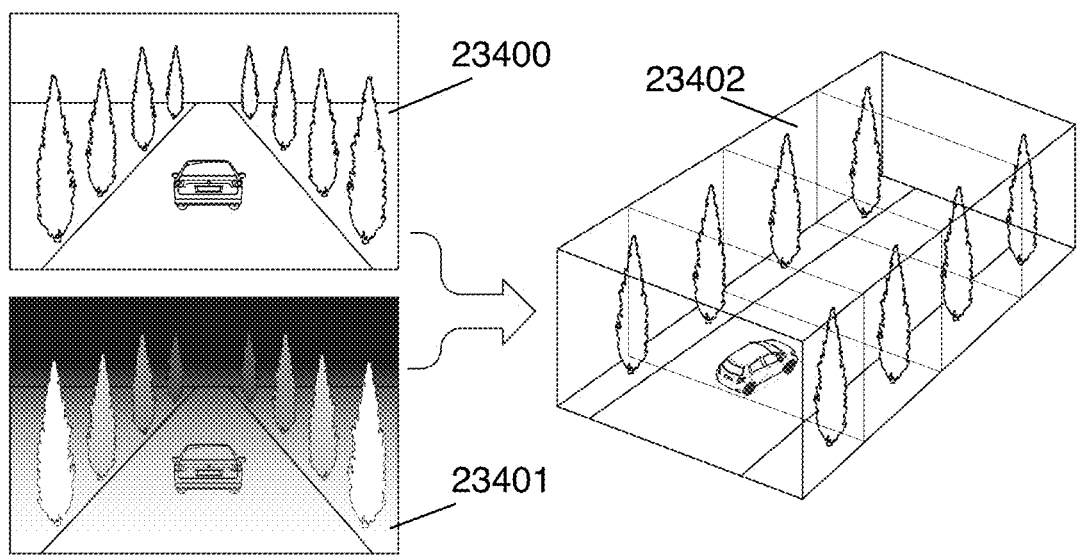
FIG. 299
| depth | pixels | pixels | ... |
|---|---|---|---|
| 1 | $(x_1,y_1)$ | $(x_2,y_2)$ | ... |
| 2 | $(i_1,j_1)$ | $(i_2,j_2)$ | ... |
| ... | ... | ... | ... |
FIG. 300
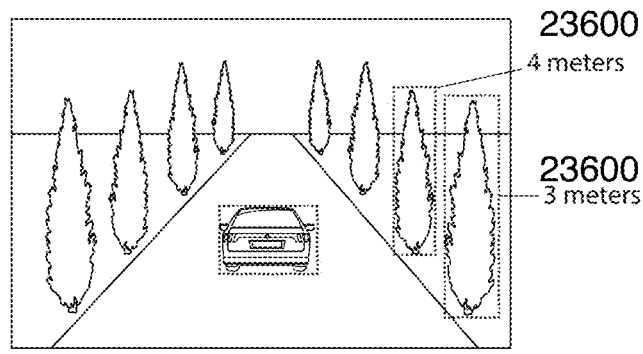

23801

23800

Complex layout of the area

Area mapped by robot in details with less than 15% of coverage.
*note the chairs and table legs, angled obstacles, hallways and doors First pass: Covering the majority of the area

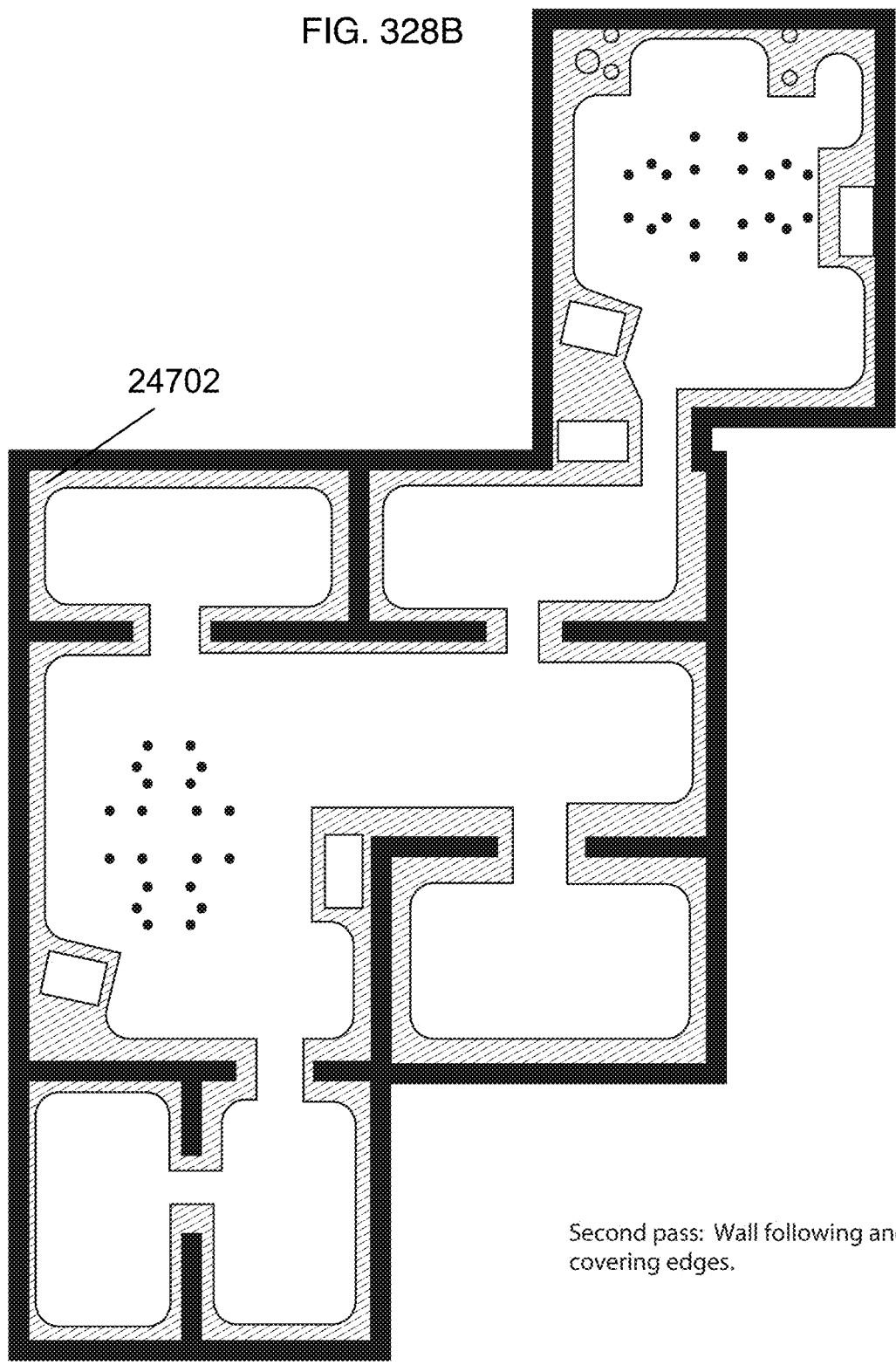

Not only does the robot avoid map-fences, but "wall-follows" their perimeter

As the robot maps the environment, it recognizes
different rooms and separate them by colors
it cleans each room entirely before going
to the next room Robot may have different performing strategies based on each zone
For example a robot vacuum may clean differently in each room

25000

Robot may load different cleaning strategies depending on the room /zone / floor type etc:
1. Mopping for kitchen
2. Steam cleaning for toilet
3. UV for baby room
UV mode goes really really really really slow
basically it has to spend 30 minutes in each square feet
4. Robust coverage under chairs and tables
5. Regular cleaning for the rest of the house.

FIG. 331A
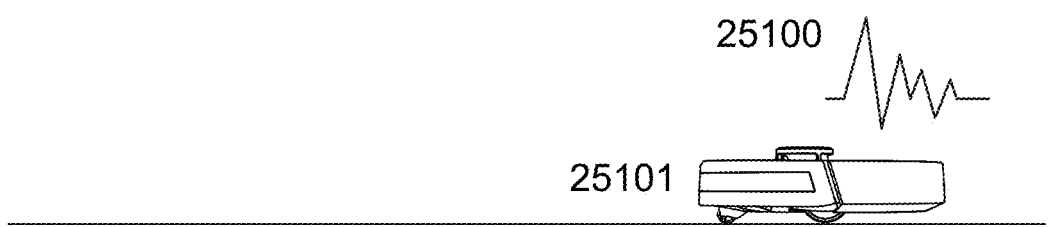
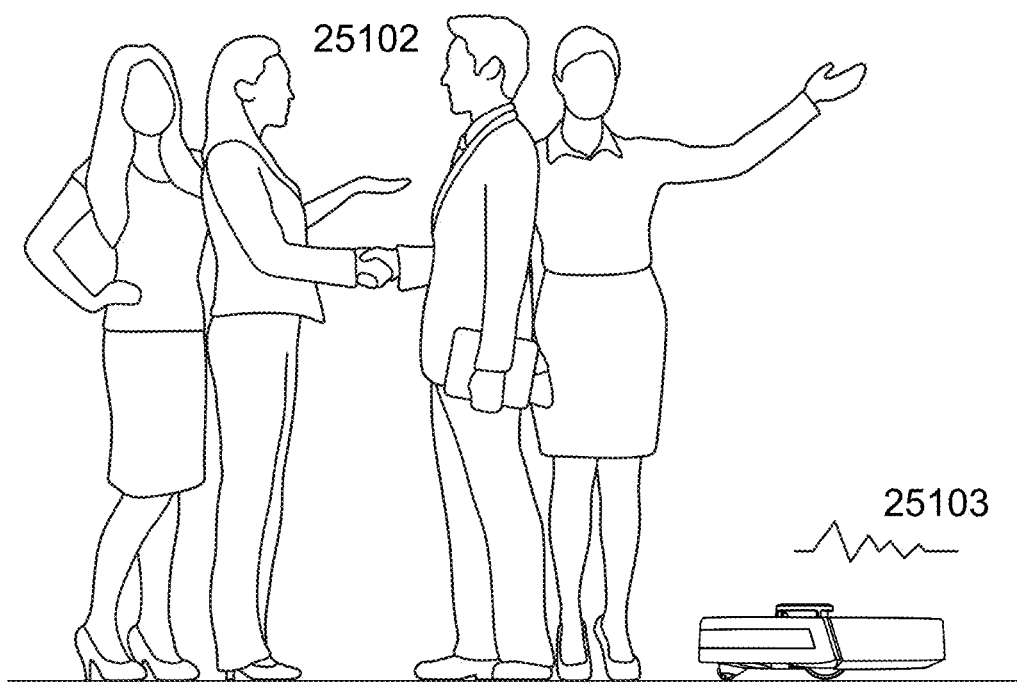
Robot may sense the presece of people in the room and adjust its performance accordingly, for example it may reduce its noise level or presence around people or rescedule its cleaning time when it sees a crowd

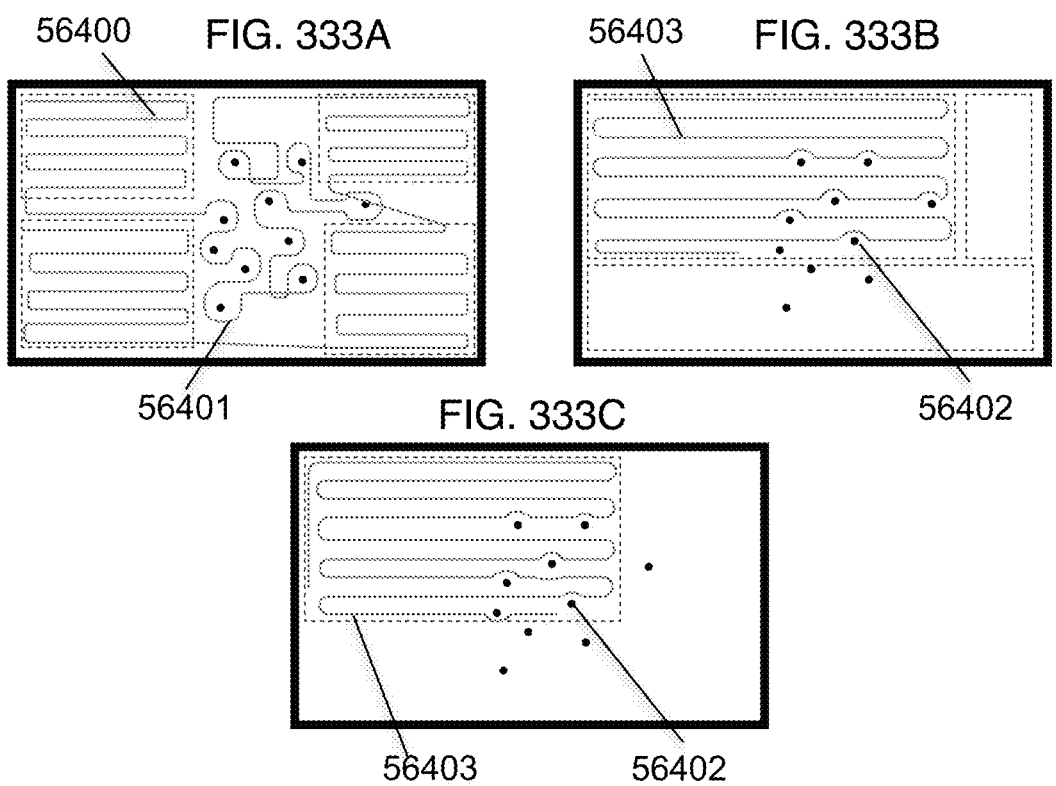

FIG. 348F 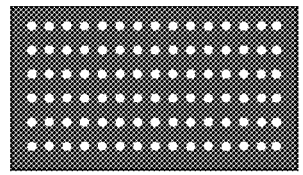 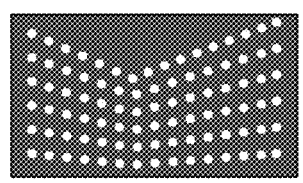

FIG. 349
24300
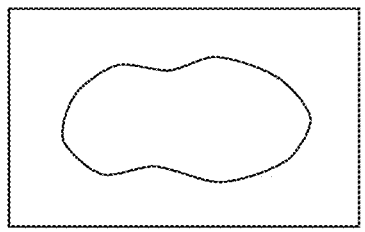
24302
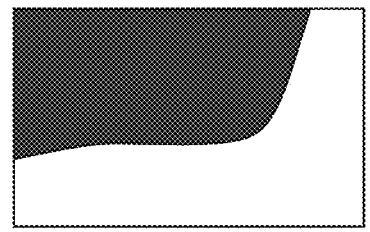
24301
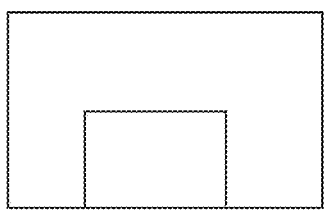
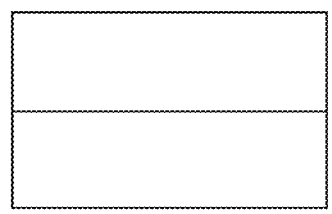
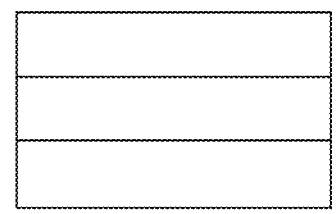
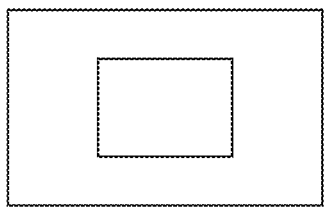
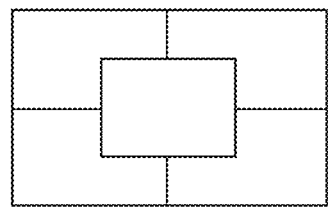
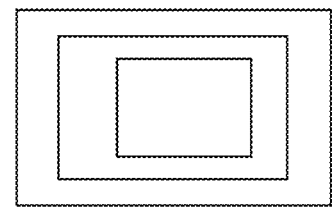
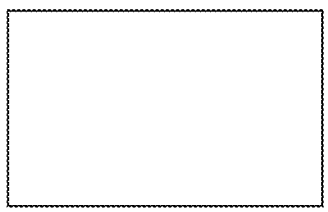
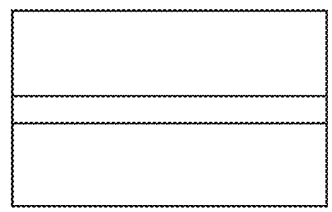
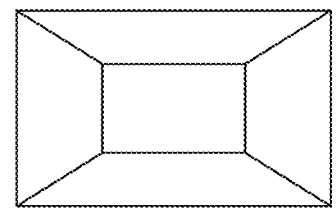
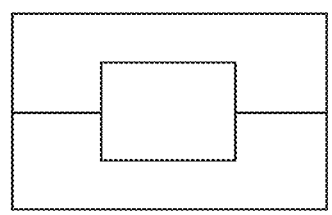

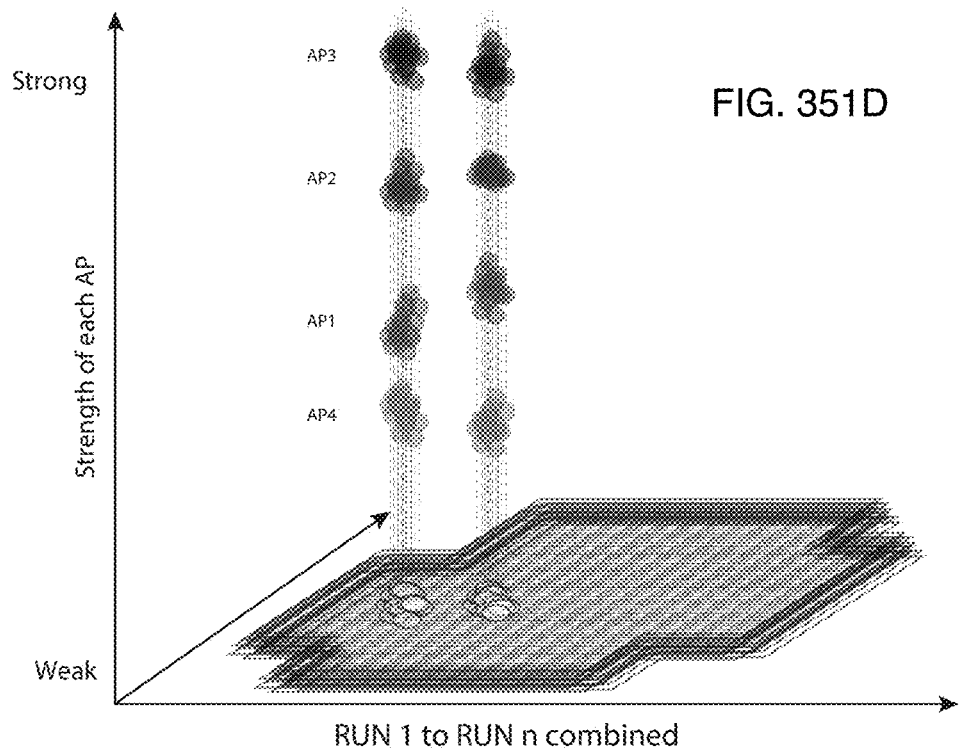
FIG. 351D
FIG. 352
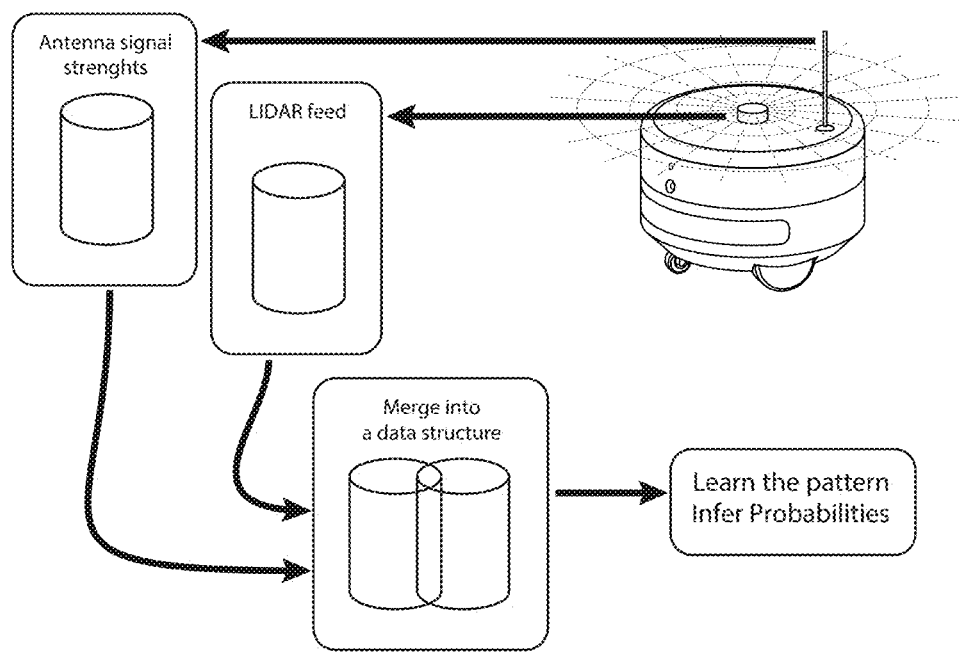

FIG. 360 teleport resilience rate - IEC

|    | SS L2 QSLAM | Brand A | Brand B | Brand C | Brand D | Brand E |
|----|-------------|---------|---------|---------|---------|---------|
| 1m | 4/4         | 1/4     | 4/4     | 4/4     | 4/4     | 1/4     |
| 2m | 4/4         |         | 2/4     | 1/4     | 2/4     |         |
| 3m | 3/4         |         |         |         |         |         | teleport resilience rate - IEC

|    | Brand F | Brand G | Brand H | Brand I | Brand J | Brand K |
|----|---------|---------|---------|---------|---------|---------|
| 1m | 4/4     | 4/4     | 0/4     | 0/4     | 0/4     | 0/4     |
| 2m | 1/4     | 3/4     |         |         |         |         |
| 3m |         |         |         |         |         |         |

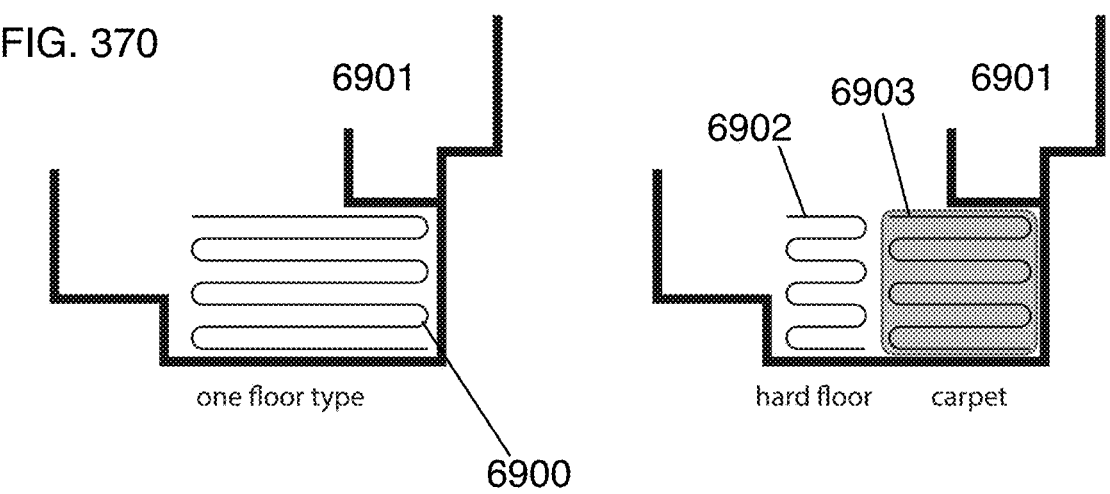

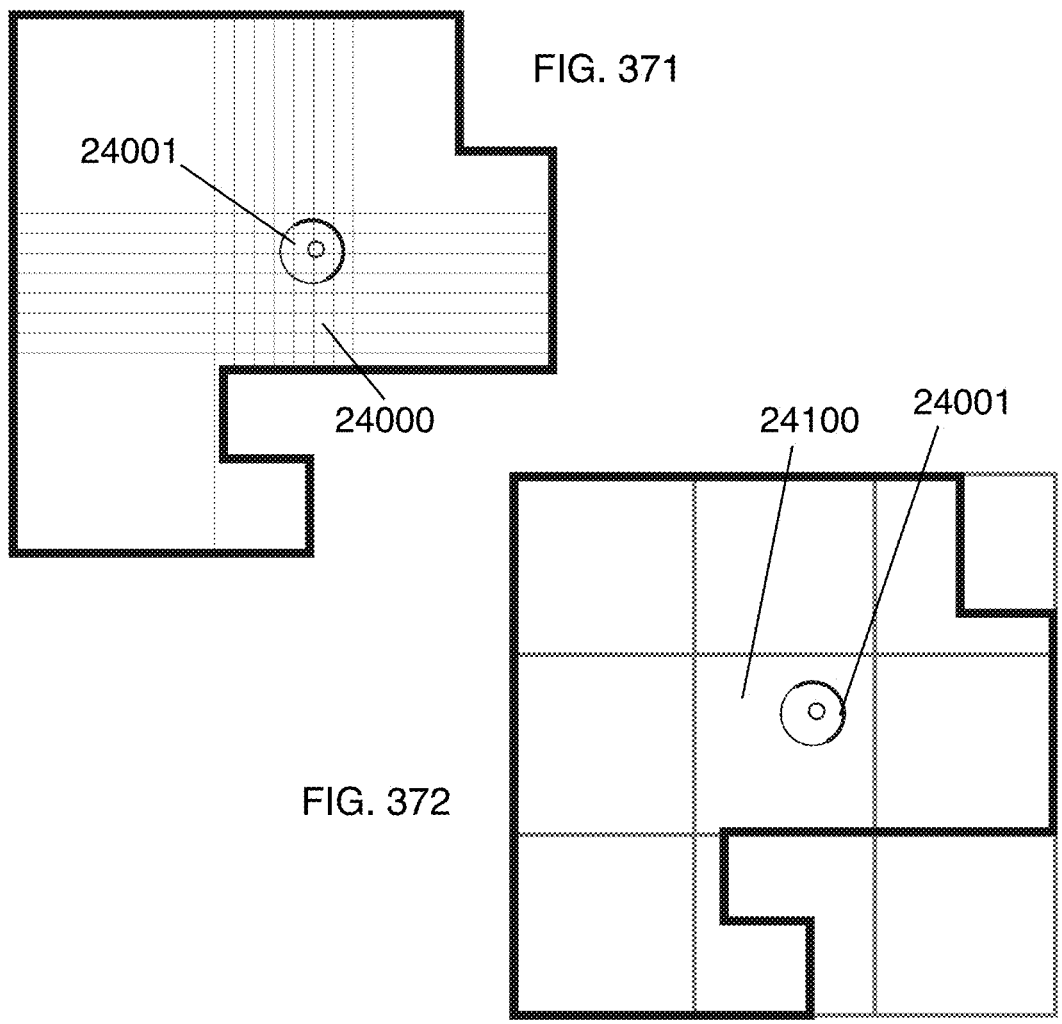

24903 at time step 1

24904 after some time steps robot detects a power socket with some shapes next to it it cannot identify them but it checks to see if it can observe it again robot detects a power socket but the shapes around it are not similar to step 1 it categorize it as a new landmark FIG. 377    camera object camera state vector extraction.

FIG. 387
Original shape
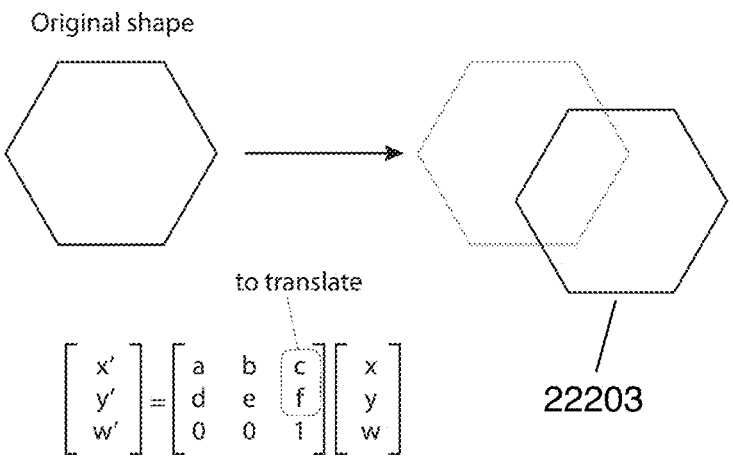
to translate
22203
FIG. 388
a linear map in 2D
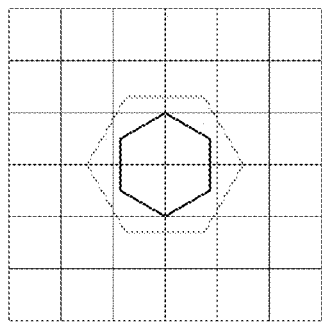
an affine map in 2D
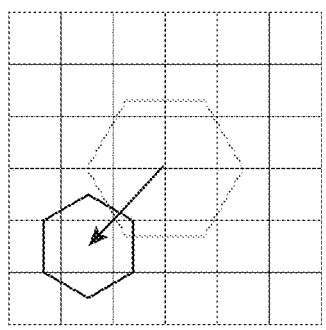
A tranbslation in 2D can be described as shear in 3D
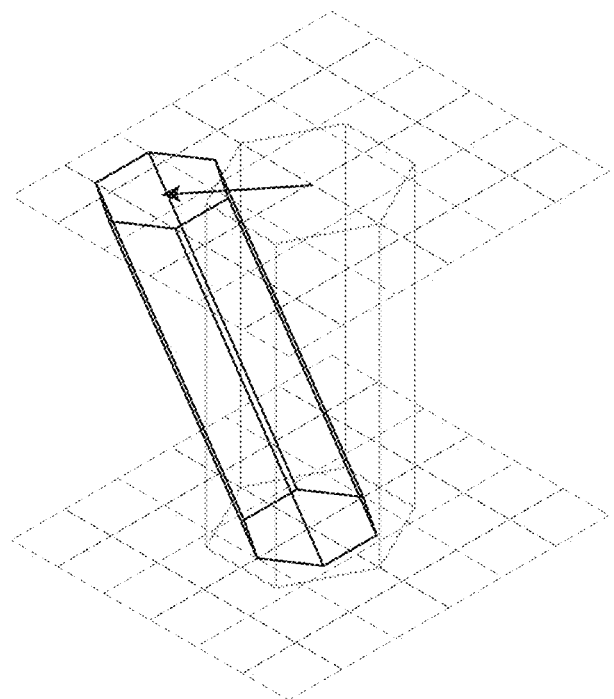
A linear map in 3D

23601

23600
person 1
person 2
person 3

1. Clean here!
2. Or do an extra clean coverage here!
3. Or prioritize here!
4. Or do an incremental cleaning here
5. Or integrate these areas for a second time cleaning in your routine coverage
6. This information can be used to create / influence a cleaning behavior in any desired way

23602

FIG. 404
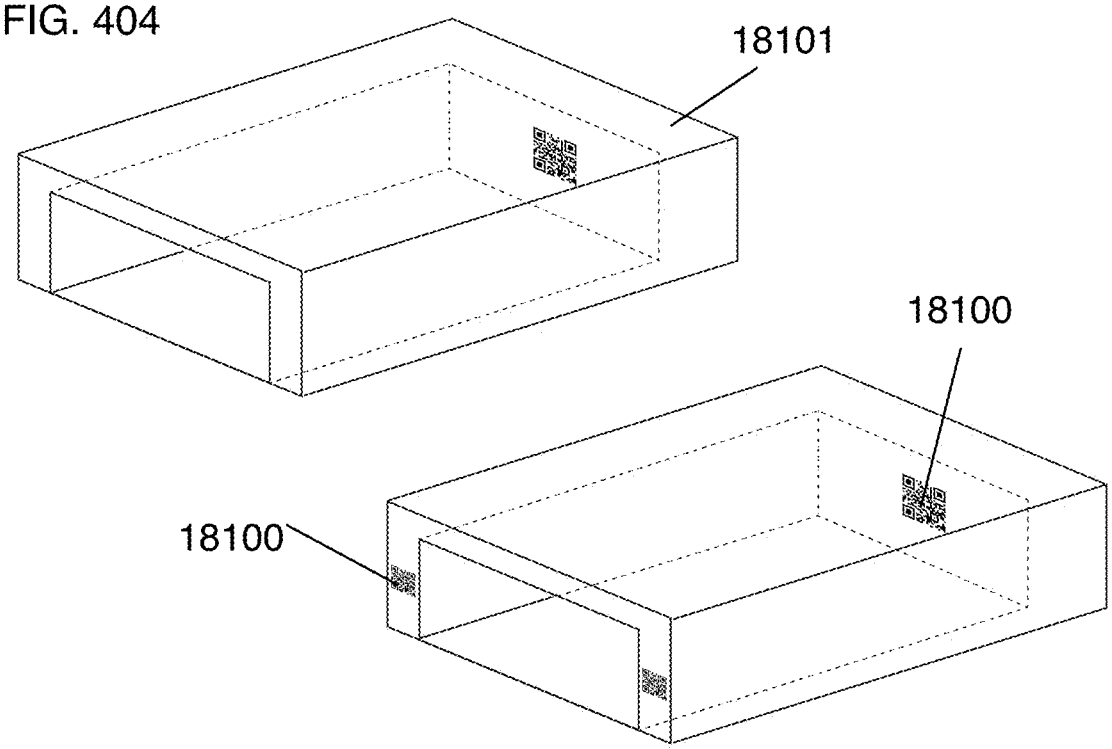
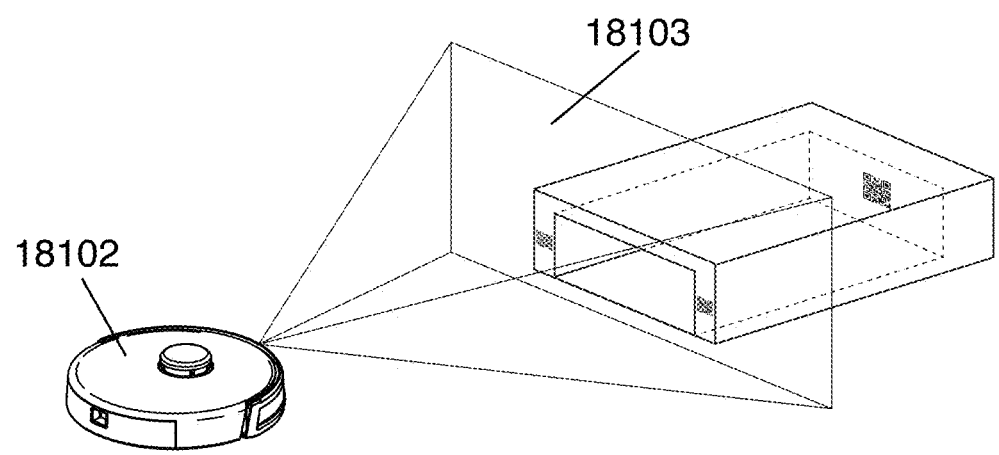

"Hey [AI assistant]... start [robot's name]"
"Hey [AI assistant]... stop [robot's name]"
"Hey [AI assistant]... send [robot's name] to be charged"
"Hey [AI assistant]... send [robot's name] to clean the [predefined room]"
...

STATIONARY SERVICE APPLIANCE FOR A POLY FUNCTIONAL ROAMING DEVICE

CROSS REFERENCE TO RELATED APPLICATIONS

This application claims the benefit of U.S. Non-Provisional patent application Ser. No. 18/503,093, filed Sep. 6, 2023, which claims the benefit of U.S. Provisional Patent Application Nos. 63/403,821, filed Sep. 5, 2022, 63/412,486, filed Oct. 2, 2022, 63/461,306, filed Apr. 23, 2023, 63/446,840, filed Feb. 18, 2023, and 63/424,716, filed Nov. 11, 2022, each of which is hereby incorporated herein by reference.

In this patent, certain U.S. patents, U.S. patent applications, or other materials (e.g., articles) have been incorporated by reference. Specifically, U.S. Non-Provisional patent application Ser. Nos. 17/990,743, 17/670,277, 17/344,902, and 17/693,946, and U.S. Non-Provisional patent Ser. Nos. 10/958,081, 11/064,856, 10/292,553, 10/932,640, 11/857,129, 11/937,749, 10/584,448, 10/698,411, 10/786,129, 10/986,971, 11/121,567, 10/183,701, 11/768,504, 11/240,854, 10/185,815, 10/762,186, 12/009,357, 10/933,534, 12/025,988, 11/442,422, 11/543,792, 10/795,377, 10/612,929, 10/915,114, 10/482,619, 11/348,269, 10/809,071 11/274,929, 10/422,648, 10/882,186, 10/452,071, 10/788,836, 11/927,965, 11/449,061, 10/311,590, 11/037,320, 10/408,604, 9/972,098, 10/346,995, 11/069,082, 10/223,793, 10/845,817, 10/690,757, 10/207,408, 11/077,555, 9/764,472, 10/386,847, 11/119,216, 10/810,427, 10/353,399, 10/613,541, 9/701,020, 11/119,496, 9/970,770, 10/436,810, and 11/241,791, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure generally relates to robotic devices.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a method for autonomously servicing a first cleaning component of a battery-operated mobile device, including: inferring, with a processor of the mobile device, a value of at least one environmental characteristic based on sensor data captured by a sensor disposed on the mobile device; actuating, with a controller of the mobile device, a first actuator interacting with the first cleaning component to at least one of: turn on, turn off, reverse direction, and increase or decrease in speed such that the first cleaning component engages or disengages based on the value of at least one environmental characteristic or at least one user input received by an application of a smartphone paired with the mobile device; and dispensing, by a maintenance station, water from a clean water container of the maintenance station for washing the first cleaning component when the mobile device is docked at the maintenance station.

BRIEF DESCRIPTION OF DRAWINGS

Steps shown in the figures may be modified, may include additional and/or omit steps in an actual implementation, and may be performed in a different order than shown in the figures. Further, the figures illustrated and described may be according to only some embodiments.

FIG. 22 illustrates a side-view of a method for obtaining a clean disposable or reusable mopping pad of a robot.

FIG. 23A-25B illustrates an example of a built-in or standalone robot maintenance station system.

FIG. 26 illustrates a control panel of a built-in or standalone robot maintenance station system.

FIGS. 27A and 27B illustrates an example of an overview page for operational scheduling for vacuuming and mopping displayed by the control panel of a built-in or standalone robot maintenance station system.

FIGS. 38-41 illustrate an example of a handle attachable to a robot.

FIGS. 43A-49C illustrate a mopping system of a robot and components thereof.

FIGS. 60A-65 illustrate examples of a robot bumper from including, top, front, and side view points.

FIGS. 66-74 illustrate a top view point of a robot bumper.

FIG. 76 illustrates a top view point of an example of a robot bumper with extension springs.

FIG. 79 illustrates a bottom view point of a robot bumper.

FIGS. 80A-80H illustrate a LIDAR cover with bumper.

FIGS. 81A and 81B illustrate adjusting a room assignment using an application of a communication device.

FIGS. 90A-90E illustrate a trading of virtual items using an application of a communication device.

FIG. 91 illustrates creating a virtual object using an application of a communication device.

FIG. 92 illustrates recognizing a virtual space using an application of a communication device or other means.

FIGS. 93A and 93B illustrate an application of a communication device displaying a map and a path of a robot.

FIG. 94 illustrates a map displayed in a shape of a lion.

FIG. 107 illustrates examples of layers.

FIGS. 123-125 illustrate an example of toggling between 2D and 3D viewports and tools available in each of the viewports.

FIG. 129 illustrates an example of a difference between a map generating run and a work performing run.

FIGS. 130 and 131 illustrate examples of user interfaces of an application displaying a map loading page.

FIGS. 147-164B illustrate an application of a communication device paired with the robot and operations thereof.

FIGS. 165A-165B illustrate the application may be used to display the map and manipulate areas of the map.

FIG. 165D illustrates User also can order the robot to clean different zones by selecting different strategies on an application of a communication device.

FIG. 166 illustrates an example of a map displayed by the application and a virtual dog house and a virtual rug added to the map by a user.

FIGS. 167A-167B illustrate that a virtual rug icon in the map may have different meaning for different tasks.

FIG. 168 illustrates no overlap, medium overlap, high overlap, and dense overlap on the path of the robot.

FIG. 177 illustrates examples of layers.

FIGS. 184-198 illustrate an application of a communication device paired with the robot and operations thereof.

FIGS. 214-217 illustrate various means for representing an environment of the robot.

FIG. 218 illustrates an environment divided into logical area units.

FIG. 219 illustrates graphs of connections between logical area units.

FIG. 220 illustrates an example of a graph of a hotel.

FIG. 221 illustrates an example of a vector field map.

FIG. 222 illustrates an example of a vector field map, a feature map, and a grid map.

FIG. 223 illustrates different types of information added to a map.

FIG. 224 illustrates an example of a map.

FIG. 225A illustrates an example of a map.

FIG. 225B illustrates a map viewed using an application of a communication device.

FIG. 226 illustrates a couch reconstructed from various forms of data.

FIG. 227 illustrates a 3D map generated from a 2D map.

Figure 228:
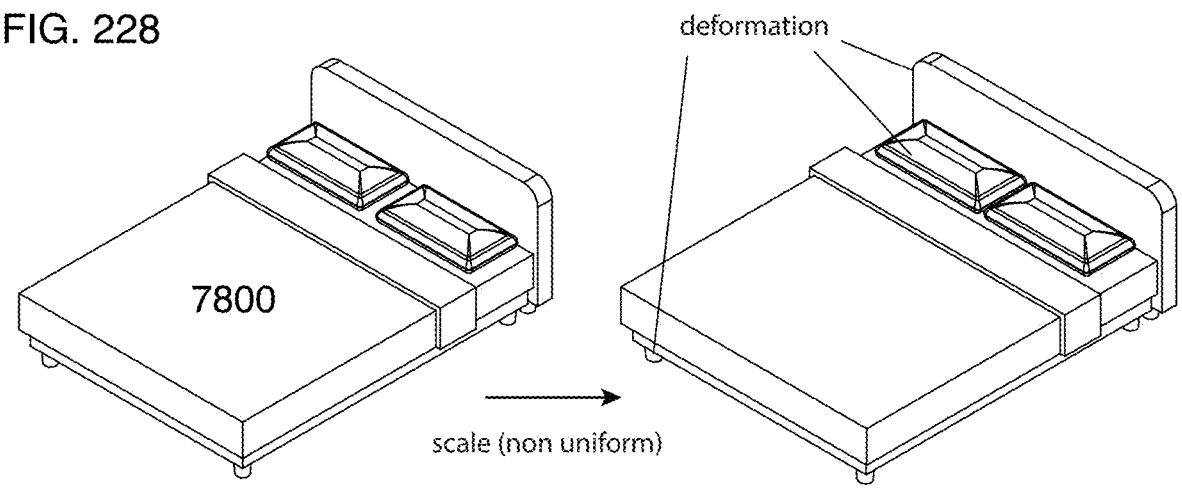

FIG. 228 illustrates scaling and changing properties of an object model.

Figure 229:
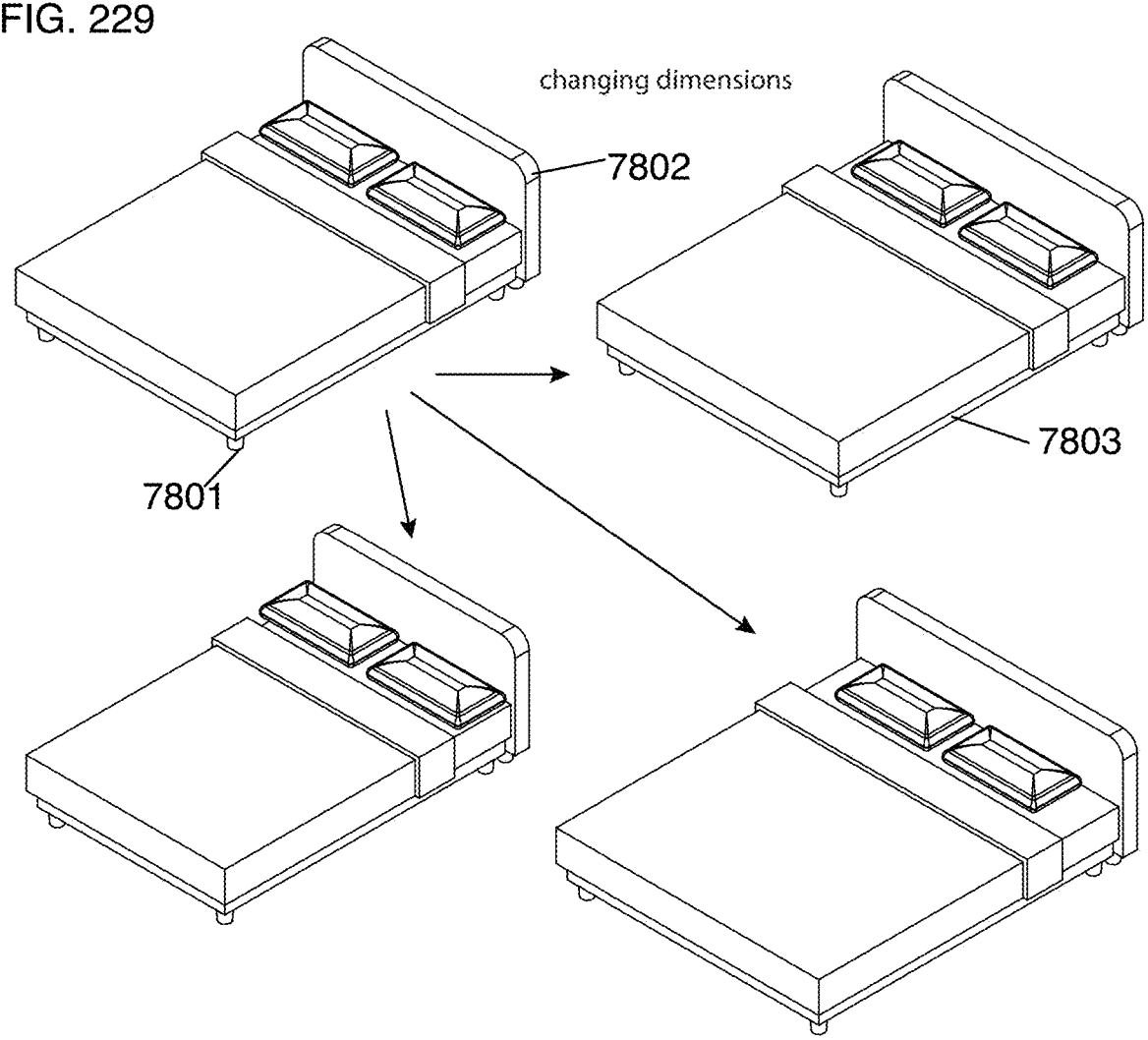

FIG. 229 illustrates maintaining a same size of components of an object model when changing dimensions of the object model.

Figure 230:
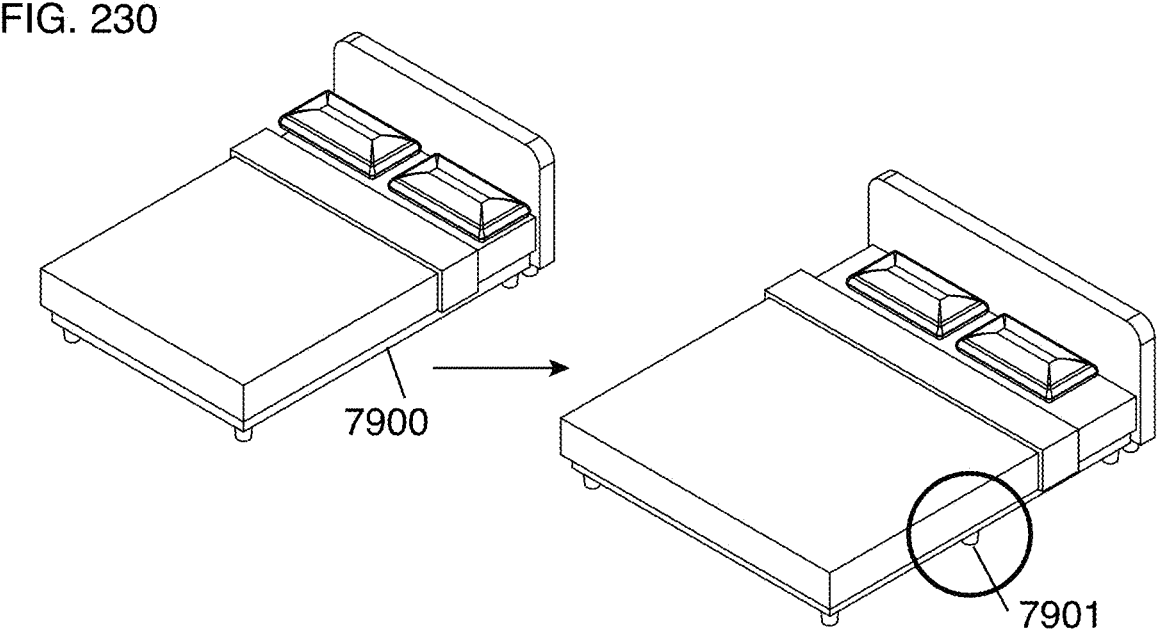

FIG. 230 illustrates an example of a smart property.

Figure 231:
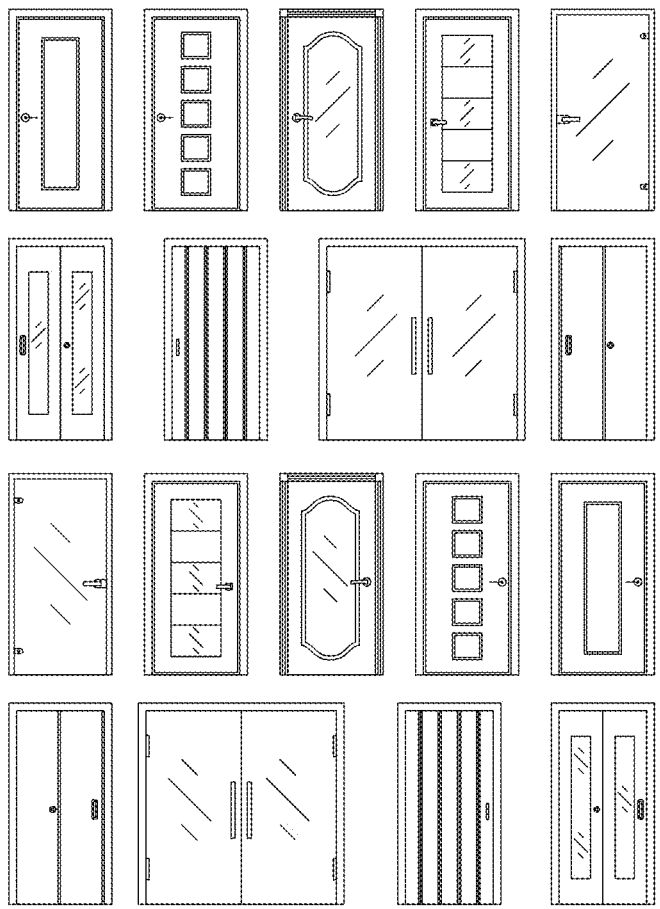

FIG. 231 illustrates different properties of a door.

Figure 232:
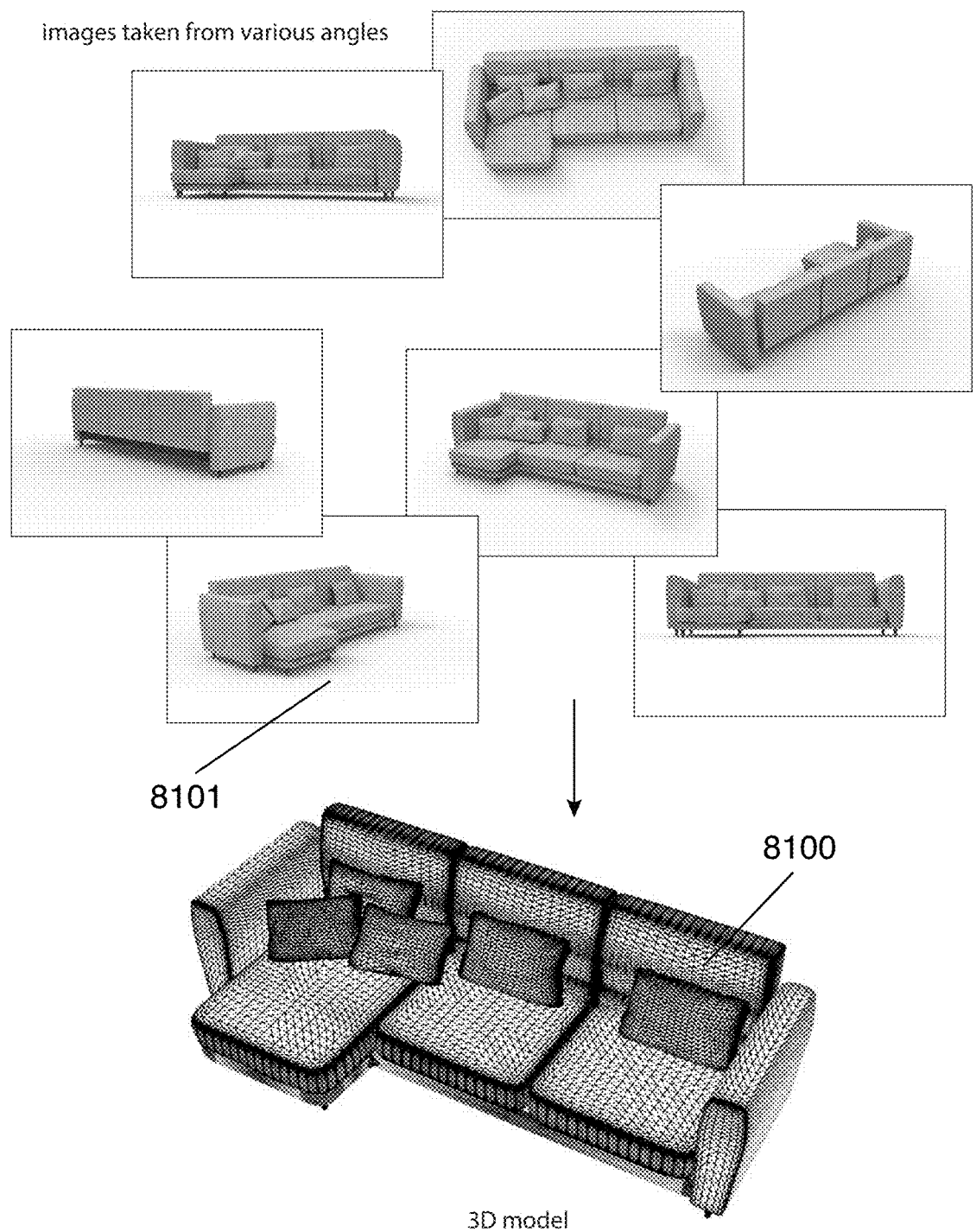
Figure 233:
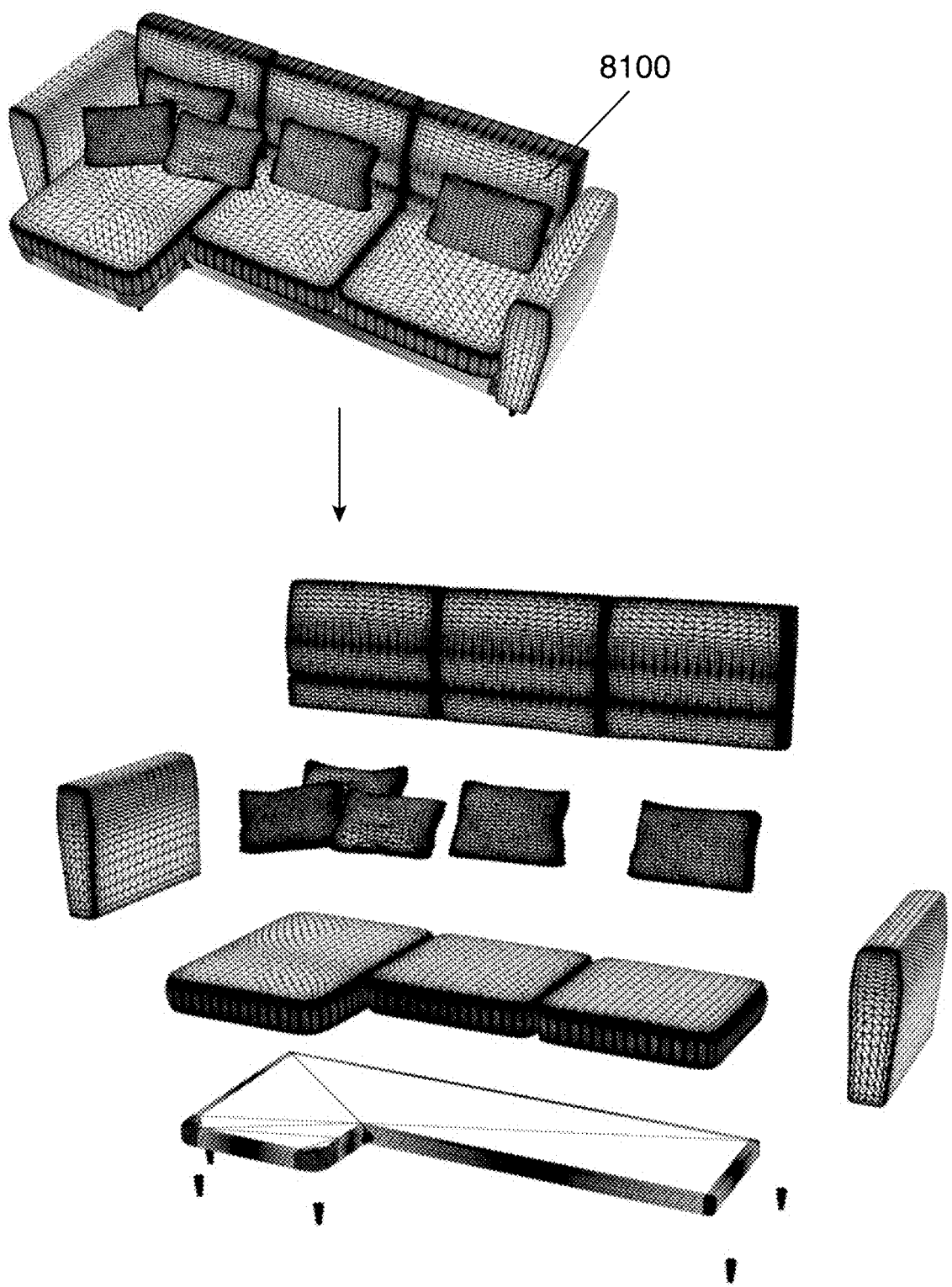

FIGS. 232 and 233 illustrate a 3D model of a couch generated from images.

Figure 234:
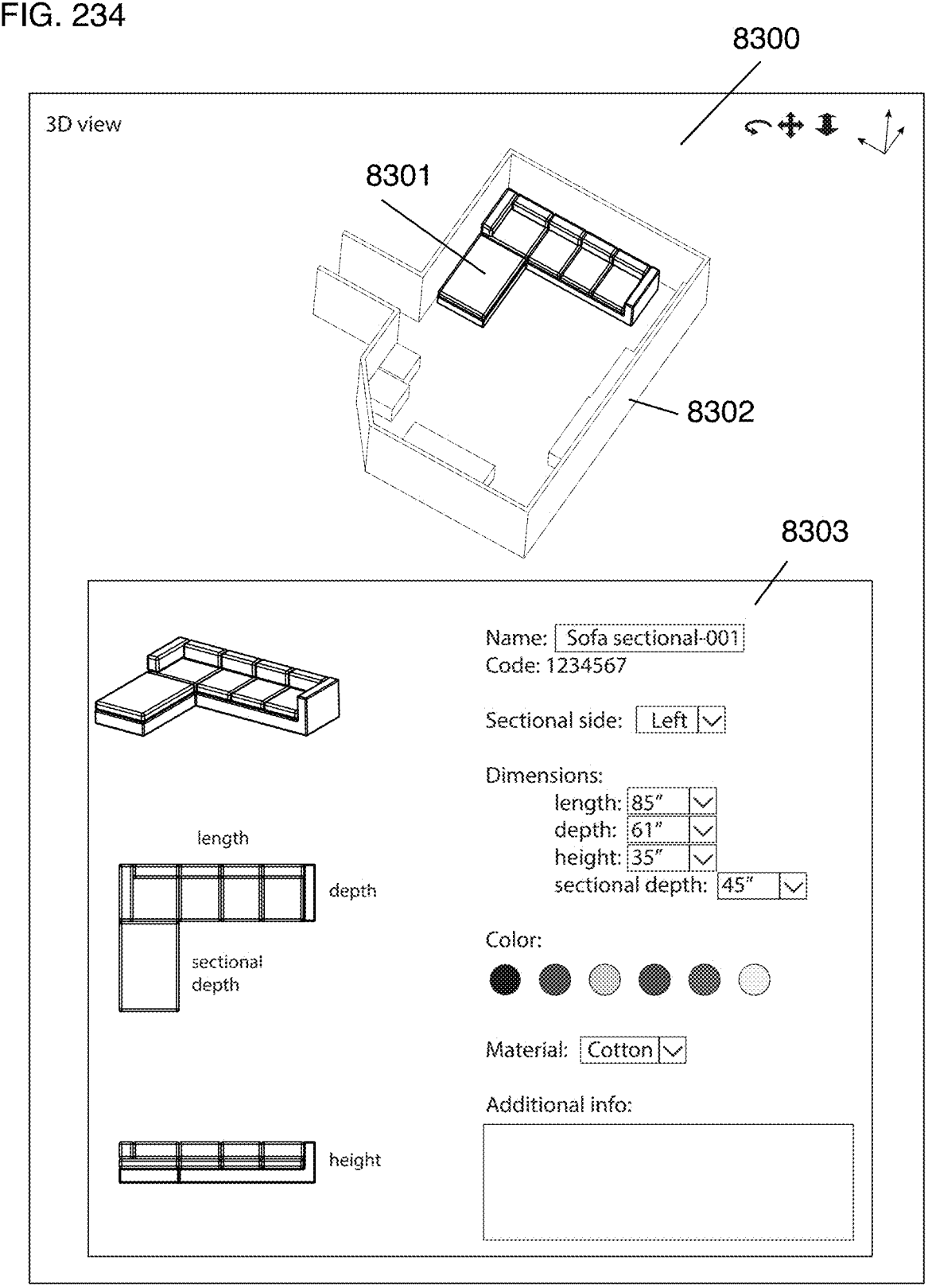

FIG. 234 illustrates an application of a communication device displaying a 3D model of a couch.

Figure 235:
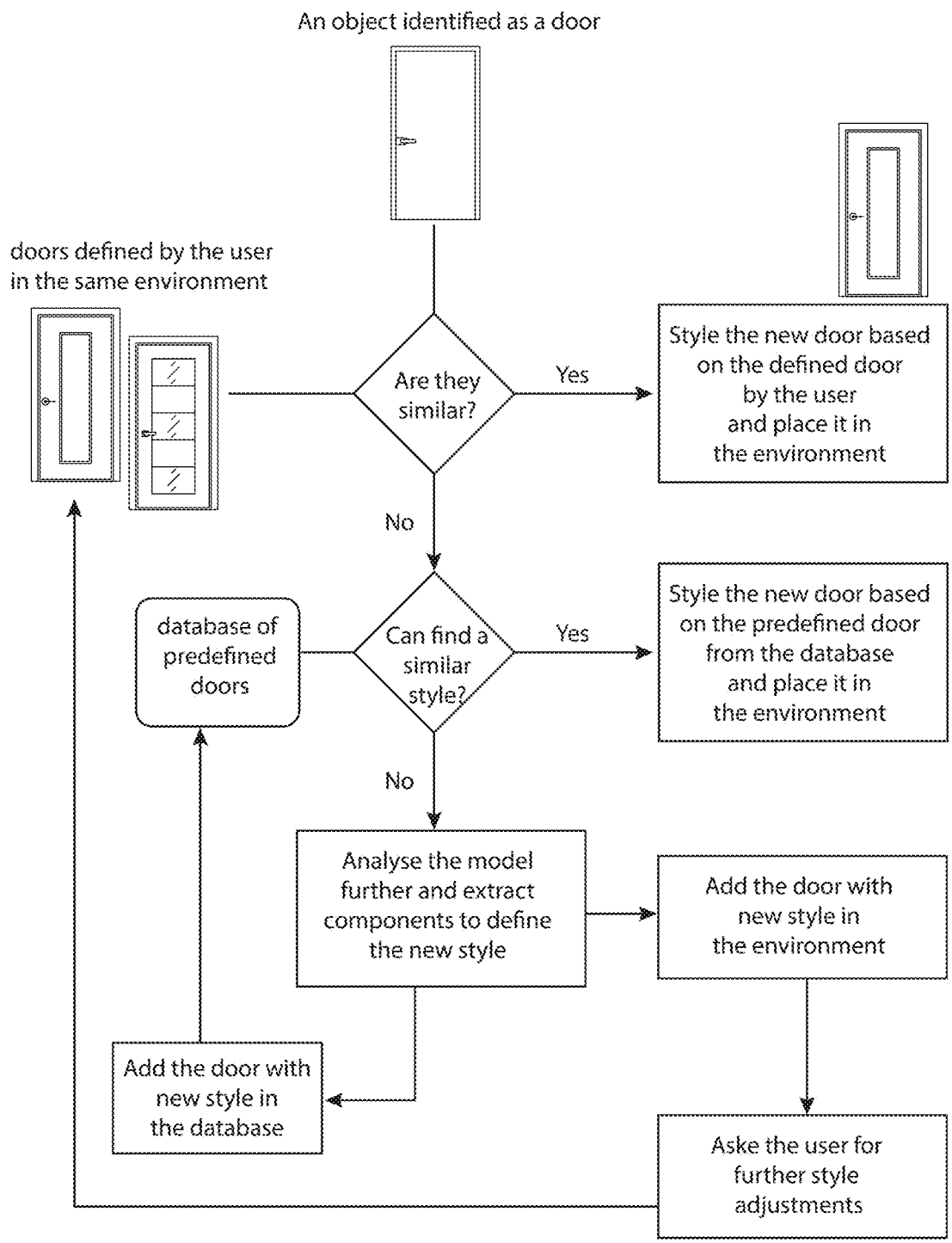

FIG. 235 illustrates a process of identifying properties of an object.

Figure 236:
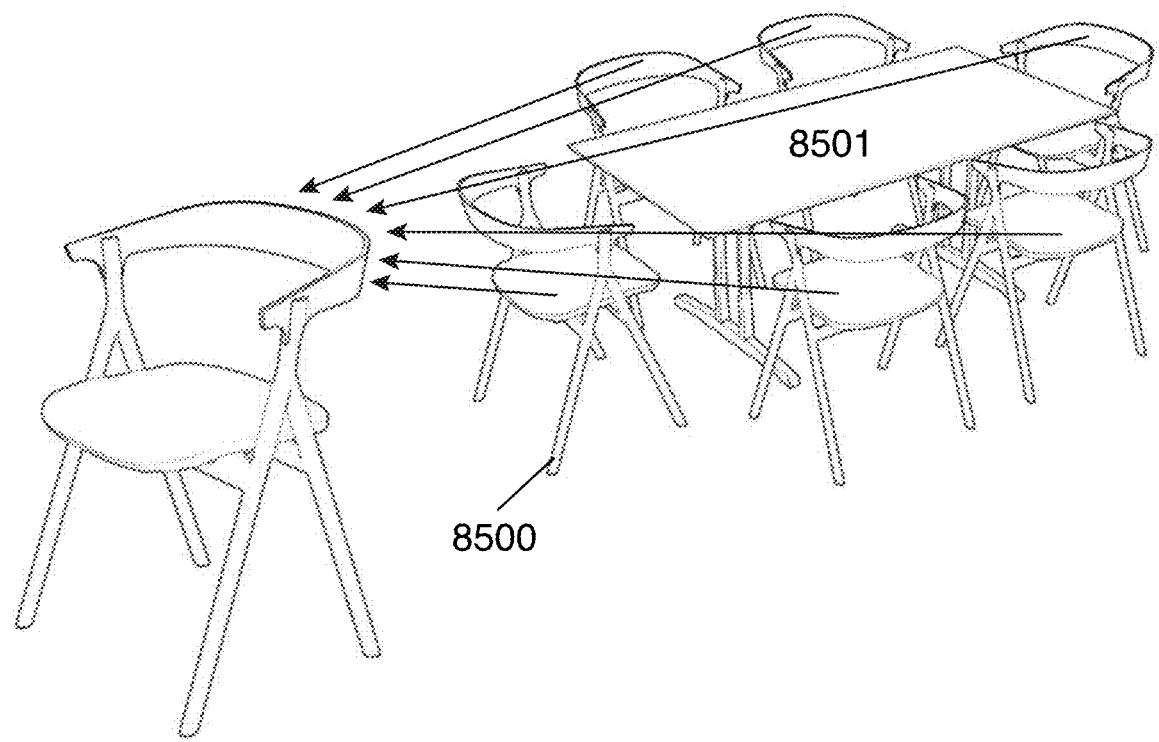

FIG. 236 illustrates a process of determining properties of an object.

Figure 237:
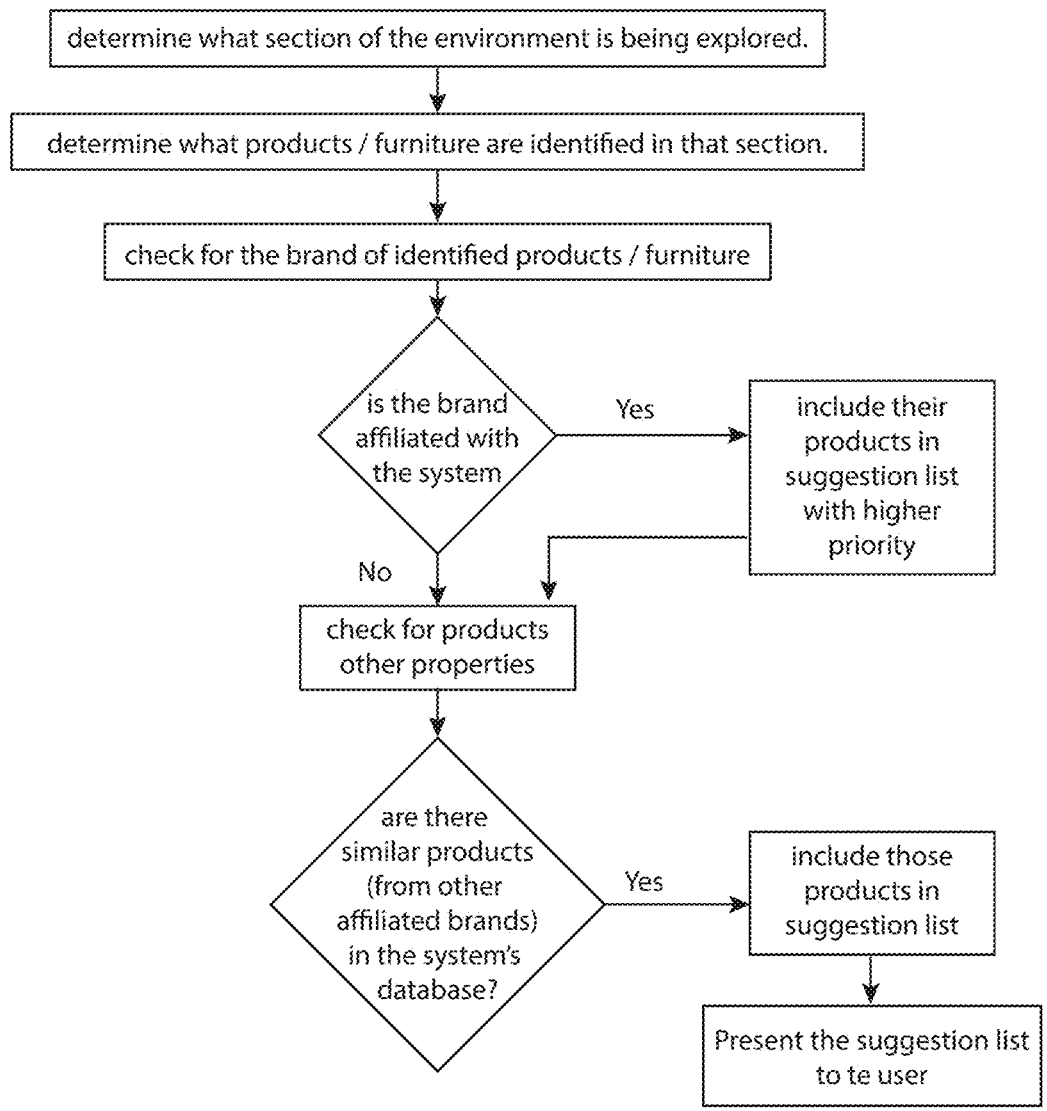

FIG. 237 illustrates a process of generating a list of suggested items.

FIG. 238 illustrates a process of determining remaining properties of an object.

FIG. 239 illustrates prioritization of items on a suggested list.

FIG. 240 illustrates identifying an empty space within an environment.

Figure 241:
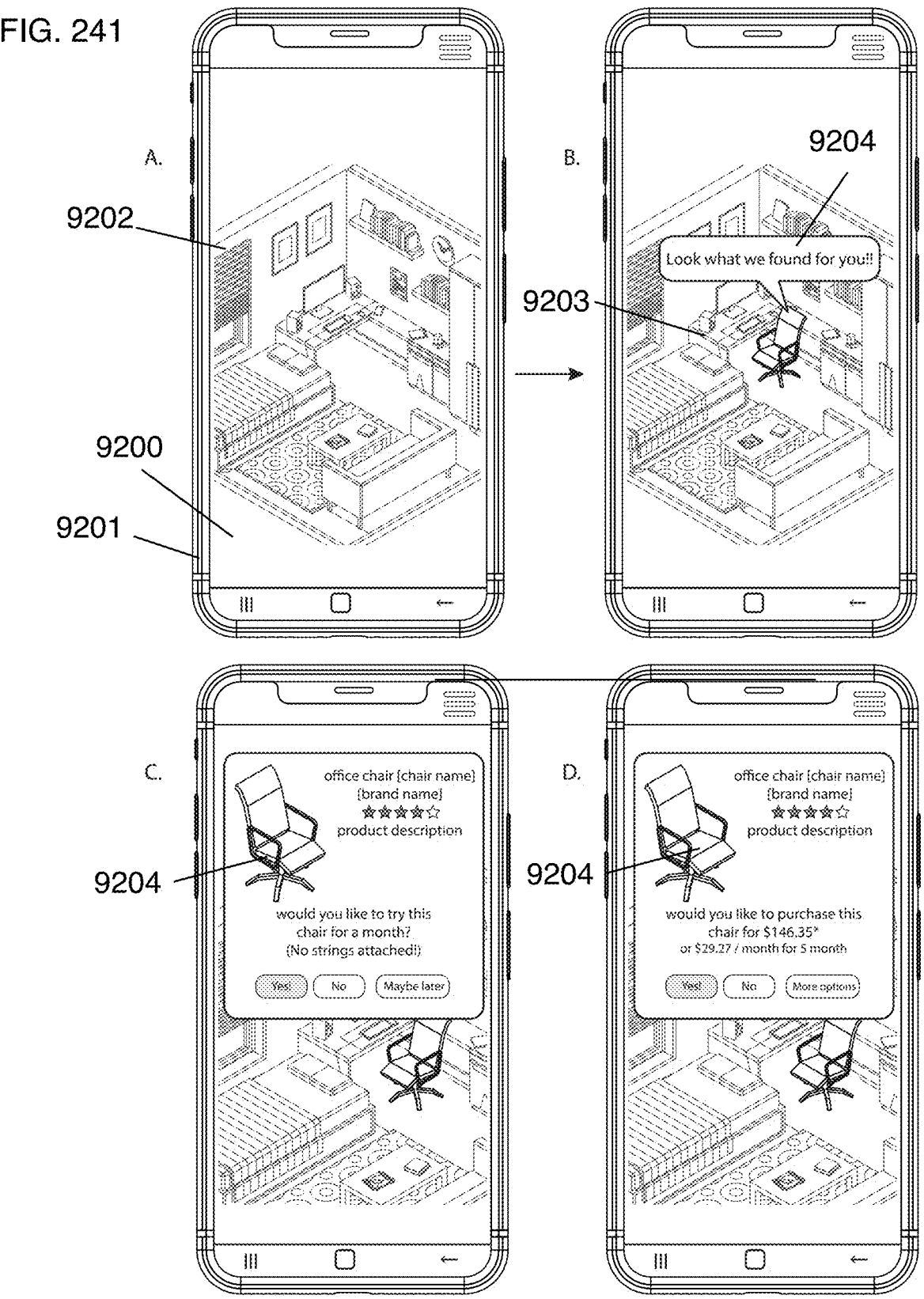

FIGS. 241 and 242 illustrate an application of a communication device promoting products to a user.

Figure 243:
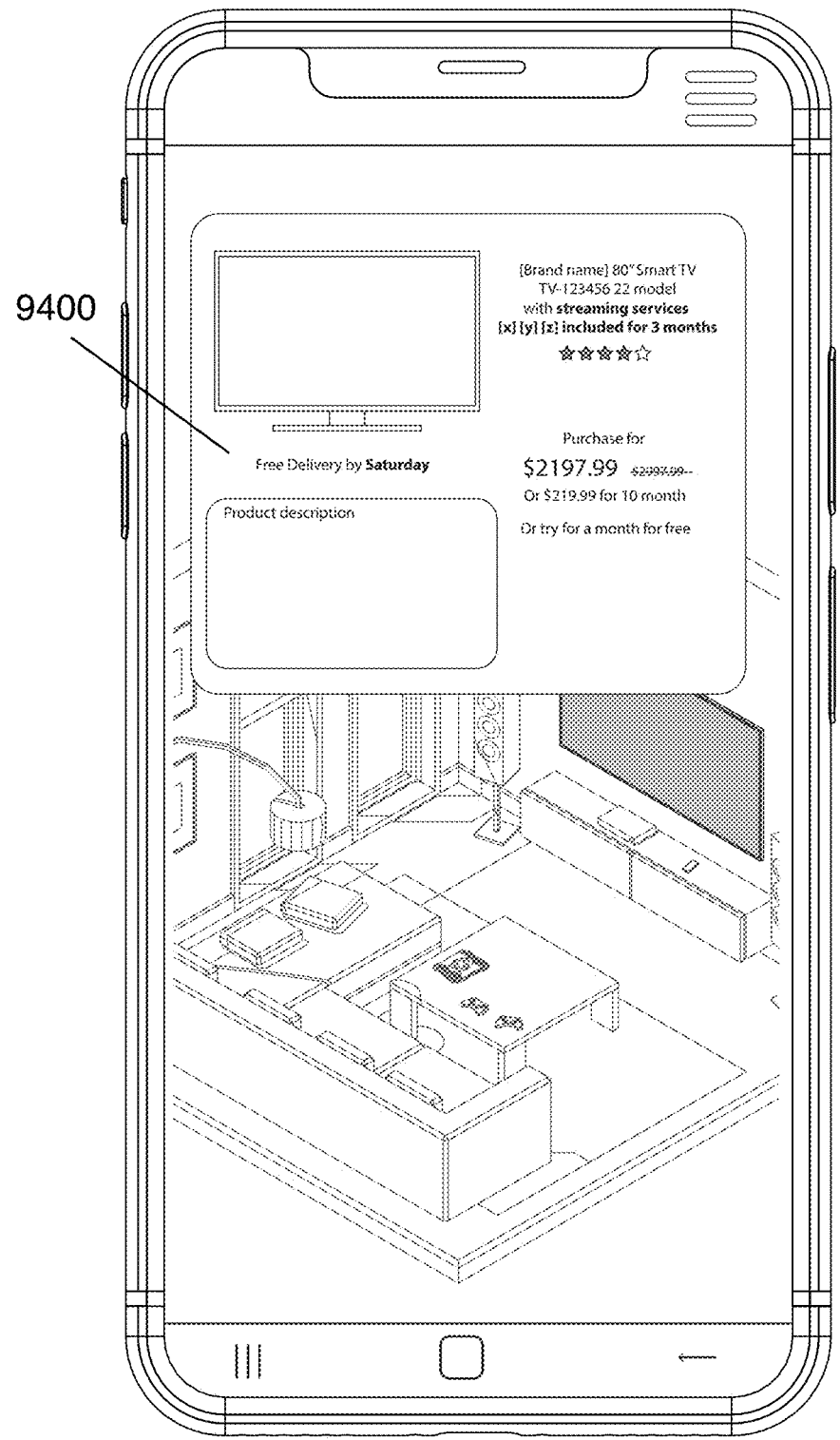

FIG. 243 illustrates an application of a communication device promoting products and services to a user.

Figure 244:
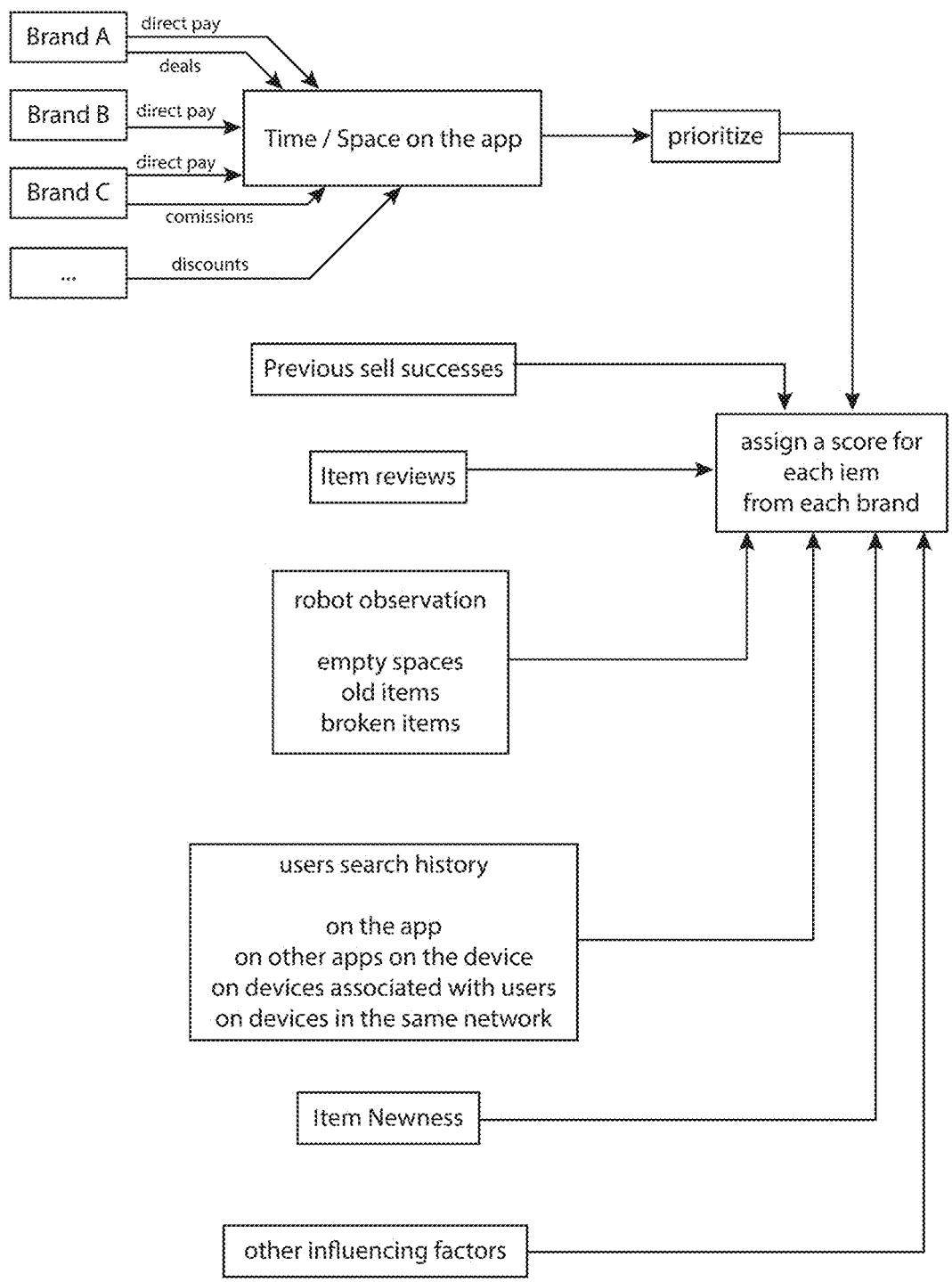

FIG. 244 illustrates factors influencing an item score.

Figure 245A:
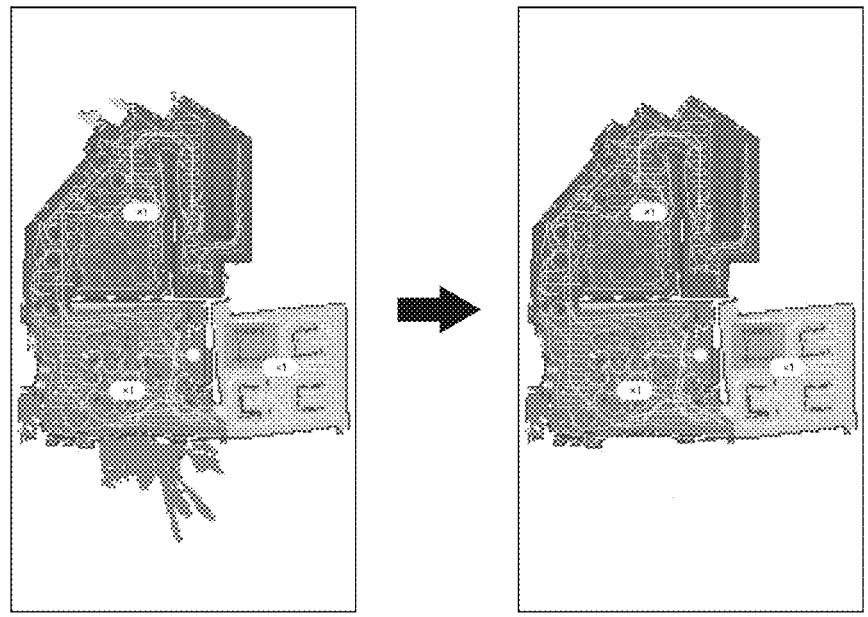
Figure 245B:
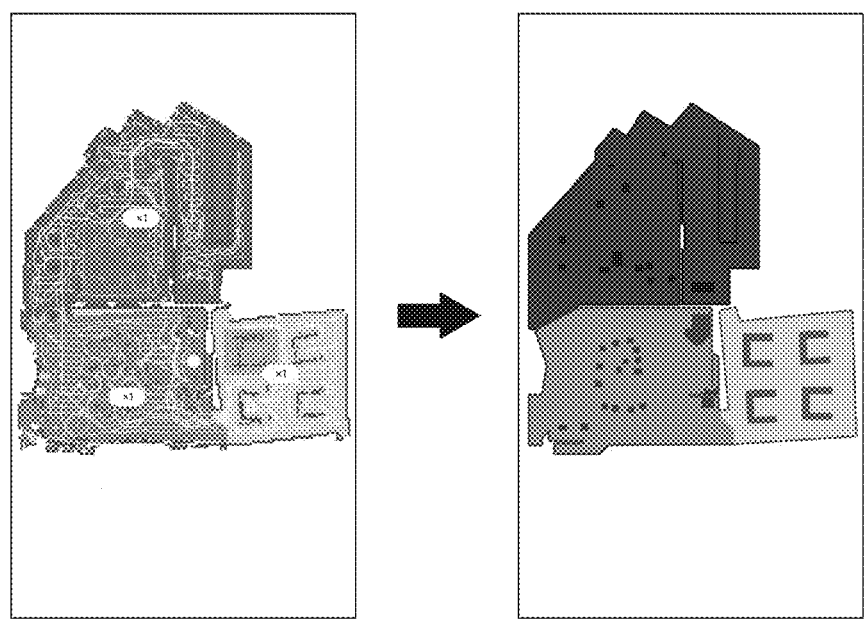

FIGS. 245A and 245B illustrate a map before and after cleaning and vectorization, respectively.

FIG. 246 illustrates a map generated by the processor during a current work session.

Figure 247:
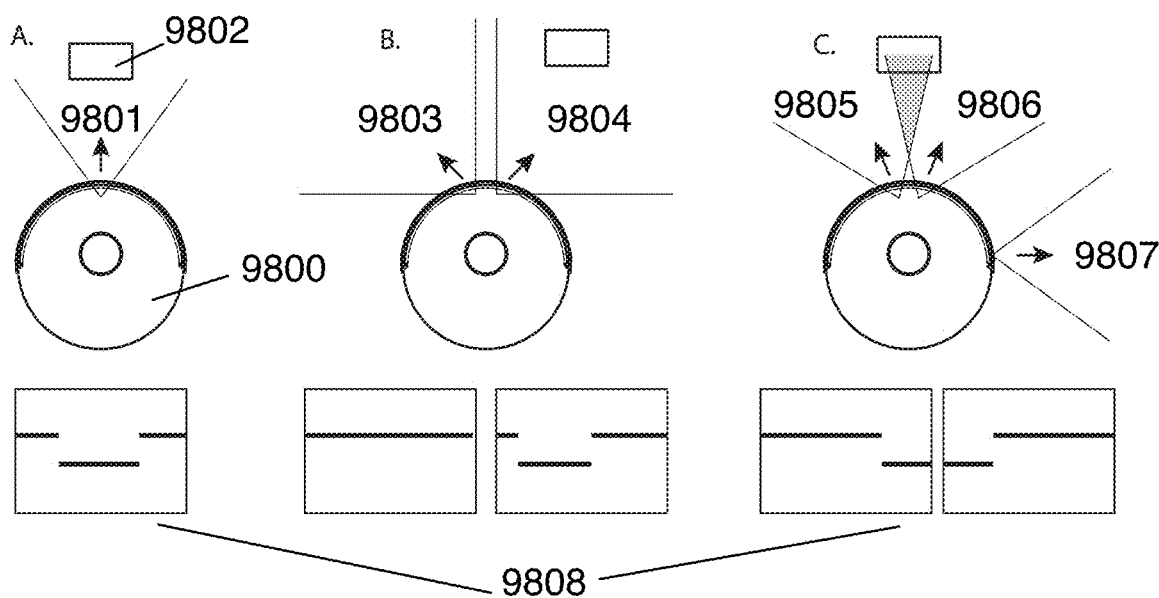

FIG. 247 illustrates an example of a robot with one or more distance sensors.

FIGS. 248A-249B illustrate examples of a module comprising at least one of a line laser and at least one of an image sensor.

Figure 251:
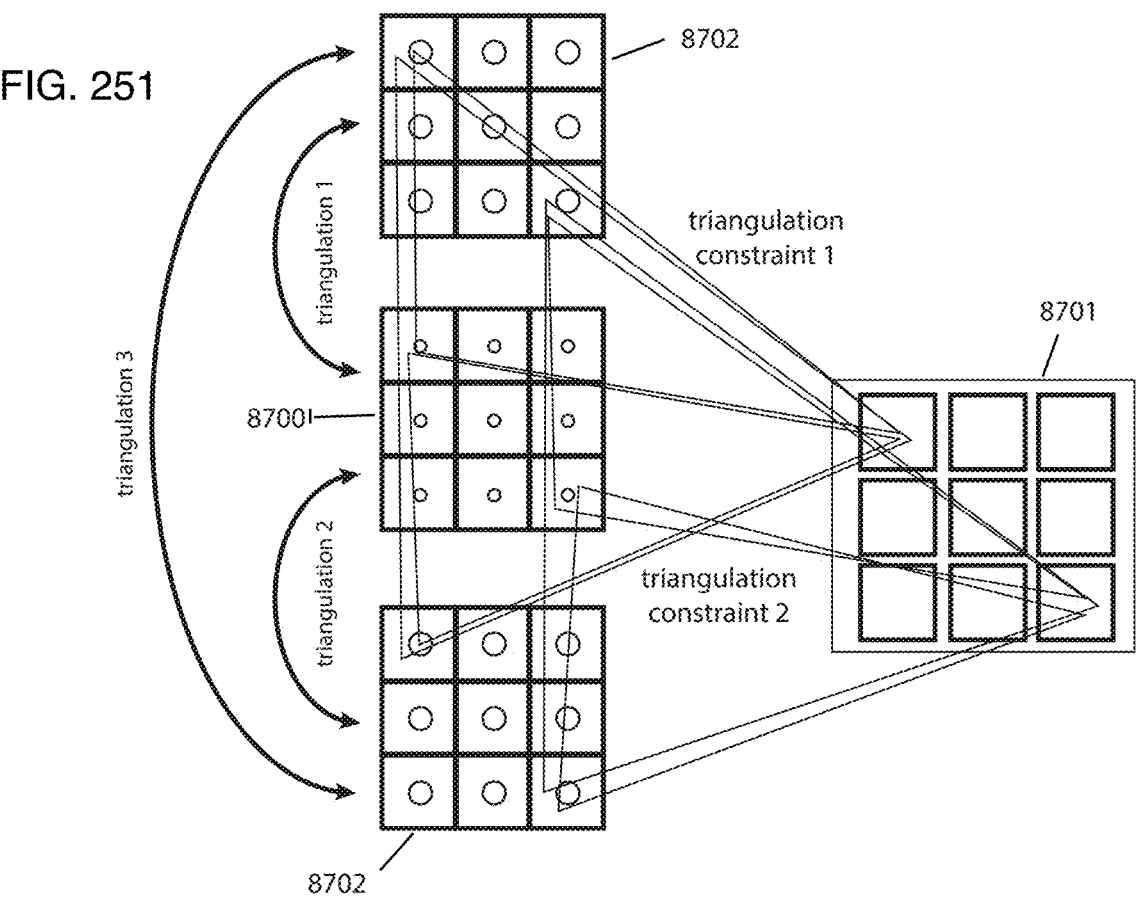

FIGS. 250 and 251 illustrate examples of structured light and measuring distances using triangulation.

Figure 252:
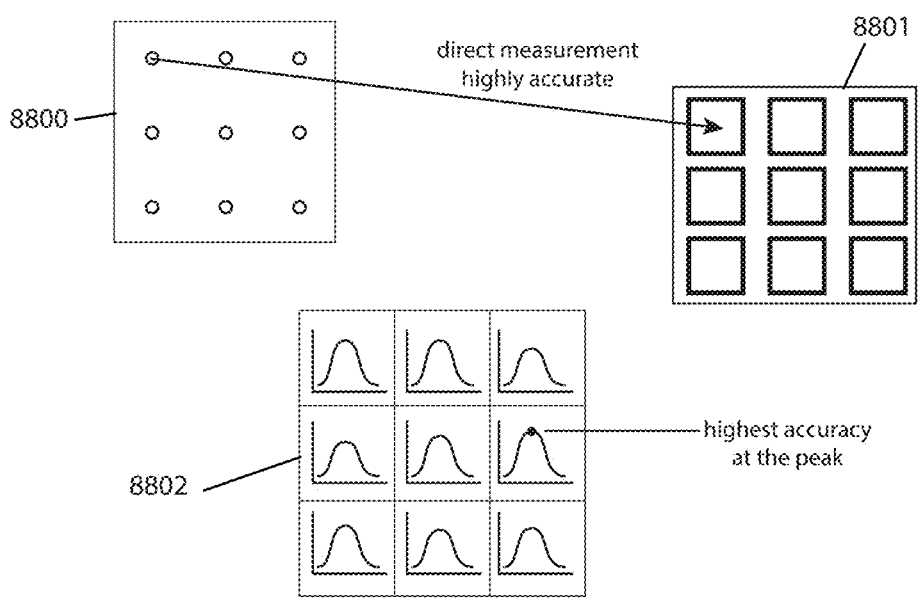
Figure 253:
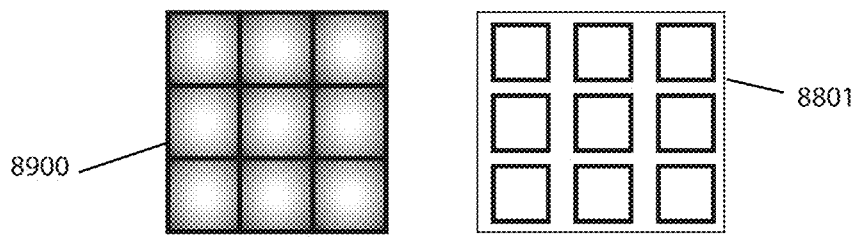

FIGS. 252 and 253 illustrate examples of TOF sensors for accurately measuring distance.

Figure 254:
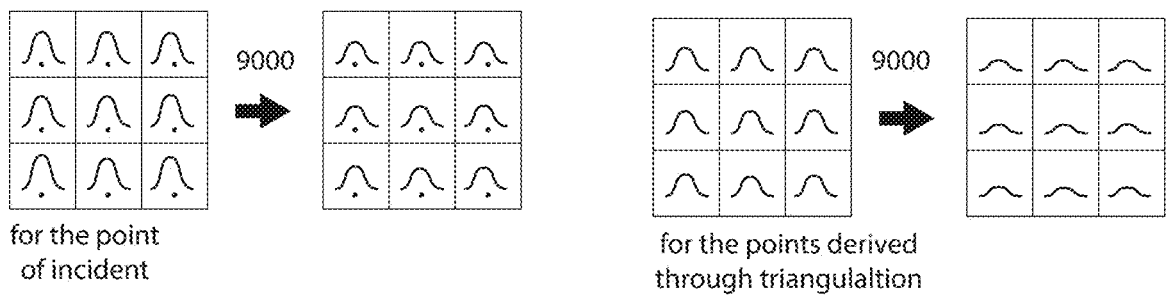

FIG. 254 illustrates changes in accuracy for distances derived through triangulation.

Figure 255:
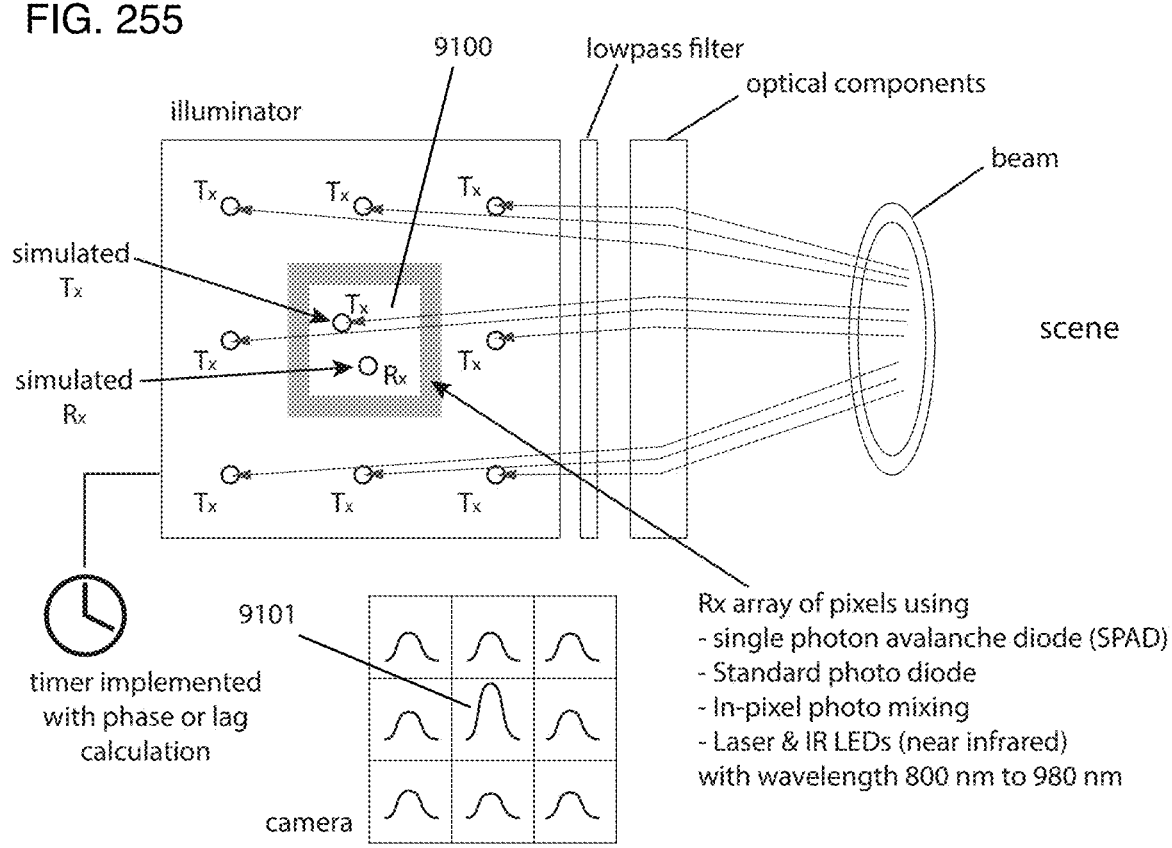

FIG. 255 illustrates a relation between confidence score and a location of transmitters and receivers.

Figure 256A:
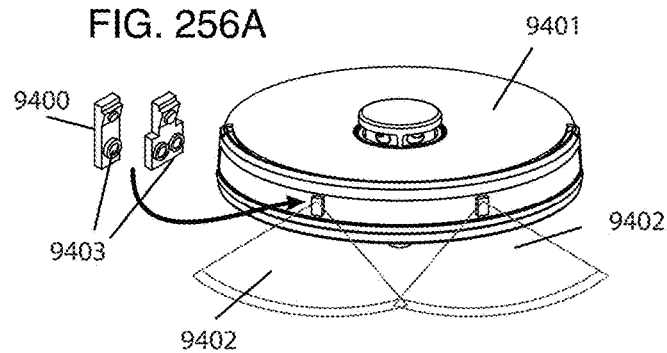
Figure 256B:
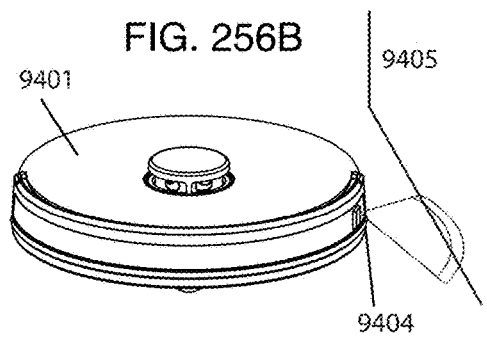
Figure 257:
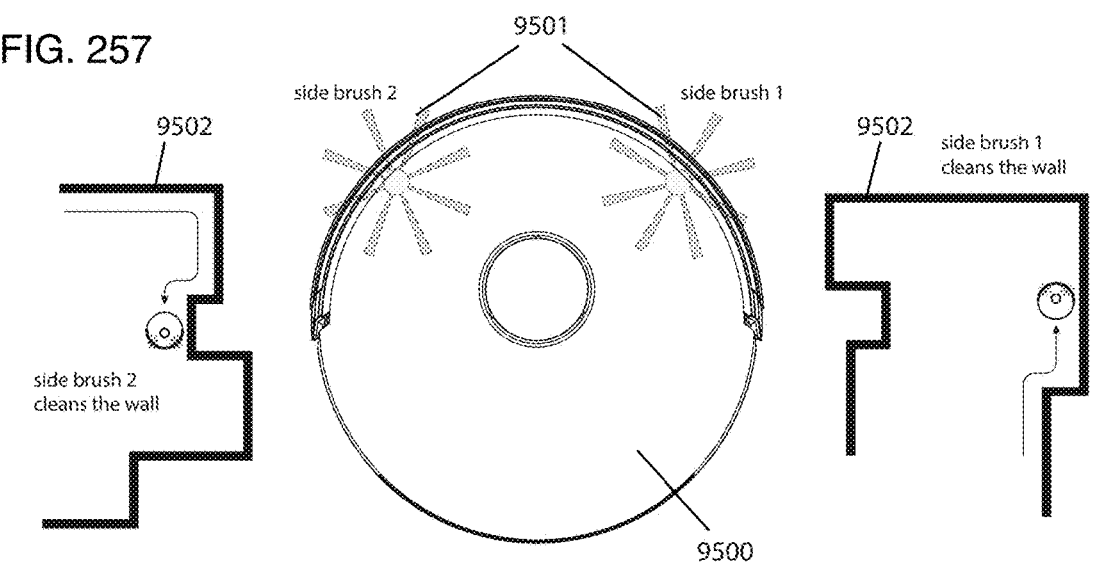

FIGS. 256A-257 illustrate examples of positioning of obstacle sensors on a robot.

FIGS. 258-271 illustrate examples of a module comprising a line laser and at least one camera.

Figure 272A:
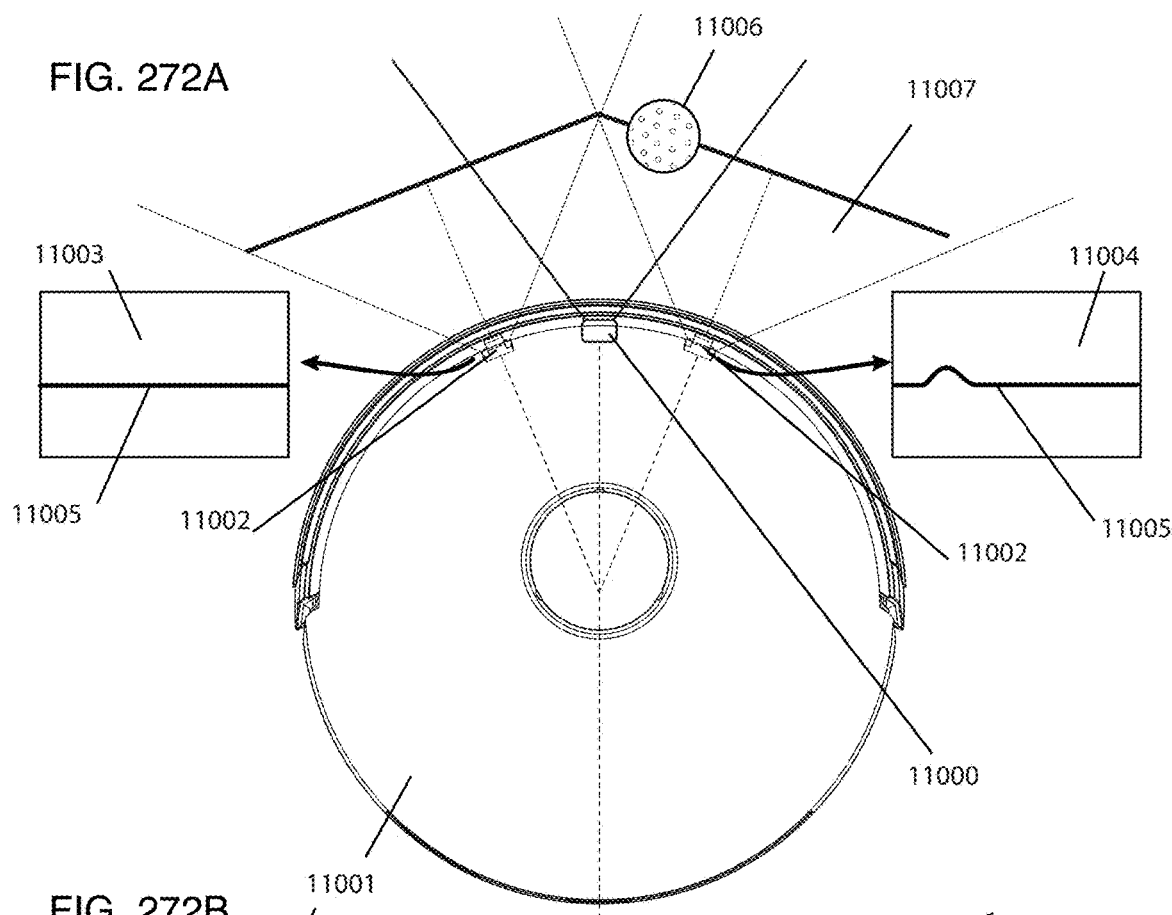
Figure 272B:
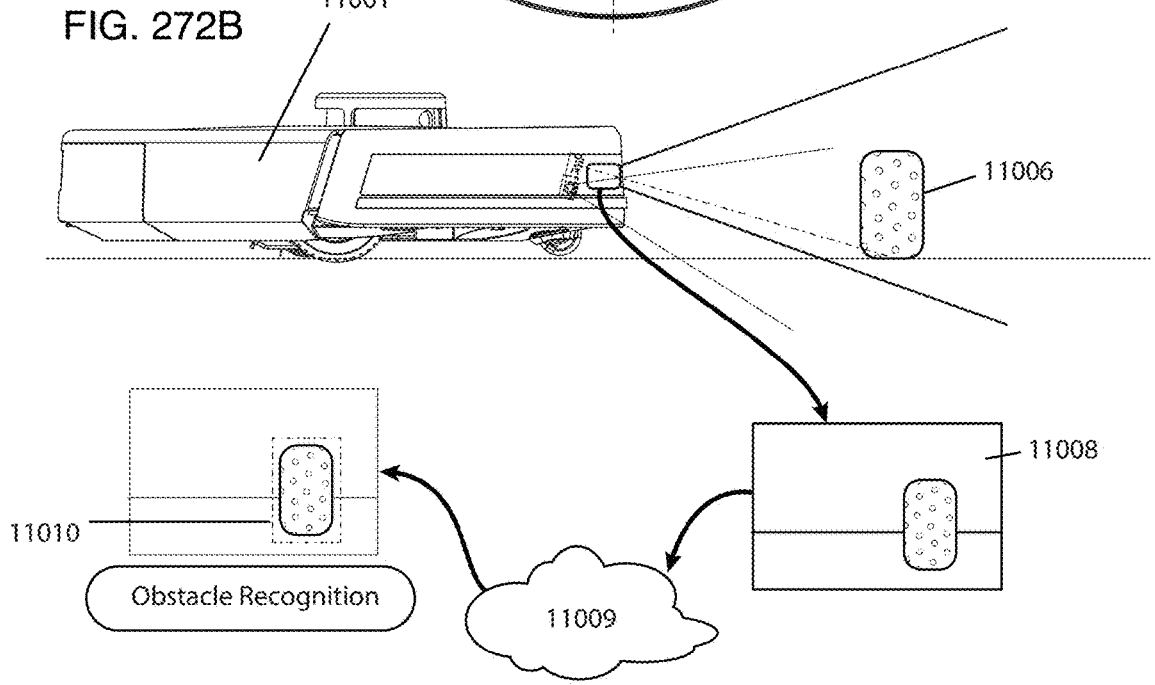

FIGS. 272A and 272B illustrate a camera and a module comprising a line laser and at least one camera.

Figure 273:
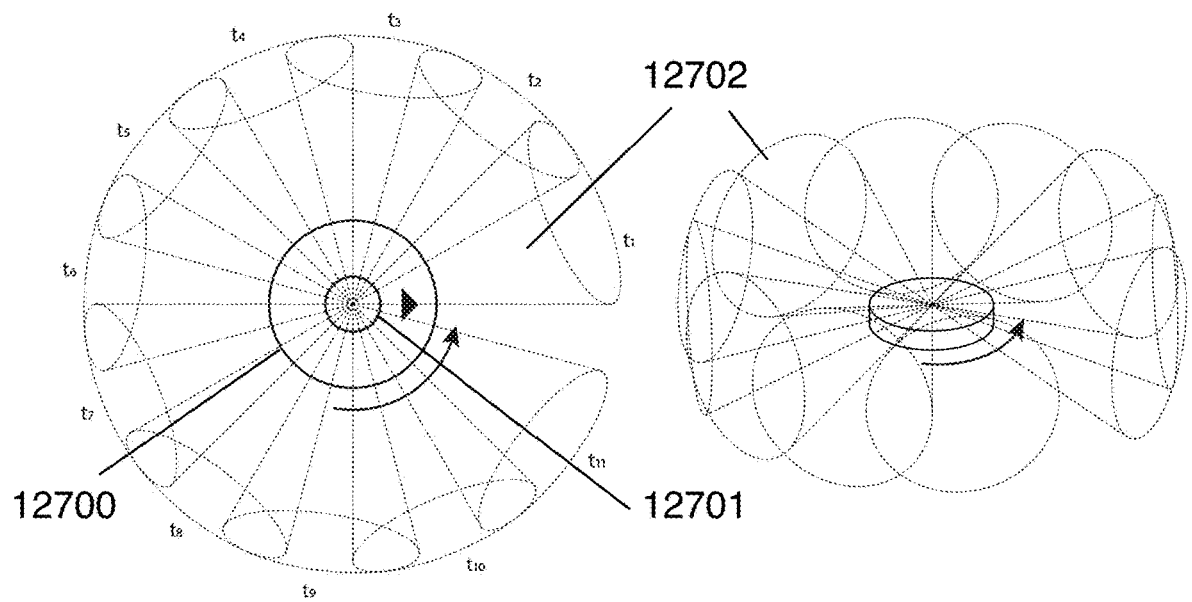

FIG. 273 illustrates an example of a constructing a frame of reference.

Figure 274:
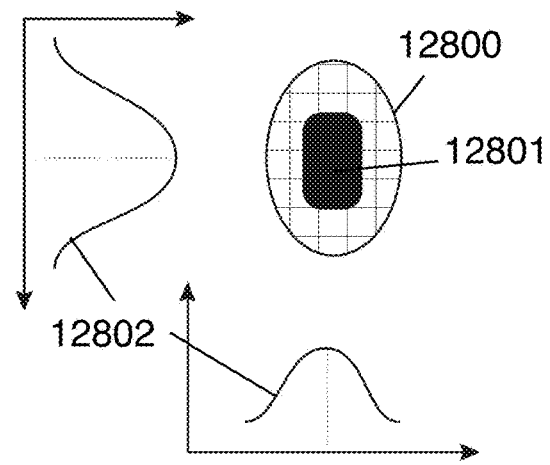

FIG. 274 illustrates an example of a bounding volume of an object.

Figure 275:
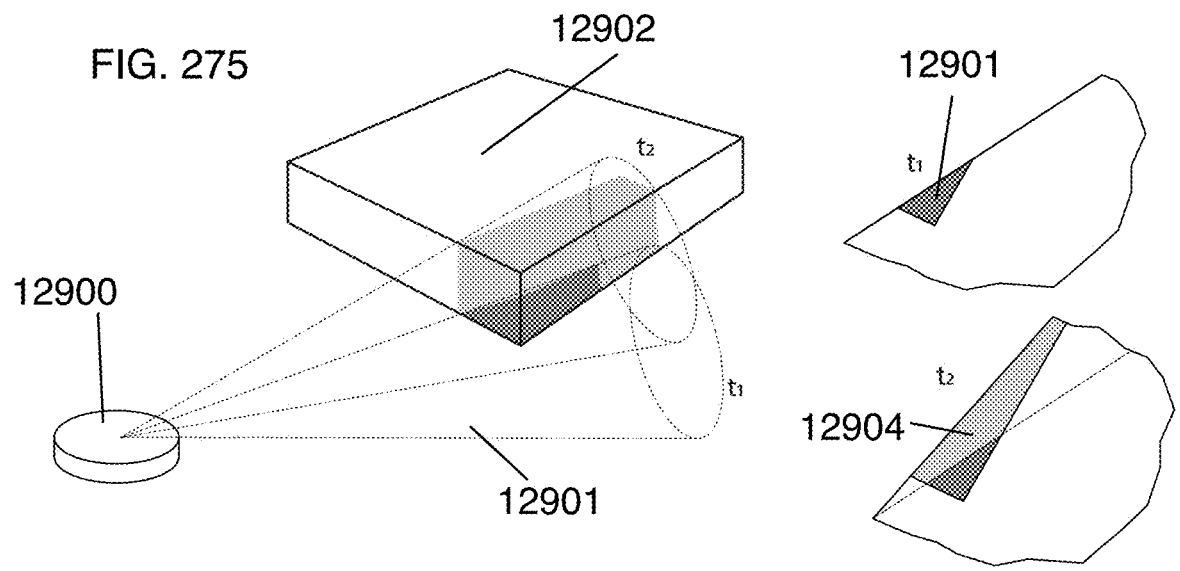

FIG. 275 illustrates an example of a robot including a sensor with a limited field of view.

Figure 276:
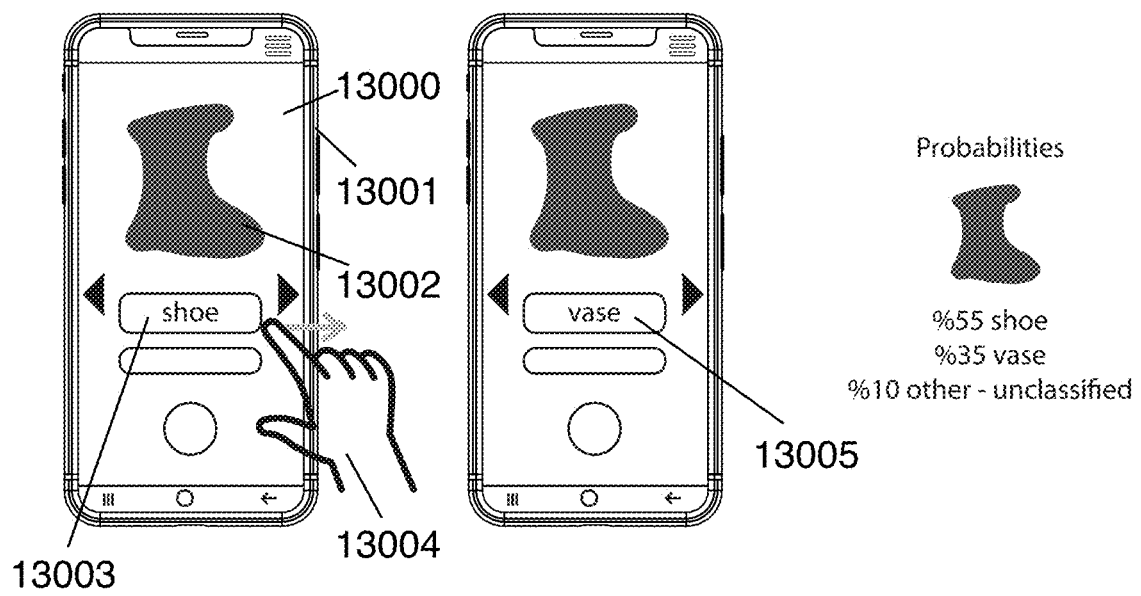

FIG. 276 illustrates an application of a communication device displaying a predicted object type.

FIG. 277 illustrates an application of a communication device displaying a location of a toy box and living room in a map.

FIG. 278 illustrates an application of a communication device displaying an object and awaiting user input.

FIG. 279 illustrates an application of a communication device displaying different tools that may be selected by a user.

Figure 280:
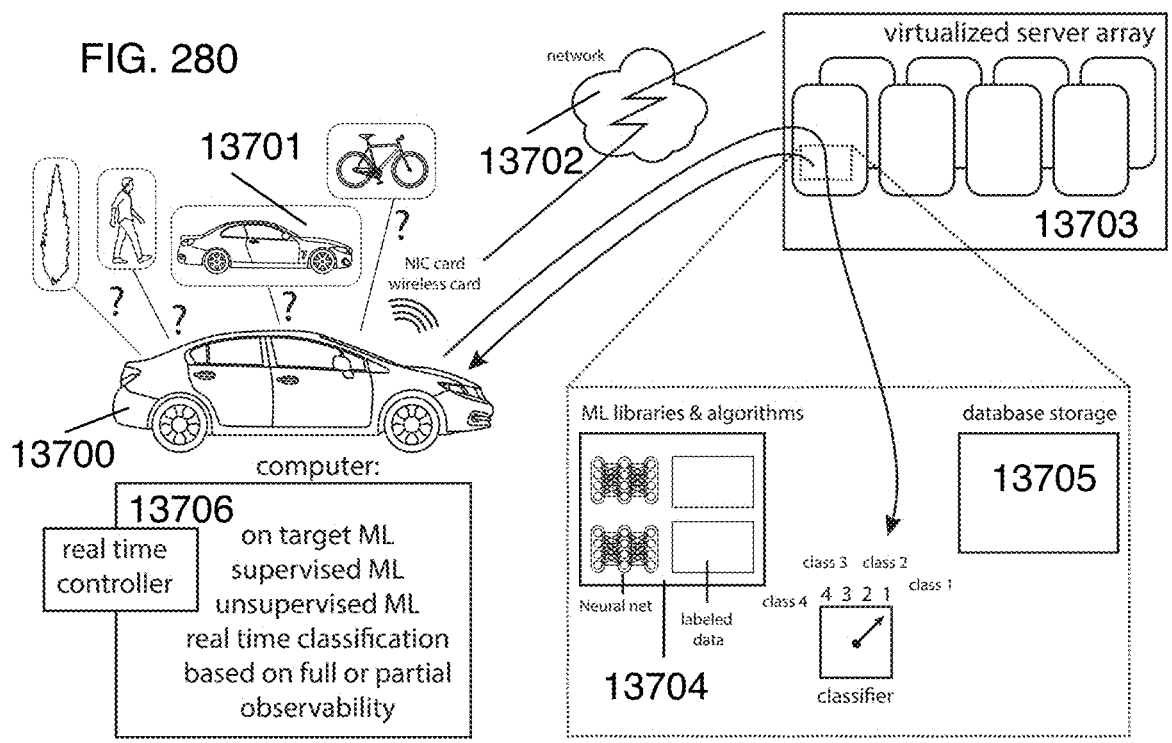

FIG. 280 illustrates an example of an autonomous vehicle configured to classify objects.

Figure 281A:
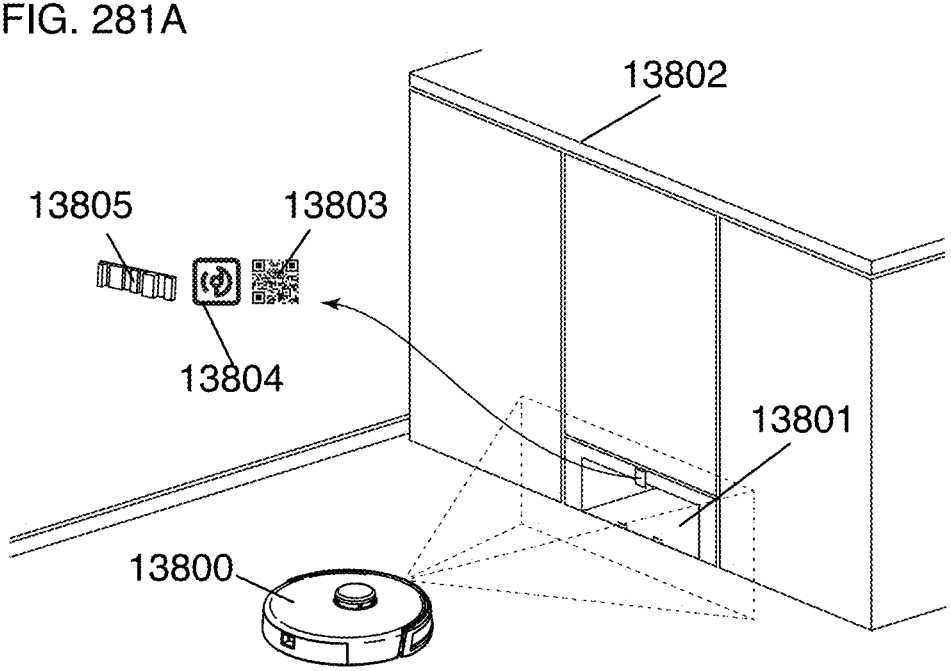
Figure 281B:
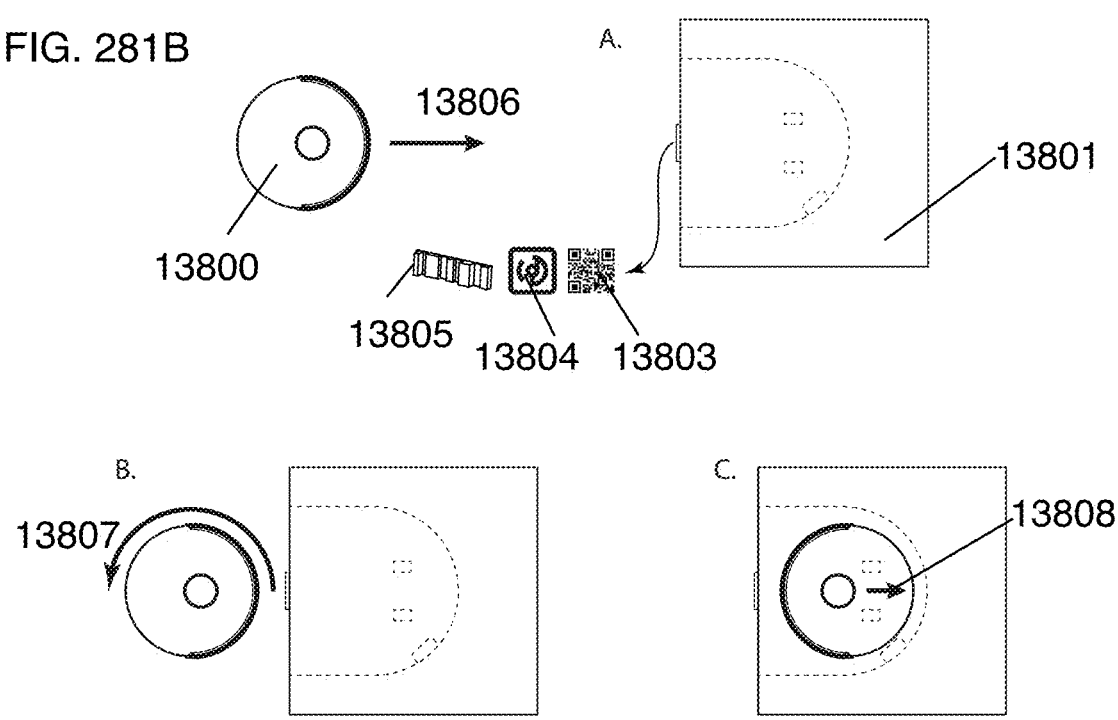

FIGS. 281A and 281B illustrate a robot docking at a charging station.

FIGS. 282-285 illustrate an example of a robot including a near range obstacle sensor approaching an obstacle and a floor transition and resulting line distortions in images.

Figure 286:
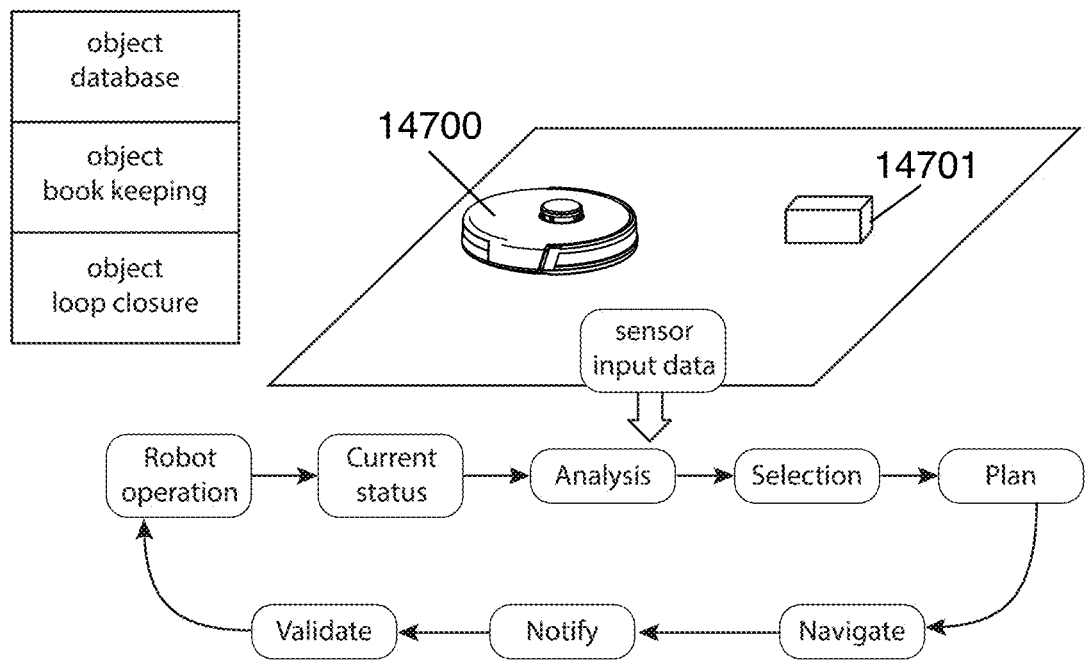

FIG. 286 illustrates an example of a process of object identification.

Figure 287:
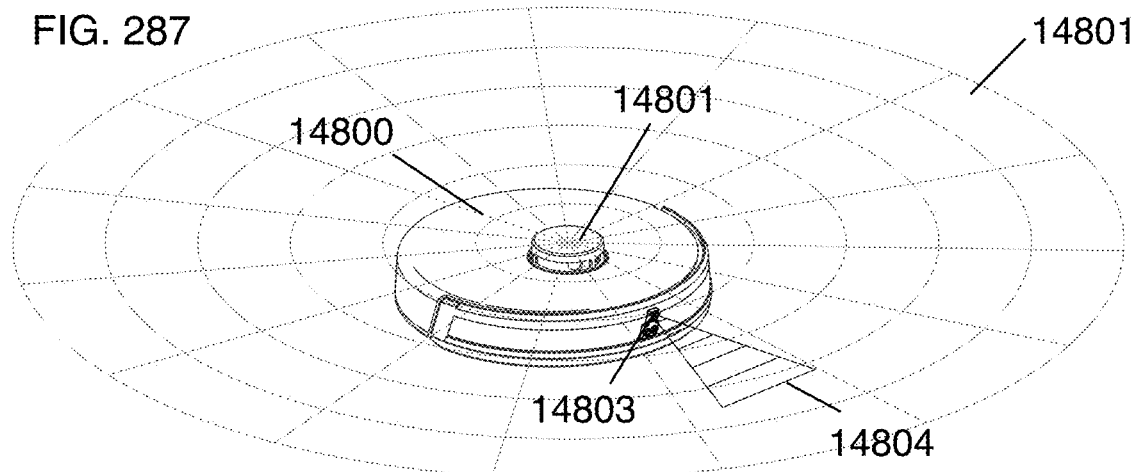

FIG. 287 illustrates an example of a robot including a LIDAR and a camera.

Figure 288:
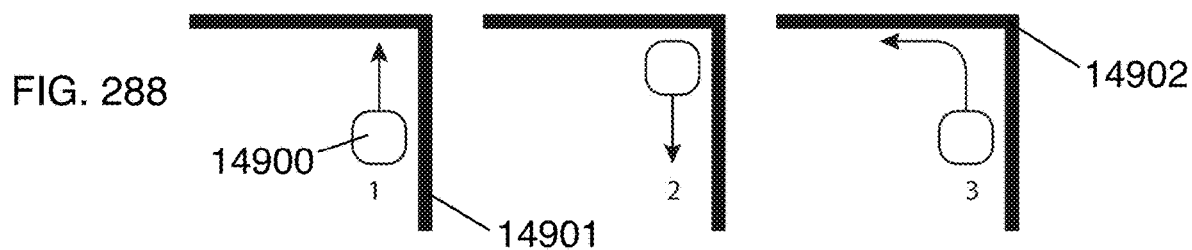

FIG. 288 illustrates an example of a robot using a near range sensor.

Figure 289:
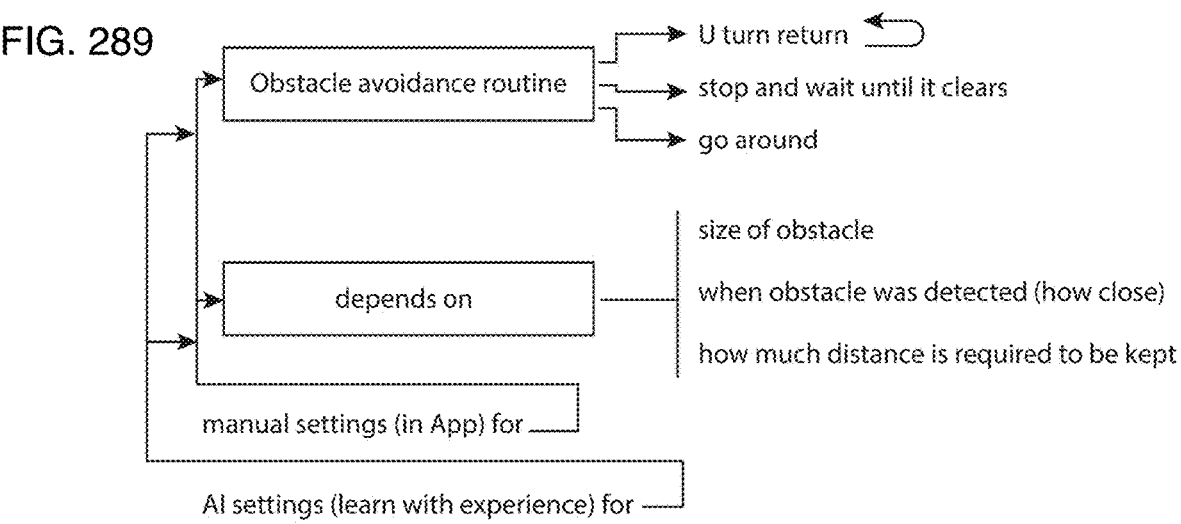

FIG. 289 illustrates an example of an obstacle avoidance routine.

Figure 290:
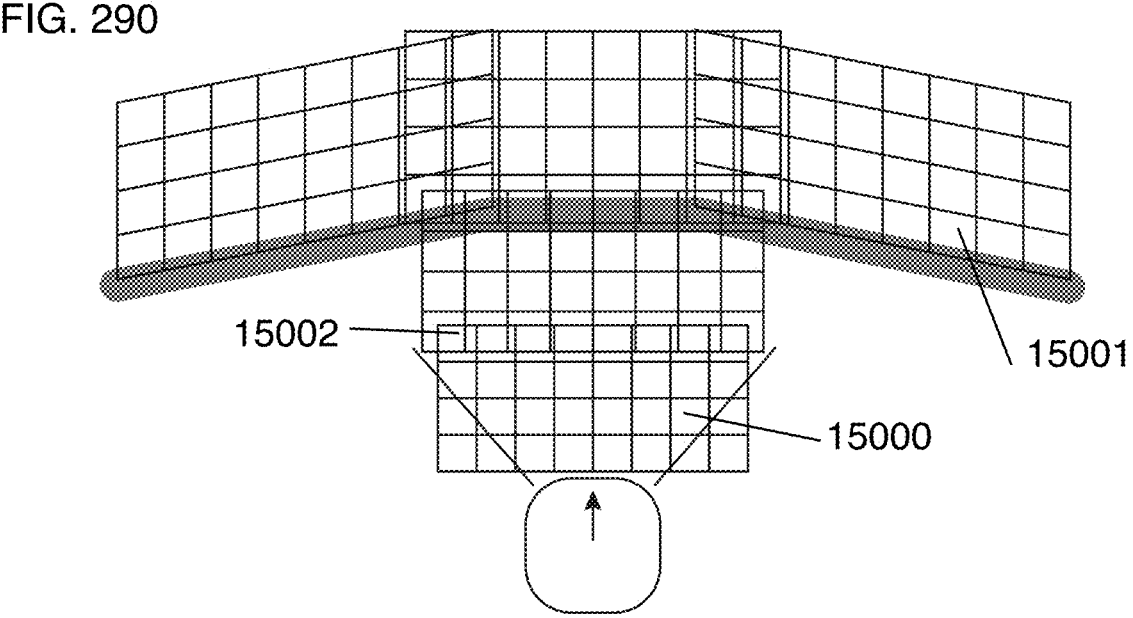

FIG. 290 illustrates an example of partially overlapping zones.

Figure 291:
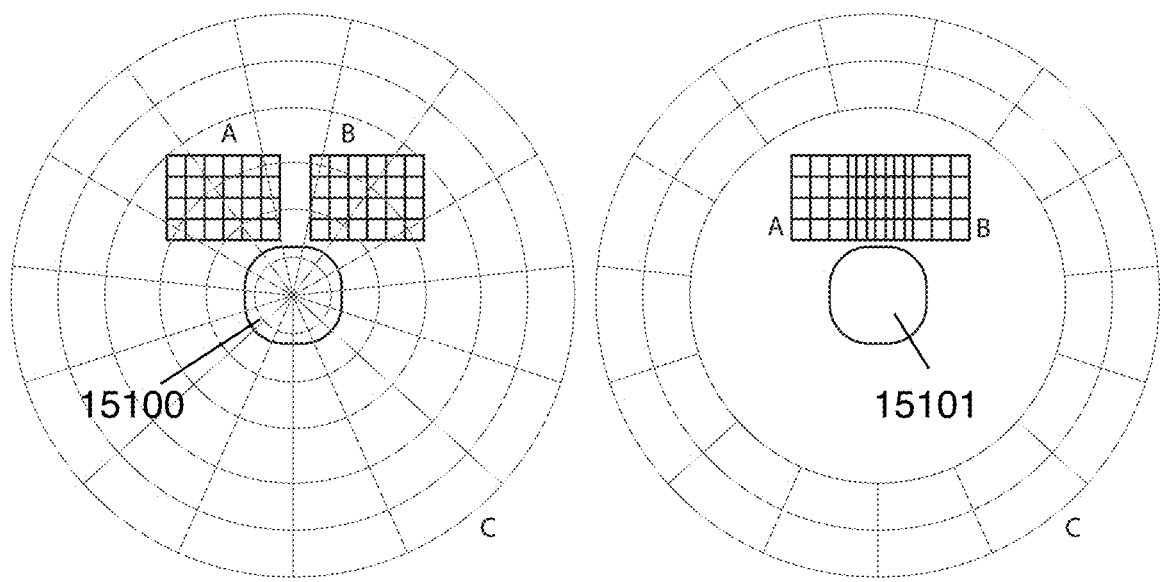

FIG. 291 illustrates an example of overlapping zones.

FIG. 292 illustrates feature extraction from images.

Figure 293B:
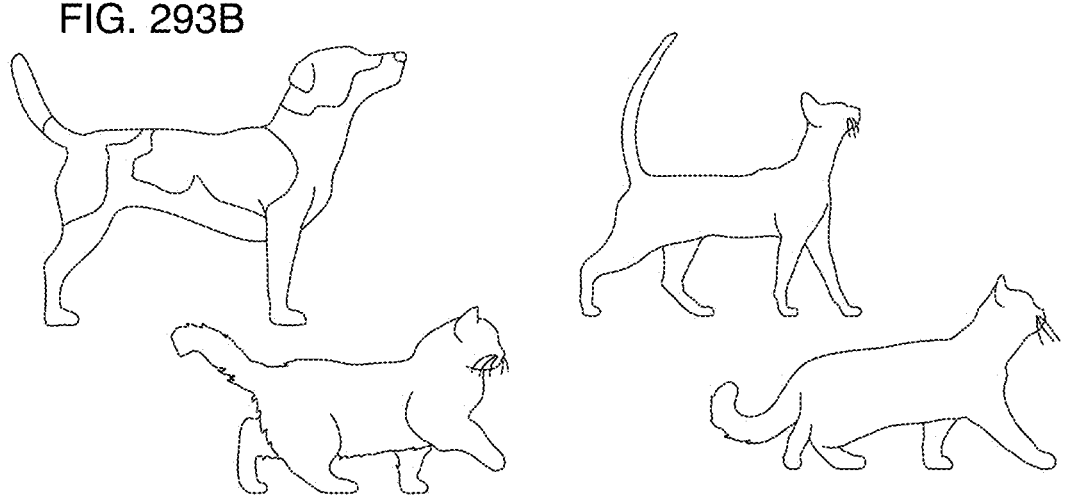
Figure 293C:
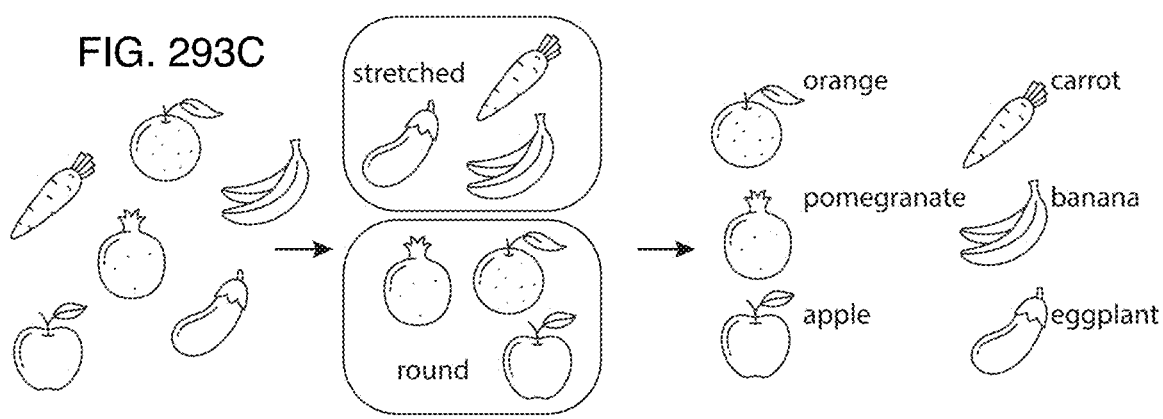

FIGS. 293A-293C illustrate examples of salient features.

Figure 294:
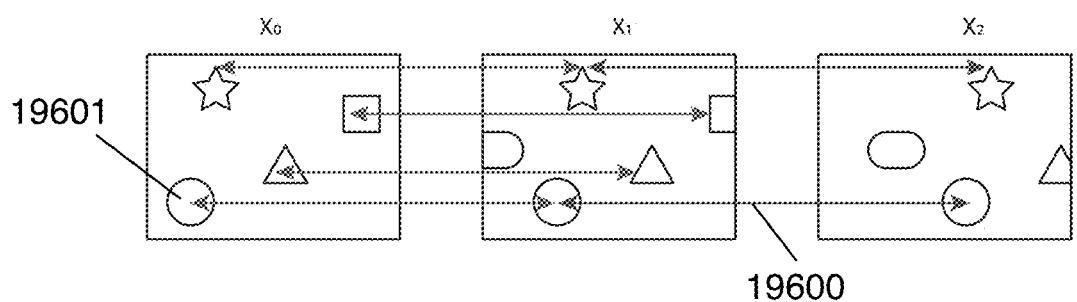

FIG. 294 illustrates an example of tracking observations from one frame to the next.

Figure 295:
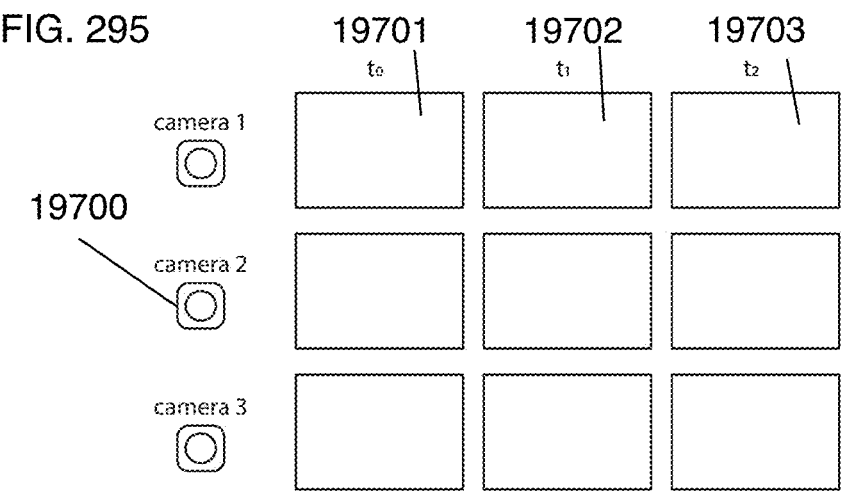
Figure 296:
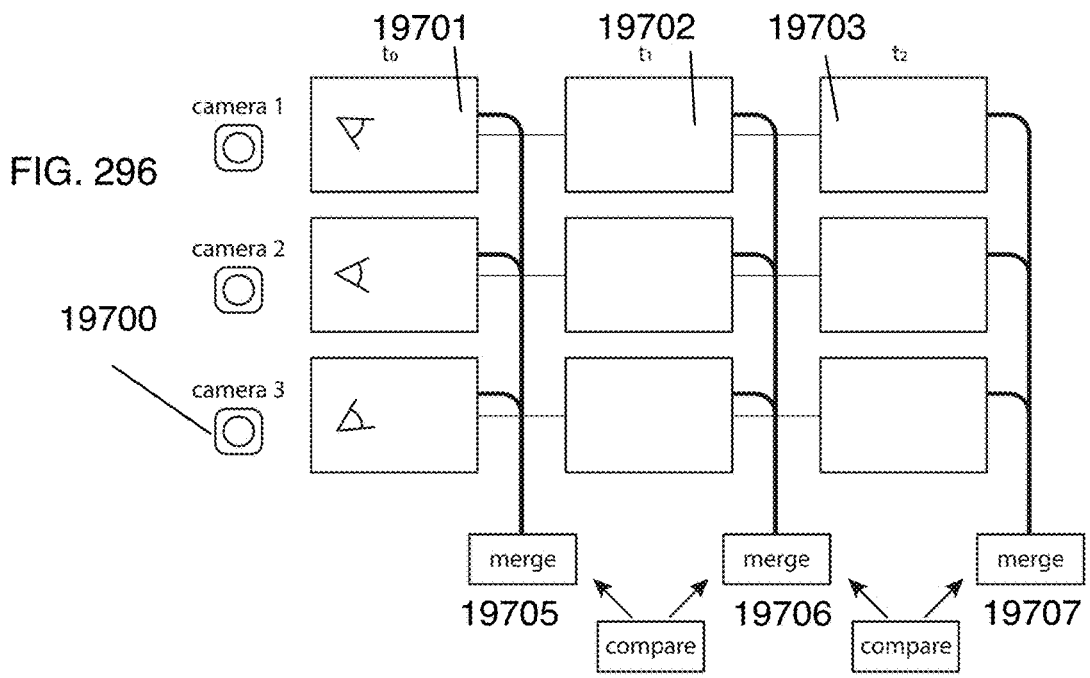
Figure 297:
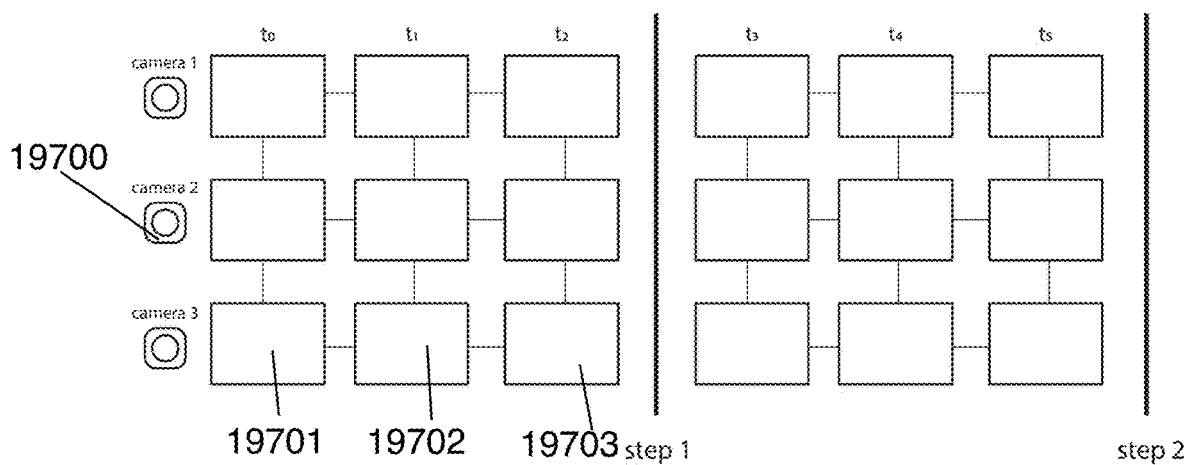

FIGS. 295-297 illustrate three cameras capturing frames of readings and merging images.

FIGS. 298-300 illustrate associating pixels with depth data.

Figure 301A:
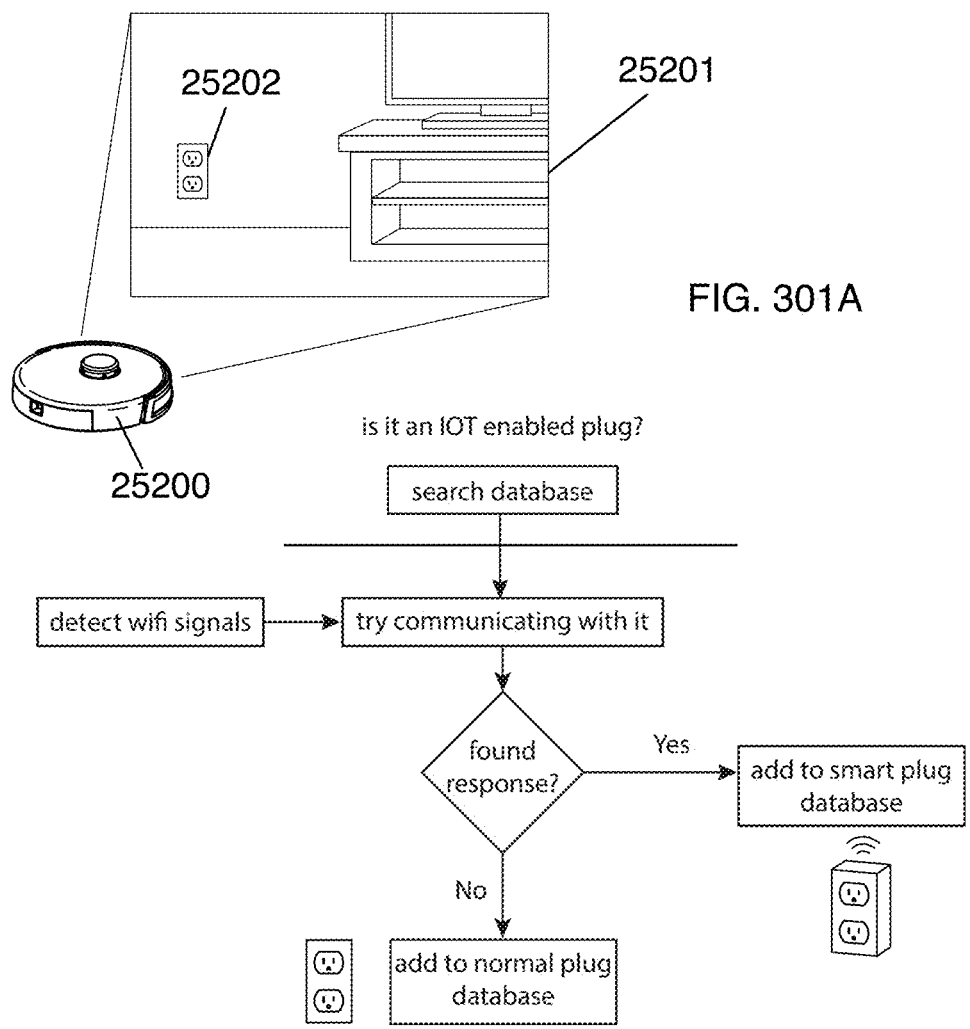
Figure 301B:
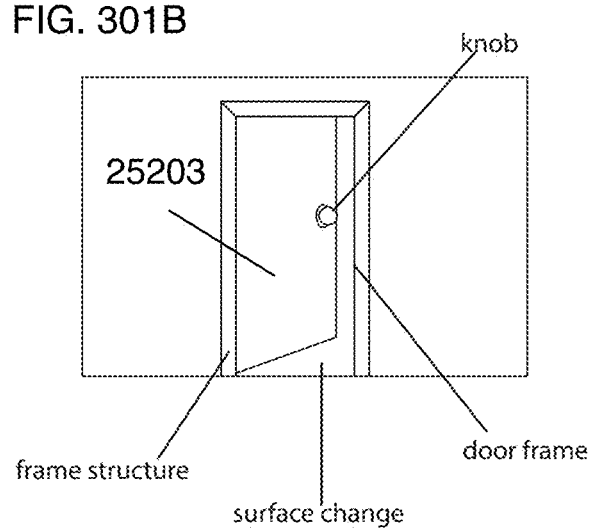

FIGS. 301A and 301B illustrate examples of object identification.

Figure 302:
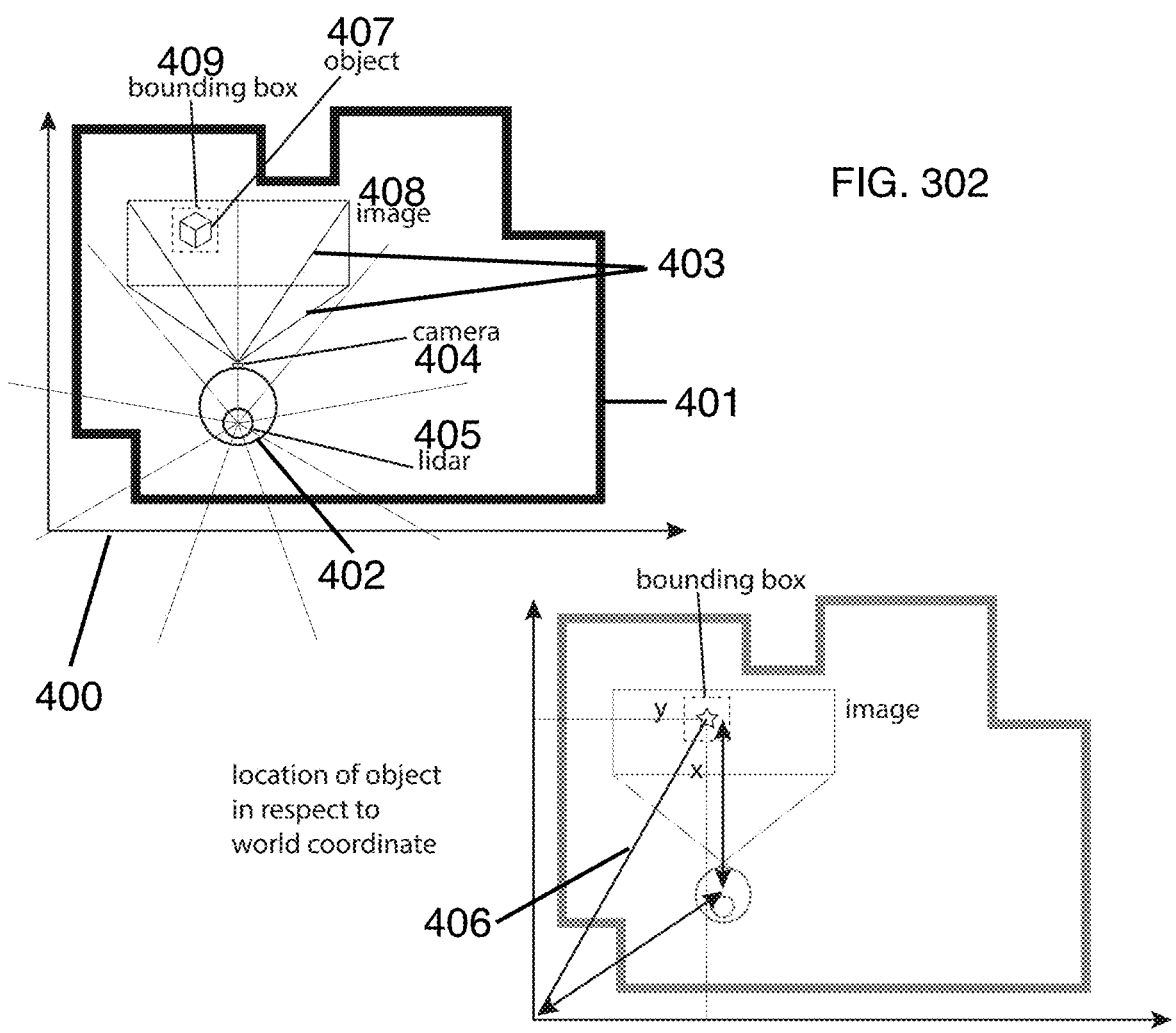

FIG. 302 illustrates an example of a coordinate system of a floorplan, a robot, and an image sensor.

FIGS. 303-306 illustrates an example of coordinate systems of objects within the environment.

Figure 307:
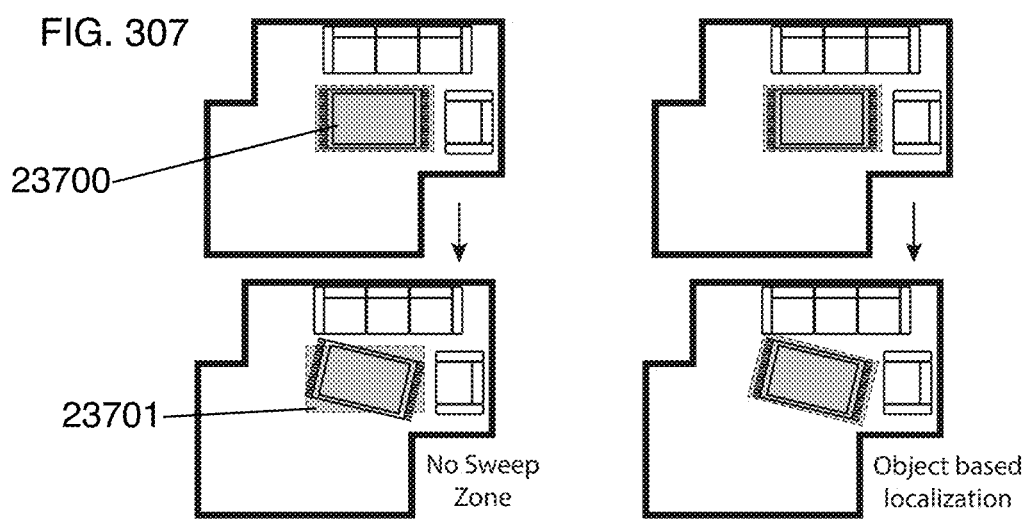
Figure 308:
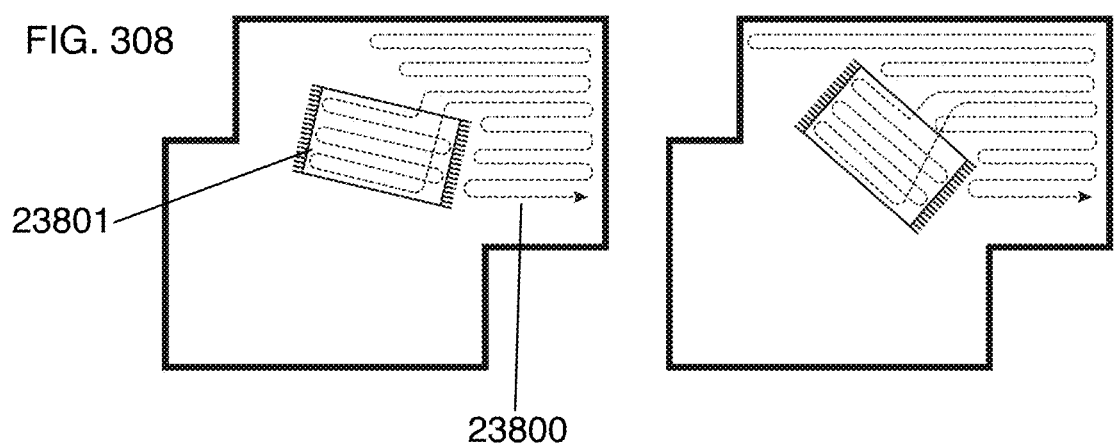

FIGS. 307 and 308 illustrate examples of object-based localization.

Figure 309:
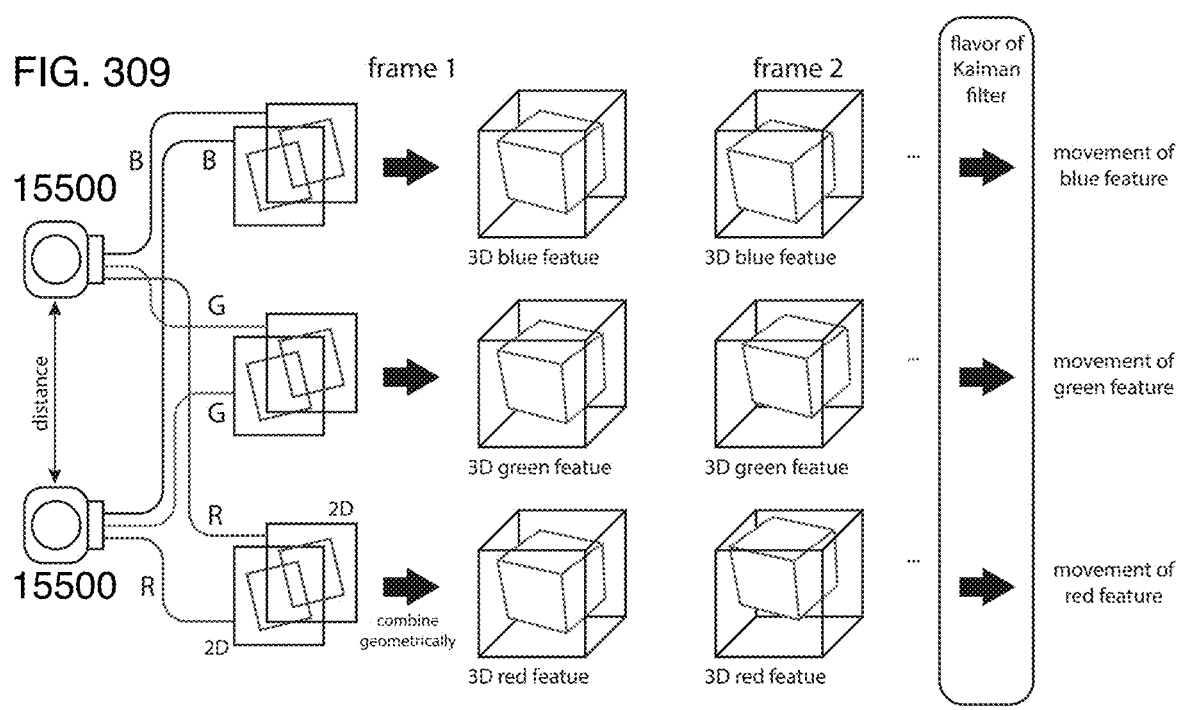
Figure 310:
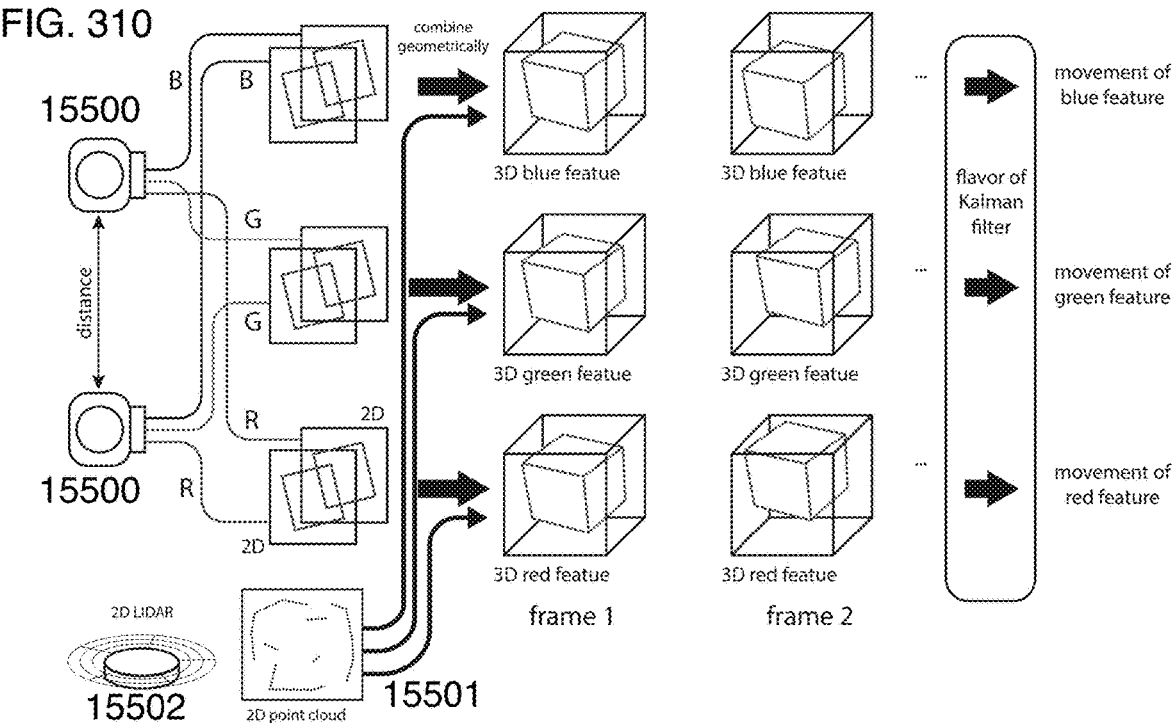
Figure 311:
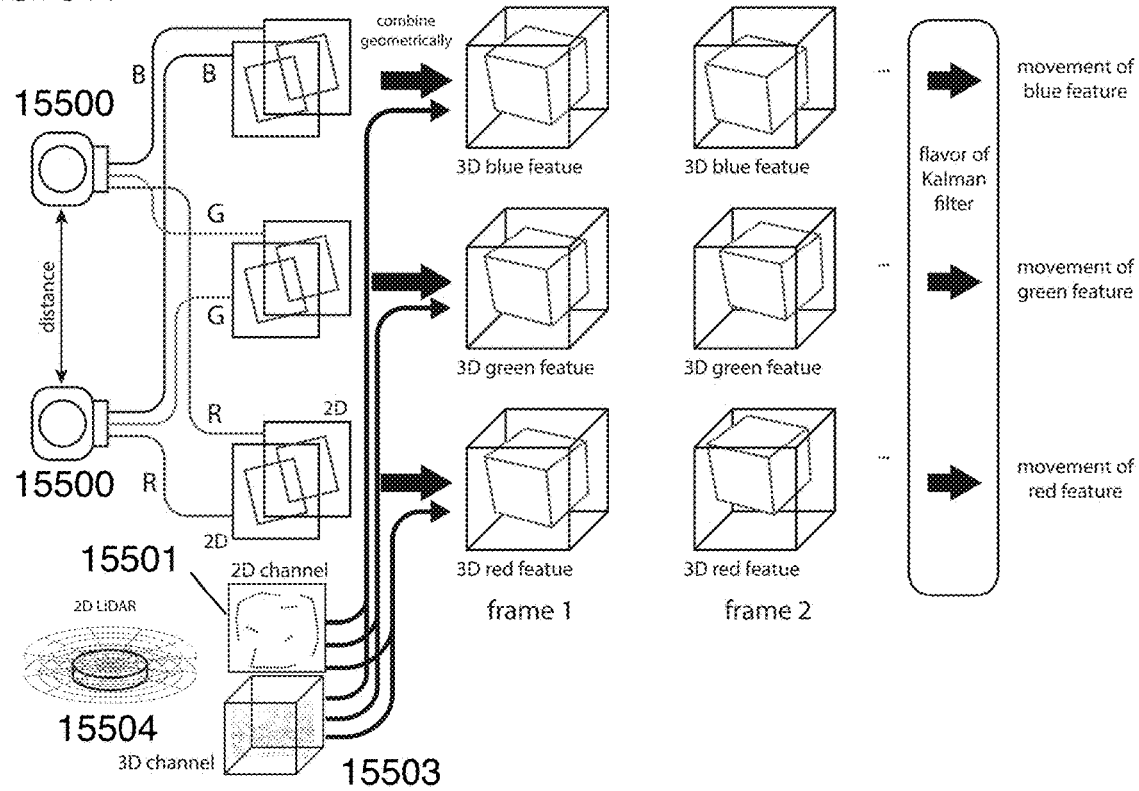

FIGS. 309-311 illustrate combining sensor data channels.

Figure 312:
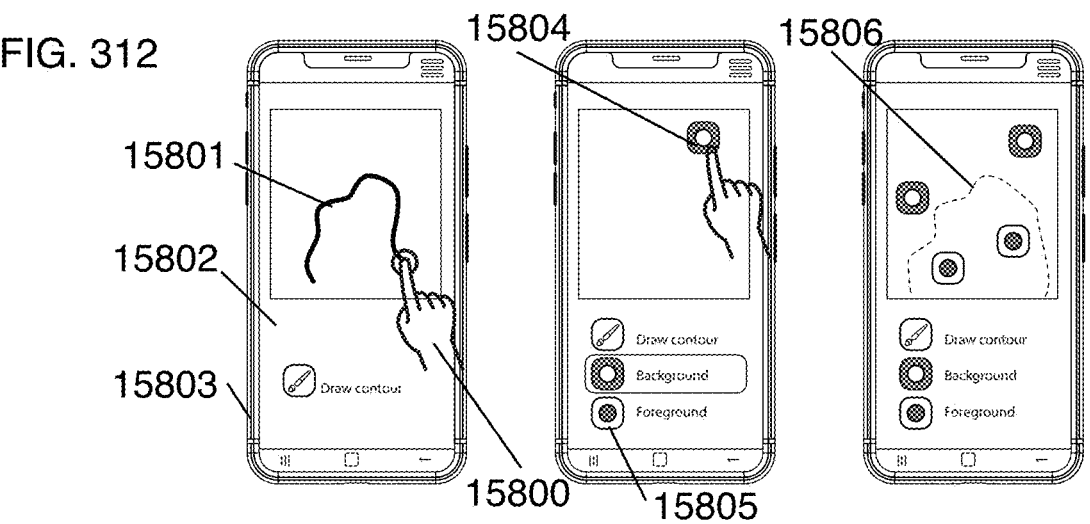

FIG. 312 illustrates a user drawing a contour using an application of a communication device.

Figure 313:
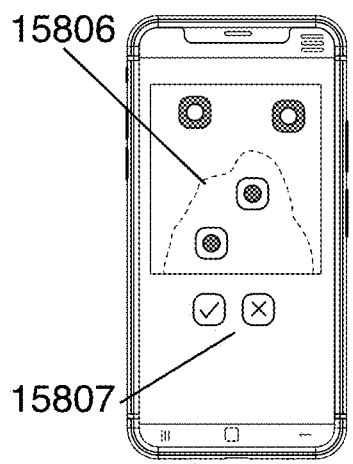
Figure 314:
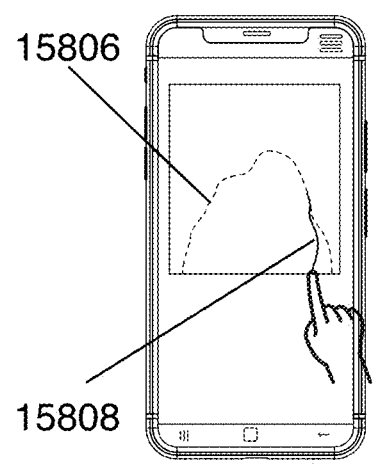

FIGS. 313 and 314 illustrate an application of a communication device displaying a segment cut and a correction to the segment cut, respectively.

Figure 315:
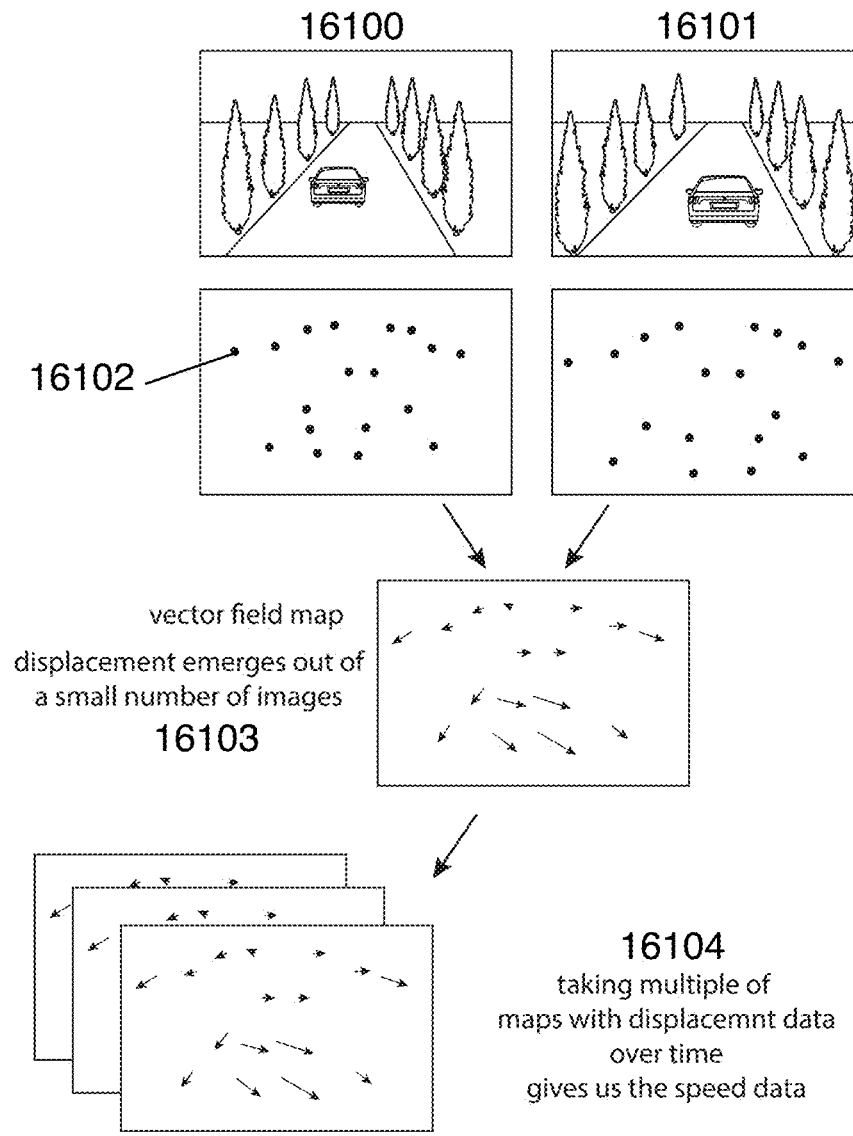

FIG. 315 illustrates an example of generating a vector field map.

Figure 316:
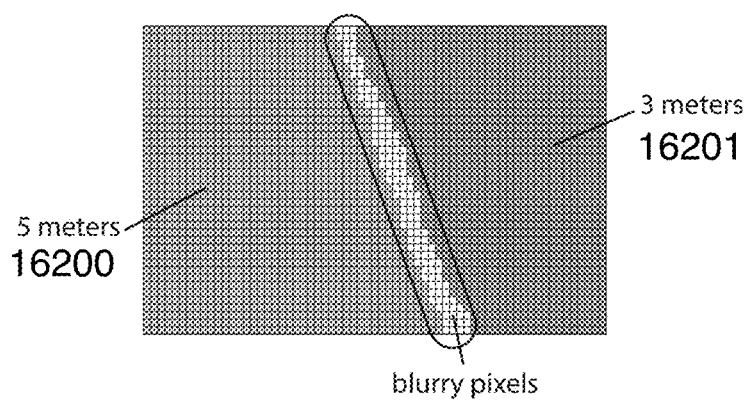

FIG. 316 illustrates resolving blurry pixels into a group.

Figure 317:
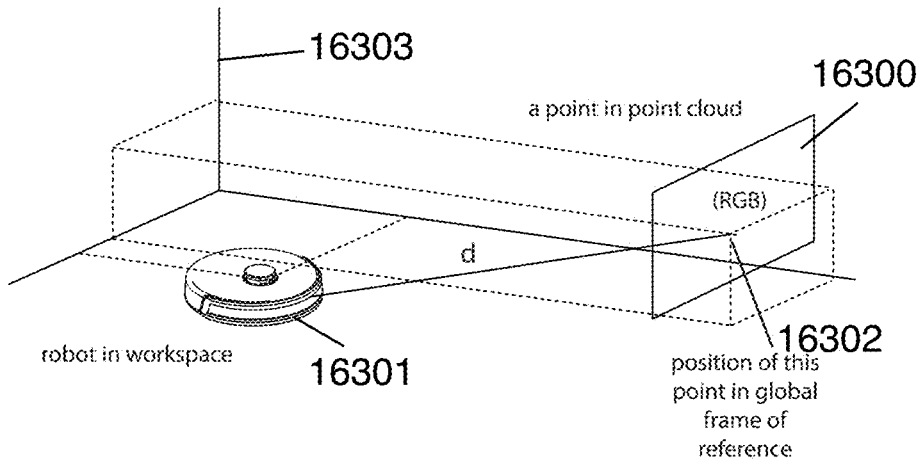

FIG. 317 illustrates an example of associating pixels with depth.

Figure 318:
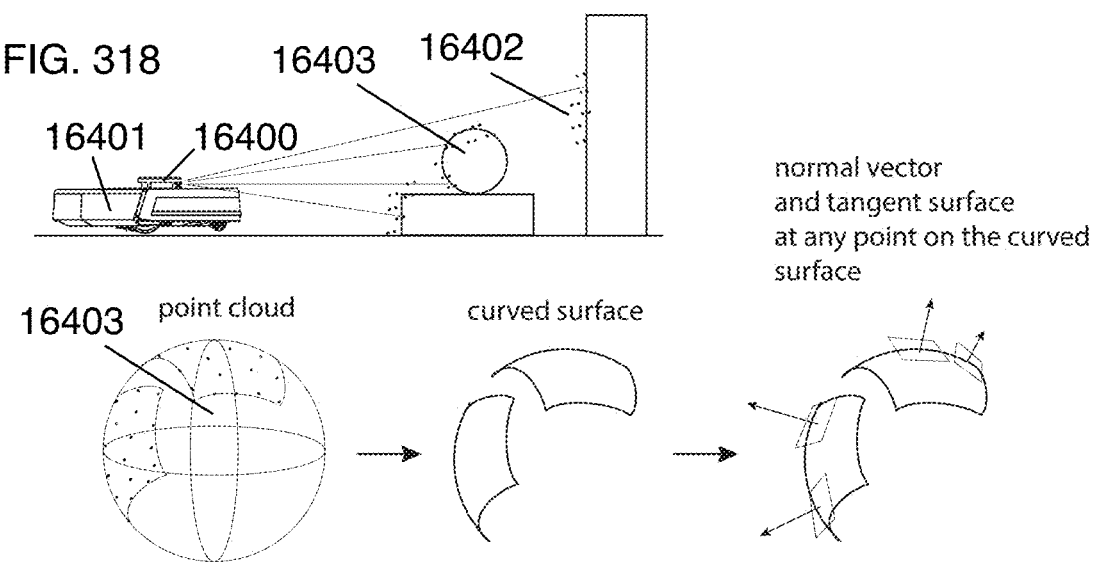

FIG. 318 illustrates a sensor of a robot capturing point cloud data to analyze an object.

Figure 319:
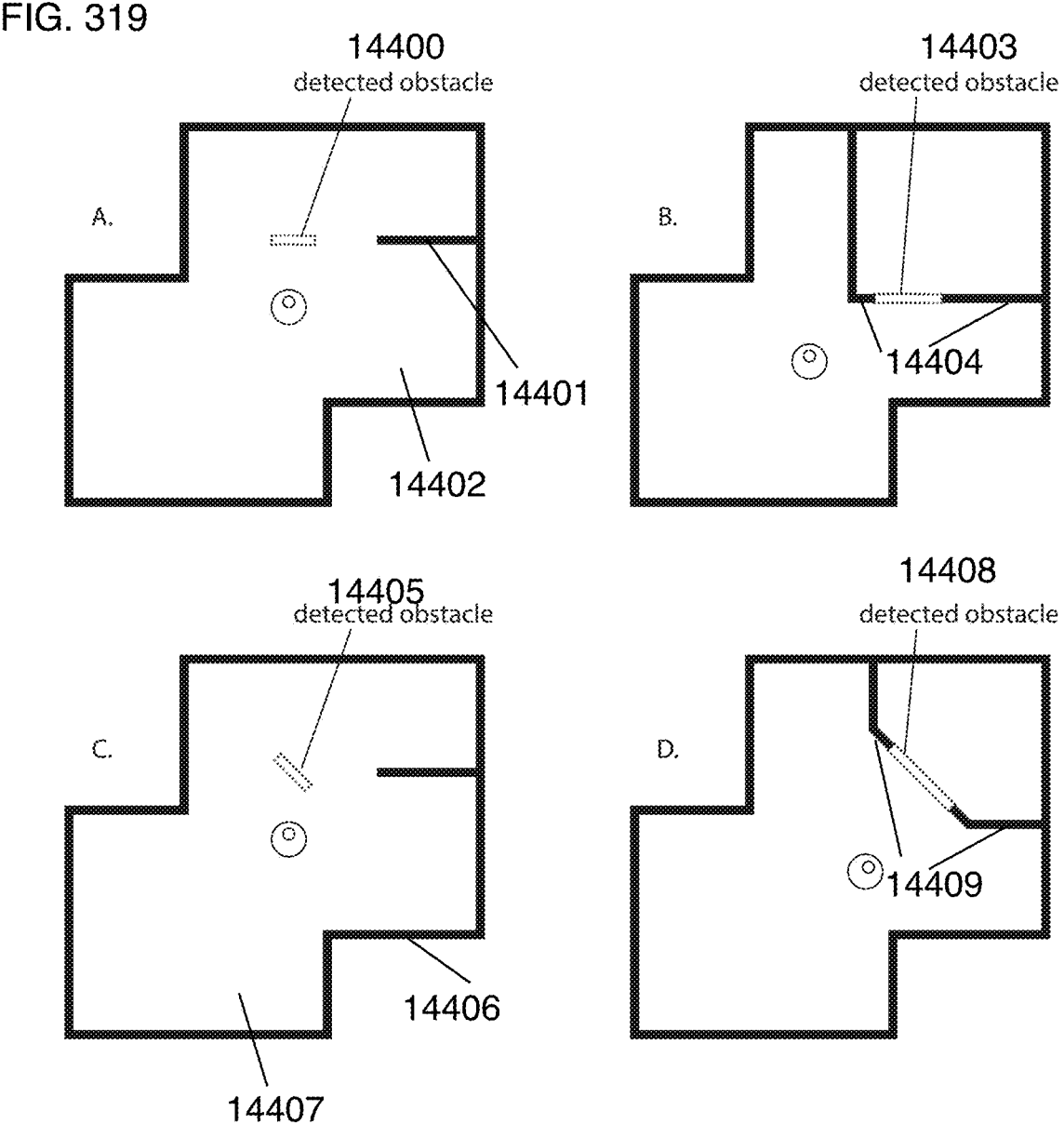

FIG. 319 illustrates a use of location and alignment as an indicator of an obstacle type.

Figure 320:
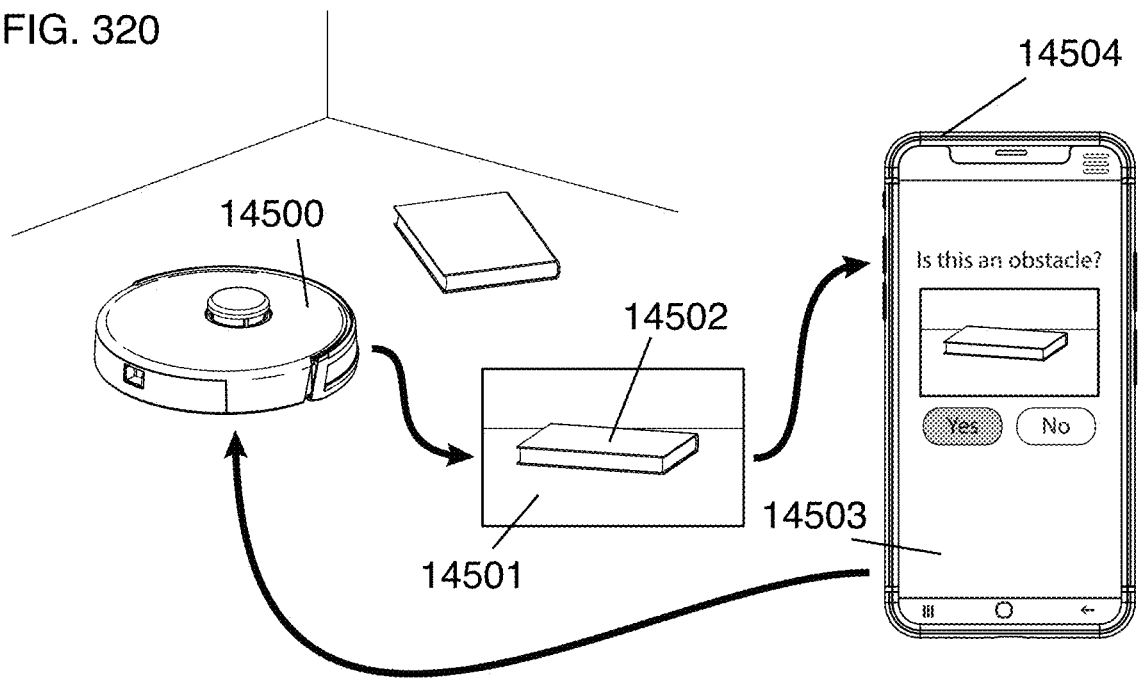

FIG. 320 illustrates an application of a communication device displaying an image of an object captured by a camera of a robot and awaiting user input.

Figure 321:
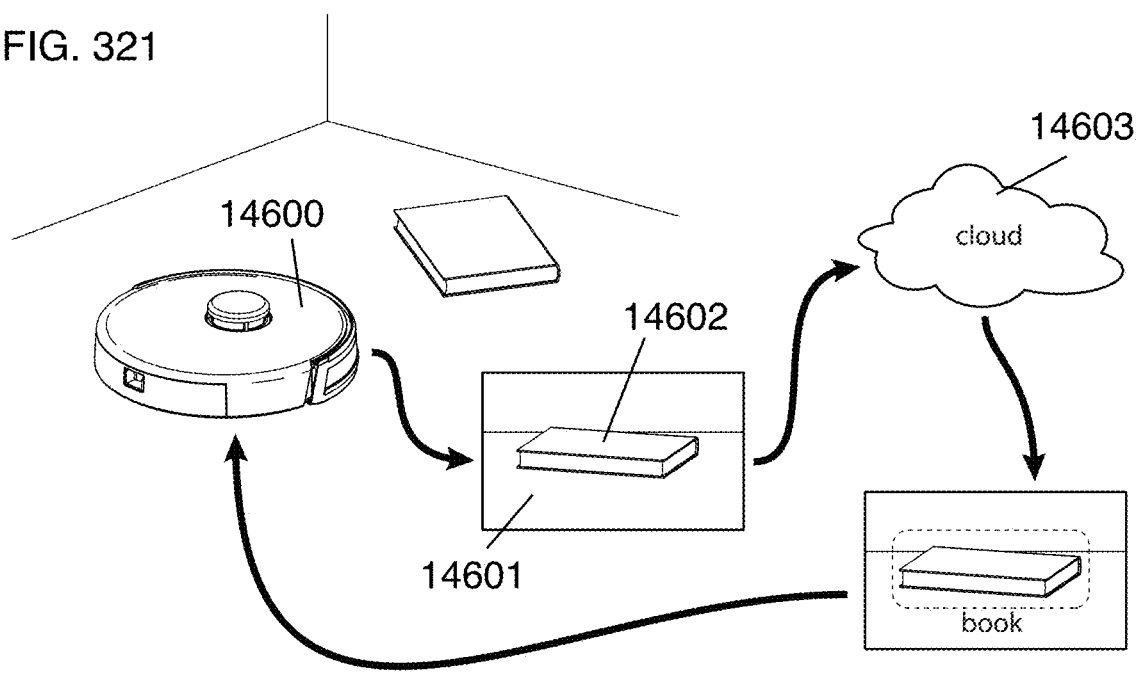

FIG. 321 illustrates an image of an object captured by a camera of a robot transmitted to the cloud for further processing.

Figure 322:
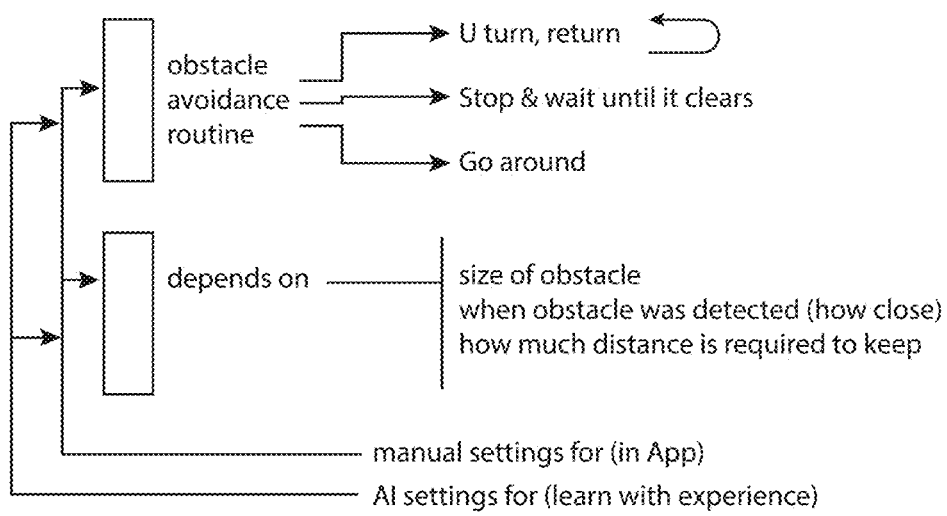

FIG. 322 illustrates a flow chart of an obstacle avoidance behavior of the robot.

Figure 323A:
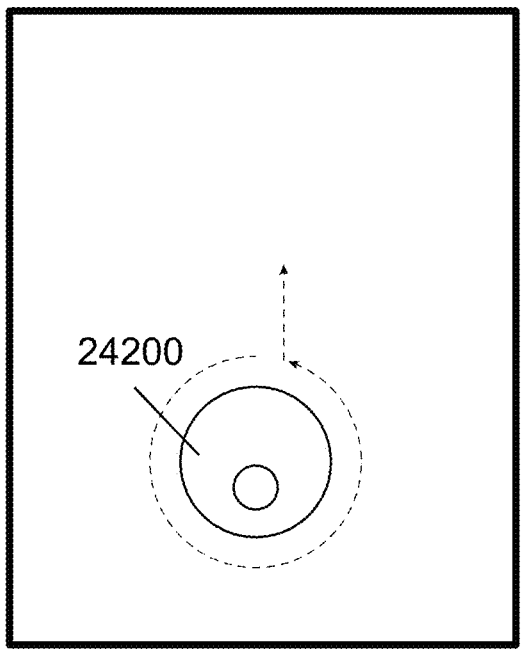
Figure 323C:
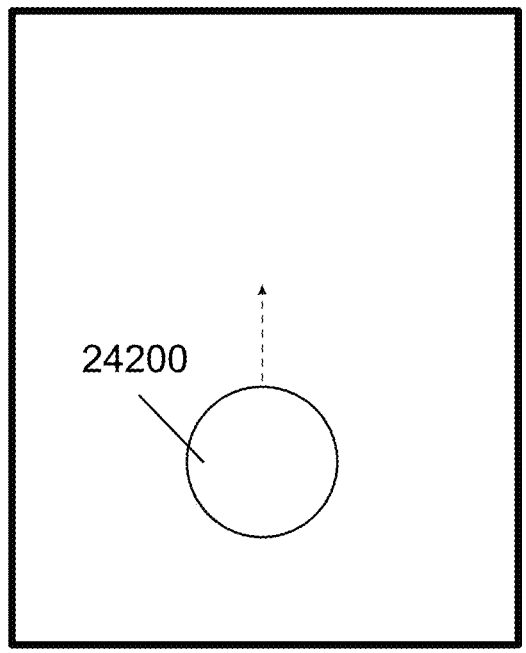
Figure 323B:
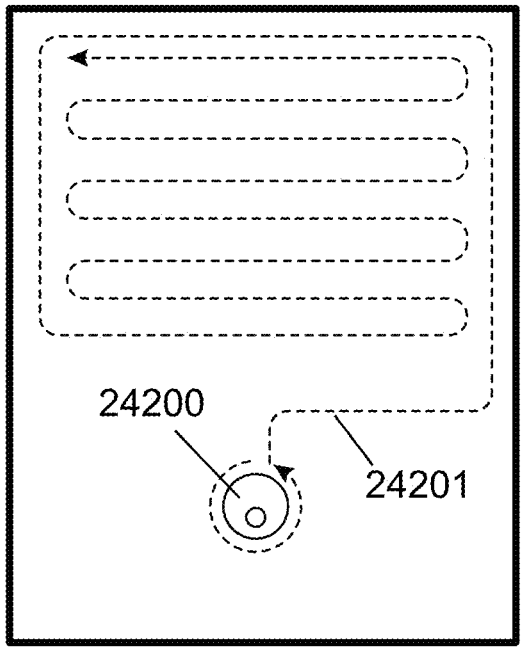

FIGS. 323A-323B illustrate traditional methods of initial mapping.

Figure 323D:
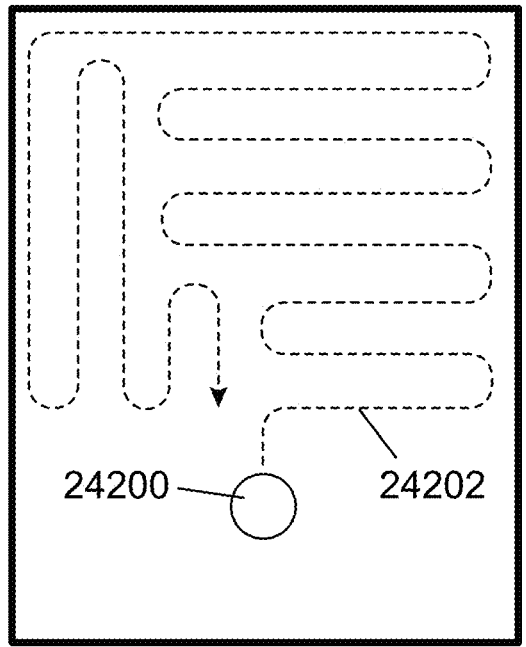

FIGS. 323C-323D illustrate new methods of navigation which doesn't require initial mapping.

Figure 324A:
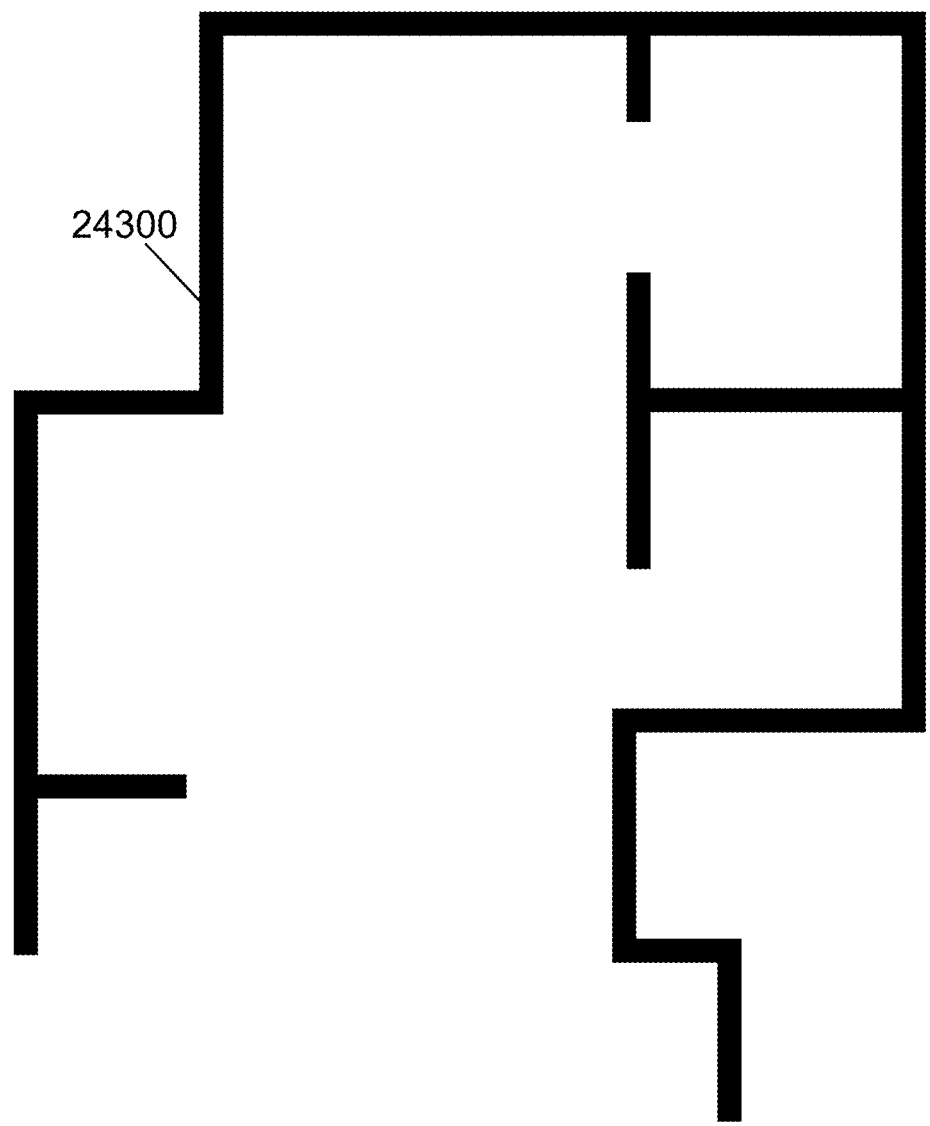

FIG. 324A illustrates a spatial representation of an environment built by the processor of the robot.

Figure 324B:
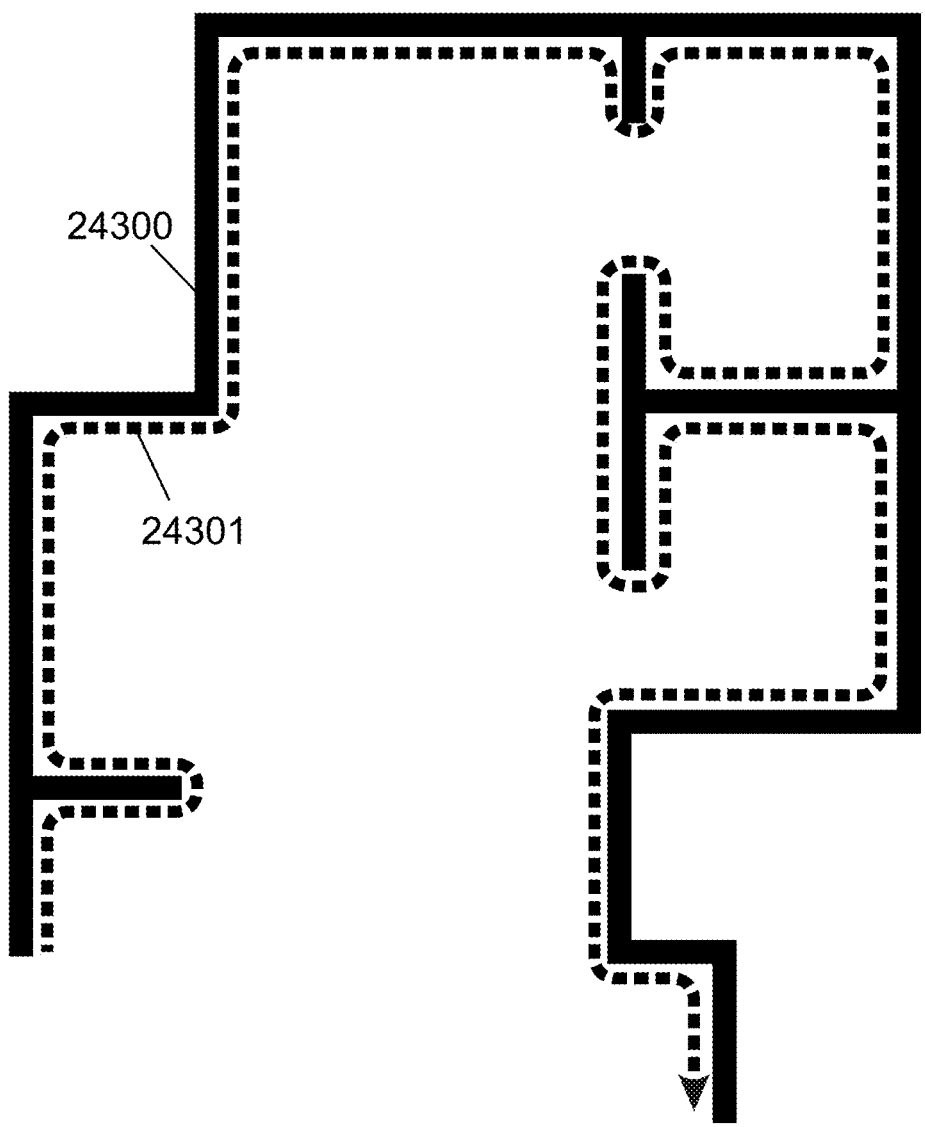

FIG. 324B illustrates a wall follow path of the robot generated by the processor.

Figure 325A:
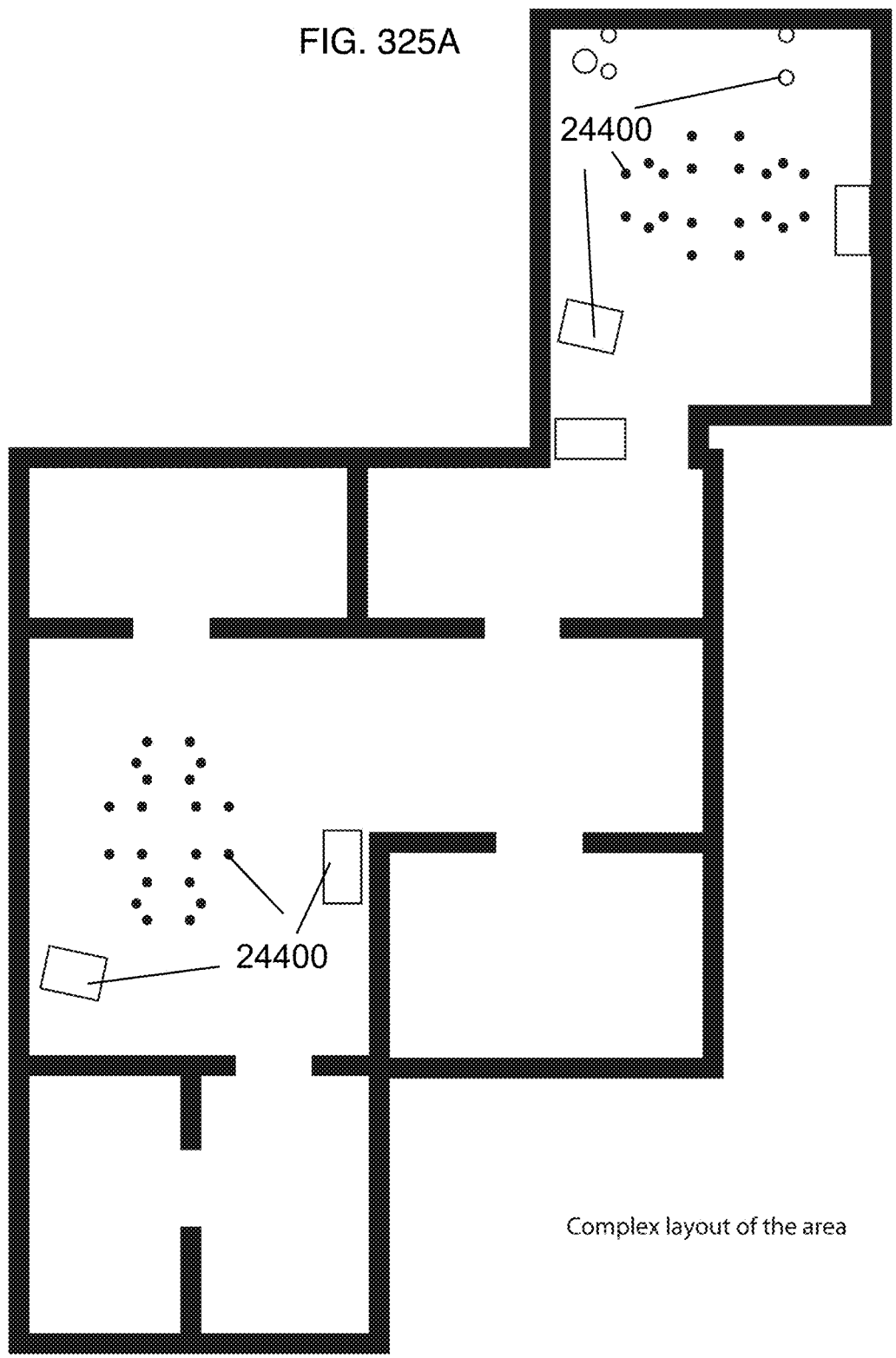

FIG. 325A illustrates an example of a complex environment including obstacles.

Figure 325B:
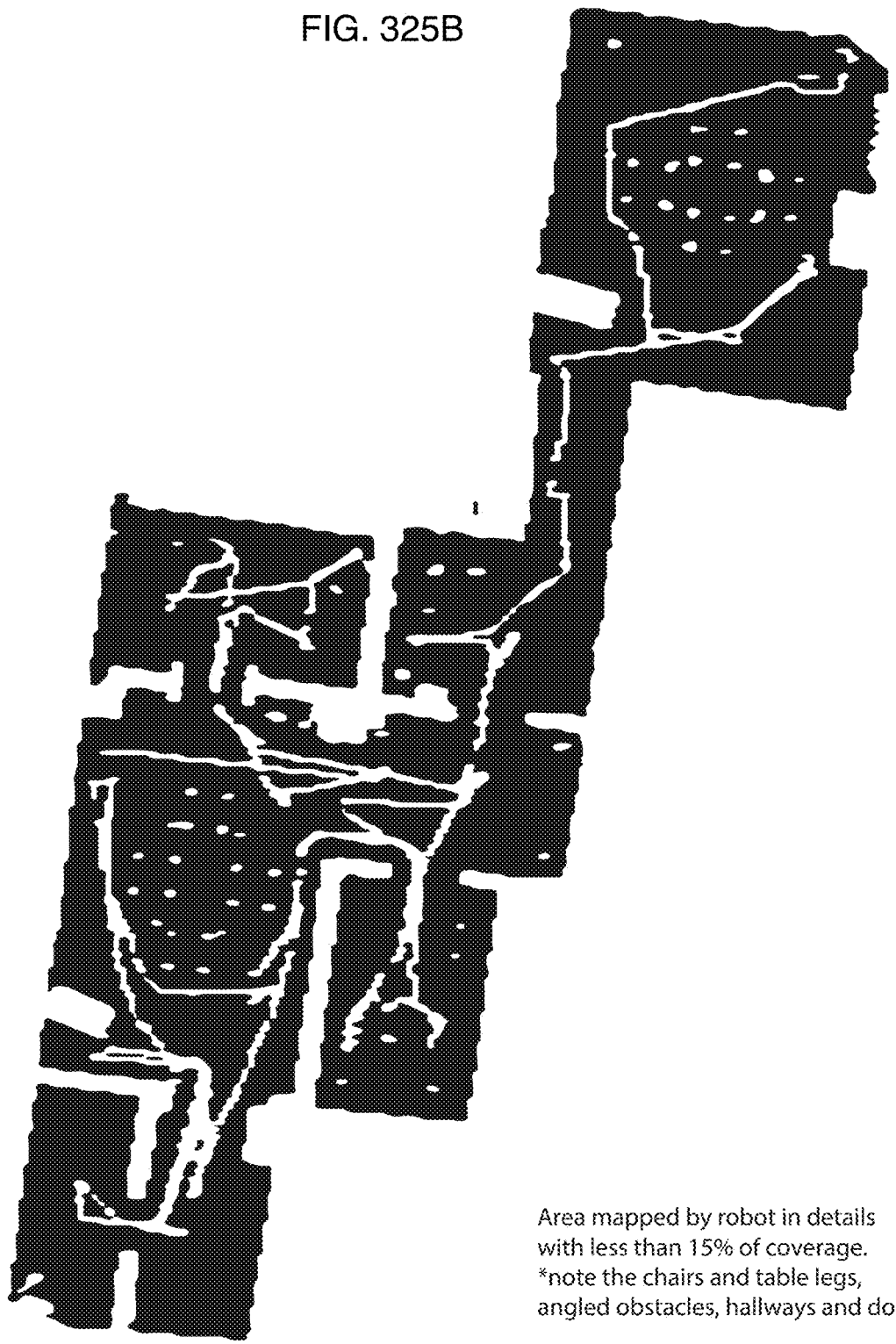

FIG. 325B illustrates a map of the environment created with less than 15% coverage of the environment.

Figure 326A:
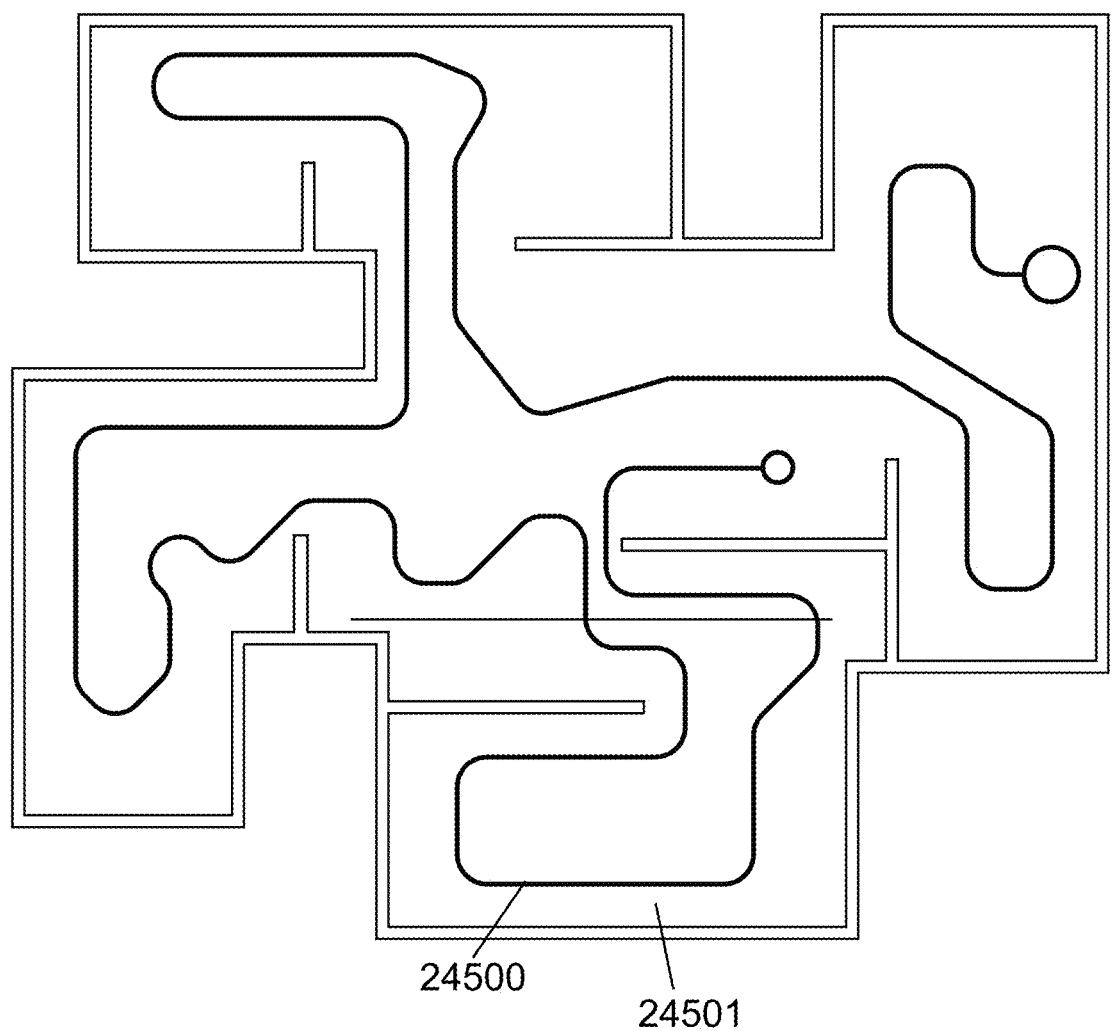

FIG. 326A illustrates an example of a path of a robot using traditional methods to create a spatial representation of the environment.

Figure 326B:
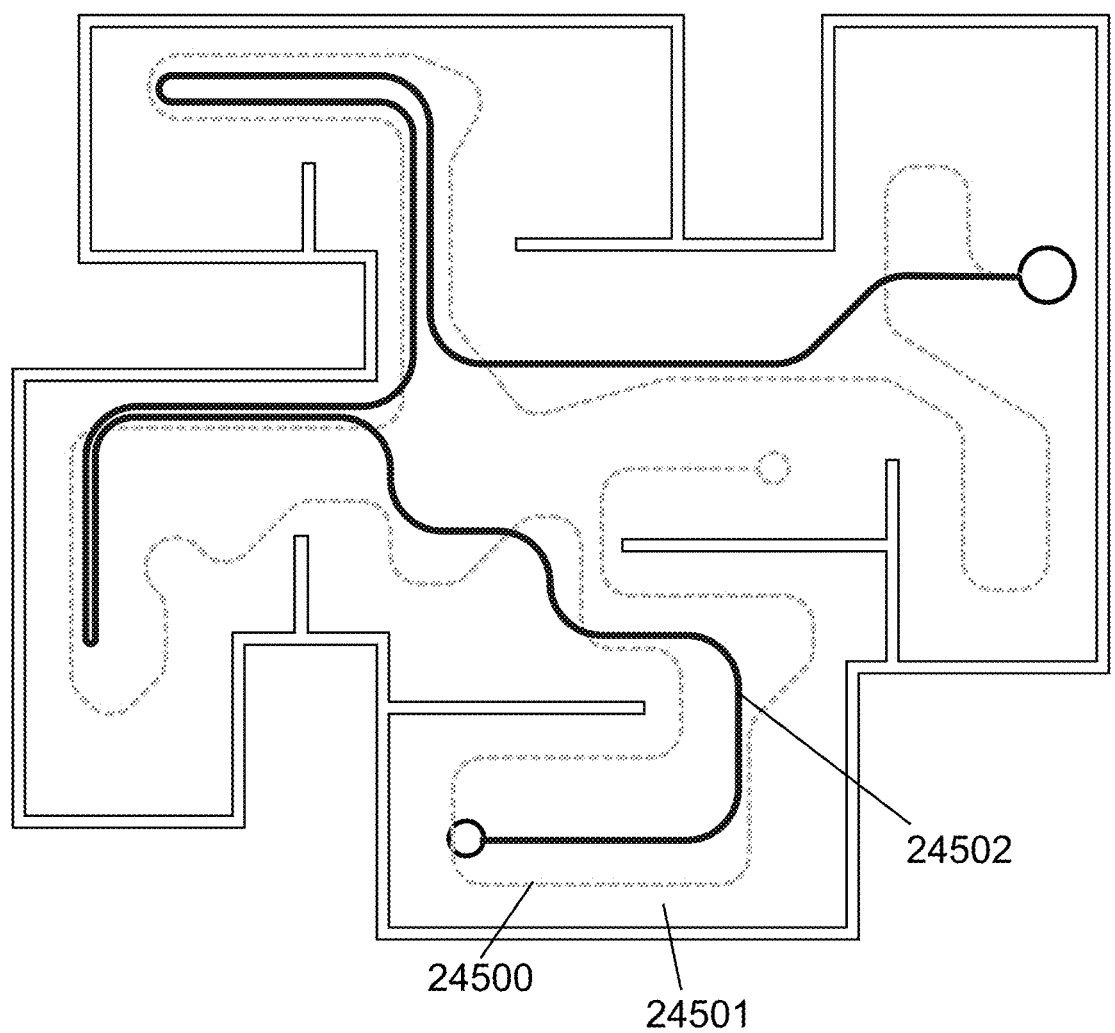

FIG. 326B illustrates an example of a path of the robot using a cost function to minimize the length of the path.

Figure 327A:
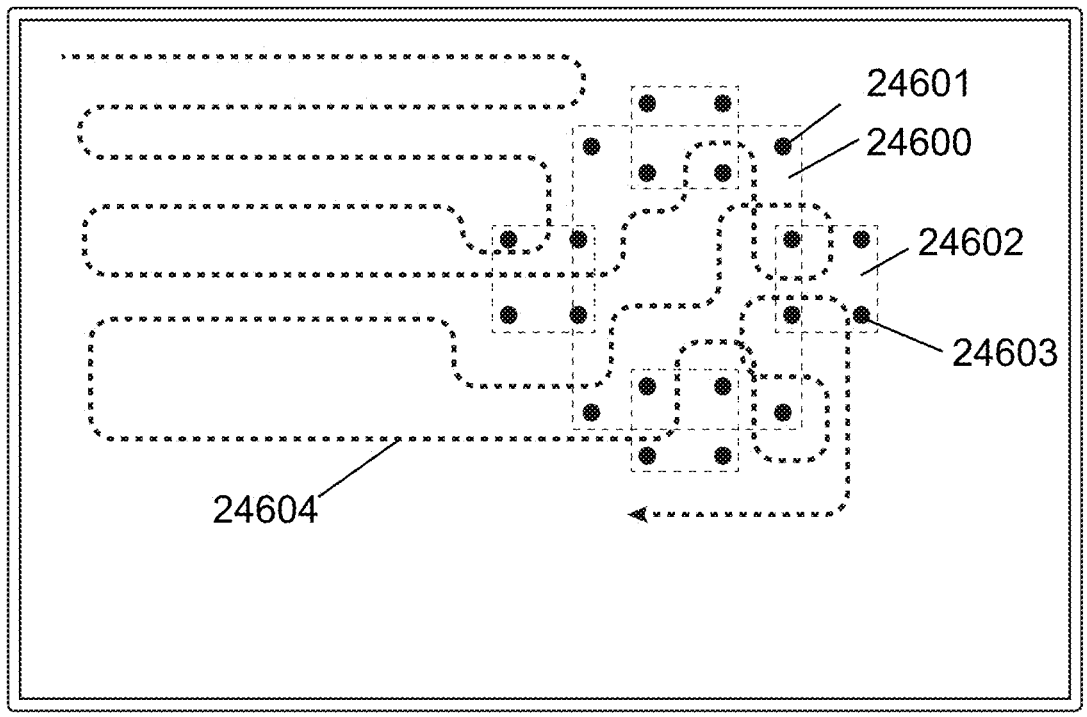

FIG. 327A illustrates an example of an environment including a table, four chairs and a path generated using traditional path planning methods.

Figure 327B:
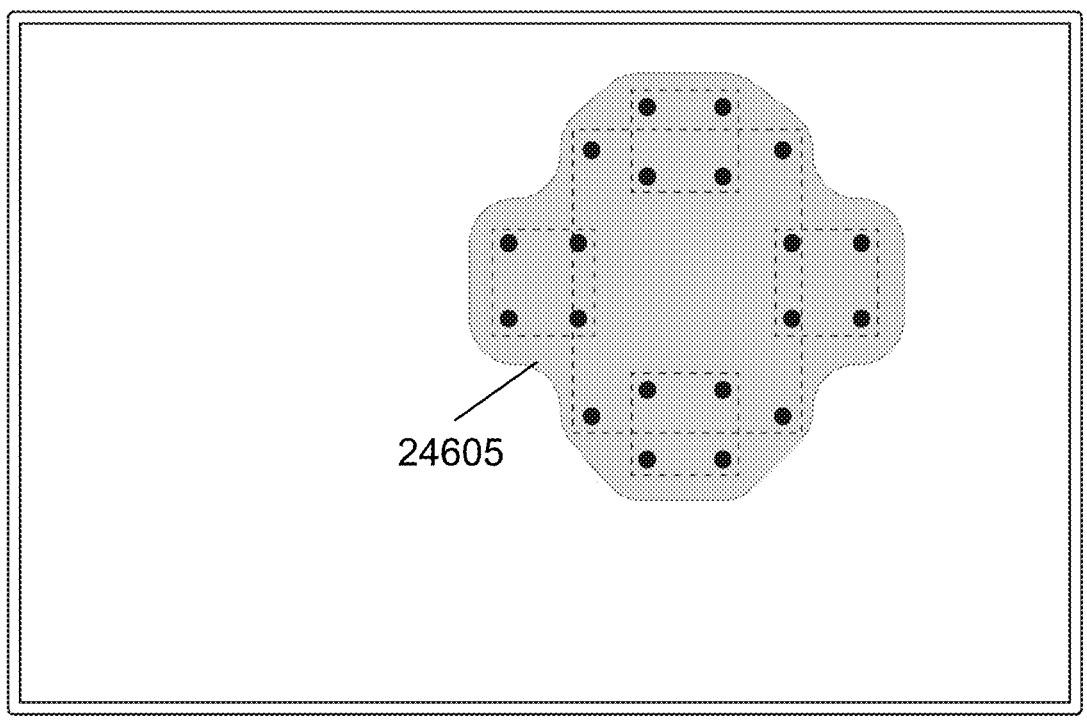

FIG. 327B illustrates an example of a high obstacle density area identified by the processor of the robot.

FIGS. 327C-327F illustrate examples of different paths planned based on open or low obstacle density areas and high obstacle density areas.

Figure 328A:
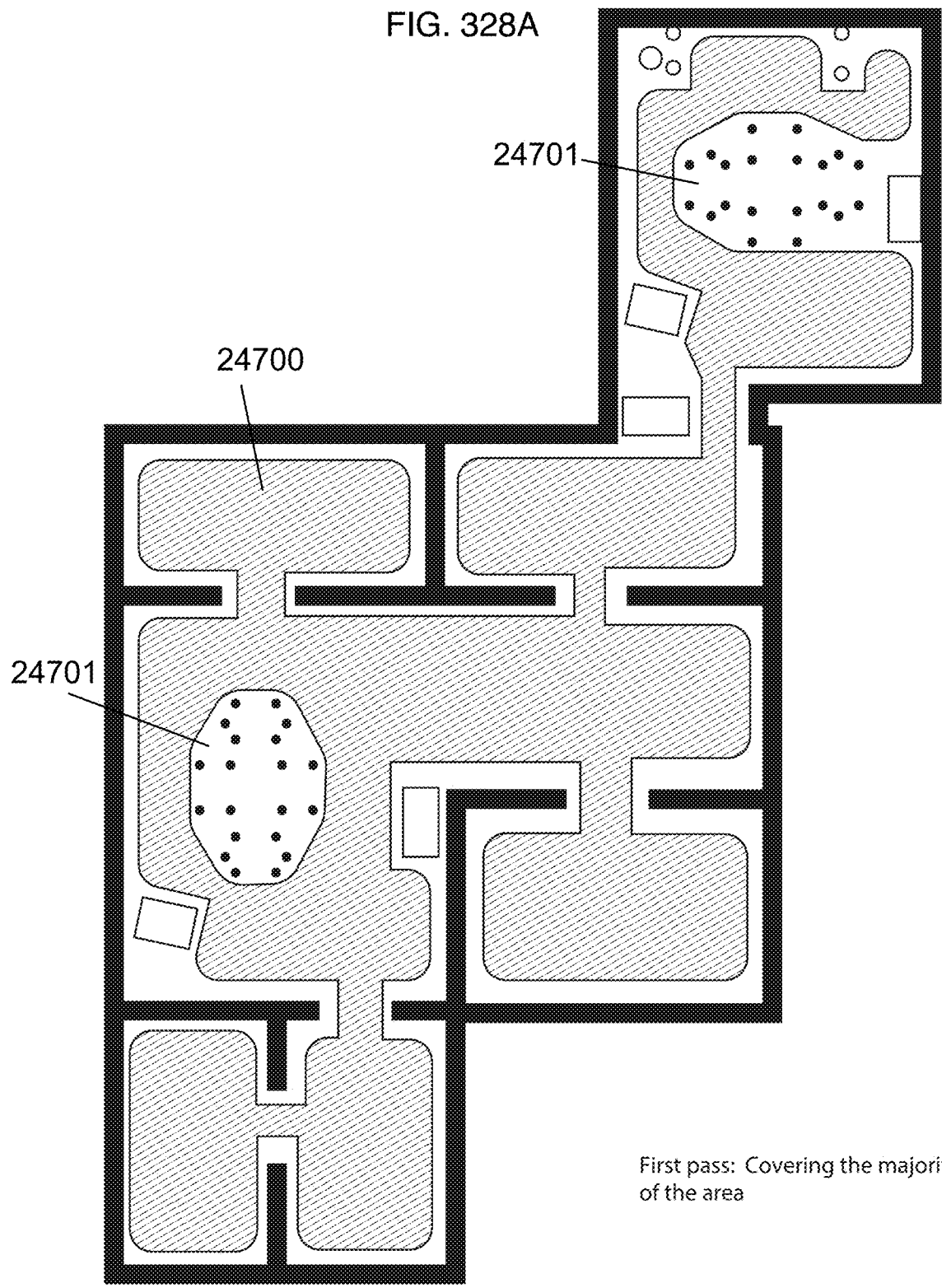
Figure 328C:
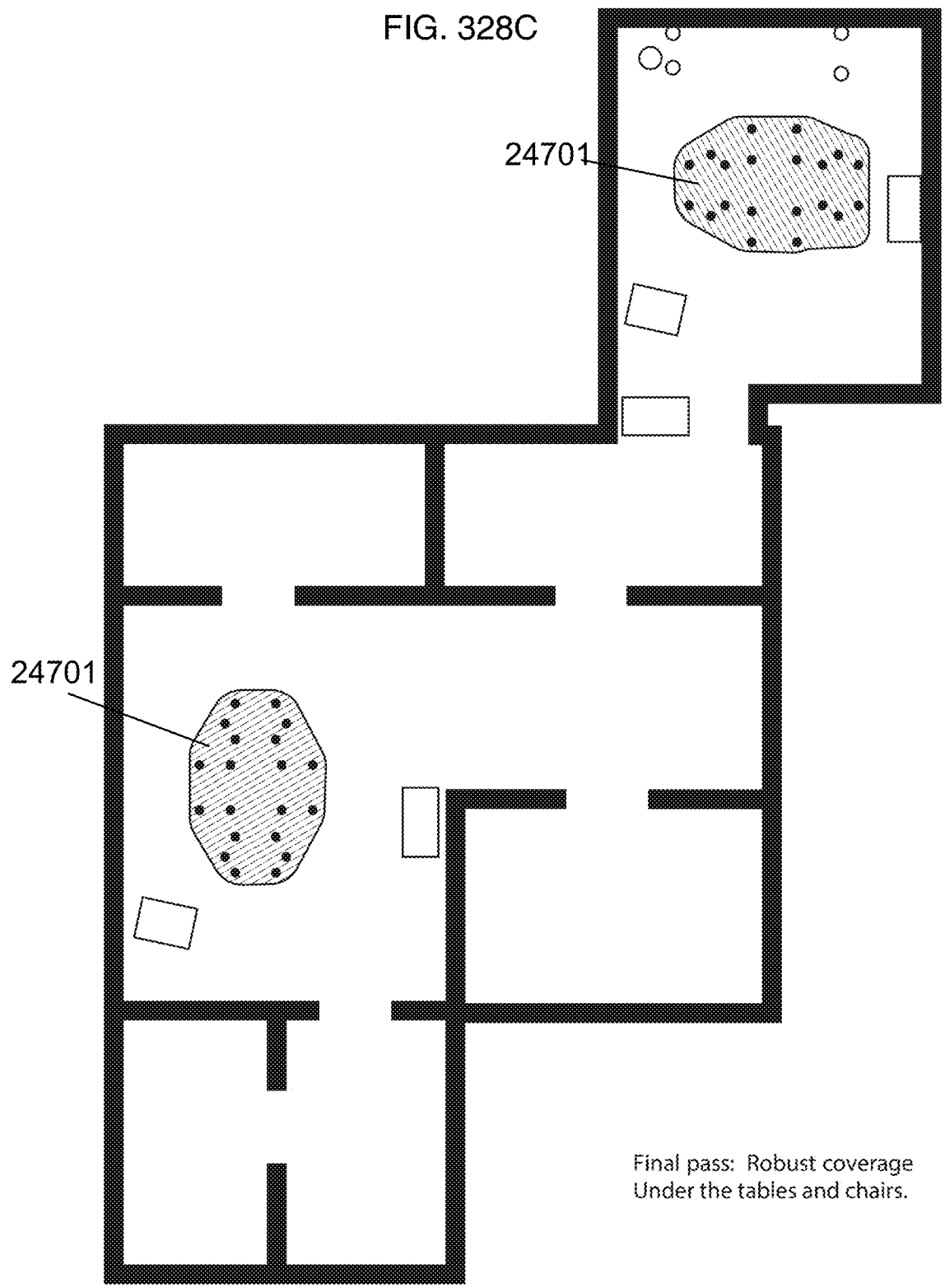

FIGS. 328A-328C illustrate an example of different coverage passes based on low and high obstacle density areas.

Figure 328D:
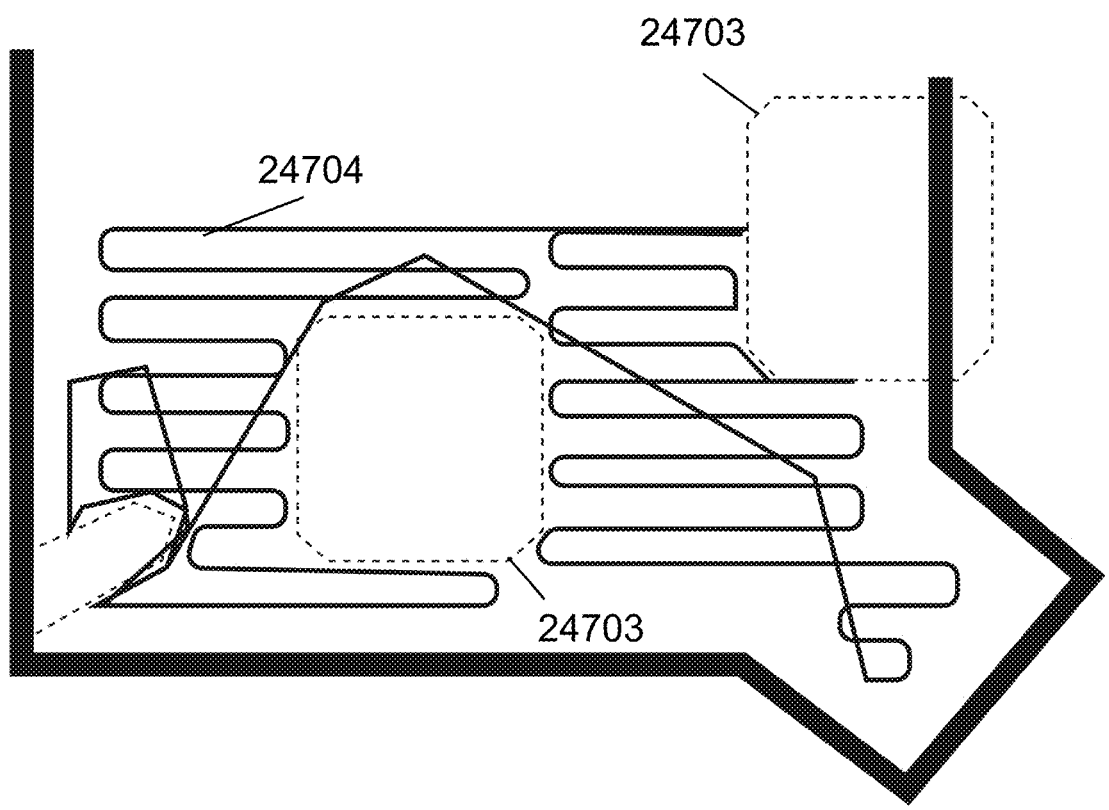

FIG. 328D illustrates an example of a map including map fences and a path of the robot that avoids entering map fences.

Figure 329:
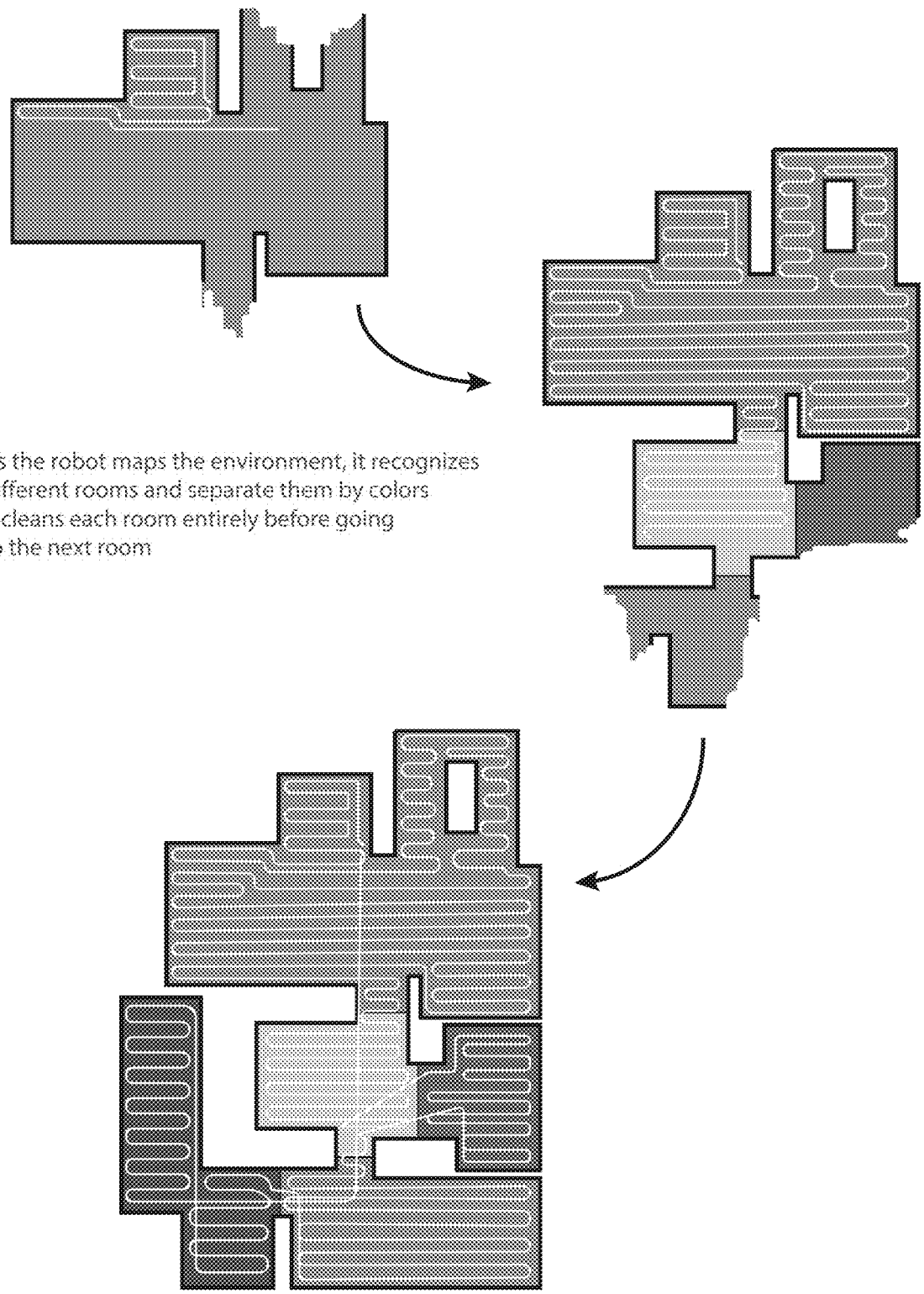

FIG. 329 illustrates an example of real time room identification and separation.

Figure 330A:
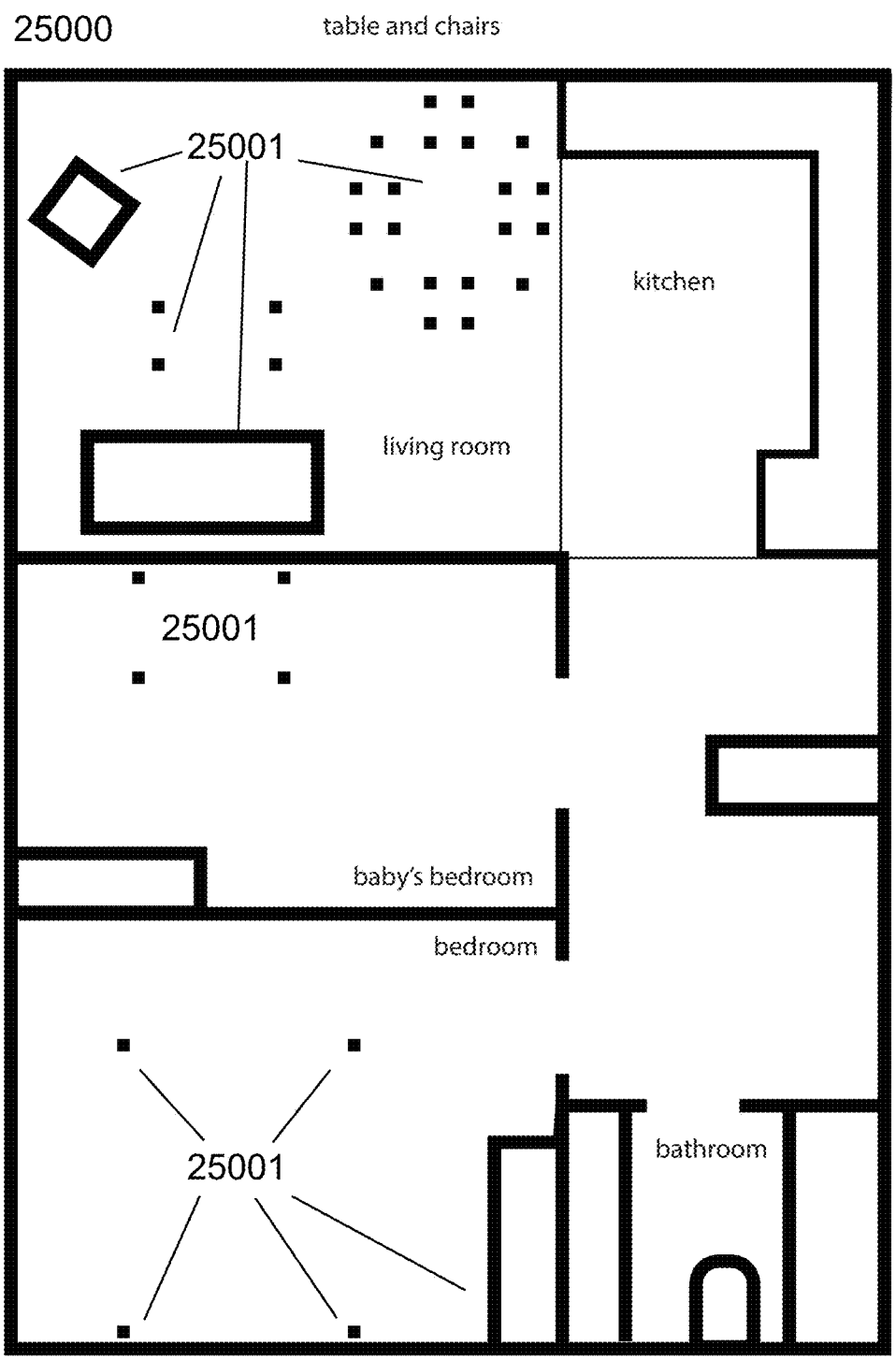
Figure 330B:
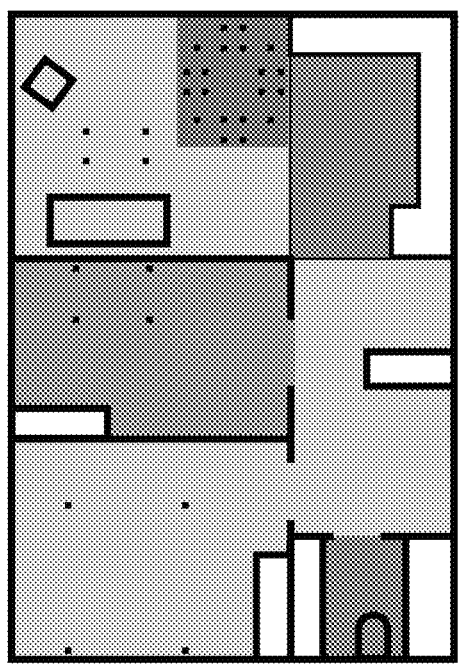

FIGS. 330A-330B illustrate the robot may use different cleaning strategies depending on the room/zone or floor type.

FIG. 331A illustrates the robot may reduce its noise level around observed people.

Figure 331B:
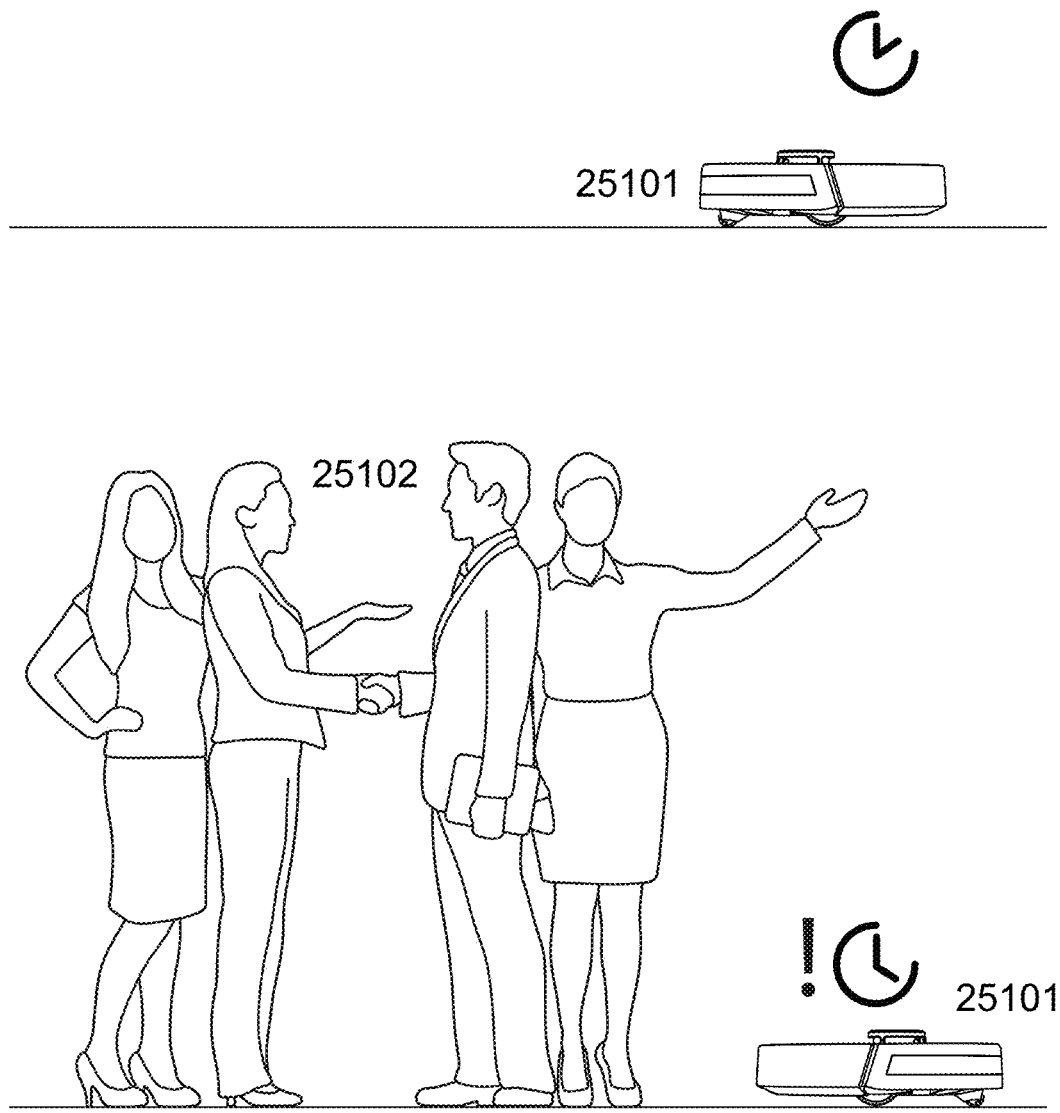

FIG. 331B illustrates the robot may reschedule its run time when it observes a crowd of people.

Figure 332A:
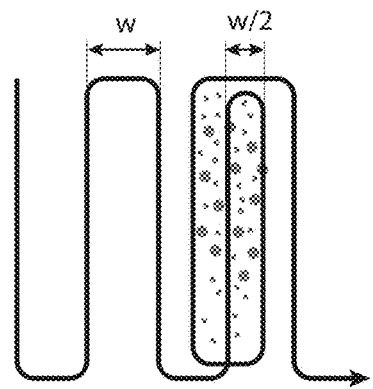
Figure 332B:
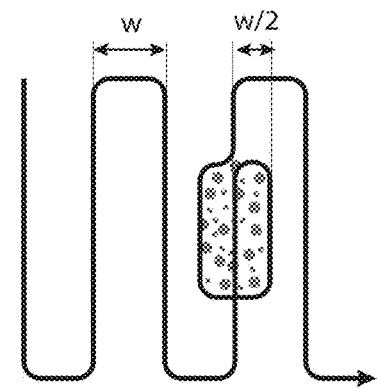
Figure 332C:
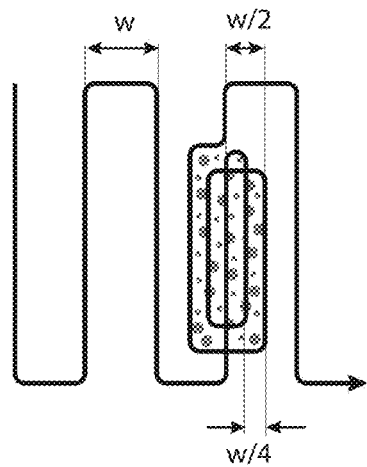

FIGS. 332A-332C illustrate path alteration robot may take to clean a spot or area.

FIGS. 333A-335 illustrate examples of boustrophedon coverage and obstacle coverage by a robot.

Figure 336:
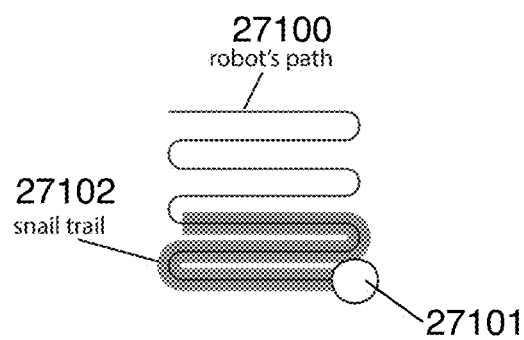

FIG. 336 illustrates an example of a path and snail trail of a robot.

Figure 337:
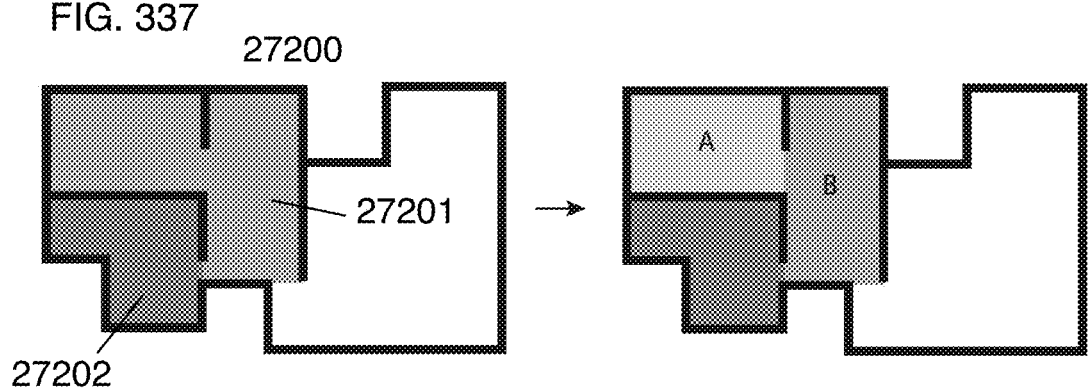

FIG. 337 illustrates an example of a room assignment.

Figure 338:
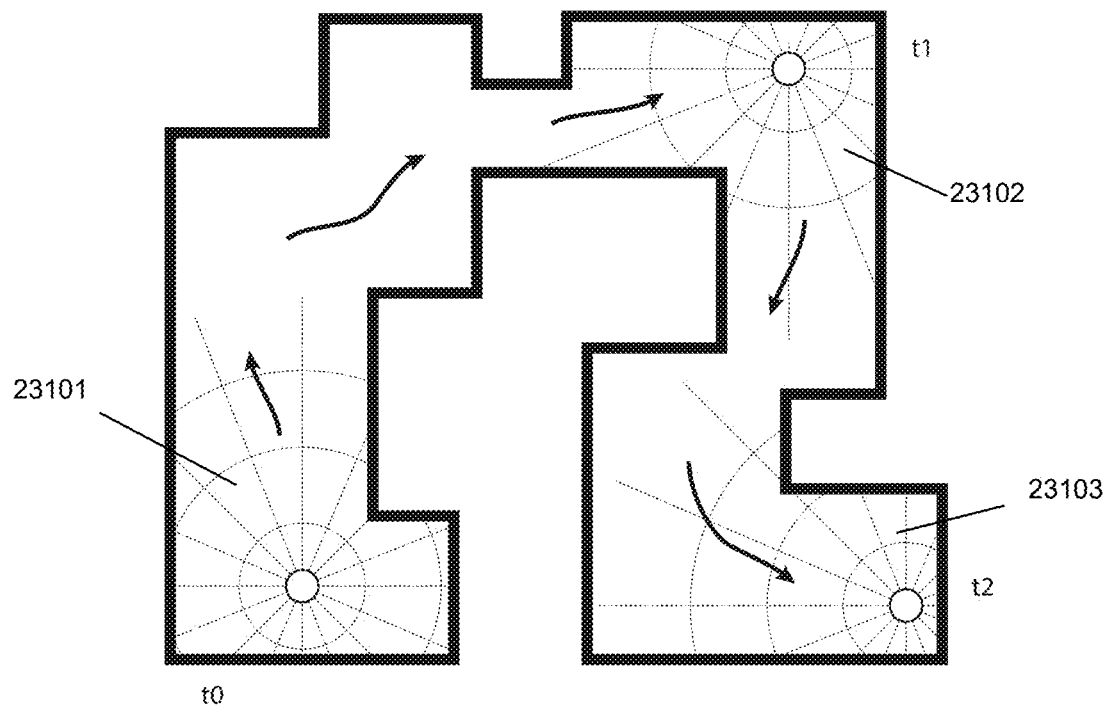
Figure 339:
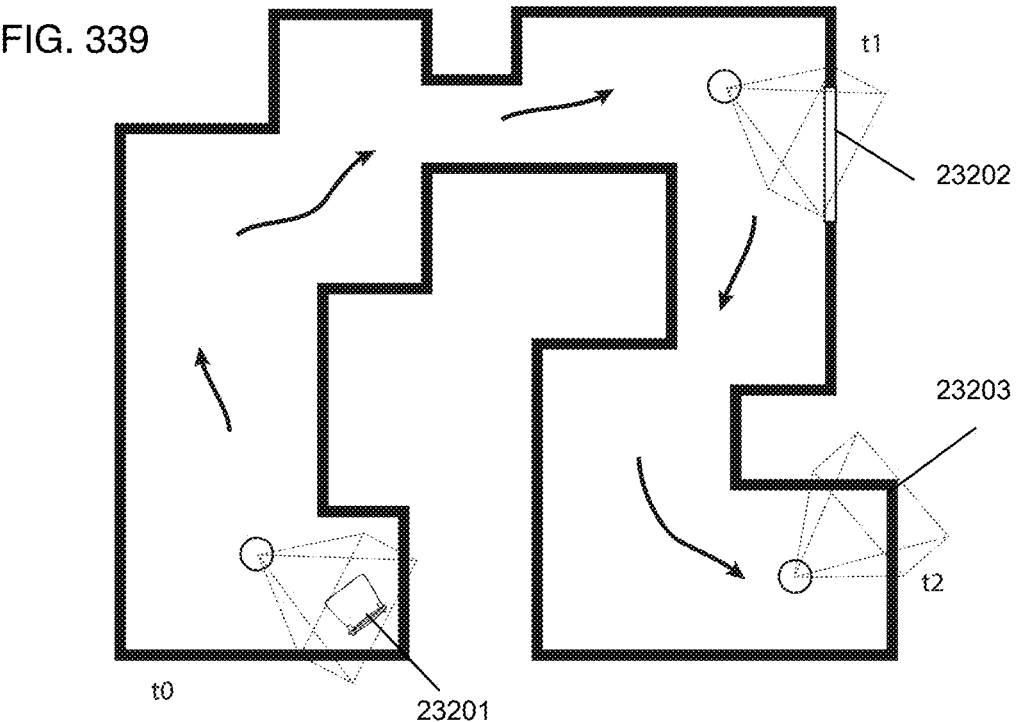

FIGS. 338 and 339 illustrate observations of a camera of a robot at different times and locations.

Figure 340:
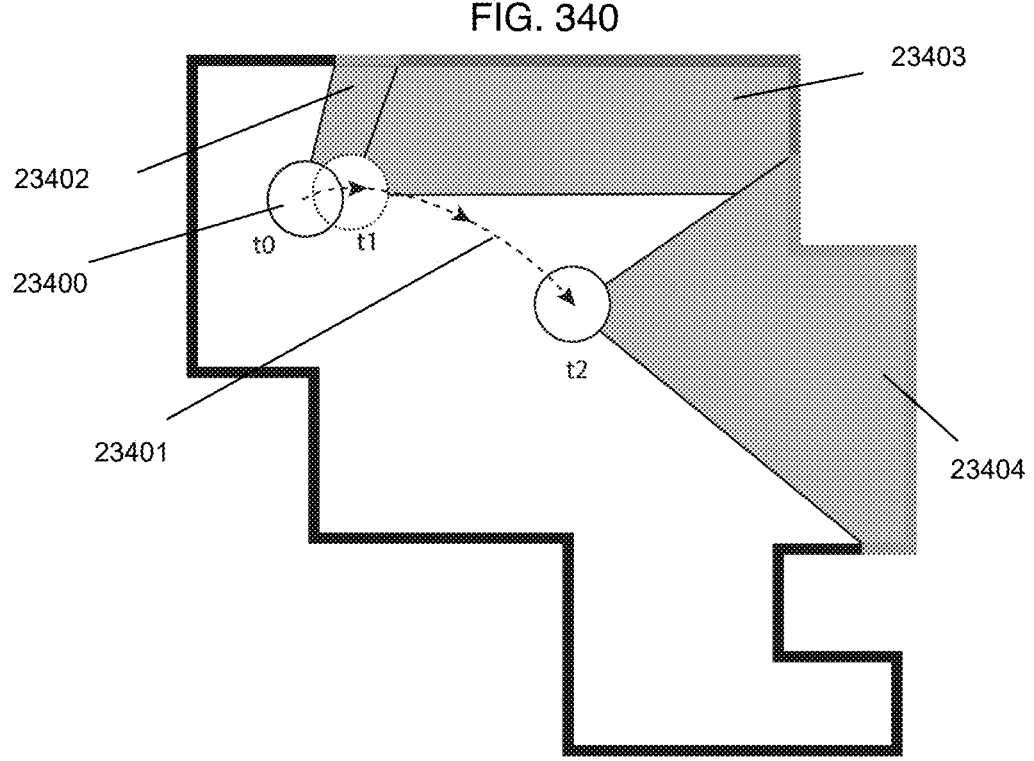

FIG. 340 illustrates the robot and its trajectory.

Figure 341:
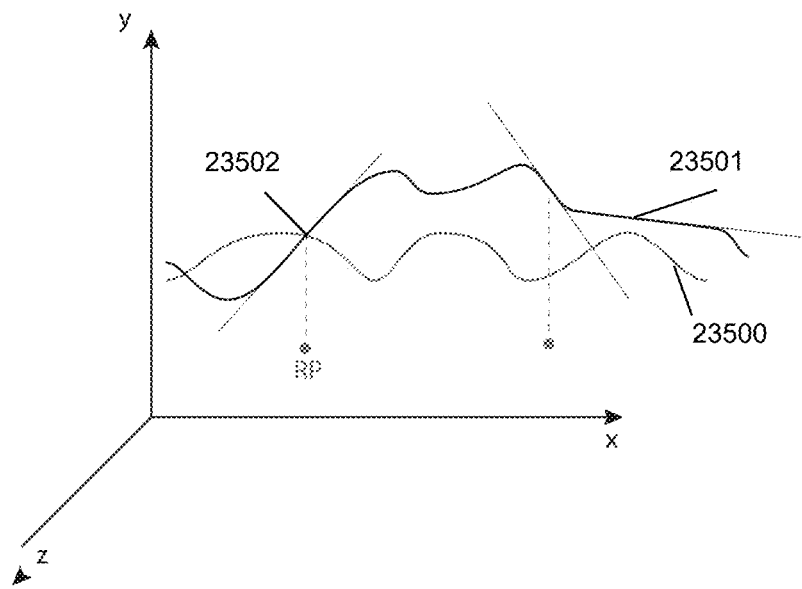

FIG. 341 illustrates confidence in a map and localization.

FIGS. 342A-343C illustrate a robot capturing depth measurements.

Figure 344:
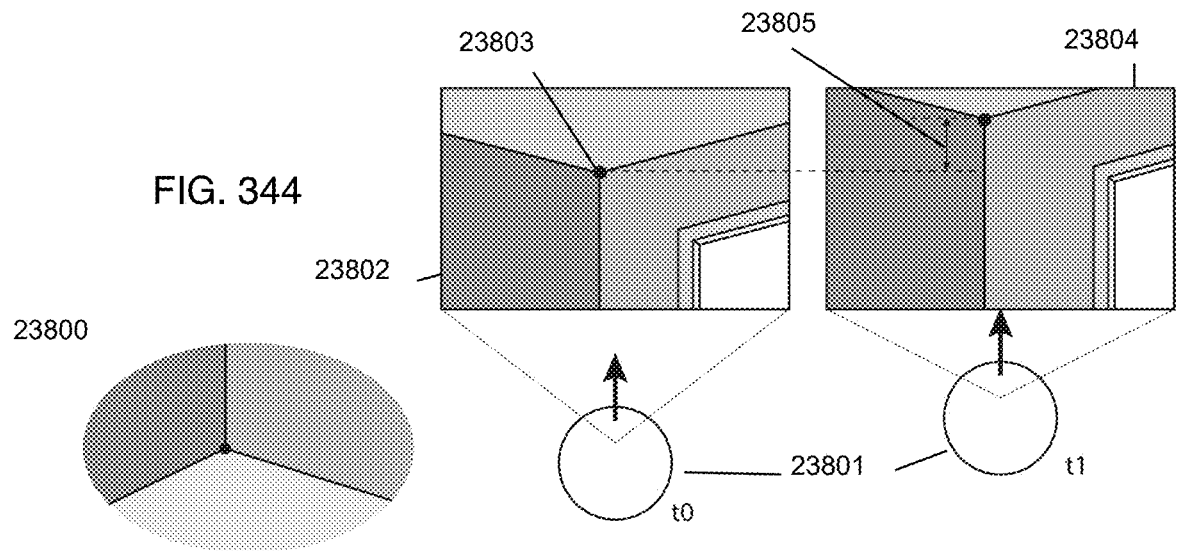

FIG. 344 illustrates an example of a corner detected by a processor of a robot.

Figure 345:
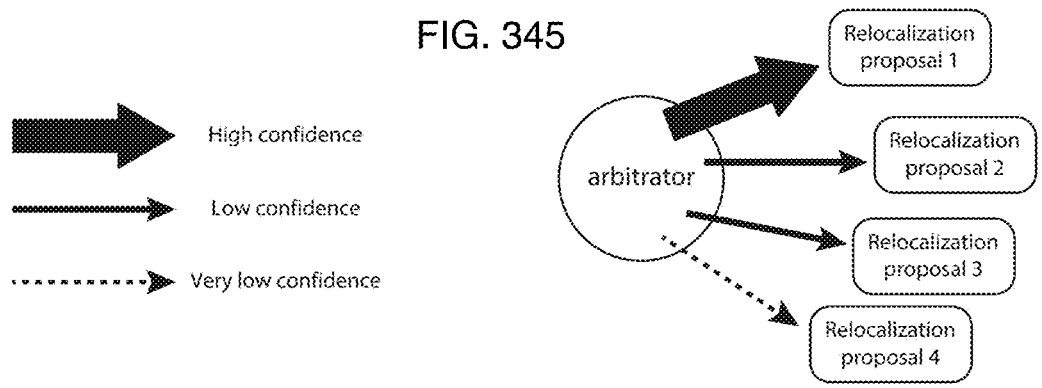

FIG. 345 illustrates an arbitrator proposing four different localization scenarios.

Figure 346A:
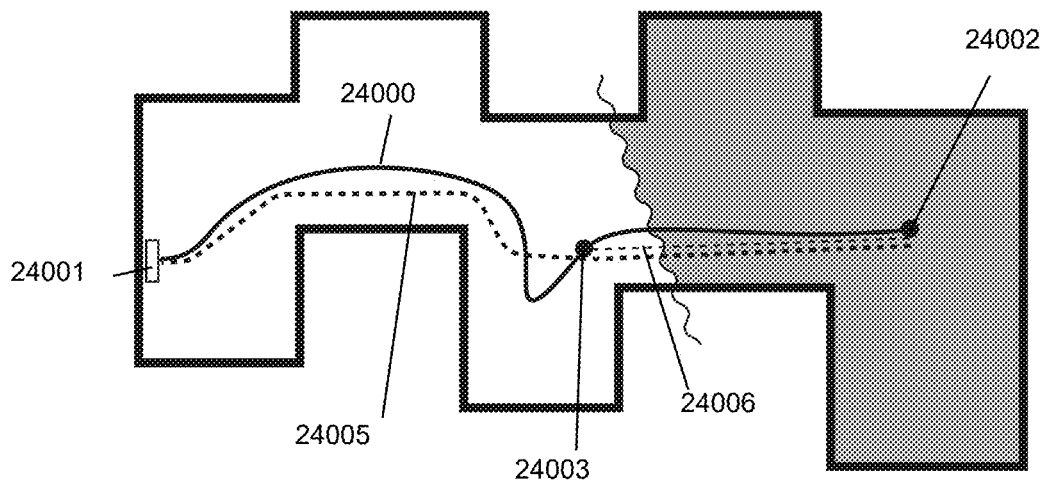

FIG. 346A illustrates a last known rendezvous point for the robot.

Figure 346B:
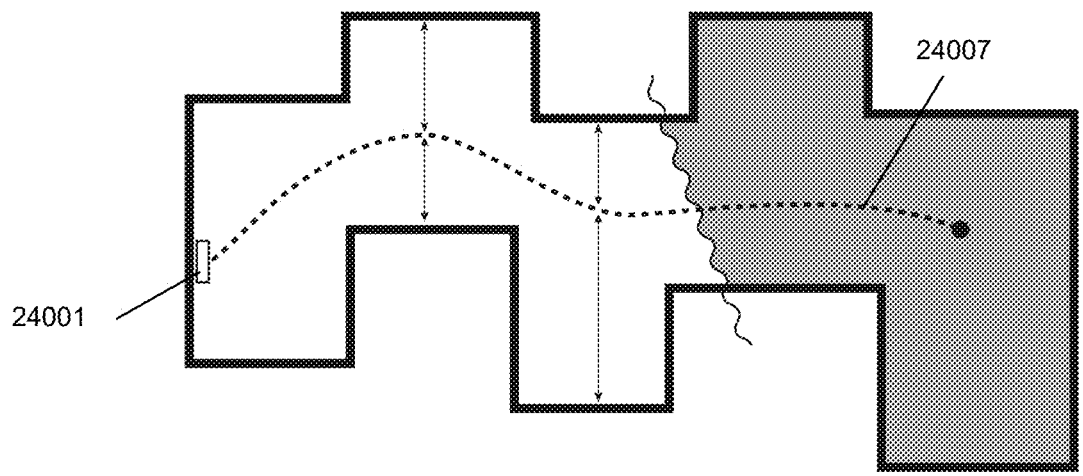

FIG. 346B illustrates a safe bread crumb path a robot follows back to a charging station.

Figure 346C:
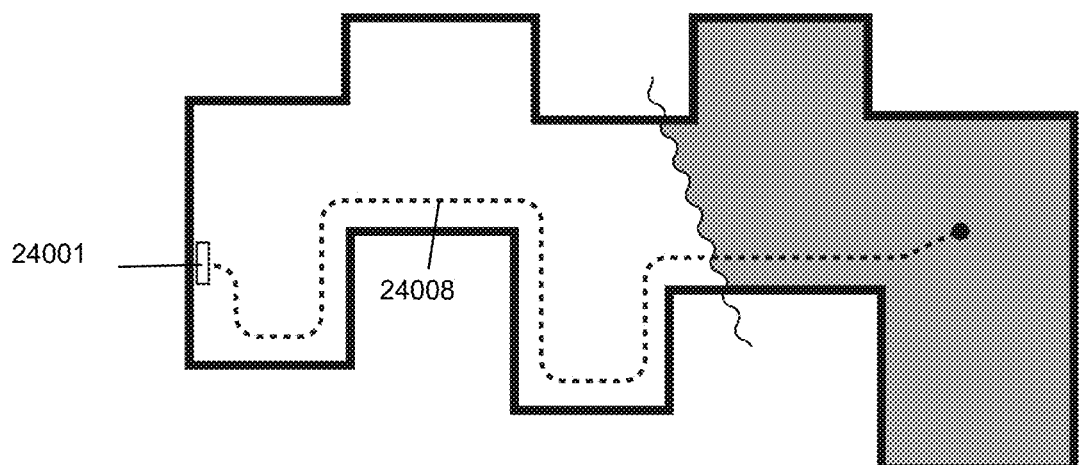

FIG. 346C illustrates a coastal path a robot follows to return to a charging station.

Figure 346D:
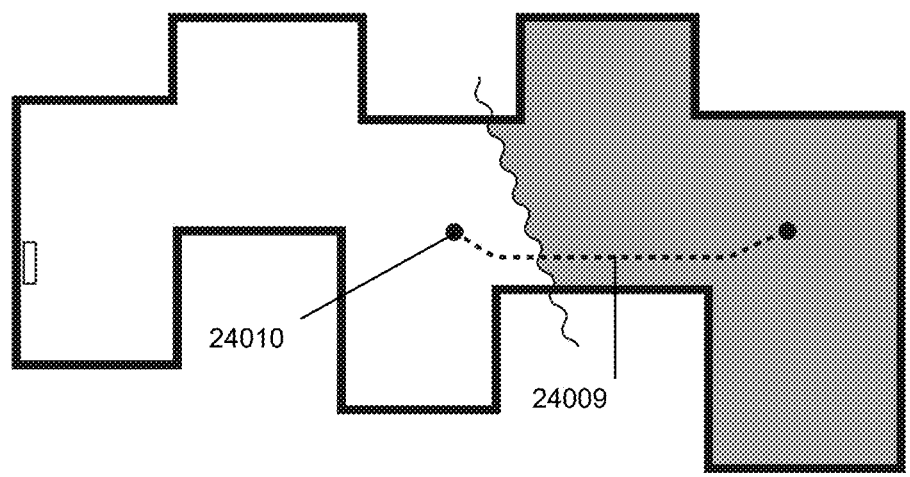

FIG. 346D illustrates a coastal path a robot follows to a last known point.

Figure 347:
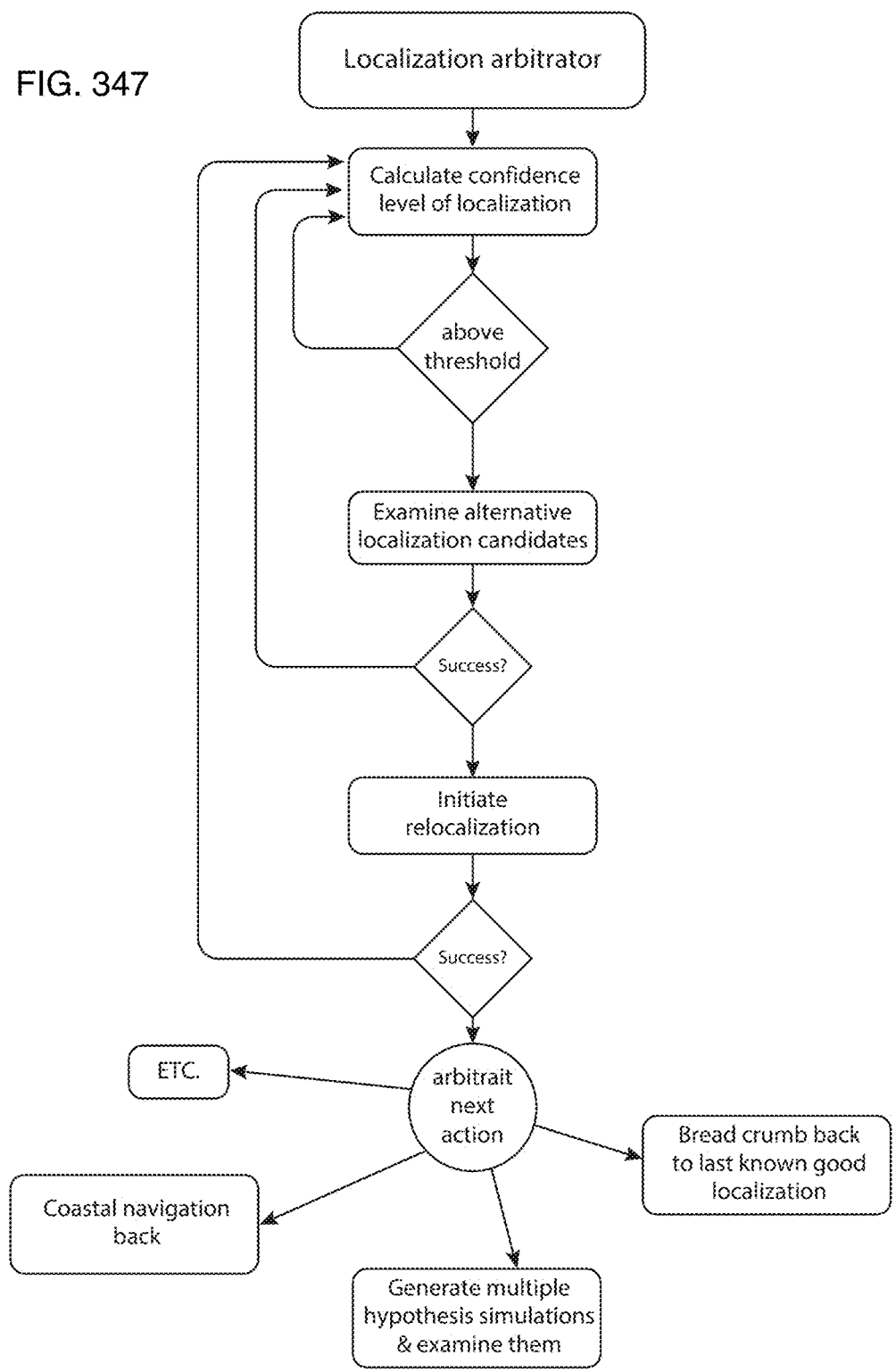

FIG. 347 illustrates an example of methods implemented in a localization arbitrator algorithm.

FIGS. 348A-348F illustrate an example of structured light projection in an environment.

FIG. 349 illustrates various types of image segmentations.

Figure 350:
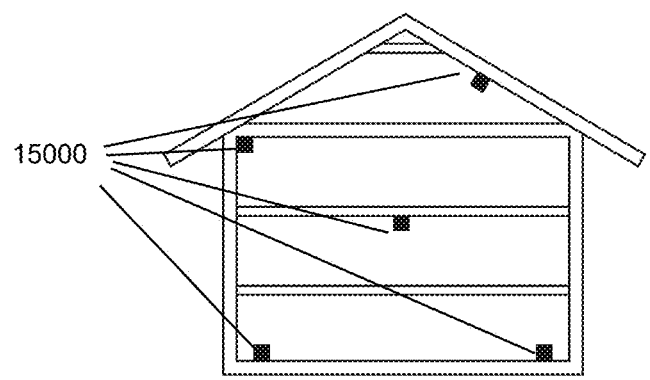

FIG. 350 illustrates wireless/Wi-Fi repeaters/routers at various levels within a home.

FIGS. 351A-351D illustrate an example of an airport with six access points and signal strength of each access point in two different runs.

FIG. 352 illustrates a process of bundling between signal strength and LIDAR feed.

Figure 353:
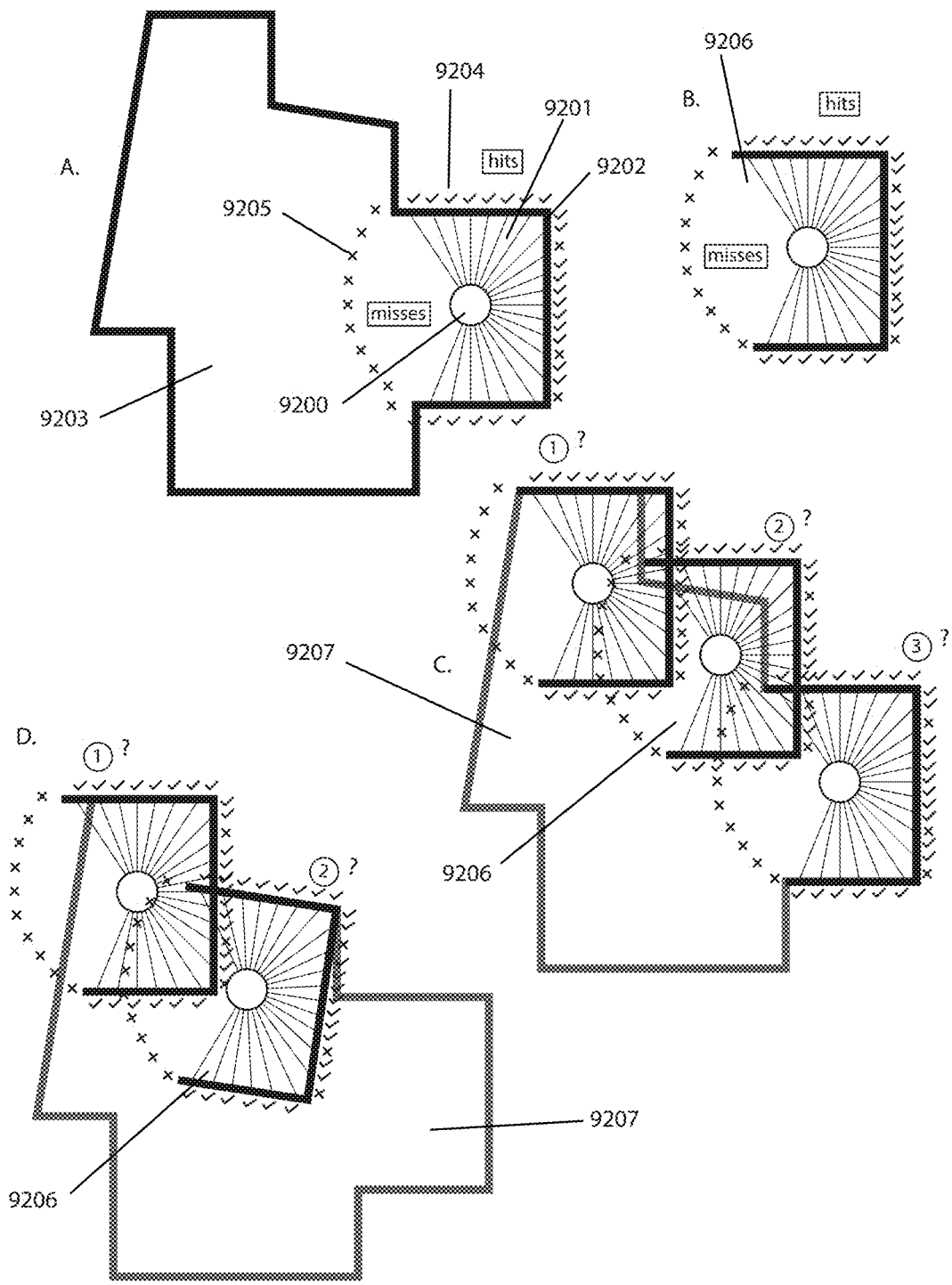
Figure 354A:
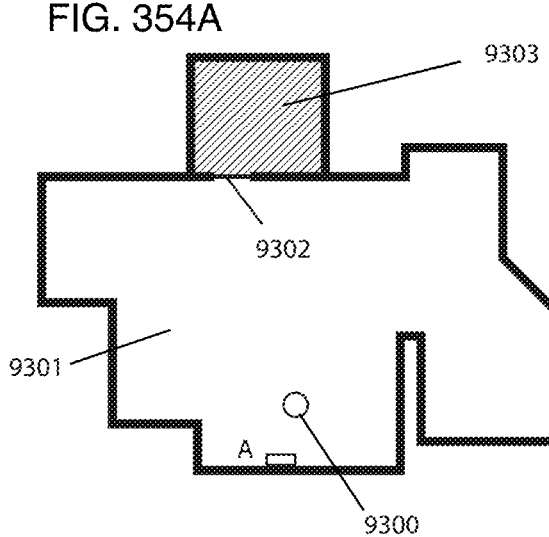
Figure 354B:
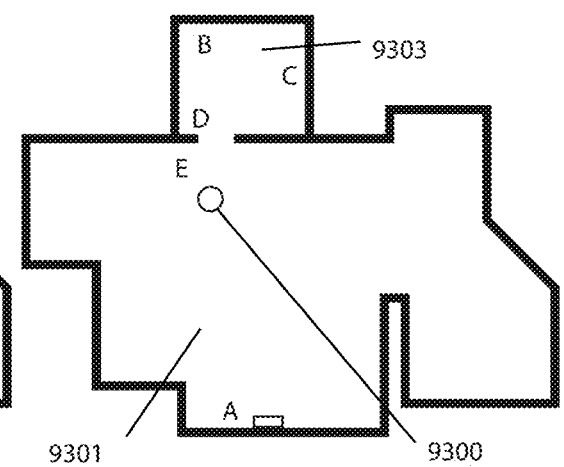

FIGS. 353-354B illustrate examples of relocalizing a robot.

Figure 355:
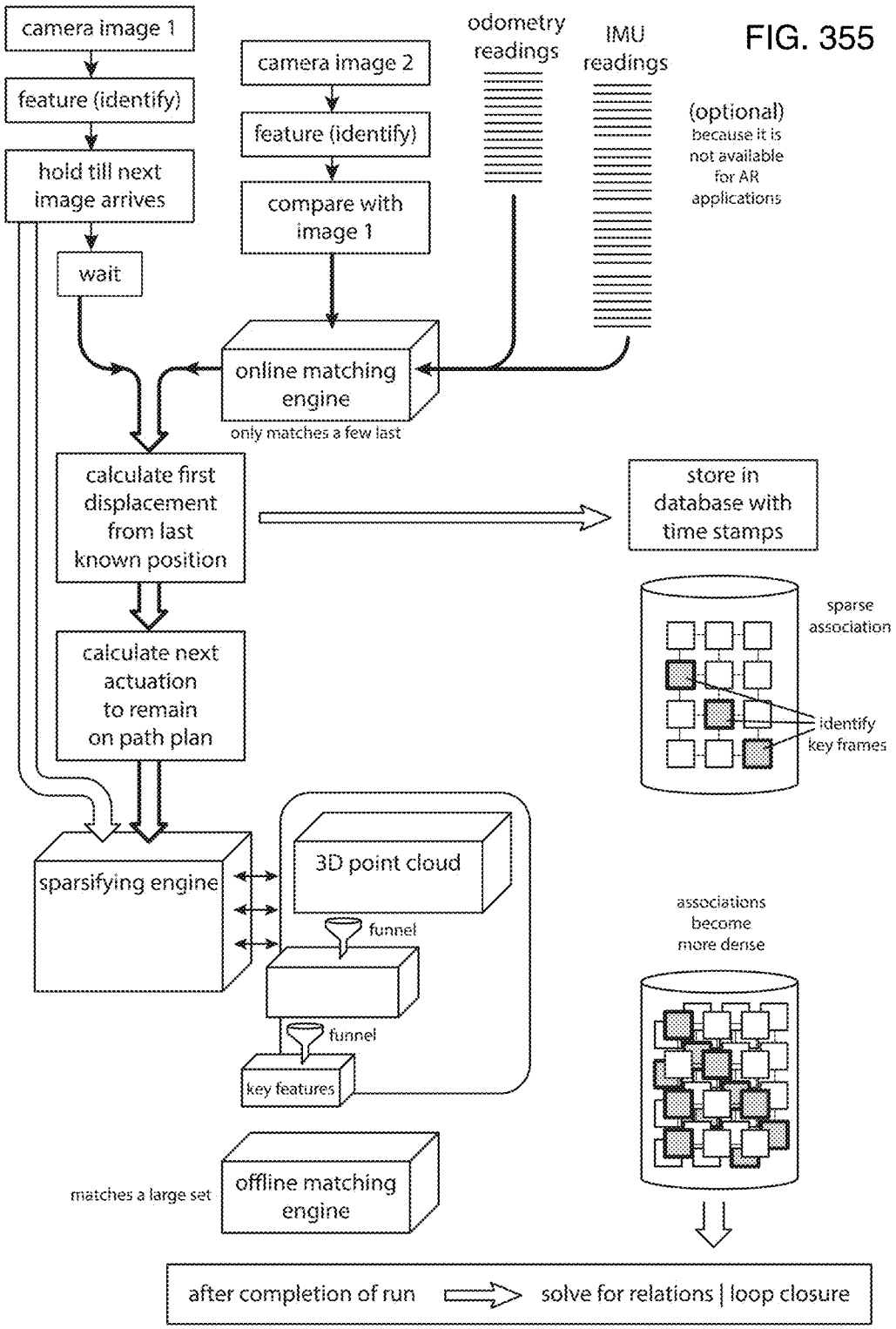

FIG. 355 illustrates a process of localization of a robot using various sensor data types.

Figure 356:
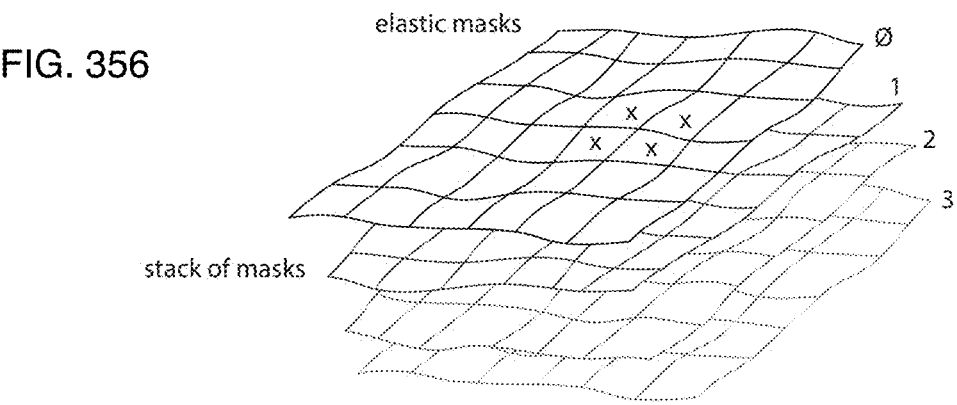

FIG. 356 illustrates a stack of masks.

Figure 357A:
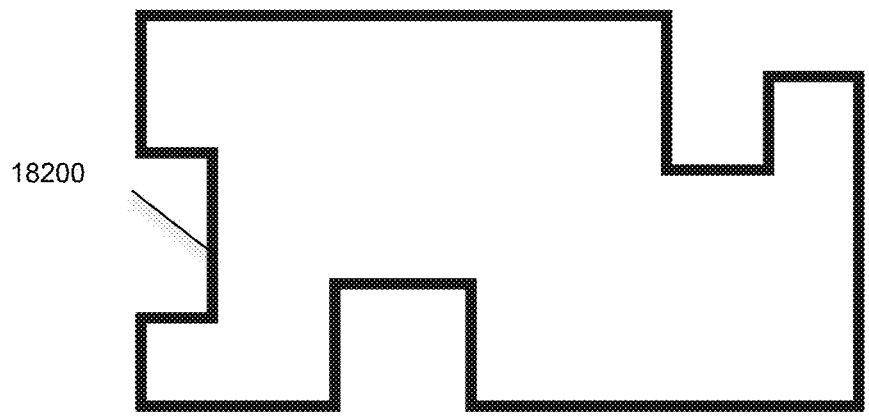
Figure 357B:
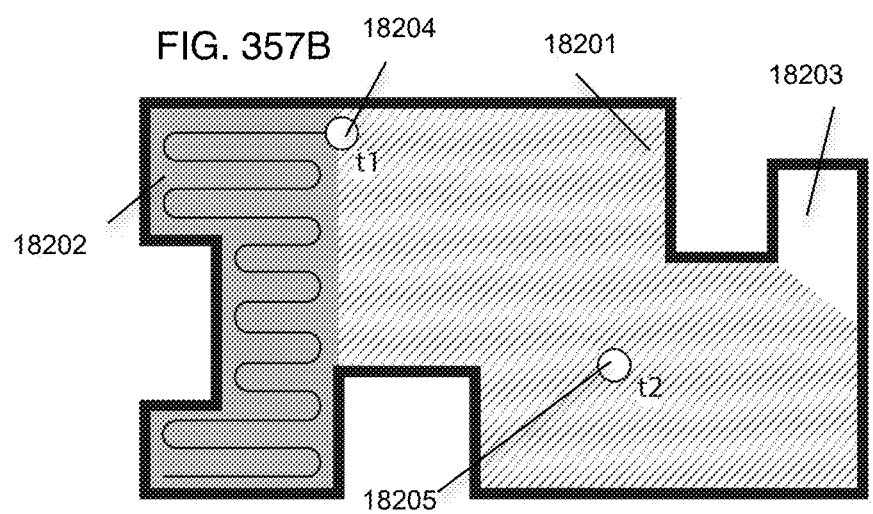
Figure 357C:
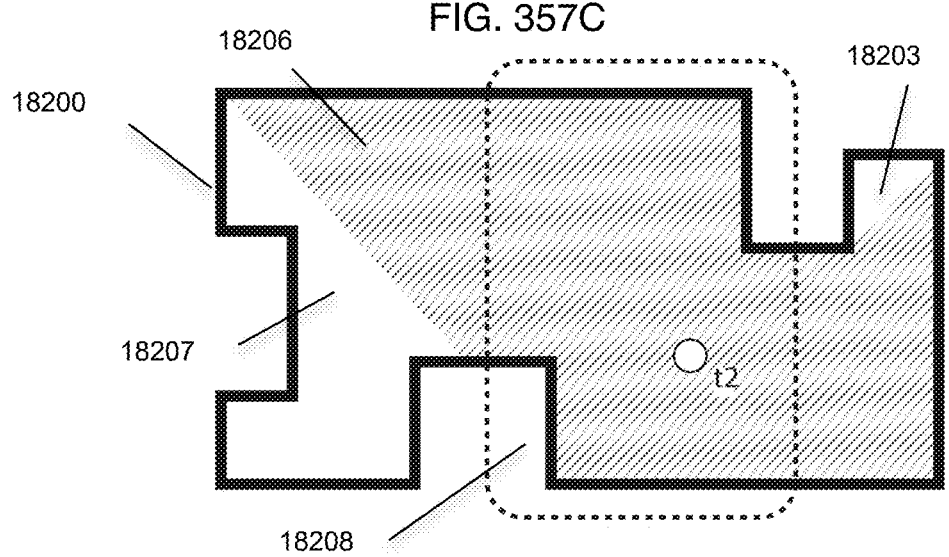

FIGS. 357A-357C illustrate a workspace, including mapped, covered, and undiscovered areas.

Figure 358:
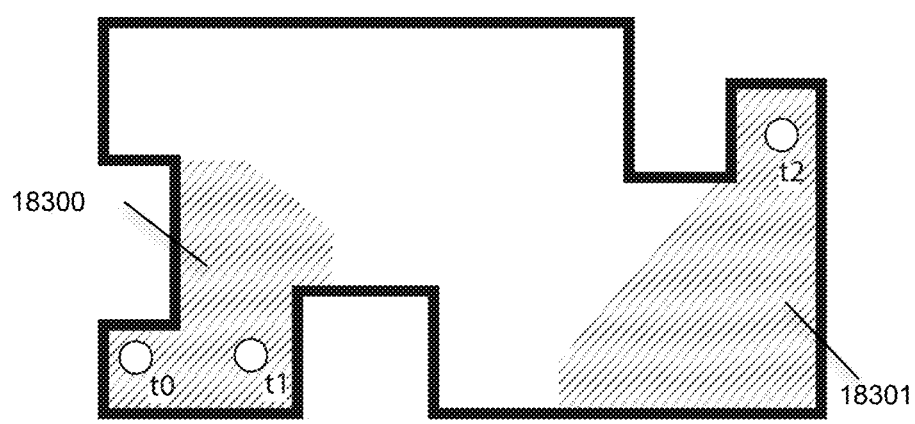

FIG. 358 illustrates a position of a robot at two different time points.

Figure 359:
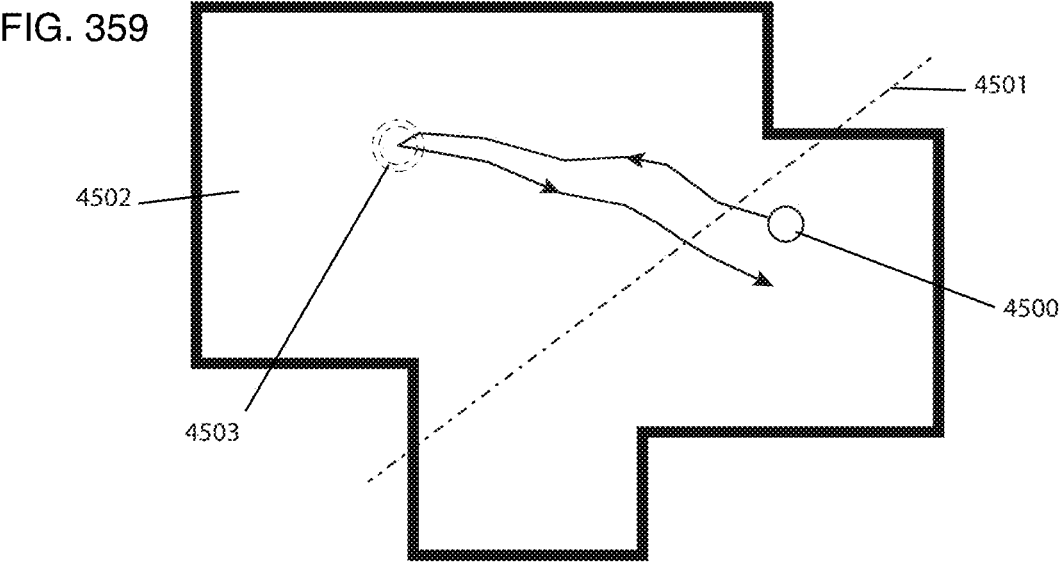

FIG. 359 illustrates an example of relocalization of a robot.

FIG. 360 illustrates a table of various robot brands and a number of successful relocalization attempts.

Figure 361:
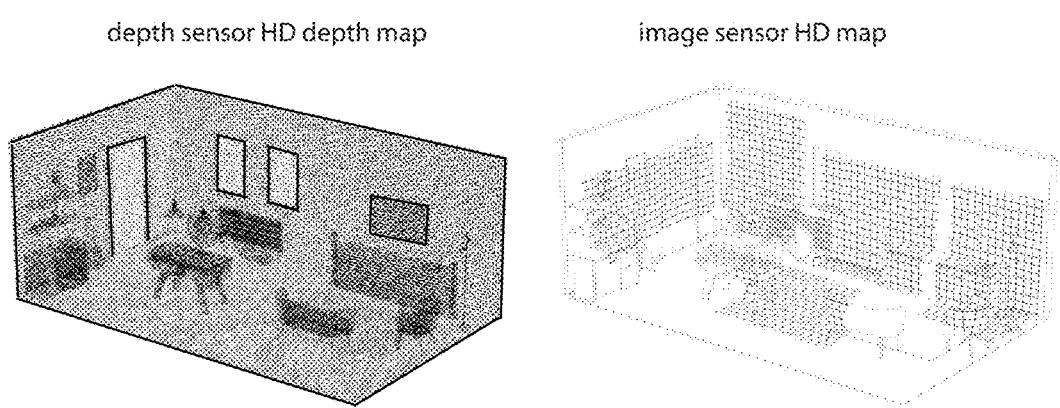

FIG. 361 illustrates an example of HD depth maps.

Figure 362:
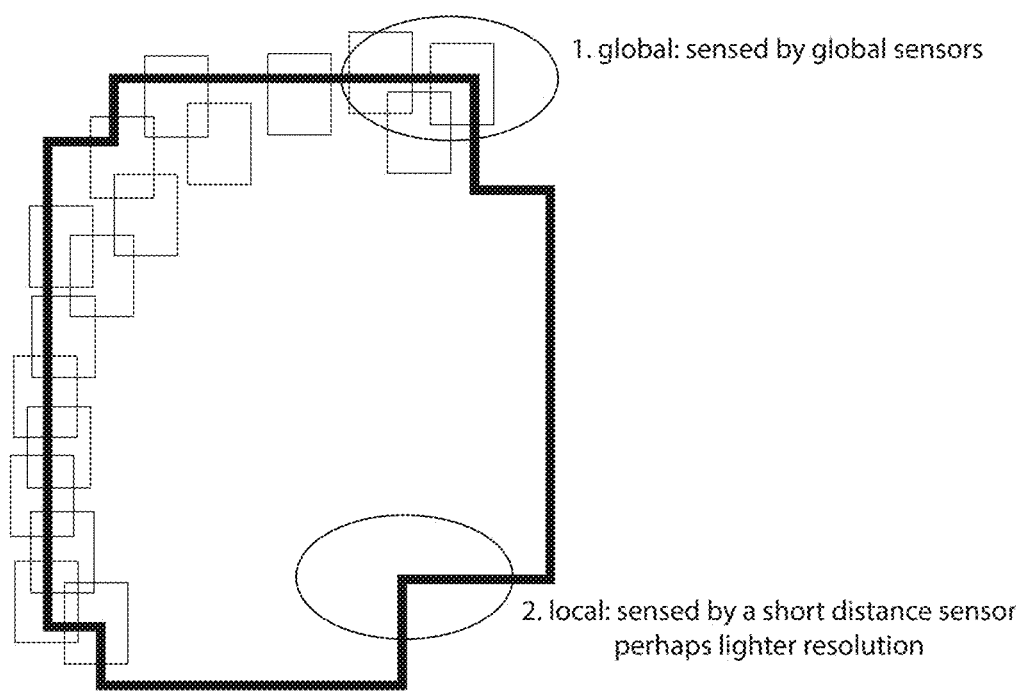

FIG. 362 illustrates an example of a sliding window.

Figure 363:
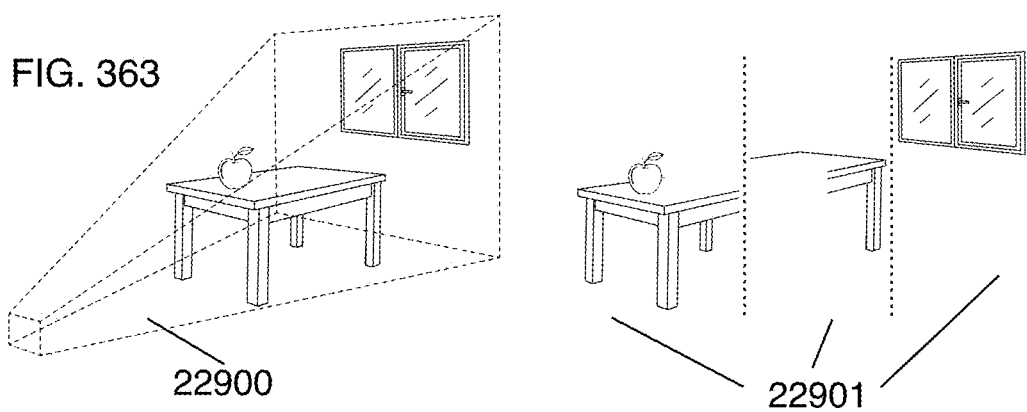

FIG. 363 illustrates associating pixels with depth data.

Figure 364:
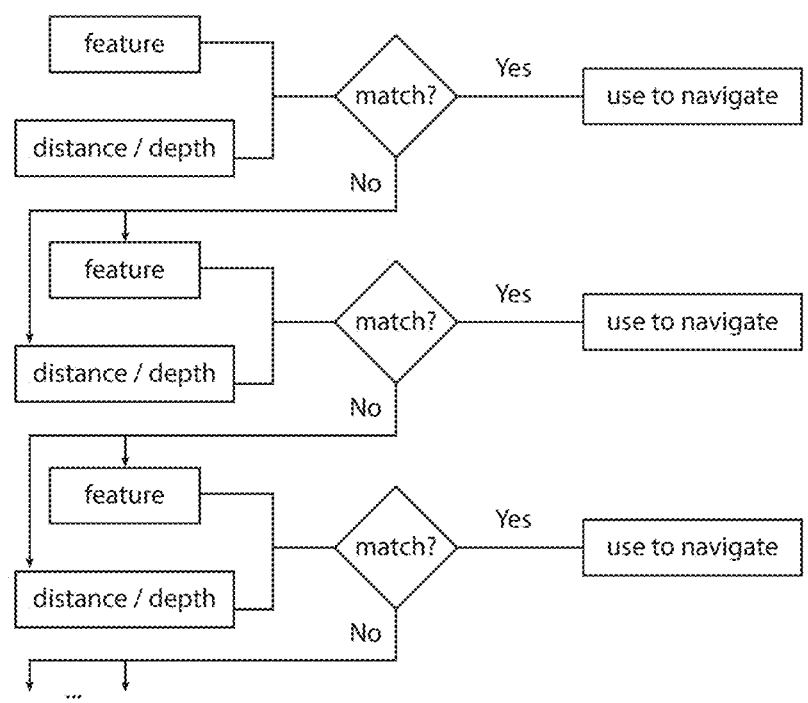
Figure 365:
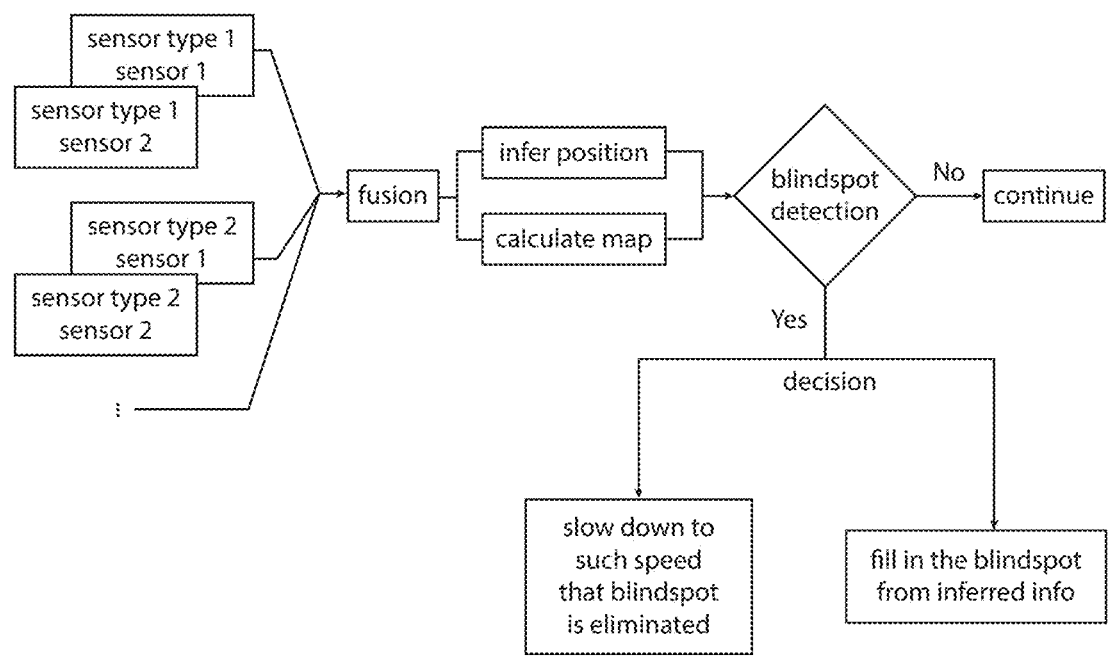

FIGS. 364 and 365 illustrate an example of a process for navigating a robot.

Figure 366:
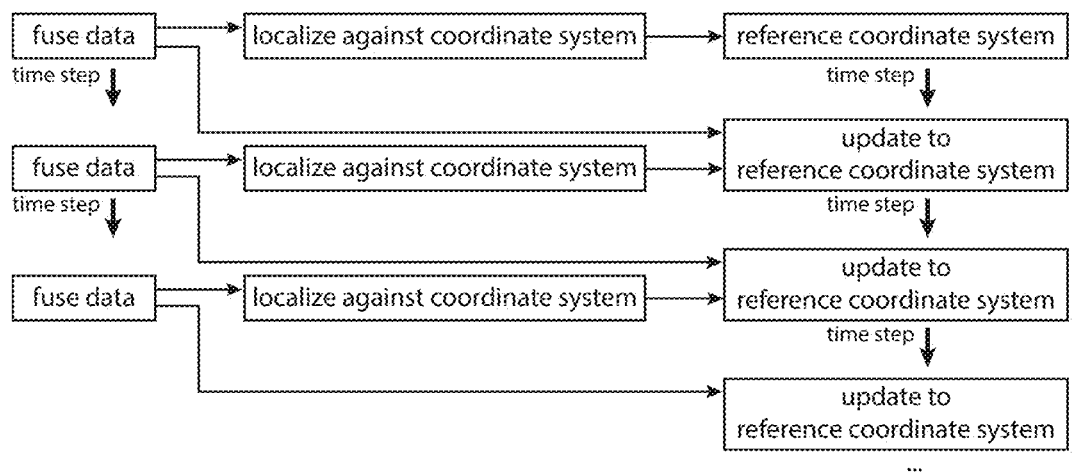
Figure 367:
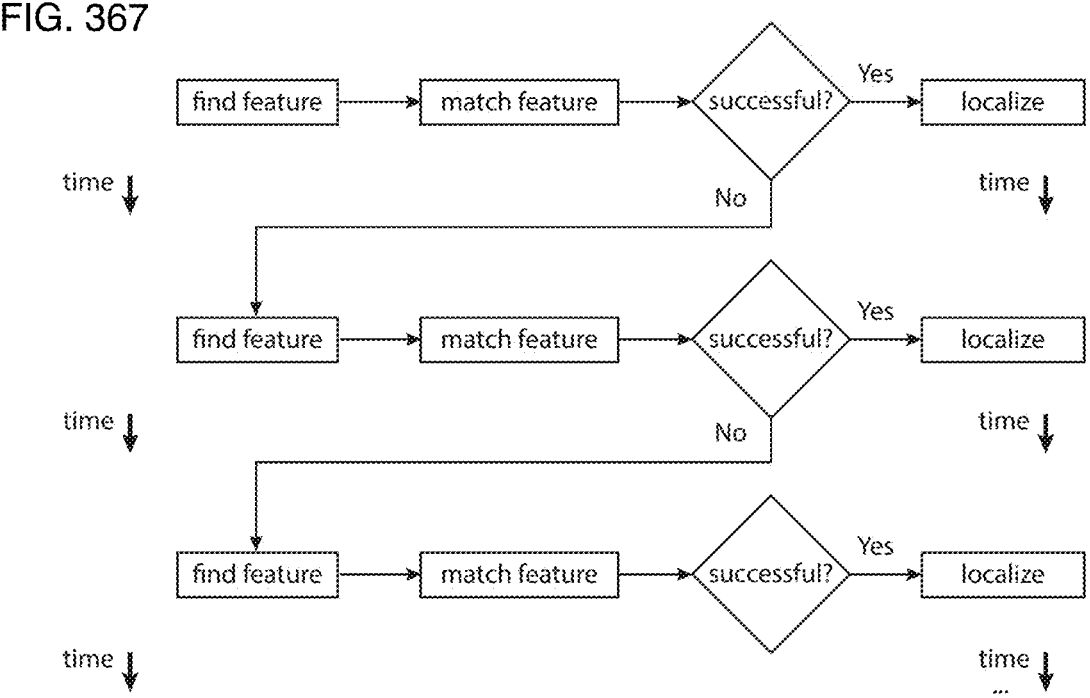

FIGS. 366 and 367 illustrate an example of a process for localizing a robot.

Figure 368:
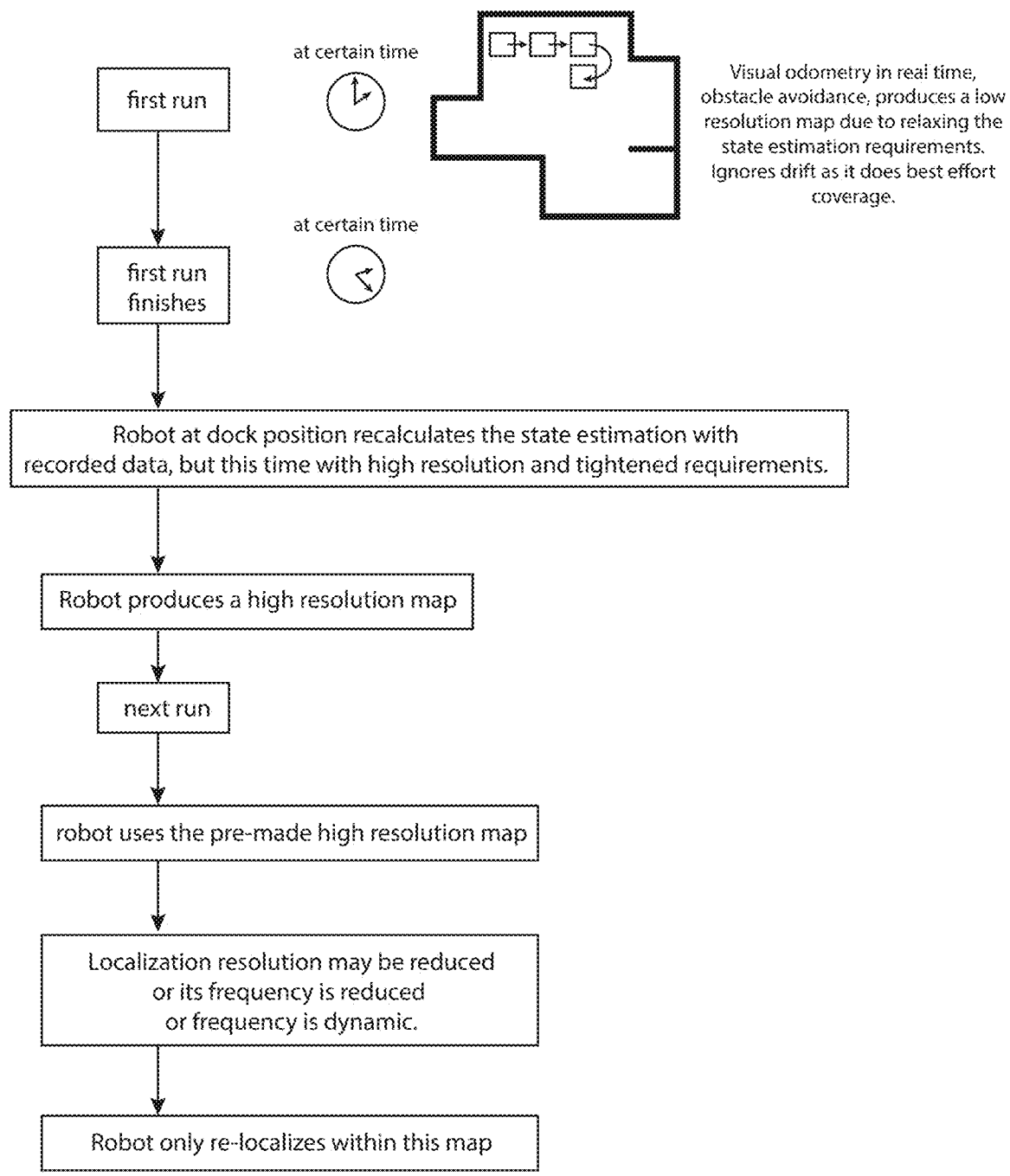

FIG. 368 illustrates an example of a process of SLAM.

Figure 369:
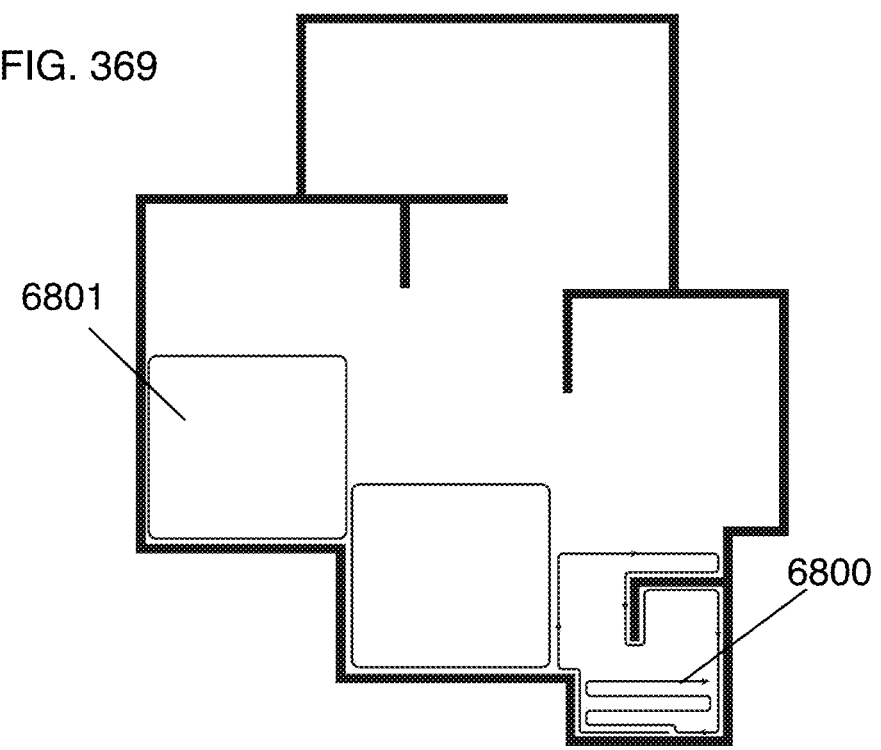

FIG. 369 illustrates an example of closing a loop during mapping.

FIG. 370 illustrates a dynamic and real-time boustrophedon path.

Figure 373:
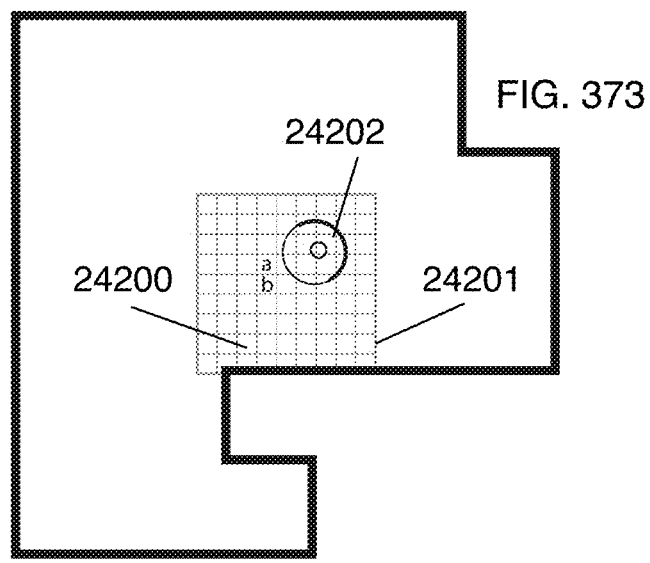

FIGS. 371-373 illustrate an example of localizing a robot within a grid map.

Figure 374:
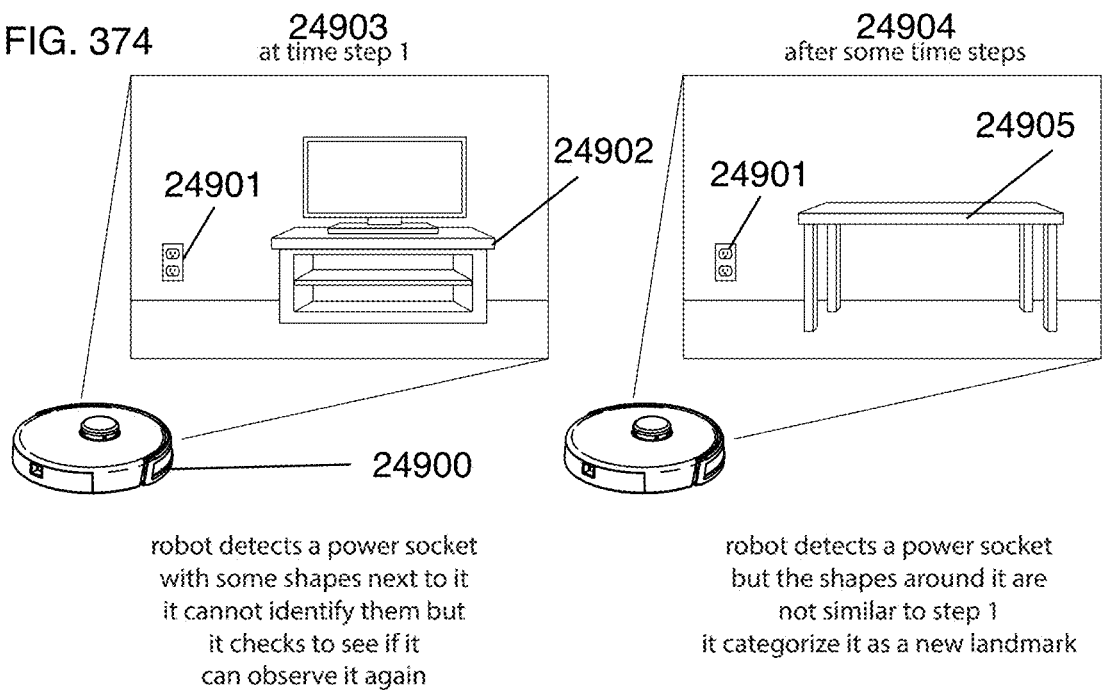

FIG. 374 illustrates an example of contextual visual localization.

Figure 375:
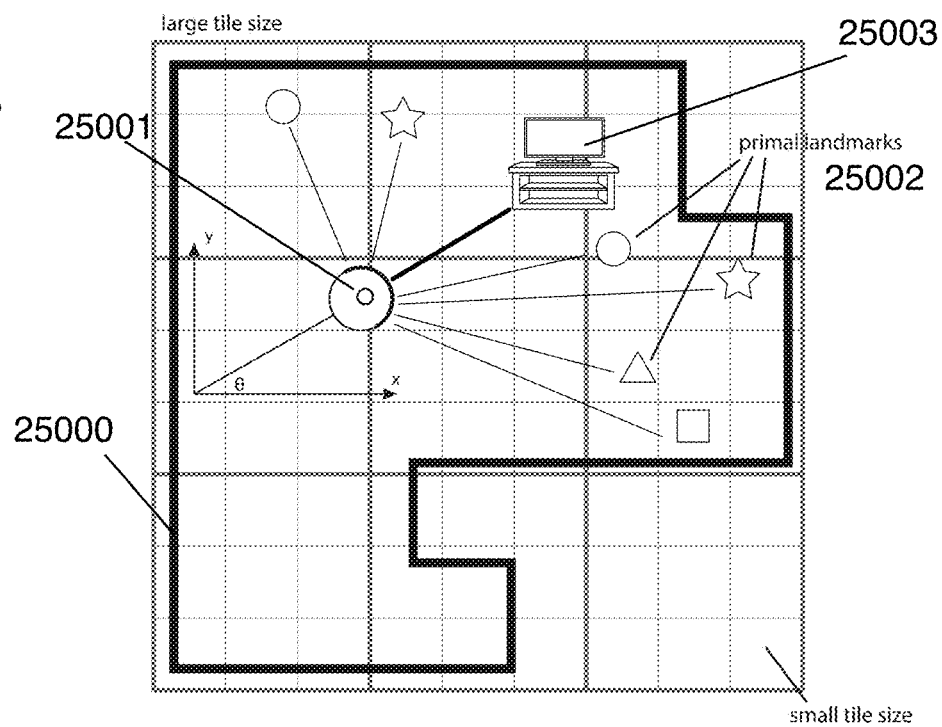
Figure 376:
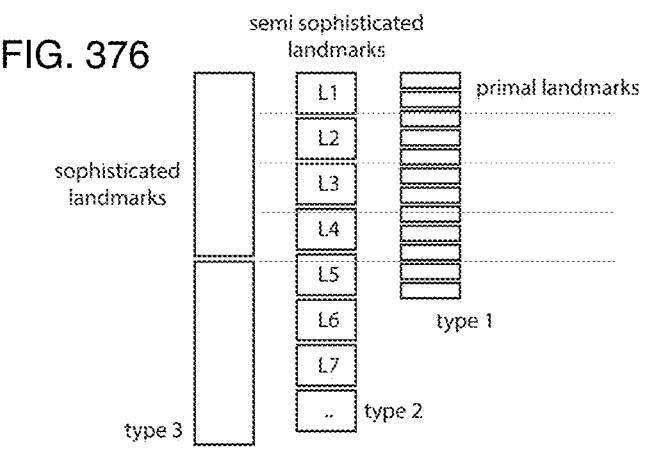

FIGS. 375 and 376 illustrate various types of landmarks.

Figure 377:
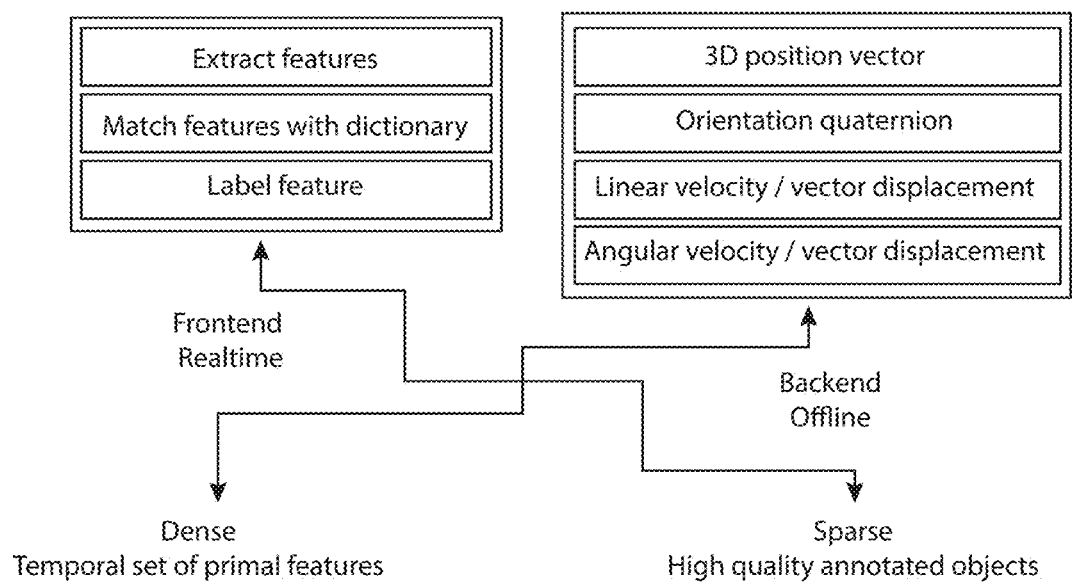

FIG. 377 illustrates a diagram of camera object and camera state vector extraction.

Figure 378:
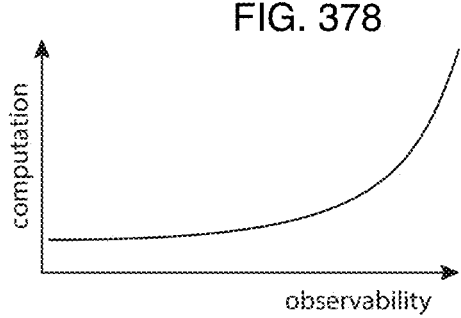

FIG. 378 illustrates a correlation between observability and computation needs.

Figure 379A:
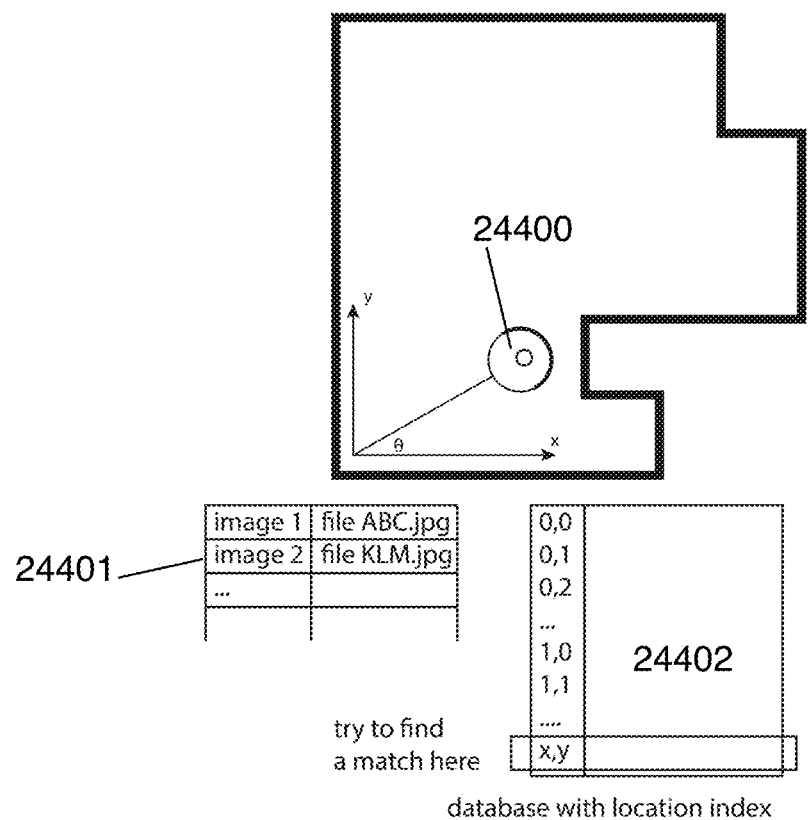
Figure 379B:
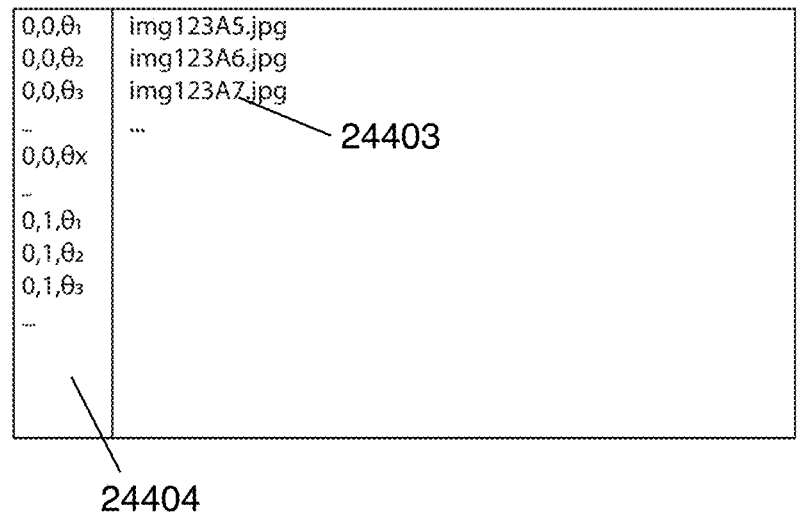

FIGS. 379A and 379B illustrate a process of matching an observed feature to previously captured image data.

Figure 380:
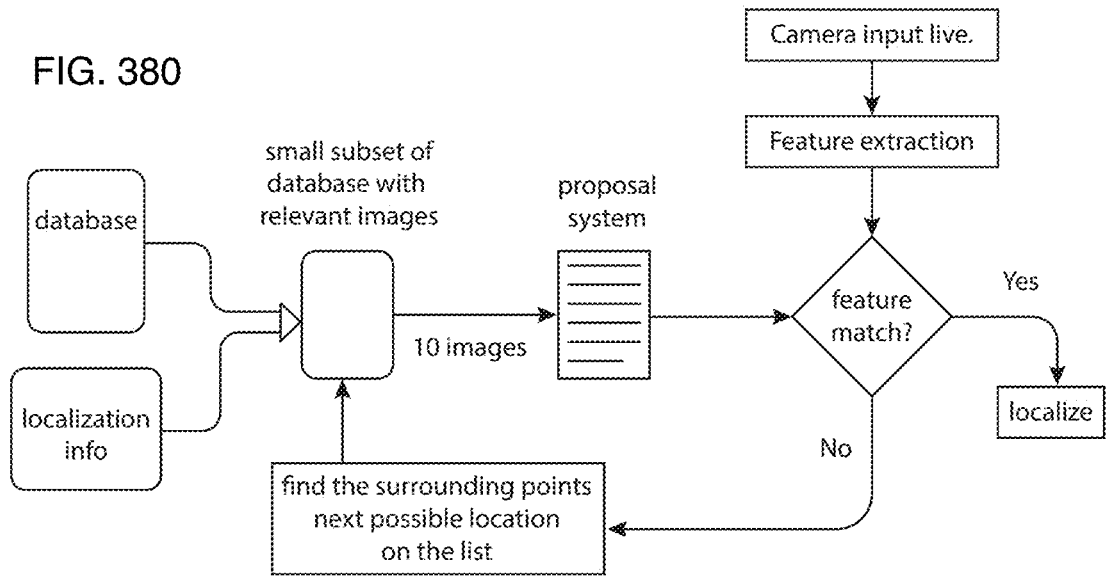

FIG. 380 illustrates an example of a process of localizing the robot.

Figure 381:
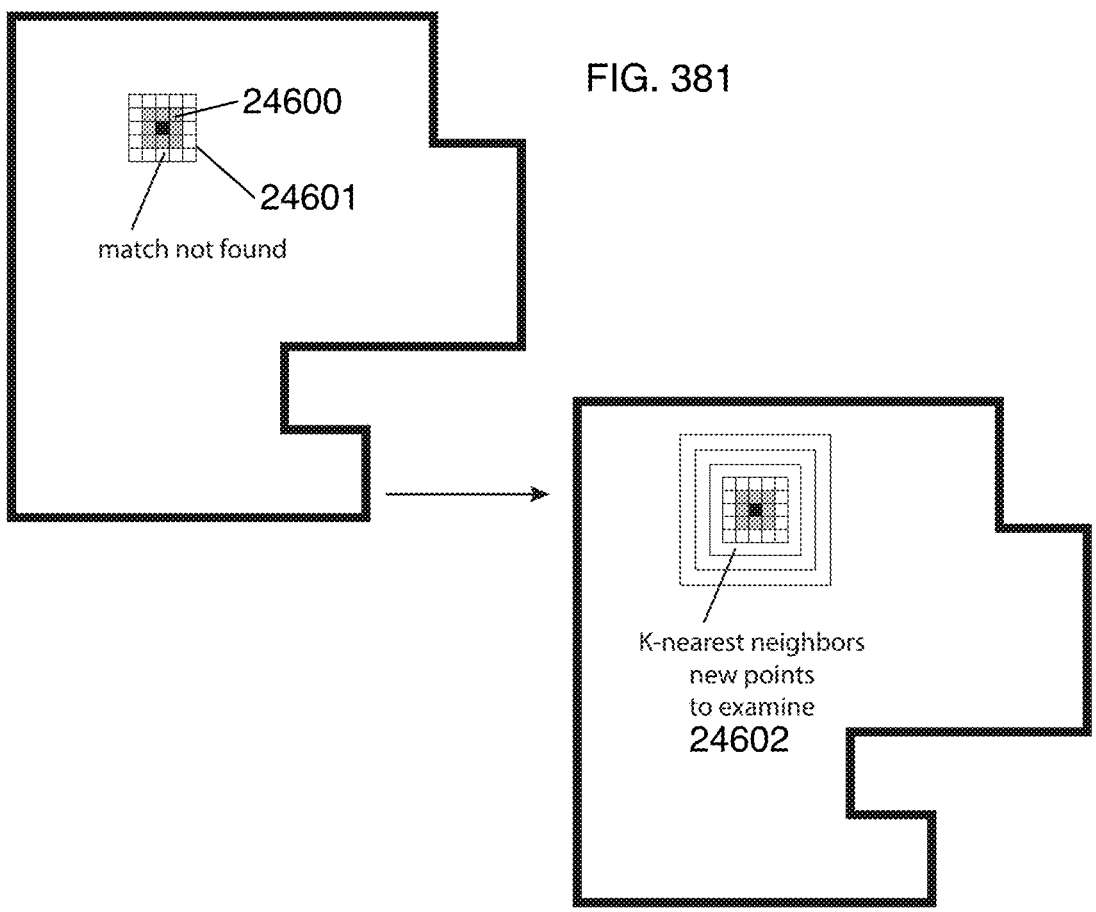

FIG. 381 illustrates a process of matching an observed feature to previously captured data.

Figure 382:
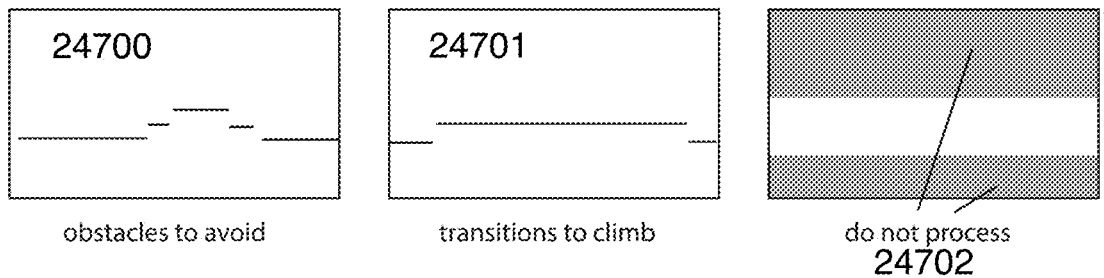

FIG. 382 illustrates processing of relevant regions of an image.

Figure 383:
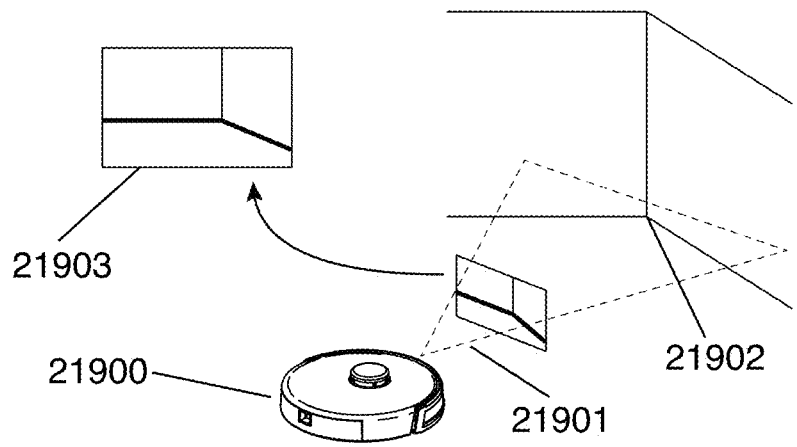
Figure 384:
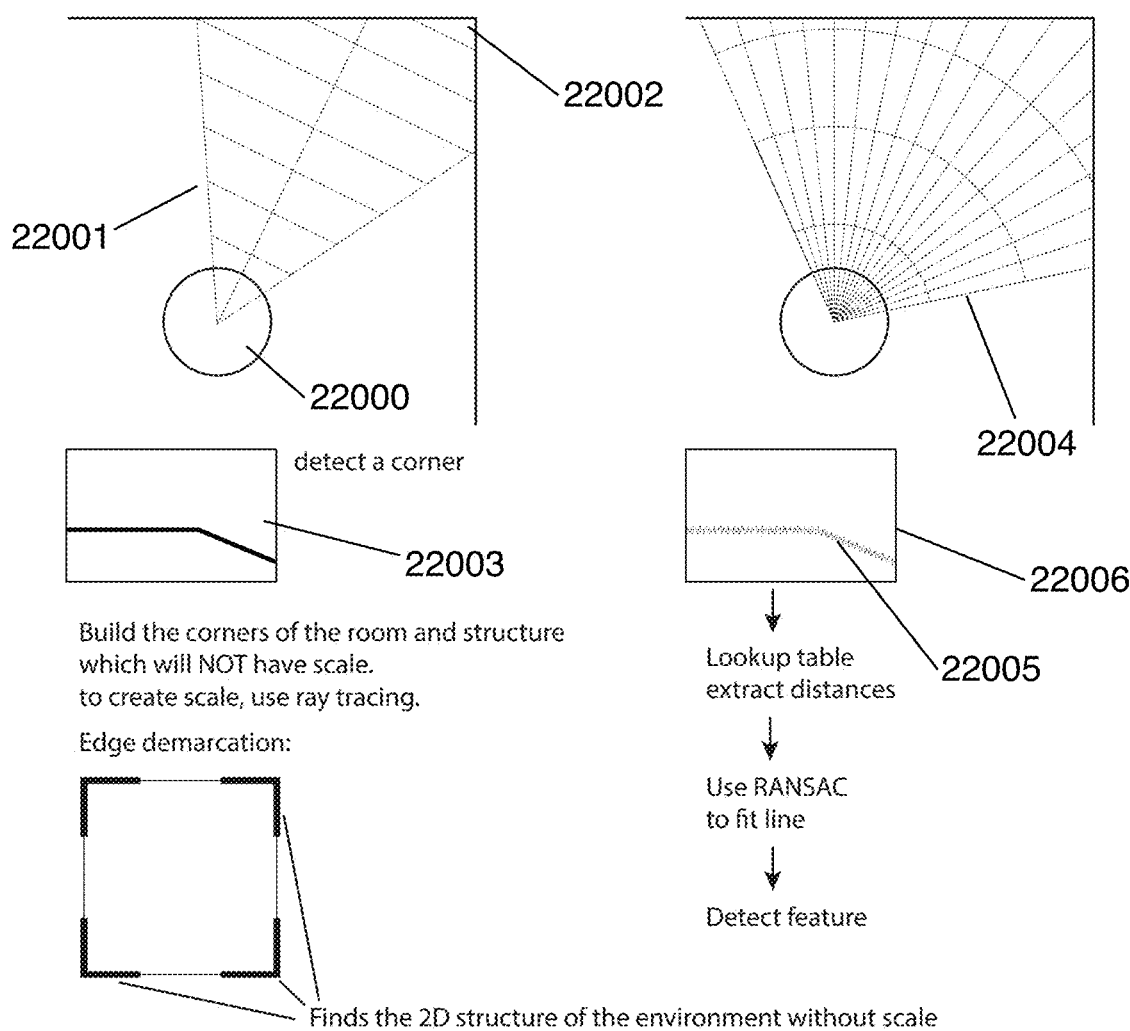

FIGS. 383 and 384 illustrate an example of a robot with a camera and structured light for measuring depth.

Figure 385:
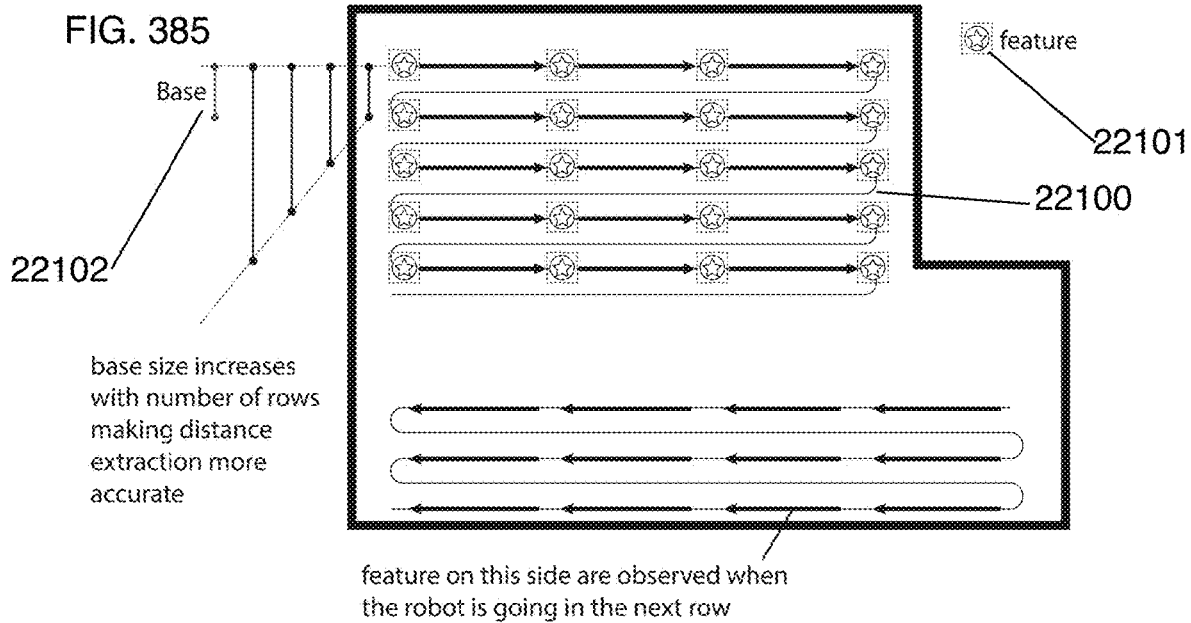

FIG. 385 illustrates an example of a boustrophedon coverage path.

Figure 386:
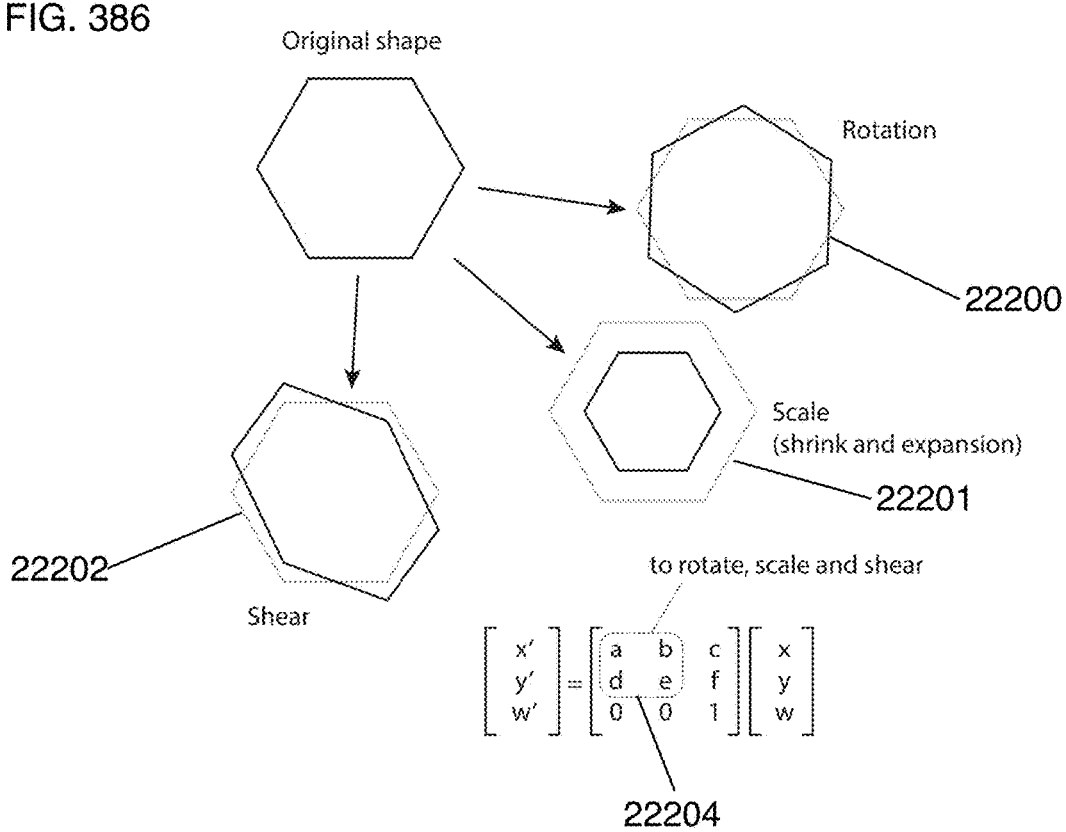

FIGS. 386 and 387 illustrate an example of decomposition of affine transformations.

FIG. 388 illustrates a translation in 2D described as a shear in 3D.

Figure 389:
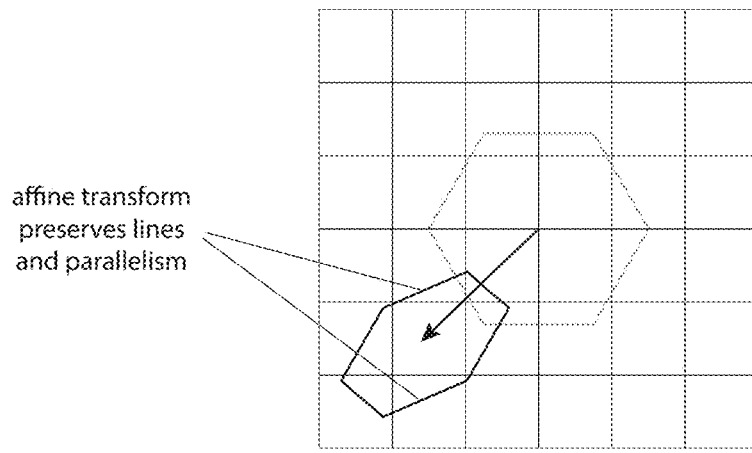

FIG. 389 illustrates preservations of lines and parallelism in affine transformation.

Figure 390:
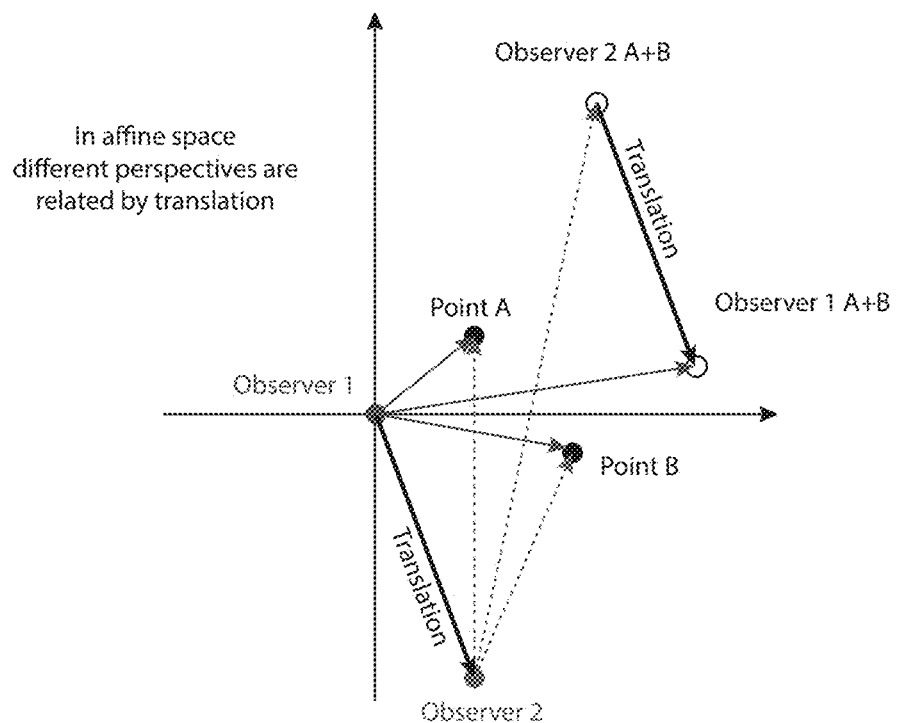

FIG. 390 illustrates translation relating different perspectives within an affine space.

Figure 391:
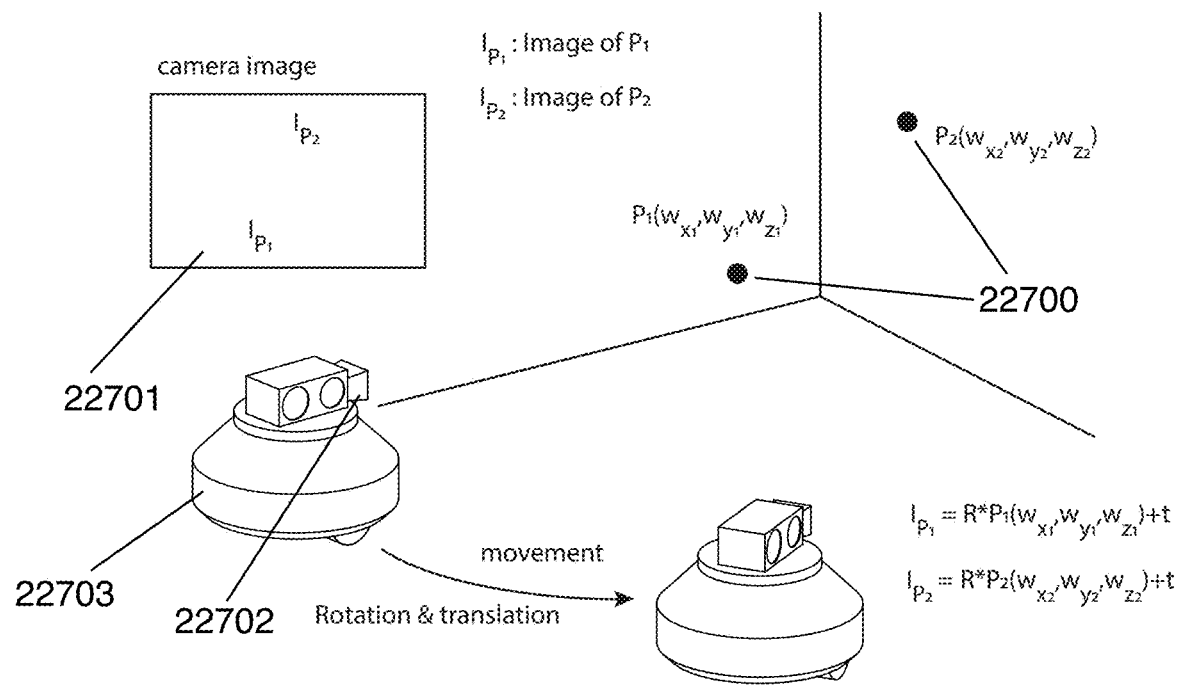

FIG. 391 illustrates transformation of points captured in an image.

Figure 392:

FIG. 392 illustrates a sequence of incoming point swarm data.

Figure 393:
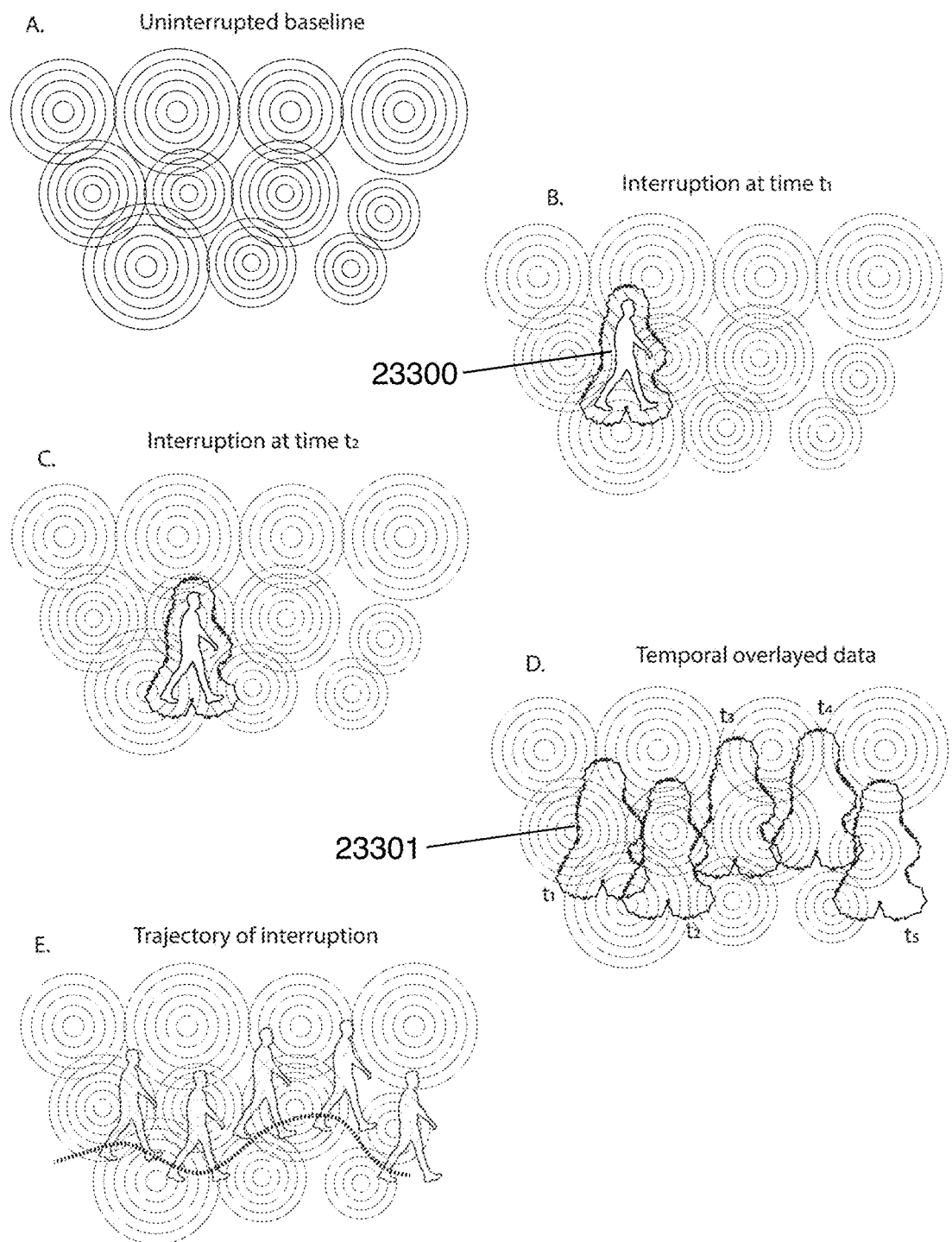
Figure 394:
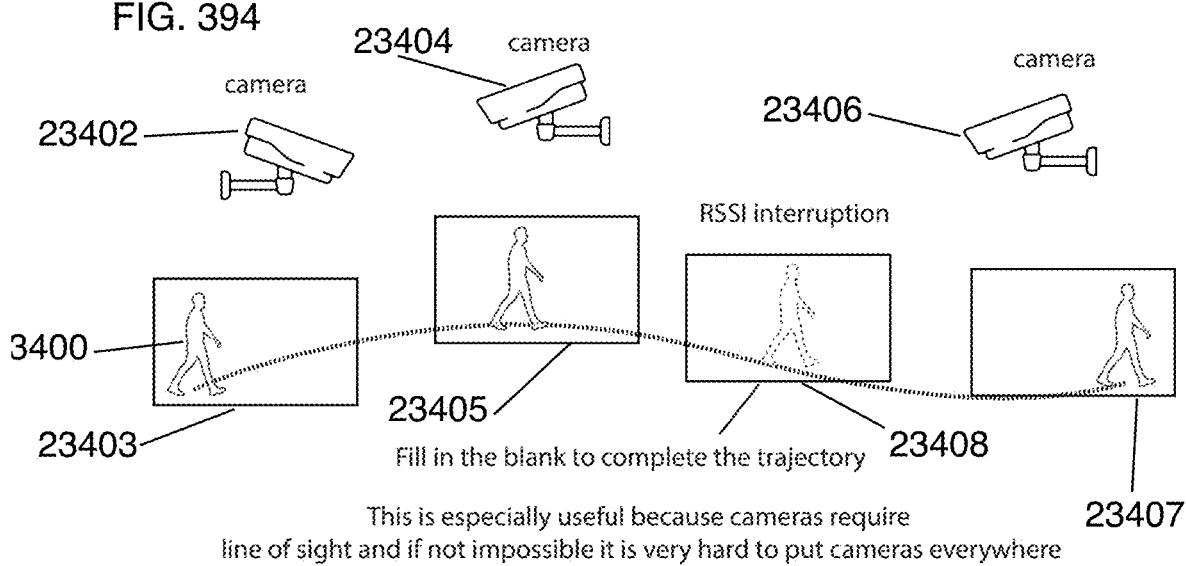

FIGS. 393 and 394 illustrate an example of a signal baseline and interruptions to the signal baseline.

Figure 395:
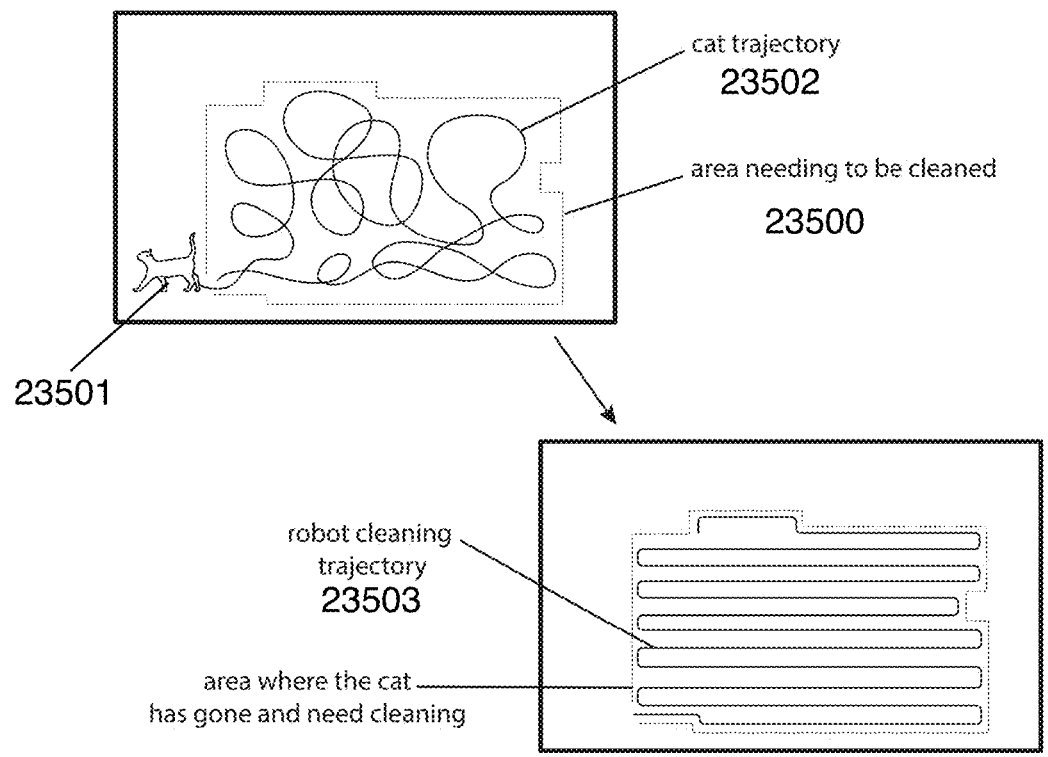
Figure 396:
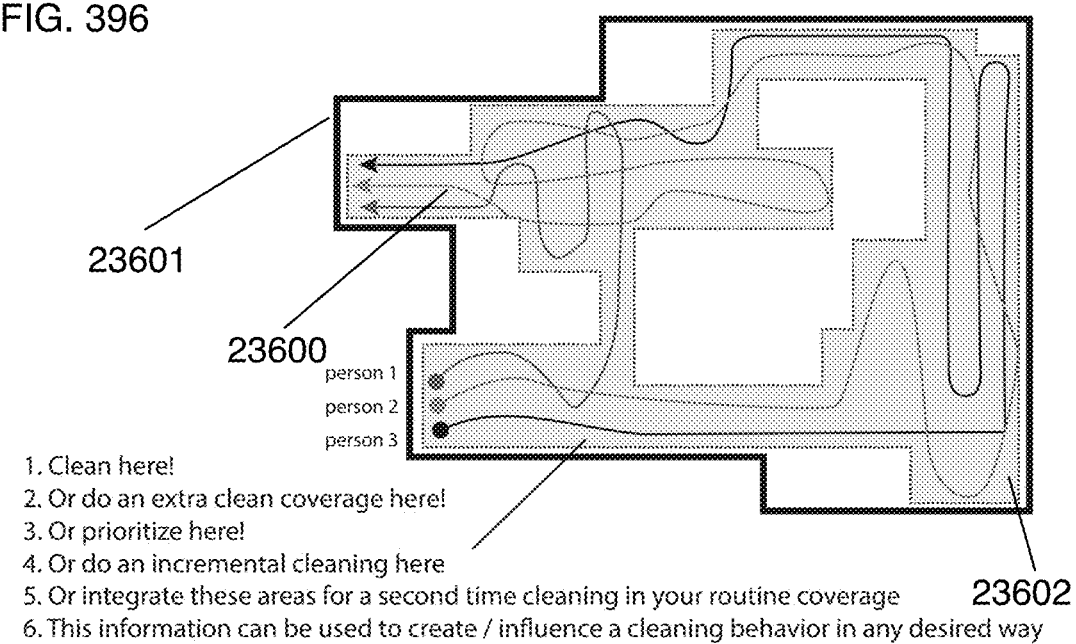

FIGS. 395 and 396 illustrate examples of using snail trail to determine a cleaning action.

Figure 397:
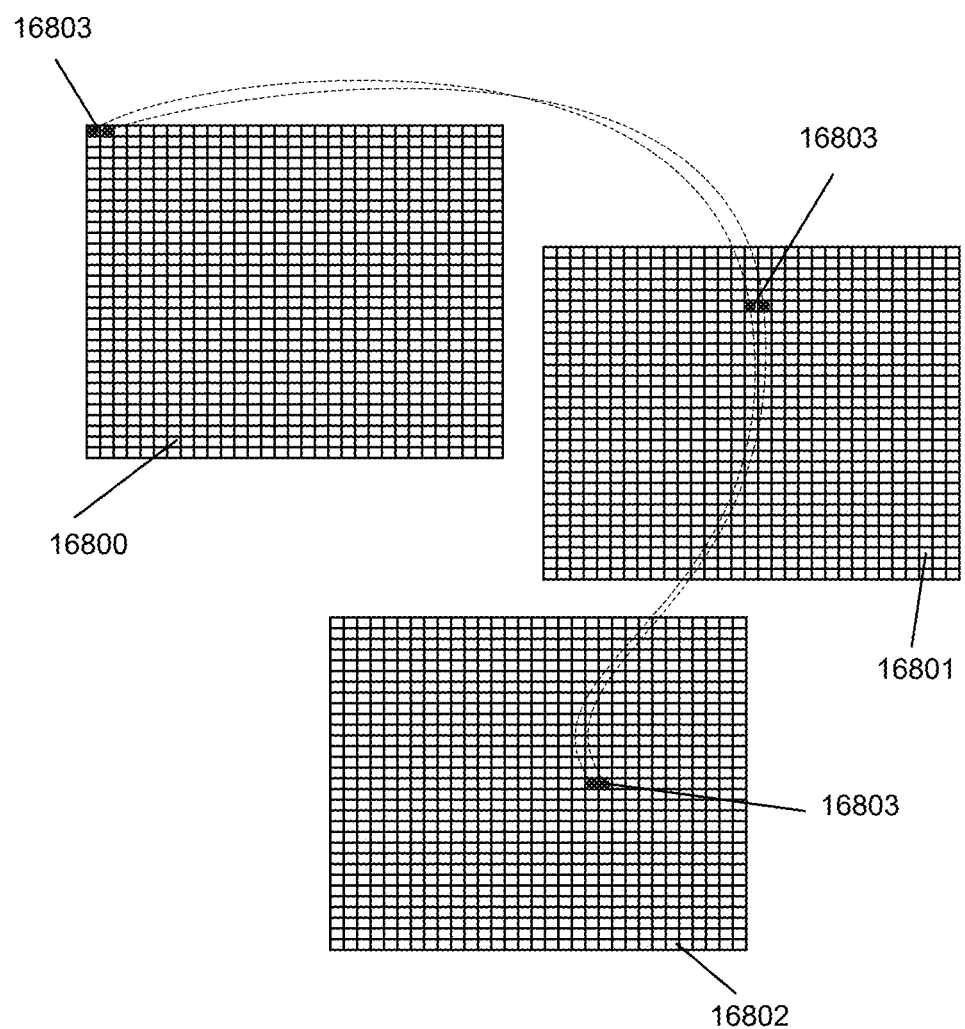

FIG. 397 illustrates three images captured during navigation of a robot.

Figure 398:
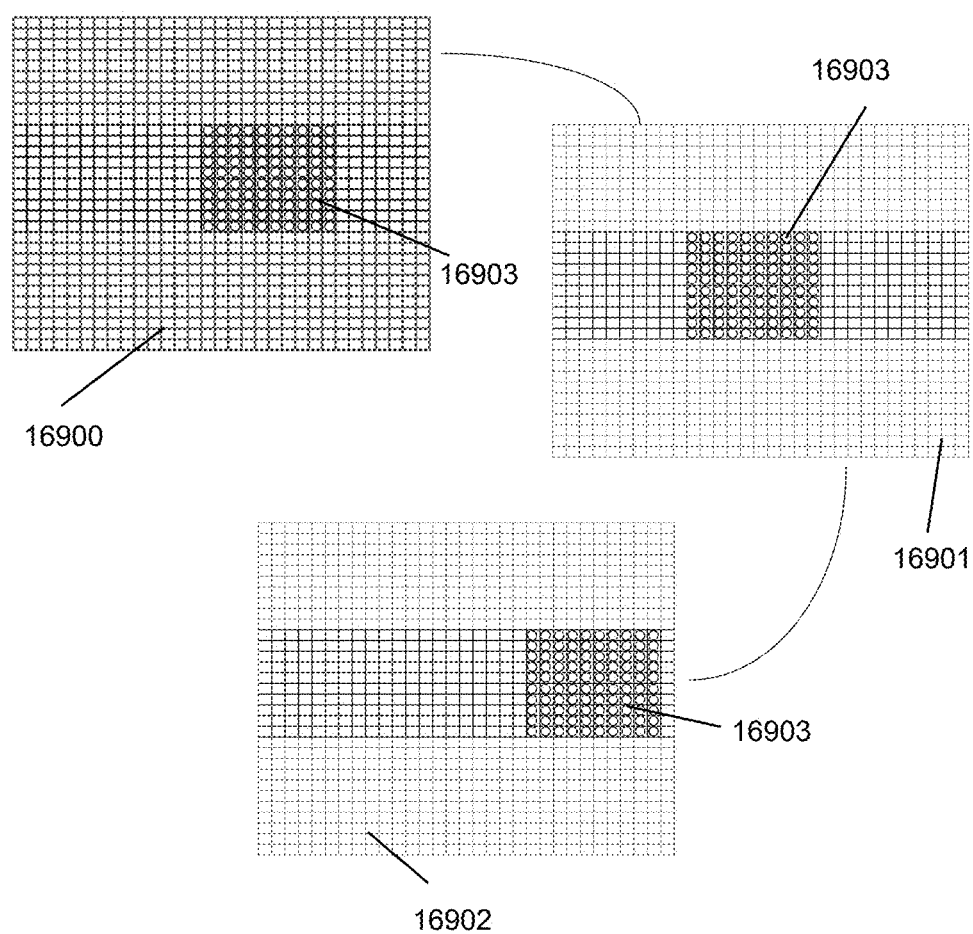

FIG. 398 illustrates three images captured during navigation of a robot.

Figure 399:
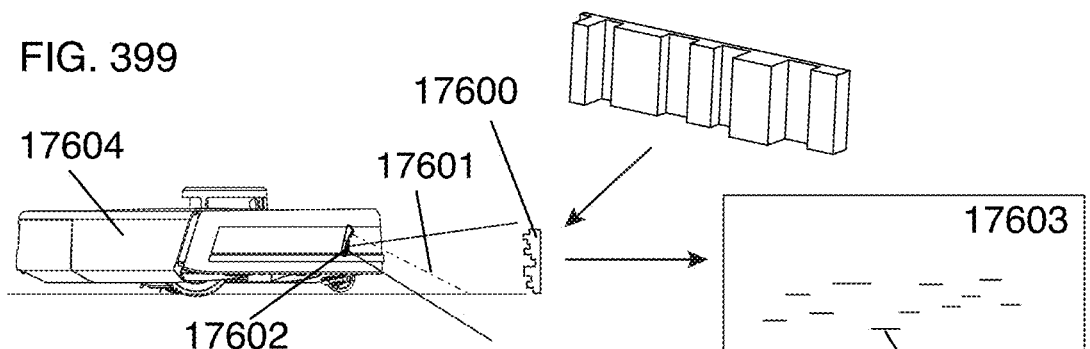
Figure 400:
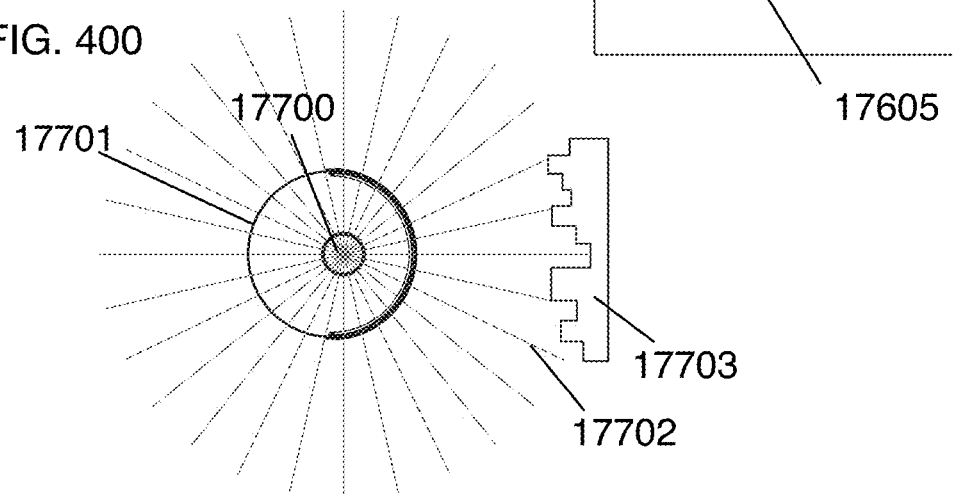
Figure 401:
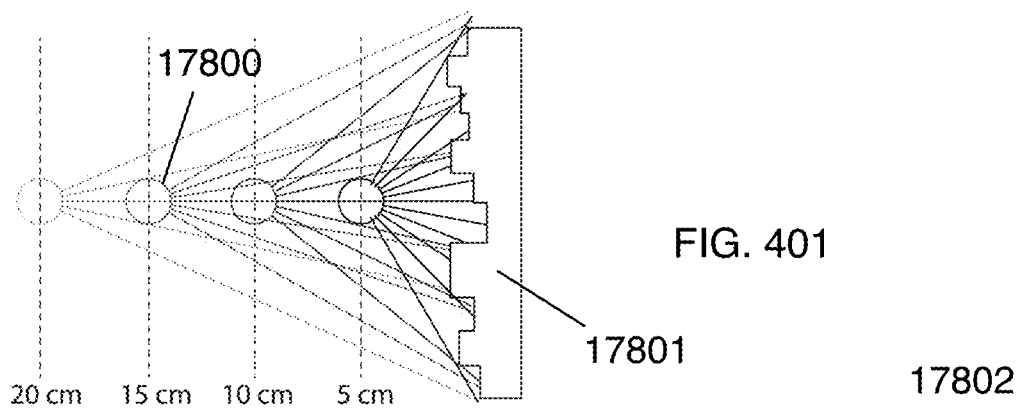

FIGS. 399-401 illustrate using detection of unique indentation patterns of objects as an indicator for information or instruction.

Figure 402:
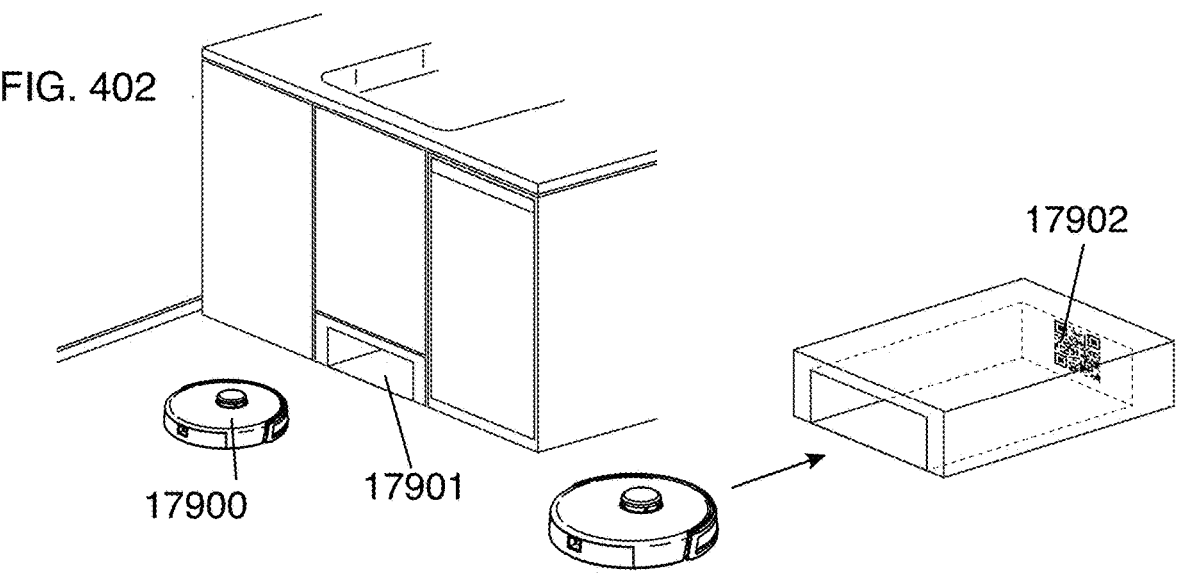
Figure 403:
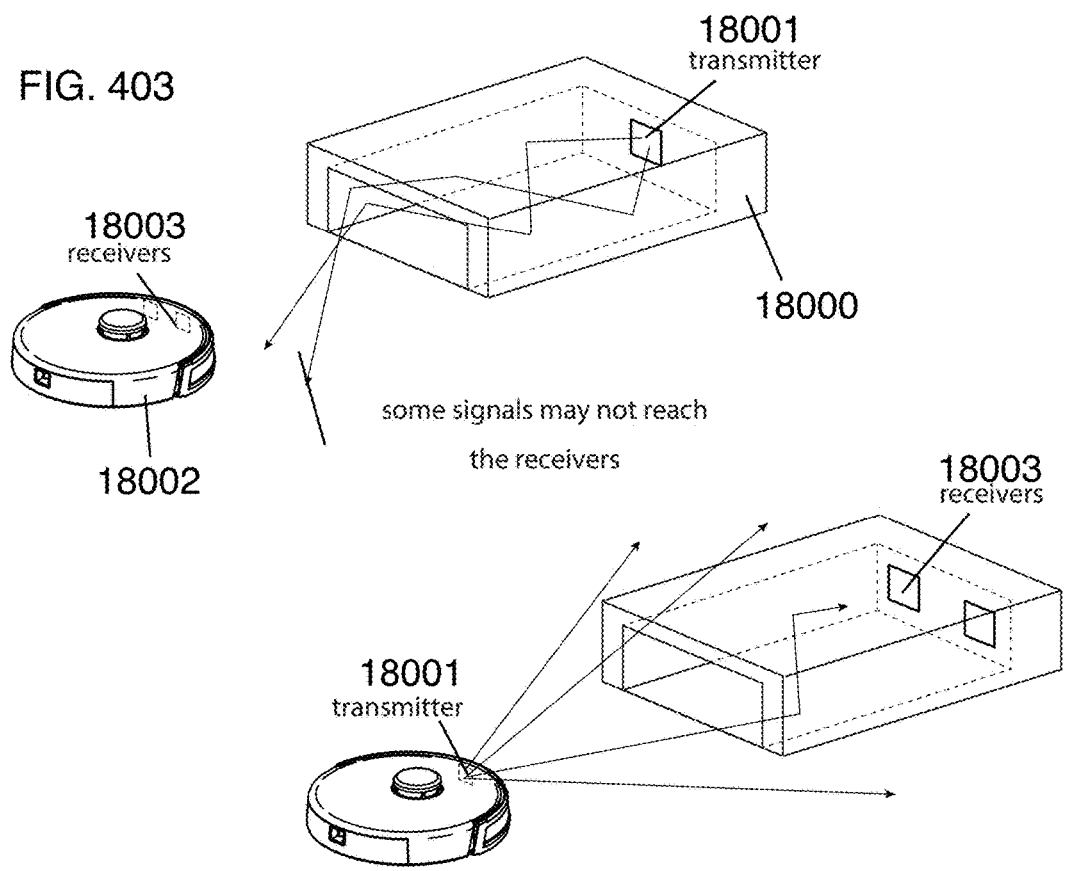

FIGS. 402 and 403 illustrate a robot docking at a docking station using an IR transmitter and receiver.

Figure 405:
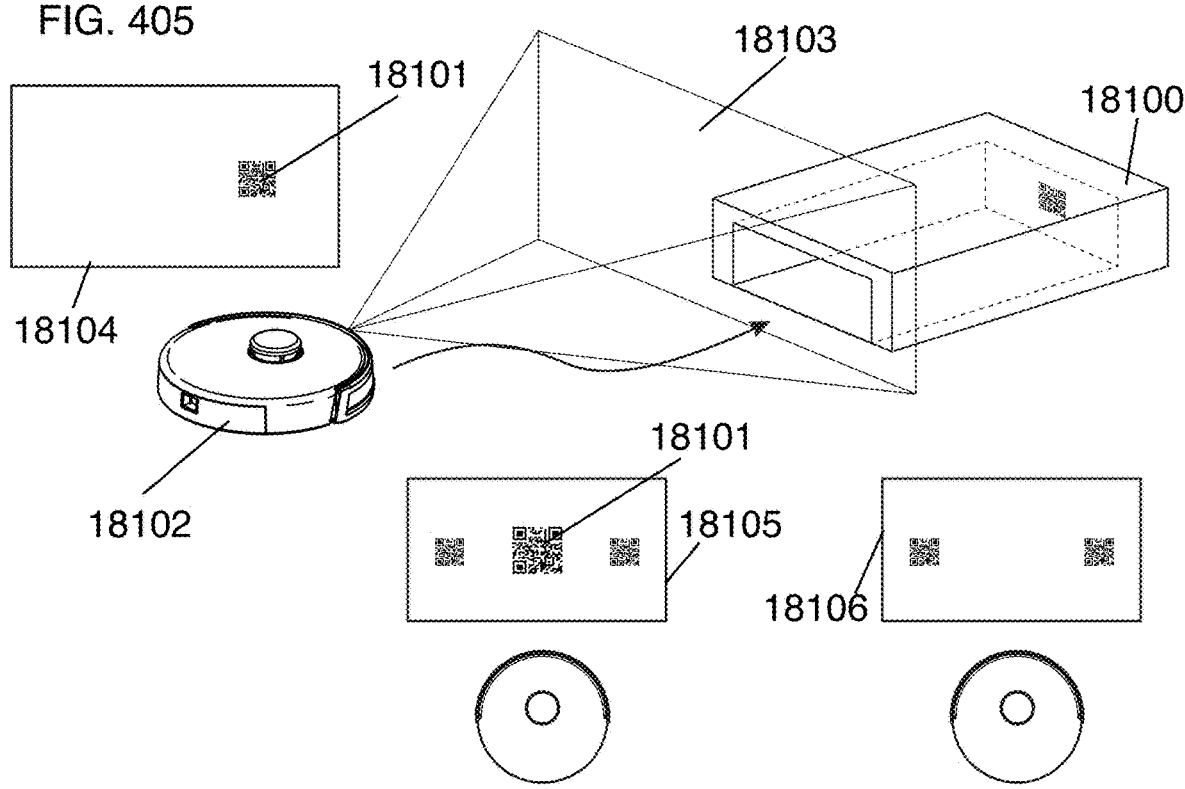

FIGS. 404 and 405 illustrate a robot docking at a docking station using QR codes.

Figure 406:
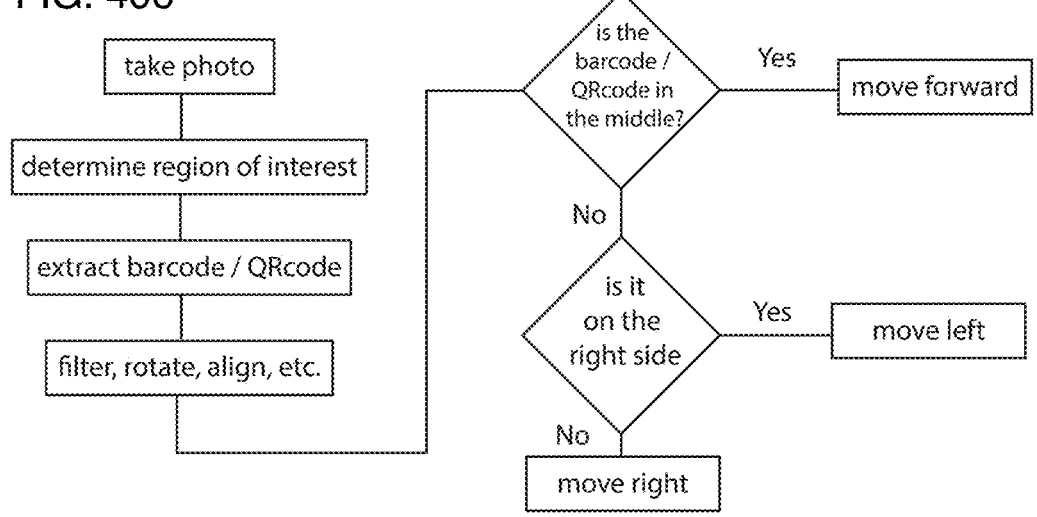

FIG. 406 illustrates a process of a robot docking at a docking station using QR codes.

FIGS. 407-413 illustrate examples of smart watches and their use in operating a robot.

Figure 414:
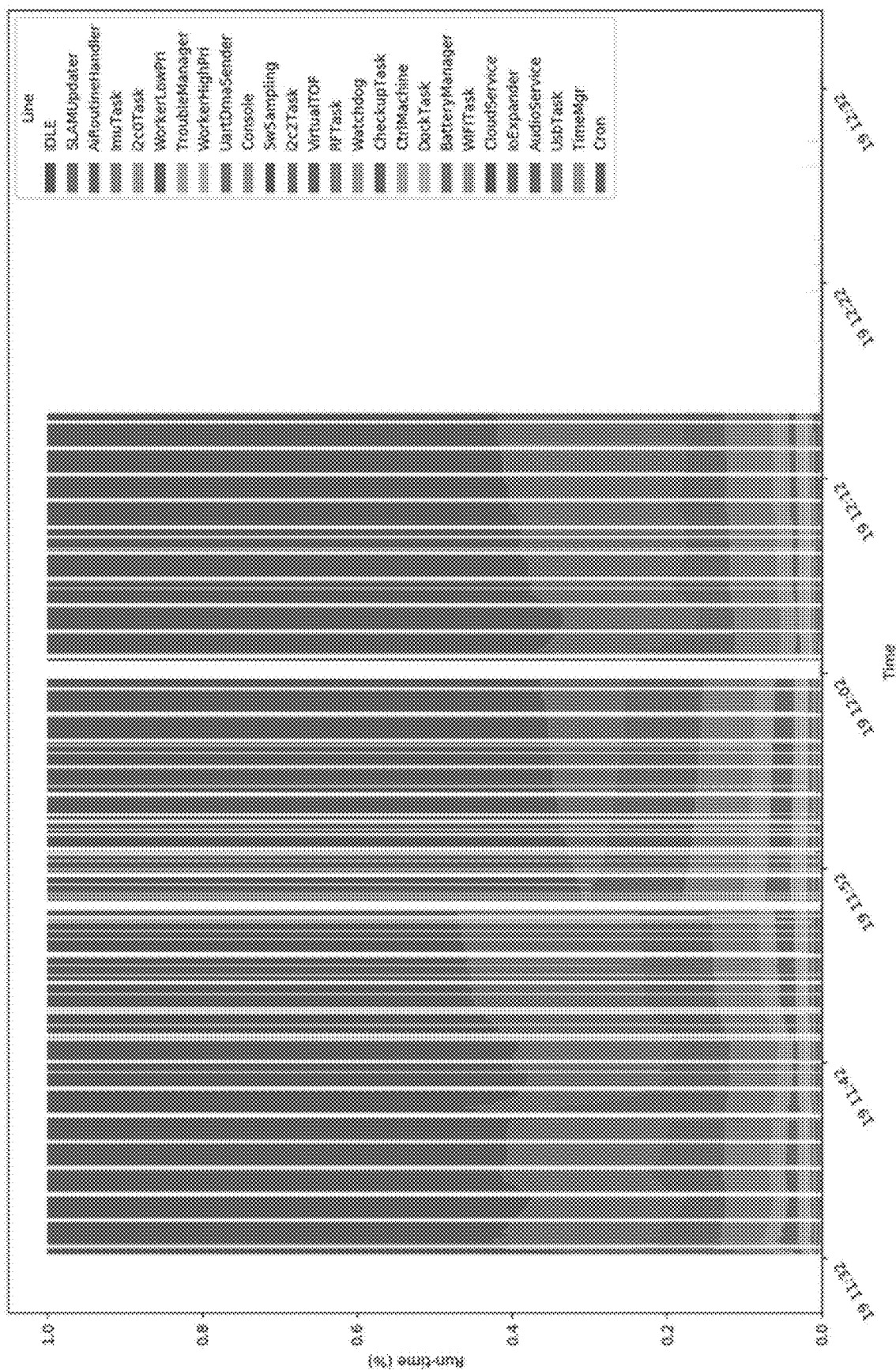

FIG. 414 provides a visualization of multitasking in real time on an ARM Cortex M7 MCU, model SAM70 from Atmel.

Figure 415:
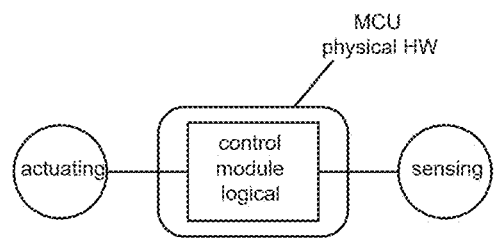

FIG. 415 illustrates an example of an MCU of the robot.

DETAILED DESCRIPTION OF SOME EMBODIMENTS

Embodiments provide a robot including, but not limited to including, one or more of a casing, a chassis including a set of wheels, a motor to drive the wheels, a receiver that acquires signals transmitted from, for example, a transmitting beacon, a transmitter for transmitting signals, a processor, a memory storing instructions that when executed by the processor effectuates robotic operations, a controller, a plurality of sensors (e.g., tactile sensor, obstacle sensor, temperature sensor, imaging sensor, LIDAR sensor, camera, depth sensor, TOF sensor, TSSP sensor, optical tracking sensor, sonar sensor, ultrasound sensor, laser sensor, LED sensor, etc.), network or wireless communications, RF communications, power management such as a rechargeable battery, solar panels, or fuel, and one or more clock or synchronizing devices. In some cases, the robot may include communication means such as Wi-Fi, Worldwide Interoperability for Microwave Access (WiMax), WiMax mobile, wireless, cellular, Bluetooth, RF, etc. In some cases, the robot may support the use of a 360 degrees LIDAR and a depth camera with limited field of view. In some cases, the robot may support proprioceptive sensors (e.g., independently or in fusion), odometry devices, optical tracking sensors, smart phone inertial measurement units (IMU), and gyroscopes. In some cases, the robot may include at least one cleaning tool (e.g., disinfectant sprayer, brush, mop, scrubber, steam mop, cleaning pad, ultraviolet (UV) sterilizer, etc.). The processor may, for example, receive and process data from internal or external sensors, execute commands based on data received, control motors such as wheel motors, map the environment, localize the robot, determine division of the environment into zones, and determine movement paths. In some cases, the robot may include a microcontroller on which computer code required for executing the methods and techniques described herein may be stored.

Some embodiments include an appliance including a built-in robot vacuum and mop and maintenance station system. The maintenance station is installed within a kitchen, such as alongside, adjacent to (e.g., similar to a dishwasher), or integrated within lower cupboards of the kitchen cabinets. In embodiments, the robot vacuums and mops a floor of an environment of the robot. In embodiments, the robot includes mapping components, a main PCB including CPU and MCU processors and memory, a power supply, obstacle detection sensors, a vacuum system, a mopping module, communication components, and wheel modules. The mapping components may include a LIDAR sensor, cameras, and other sensors. The obstacle detection sensors may include proximity sensors, IR sensors, Time-of-Flight (ToF) sensors, structured light and camera device, and other sensors. The power supply may include a rechargeable battery. The vacuum system may include a main brush module, one or more side brushes, a vacuum motor, a dustbin, and filters. The main brush module may use single or dual brushes fabricated from bristles or rubber. The mopping module may include a water and/or cleaning solution container, a micro pump positioned within the container, a static or dynamic (e.g., spinning, rolling, vibrating, etc.) mopping attachment, and a mopping pad fabricated from a microfiber material or another material. The mopping module may be equipped with a lifting mechanism to lift the mopping pad when the robot approaches and drives on a carpeted area. The communication components may include a Wi-Fi module, a speaker, and a user interface (UI). Each wheel module may include a combination of two drive wheels powered separately and a front caster wheel. Wheels may have encoders to measure their individual speed and robot speed as a unit. The robot may have a separate roller on the back. In some embodiments, the robot includes an RGB camera for capturing and transmitting a viewpoint of the robot to an application of a communication device (e.g., smartphone, tablet, smart TV, smart watch, laptop, etc.) of a user of the robot. In some embodiments, the robot includes a microphone for receiving voice commands from the user. In some embodiments, the robot operates as a communication device for the user using a combination of a camera, Wi-Fi capabilities, a speaker, and a microphone. In embodiments, a processor of the robot maps and localizes the robot within the environment. In addition to mapping and localization, the processor of the robot executes object recognition, obstacle detection, object avoidance, communication, and other tasks.

In embodiments, the maintenance station built into the cabinets of the kitchen includes at least some of a charging component, guiding sensors, an auto-empty component, a self-refill component, a self-wash and self-clean component, a draining system, sensors, and a UI. The charging component may include charging pads positioned on a back wall portion of the maintenance station. In such a case, charging pads of the robot are positioned on a back portion of the robot. Alternatively, charging pads may be positioned on a front portion of the maintenance station. In such a case, charging pads of the robot are positioned on a bottom surface of a front portion of the robot. In some cases, charging pads may not be positioned on the bottom surface of a rear portion of the robot as the mopping module is positioned in the rear portion of the robot. In some embodiments, the guiding sensors are indicators the robot uses to find the maintenance station. The guiding sensors may include a parallel structured light, a barcode, a QR code, 2D patterns, or 3D structures with unique indentation patterns recognizable by the processor of robot. In some cases, the maintenance station includes a physical guiding mechanism to aid in positioning the robot in an exact desired position (e.g., cavities for the wheels of the robot). Positioning the robot in an exact desired position is especially important for washing and cleaning related mechanism. In another case, rollers may guide and course correct the robot as the robot docks at the maintenance station.

In some embodiments, the robot autonomously empties its bin based on any of an amount of surface area covered since a last time the bin was emptied, an amount of runtime since a last time the bin was emptied, the amount of overlap in coverage (i.e., a distance between parallel lines in the boustrophedon movement path of the robot), a volume or weight of refuse collected in the bin (based on sensor data), etc. In some embodiments, the user may choose when the robot is to empty its bin using the application. For instance, sliders may be displayed by the application and adjusted by the user to determine at which amount of surface area or runtime, respectively, since a last time the bin was emptied, the robot should empty its bin.

In embodiments, the auto-empty component empties the dustbin of the robot into a large dust container each time the robot returns to the maintenance station. The auto-empty component may include the large dust container, a vacuum motor to suction debris from the dustbin of the robot into the large dust container, an intake tube connecting the dustbin of the robot to the large dust container, and a filter. The large dust container may include a bag positioned within the container for collecting the dust and debris or may be used without a bag. In some embodiments, the large dust container is a part of a kitchen trash bin. Keeping a bag of the large container separate from the kitchen trash bin may be beneficial as a time period for the bag of the large dust container to get full is longer and the bag protects against spreading of allergens. The intake tube may connect to the dustbin directly, through the body of the robot, or through the main brush opening. In cases wherein the environment of the robot (e.g., a house, a condo, an apartment. etc.) is equipped with a central vacuum system, the auto-empty mechanism may empty the dustbin of the robot directly into the central vacuum system instead of the large dust container or bag of the maintenance station.

In embodiments, the self-refill component refills the container of the mopping module with water and/or cleaning solution. The self-refill component may include a water intake line for delivering water from a plumbing system of the environment directly to the container of the mopping module, a shut off valve for shutting off access to water from the plumbing system of the environment, and an intake valve and screen to control the flow of water from the plumbing system. In some embodiments, an intermediary reservoir is positioned between the mopping module and water intake line. The self-wash and self-clean component may include a water intake line (a different or same water intake line as the self-refill component) for directing water and/or cleaning solution to a mopping pad and a cleaning mechanism. The cleaning mechanism may include a brush in contact with the mopping pad and/or a squeegee for removing water buildup on the mopping pad into the draining system. The brush may move locally, such as in a rotating motion or reciprocating motion, from one side of the mopping pad to other side of the mopping pad one or several times to clean the mopping pad. In some cases, spinning mop pads may be employed and a spinning motion of the spinning mopping pads may be used for cleaning the pads themselves, wherein the pads are spun on a stationary brush and squeegee disposed on the maintenance station. Stationary components are beneficial as they reduce an overall number of moving parts that are prone to mechanical failure. The draining system may include a drain hose, a filter, and a vacuum motor to suction water into the drain hose. The drain hose may be directly connected to a water waste system of the environment (similar to a dishwasher), wherein an air gap device is required prior to connection to the water waste system. In some embodiments, the drained dirty water is collected in a separate container that is emptied manually. In some embodiments, the vacuum motor of the robot is used in reverse in combination with a small heating element to dry the mopping pads using hot air flow after draining the dirty water and/or cleaning solution from the mopping pads. In some embodiments, a washing and draining area of the maintenance station is equipped with a removable tray that is manually cleaned periodically.

In some embodiments, sensors of the maintenance station recognize and guide the robot to the maintenance station for recharging, sensing whether containers need refilling or emptying, recognizing whether filters need to be cleaned, etc. In embodiments, the user interface of the maintenance station displays indicators including charging, fully charged, emptying the dustbin, dustbin emptied, cleaning, mopping pad cleaned, refilling the container (of the mopping module), container (of the mopping module) refilled, and clean the filters. In the case of the built-in maintenance station, it is important the indicators are visible on the maintenance station despite the robot also displaying the indicators, as in some instances the robot is positioned on the maintenance station beneath cupboards and indicators on the robot cannot be seen (e.g., when charging or emptying the dustbin). In some embodiments, the indicators are displayed by the application of the communication device. For at least some of the indicators the application alarms the user by sending notifications to the communication device. In some embodiments, the maintenance station includes a storage space for storing robot accessories and spare parts (e.g., extra brushes, mopping pads, cleaning tools, etc.). The storage space may be a separate compartment or part of the cabinets with a separate access point.

In some embodiments, the robot is part of the built-in robot and maintenance station system. For example, the mopping robot and the vacuum robot may be separate robotic devices such that they may each perform more specialized tasks in different frequencies. The mopping robot may include different modes, such as dry mop, wet mop, and steam mop modes while the vacuuming robot may perform wet vacuuming (i.e., vacuuming liquids) and dry vacuuming. In some embodiments, the mopping robot and vacuum robot work and communicate with one another to clean the environment. For instance, the vacuum robot may wet vacuum an area in which a liquid spill occurred, after which the vacuum robot may inform the mopping robot of the spillage and the mopping robot may steam mop the area in which the liquid spill occurred. In cases wherein the mopping robot is configured to perform steam mopping, the mopping robot comprises a water tank as well. During operation, the water within the water tank of the mopping robot is heated to a temperature of approximately 120 degrees Celsius then is passed to microfiber mopping pads through one or more steam jets, moistening the pads and the floor. In some embodiments, a carpet cleaning robot is part of the built-in robot and maintenance station system. Unlike the mopping robot, the carpet cleaning robot targets carpeted areas and uses a mix of shampoo and water or steam to clean the carpeted areas. After washing the carpeted areas, the carpet cleaning robot vacuums the washed areas to remove liquid and dry the carpeted areas. In some embodiments, the carpet cleaning robot has a deep clean and/or a spot clean mode to target stains on a particular spot on the carpet. The carpet cleaning robot may clean carpeted areas using several passes and a higher vacuum power to fully extract the liquids from the washed carpeted areas. In some embodiments, the carpet cleaning robot has a thorough clean mode, wherein cleaning (i.e., washing and vacuuming) is performed in a single continuous pass. In some embodiments, the mopping robot and the carpet cleaning robot may be combined into a single robotic device.

In some embodiments, rather than using one maintenance station configured to automatically empty the dustbin of the robot, a central vacuum system is used. A central vacuum system is especially useful for multistory buildings, wherein specific inlets may be placed on each floor for emptying the dustbins of one or more robots on each floor. Each inlet may be connected to a network of pipes connected to a strong vacuum motor disposed within a utility room or another area of the environment. The vacuum motor creates suction to suck dust and debris from the dustbin of the robot into a large dustbin container via the network of pipes. After a run and/or when the dustbin of the robot is full, the robot autonomously connects an outlet of the dustbin to a nearest inlet. The central vacuum motor sucks the dust and debris from the dustbin of the robot. The vacuum motor of the central vacuum system may continuously run or may detect when a robot is connected to one of the inlets, upon which the vacuum motor is triggered to run until the robot is disconnected from the inlet. A maintenance station for recharging, washing mopping pads, refilling a clean water container, etc. may be present elsewhere within the environment. In some embodiments, the auto empty inlet may be combined with charging pads as well so the robot can stay there after emptying the dustbin to recharge. In some embodiments, the maintenance station is connected to the central vacuum system, wherein the dust and debris is sucked into the large dustbin container of the central vacuum system.

The built-in robot and maintenance station system may include a control panel for setting operational schedules of the robots, accessing information relating to the robots, and controlling the robots manually. The control panel may be attached to one of the cabinets surrounding the maintenance station or may be integrated into a smart home control panel.

Using the application or the control panel, the user may access information such as statistics relating to past operational sessions. Examples of statistics relating to a past operational session include a time a robot deployed from the maintenance station, a duration of the operational session, areas covered (e.g., provided numerically and/or displayed as highlighted areas within the map), a number of cycles (i.e., a number of returns to the maintenance station during one run), etc. Additional examples of information that may be accessed using the application or the control panel include a number of times a dust bin of the robot has auto emptied since a last time a dust bin of the maintenance station was emptied, an indication of an amount of space or volume used or remaining in the dust bin of the maintenance station, an indication that the washing area of the maintenance station needs cleaning, an indication that the filters of the maintenance station need cleaning, an indication that the filters of the robot need cleaning, a status of a dirty water tank of the robot (e.g., an indication of an amount of space or volume used or remaining or an indication that the tank needs to be emptied), a status of a clean water tank of the robot (e.g., an indication of an amount of clean water used or remaining or an indication that the tank needs to be refilled), etc.

In some embodiments, the user accesses, modifies, and/or adds operational scheduling information of the robot using the application or the control panel. The user may access scheduling options to choose days of the week to operate the robot, time of the day to operate the robot for each selected operational day, areas within which the robot is to operate for each selected day and an order of cleaning the selected areas, etc. The user may specify the areas within which the robot is to operate and their cleaning order or the robot may prioritize cleaning of areas and the order in which areas are cleaning automatically based on the labels associated with areas of the environment. For example, the robot may begin with cleaning areas labelled as bedrooms and living rooms, wherein floors are typically cleaner, using freshly cleaned mopping pads and with an empty dustbin. The robot may then finish with cleaning areas labelled as kitchen and bathrooms, which typically require deeper and more frequent cleaning, before going back to the washing area of the maintenance station to clean the mopping pads. The user may choose for the robot to return to the maintenance station between cleaning of certain areas using the application or the control panel. This ensures the robot is cleaning using new or cleaned mopping pads before cleaning certain areas.

In some embodiments, the control panel is equipped with a direct voice assistant such the user may audibly call the robot to action. In some embodiments, the built-in robot and maintenance station is connected to a smart home system and is audibly called to action using a voice assistant (e.g., Google Home or Amazon Alexa) of the smart home system. The direct voice assist may be triggered by voice prompt such as "hey robot" (or a name of the robot set using the application or control panel), followed by commands such as "start cleaning", "mop the kitchen" (i.e., the area labelled as kitchen within the map), "vacuum the living room", "clean the bedroom", "go back to the maintenance station", etc. When a smart home assistant of another system is used to audibly call the robot to action the user first wakes the smart home assistant prior to commanding the robot to perform a task. For example, the use may wake a smart home assistant of another system and command the robot using a voice prompt such as "hey Google, ask the robot to clean the bedroom" or "Alexa, tell the robot to clean the bathroom".

Figure 1:
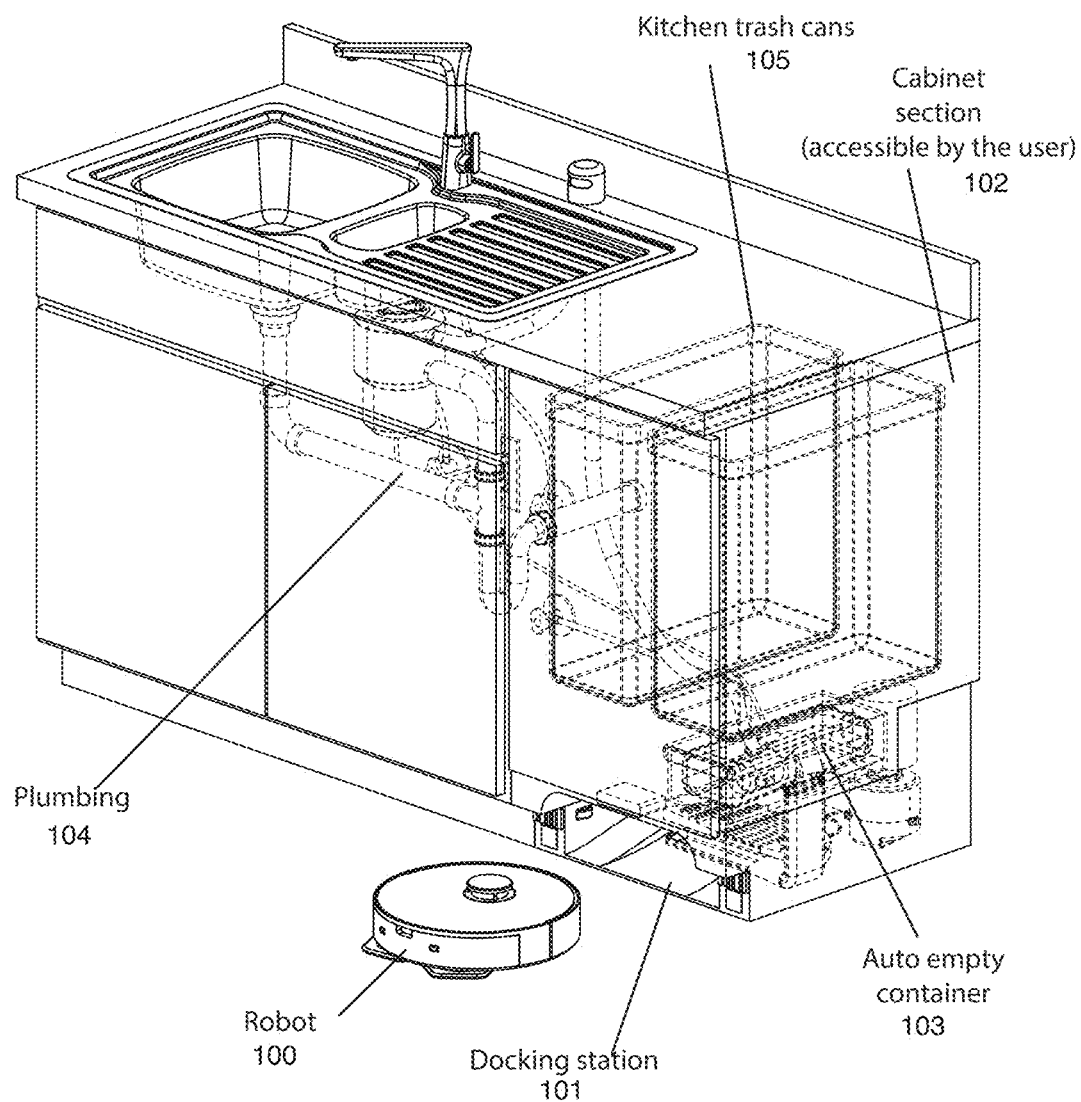
FIGS. 1-6 illustrate examples of a built-in or standalone robotic vacuum maintenance station.
Figure 2A:
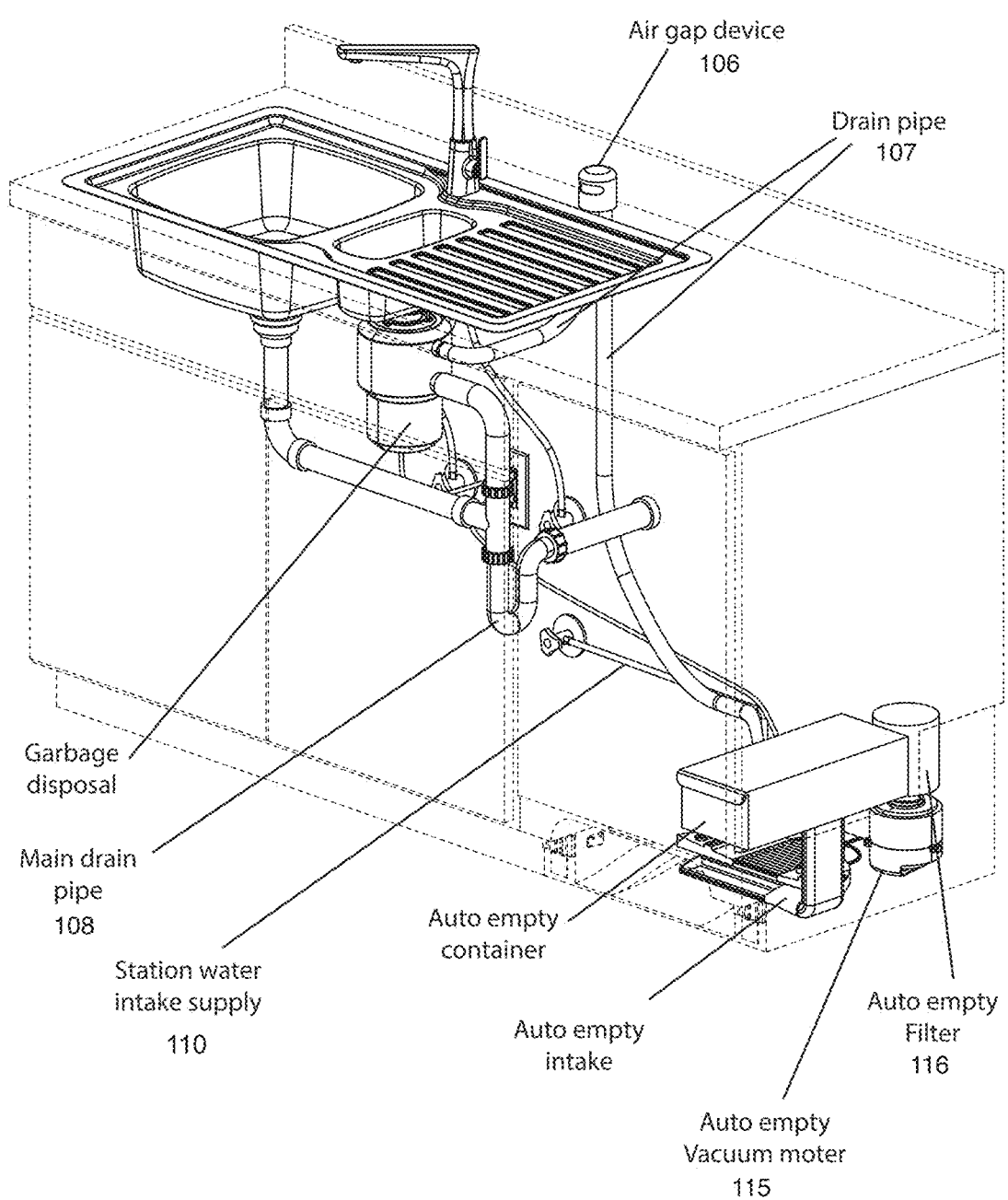
Figure 2B:
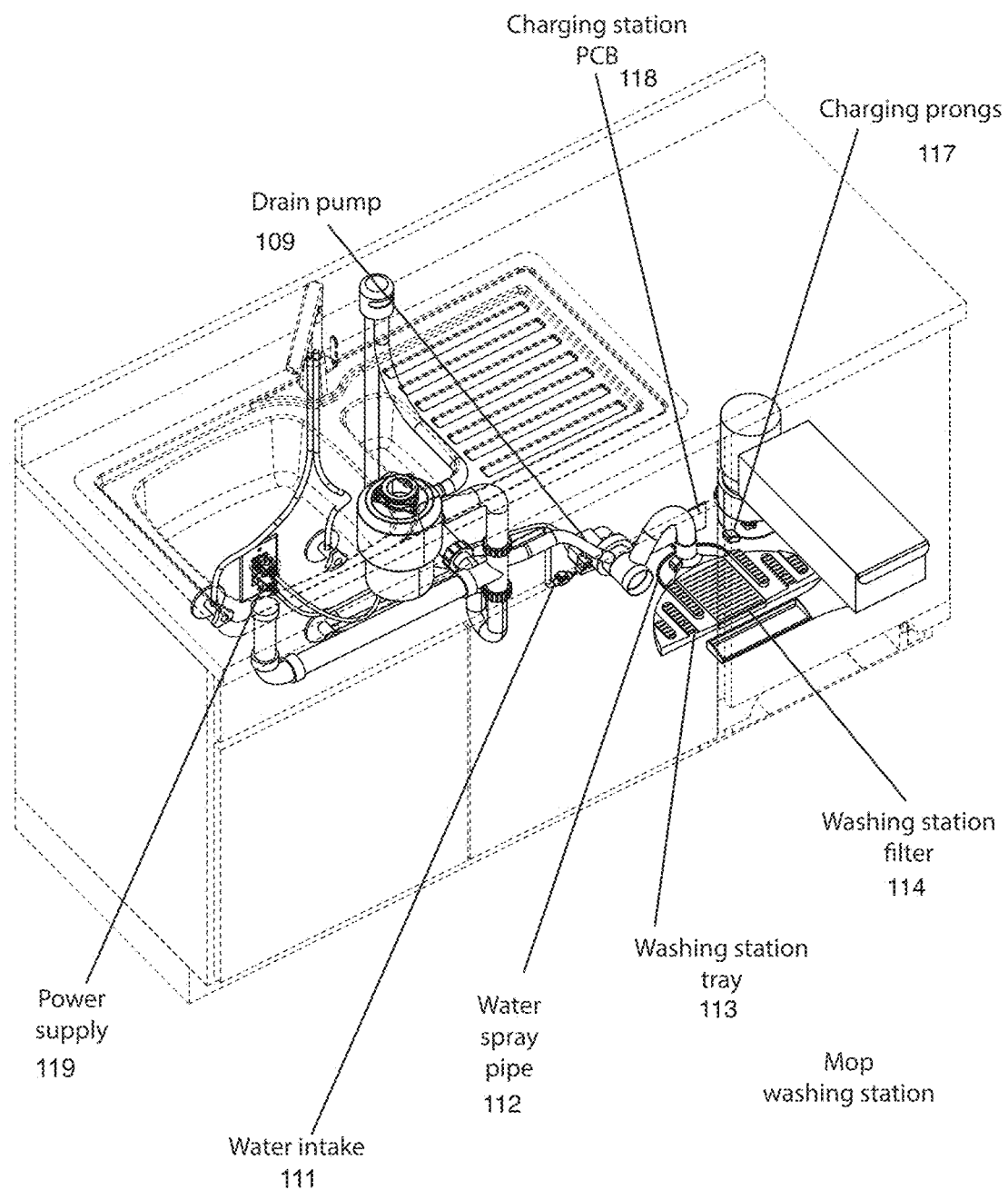
Figure 3:
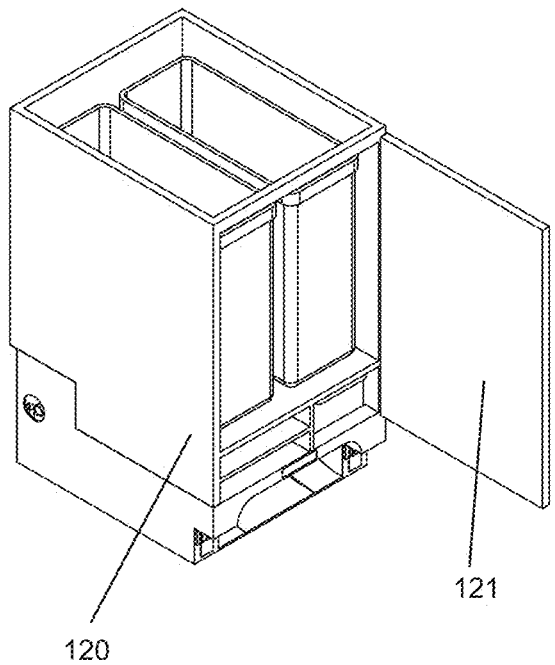
Figure 4:
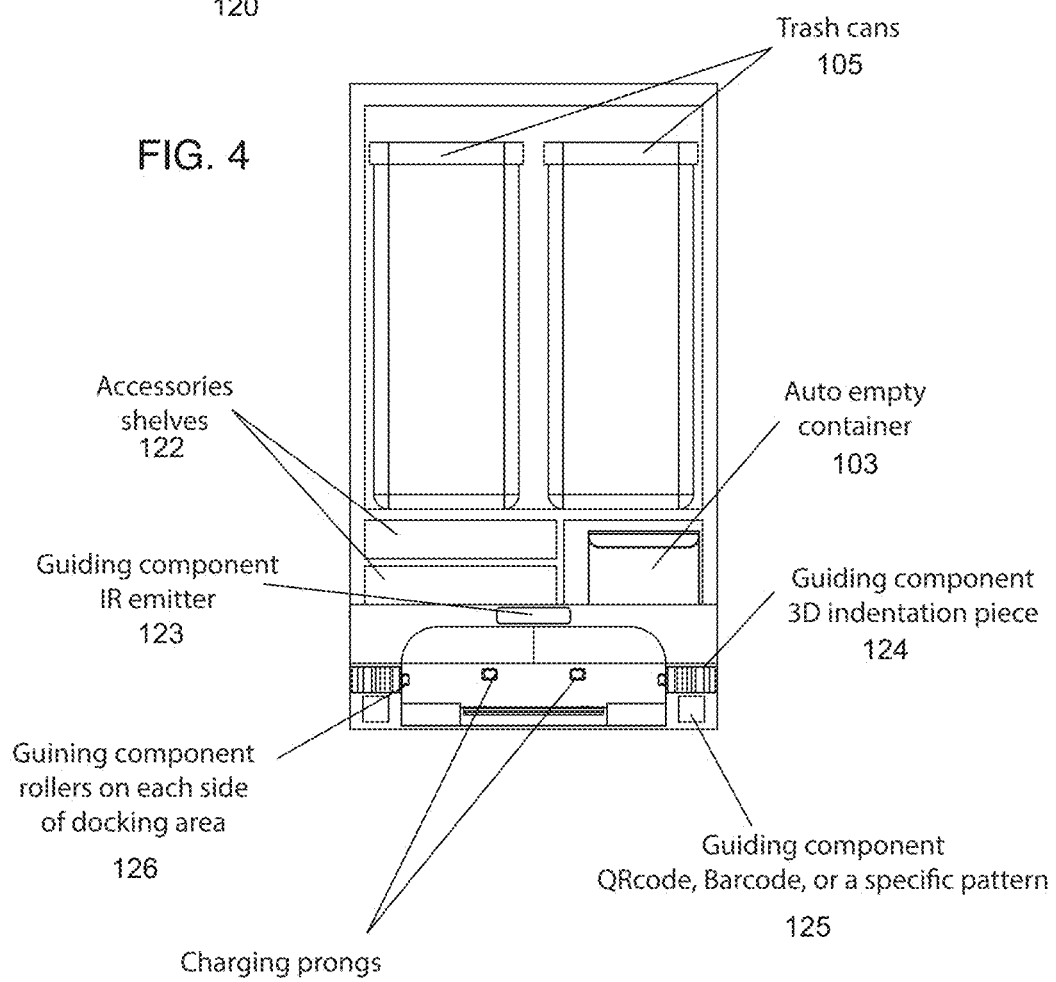

FIG. 1 illustrates an example of a built-in robotic floor cleaning system including a robot 100 and a corresponding docking station 101. The docking station 101 is built into the cabinet 102 and includes a mechanism for automatically emptying a dustbin of the robot 100 into a container 103 of the docking station 101. The docking station 101 also includes a washing station for washing a mopping pad of the robot 100. The washing station is directly connected to plumbing 104 for direct access to water. The docking station 101 also includes a mechanism for emptying dirty drained from washing the mopping pad directly into a drain pipe of the kitchen. The mechanism for emptying the dustbin of the robot 100 may be directly connected to the kitchen trashcans 105 such that contents from the container 103 of the docking station 101 may be emptied into the trashcans 105. FIGS. 2A and 2B illustrate connections between components of the mop washing station of the docking station 101 and the plumbing system of the kitchen. An air gap device 106 is connected to drain pipes 107. The drain pipes 107 drain dirty water removed during washing of the mopping pad directly into the main drain pipe 108 of the kitchen by suction of the dirty water using a drain pump 109. A main water supply 110 is connected to water intake 111 which deliver water to a water spray pipe 112 for cleaning the mopping pad. The mop washing station includes a washing station tray 113 and a washing station filter 114. The mechanism for emptying the dustbin includes a vacuum motor 115 for creating suction and a filter 116. The docking station 101 also includes charging prongs 117 for charging the robot 100 and a docking station PCB 118. The docking station 101 operates using power supply 119. FIGS. 3 and 4 illustrate a cabinet section 120 within which the docking station 101 is built. An inside of the cabinet section 120 is accessible using a front door 121 behind which trashcans 105, the docking station container 103, and robot accessories 122 are stored. In some embodiments, the cabinet section 120 may be a drawer, translating in an outwards direction when the door 121 is opened. FIG. 4 further illustrates guiding components for guiding the robot 100 to and aligning the robot 100 with the docking station 101. Guiding components includes an IR emitter 123, a structure 124 with a unique surface indentation pattern recognizable by the robot 100, a QR code or barcode 125, and physical guiding rollers 126. The use of such guiding components is described in detail above. In different embodiments, one or more of the guiding components are used.

Figure 5:
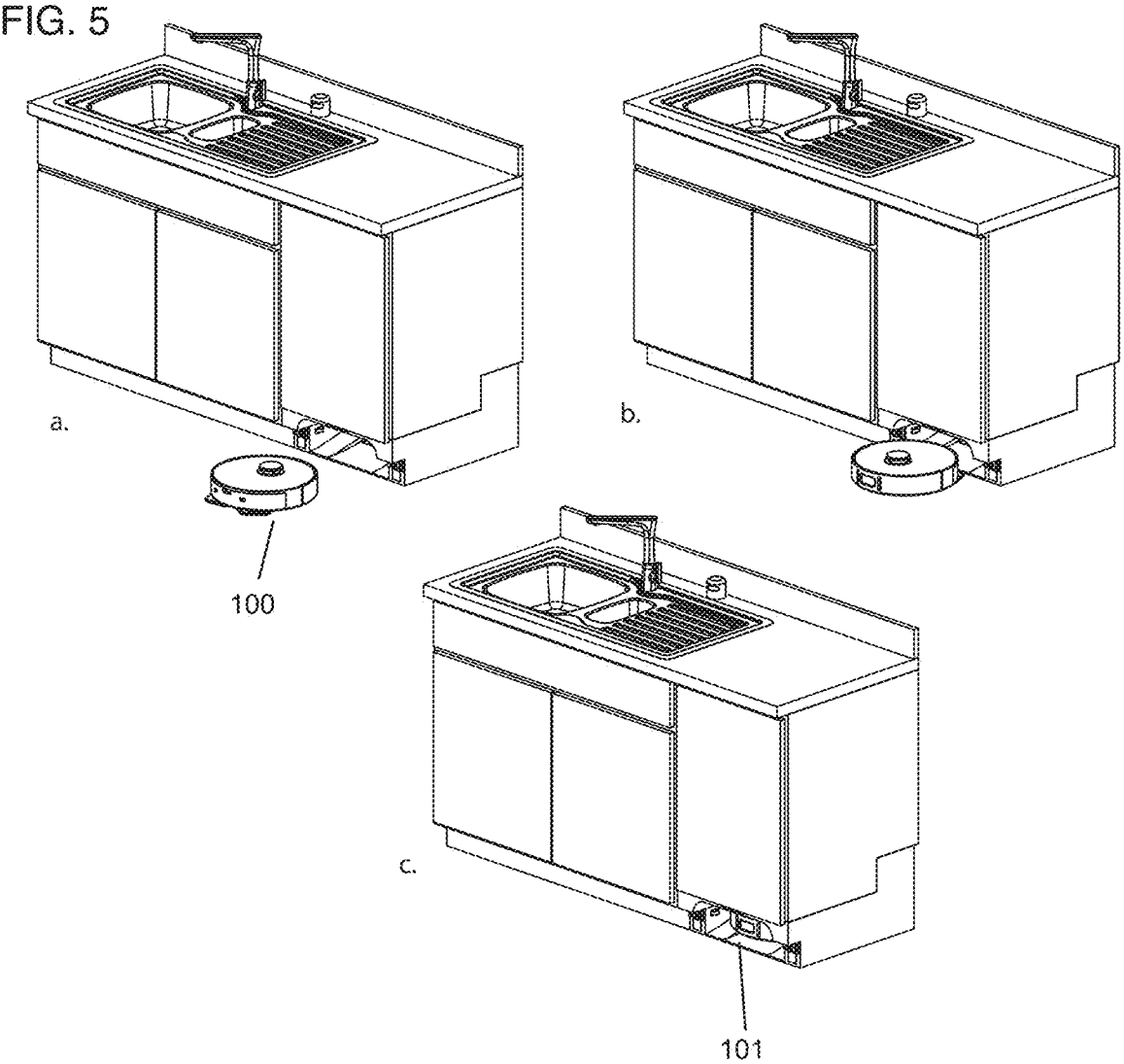
Figure 6:
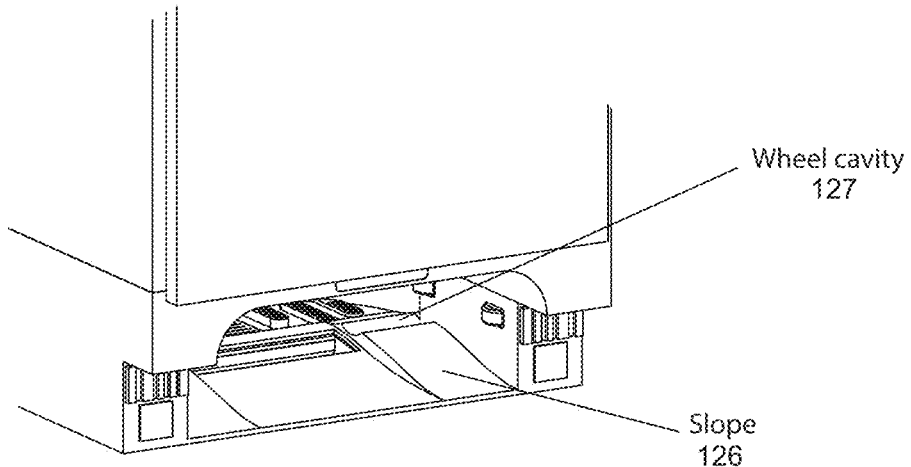

FIG. 5 illustrates the robot 100 approaching the docking station 101 and docking. The robot 100 approaches the docking station 101 forward facing as the majority of object and obstacle detection sensors are positioned in a front portion of the robot 100 (a). Once the robot 100 aligns with the dock 101 using the guiding components 122-125, the robot 100 rotates 180 degrees in place (b). The robot 100 then docks by driving in a backwards direction into the docking station 101 (c) such that the mopping module is positioned over the washing station of the dock 101 and charging prongs of the robot and charging prongs 117 of the dock 101 are aligned. FIG. 6 illustrates upward slopes 126 disposed on a front portion of the docking station 101 for elevating the robot 100 above the washing station. Wheel cavities 127 positioned each wheel of the robot 100 in the desired location.

Figure 7:
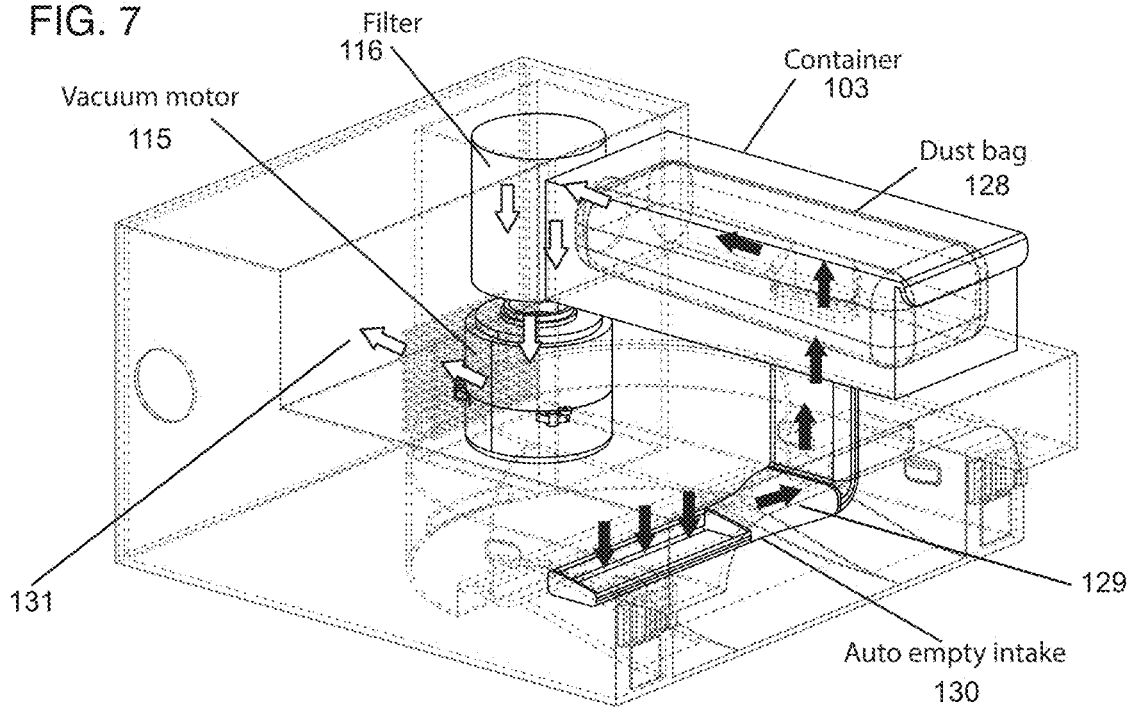
FIGS. 7-12 illustrate an internal view of an example of a built-in or standalone robotic vacuum maintenance station.
Figure 8:
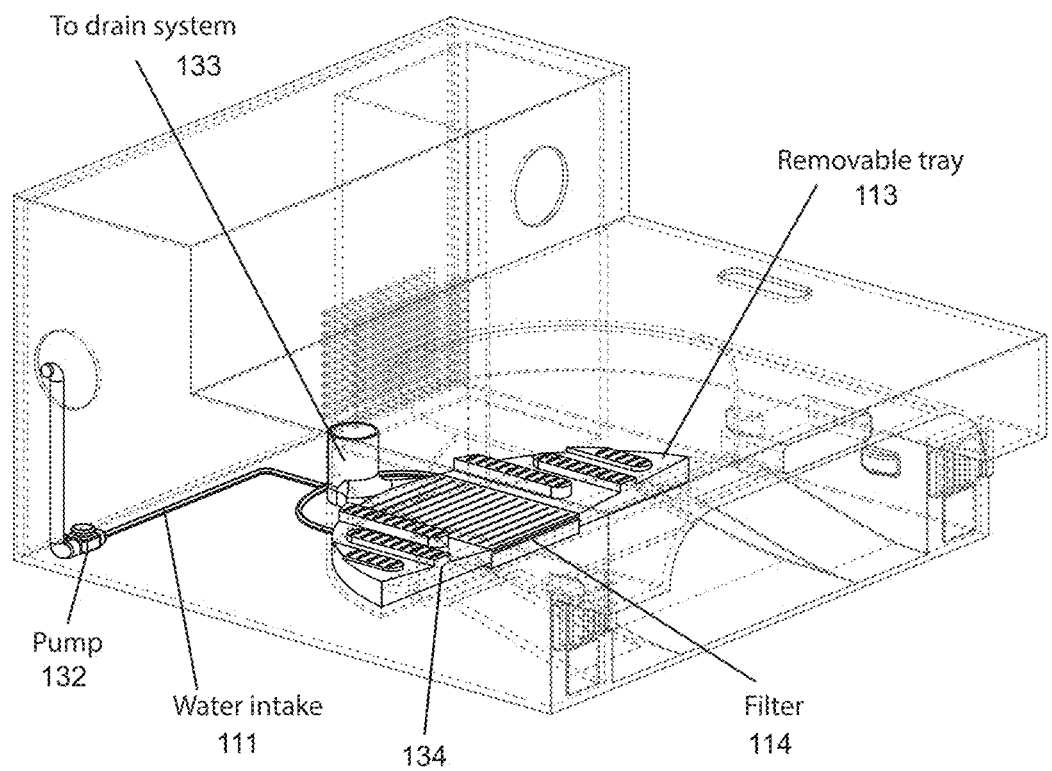
Figure 9:
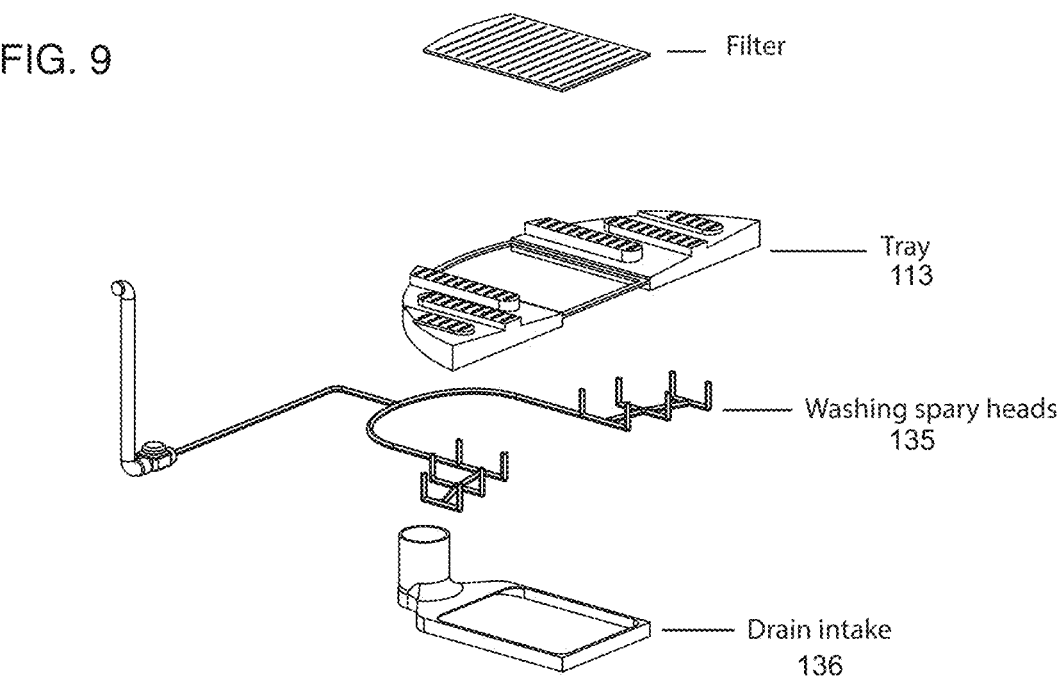
Figure 10:
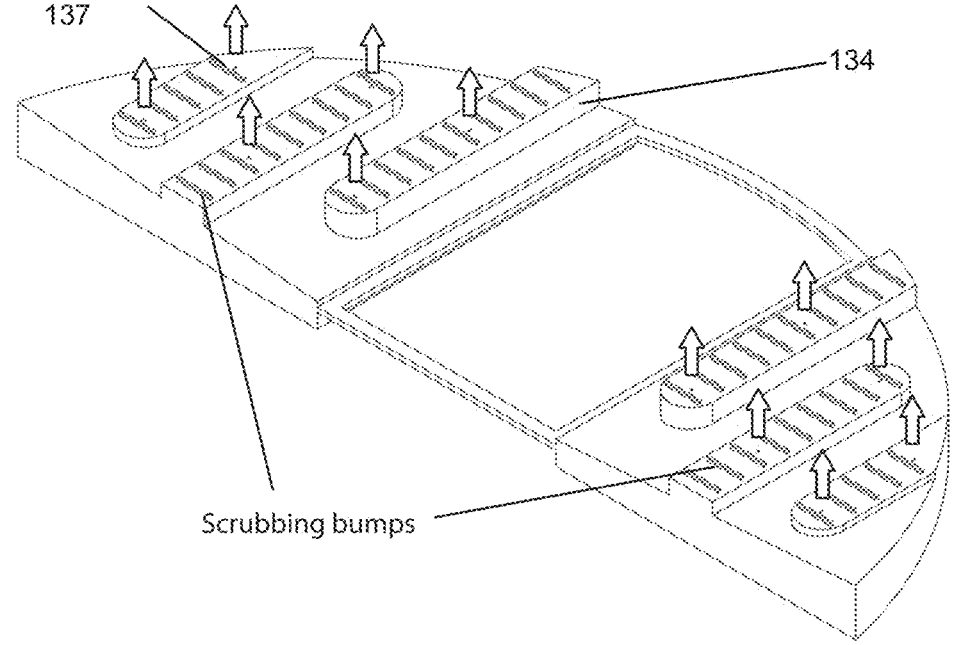
Figure 11:
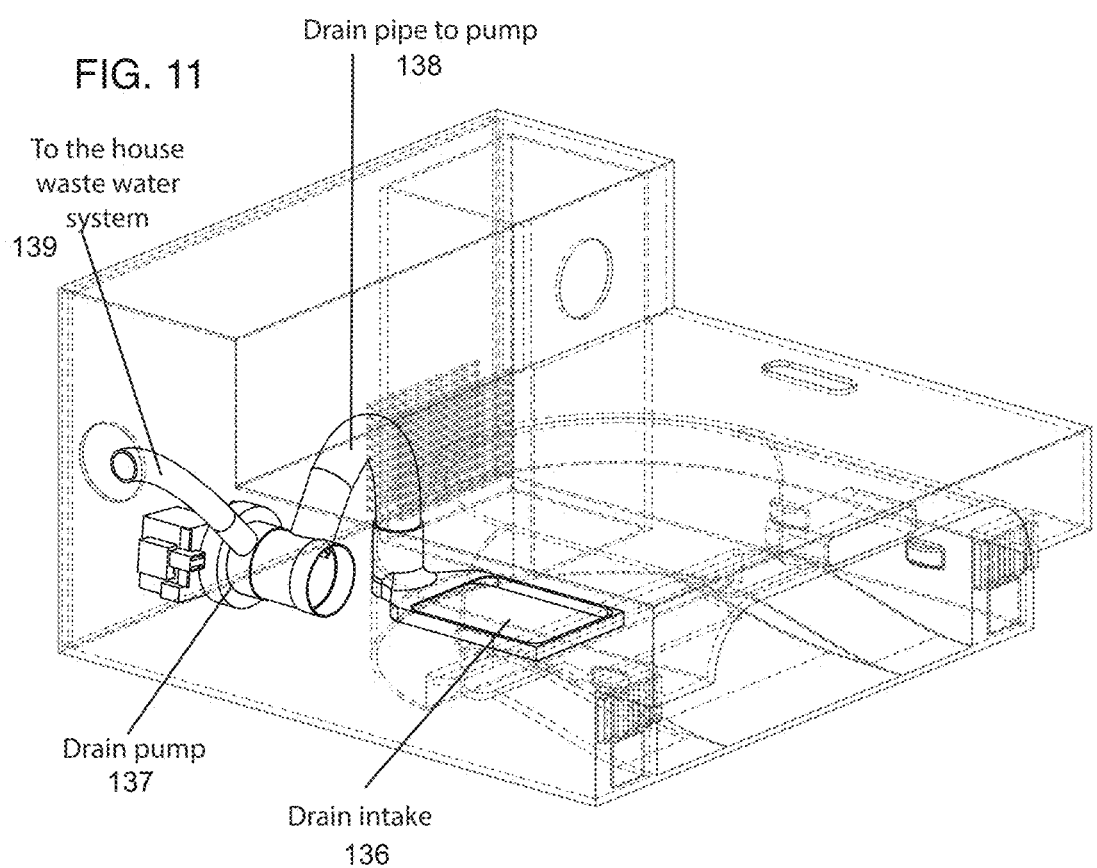
Figure 12:
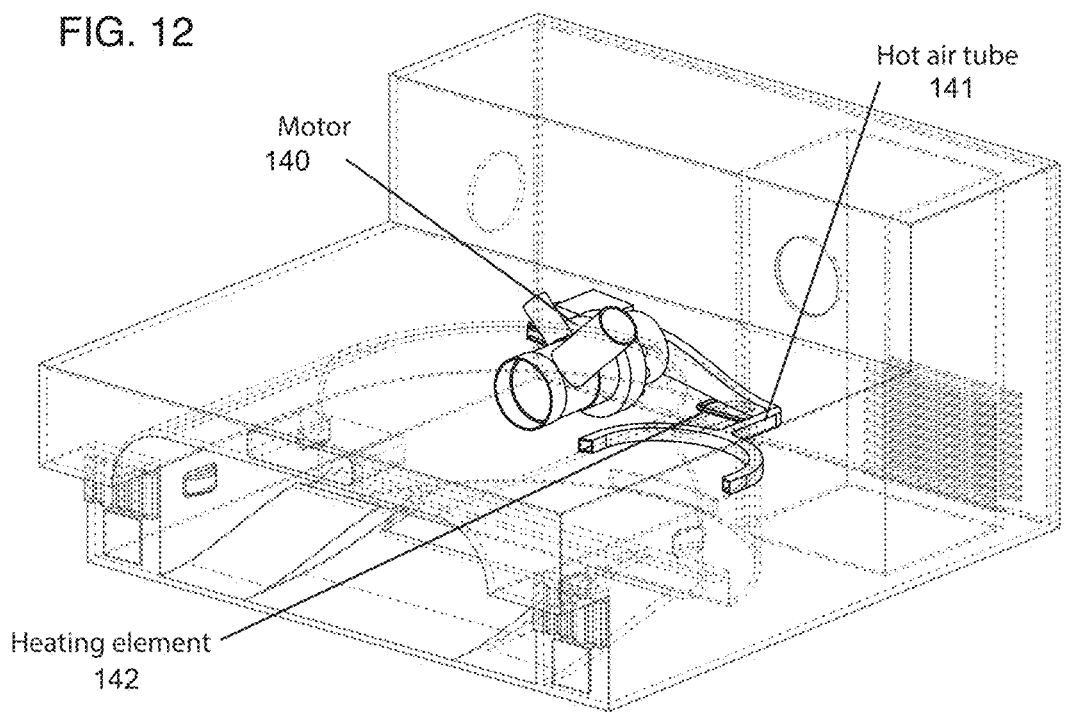

FIG. 7 illustrates the mechanism for automatically emptying the dustbin of the robot 100 including vacuum motor 115, filter 116, and container 103. In this embodiment, a disposable dust bag 128 is placed within the container 103, however, in some embodiments dust and debris may be collected directly within the container 103. In some embodiments, the dust bag 128 may be reusable. A path of air flow 129 from an intake 130 to the container 103, filter 116, vacuum motor 115, and out a rear vent 131 is shown. The intake 130 of dust and debris is disposed below the robot 100 when docked, however, in some embodiments the intake 130 may be disposed above, to the side or behind the robot 100 when docked. FIG. 8 illustrates the washing station for mopping pads of the robot 100 including the water intake 111 which delivers water to the water spray pipe 112 for cleaning the mopping pad, the pump 132 for drawing the water, the removable tray 113, and the filter 114. The drain system 133 is connected to drain pipes 107 of the kitchen. In this example, the washing station is stationary, and during the washing process, the rotational mopping pads of the robot 100 are spun as water is sprayed upwards from the tray 113. As the mopping pads are spun they scrub against protruding structures 134 disposed on the tray 113 to scrub dirt off of the mopping pads. FIG. 9 illustrates an exploded view of the components of the washing station shown in FIG. 8 in addition to the washing spray heads 135 through which water sprays upwards and drain intake 136. FIG. 10 illustrates the protruding structures 134 disposed on the tray 113 and openings 137 through which water sprays upwards from the spray heads 135. Both the tray 113 and the filter 114 are removable for cleaning. Each side of the tray 113 is sloped towards the center to guide the dirty water into the drain intake 136. FIG. 11 illustrates the drain system 133 of the washing station including the drain intake 136 connected to a drain pump 137 via pipe 138. The drain pump 137 is also connected to the waste water system of the kitchen via pipe 139. FIG. 12 illustrates an embodiment wherein exhaust air from a motor 140 of the drain pump 137 dries the washing station and the mopping pads of the robot 100. Exhaust air is redirected back to the washing station via the hot air tube 141 and a heating element 142 increases a temperature of the air.

Figure 13:
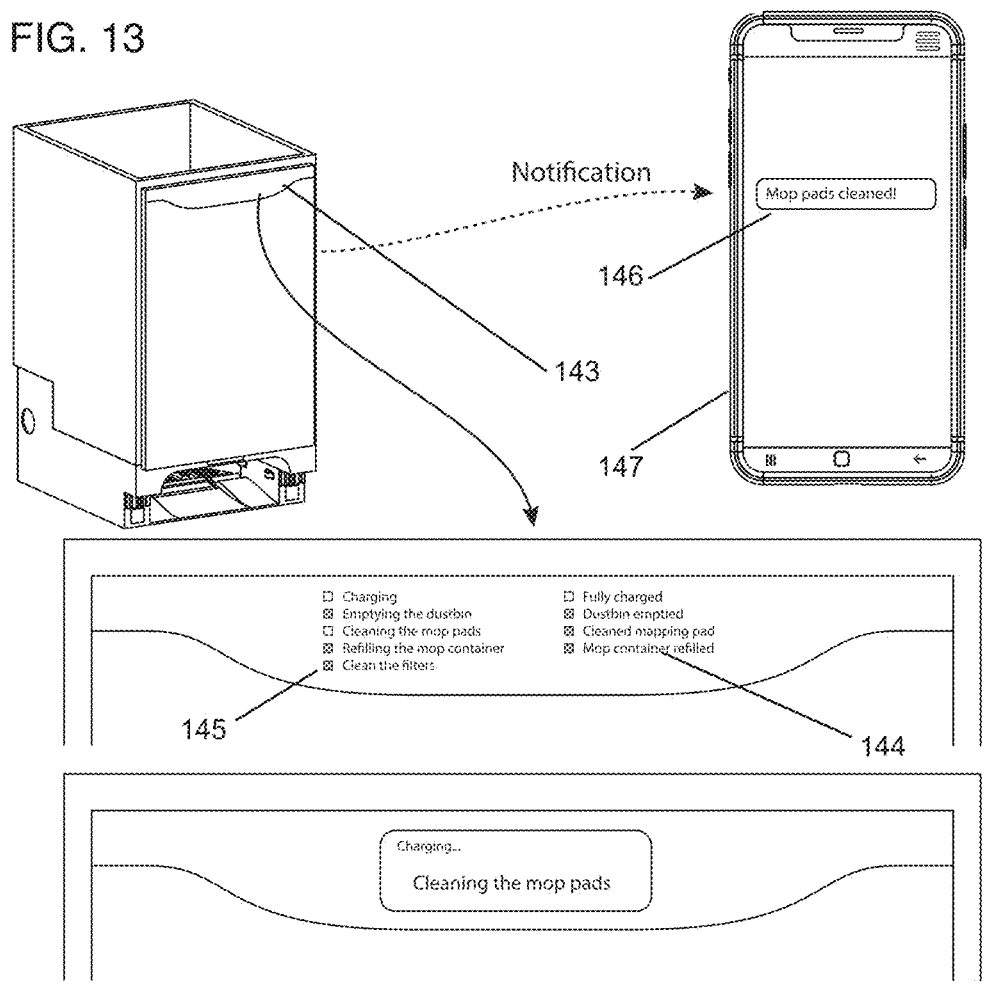
FIGS. 13 and 14 illustrate a built-in or standalone robotic floor vacuum maintenance system sending wireless indicators conveying tasks in progress or finished to a communication device.
Figure 14:
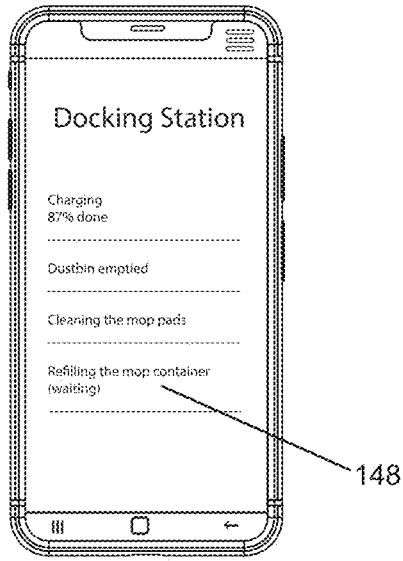

FIG. 13 illustrates a UI 143 of the docking station 101. The UI 143 is disposed on the front door 121 such that it is visible to a user. The main function of the UI 143 is to display indicators 144 conveying tasks currently in progress or finished by the robot 100 since most of the tasks are automatic (except some periodic maintenance such as changing and cleaning filters). The UI 143 of the docking station 101 displays simple text indicators 144 with lit LEDs 145 next to indicators 144 that are highlighted. In another embodiment, the UI 143 displays current tasks 145. The docking station 101 transmits notifications to an application 146 of a communication device 147 when a task is completed. FIG. 14 illustrates the application 146 displaying task states 148 (e.g., done, in progress, waiting, etc.) of the docking station 101.

Figure 15:
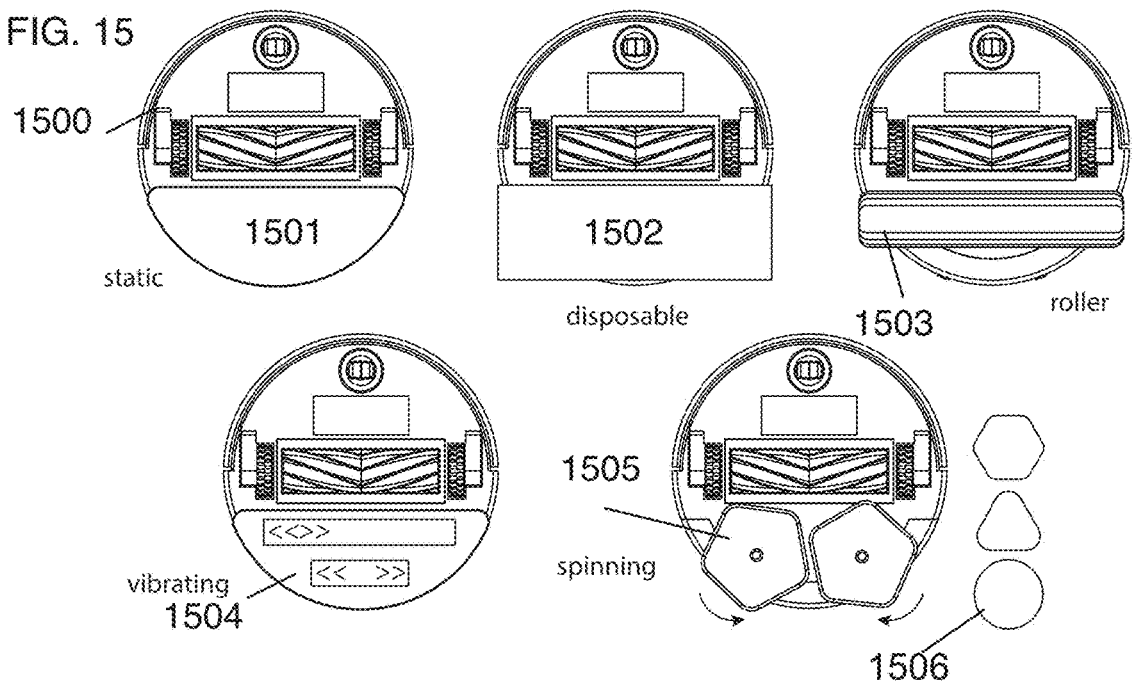
FIG. 15 illustrates examples of different types of mopping modules of a robot.
Figure 16:
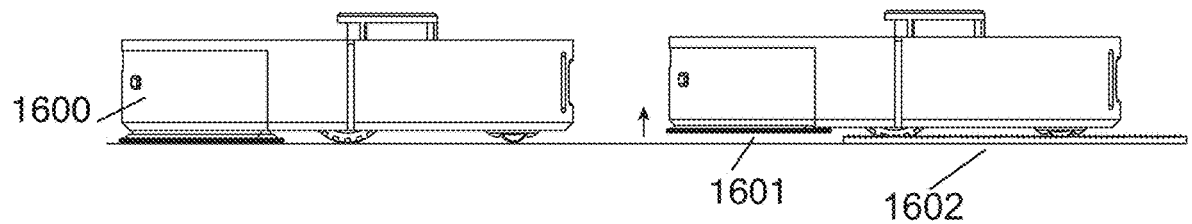
FIGS. 16-17 illustrates a side-view of a mopping module of a robot equipped with a lifting mechanism for raising a mopping pad.
Figure 17:
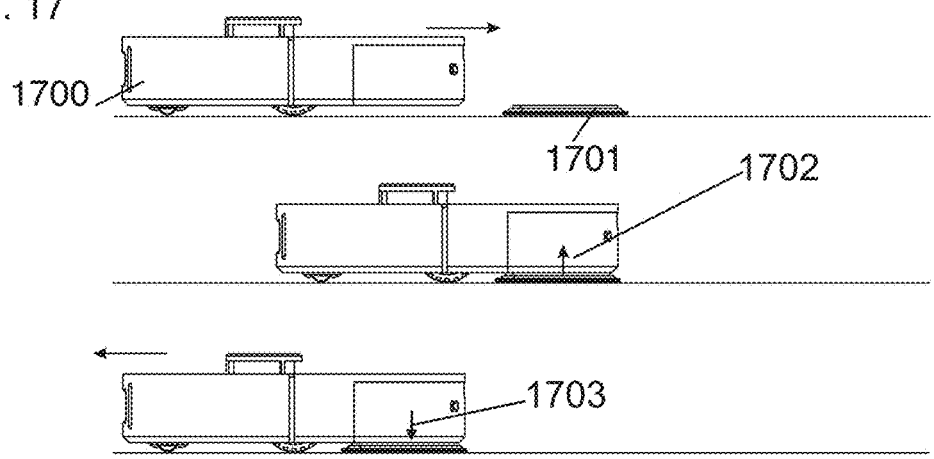

FIG. 15 illustrates different types of mopping modules of a robot 1500 including a mopping module with a static mopping pad 1501, a mopping module with a disposable mopping pad 1502, a mopping module with a roller 1503, a mopping module with a vibrating mopping pad 1504 and a mopping module with spinning mopping pads 1505 that may be of various shaped 1506. FIG. 16 illustrates a mopping module of a robot 1600 equipped with a lifting mechanism for raising a mopping pad 1601 (and some components of the mopping module) upon approaching a carpeted area 1602. Vertical movement of the mopping pad 1601 is also useful for applying downwards pressure during mopping and adjusting the height of the mopping pad 1601 for cleaning. FIG. 17 illustrates a robot 1700 driving towards a mopping pad 1701 and autonomously attaching 1702 the mopping pad 1701 and detaching 1703 the mopping pad 1701. This is useful for swappable and disposable mopping pads.

Figure 18:
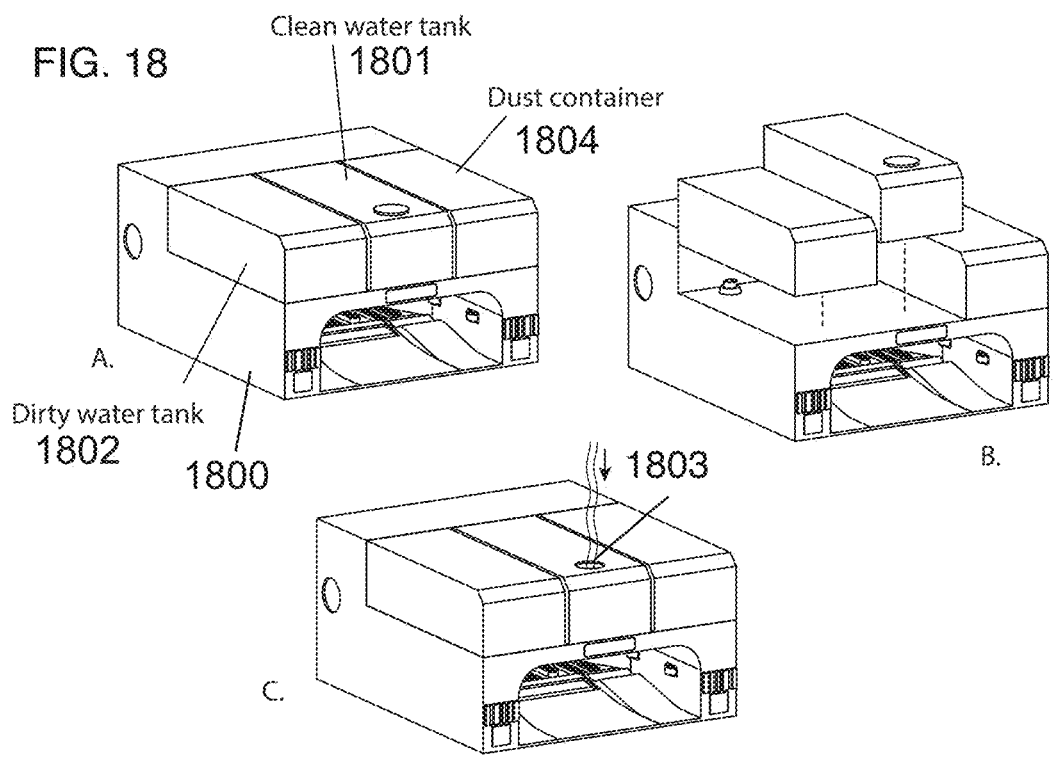
FIG. 18-21 illustrates a standalone docking station.
Figure 19:
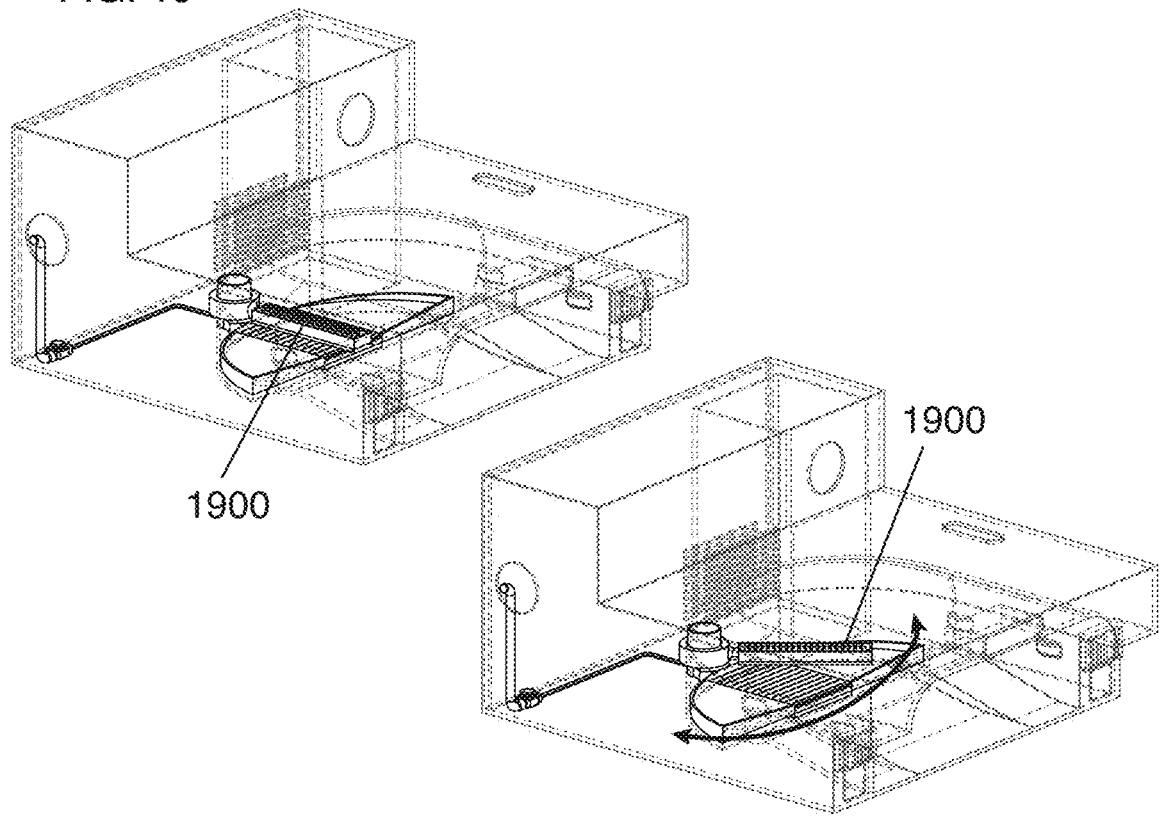
Figure 20:
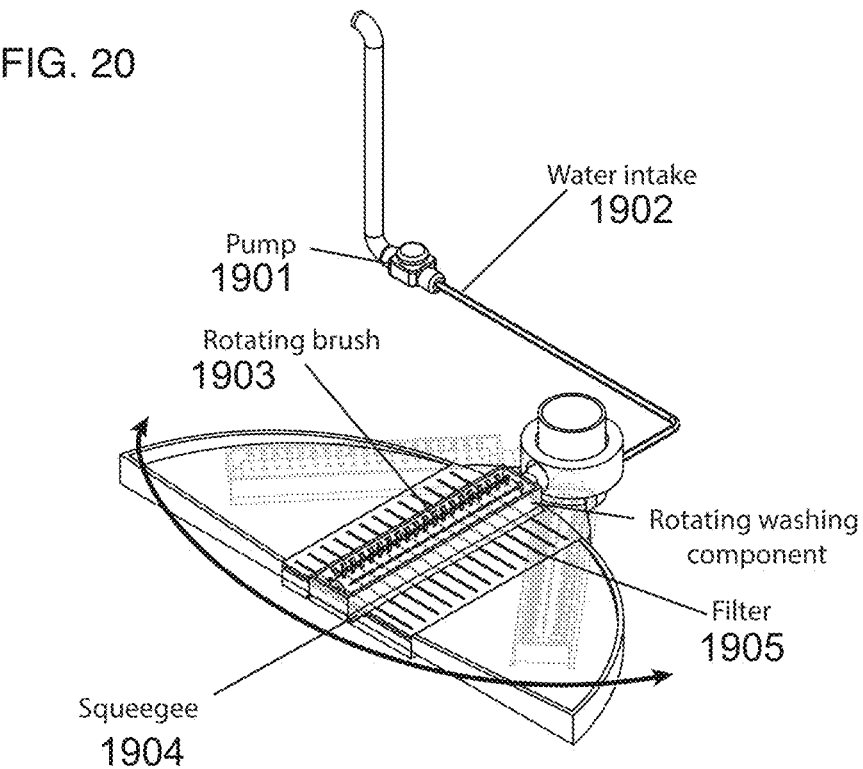
Figure 21:
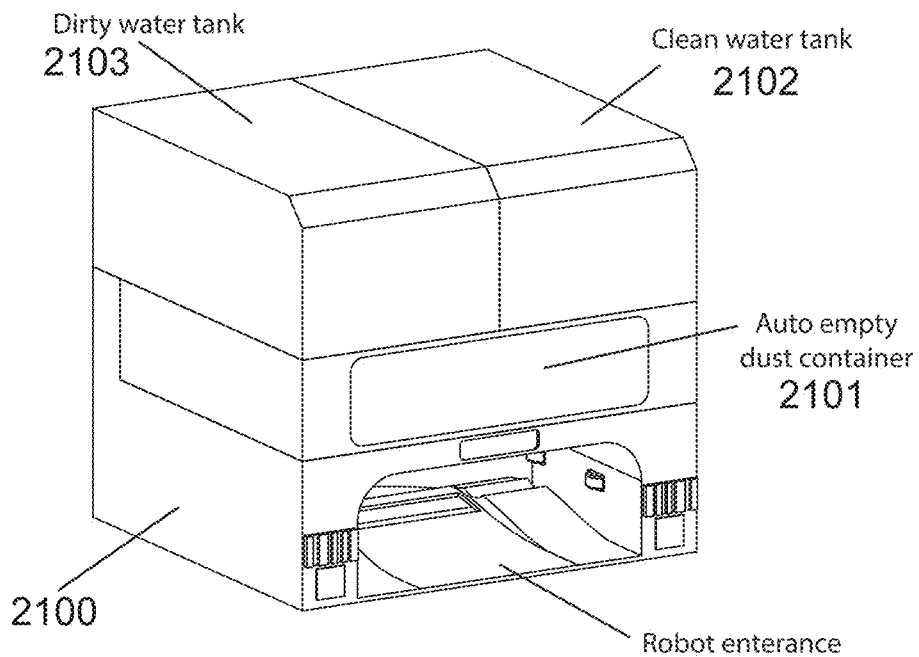

FIG. 18 illustrates a standalone docking station 1800 (i.e., disconnected from home, such as plumbing) of a robot. The docking station 1800 includes two water tanks 1801 and 1802. The tank 1801 is for clean water or cleaning solution to wash mopping pads of the robot and for refilling the mopping container of the robot (if applicable). The tank 1802 is for collecting dirty water removed from the mopping pads after washing. The tanks 1801 and 1802 are removable for cleaning and refilling, as shown in (B). In some cases, a user may refill the clean water tank 1801 without removing the tank 1801 from the docking station 1800 through hole 1803 (C). A dust container 1804 is positioned adjacent to clean water tank 1802 for collecting the debris in a dustbin of the robot. FIGS. 19 and 20 illustrate an alternate washing station, wherein a washing component 1900 moves in an oscillatory motion under the mopping pads of the robot when docked. Water is pumped via a pump 1901 upwards through the washing component 1900 via a water intake 1902 during washing of the mopping pads. A rotary brush 1903 within the washing component 1900 scrubs dirt off of the mopping pads. Squeegees 1904 guide the extracted dirty water to a filter 1905. This alternate washing station is useful for static mopping pads. FIG. 21 illustrates another variation of a standalone docking station 2100 including a dust container 2101 positioned below clean water tank 2102 and dirty water tank 2103 such that tanks 2102 and 2103 are positioned higher up for easy access. FIG. 22 illustrates a method for obtaining a clean disposable or reusable mopping pad of a robot 2200. In this method, a docking station 2201 automatically swaps a mopping pad 2202 of the robot 2200. The method includes (1) the robot 2200 approaching the docking station 2201, aligning with the dock 2201 (if necessary) and turning 180 degrees such that a side of the robot 2200 with the mopping pad 2202 enters the docking station 2201 first; (2) a mechanical plate 2203 in column 2204 lowers for positioning underneath a location of a mopping pad of the robot 2200, wherein column 2204 holds used mopping pads 2205 and column 2206 holds clean mopping pads 2207; (3) the robot 2200 positioning itself on top of the mechanical plate 2203 and detaching the used mop pad 2202; (4) a second mechanical plate 2208 in column 2206 lowering with a clean mopping pad for positioning underneath the robot 2200 as the robot 2200 moves towards a rear of the docking station 2201 to attach the clean mopping pad; (5) the robot 2200 reversing out of the docking station 2201; and (6) both mechanical plates 2203 and 2206 moving upwards to their original positions, the mechanical plate 2206 picking up a new mopping pad from mopping pads 2207 and the mechanical plate 2203 adding the detached used mopping pad to the used mopping pads 2205.

In some embodiments, the maintenance station of the robot includes a door. FIGS. 23A and 23B illustrate a front door 54000 of a maintenance station 54001 of a robot in a closed position and an open position, respectively. The door 54000 is closed when the robot is performing work and the robot is positioned inside the maintenance station 54001 for charging, emptying a dustbin of the robot, cleaning mopping pads of the robot, or other robot maintenance tasks (e.g., emptying or refilling water containers). The door 54000 reduces the noise expelled into the environment from operation of the different mechanisms inside the maintenance station (e.g., autonomous emptying of the dustbin of the robot, washing of the mopping pads of the robot, etc.) and provides aesthetics benefits. When the door 54000 is open, the door 54000 acts as a ramp for an easier entrance and exit by the robot from the maintenance station 54001. The door 54000 is opened and closed using the door motor and gearbox 54002. The maintenance station 54001 is configured to autonomously open the door 54000 as the robot is approaching the maintenance station 54001 for entry into the maintenance station 54001. The maintenance station 54001 is configured to close the door 54000 when the robot is within the maintenance station 54001 or ready to depart the maintenance station 54001 to perform work.

Figure 24A:
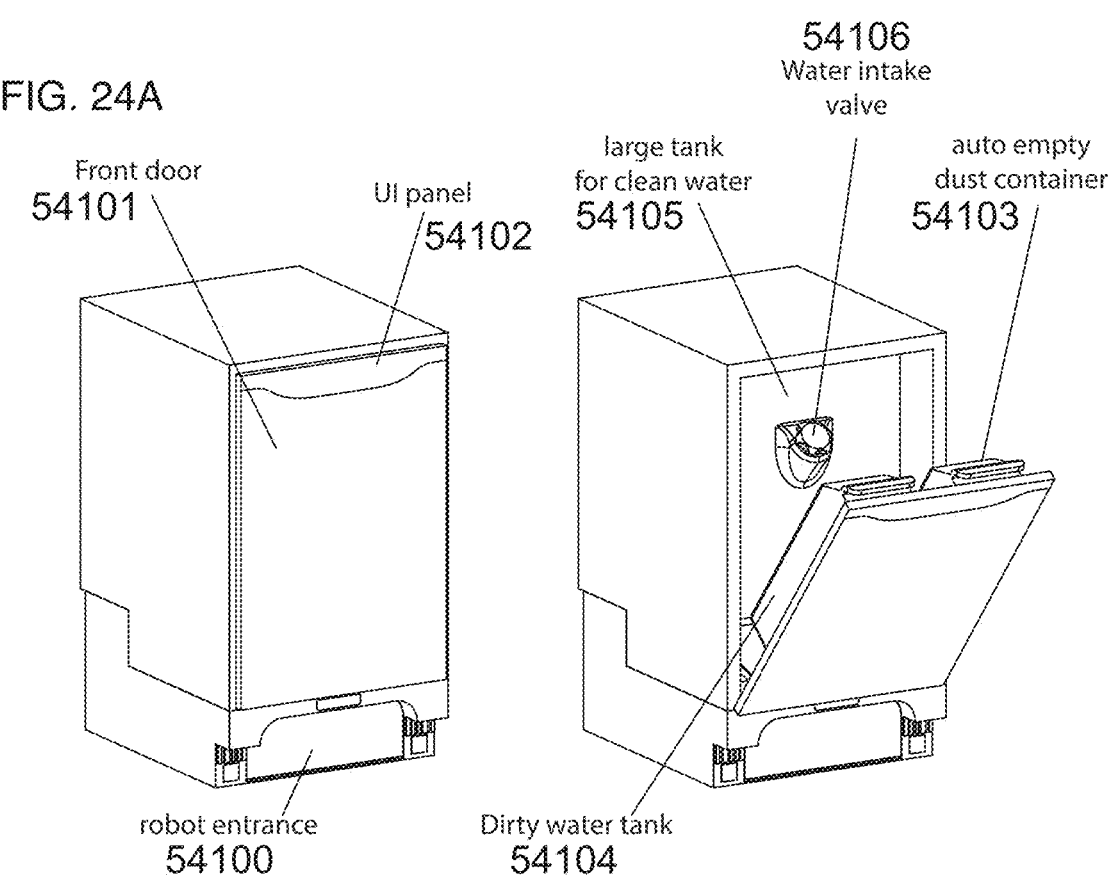
Figure 24B:
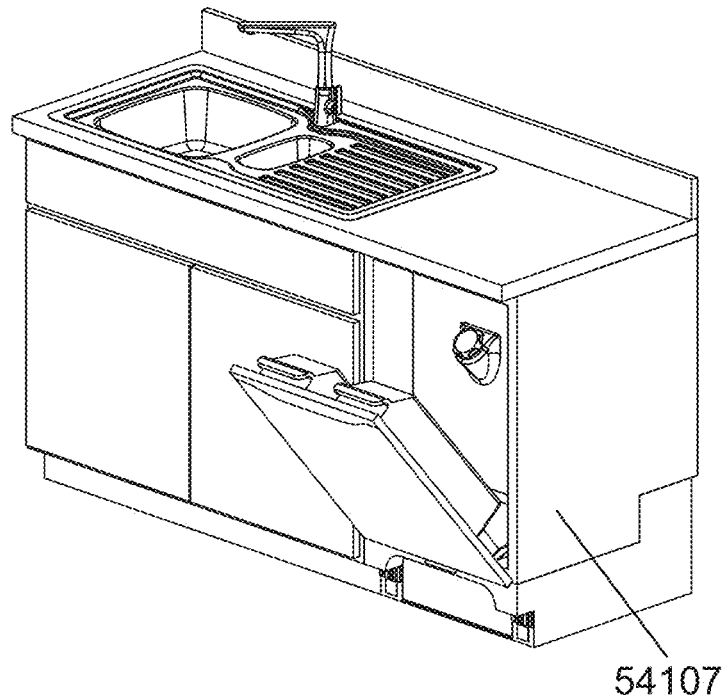

FIGS. 24A and 24B illustrate an example of a maintenance station of the built-in robot and maintenance station system. A robot enters the maintenance station using door 54100. A front door 54101 of the maintenance station includes a built-in user interface 54102. A large dust bin 54103 and dirty water container 54104 are coupled to the front door 54100. A large clean water tank 54105 is housed within the maintenance station and is refilled using water intake valve 54106. The maintenance station may be positioned within (or adjacent to) a cabinet 54107 of a kitchen or elsewhere in a house as the maintenance station does not require connection to a plumbing system of the house. The large clean water tank 54105 is able to store a large amount of clean water and as such requires refilling less frequently. The large dustbin 54103 and dirty water tank 54104 are large as well and as such require emptying less frequently.

Figure 25A:
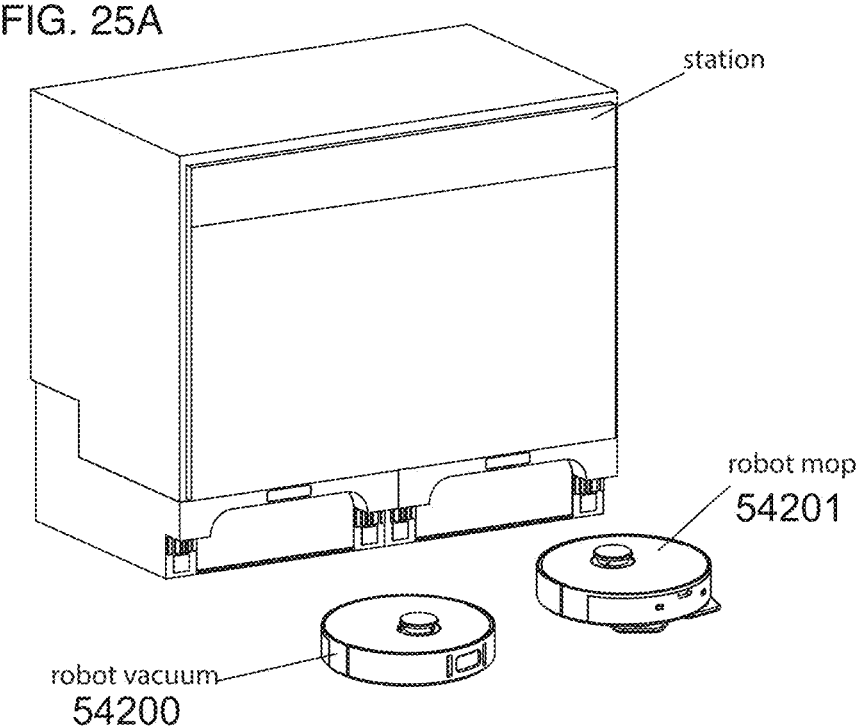
Figure 25B:
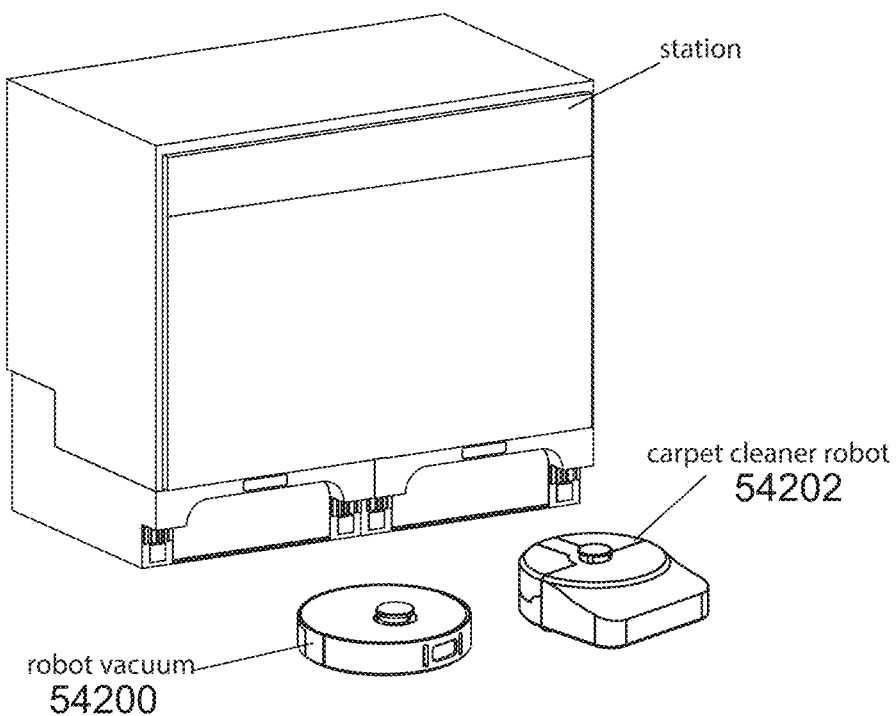

FIGS. 25A and 25B illustrate the built-in robot and maintenance station system expanded to include two separate robots. FIG. 25A illustrates a vacuum robot 54200 and a mopping robot 54201 while FIG. 25B illustrates the vacuum robot 54200 and a carpet cleaning robot 54202. In such a case, the maintenance station is equipped with respective mechanisms required to maintain each type of robot. In some embodiments, the two robots may share a same mechanism or feature of the maintenance station. For example, in the case of FIG. 25B, the vacuum robot may be configured with a wet vacuum and the maintenance station may include a single mechanism for emptying a dirty water container of both the vacuum robot 54200 and the carpet cleaning robot 54202. In embodiments, operational schedules of the two robots vary.

Figure 28:
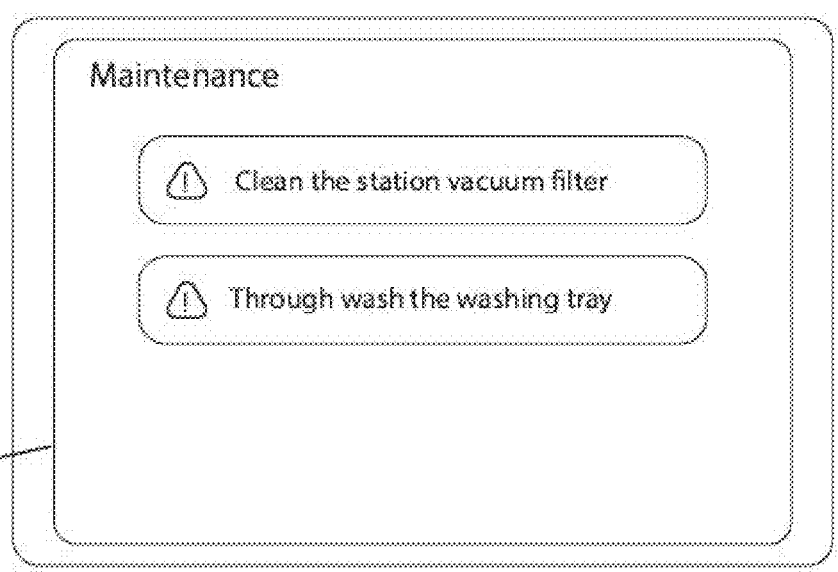
FIG. 28 illustrates a control panel of a built-in or standalone robot maintenance station displaying a maintenance page that indicates actions required to maintain a built-in or standalone robot maintenance station.
Figure 29:
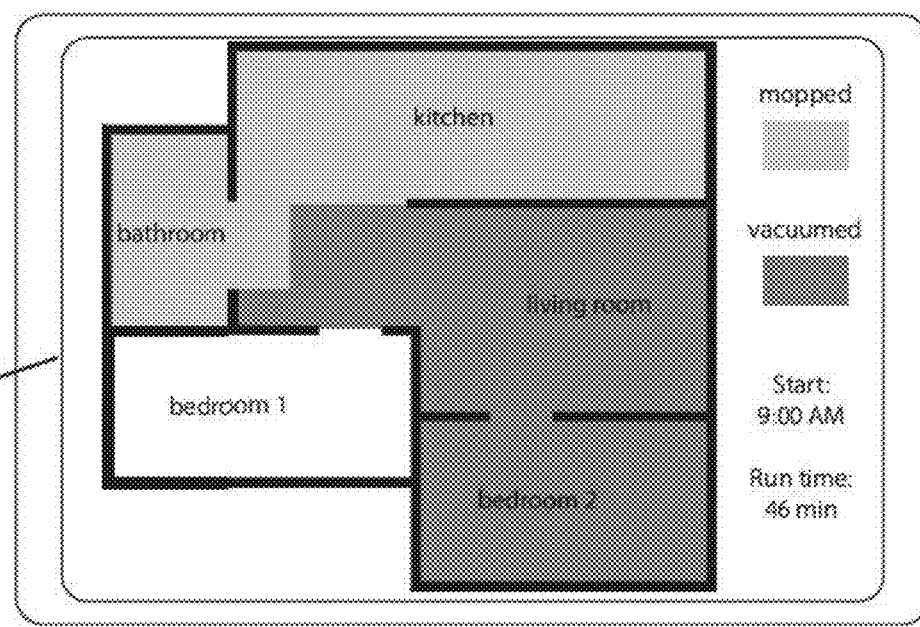
FIG. 29 illustrates a control panel of a built-in or standalone robot maintenance station displaying a coverage map page.
Figure 30:
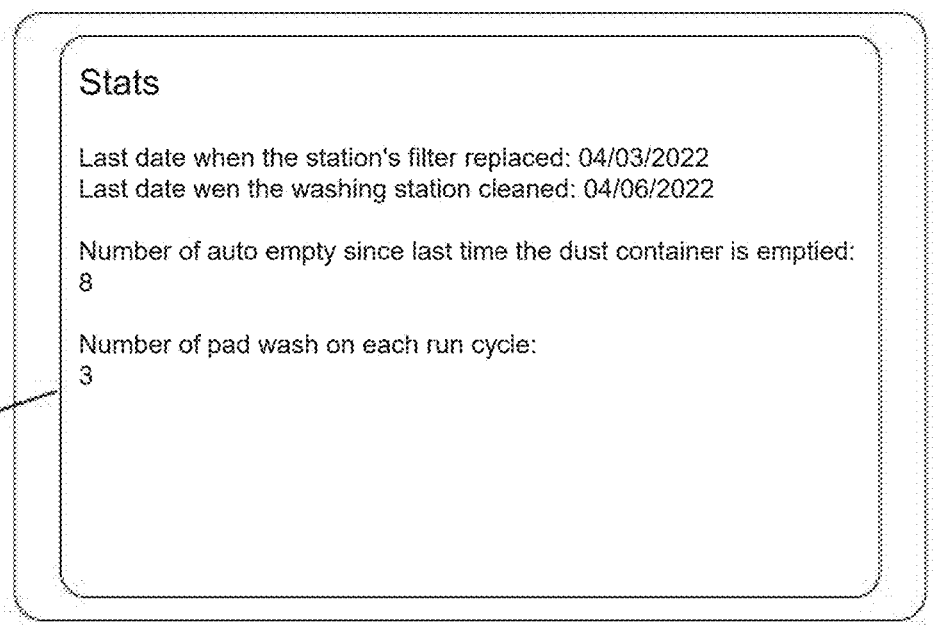
FIG. 30 illustrates a control panel of a built-in or standalone robot maintenance station displaying a statistics page.

FIG. 26 illustrates a control panel 54300 of a maintenance station. A user may access information such as scheduling, maintenance, a coverage map, and other statistics related to a robot and the maintenance station. The user may use the control panel to access similar information, adjust similar settings, etc. as is possible using the application. FIG. 27A illustrates an example of an overview page for operational scheduling for vacuuming and mopping displayed by the control panel 54400. Different days and times are selected for vacuuming and mopping. FIG. 27B illustrates the control panel displaying a page used to order rooms for cleaning for both vacuuming 54401 and mopping 54402 on a particular day, Monday in this example. FIG. 28 illustrates the control panel 54500 displaying a maintenance page that indicates actions required to maintain the maintenance station and the robot, such as cleaning a vacuum filter of the maintenance station and thorough washing of a washing tray of the maintenance station. When maintenance of the maintenance station or the robot is required, the user interface or control panel of maintenance section or the application may display a notice icon and/or the maintenance station may illuminate in a particular color. The user may use the application or the UI or panel of the maintenance station to view maintenance tasks currently required. FIG. 29 illustrates the control panel 54600 displaying a coverage map page, wherein areas of an environment mopped and vacuumed during an operational session are displayed using different colors and other information such as a start time and runtime of the operational session. FIG. 30 illustrates the control panel 54700 displaying a statistics page, wherein an overview of performance of the built-in robot and maintenance station system is provided. The user may provide input to the control panel to aid in remembering particular maintenance tasks. For example, the user may provide input designating when the user installed a new filter or brush on the maintenance station or the robot to keep track of maintenance. In some embodiments, the maintenance station and/or the robot may include sensors for recognizing newly installed parts and the installation may be automatically logged.

Figure 31:
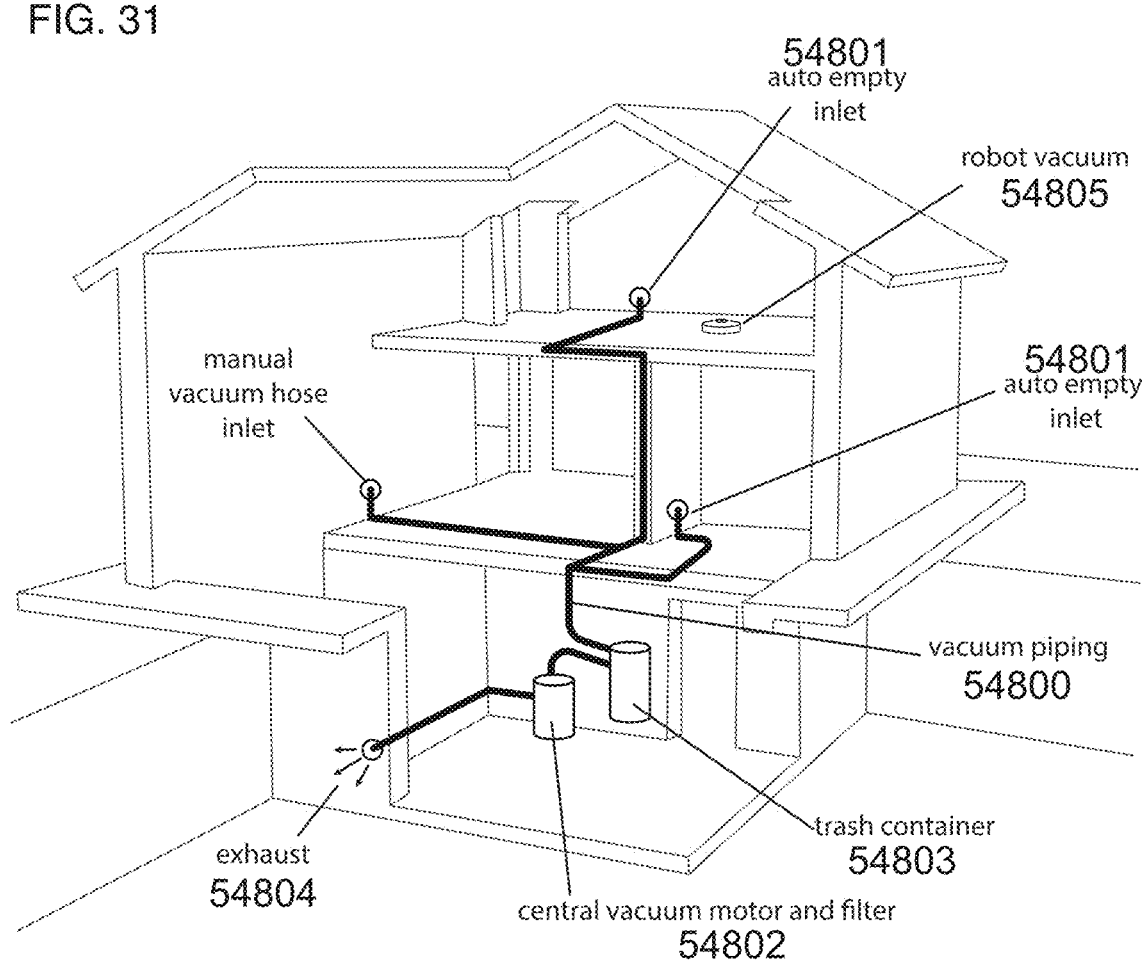
FIG. 31 illustrates a schematic view of a central vacuum system within a home.
Figure 32:
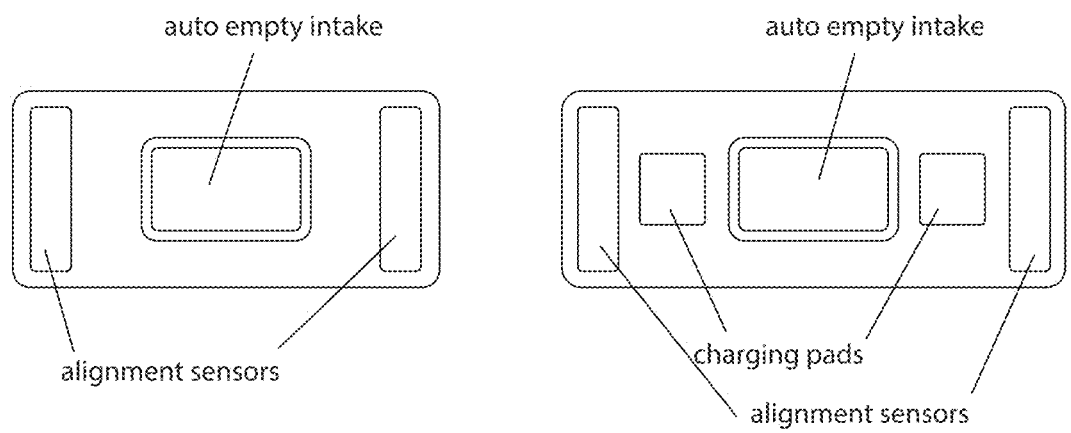
FIG. 32 illustrates different examples of inlets within a central vacuum system.
Figure 33:
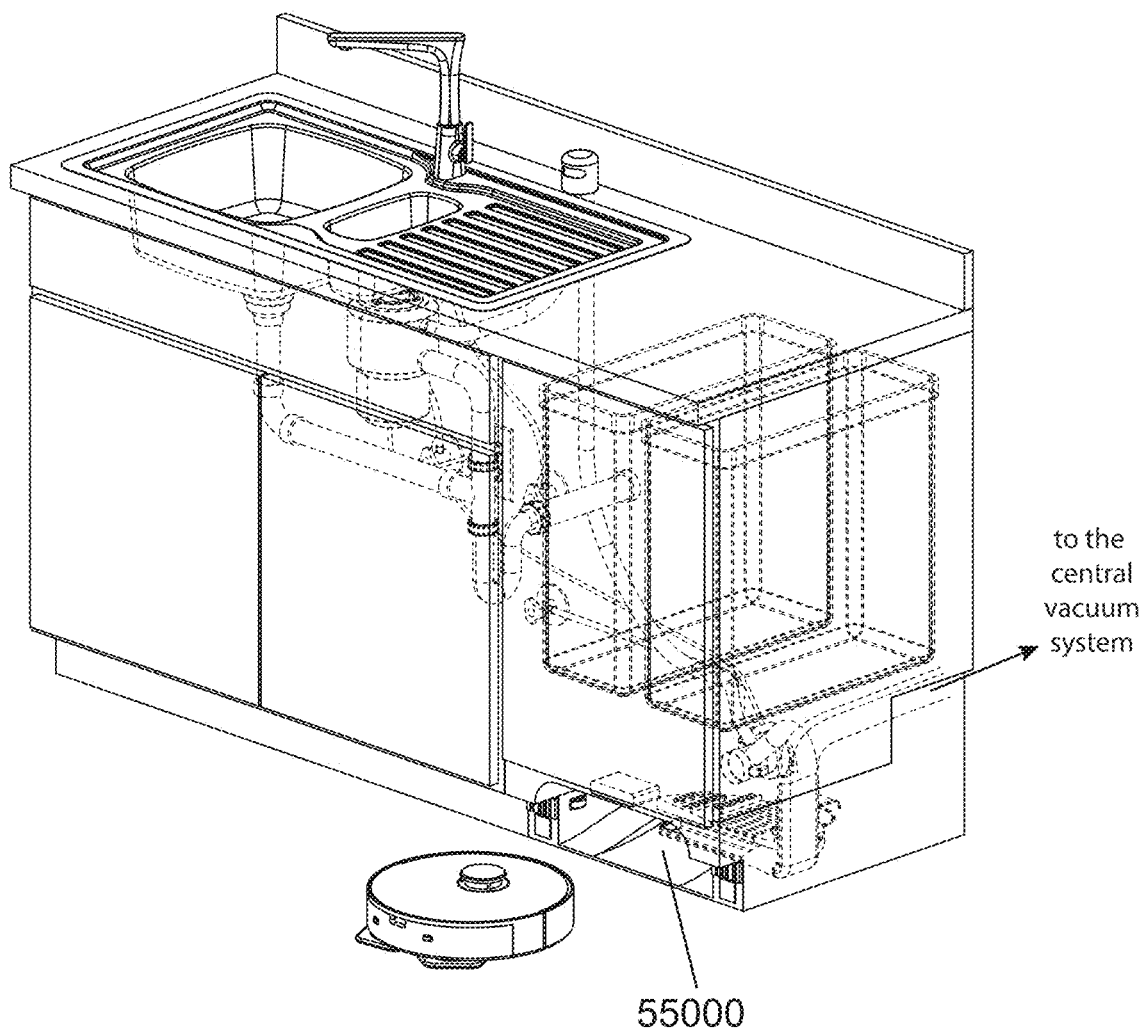
FIG. 33 illustrates an example of a built-in robot and maintenance station directly connected to plumbing, disposal, and central vacuum systems.

FIG. 31 illustrates a schematic view of a central vacuum system within a home including a network of pipes 54800 connected to inlets 54801 positioned on each floor of the home, a central vacuum motor and filter 54802, a trash container 54803, and an exhaust 54804. The trash container 54803, central vacuum motor 54802, and the exhaust 54804 are positioned in a basement of the home. A robot 54805 autonomously aligns and connects to any of the inlets 54801 for emptying a dustbin of the robot 54805 after an operational session and/or when the dustbin of the robot 54805 is full. The vacuum motor 54802 creates suction to suck the dust and debris from the dustbin of the robot into the trash container 54803 via the network of pipes 54800 and the exhaust 54804 of the vacuum motor 54802 leads the suctioned air outside of the home. The central vacuum system may include other inlets for a manual vacuuming hose as well. FIG. 32 illustrates two examples of inlets 54801 including an intake 54806 and alignment sensors 54807 used by the robot 54805 to align an outlet of the dustbin with the intake 54806 for connection. The inlets 54801 may include charging pads as well for recharging the robot 54805. FIG. 33 illustrates an example of a built-in robot and maintenance station 55000 directly connected to plumbing, disposal, and central vacuum systems of a home as described herein.

Some aspects provide a built-in robotic floor cleaning system wherein components of the system are installed within the infrastructure of a workspace. Some aspects provide a built-in robotic floor cleaning system including a robot and a docking station built into the infrastructure of a workspace for charging the robot. In some embodiments, the system further includes a control panel and an input/output means also integrated into the infrastructure of the workspace to control the floor cleaning system and deliver inputs from users and display outputs from the system.

Some embodiments include a built-in robotic floor cleaning system including a robot used for preforming cleaning tasks, such as vacuuming, mopping, steam cleaning, etc. on different surface types and a docking station built into the infrastructure of a workspace which connects to an electric power supply providing electric power to recharge a battery of the robot. The system may further include a built-in control panel to control the built-in robotic floor cleaning system and an input and output means through which a user provides inputs or receives outputs from the device. The input/output means may benefit from an interface that can communicate with a user. It would be obvious to one skilled in the art that the control panel could be installed directly on the robot or be an external control panel. Also, an external docking station can be used concurrently with the built-in docking station.

In some embodiments, a movement confinement and alteration system that comprises an auxiliary signal emitter is built into the infrastructure of the workspace at a strategic point near the docking station. The auxiliary signal emitter emits modulated signals with navigational instructions to assist the robot in navigating to a specific location, such as the docking station. One skilled in the art would appreciate that the invention can benefit from multiple movement confinement and alteration systems concurrently.

Figure 34:
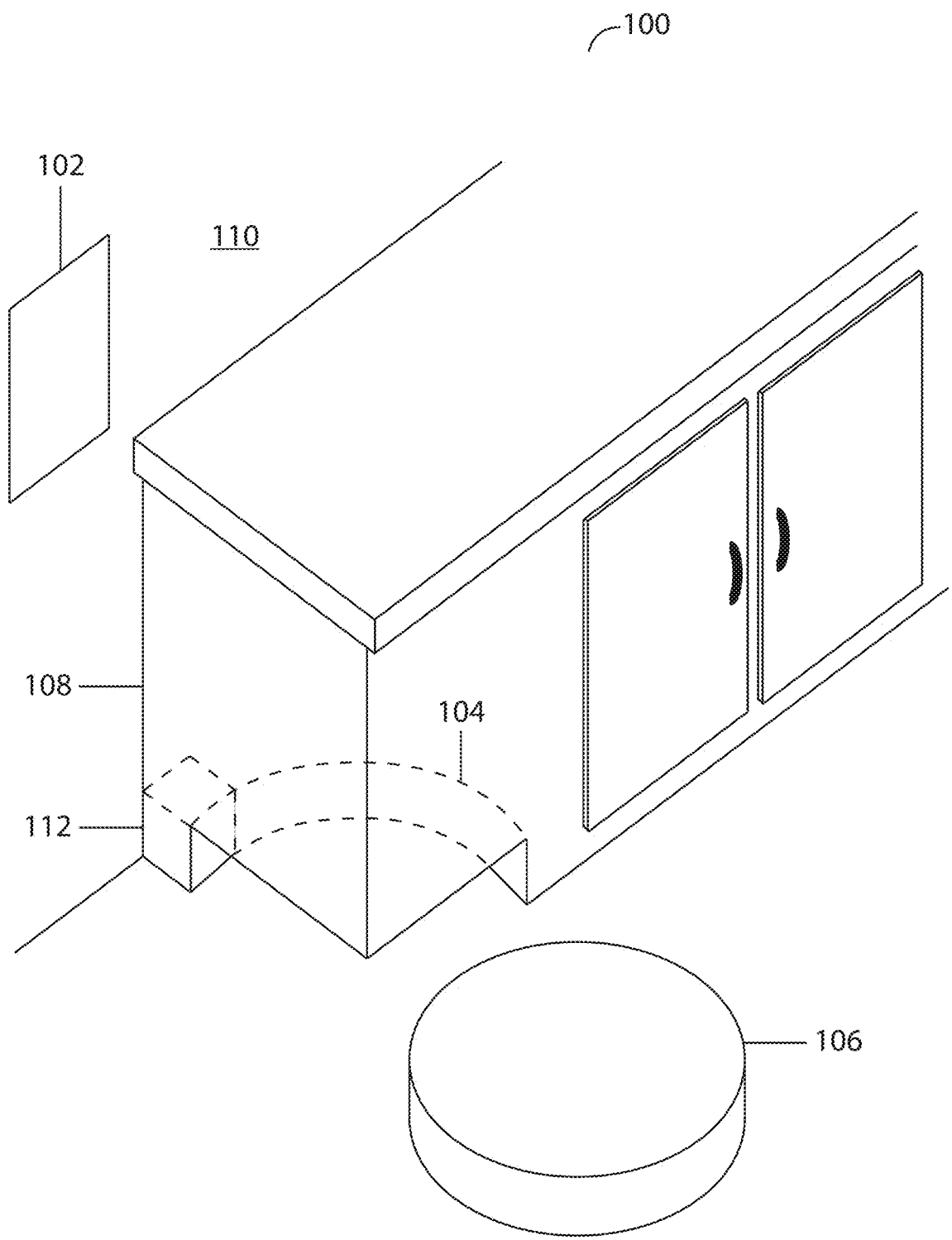
FIG. 34 illustrates a built-in robotic floor cleaning system, according to some embodiments.

FIG. 34 illustrates a built-in robotic floor cleaning system 100. In this embodiment, a control panel 102 for controlling the robot 106 is built into the wall 110 and a docking station 104 is built into the cabinet 108. The docking station 104 connects to a power supply 112 to deliver power to the robot 106 while it is docked. It will be obvious to one skilled in the art that the figures are only for illustration purposes and the placement of the docking station 104 and the control panel 102 is not limited and the docking station and control panel may be built into other parts of a workspace. In some embodiments, a map of the layout of the work environment is provided to the system by an administrator during an initial set-up phase.

Figure 35:
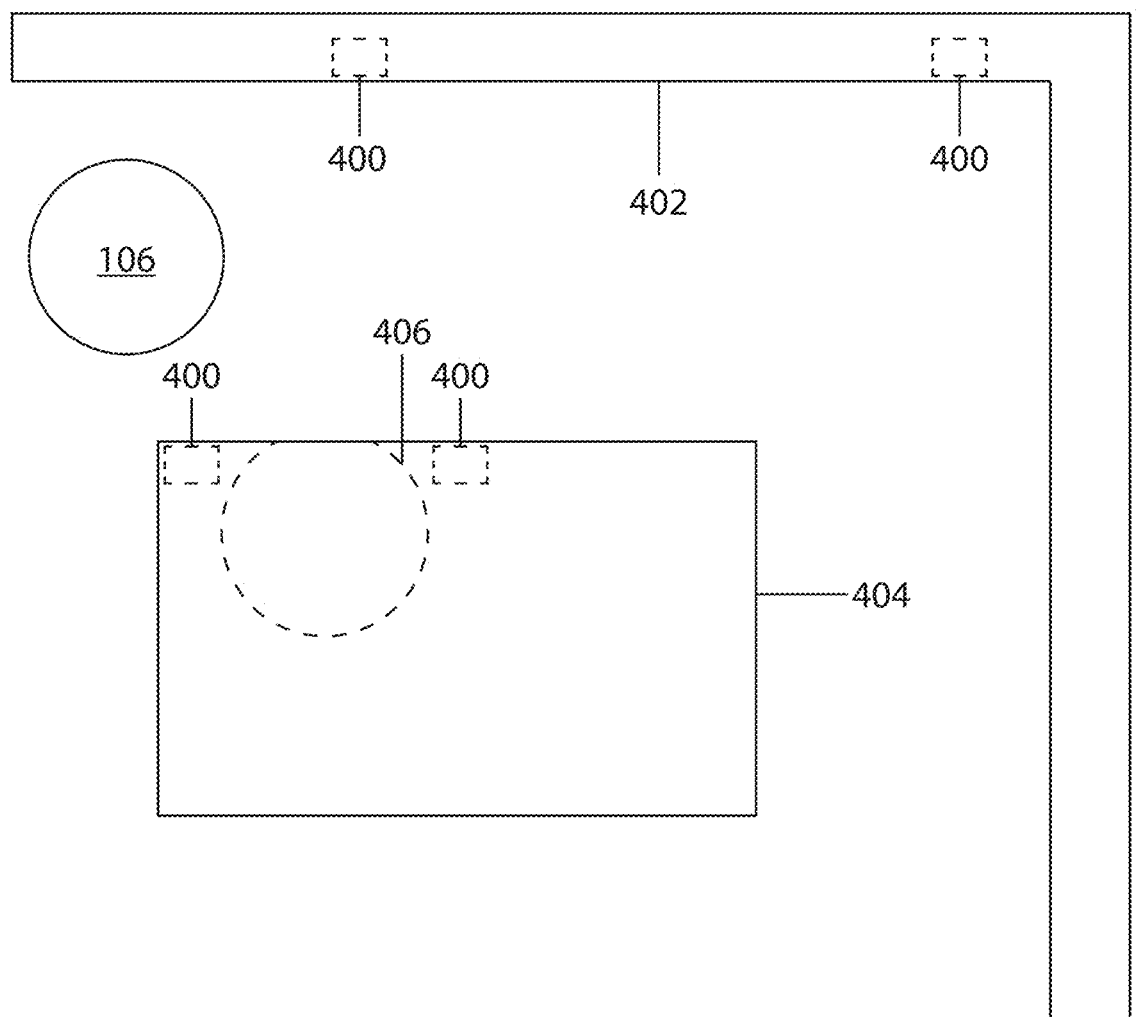
FIG. 35 illustrates an overhead view of a robotic floor cleaning system with a docking station and auxiliary signal emitters positioned within the infrastructure of the workspace at strategic points to guide the floor cleaning device, according to some embodiments.

FIG. 35 illustrates an overhead view of a built-in robotic floor cleaning system. In the example shown, a number of auxiliary signal emitters 400 are installed within the wall 402 and cabinet 404. In some embodiments, auxiliary signal emitters may be used to aid a robot 106 in navigating to a docking station 401. Auxiliary signal emitters 400 send omnidirectional signals that are received by the robot 106 when it approaches, the signals containing movement instructions for the robot to follow.

In some embodiments, the input/output means uses wireless signals to send and receive signals to and from remote devices, such as: remote controls or smartphones. In some embodiments, an application could be installed on an internet-enabled device, such as a smartphone, a computer, a tablet, etc., to facilitate communication between a user and the control panel 102.

Some embodiments provide a built-in robot and maintenance station system as described in U.S. Non-Provisional patent Ser. No. 10/958,081, hereby incorporated herein by reference.

In some embodiments, a maintenance station of the robot dispenses water from a clean water container of the maintenance station for washing a mopping pad and/or a bottom of the maintenance station when the robot is docked at the maintenance station. In one embodiment, the mopping pad of the robot may rotate while the maintenance station dispenses water, wherein contact between the spinning mopping pad and forceful flow if dispensed water cleans the mopping pad. In another embodiment, a component of the maintenance station may clean the mopping pad when the mobile device is docked at the maintenance station, wherein the component moves relative to and contacts the mopping pad to clean the mopping pad as the maintenance station dispenses the water. The maintenance station includes a dirty water container to collect the dirty water from cleaning the mopping pad. In some embodiments, the maintenance station heats the water dispensed for washing the mopping pad. In some embodiments, the maintenance station comprises a means for generating and blowing room temperature or heated air (e.g., fan and a heating element) towards the mopping pad to dry the mopping pad and the maintenance station after washing the mopping pad. In some embodiments, the maintenance station or the robot includes a mechanism for disinfecting at least one component of the maintenance station or the robot. In some embodiments, the robot climbs up a surface to dock. In some embodiments, the maintenance station includes a ramp and at least two wheel pockets for easy docking of the robot. To dock, the robot drives up the ramp until a right wheel and a left wheel are positioned in a right wheel pocket and a second wheel pocket of the maintenance station.

In some embodiments, the maintenance station empties a dustbin of the robot into a bin of the maintenance station after each cleaning session. In some embodiments, at least one brush of the robot spins during emptying of the dustbin of the robot into the bin of the maintenance station to clean the at least one brush. In some embodiments, the maintenance station refills a clean water container of the robot with clean water (and/or cleaning solution or detergent) stored in a clean water container of the maintenance station. In some embodiments, the robot returns to the maintenance station to refill the clean water container of the robot during a cleaning session upon a sensor detecting a water level below a predetermined water level. The robot resumes cleaning from a last location prior to refilling the clean water container of the robot. In some embodiments, the processor of the robot determines a distribution of a volume of water within the clean water container of the robot such that all mopping planned can be completed with the volume of water available in the clean water container of the robot. The processor may determine the distribution of the volume of water within the clean water container of the robot upon a sensor detecting a particular level of water.

In some embodiments, the robot comprises a vacuum module and a mopping module. In some embodiments, the robot comprises a means for moving a main brush of the vacuum module away and towards a driving surface and a means for moving a mopping pad of the mopping module away and towards the driving surface. Movement away from the driving surface such that the main brush or the mopping pad is free from contact with the driving surface constitutes disengagement and movement towards the driving surface such that the main brush or the mopping pad contacts the driving surface constitutes engagement. In some embodiments, a controller of the robot actuates an actuator interacting with a cleaning component of the robot to turn on, turn off, reverse direction, and/or increase or decrease a speed such that the mopping pad engages or disengages based on a value of at least one environmental characteristic (e.g., a floor type) or at least one user input received by an application of a smartphone paired with the robot or a type of cleaning (e.g., mop-only, vacuum only, and vacuum and mop). For instance, the main brush is disengaged and the mopping pad is engaged when the robot is mopping only. In another example, the main brush is engaged and the mopping pad is disengaged when the robot is vacuuming only, carpet cleaning, and the floor type detected is carpet (e.g., ultrasonic sound sensors, IR sensors, etc.). In some embodiments, the main brush and/or the mopping pad are disengaged when the robot is returning back to the maintenance station. In some embodiments, the mopping pad is positioned adjacent to or on a top surface of the robot when disengaged.

In some embodiments, the mopping module includes a means for vibrating the mopping pad. Examples include an eccentric mass, electric oscillators, etc. In some embodiments, the mobile device includes a means for applying a downward pressure onto the mopping pad such that the mopping pad contacts a driving surface with the downward pressure. In some embodiments, the controller of the robot actuates an actuator interacting with the means for application the downward pressure onto the mopping pad such that downward pressure of the mopping pad onto the driving surface is applied when a stain is detected on the driving surface.

Figure 36A:
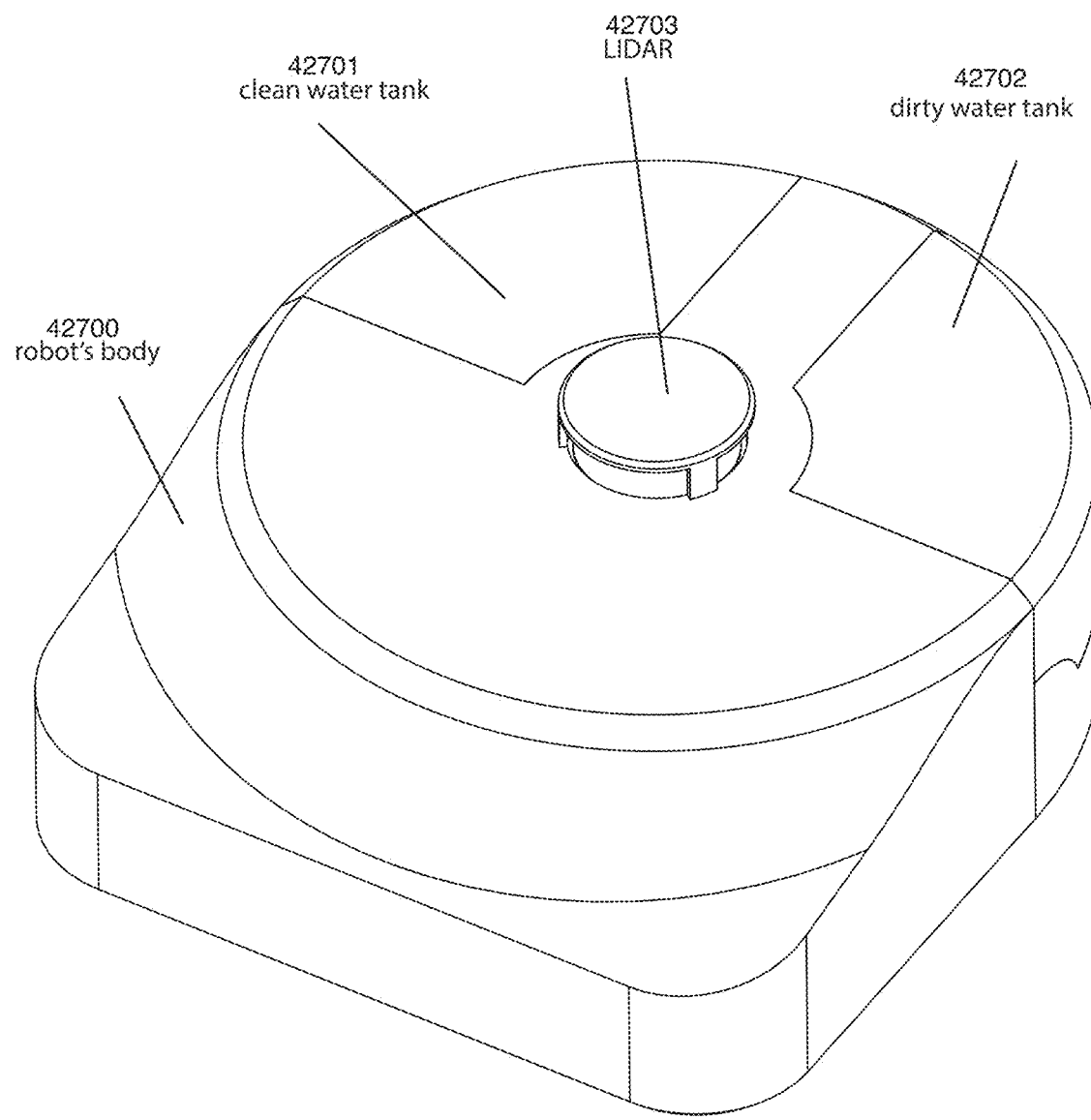
FIGS. 36A-36G illustrate an example of a cleaning robot.
Figure 36B:
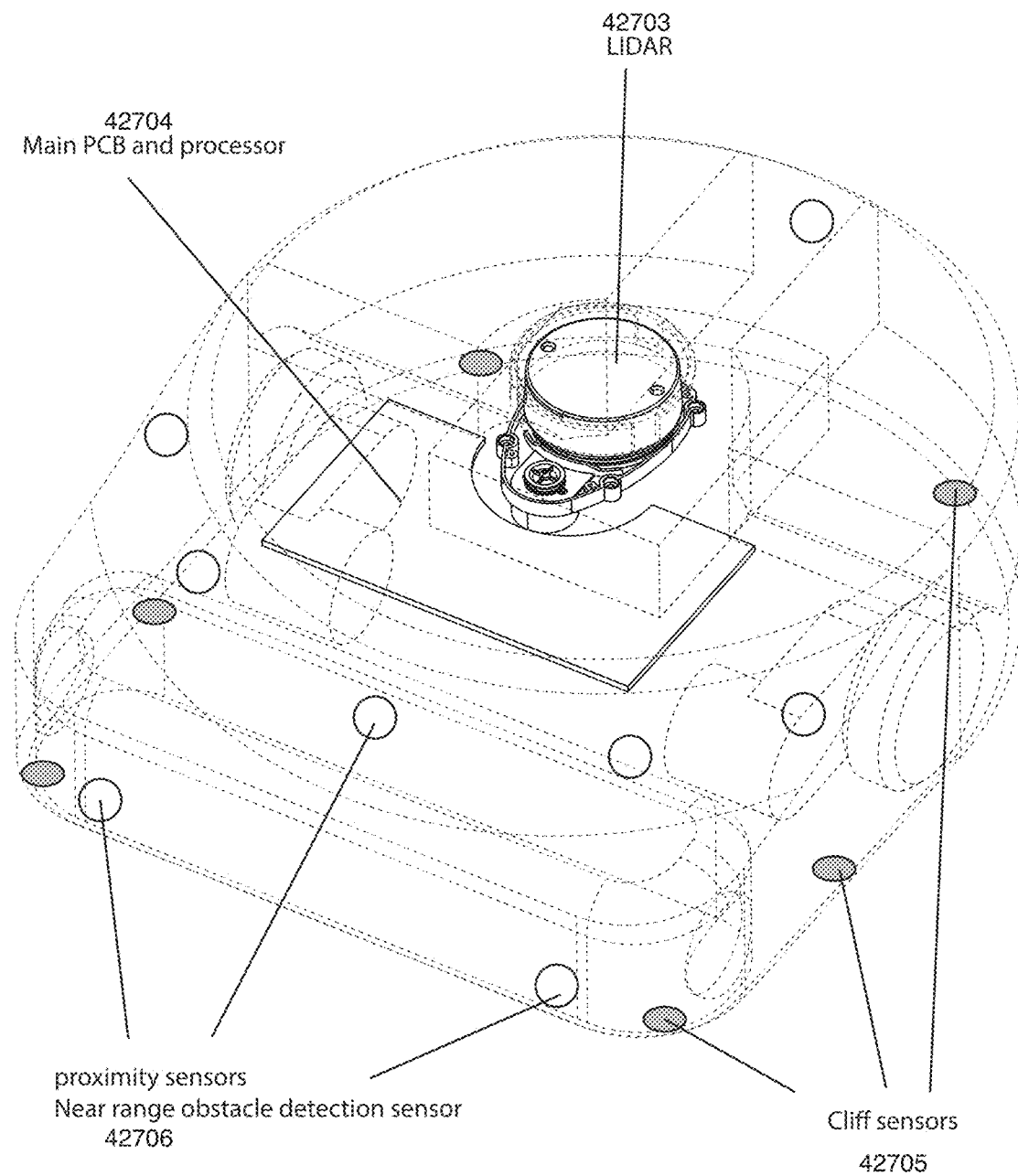
Figure 36C:
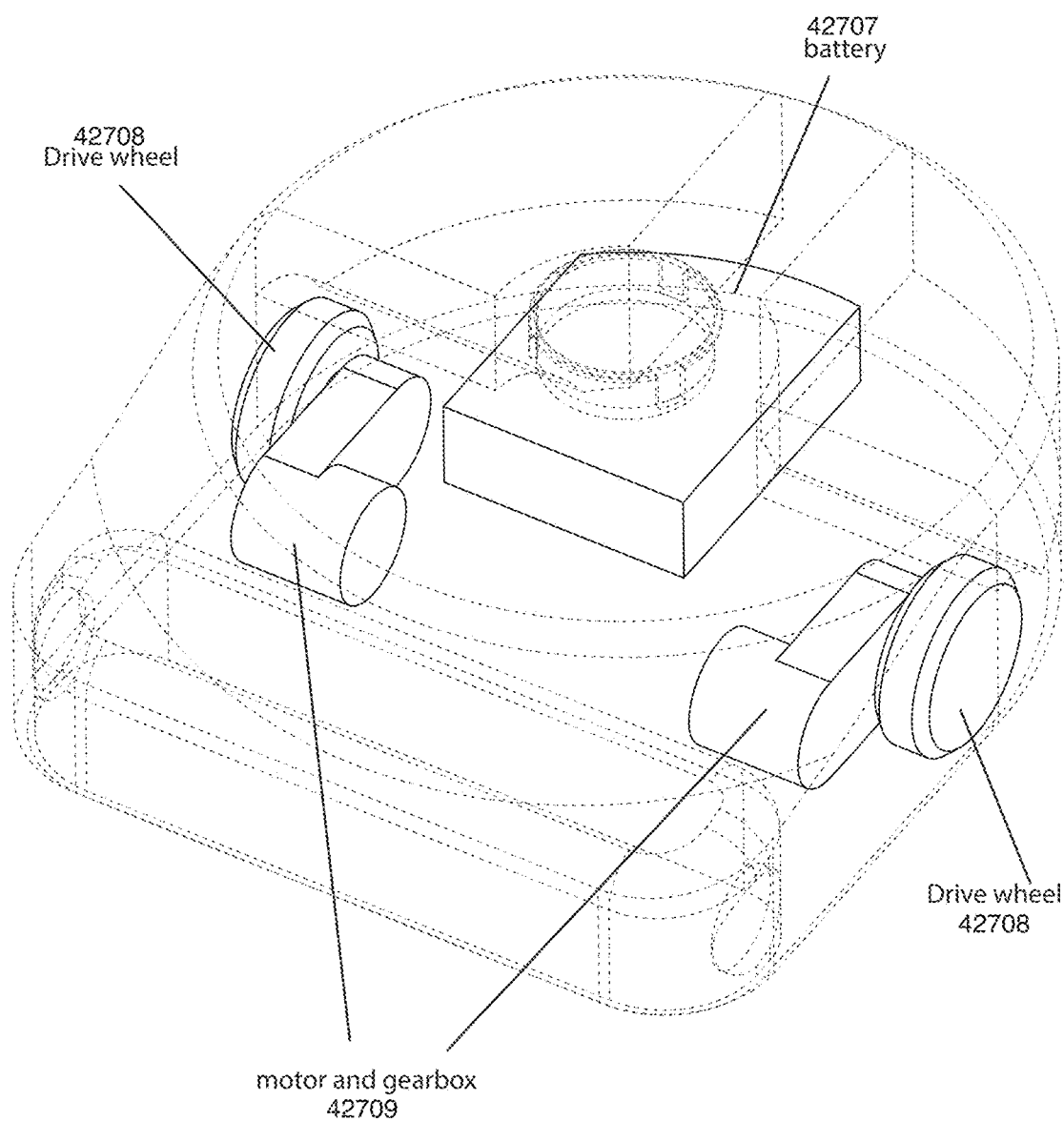
Figure 36D:
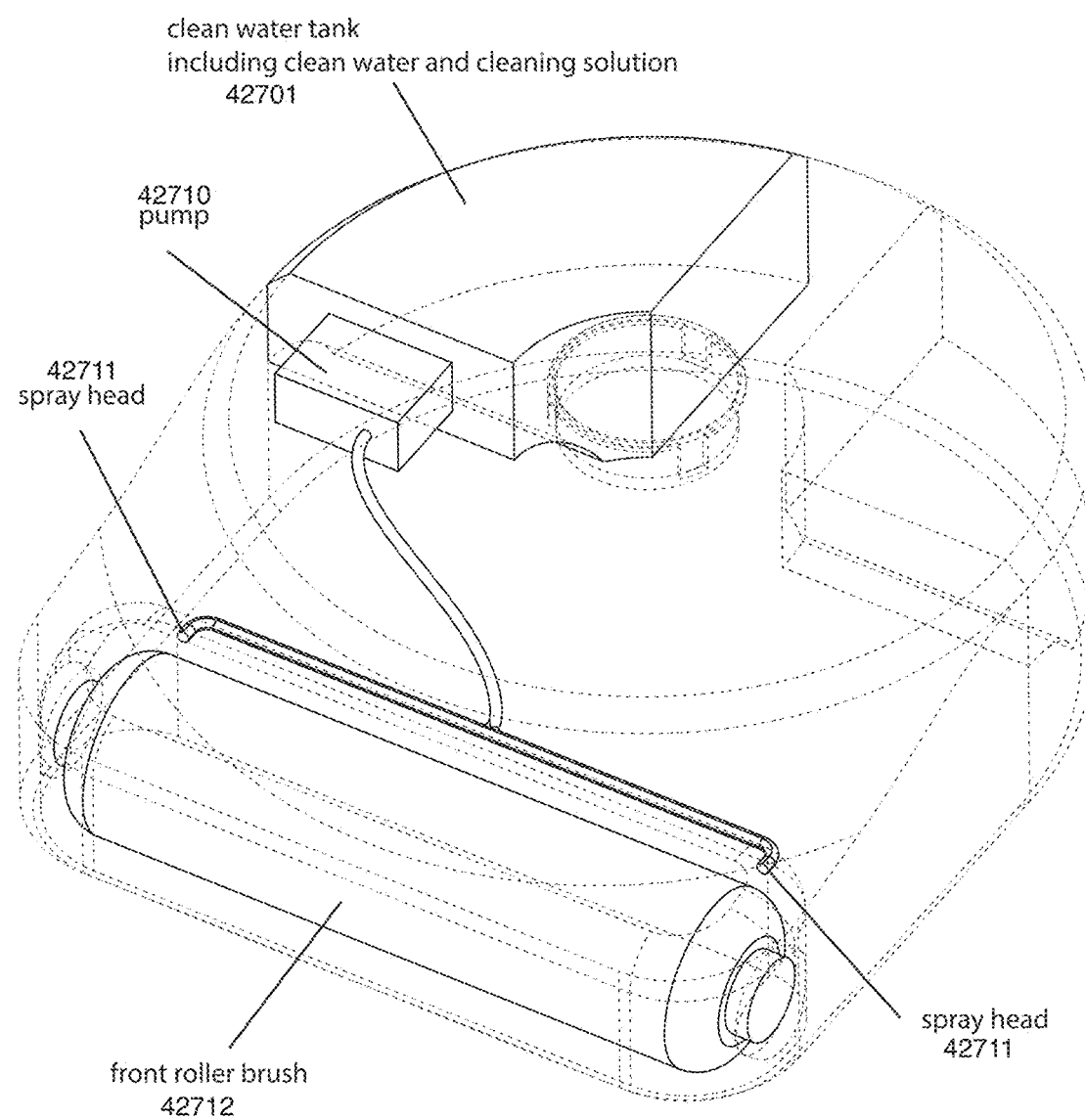
Figure 36E:
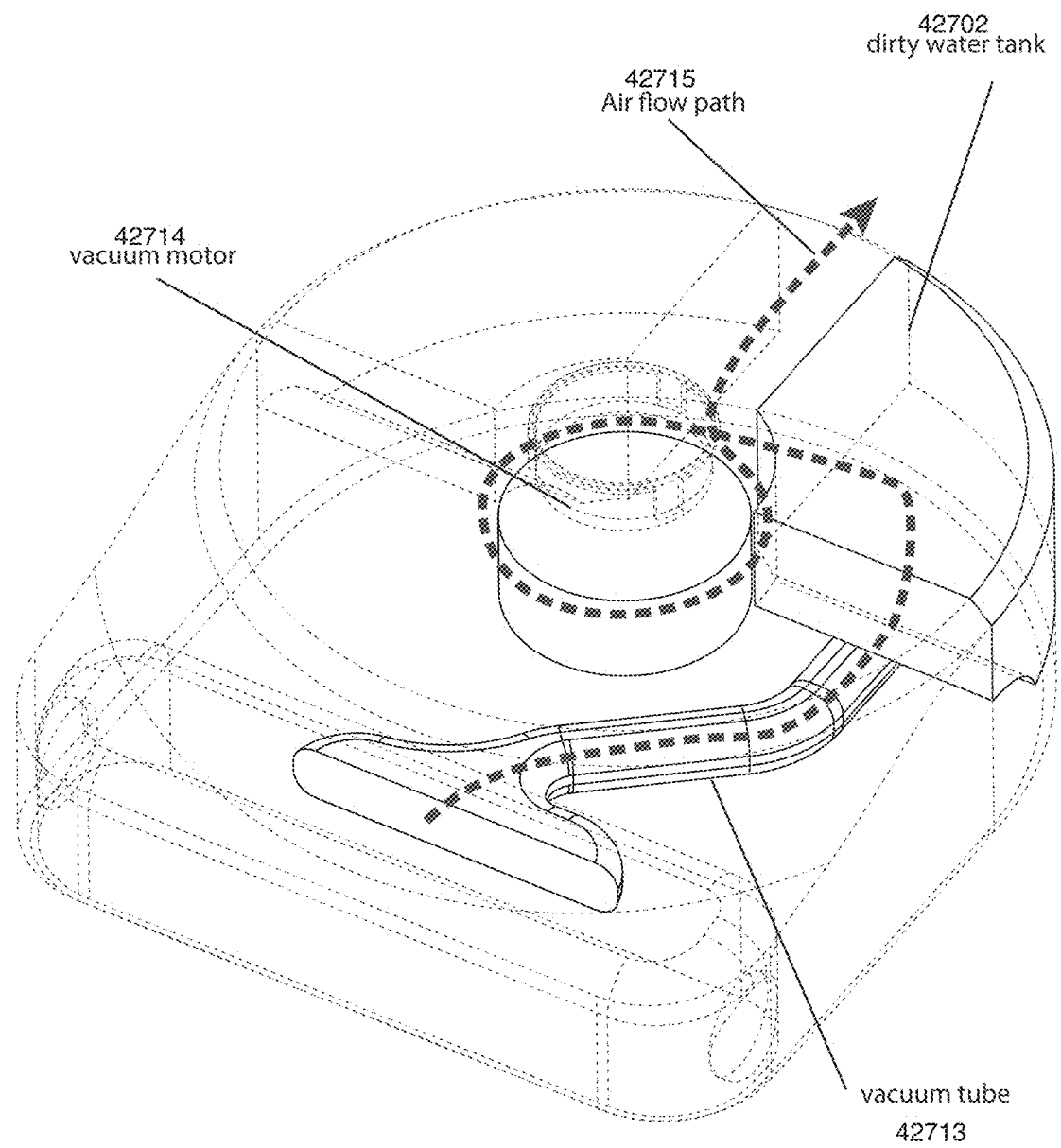
Figure 36F:
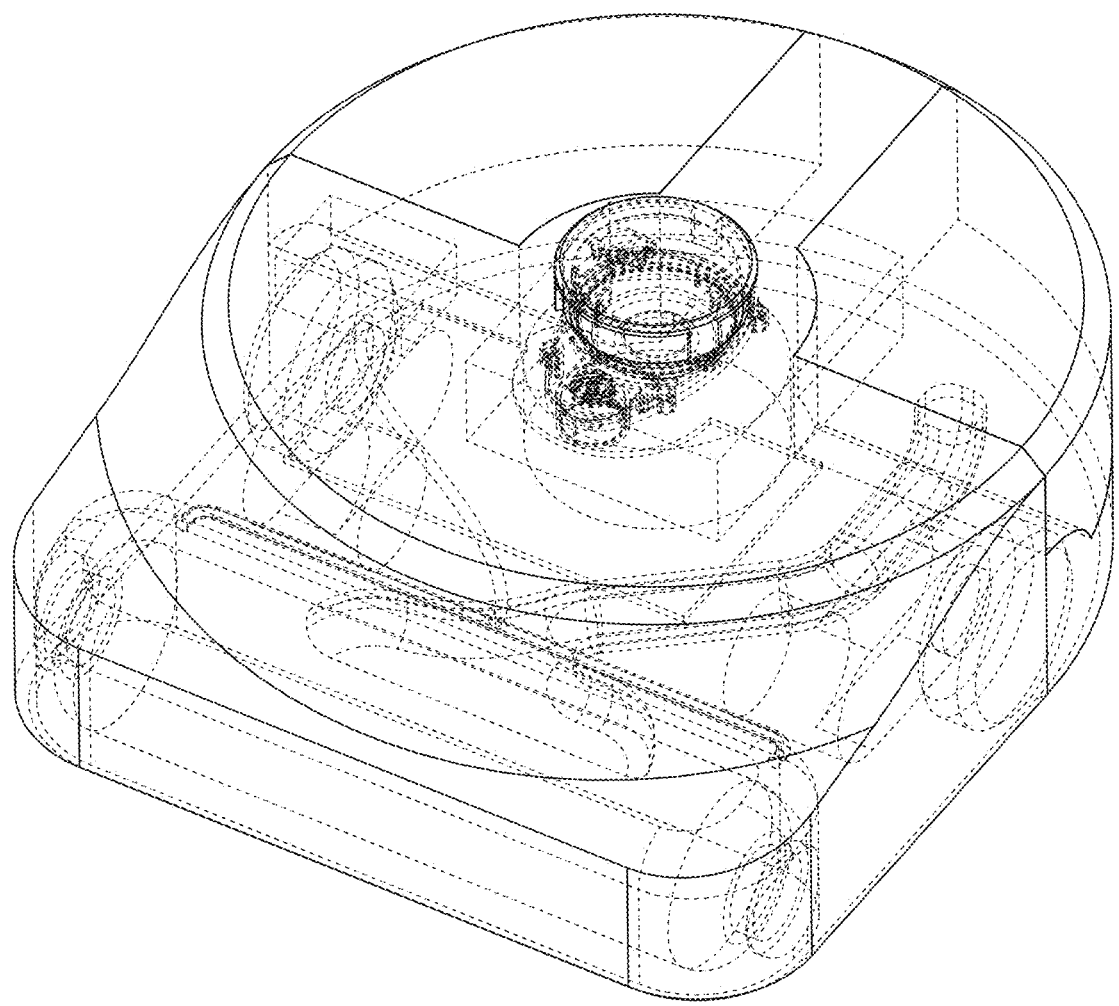

Some embodiments include a dry vacuum and wet mop robot for mopping and vacuuming hard surfaces simultaneously and, in some cases, spot cleaning carpeted areas. The robot may comprise a main body, a LIDAR sensor, a PCB and processor, proximity sensors, cliff sensors, a battery, drive wheels including motors and gearboxes, a mopping roller, a clean water/solution tank, a water spray system, a vacuum motor, and a dirty water and dirt collection tank. FIGS. 36A-36F illustrate an example of a dry vacuum and wet mop robot comprising a body 42700, a clean water tank 42701, a dirty water tank 42702, a LIDAR sensor 42703, main PCB and processor 42704, cliff sensors 42705, proximity sensors 42706, battery 42707, and drive wheels 42708 with motor and gearbox 42709. FIG. 36D illustrates a clean water spraying sub-system, wherein a pump 42710 is attached to the clean water tank 42701 and a spray head 42711. The spray head 42711 sprays liquid from the clean water tank 42701 onto a front roller brush 42712. FIG. 36E illustrates a dirty water and dirt collection sub-system including a vacuum nozzle 42713 and a vacuum motor 42714, the flow path 42715 of which is shown. FIG. 36F illustrates all sub-systems and components of the robot shown in FIS. 481A-481E.

In some embodiments, the robot includes a peripheral brush with one or more arms (three are shown) to which bristles are securely attached such that bristles remain in place when pulled and/or at risk of being plucked from the one or more arms of the peripheral brush. In some embodiments, the arms are hollowed tubes. In some embodiments, the bristles are secured to the one or more arms of the peripheral brush using stitching. In some embodiments, the bristles are bundled together and securely stitched to the one or more arms, forming one or more compact and firm brushes that result in more effective sweeping of debris as bristles are not lost over time and the brush maintains its fullness. In some embodiments, the secure stitching of bristles to the one or more arms of the peripheral brush avoid the bristles from being forcibly plucked during operation when, for example, the bristles become entangled with or caught up with an obstruction (e.g. cable, hair, or carpet) or make contact with a sticky substance or become lodged between objects and the robot or when the peripheral brush continues or attempts to continue to rotate when entangled with an obstruction.

In some embodiments, the stitching technique used to stitch the bristles together and/or to the one or more arms of the peripheral brush can vary. For example, stitching the bristles together can include stitching across the bundle of bristles in a straight line in a direction perpendicular to the length of the bristles. In another example, stitching the bristles together can include stitching diagonally across the bristles in two directions. In other instances, other stitching techniques can be used, such as stitching in a crisscross pattern. In some embodiments only one type of stitching technique is used while in other embodiments more than one type of stitching technique is used. In some embodiments, a stitching technique is repeated multiple times. For example, multiple parallel stitching lines along an end of the bundle directed perpendicular to the length of the bristles can be used to increase the fastening strength of the bristles to one another. Examples of stitching techniques including across a bundle of bristles using straight line technique, diagonal technique, crisscross technique, and combined straight line and crisscross techniques, respectively. In some embodiments, the bristles are stitched together and then stitched to the one or more arms of the peripheral brush. In some embodiments, the one or more arms of the peripheral brush include small openings through which the stitching material can be weaved in order to stitch the bristles to the one or more arms.

Figure 36G:
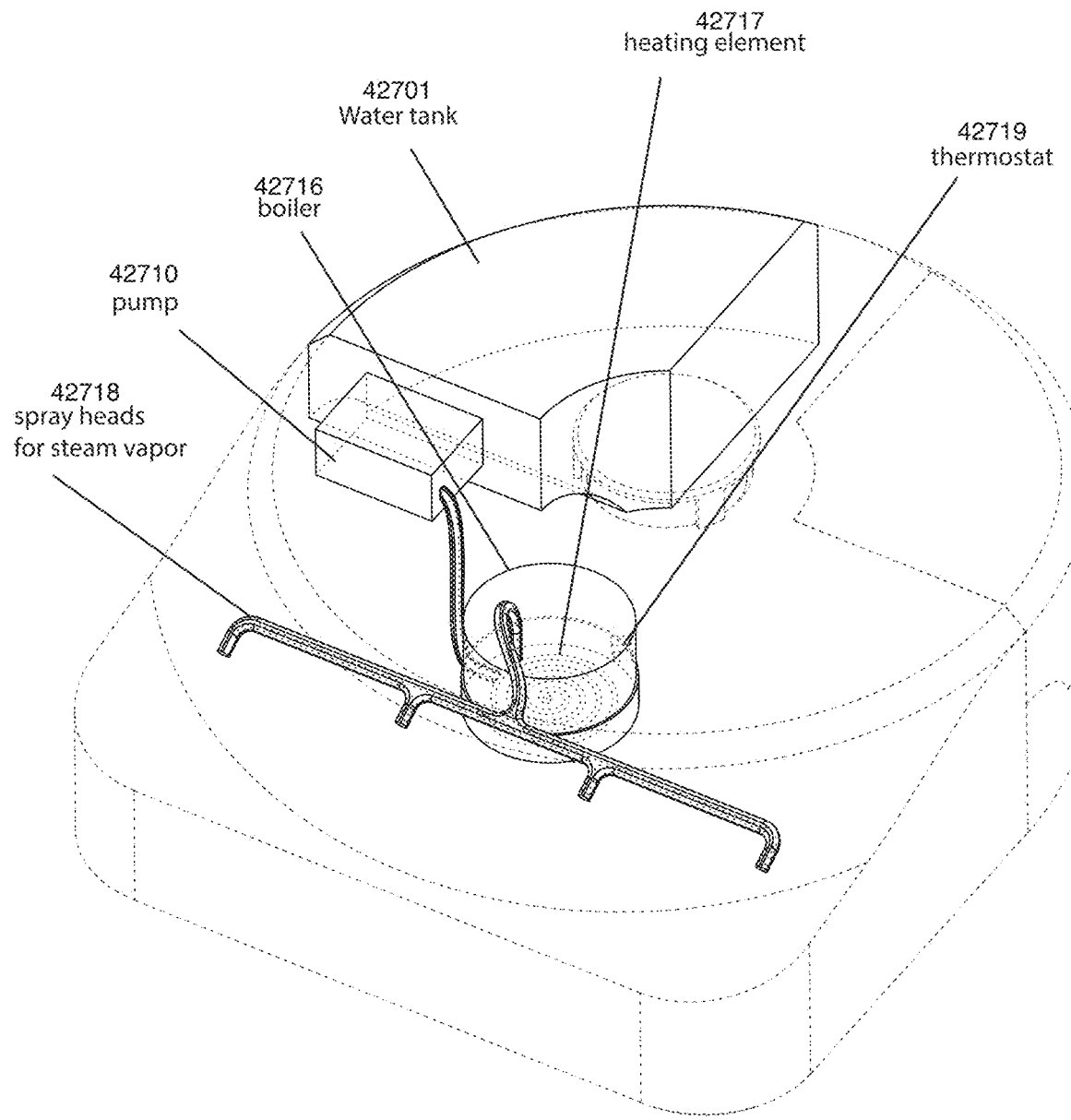
Figure 37:
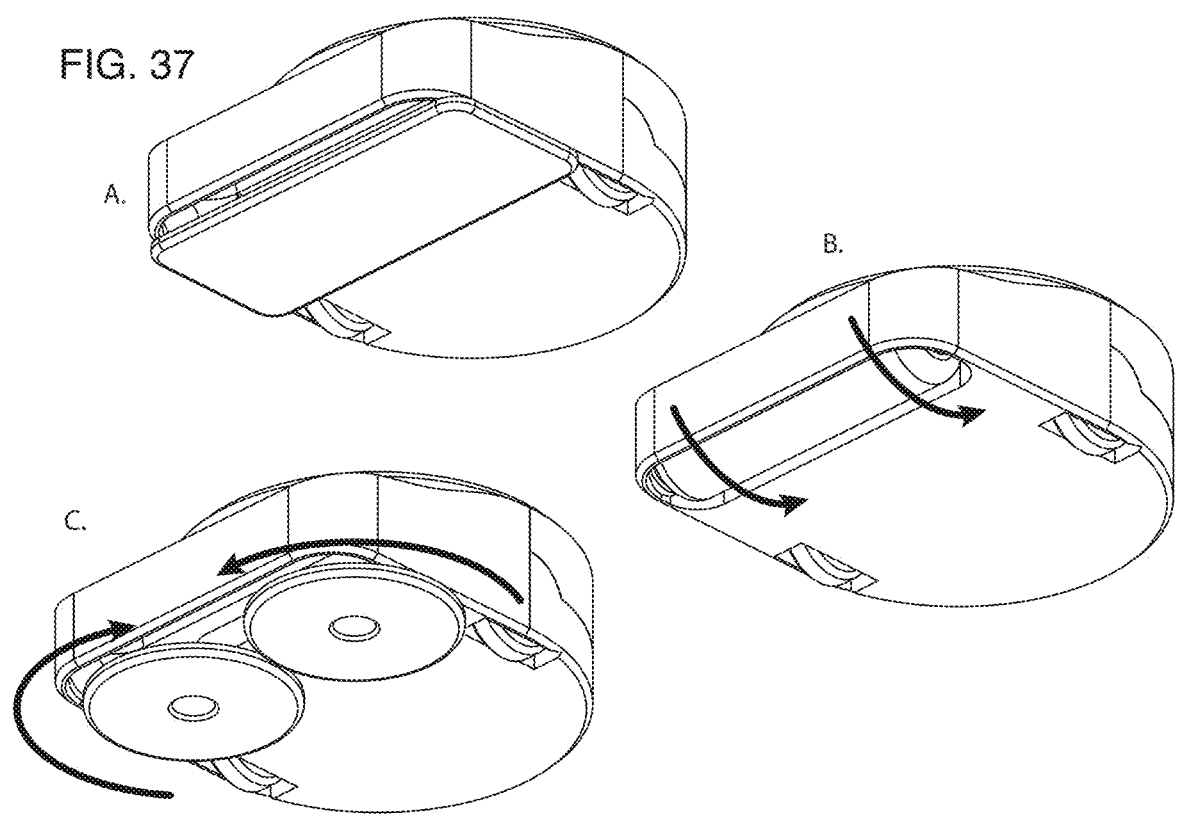
FIG. 37 illustrates different examples of cleaning pads.

In some embodiments, the robot comprises a steam mop mechanism, wherein water is pumped into a boiler for boiling to form steam vapor. The vapor exits from spray heads positioned in a front portion of the robot onto an area in front of the robot. With both a steam mop and vacuum, it is beneficial to position the vacuum in front of the steam mop such that the robot vacuums the floor before steaming the floor for cleaning. FIG. 36G illustrates a steam mop sub-system of a robot comprising the water tank 42701, the pump 42710 attached to the water tank 42701, a boiler 42716 and heating element 42717 for generating steam from water fed to the boiler 42716 from the water tank 42701, and spray head 42718 for dispersing the vapor from the boiler 42716 onto a floor. A thermostat 42719 monitors a temperature in the boiler 42716. In some embodiments, the robot comprises a roller or a pad for moping the floor. The roller may be motorized or free to spin. Various types of pads may be used to scrub the floor deeply or delicately. In some embodiments, the robot comprises a mechanism for spinning the pad or moving the pad back and forth during cleaning, wherein the added movement of the pad cleans the floor more thoroughly. FIG. 37 illustrates different examples of cleaning pads of a robot including A. a static pad, B. a roller pad, and C. two spinning pads. In some embodiments, a vacuum nozzle is positioned in front of a mop roller/pad for dry vacuuming before mopping the floor. In some embodiments, vacuuming and mopping function separately, wherein only one of vacuuming and mopping operate at a time. In some embodiments, mopping is activated upon sensing changes in the floor characteristics, such as floor reflectivity or stickiness.

Figure 38:
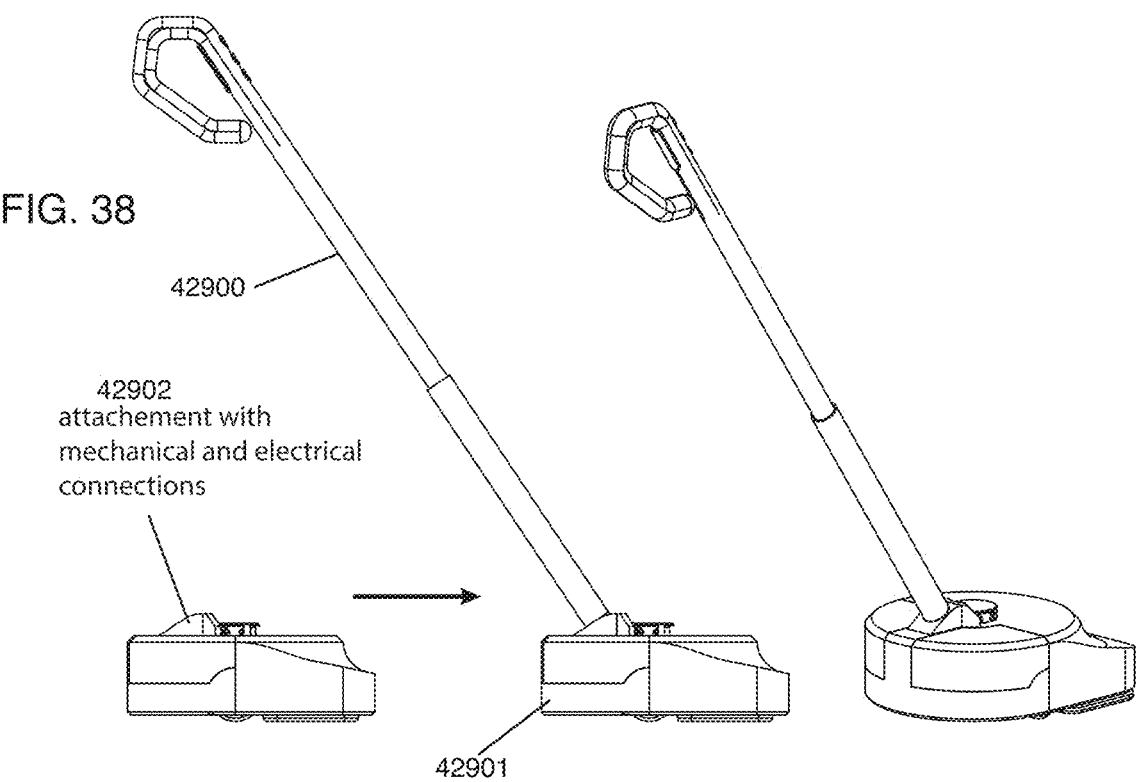
Figure 39:
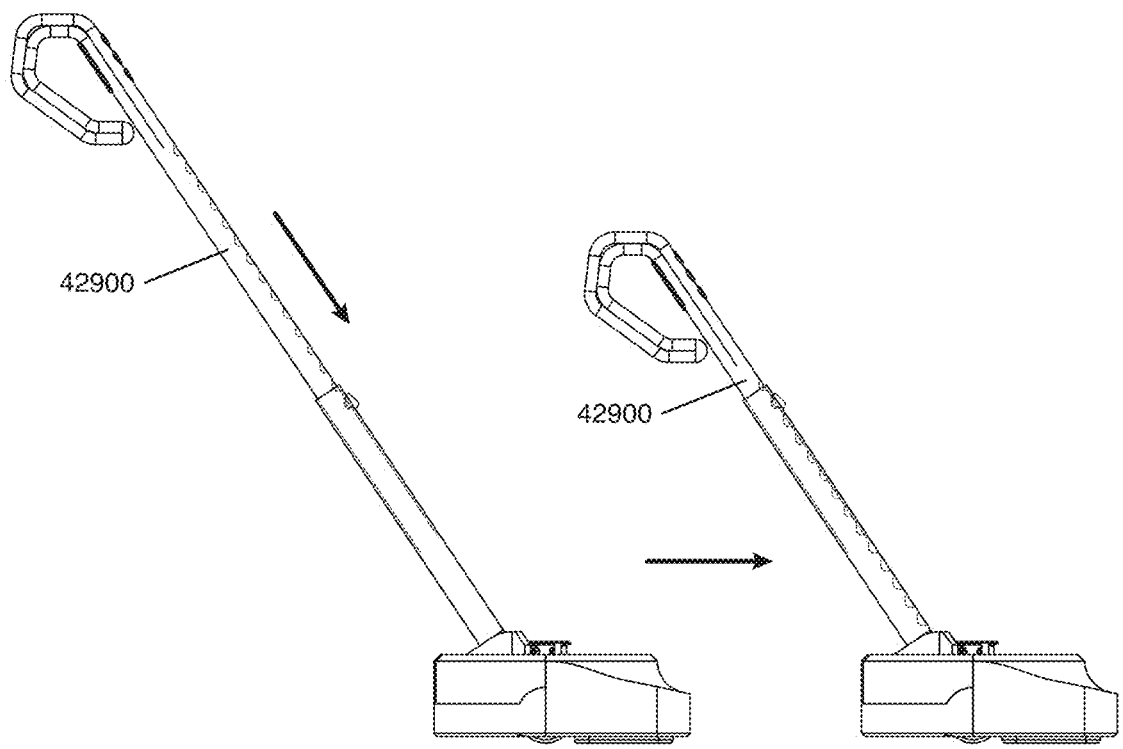
Figure 40:
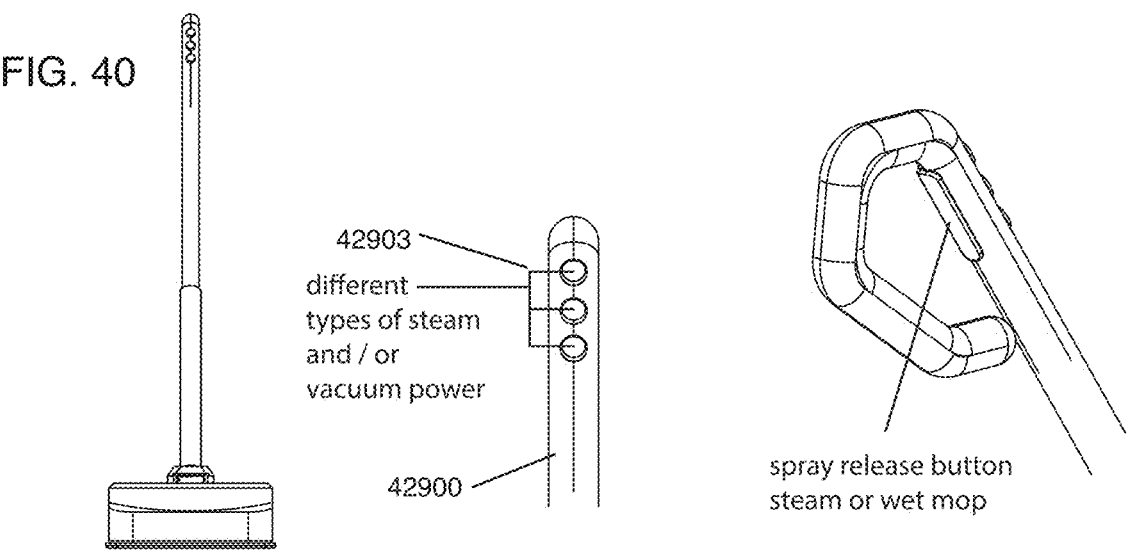

In some embodiments, a handle is attachable to the robot for manual movement of the robot, such as a case where a user mops a spot manually or when a user wants to apply a different pressure onto the floor while mopping. In some embodiments, the attached handle comprises a mechanism for adjusting a length of the handle, such that the robot may be used for more applications. For example, with a short handle the robot is used to steam sofas and other furniture. In some embodiments, manual controls such as a power button and steam release are shifted to the attached handle. In some embodiments, the handle is attached to the robot using a ball joint to provide more flexibility in manually controlling the robot. FIG. 38 illustrates a handle 42900 attached to a robot 42901 at an attachment point 42902 with mechanical and electrical connections. FIG. 39 illustrates adjusting a handle length of the handle 42900. FIG. 40 illustrates a transfer of controls 42903 shifted to the handle 42900 for manual control. FIG. 41 illustrates possible movements of the handle 42900 when a ball joint is used at the attachment point 42902.

Figure 42A:
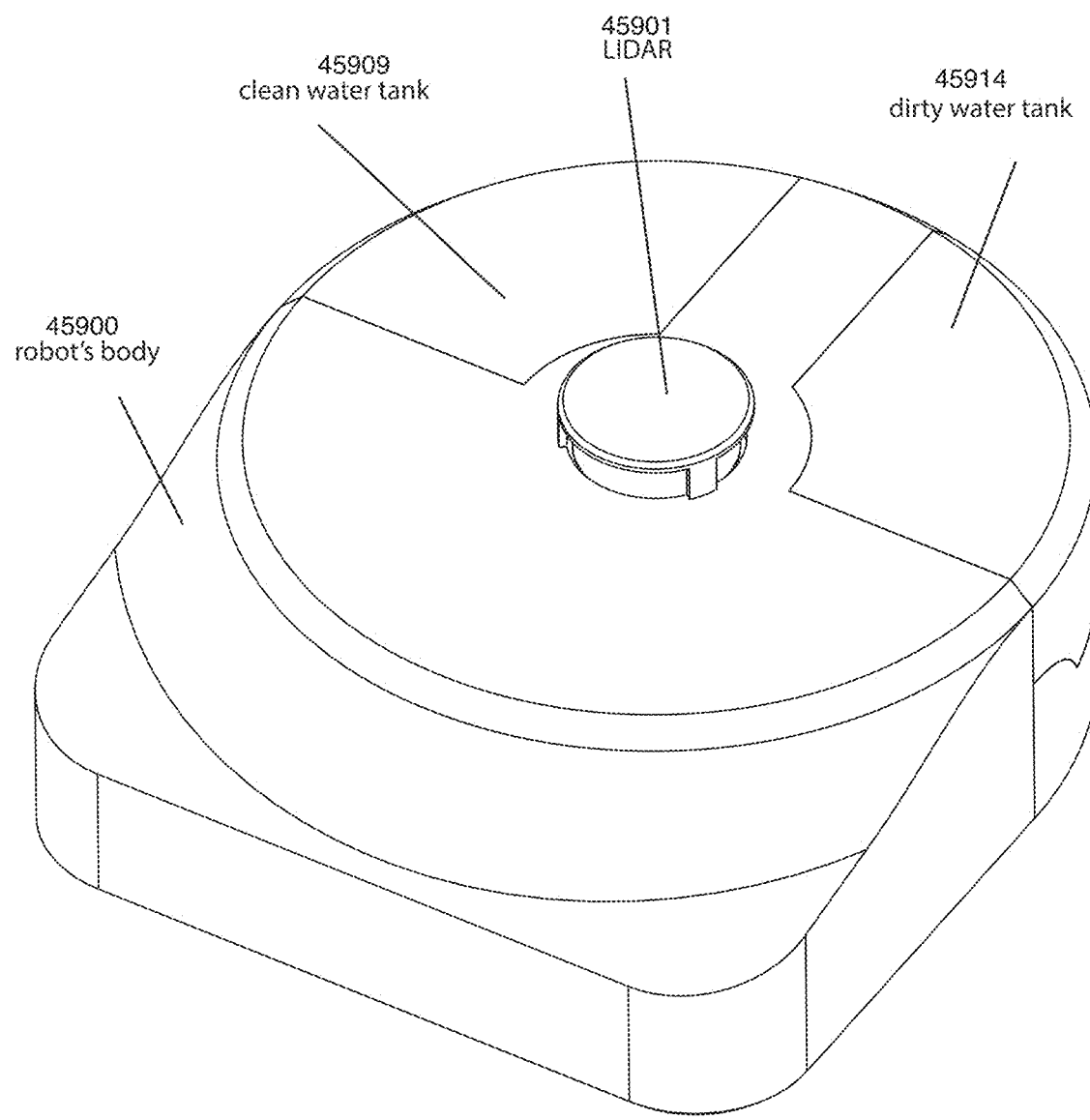
FIGS. 42A-42F illustrate an example of a robot.
Figure 42B:
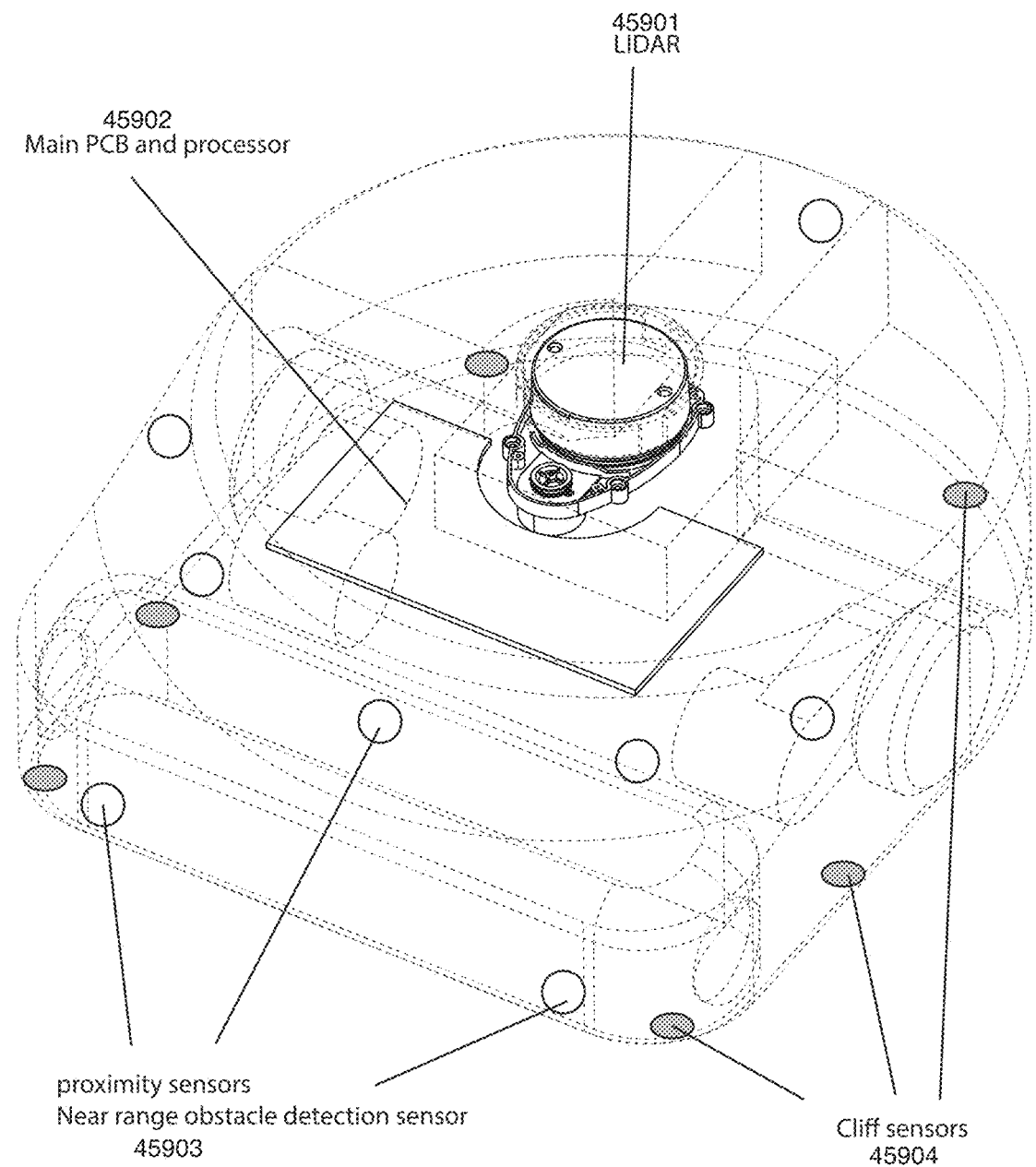
Figure 42C:
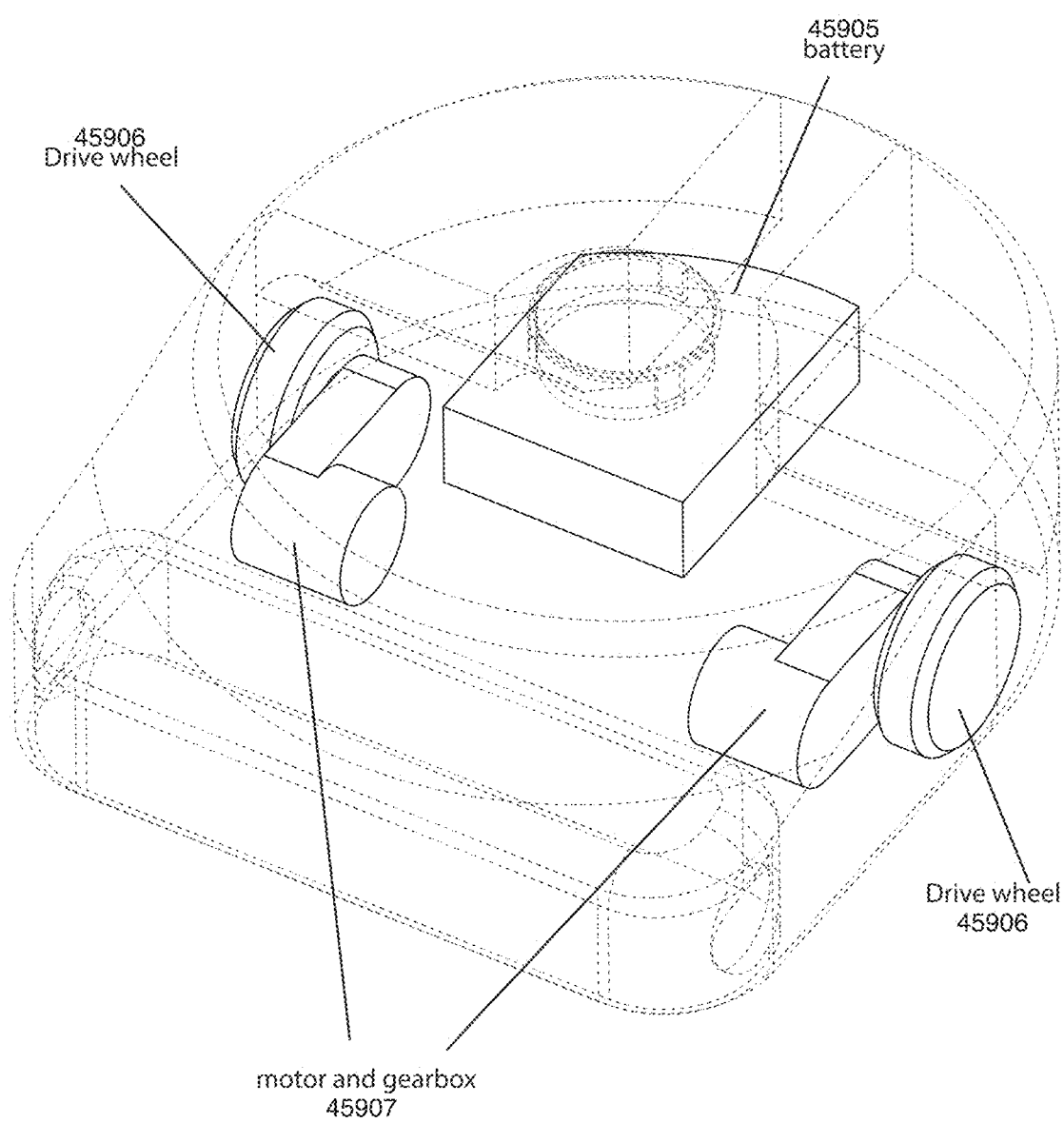
Figure 42D:
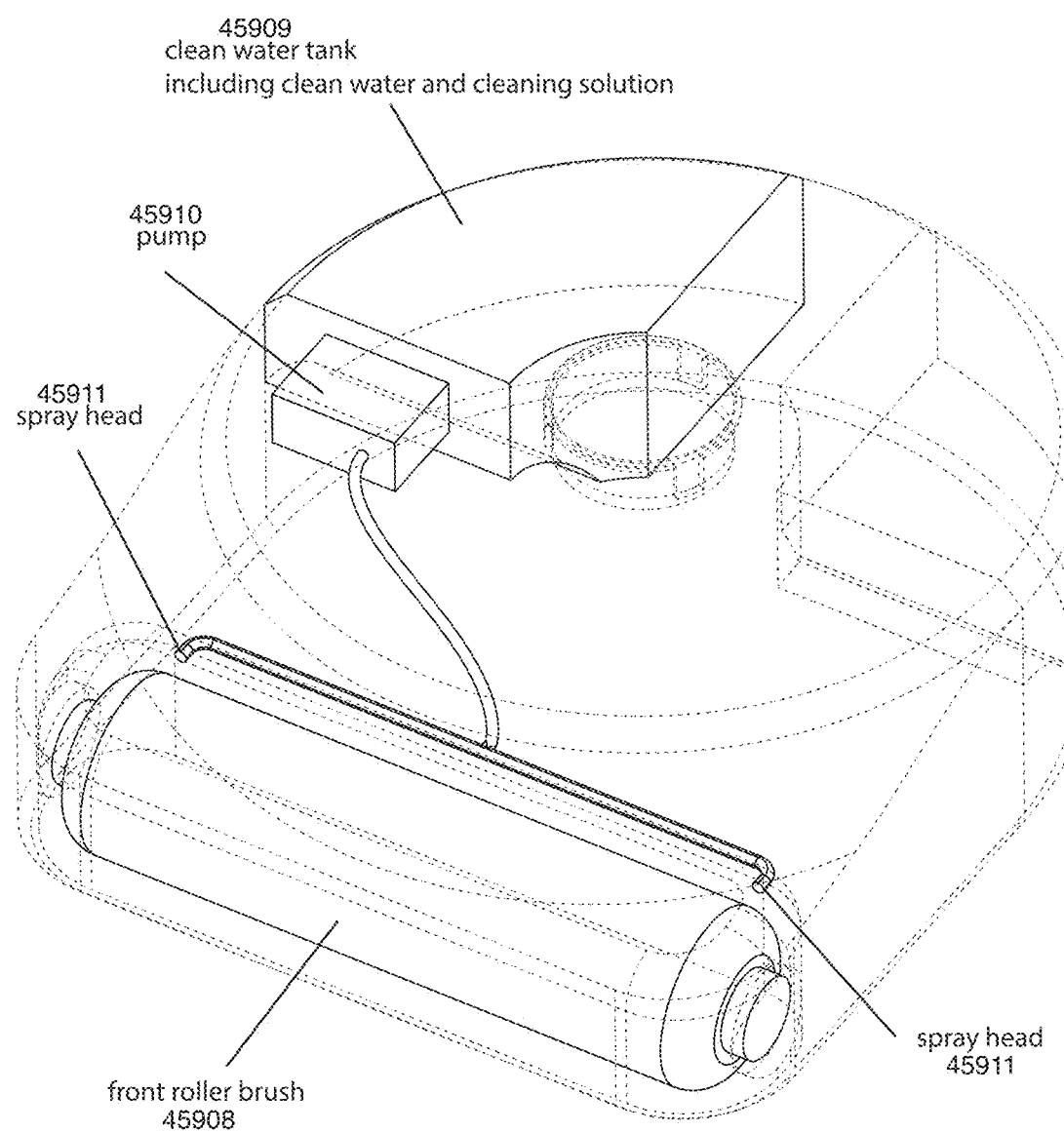
Figure 42E:
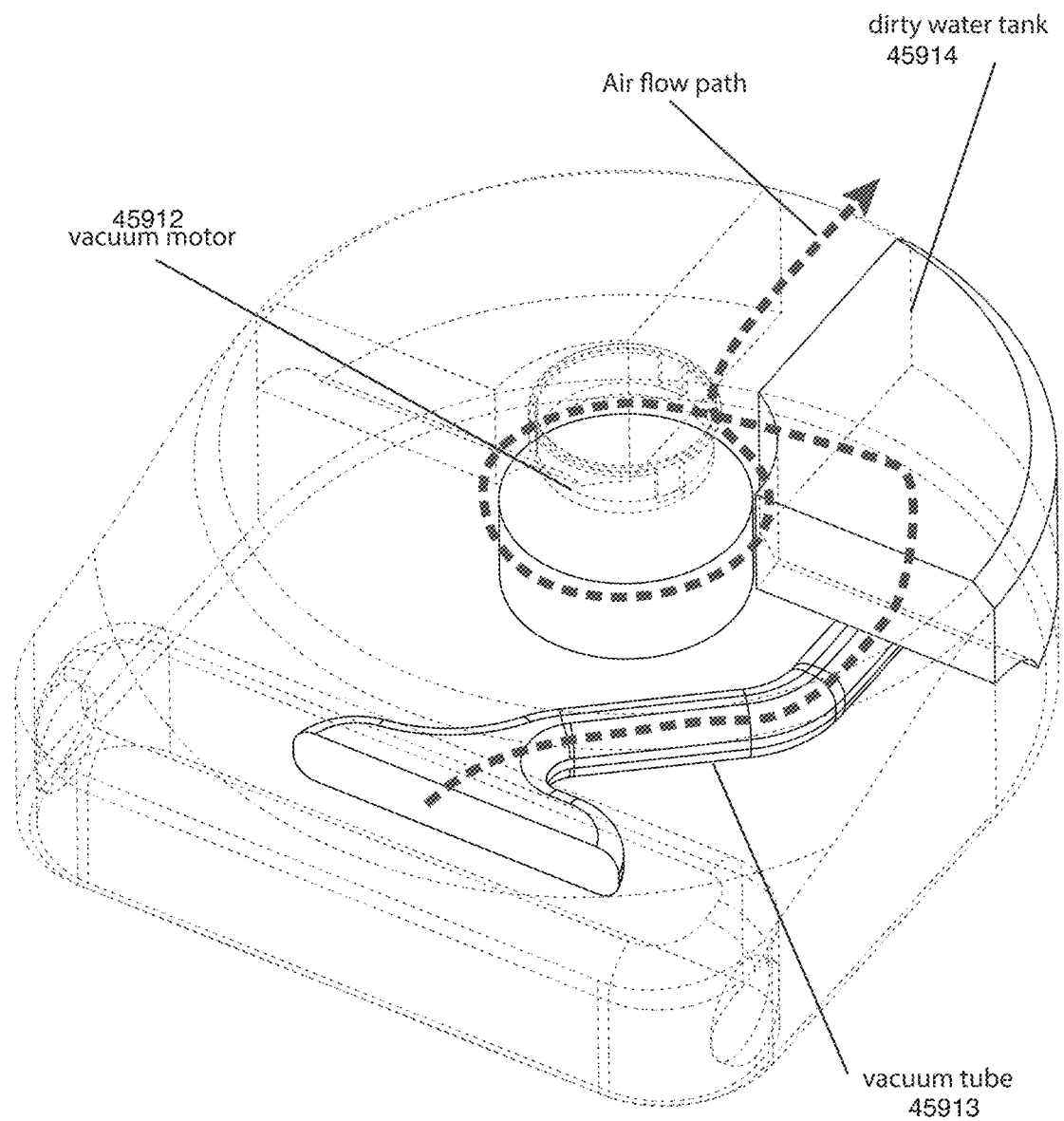
Figure 42F:
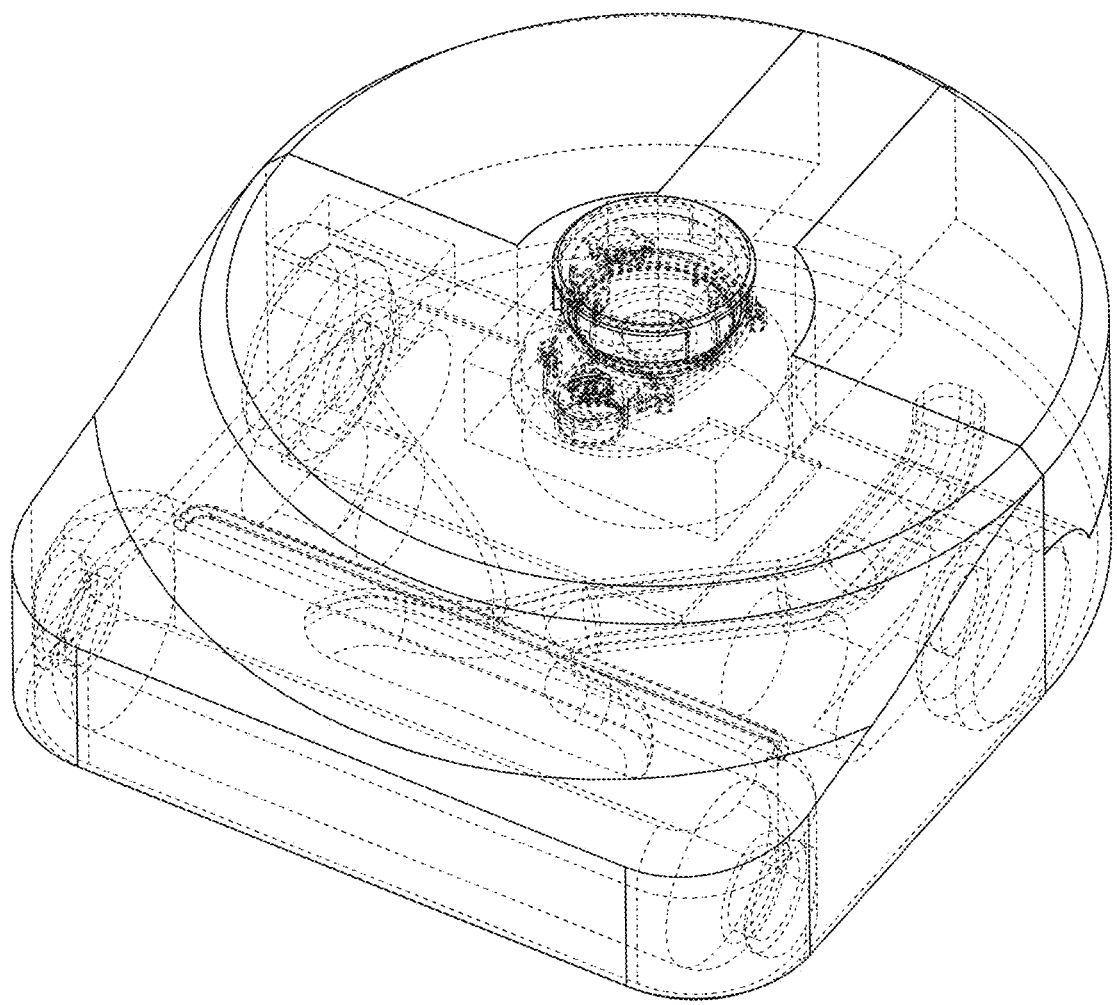

Some embodiments comprise robot including a wet mop and dry vacuum for mopping and vacuuming hard surfaces at a same time. FIGS. 42A-42F illustrate an example of a robot comprising a main body 45900, LIDAR 45901, PCB and processor 45902, proximity sensors 45903, cliff sensors 45904, battery 45905, drive wheels 45906 and their motors and gearboxes 45907, mopping roller brush 45908, clean liquid tank 45909, water spray system including a pump 45910 and spray head 45911, vacuum motor 45912, vacuum tube 45913, and dirty liquid tank 45914. FIG. 42A illustrates an exterior of the robot, FIG. 42B illustrates obstacle detecting components and the PCB and processor, FIG. 42C illustrates the drive wheels, their motors and gearboxes and the battery, FIG. 42D illustrates the clean liquid spraying system, FIG. 42E illustrates the dirty liquid collection system and an air flow path of the vacuum, and FIG. 42F illustrates all subsystems.

In some embodiments, a mopping robot includes a roller brush for mopping a floor. In some embodiments, a cleaning blade or brush positioned above the roller brush within the robot cleans the roller brush constantly as the roller brush picks up dirt and water (or cleaning solution). Friction between the cleaning blade or brush and the roller brush extracts the dirt and/or the water from the roller brush and guides the dirt and/or the water to a dirty water container disposed on the robot. In some embodiments, solid pieces of dirt are separated from the water during the cleaning process of the roller brush and are guided to a dirt collection container. In some embodiments, solid pieces of dirt are filtered from the water for separated from the water. In these embodiments, a filter is positioned above the dirty water container. The filter allows the water to flow into the dirty water container while preventing the dirt from entering the dirty water container. A similar cleaning process may be used for cleaning a main vacuum brush of a robot.

In embodiments, the cleaning blade or brush is static or motorized. In some embodiments, the cleaning blade or brush rotate in an opposite direction to a direction of rotation of the roller brush. Since roller brushes typically rotate in a forward direction while the robot cleans the floor, the cleaning blade or brush rotates in a backwards direction to cause friction between the cleaning blade or brush and the roller brush required in extracting dirt and water from the roller brush. Regardless of the directions of rotation, the direction of movement of the extracted dirt and water depends on a location of the cleaning blade or brush in relation to the roller brush. For instance, when the cleaning blade or brush is positioned behind the roller brush, the extracted dirt and water fall downwards and a container beneath the roller brush and the cleaning blade or brush is required to catch the extracted dirt and water. When the cleaning blade or brush is positioned in front of the roller brush, the extracted dirt and water are directed upwards. In this case, a vacuum mechanism is necessary for collecting the extracted dirt and water and a container above the roller brush and the cleaning blade or brush or elsewhere is required for containing the dirt and water.

In some embodiments, the robot includes a clean water container and a dirty water container. A charging station of the robot may be configured to refill and/or drain the clean water container and the dirty water container. In some embodiments, a mechanical nozzle of the charging station extends when the robot is properly positioned on the charging station and refills the clean water container. In some embodiments, a mechanical nozzle of the charging station extends when the robot is properly positioned on the charging station, connects to the dirty water container, and drains the dirty water into a container housed within the charging station. The container housed within the charging station storing dirty water may be removed manually to discard the dirty water or may be connected to a sewer system of the environment for direct discard of the dirty water.

In some embodiments, the nozzle enters the clean water container and/or the dirty water container from above. In some embodiments, the clean water container and/or the dirty water container are positioned on a rear side or left/right sides of the robot. In some embodiments, the clean water container and/or the dirty water container are refilled and/or drained from a bottom side of the containers. In some embodiments, a pump pumps clean water stored on the charging station or from a water system of the environment into the clean water container. In some embodiments, a suction pump sucks dirty water from the dirty water container and into a container housed in the charging station or into a sewer system of the environment. Regardless of a position of the nozzles in relation to the clean water container and the dirty water container, a sealing mechanism is used at a point of contact between a nozzle and a container.

In some embodiments, a float mechanism is used prevent a container from overflowing with or depletion of water or cleaning fluid. The float mechanism may be fully mechanical. The float mechanism may include a float ball or cylinder attached to a lever arm. When the water or cleaning fluid level in the container drops below a certain point, the float also drops, causing the lever arm to move downwards. This downward movement of the lever arm opens a valve, allowing water or cleaning fluid to flow into the container. As the water or cleaning fluid level in the container rises, the float also rises, causing the lever arm to move upwards. This upward movement of the lever arm closes the valve, stopping the flow of water or cleaning fluid into the container. The valve remains closed until the water or cleaning fluid level drops again, causing the float to drop and the lever arm to move downwards and open the valve once more. In this way, the automatic valve maintains a consistent and desired water or cleaning fluid level in the container without any overflowing. In some embodiments, the float ball or cylinder is not directly connected to the valve. For example, when the container is filled from the top the float may be used to close the valve when the container is full by blocking vertical movement of the valve. In some embodiments, the valve is spring loaded and is pushed down by a nozzle of the charging station. In some embodiments, the float mechanism may trigger a switch that transmits a message to the robot indicating the container is full. The robot may then transmit an instruction to the charging station to shut or turn off the valve or pump. In some embodiments, an optical or weight sensor may be used in determining whether the container is full, empty, or a level of water or cleaning fluid.

In some embodiments, clean water and/or a cleaning solution are pumped into the clean water container. A processor of the charging station or robot may determine a ratio of the water and the cleaning solution and the charging station may subsequently pump the determined amount of water and cleaning solution into the clean water container. In some embodiments, the ratio of water and cleaning solution is adjusted based on sensor data (new and historical). In some embodiments, the cleaning solution may be pumped into a separate container of the robot and the cleaning solution may be combined with the water during coverage of the environment by the robot. In some embodiments, the cleaning solution is sprayed from the separate container onto the floor and is combined on the floor with water sprayed from the clean water container onto the floor. In some embodiments, the robot includes sensors used in recognizing a type of stain and properties of the stain on the floor (e.g., milk, pet waste, etc.; wet or dry; a level of stickiness; an area of the stain). In some embodiments, the processor of the robot classifies the type of the stain based on surface reflection differences, color, stickiness, or other properties. In some embodiments, the robot spend more time cleaning the stained area, uses a higher cleaning intensity in cleaning the stained area, and/or applies a higher cleaning tool pressure to the stained area.

In some embodiments, a filtering mechanism is housed within the charging station for filtering and recycling dirty water stored in a dirty water container of the charging station. The recycled dirty water may be pumped into a clean water container of the charging station. This reduces an amount water used by the robot. In some embodiments, the charging station is configured to infuse the dirty water with silver ions after filtration to kill the bacteria and fungi before recycling the water. In some embodiments, the filtering mechanism is housed within the robot (e.g., larger commercial cleaning robots) and the dirty water collected in the dirty water container of the robot is filtered one or more times, recycled, and pumped into the clean water container of the robot.

In some embodiments, the clean water and dirty water containers of the charging station are used in washing the roller brush. The clean water and dirty water containers are filled and drained, respectively, as described above during washing of the roller brush. During washing, the roller brush spins faster than in operation while clean water from the clean water container is pumped over the roller brush as the robot is statically positioned on the charging station. The cleaning blade or brush extracts and guides any remaining dirt and water (or cleaning solution) from the roller brush to the dirty water container or bin of the charging station. During this process, the robot is static over the charging station. In some embodiments, an edge of the cleaning blade has small teeth to extract finer dirt particles from the roller brush. In some embodiments, two cleaning blades are used, one blade having a thin and continuous edge and the other blade having a thicker and toothed edge.

Some embodiments include the process of cleaning the roller brush (or another brush of the robot). Once the robot is properly positioned over the charging station, the roller brush spins for a short time while the cleaning blade or brush extracts the solid dirt from the roller brush. Then to wash the roller brush, the clean water and/or the cleaning solution are pumped onto the roller brush while the roller brush continues to spin. At the same time, the cleaning blade or brush scrapes or scrubs the roller brush to extract even more dirt from the roller brush. Finally, the roller brush spins faster than in operation for a few minutes without any addition of water and/or cleaning solution to dry the roller brush.

In some embodiments, the robot may vacuum the floor before mopping the floor. In such a case, a vacuum system is disposed on a front portion of the robot and includes a separate dustbin and a mopping system is disposed on a rear portion of the robot. In some embodiments, the robot uses only the vacuum system or the mopping system during a cleaning session. In some embodiments, at least a portion of the mopping system is lifted away from the floor (e.g., 2, 3, 5, or other amount of millimeters) when the robot is only vacuuming or when the robot is approaching carpet to avoid touching carpet when the robot is vacuuming or driving over carpeted areas. A portion of the mopping system may change position and/or orientation, such as positioned on a top surface of the robot or on a rear portion of the robot, when the robot is vacuuming.

Figure 44B:
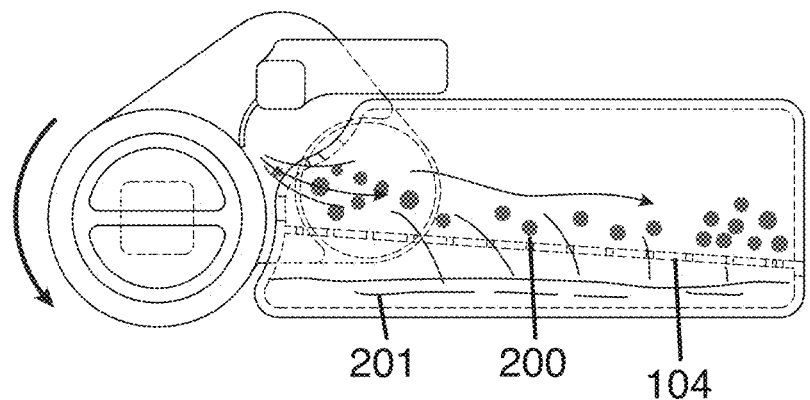

FIG. 43A illustrates a self-cleaning mopping system with a roller brush 100 and a cleaning brush 101 rotating in opposite directions by motor and gearbox 102, a dirty water and debris container 103, and a filter 104 to separate the debris from the dirty water. FIG. 43B illustrates a self-cleaning mopping system with the roller brush 100 and a cleaning blade 105, the dirty water and debris container 103, and the filter 104 to separate the debris from the dirty water. FIG. 44A illustrates a side view of the self-cleaning mopping system in FIG. 43A, wherein the filter 104 separates the debris 200 from the dirty water 201. FIG. 44B illustrates a side view of the self-cleaning mopping system in FIG. 43B, wherein the filter 104 separates the debris 200 from the dirty water 201.

Figure 45A:
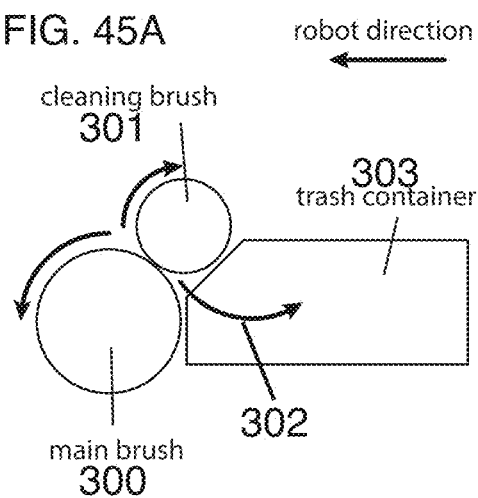
Figure 45B:
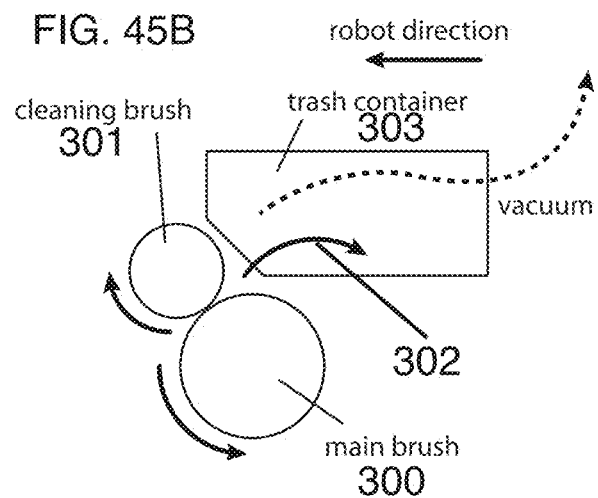

FIGS. 45A and 45B illustrate how the location of the main brush 300 and a cleaning brush 301 affect a direction 302 of dirt extracted into a container 303.

Figure 46:
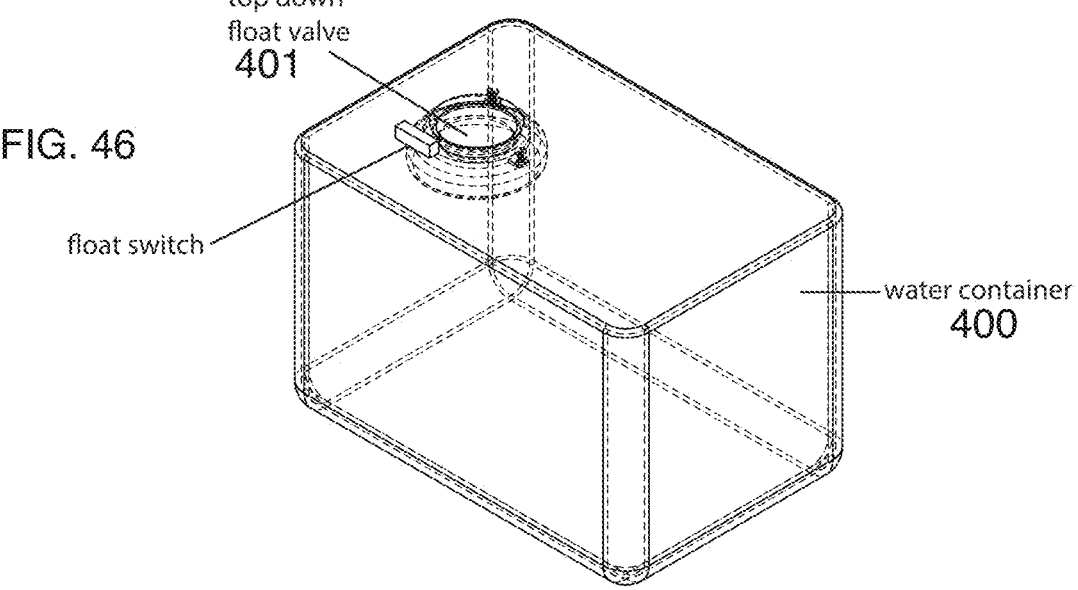
Figure 47:
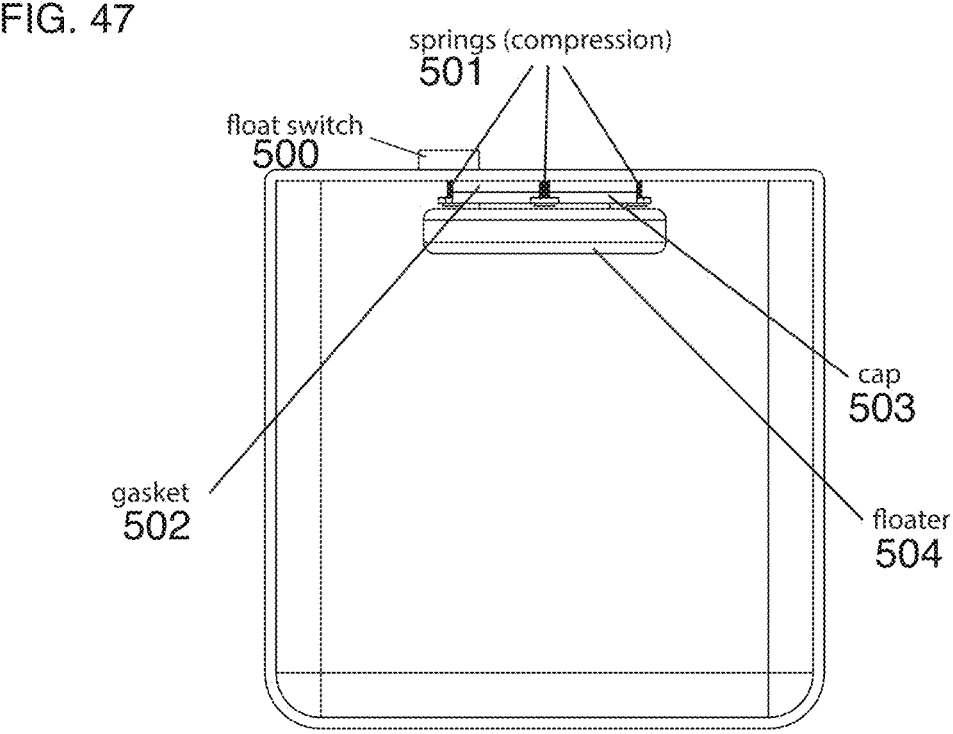
Figures 48A, 48B:
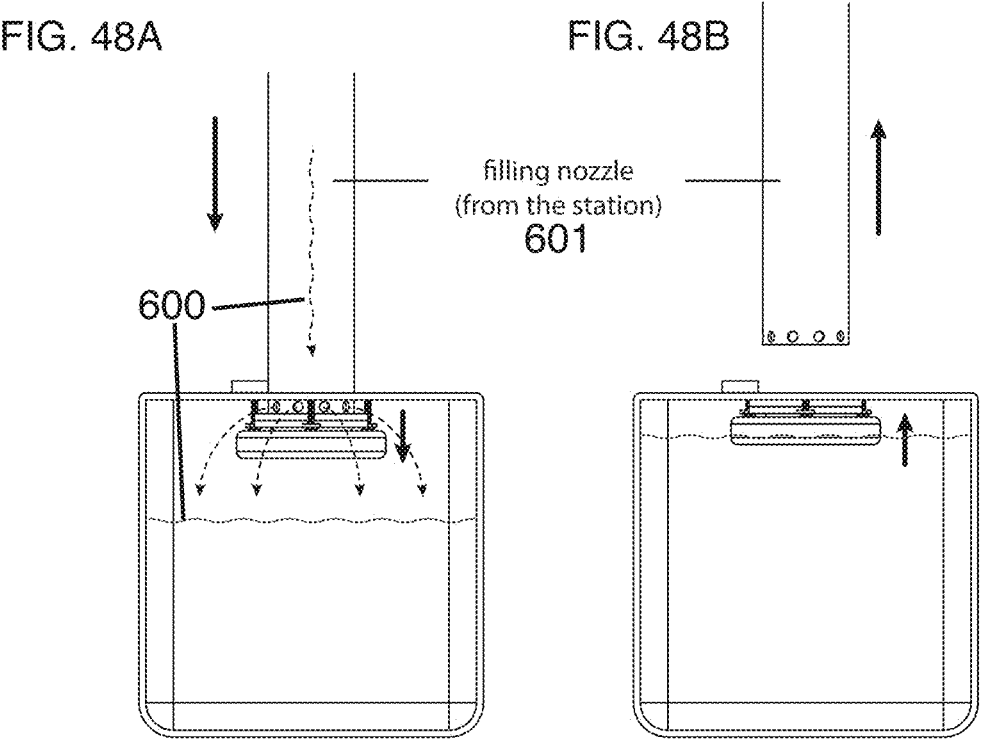

FIG. 46 illustrates a water container 400 of a robot including a top-down float valve 401. The water container 400 may be refilled automatically when the robot is positioned at a charging station. FIG. 47 illustrates different components of the float valve 400 including a float switch 500, springs 501, gasket 502, a cap 503, and a floater 504. FIGS. 48A and 48B illustrate the container 400 being refilled with water 600 from a nozzle 601 of the charging station through the float valve 401. The nozzle 601 pushes the cap 503 down to refill the container 400 with water, the springs 501 extending as the cap 503 is pushed down. As the water level rises, the floater 504 rises, triggering the switch 500, indicating to the robot that the container 400 is full. The robot may then send a signal to the charging station to shut off the water and pull the nozzle 601 up.

Figure 49A:
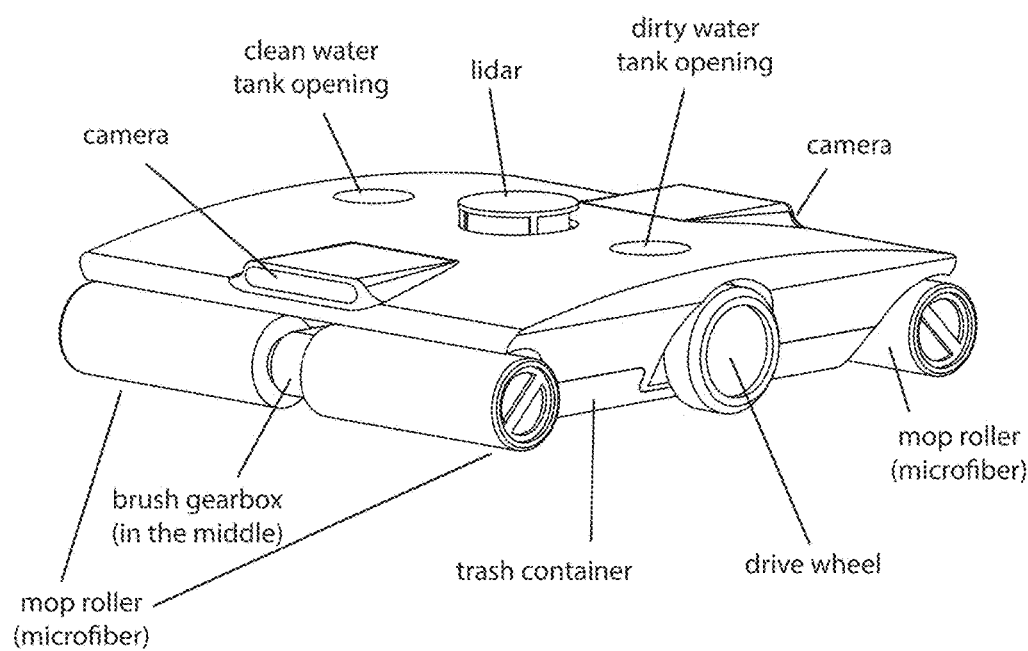
Figure 49B:
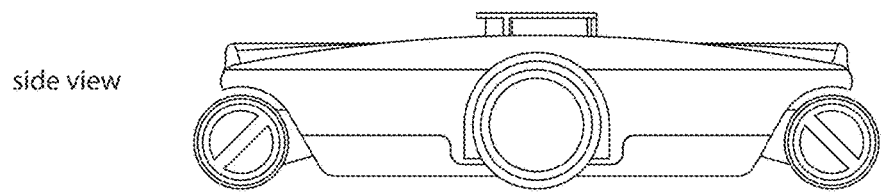
Figure 49C:
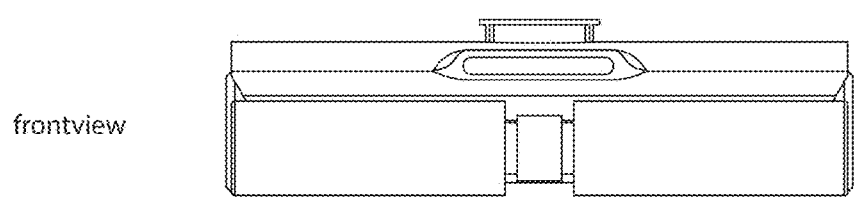

FIG. 49 illustrates a wet and dry mop robot and its components. Both front and rear sides of the robot are equipped with mop rollers. To cover the entire width of the robot, the mop rollers are inserted from the sides of the robot, covering edge to edge while a motor and gearbox assembly is placed in a middle of roller brushes. The wheels of the robot are positioned in the middle of the robot such that the front and back mop rollers may clean any potential trail left behind. The clean water tank is refilled and the dirty water tank is drained using the charging station as described above.

In some embodiments, the robot uses steam to clean the floor. Clean water may be stored in a clean water container of the robot. The robot may comprise a mechanism for converting the water into steam during a cleaning a session at specific intervals. To generate steam, a small pump may pump water from the clean water container into a heating chamber or a one-sided valve may open to allow water to flow into the heating chamber. The heating chamber include a heating element for heating the water to its boiling point, producing steam. The pressure inside the heating chamber builds as the steam is produced and the pressure is regulated by a pressure relief valve, preventing the heating chamber from becoming over-pressurized. Once steam is produced, the steam flows through a tube or a hose onto a mopping pad or a roller brush that contacts the floor for cleaning and sanitization. As the steam is released from the heating chamber, the pressure in the heating chamber drops, triggering the pump or valve to add water into the heating chamber to produce more steam when needed.

Although the high-temperature steam produced evaporates quickly, the robot may be equipped with a vacuum system to suck moisture and any dirt loosened from the steam while the robot steam cleans the floor. The vacuum system may direct the water and dirt to a container of the robot. The robot may include a filtering system for separating solid pieces of dirt from liquid and storing them in separate containers. The clean water container of the steam robot may be refilled manually or autonomously by the charging station, as described above. Similarly, a dirty water container storing dirty water may be drained manually or autonomously by the charging station. A container storing the solid pieces of dirt may also be emptied autonomously by the charging station.

Some embodiments may combine the steam with vibration of at least mopping pad, roller brush, or the like as both steam and vibration aim to loosen stains, dirt, and debris before mopping and vacuuming the floor. In some embodiments, a steaming function of the robot is combined with a wet and dry mopping function of the robot. In this case, a portion of the water from the clean water container of the robot is guided into the heating chamber while the rest of the water is applied to the floor or a mopping pad/roller brush of the robot. A self-cleaning process as described above for the mopping pad or the roller brush may be used. However, in this case, steam may be used to loosen any dirt stuck to the mopping pad or roller brush before washing the mopping pad or roller brush.

To avoid mold and bacteria growth within the dirty water container, the dirty water may be treated with UVC light during operation or when idle. Different materials with antibacterial and antimicrobial properties may be embedded in the material used in fabricating the dirty water container. Examples of materials with antibacterial and antimicrobial properties include silver, copper, zinc, and triclosan. Silver has natural antibacterial properties and is often used in antibacterial plastics. Silver ions are embedded in the plastic, and when bacteria comes into contact with the plastic, the ions release and kill the bacteria. Copper is another material with natural antibacterial properties that is sometimes used in antibacterial plastics. Similar to silver, copper ions are embedded in the plastic and released to kill bacteria on contact. Zinc is a mineral that can also have antibacterial properties when used in plastics. Like silver and copper, zinc ions are embedded in the plastic and released to kill bacteria. Triclosan is an antimicrobial agent that is sometimes added to plastics to prevent the growth of bacteria. It works by interfering with the metabolism of bacteria, ultimately killing them.

In some embodiments, the robot deep cleans carpeted areas. The robot may spray clean water, cleaning solution, and/or steam onto a carpet. Once the water, cleaning solution, and/or steam is applied onto the carpet, brushes or rollers of the robot agitate carpet fibers and loosen dirt and stains. Agitation may be achieved with rotating brushes, oscillating brushes, or other types of scrubbing mechanisms of the robot. After the water, cleaning solution, and/or steam is agitated into the carpet fibers, a vacuum system of the robot generates powerful suction to extract and guide the combined dirt and water/cleaning solution from the carpet into a dirty container of the robot.

Unlike robot vacuums, the robot cleans the carpet one spot at a time. Brushes of the robot may move independently from the robot. For instance, a brush of the robot may move forwards and backwards (if it is a sweeper brush) or move in a circular path or a spiral path (if it is a spinning brush) to agitate the carpet fibers while the robot is stationary. Self-cleaning brushes and self-draining/self-refilling container are similar to that described above.

Figure 50:
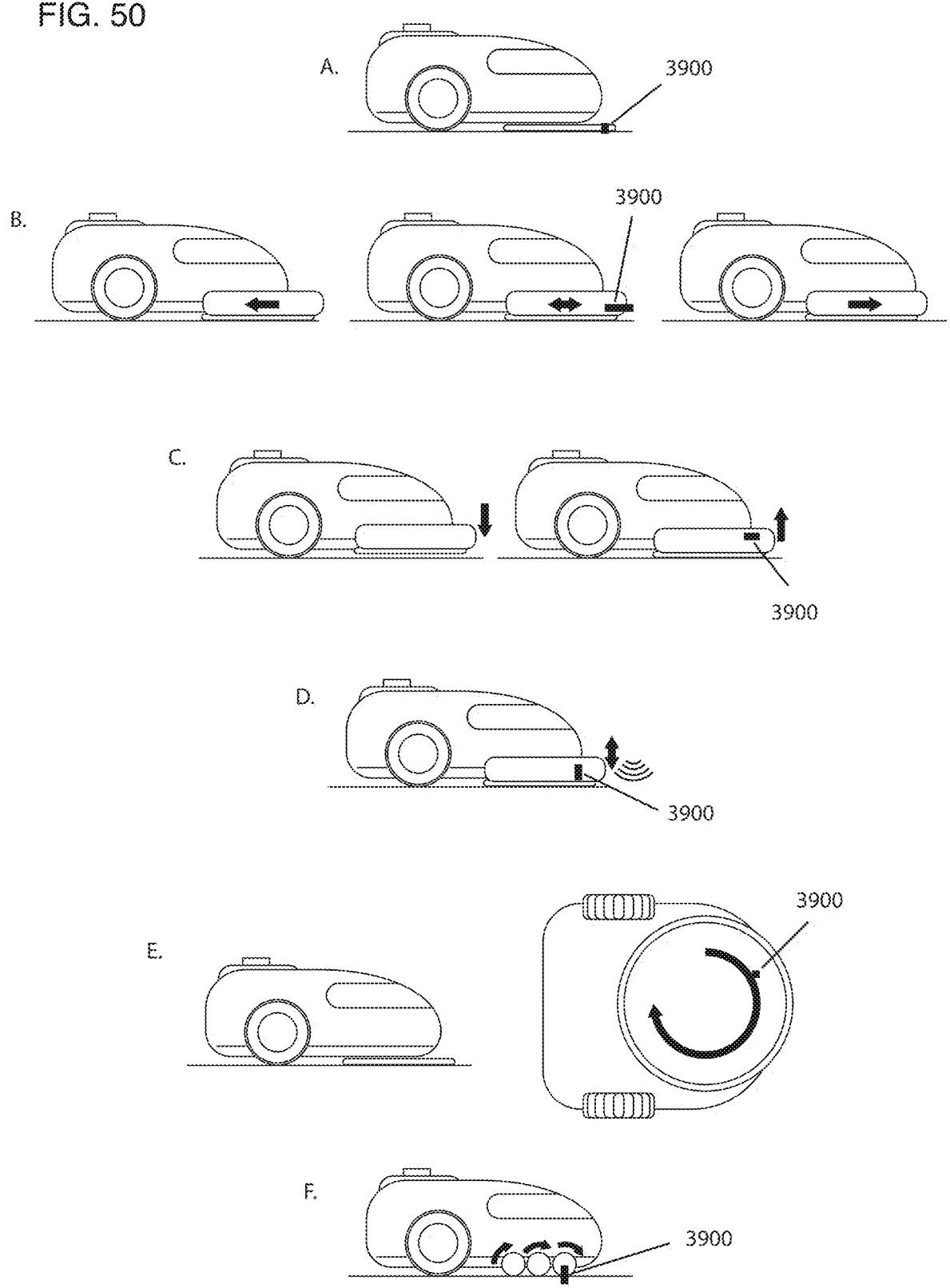
FIG. 50 illustrates examples of various mechanisms for a mopping attachment.

FIG. 50 illustrates a robot with a mopping attachment 3900. The mopping attachment 3900 is of various forms and includes different mechanisms for performing work. The mopping attachment 3900 may be a stationary mop (A), include a mechanism facilitating a back and forth motion for mopping (B), include a mechanism facilitating up and down motion for lifting and lowering the mop (C), include a mechanism facilitating ultrasonic vibration or shaking (D), include a spinning disk mop (E), and/or including spinning rollers (F). In addition to these variations, the mopping attachment 3900 may include a steaming mechanism or a water dispensing mechanism for dispensing warm or cold water to dampen a mop cloth for better cleaning. In some cases, the mopping attachment 3900 may be combined with a dirt suction mechanism to clear excess dirty water or debris before or after mopping.

In some embodiments, a mopping extension may be installed in a dedicated compartment in the chassis of the robot. In some embodiments, a cloth positioned on the mopping extension is dragged along the work surface as the robot drives through the area. In some embodiments, nozzles direct fluid from a cleaning fluid reservoir to the mopping cloth. The dampened mopping cloth may further improve cleaning efficiency. In some embodiments, the mopping extension further comprises a means for moving back and forth in a horizontal plane parallel to the work surface during operation. In some embodiments, the mopping extension further comprises a means for moving up and down in a vertical plane perpendicular to the work surface to engage or disengage the mopping extension.

Figure 51:
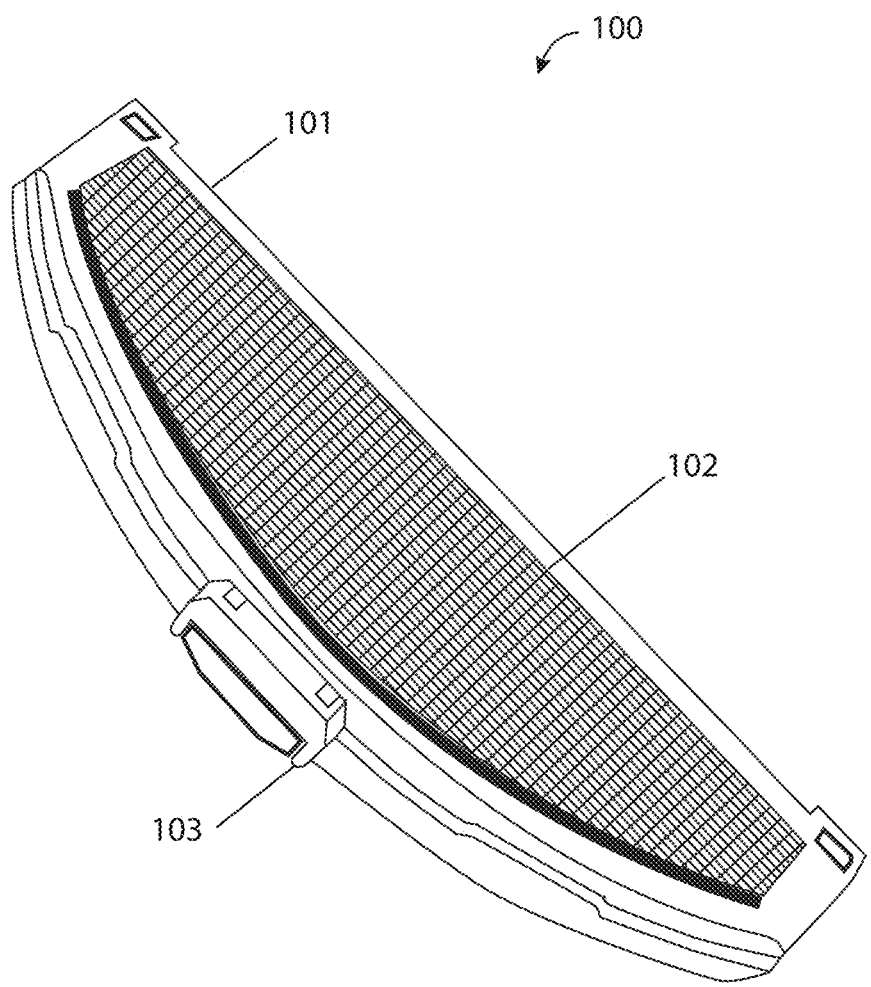
FIG. 51 illustrates a bottom view of a mopping extension in accordance with some embodiments.

In some embodiments, a detachable mopping extension that may be installed inside a dedicated compartment with the chassis of the robot is provisioned. FIG. 51 illustrates a bottom view of an example of a detachable mopping extension 100. In some embodiments, the mopping extension may be attached to the chassis of a robot (not shown). The mopping extension includes a frame 101 that supports a removable mopping cloth 102 and a latch 103 to secure and release the mopping extension to and from the robot.

Figure 52:
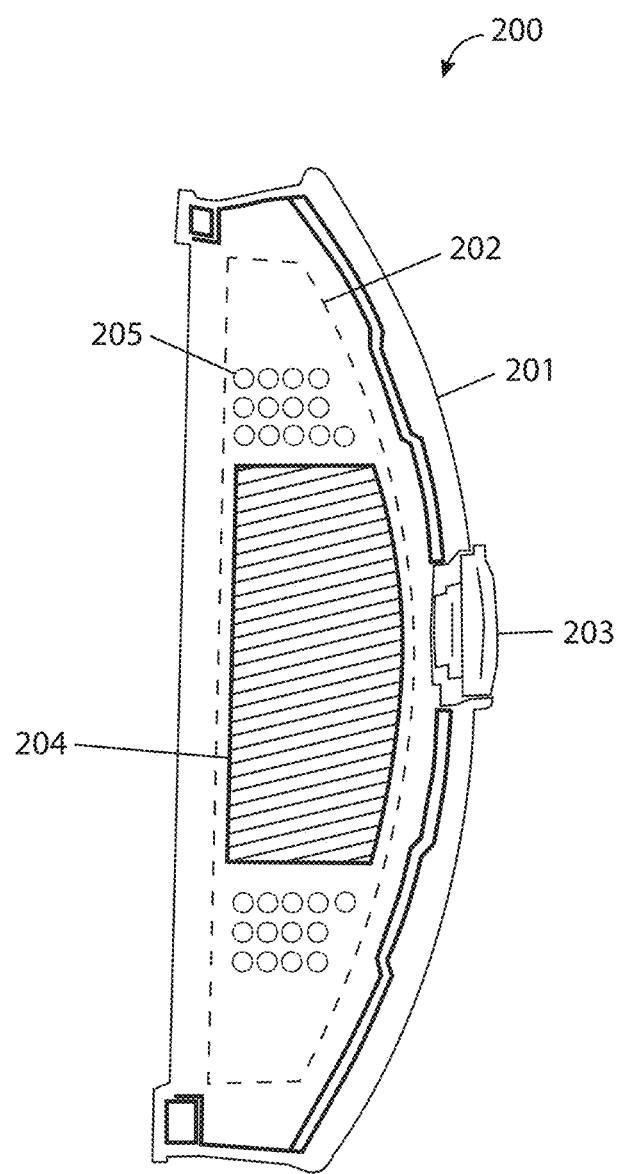
FIG. 52 illustrates a top view of a mopping extension with internal components in accordance with some embodiments.

FIG. 52 illustrates an example of internal components of a mopping extension 200. The frame 201 supports the mop components. A latch 203 secures the mopping extension to the chassis of the robot and may be released to detach the mopping extension. In some embodiments, the mopping extension further includes a refillable fluid reservoir 204 that stores cleaning fluid to be dispersed by nozzles 205 onto the mopping cloth 202. In some embodiments, the nozzles continuously deliver a constant amount of cleaning fluid to the mopping cloth. In some embodiments, the nozzles periodically deliver predetermined quantities of cleaning fluid to the cloth.

Figure 53:
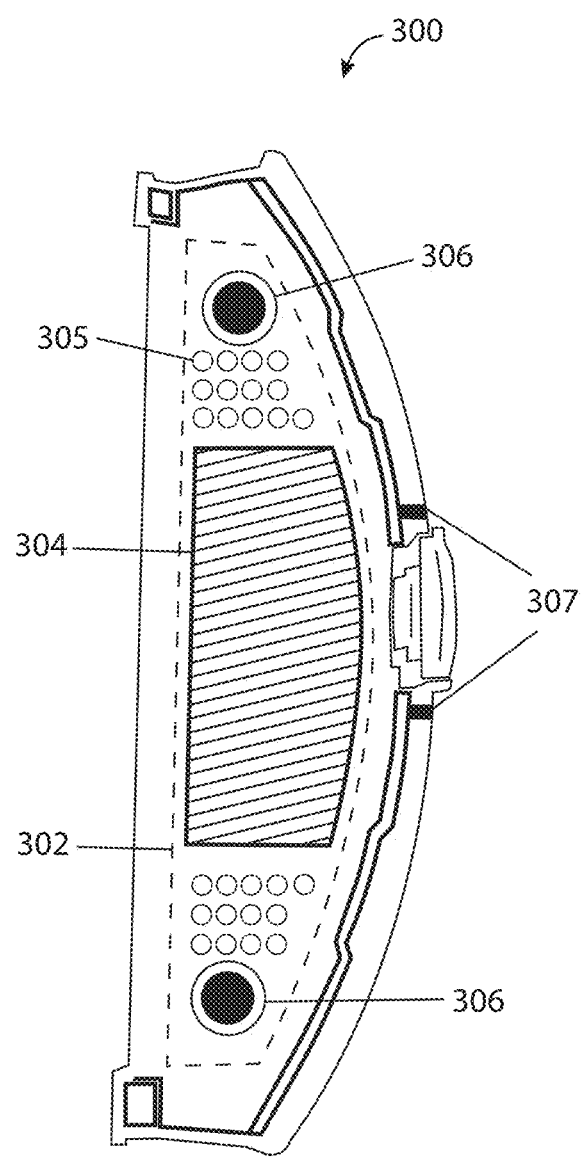
FIG. 53 illustrates a top view of a mopping extension with ultrasonic oscillators in accordance with some embodiments.

FIG. 53 illustrates an example of a mopping extension 300 with a set of ultrasonic oscillators 306 that vaporize fluid from the reservoir 304 before it is delivered through the nozzles 305 to the mopping cloth 302. Metal electrodes 307 provide power from a main battery (not shown) of the robot to the ultrasonic oscillators. In some embodiments, the ultrasonic oscillators vaporize fluid continuously at a low rate to continuously deliver vapor to the mopping cloth. In some embodiments, the ultrasonic oscillators turn on at predetermined intervals to deliver vapor periodically to the mopping cloth.

Figure 54A:
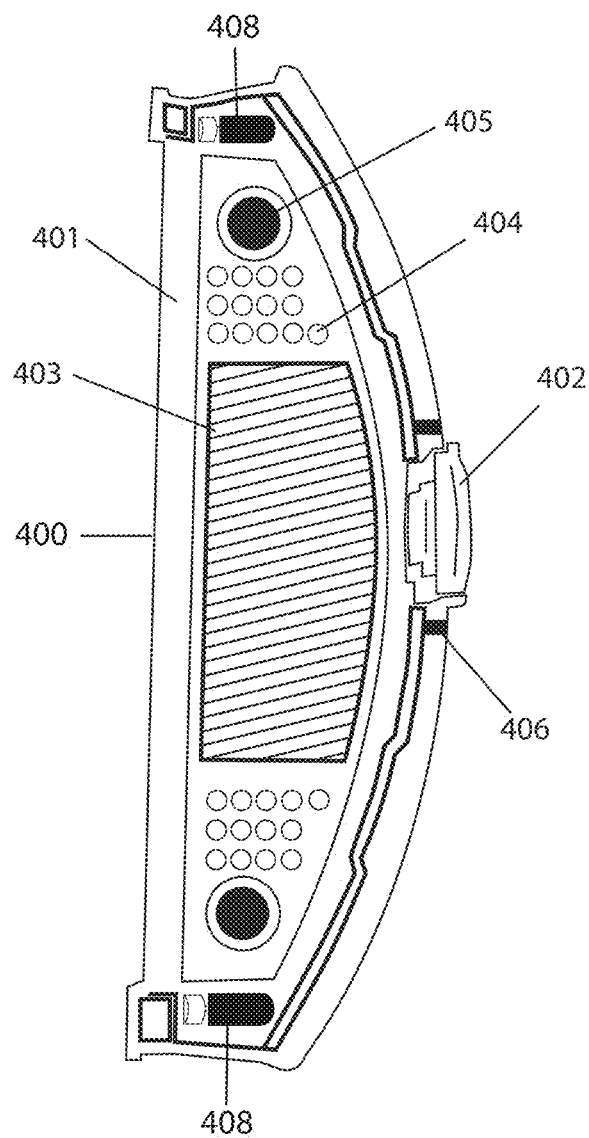
FIG. 54A illustrates a top view of a mopping extension with eccentric rotating mass vibration motors to provide vibrations to the mopping extension in accordance with some embodiments.
Figure 54B:
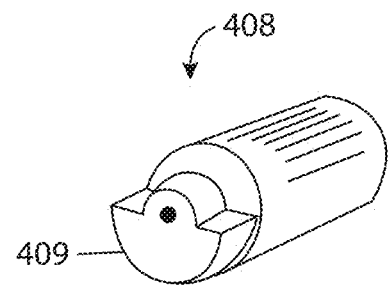
FIG. 54B illustrates a perspective view of an eccentric rotating mass vibration motor in accordance with some embodiments.

In some embodiments, the mopping extension includes a means to vibrate the mopping extension during operation. FIG. 54A illustrates an example of a top side of a mopping extension 400. The mopping extension 400 includes a frame 401 that supports a removable mopping cloth and a latch 402 to secure and release the mopping extension to and from a robot. The mopping extension further includes a refillable fluid reservoir 403 that stores cleaning fluid to be dispersed by nozzles 404 onto the mopping cloth. In some embodiments, the nozzles continuously deliver a constant amount of cleaning fluid to the mopping cloth. In some embodiments, the nozzles periodically deliver predetermined quantities of cleaning fluid to the cloth. The mopping extension 400 also includes a set of ultrasonic oscillators 405 that vaporize fluid from the reservoir 403 before it is delivered through the nozzles 404 to the mopping cloth. Metal electrodes 406 provide power from a main battery (not shown)

of the robot to the ultrasonic oscillators. In some embodiments, the ultrasonic oscillators vaporize fluid continuously at a low rate to continuously deliver vapor to the mopping cloth. In some embodiments, the ultrasonic oscillators turn on at predetermined intervals to deliver vapor periodically to the mopping cloth. The mopping extension further includes eccentric rotating mass vibration motors 408. FIG. 54B illustrates a close up perspective view of an eccentric rotating mass vibration motor 408. Eccentric rotating mass vibration motors rely on the rotation of an unbalanced counterweight 409 to provide vibrations to the mopping extension.

Figure 55:
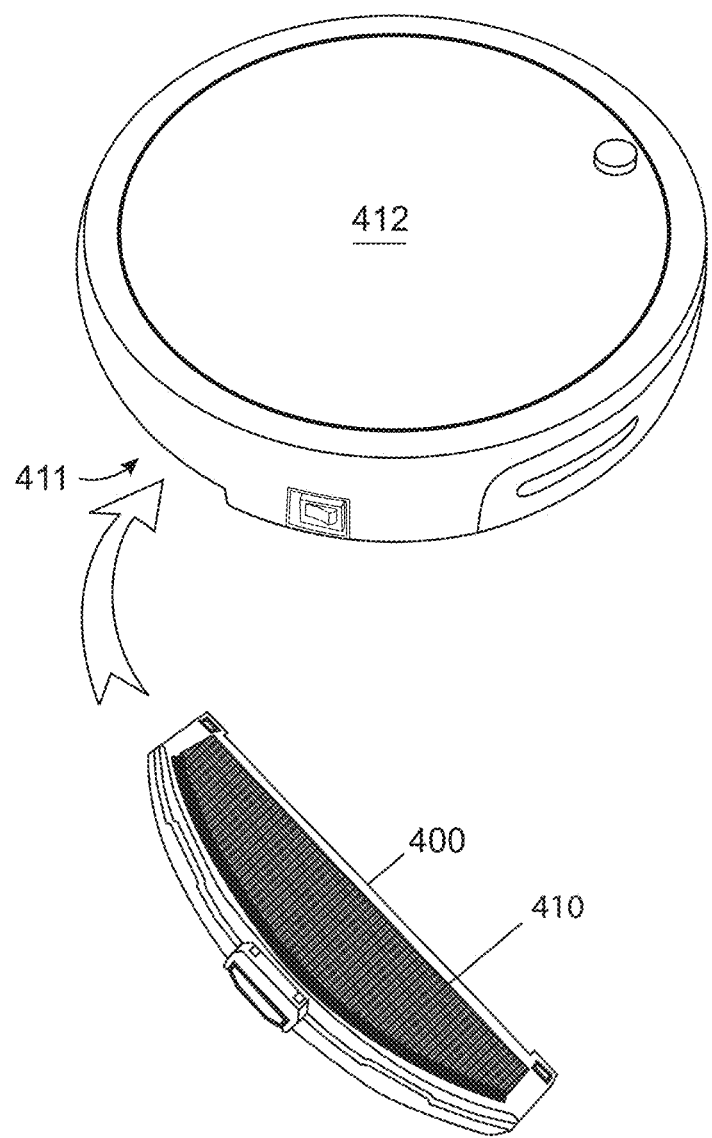
FIG. 55 illustrates the insertion of a mopping extension into a compartment in the chassis of a robotic vacuum in accordance with some embodiments.

FIG. 55 illustrates an example of a robot to which a mopping extension 400 may be attached. The mopping extension 400 with mopping cloth 410 fits into a compartment 411 on the underside of the robot 412 such that the cloth 410 attached to the bottom side of the mopping extension may be caused to make contact with the work surface as the robot 412 drives.

Figure 56:
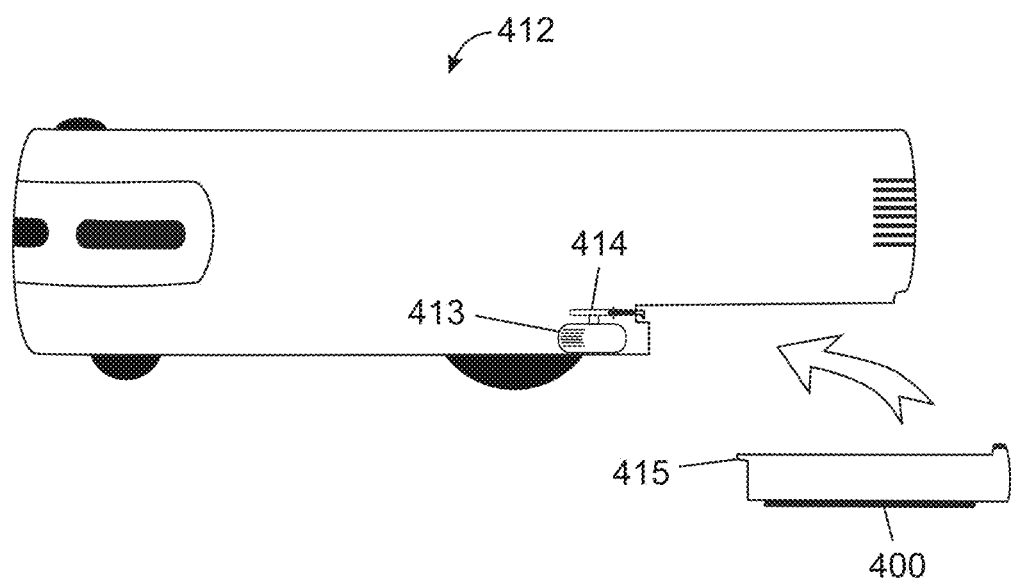
FIG. 56 illustrates a side view of a robotic vacuum with a motor to move a mopping extension back and forth during operation in accordance with some embodiments.

In some embodiments, the mopping extension includes a means to move the mopping extension back and forth in a horizontal plane parallel to the work surface during operation. FIG. 56 illustrates a side elevation view of the robot 412 with a mechanism for moving the mopping extension 400 back and forth. An electric motor 413 positioned inside the chassis of the robot 412 transfers movements to the mopping extension 400 through a rod 414 to tabs 415 on the mopping extension.

Figure 57A:
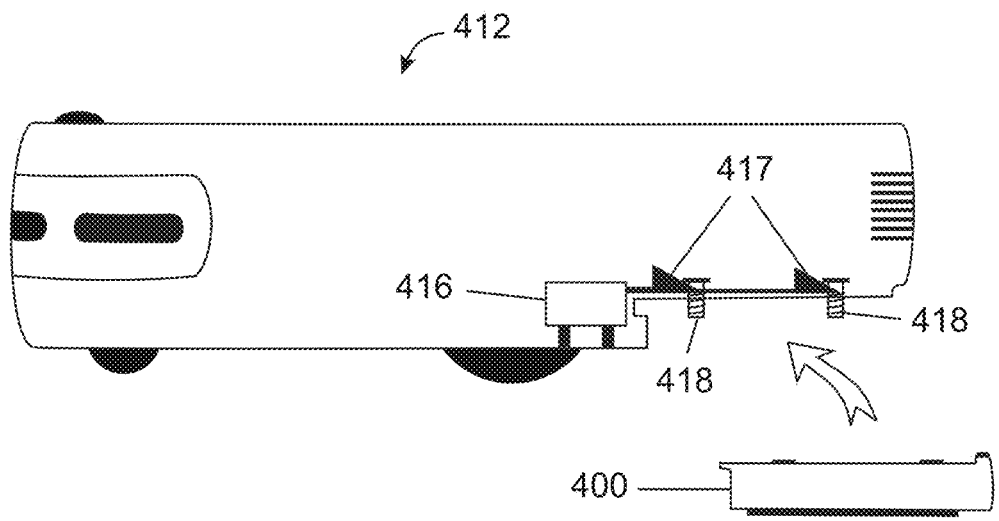
FIG. 57A illustrates a side view of a robotic vacuum with a mechanism for engaging and disengaging a mopping extension in an engaged position in accordance with some embodiments.
Figure 57B:
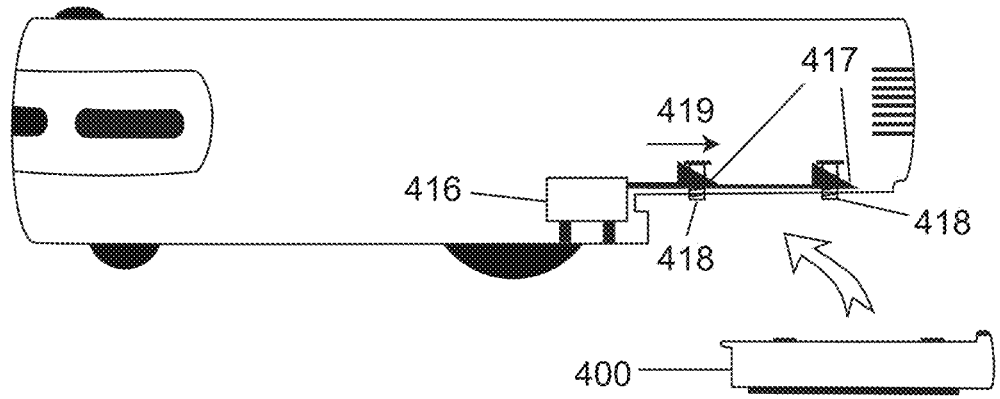
FIG. 57B illustrates a side view of a robotic vacuum with a mechanism for engaging and disengaging a mopping extension in a disengaged position in accordance with some embodiments.

In some embodiments, the mopping extension includes a means to engage and disengage the mopping extension during operation by moving the mopping extension up and down in a vertical plane perpendicular to the work surface. In some embodiments, engagement and disengagement may be manually controlled by a user. In some embodiments, engagement and disengagement may be controlled automatically based on sensory input. FIG. 57A illustrates a side view of the robot 412 with a means for engaging and disengaging a mopping extension 400. The mopping extension is shown not attached to the robot and not all components of the robot are shown in this example to more clearly show details. An electric servomotor 416 positioned within the chassis of the robot 412 pushes forward and pulls back wedges 417 that raise and lower springs 418 to which the mopping extension 400 may be attached. When the wedges are pulled back, as shown in FIG. 57A, the mopping extension 400, when attached, will be engaged. Referring to FIG. 57B, when the wedges 417 are pushed forward in a direction 419 by the electric servomotor 416, the springs 418 are raised and the mopping extension 400 is disengaged.

Figure 58A:
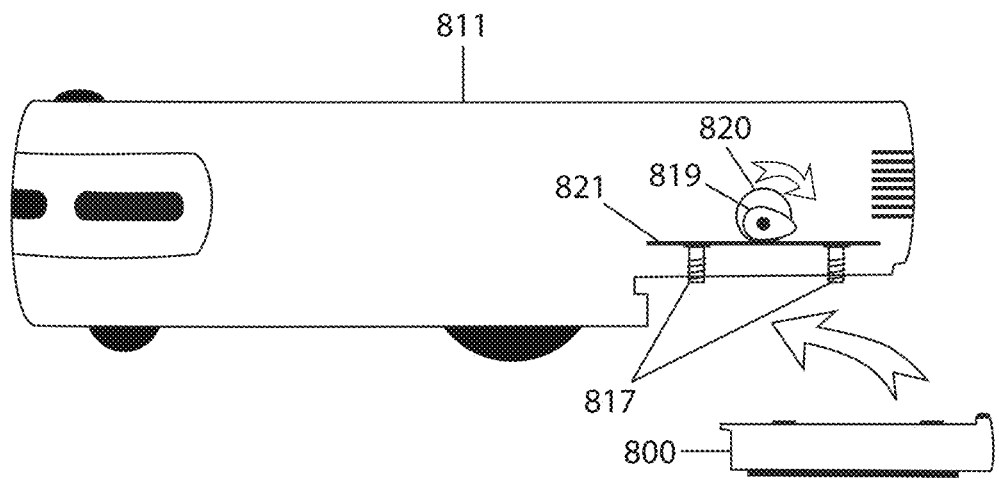
FIG. 58A illustrates a side view of a robotic vacuum with an alternative mechanism for engaging and disengaging a mopping extension in a disengaged position in accordance with some embodiments.
Figure 58B:
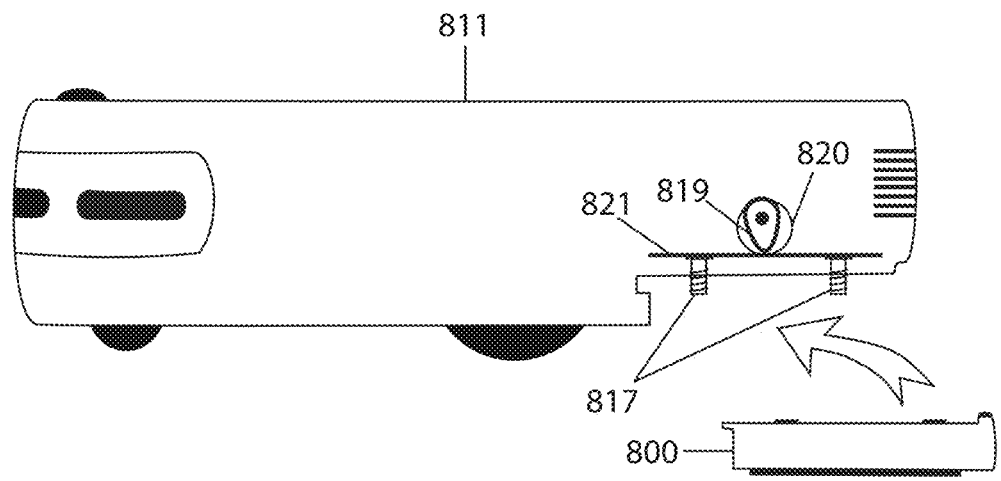
FIG. 58B illustrates a side view of a robotic vacuum with an alternative mechanism for engaging and disengaging a mopping extension in an engaged position according in accordance with embodiments.

FIGS. 58A and 58B illustrate an example of an alternate method for engaging and disengaging a mopping extension. An oval wheel 819 positioned in the chassis of a robot 811 is turned by an electric motor 820, which causes the wheel to push down a plate 821. When the wheel is not pushing the plate down, springs 817 are not pushed down and the mopping extension 800 is not engaged. In FIG. 58B the wheel 819 is pushing down the plate 821 causing the springs 817 to be pushed down which lowers the mopping extension 800, engaging it.

Figure 59A:
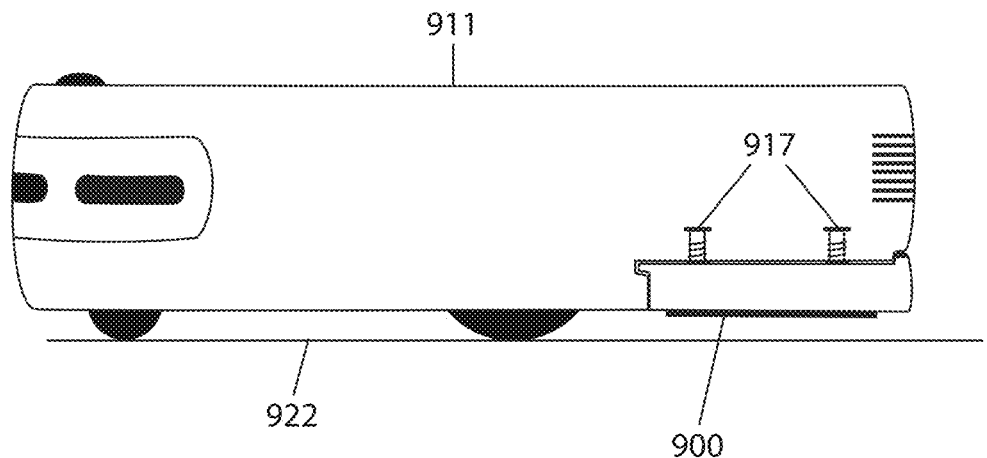
FIG. 59A illustrates a side view of a robotic vacuum with a mopping extension attached in a disengaged position in accordance with some embodiments.
Figure 59B:
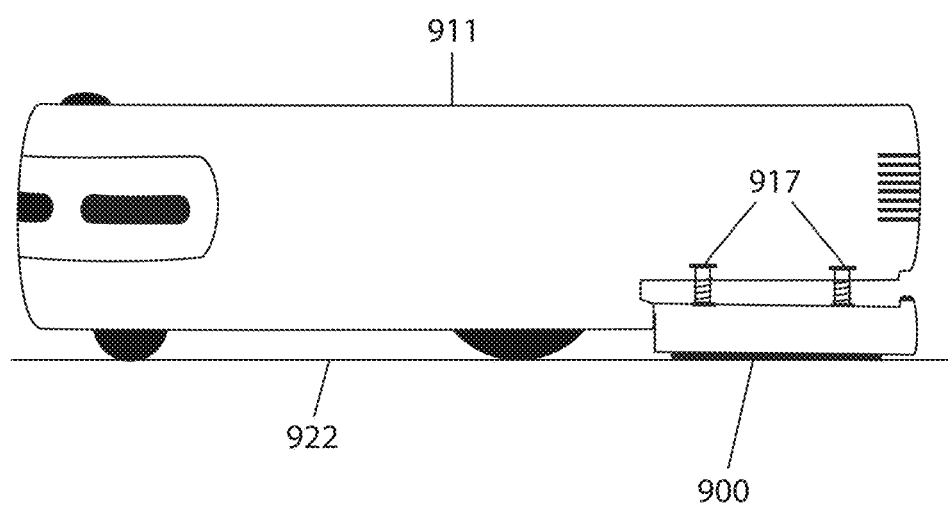
FIG. 59B illustrates a side view of a robotic vacuum with a mopping extension attached in an engaged position in accordance with some embodiments.

FIGS. 59A and 59B illustrate and example of a robot 911 with a mopping extension 900 attached. In FIG. 59A, the springs 917 are not lowered and the mopping extension 900 is in a disengaged position, where the mopping extension cannot make contact with the work surface 922. In FIG. 59B the springs 917 are lowered and the mopping extension 900 is in an engaged position, such that the mopping extension makes contact with the work surface 922.

In some embodiments, the robot may include a detachable washable dustbin as described in U.S. Non-Provisional patent Ser. No. 11/064,856, hereby incorporated herein by reference. In some embodiments, the robot may include a mop extension as described in U.S. Non-Provisional patent Ser. No. 10/292,553 or a motorized mop as described in U.S. Non-Provisional patent Ser. No. 10/932,640, each of which is hereby incorporated herein by reference. In some embodiments, the robot may include a mopping mechanism as described in U.S. Non-Provisional patent Ser. Nos. 11/857,129 and 11/937,749, hereby incorporated herein by reference.

In some embodiments, the maintenance station of the robot includes one or more features of charging stations described in, U.S. Non-Provisional patent Ser. Nos. 10/584,448, 10/698,411, 10/786,129, 10/986,971, 11/121,567, each of which is hereby incorporated herein by reference.

In some embodiments, the robot comprises a bumper configured to recognize objects within the environment. When the bumper triggered, the processor of the robot recognizes a presence of an object and actuates the robot to stop or changes its path accordingly. In most embodiments, the bumper is positioned in a front portion of the robot as the robot is more likely to encounter an object in front of the robot, as the robot primarily drives in a forward direction. In some embodiments, the bumper is positioned on the front portion and on a back portion of the robot such that contact with an object during forward and backward movement of the robot are accounted for. Or, in some embodiments, the bumper surrounds all sides of the robot, covering the front portion, the back portion and left/ride sides of the robot. A bumper positioned on the right/left sides of the robot are useful when the robot approaches an object at an angle and for recognizing moving objects that approach the robot from its side. In some cases, the bumper covers a top portion of the robot, especially around top edges of the robot. A bumper surrounding the top edges of the robot helps in recognizing objects with an overhang (e.g., low cabinets, furniture with a low height clearance, or tables and chairs for taller robots) to avoid wedging underneath those objects.

With an integrated bumper that covers front, back, left/right side and top portions of the robot, identification of a direction of a force caused by an impact with an object is important in deciding a next move of the robot. Since the bumper moves upon impact, the direction of movement of the bumper is used to recognize the direction of the force, and ultimately, a location of the object relative to the robot. In embodiments, various sensors are used to detect a direction of movement of the bumper. For example, simple mechanical switches positioned around a body of the robot, between the body of the robot and the bumper are used to detect a direction of movement of the bumper. These switches are triggered upon impact of the bumper with, for example, an object. When impact of the bumper is with a front central portion, only a front switch is triggered and when impact of the bumper is with a front, left portion, both front and left switches are triggered. The mechanical switches are positioned strategically based on a shape of the robot such they accurately indicate a location of impact. Due to the nature of the switches being mechanical, they prone to wear and tear and/or losing accuracy. Another type of switch used to determine a direction of movement of the bumper is a fork sensor or infrared switch. Similar to mechanical switches, these sensors are positioned around the robot to detect a direction of movement of the bumper. Fork sensors or IR switches only recognize movement in one direction by sliding a moving piece inside a fork shaped slot, blocking light (i.e., IR wave) emitted between two arms of the fork. Therefore, positioning fork sensors or IR switches at an angle in relation to each other for a same moving part (bumper and body) may be limited. In another case, tactile or touch sensors are used to determine a direction of force acting on the bumper upon impacting an object. In this case, a series of tactile sensors are positioned between the bumper and the body of the robot. When the bumper presses against a sensor, the sensor is triggered and a location of impact is determined based on a location of the triggered sensor. Tactile sensors may be grouped together to simplify detection of a direction of impact with an object.

Another means of determining a direction of movement of the bumper includes the use of pressure sensors. A normal pressure sensor or a differential pressure sensor may be used. To use a pressure sensor for detecting impact with the bumper, a flexible silicon tube filled with air is positioned between the bumper and the body of the robot or on an outer surface of the bumper. Upon impact with an object, the tube is compressed and the air pressure inside the tube changes. The air pressure sensor detects and measure the change in pressure, indicating impact with the bumper. Accuracy of a location of the applied force is dependent on the placement of one or more tubes. For example, two separate tube systems are positioned on the front and the back portion of the bumper to distinguish between impacts on the front and back portions of the robot. In another example, four tube systems are positioned on four corners (front right, front left, back right, and back left) of the bumper to detect a location of impact more accurately. In some embodiments, differential pressure sensors are used to connect two tube systems together and measure their change in pressure using only one sensor. In some embodiments, the flexible tubes themselves are used as the bumper surrounding the robot, which may be useful for robots operating within water or flying robots having a tube shaped bumper surrounding a perimeter of their bodies.

Alternatively, inertia measurement units (IMU) sensors are positioned on the bumper and the body of the robot to detect a location and direction of impact with an object. IMU sensors are composed of a 3-axes accelerometer and a 3-axes gyroscope to detect acceleration and rotation in the 3 axes separately. A difference between readings of the IMU sensor positioned on the bumper and IMU sensor positioned on the body of the robot provides an indication of local movement of the bumper in relation to the body of the robot. For example, when the IMU sensor positioned on the bumper outputs readings of vertical acceleration (z axis) that are larger than the vertical acceleration output by the IMU sensor positioned on the body of the robot, the bumper is assumed to be pressed downwards. Simultaneously, a difference between horizontal rotation (x or y axis) readings output by the IMU sensor positioned on the bumper and the body of the robot indicates a location of the downward force (e.g., front, back, left or right side of the robot). Using two IMU sensors, one on the body of the robot and one on the bumper, an impact in a direction of movement of the robot is detected. Upon impact with an object, the impact is recorded by the IMU sensor positioned on the bumper initially, then the IMU sensor positioned on the body of the robot once the robot slows down, therefore there is a small time difference between activation of the two IMU sensors. Also, the impact detected by the IMU sensor positioned on the body of the robot is milder as a portion of the impact force is dampened by the bumper. In another example, two IMU sensors are positioned on the bumper at opposite ends (e.g., front and back) and one IMU sensor is positioned on the body of the robot. Readings of the IMU sensors positioned on the bumper are used to confirm a location and direction of impact with an object. For example, if a downward force is applied to a front portion of the bumper, the front IMU sensor records a large acceleration in the downwards direction while the back IMU sensor records a small acceleration in the upwards direction as the front portion of the bumper moves downwards while the back position of the bumper moves upwards. A combination of the IMU sensor readings indicates the location of the applied force in the front portion of the bumper. The difference between readings from the IMU sensor positioned on the body of the robot and the IMU sensor positioned on the bumper aids in determining whether movement of the bumper is caused by an object or movement of the robot. When readings of the IMU sensor positioned on the body are larger in magnitude and indicate impact sooner than the readings of the IMU sensor positioned on the bumper, it may be assumed the difference is due to acceleration or deceleration of the robot. When readings of the IMU sensor positioned on the bumper are larger in magnitude and indicate impact sooner than the readings of the IMU sensor positioned on the body, it may be assumed the difference is due to the bumper hitting an object.

For the bumper to perform its intended function correctly, the bumper must be capable of returning to a neutral state. Several methods may be used to return the bumper to a neutral position after impact. For example, extension springs positioned in between the bumper and the body of the robot are used, with one end of the spring connected to the body and the other end of the spring connected to the bumper. When the bumper contacts an object, the springs extend as the bumper moves backwards due to the impact. After disengaging with the object, the springs return to their neutral state, moving the bumper in a forward direction back to its neutral position. While this method is useful for front facing impacts, it does not work well in all directions. As such, compression springs may be added. Compression springs are similar to extension springs, however, their connection to the body of the robot and the bumper are opposite. For extension springs, the spring head closest to a center of the robot is connected to the body and the spring head furthest from the center of the robot is connected to the bumper, while for compression springs, the spring head closest to the center of the robot is connected to the bumper and the spring head furthest from the center of the robot is connected to the body. In this setup, a set of springs are extended upon impact with an object while another set of springs are compressed upon impact. After disengaging with the object, both sets of springs return to their neutral states, thereby returning the bumper to its neutral state as well. In some cases, leaf springs are positioned between the body of the robot and the bumper. A middle portion of each leaf spring is connected to the body while the two ends of the spring are connected to the bumper. Springs may be paired and positioned in opposite directions. Depending on a direction of the impact, one spring compresses while the other spring extends. After impact, both springs return to their neutral state and return the bumper back to its neutral state. While the middle portion of each spring is fixed to the body, the two ends of the spring require enough room to slide along an inner surface of the bumper when stretching and compressing. Leaf springs may be positioned on a top portion of the robot between the body of the robot and the bumper, accounting for cases of downward forces causing the bumper to tilt relative to the body.

Figure 60A:
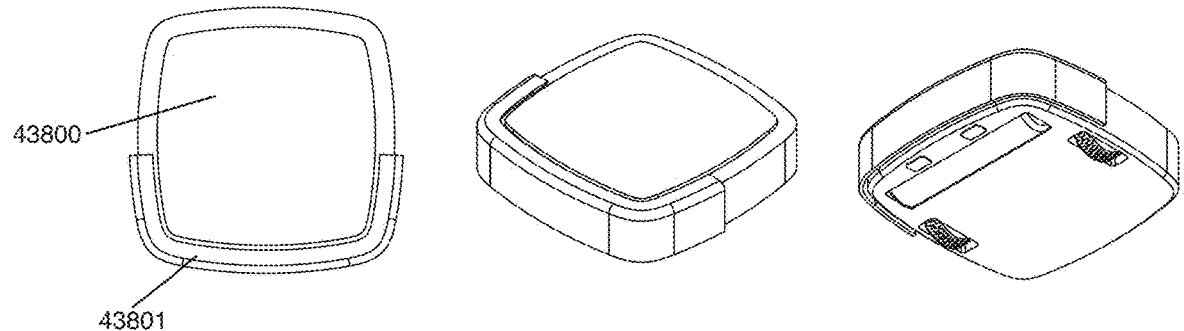
Figure 60B:
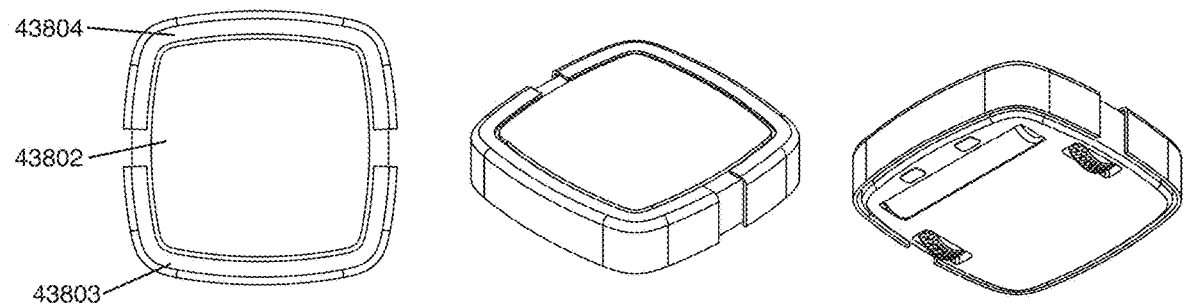
Figure 60C:
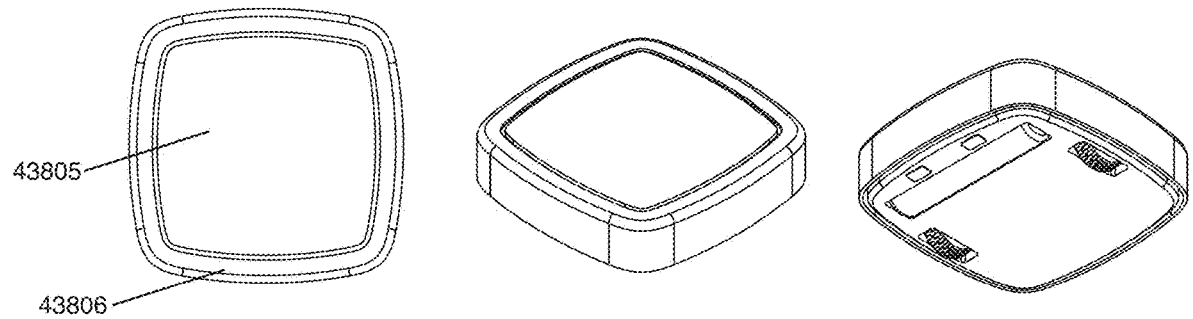
Figure 63:
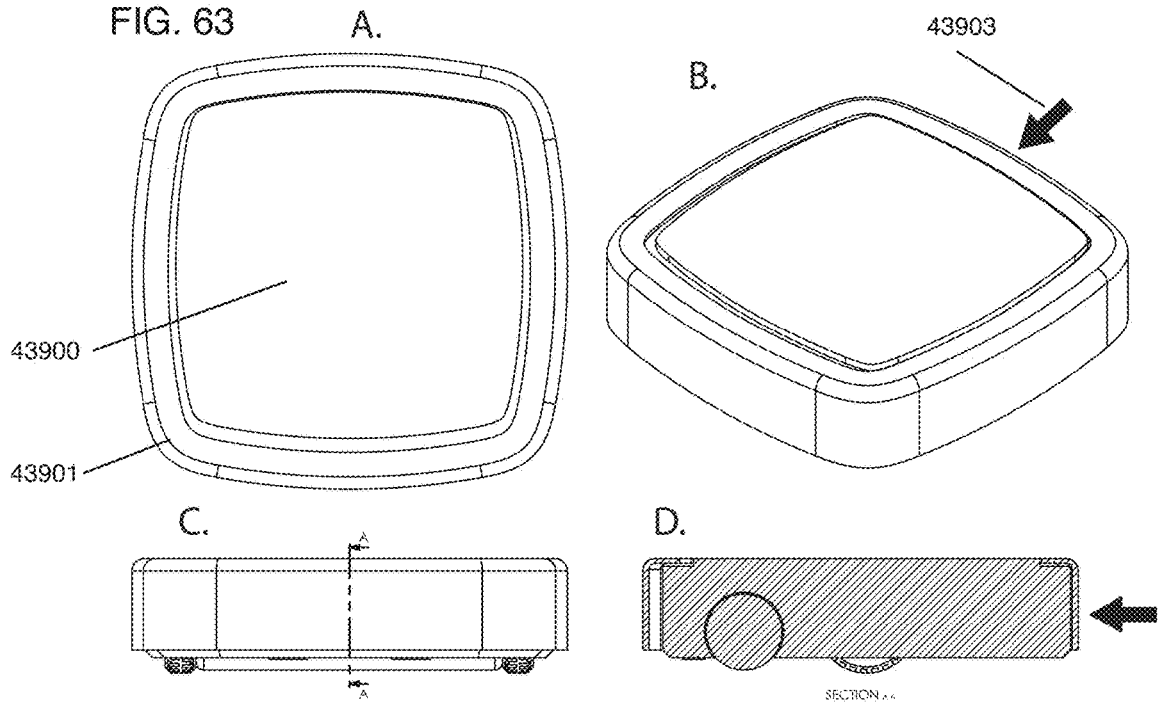
Figure 64:
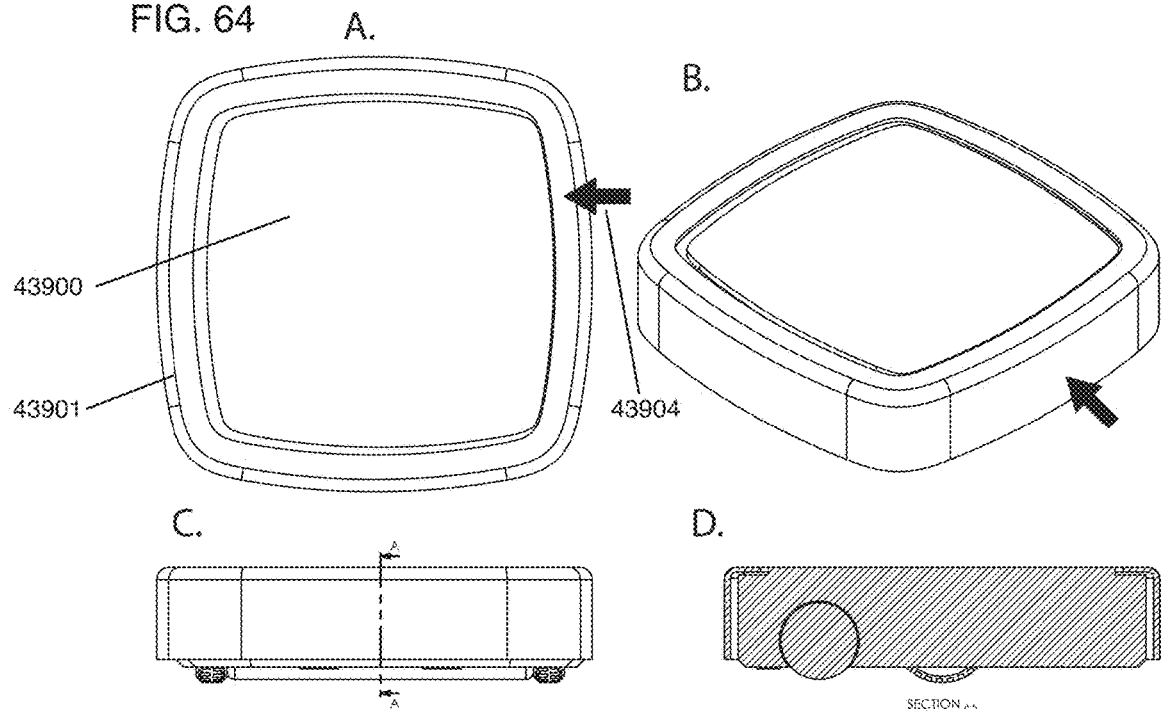

FIG. 60A illustrates top, perspective and bottom views of a cleaning robot 43800 comprising a front bumper 43801. FIG. 60B illustrates top, perspective and bottom views of a cleaning robot 43802 comprising a front bumper 43803 and a rear bumper 43804. FIG. 60C illustrates top, perspective and bottom views of a cleaning robot 43805 comprising an integrated bumper 43806. FIG. 61 illustrates A. top, B. perspective, C. front, and side sectional (A-A of C. front) views of a cleaning robot 43900 with an integrated bumper 43901 in neutral position. FIG. 62 illustrates A. top, B. perspective, C. front, and side sectional (A-A of C. front) views of the cleaning robot 43900 with the integrated bumper 43901 triggered by a force 43902 applied to a front portion of the bumper 43901. FIG. 63 illustrates A. top, B. perspective, C. front, and side sectional (A-A of C. front) views of the cleaning robot 43900 with the integrated bumper 43901 triggered by a force 43903 applied to a rear portion of the bumper 43901. FIG. 64 illustrates A. top, B. perspective, C. front, and side sectional (A-A of C. front) views of the cleaning robot 43900 with the integrated bumper 43901 triggered by a force 43904 applied to a side portion of the bumper 43901. FIG. 65 illustrates A. top, B. perspective, C. front, and side sectional (A-A of C. front) views of the cleaning robot 43900 with the integrated bumper 43901 triggered by a force 43905 applied to a top, front portion of the bumper 43901. Note the bumper 43901 is tilted relative to a body of the robot.

Figure 69:
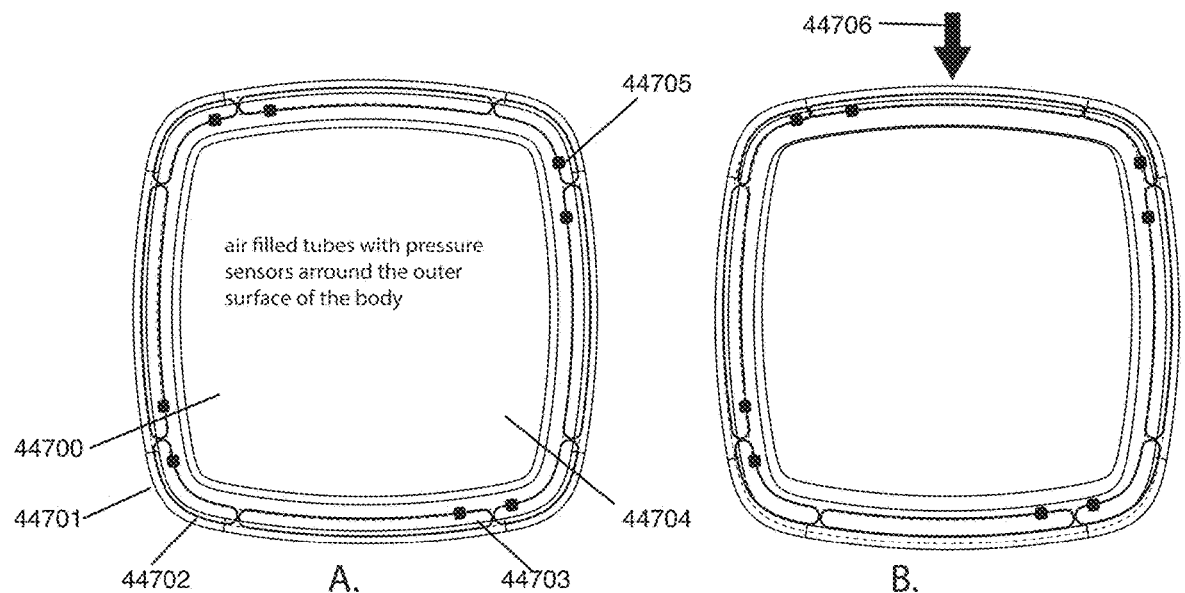
Figure 70:
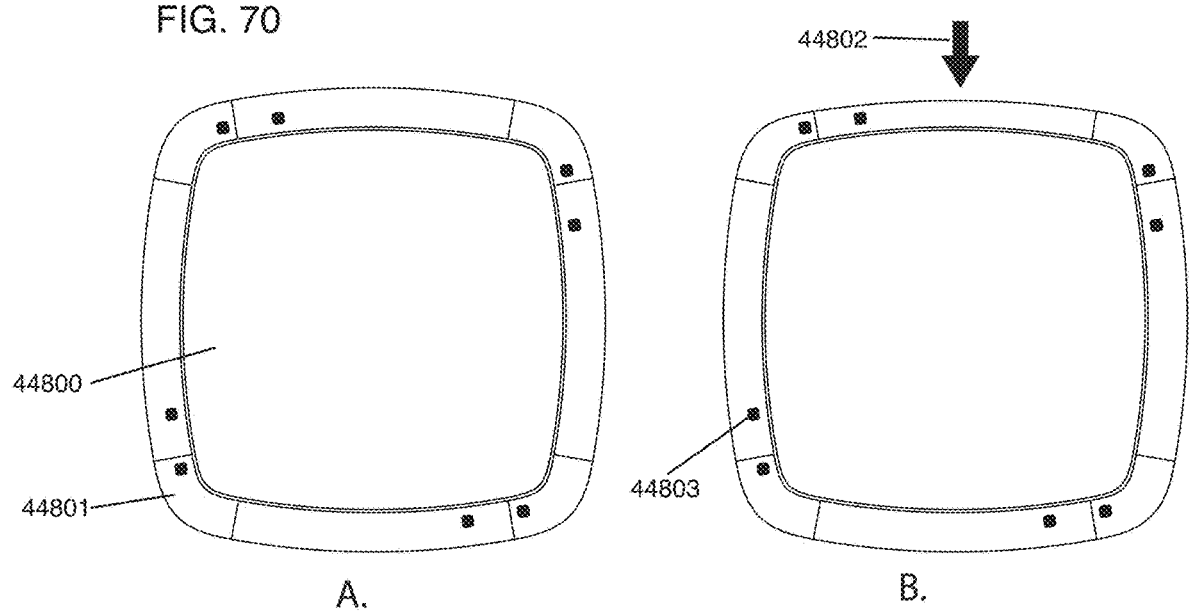
Figure 71:
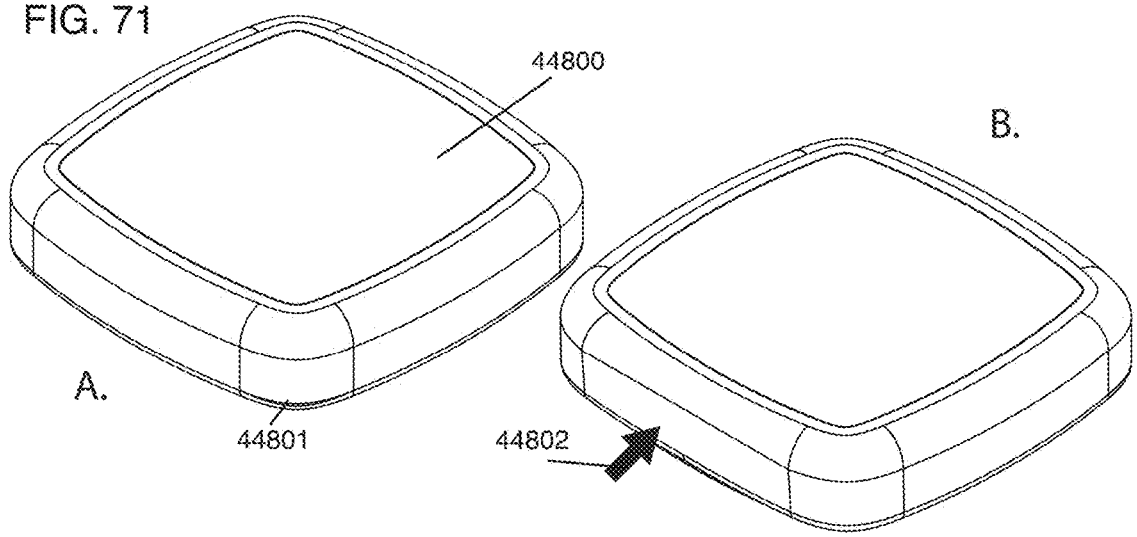

FIG. 66 illustrates a cleaning robot 44400 comprising an integrated bumper 44401 in A. a neutral state and B. a triggered state. A series of mechanical switches 44402 are positioned between a body 44403 of the robot 44400 and the bumper 44401. The switches 44402 are triggered when the bumper 44401 moves in direction 44404 due to impact with an object. FIG. 67 illustrates a cleaning robot 44500 comprising an integrated bumper 44501 in A. a neutral state and B. a triggered state. A series of IR fork sensors 44502 are positioned between a body 44503 of the robot 44500 and the bumper 44501. When the bumper 44501 moves in a direction 44504 due to impact with an object, some of the IR fork sensors 44502 are triggered, indicating the direction 44504 of the bump. FIG. 68 illustrates a cleaning robot 44600 comprising an integrated bumper 44601 in A. a neutral state and B. a triggered state. A series of tactile sensors 44602 are positioned between a body 44603 of the robot 44600 and the bumper 44601, around an outer surface of the body 44603. When the bumper 44601 moves in a direction 44604, some of the tactile sensors 44602 are triggered, indicating the direction 44604 of the bump. FIG. 69 illustrates a cleaning robot 44700 comprising an integrated bumper 44701 in A. a neutral state and B. a triggered state. A series of flexible tubes 44703 filled with air are positioned between a body 44704 of the robot 44700 and the bumper 44701. Each tube of tubes 44703 is connected to an air pressure sensor 44705. When the bumper 44701 moves in a direction 44706 due to impact with an object, some of the tubes 44703 between the bumper 44701 and the body 44704 compress, causing the air pressure in the tube to change. This change in air pressure is measured by the sensors 44705. In analyzing the readings from the air pressure sensors 44705, the direction and location of the bump is determined. FIGS. 70 and 71 illustrate a robot 44800 with a series of air-filled tubes 44801 as an integrated bumper in A. a neutral state and B. a triggered state. In this embodiment, the air pressure of the bumper itself changes upon an object impacting the bumper in a direction 44802. The bumper is segmented into a series of tubes 44801 with separate air pressure sensors 44803 for indicating a direction and location of the bump.

Figure 72:
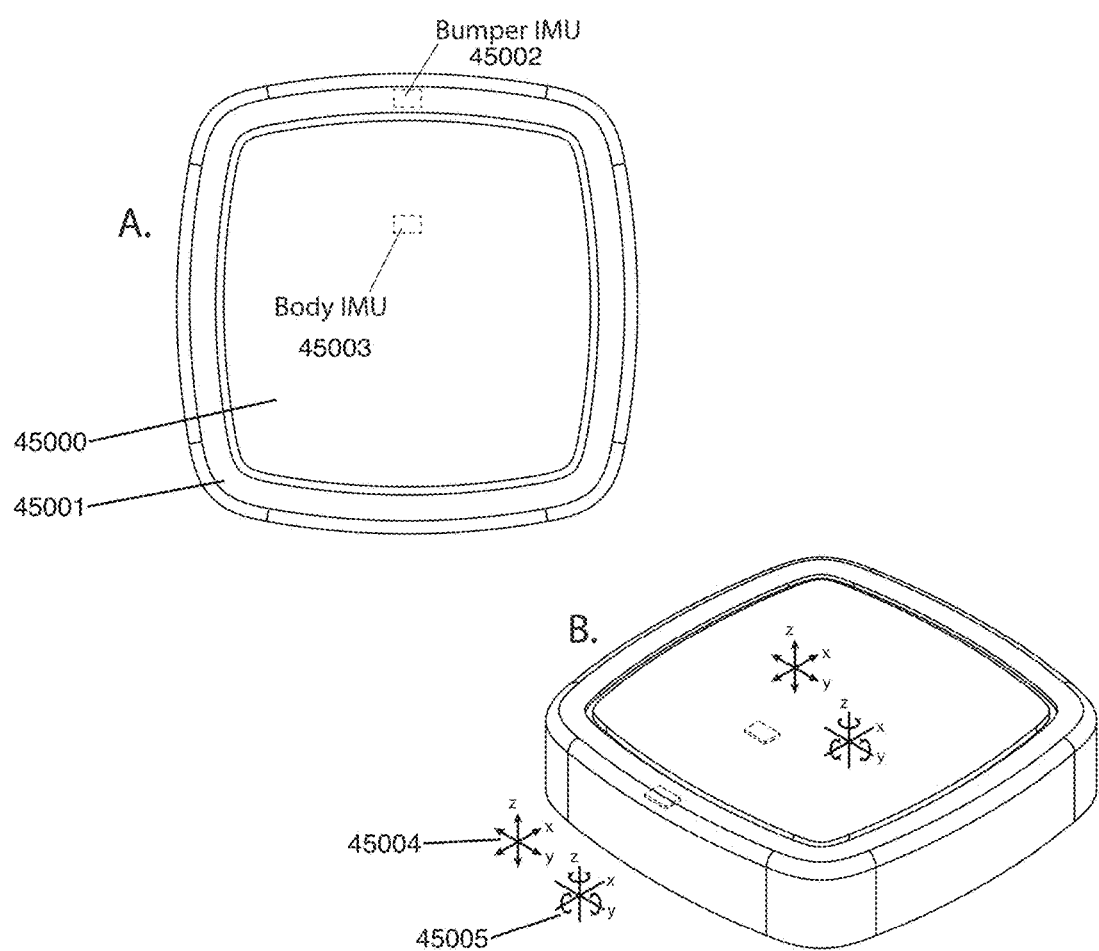
Figure 73:
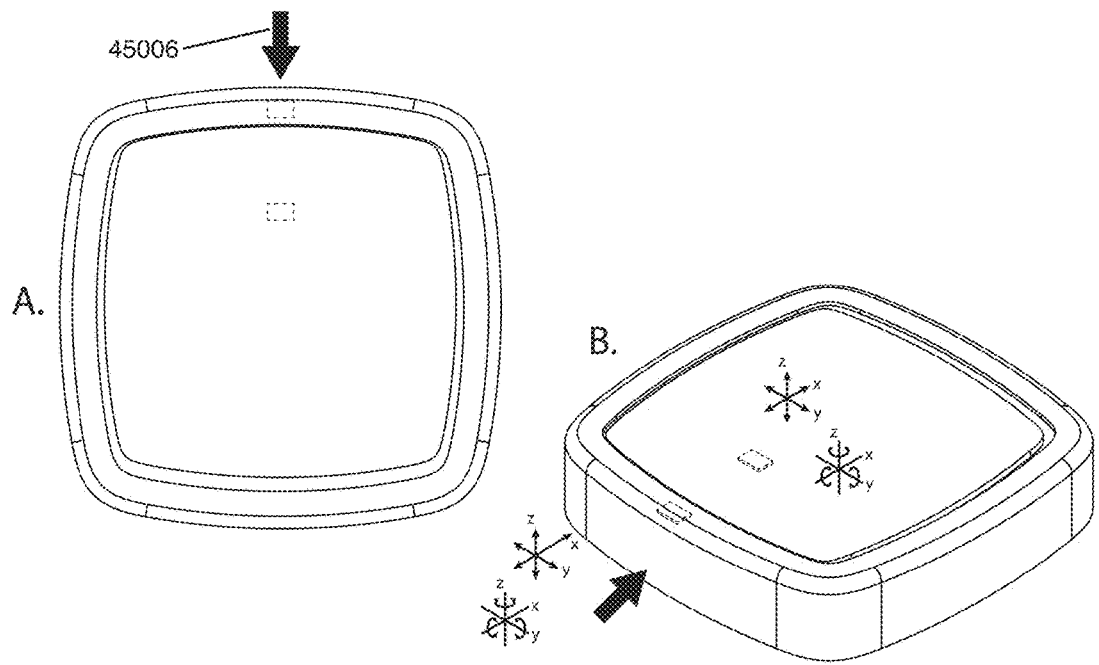
Figure 74:
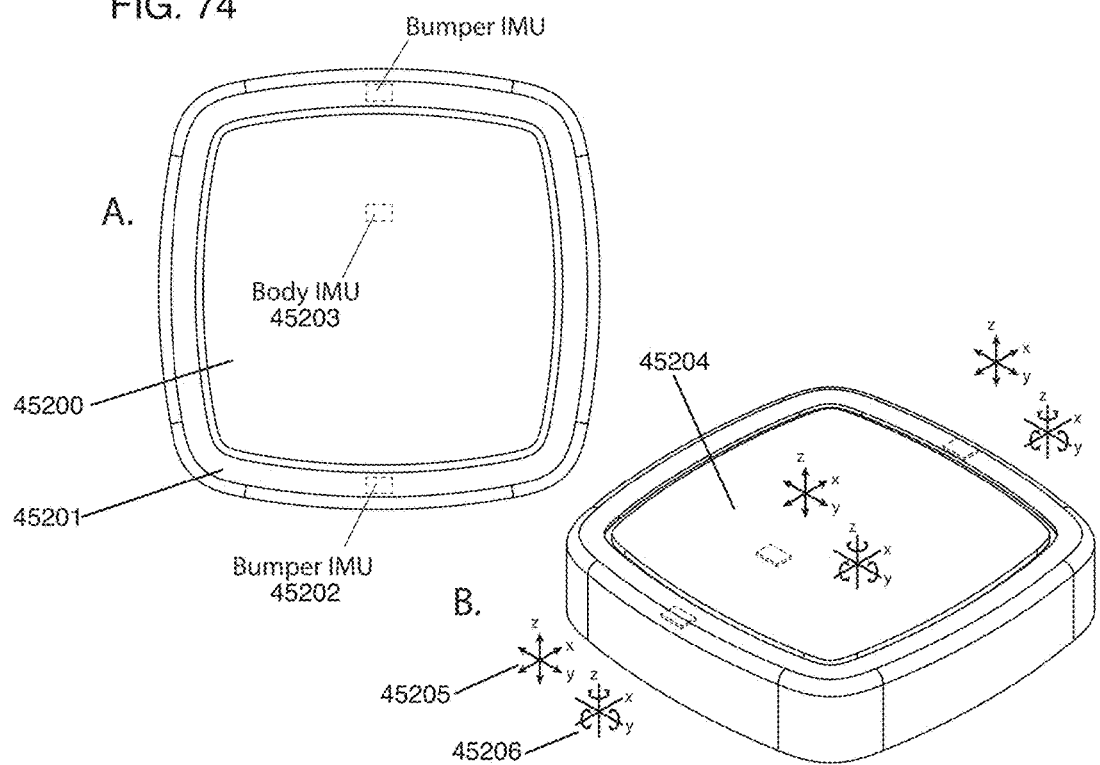
Figure 75:
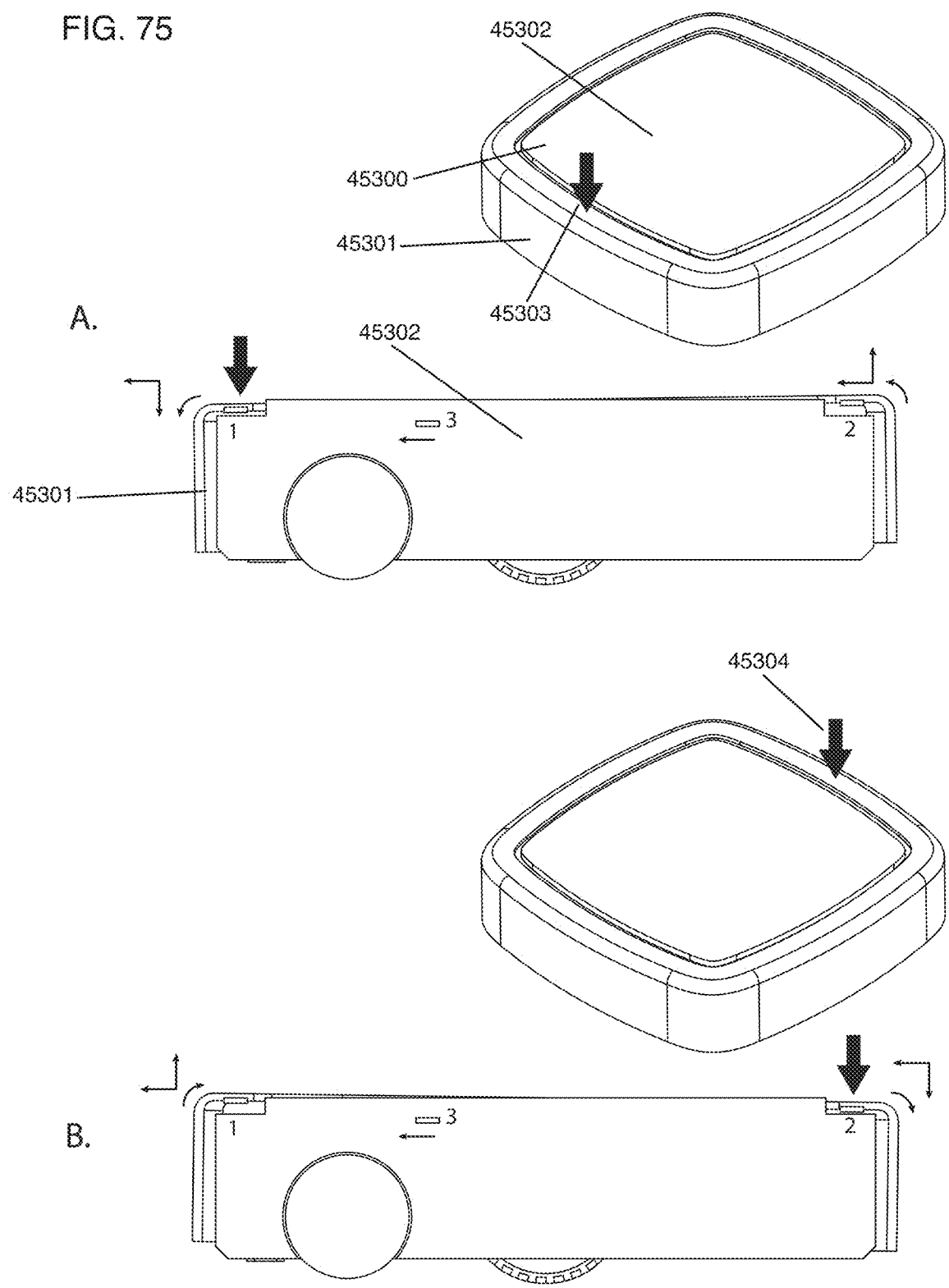
FIG. 75 illustrates a top view point and a side view point of examples of a robot bumper.

FIG. 72 illustrates A. top and B. perspective views of a cleaning robot 45000 comprising an integrated bumper 45001. A pair of IMU sensors 45002 are positioned on the bumper 45001 and a body 45003 of the robot 45000. Each IMU generates separate readings for acceleration 45004 and rotation 45005. Local movement of the bumper 45001 in relation to the robot 45000 is determined by comparing the two sets of IMU sensor readings. FIG. 73 illustrates A. top and B. perspective views of the cleaning robot 45000 with the integrated bumper 45001 and IMU sensors 45002. An impact force 45006 is applied to a front portion of the robot 45000. In this case, the IMU sensor positioned on the bumper 45001 reads a higher acceleration in a direction opposite to a movement of the robot 45000 before the IMU sensor positioned on the body 45003 of the robot 45000 senses the impact. The time difference between when each IMU sensor senses the impact and the change in acceleration and rotation of the two IMU sensors compared to each is indicative of impact and a direction of the impact force. FIG. 74 illustrates A. top and B. perspective views of a cleaning robot 45200 comprising an integrated bumper 45201. Two IMU sensors 45202 are positioned on opposite sides on the bumper 45201 and another IMU sensor 45203 is positioned on a body 45204 of the robot 45200. By fusing the acceleration 45205 and rotation 45206 readings of the two IMU sensors 45202 positioned on the bumper 45201, location and direction of the impact force is determined. FIG. 75 illustrates a cleaning robot 45300 comprising an integrated bumper 45301. Two IMU sensors (1) and (2) are positioned on opposite sides on the bumper 45301 and another IMU sensor (3) is positioned on a body 45302 of the robot 45300. In scenario A., a downward force 45303 is applied to a top, front portion of the bumper 45301 while the robot 45300 is moving in a forward direction. The IMU sensor (1) positioned on a front portion of the bumper 45301 reads an increase in downward acceleration and a counterclockwise rotation in addition to forward acceleration. The applied force 45303 causes the front portion of the bumper 45301 to tilt downward, causing a rear portion of the bumper 45301 to move upwards. Depending on a rigidity and form of the bumper 45301, the rear IMU sensor (2) reads an upward acceleration smaller or bigger than the acceleration readings of IMU sensor (1) and a counterclockwise rotation. Meanwhile, IMU sensor (3) positioned on the body 45302 only reads a forward acceleration at the time of impact. The force applied to the front portion of the robot 45300 is determined by comparing the combined readings of IMU sensors (1) and (2) with the readings of IMU sensor (3). In scenario B., a downward force 45304 is applied to a top, rear portion of the bumper 45301. IMU sensor (2) reads an increase in downward acceleration and a clockwise rotation in addition to a forward acceleration. The applied force 45304 causes the rear portion of the bumper 45301 to tilt downwards, causing the front portion of the bumper 45301 to move upwards. Depending on the rigidity and form of the bumper 45301, IMU sensor (1) reads an upward acceleration smaller or bigger than the corresponding readings of IMU sensor (2) and a clockwise rotation. Meanwhile, IMU sensor (3) only reads a forward acceleration at the time of impact. The force applied to the rear portion of the robot 45300 is determined by comparing the combined readings of IMU sensors (1) and (2) with the readings of IMU sensor (3).

Figure 77:
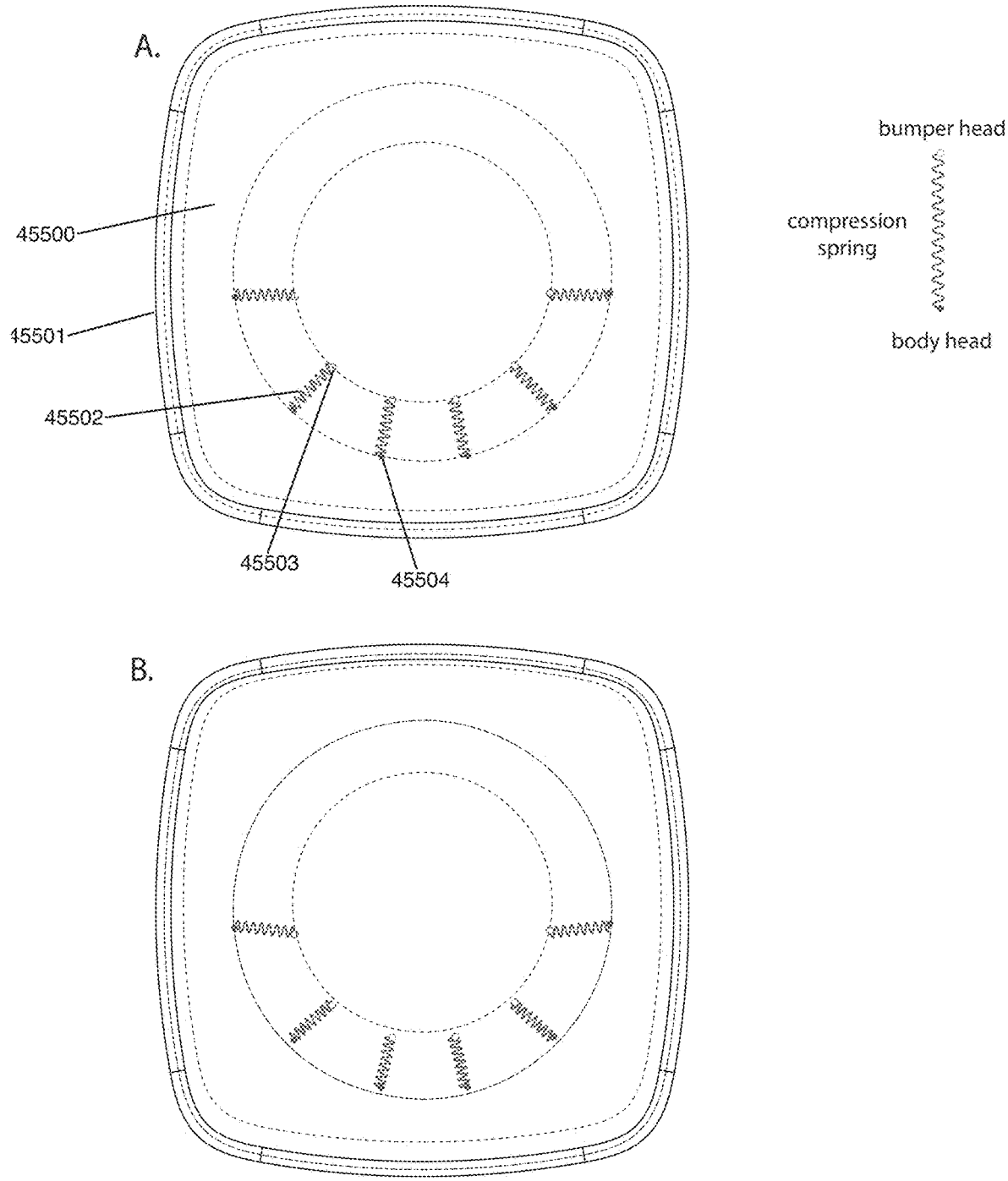
FIGS. 77 and 78 illustrate a top view of examples of a robotic bumper in a neutral state and a triggered state.
Figure 78:
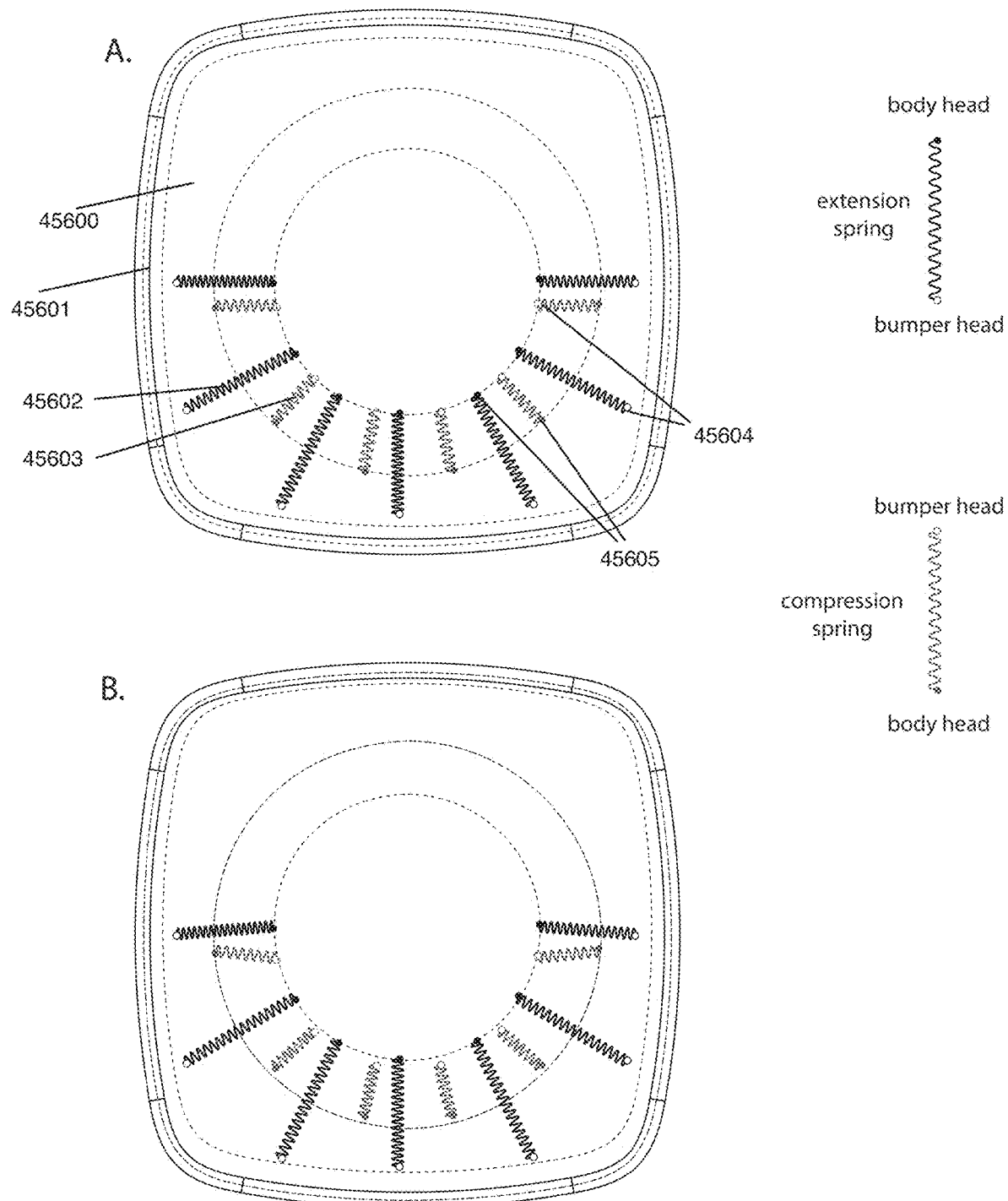
Figure 80A:
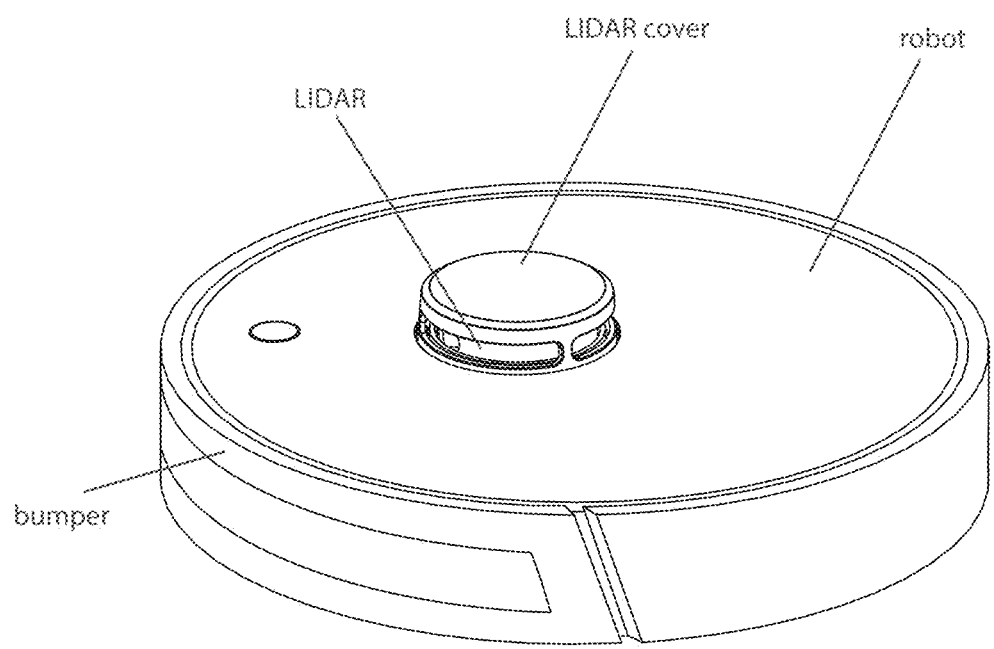
Figure 80F:
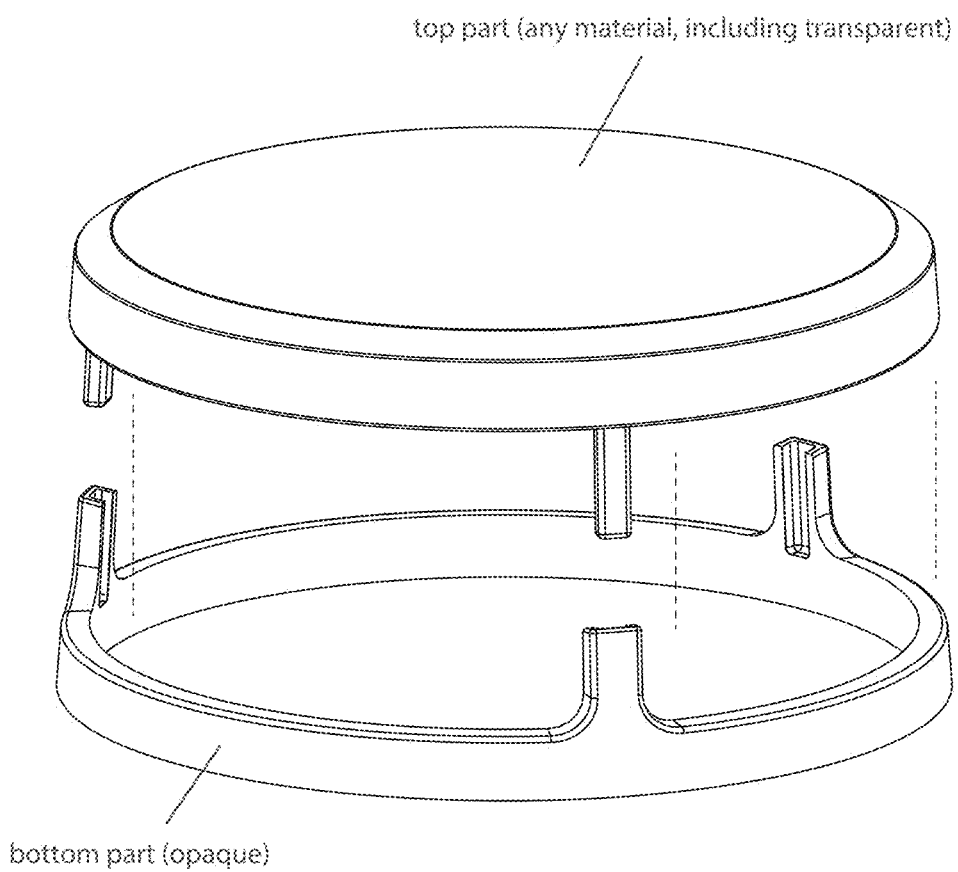
Figure 80H:
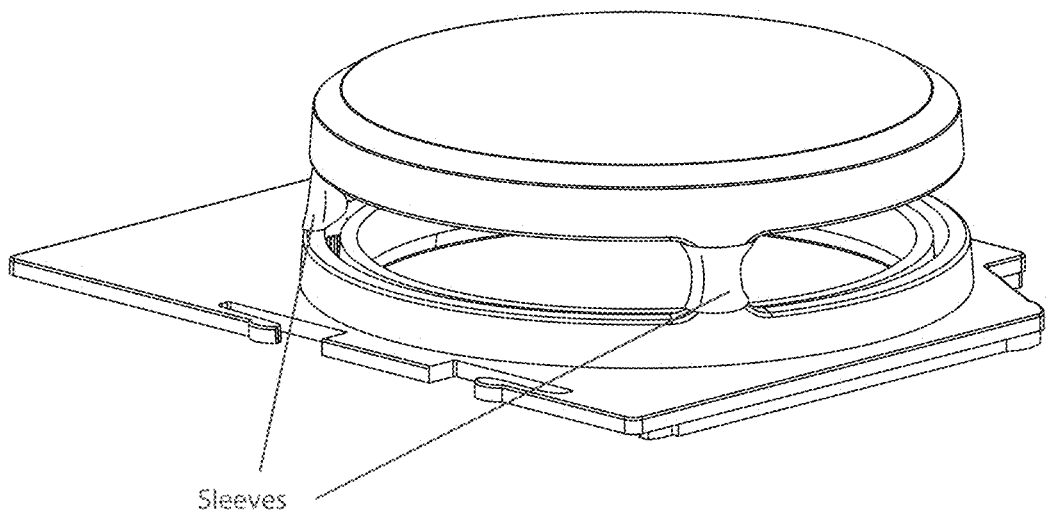

FIG. 76 illustrates a cleaning robot 45400 comprising an integrated bumper 45401 in A. a neutral state and B. a triggered state. The bumper 45401 covers a top surface of the robot 45400. A series of extension springs 45402 connect an inner top surface 45403 of the bumper 45401 and to an outer top surface 45404 of a body of the robot 45400. When the bumper 45401 is impacted and pushed back in a direction of impact, the springs 45402 extend, as shown in B. The springs 45402 return to their normal state after the impact, returning the bumper 45401 to its neutral position, shown in A. FIG. 77 illustrates a cleaning robot 45500 comprising an integrated bumper 45501 in A. a neutral state and B. a triggered state. The bumper 45501 covers a top surface of the robot 45500. A series of compression springs 45502 connect an inner top surface 45503 of the bumper 45501 and to an outer top surface 45504 of a body of the robot 45500. When the bumper 45501 is impacted and pushed back in a direction of impact, the springs 45502 compress, as shown in B. The springs 45502 return to their normal state after the impact, returning the bumper 45501 to its neutral position, shown in A. Compression springs are generally more durable and are easily inserted into an assembly with less manufacturing and molding complexity. However, compression springs are not ideal for resisting non-axial loads. FIG. 78 illustrates a cleaning robot 45600 comprising an integrated bumper 45601 in A. a neutral state and B. a triggered state. Cleaning robot 45600 includes both a series of extension springs 45602 and a series of compression springs 45603, as shown in FIGS. 76 and 77, respectively. Springs 45602 and 45603 connect an inner top surface 45604 of the bumper 45601 and to an outer top surface 45605 of a body of the robot 45600. When the bumper 45601 is impacted and pushed back in a direction of impact, the springs 45602 extend while the springs 45603 compress, as shown in B. The springs 45602 and 45603 return to their normal state after the impact, returning the bumper 45601 to its neutral position, shown in A. The combination of extension and compression springs provides more accuracy in keeping the bumper in place. FIG. 79 illustrates a cleaning robot 45700 comprising an integrated bumper 45701 positioned in A. a neutral state, B. a triggered state upon an impact force 45702 applied to a front portion of the robot 45700, C. triggered state upon an impact force 45703 applied at to a front, left portion of the robot 45700 at a 45 degrees angle, and D. triggered state upon an impact force 45704 applied to a left side of the robot 45700. Inner edges of the bumper 45701 are connected to outer edges of a body of the robot with a series of leaf springs 45705. Leaf springs 45705 are paired together to even out the applied forces and keep the bumper 45701 in place.

Some embodiments provide at least some of the features of a bumper described in U.S. Non-Provisional patent application Ser. Nos. 17/990,743 and 10/183,701, each of which is hereby incorporated herein by reference.

In some embodiments, the robot includes a LIDAR positioned on a top surface of a chassis of the robot. A housing covering at least a portion of the LIDAR may be used to protect the LIDAR. The housing may cover a top of the LIDAR and may include two or more pillars connecting the housing to the top of the chassis of the robot or a bottom portion of the housing. In some embodiments, the LIDAR of the robot may be positioned on a top surface of the robot and a LIDAR cover protects the LIDAR. The LIDAR cover may function similar to a bumper of the robot. The LIDAR cover is illustrated in FIGS. 80A-80H. In some cases, the LIDAR may be positioned within a front portion of the robot adjacent to the bumper. The bumper may include an opening through which the LIDAR observes the environment.

In some embodiments, the amount of time it takes to locate the docking station and navigate to the docking station is improved. In some embodiments, a multivariate cost function is deployed. In other embodiments, a neural network to train the robot to search in the same manner as a human would is deployed. The multivariate cost function may balance the two requirements of a thorough search and a quick search. In some embodiments, the neural network solution creates a series of floorplan and robot simulations. A user may use the application to draw a path from where the robot presumably ran out of charge. In some embodiments, the processor of the robot always keeps track of the charging station and continuously has a plan for returning to the charging station. In embodiments where the location of the charging station is totally lost, the processor of the robot starts the search from where the charging station was last visible instead of where the robot was when it ran out of battery. In some embodiments, the last place where the charging station was observed is the first place the processor starts its search.

In some embodiments, PID is employed to smoothen and straighten a final approach of the robot during docking. PID is used to avoid an unsmooth final approach and to attain a smooth and straight final approach, as in the best case. Some embodiments include an example of a process of ensuring a smooth and straight final approach during docking, wherein heading is continuously measured and adjusted for to ensure alignment is attained. In some embodiments, the robot may use a camera to initially align with the charging station, then at a final step, turns and docks using IR.

An absolute frame of reference and/or position may be assigned and/or a seed location may be provisioned by the processor as a point, a set of points, or a landmark against which all relative positions of the robot are measured and calculated. For example, a charging station or a station at which a dustbin of the robot is emptied may be used as a ground zero landmark. In some embodiments, a charging station includes IR LED emitters and the robot includes a receiver or the charging station includes receivers and the robot includes an omnidirectional transmitter. The robot may use signals emitted by the emitters of the charging station to detect and align with the charging station for docking.

The robot is required to avoid hitting the charging station when covering the areas of the environment, particularly when covering the perimeter by moving along the wall along which the charging station resides. In some embodiments, there are multiple charging stations and the robot must avoid them all. In some embodiments, a no-entry zone is created automatically where the charging station resides to prohibit the robot from entering an area surrounding the station.

In some embodiments, the robot lines up with the docking station using IR sensors. In some embodiments, the robot lines up with the docking station using a 2D or 3D physical visual feature or a QR code captured by a camera or depth camera of the robot. In some embodiments, the robot lining up with the docking station is ensured by using more than one type of sensor. For example, a pair of complementary hall effect sensors may be used to confirm that the alignment of the robot with the docking station is even. In case the alignment is uneven, incremental angular adjustments may be made to a heading of the robot. A heading of the robot may be guided using the hall effect sensors, IR sensors, a QR code, or other methods.

In some embodiments, the robot may dock from its rear for filling its liquid or water reservoir (e.g., for mopping or steaming) or for emptying the contents of its bin. The robot may then detach from the dock and re-align and dock from a front of the robot to charge its battery. In some embodiments, the opposite order or any other order may be followed depending on the location of bin and reservoir and location of the battery on the robot. There may be several independent docking routines for various purposes. For one purpose, the robot may dock from the front and for another purpose it may dock from the rear. For one purpose, it may use one type of sensor, and for another purpose it may use a different sensor or a different combination of sensors. For example, if the robot has docked to charge its battery, the closed circuit created by touch of charging pads on the station and the conductive metal piece on robot and the electric current running through them is an indication that the charging is being done properly. If the docking is for the purpose of charging, this may suffice to confirm the robot is aligned well. If the docking is for any other purpose such as filling the water tank, the robot may dock from a different orientation so the presence of current as a result of a closed circuit is unavailable. In some cases, the robot may dock in an orientation that can serve multiple purposes. For example, in the same orientation, the battery may be charged, the liquid reservoir may be filled, and the dirty liquid container may be emptied. While current sensing works as an accurate enough method to ensure the robot is charging, it may not accurately determine the placement of the robot in relation to the dock for applications such as emptying the collected dirty liquid, filling the reservoirs with clean fluid or water, or emptying the dust from the bin.

For these, additional sensing may be required. For example, the IR method may be combined with the hall effect sensors or QR code scanning, and such. In some embodiments, for finding signal emissions from a dock and service station by the robot, the algorithm causes the robot to fully explore all frontiers in a current room and drive along all outer navigation anchor nodes (anchor nodes with neighbor count <8) which would allow the robot to drive along the walls of the room and the perimeter of interior islands (where docks are usually positioned). This improvement helps as a dock search along just the outer nodes in each room biases the search to be successful at locating hard-to-see docks placed along the outer walls, however, would miss docks placed along interior islands. In some embodiments, the logic will first cause the robot to attempt to find the dock by performing a quick exploration of each room and then in a second step or alternative step could cause the robot to fully explore all frontiers in each room to search for the dock. If the dock is not found, then the algorithm could cause the robot to drive along all outer navigation anchor nodes in each room. Regular exploration in most cases is adequate in finding the dock and therefore will be a first step in finding the dock. In some embodiments algorithm allows the robot to adjust by stopping/slowing a forward movement at times and rotate or pivot in place to ensure that it does not miss a signal and specially in the last part of approach better align itself with the center-line. In some embodiments a number of IR receivers (two, three, four, or more) are used. In order to overcome ambient light interference a code-word system to distinguish signals that are sent with intent from those that are scattered in ambiance is implemented. In some embodiments code words are implemented with modulation of IR frequency. In some embodiments, a docking algorithm could be developed to parse the received code words and process the code words to control the driving of the robot such that it may be aligned with a center line of the docking station, and cause the robot to stop upon detecting the robot is on the charging pads. In some embodiments, a docking drive routine will start driving the robot to drive an arc within the IR zone while receiving IR readings from the docking station IR transmitters, parse and process the IR readings to identify code words, and provide driving instructions to the robot to align it with the docking station based on the code words received. To determine appropriate driving instructions, a position and direction of the robot relative to the docking station may be determined for sensor readings received by different IR receivers of the robot from different IR transmitters of the docking station. For example, when the far left and far right IR receivers of the robot receive code words indicating the signal received is from the left and right IR transmitter of the docking station, respectively, the robot is facing the dock and is close to the centerline of the dock.

In some embodiments, appropriate driving speed and angular rotation ranges required to achieve a high docking success rate are decided by the algorithm. In some embodiments, the previous failures and successes in a particular robot dock pair at a particular location may be used to improve the performance or rate of success of the future dockings. Machine Learning and AI can contribute to success of the robot docking based on the particular geometric and topologic settings of robot's work environment. Docking success rate versus dock location may be graphed using AI algorithms to understand what causes low success rates and optimize the algorithm at run time at the final work place. Feedback may be provided to the manufacturer to further improve the future algorithms.

In some embodiments, a charging station of the robot includes a bar code or QR code readable by a camera or a scanner. In some embodiments, an identification may be used to identify a location. Alternatively, the robot recognizes the charging station using image recognition technology. A charging station with a particular structure disposed on the charging station may be detected by the processor of the robot. A light source disposed on a robot may emit, for example, a laser line, and a camera disposed on a robot may capture images of the laser line projected onto object surfaces. A position of one or more segments of the laser line in a captured image depends on indentations of a surface of an object onto which the laser line is projected. Given the known indentations of structure, a processor of the robot identifies the charging station upon extracting a particular pattern of the segments of the laser line in a captured image.

Some embodiments include a method for an accurate final docking approach to a recharge and maintenance station using two receiver sensors of the robot positioned a base distance apart. The two receivers detect an emission emitted by an emitter component of the recharge and maintenance station. The processor actuates the robot based on the detection of the emission by the two receiver sensors of the robot. In some embodiments, the actuation is proportionally adjusted to emissions detected by the two receivers to achieve a final approach to the station in a straight line perpendicular to a width of the station. In some embodiments, actuation oscillations are iteratively smoothened based on a qualitative or quantitative metric associated with the emissions received by the two receiver sensors and their geometric relation to one another. Metrics may include sensing the presence or absence of the emission, a time it takes for arrival of the emission, a sensed strength of the emission, and a rate of increase or decrease in the strength of the emission. To achieve a proper alignment, a detected misalignment may actuate the robot to redock to correct the misalignment. In some embodiments, the two receiver sensors are positioned on a right side and a left side of a front portion of the robot. In some embodiments, the receiver sensors are positioned on a left side and a right side in a rear portion of the robot. In some embodiments, the quantitative or qualitative metric associated with the emission received by the two receivers comprises a cost function. In some embodiments, the cost function is minimized to achieve a straight line approach during docking. The cost function may comprise one of: a mean sum of errors, a mean sum of squared errors, a Huber loss function, and a least square. The Huber loss function is quadratic for small values of residuals and linear for large values.

A robot may carry multiple sensing apparatus including any of an optical sensor, an audio sensor, a RF sensor, an electromagnetic sensor, a position sensor, a GPS, a differential GPS, a gyroscope, an IMU, a tactile sensor, an environmental sensor, antennas, RF transceivers, etc. Each sensor may include a transmitter or receiver component positioned stationary in the environment or disposed on the robot. The signals transmitted by different sensor transmitters may be received by the robot at different times or at different signal strengths. When multiple receivers are stationed at various points within the environment, the robot receives each signal at different strengths such that the robot may localize itself in relation to the environment. For example, dual sonar sensors disposed on a charging station may transmit ultra sound signals received by one or two transceivers disposed on a robot are used in guiding the robot to align itself with the charging station during docking. A PID mechanism may reduce oscillations to a point that the last approach of the robot as it docks at the charging station follows along a straight path. In some embodiments, the robot docks at the charging station using IR transmitters and IR receivers disposed on the robot and charging station. Transmitter and receiver sensors of various kinds, such as hall effect sensors and light spectrum sensors, may be used individually or in a complementary setup for docking the robot. For instance, when a signal from a first transmitter is stronger than a signal from a second transmitter, the two transmitters positioned on opposite sides and at equal distances from a center of the charging station, the robot reorients by rotating in place or adjusting its wheel speed to arc back to a line central to the dock.

In some embodiments, it is essential the robot follow along a straight path and adhere to a central line. In some embodiments, the robot follows a line of a certain color drawn on the floor. In some embodiments, an outside marker, such as an indentation pattern, a barcode, QR code, or an active beacon may be used in guiding the robot. Active beacons may include IR light beams paired with IR receivers or a hall effect sensor and a magnetic field creator. Given the use of two active beacons, the robot may know it is centrally positioned in relation to the two active beacons when both are simultaneously observed by the robot. In some embodiments, a signal strength of signals transmitted by two signal transmitters may be used in guiding the robot to drive rightwards or leftwards to align along a central line. The transmitted signals may comprise IR, visible light, RF, or magnetic field signals. The two signal transmitters may be of different kinds. For example, each signal transmitter may transmit a different signal and a corresponding receiver of a receiver pair receives a particular corresponding signal. In embodiments, it is desirable that oscillation of the robot is avoided or minimized as the robot drives, for example, straight.

Some embodiments use at least some methods, processes, and/or techniques for docking a robot described in U.S. Non-Provisional patent application Ser. Nos. 17/494,251, 17/670,277, and 17/990,743, and U.S. Non-Provisional patent Ser. No. 11/768,504, each of which is hereby incorporated herein by reference.

In some embodiments, the robot is paired with an application of a communication device by exchanging information between the application and the robot. Information may be transmitted wirelessly using Bluetooth. In some embodiments, user input is provided to at least one of the robots and the application to initiate pairing or progress the pairing process. In some embodiments, pairing the application of the communication device with the robot is initiated by scanning a QR code using a camera of the communication device. Some embodiments may use at least some of the methods, processor, and/or techniques for pairing the robot with the application described in U.S. Non-Provisional patent application Ser. Nos. 17/990,743 and 11/240,854, each of which is hereby incorporated herein by reference.

Figure 81A:
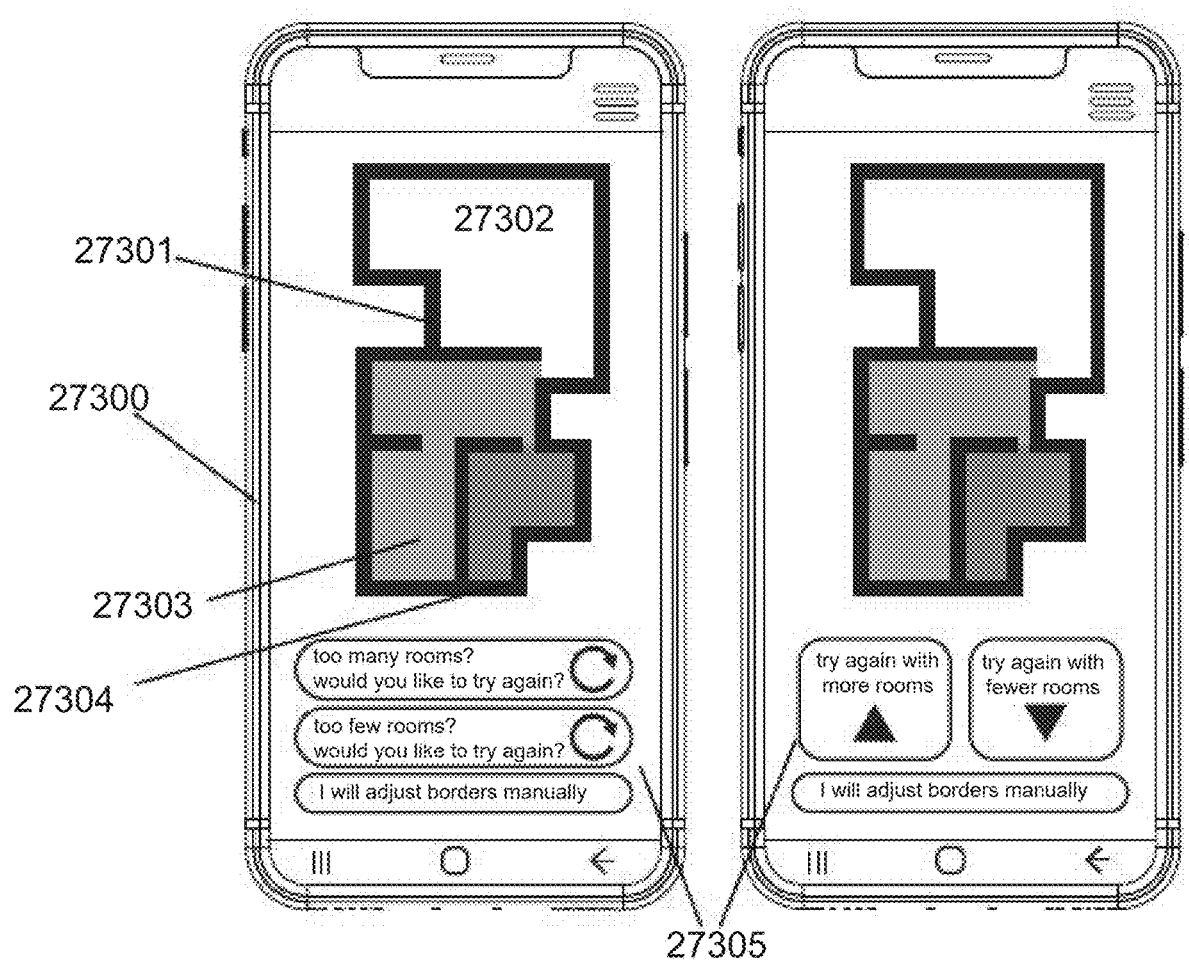

In some embodiments, the application of the communication device paired with the robot is used to adjust a room assignment. For instance, FIG. 81A illustrates an application of a communication device 27300 displaying an initial room assignment of a map 27301 including rooms 27302, 27303, and 27304. Using the application, a user can choose to rerun the room assignment for more rooms or for less rooms or can choose to adjust borders manually 27305. If more rooms are desired, the room assignment algorithm attempts to split more areas. If less rooms are desired, the algorithm focuses on areas that could be merged, such as two small adjacent rooms or two areas split based on a borderline gap. In some embodiments, the application is used to adjust borders, split rooms, and merge rooms manually. FIG. 81B illustrates using the application to A. adjust borders by sliding borders 27306 using a finger 27307 on the screen, B. split rooms by drawing a border 27308 using the finger 27307, and C. merge rooms by using the finger 27307 to choose rooms 27309 and 27310 to merge.

Figure 82:
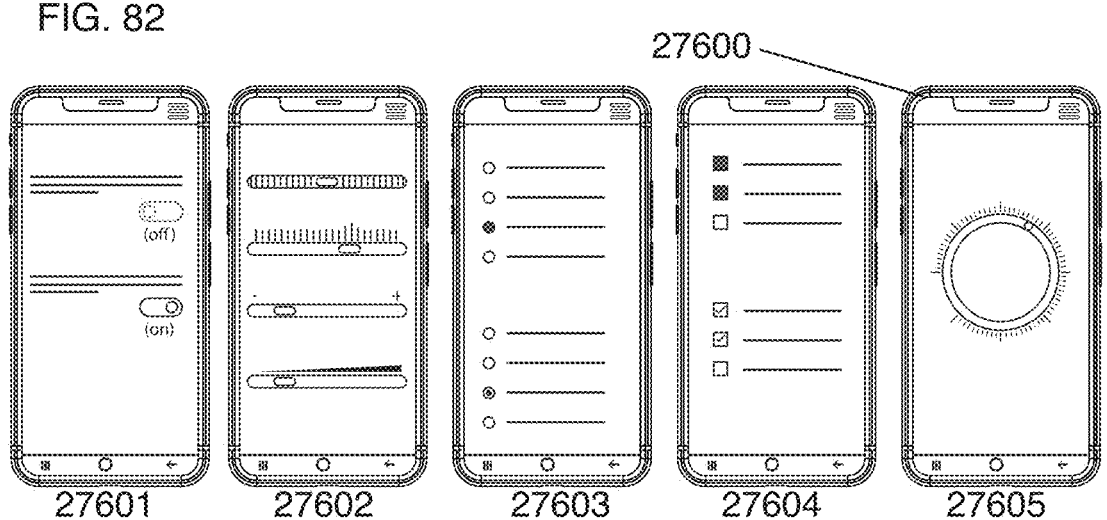
FIG. 82 illustrates examples of user interfaces of an application of a communication device.
Figure 83:
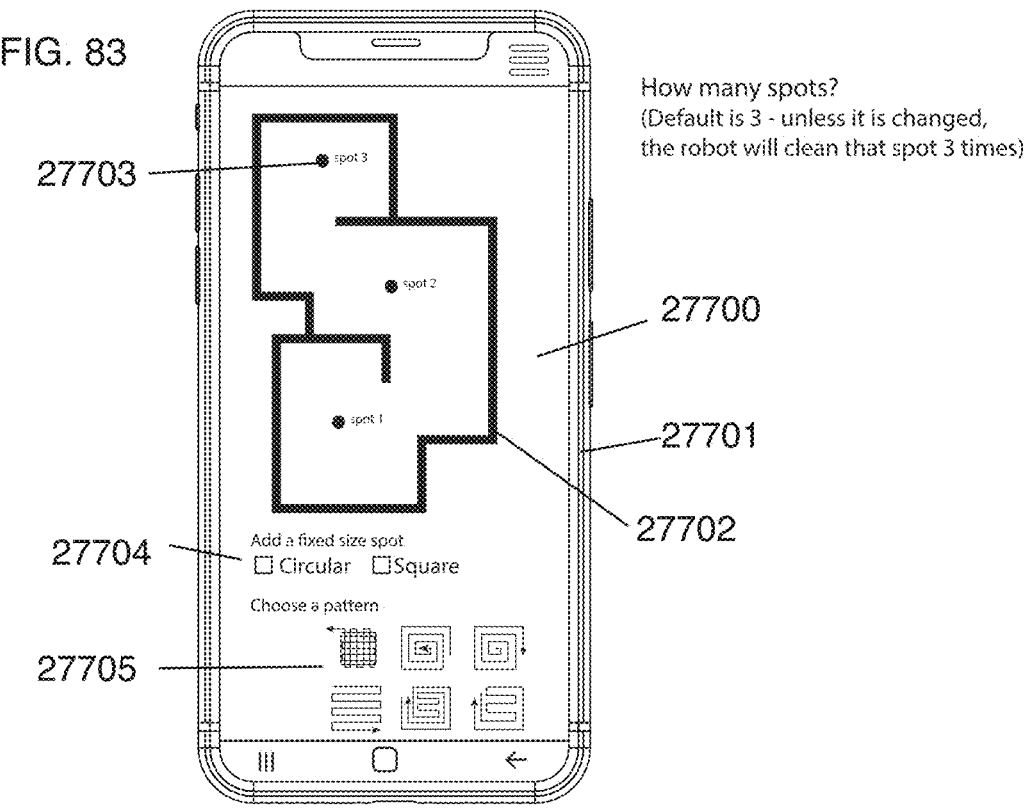
FIGS. 83 and 84 illustrate an application of a communication device displaying spot cleaning locations within a map.
Figure 84:
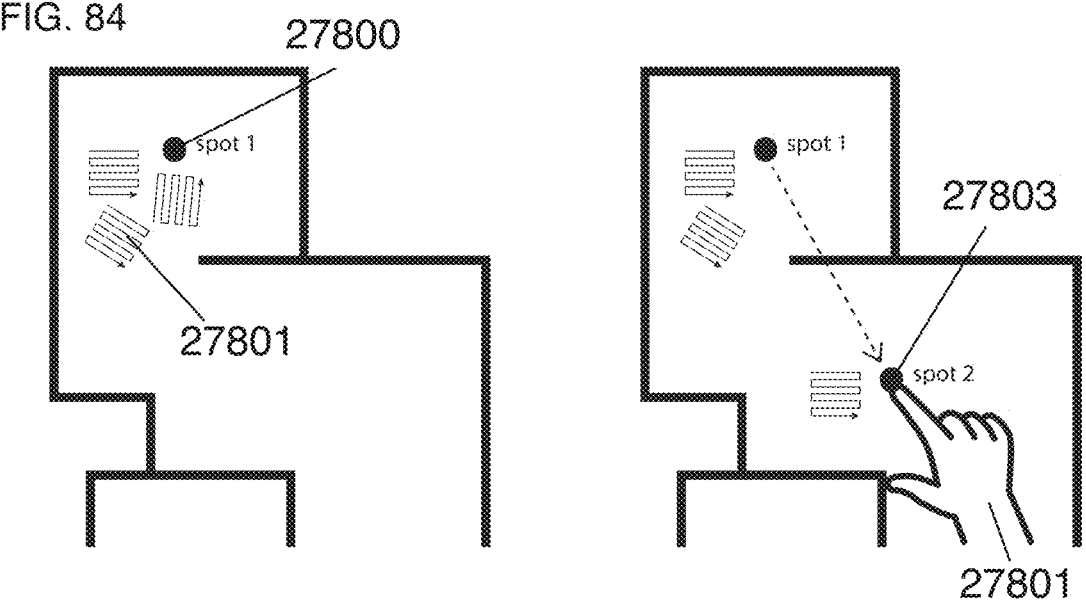

In some embodiments, a user may use the application of the communication device to choose a location for the robot to cover within a map of the environment and in some cases, may select a movement path type for the robot to execute at the location. In some embodiments, the robot spot cleans the location. In some embodiments, the user may use the application to choose multiple locations within the map for spot cleaning and a number of times to coverage of each location selected. FIG. 82 illustrates a communication device 27600 executing an application and various user interfaces that may be used in selecting settings of the robot, such as on/off toggles 27601, sliders 27602, radio buttons 27603, check boxes 27604, and dial 27605. FIG. 83 illustrates an application 27700 of a communication device 27701 displaying a map 27702 and three locations 27703 selected for spot cleaning by a user. The user may use the application 27700 to select a circular or square fixed size spot 27704 to add to the map 27703 and a movement path type 27705 for the robot to execute at the locations 27703. The robot may cover each location 27703 one or more number of times, however, the user may use the application 27700 to customize a number of times the robot covers each of the locations 27703. In some embodiments, a default of three or another number of spot cleans may be selected at a time. In some embodiments, the user may choose a location for spot cleaning by touching a location within the map using the application. FIG. 84 illustrates a first selected location 27800 with a default of three spot clean coverages using boustrophedon movement path 27801. FIG. 84 also illustrates the user 27802 distributing the three spot clean coverages by creating a second location 27803 for cleaning by touching the first location 27800 and dragging their finger across the screen to the second location 27803. A third location may be similarly chosen, resulting in three spot cleaning locations, each with boustrophedon movement path coverage.

In some embodiments, an application of a communication device paired with the robot may display the map of the environment as it is being built and updated. In some embodiments, while the robot creates a map of the environment, a method and interface is developed such that the user may interact with the map. This interaction takes place over the cloud, wherein the robot presents the map to the user through an interface (e.g., web, application, or smart phone), and the user defines the boundaries and pushes that data back to the robot. In some embodiments, conflicting situations may be resolved. For example, when a robot is manually placed inside an off-limit area, the robot requires a course of action that is defined based on the specific application of the navigation system. In some embodiments, the robot remains in place and does not move because any work in the area causes a massive inconvenience. In some embodiments, the robot is allowed to violate the no-entry rule while searching for a way out or moving out of the area if a path exists. In some embodiments, a path out may be the closest path. In some embodiments, safe paths may be defined by the user. In some embodiments, a safe path out of the no-entry zone may have a pre-setting. In some embodiments, the pre-settings provide a set of choices for the user to select from. In some embodiments, the pre-settings are over-ridden or de-prioritized by the user defined settings. A robot algorithm synthesizes a map from a temporal point swarm created from LIDAR sensor input. Similarly, the robot algorithm may synthesize a map from temporal image data from a camera. When boundaries are created on a user interface or the application, the boundaries merge with the map and a path plan that avoids the areas marked as off-limits is devised. An off-limit area may be a zone, such as a rectangle or another geometrically shaped zone or a line that the robot cannot cross or pass.

In some embodiments, various map customizations may be implemented using a communication device (e.g., mobile phone, tablet, laptop, etc.). An area to avoid may be defined or an area to cover may be defined. An area to cover may also be determined using other methods, such as a human driving the robot to create an enclosure, thee inside of which is to be covered. In some embodiments, the device is used to create virtual boundaries within the map of the environment displayed by the application. On a mobile phone, a boundary may be created by using a finger to draw the virtual boundary into the map. The application of the communication device may be wirelessly paired with the robot such that any updates to the map by the robot or made using the application are wirelessly transmitted to the application or the robot, respectively. During operation, the processor of the robot tracks its position within the map and avoids crossing any virtual boundaries created within the map.

The application may also be used to define a path of the robot and zones and label areas. In some cases, the processor of the robot may adjust the path defined by the user based on observations of the environment or the use may adjust the path defined by the processor. In some cases, the application displays the camera view of the robot. This may be useful for patrolling and searching for an item. In some embodiments, the user may use the application to manually control the robot (e.g., manually driving the robot or instructing the robot to navigate to a particular location). In some embodiments, a historical report of prior work sessions may be accessed by a user using the application of the communication device. In some embodiments, the historical report may include a total number of operation hours per work session or historically, total number of charging hours per charging session or historically, total coverage per work session or historically, a surface coverage map per work session, issues encountered (e.g., stuck, entanglement, etc.) per work session or historically, location of issues encountered (e.g., displayed in a map) per work session or historically, collisions encountered per work session or historically, software or structural issues recorded historically, and components replaced historically.

In some embodiments, the user may use the user interface of the application to instruct the robot to begin performing work (immediately. In some embodiments, the application displays a battery level or charging status of the robot. In some embodiments, the amount of time left until full charge or a charge required to complete the remaining of a work session may be displayed to the user using the application. In some embodiments, the amount of work by the robot a remaining battery level can provide may be displayed. In some embodiments, the amount of time remaining to finish a task may be displayed. In some embodiments, the user interface of the application may be used to drive the robot. In some embodiments, the user may use the user interface of the application to instruct the robot to perform a task in all areas of the map. In some embodiments, the user may use the user interface of the application to instruct the robot to perform a task in particular areas within the map, either immediately or at a particular day and time. In some embodiments, the user may choose a schedule of the robot, including a time, a day, a frequency (e.g., daily, weekly, bi-weekly, monthly, or other customization), and areas within which to perform a task. In some embodiments, the user may choose the type of task. In some embodiments, the user may use the user interface of the application to choose preferences, such as detailed or quiet disinfecting, light or deep disinfecting, and the number of passes. The preferences may be set for different areas or may be chosen for a particular work session during scheduling. In some embodiments, the user may use the user interface of the application to instruct the robot to return to a charging station for recharging if the battery level is low during a work session, then to continue the task. In some embodiments, the user may view history reports using the application, including total time of working and total area covered (per work session or historically), total charging time per session or historically, number of bin empties (if applicable), and total number of work sessions. In some embodiments, the user may use the application to view areas covered in the map during a work session. In some embodiments, the user may use the user interface of the application to add information such as floor type, debris (or bacteria) accumulation, room name, etc. to the map. In some embodiments, the user may use the application to view a current, previous, or planned path of the robot. In some embodiments, the user may use the user interface of the application to create zones by adding dividers to the map that divide the map into two or more zones. In some embodiments, the application may be used to display a status of the robot (e.g., idle, performing task, charging, etc.). In some embodiments, a central control interface may collect data of all robots in a fleet and may display a status of each robot in the fleet. In some embodiments, the user may use the application to change a status of the robot to do not disturb, wherein the robot is prevented from working or enacting other actions that may disturb the user.

In some embodiments, the application may display the map of the environment and allow zooming-in or zoomingout of the map. In some embodiments, a user may add flags to the map using the user interface of the application that may instruct the robot to perform a particular action. For example, a flag may be inserted into the map and the flag may indicate storage of a particular medicine. When the flag is dropped a list of robot actions may be displayed to the user, from which they may choose. Actions may include stay away, go there, go there to collect an item. In some embodiments, the flag may inform the robot of characteristics of an area, such as a size of an area. In some embodiments, flags may be labelled with a name. For example, a first flag may be labelled front of hospital bed and a characteristic, such size of the area, may be added to the flag. This may allow granular control of the robot. For example, the robot may be instructed to clean the area front of the hospital bed through verbal instruction or may be scheduled to clean in front of the hospital bed every morning using the application.

In embodiments, a user may add virtual walls, do not enter zones or boxes, do not mop zones, do not vacuum zones, etc. to the map using the application. In embodiments, the user may define virtual places and objects within the map using the application. For example, the user may know its cat has a favorite place to sleep. The user may virtually create the sleeping place of the cat within the map for convenience. In some embodiments, a user may manually determine the amount of overlap in coverage by the robot. For instance, when the robot executes a boustrophedon movement path, the robot travels back and forth across a room along parallel lines. Based on the amount of overlap desired, the distance between parallel lines is adjusted, wherein the distance between parallel lines decreases as the amount of desired overlap increases. In some embodiments, the processor determines an amount of overlap in coverage using machine learning techniques. For example, the processor may increase an amount of overlap in areas with increase debris accumulation, both historically and in a current work sessions. In some embodiments, the processor may determine the amount of overlap in coverage based on a type of cleaning of the robot, such as vacuuming, mopping, UV, mowing, etc. In some embodiments, the processor or a user may determine a speed of cleaning based on a type of cleaning of the robot.

In some embodiments, the application of a communication device may display a map of the environment. In some embodiments, different floor types are displayed in different colors, textures, patterns, etc. For example, the application may display areas of the map with carpet as a carpet-appearing texture and areas of the map with wood flooring with a wood pattern. In some embodiments, the processor determines the floor type of different areas based on sensor data such as data from laser sensor or electrical current drawn by a wheel or brush motor. For example, the light reflected back from a laser sensor emitted towards a carpet is more distributed than the light reflected back when emitted towards hardwood flooring. Or, in the case of electrical current drawn by a wheel or brush motor, electrical current drawn to maintain a same motor speed is increased on carpet due to increased resistance from friction between the wheel or brush and the carpet. In some embodiments, a user may provide an input to the application to designate floor type in different areas of the map displayed by the application. In some embodiments, the user may drop a pin in the displayed map. In some embodiments, the user may use the application to determine a meaning of the dropped pin (e.g., extra cleaning here, drive here, clean here, etc.). In some embodiments, the robot provides extra cleaning in areas in which the user dropped a pin. In some embodiments, the user may drop a virtual barrier in the displayed map. In some embodiments, the robot does not cross the virtual barrier and thereby keeps out of areas as desired by the user. In some embodiments, the user may use voice command or the application of the communication device to instruct the robot to leave a room. In some embodiments, the user may physically tap the robot to instruct the robot to leave a room or move out of the way.

In some embodiments, an application of a communication device paired with the robot may be used to execute an over the air firmware update (or software or other type of update).

In some embodiments, more than one robot and device may be connected to the application and the user may use the application to choose settings for each robot and device. In some embodiments, the user may use the application to display all connected robots and other devices. For example, the application may display all robots and smart devices in a map of a home or in a logical representation such as a list with icons and names for each robot and smart device. In some embodiments, the user may choose that one robot perform a task after another robot completes a task. In some embodiments, the user may choose schedules of both robots using the application. In some embodiments, the schedule of both robots may overlap (e.g., same time and day). In some embodiments, a home assistant may be connected to the application. In some embodiments, the user may provide commands to the robot via a home assistant by verbally providing commands to the home assistant which may then be transmitted to the robot. Examples of commands include commanding the robot to disinfect a particular area or to navigate to a particular area or to turn on and start disinfecting. In some embodiments, the application may connect with other smart devices (e.g., smart appliances such as smart fridge or smart TV) within the environment and the user may communicate with the robot via the smart devices.

In some embodiments, different objects within an environment may be associated with a location within a floor plan of the environment. For example, a user may want the robot to navigate to a particular location within their house, such as a location of a TV. To do so, the processor requires the TV to be associated with a location within the floor plan. In some embodiments, the processor may be provided with one or more images comprising the TV using an application of a communication device paired with the robot. A user may label the TV within the image such that the processor may identify a location of the TV based on the image data. For example, the user may use their mobile phone to manually capture a video or images of the entire house or the mobile phone may be placed on the robot and the robot may navigate around the entire house while images or video are captured. The processor may obtain the images and extract a floor plan of the house. The user may draw a circle around each object in the video and label the object, such as TV, hallway, living room sofa, Bob's room, etc. Based on the labels provided, the processor may associate the objects with respective locations within the 2D floor plan. In some embodiments, the floor plan may be a bird's eye view of the environment. Then, if the robot is verbally instructed to navigate to the living room sofa to start a video call, the processor may actuate the robot to navigate to the floor plan coordinate associated with the living room sofa.

In one embodiment, a user may label a location of the TV within a map using the application. For instance, the user may use their finger on a touch screen of the communication device to identify a location of an object by creating a point, placing a marker, or drawing a shape (e.g., circle, square, irregular, etc.) and adjusting its shape and size to identify the location of the object in the floor plan. In embodiments, the user may use the touch screen to move and adjust the size and shape of the location of the object. A text box may pop up after identifying the location of the object and the user may label the object that is to be associated with the identified location. In some embodiments, the user may choose from a set of predefined object types in a drop-down list, for example, such that the user does not need to type a label. We can select from a list. In other embodiments, locations of objects are identified using other methods. In some embodiments, a neural network may be trained to recognize different types of objects within an environment. In some embodiments, a neural network may be provided with training data and may learn how to recognize the TV based on features of TVs. In some embodiments, a camera of the robot (the camera used for SLAM or another camera) captures images or video while the robot navigates around the environment. Using object recognition, the processor may identify the TV within the images captured and may associate a location within the floor map with the TV. However, in the context of localization, the process does not need to recognize the object type. It suffices that the location of the TV is known to localize the robot. This significantly reduces computation. There are certain ways to do this.

In some embodiments, an application of a communication device paired with the robot controls the robot using one or more of: switches or toggles for transitioning between two or more states; sliders for choosing setting between a minimum and a maximum; multiple choice radio buttons or checkboxes to choose between one or more options; and text for providing commands to the robot. In some embodiments, the application is also used to select a theme and a color. In some embodiments, the application, the robot, or another computational device generates a message indicating that human intervention is necessary to continue operation of the robot. In some embodiments, the message is sent through a network or cloud using a Wi-Fi or cellular module from the robot to the application of the communication device of a user responsible for maintaining the robot. In some embodiments, the message comprises a map of a workplace and a last known location of the robot with the map. In some embodiments, connectivity between the robot and the application is diagnosed to determine where a disconnect in the connection is. In some embodiments, a blocked status of the robot is cleared upon the robot (or a user or other device) clearing a problem of the robot. In some embodiments, the message is escalated when the robot is not assisted within a predetermined period of time from when a problem is detected. In some embodiments, escalation comprises any of: notification, involving additional users, repeating messages at higher-than-normal frequency, adding audio alerts, adding more attention-grabbing language.

In some embodiments, a graphical user interface (GUI) of an application (e.g., a native application or web application) of a communication device is used to modify, add, and/or delete information to the map of the environment. Examples of a communication device include, but are not limited to, a smartphone, computer, tablet, laptop, dedicated remote control, or any device that may communicate with and display data from the robot and receive inputs from a user. In some embodiments, input into the application of the communication device specifies or modifies environmental characteristics of different locations within the map of the environment. For example, floor type of locations, locations likely to have high and low levels of debris accumulation, locations likely to have a specific type or size of debris, locations with large obstacles, etc. are specified or modified using the application of the communication device. In other embodiments, input into the application of the communication device modifies, adds, and/or deletes perimeters, doorways, subareas, etc. of the map and/or cleaning path. Input into the application also chooses or modifies functions and settings of the robot such as cleaning mode (e.g. vacuuming, UV treatment, sweeping, mopping, etc.), cleaning schedule (e.g., day and time of cleaning, subarea to be cleaned, frequency of cleaning, etc.), order of coverage of subareas of the environment, impeller speed, main brush speed, wheel speed, peripheral brush speed, etc.

Figure 85:
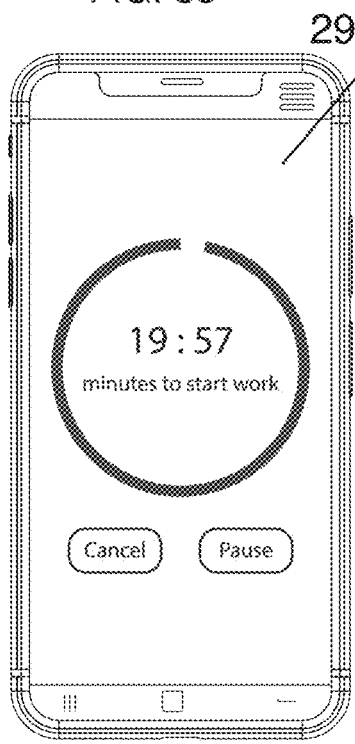
FIG. 85 illustrates an application of a communication device displaying a timer for a robot to perform work.
Figure 86:
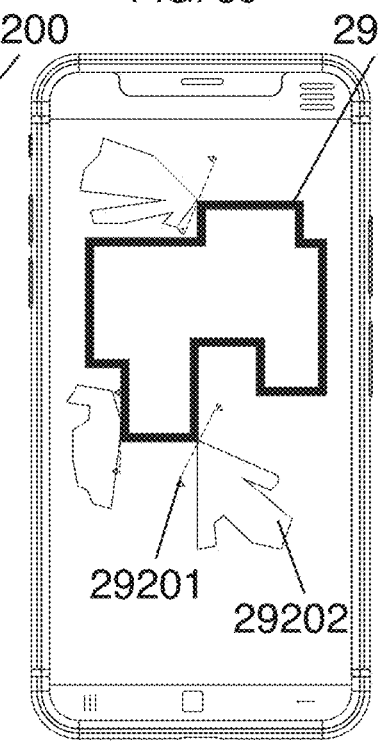
FIGS. 86 and 87 illustrate a slicer tool and a selection tool of an application of a communication device, respectively.
Figure 87:
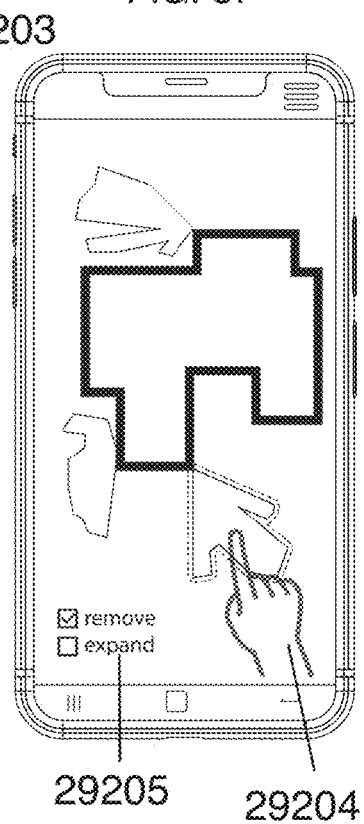
Figure 88A:
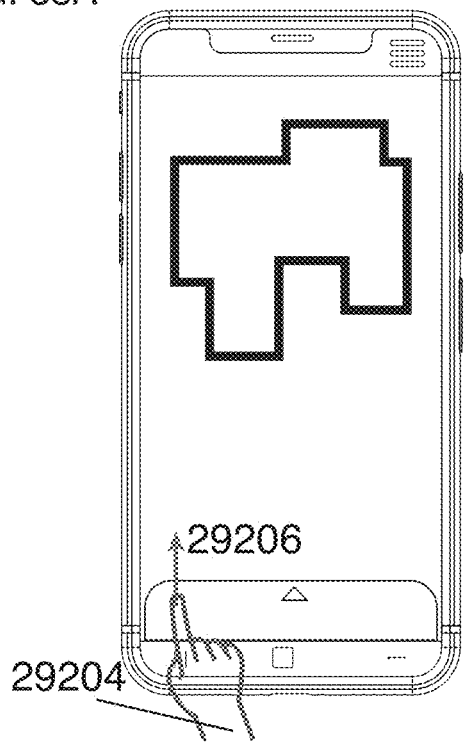
FIGS. 88A-88D illustrate adding a household member using an application of a communication device.
Figure 88B:
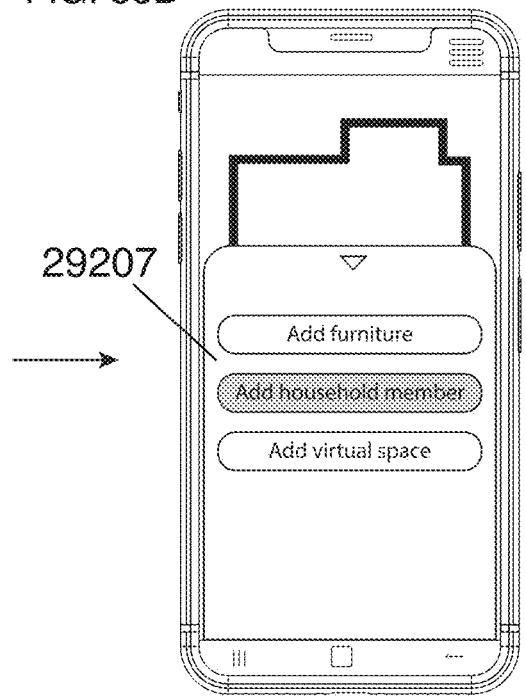
Figure 88C:
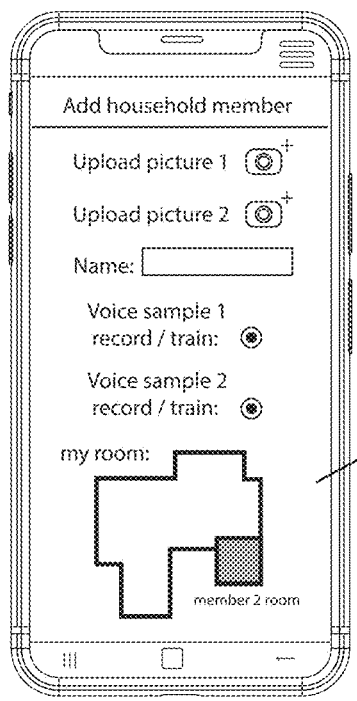
Figure 88D:
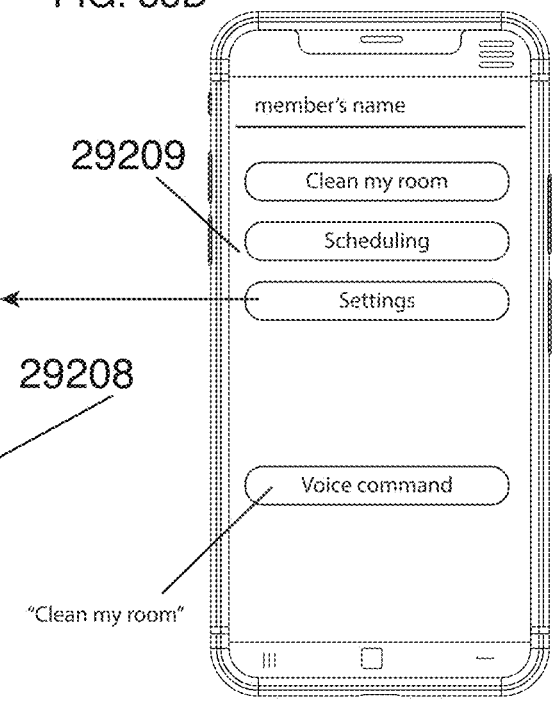
Figure 89A:
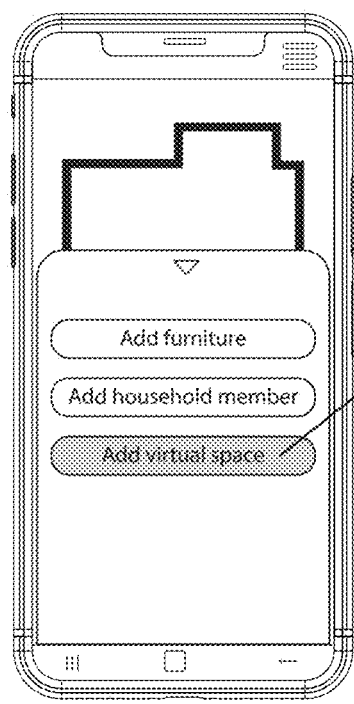
FIGS. 89A-89D illustrate adding a virtual space and furniture using an application of a communication device.
Figure 89B:
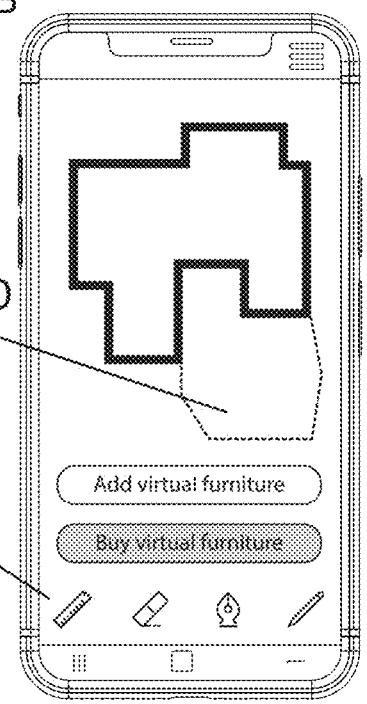
Figure 89C:
Figure 89D:
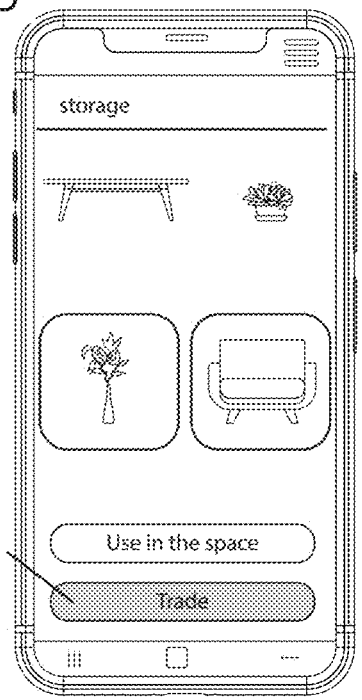
Figure 90A:
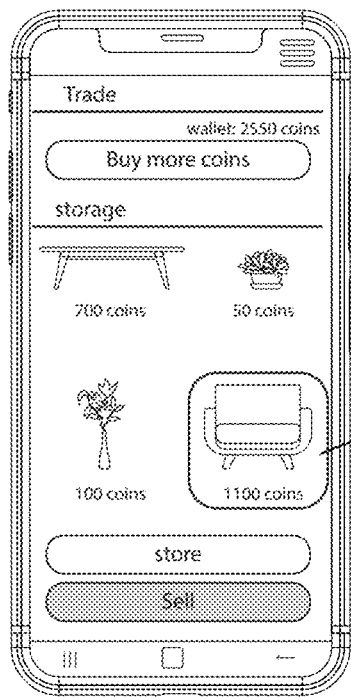
Figure 90B:
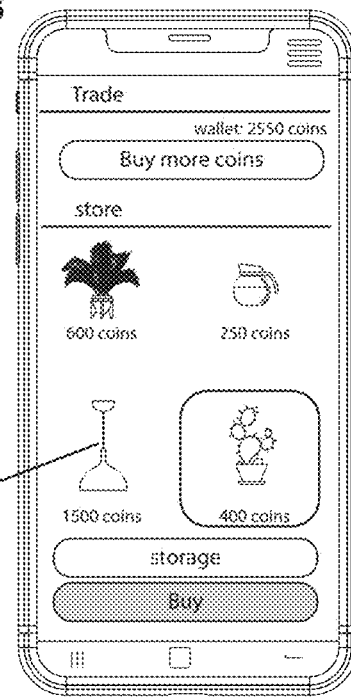
Figure 90C:
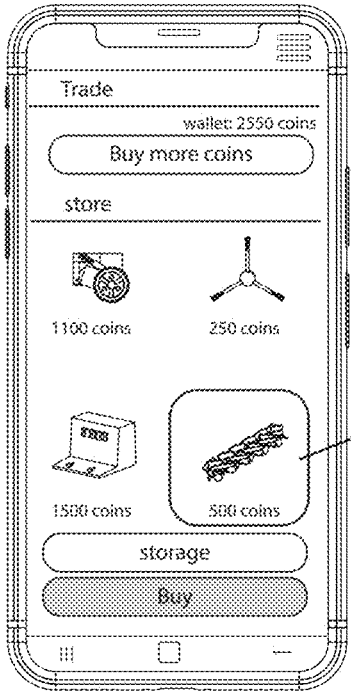
Figure 90D:
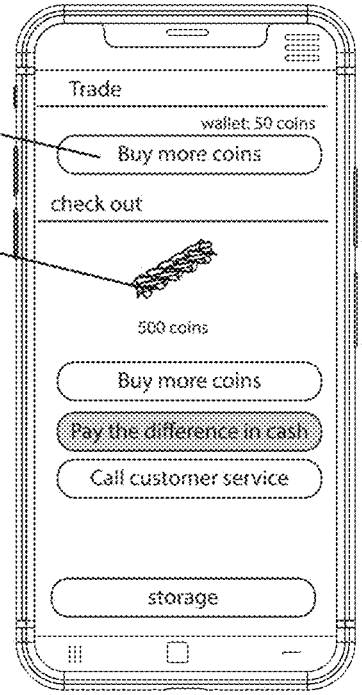

In some embodiments, a user sets a timer for the robot to begin working using an application of a communication device. FIG. 85 illustrates an application 29200 displaying a timer counting down to a time when the robot is to perform work. In some embodiments, the user uses the application to select areas of a map that are not representative of the environment. FIG. 86 illustrates a slicer tool 29201 of the application 29200 to cut areas 29202 from a map 29203 of an environment as they are not representative of the true environment. FIG. 87 illustrates a user 29204 using a selection tool 29205 to cut areas 29202 from the map 29203 of the environment as they are not representative of the true environment. In some embodiments, the user adds information to the map using the application. FIGS. 88A and 88B illustrate the user 29204 swiping upwards 29206 to add furniture, a household member, or a virtual space 29207. FIG. 88C illustrates information 29208 that is added for a household member, including a picture of the member, a name, a voice sample, and a room of the member. FIG. 88D illustrates settings and instructions 29209 that may be selected or set for a particular member. Selecting settings returns the user to the page displayed in FIG. 88C. FIG. 89A illustrates selecting addition of virtual space using the application 29200. FIG. 89B illustrates a virtual space 29210 added using a tool 29211 of the application 29200. The user 29204 can use the application 29200 to add virtual furniture or buy virtual furniture. FIG. 89C illustrates a message 29212 displayed by the application 29200 upon a company or service provider providing a free piece of virtual furniture to a user. The user 29204 can use the application 29200 to use the virtual furniture immediately or place in storage. FIG. 89D illustrates storage of the virtual furniture, which may be added to a map or traded for other virtual furniture or real robot accessories 29213. While the robot cannot enter a virtual space physically, the robot can enter virtually. In some embodiments, a task is scheduled for a virtual area, wherein the task is simulated using the application or VR equipment. Some embodiments include application purchases of virtual and physical products using application currency. FIG. 90A illustrates the application 29200 displaying a trading page, wherein the user 29204 uses the application 29200 to sell items 29214 from their storage for application currency (i.e., coins). FIGS. 90B and 90C illustrate the application 29200 displaying virtual items 29215 and real physical robot accessories 29216 the user may purchase using their application currency. The user may purchase more coins 29217 using real currency. In some cases, the user pays for an item using coins and real currency, as in FIG. 90D, wherein the user check outs and has the option to purchase more coins or pay the difference for the product 29218 in real currency or call customer service (e.g., to negotiate or waive the difference in cost). FIG. 90E illustrates the application 29200 displaying other features 29219 the user 29204 may redeem coins for. FIG. 91 illustrates an example of a process for creating a virtual object, wherein a user can select to create a virtual surface 29800, add a number of legs 29801, and a shape 29802 of the legs. Some embodiments employ surface recognition for placement of virtual object. In some embodiments, surfaces are discovered or recognized by a stationary or mobile device or robot, smart watch, smart phone, HMD, glasses, VR headset or other user interfaces. FIG. 92 illustrates an example of recognizing surfaces 29900 of a virtual environment 29901 by a mobile device or using a smart watch, an interface of an application of a smart phone, virtual glasses, or a VR headset. A user may choose to add a virtual teddy bear 29902 to the virtual environment 29901 and pay for other selectable options 29903.

Some embodiments create a 2D or 3D floor plan from the map that is viewable using an application of a communication device paired with the robot. In some embodiments, the application displays any of a path of the robot, obstacles, a location of the robot, a border of a room, and rooms in different colors such that they are distinguishable. For example, FIG. 93A illustrates a room 30000 displayed in a solid dark color, the robot 30001 displayed in white, and a path 30002 of the robot displayed in a shade of color lighter than the shade of color of the room 30000. FIG. 93B illustrates a room 30000 displayed in solid color and a border 30001 of the room 30000 and obstacle 30002 within the room 30000 displayed in a darker shade of color than the color of the room 30000. In some embodiments, the application generates an illustration of an object or animal having a similar shape to the map displayed by the application. FIG. 94 illustrates a map 30100 displayed by an application of a communication device and a lion 30101 generated and displayed by the application as its shape is similar to that of the map 30100. In some embodiments, the lion 30101 acts as a screen saver for the application.

In embodiments, the robot may be instructed to navigate to a particular location, such as a location of the TV, so long as the location is associated with a corresponding location in the map. In some embodiments, a user may capture an image of the TV and may label the TV as such using the application paired with the robot. In doing so, the processor of the robot is not required to recognize the TV itself to navigate to the TV as the processor can rely on the location in the map associated with the location of the TV. This significantly reduces computation. In some embodiments, a user may use an application paired with the robot to tour the environment while recording a video and/or capturing images. In some embodiments, the application may extract a map from the video and/or images. In some embodiments, the user may use the application to select objects in the video and/or images and label the objects (e.g., TV, hallway, kitchen table, dining table, Ali's bedroom, sofa, etc.). The location of the labelled objects may then be associated with a location in the two-dimensional map such that the robot may navigate to a labelled object without having to recognize the object. For example, a user may command the robot to navigate to the sofa so the user can begin a video call. The robot may navigate to the location in the two-dimensional map associated with the label sofa.

In some embodiments, the robot navigates around the environment and the processor generates map using sensor data collected by sensors of the robot. In some embodiments, the user may view the map using the application and may select or add objects in the map and label them such that particular labelled objects are associated with a particular location in the map. In some embodiments, the user may place a finger on a point of interest, such as the object, or draw an enclosure around a point of interest and may adjust the location, size, and/or shape of the highlighted location.

A text box may pop up and the user may provide a label for the highlighted object. Or in another implementation, a label may be selected from a list of possible labels. Other methods for labelling objects in the map may be used.

In some embodiments, items of interest, such as items a user intends to purchase, are placed within the floor plan or map using the application. In some embodiments, a schematic map or a map reconstructed from images is used to display a realistic view of an environment of a user, such as their home, for the purpose of, for example, observing anomalies. In some embodiments, a user uses the application to control a device, such as a TV, from within the displayed map. For example, a user may select the TV by tapping a displayed TV icon within the map on a screen of the communication device. Upon selecting the TV, a control panel of the TV or an application control screen for the TV is displayed by the application. In some embodiments, an application of a device is embedded within the application of the communication device paired with the robot such that a single application is used to operate the robot and the device. In some embodiments, the application transmits the virtual reality of the home of the user to another device, such as a communication device of another user, such that another user can experience the virtual reality of the home.

Figure 95:
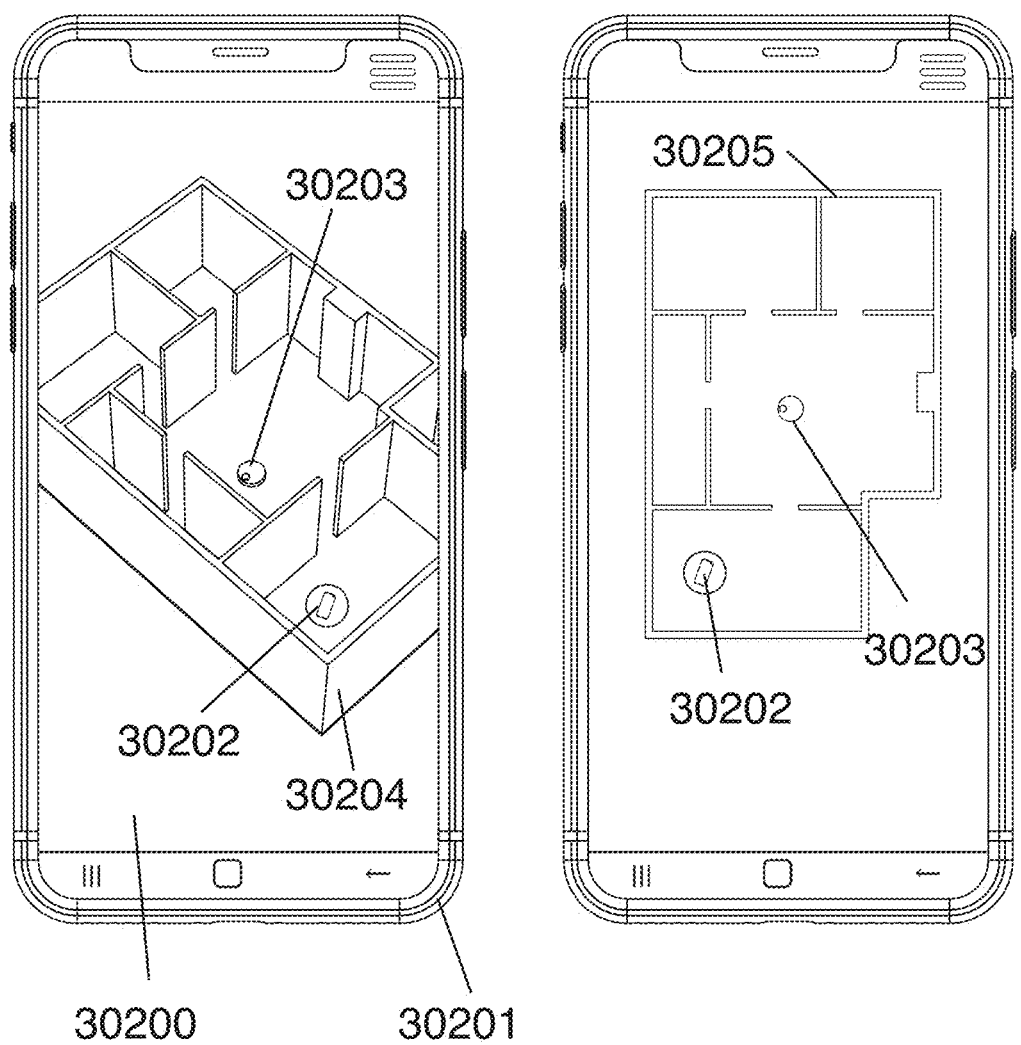
FIG. 95 illustrates an application of a communication device displaying a location of the communication device and a robot in a map.

In embodiments, the application of the communication device displays the map in 2D or 3D. In some embodiments, a location of the robot and a location of a charging station of the robot are shown within the map. In some embodiments, a location of the communication device is shown within the map, which in many cases coincides with a location of the user by whom the communication device is owned. This helps the user locate themselves within the map and in relation to the robot. FIG. 95 illustrates an application 30200 of a communication device 30201 displaying a location 30202 of the communication device 30201 and a robot 30203 within a 3D map 30204 and a 2D map 30205 of the environment. In some embodiments, given appropriate consent is obtained, a location of other devices, such as communication devices of other persons within a household, are shown within the map. In some embodiments, the robot is equipped with a GPS module which is useful for placing the map in the context of a larger geographical location, such a location of the map in relation to a city. In some embodiments, the map, the robot, and the communication devices are displayed by the application in a same view using their global location data. In some embodiments, the processor of the robot uses wireless signal strength, access points, and Bluetooth signals to locate the communication device in relation to the robot, upon which the application highlights the location of the communication device within the map. In some embodiments, the communication device includes a camera or depth sensor. In some embodiments, a processor of the communication device executing the application determines a location of the communication device based on an image captured by the camera or spatial data captured by the depth sensor using relocalization methods for the robot described herein. Various combinations of localization and relocalization methods described herein may be used to locate and display the location of the communication device within the generated map.

Figure 96:
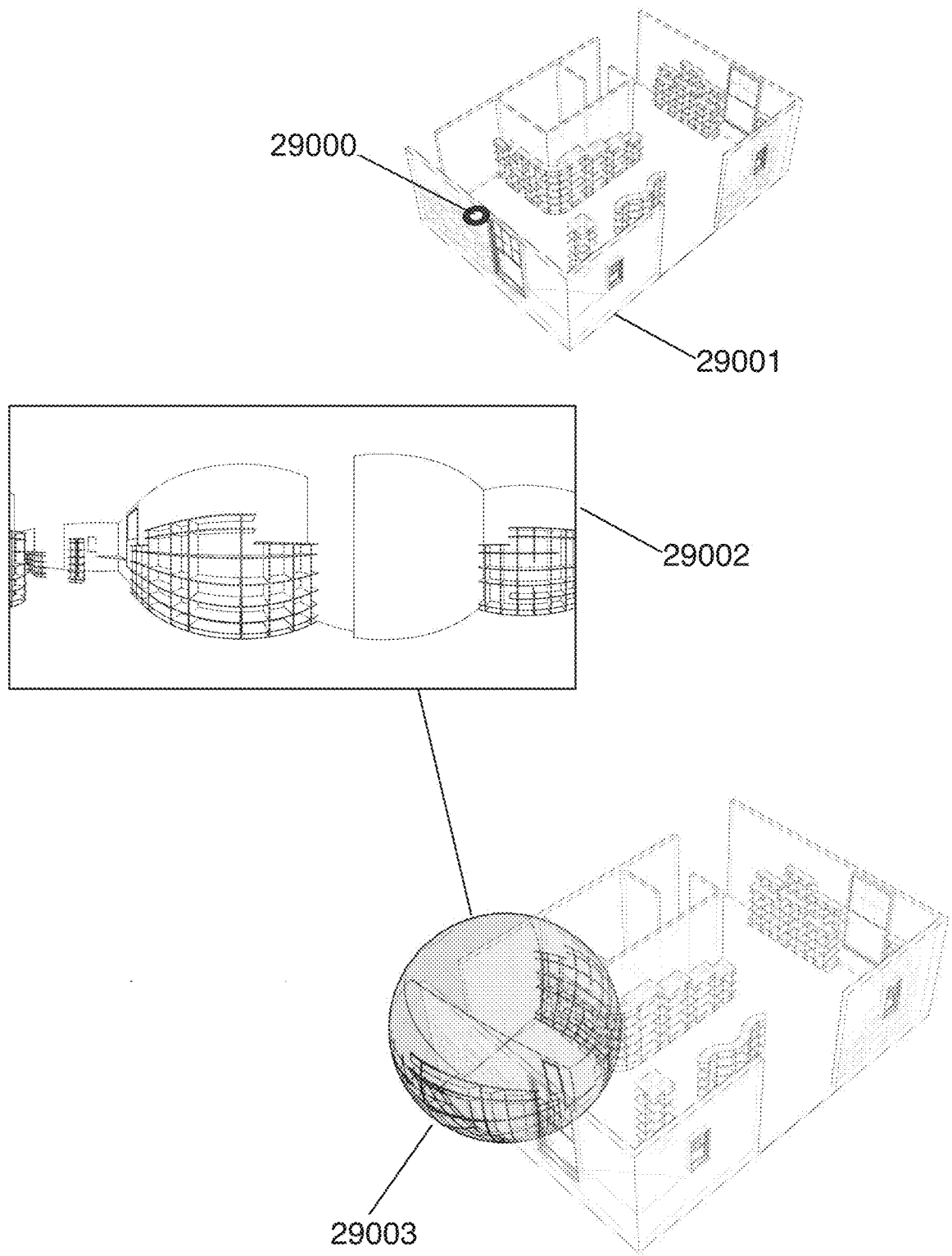
FIG. 96 illustrates a location of a robot from which a panoramic image is captured by a camera disposed on the robot.
Figure 97:
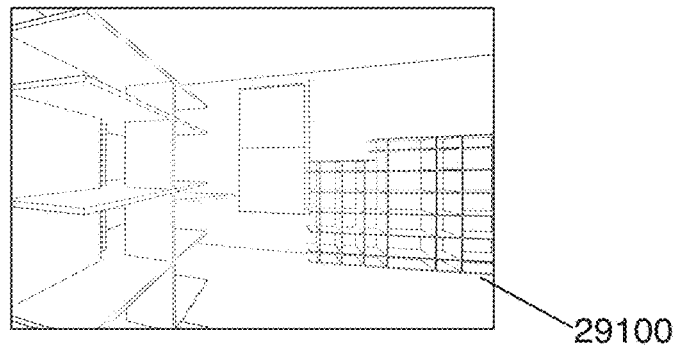
FIG. 97 illustrates an example of a virtual camera view of a robot.
Figure 98:
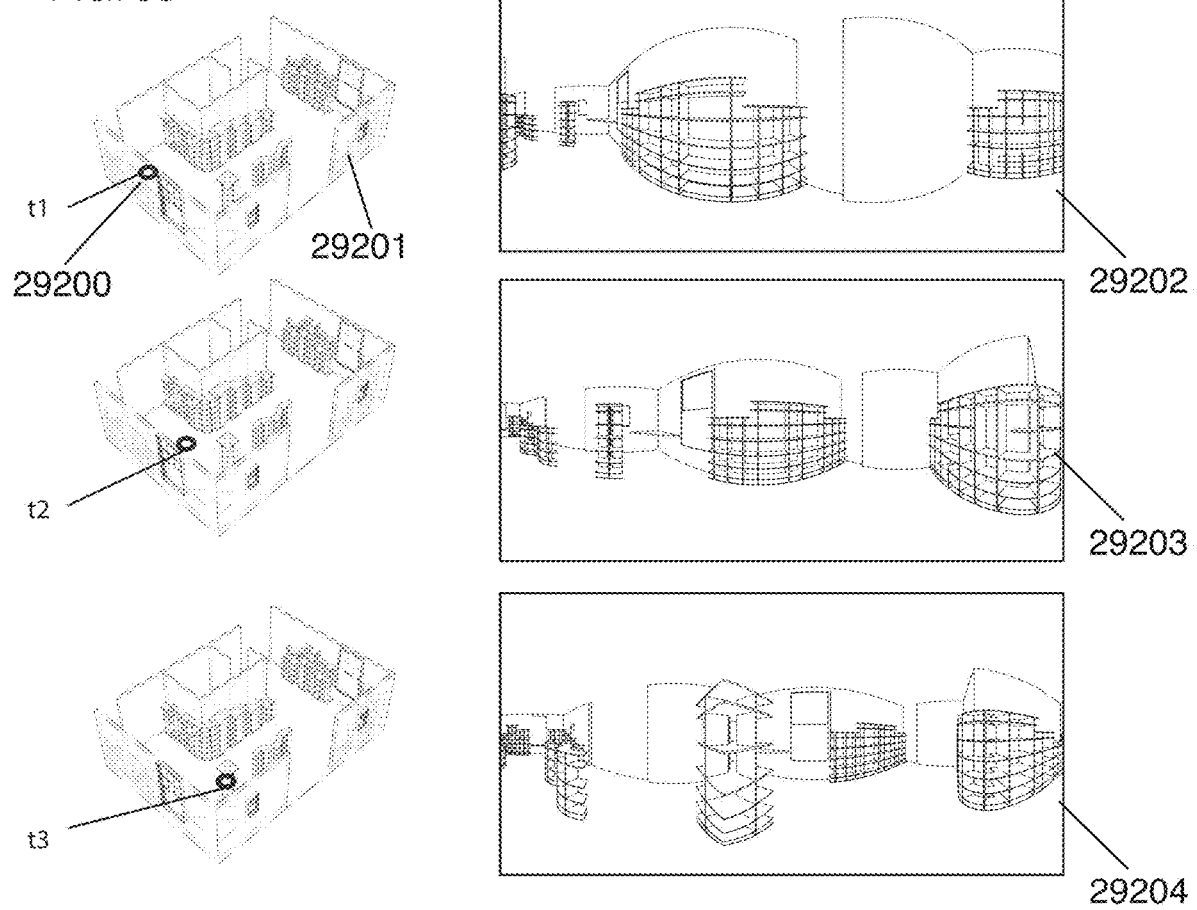
FIGS. 98 and 99 illustrate examples of panoramic images and a projection thereof.
Figure 99:
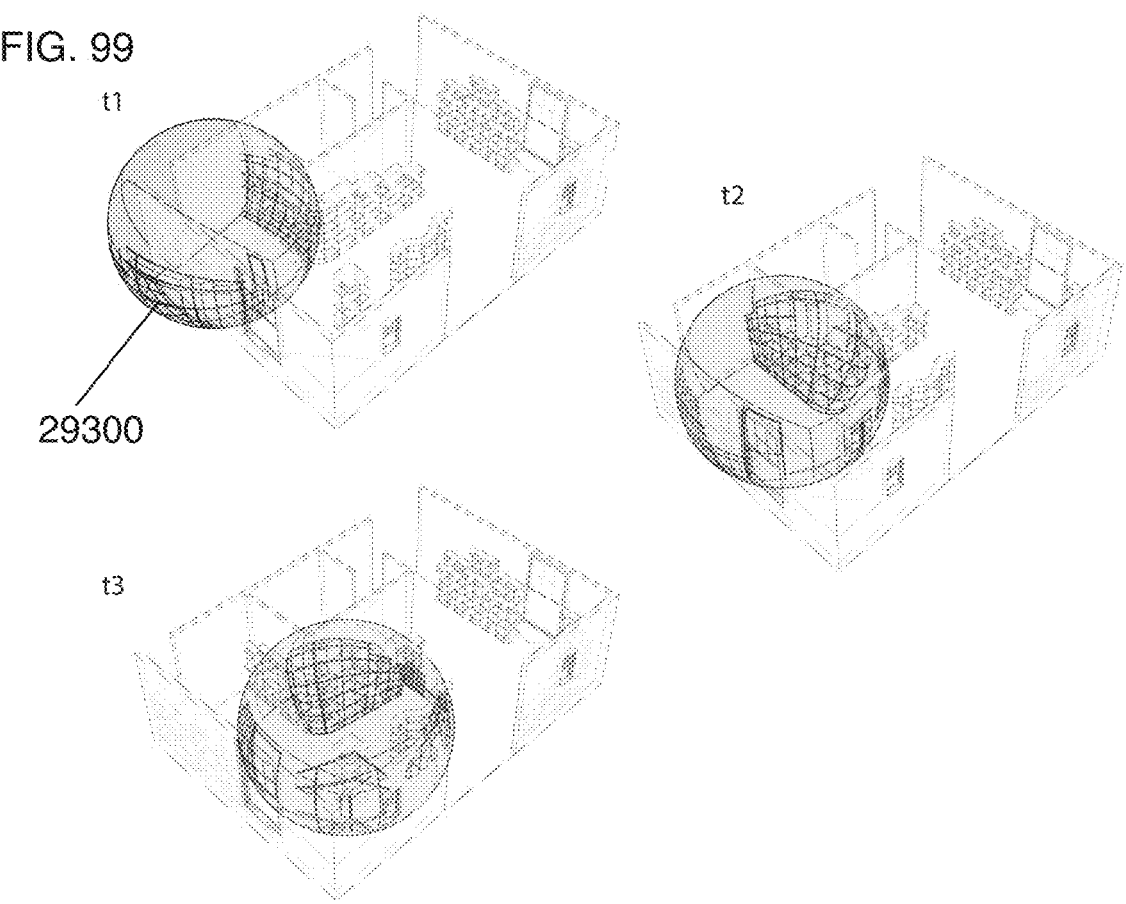
Figure 100:
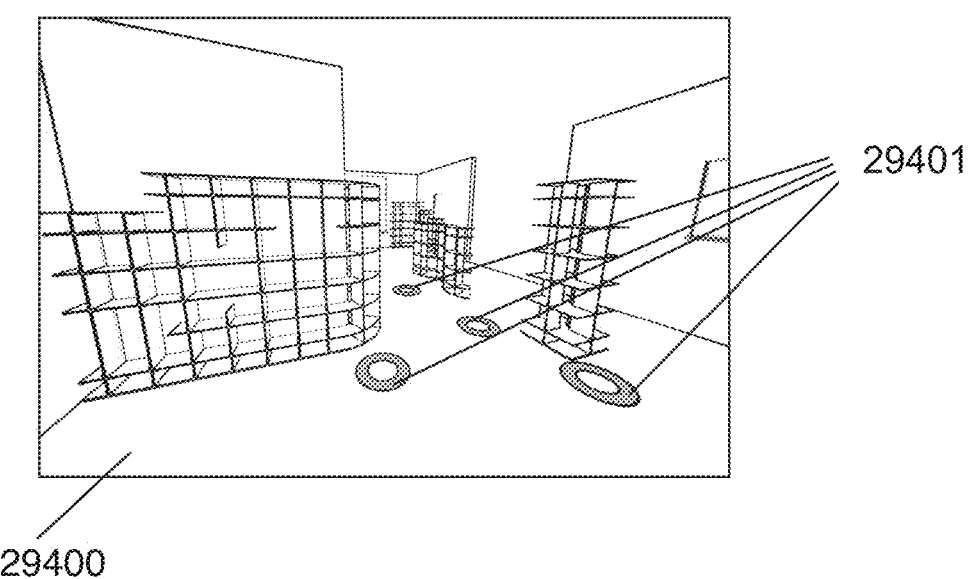
FIG. 100 illustrates an environment and hotspots displayed by an application.

In some embodiments, the processor of the robot or an external processor digitally recreates the environment of the robot and the application of communication device (e.g., mobile device, desktop, laptop, smart TV, smart watch, etc.) paired with the robot displays the digital environment to the user in 2D, 3D, VR, AR, or mixed reality format. The 3D digital representation of the environment may be shown to the user in different levels of detail. For example, if the accuracy is unimportant, a camera of the robot may capture a panoramic image of the surroundings of the robot and the processor may transmit the image to the application for viewing by the user. Depending on a method used in capturing the panoramic image, the image may be projected back onto inner surfaces of a cube, a cylinder, or a sphere. FIG. 96 illustrates a location of a robot 29000 at a time step t1 within surroundings 29001, from which panoramic image 29002 is captured by a camera of the robot 29000. An application paired with the robot displays the panoramic image 29002 projected onto an inner surface of sphere 29003 positioned at the location of the robot 29000 at the time the image 29002 was captured. In some embodiments, a virtual camera is positioned within a volume onto which an image is projected, giving the user an illusion of 3D space when viewed used the application. The user may use the application to view the surroundings from any direction, select different points within the surroundings to obtain more information, and guide the robot to drive to a particular point or face a particular direction. FIG. 97 illustrates a virtual camera view 29100 of the robot. When the virtual camera is positioned in a center of a sphere the viewer observes the surroundings as if the viewer were standing in place of the robot at the time the image is captured. The viewer may use the application to turn the viewing direction, however, as soon as the virtual camera translates the illusion of being in 3D space is broken. To compensate for this issue, the robot may capture images in different time or space intervals. The robot may capture and send these panoramic images from several points within the environment along with its own position data for each picture. In 3D space, the position data for each panoramic image is highlighted as a hotspot. When the user selects any of these hotspots, the virtual camera moves to that hotspot and the volume with the panoramic image of that spot projected onto the volume is presented to the user using the application. This method adds the illusion of movement to the experience. While the user still can't navigate within the virtual environment freely, they can see the environment from different selected locations. FIG. 98 illustrates a location of robot 29200 within environment 29201 at three different time points and corresponding panoramic images 29202, 29203, and 29204, respectively. The images 29202, 29203, and 29204 are displayed by the application for viewing by the user. FIG. 99 illustrates panoramic images projected onto an inner surface of sphere 29300 positioned at a location of the robot at different times the panoramic images were captured. FIG. 100 illustrates an environment 29400 and hotspots 29401 displayed by the application. A user may select any of the hotspots 29401 to relocate a virtual camera, the hotspots 29401 corresponding with previous locations of the robot at the time images for the respective hotspots were captured.

Figure 101:
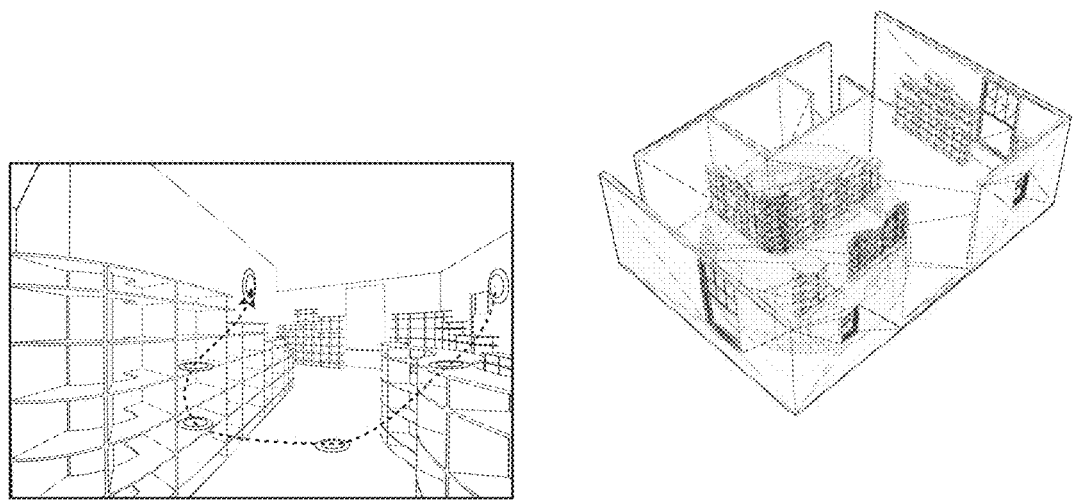
FIG. 101 illustrates a user using a 3D cursor to determine different directions of surfaces.

A next step includes using the 3D information in the experience. While raw 3D data (point cloud for example) is useful for robot navigation, it is usually too noisy for presenting it to the user, and further the points in the point cloud are scattered and need to be converted to a mesh surface before presentation. Even the generated mesh may lack certain details from areas that are not captured by the robot. One solution for representation here is to place the 3D generated model in the background in 3D space but not showing or rendering it in the viewport. In each hotspot location the panoramic image is shown, and the hidden 3D model is used to distinguish some 3D elements. For example, FIG. 101 illustrates the user using a 3D cursor to determine different directions of surfaces in the projected panoramic image view by the user. The 3D cursor aligns itself with different surfaces as the user moves in the viewport. This direction information is generated using the hidden 3D model.

Figure 102:
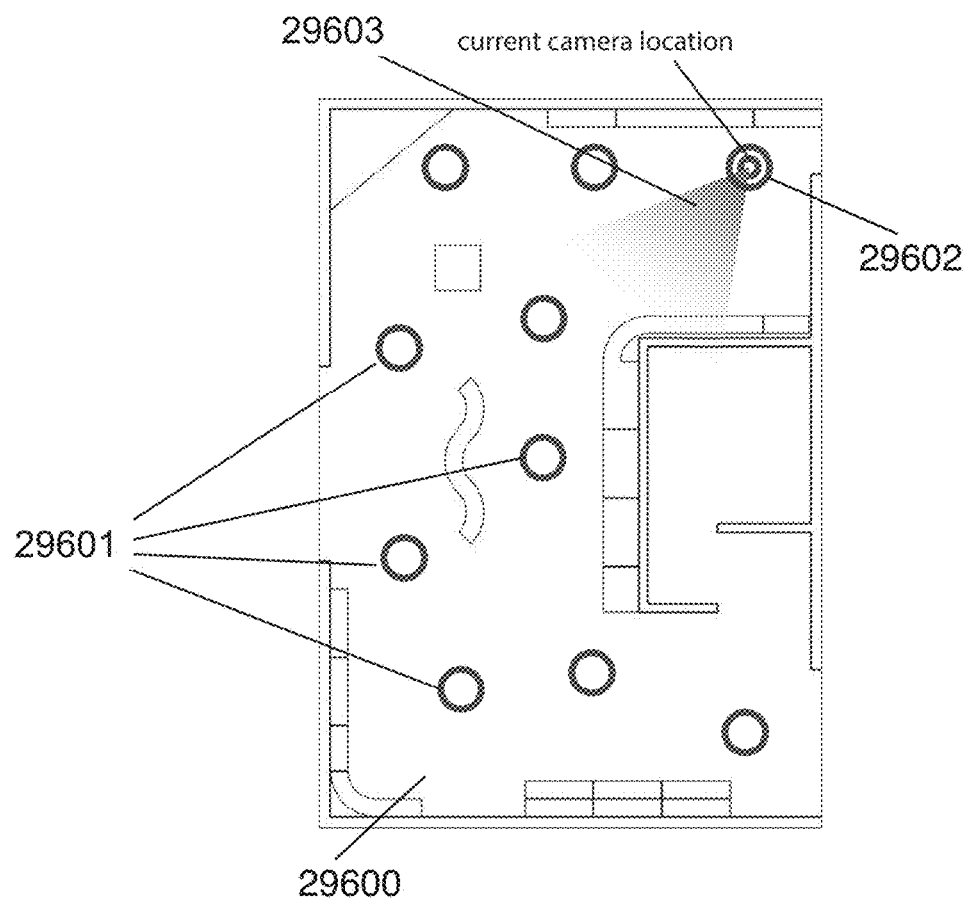
FIG. 102 illustrates an example of a 2D map including hotspots.
Figure 103:
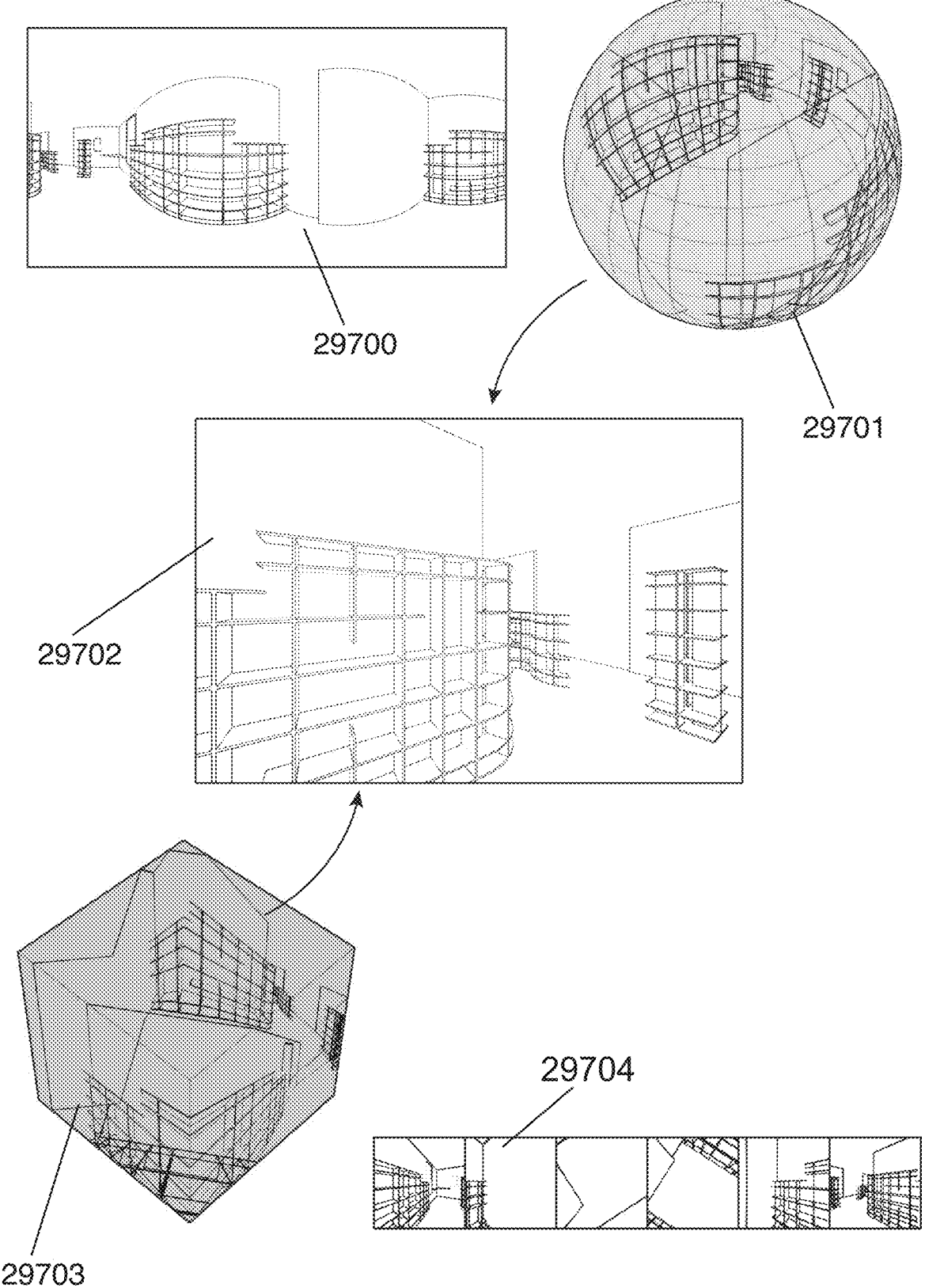
FIGS. 103-105 illustrate an example of panoramic image projections and data used in generating the panoramic images.
Figure 104:
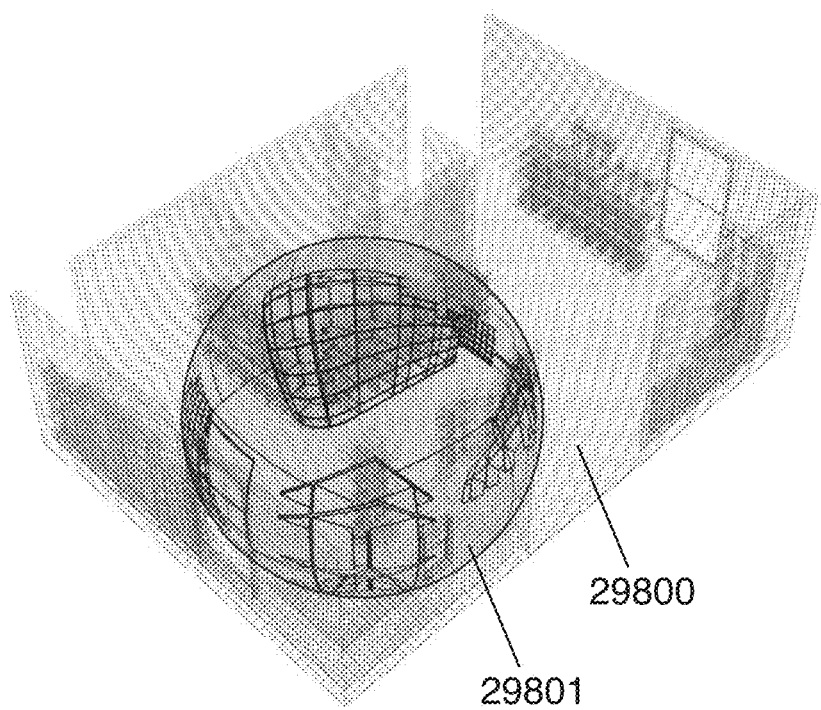
Figure 105:
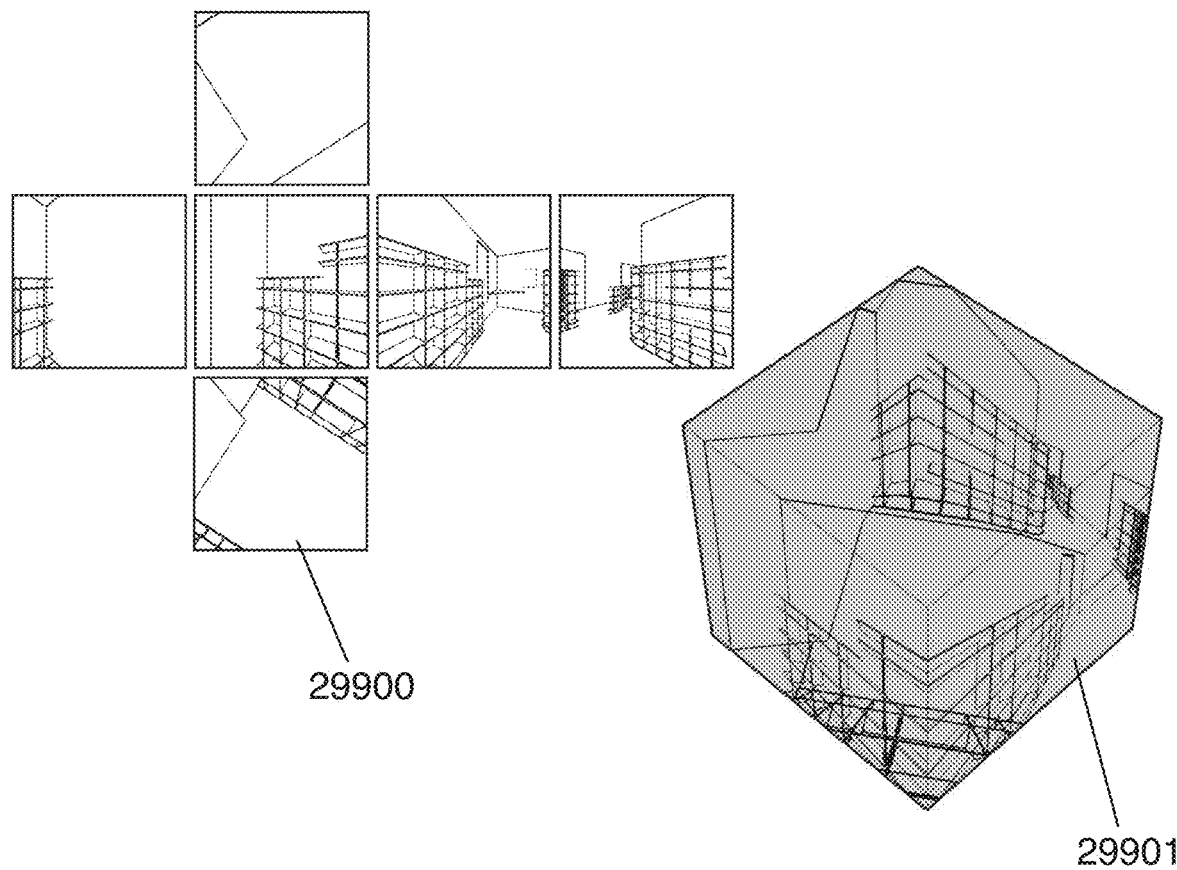

The next step includes presenting the actual 3D generated model to the user, which is more accurate but needs more processing, optimization, and clean up. In this method, instead of projecting the panoramic images onto a simple volume, they are projected on the actual 3D model of the environment. The number of images, their distance, and the complexity of the generated 3D model are some of the elements contributing to the quality of the final model and the amount of processing needed to generate such a model. In all the different levels of presentation, the 3D view may be accompanied by a 2D map to show the location of the viewer within the map. This location may be similar to the robot's location or may be different. FIG. 102 illustrates a 2D map 29600 including hotspots 29601 that may be selected from a top-down view for a virtual camera view from the respective hotspot. A virtual camera 29602 is shown at the selected hotspot as well as the direction of view 29603. The projected image onto volume surfaces may look distorted from the outside but when the camera is placed at the exact location of the robot the images appear correctly. FIG. 103 illustrates a spherical panoramic image 29700 that is projected onto a surface of sphere 29701. However, when a virtual camera is centered within the sphere 29701, an undistorted image 29702 corresponding to a FOV of the virtual camera is displayed. This applied for the panoramic image 29700 projected onto a surface of the cube 29703, wherein 29704 illustrates the deconstructed cubical projection, each square corresponding to one side of the cube. While the images appear distorted from the outside for both projections 29701 and 29703, the images appear undistorted when the virtual camera with correct FOV is positioned at the center of either volume, Since the robot after several run sessions can generate a 3D HD map, the process of generating panoramic images can be done at any point in the map using the 3D data meaning the robot does not have to be physically present in the environment to capture the image. FIG. 104 illustrates 3D data 29800 of the environment from which the panoramic images projected onto 3D sphere 29801 are generated. Additionally, the panoramic image does not have to be a single image. It can be a combination of several images taken from different angles. FIG. 105 illustrates multiple images 29900 captured from different angles used in generating a panoramic image projected onto 3D cube 29901. Images may need to be deformed (e.g., stretched) before projection. Using this 3D representation, the user may control the robot remotely in the real environment in real-time.

Figure 106:
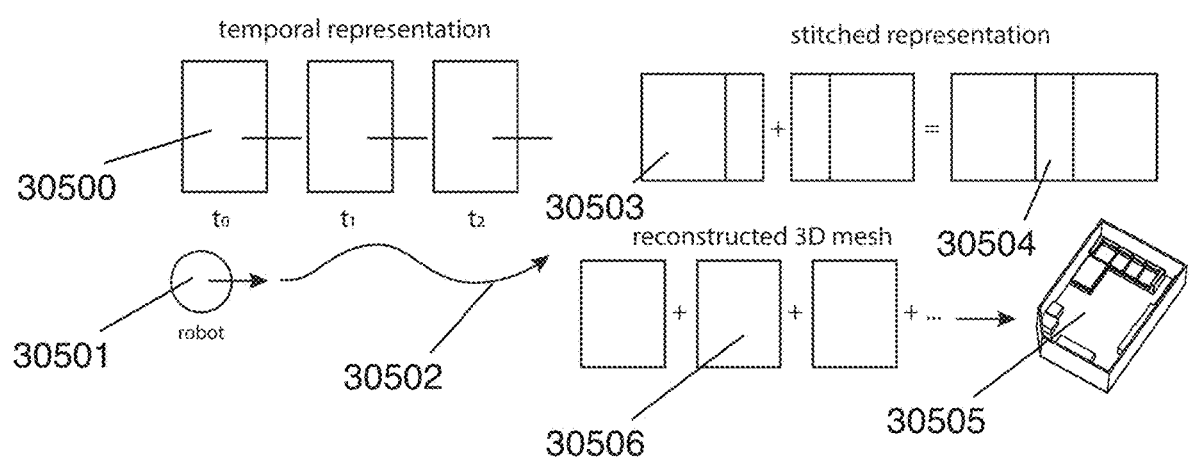
FIG. 106 illustrates examples of various representations of an environment.

In different embodiments, the environment is represented in various forms. FIG. 106 illustrates various representations of the environment, including temporal representation of the environment, wherein images 30500 are captured at time steps as the robot 30501 moves along a path 30502; a stitched representation of the environment wherein data 30503 of the environment is stitched together at overlapping points 30504; and a 3D mesh of the environment 30505 reconstructed from images 30506. Other representations of the environment may include temporal on grid representation; an immersive representation viewed from within VR or viewed on a flat screen or a web page; a 2D top view representation; a representation synthesized from point cloud and textured with semantic features; a representation texturized from images; and 2D top view representation with floors and walls textured.

Figure 108:
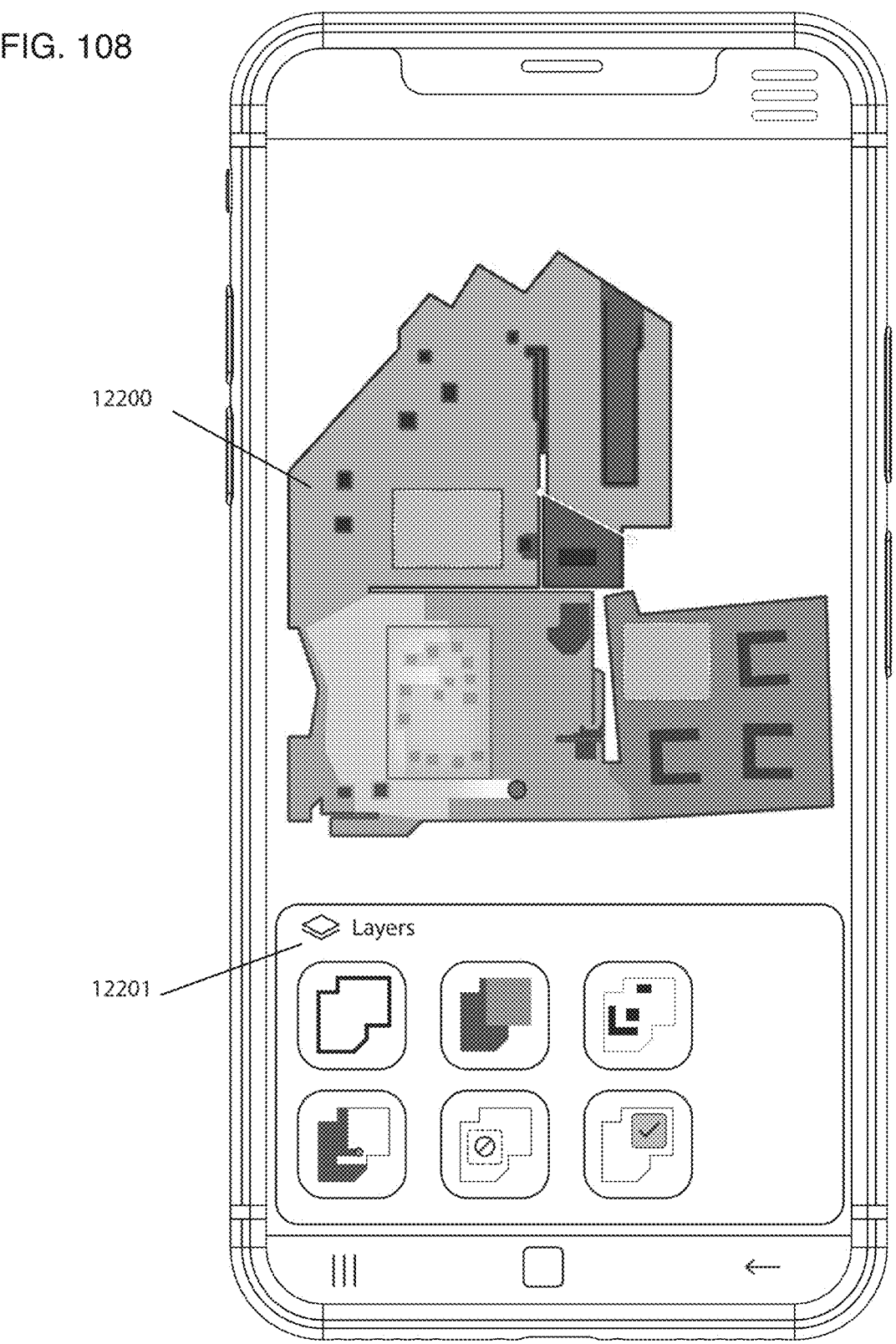
FIGS. 108-111 illustrate examples of a user interface of an application used to select layers.
Figure 109:
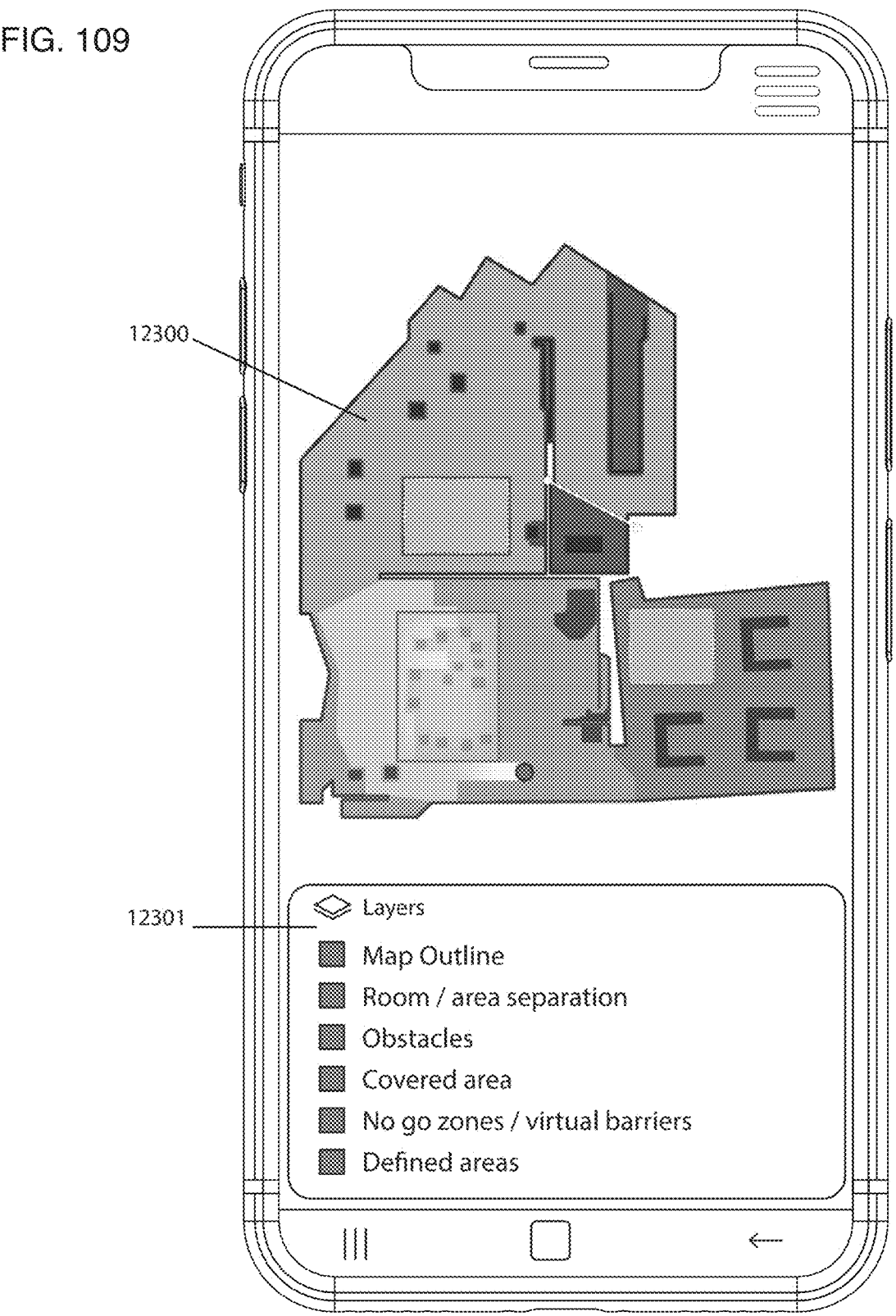
Figure 110:
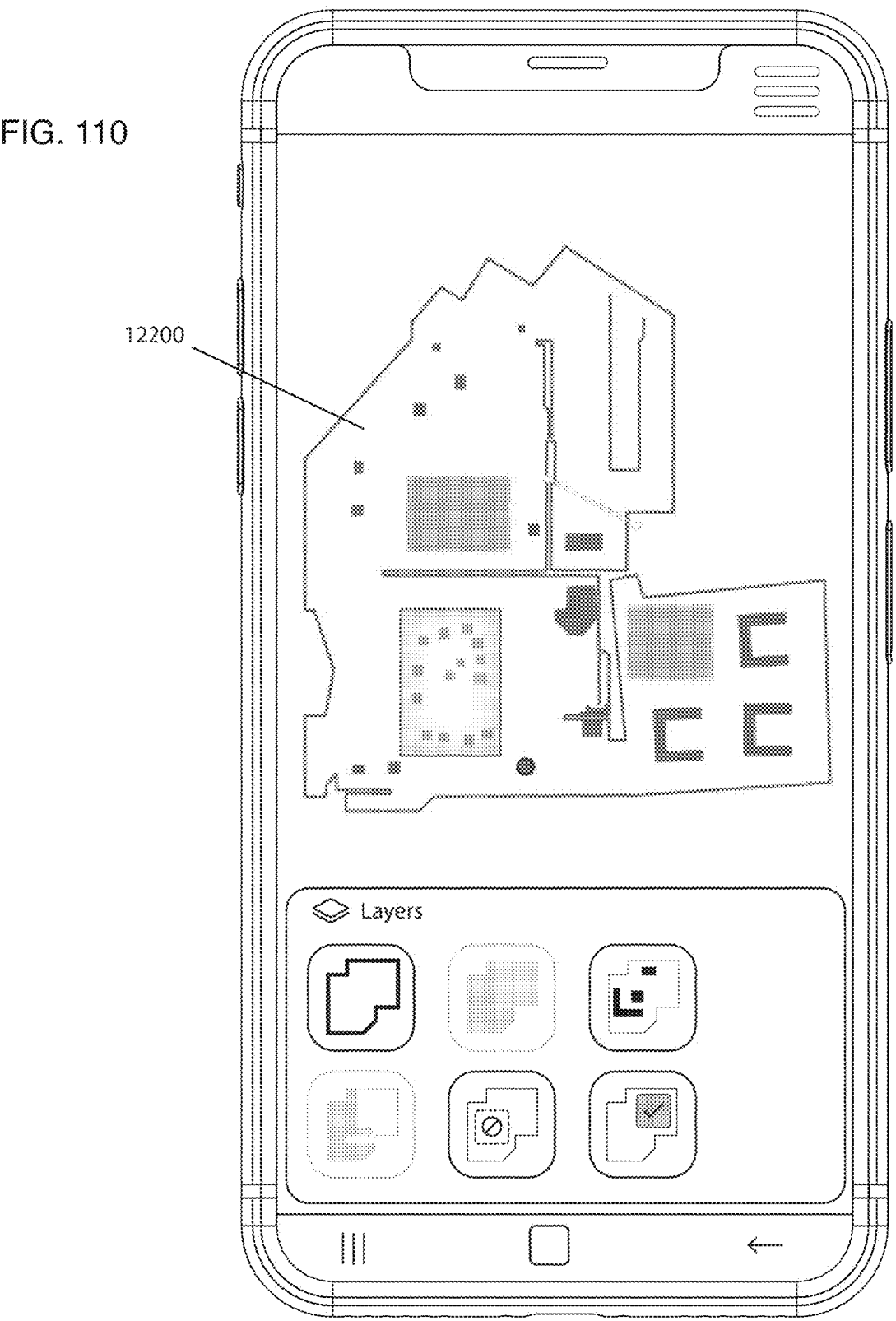
Figure 111:
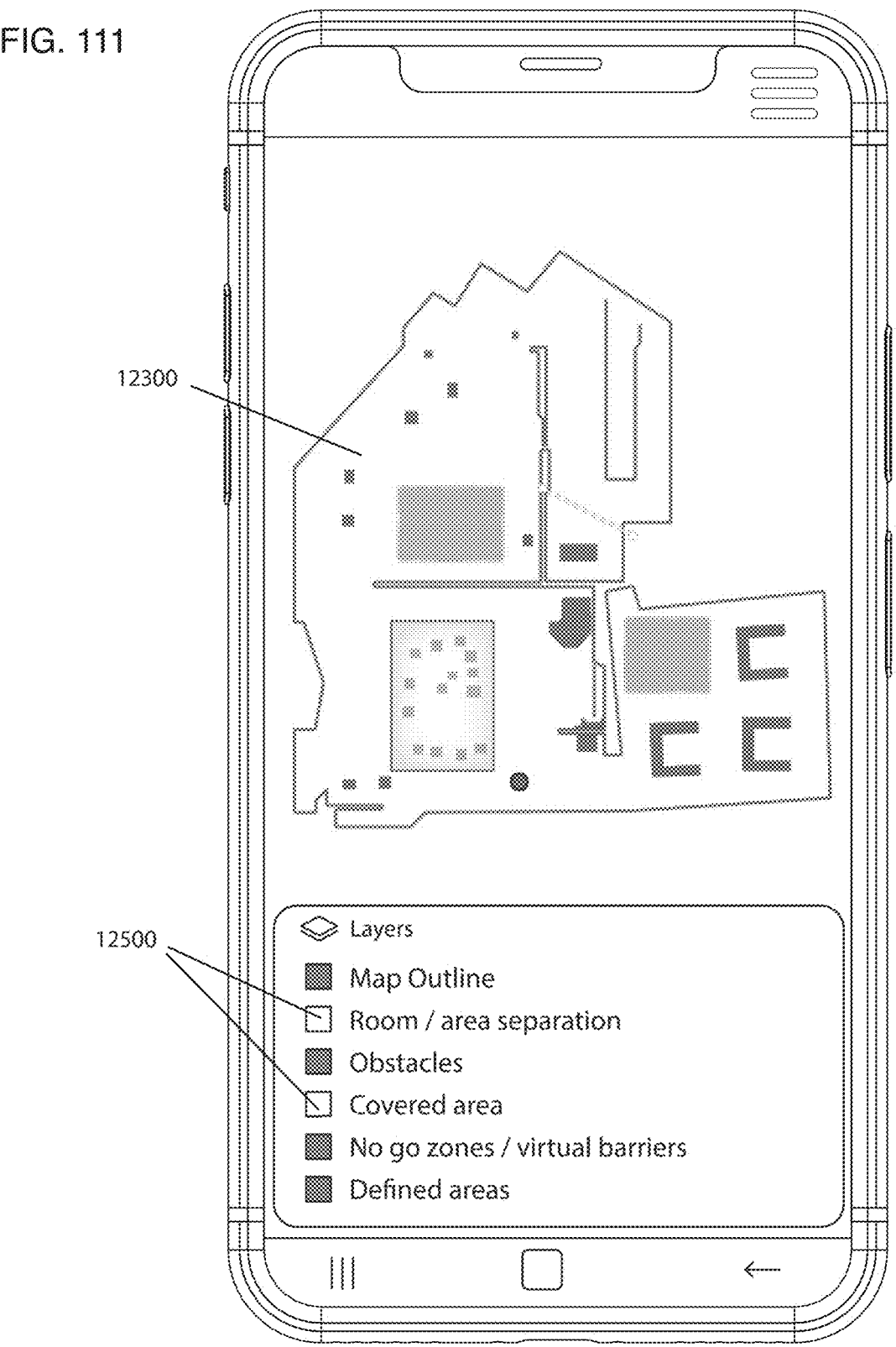
Figure 112:
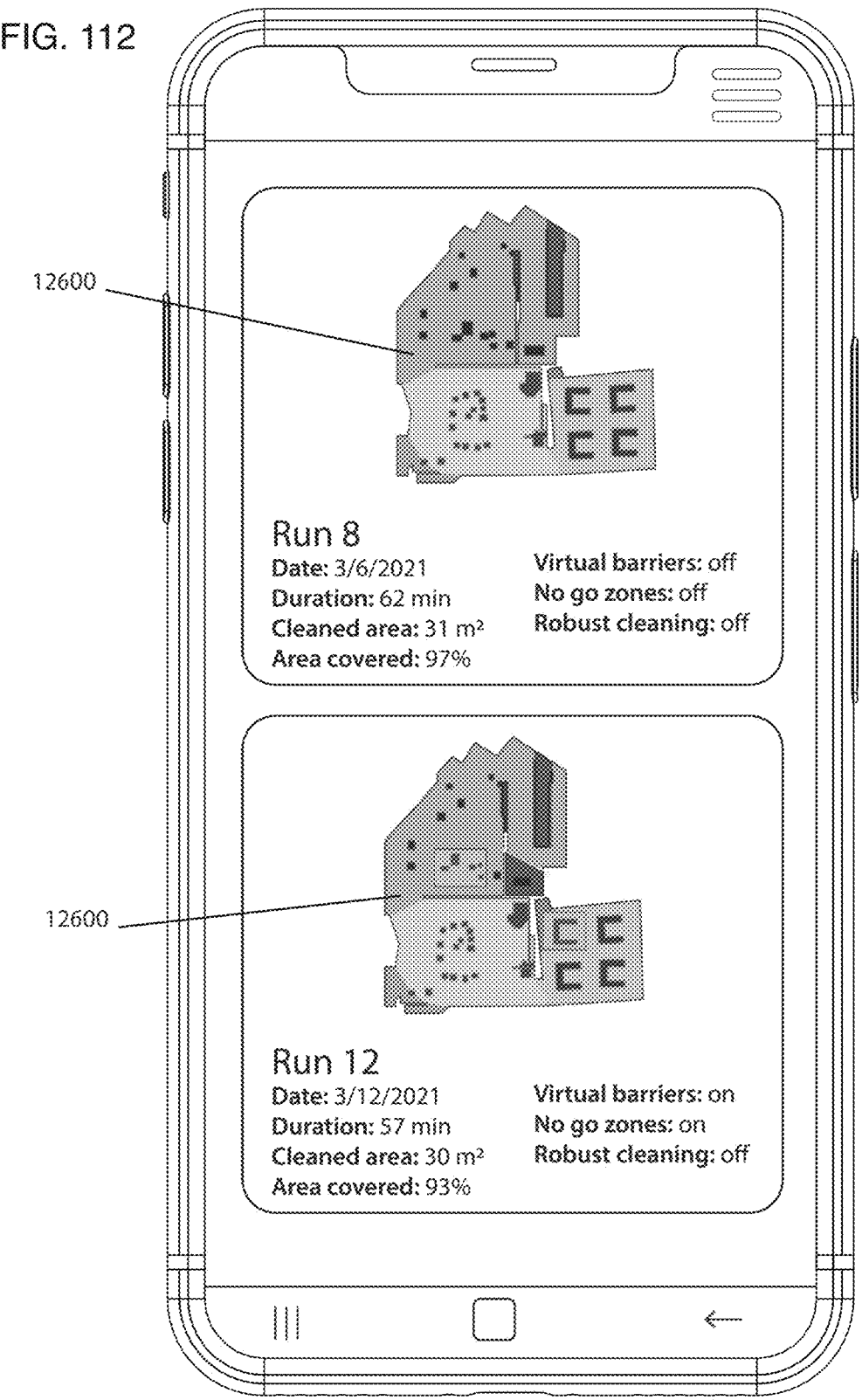
FIG. 112 illustrates an example of a user interface of an application displaying a comparison of runs.

The map displayed by the application may include several layers. Each layer may include different types of information and the application may be used to turn each layer on or off. Some examples of layers include a base layer comprising architectural elements; a static obstacle layer comprising permanent obstacles that are not part of the architecture; a dynamic obstacle layer comprising obstacles the robot may have encountered during previous runs that are no longer observed to be present in the area in which they were encountered; a coverage layer comprising areas covered by the robot; a room separation layer comprising all rooms, each displayed in a different color or pattern and the name of each room and other room-related information displayed; a barrier layer comprising no-go zones and virtual barriers defined by the user using the application; a defined space layer comprising areas within which the robot is to perform certain tasks defined by the user using the application (e.g., areas a robot cleaner is to mop and/or vacuum or robustly clean). In some cases, there may be several layers, each layer defining areas for different tasks. Other layers include a current location layer that highlights the robot in its current location. Other related items such as the charging station may be placed in this layer or in a separate layer. Depending on the function of the robot, additional layers with specific information may be added onto the map. For example, a survey robot may have elevation data of a covered field, the information of which may be displayed in a separate layer. Or the survey robot may have captured several pictures during its run from different spots, the spots being highlighted in a hot spot layer on the map. The application may provide a link to images associated with the spot from which they were captured upon the user touching the spot displayed on the screen. In another example, a robot tasked with covering an area may add a layer that visualizes a difficulty of coverage of different areas onto the map based on previous data of an amount of coverage time spent by the robot in different areas of the map. In embodiments, layers may be live layers, wherein they depend on sensor data currently obtained and may therefore change in real-time. Layers may also include interactive properties. For example, the user may use the application to modify virtual walls and no-go zones in a barrier layer or select a point in a hot spot layer to cause the application to display the image captured from the selected point. FIG. 107 illustrates examples of different layers including (A) a base layer comprising an outline of a map, (B) a room/area separation layer; (C) an obstacle layer, (D) a covered area layer, (E) a no-go zone/ virtual barrier layer, (F) a defined area layer, (G) a combination of layers (A) to (F). FIG. 108 illustrates an example of the application user interface displaying the map 12200 with a combination of layers (A) to (F). Each layer is identified with an icon 12202 that may be used to toggle each layer on or off. FIG. 109 illustrates another example of the application user interface displaying the map 12300 with a combination of layers (A) to (F). Each layer is identified by a layer label 12301. The application may be used to toggle each layer on or off. FIG. 110 illustrates the same user interface as FIG. 108, however in this case, some layers, namely unselected room separation and covered area layers, are toggled off, as shown in the displayed map 12200. Unselected layer icons appear in lighter color, grey or monochrome, while selected layer icons appear darker with more contrast and/or in full color. FIG. 111 illustrates the same user interface as FIG. 109, however in this case, some layers, namely unselected room separation and covered area layers, are toggled off as indicated by the unfilled boxes 12500 and as shown in the displayed map 12300. The application may save the map and its additional layers used in different runs and display them upon request. The application may also display a comparison between two or more runs, wherein the map information related to each run are displayed by the application. In some embodiments, the application compares runs internally based on parameters such as speed of coverage, covered areas, number of difficulties during the run, efficiency, etc. and provide and display a score for each run for comparison purposes. FIG. 112 illustrates an example of the application user interface displaying information related to two runs of the robot, each using a same map 12600 but on different dates.

Figure 113:
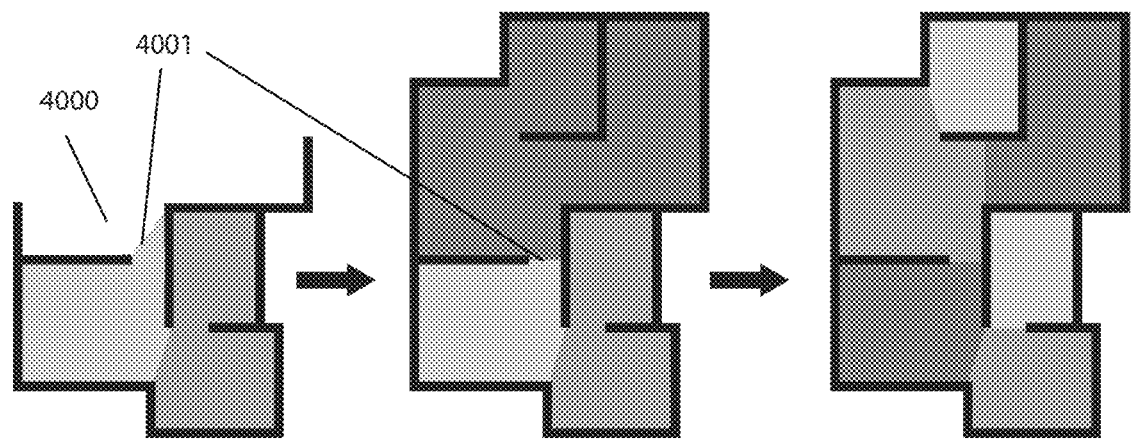
FIGS. 113-117 illustrate examples of adjusting and reallocating room division of a map in real time and using an application.
Figure 114:
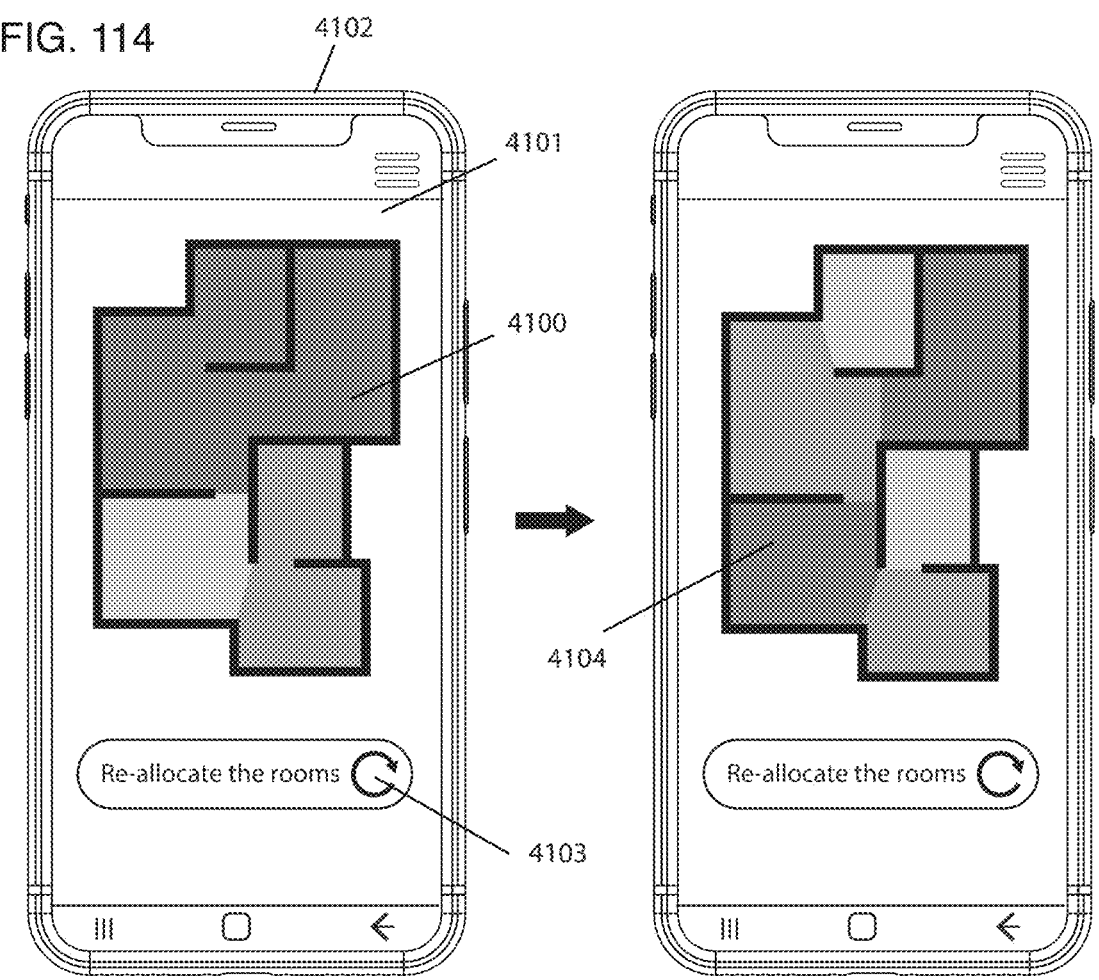
Figure 115:
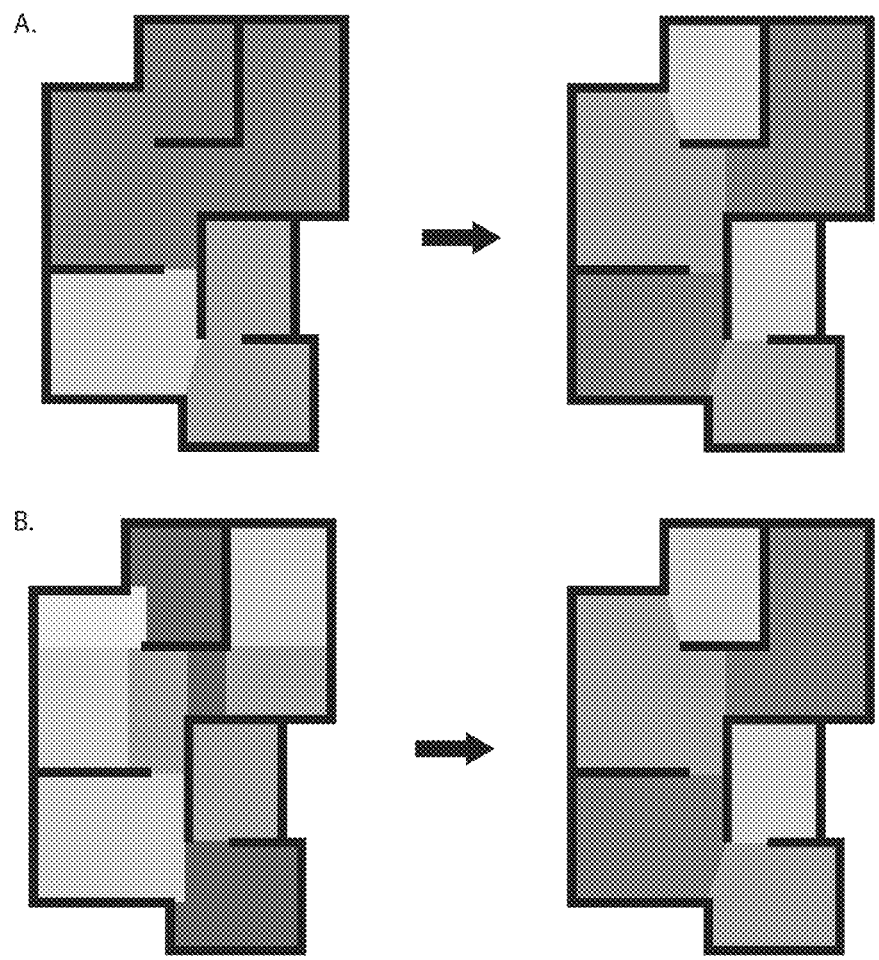
Figure 116:
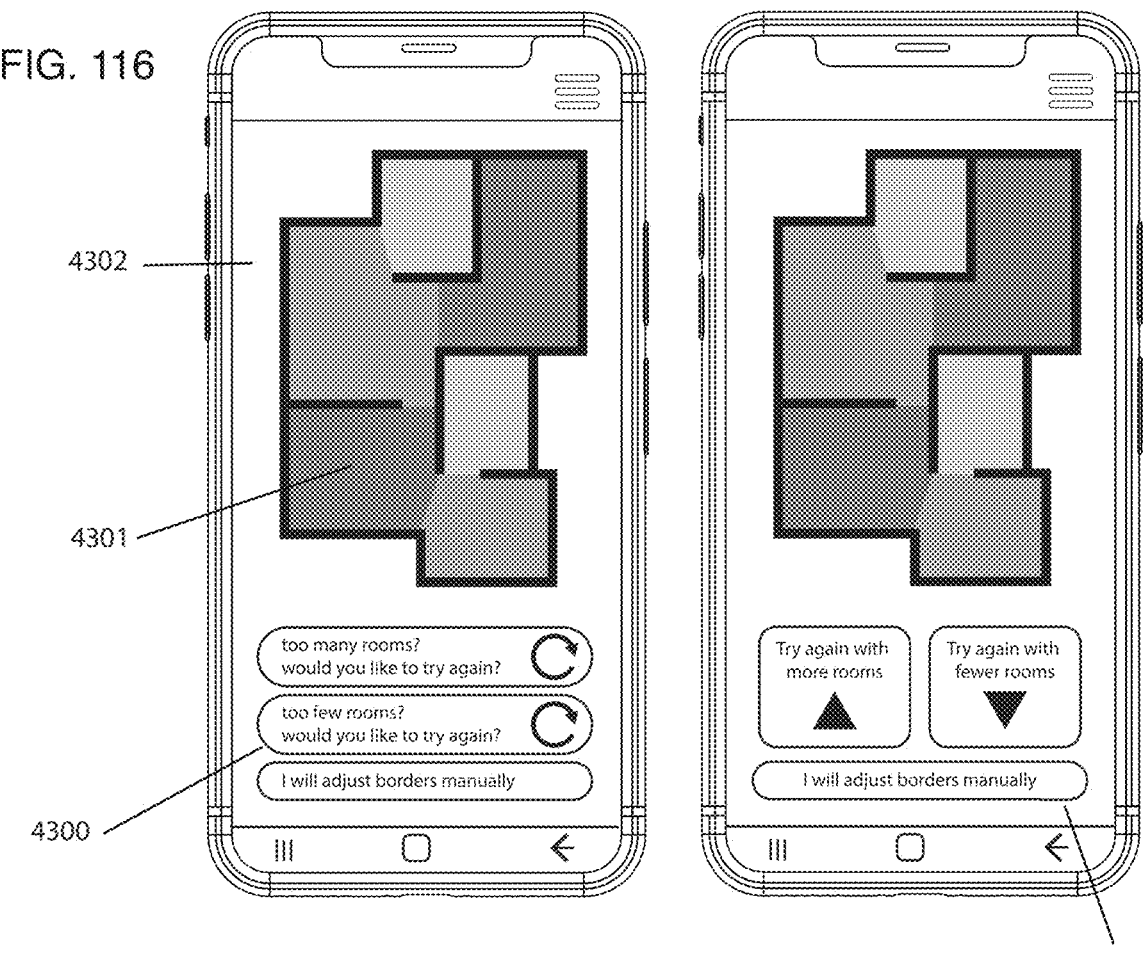
Figure 117:
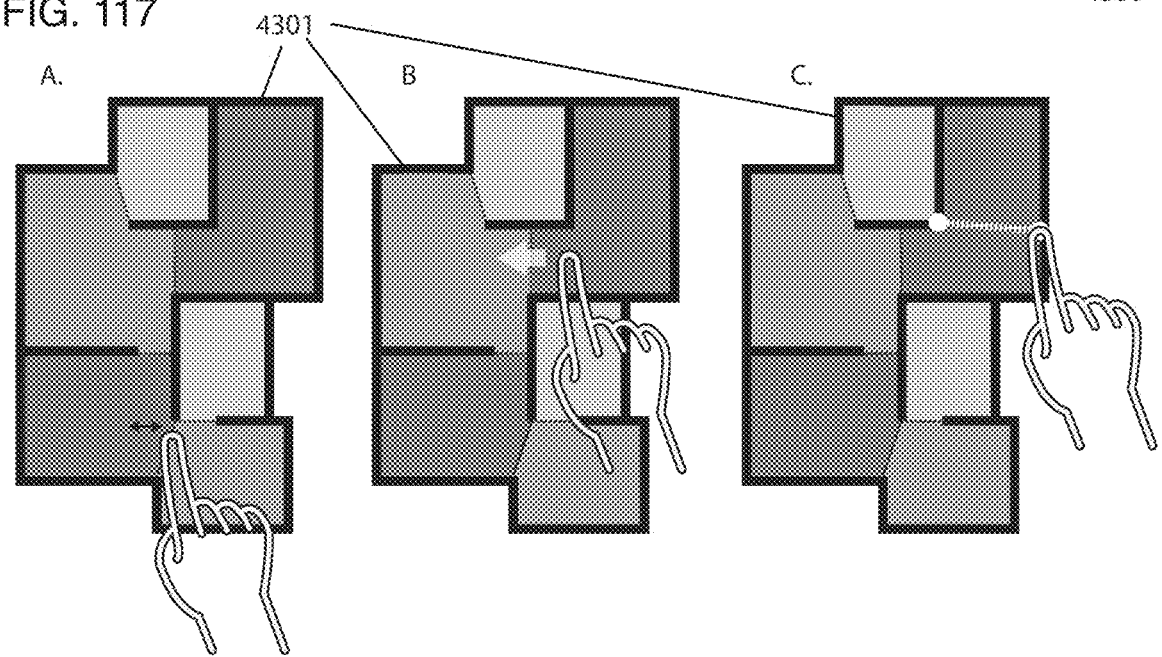

In some embodiments, the processor of the robot generates a map of the environment in real-time. As the robot navigates through the environment, the processor obtains sensor data of the environment from sensors disposed on the robot, maps the environment, and divides the map into separate rooms in real-time. After the first work session, upon observing the entire work area, the processor of the robot obtains a better understanding of the environment and adjusts the room divisions automatically. This is illustrated in FIG. 113, wherein the map 4000 progressively expands to include the entire working area and the dividers 4001 dividing the map 4000 are correspondingly adjusted as a better understanding of the environment is obtained by the processor. In some embodiments, a user may use an application of a communication device paired with the robot to re-allocate the division of rooms. FIG. 114 illustrates a map 4100 with an initial division displayed on an application 4101 of a communication device 4102. A user may use a touch screen to provide an input to re-allocate the rooms by touching icon 4103. As a result, the application determines a new and different layout for room division displayed in map 4104. In some cases, the processor of the robot may choose to adjust the room division based on a number and size of rooms. Two examples (A and B) of an adjustment of room division are illustrated in FIG. 115. If there are too few rooms, the processor may divide the map to include more rooms for better separation (A) or if there are too many rooms, the processor may merge some rooms to generate a better layout (B). In one embodiment, the application may provide an option to re-allocate the rooms such that the room division include more or fewer rooms or to manually re-allocate the rooms, as illustrated in FIG. 116. Icons 4300 may be used re-allocate the rooms in map 4301 displayed by the application 4302 such that the room division include more or fewer rooms or to manually re-allocate the rooms. FIG. 117 illustrates action a user may take in manually dividing the map 4301. The application displays borders of each room that the user may manipulate by dragging (A and B), rotating, and deleting. The user touch and hold their finger on a room for the application to display an option to merge the room with an adjacent room. The user may also draw new lines (C) to split a room into two rooms.

Figure 118:
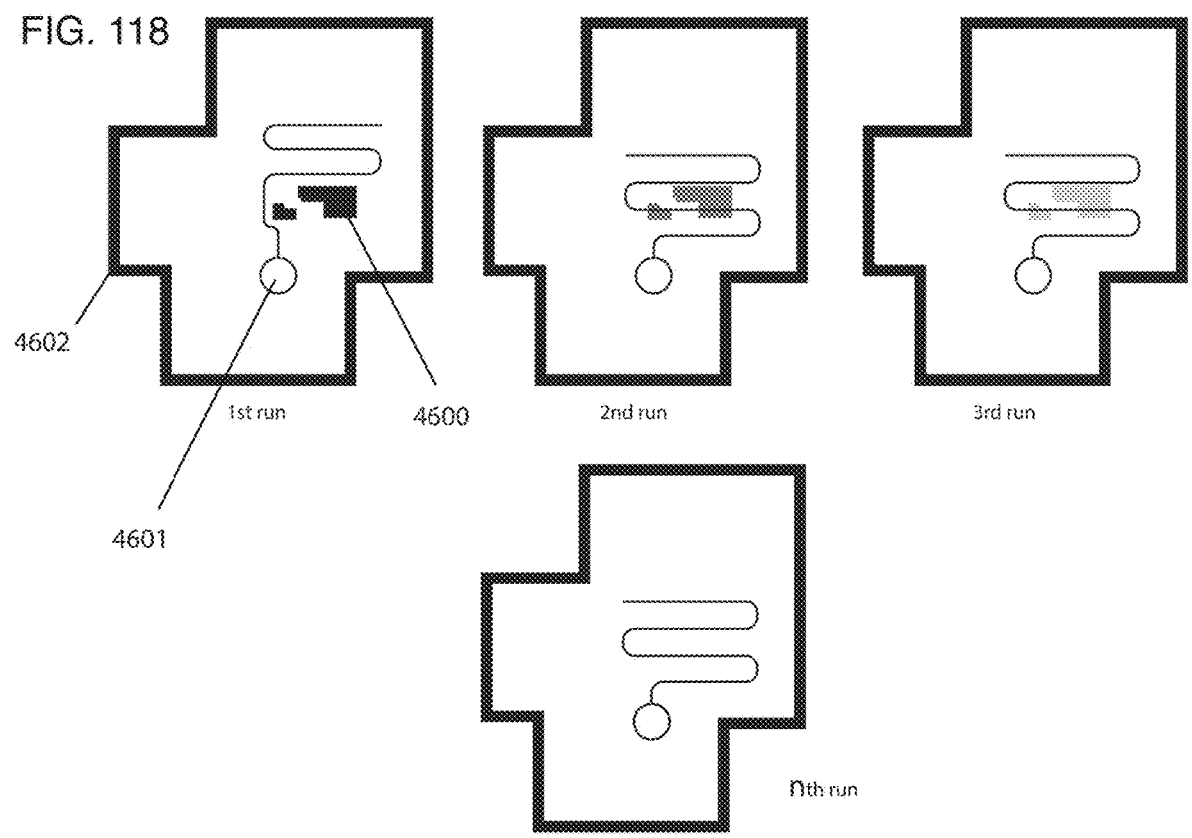
FIG. 118 illustrates an example relating to dynamic obstacles in a map.

When the robot encounters a temporary obstacle during an initial run, the processor marks the obstacle on the map. This is illustrated in FIG. 118, wherein obstacle 4600 observed by sensors of robot 4601 during a first run is marked in map 4602. When an obstacle is removed during a future run, the robot traverses the area which the obstacle occupied previously despite the processor remembering the area occupied by the obstacle previously, as illustrated for the second run in FIG. 118. As more runs are executed, the processor updates a certainty of a presence of the obstacle on the map. The reduction in color intensity in the third run illustrated in FIG. 118 indicates a reduction in certainty of the presence of the obstacle 4600 as it is not observed again in the third run. After several runs in which the obstacle 4600 is not observed at the same location, the processor removes the obstacle 4600 from the map, shown in the nth run illustrated in FIG. 118.

Figure 119:
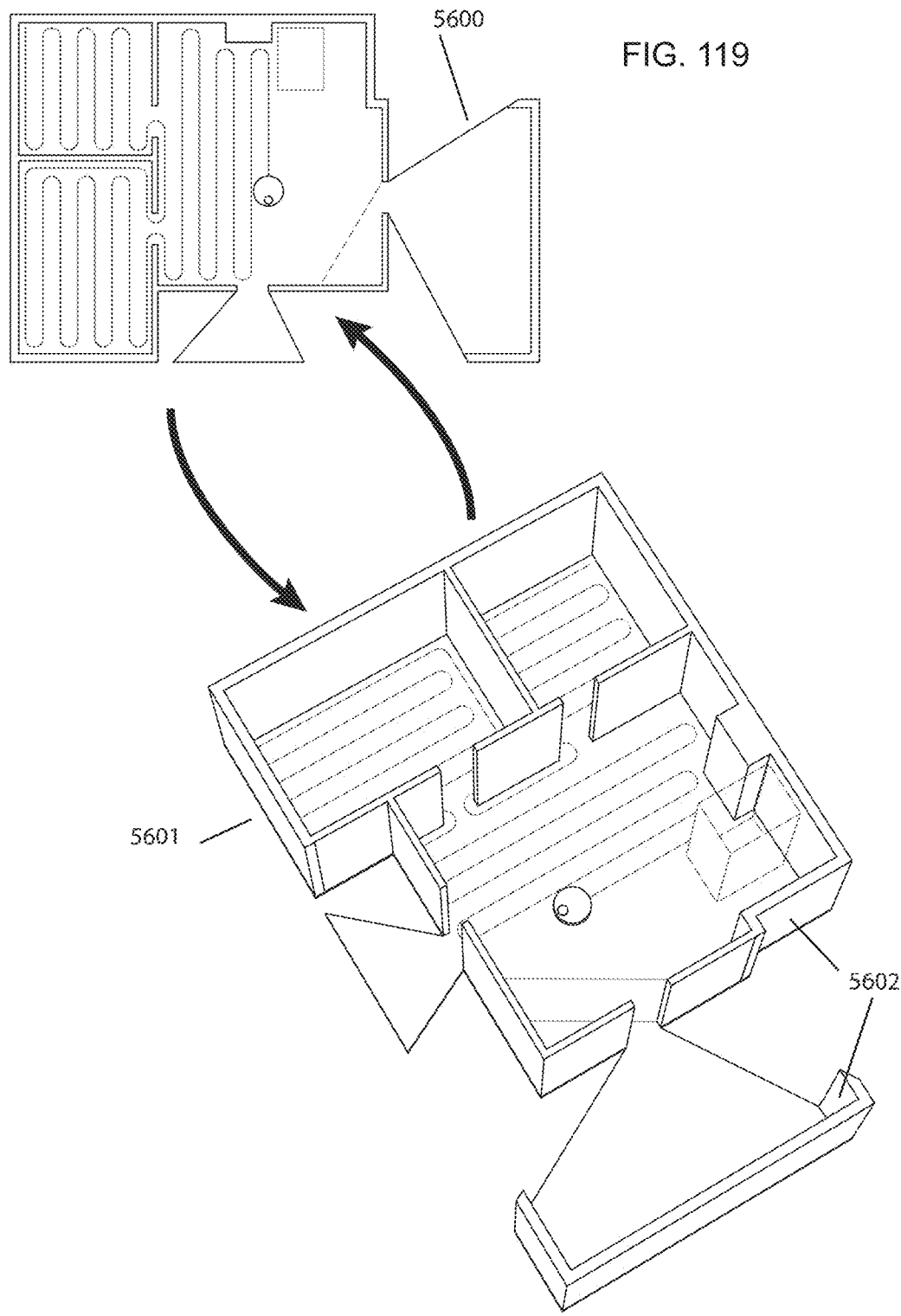
FIG. 119 illustrates an example of a conversion of a partial 2D map into a 3D map.
Figure 120:
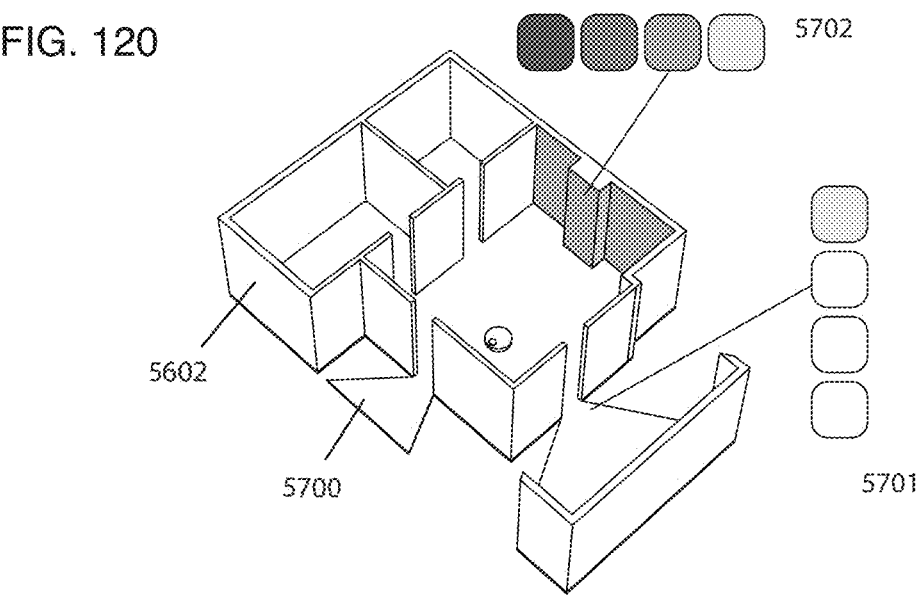
FIGS. 120-122 illustrate examples of modifications and elements added to a map.
Figure 121:
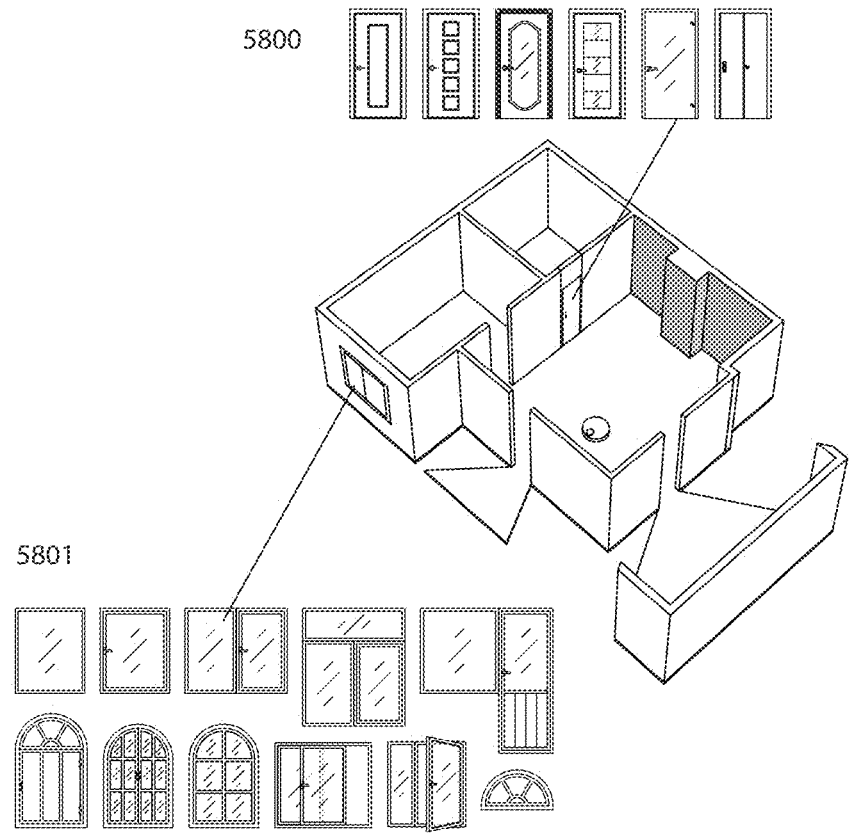

In some embodiments, the processor of the robot (or another external processor) converts the 2D map into a 3D map for better representation of the environment. In embodiments, the 2D map includes different features, the most common feature being the walls of the environment. In some embodiments, the shape of the walls in the 2D map are extruded in a vertical axis corresponding to a direction of a height of the walls to generate the walls in 3D. The extrusion height may be an estimate based on architecture standards or the robot may comprise sensors for measuring floor-to-ceiling distance or otherwise the height of the walls. For example, FIG. 119 illustrates a conversion of a partial 2D map 5600 into a 3D map model 5601 by extruding the walls 5602 in a direction corresponding with a direction of a height of the walls 5602. Additional data such as areas covered (i.e., robot path), no-go zones, and virtual barriers are converted in the 3D map model as well. The map may be switched from 2D to 3D and vice versa at any time using an application of a communication device (e.g., smart phone, tablet, laptop, desktop computer, smart TV, smart watch, etc.) paired with the robot. Another feature of the 2D map includes a floor. In some embodiments, the processor of the robot may separate the floor from the walls as the robot covers the environment. The robot may also be equipped with sensors used in distinguishing hard floors (e.g., hardwood, ceramic, stone, concrete, tiles, etc.) from soft floors (e.g., carpet, rugs, etc.). FIG. 120 illustrates an example of separation of a floor 5700 and the walls 5602. The processor of the robot or a user via the application adds textures 5701 to the floor 5700 to indicate a type of floor (e.g., hardwood, carpet, etc.) and colors 5702 to individual walls to distinguish between characteristics or for aesthetic purposes. Colors may also be applied to floors and textures may also be added to walls. In some cases, the processor translates the floors into planes in the 3D space. In embodiments, the conversion from 2D to 3D happens in real-time while the robot is covering the environment and building the map, wherein the partial 2D map is converted into 3D. The processor updates the 3D map as more areas are discovered and mapped. Additional data such as covered areas, no-go zones and virtual barriers may be transferred into the 3D map as well. In some embodiments, the processor decimates or re-tessellates the 3D map to form a cleaner and more representable map while using less memory. In addition, the processor may clean the shapes of the floor and the walls in the 2D map before extrusion or conversion into the 3D map. This provides a cleaner map with less vertices that require less memory and are faster to render and easier to generate texture coordinates for. A location of architectural elements such as doors, windows, stairs and vanities are another feature that the processor may extract from the 2D map and include in the 3D map. FIG. 121 illustrates architectural elements such as doors 5800 and windows 5801 positioned within the 3D map model by the application in places recognized by the processor of the robot. In some embodiments, the application is used to choose a different architectural element that is more suitable to the real-life equivalent than the architectural element autonomously chosen by the application. In some embodiments, the processor may use generic models of architectural elements comprising parameters such as width and height in placing them as schematics in a location within the generated 3D model. A similar approach may be used for other elements such as furniture (e.g., sofas, chairs, tables, beds, etc.), wherein generic and simplified models of these elements comprising parameters such as element type and size are used in placing them within the 3D space.

Figure 122:
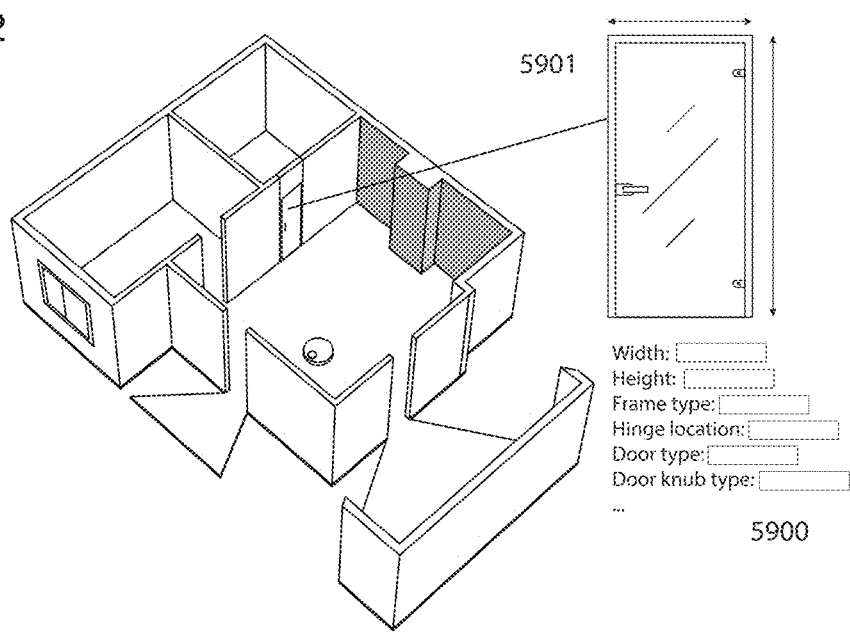

In embodiments, the user may have the option to customize different aspects of the generated map model using, for example, the application of the communication device paired with the robot. For example, the user may change a color or texture of the walls and the floors to better match the model with the real environment. In another example, the user may change a type of door, window, other architectural elements, and furniture. The process of customization may be implemented in two ways. In one instance, customization of the map model is implemented by changing parameters of the map model. These parameters may include, for example, size, width, length and height, color, etc. of an element. For example, FIG. 122 illustrates an example of using the application to customize parameters 5900 of a door 5901. In some cases, adjustable parameters are specific to the model or an element. For example, adjustable parameters of a door may also include a way a door opens or a hinge location of the door, inclusion of panels or a number of panels on the door, a single pane or double pane door, etc. In another example, adjustable parameters of a stair system may include a number of stairs, a depth and a height of the stairs (changing one of these parameters may change the other two), a type of the stair system (e.g., straight, L shape, C shape, spiral, etc.), a type of a hand rail, etc. In another instance, customization of the map model is implemented by changing the map model itself. For example, the processor may guess an incorrect type of a furniture piece (e.g., mapping a sofa instead of a bed) and the user corrects the type of the furniture mapped in the 3D scene. In another example, the user accesses a catalogue or a library of possible element types of various elements (e.g., architectural and furniture). This helps in customization in comparison to using generic models. In some cases, the robot may be equipped with more sophisticated sensors such as image sensors and the processor may process the sensor data to recognizes a type of the furniture or other elements within the environment by automatically searching the library for the specified element with features closest to the element observed.

In some embodiments, assets such as libraries and catalogues are stored on a server and/or on the cloud and are downloaded upon request. A thumbnail image or video may be displayed by the application to represent the asset and upon selection, the asset is downloaded and directly imported to the 3D scene. Another type of asset that may be used in customizing the map model comprises various looks with different color schemes, materials, and textures. For example, the user may choose a particular look for one of the walls within the map model, such as brick. The asset may include a variety of brick wall patterns that the user may choose from. Upon selecting the desired pattern, a brick shader comprising a series of textures is applied to the wall. The textures control different aspects of the look of the wall. Common textures include diffuse comprising color data of the texture without any lighting data; specular or roughness which determine how each part of the texture reacts to the light; and bumps which fakes minor bumps on a surface so it appears more 3D. Bumps may be implemented using a simple grayscale map that affects a local height of any given point on the surface. Or the bumps may be implemented using a RGB map (known as a normal map) that maps the (R, G, B) values of the texture to the normal vector (X, Y, Z) of a corresponding point on the surface. Each point with a different normal vector act differently upon receiving light, mimicking a case where the bumps are placed on the surface at different angles. Other textures include displacement which displace the surface points based on a value of the texture (this is most accurate, however is process intensive); opacity or transparency which determines how light passes through or reflects from the surface; and self-illumination which determines whether the surface is illuminating or not, affecting the surface look upon receiving light and other objects casting a shadow on the surface. In embodiments, the implementation of these customizations is processed on the backend, however, the user may have some control over the scale and orientation of the textures. In another example, the user chooses a specific color for an element, such as the wall. The user may choose the color from a provided color wheel, however not all the colors of the color wheel are available in paint form, or may choose the color from color catalogues/libraries. These libraries may be provided by paint companies with their specific codes. This way the user is sure the color chosen can be replicated in real life.

Figure 123:
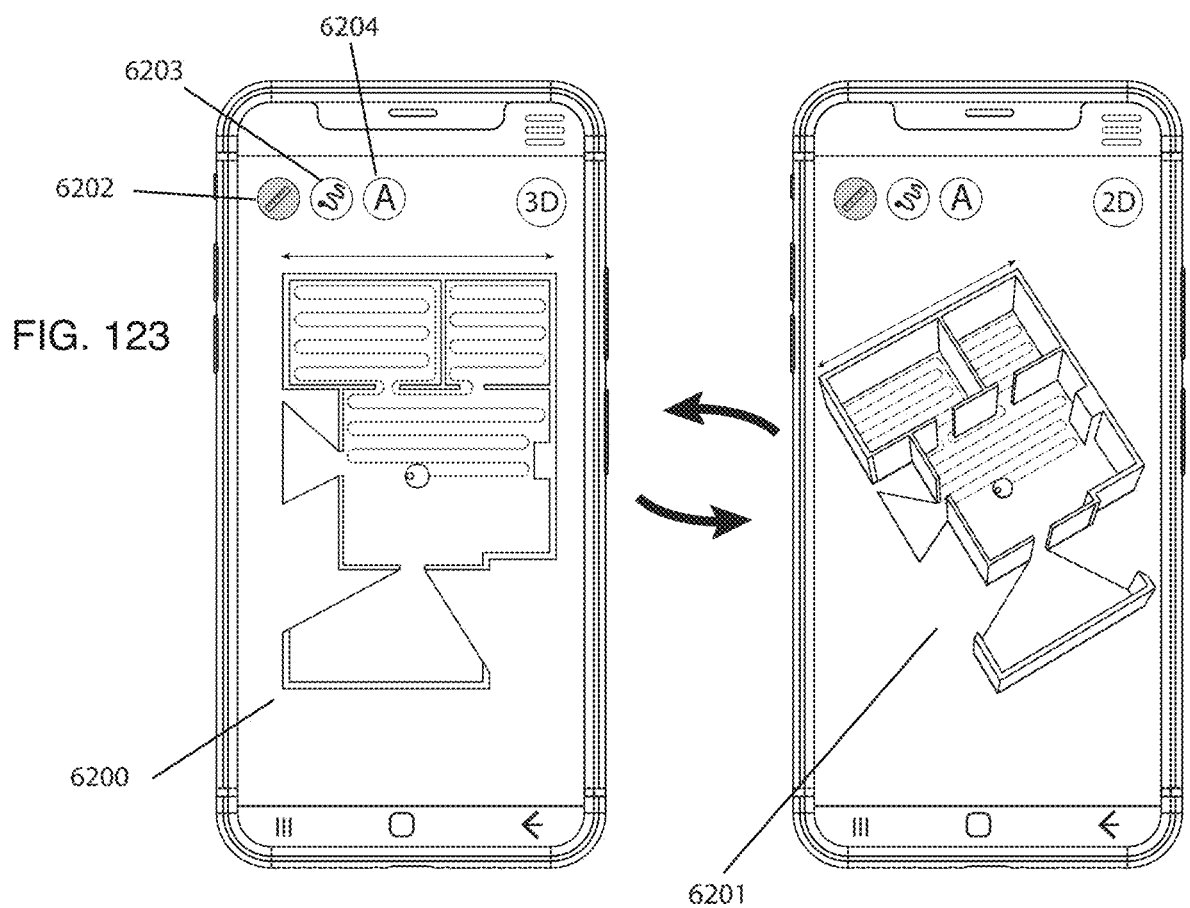
Figure 126:
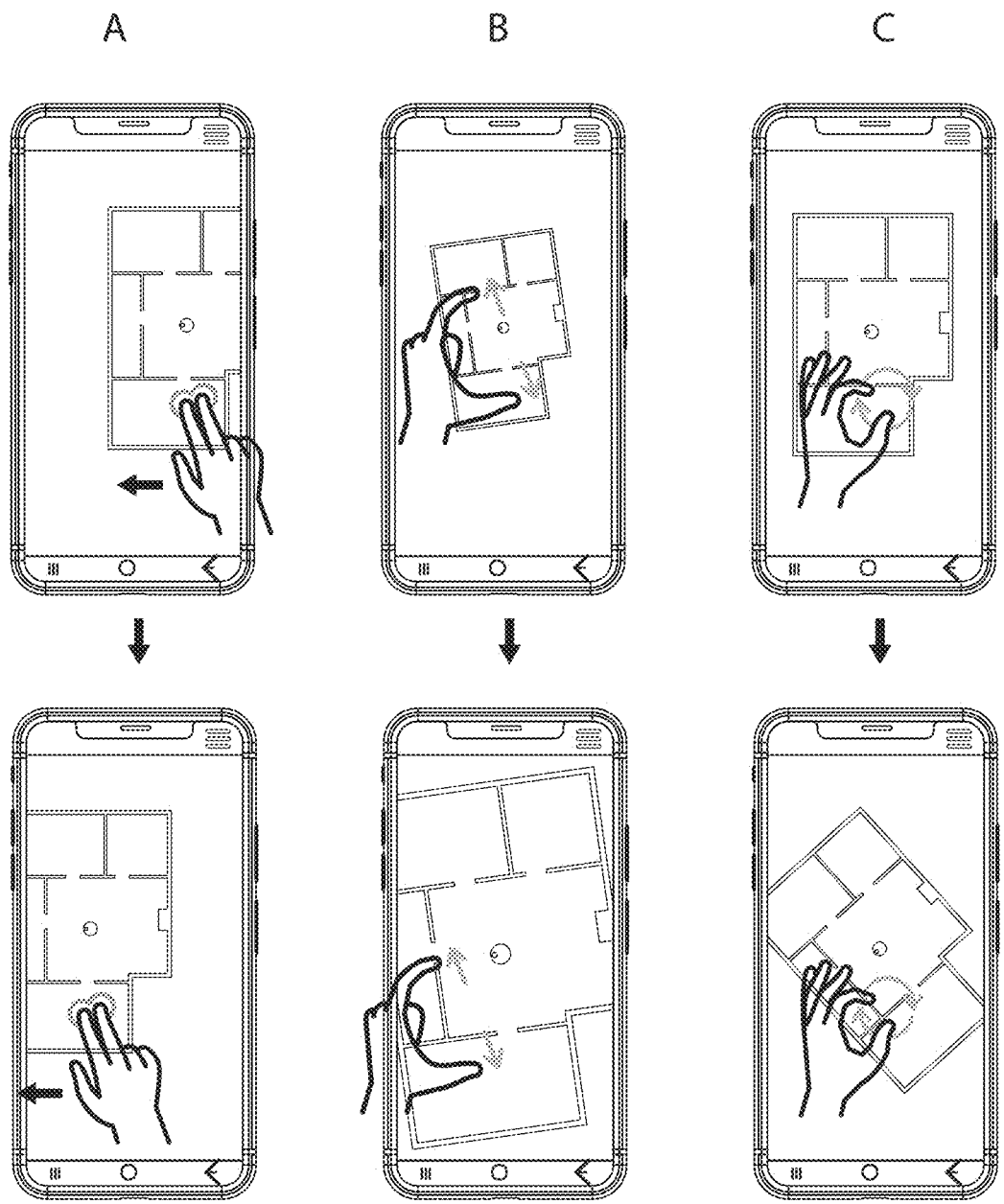
FIGS. 126-128 illustrate examples of navigation in 2D and 3D viewports.
Figure 127:
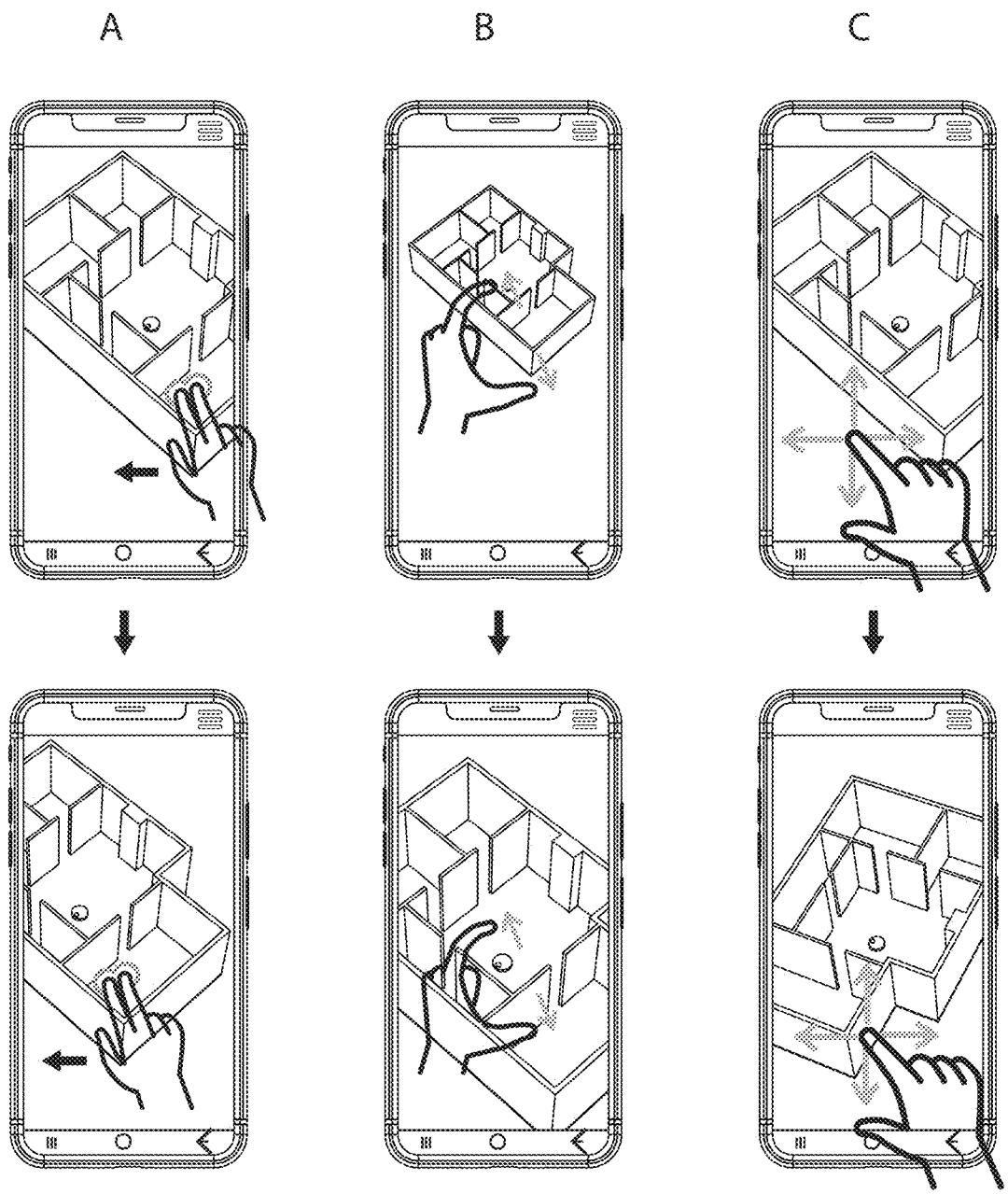
Figure 128:
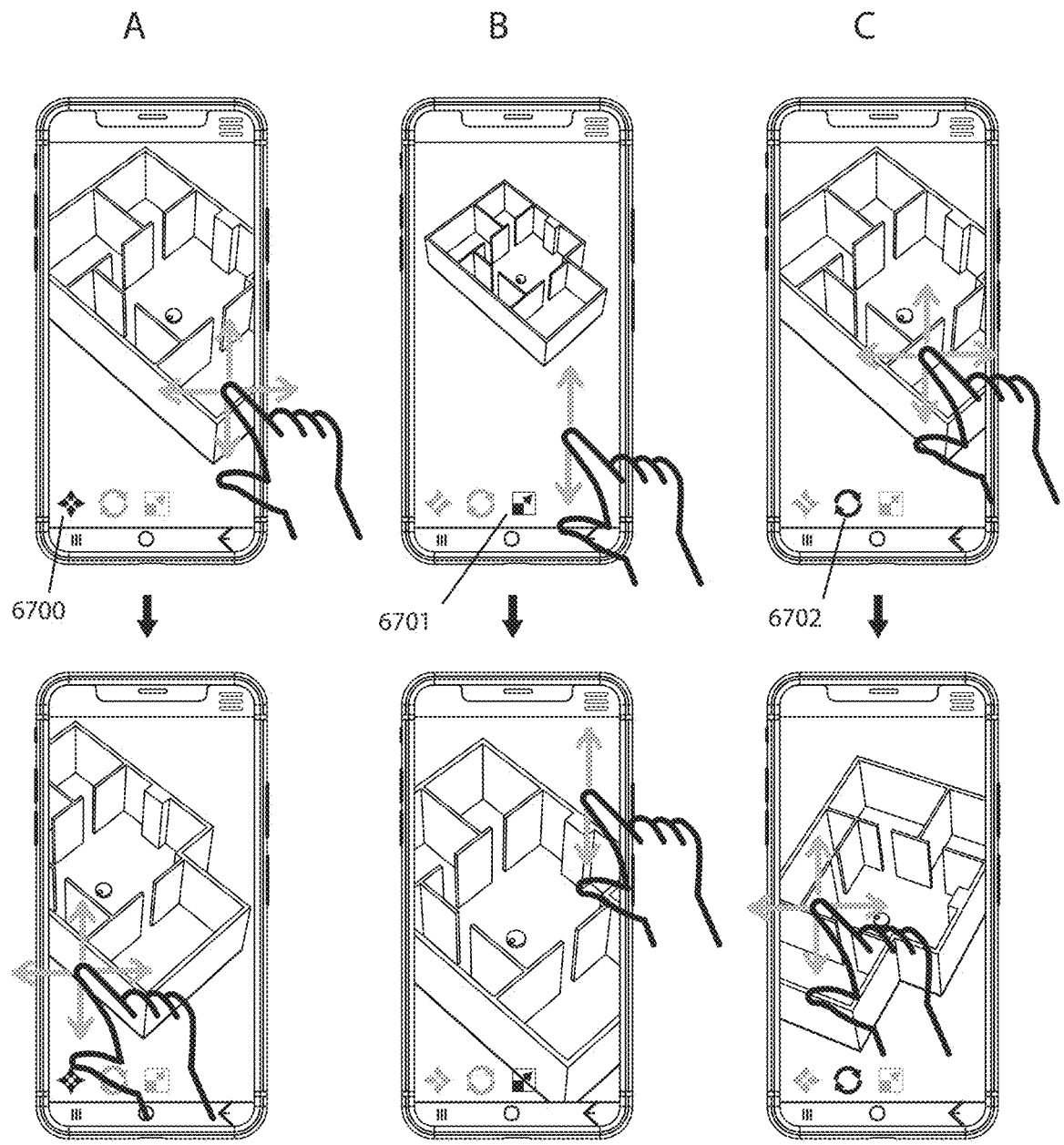

In some embodiments, it may be easier to adjust the location of assets in the 2D map model rather than the 3D map model when placing the asset into the scene. Therefore, in embodiments, the application comprises an option to switch between the 2D map model and the 3D map model. This feature is also beneficial for other purposes. For example, measuring areas and wall lengths is easier in a 2D top-down view of the map model. In each viewport, 2D and 3D, the application comprises different tools that the user may access. Examples of some useful tools include a measuring tool for measuring lengths of walls, areas of different spaces, angles, etc.; drawing tools (e.g., brushes, color selector, eraser, etc.) for drawing notes and ideas on top of the 2D map model; and an annotation tool for writing points and ideas within the 2D or 3D map model. FIG. 123 illustrates an example of a 2D viewport 6200 and 3D viewport 6201 displayed by the application. This application is used to switch between the 2D viewport 6200 and 3D viewport 6201. The application also includes measuring tool 6202, drawing tool 6203, and annotation tool 6204. FIG. 124 illustrates subtools of the measuring tool 6202 including length measurement tool 6300, area measurement tool 6301, and angle measurement tool 6302. FIG. 125 illustrates subtools of the drawing tool 6203 including brush tool 6400, paint bucket tool 6401, eraser tool 6402, and color selecting tool 6403. Upon selecting the brush tool 6400, brush sizes 6404 are displayed for selection. In embodiments, each viewport, 2D and 3D, comprises a different set of tools for navigation. For both the 2D and the 3D map model these navigation tools are activated by selecting icons displayed on the screen of the communication device or by using finger gestures. Navigation of the 2D map model in the 2D viewport may include the following navigation modes: panning by dragging two fingers on the screen to pan the map around; zooming by pinching two fingers towards or away from each other on the screen to zoom in or out, respectively; rotating by rotating two fingers on the screen to rotate the map; and reset rotation or refitting the map to the screen by double tapping the screen. FIG. 126 illustrates examples of basic navigation in the 2D viewport displayed by the application, including (A) panning, (B) zooming and (C) rotating. Navigation of the 3D map model in the 3D viewport comprises controlling a virtual camera using the following navigation modes: panning by dragging two fingers on the screen to pan the view towards the left, the right, up or down (in reality a real camera would move in the opposite direction to cause the scene to move in the intended direction); zooming by pinching two fingers towards or away from each other on the screen to zoom in or out, respectively (based on the use case of the map, zooming in or out may translate to moving the virtual camera closer to or further from the scene (known as dolly) or changing the focal lens of the virtual camera to zoom in or out, resulting in a different perspective); rotation about any of the three different axes by dragging a single finger on the screen to rotate the virtual camera around its target point (i.e., the center of viewport). FIG. 127 illustrates examples of basic navigation in the 3D viewport displayed by the application, including (A) panning, (B) zooming, and (C) rotating. In some embodiments, the application includes an orientation icon in the viewport that is used to align the viewport with standard views (e.g., front, back, top, bottom, left, and right views). In some embodiments, gizmos are used to navigate the 3D map model in 3D space. While this method may be less intuitive, the user has more control over navigation. In some embodiments, a specific gizmo appears upon selection of a type of navigation mode. Depending on the type of navigation mode, the gizmo may include different handles that the user may drag on the screen to change the viewport. For example, rotation may be represented by three rings each positioned on one of three perpendicular axes, each ring being selectable by the user for rotating the scene around a specific axis. In one case, there is a fourth ring aligned with the screen and used to rotate the scene around an axis perpendicular to the screen (similar to rolling the camera in real life). Gizmos may also be used to manipulate objects. For example, gizmos may be used to relocate, scale, or rotate objects within the scene which differs from navigating the scene itself. FIG. 128 illustrates an alternative method of navigation in 3D viewport displayed by the application, wherein the type of navigation (A) panning, (B) zooming, and (C) rotating is selected using icons 6700, 6701, and 6702, respectively. Once the specific type of navigation is selected, the user interacts with the touchscreen to perform the particular type of navigation. For example, dragging a finger upwards and downwards or left and right to pan when panning is selected or dragging a finger upwards or downwards to zoom in and out when zoom is selected or dragging two fingers in a circular motion to rotate when rotation is selected. In embodiments, the application is used to export various types of data from the application.

Figure 131:
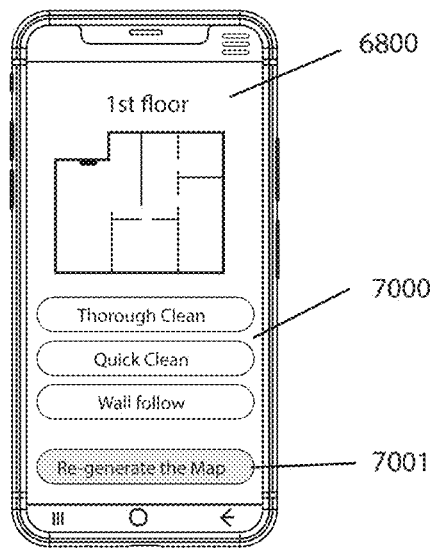
Figure 132:
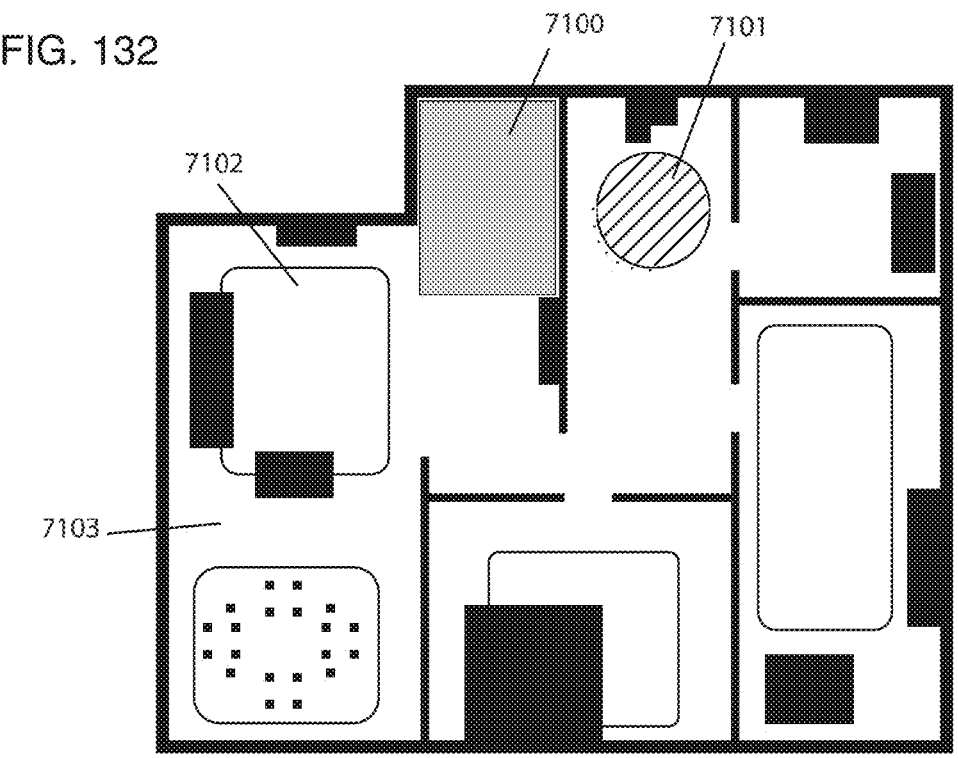
FIG. 132 illustrates variations on displaying floor types within a map.

In some embodiments, a first run of the robot is a map-generating run. In some embodiments, the application displays a request to the user for the first run to be a map generating run, the user providing an input to the application that confirms or rejects the request. In this mode, the robot quickly traverses through the environment to generate the map without performing any other task. FIG. 129 illustrates an application 6800 of a communication device 6801 displaying a path 6802 of the robot during a map generating run and a path 6803 of the robot during a cleaning work session. The path 6802 is a shorter path executed by the robot to observe and generate the map 6804 while the path 6803 is a longer path executed by the robot to cover the area within the map 6804. In some embodiments, the processor of the robot chooses movement patterns that are suitable in identifying architectural elements (e.g., wall follow movement pattern for identifying walls, for example) to build the map faster. When saving the map, the application may save a snapshot of the map for display as a visual aid in a load map section of the application. For example, FIG. 130 illustrates various examples of user interfaces displayed by the application 6800. Available maps may be displayed using a map thumbnail and a corresponding map name as in user interfaces 6900 and 6901, a map thumbnail as in user interface 6902, or a map name as in user interface 6903. Upon choosing a certain map, different work options may be displayed by the application. In some embodiments, the application is used to select a map-generating run at any time, such as in cases where the environment of the existing is changed, to update the existing map. FIG. 131 illustrates different work options 7000 displayed by the application 6800 upon selecting a first-floor map from a list of available maps. The application 6800 also displays an option 7001 to re-generate the selected map, which upon selection actuates the robot to execute a map generating run to generate a new map of the first floor to replace the current map of the first floor. While generating the map, the processor may identify different floor types (e.g., carpet, hardwood, stone, etc.) based on floor sensor data and mark the floor types within the map. In some cases, the application is used to select areas with different floor types for exclusion or inclusion of the areas during execution of a particular task by the robot. The areas with different floor types may be highlighted to indicate that they are selectable in the application. In embodiments, the processor uses floor type data to adjust the performance of the robot. For example, a mopping robot may autonomously lift its mopping module when approaching or driving on a carpeted area. FIG. 132 illustrates an example of different floor types distinguished by different color 7100, pattern 7101, and texture 7102 in a map 7103.

In some embodiments, the processor identifies and labels room. In some embodiments, the application is used to label rooms or change a label of a room or delete a label of a room. The processor of the robot may have access to a database of different environment plans (in similar categories such as residential, commercial, industrial, etc.) to help in identifying and labeling rooms. Using these databases, the processor generates a pattern for a relation between rooms and uses the pattern to predict the rooms more accurately. For example, in a residential plan, there is a low chance of a room being a bedroom when it is adjacent to and has a door connecting to a kitchen and a higher chance of the room being a dining room or a living room.

Figure 133:
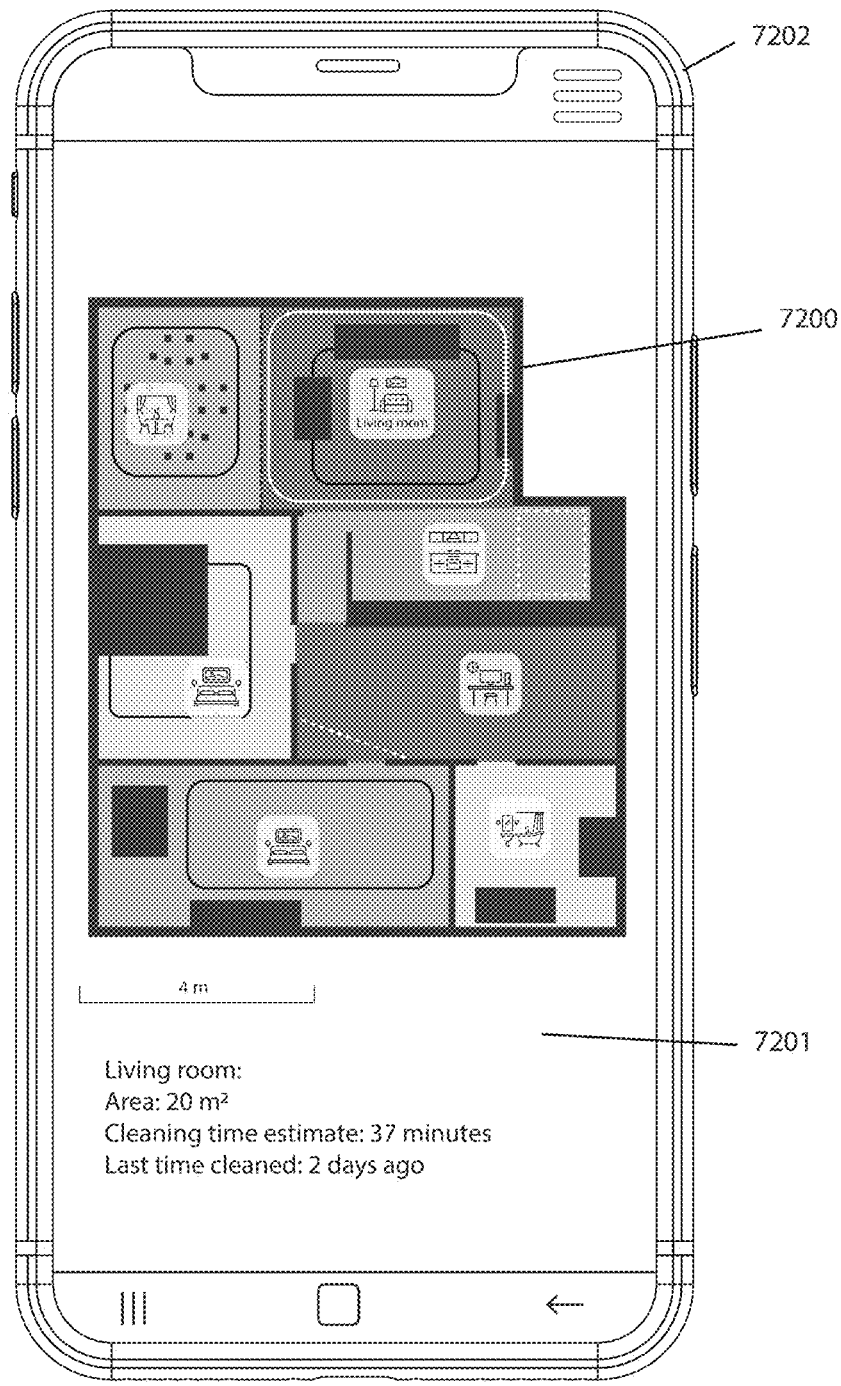
FIG. 133 illustrates examples of overlay elements in the map.
Figure 134:
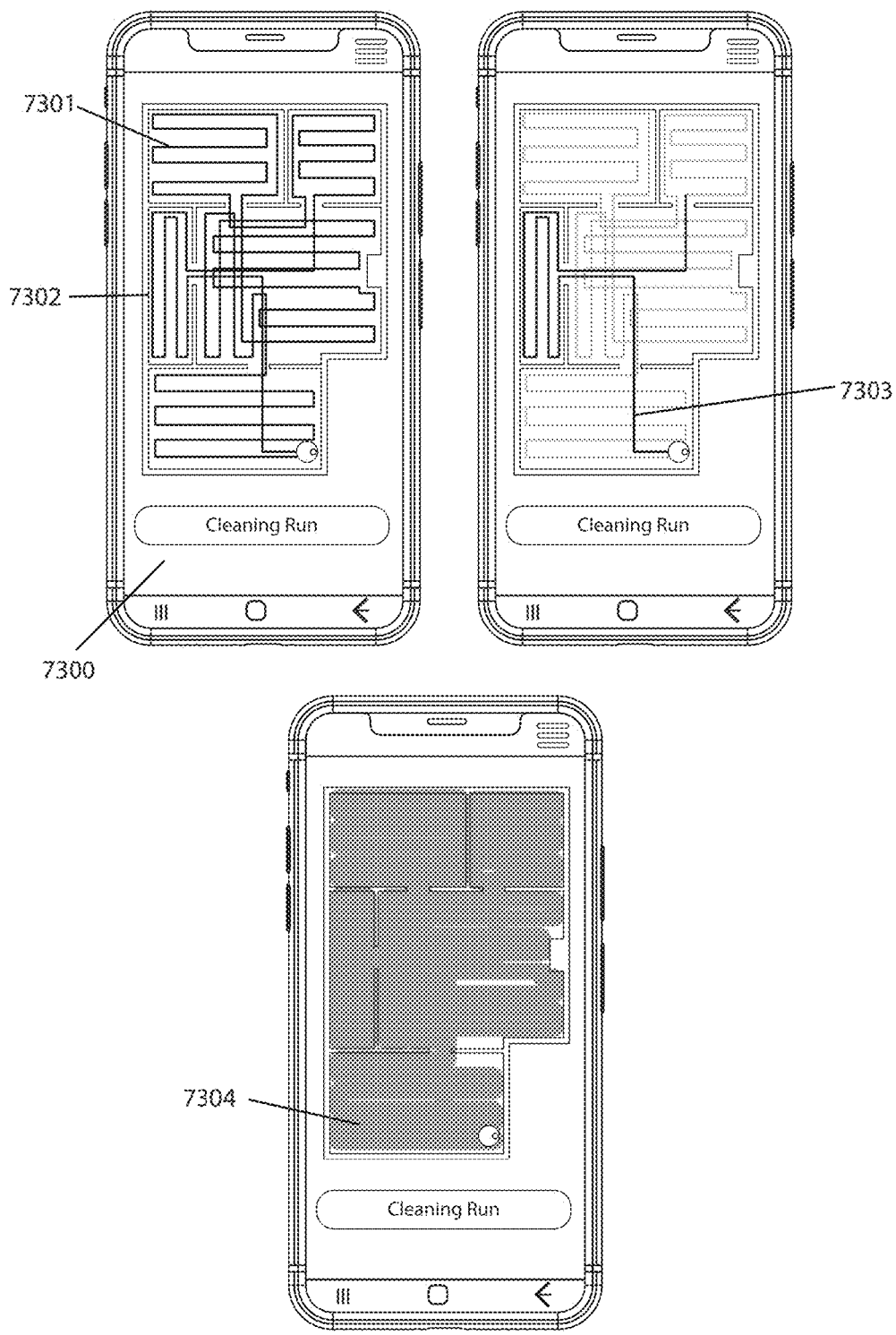
FIG. 134 illustrates variations on displaying a path of a robot within a map.

In some embodiments, the map is divided into separate areas autonomously via the processor of the robot and/or manually via the application. In some embodiments, the application displays the divided map, each separate area being displayed as a different color and/or having a label for the particular area. In some embodiments, different icons are chosen and displayed for each area, the selection of the icon causing additional data related to the particular area to be displayed, thereby avoid cluttering of the map. The icon may be autonomously generated or may be chosen using the application. The additional data displayed may include, for example, a name of the room, a surface area of the room, a last time the robot performed a task in the room, scheduled times for the robot to perform a task in the room, debris accumulation in the room, floor type in the room, obstacle types in the room, obstacle density in the room, human activity levels in the room at different times, etc. In some embodiments, the application displays a scale reference (in feet or meters) with the map such that the user has a rough idea of a size of each room/area. In some embodiments, the processor of the application determines an estimate of an amount of time required to complete coverage of an area based on robot settings and the area, the estimate being displayed by the application. For example, the application may display an estimate of an amount of time to clean a specific area by a robot cleaner. FIG. 133 illustrates a map 7200 displayed by application 7201 executed by communication device 7202. The application displays various overlay elements on the map as well as a scale factor, the selected room, area covered, a cleaning time estimate for finishing cleaning, and a last time the robot cleaned. In some cases, the processor of the robot may mark each area in the map with an actual time spent covering each area, which may be displayed by the application. In some embodiments, the application displays coverage of an area and a path of the robot as the robot covers the area, the moving trajectory of the robot displayed on the map in real-time. In one case, the application displays the path the robot executed on the map. In another case, the application displays an animation of the path, drawing the path on the map as the robot moves over time, thereby replaying the movement of the robot in a session. Since the path of the robot may become too complex of a shape quickly on the map, the application may display a portion of the path (e.g., the last 10 minutes) by autonomously choosing or manually selecting via the application to display a portion of the path generated between two particular timestamps. In some embodiments, the application only displays covered areas instead of the path. In this case, the footprint of robot may be used to inflate the path to show actual covered areas. In embodiments, the application is used to select different display settings of the path and the covered areas described above. FIG. 134 illustrates an application 7300 displaying different display options for a path of the robot including displaying a path 7301 of the robot in a map 7302 as the robot executed the path 7301 in real-time, displaying a most recent portion of a path 7303 executed by the robot, and displaying coverage 7304 of areas within the map 7302.

Figure 135:
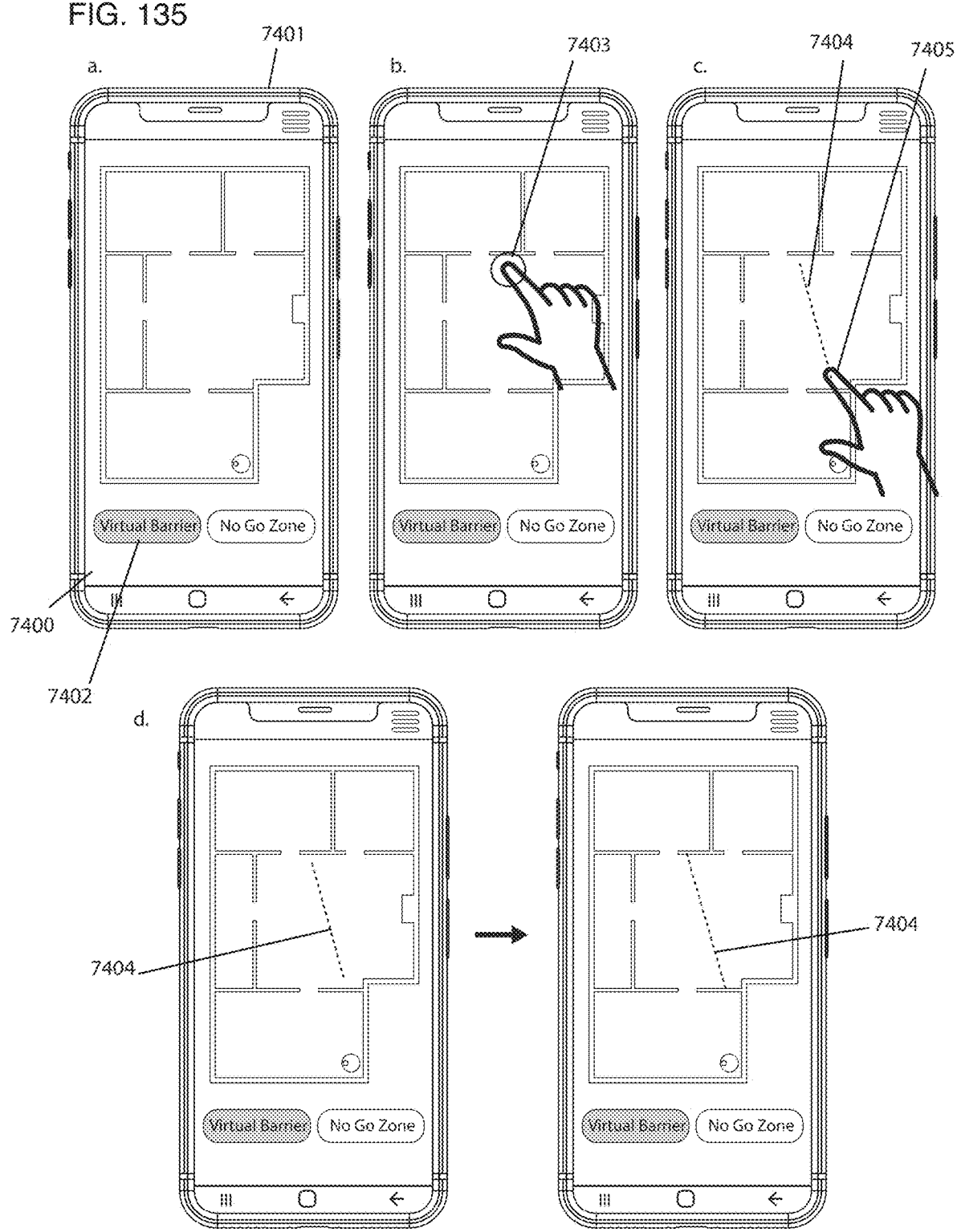
FIGS. 135-137 illustrate examples of methods for placing a virtual barrier within a map.
Figure 136:
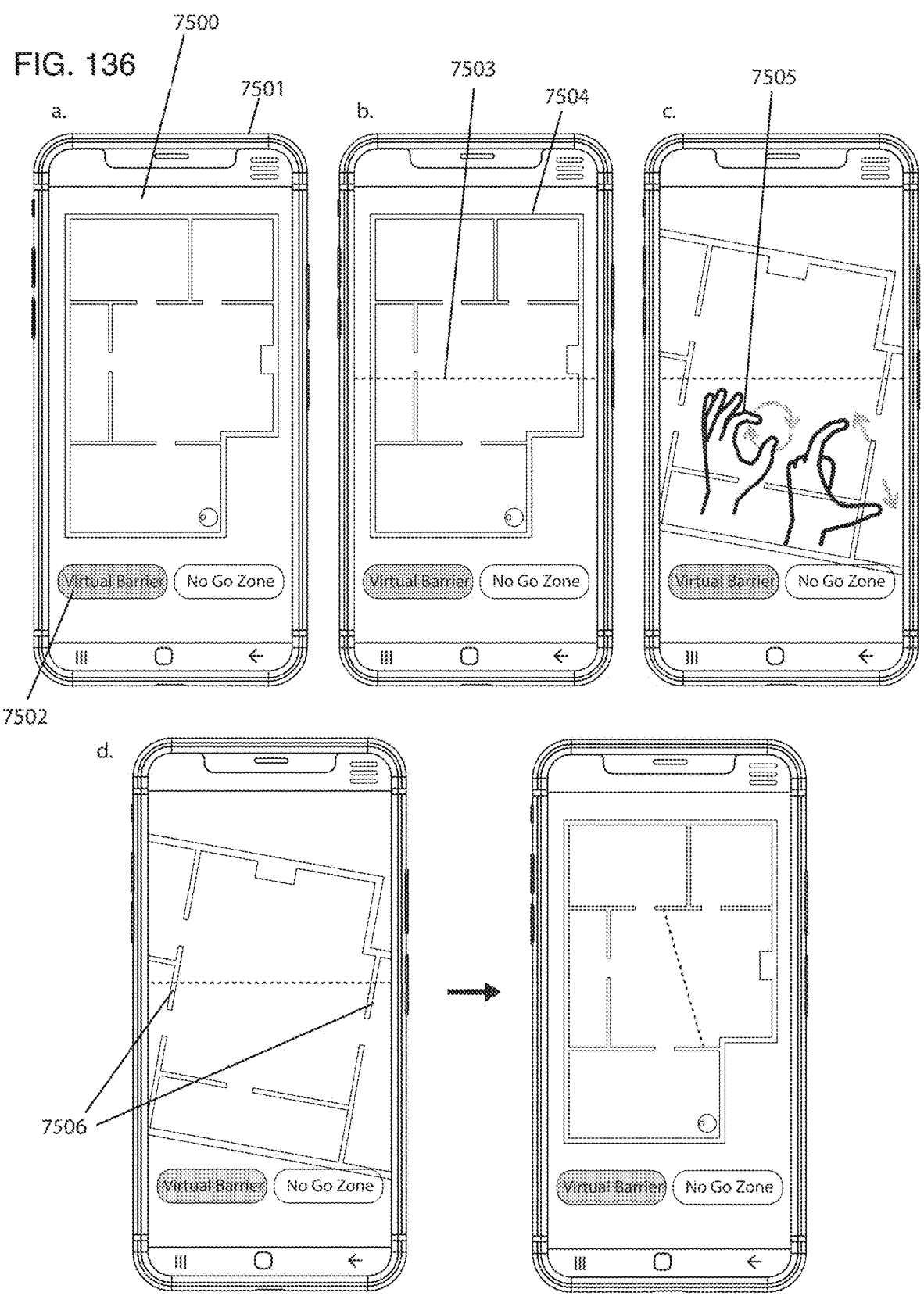
Figure 137:
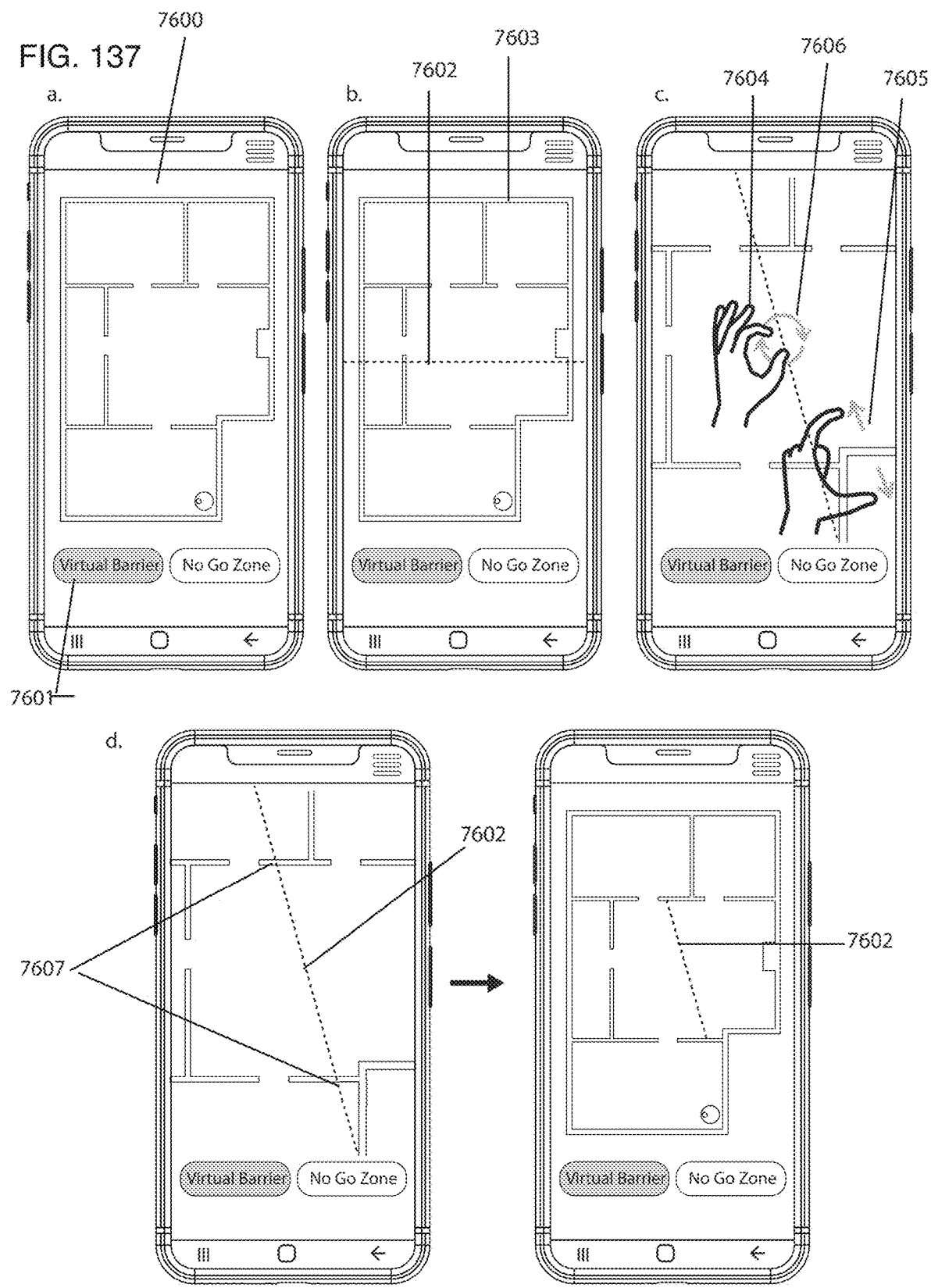

Different approaches may be used in placing and adjusting items, such as virtual barriers, room dividers and no-go zones, within the map using the application. In one approach, the application is used to select the desired item and draw the item. Upon selecting a specific item, the application displays tools that may be used to draw the selected item within the map. For example, a tool for drawing a straight line may be used to insert a room divider. In some cases, the line is extended to a closest wall after the line is drawn in the map. The line may be dragged on the screen at each end to adjust the divider. In this approach, the map location is relatively constant (unless the user chooses to navigate the map) and the user directly customizes the placed item. FIG. 135 illustrates using application 7400 of communication device 7401 to (a) select virtual barrier tool 7402, (b) select a wall 7403 from which a virtual barrier is to begin, and (c) draw the virtual barrier 7404 by dragging a finger 7405 across the screen of the communication device 7401. After drawing the virtual barrier 7404, (d) the application autonomously adjusts and extends the drawn virtual barrier 7404 to the nearest walls. In a second approach, the application is used to select the desired item and the application places the selected item in the middle of the screen. The application is used to navigate the map (using the navigation modes described above) to position the item in the desired position within the map. This approach is more useful on smaller screens such as cellphones as there is more control in placing the item accurately. FIG. 136 illustrates using application 7500 of communication device 7501 to a. select virtual barrier tool 7502 upon which b. a virtual barrier 7503 appears in a middle of a map 7504 displayed by the application 7500 and c. manipulate the map 7504 by dragging fingers 7505 on the screen in different to place the virtual barrier 7503 in the desired position in relation to the map 7504. After placing the virtual barrier 7503, d. the application keeps the segment of the virtual barrier 7503 that is in between the walls 7506 and trims the rest. A third approach is a combination of the first and second approaches. This approach provides the best of the previous two methods in a more intuitive way. For example, upon selecting a room divider, the divider is placed in the middle of the screen. Two-finger rotation on the screen may be used to rotate the divider, while two fingers dragging or pinching on the screen may relocate and zoom the map around the divider to position the divider in the desired location. FIG. 137 illustrates a combination of two previous approaches for placing a virtual barrier. The application 7600 is used to a. select a virtual barrier tool 7601 upon which b. a virtual barrier 7602 appears in the middle of a map 7603 and c. manipulate the map 7603 around the virtual barrier 7602 by dragging fingers 7604 in different directions along the screen to place the virtual barrier 7602 in the desired position in relation to the map 7603. In this case, dragging the fingers 7604 in a pinching gesture 7605 causes zooming in and out of the map while dragging fingers in a circular motion 7606 causes the virtual barrier 7602 to rotate around the center of the screen. After placing the virtual barrier 7602, d. the application keeps the segment of the virtual barrier 7602 that is in between the walls 7607 and trims the rest.

Figure 138:
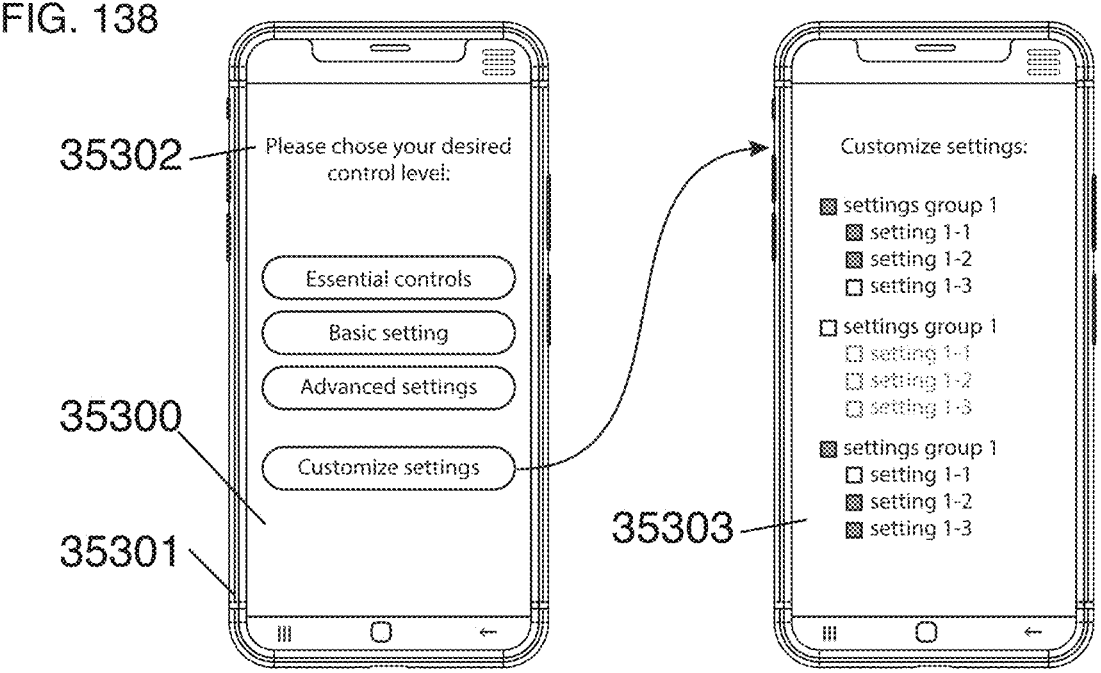
FIG. 138 illustrates selecting different levels of control settings of a robot using an application of a communication device.
Figure 139:
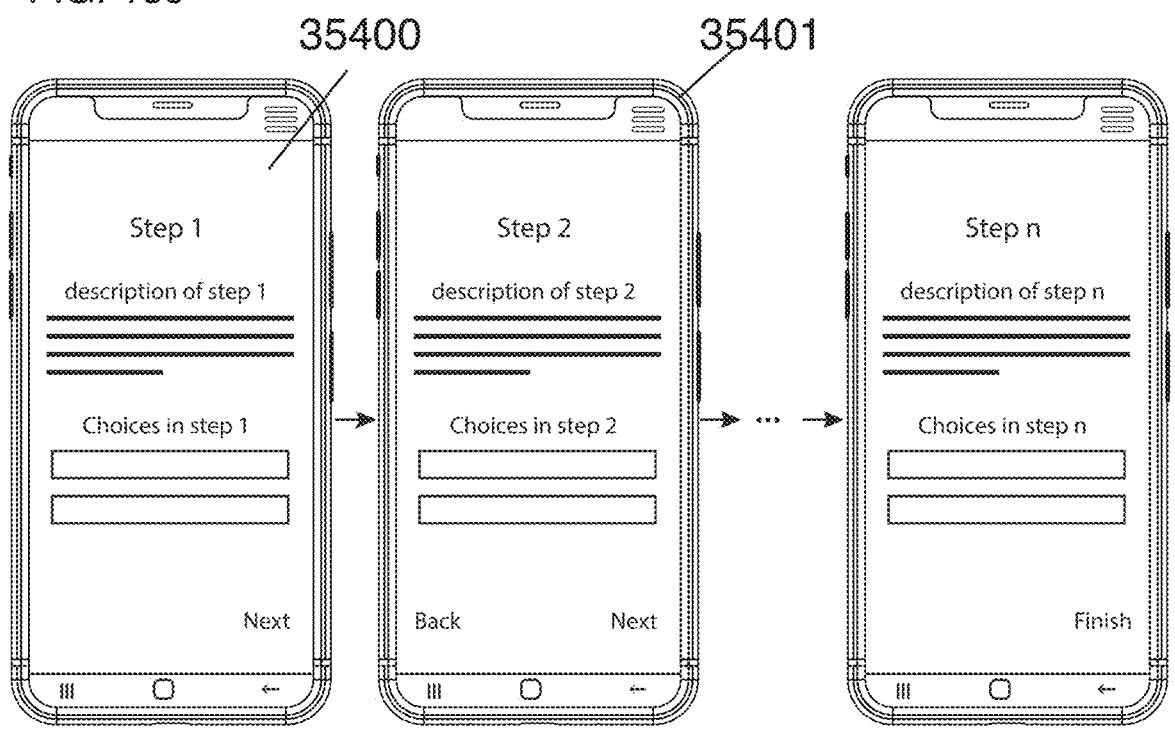
FIG. 139 illustrates a wizard tool of an application of a communication device.

Some embodiments employ a wizard tool to walk the user through different steps of interaction and/or decision making. The wizard provides different options to the user at each step using the application of the communication device paired with the robot. When a goal of the wizard is to help with decision making the options are presented to the user in a form of questions. The wizard decides between available options based on the user-provided answers to the questions. For example, the wizard helps the user determine the best settings and/or a schedule for a robot cleaner based on their answers to a series of questions related to their lifestyle. Examples of questions include: how many people are living in the household? do you have a pet? if yes, does your pet shed a lot? how often do you need to vacuum the floors in a week? do you prefer the vacuum to run in the morning or in the afternoon? Based on user answers to the questions, the wizard generates a schedule for the robot specifying days and times for cleaning different rooms. The user may modify and adjust the generated schedule using the application. FIG. 138 illustrates using an application 35300 of a communication device 35301 to select a control level 35302 of the robot. The user has the option to select between essential settings, basic settings, advanced settings, and custom settings, each of which is described in further detail below. Upon selecting custom settings, various customizable settings 35303 are displayed by the application 35300, of which the user can enable or disable. FIG. 139 illustrates an example of a wizard tool of an application 35400 of a communication device 35401. The wizard tool guides a user through a certain task by dividing the task into smaller subtasks/steps, such as Step 1, Step 2, . . . , Step n, wherein at each step a choice the user makes defines a linear pathway among multiple possible pathways to completing the certain task.

Figure 140:
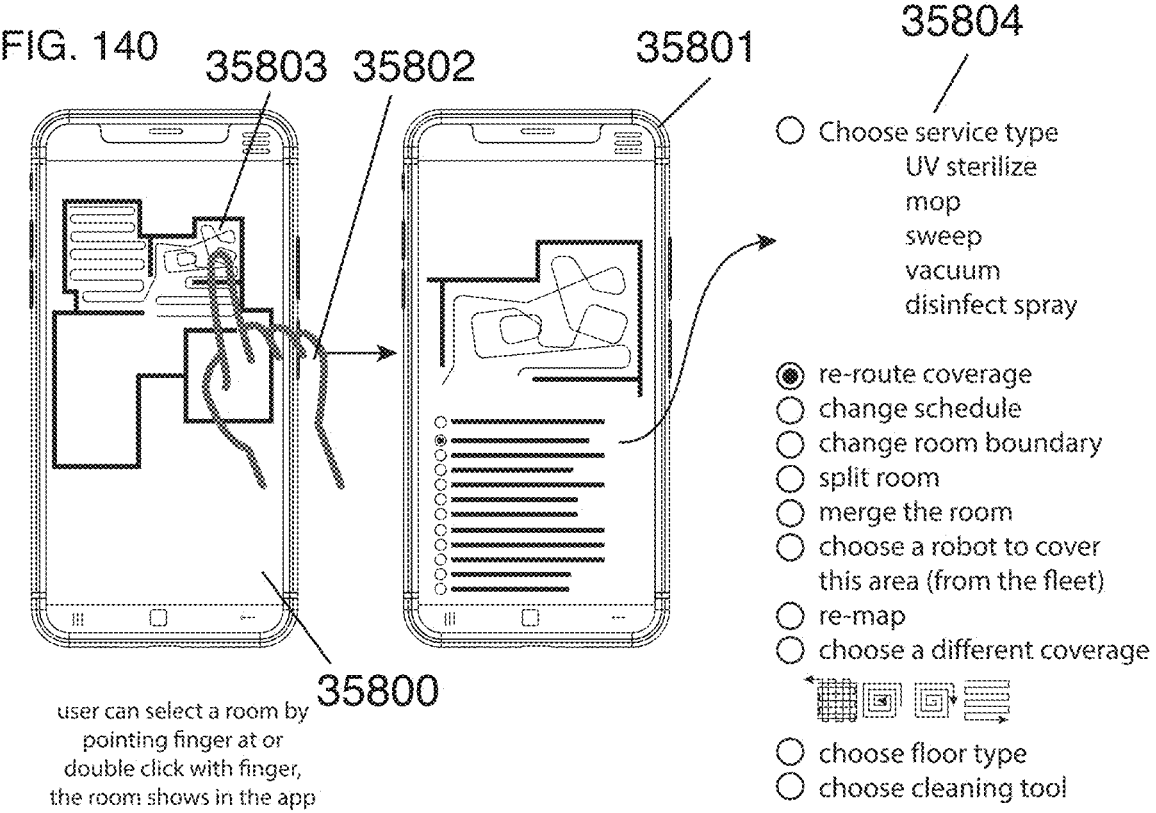
FIGS. 140-141B illustrate a user using an application of a communication device to provide settings to subareas within a map and training the application to segment the map.
Figure 141A:
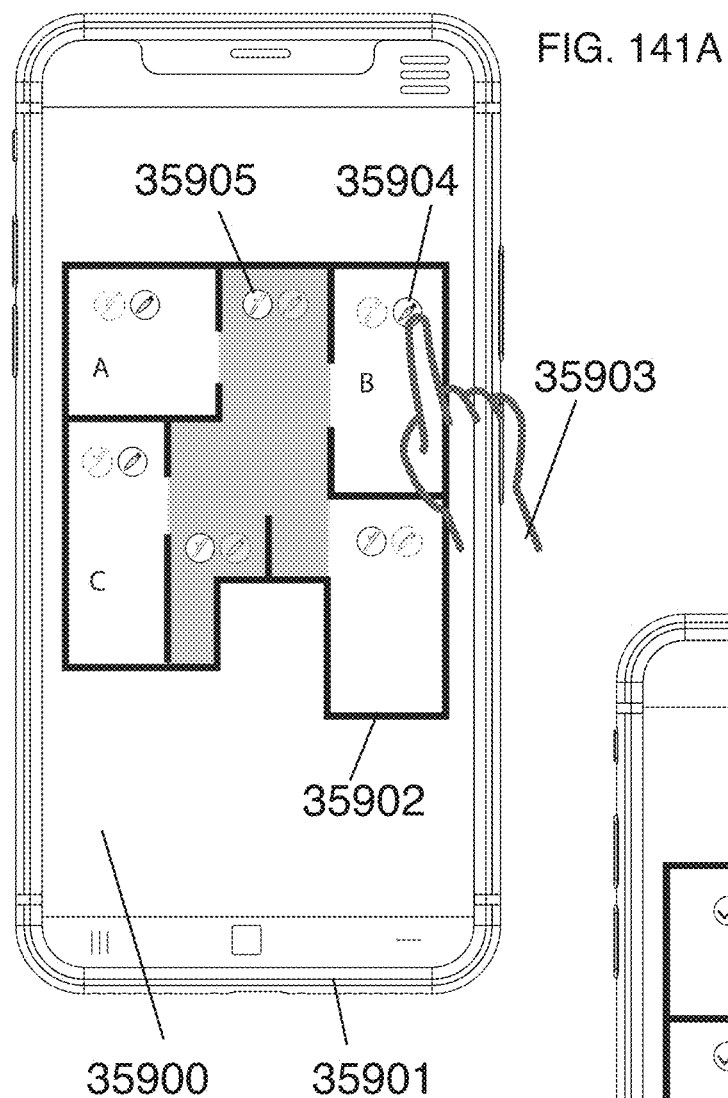
Figure 141B:
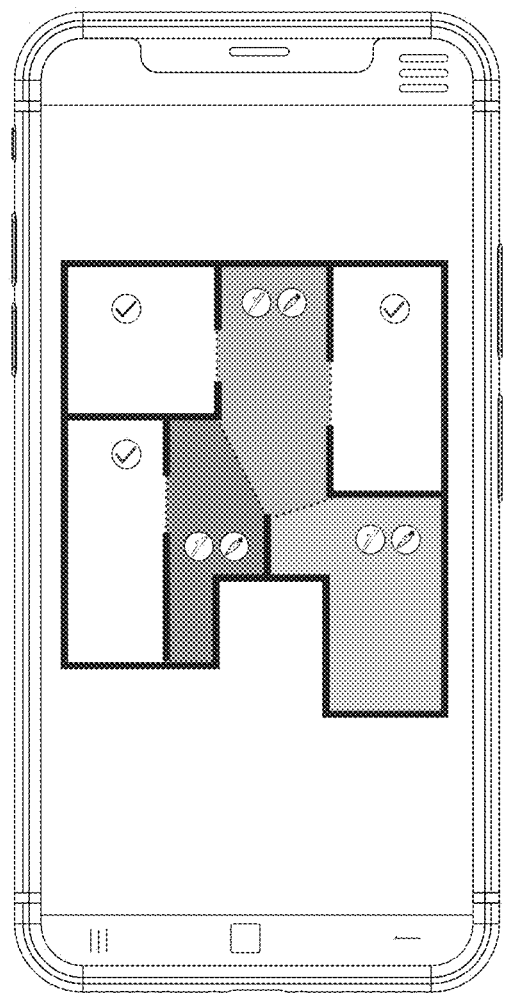
Figure 142:
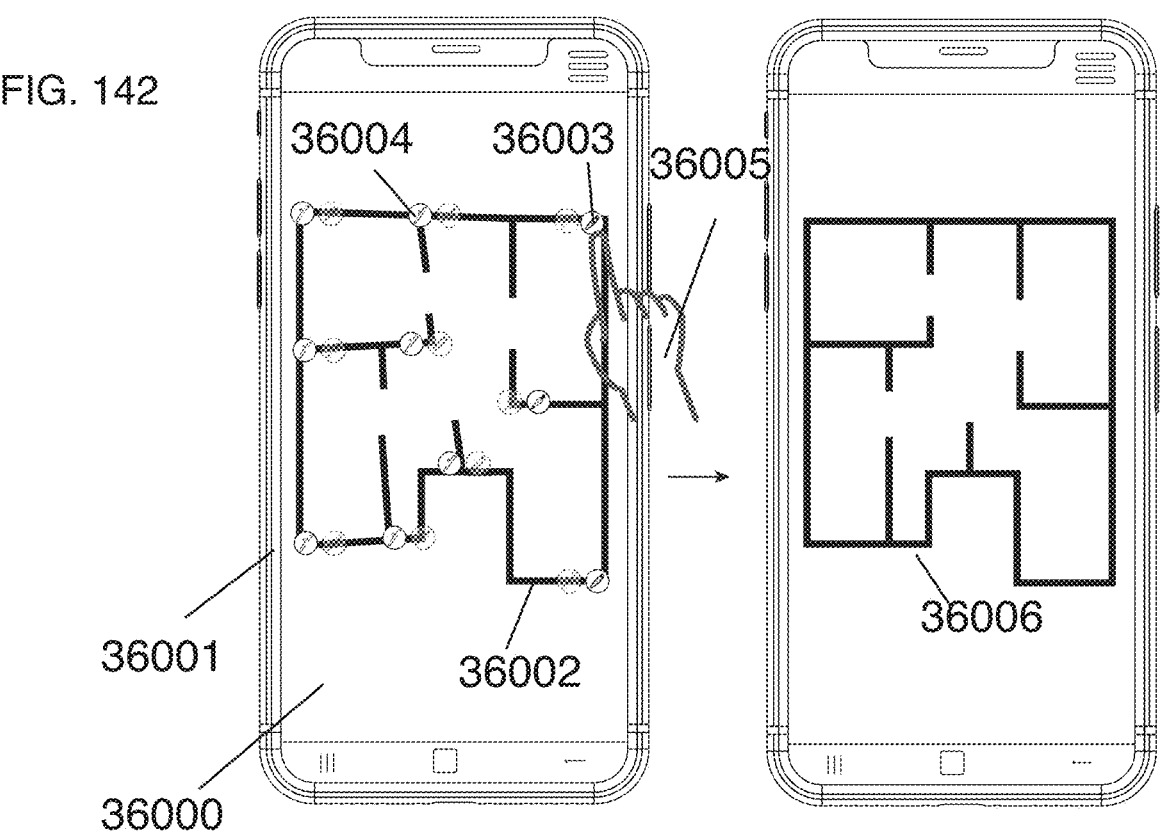
FIG. 142 illustrates a user using an application of a communication device to train the application to correctly map boundaries.
Figure 143:
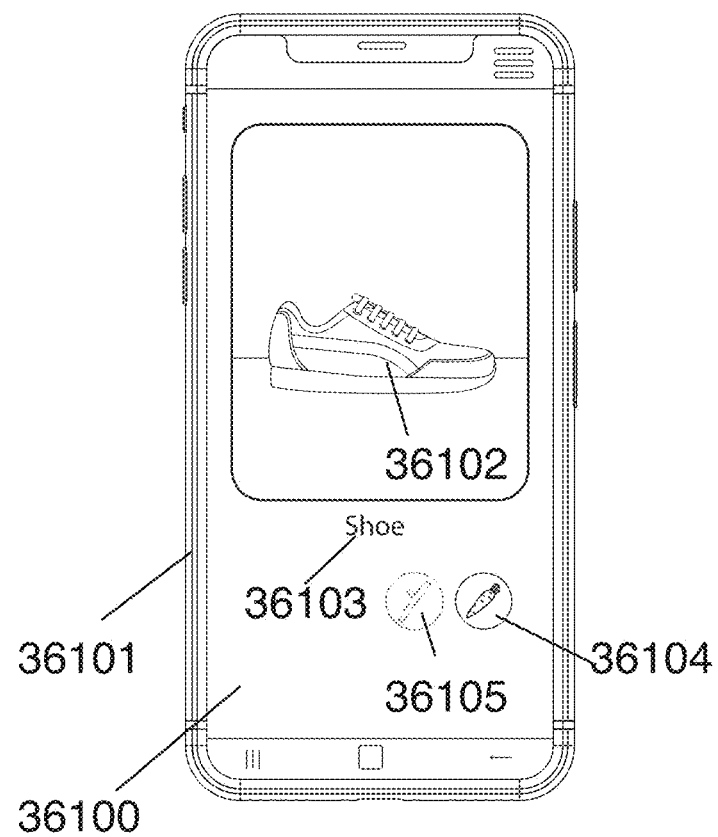
FIG. 143 illustrates a user using an application of a communication device to train the application to correctly identify object types.
Figure 144:
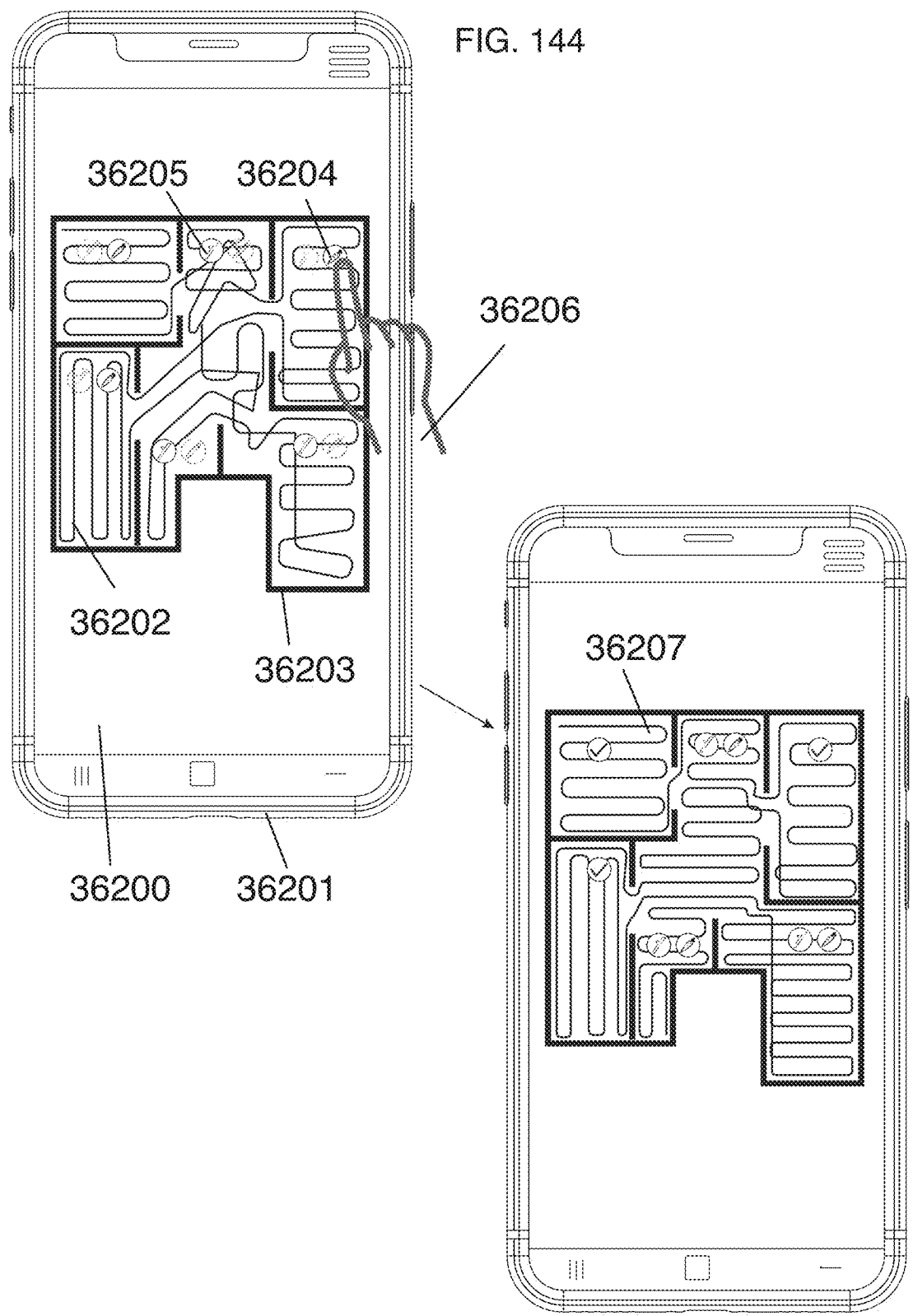
FIG. 144 illustrates a user using an application of a communication device to train the application to correctly plan paths.

Some embodiments train the robot such that the robot performs a job better during a next episode. A job may be divided spatially or temporally and user feedback may be provided accordingly. For example, coverage of one area may be acceptable while coverage of another area may be unacceptable. Dividing an environment spatially allows instructions to be assigned to subareas. For example, division of an environment into rooms allows a user to select a room within which coverage is unacceptable, requiring the robot to execute an alternative path plan. FIG. 140 illustrates an example of an application 35800 of a communication device 35801 paired with the robot. A user 35802 selects a room 35803 by touching the room 35803 or double tapping the room 35803 displayed on the screen, after which room 35803 is displayed with possible instructions 35804 to assign to the room 35803. In one embodiment, the application comprises a training mechanism for each segment or subarea of the environment. FIGS. 141A and 143B illustrate an application 35900 of a communication device 35901 paired with the robot displaying a map 35902 divided into subareas. In FIG. 141A, a user 35903 selects a carrot icon 35904 within subareas A, B, and C, indicating an acceptable division of these subareas. The user 35903 select a stick icon 35905 within subarea D, indicating the division is unacceptable. The division of subarea D is removed and the application displays another possible division of the subarea D, as shown in FIG. 141B. In FIG. 141B perforated lines 35906 suggest division options that the user may accept by selecting the carrot icons 35904. FIG. 142 demonstrates a similar concept for map warping, wherein an application 36000 of a communication device 36001 paired with the robot displays a map 36002 of an environment. Carrot icons 36003 and stick icons 36004 are displayed at boundaries and a user 36005 selects the carrot icon 36003 to indicate a correct boundary or the stick icon 36004 to indicate an incorrect boundary, causing the application to adjust the respective boundary. Correction of the boundaries results in the map 36006. FIG. 143 demonstrates a similar concept for object recognition and classification, wherein an application 36100 of a communication device 36101 paired with the robot displays an image of an object 36102 and an object type 36103 of object 36102. Carrot icons 36104 and stick icons 36105 are displayed and a user 36105 selects the carrot icon 36104 to indicate a correct object type classification or the stick icon 36105 to indicate an incorrect object type classification. The feedback improves the classification algorithm for future classifications. FIG. 144 demonstrates a similar concept for path planning, wherein an application 36200 of a communication device 36201 paired with the robot displays paths 36202 of the robot within different subareas of a map 36203 of an environment. Carrot icons 36204 and stick icons 36205 are displayed for different paths 36202 executed in subareas and a user 36206 selects the carrot icon 36204 to indicate an acceptable path or the stick icon 36205 to indicate improvement is needed for the planned paths. The paths for which stick icons 36205 are selected are re-planned to paths 36207, wherein the user selects the carrot icon 36204 or stick icon 36205 to provide feedback on the re-planned paths 36207. The feedback improves a path planning algorithm of the robot such that over time efficient paths 36207 are planned. Based on robot training, the robot re-executes a task immediately or improves execution of the task during a next work session. In embodiments, positive and negative reinforcement are used by the processor of the robot or other robots to improve judgment. Some algorithms may use positive and negative examples with different weights. Some embodiments may use passive training, wherein the user does not provide an input and an interpretation is formulated and considered with some lower weight than explicit training. Each training may actuate a correction during a current work session or a status and contributes to improved decision-making, with decisions having a higher probability of being a choice a human would make.

Figure 145:
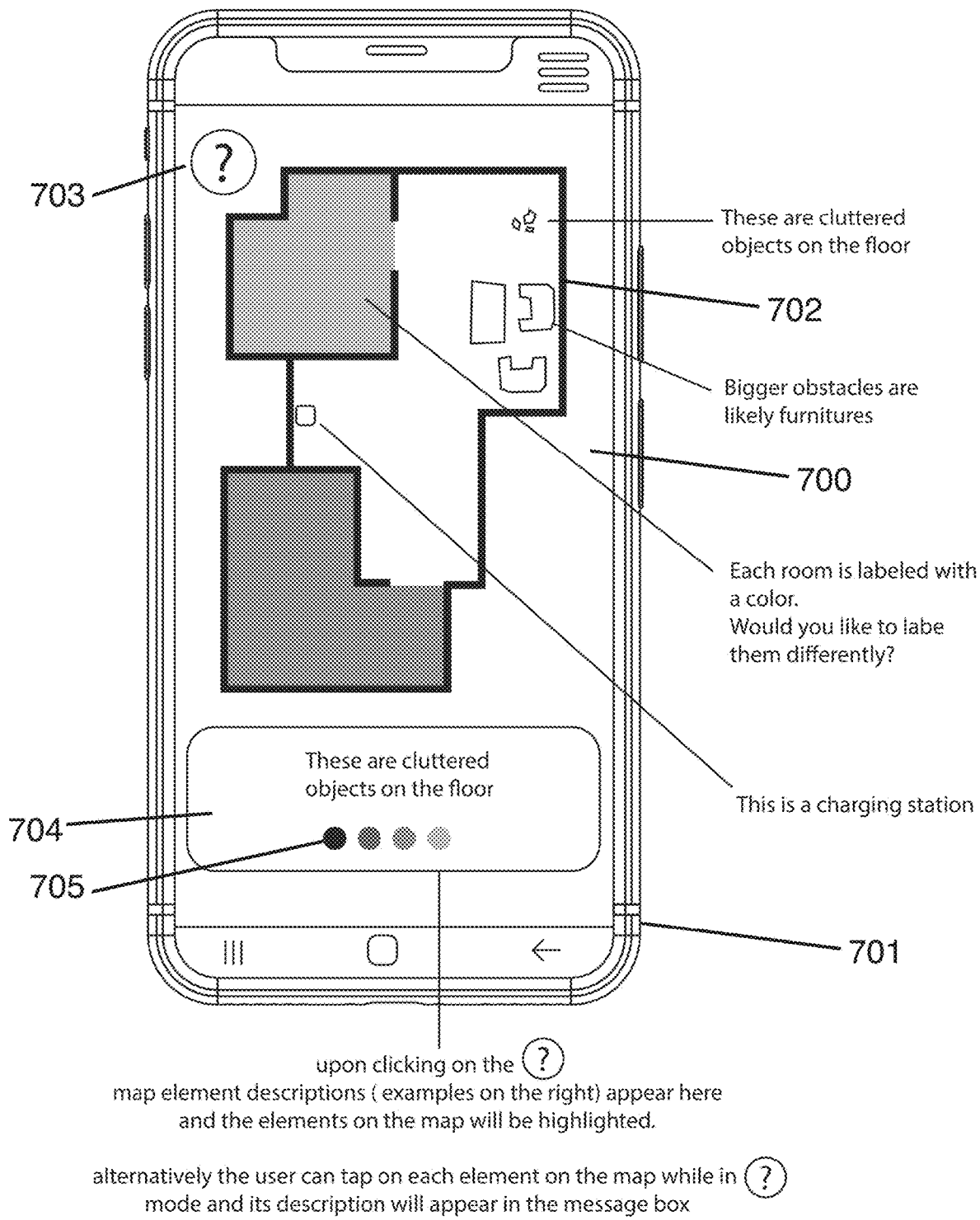
FIGS. 145-146 illustrate an example of an application of a communication device paired with the robot and operations thereof.

FIG. 145 illustrates an application 700 of a communication device 701 displaying a map 702 of an environment of a robot. Upon a user selecting icon 703, a prompt 704 of information pertaining to elements 705 within the map 702 is displayed and corresponding elements 705 of the map are highlighted. Alternatively, the user may select different elements 705 within the map 702 and upon their selection, the prompt 704 of information corresponding to the selected element 705 is displayed.

Figure 146:
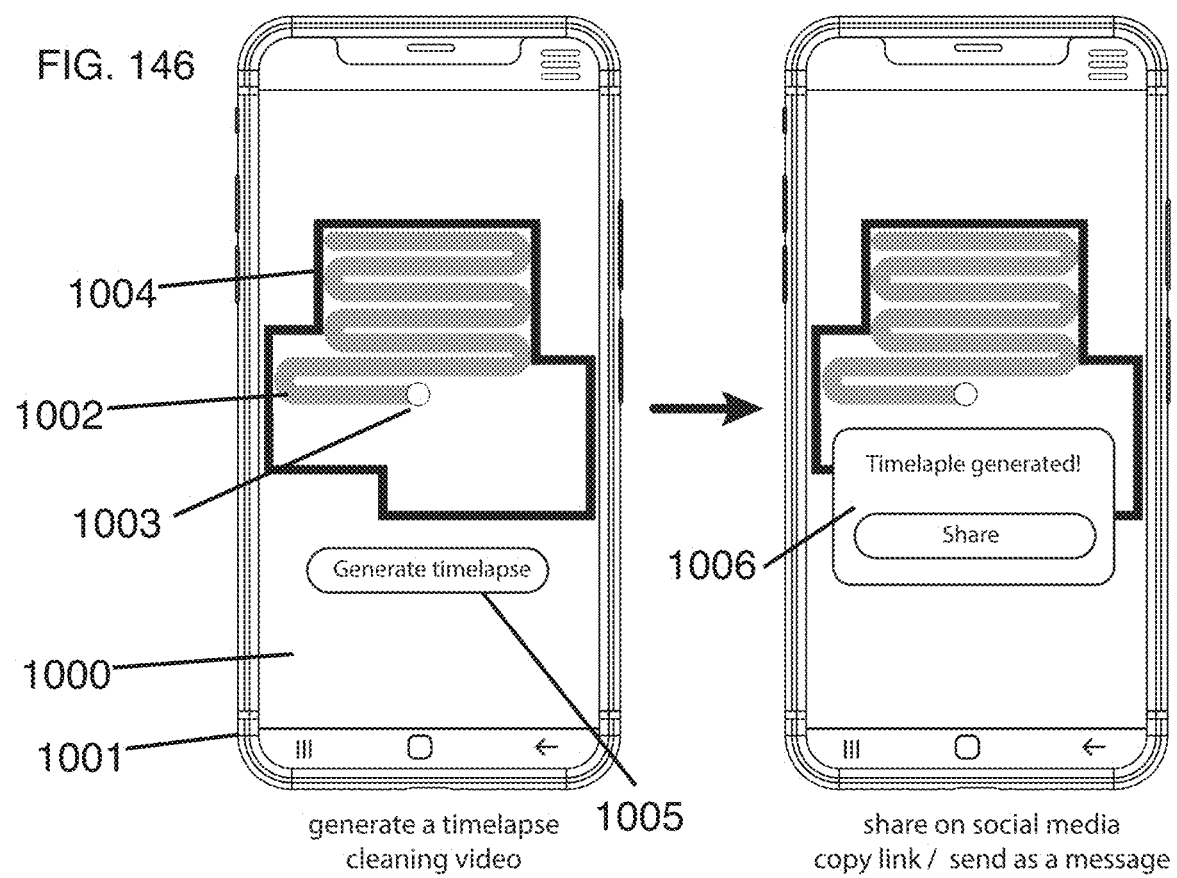

FIG. 146 illustrates an application 1000 of a communication device 1001 displaying a cleaning path 1002 of a robot 1003 within map 1004 in real-time. The application may receive an input 1005 designating an instruction to generate a timelapse of a cleaning session of the robot 1003. Upon completing generation of the timelapse, the application displays a prompt 1006 notifying a user that the timelapse is generated. The application may receive an input 1007 designating an instruction to share the timelapse, upon which a corresponding link may be copied or the timelapse may be sent by text message or posted on social media.

Some embodiments render a line connecting a position of the robot before a displacement to a position of the robot after the displacement.

Some embodiments include an application executed on a user input device configured to receive user input. The user input may designate a particular behavior the robot is to perform upon encountering a particular object type. In some embodiments, the processor of the robot or the cloud identifies an object as having the particular object type based on sensor data used in distinguishing object type of objects encountered by the robot. Upon identification of the particular object type, the robot performs the particular behavior.

Figure 147:
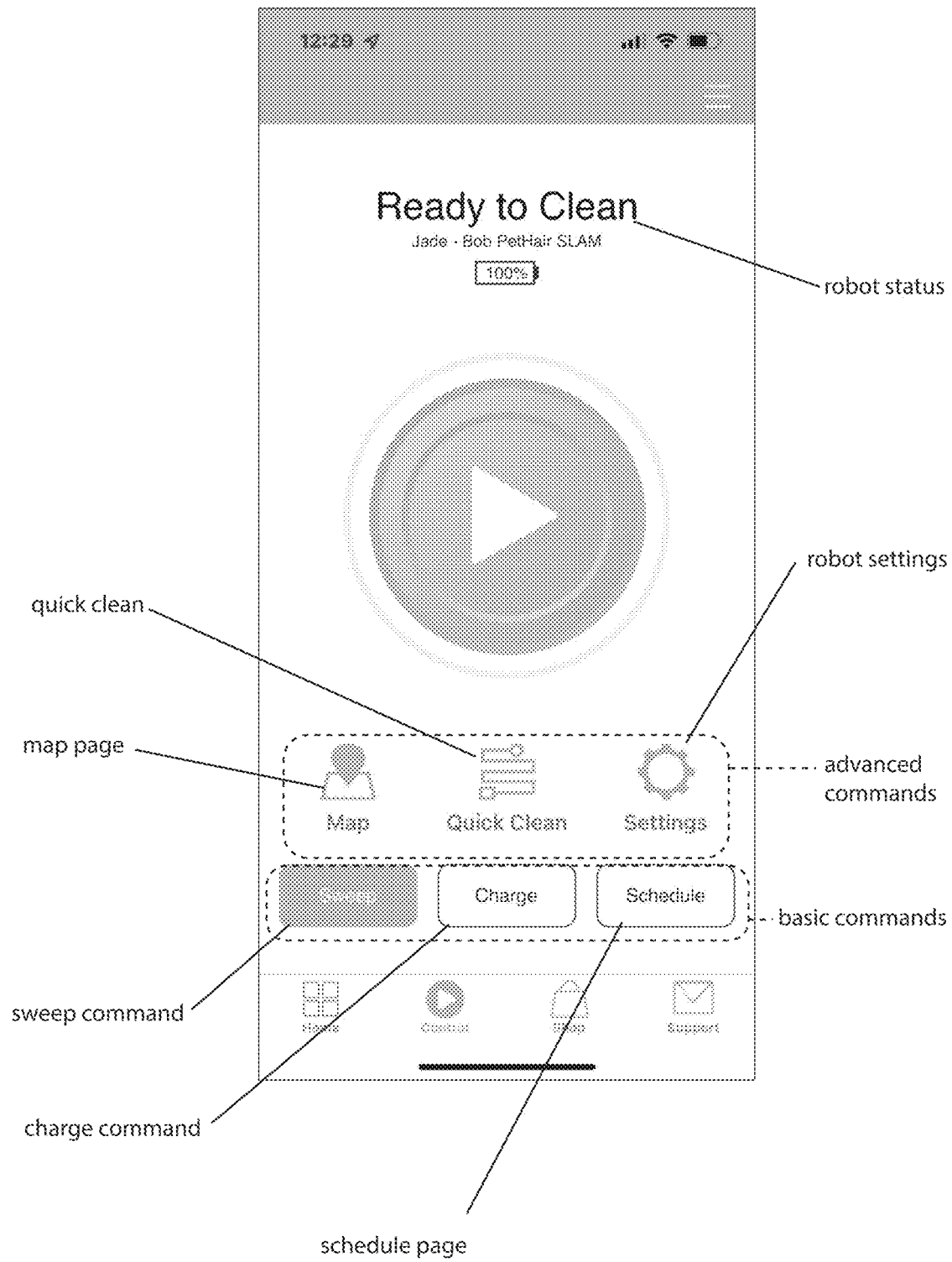

On a main control page of the application several sections are used to control the robot and display information relating to the robot. FIG. 147 illustrates an example of a main control screen of the application and user interface components. The application displays a status of the robot, the status indicating whether the robot is cleaning, charging, or is ready to clean. The application also displays a name of the robot (in case there may be more than one robot paired with the application), a battery charge level, and a working status of the robot (e.g., cleaning or paused). From the control page, a user may select one of several icons to control and customize performance of the robot. Upon selecting a map icon, the application is redirected to a map page displaying the map and from which the map may be customized. Upon selecting a quick clean icon, the application prompts the user to specify a section of the map to be cleaned immediately by the robot. The section of the map for quick cleaning may be defined manually by the user or may be selected from defined rooms within the map. Upon selecting a settings icon, the application is redirected to a settings page where various settings may be enabled or disabled for the robot, such as suction power, voice indicators, and edge detection. Upon selecting a sweep icon, the robot is instructed to immediately perform a cleaning job. Upon selecting a charge icon, the robot is instructed to drive to and dock at a charging station. Upon selecting a schedule icon, the application is redirected to a scheduling page where multiple schedules for the robot to perform during particular days and time of the week may be specified.

Figure 148A:
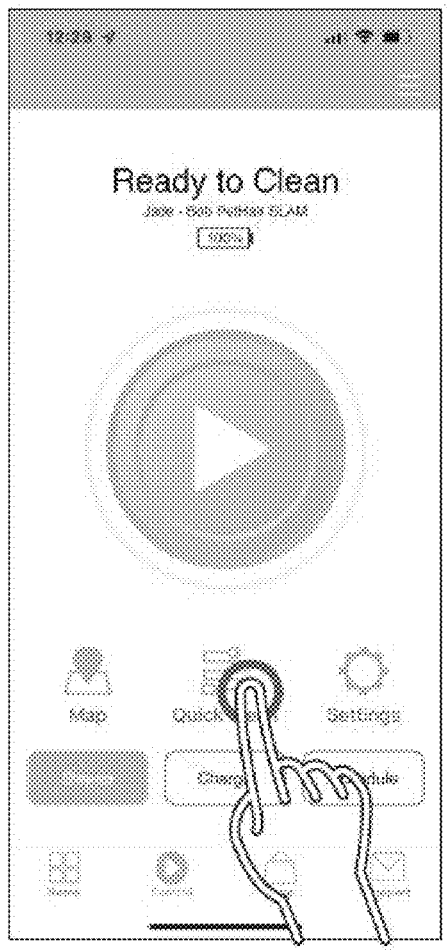
Figure 148B:
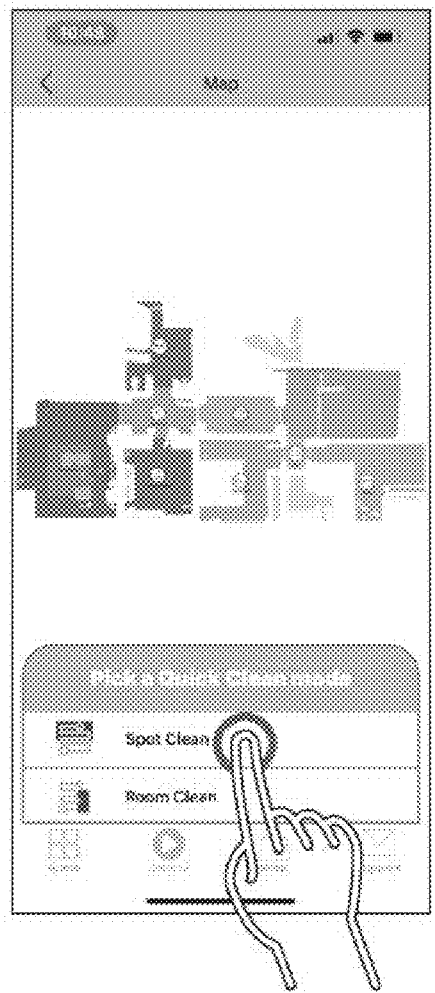
Figure 148C:
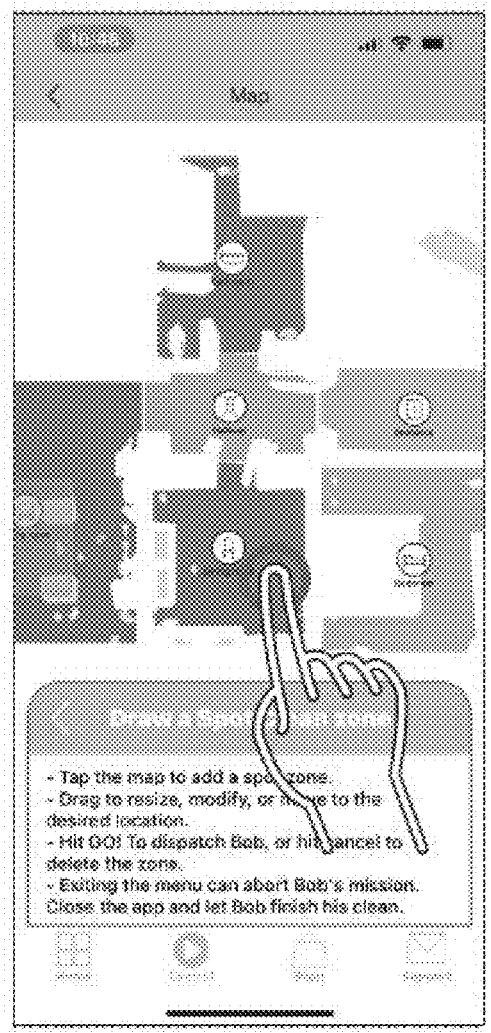
Figure 148D:
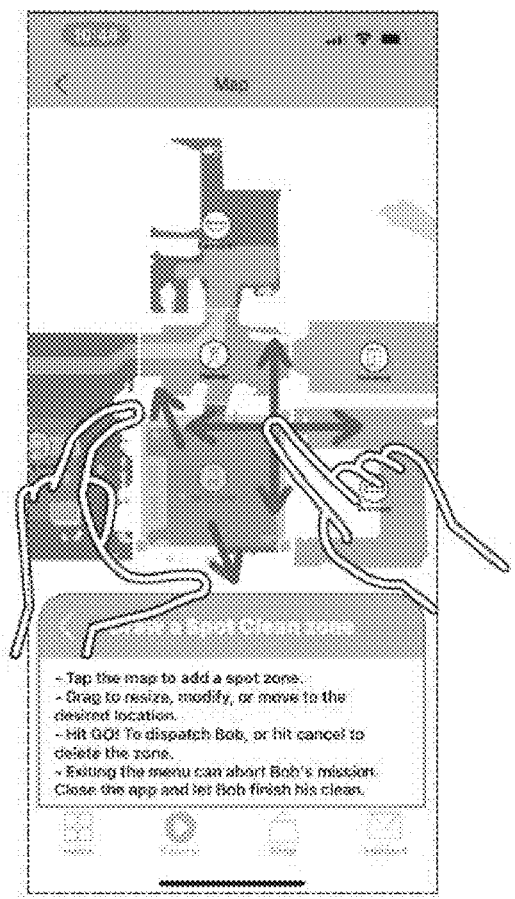
Figure 148G:
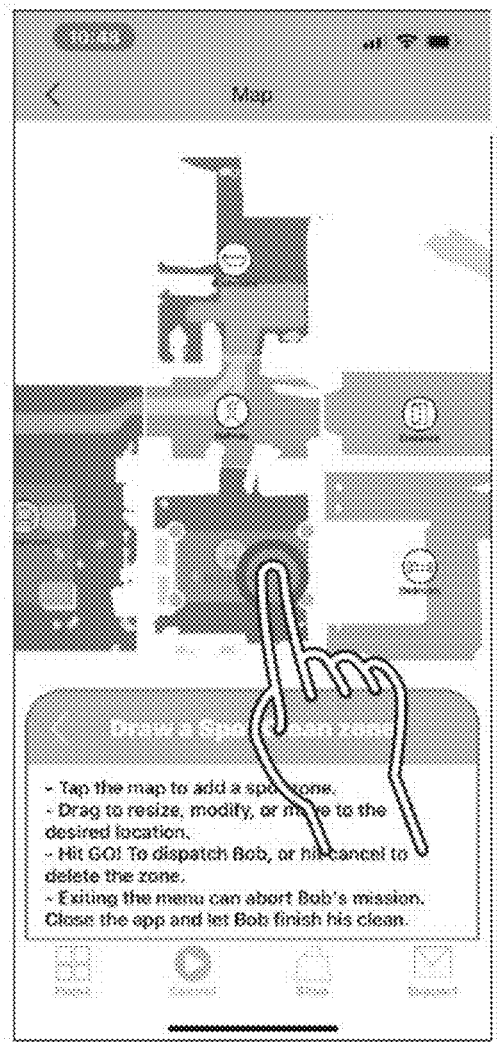
Figure 148F:
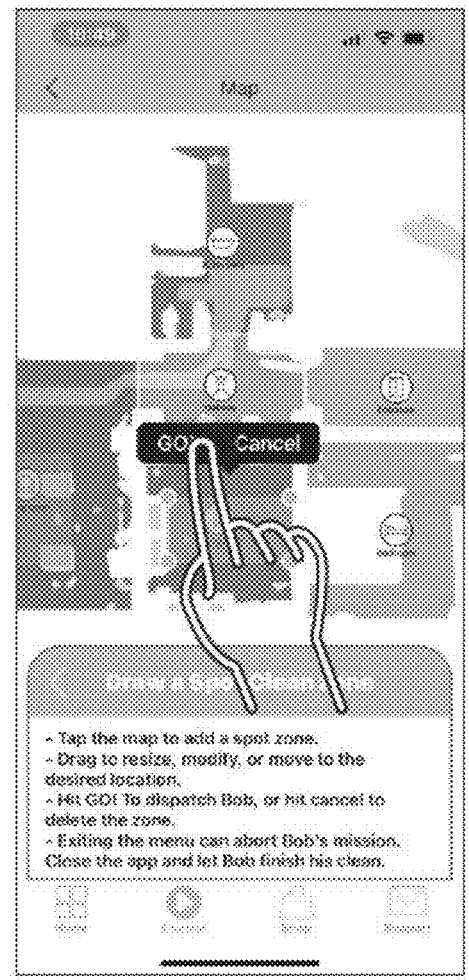
Figure 148G:

To spot clean an area within the environment, a user may use the application to select a spot clean option from a quick clean menu. The user may then draw a spot clean zone within the map, upon which a rectangle (e.g., a green rectangle) representing the spot clean zone appears on the map. The user may move the rectangle by touching the rectangle and dragging the rectangle or may resize the rectangle by touching and dragging any corner of the rectangle. The user may tap on the spot clean zone, upon which a pop up menu appears over the rectangle for confirmation to go or cancel. If the user confirms go, an intersection of the map and the rectangle are selected for spot cleaning and the robot drives to the spot clean zone for cleaning. If the user chooses cancel, the spot clean zone is deleted. The user may create another spot clean zone or return to a previous menu. FIGS. 148A-148G illustrate steps of issuing a spot clean command. In FIG. 148A a user selects quick clean from a main control page of the application; in FIG. 148B the user selects spot clean from a quick clean menu; in FIG. 148C the user selects a spot on a map for spot cleaning; in FIG. 148D a rectangle representing a spot clean zone appears, of which the user may resize or move; in FIG. 148E the user taps on the rectangle; in FIG. 148F a pop up menu appears with two commands: GO! to confirm and send the robot to clean the spot clean zone and cancel to delete the created spot clean zone; in FIG. 148G the user selects GO!, upon which the robot drives to the spot clean zone and cleans the area. The robot returns to a charging station after cleaning.

Figure 149A:
Figure 149B:
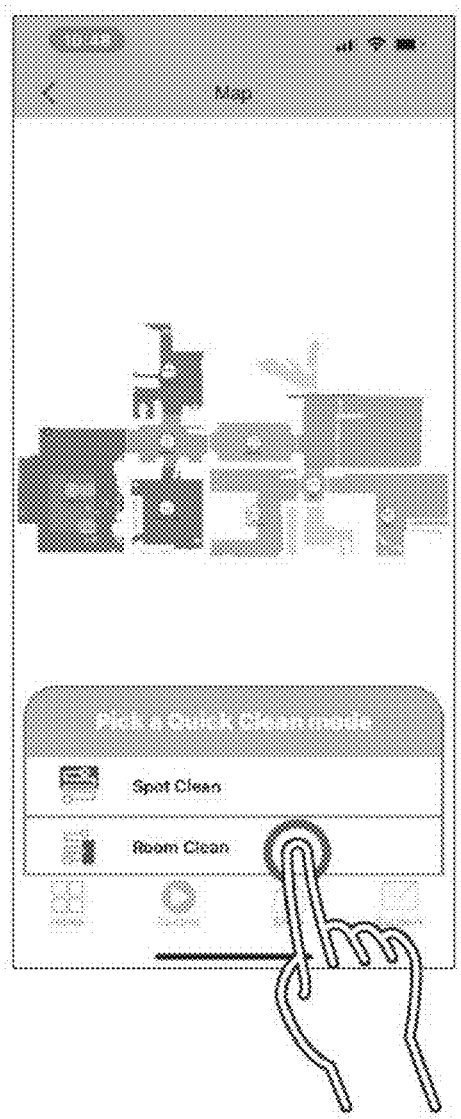
Figure 149C:
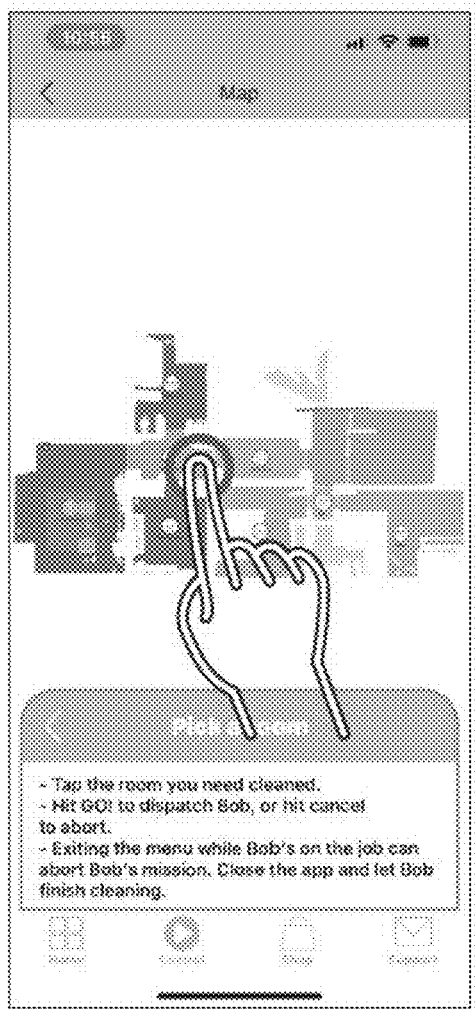
Figure 149D:
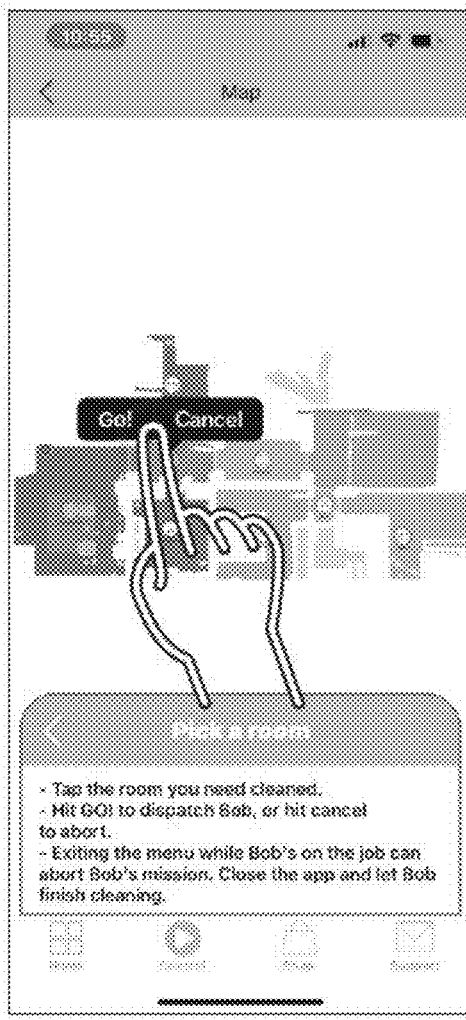

To clean a room within the environment, the user may use the application to select a room clean option from the quick clean menu. When selected, the application prompts the user to select a room within the map. The user touches any room displayed by the application to select the room for cleaning. Once the room is selected, a displayed color of the room changes, a border appears around the selected room within the map, and a pop up menu appears prompting the user to select go or cancel. If the user selects go, the robot drives to the selected room and starts cleaning the entire room. The room remains highlighted within the m ap during cleaning. If the user selects cancels, the user may select another room for cleaning or go back to a previous menu. While in quick clean mode, the robot focuses on the task at hand and cannot accept new commands. Therefore, the application does not allow the user to move away from the displayed screen, wherein selecting a back button triggers a pop up prompting the user to select cancel task. If the task is canceled, the robot stops cleaning and returns to the charging station. FIGS. 149A-149E illustrate steps for issuing a room clean command. In FIG. 149A the user selects quick clean from the main control page; in FIG. 149B the user selects room clean form the quick clean menu; in FIG. 149C the user taps on a room within map for cleaning; in FIG. 149D a pop up menu appears with two commands: GO! to confirm the room cleaning and send the robot to clean the room and cancel to cancel cleaning of the selected room; in FIG. 149E the user selects GO!, upon which the robot drives to the selected room and cleans the room. The robot returns to the charging station after cleaning.

Figure 150A:
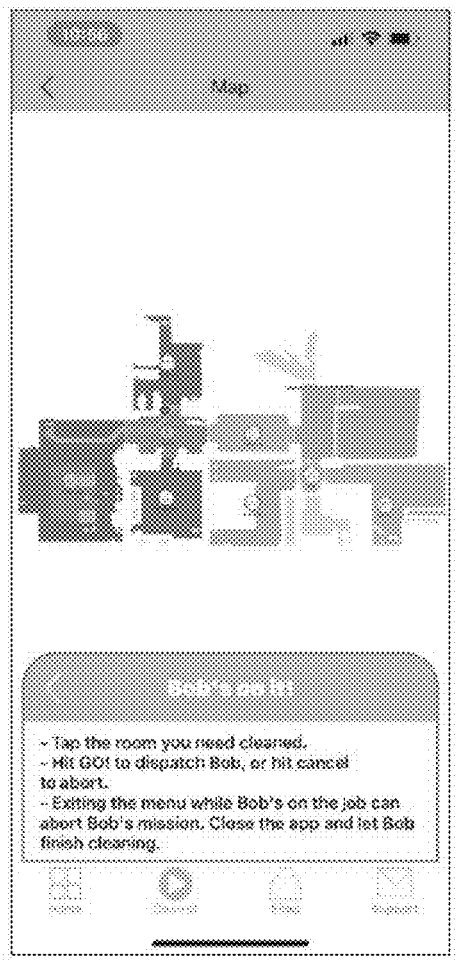
Figure 150B:
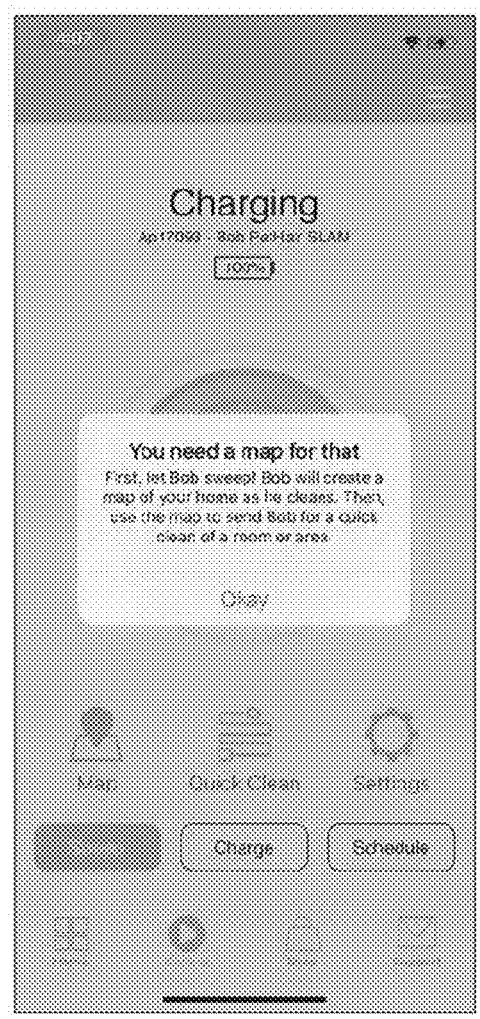

When there is no map available, such as when the robot is cleaning an environment for a first time or a map is deleted, functions depending on the map are disabled. A pop up message may appear on the application upon a user selecting a function depending on the map, the message informing the user that a map is required for the function and instructing the user to allow the robot to sweep (and map the area) first, then use the generated map for further operations. FIG. 150 illustrates a pop message displayed by the application when quick clean is selected by a user and no map is available. As the robot cleans the environment, the processor of the robot simultaneously maps the area covered by the robot. The application may display the map as it is built in real-time. At the end of the cleaning run, the application displays a map of at least a portion of the environment the robot was able to clean. The application may also display areas where the robot encountered furniture and other obstacles highlighted in lighter color on the map.

Figure 152:
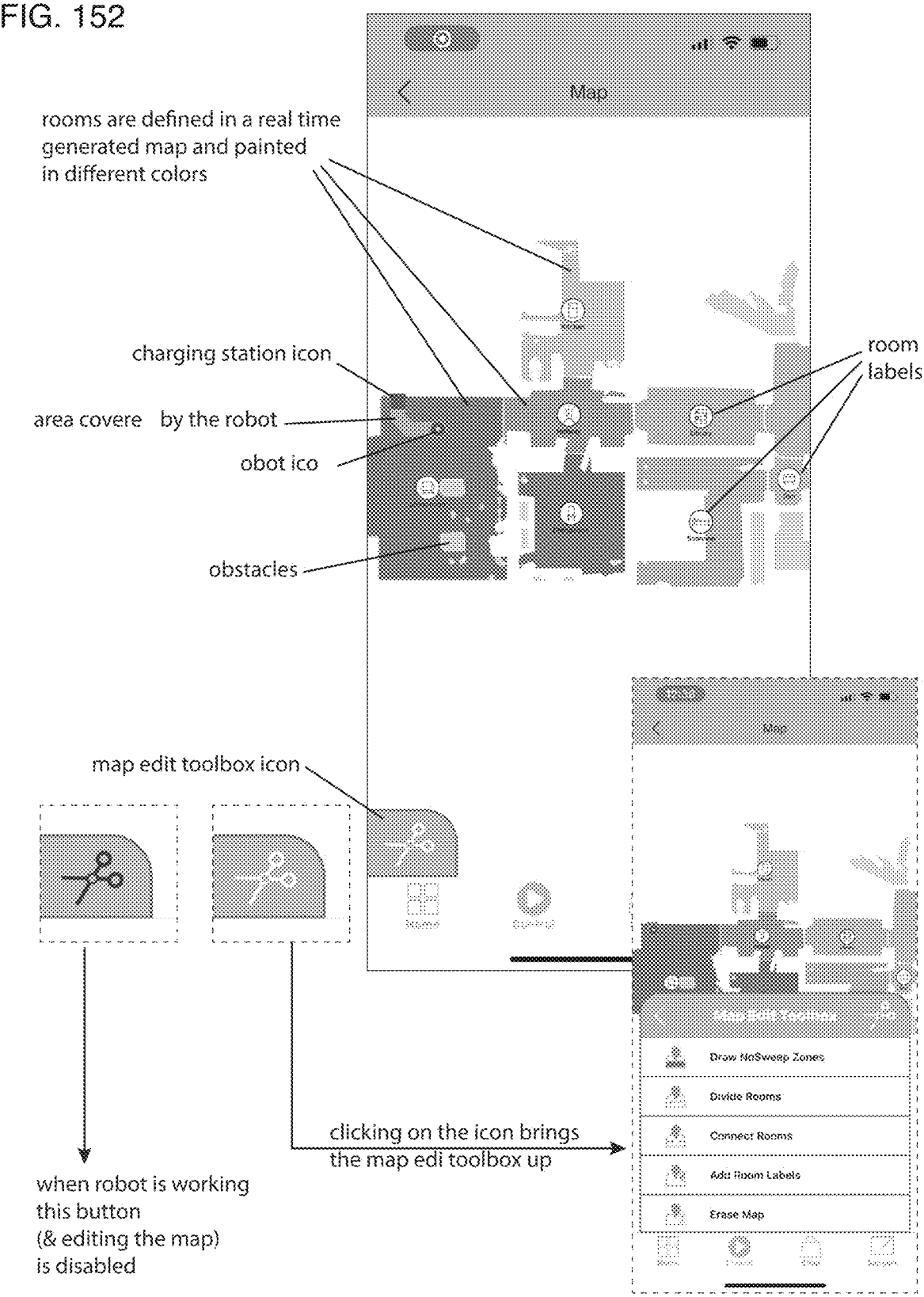

To view the map, the user may use the application to select a map icon. FIGS. 151A and 151B illustrate a user accessing a map page from the main control page by selecting a map icon. If the environment is already mapped, the application redirects to the map page where the user may view, edit, and update the map. FIG. 152 illustrates the map page and different components of the map page. Different areas within the map are distinguished by different colors and each area is a room. The robot and charging station are visualized within the map as a circle and a square, respectively. The user may use their fingers to zoom in and out, move the map, and edit the map using different commands in a map edit toolbox. If the robot is actively working, the operations for editing and updating the map in the map edit toolbox are disabled. The user may use the application to pause the robot or wait for the robot to finish its cleaning job then edit and update the map.

Figure 153:
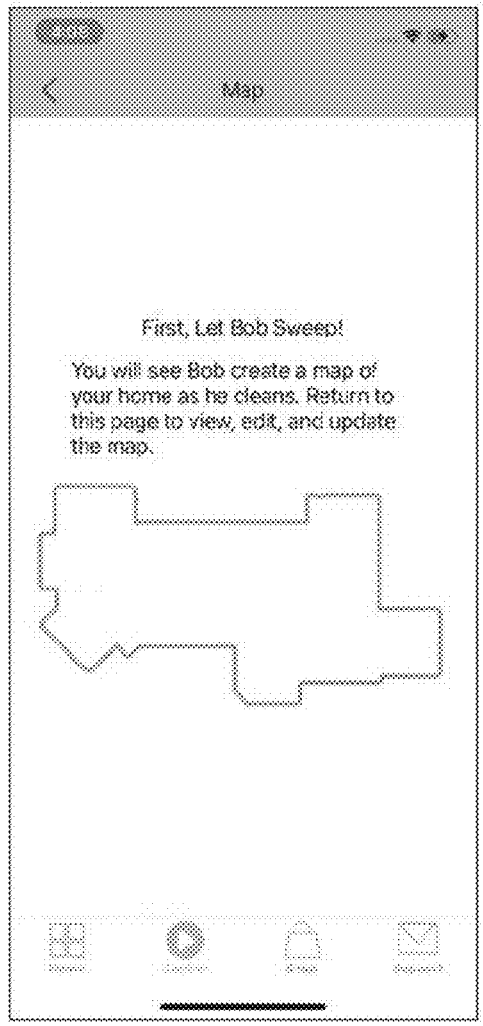

FIG. 153 illustrates a message displayed by the application when there is no map available in the map page. When there is no map available, such as when the robot is cleaning an environment for a first time or a map is deleted, the message within the map page informs the user that the robot must sweep and map the environment first. After mapping is complete, the user may view, edit, and update the map from the map page using the application. To modify the map from the map page, the user may use the application to select an edit icon, upon which the map edit toolbox is displayed. Using the map edit toolbox the user may draw no-sweep zones, divide rooms, connect rooms, add room labels, and erase the map. To exit from the map edit toolbox, the user may select a back button displayed on a top left corner of the application.

Figure 154A:
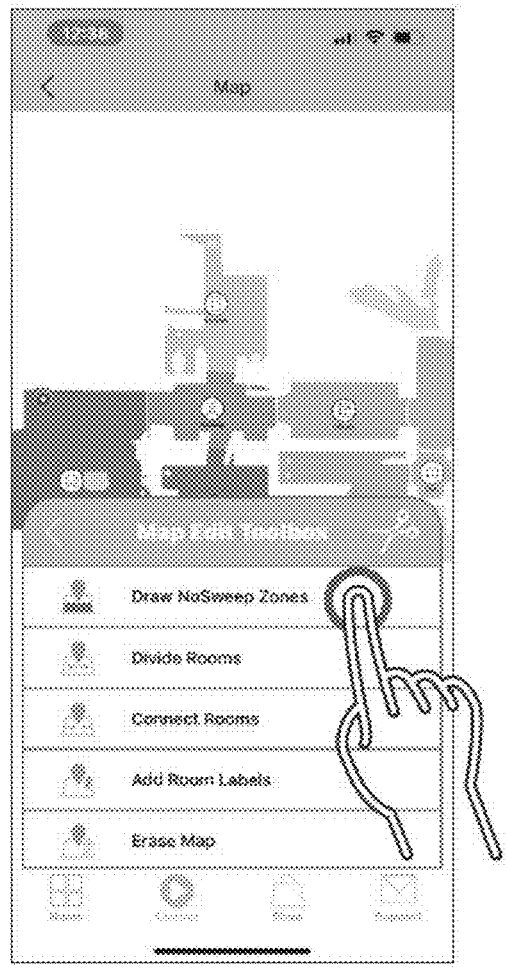
Figure 154B:
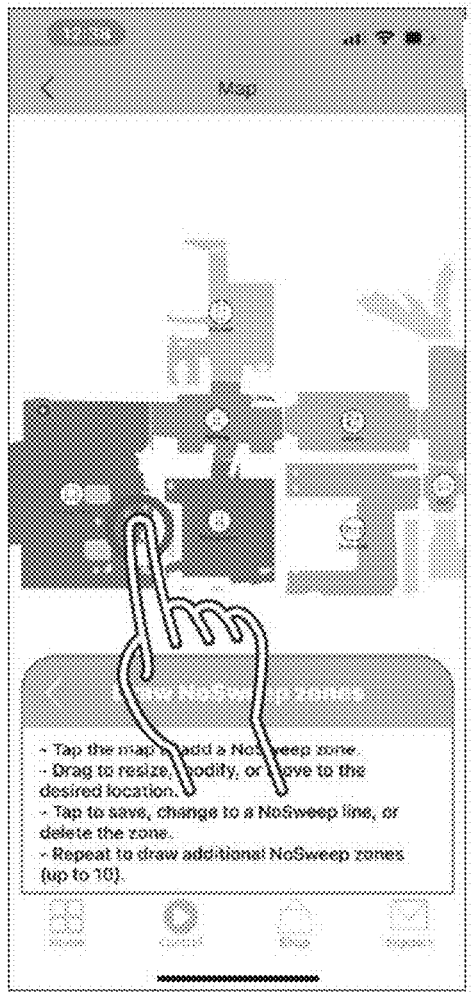
Figure 154C:
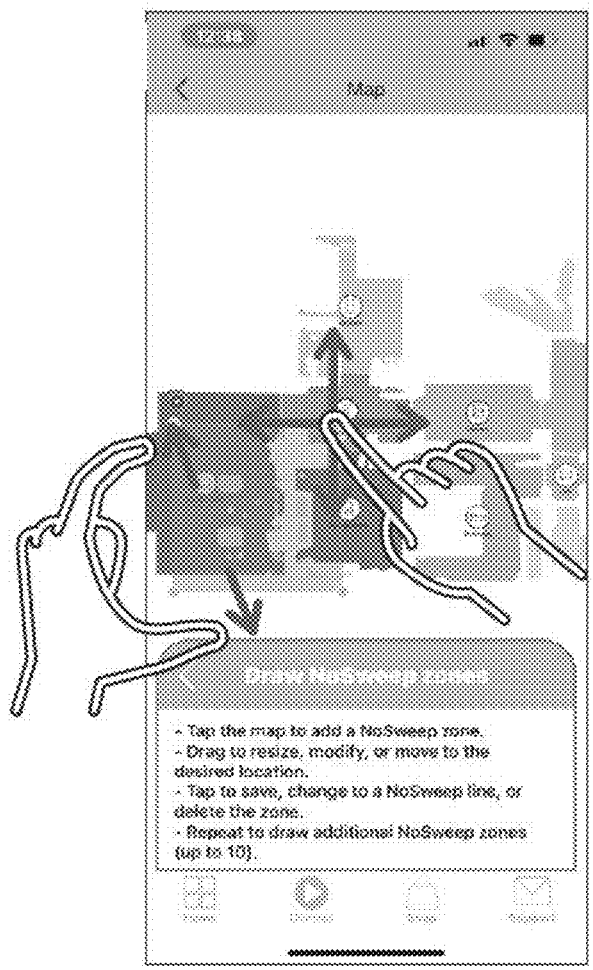
Figure 154D:
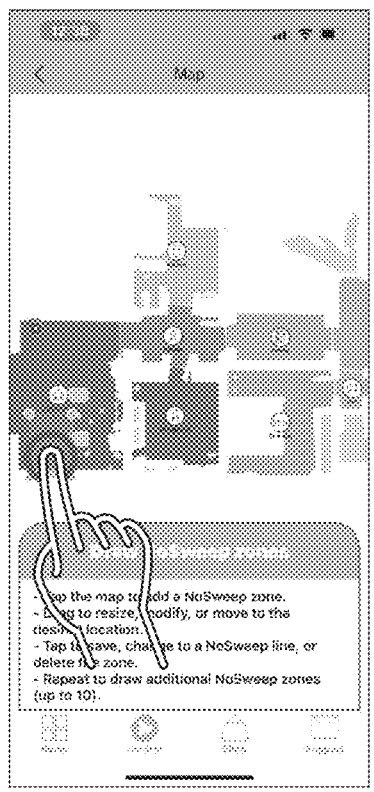
Figure 154E:
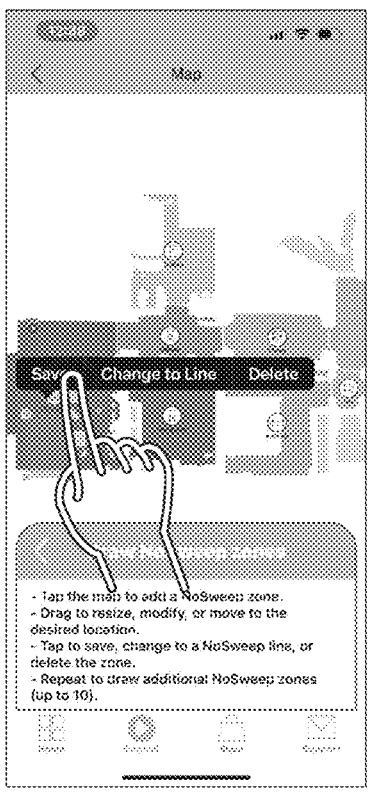
Figure 154F:
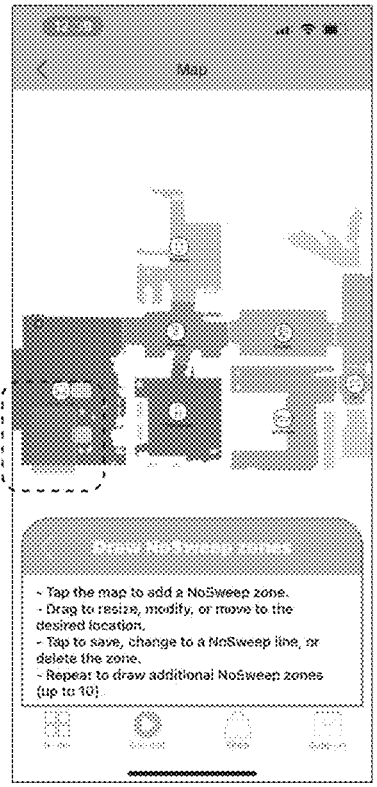
Figure 155A:
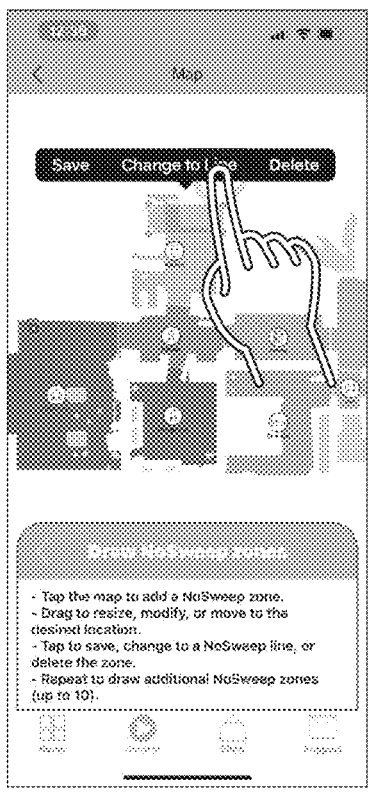
Figure 155B:
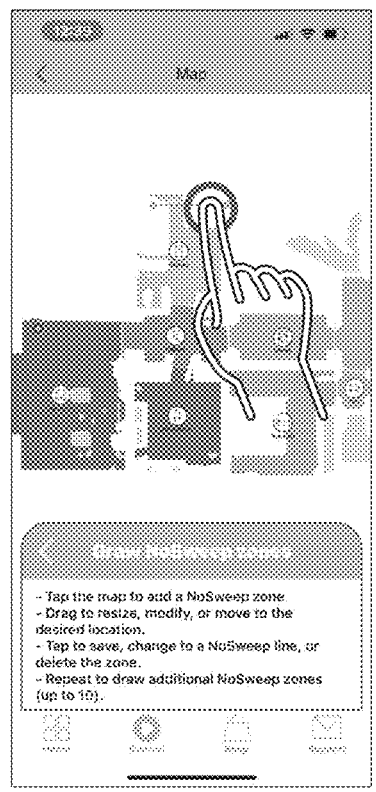
Figure 155C:
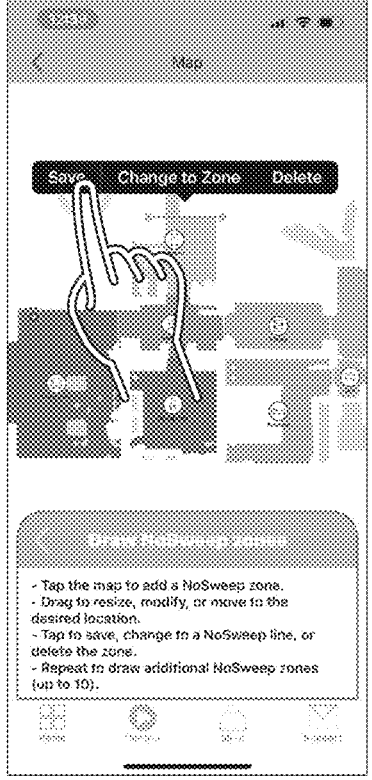
Figure 155D:
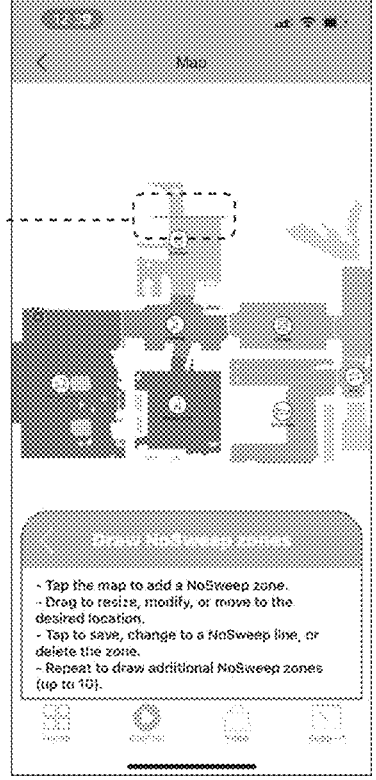

No-sweep zones are a helpful tool for keeping the robot away from areas of a house where the robot should not or cannot work within. These areas may have loose wires or small objects that may be accidentally picked up by the robot and cause issues or areas that the robot may repeatedly get stuck in. The application may implement no-sweep using: (1) a rectangular no-sweep zone the robot cannot enter, drawn within the map using the application and (2) a no-sweep line the robot cannot cross, drawn within the map using the application. To draw a no-sweep zone or line, the user may use the application to select draw NoSweep zones from the map edit toolbox. The user may then tap on an area within the map to draw the NoSweep zone. A rectangle (e.g., red rectangle) appears on the map at the selected area. The user may use the application to move and resize the rectangle by touching and dragging the rectangle and by touching and dragging any corner of the rectangle, respectively. The user may use the application to tap on the NoSweep zone, upon which a pop up appears with three options: (1) save to save the NoSweep zone in the map, (2) change the NoSweep zone to a line, and (3) delete the NoSweep zone. The application supports up to ten NoSweep zones, after which the application informs the user that the maximum number of NoSweep zones has been reached when the user attempts to add another NoSweep zone. FIGS. 154A-154F illustrate steps for drawing a NoSweep zone within the map. In FIG. 154A a user uses the application to selects draw NoSweep zone from the map edit toolbox; in FIG. 154B the user taps on an area within the map to draw the No Sweep zone; in FIG. 154C a rectangular NoSweep zone appears within the map, which the user may move or resize; in FIG. 154D the user taps on the NoSweep zone; in FIG. 154E the application displays a pop up menu with options of save, change to line, and delete; in FIG. 154F the user chooses save and the NoSweep zone is saved within the map. If the user choose delete, the NoSweep zone is deleted. If the user selects change to line, the rectangular NoSweep zone changes to a line, acting as a virtual barrier for the robot. The user may move and modify the line to position the line in the desired place and orientation. The user may tap on the line, upon which the pop up reappears, however, the option change to line is swapped with change to zone to change the line to the rectangular. To return to the map edit toolbox, the user may select the back icon. In FIG. 155A a user selects change to line, wherein the rectangular NoSweep zone is replaced by a line; in FIG. 155B the user taps on the line and a pop up menu appears; in FIG. 155C the user may select save, delete, or change to a zone; in FIG. 155D the user selects save and the line is saved within the map.

Figure 156A:
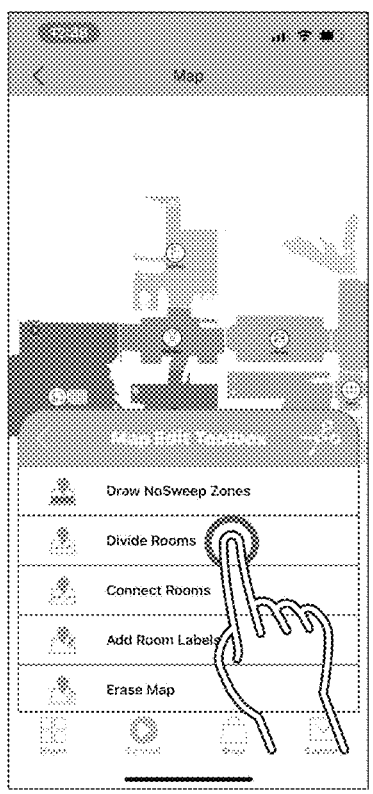
Figure 156B:
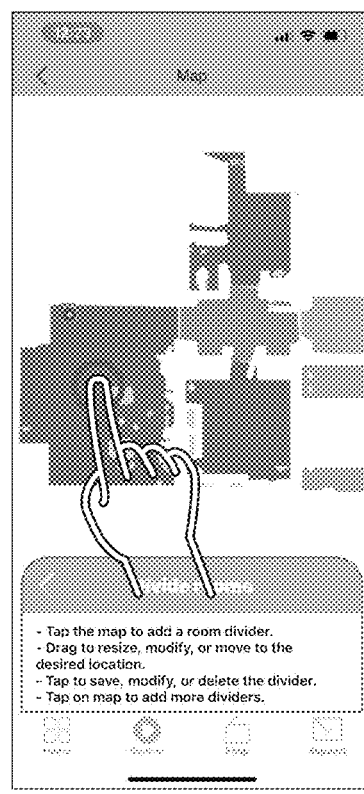
Figure 156C:
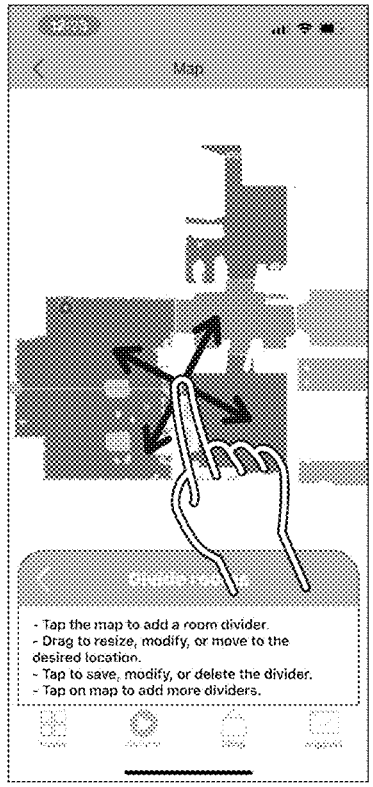
Figure 156D:
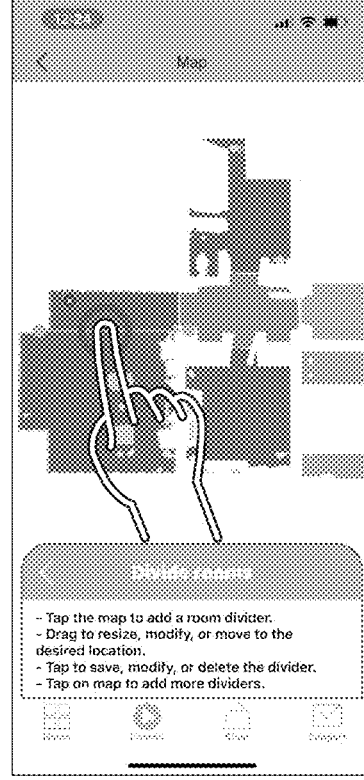
Figure 156E:
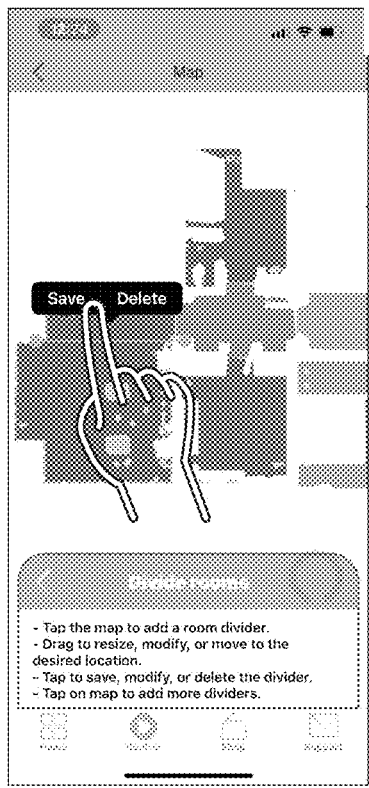
Figure 156F:
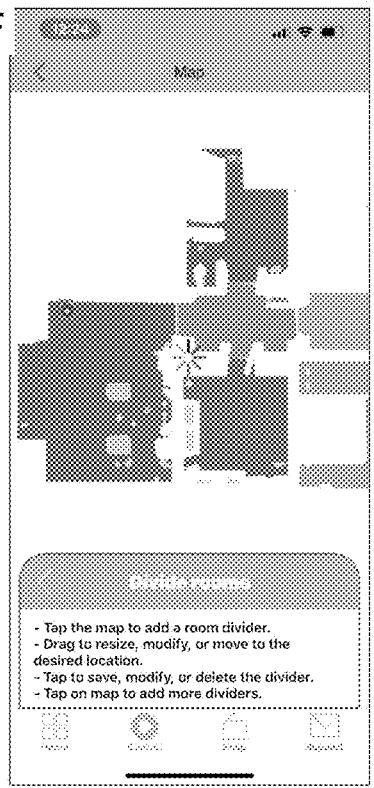
Figure 156G:
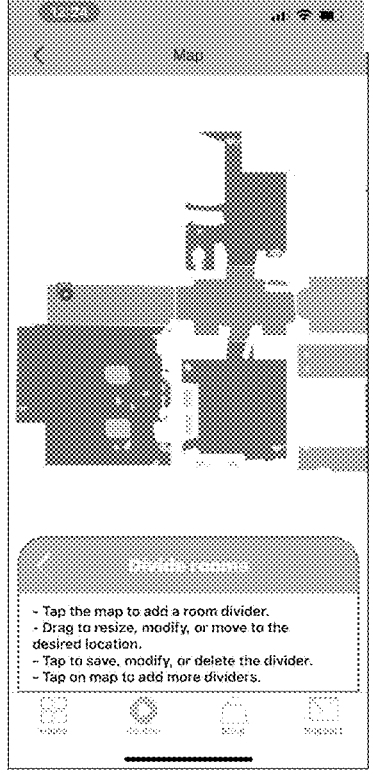

In cases where the processor of the robot or the application incorrectly colored two or more rooms as one large room or the user wants to partition a room, the user may use the application to divide the environment as desired. The user may use the application to select divide rooms from the map edit toolbox. Then, the user may select a room by tapping on the room within the map, upon which a room divider line appears over the selected room within the map. The user may drag each end of the line to adjust its size and position the line in the desired location. Once in the right location, the user may tap on the divider, upon which a pop up appears prompting the user to save or delete the line. When the save option is selected, the selected room is divided into two separate rooms according to the location and orientation of the line. Each room is distinguished with a different color. When the delete option is selected the line is deleted. The user may draw another line or select back to go back to the map edit toolbox and choose a different command. If the line crosses several rooms, only the initial selected room is divided. FIGS. 156A-156G illustrate the steps for dividing a room within the map. In FIG. 156A a user selects divide rooms from the map edit toolbox; in FIG. 156B the user selects a room to divide within the map; in FIG. 156C a line appears within the map over the selected room, wherein the user may resize, rotate, and move the line to place it in the desired location; in FIG. 156D the user taps on the line; in FIG. 156E a pop up menu appears with the options of save and delete; in FIG. 156F the user chooses save and the application starts to process and divide the room, wherein a displayed rotating icon indicates the division is in progress; in FIG. 156G the map is refreshed with the initially selected room divided into two rooms painted in different colors.

Figure 157A:
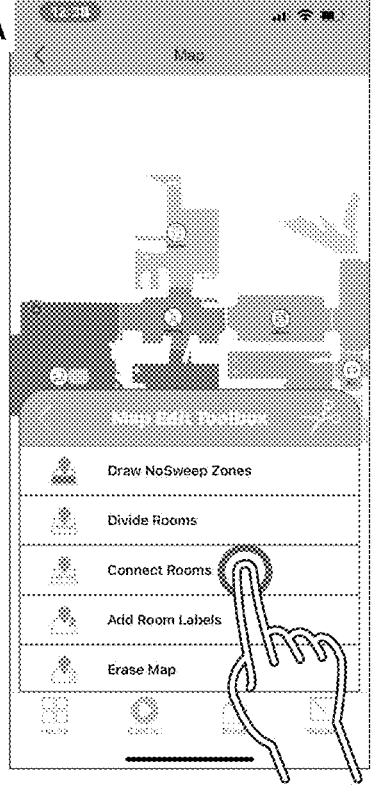
Figure 157B:
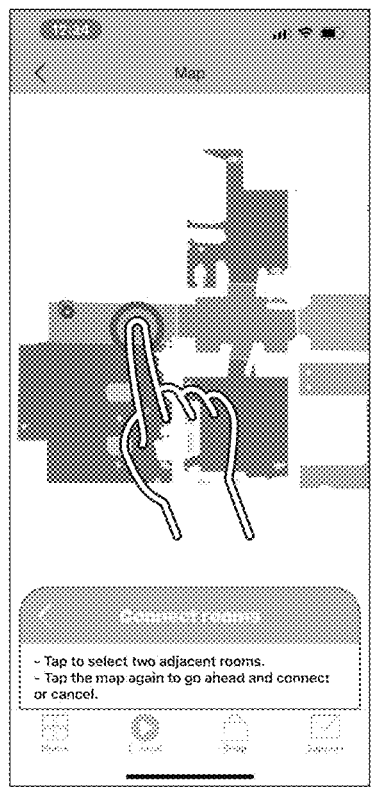
Figure 157C:
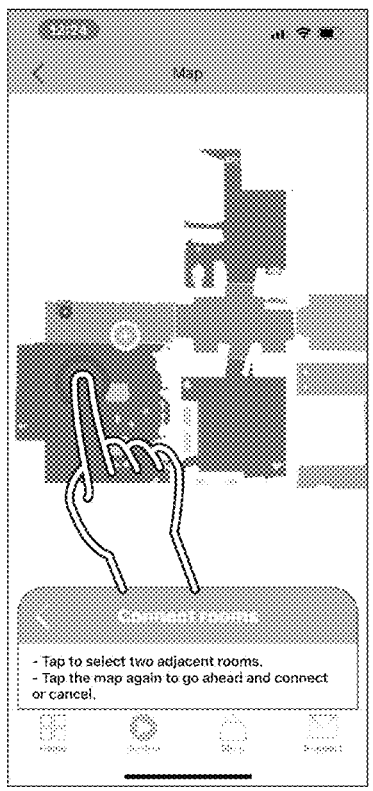
Figure 157D:
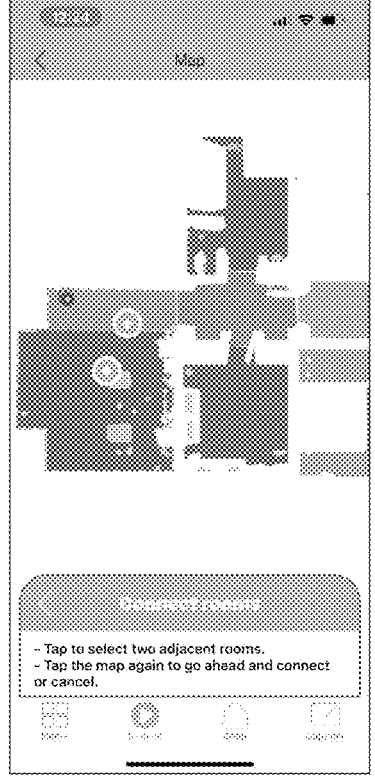
Figure 157E:
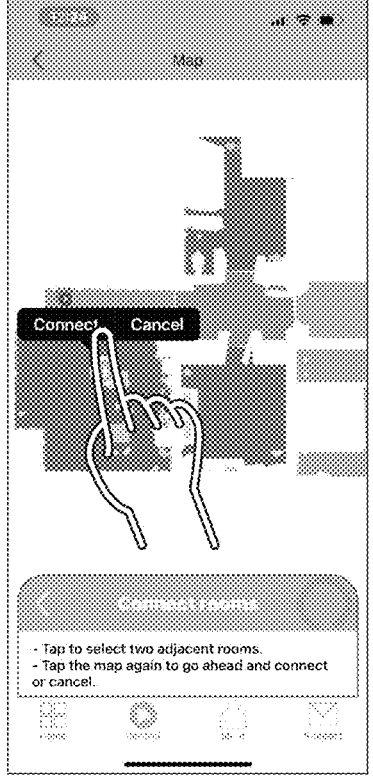
Figure 157F:
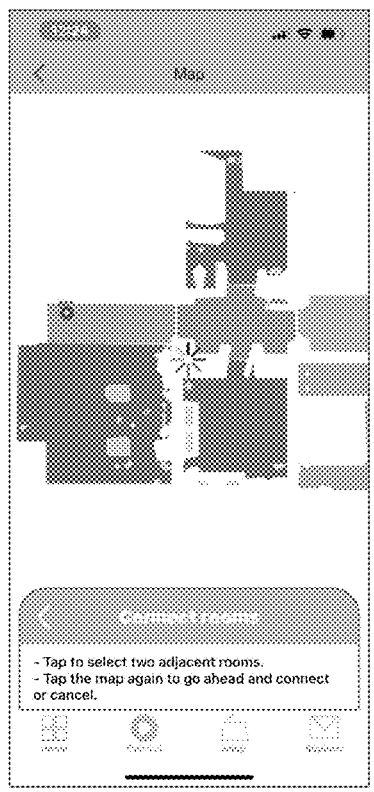
Figure 157G:
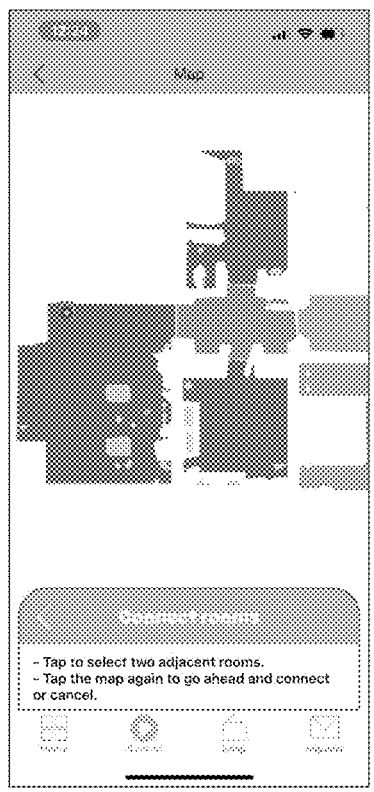

In cases wherein the user wants to connect two rooms within the map into one larger room or if the processor of the robot or the application incorrectly partitioned the environment, the application may be used to connect adjacent rooms to form one larger room. From the map edit toolbox, the user may select connect rooms. Then, the user may select two adjacent rooms within the map, upon which a pop up menu appears prompting the user to select to connect the two rooms or cancel. When connect is selected the application combines the two rooms to form a single room. When cancel is selected the application cancels the operation. When selecting the rooms to connect, a border and a plus icon appears over the selected rooms to highlight them. The user may select as many rooms as desired for combination into a single room. Once done, they user may select the back icon to go back to the map edit toolbox. FIGS. 157A-157G illustrate the steps for connecting rooms within the map. In FIG. 157A a user selects connect rooms from the map edit toolbox; in FIG. 157B the user taps on one of the rooms to connect; in FIG. 157C a plus icon appears on the selected room and the user may then select any room adjacent to the selected room; in FIG. 157D the user selects the second room and another plus icon appears on top of the second room; in FIG. 157E a pop up menu appears on top of the selected room prompting the user with options to connect and delete; in FIG. 157F the user selects connect and the application starts to process and connect the selected rooms, during which a rotating icon is displayed to indicate the process is in progress; in FIG. 157G the map is refreshed with the initially selected rooms connected to form a single room and painted in a new color.

Figure 158A:
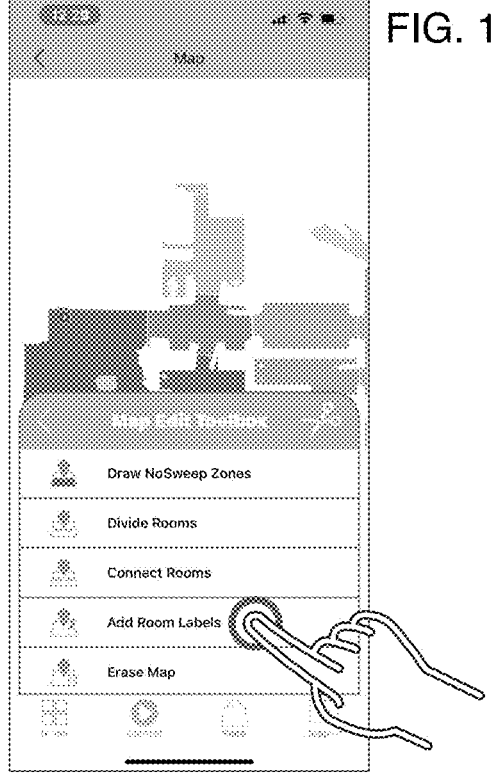
Figure 158B:
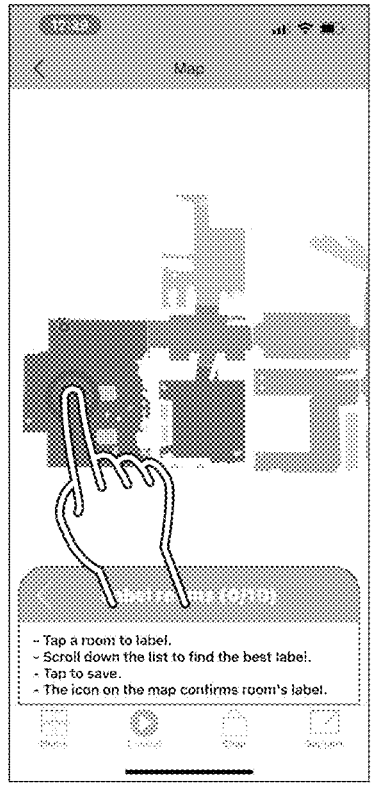
Figure 158C:
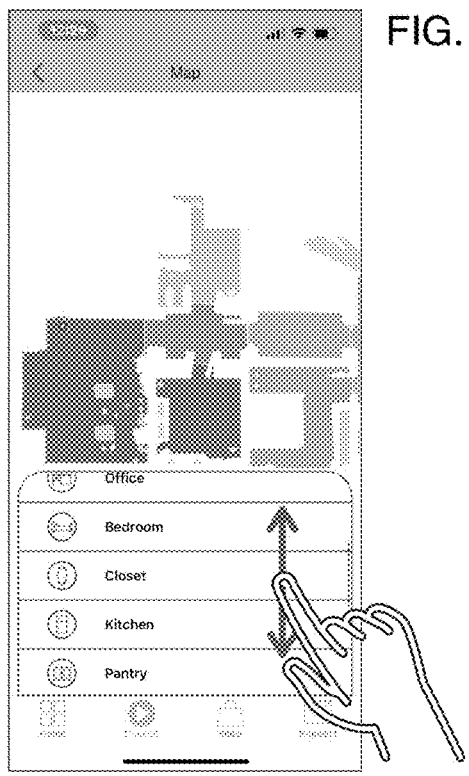
Figure 158D:
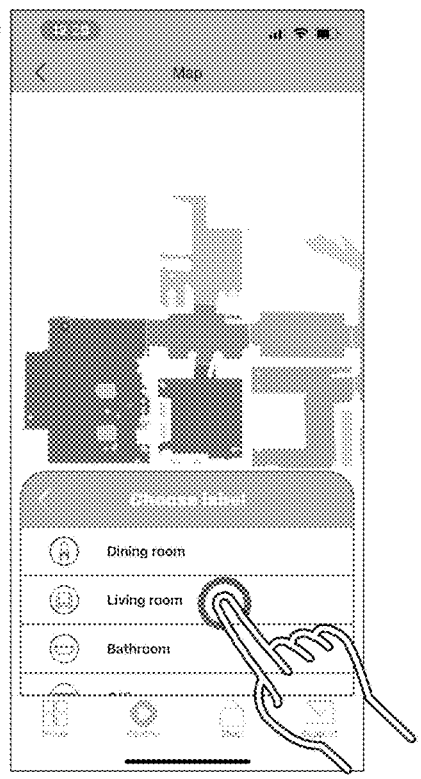
Figure 158E:
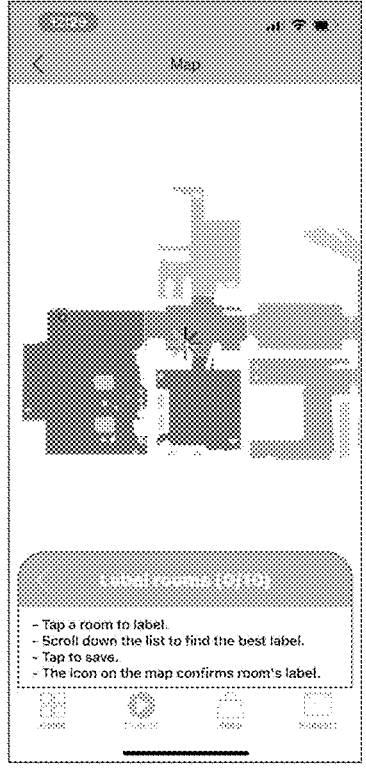
Figure 158F:
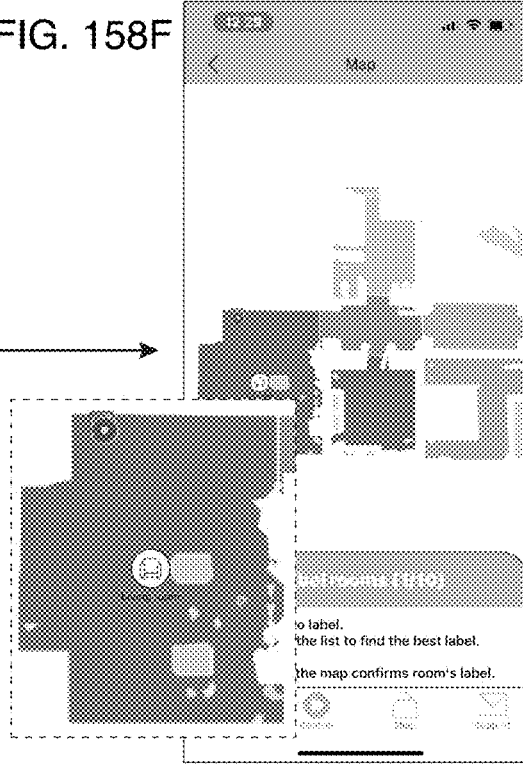

Assigning names or labels to rooms is useful for recognizing rooms and creating customized cleaning schedules. The user may use the application to select add room labels from the map edit toolbox. Then, the user may select the room to label and scroll through a displayed list of room names to find and select a best match. Within a few seconds, the application refreshes and the selected name of the room is displayed as an icon on the map. The application may display a number of labeled rooms and a total number of rooms. FIGS. 158A-158F illustrates steps for labeling a room. In FIG. 158A a user selects add room labels from the map edit toolbox; in FIG. 158B the user taps on the room within the map to label; in FIG. 158C a list of available labels appear and the user scrolls through the list to find a label best describing the room; in FIG. 158D the user selects a label for the room; in FIG. 158E the application starts processing and a wait indicator appears on the screen; and in FIG. 158F a label icon of the selected label appears on top of the room within the map.

Figure 159A:
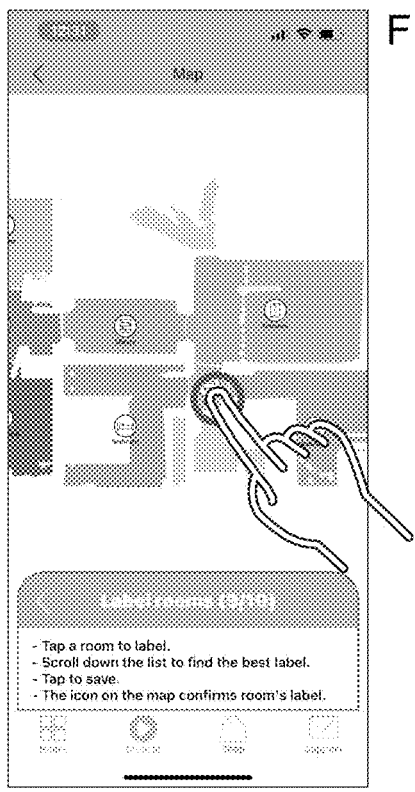
Figure 159B:
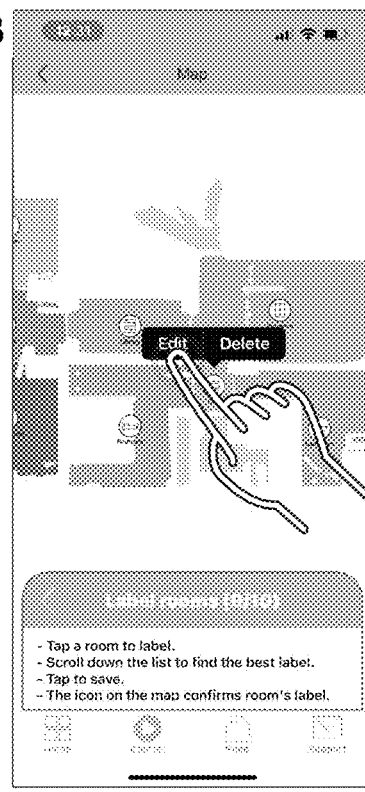
Figure 159C:
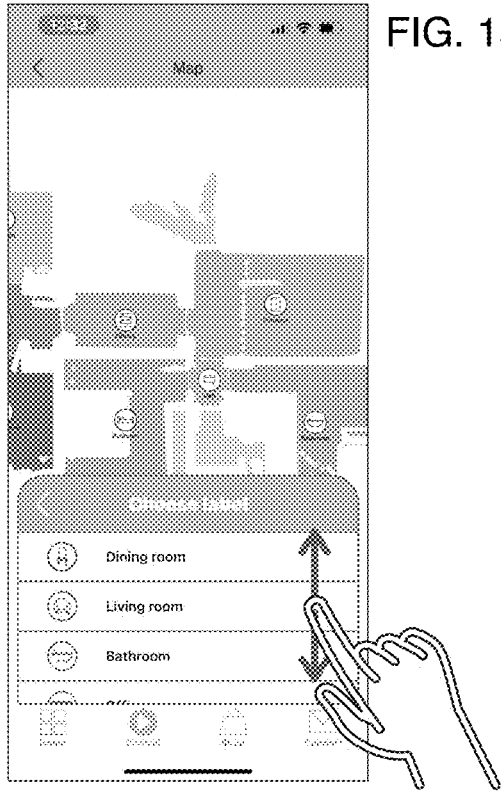
Figure 159D:
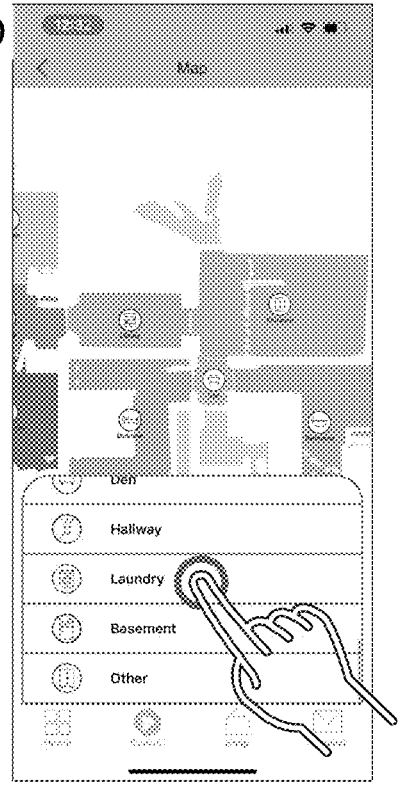
Figure 159E:
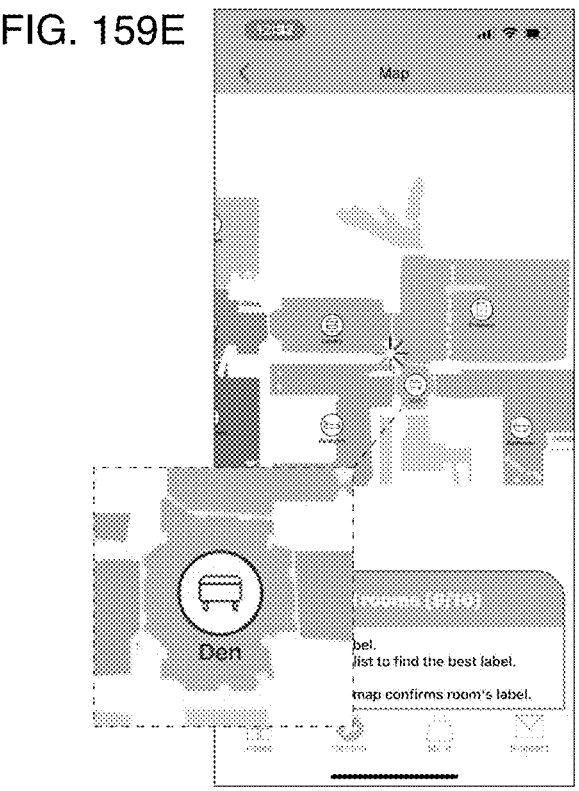
Figure 159F:
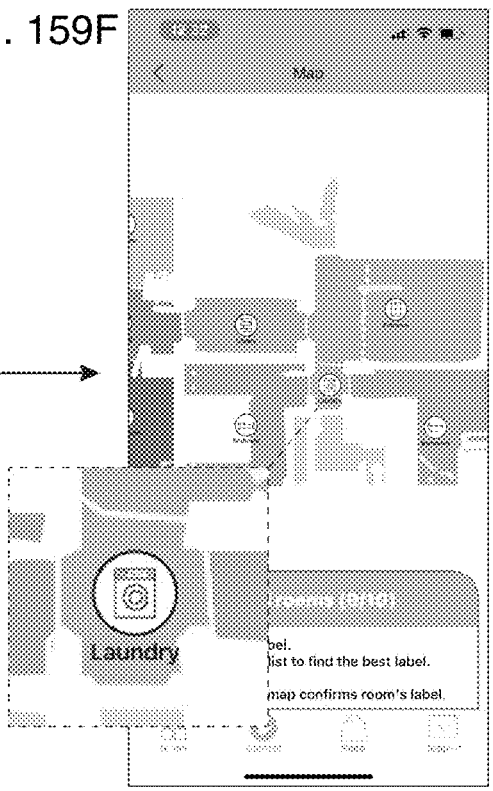
Figure 160:
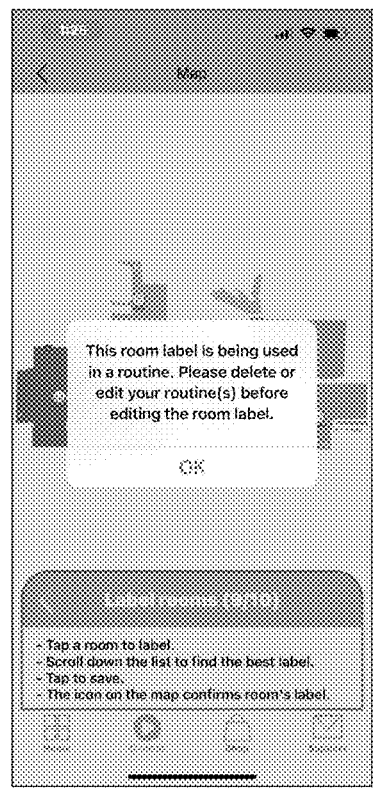

To update or delete a room label, the user may use the application to select a label icon, upon which a pop up menu with option to edit or delete the room label appears. FIGS. 159A-159F illustrate steps for editing an existing room label. In FIG. 159A a user taps on an existing label icon within the map while in the add room labels section of the map editing toolbox; in FIG. 159B a pop up menu appears with options of edit and delete, wherein selecting delete deletes the existing label icon of the room and selecting edit causes the list of available labels to appear on the screen; in FIG. 159C the user scroll through the list of labels to choose a label best describing the room; in FIG. 159D the user selects a new label for the room; in FIG. 159E the application starts processing and a wait indicator appears on the screen; and in FIG. 159F the new label icon appears on top of the room. If a room label is used for an active schedule, the application does not allow updates or deletion of the room label. Using the application, the schedule must be updated or deleted first before modifying the room label. FIG. 160 illustrates a message displayed by the application when a room label is used for an active schedule and the user attempts to update or delete the room label before editing or deleting the active schedule.

Figure 161A:
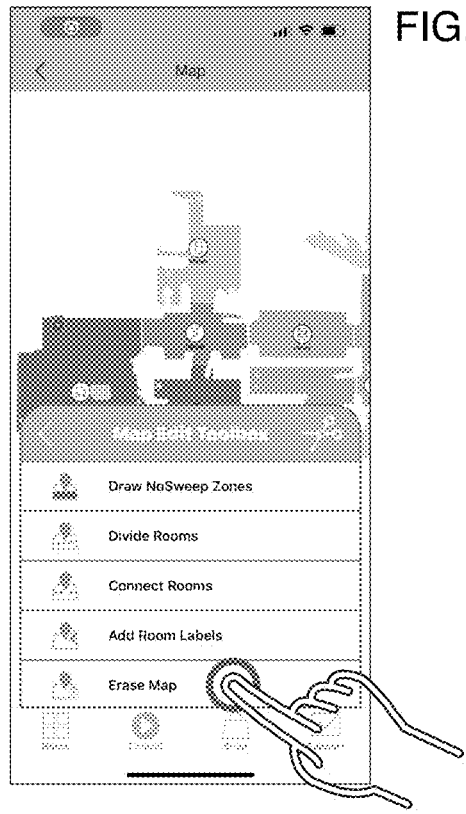
Figure 161B:
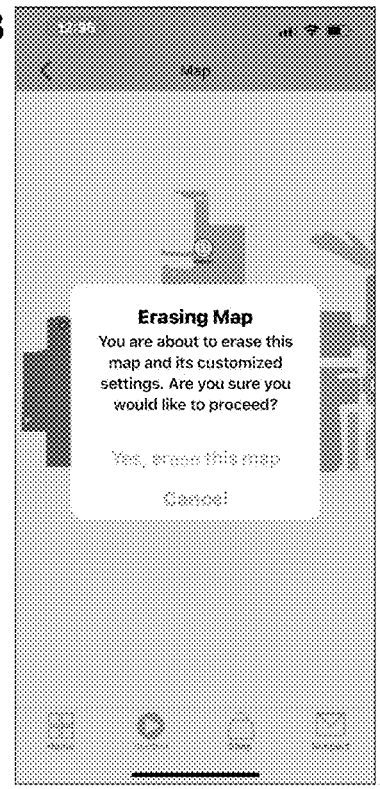

Sometimes the map may become distorted for some reason, such as when the user rearranges their furniture layout or moves to a new home. When the map appears significantly different from a floor plan of the environment, it may be best to delete the map and have the robot remap the house from scratch. This is often much faster than manually updating the map. To erase the map, the user may use the application to select erase map from the map edit toolbox. Upon selecting erase map, a pop up message appears informing the user that the map and map settings are going to be erased. The user is prompted to either confirm or cancel the operation. Once confirmed, the map is erased including schedule, room labels, and other map data. In FIG. 161A a user selects erase map from map edit toolbox; and in FIG. 161B the application displays a warning message before erasing the map and prompts the user for confirmation. When the user chooses yes, erase this map, the map and all of its customizations and schedules are deleted.

A settings page may be accessed from the main control page of the application by selecting a settings icon. Within the settings page, the user may set preferences for cleaning performance and update software of the robot. Cleaning preferences may include an option to mute the robot, wherein all audio messages and alerts are muted and a low power mode, wherein the robot cleans more quietly and for a longer amount of time. Another cleaning preference includes edge detection. By default, the robot detect edges on the floor, however, this causes the robot to avoid dark carpets as they are interpreted as a cliff. Disabling edge detection allows the robot to clean the dark carpets. Upon disabling this option within the application, a warning message may appear notifying the user that the robot can no longer detect stairs and edges and may fall upon approaching these obstacles. A note may also be displayed in the map page stating that edge detection is disabled.

Figure 162A:
Figure 162B:
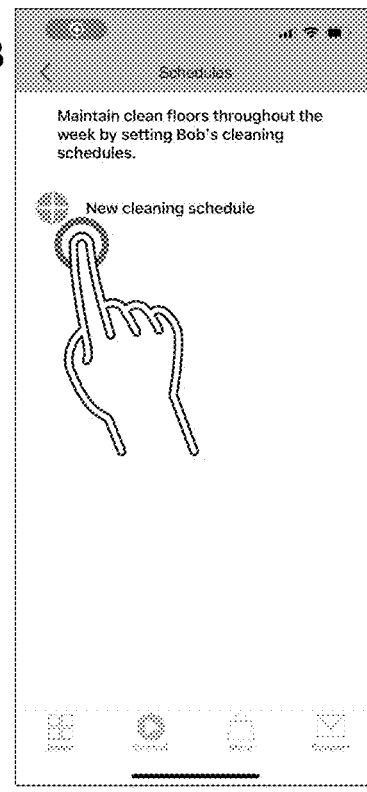
Figure 162C:
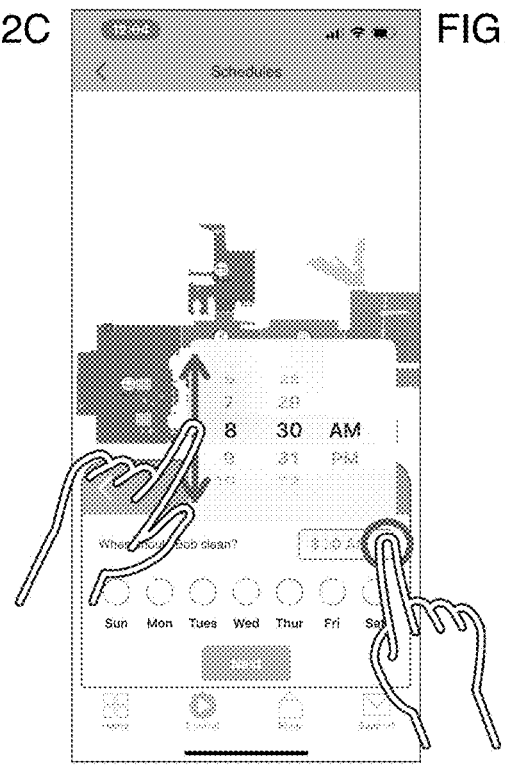
Figure 162D:
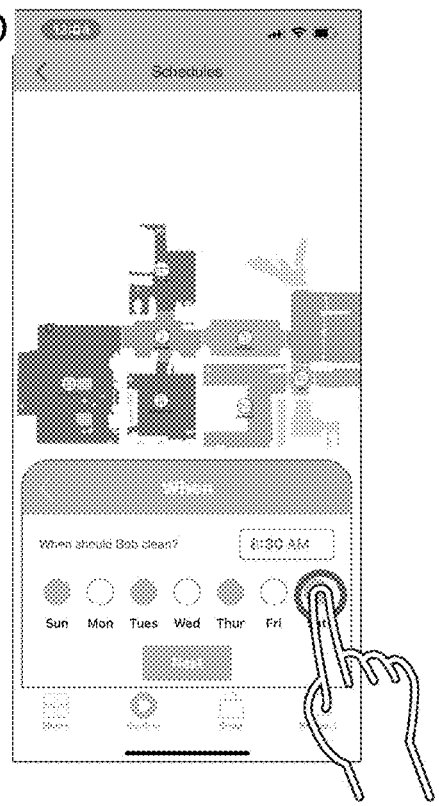
Figure 162E:
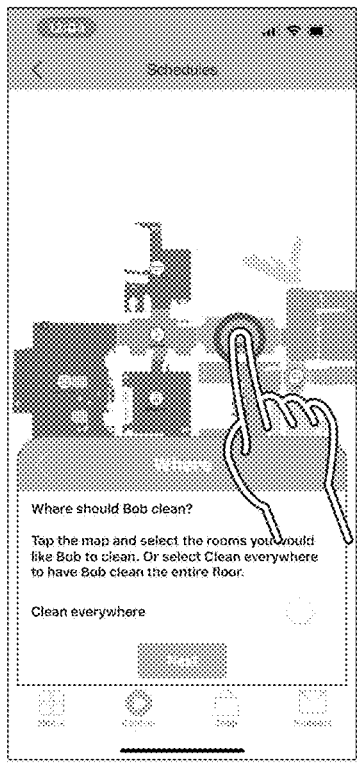
Figure 162F:
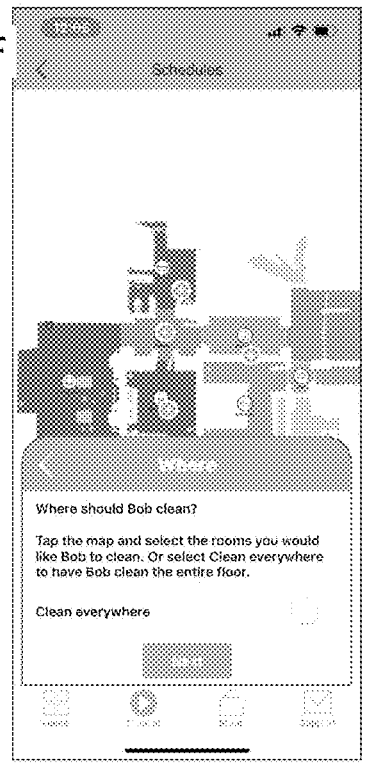
Figure 162G:
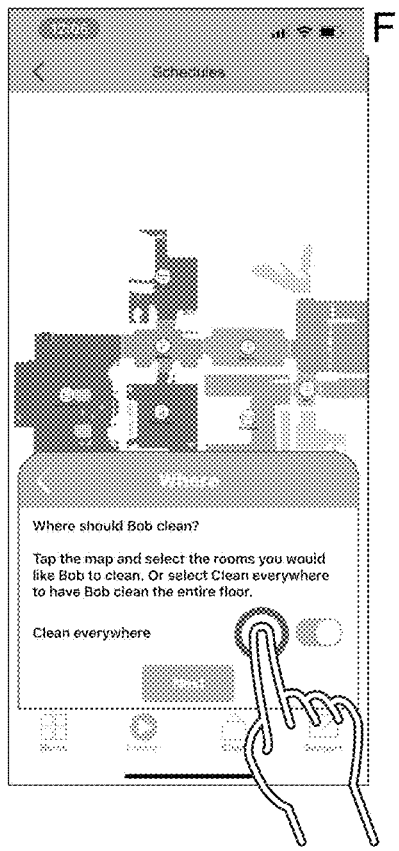
Figure 162H:
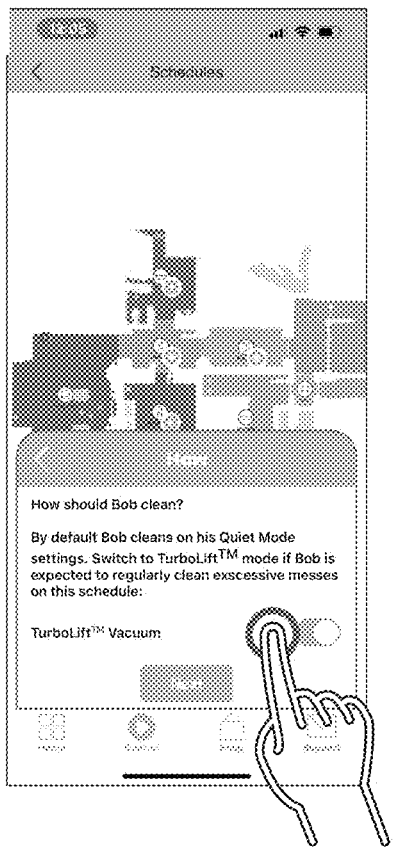
Figure 162I:
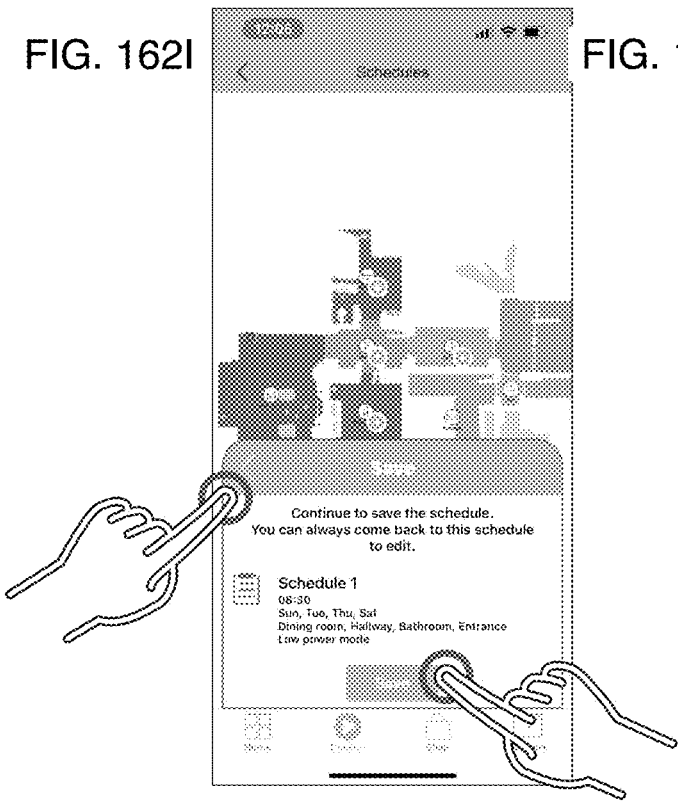
Figure 162J:

A schedule page may be accessed from the main control page of the application by selecting a schedule button. Within the schedule page the user may schedule a weekly routine for the robot to perform a cleaning task by creating a new cleaning schedule. Once the robot is connected to Wi-Fi and map review and edit is complete, the application may be used to set schedules for the robot. The user may use the application to select the schedule button on the main control page. Then the user may select new cleaning schedule, upon which the application redirects to a next page from which the user may select a time of the day and days of the week for cleaning. Once the time and days are selected, the user may select next, upon which the application redirects to a next page from which the user may select the rooms to be cleaned for the selected days and times. Using the map, the user may select as many rooms as desired for the schedule. If a selected room is unlabeled, the application may prompt the user to label the room first. Alternatively, the user may select clean everywhere wherein the robot cleans the entire map. After selecting the rooms, the user may select next, upon which the application redirects to a next page from which the user may select different cleaning modes for the schedule. By default the robot cleans in quiet mode or using low power settings. The user may select turboLift (or high power settings) for the robot to use more power while cleaning. On a next page, the user may review the schedule summary and save the schedule. The user may select a back button to return to previous pages and make modifications. Once saved, the application automatically assigns a numerical value to the new schedule and the user can view the schedule summary on the screen. FIGS. 162A-162J illustrate a process for setting a schedule for the robot. In FIG. 162A a user selects a schedule button from the main control page; in FIG. 162B the application redirects to a schedule page wherein existing schedules are displayed and from which a user selects a button to create a new cleaning schedule; in FIG. 162C the application redirects to a next page from which the user may set times and dates for the schedule, wherein the user may tap on a time dial and user their finger to set a specific time; in FIG. 162D the user may select days of the week the robot is to perform cleaning at the specified time, then select next to be redirected to a next page; in FIG. 162E the user specifies rooms the robot is to clean during the selected days and times; in FIG. 162F each selected room is highlighted by a border and a plus icon, then selects next to be redirected to a next page (in FIG. 162G the user alternatively selects clean everywhere, wherein the robot clean the entire map during the selected days and times); in FIG. 162H the user selects whether the robot is to perform cleaning in low power or full power mode, then selects next to be redirected to a next page; in FIG. 162I the user reviews a schedule summary and selects save or back to return to previous pages and edit the schedule; in FIG. 162J the application assigns a numeric value to the saved schedule and displays the schedule in the schedule page of the application.

Figure 163A:
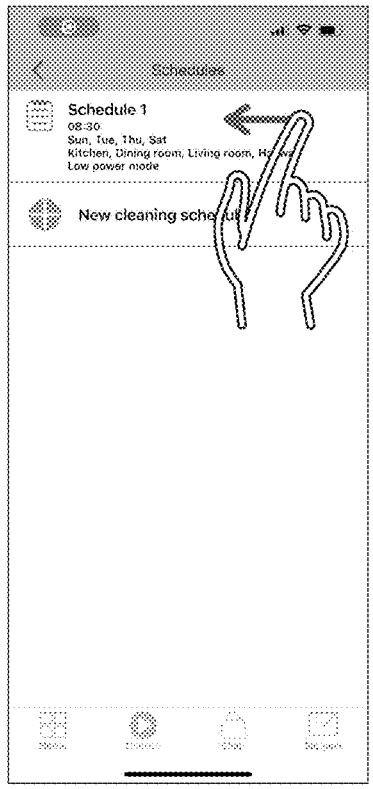
Figure 163B:
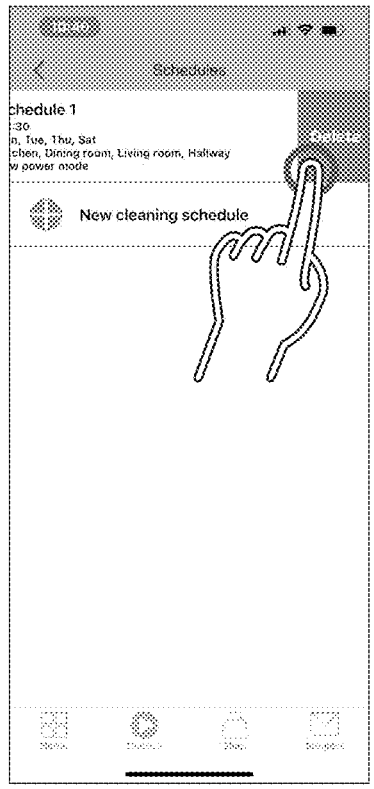
Figure 164A:
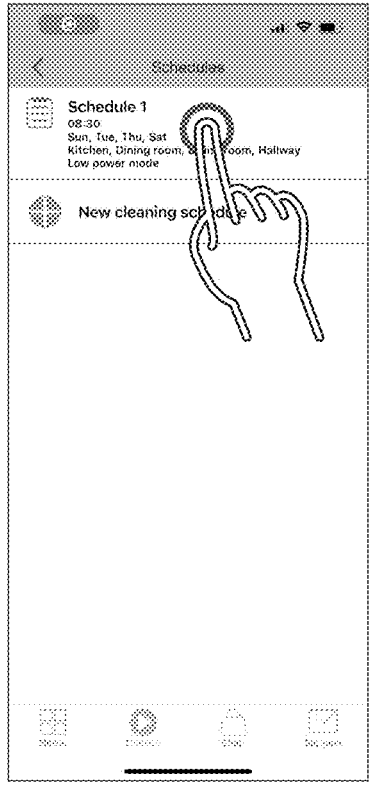
Figure 164B:
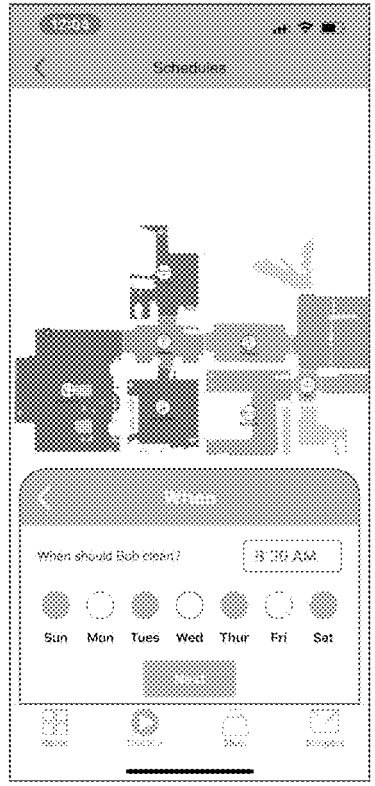

To delete a schedule, the user may touch the schedule while swiping left, prompting a delete option to appear, then select delete, as illustrated in FIGS. 163A and 163B. To edit a schedule, the user may select a schedule from the schedule page. FIG. 164A illustrates the user tapping on the schedule and FIG. 164B illustrates the application then directing to a first page of setting a new schedule. When the user deletes the robot from the application, deletes room labels from the map, erases the map, or hard resets the robot, all scheduled cleanings are deleted as well.

Figure 165C:
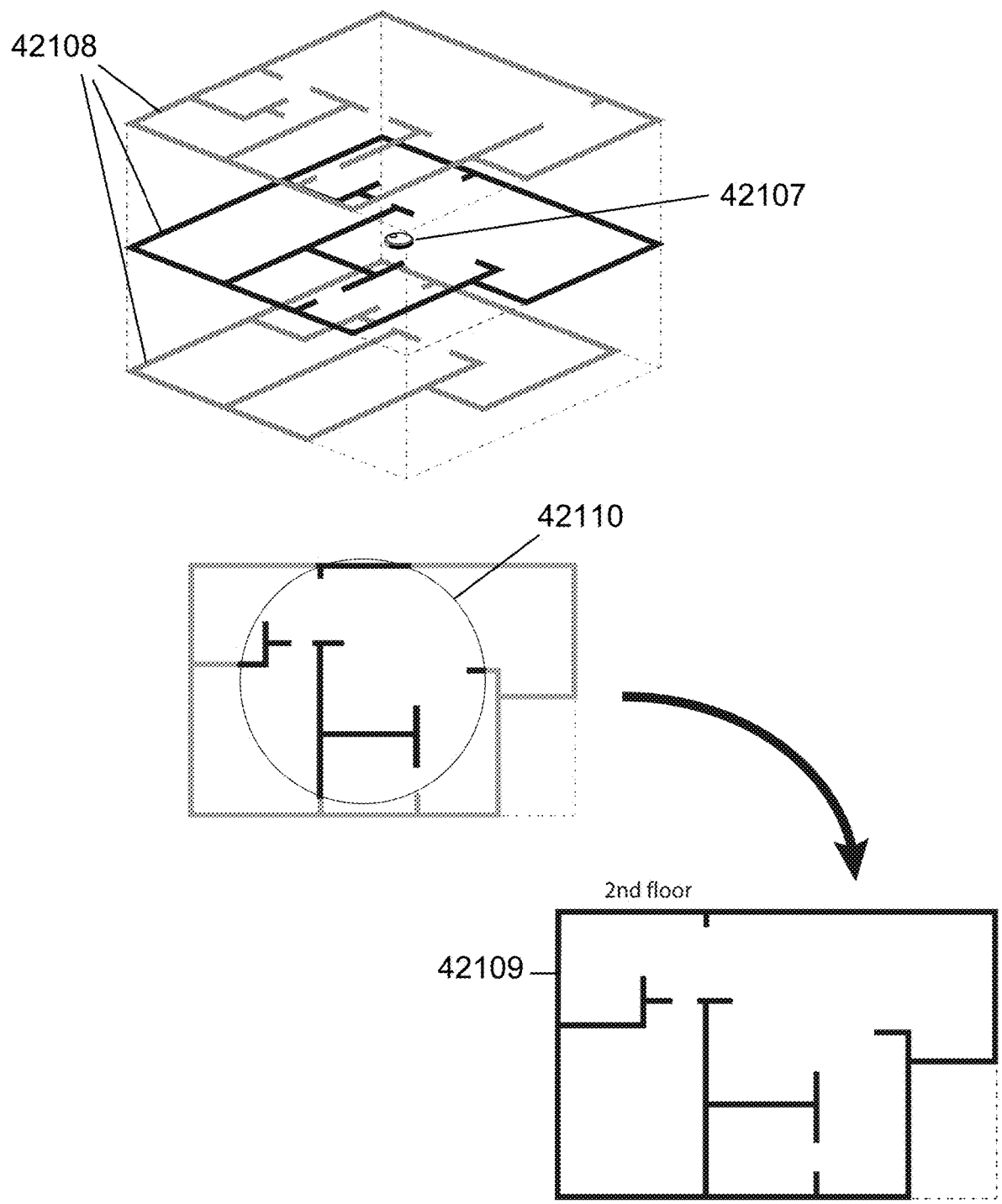
FIG. 165C illustrates the robot may have maps of several floors in the memory.

In some embodiments, the application may be used to display the map and manipulate areas of the map. Examples are shown and explained in FIGS. 165A-165B. In FIG. 165A a user 42100 may draw lines 42101 in the app to split the map 42102 into separate sections 42103 and 42104. These lines will automatically become straight and will be extended to closest walls. In FIG. 165B In the app charging station 'zone' may be drawn by colored or dotted lines 42105 indicating the IR beams emitting from the station 42106. User may guide the robot 42107 to this zone for it to find the station 42106. In FIG. 165D robot 42107 may have maps 42108 of several floors in the memory. when the user put it in second floor 42109, it can recognize the floor by initial mapping 42110 and load performing strategies based on that second floor 42109. FIG. 165E illustrates the user ordering the robot to clean different zones by selecting different strategies 42111 on an application 42112 of a communication device 42113.

In embodiments, a user may add virtual walls, do not enter zones or boxes, do not mop zones, do not vacuum zones, etc. to the map using the application. In embodiments, the user may define virtual places and objects within the map using the application. For example, the user may know its cat has a favorite place to sleep. The user may virtually create the sleeping place of the cat within the map for convenience. For example, FIG. 166 illustrates an example of a map displayed by the application and a virtual dog house 42200 and a virtual rug 42201 added to the map by a user. In some cases, the user may specify particular instructions relating to the virtual object. For instance, the user may specify the robot is to avoid the edges of the virtual rug 42201 as its tassels may become intertwined with the robot brush. While there is no dog house in the real world the virtual dog house implies certain template profile instructions that may be configured or preset, which may be easier or more useful than plainly blocking the area out. When a map and virtual reconstruction of the environment is shared with other devices in real time, a virtual object such as rug having one set of corresponding actions for one kind of robot may have a different set of corresponding actions for a different robot. For example, a virtual rug created at a certain place in the map may correspond to actions such as vacuum and sweep the rug but remain distant from the edges of the rug. As described above, this may be to avoid entanglement with the tassels of the rug. This is shown in FIG. 167A. For a mopping robot, the virtual rug may correspond to actions such as avoid the entire rug. This is shown in FIG. 167B. For a service robot, the virtual rug may not correspond to any specific instructions. This example illustrates that a virtual object may have advantages over manually interacting with the map.

In some embodiments, a user may manually determine the amount of overlap in coverage by the robot. For instance, when the robot executes a boustrophedon movement path, the robot travels back and forth across a room along parallel lines. Based on the amount of overlap desired, the distance between parallel lines is adjusted, wherein the distance between parallel lines decreases as the amount of desired overlap increases. In some embodiments, the processor determines an amount of overlap in coverage using machine learning techniques. For example, the processor may increase an amount of overlap in areas with increase debris accumulation, both historically and in a current work sessions. For example, FIG. 168 illustrates no overlap 42400, medium overlap 42401, high overlap 42402, and dense overlap 42403. In some cases, an area may require a repeat run 42402. In some embodiments, such symbols may appear as quick action buttons on an application of a communication device paired with the robot. In some embodiments, the processor may determine the amount of overlap in coverage based on a type of cleaning of the robot, such as vacuuming, mopping, UV, mowing, etc. In some embodiments, the processor or a user may determine a speed of cleaning based on a type of cleaning of the robot. For example, the processor may reduce a speed of the robot or remain still for a predetermined duration on each 30 cm×30 cm area during UV cleaning.

In some embodiments, the application of a communication device may display a map of the environment. In some embodiments, different floor types are displayed in different color, textures, patterns, etc. For example, the application may display areas of the map with carpet as a carpet-appearing texture and areas of the map with wood flooring with a wood pattern. In some embodiments, the processor determines the floor type of different areas based on sensor data such as data from laser sensor or electrical current drawn by a wheel or brush motor. For example, the light reflected back from a laser sensor emitted towards a carpet is more distributed than the light reflected back when emitted towards hardwood flooring. Or, in the case of electrical current drawn by a wheel or brush motor, electrical current drawn to maintain a same motor speed is increased on carpet due to increased resistance from friction between the wheel or brush and the carpet.

In some embodiments, a user may provide an input to the application to designate floor type in different areas of the map displayed by the application. In some embodiments, the user may drop a pin in the displayed map. In some embodiments, the user may use the application to determine a meaning of the dropped pin (e.g., extra cleaning here, drive here, clean here, etc.). In some embodiments, the robot provides extra cleaning in areas in which the user dropped a pin. In some embodiments, the user may drop a virtual barrier in the displayed map. In some embodiments, the robot does not cross the virtual barrier and thereby keeps out of areas as desired by the user. In some embodiments, the user may use voice command or the application of the communication device to instruct the robot to leave a room. In some embodiments, the user may physically tap the robot to instruct the robot to leave a room or move out of the way.

In some embodiments, the application of the communication device displays different rooms in different colors such that may be distinguished from one another. Any map with clear boundaries between regions requires only four colors to prevent two neighboring regions from being colored alike.

In some embodiments, a user may use the application to request dense coverage in a large area to be cleaned during a work session. In such cases, the application may ask the user if they would like to split the job into two work sessions and to schedule the two sessions accordingly. In some embodiments, the robot may empty its bin during the work sessions as more debris may be collected with dense coverage.

Figure 169:
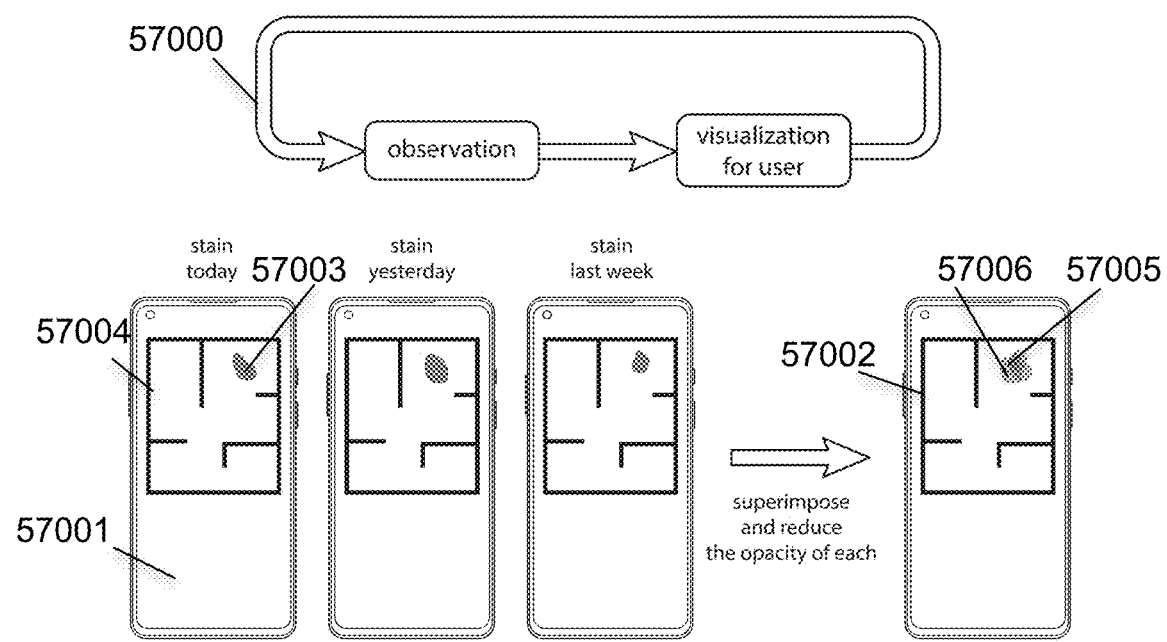
FIG. 169 illustrates an observation and visualization loop.

In some embodiments, observations captured by sensors of the robot may be visualized by a user using an application of a communication device. For instance, a stain observed by sensors of the robot at a particular location may be displayed in a map of the environment at the particular location it was observed. In some embodiments, stains observed in previous work sessions are displayed in a lighter shade and stain observed during a current work session are displayed in a darker shade. This allows a user to visualize areas in which stains are often observed and currently observed. FIG. 169 illustrates an observation and visualization loop 57000 and an application 57001 of a communication device 57002 displaying a stain 57003 in a map 57004 observed at different times. The current observed stain is displayed in a darker shade 57005 while those previously observed are displayed in a lighter shade 57006.

Figure 170:
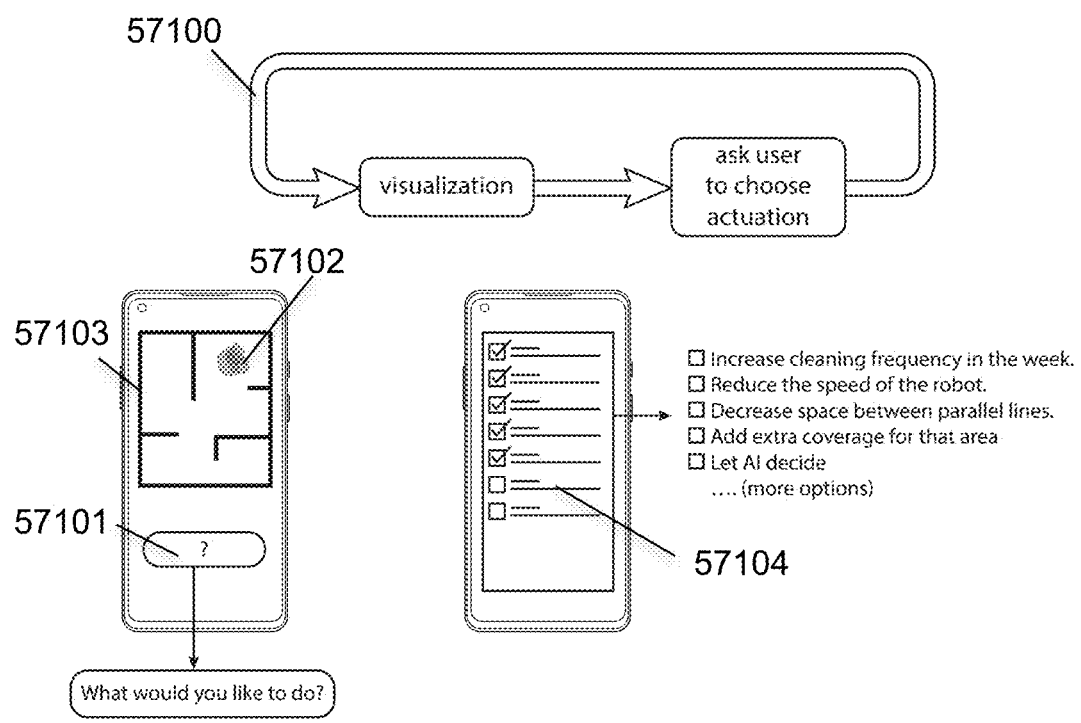
FIG. 170 illustrates a visualization and user-chosen actuation loop.

In some embodiments, the user may choose an actuation based on the visualization displayed to the user, such as observed locations of stains or high debris accumulation. Examples of actuations include increasing cleaning frequency, reducing the speed of the robot, decrease a distance between parallel lines in the robot path or increasing coverage overlap, adding extra coverage for an area, autonomous AI actuation, etc. FIG. 170 illustrates a visualization and user-chosen actuation loop 57100, a button 57101 that may be displayed below the visualization of a stain 57102 in a map 57103 and used by a user to select one or more actuations 57104.

Figure 171:
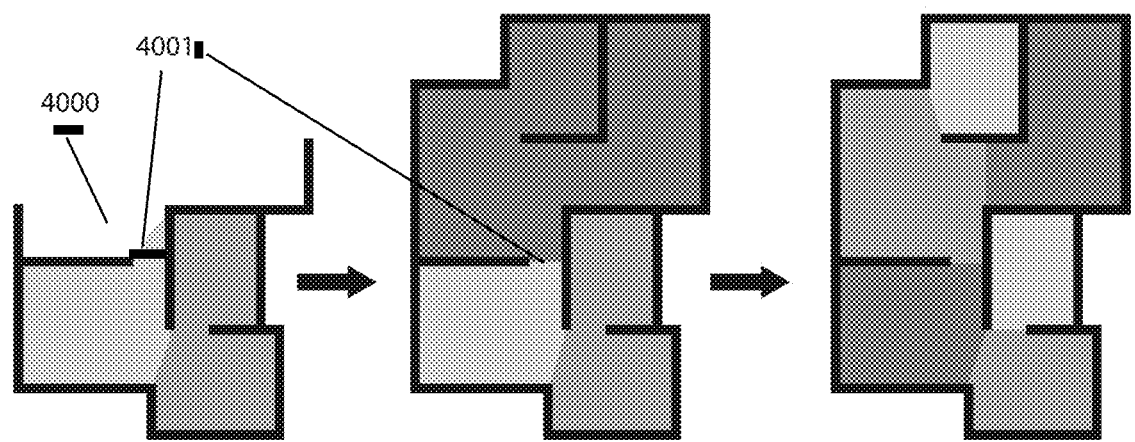
FIGS. 171-175 illustrate examples of adjusting and real-locating room division of a map in real time and using an application.
Figure 172:
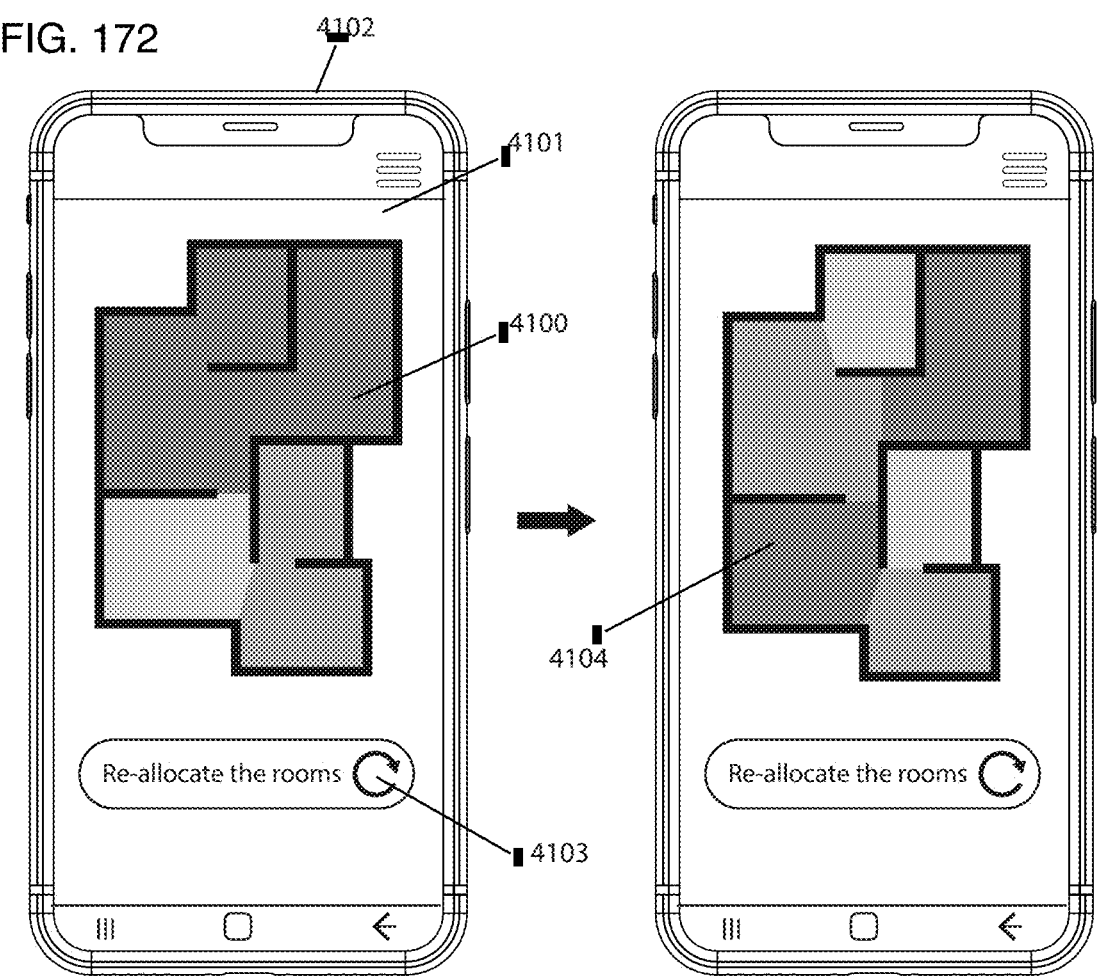
Figure 173:
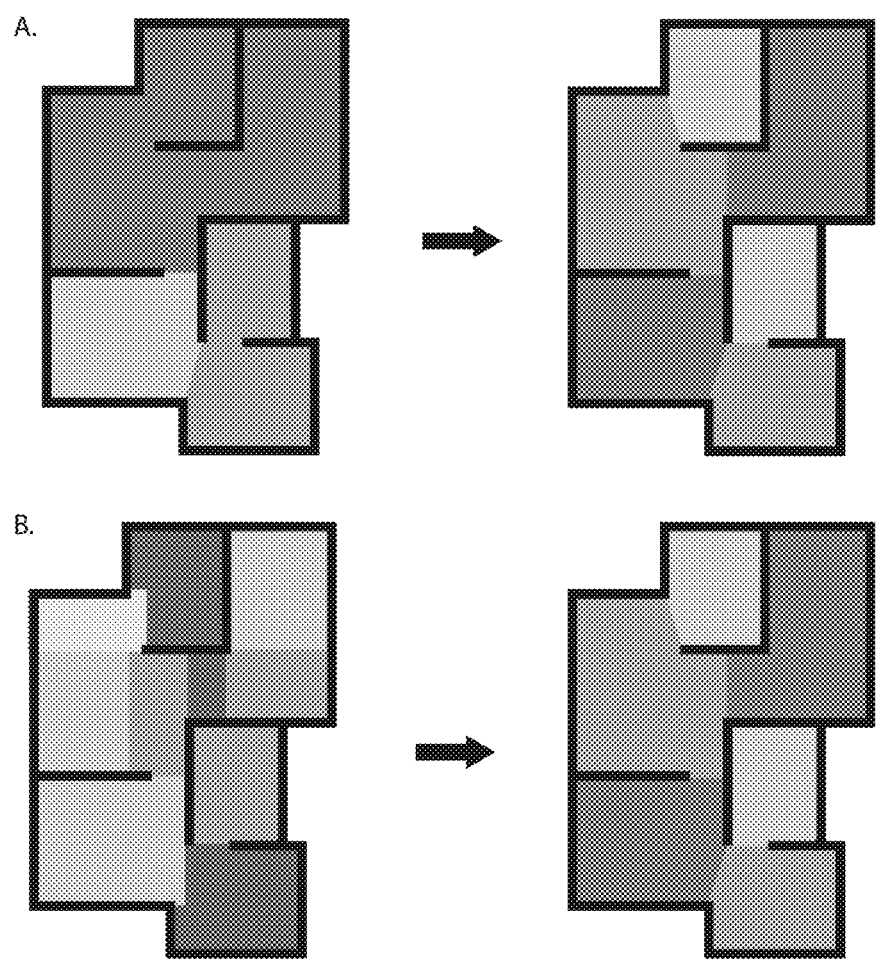
Figure 174:
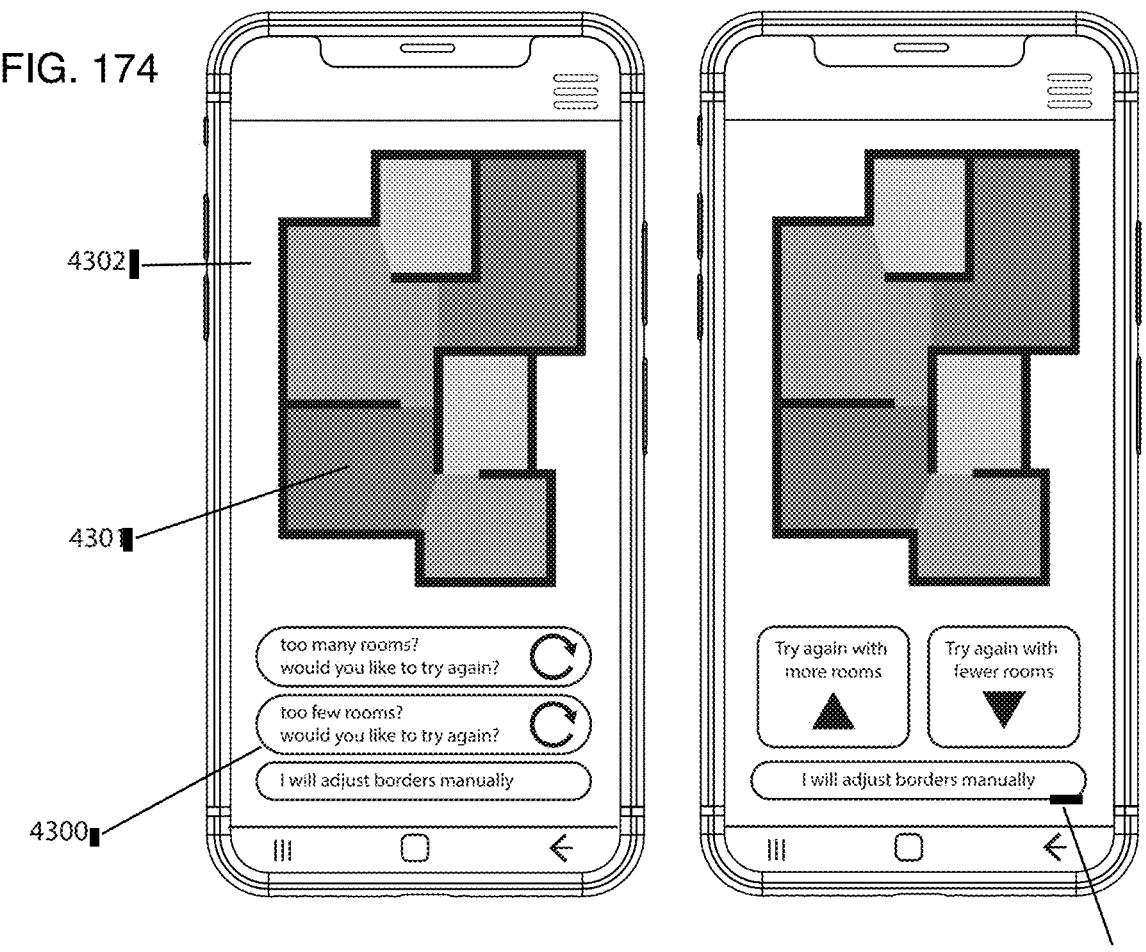
Figure 175:
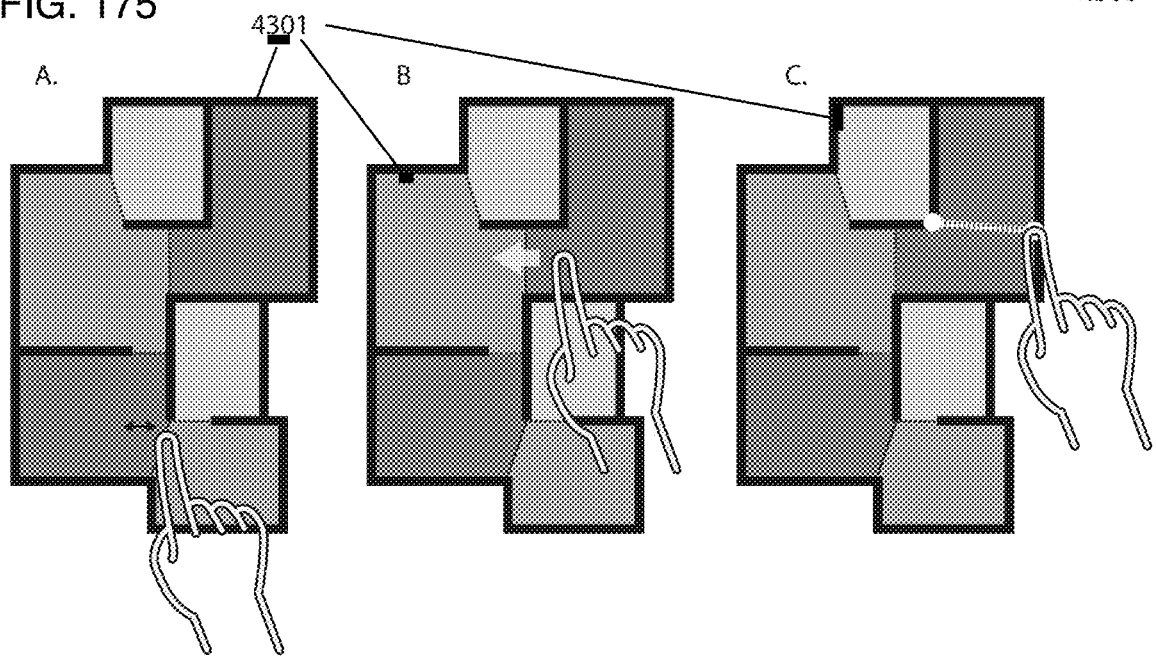

After the first work session, upon observing the entire work area, the processor of the robot obtains a better understanding of the environment and adjusts the room divisions automatically. This is illustrated in FIG. 171, wherein the map 4000 progressively expands to include the entire working area and the dividers 4001 dividing the map 4000 are correspondingly adjusted as a better understanding of the environment is obtained by the processor. In some embodiments, a user may use an application of a communication device paired with the robot to re-allocate the division of rooms. FIG. 172 illustrates a map 4100 with an initial division displayed on an application 4101 of a communication device 4102. A user may use a touch screen to provide an input to re-allocate the rooms by touching icon 4103. As a result, the application determines a new and different layout for room division displayed in map 4104. In some cases, the processor of the robot may choose to adjust the room division based on a number and size of rooms. Two examples (A and B) of an adjustment of room division are illustrated in FIG. 173. If there are too few rooms, the processor may divide the map to include more rooms for better separation (A) or if there are too many rooms, the processor may merge some rooms to generate a better layout (B). In one embodiment, the application may provide an option to re-allocate the rooms such that the room division include more or fewer rooms or to manually re-allocate the rooms, as illustrated in FIG. 174. Icons 4300 may be used to re-allocate the rooms in map 4301 displayed by the application 4302 such that the room division include more or fewer rooms or to manually re-allocate the rooms. FIG. 175 illustrates action a user may take in manually dividing the map 4301. The application displays borders of each room that the user may manipulate by dragging (A and B), rotating, and deleting. The user touch and hold their finger on a room for the application to display an option to merge the room with an adjacent room. The user may also draw new lines (C) to split a room into two rooms.

Figure 176:
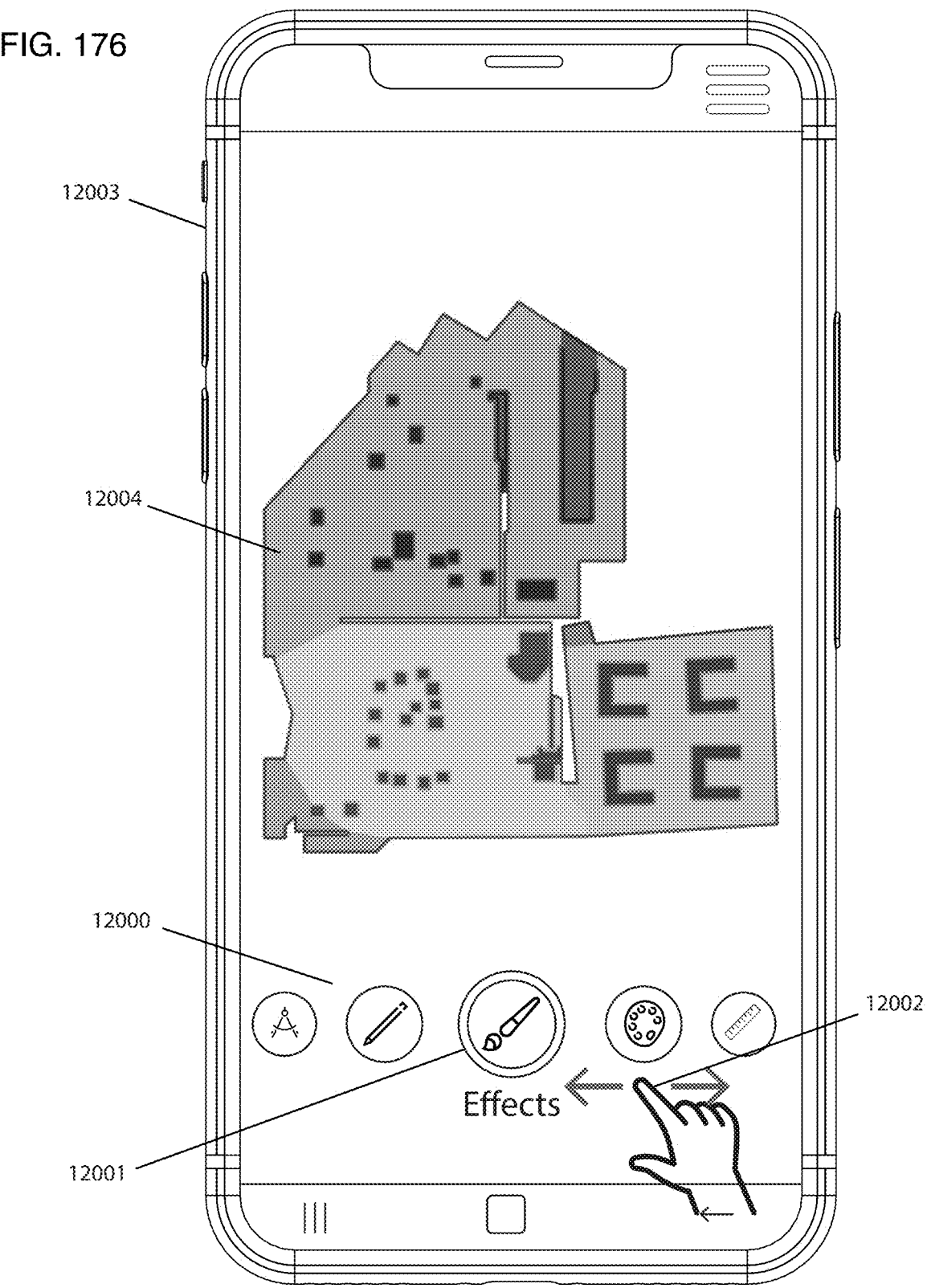
FIG. 176 illustrates an example of a user interface of an application from which effects and styles are selected.

The application may be used to cycle through different possible effects and/or preview the map based on the effect and choose the desired effect for presentation of the map. FIG. 176 illustrates an example of the application user interface 12000 including effect and style icons 12001 that a user may cycle through by swiping their finger 12002 along the screen of the smart phone 12003. The application displays the map 12004 in the selected style.

Figure 178:
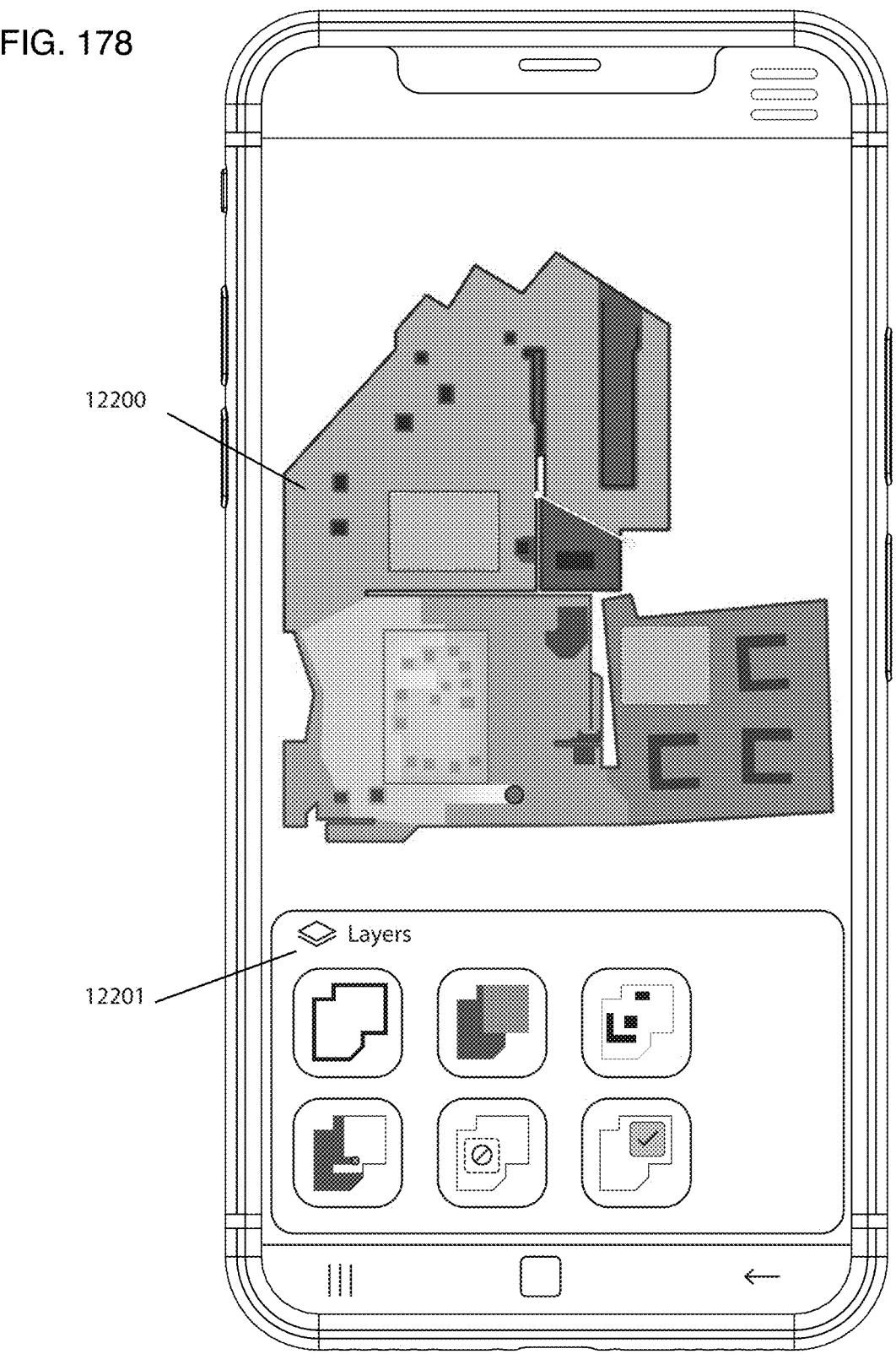
FIGS. 178-181 illustrate examples of a user interface of an application used to select layers.
Figure 179:
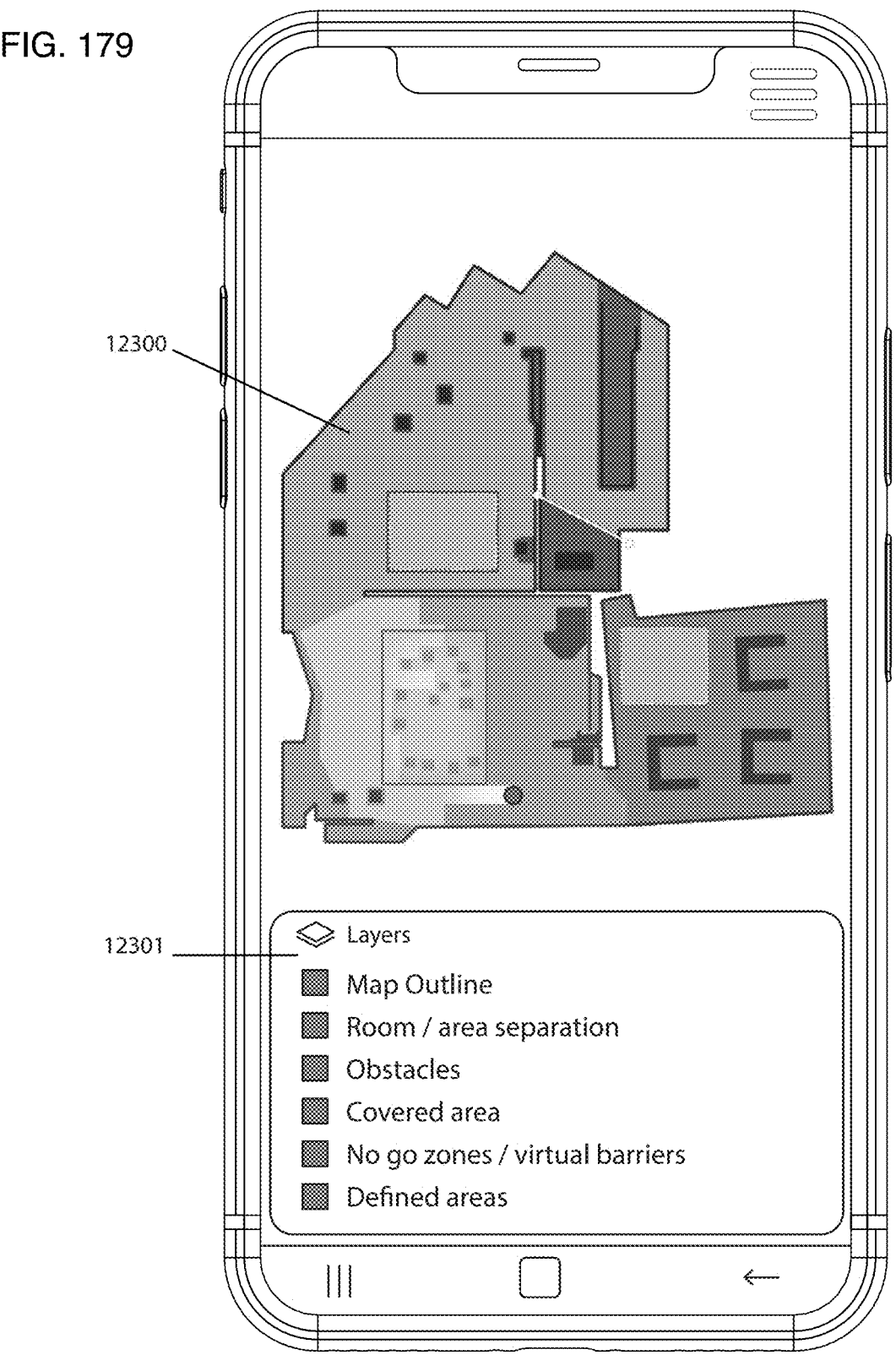
Figure 180:
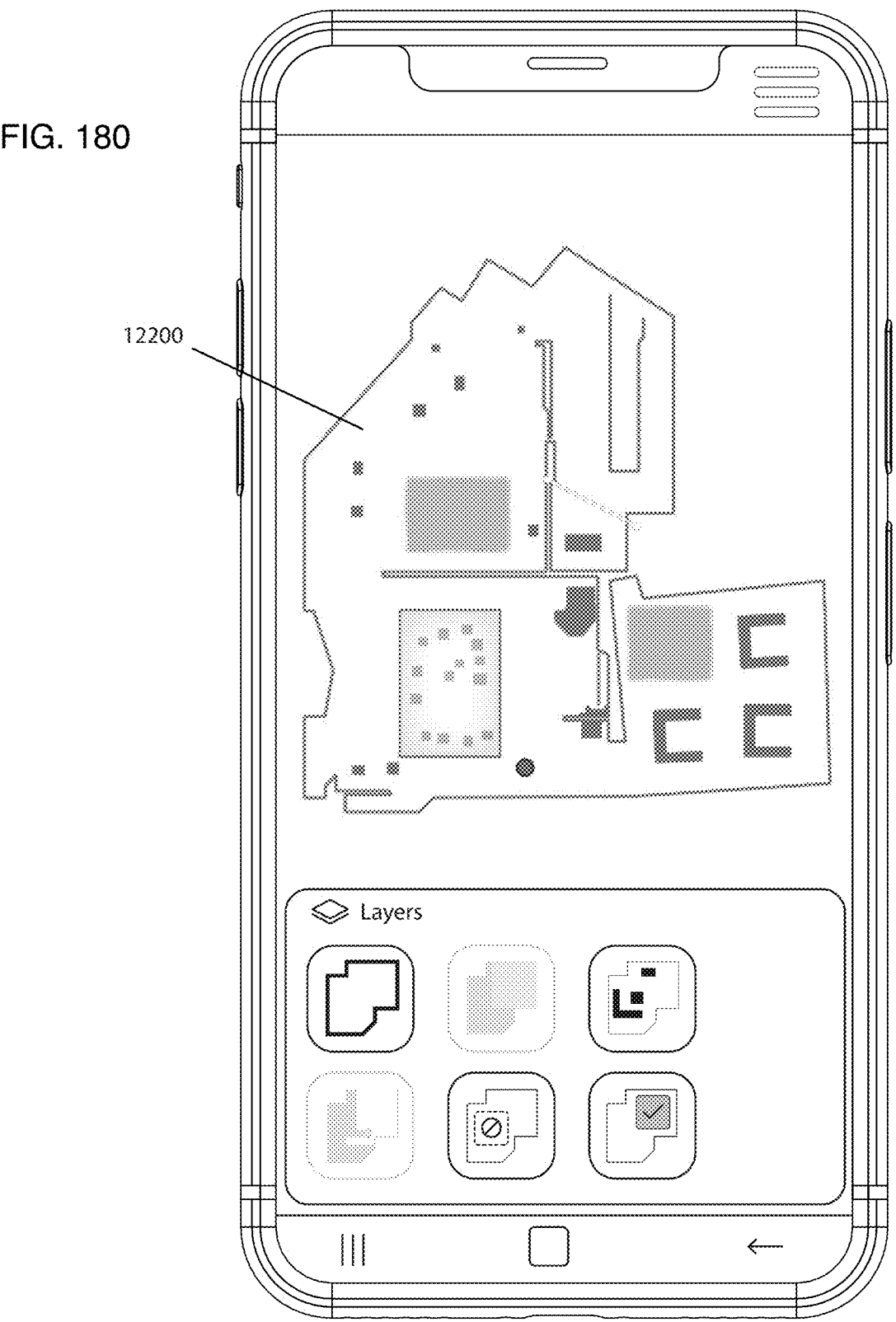
Figure 181:
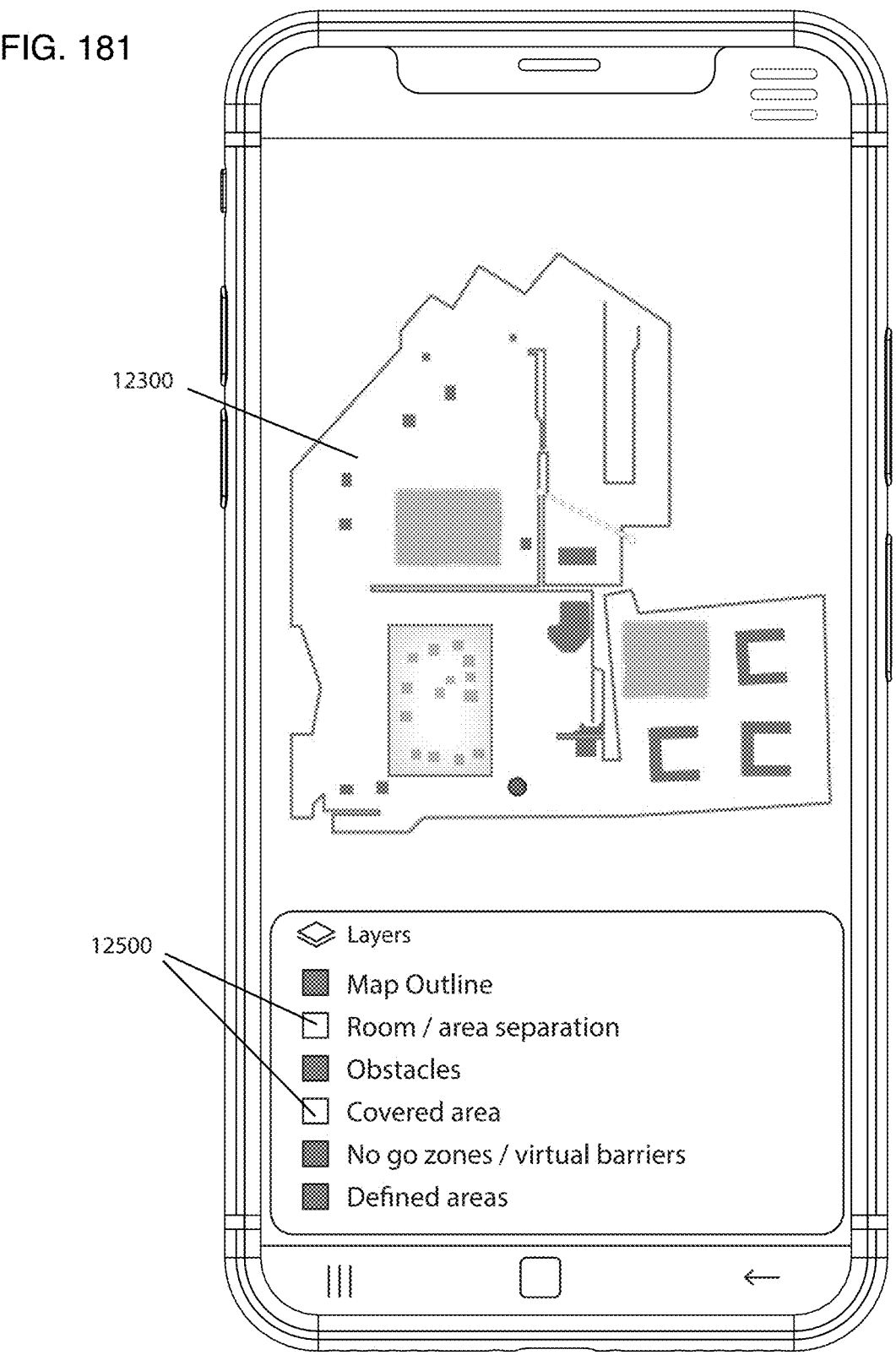
Figure 182:
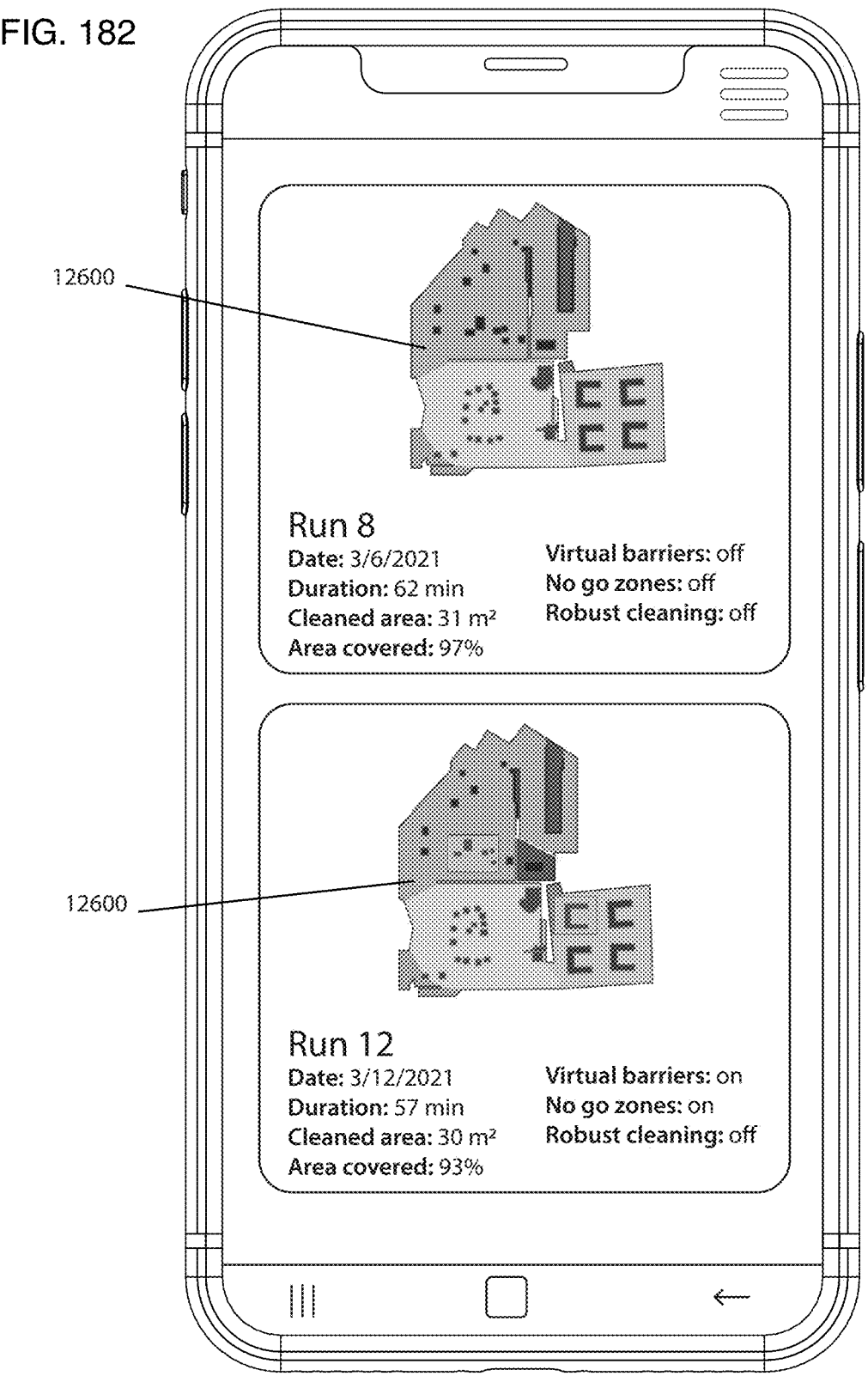
FIG. 182 illustrates an example of a user interface of an application displaying a comparison of runs.

The map displayed by the application may include several layers. Each layer may include different types of information and the application may be used to turn each layer on or off. Some examples of layers include a base layer comprising architectural elements; a static obstacle layer comprising permanent obstacles that are not part of the architecture; a dynamic obstacle layer comprising obstacles the robot may have encountered during previous runs that are no longer observed to be present in the area in which they were encountered; a coverage layer comprising areas covered by the robot; a room separation layer comprising all rooms, each displayed in a different color or pattern and the name of each room and other room-related information displayed; a barrier layer comprising no-go zones and virtual barriers defined by the user using the application; a defined space layer comprising areas within which the robot is to perform certain tasks defined by the user using the application (e.g., areas a robot cleaner is to mop and/or vacuum or robustly clean). In some cases, there may be several layers, each layer defining areas for different tasks. Other layers include a current location layer that highlights the robot in its current location. Other related items such as the charging station may be placed in this layer or in a separate layer. Depending on the function of the robot, additional layers with specific information may be added onto the map. For example, a survey robot may have elevation data of a covered field, the information of which may be displayed in a separate layer. Or the survey robot may have captured several pictures during its run from different spots, the spots being highlighted in a hot spot layer on the map. The application may provide a link to images associated with the spot from which they were captured upon the user touching the spot displayed on the screen. In another example, a robot tasked with covering an area may add a layer that visualizes a difficulty of coverage of different areas onto the map based on previous data of an amount of coverage time spent by the robot in different areas of the map. In embodiments, layers may be live layers, wherein they depend on sensor data currently obtained and may therefore change in real time. Layers may also include interactive properties. For example, the user may use the application to modify virtual walls and no-go zones in a barrier layer or select a point in a hot spot layer to cause the application to display the image captured from the selected point. FIG. 177 illustrates examples of different layers including (A) a base layer comprising an outline of a map, (B) a room/area separation layer; (C) an obstacle layer, (D) a covered area layer, (E) a no-go zone/ virtual barrier layer, (F) a defined area layer, (G) a combination of layers (A) to (F). FIG. 178 illustrates an example of the application user interface displaying the map 12200 with a combination of layers (A) to (F). Each layer is identified with an icon 12202 that may be used to toggle each layer on or off. FIG. 179 illustrates another example of the application user interface displaying the map 12300 with a combination of layers (A) to (F). Each layer is identified by a layer label 12301. The application may be used to toggle each layer on or off. FIG. 180 illustrates the same user interface as FIG. 178, however in this case, some layers, namely unselected room separation and covered area layers, are toggled off, as shown in the displayed map 12200. Unselected layer icons appear in lighter color, grey or monochrome, while selected layer icons appear darker with more contrast and/or in full color. FIG. 181 illustrates the same user interface as FIG. 179, however in this case, some layers, namely unselected room separation and covered area layers, are toggled off as indicated by the unfilled boxes 12500 and as shown in the displayed map 12300. The application may save the map and its additional layers used in different runs and display them upon request. The application may also display a comparison between two or more runs, wherein the map information related to each run are displayed by the application. In some embodiments, the application compares runs internally based on parameters such as speed of coverage, covered areas, number of difficulties during the run, efficiency, etc. and provide and display a score for each run for comparison purposes. FIG. 182 illustrates an example of the application user interface displaying information related to two runs of the robot, each using a same map 12600 but on different dates.

Figure 183:
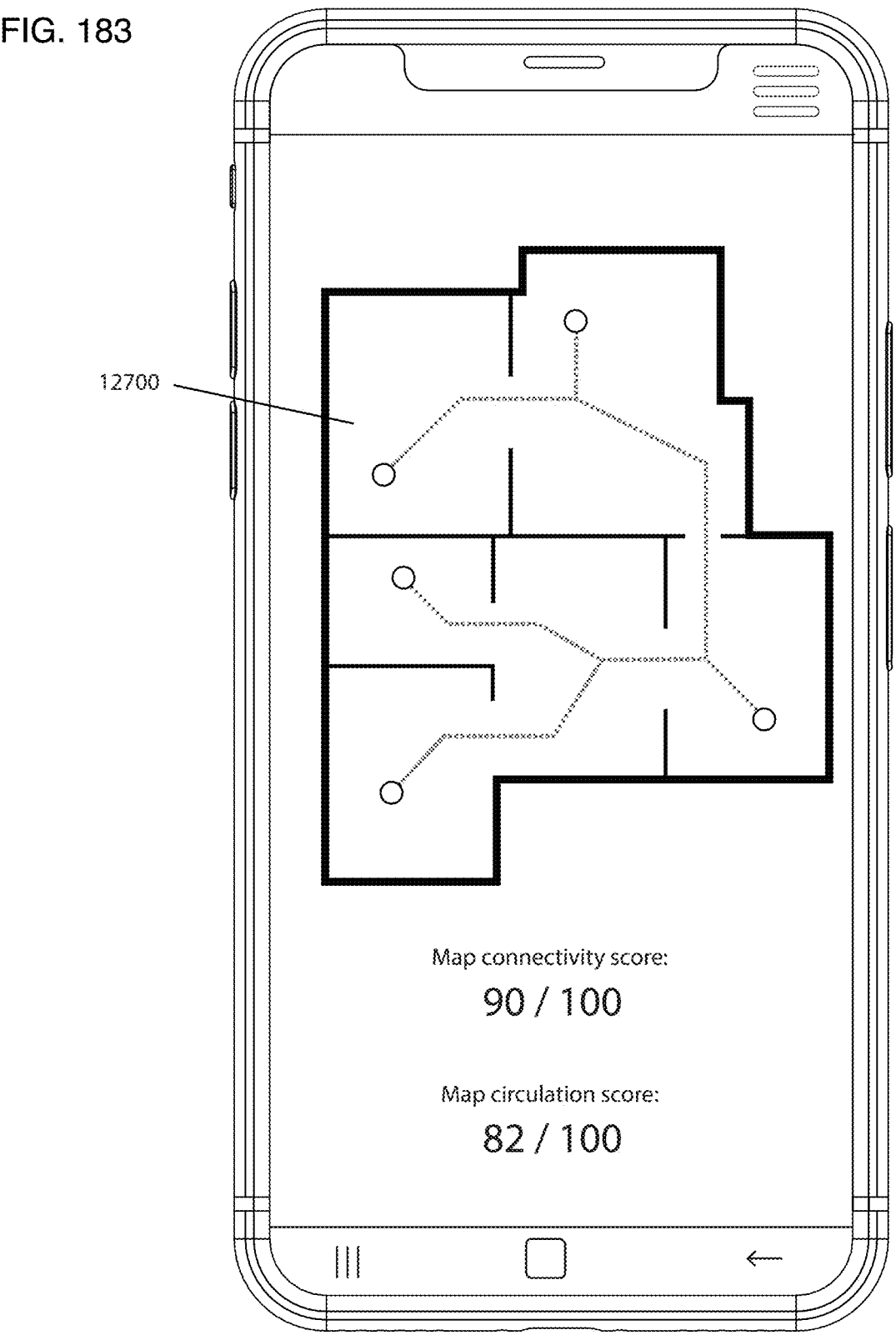
FIG. 183 illustrates an example of a user interface of an application displaying a map score based on connectivity and circulation.

In some embodiments, the application is trained to determine a score for each map generated based on circulation, connectivity, layout, etc. FIG. 183 illustrates an example of the application user interface displaying a determined map connectivity and map circulation score of the displayed map 12700. In some embodiments, the application is trained to suggest different layouts for each room. In some cases, the application assists in designing different layouts for special use case scenarios such as commercial facilities (e.g., supermarkets, mall, and stores), industrial facilities (e.g., factories and warehouses), or residential buildings (e.g., house).

In some embodiments, the application displays a trail of a path of the robot on the map as the robot moves within the map to clean. This differs from displaying areas covered by the robot as the trail displayed includes a trajectory of the robot for the past few seconds or a minute, the trail being the path the robot takes to move and localize itself. Separating the trajectory from the areas covered by the robot result in a cleaner map representation.

Covered areas may be displayed by the application using lighter color than the color of the room displayed. For example, the color of room displayed is a first shade of blue, the areas covered by the robot are displayed with a second shade of blue 50% lighter than the first shade of blue. In some embodiments, the change of color of an area within a room from the color of the room to the color of coverage only occurs one time or occurs each time the robot covers the area, wherein the color of coverage gets lighter in shade each time the robot covers the area. As such, the application displays areas that are covered more thoroughly within the cleaning session. FIG. 184 illustrates an example of a map 1300 displayed by an application 1301 of a communication device 1302. A covered area 1303 is presented with a lighter color than a color of the rooms. A trajectory 1304 of the robot for the past minute or so is also displayed. FIG. 185 illustrates covered areas 1400, 1401, and 1403 displayed in different shades, a shade reflects a number of times the area has been covered (e.g., shade decreases with increased number of coverage).

Figure 187:
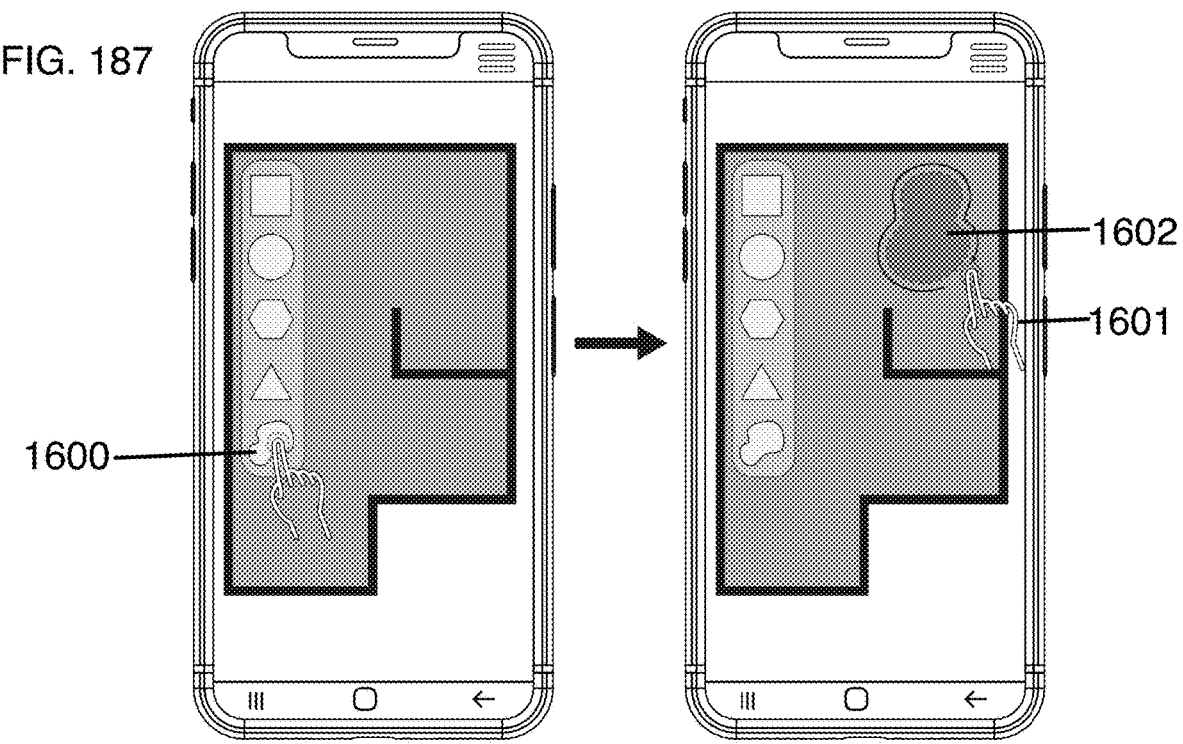
Figure 188:
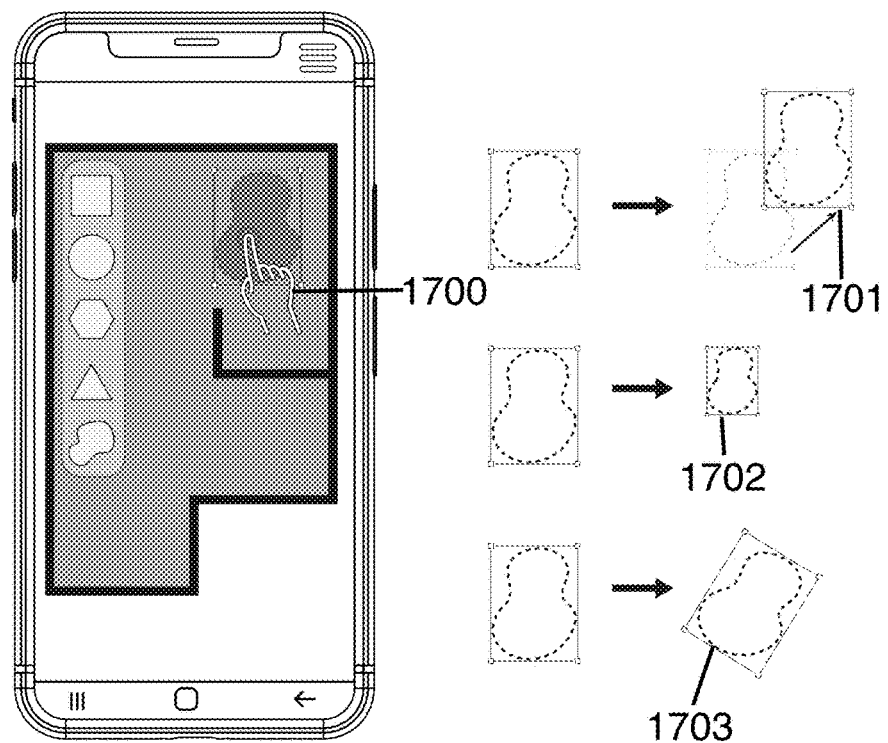
Figure 189:
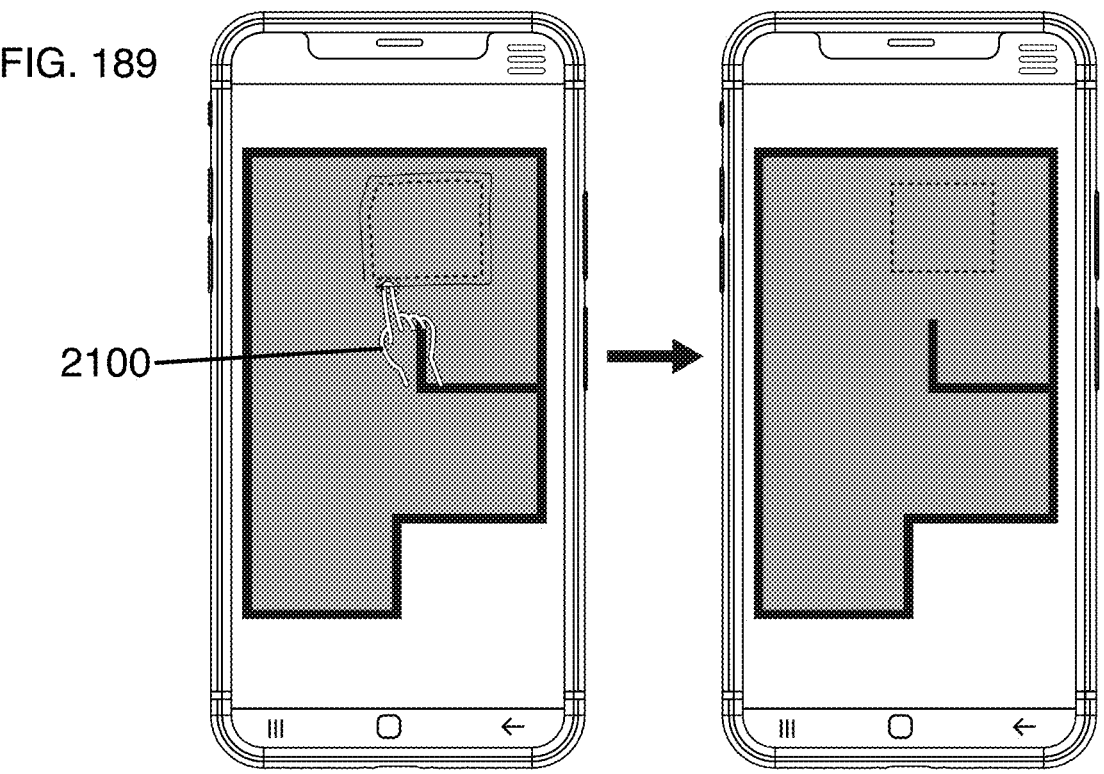

In some embodiments, a user provides input to the application, drawing a no sweep zones within the map. No sweep zones may be rectangular or another shape. No sweep zones may be drawn using primitive shapes, such as a rectangle, an ellipse, a circle, polygons, or may be a free hand drawn shape. In the case of a free hand drawn shape, the user may draw the shape onto the map using their finger or a stylus pen and the application converts a path of the free hand drawn shape into a Bezier curve and closes the path by connecting an end point to a starting point. Other types of zones may also be created using these methods. After drawing a no sweep zone, the application may receive a user input to transform the no sweep zone, wherein the input moves, rotates, and/or scales (uniformly or non-uniformly) the shape of the no sweep zone. FIG. 186 illustrates an example of a map 1500 displayed by an application 1501 of a communication device 1502 and user input 1503 from a floating menu 1504 of shapes designating a rectangular shape for a new zone (no sweep, no mop, spot clean, etc.) and user input 1504 drawing the new zone 1505. FIG. 187 illustrates user input 1600 from a floating menu 1504 of shapes designating a freehand drawn shape for a new zone (no sweep, no mop, spot clean, etc.) and user input 1601 drawing the new zone 1602. When a finger of the user is lifted off of the screen, a path of the hand drawn zone automatically closed. FIG. 188 illustrates user input 1700 for transformation of zone 1602, transformations including translation 1701, scaling 1702, and rotation 1703. FIG. 189 illustrates the application 1500 receiving user input 2100 designating a freehand drawing of a zone (no sweep, no mop, spot clean, etc.) and the application converting the drawn zone to a closest primitive shape upon, for example, the user holding their finger on or lifting their finger from the screen.

Figure 190:
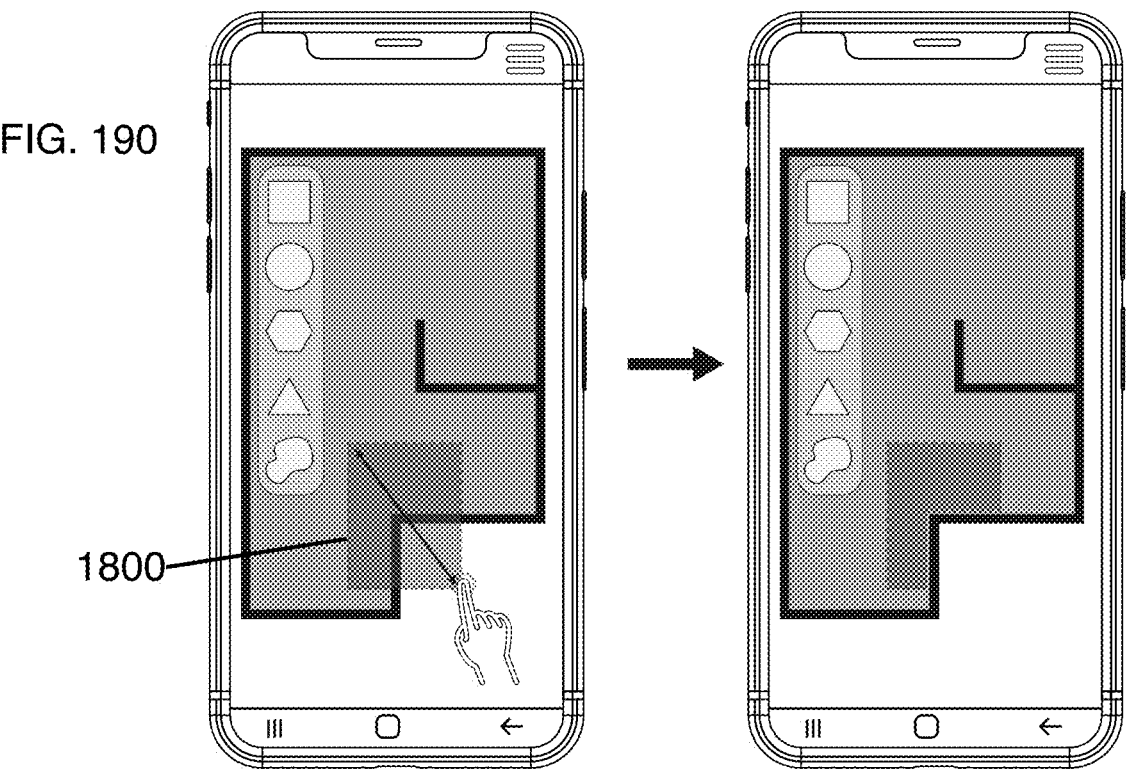
Figure 191:
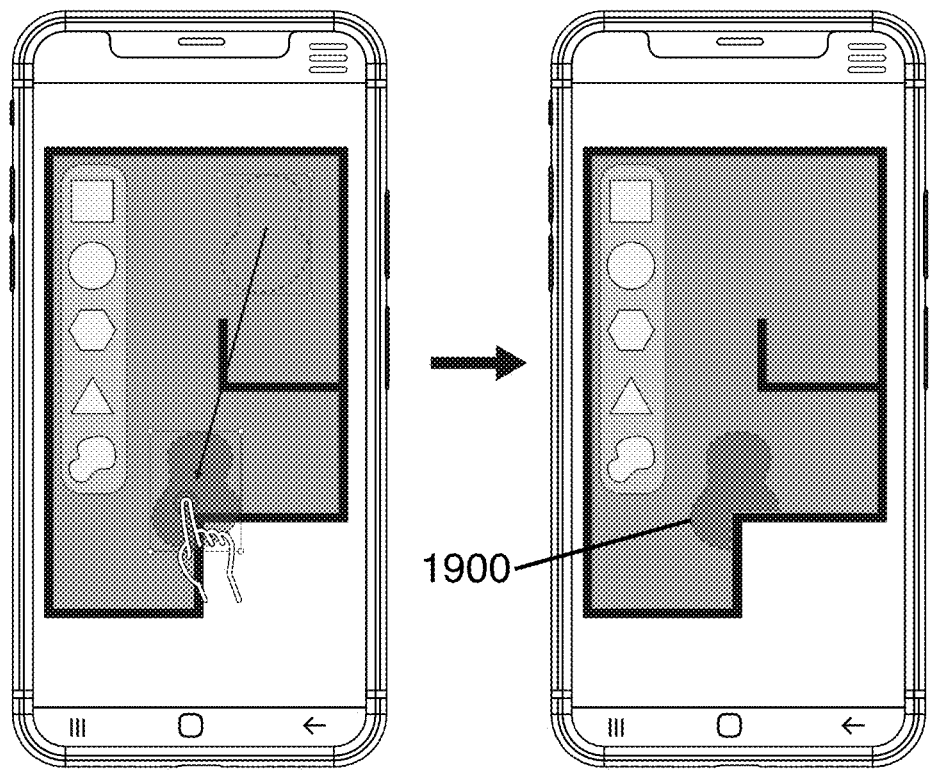
Figure 192:
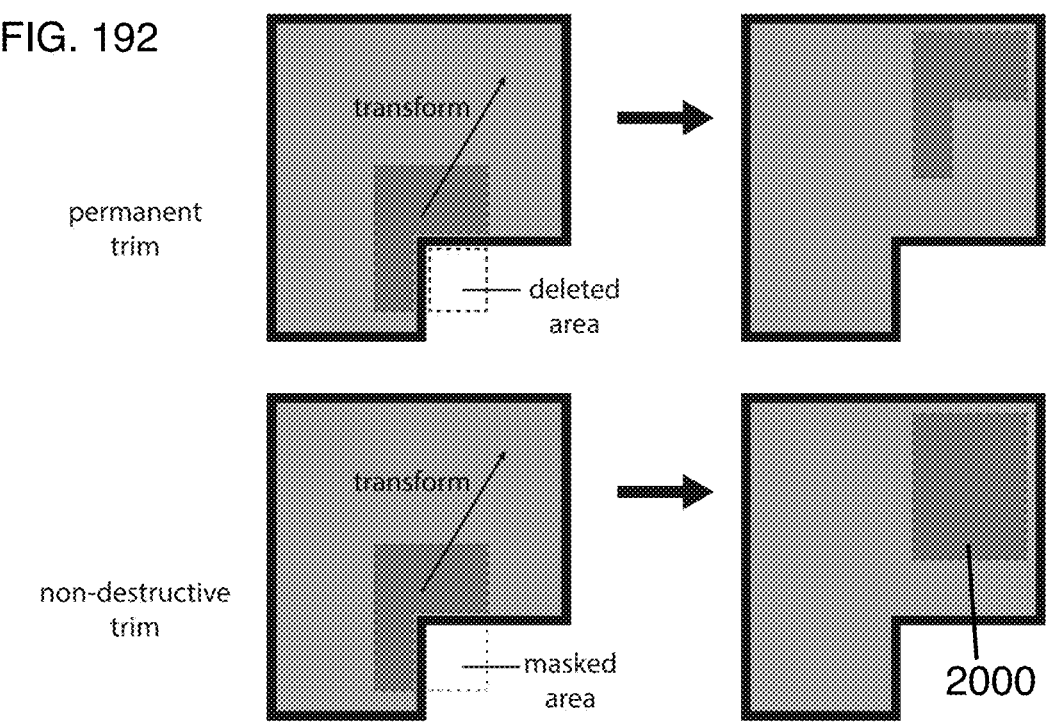

In some embodiments, the map displayed by the application may be used to mask the no sweep zone. The application uses the outline of the map to automatically hide areas of the no sweep zone that exceed the outline of the map. FIG. 190 illustrates the application 1501 trimming a zone 1800 exceeding a border of the map 1500. The trim may be permanent (i.e., deleted) or non-destructive (areas of the zone exceeding the border are masked). Non-destructive may be useful for further adjustment of the zone, as in the case of FIG. 191, wherein the masked area of a zone 1900 is unhidden once the zone 1900 is translated and fully within borders of the map 1500. FIG. 192 illustrates another example of permanent and non-destructive trims, wherein an original shape of a zone 2000 initially trimmed for exceeding map borders is permanently removed or reinstated once the zone 2000 is fully within map borders.

Figure 193:
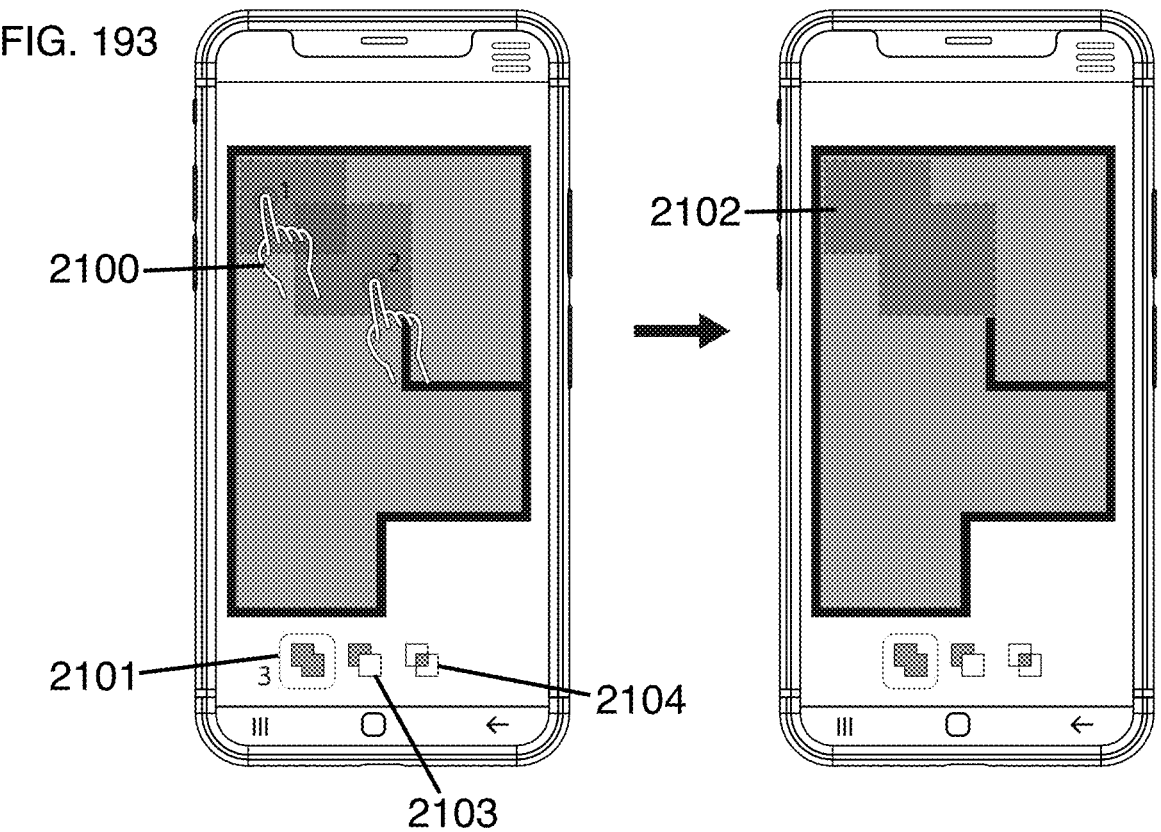

The application may receive user input to combine two or more overlapping no sweep zones into a single no sweep zone. Other types of zones may be transformed using these methods. FIG. 193 illustrates the application 1500 receiving user input 2100 designating a merger of two zones and user inputs 2101 designating two intersecting zones to merge. The merged zone 2102 is treated as a single zone for transformation. Intersecting zones may also be subtracted 2103 and intersected 2104.

Figure 194:
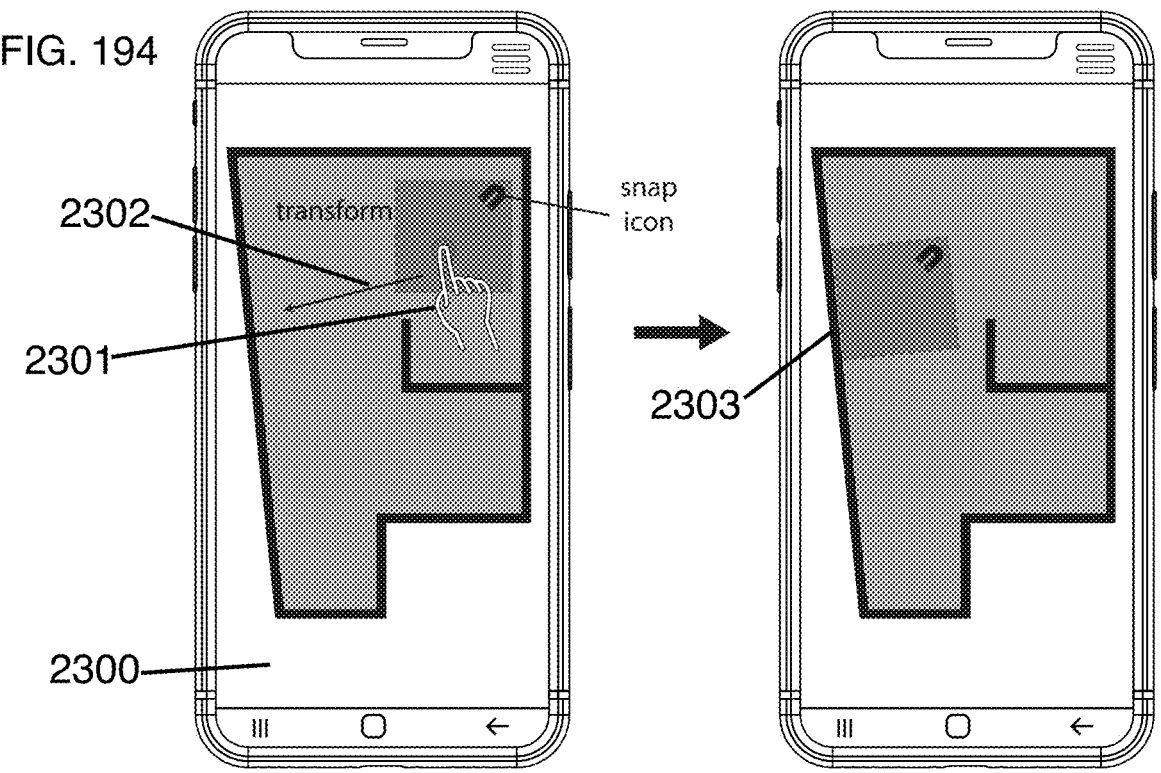

The application may receive user input to enable alignments and snaps, wherein the application automatically aligns zones with walls of the environment within the map. The application may perform the alignment as a zone is drawn or while transforming the zone. For instance, the application may automatically snap a zone to a wall as the zone is moved near the wall. The application may rotate a zone to align its orientation with an orientation of a closest wall. FIG. 194 illustrates an application 2300 receiving user input 2301 enabling zone snapping upon drawing and/or transforming a zone. When enabled, during transformation of a zone 2302, the application snaps the zone 2302 to a closest wall 2303 as the zone 2302 approaches the wall 2303.

In cases wherein robot may has multiple functions (e.g., vacuuming and mopping), the application may receive user inputs to create a no go zone for each function separately, such as no sweep zones, no mop zones, no wet mop zones, etc. The application may display different zones in different colors and outlines. In some embodiments, a mopping functionality of the robot is dependent on a whether a mop attachment is attached to the robot, wherein the robot mops the floor when the mop attachment is attached. In such a case, no mop zones take priority and the robot avoids the no mop zones. In some other embodiments, the robot disables the mopping functionality while the robot vacuums and/or sweeps. For example, the mop attachment may be lifted or displaced to avoid contact with the floor while the robot vacuums and/or drives on carpet. In one example, the robot may enter no mop zones while vacuuming and sweeping, during which the mopping function is disabled. FIG. 195A illustrates an application 2400 displaying various types of zones within a map 2401. Each different type of zone acts as a layer within the map 2400. The application receives user input 2402 and 2403 to select a layer 2402 and a zone to draw on the selected layer, respectively. All zones drawn on a same layer trigger a same robot command. For example, the user may draw several zones on a no go zone layer and as they are all on the no go zone layer, the robot avoids all of the zones on the no go zone layer. Additionally, FIG. 195 illustrates the application 2400 receiving user input 2404 to toggle visibility of each layer within the application to better view the zones within the map.

Figure 196:
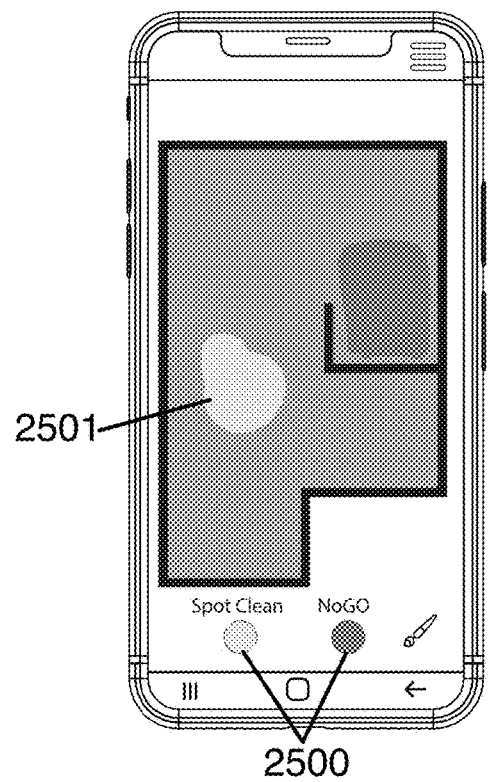

Instead of drawing zones within the map using the application, the user may use their finger or a stylus pen to paint over an area of the map to create a zone. Different paint colors may result in the application creating different types of zones. For example, when the color red is used, the application creates a no sweep or no go zone of the area colored. When the color blue is used the application creates priority zones or mopping zones or when the color green is used the application creates a spot cleaning zone or a deep cleaning zone. Painted zones may have hard borders, which makes more sense for a vacuum cleaner, or may fade into each other, which may be useful in other cases. For example, the user may use the application to paint areas in two different colors, such as red and blue, to indicate zones the robot needs to spend more time patrolling and zones the robot needs to spend less time patrolling. The application may color areas between the red and blue painted zones with different hues of purple (closer to red near red zones and closer to blue near blue zones) and the robot spends an amount of time patrolling each zone according to the color of the zone. FIG. 196 illustrates the application 2400 receiving user input 2500 designating a particular color corresponding with a type of zone and input 2501 painting an area of the map with the selected color.

In some embodiments, the application is configured to display: a map of an environment, a robot status, a battery charge, a cleaning area, a cleaning time, cleaning history, maintenance information (e.g., amount of usage or remaining usage of different components), and firmware information (e.g., current version and updates). The map may be displayed as a 2D, 3D, or matrix map. In some embodiments, the application displays a different map for each floor of the environment. In some embodiments, the processor of the robot automatically detects the floor of the environment on which the robot is located based on a comparison between current observations of sensors of the robot and each of the maps of the environment.

In some embodiments, the application is configured to display: an icon within the map representing a location of an object, floor type of different areas within the map, a user manual, and product information. In some embodiments, the application is configured to display a video feed of a camera of the robot. In some embodiments, the application is configured to receive acoustic input (e.g., voice of a user) and the robot includes a speaker for outputting the acoustic input such that a user may remotely speak to those nearby the robot.

In some embodiments, the application is configured to receive at least one input designating: an addition or a modification to a no-go zone (or other zones, such as no-sweep, no-mop, no-vacuum, and no-steam zones), a cleaning schedule, an instruction to start cleaning, a number of cleaning passes, an instruction for the robot to dock, a suction power, and an instruction to clean a particular spot within the map. In some embodiments, the robot is configured to automatically repeat a schedule. In some embodiments, the application is configured to receive at least one input designating an instruction for the robot to repeat a particular schedule.

In some embodiments, the application is configured to receive at least one input designating: an instruction to vacuum first then mop, an instruction to vacuum and mop, an instruction to vacuum only, an instruction to mop only, an instruction to enable quiet mopping (reduces robot noises while mopping), a virtual wall within the map, an addition of or a modification to furniture within the map, a modification to a floor type within the map, an instruction to empty a bin of the robot, an instruction to map the environment before cleaning for a first time, a scrub intensity, a robot route, a favorite schedule, a merger of two rooms, a division of two rooms, an order in which to clean rooms, a start and stop time within which the robot is to recharge (e.g., off peak electricity hours), an instruction to enable deep carpet cleaning, an instruction to clean in a particular direction (e.g., a floor direction such as along a direction in which hardwood is laid), an instruction to move the robot in a particular direction (e.g., application used as a remote control to manually drive the robot), a start and a stop time during which the robot is to not operate, a robot voice, a frequency at which the bin of the mobile device is to be emptied by the maintenance station, and a mopping mode. In some embodiments, the robot may default to vacuum only mode when a mop attachment is undetected by a sensor of the robot.

In some embodiments, the application is configured to receive at least one input designating: a water volume for mopping; an instruction to enable deep scrubbing (e.g., the mopping pad or the robot with the mopping pad move back and forth in small strides while forcibly pressing the mopping pad downward to simulate a user scrubbing a tough stain off of the floor), an instruction to clean next to a particular object, an addition or deletion of a divider to divide a room or merge rooms, a room label, and an instruction to only clean when the user is not home. In some embodiments, the controller of the robot actuates actuators such that the deep scrubbing function is executed when data collected by sensors of the robot indicate a stain on the floor.

In some embodiments, the processor of the robot or the application automatically labels rooms within the map. In some embodiments, a location of the communication device of the user is used in determining whether the user is home or elsewhere. In some embodiments, the user is recognized using at least some of the methods, processes, and/or techniques for user recognition described in U.S. Non-Provisional patent Ser. Nos. 10/185,815, 10/762,186, and 12/009,357, each of which is hereby incorporated herein by reference.

In some embodiments, the application is configured to receive at least one input designating an instruction to clean the dirtiest rooms immediately or at a scheduled later time. The application may display a cleaning plan including areas to be cleaned and estimated cleaning time for each area prior to the robot executing the cleaning plan. Based on the previewed cleaning plan, the user may choose to instruct the robot to executing the cleaning plan via the application. In some embodiments, the application is configured to display locations in which dirt was detected and/or a dirtiness of rooms within the map (e.g., dirtiness level of rooms indicated by color). In some embodiments, the robot is configured to autonomously prioritize cleaning of the dirtiest rooms. The processor of the robot or the application may determine dirtiness of rooms based on how often each room is cleaned, how frequently dirt is detected in each room, tracks the state of cleanliness room-by-room past cleaning sessions, and/or floor types. In some embodiments, the controller of the robot automatically actuates actuators to adjust vacuum power, cleaning passes, scrubbing, etc. based on sensor data.

In some embodiments, the application is configured to suggest no-go zones by displaying the suggested no-go zones within the map of the environment. In some embodiments, the processor of the robot or the application determines suggested no-go zones based on at least one of: areas in which the robot previously got stuck and locations of cliffs. In some embodiments, the application is configured to receive at least one input designating an instruction to implement a suggested no-go zone. In some embodiments, the application is configured to implement a no-go zone after data captured by sensors of the robot repeatedly indicate existence of a cliff detected at same spot. Some embodiments identify a cliff as described in U.S. Non-Provisional patent application Ser. Nos. 17/990,743 and 17/344,902, and U.S. Non-Provisional patent Ser. Nos. 12/099,357 and 10/933,534, each of which is hereby incorporated herein by reference.

In some embodiments, the application is configured to suggest at least one of: a cleaning (during or after particular events or at a particular day and time), a location to clean (e.g., commonly messy areas such as kitchen during cooking, dinner table after dinner, etc.), a cleaning setting (e.g., suction power, scrub intensity, a number of cleaning passes, etc.) to use during a cleaning, and a cleaning day or time to execute a cleaning and display the suggestions. In some embodiments, the application is configured to receive at least one input designating an instruction to implement the suggestion. In some embodiments, the processor of the robot or the application determines a suggested schedule, cleaning settings, and cleaning times based on previous cleaning habits of the user, the season, dirtiness of different areas within the environment, etc.

In embodiments, the robot is configured to update its understanding of the environment, adjust its settings and/or execute actions according to the at least one input received by the application.

Some embodiments determine a schedule of the robot based on user input received by the application as described in U.S. Non-Provisional patent Ser. Nos. 12/025,988, 11/442,422, and 11/543,792, each of which is hereby incorporated herein by reference.

In some embodiments, the user uses the application to remotely instruct the robot to capture an image using the camera of the robot and the application displays the image. Such a feature may be a sub-feature of a robot (e.g., vacuum robot) or a main function of a robot (e.g., patrolling robot). The images captured by the camera of the robot may be stored in an internal gallery or album of the robot. In addition to the usual metadata, the application tags the images by location within the map (i.e., local/location tagging). The user may access images using a gallery of the application or based on a selected location within the map of which images are tagged. The application may display the map and images captured within different areas within the map. The application may receive user input to export, share, or delete images. If enabled via the application, the robot may send images to the user under certain scenarios. For example, if the robot is struggling to overcome an obstacle or encounters an unidentified object, the camera of the robot captures an image of the obstacle or object and sends the image to the application. The application may require user input indicating how the robot is to proceed.

The application may be used by the user to summon the robot, wherein the robot uses the user smartphone location to locate the user. The user may enable or disable location discovery using their smartphone via the application. The summoning function may be used for summoning a vacuum robot for spot cleaning or prioritizing an area for cleaning or a home assistant robot, particularly if the user has mobility issues and the robot can help.

The user may also capture an image of an area in which the user is located. The robot may be summoned to the area in the image for cleaning (e.g., spot cleaning) or another reason, wherein the application or the robot may determine the location of the area based on the image or both the user smartphone location and the content of the image.

In some embodiments, the application displays short loop animations to indicate a status of the robot. For example, the application may display separate animations to indicate the robot is working, stopped, looking for the charging station, charging, having an issue, etc.

Figure 197:
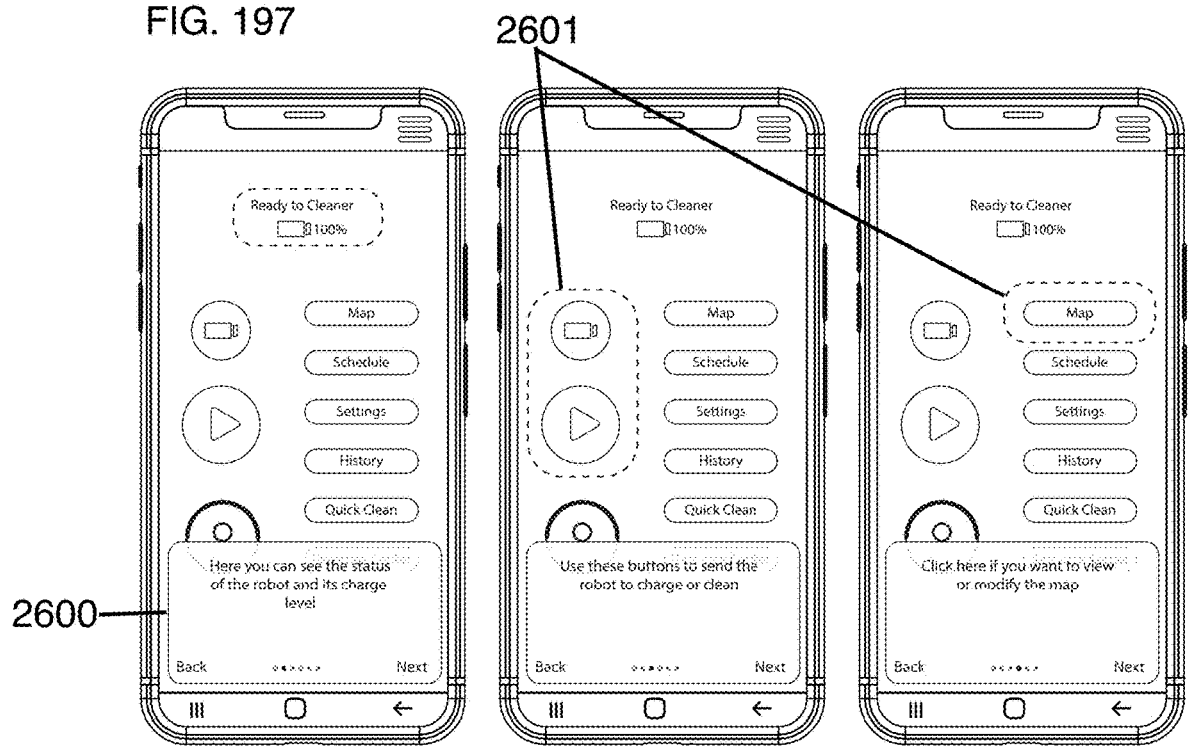

The application functions and features may be categorized into three different groups for an application tutorial. The first group for in-application tutorial are in-application features, functions solely present within the application, such as scheduling, map editing, map viewing, and main control panel features. To learn in-application features, the application tutorial for first time users may use interactive tooltips or section tours/walkthroughs. When the user encounters a section of the application for the first time, a series of tooltips may appear on the screen pointing out what each icon means and what each button does. To learn in-application features, the application tutorial for first time users may use a help icon/button. For sections where the user needs to provide a series of inputs to the application to reach a feature, such as the various map editing features, a help icon/button map be useful. Upon selecting a help icon a list of instructions, short videos, and/or a series of images, may appear on the screen. It is better to avoid long videos listing all in-application features as the long videos become boring quickly and the user may easily forget how to operate features after watching the entire video. Alternatively, similar to interactive tooltips, the application may display a quick demonstration presenting how each tool or feature works. FIG. 197 illustrates an example of an in-application tutorial for onboarding a user including descriptive text 2600 describing different highlighted features and functionalities 2601 of the application.

The second group for in-application tutorial are application and robot features, features and functions that encompass both the user the robot (e.g., Wi-Fi pairing). For these features and functions, a short video demonstrating all the steps is helpful. The application may display the video as the features and functions are performed and until they are completed such that the user may refer to the video if needed. Alternatively, each step may be described with a short paragraph of text and an image (or animation) and the user may follow the steps as functions are performed.

The third group for in-application tutorial are cross application features, features and functions that encompass the robot and a third party (e.g., pairing the robot with a home assistant application). For cross application features, an in-application text-based tutorial may be used. The text may include images (e.g., screen shots) of a third party application to visualize the content of the tutorial. The text and images may be quickly updated whenever the third party application updates their user interface.

In addition to in-application tutorials, the application may include a resource center. The user may use the resource center of the application to access information. The resource center may include a robot manual and quick start guide and animations and videos related to maintenance and care, self-repair, and functions of the robot. If the application controls more than one model of robot, the user may access the resource center of the application under a control panel of the particular model of robot, thereby avoiding any confusion between information relating to different models of robot.

As the options for editing and modifying the map via the application increase, categorizing various functions and actions and binding them into groups becomes more and more important as a smartphone screen size is limited. There are several user interface design elements that may be incorporated into the application to guide the user through these categories and unclutter the user interface.

A floating menu, also known as a floating action button (FAB), is a design element used in mobile applications and websites to enable users to access important features and functions quickly and easily. In an application, a floating menu is typically a circular button or icon that floats above the user interface, usually placed in a bottom right corner of the screen but that can be dragged to other sections of the screen. The floating menu is usually transparent to be less distracting. When a user taps on the floating menu, it expands to reveal a set of options, such as creating a new item (no sweep or spot clean zones), adding a note or label, performing an action (merging or splitting rooms, cleaning the map, etc.). The options may be presented as icons, short description, or a combination of icons and description. When the options are only presented by icons, a description may appear when the user presses and holds on or hovers over the icon for a few seconds. Floating menus are often used to highlight a primary call-to-action, such as adding a new item or sharing content. Floating menus may also provide quick access to common features, such as settings or help documentations. In addition, floating menus may help keep the interface uncluttered by hiding less frequently used features until they are needed. Floating menus may be customized to fit the style and branding of the application and may be animated to provide visual feedback to the user when an action is taken. They are a popular design element because they are easy to use, visually appealing, and provide quick access to important features.

A bottom bar, also known as a bottom navigation bar or tab bar, is a user interface element commonly used in mobile applications to provide quick access to application functionality and content. A bottom bar is typically located at the bottom of the screen and consists of several icons or tabs that represent different parts of the application or different functions. When a user selects or taps on one of the icons or tabs, the application switches to the corresponding screen or function. If the number of buttons on the bottom bar are high (usually more than five), the user can scroll the bar itself from side to side (carousal) to access the rest of the buttons. Bottom bars are especially useful in applications with a large number of screens or functions as they allow users to quickly switch between different functions without having to navigate through multiple screens. The buttons on the bottom bar may act as tabs and contain a group of functions. For example, in the case of editing the map using the application, all drawing functions, such as drawing a no sweep zone, a no go zone, a spot cleaning zone, a virtual barrier, etc., may be grouped under a single button and when the user taps on that button, either the bottom bar changes to display the drawing functions or a separate bar appears above the bottom bar to display the functions.

A side drawer menu, also known as a navigation drawer or hamburger menu, is a user interface element commonly used in mobile applications to provide access to application functionality and content. A side drawer menu is typically represented by a three-line icon, resembling a hamburger, located in the top left or right corner of the screen. When the user taps on the hamburger icon, the menu slides out from the side of the screen, revealing a list of options and links to different parts of the application. Side drawer menus are often used to organize and categorize application content, such as different types of high-level settings in the application, like managing account elements or robot settings. They can also be used to provide easy access to commonly used functions, such as search or settings. Side drawer menus are a popular design element because they allow for a clean and uncluttered user interface, while still providing access to important functionality and content. However, it is important to note that side drawer menus may not always be the best solution for application navigation. Some users may not immediately recognize the hamburger icon and it can be difficult to design a menu that is both intuitive and easy to use. It is important to consider the specific needs of the application and its users when deciding whether to use a side drawer menu.

An accordion is a type of user interface element that allows users to expand or collapse sections of content. Accordions are typically used to group related content or functions in an application, such as a list of frequently asked questions in a support application. However, in the case of editing the map using the application, the accordion may be utilized to reveal and hide different sub functions or functions settings and help decluttering the user interface. When a user clicks on the header of an accordion section, the section expands to reveal its content. Clicking on the header again collapses the section, hiding its content. Accordions may be useful when the application needs to provide users with an overview of content or functionality, while also allowing them to dive deeper into specific areas as needed. Overall, accordions can be a useful way to organize content and functionality in the application by providing users with a clear overview of what is available, while also allowing them to drill down into specific areas as needed.

Figure 198:
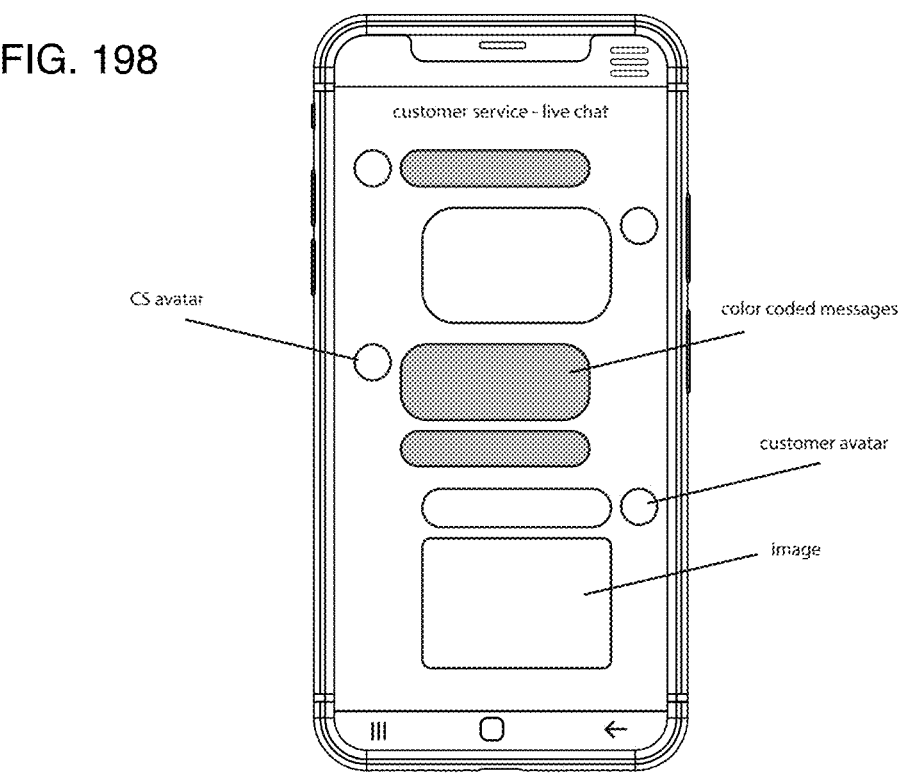

In some embodiments, the user may directly chat with a customer service representatives using a chat system of the application (e.g., when the robot is not working as expected). The chat system may connect the user to a real human operator or an AI assisted chatbot trained to help customers. When it comes to customer service, chatbots may be used to automate common inquiries and offer 24/7 support to customers via the application. There are several benefits of providing chatbots for customer service through the application: cost-effectiveness, as chatbots provide customer service support at a lower cost than hiring human customer service agents; availability, as chatbots provide customers with support around the clock without requiring human agents to be available at all times; quick response times, as chatbots respond to customer inquiries instantly without requiring users to wait on hold or wait for a human agent to be available; consistent customer experience, as chatbots provide a consistent experience to customers, ensuring that all inquiries are handled in the same way; and scalability, as chatbots practically handle an unlimited number of customer inquiries simultaneously, making them a scalable solution for large user bases. During a chat, the user may permit a customer service operator to take control of their robot to access its features and working logs or perform a troubleshoot check on the robot remotely. The user may send pictures or videos of the robot to the customer service via the chat system of the application to demonstrate issues encountered with the robot. Images are helpful as sometimes explaining an issue in written format is not effective. The chat system of the application may use an automatic translation system to automatically translate messages between two or more languages in real-time for cases where users and customer service representatives that speak different languages interact with each other. FIG. 198 illustrates an example of a live chat session within a chat system of an application. A user explain robot issues via text and/or images/videos.

The application may be used to access an online shop. Depending on a model of the robot and/or a usage log of the robot, the application may suggest renewing consumable parts of the robot, such as a main brush and a side brush, filters, and batteries as necessary. The user may order spare parts directly from the shop using the application. The user may use the application to sign up for a consumable parts subscription that is delivered to the user after a certain period of time (monthly, bi-monthly, each season, every six months, etc.)

In some embodiments, the robot receives an instruction to establish a video stream or an audio stream, which may be symmetrical (e.g., two-way communication) or asymmetrical (e.g., one-way communication). In some embodiments, the video streamed is viewed using a display screen and the audio streamed is heard using a speaker. The display screen and/or speaker may be a component of the robot or another electronic device (e.g., cell phone, tablet, computer, smart TV, a car, etc.) depending on the application/type of robot and a direction of communication. In some embodiments, audio (e.g., environmental noises, voice of a user, etc.) is captured by a microphone of the robot or another electronic device (e.g., cell phone, tablet, computer, smart TV, a car, etc.). In some embodiments, the audio and video captured is accessible on the cloud and is viewed, edited, and/or deleted by a user in real-time, at a later time, or based on a preset setting by the user or a service provider. A user account may be associated with one side of communication or both sides of communication. Multiple users may use the robot, each user having their own account. In some embodiments, the user communicating is identified and associated with their respective account automatically based on smart authentications, such as voice recognition, face recognition, or other seamless recognitions.

In some embodiments, the robot may include speakers and a microphone. In some embodiments, audio data from the peripherals interface may be received and converted to an electrical signal that may be transmitted to the speakers. In some embodiments, the speakers may convert the electrical signals to audible sound waves. In some embodiments, audio sound waves received by the microphone may be converted to electrical pulses. In some embodiments, audio data may be retrieved from or stored in or transmitted to memory and/or RF signals. In some embodiments, a user may instruct the robot to navigate to a location of the user or to another location by verbally providing an instruction to the robot. For instance, the user may say "come here" or "go there" or "got to a specific location". In some embodiments, a directional microphone of the robot may detect from which direction the command is received from and the processor of the robot may recognize key words such as "here" and have some understanding of how strong the voice of the user is. In some embodiments, electroacoustic devices such as speakers or other audio components and/or electromechanical devices that convert energy into linear motion such as a motor, solenoid, electroactive polymer, piezoelectric actuator, electrostatic actuator, or other tactile output generating component may be used. In some cases, a directional microphone may be insufficient or inaccurate if the user is in a different room than the robot. Therefore, in some embodiments, different or additional methods may be used by the processor to localize the robot relative to the verbal command of "here". In one method, the user may wear a tracker that may be tracked at all times. For more than one user, each tracker may be associated with a unique user ID. In some embodiments, the processor may search a database of voices to identify a voice, and subsequently the user, providing the command. In some embodiments, the processor may use the unique tracker ID of the identified user to locate the tracker, and hence the user that provided the verbal command, within the environment. In some embodiments, the robot may navigate to the location of the tracker. In another method, cameras may be installed in all rooms within an environment. The cameras may monitor users and the processor of the robot or another processor may identify users using facial recognition or other features. In some embodiments, the processor may search a database of voices to identify a voice, and subsequently the user, providing the command. Based on the camera feed and using facial recognition, the processor may identify the location of the user that provided the command. In some embodiments, the robot may navigate to the location of the user that provided the command. In one method, the user may wear a wearable device (e.g., a headset or watch) with a camera. In some embodiments, the processor of the wearable device or the robot may recognize what the user sees from the position of "here" by extracting features from the images or video captured by the camera. In some embodiments, the processor of the robot may search its database or maps of the environment for similar features to determine the location surrounding the camera, and hence the user that provided the command. The robot may then navigate to the location of the user. In another method, the camera of the wearable device may constantly localize itself in a map or spatial representation of the environment as understood by the robot. The processor of the wearable device or another processor may use images or videos captured by the camera and overlays them on the spatial representation of the environment as seen by the robot to localize the camera. Upon receiving a command from the user, the processor of the robot may then navigate to the location of the camera, and hence the user, given the localization of the camera. Other methods that may be used in localizing the robot against the user include radio localization using radio waves, such as the location of the robot in relation to various radio frequencies, a Wi-Fi signal, or a sim card of a device (e.g., apple watch). In another example, the robot may localize against a user using heat sensing. A robot may follow a user based on readings from a heat camera as data from a heat camera may be used to distinguish the living (e.g., humans, animals, etc.) from the non-living (e.g., desks, chairs, etc.). In embodiments, privacy practices and standards may be employed with such methods of localizing the robot against the verbal command of "here" or the user.

Other devices may detect the name of the robot and transmit information to the processor of the robot including the direction and location from which the audio input originated or was detected or an instruction. For example, a home assistant, such as an Alexa, may receive an audio input of "Bob come here" for a user in close proximity. The home assistant may perceive the information and transmit the information to the processor of Bob (the robot) and since the processor of Bob knows where the home assistant is located, Bob may navigate to the home assistant as it may be the closest "here" that the processor is aware of. From there, other localization techniques may be used or more information may be provided. For instance, the home assistant may also provide the direction from which the audio input originated.

In some embodiments, the processor of the robot may intelligently determine when the robot is being spoken to. This may include the processor recognizing when the robot is being spoken to without having to use a particular trigger, such as a name. For example, having to speak the name Amanda before asking the robot to turn off the light in the kitchen may be bothersome. It may be easier and more efficient for a user to say "lights off" while pointing to the kitchen. Sensors of the robot may collect data that the processor may use to understand the pointing gesture of the user and the command "lights off". The processor may respond to the instruction if the processor has determined that the kitchen is free of other occupants based on local or remote sensor data. In some embodiments, the processor may recognize audio input as being directed towards the robot based on phrase construction. For instance, a human is not likely to ask another human to turn the lights off by saying "lights off", but would rather say something like "could you please turn the lights off?" In another example, a human is not likely to ask another human to order sugar by saying "order sugar", but would rather say something like "could you please buy some more sugar?" Based on the phrase construction the processor of the robot recognizes that the audio input is directed toward the robot. In some embodiments, the processor may recognize audio input as being directed towards the robot based on particular words, such as names. For example, an audio input detected by a sensor of the robot may include a name, such as John, at the beginning of the audio input. For instance, the audio input may be "John, could you please turn the light off?" By recognizing the name John, the processor may determine that the audio input is not directed towards the robot. In some embodiments, the processor may recognize audio input as being directed towards the robot based on the content of the audio input, such as the type of action requested, and the capabilities of the robot. For example, an audio input detected by a sensor of the robot may include an instruction to turn the television on. However, given that the robot is not configured to turn on the television, the processor may conclude that the audio input is not directed towards the robot as the robot is incapable of turning on the television and will therefore not respond. In some embodiments, the processor of the robot may be certain audio inputs are directed towards the robot when there is only a single person living within a house. Even if a visitor is within the house, the processor of the robot may recognize that the visitor does not live at the house and that it is unlikely that they are being asked to do a chore. Such tactics described above may be used by the processor to eliminate the need for a user to add the name of the robot at the beginning of every interaction with the robot.

Figure 199:
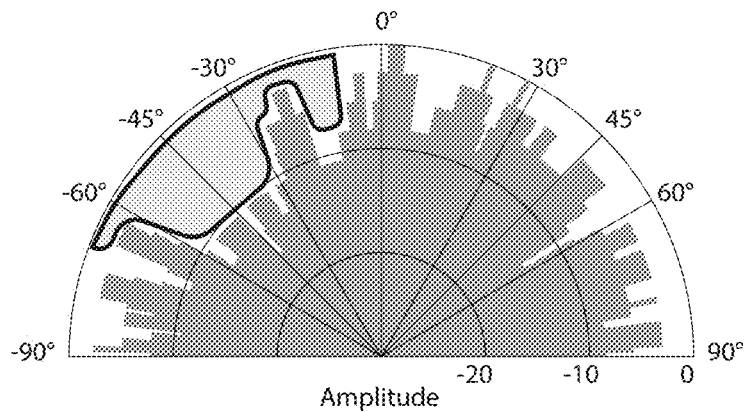
FIG. 199 illustrates an example of an acoustic range finder.
Figure 200:
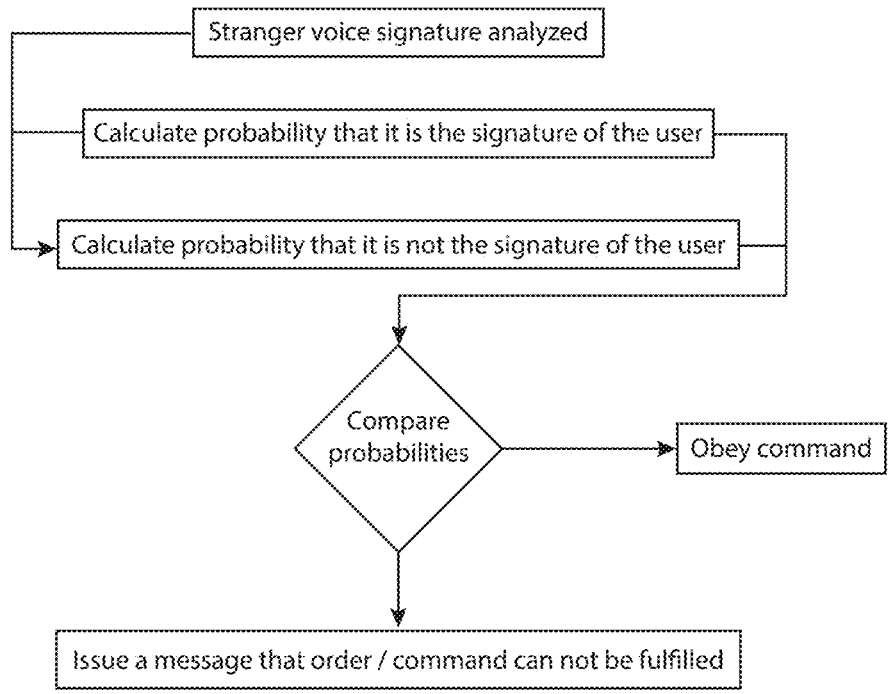
FIG. 200 illustrates an example of a process of voice signature analysis.
Figure 201:
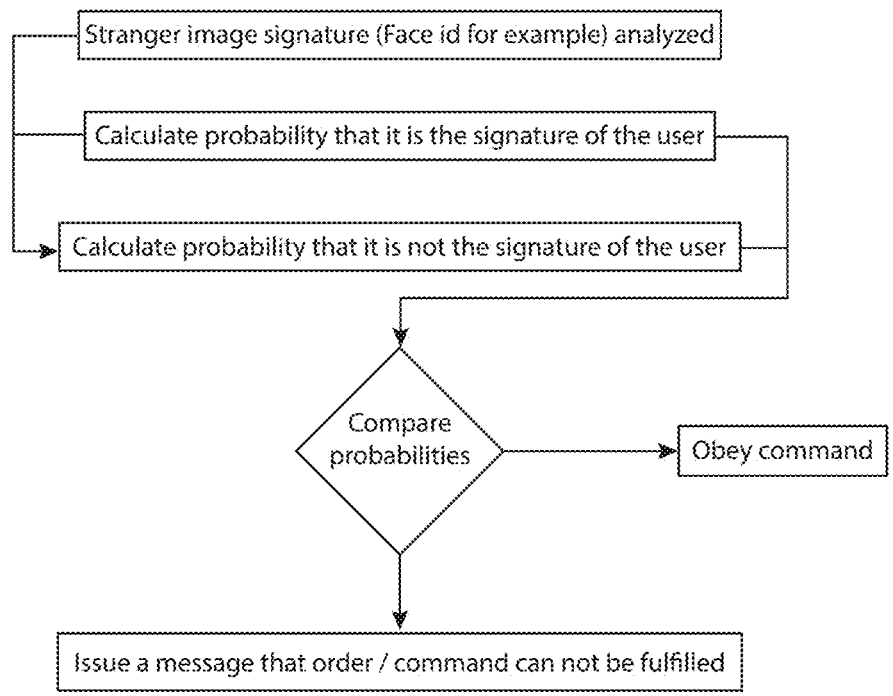
FIG. 201 illustrates an example of a process of image signature analysis.
Figure 202:
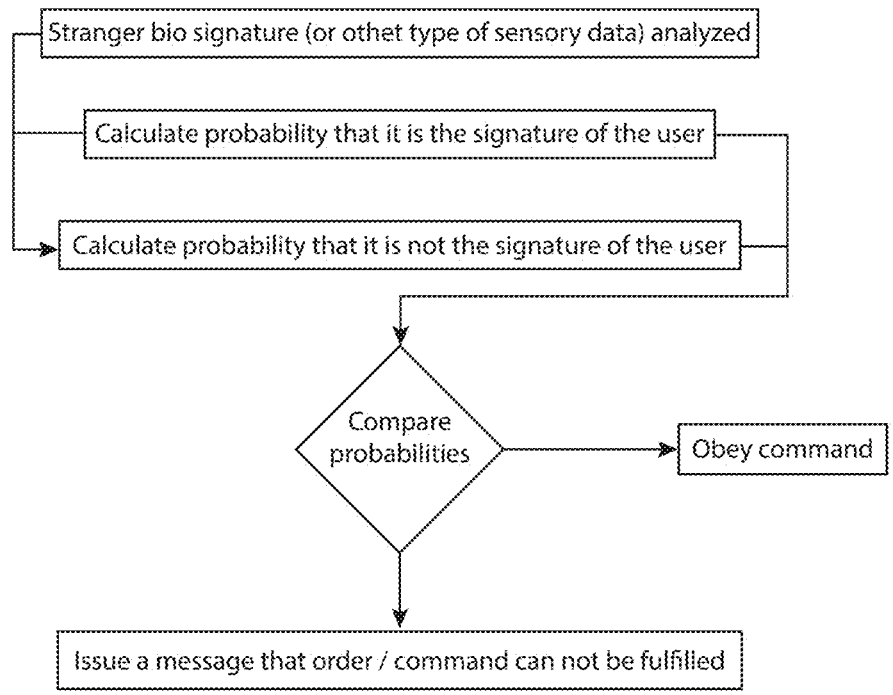
FIG. 202 illustrates an example of a process of biosensor signature analysis.

In some embodiments, the robot comprises an acoustic range finder. For instance, FIG. 199 illustrates an example of an acoustic range finder. Some embodiments employ audio localization, wherein the processor of the robot localizes the robot based on acoustic sensor data. In some embodiments, the processor analyzes acoustic sensor data and recognizes a user based on the acoustic sensor data. In some embodiments, only select users are authorized and can activate, use, and issue a command to the robot. In some embodiments, a memory of the robot includes a voice signature of one or more users. The processor of the robot analyzes acoustic sensor data and, based on the voice signatures of the one or more users, probabilistically identifies a particular user. The robot then executes orders based on a permission and access level associated with the identified user. FIG. 200 illustrates an example of a process of voice signature analysis, wherein upon a command given to a robot, a processor of the robot analyzes the voice signature and determines a probability of the voice signature matching and mismatching a voice signature of a user of the robot. The processor actuates the robot to obey the command or issue a message relaying that the command could not be fulfilled based on the probability indicating the voice signature is the user or is not the user, respectively. A similar process of identifying the user may be employed based on image analysis, such as facial recognition. FIG. 201 illustrates a similar process as described for voice signature identification, however, identification of the user is based on image signature analysis. FIG. 202 illustrates a similar process as described for voice signature identification, however, identification of the user is based on other biosensor signature analysis.

Figure 203:
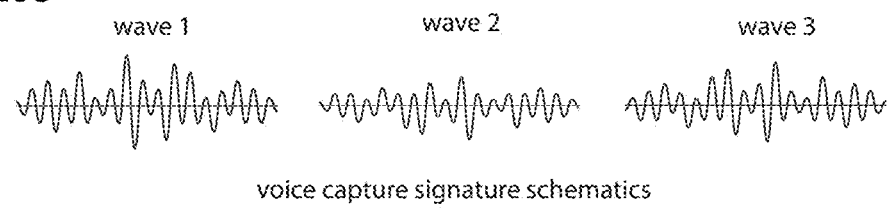
FIG. 203 illustrates examples of voice signature schematics.
Figure 204:
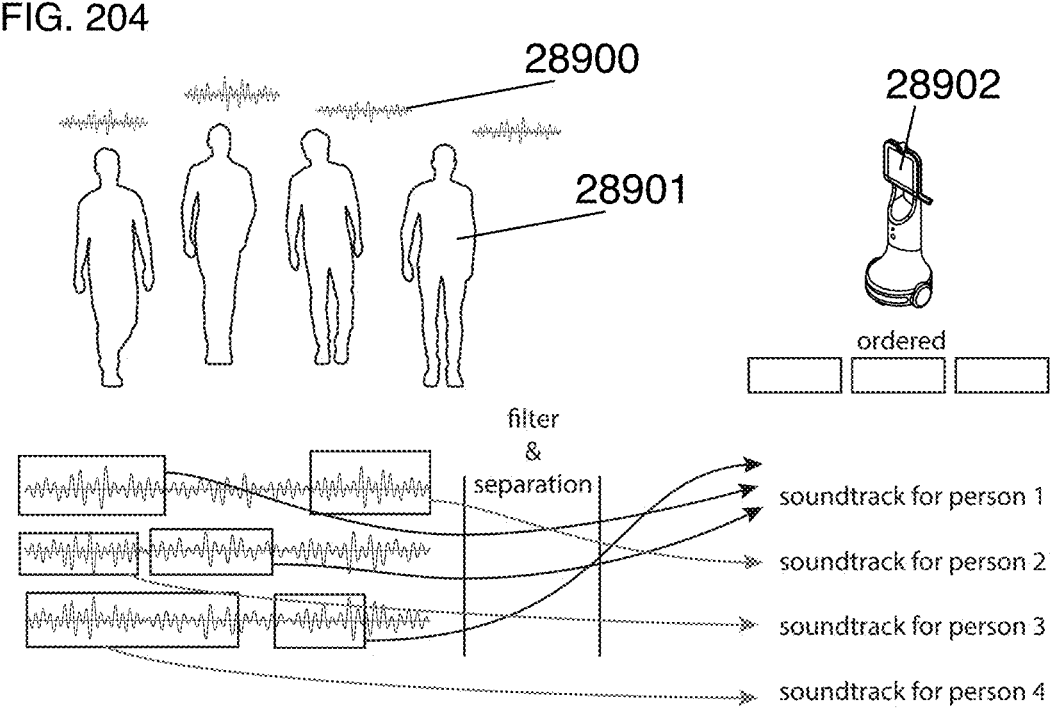
FIG. 204 illustrates a robot separating voice capture signatures of various persons.
Figure 205:
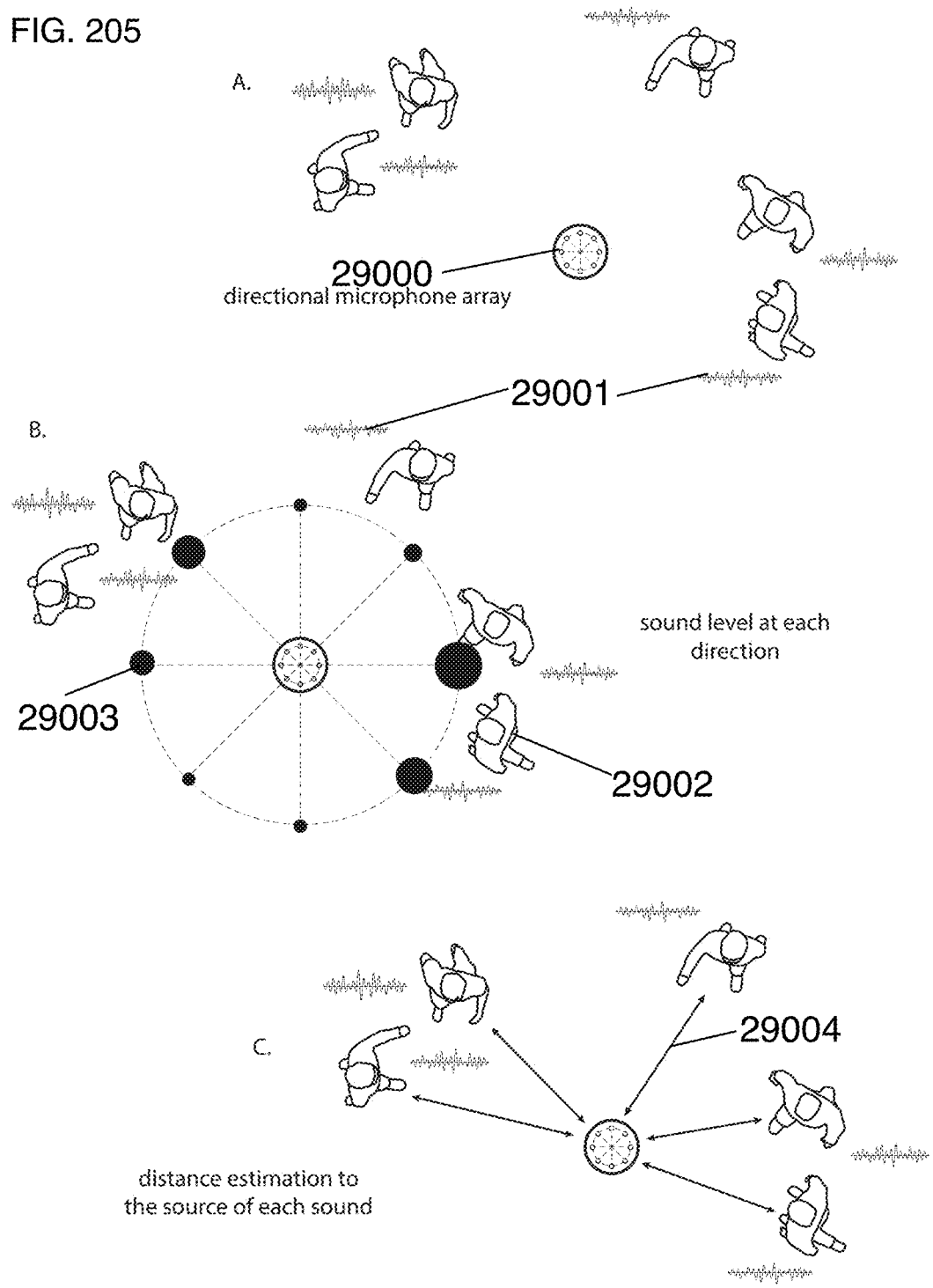
FIG. 205 illustrates a robot determining a location of persons using a directional microphone.

In some embodiments, a voice command is provided directly to the robot through a directional microphone of the robot, using an application of a smartphone paired with the robot, or using a home assistant (e.g., Siri, Alexa, Google Home, etc.). FIG. 203 illustrates examples of voice signature schematics. In some embodiments, a voice is transcribed to text then translated or transformed into visual language. In some embodiments, affinity is used to perform localization based on intangible clues. FIG. 204 illustrates voice capture signatures 28900 of various persons 28901 captured or provided to a robot 28902. A processor of the robot applies a filter and separation to determine to which person of persons 28901 each voice capture signature 28900 belongs. Separation may be based on time sequence (i.e., a same user cannot be saying two mixed sentences concurrently); extraction of words and ordering of words into meanings; lip reading, facial expression, proximity of persons, etc.; voice signatures, either from known users or unknown samples, wherein some frequencies resonate and others do not; noise reducing methods to clear background noise; and relative localization, wherein a directional microphone on the robot is used to identify where each person is in relation to the robot (e.g., such that the robot can drive to a specific person if commanded to do so). FIG. 205 illustrates A. a directional microphone 29000 capturing audio data 29001 of persons 29002; B. a sound level 29003 in each direction; and C. an estimated distance 29004 to a source of each audio data 29001. In some embodiments, the processor of the robot understands location from context. For example, from a voice command of 'help John', a processor of a robot understands a person is within a vicinity of the robot and is perhaps on a contact list or in a social network of the robot. The processor quickly identifies John from a group of people that may each potentially be John. The identification may be probabilistic in nature. Settings may be configurable and thresholds for various tasks may be set.

A power management system is disclosed such that it manages power distribution, charging and in addition supports a sleep mode and a deep sleep mode. In some embodiments two step switches would provide 5V and 3.5V to the components. In preferred embodiments, a single step switch is used to provide 5V and an LDO is used to provide 3.5V from the 5V. The charging method includes several constant current stages, where in each stage the current is gradually decreased as the terminal voltage reaches each voltage step threshold until the terminal condition is reached. In some embodiments, the first stage starts with an aggressive ramped up CV charging method. In some embodiments, the multistage method is enhanced with dynamic predictive control with additional sample points to allow transition from one stage to the next. In run time, when the robot is in pause or in standby, some components may be shut down to save power and turned back on when there is any activity observed. To operate autonomously, mapping methods are implemented within robots such that they may autonomously create a map of the working environment and subsequently use it for navigation.

Minimizing power consumption in communication wirelessly or wired is an objective in robotic systems due to geometric and other limitations. As such, power aware communication protocols may be employed. Other methods may utilize sleep mode, deep sleep mode or standby mode. In some embodiments, the robot reduces or eliminates power supply to components where they may not be immediately used. User interface and LED lighting may also be dimmed or turned off. The system may be awakened by a Wi-Fi signal coming in through an app or a button or a human voice. For contextual mapping and recommending items that may belong to an understood map, naïve Bayes methods may be used. Supervised and unsupervised learning algorithms may be used. In some embodiments, conditional independence between items may be assumed. In some embodiments, Maximum a Posterior (MAP) estimation may be used.

Figure 206:
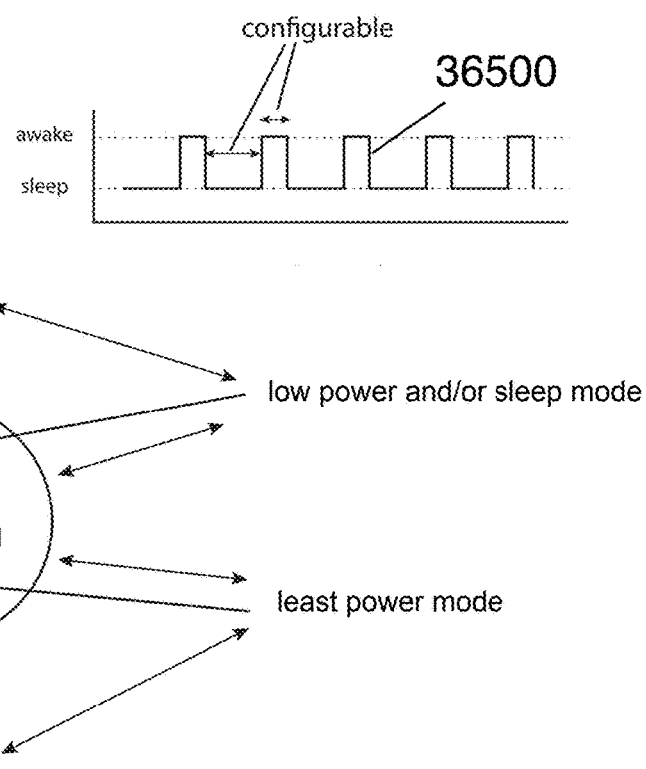
FIG. 206 illustrates various power modes of a robot.
Figure 207:
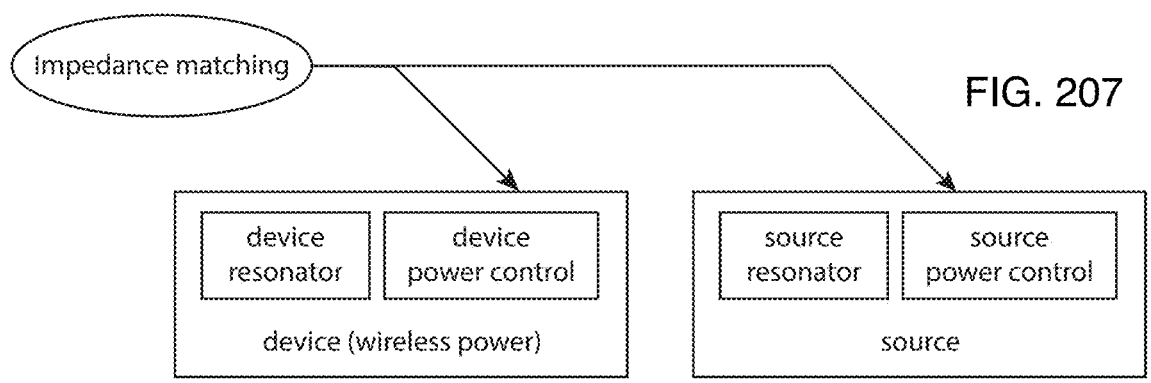
FIG. 207 illustrates impedance matching between a device and a source.

In some embodiments, wireless power may be used to keep the robot in one mode of several power saving modes, such that the robot stays alive and responsive when the robot is not charging. FIG. 206 illustrates various power modes of the robot and possible transitions between modes indicated by arrows. The modes include normal operation, standby, suspend wherein new data is not acquisitioned but latest data and content inside registers are kept, deep suspend (the lowest power mode), low power and/or sleep mode when the robot is not fully asleep, and a least power mode when the robot is not fully awake. In the low power and/or sleep mode and the least power mode the robot alternates between sleep and awake, as shown in graph 36500. When the robot is awake, all functionalities are active. FIG. 207 illustrates impedance matching between a device and a source.

Figure 208:
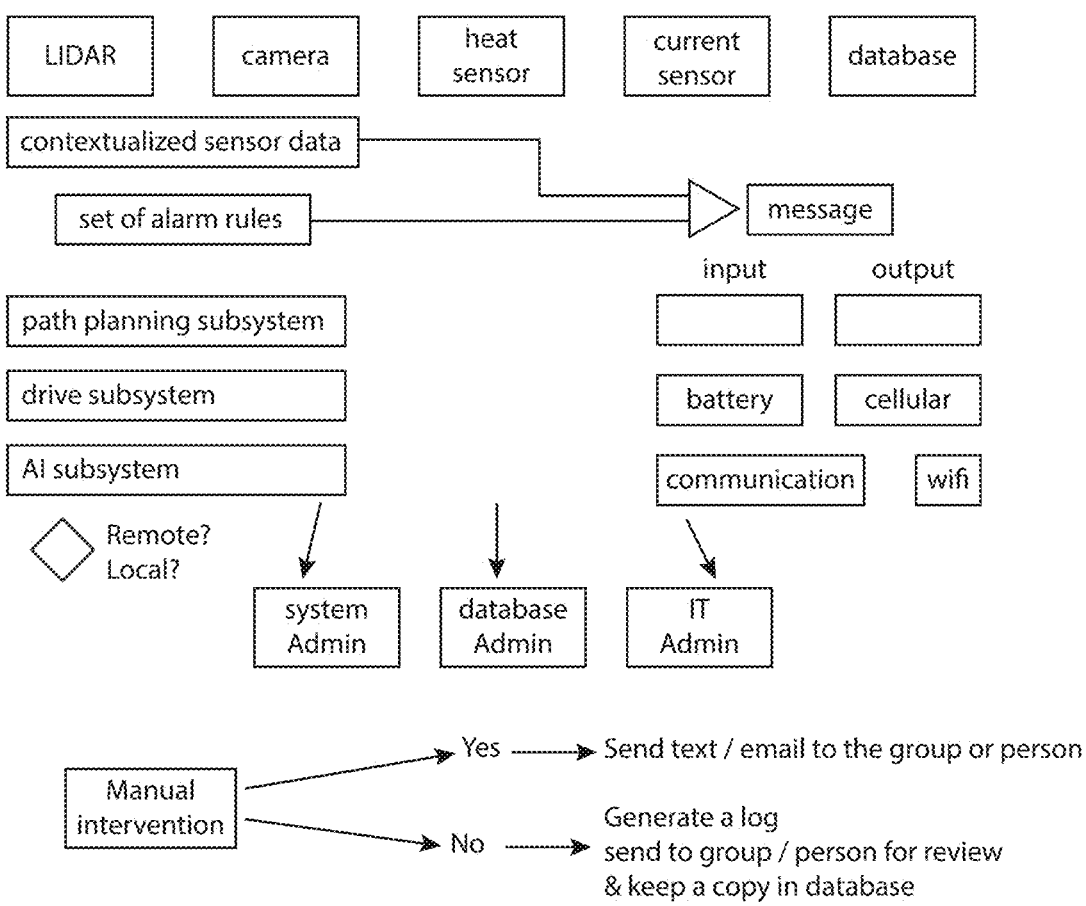
FIG. 208 illustrates an example of a process for generating and sending messages when human intervention is necessary.

In some embodiments, a message is generated on the robot, a communication device, or a user interface of an application of a communication device (e.g., a computer or smart phone) indicating human intervention is necessary to continue operation of the robot. In some embodiments, the message is sent from the robot to a user responsible for maintaining the robot via a network, the cloud, or a Wi-Fi or cellular module. In some embodiments, the message includes a map of the environment and a last known location of the robot within the map. In some embodiments, connectivity of the robot with the application may be diagnosed (e.g., to determine where the disconnect is). In some embodiments, a current status of the robot is cleared upon the issue being resolved or attended to. In some embodiments, the message is escalated when the robot is not assisted within an expected period of time, wherein escalation comprises any combination of (1) notification (i.e., a red flag), (2) involvement of additional users, (3) repeating messages at a higher than normal frequency, and (4) adding more attention-grabbing language. FIG. 208 illustrates an example of a process of generating and sending messages when human intervention is necessary to continue operation of a robot.

In some embodiments, a test fixture is used during assembly to power a PCBA of the robot and read from certain test points provisioned on the PCBA. Values of readings that fall within a particular range indicate the PCBA is functioning correctly and can be used in product assembly. If the values of readings are not within the particular range, then the PCBA is deemed unusable and set aside for investigation. In some embodiments, readings from the same test points are collected during runtime and sent to an analysis circuit. In some embodiments, a network is pre-trained to associate evolutions of voltage/current readings of test points on the PCBA with likely failure. During runtime, some embodiments resolve temporal observations into probabilistic labels that predict failure of components of the system. In some embodiments, signatures from patterns in readings are extracted and a life expectancy distribution density of components powered and tested in a particular circuit design are used as a priori data points. Monitoring the evolution of readings may indicate that a particular component is demonstrating signs of decay. Such decay may cause further damage to the component itself and others, ultimately endangering operation of the entire system.

In some embodiments, a reading and analysis circuit is built into a PCBA such that the reading and analysis circuit functions in tandem with the main functionality of the system. A processor of the system is able to read from the test points continuously and analyze the stream of data in real-time. The processor of the system may be on the same PCBA as the reading and analysis circuit or on a different PCBA. The reading and analysis circuit may use the processor of the system or have its own processor on the board. The reading and analysis circuit associates a pattern of evolution of readings with labels that indicate potential failures in various parts of the system. In some embodiments, detection of potential malfunction or failure of components is based on identification of particular signatures and/or anomalies. Signature based detection isolates a distinct observation of a known behavior with a high certainty. However, there may be times that the readings do not show a pattern close enough to the signature or that a signature does not capture outlier behaviors. In these circumstances, anomaly based detection may trigger one or more of a failsafe mechanism (e.g., run the system on a standby processor or board), automated detailed circuit diagnostic, a verbose logging, an alarm to the operator; etc. The aspect of AI described herein for detection of failure or malfunction of components is similar to network intrusion detection systems that detect and respond to malicious network traffic. In embodiments, rate of precision and rate of recall are tuned to optimize predictions and avoid false alarms. During runtime, the operator may snooze/dismiss false alarms or swap the module that provides labels in continuous reinforcement learning. Given the design of the reading and analysis circuit, the system may obtain readings from different test point locations on the board, with data from each test point location pertaining to a different component of the system. This provides the ability for local diagnosis, isolating faults in the system, for overall analysis of the system. Depending on the component (and subsystem to which the component belongs), network layers are architected to be deep or shallow, the parameters of which are selected and tuned accordingly.

Auto-diagnostics and failure prediction are essential for robotic systems as they lack qualitative observations of a human driver. For example, in a human operated vehicle, a driver feels an engine response upon pressing a gas pedal and the brake system performance upon applying brake. An abnormal reaction or response from the engine or brake system is detected by the driver, causing the driver to slow down or stop the car before complete failure. While sensory information and light indicators on a vehicle panel assist the driver in early detection of anomalies, the driver has other qualitative means to sensor abnormalities with the vehicle. Without a human driver, autonomous robotic systems need to rely on machine learning and AI to develop hypotheses of future failures and perform analysis to determine if the hypotheses are valid. In some embodiments, a data classifier reads input data, such as current, voltage, temperature, etc., and resolves the information into labels using a trained classification network. The classification network may be trained using a large volume of sample readings and based on human classification of the sample readings. During the training phase, input data passes through the classification network and a human provides a label associated with the input data, thereby classifying what that input data indicates. The human analyses logs and creates an association between particular input data and future failures of the system that occurred and particular input data and normal operation of the system. Therefore, during runtime the classification network is able to resolve input data to a label describing a potential failure of a component or the robot, a failure type, a failure location, or a failure probability of a component or the robot based on resemblance of the input data to an observation learned during the training phase.

A large volume of data is required to properly train the classification network. In some embodiments, data from large a fleet of robots (e.g., commercialized robots) is analyzed and used in training the classification network. Handcrafting circuit boards for robots that are expected to fail may be used in increasing the volume of failure data as common causes of failures in aged systems and behavior of aged components (i.e. aging passives, resistors, capacitors) are generally known. Further, functioning outside a desired safety range may affect aging and failure of other components. These factors may be used in handcrafting circuit boards that are deliberately made to induce failures.

In some embodiments, software is used to inject anomalies. Software may be deliberately designed to cause spikes in currents, to age components synthetically, or to cause components to operate outside their safety range. The software may be a software specifically designed to stress components or may be included within a system operational software used in operating a robot. For example, a software task (or process or thread) may be added to the system operational software and a scheduler may run the software task on a processor of the robot at intervals (similar to any other software) to create deliberate anomalies that age components of the robot faster. Degradation and failure data may then be collected and used in training the classification network in classifying a potential failure of a component or the robot, a failure type, a failure location, or a failure probability of a component or the robot. In some embodiments, additional synthetic degradation and failure data is created using readings acquired from a PCBA. To create synthetic data, some values are altered (to within a range) such that the synthetic data generalizes at a same rate as readings acquired from the PCBA. In some embodiments, transfer learning is used. A life expectation probability density of each component is different and has a different life expectation based on an arrangement in a circuit board as a component is subject to variables that are specific to the particular circuit board arrangement.

In some embodiments, the system is designed such that upon discovery of an anomaly or a unique signature, further diagnostics are executed to further isolate the culprit component (or subsystem). This may be executed as the system runs. Alternatively, or in addition, a fail safe mechanism is triggered upon discovery of the anomaly or the unique signature. For example, the primary function of the system may be delegated to a standby processor and the diagnostic may be executed by a processor of the primary system. As another example, in a multi-processing system, a potentially faulty component may be automatically taken offline, its load distributed among other processors (or circuits). A diagnostic routine may be executed by a processor of the system under suspicion and based on the diagnostic results, the component is either brought back online or remains offline until maintenance is performed.

A large number of failures begin with a malfunction of a first component which then expedites aging of other components the first component interacts with. For example, a decayed capacitor or resistor may allow transfer of current above or below a safe current level of a component to which the decayed capacitor or resistor is connected. As such, the next component may experience a brown out or excess power, each of which lead to a different kind of malfunction that may propagate to larger issues. Often, initial malfunction of the first component is not a complete failure. Failure of the first component is gradual or intermittent and as such does not immediately bring the robot to halt. However, intermittent malfunction or gradual decay may become more frequent or severe and over time affects the quality of components to which the degraded component is connected to. Therefore, the prediction of failures of components (or subsystems) of the robot are significant as they allow an operator enough time to take preventative action.

The predictive on-board diagnostic system described herein is unrestricted and may be used beyond navigational systems. The predictive on-board diagnostic system is application agnostic and may be used on an electronic circuit board of any electronic device. In mission critical systems, the predictive on-board diagnostic system may prevent catastrophic events. In consumer robots, the predictive on-board diagnostic system may create a better customer experience. For example, a customer service maintenance session proactively initiated by a customer service representative (based on predictive failure of a component) before any failure occurs and a customer faces the burden of opening a complaint ticket creates a positive experience for the customer. A customer service session may be initiated by a user using an application of a communication device (e.g., smart phone, laptop, tablet etc.), via email, or an electronic notification. Depending on the type of maintenance, a human customer representative may or may not be involved. For example, the application may autonomously initiate ordering of a consumable part of a robot that is predicted to fail soon. If a non-consumable part is under warranty, it may be shipped to a customer with a tutorial in performing the maintenance in advance of a failure. The customer is then able to prevent the failure by following the simple tutorial instructions to swap in the new part with the one predicted to fail.

In a preferred embodiment, the predictive on-board diagnostic system is implemented on a real-time processor, such as an Arm Cortex M or Arm Cortex R. In a real-time system, a fail-safe mechanism may immediately act to promote a standby processor to the primary processor when an anomaly is detected. In a mission critical system, where no interruption can be tolerated, the predictive on-board diagnostic system prevents the slightest downtime. The bit rate used is a fraction of that used in prior art. As encryption adds computational intensity, a lightweight implementation is encrypted with higher bit encryption keys. A low data rate requirement for transferring data allows encryption to occur at very low levels of an OSI layer. Further, an embedded system using a bare-metal MCU or a small scheduler is not subject to vulnerabilities of Linux. The system may be used on a processor that supports HW encryption.

Some embodiments use at least some methods, processes, and/or techniques for operating a robot described in U.S. Non-Provisional patent application Ser. Nos. 17/494,251, 17/670,277, and 17/990,743, and U.S. Non-Provisional patent Ser. No. 11/768,504 each of which is hereby incorporated herein by reference.

In some embodiments, the autonomous robot includes one or more processors and one or more environmental sensors (e.g., sensors that sense attributes or can observe or provide data from which inferences can be made about characteristics of an environment, such as those of a floor, a wall, or a surface of an obstacle). In some embodiments, the environmental sensor is communicatively coupled to the processor of the robot and the processor of the robot processes the sensor data (a term which is used broadly and may refer to information based on sensed or observed or inferred data at various stages of a processing pipeline). In some embodiments, the sensor includes its own processor for processing the sensor data. Examples of sensors include, but are not limited to (which is not to suggest that any other described component of the robot is required in all embodiments), floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment (e.g., periodically, like more often than once every 5 seconds, every second, every 500 ms, every 100 ms, or the like or randomly as determined by an algorithm) and the processor obtains the sensor data. In some embodiments, the sensed data is associated with location data of the robot indicating the location of the robot at the time the sensor data was obtained. In some embodiments, the processor infers environmental characteristics from the sensory data (e.g., classifying the local environment of the sensed location within some threshold distance or over some polygon like a rectangle as being with a type of environment within a ontology, like a hierarchical ontology). In some embodiments, the processor infers characteristics of the environment in real-time (e.g., during a cleaning or mapping session, for example, with 10 seconds of sensing, within 1 second of sensing, or faster) from real-time sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, etc.) based on the environmental characteristics inferred (in some cases in real-time according to the preceding sliding windows of time). In some embodiments, the processor activates or deactivates (or modulates intensity of) functions (e.g., vacuuming, mopping, UV, etc.) based on the environmental characteristics inferred (a term used broadly and that includes classification and scoring). In other instances, the processor adjusts a cleaning path, operational schedule (e.g., time when various designated areas are worked upon, such as when cleaned), and the like based on sensory data. Examples of environmental characteristics include floor type, obstacle density, room type, level of debris accumulation, level of user activity, time of user activity, etc.

In some embodiments, the processor of the robot marks inferred environmental characteristics of different locations of the environment within a map of the environment based on observations from all or a portion of current and/or historical sensory data. In some embodiments, the processor modifies the environmental characteristics of different locations within the map of the environment as new sensory data is collected and aggregated with sensory data previously collected or based on actions of the robot (e.g., cleaning history). For example, in some embodiments, the processor determines the probability of a location having different levels of debris accumulation (e.g., the probability of a particular location having low, medium and high debris accumulation) based on the sensory data. If the location has a high probability of having a high level of debris accumulation and was just cleaned, the processor reduces the probability of the location having a high level of debris accumulation and increases the probability of having a low level of debris accumulation. Based on sensed data, some embodiments may classify or score different areas of a working environment according to various dimensions, e.g., classifying by floor type in a hierarchical floor type ontology or according to a dirt-accumulation score by debris density or rate of accumulation.

In some embodiments, the processor associates each or a portion of the environmental sensor readings with the particular cell of the grid map within which the robot was located when the particular sensor readings were taken. In some embodiments, the processor associates environmental characteristics directly measured or inferred from sensor readings with the particular cell within which the robot was located when the particular sensor readings were taken. In some embodiments, the processor associates environmental sensor data obtained from a fixed sensing device and/or another robot with cells of the grid map. In some embodiments, the robot continues to cover the surface of the environment until data from the environmental sensor is collected for each or a select number of cells of the grid map. In some embodiments, the environmental characteristics (predicted or measured or inferred) associated with cells of the grid map include, but are not limited to (which is not to suggest that any other described characteristic is required in all embodiments), a floor type, a room type, a type of floor transition, a level of debris accumulation, a type of debris, a size of debris, a level of user activity, a time of user activity, etc. In some embodiments, the environmental characteristics associated with cells of the grid map are based on sensor data collected during multiple working sessions wherein characteristics are assigned a probability of being true based on observations of the environment over time.

In some embodiments, the processor associates (e.g., in memory of the robot) information such as date, time, and location with each sensor reading or other environmental characteristic based thereon. In some embodiments, the processor associates information to only a portion of the sensor readings. In some embodiments, the processor stores all or a portion of the environmental sensor data and all or a portion of any other data associated with the environmental sensor data in a memory of the robot. In some embodiments, the processor uses the aggregated stored data for optimizing (a term which is used herein to refer to improving relative to previous configurations and does not require a global optimum) cleaning of the environment by adjusting settings of components such that they are ideal (or otherwise improved) for the particular environmental characteristics of the location being serviced or to be serviced.

In some embodiments, the processor of the robot generates a new grid map with new characteristics associated with each or a portion of the cells of the grid map at each work session. For instance, each unit tile may have associated therewith a plurality of environmental characteristics, like classifications in an ontology or scores in various dimensions like those discussed above. In some embodiments, the processor compiles the map generated at the end of a work session with an aggregate map based on a combination of maps generated during each or a portion of prior work sessions. In some embodiments, the processor directly integrates data collected during a work session into the aggregate map either after the work session or in real-time as data is collected. In some embodiments, the processor aggregates (e.g., consolidates a plurality of values into a single value based on the plurality of values) current sensor data collected with all or a portion of sensor data previously collected during prior working sessions of the robot. In some embodiments, the processor also aggregates all or a portion of sensor data collected by sensors of other robots or fixed sensing devices monitoring the environment.

In some embodiments, the processor (e.g., of a robot or a remote server system, either one of which (or a combination of which) may implement the various logical operations described herein) determines probabilities of environmental characteristics (e.g., an obstacle, a floor type, a type of floor transition, a room type, a level of debris accumulation, a type or size of debris, etc.) existing in a particular location of the environment based on current sensor data and sensor data collected during prior work sessions. For example, in some embodiments, the processor updates probabilities of different floor types existing in a particular location of the environment based on the currently inferred floor type of the particular location and the previously inferred floor types of the particular location during prior working sessions of the robot and/or of other robots or fixed sensing devices monitoring the environment. In some embodiments, the processor updates the aggregate map after each work session. In some embodiments, the processor adjusts speed of components and/or activates/deactivates functions based on environmental characteristics with highest probability of existing in the particular location of the robot such that they are ideal for the environmental characteristics predicted. For example, based on aggregate sensory data there is an 85% probability that the type of floor in a particular location is hardwood, a 5% probability it is carpet, and a 10% probability it is tile. The processor adjusts the speed of components to ideal speed for hardwood flooring given the high probability of the location having hardwood flooring. Some embodiments may classify unit tiles into a flooring ontology, and entries in that ontology may be mapped in memory to various operational characteristics of actuators of the robot that are to be applied.

In some embodiments, the processor uses the aggregate map to predict areas with high risk of stalling, colliding with obstacles and/or becoming entangled with an obstruction. In some embodiments, the processor records the location of each such occurrence and marks the corresponding grid cell(s) in which the occurrence took place. For example, the processor uses aggregated obstacle sensor data collected over multiple work sessions to determine areas with high probability of collisions or aggregated electrical current sensor of a peripheral brush motor to determine areas with high probability of increased electrical current due to entanglement with an obstruction. In some embodiments, the processor causes the robot to avoid or reduce visitation to such areas. In some embodiments, the processor uses the aggregate map to determine a navigational path within the environment, which in some cases, may include a coverage path in various areas (e.g., areas including collections of adjacent unit tiles, like rooms in a multi-room work environment). Various navigation paths may be implemented based on the environmental characteristics of different locations within the aggregate map. For example, the processor may generate a cleaning path that covers areas only requiring low impeller motor speed (e.g., areas with low debris accumulation, areas with hardwood floor, etc.) when individuals are detected as being or predicted to be present within the environment to reduce noise disturbances. In another example, the processor generates (e.g., forms a new instance or selects an extant instance) a cleaning path that covers areas with high probability of having high levels of debris accumulation, e.g., a cleaning path may be selected that covers a first area with a first historical rate of debris accumulation and does not cover a second area with a second, lower, historical rate of debris accumulation.

In some embodiments, the processor of the robot uses real-time environmental sensor data (or environmental characteristics inferred therefrom) or environmental sensor data aggregated from different working sessions or information from the aggregate map of the environment to dynamically adjust the speed of components and/or activate/deactivate functions of the robot during operation in an environment. For example, an electrical current sensor may be used to measure the amount of current drawn by a motor of a main brush in real-time. The processor may infer the type of floor based on the amount current drawn and in response adjusts the speed of components such that they are ideal for the particular floor type. For instance, if the current drawn by the motor of the main brush is high, the processor may infer that the robot is on carpet, as more power is required to rotate the main brush at a particular speed on carpet as compared to hard flooring (e.g., wood or tile). In response to inferring carpet, the processor may increase the speed of the main brush and impeller (or increase applied torque without changing speed, or increase speed and torque) and reduces the speed of the wheels for a deeper cleaning. Some embodiments may raise or lower a brush in response to a similar inference, e.g., lowering a brush to achieve a deeper clean. In a similar manner, an electrical current sensor that measures the current drawn by a motor of a wheel may be used to predict the type of flooring, as carpet, for example, requires more current to be drawn by the motor to maintain a particular speed as compared to hard flooring.

In some embodiments, the processor infers presence of users from sensory data of a motion sensor (e.g., while the robot is static, or with a sensor configured to reject signals from motion of the robot itself). In response to inferring the presence of users, the processor may reduce impeller speed to decrease noise disturbance. In a further example, the processor identifies a user in a particular area of the environment using obstacle sensor data collected during a cleaning session. In response, the processor reduces the speed of the impeller motor when operating within the particular area or avoids the particular area to reduce noise disturbances to the user.

In some embodiments, the processor adjusts speed of components, selects actions of the robot, and adjusts settings of the robot, each in response to real-time or aggregated sensor data (or environmental characteristics inferred therefrom). For example, the processor may adjust the speed or torque of a main brush motor, an impeller motor, a peripheral brush motor or a wheel motor, activate or deactivate (or change luminosity or frequency of) ultraviolet (UV) treatment from a UV light configured to emit below a robot, steam and/or liquid mopping (e.g., modulating flow rate of soap or water), sweeping, or vacuuming (e.g., modulating pressure drop or flow rate), set a cleaning schedule, adjust a cleaning path, etc. in response to real-time or aggregated sensor data (or environmental characteristics inferred therefrom). In one instance, the processor of the robot may determine a cleaning path based on debris accumulation data of the aggregate map such that the cleaning path first covers areas with high likelihood of high levels of debris accumulation (relative to other areas of the work environment), then covers areas with high likelihood of low levels of debris accumulation. Or the processor may determine a cleaning path based on cleaning all areas having a first type of flooring before cleaning all areas having a second type of flooring. In another instance, the processor of the robot may determine the speed of an impeller motor based on most likely debris size or floor type marked in the aggregate map such that higher speeds are used in areas with high likelihood of large sized debris or carpet and lower speeds are used in areas with high likelihood of small sized debris or hard flooring.

In some embodiments, the processor may use machine learning techniques to predict environmental characteristics using sensor data such that adjustments to speed of components of the robot can be made autonomously and in real-time to accommodate the current environment. Examples can include, but are not limited to, adjustments to the speed of the main brush, wheels, impeller and peripheral brush, activating/deactivating UV treatment, sweeping, steam or liquid mopping, and vacuuming, adjustments to cleaning path and cleaning schedule, etc. In some embodiments, the processor may use a classifier such as a convolutional neural network to classify real-time sensor data of a location within the environment into different environmental characteristic classes such as floor types, room types, levels of debris accumulation, debris types, debris sizes, and the like.

In some embodiments, the robot may encounter stains on the floor during a working session. In some embodiments, different stains (e.g., material composition of stain, size of stain, etc.) on the floor may require varying levels of cleaning intensity to remove the stain from, for example, a hardwood floor. In some embodiments, the robot may encounter debris on floors. In some embodiments, debris may be different for each encounter (e.g., type of debris, amount of debris, etc.). In some embodiments, these encounters may be divided into categories (e.g., by amount of debris accumulation encountered or by size of stain encountered or by type of debris or stain encountered). In some embodiments, each category may occur at different frequencies in different locations within the environment. For example, the robot may encounter a large amount of debris accumulation at a high frequency in a particular area of the environment. In some embodiments, the processor of the robot may record such frequencies for different areas of the environment during various work sessions and determine patterns related to stains and debris accumulation based on the different encounters. For example, the processor may identify particular areas as being likely to have hard to clean stains and may actuate the robot to perform a deep clean in such areas. In some embodiments, the processor may adjust cleaning strategies based on the derived patterns. In some embodiments, observations captured by sensors of the robot may be visualized by a user using an application of a communication device. For instance, a stain observed by sensors of the robot at a particular location may be displayed in a map of the environment at the particular location it was observed. In some embodiments, stains observed in previous work sessions are displayed in a lighter shade and stain observed during a current work session are displayed in a darker shade. This allows a user to visualize areas in which stains are often observed and currently observed. In some embodiments, the user may choose an actuation based on the visualization displayed to the user, such as observed locations of stains or high debris accumulation. Examples of actuations include increasing cleaning frequency, reducing the speed of the robot, decreasing a distance between parallel lines in the robot path or increasing coverage overlap, adding extra coverage for an area, autonomous AI actuation, etc.

Some embodiments may use at least some of the methods, processes, and/or techniques for autonomously adjusting settings of the robot described in U.S. Non-Provisional patent application Ser. Nos. 17/693,946, 17/494,251, 17/670,277, and 17/990,743, and U.S. Non-Provisional patent Ser. Nos. 10/795,377 and 11/768,504, each of which is hereby incorporated herein by reference.

In some embodiments, a camera, installed on the robot, for example, measures the depth from the camera to objects within a first field of view. In some embodiments, a processor of the robot constructs a first segment of the map from the depth measurements taken within the first field of view. The processor may establish a first recognized area within the working environment, bound by the first segment of the map and the outer limits of the first field of view. In some embodiments, the robot begins to perform work within the first recognized area. As the robot with attached camera rotates and translates within the first recognized area, the camera continuously takes depth measurements to objects within the field of view of the camera. In some embodiments, the processor compares depth measurements taken within the second field of view to those taken within the first field of view in order to find the overlapping measurements between the two fields of view. The processor may use different methods to compare measurements from overlapping fields of view. An area of overlap between the two fields of view is identified (e.g., determined) when (e.g., during evaluation a plurality of candidate overlaps) a number of consecutive (e.g., adjacent in pixel space) depths from the first and second fields of view are equal or close in value. Although the value of overlapping depth measurements from the first and second fields of view may not be exactly the same, depths with similar values, to within a tolerance range of one another, can be identified (e.g., determined to correspond based on similarity of the values). Furthermore, identifying matching patterns in the value of depth measurements within the first and second fields of view can also be used in identifying the area of overlap. For example, a sudden increase then decrease in the depth values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the perceived depths, can also be used to estimate the area of overlap. A Jacobian and Hessian matrix can be used to identify such similarities.

In some embodiments, the processor uses a neural network to stitch images together and form a map. Various methods may be used independently or in combination in stitching images at overlapping points, such as least square method. Several methods may work in parallel, organized through a neural network to achieve better stitching between images. Particularly with 3D scenarios, using one or more methods in parallel, each method being a neuron working within the bigger network, is advantageous. In embodiments, these methods may be organized in a layered approach. In embodiments, different methods in the network may be activated based on large training sets formulated in advance and on how the information coming into the network (in a specific setting) matches the previous training data.

Figure 209:
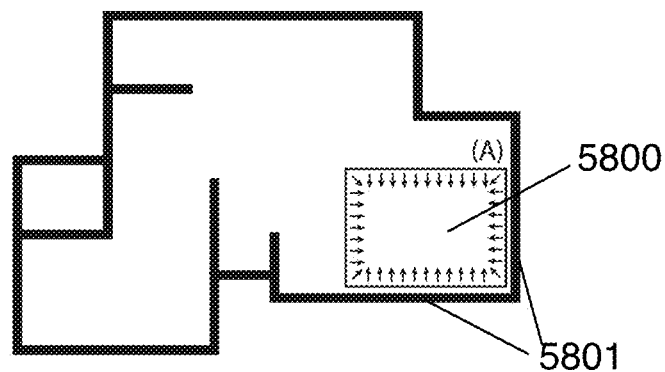
FIG. 209 illustrates an example of partial coastal mapping.

Some embodiments include a radially outward SLAM method for robots. In the radially outward SLAM method, a robot immediately begins performing work, as opposed to the commonly executed rigid box inward looking SLAM method. In the rigid box inward looking SLAM method, the robot initially follows along one or more walls while creating a rigid box by closing the loop at a starting point of the box before beginning coverage. After following one or more walls and establishing the one or more walls as the ground truth of one or more perimeters of a map with high certainty, the robot makes a substantially 90 degrees turn to close the loop and form a rectangle, or otherwise a ground truth area that may be covered by the robot. For example, FIG. 209 illustrates a rectangle 5800 including two ground truth perimeters coinciding with walls 5801 and two sides that do not coincide with a wall. This SLAM method may be viewed as partial coastal mapping, whereas in costal mapping the robot follows along all walls before beginning to perform work.

In some embodiments, global sensors, such as a LIDAR or a camera, are used to establish walls as ground-truth perimeter points. In some embodiments, a second sensor, such as a short-range distance sensor or a bumper sensor, also senses the walls as the robot follows along the walls. Sensing the walls with the second sensor confirms sensor readings of the global sensor, as the global sensors use remote sensing techniques with lower certainty and lower resolution. The additional sensor readings captured by the second sensor increases the confidence score of the map and localization of the robot within the map. Since the second sensor is limited to confirming the location of walls, only the global sensors are used in sensing the areas that do not coincide with a wall. However, given that the locations of walls used as ground truth perimeter points have a high certainty, even with the lower accuracy areas of the map that do not coincide with a wall, the overall stability of the map is high. In some instances, low certainty long range sensors are used for mapping directions that are not directed towards a wall which limits the FOV of uncertain areas.

Figure 210:
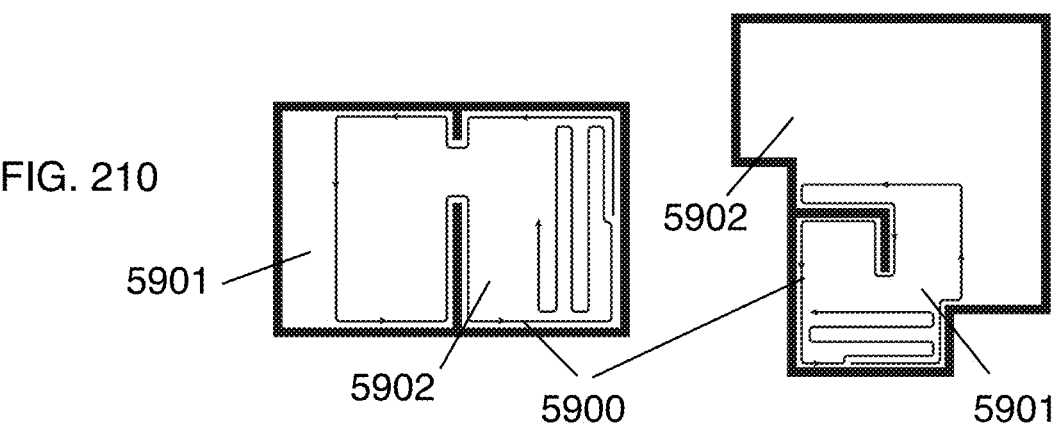
FIG. 210 illustrates an example of mapped rigid areas.
Figure 211:
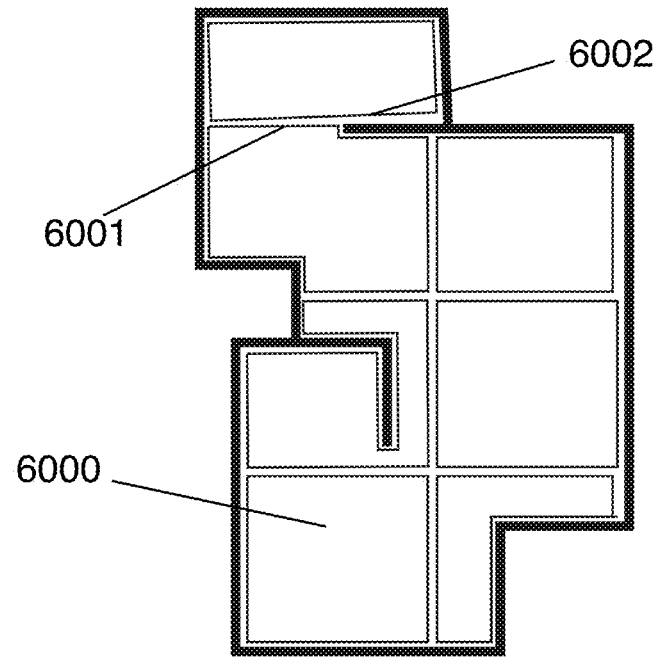
FIG. 211 illustrates an example of rigid geometries within which a robot performs work.

The rigid box inward looking SLAM method described above is limited by its rigid form, causing the robot to infringe on room boundaries in some instances and clean in an inorganic-looking way (i.e., cleaning rooms partially as opposed to cleaning from one room to another room, one at a time). For example, FIG. 210 illustrates two examples of mapped rigid areas 5900 within which the robot performs coverage. Both rigid areas 5900 span over two rooms 5901 and 5902. The areas 5900 in each case cover only a portion of room 5902, causing the robot to clean in a seemingly inorganic way. Additionally, with the rigid box inward looking SLAM method, alignment of rigid geometries may suffer as they are added one on top of another. FIG. 211 illustrates an example of areas 6000 with rigid geometries within which the robot performs coverage. As each area of the areas 6000 are mapped they are each added one on top of the other, and in some instances, issues with alignment arise, as in the case of perimeters 6001 and 6002 of adjacent areas. The rigid box inward looking SLAM method further requires a large computational expense (processing and memory) as the entire mapped area is formed by stitching each of the areas 6000. While consumer homes require enough processing to perform coverage within an area of a home (e.g., 240 square meters), commercial establishments such as shopping malls, hotels, and offices are much larger and require much more processing and memory. Therefore, if the entire mapped area is formed into a single area by stitching multiple smaller areas together, computational intensity increases exponentially, causing limitations on the amount of area that can be covered by the robot.

Figure 212:
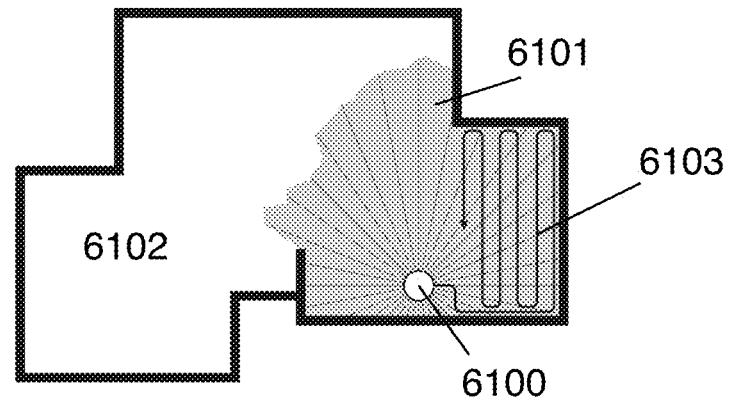
FIG. 212 illustrates an example of a robot performing work.

In contrast to the rigid box inward looking SLAM method, the radially outward looking SLAM method immediately begins map filling and localization upon startup of the robot and compensates for a lack of ground truth walls using probabilistic algorithms. The robot begins performing work soon after being turned on by using partial observation of the environment. FIG. 212 illustrates a robot 6100 with partial observation of subarea 6101 within an environment 6102. The robot 6100 begins performing work within observed area 6101 upon startup of the robot by following along path 6103. As the robot 6100 performs work, a processor of the robot continues to expand the areas observed using newly captured sensor data of the environment 6102. The processor continues to plan paths that cover the newly observed areas. The radially outward looking SLAM method uses rooms as opposed to being restricted to rigid geometries, as is the case in the rigid box inward looking SLAM method. For instance, FIG. 210 illustrates rigid geometries 5900 that violate the boundaries of rooms

5901 and 5902, respectively, as the SLAM method follows a substantially rigid pattern. This may be reasonable for a consumer home, however, for larger establishments, such as a hotel or a shopping mall, it is impractical for the robot to enter and exit a hotel room or a shop in a mall while cleaning the hotel room or shop.

Figure 213:
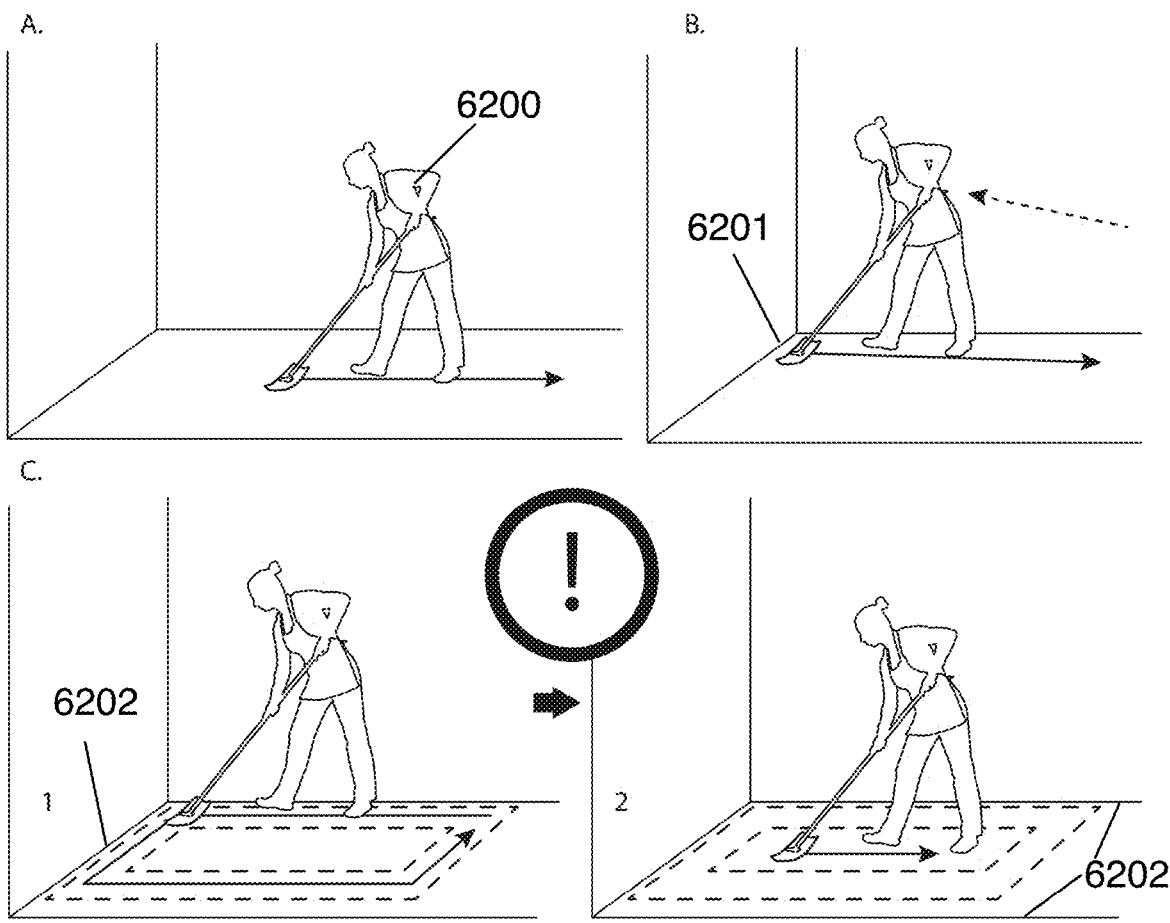
FIG. 213 illustrates examples of a person performing a cleaning task.

In embodiments, rigid box inward looking SLAM method is limiting for applications where coverage is not the goal. For example, scouting robots, surveillance robots, food delivery robots, or service robots do not need to follow along a wall to perform their function. It is unintuitive for such robot types to follow along some walls before performing their intended function. For a home cleaning robot or a commercial cleaning robot the wall following limitation is masked as the robot must cover areas along the walls as part of its coverage task. Typically, the robot initially covers some areas along the walls to establish ground truth perimeters for the map. However, even in a coverage task, it is inorganic to initially clean along some walls of a room rather than areas initially surrounding the cleaner. For instance, a human tasked to mop or vacuum a floor does not create a rigid box with one or two sides coinciding with one or two walls then clean inside the rigid box. The human is more likely to start cleaning areas initially surrounding a location of the human at the time the task was given or begin cleaning from one wall work inwards towards a center of the room and finally the wall opposite from where the cleaning began. It is unintuitive for a human to follow along a first wall, then a second wall without touching any other areas. FIG. 213 illustrates A. a person 6200 intuitively starting a cleaning task in areas surroundings the person 6200 or B. the person 6200 intuitively starting a cleaning task from a corner or wall 6201 and cleaning towards a center of the room and C. the person 6200 unintuitively following along walls 6202, drawing a narrow width rectangle 6203 and then cleaning inside the rectangle 6203.

In some embodiments, a robot comprising a camera, LIDAR, or depth camera with a controller stores a map previously created by the processor of the robot or by a processor of another robot. The LIDAR or camera capture readings indicative of boundaries and obstacles within the environment. The processor of the robot determines, based on a difference between the LIDAR or camera data and the map, whether the map requires revision or the robot has taken a detour or an alternate path without updating the map. In some embodiments, the processor of the robot refines and smoothens the map after a cartography run by the robot or a collaborating robot. This allows the mapping to rely more on online state estimation using filtering methods with a Markovian assumption. For example, EKF works based on such an assumption and removes the histories that have little impact on the current state. However, this assumption suffers from an update transforming a Gaussian distribution to a form wherein the act of linearization, by definition, ignores data that accumulates a sufficient size error over a series of stamps to invalidate the assumption. Prior art only considers the state estimation in an online sense, wherein the latest measurements are incorporated in real-time as they are captured, some or all sliding window methods, or a pose graph. In some embodiments herein, a dynamic sized sliding window is used and a size of the window changes with availability of computational resources. When a CPU engagement is below a certain threshold, the window size increases to make use of the resources that are available and would otherwise go unused. This keeps the residual errors from accumulating and becoming out of control and periodically in check on a best effort basis. In some intervals, loop closure occurs, however, in other instances, the robot runs minimal navigational tasks. Since a multithreading system allows for resource management, the threads with higher priority get served while some threads intending to apply smoothing when computational resources are available are pruned (or pre-empted) if the availability condition changes. This allows best use of resources in a cartography run, wherein the robot navigates while performing work and the processor applies filters such as EKF or particle filters.

After the cartography run, during which optimal use of resources is made, a full-pose graph optimization may be executed by a playback of recordings of states (similar to a deja vu for the robot). This may be thought of as the processor of the robot, now knowing the future, going back and avoiding the residual mistakes (i.e., errors) made, finding key frames and constructing BA between them, considering larger window sizes or a window size determined based on a co-visibility graph, or solving the complete full SLAM problem while the robot is stationary, charging, and waiting for a next run. In some embodiments, the playback smoothing is interrupted by a user instructing the robot to perform work, in which case the rest of the playback continues at a later time. In many environments, such as a house or a supermarket, the environment rarely changes structurally. As a result, an occasional or single smoothing or backend optimization has significant impact. This way, the available computational resources are spread more evenly and the SLAM optimization requirements are traffic shaped. In implementation, Schur Kron reduction or node elimination, Gaussian reduction, and other linear algebra may be used. In some embodiments, delayed smoothing occurs in the background as a very low priority task and is capped at a certain MCU/CPU usage percentage, MIPS, or clock rate. In some cases, cloud usage resources are capped to better use existing resources. In some embodiments, delayed smoothing occurs on the cloud concurrent with or after the cartography run. Delayed smoothing particularly works well with multi-type feature detection.

In some embodiments, a perfect map is corrupted with bad data points. For instance, map drift and warping may occur over a small time frame (e.g., a second) and may be the result of many different root causes. Though each root cause may require individual recovery, a protection mechanism may prevent several root causes of map corruption from occurring, ultimately reducing the occurrence rate of situations requiring recovery and the reliance on such recoveries. Some embodiments employ an umbrella map management method to prevent bad data from corrupting a perfect map. The map management method is inspired by the concept of critical mass, particularly in the context of statistical chance of survival for companies in the event of a catastrophic incident, wherein an index statistically measures an amount of tolerance a system has in dealing with various undesired situations. Herein, a scoring mechanism to score a map is combined with a shielding mechanism to prevent a highly reliable map from being corrupted by reducing a level of reliance on new data when necessary. The quality of a map is measured based on the quality of incoming sensor data using statistical analysis. This approach is beneficial in various respects, such as preventing thin obstacles from moving from one cell to another during a run. In prior art and older technology, map warping occurs when the robot encounters a glass obstacle, such as a glass wall. The glass wall acts as a mirror and a reflection of an opaque wall in the glass wall in line with a nearby opaque wall causes map drift. Further, reflections may sometimes cause a phantom wall to be detected. Another concern for map corruption relates to signal reflection. For instance, a LIDAR sensor and several other sensors rely on sensing a reflected signal. Often it is difficult for the processor to distinguish a reflected light signal of a current transmitted signal from reflected light signals of previously transmitted signals that have bounced off of some objects and reached the sensor at a same time. Another issue in the prior art and older technology related to the influence of reflectivity. Reflectivity is a determinant factor in the likelihood of detecting an object with a camera or an active illumination beam reflected off of an object. The likelihood of detection is probabilistically estimated with a normalized ratio calculated by dividing the number of successfully detected objects by the sum of all detected and undetected (i.e., objects expected to be detected but were not) objects in a series of experiments. Given reflectivity plays a role in the range within which a LIDAR sensor or camera can return reliable results and that reflectivity varies in different environments, times of day, seasons, weather conditions, etc., an unresolved challenge in the prior art is developing a method to overcome such issues reliably.

Herein, improvements to issues in the prior art and older technologies are proposed. Embodiments described herein disclose reducing map drift by reducing map filling strength in uncertain circumstances, introducing a non-linear probability map within the map using a sigmoid function, and increasing dynamic range within the map. In some embodiments, reducing map filling strength may be countered by non-linear mapping using the sigmoid function. This stabilizes the map and helps overcome map warping. Another improvement described herein includes bounding global planning and map analysis expansions by detecting boundaries, adding a map of boundaries of perimeter followed obstacles, and tracking perimeter followed boundaries by raytracing between added track poses, wherein boundary points added within a short time span from one another are assumed to be continuous boundaries. In embodiments, the track pose is offset to a right side of the robot for right side perimeter follows. In some embodiments, a minimum separation distance condition is used to decide whether to add candidate track poses, wherein only new poses that are less than the separation distance threshold are tracked when the angles from the last tracked pose are greater than a specified threshold. In some embodiments, navigation planning is bound by the wall followed boundaries except through robot snail trails. In some embodiments, global planning is not allowed to expand through the wall followed boundaries unless it is through the robot snail trails. In embodiments, wall followed boundaries bound (close or fence) areas. As the robot covers an area bound by boundaries, portions of the area covered are marked as completed and outlines of the area are tracked as open or candidate coverage directions. In some embodiments, map-analysis expansions through wall followed boundaries are not permitted except when expanding through robot snail trail areas. The conditions and algorithmic improvements disclosed above improve map stability, specifically the execution of radially outward mapping without falling into corner cases. Some embodiments implement a LIDAR scan pitch and roll correction to reduce map warping. In some embodiments, the bounding of global planning and map-analysis expansions by wall followed boundaries is implemented in combination with LIDAR scan pitch and roll corrections. In other embodiments, the bounding of global planning and map-analysis expansions by wall followed boundaries is solely implemented. LIDAR scan pitch and roll correction may be used to increase scan matching accuracy and consequently map stabilization. Some embodiments implement additional filtering of outliers and discards portions of data that does not fit well with the majority of the data.

In some embodiments, a memory of a robot stores a lighter resolution map with elaborate metadata as a reference. In some embodiments, the processor of the robot chooses to only load the light resolution map for areas immediately surrounding the robot and load a down-sampled map for areas that are not immediately relevant. In some cases, the processor may not load any map data relating to areas remote to the robot. A place of storage of various forms of data at different levels of details may be decided architecturally. For example, some data may be loaded to RAM, some data may be cached, some data may be offloaded and kept on the cloud, etc.

In some embodiments, spatial data is transmitted from the robot to a cloud service. The cloud service may compare the received spatial data with previous maps stored for the same environment or location within the environment. Upon finding a match between the spatial data and a previous map, cloud services may transmit the previous map to the robot for use in navigation. Alternatively, the cloud service may inform the robot of which previous map locally stored matched with the spatial data and the processor of robot may load the stored map. In some embodiments, the processor of the robot transmits newly collected spatial data to the cloud service for storage in the cloud for future use. In some embodiments, the cloud service or the processor of the robot appends the newly collected spatial data to a previous map to improve the quality, add new details, update changes, or add areas that were previously undiscovered in an already existing map. Any newly uploaded or previously stored maps or data may be fused temporally to improve, expand, augment, increase resolution, add details, remove errors, etc. from already existing map or data.

In some embodiments, a map is deemed a 'confirmed' or 'verified' map when the map has been updated or reaffirmed a sufficient number of times through multiple runs of a single robot and/or a crowd of robots and/or based on user input confirming that the map is accurate (e.g., via an application of a communication device paired with the robot). In some embodiments, a 'confirmed' or 'verified' map is not editable to avoid any disruption from subsequently collected poor data. In embodiments wherein newly collected data is found to be a good match with a previously created map, the newly collected data is merged with the previously created map upon user input confirming the merger (e.g., via an application of a communication device paired with the robot).

The processing of data captured with a camera, a depth camera, a LIDAR, or any other exteroceptive perception sensor is processed in different sequences, as explained herein. The steps of data processing and filtering may occur in parallel or in serial, with an order other than that explained herein.

FIG. 214 illustrates various means for representing of an environment of the robot including (1) temporal representation wherein data at different time steps are captured as the robot drives along a path; (2) temporal on grid; (3) stitching of data at overlapping points to generate a representation of the environment; (4) combining of data to generate a reconstructed 3D mesh of the environment; (5) immersive using virtual reality (VR) or extended reality (XR) for observing the environment with a wearable device (e.g., headset) and viewing the environment in 2D using an application of a computing device; (6) a 2D top view of the environment; (7) synthesizing a representation of the environment from a point cloud and texturing the representation using semantic features; (8) texturized from images; (9) a 2D top view where a floor and walls are texturized; (10) semantic object-based localization to represent the environment, wherein instructions or robot behaviors associated with different objects are maintained despite the location of the objects within the environment; and top view, 3D reconstruction, or immersive representation of the environment with 2D image, icon, or 3D reconstruction of objects overlaid.

Figure 217:
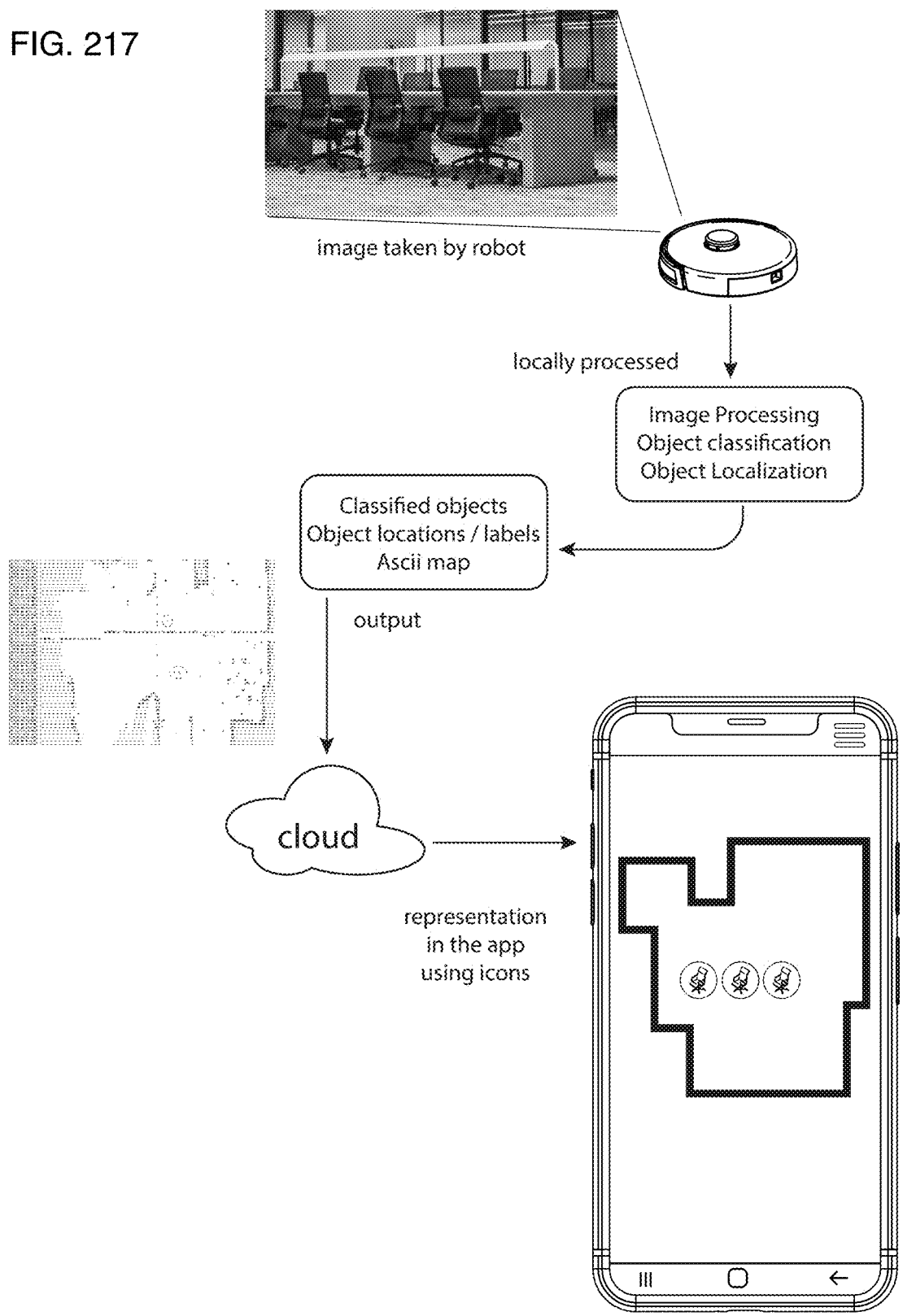

Basic SLAM technology creates a structural map of the environment using sensor readings captured by a depth camera or a LIDAR. However, with basic SLAM, the environment is not understood, as such, path planning decisions are not made based on an understanding of the environment, the way a human would make path planning decisions. The SLAM techniques disclosed herein include several contextual elements. For example, an AI-based algorithm distinguishes a room in an environment in real-time, on the fly, before visiting all areas of the environment, and a path of the robot is planned in a room-to-room manner. In prior art, mapping of the entire environment is required before the map is segmented and rooms are distinguished. Other examples of contextual elements include floor types, glass/invisible walls, active illumination clues, and object localization. FIG. 215A is an office 2400 within an environment. FIG. 215B illustrates a portion of a map of the environment, including the office 2400. There is no object information included in the map. Some embodiments add object information to the map. Classifying objects in a stand-alone setting is not considered a challenge anymore. The challenge is in localizing the classified objects, or otherwise, in overlaying the objects on the map in their proper positions. Other challenges include motion blur as a result of movement and different classification of objects as the robot approaches and observes the objects from different angles. As the processor of the robot maps the environment, a camera disposed on the robot captures images from the environment and a SLAM algorithm localizes objects captured in the images within the map. For example, FIG. 216 illustrates an ASCII representation of the office 2400. ASCII characters in FIG. 216 show the structure of the office 2400 as well as objects within the office 2400 that the processor of the robot has recognized. In this example, 0 represents a cable, 1 represents a shoe, 2 represents a sock, and 3 represents a chair. From a hardware standpoint, this concept is fully embedded on a main PCB by implementing the controller on the PCB. The camera and other sensors are disposed in a casing or a proper frame and act as a stand-alone module within the robot. With this process, image processing and object classification are executed locally on the robot. This means, instead of actual images as output, the output is classified objects or object labels and their proper positions within the map. The map may be transmitted over the cloud and later used to represent objects within the map using icons. As such, the process is locally contained, and since images are processed locally, the user's privacy is protected and leakage of visual data is prevented. FIG. 217 illustrates the above-described process, beginning with an image captured from the environment and resulting with the application displaying a map including objects in their proper positions represented as icons.

Figure 218:
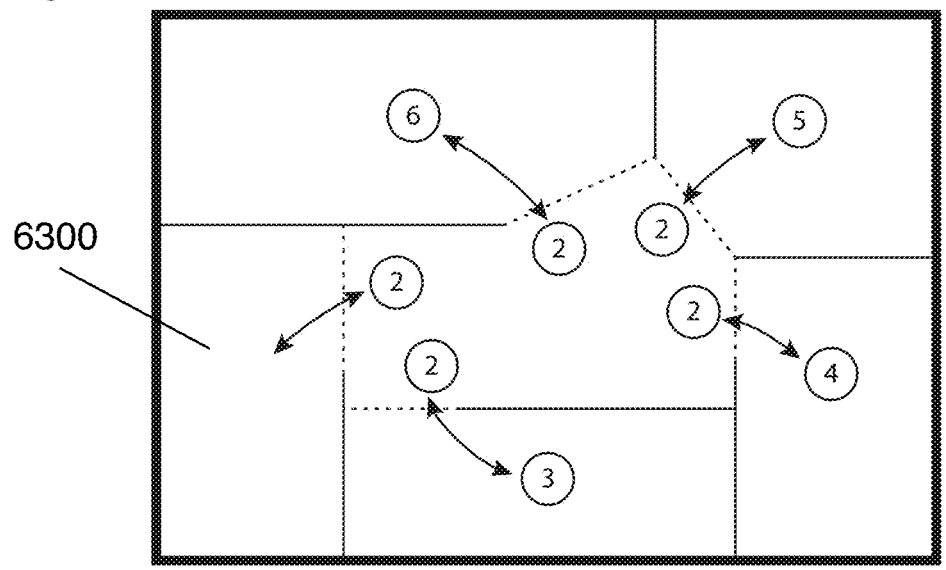
Figure 219:
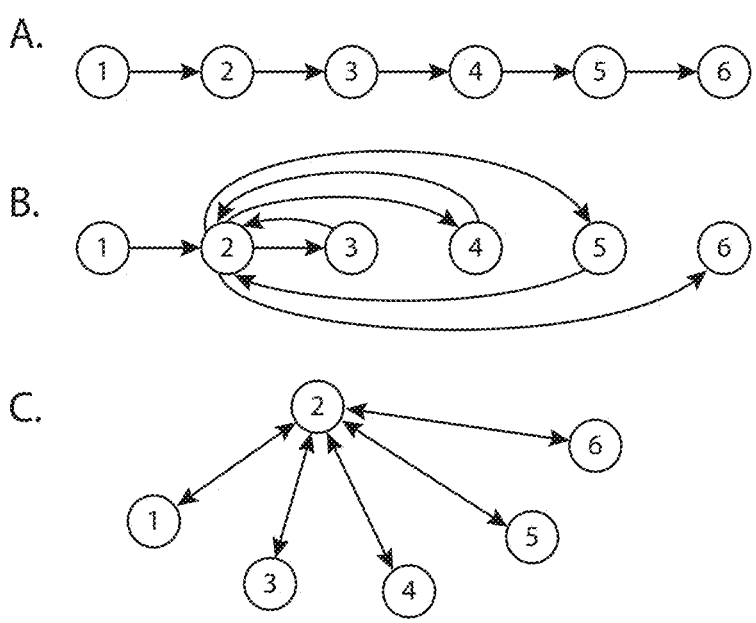

To reduce computational cost that increases exponentially with a size of a workspace, the processor of the robot divides the workspace into logical area units (e.g., rooms in a home, stores in a mall, suites in a hotel, etc.) and stores a map for each logical area unit, wherein each logical area unit is connected to other logical area units. In embodiments, a graph is used to represent the connections between logical area units. FIG. 218 illustrates an example of six logical area units in an environment 6300, each connected to at least one other logical area unit. Logical area unit 2 is connected to logical area units 1, 3, 4, 5, and 6 through openings (illustrated by dashed lines). FIG. 219A illustrates a graph of the connections of logical area units 1-6 within environment 6300. The graph is generated as a linear connection of vertices as the robot moves from one logical area unit to another in numerical order, ignoring redundant links. FIGS. 219B and 219C illustrate alternative graphs that represent the connections between logical area units in environment 6300 as the robot moves from one logical area unit to another in numerical order.

After an initial assignment of each logical area unit to a node, the processor offloads prior nodes (especially logical area units that are more than one edge away) into a location of memory storage that differs from active processing memory, as the robot explores and finds new logical area units. For example, a processor uses primary memory (sometimes on-chip) for immediate tasks, a secondary memory for less immediate tasks, and a third memory for tasks and information that are less likely to be needed in real-time. A primary memory often communicates directly with the processor, has a very high speed with limited capacity, and is sometimes built into the processor. A secondary memory offers more capacity but less speed. Often data present on the secondary memory is loaded to primary memory for processing and sent back to the secondary memory. Data is stored on storage memory, which often survives a power switch. Storage memory comprises NV-RAM or flash memory, as they provide a means to store data as opposed to being active in processing data. Through a process of paging and caching, the processor optimizes available memory spaces.

Upon entrance to a new logical area unit, the robot performs an initial exploration. Upon the processor identifying a particular logical area unit (e.g., room 2), the loads a map associated with the logical area unit. In some embodiments, the processor caches maps of previous logical area units visited. If the processor stores the map of the particular logical area unit, there is no need to offload and reload the map, as offloading and reloading requires computational cycles, and therefore, does not save significantly on efficiency.

In some embodiments, the processor keeps more than one logical area unit in the cache (e.g., 2, 3, 4, 5, and 10 hub rooms), depending on a shape of the graph, the processing power and other computational resources, and a current size of the workspace. For example, when computational resources of the robot permits storing 4000 sq. ft. of the workspace with a particular obstacle arrangement complexity and 3000 sq. ft. of logical area units are already discovered, there is no need to offload the vertices pertaining to the 3000 sq. ft. to secondary memory.

With a hierarchical graph approach, a size of the map scales to larger areas with controlled addition of computational intensity, such as a linear increase, reasonably more than a linear increase, or much more than a linear increase. There are more advantages to using a hierarchical approach as the workspace increases in size. In some embodiments, a set of attributes and properties are associated with each logical area unit, such as a label (e.g., type of room or a number), a size, a floor type, a number of floor types and the areas pertaining to each floor type, a set of features (e.g., corners), light sources (e.g., bulbs on the ceiling or walls), power outlet locations, objects (e.g., furniture or appliances) and their respective locations, objects on the floor in a current run or histogram of runs, a set of actions associated with detected objects on the floor, etc. For example, the processor instructs the robot to stay away from a detected object (e.g., socks).

Figure 220:
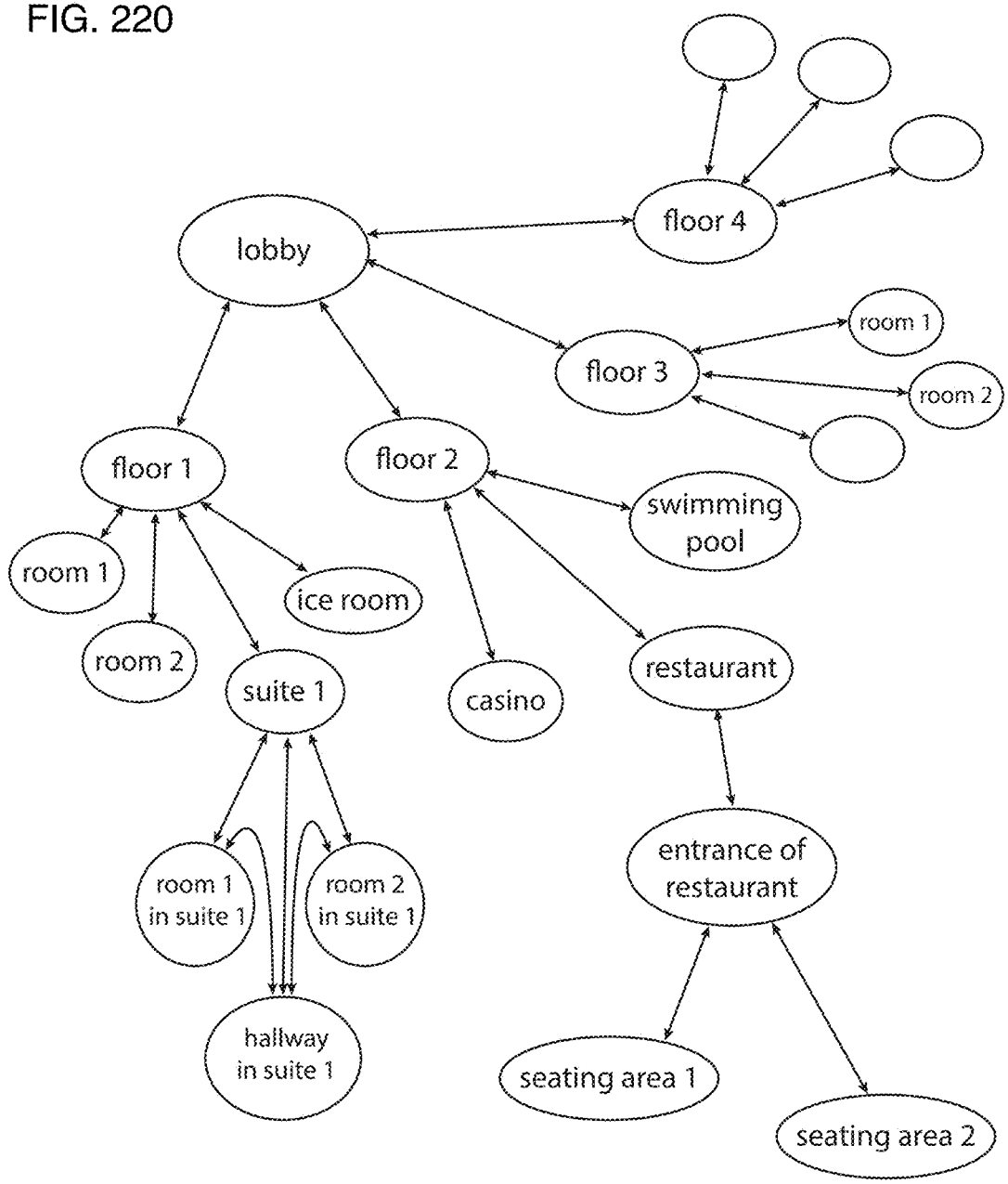

A logical area unit may comprise a room or a floor or another area. For example, a house with multiple floors includes multiple maps and each map is represented as a logical area unit. In some embodiments, a user uses a GUI or HMI interface of an application paired with the robot to choose a map of a current location of the robot manually as opposed to the processor of the robot automatically choosing the correct map via a relocalization process. In another example, a hotel with multiple floors, each floor with multiple rooms is represented using a graph architecture that allows for growth. FIG. 220 illustrates an example of a graph of a hotel, wherein the lobby, each floor and all rooms accessible from each of the floors are logical area units. The rooms in suite 1 and the entrance and seating areas of the restaurant are also logical area units.

The hierarchical approach is especially advantageous for managing computational resources required for storing a vector field map as the vector field map encompasses more data dimensions than a grid map or a combined grid map and feature map. While the concept of logical area units applies to various types of maps, implemented hierarchically or linearly, the concept logical area units is a subject of this invention and may be combined with other method and techniques described herein. For example, the processor of the robot identifies a room and the robot treats the workspace with coverage in a first run while honoring the constraints of a logical area unit, which may be combined with one or more methods and techniques described herein, such as room coloring.

Figure 221:
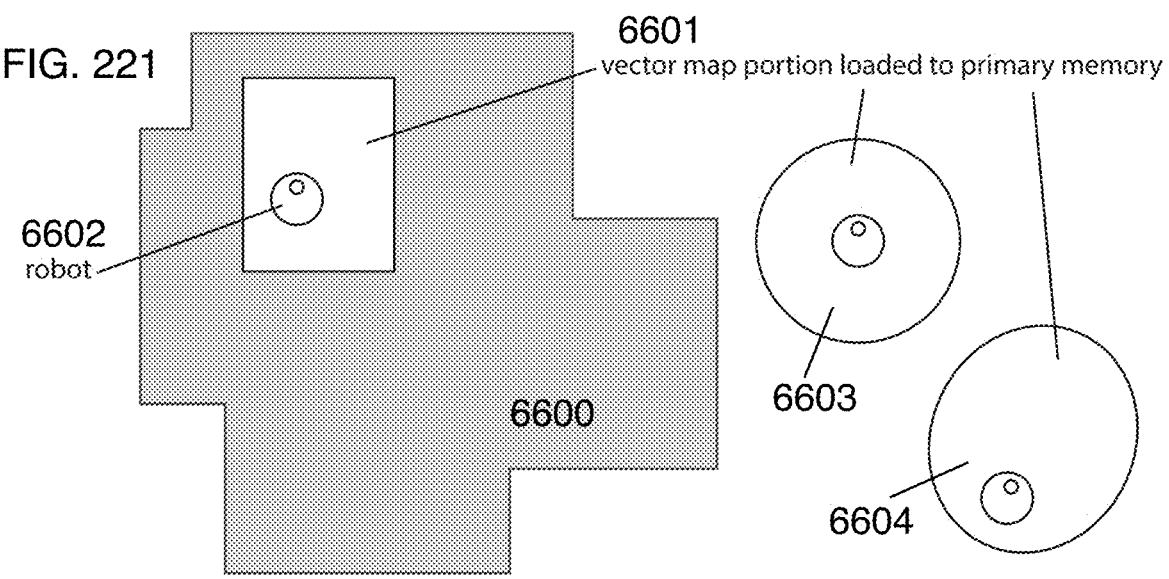
Figure 222:
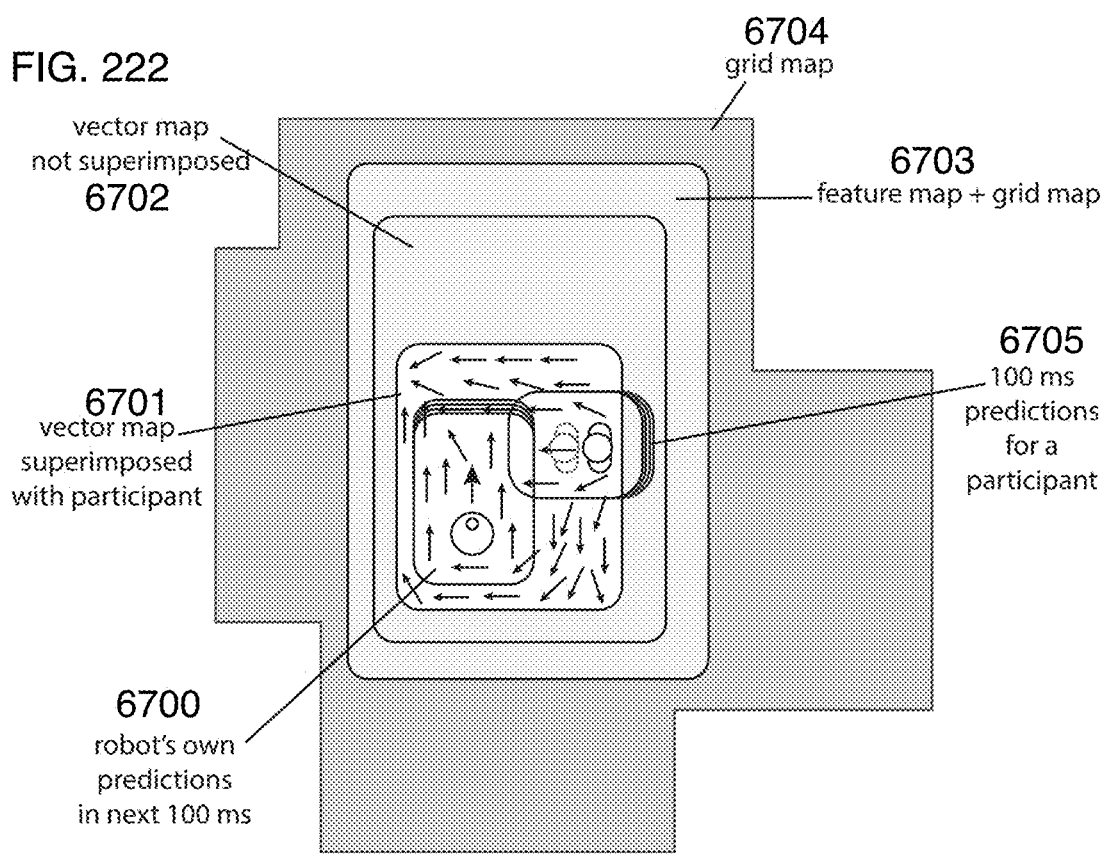

In some embodiments, the logical area unit is not used in conjunction with offloading and reloading map portions. A block of the feature map, grid map, or vector field map surrounding the robot is loaded, such as areas in front, behind and to the sides of the robot. FIG. 221 illustrates a vector map 6600 and a rectangular vector map portion 6601 surrounding robot 6602 loaded to primary memory. The vector map portion may be different shapes, such as circular vector map portions 6603 and 6604. Loading an area of a map that is immediately applicable to a location of the robot as well as areas that the robot is predicted to be located within in the next 100 ms, 299 ms, 300 ms, 1 second, 2 second, etc. saves computational processing. The processor may use the feature vector map superimposed with dynamic participants to formulate predictions of locations of the dynamic participants within the next 100 ms, 200 ms, 300 ms, etc. The parts of the feature vector map superimposed with pose predictions of the dynamic participants which the robot is unable to reach prior to the predictions expiring are not loaded. Only information within the vicinity of the robot is useful, as such, that is the information that is loaded, making processing practically feasible. In some embodiments, two or more regions within a vicinity of the robot are loaded. For example, FIG. 222 illustrates a vector field map of a first region 6700 within an immediate vicinity of the robot superimposed with a vector field map superimposed with predictions of participant locations 6701, a second region 6702 including a vector field map, a third region 6703 including a feature map and a grid map, and a fourth region including the grid map 6704. Predictions of a location of the robot in a next 100 ms 6700 and predictions of a location of the participant in a next 100 ms 6705 are also superimposed. Other portions of the grid map 6704 are not loaded to save on processing.

The use of rooms as logical units of area is organic. In some embodiments, the processor of the robot uses a hierarchical separation of rooms in a graph, wherein each room is a node in the graph. This helps with scaling the map, such as beyond the size of a consumer home, as a store in a shopping mall or a hotel room in a hotel, for example, are not required to be a part of a single flat humongous map. When presented to the user using an application of a communication device paired with the robot, logical units of areas, or otherwise a room, serve as a more intuitive way of communicating a status of the work relating to each room with the user. In some embodiments, rooms within the map are colored. In some embodiments, rooms within the graph are colored based on partial observability, wherein a color is assigned to an area that forms an enclosure as soon as the robot enters the area and perceives the area as the enclosure. Graph coloring or vertex coloring may be defined on an undirected graph G=(V, E), wherein a color C from a set C $\{C_1, C_2, C_3, \ldots, C_i\}$ is assigned to a vertex V from a set V $\{V_1, V_2, V_3, V_4, \ldots, V_j\}$ such that where an edge E between vertices $V_i$ and $V_j$ exists, $C(V_i) \neq C(V_j)$. To formalize the problem for G=(V, E), a relating function R is required, A: V"S such that V $(V_i, V_j) \in V$, R $(V_i) \neq R (V_j)$, wherein $|S|$ is a minimum cardinal number, V has n members, and p is the probability of an edge existing between two vertices.

Since easily distinguishable colors are limited, minimizing the quantity of colors used may be beneficial. For example, on a small screen device it may not be easy for a user to distinguish one room colored a shade of orange from a second room colored a shade of red if the shades are similar to one another and the two room with the two colors are positioned next to each other. As a result, the two rooms may appear to be one room. In some embodiments, it may be desirable for rooms to each be colored with distinct colors without any adjacent rooms having a same color or substantially similar color. In some embodiments, reuse of a color may not be acceptable, while in other embodiments reuse of a color is acceptable given that adjacent vertices do not have a same color. In addition to graph coloring or vertex coloring, in some embodiments, edge coloring, face coloring or hatching may be used.

A graph colored with at least K colors is a K-chromatic graph. Each of the vertices that are colored with Ki forms a subset of all vertices that are assigned to a color class. In some embodiments, four to six, seven to nine, ten or more, or another number of colors may be used. A chromatic polynomial P(G, t) provides a number of ways that a graph G may be colored using a particular number of colors t. The chromatic polynomial P(G, t) may be restricted by a set of rules and constraints. In one instance, a greedy coloring method assigns vertices in a set V $\{V_1, V_2, V_3, V_4, \ldots, V_j\}$ colors from an ordered set of colors C $\{C_1, C_2, C_3, \ldots C_i, C_j\}$. Vertices ordered in the set are each assigned a color from the color set with a smallest available index. In some instances, additional constraints may be used. For example, a set of colors assigned to a large number of hotel rooms wherein the cleaning schedule is based on a set of constraints (e.g., guest check out, room availability for check in time, etc.) and a single robot is unable to clean more than one room at a time, may use a modified graph coloring algorithm to accommodate the additional constraints. To find a solution for graph coloring, methods of dynamic programming (DP), linear programming (LP), or brute force (BF) may be used. For instance, a greedy coloring method counts through vertices one by one and assigns a first available color to the respective vertex. The greedy coloring method algorithmically performs the following steps: set $V_i \neq 0$ to initialize vertex element to zero; $V_i = V_{i+1}$ wherein increment $V_i$ given i≤n; assign $C_j$ to ($V_i$) from the set C; and $C \subset C_n$ wherein set C is a subset of $C_n$, $C_N = \{C_1, C_2, C_3, \ldots C_j, C_{j+1} \ldots C_n\}$, $C = \{C_j, C_{j+1}, \ldots C_N\}$ and j is an unused color. In some embodiments, a branch and bound algorithm is used for determining the chromatic number of a graph. In some embodiments, a Zykov tree may be explored from an upper bound to a lower bound.

Some embodiments may use at least some of the methods, processes, and/or techniques for creating, updating, and presenting a map of an environment (including information within the map) described in U.S. Non-Provisional patent application Ser. Nos. 17/494,251, 17/670,277, and 17/990,743, and U.S. Non-Provisional patent Ser. Nos. 10/612,929, 11/768,504, 10/915,114, 10/482,619, 11/348,269, 10/809,071, 11/274,929, and 10/422,648, each of which is hereby incorporated herein by reference.

Figure 223:
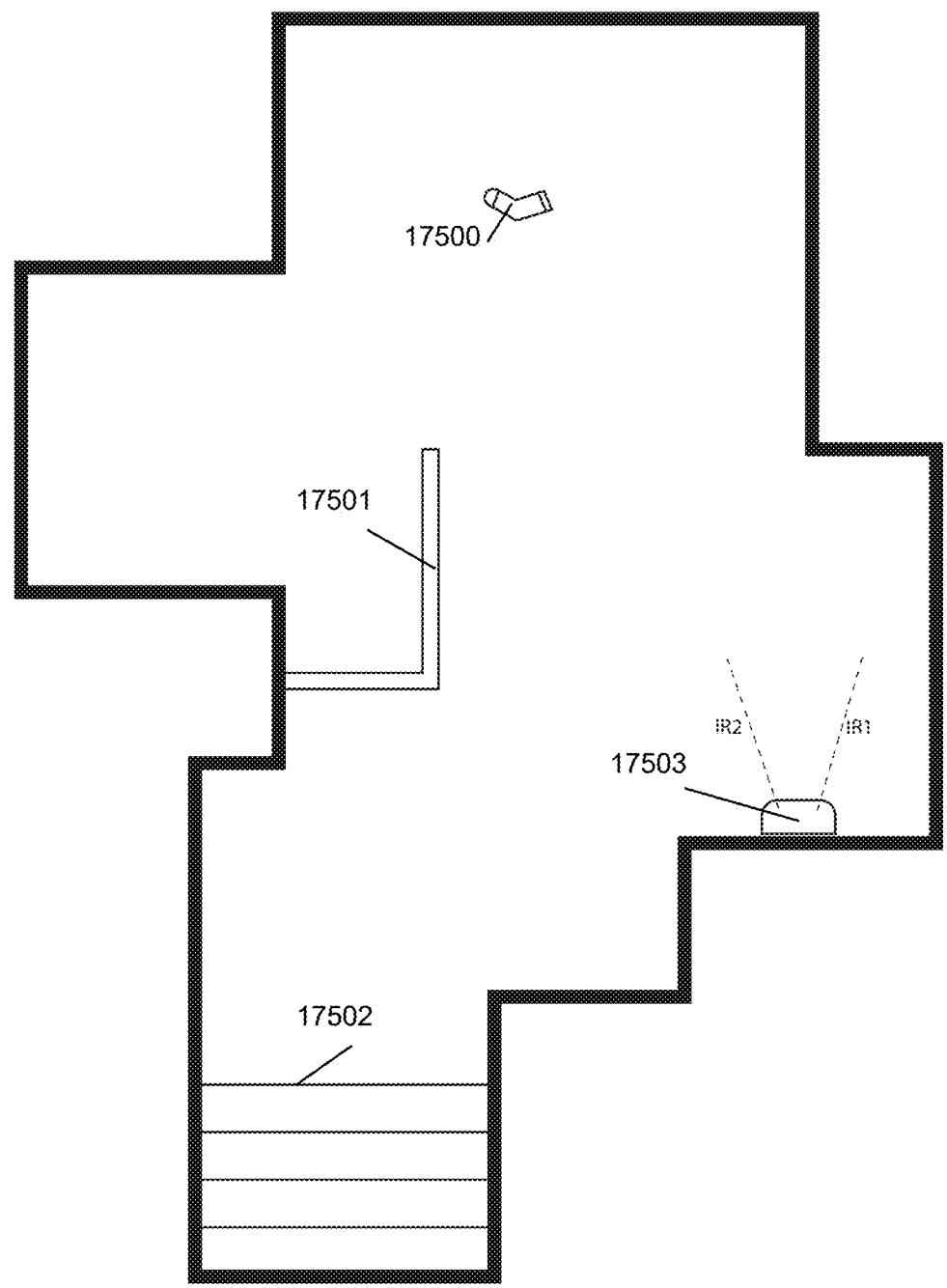

In some embodiments, the processor may add different types of information to the map of the environment. For example, FIG. 223 illustrates four different types of information that may be added to the map, including an identified object such as a sock 17500, an identified obstacle such as a glass wall 17501, an identified cliff such as a staircase 17502, and a charging station of the robot 17503. The processor may identify an object by using a camera to capture an image of the object and matching the captured image of the object against a library of different types of objects. The processor may detect an obstacle, such as the glass wall 17501, using data from a TOF sensor or bumper. The processor may detect a cliff, such as staircase 17502, by using data from a camera, TOF, or other sensor positioned underneath the robot in a downwards facing orientation. The processor may identify the charging station 17503 by detecting IR signals emitted from the charging station 17503. In one example, the processor may add people or animals observed in particular locations and any associated attributes (e.g., clothing, mood, etc.) to the map of the environment. In another example, the processor may add different cars observed in particular locations to the map of the environment.

Figure 224:
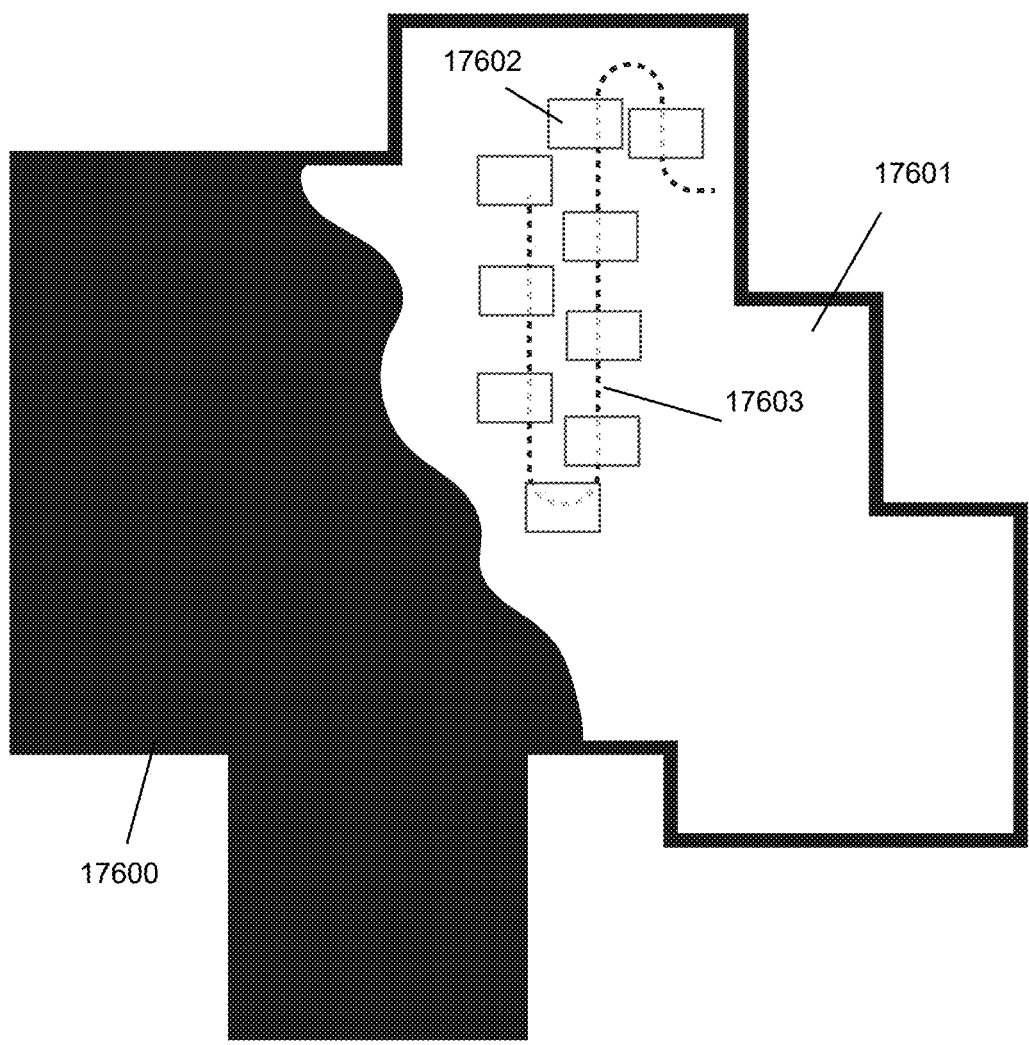
Figure 225A:
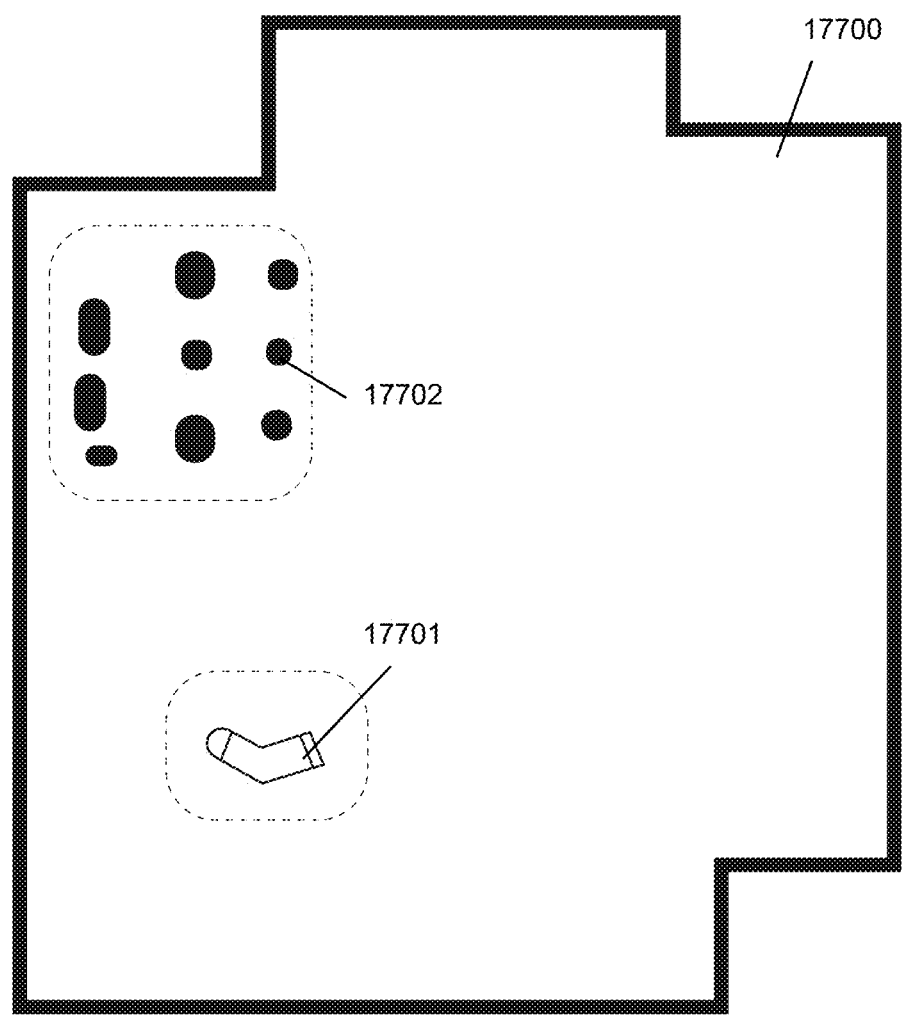
Figure 225B:
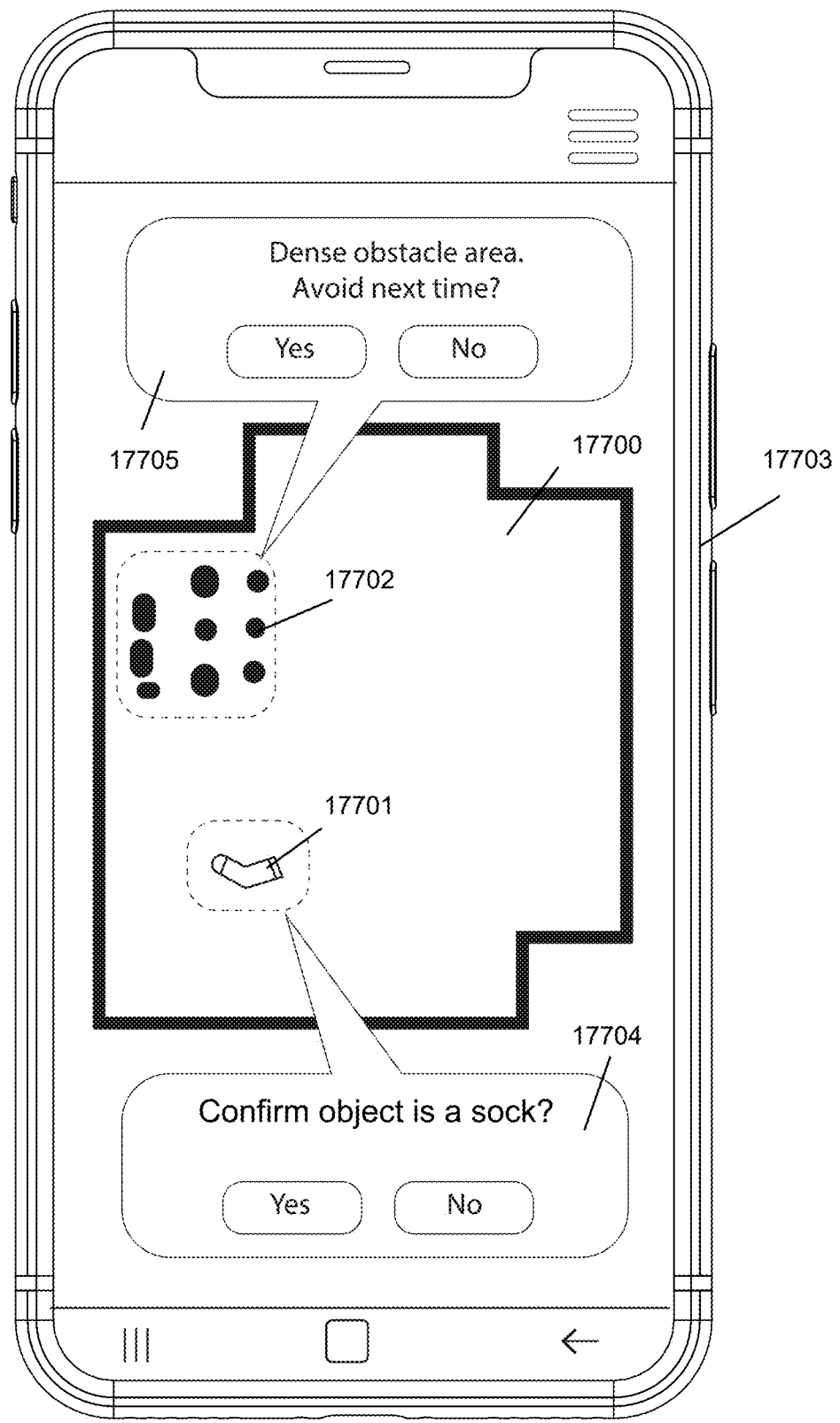

In some embodiments, the processor of the robot may insert image data information at locations within the map from which the image data was captured from. FIG. 224 illustrates an example of a map including undiscovered area 17600 and mapped area 17601. Images 17602 captured as the robot maps the environment while navigating along the path 17603 are placed within the map at a location from which each of the images were captured from. In some embodiments, images may be associated with a location from the images are captured from. In some embodiments, the processor stitches images of areas discovered by the robot together in a two dimensional grid map. In some embodiments, an image may be associated with information such as the location from which the image was captured from, the time and date on which the image was captured, and the people or objects captured within the image. In some embodiments, a user may access the images on an application of a communication device. In some embodiments, the processor or the application may sort the images according to a particular filter, such as by date, location, persons within the image, favorites, etc. In some embodiments, the location of different types of objects captured within an image may be recorded or marked with the map of the environment. For example, images of socks may be associated with the location at which the socks were found in each time stamp. Over time, the processor may know that socks are more likely to be found in the bedroom as compared to the kitchen. In some embodiments, the location of different types of objects and/or object density may be included in the map of the environment that may be viewed using an application of a communication device. For example, FIG. 225A illustrates an example of a map of an environment 17700 including the location of object 17701 and high obstacle density area 17702. FIG. 225B illustrates the map 17700 viewed using an application of a communication device 17703. A user may use the application to confirm that the object type of the object 17701 is a sock by choosing yes or no in the dialogue box 17704 and to determine if the high density obstacle area 17702 should be avoided by choosing yes or no in dialogue box 17705. In this example, the user may choose to not avoid the sock, however, the user may choose to avoid other object types, such as cables.

Figure 227:
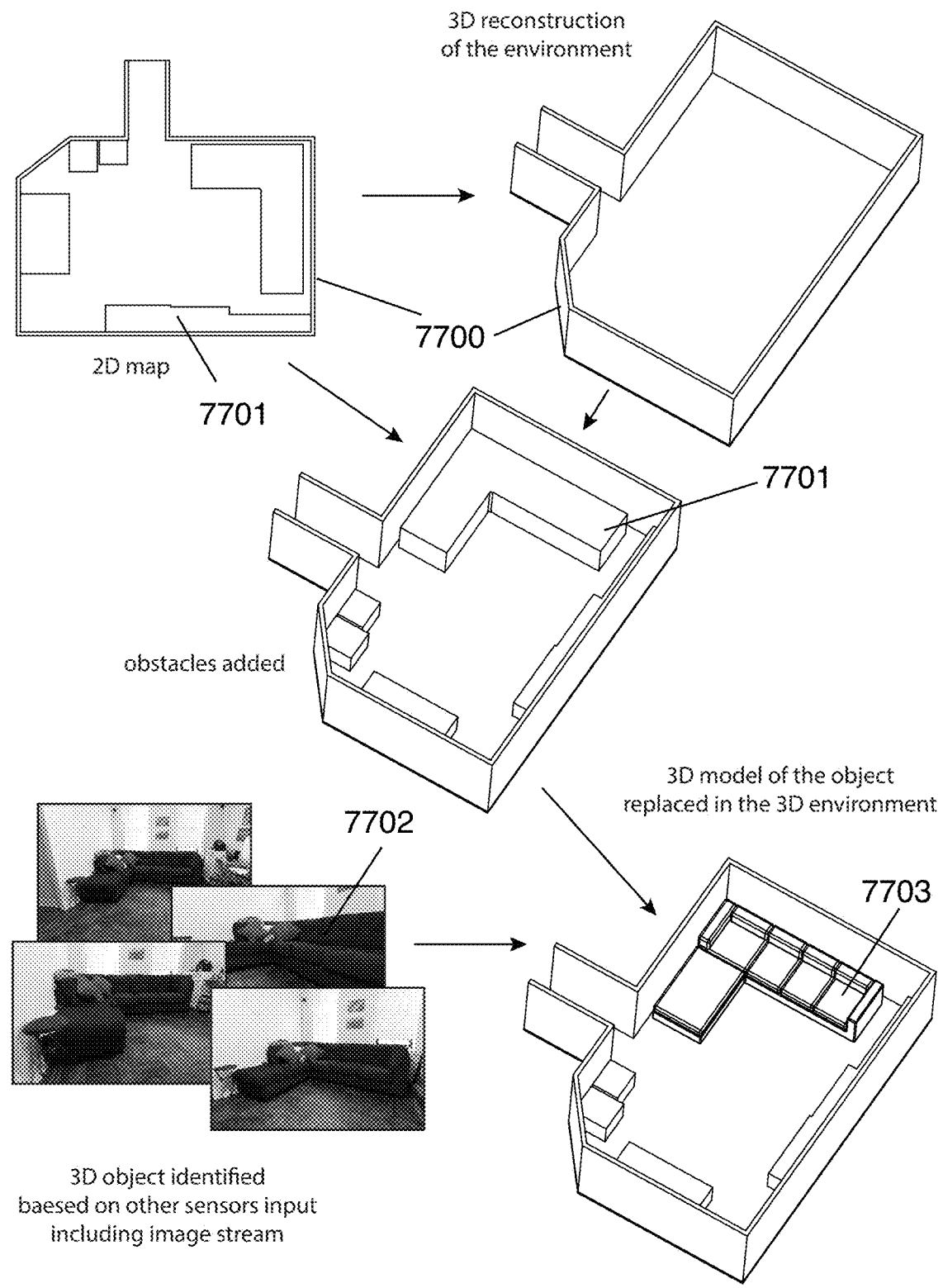

In some embodiments, the SLAM enabled robot generates a 3D model of the environment using data from various sensors. For example, the processor of the robot directly generates the 3D model of the environment as the robot runs within the environment when the robot is equipped with more sophisticated sensors for sensing the environment in 3D (e.g., 3D LIDAR, depth sensor). In some embodiments, upon the robot approaching a piece of furniture, the processor recognizes a type of the furniture and adds a 3D model of the furniture (or a model similar to the type of furniture) into the 3D environment. FIG. 226 illustrates various types of data including images and point cloud data as well as a wireframe model and surface model of a couch 7600. The couch 7600 is reconstructed in 3D by combining the data. In some embodiments, the processor of the robot generates a 2D map and build a 3D model of the environment based on the 2D map by extruding the walls in a vertical direction and placing doors, windows, and other architectural elements in the 3D model. The processor may place objects within the environment by recognizing objects (e.g., furniture) using sensors (e.g., camera and image sensors) and placing 3D model replicas of the objects within the 3D model of the environment. FIG. 227 illustrates an example of a 2D map and a 3D map generated from the 2D map by extruding walls 7700 and objects 7701 in a vertical direction. The processor of the robot identifies the objects 7701 based on sensor input including image data of the object, in this case couch 7702, and replaces objects 7701 with 3D models 7703 of the identified object.

In some embodiments, the objects placed within the 3D model of the environment are pregenerated object models. Pregenerated object models may be parametric such that they may be adjusted to fit a particular environment. Properties, such as dimensions, colors, and style, may be modified to adjust the pregenerated object model to match the real furniture within the environment. Model properties may be categorized into two different groups, basic (or low level) properties, such as dimensions and colors, and smart (or high level) properties, such as material, style and existence of different compartments within the model. FIG. 228 illustrates a difference between scaling an object model 7800 and changing properties, in this case dimensions, of the object model 7800. When the object model is scaled in 3D space, all components of the object model are scaled accordingly. When the scaling process is non-uniform, wherein the scale factor for each dimension is different, deformation of some or all of the components of the object model is the result, which is usually undesirable. Changing dimensions of the object model, given relations between components of the object model are defined correctly, results in a change in overall size of the object model while maintaining the same size of the components of the object model. For example, in FIG. 229, legs 7801 and headboard curve 7802 of the bedframe 7803 remain the same size while the overall size of the bedframe 7803 is changed. In other examples, the bedframe may include 4, 6, 8 or more legs; be fabricated of steel, wood, composite, or a combination of these materials; may include a fabric covering the bedframe; may include different style of legs, such as modern, antique, classic, carved; etc. In embodiments, a database includes different options (e.g., material, style, color, number of components, etc.) for each component of the object model. In some embodiments, the AI algorithm chooses a best combination of properties based on observations of the real environment and update the object model accordingly. The smart (or high level) properties may be linked to other properties such as basic properties. For example, if the bedframe is larger than a predetermined size, the bedframe must include a minimum of 6 legs. FIG. 230 illustrates an example of a smart property, wherein the AI algorithm determines bedframe 7900 length and width are larger than a predetermined length and width, and as a result adds an extra pair of legs 7901 to the middle of the bedframe 7900.

Another example of a property of an object model comprising a door includes a style of the door. Basic properties of the door may include, dimensions (i.e., width, height and thickness of the door), door frame dimensions (i.e., door frame width, thickness in relation to the door itself), color of the door and the door frame, etc. Smart properties of the door may include a number of doors (e.g., 1, 2, or more), a type of the door (e.g., regular, barn door, pocket door, sliding door, French door, etc.), hinge placement (e.g., left, right), a fastening means (e.g., rotating hinge or rails), a number of panels on each door and their dimensions in relation to each other and the door itself, type of door panels (e.g., wood, glass, etc.), a shape of each panel, a shape of frame around the panels, etc. FIG. 231 illustrates a variety of different doors that are generated by modifying a set of properties, such as dimensions, material, hinge side, number and shape of panels, number of doors, etc. In some embodiments, the AI algorithm generates a model of a piece of furniture within the environment based on various images captured from different angles, image sequences, depth images, point cloud data, etc. using NeRF, photogrammetry, or other methods. FIG. 232 illustrates a 3D model of a couch 8100 generated based on various images 8101 captured from different angles. FIG. 233 illustrates the generated model of the couch 8100 further analyzed to separate the model of the couch 8100 into different components, clean up the modeled components, optimize or recognize the type, style, brand, make and/or model of the piece of furniture 8100.

After placing an object model (e.g., furniture) within the 3D model of the environment, a user may use an application of a communication device to adjust properties of the model such that it more closely matches the real object within the environment. There may be different levels of control over the properties visible to the user. For example, the user may adjust a size of a component of the object model within a predetermined range. These controls prevent the virtual model from breaking. FIG. 234 illustrates an example of an application 8300 displaying a 3D model of a couch 8301 within a 3D model of the environment 8302 and properties 8303 that a user may adjust to more closely match the couch 8301 to a real couch of the user.

In some embodiments, the AI algorithm learns from user input to better analyze and generate 3D object models. The AI algorithm may include user input directly into a decision-making process and/or give user input higher priority. For example, a user adjusts properties of a door within a house or office environment. The AI algorithm determines there is a high probability that other doors within the same environment have similar properties and therefore first considers the user input when recognizing properties of other doors before examining other factors or searching within a database of doors. FIG. 235 illustrates a process of identifying properties of a door by an AI algorithm, wherein user input over is prioritized over a database of doors. In some embodiments, the AI algorithm cross references previously recognized furniture to identify other furniture.

For example, there is a higher chance for a couch in a living room to be from a same collection as a love seat in the same living room. In another example, given all chairs of a dining table are typically identical, the processor of the robot uses combined data gathered relating to different chairs at the dining table to build a chair model. The chair model is placed within the 3D model of the environment to represent all the chairs of the dining table. FIG. 236 illustrates, based on similarities of chairs 8500 of dining table 8501, a location of each chair 8500 in relation to one another, and the arrangement of chairs 8500 around the table 8500, there is a high probability that all chairs 8500 are identical and a same chair model can be used for all chairs 8500.

As a user explores different areas of a 3D model of the environment using an application of a communication device, the AI algorithm may suggest new appliances and furniture based on objects already identified within the environment and a section of the environment the user is exploring. In some embodiments, the AI algorithm generates a suggested list of items with properties complementing dominant properties previously identified items (e.g., brand, make and model, style, collection, color, etc.). For example, the suggested list may include another piece of furniture or appliance from a same collection of furniture or appliance identified in the environment. FIG. 237 illustrates a process of generating a suggested list of items by an AI algorithm, as described above.

In some embodiments, an object identification process is automatically executed by the AI algorithm, while in other embodiments, a user contributes to the process by labeling items and sections of the environment using an application of a communication device. During the labeling process, the user may provide some information and the AI algorithm may determine the rest of the properties by searching a local database or the web. For example, the user may provide a brand name, a serial number, or another piece of information of a product and the AI algorithm uses the information as keywords to search for the product and determines remaining properties of the product. FIG. 238 illustrates a process of determining remaining properties of a product by an AI algorithm given some user-provided product information and images of the product, wherein local databases (e.g., from affiliated brands) are prioritized over information from the web. The suggested list may vary depending on the section of the 3D environment the user is exploring. For example, when an area explored is a kitchen, the AI algorithm mainly suggests kitchen appliances or furniture found in a kitchen. When an area explored is a living room, the AI algorithm mostly suggests furniture typically found in a living room. FIG. 239 illustrates variations in prioritization of items on a suggested list for different sections of the environment. In some embodiments, the AI algorithm suggests items from specific brands and the user purchases items using the application of the communication device. The AI algorithm and/or application provider may have contracts with different brands so as include all or part of their products directly in the application store. The application provider may earn revenue by selling a product integration option to brands. The application provider may earn revenue from a brand when users click on items from the brand. The application provider may earn revenue by earning a portion of a total dollar amount of the items sold through the application. In some embodiments, the AI algorithm suggests furniture or other products to purchase based on a layout and empty spaces within the environment. For example, the AI algorithm filters through a database of a particular type of furniture based on a size and suggests the filtered items to the user for a space within the environment. FIG. 240 illustrates an empty space 9100 of an environment 9101. Based on a size of the space 9100 and its proximity to a desk 9102 (or input from a user), the AI algorithm filters chairs for a particular chair type, in this case a desk chair 9103, and size. FIG. 241 illustrates an application 9200 of a communication device 9201 promoting items as a user uses the application 9200 to explore a 3D environment. A. the user explores a room 9202 in the 3D environment; B. an AI algorithm recognizes an empty space in front of a desk 9203 and suggests a product by placing 3D model of the product 9204 in the environment; C. the user selects the product 9204, more information pops up including the product brand, make and model, review score, and descriptions, a free trial of the product 9204 is offered for a period of time; D. the application offers an option to purchase the product 9204 and a financing option; E. the user chooses to purchase the product 9204 and the application provides option to add to cart and view related products; F. the user chooses to view similar options. FIG. 242 illustrates a similar concept, however, A. an existing item 9300 within a model of an environment 9301 is B. replaced with a new product 9301 to promote product 9301 and visualize the product 9301 within the model of the environment. FIG. 243 illustrates the application promoting a product and a service simultaneously, in this case, a smart TV with different streaming services 9400 are promoted.

Several factors may influence a process of choosing a product to promote on the application, including but not limited to: an amount of time and/or page space paid for by brands to feature their products, wherein a brand X may pay the application provider to feature all or some of their products for a particular period of time and on top of paying for featuring the product the brand may provide incentives such as discounts, deals, and commissions to the application provider to increase their chance of being featured more often; robot observation, wherein sensor data is used to identify empty spaces suitable for certain items; broken, old, or outdated items that may be replaced; user search history on the application, another application on the same device, one or more applications on all devices associated with the user, or one or more applications on devices within a same network provide some insight on items the users are looking for; previous success in selling particular items, wherein items sold successfully in the past have a higher chance of selling during promotion; reviews, wherein items with more reviews and more positive reviews have a higher chance of selling during promotion; and newness, wherein newer items equipped with better technology and aligned with current trends have a fear of missing out (FOMO) factor to them and attract a niche demographic of early adopters. By factoring in all the mentioned influences, the AI algorithm may assign a score for to a particular item from each brand. Items with higher scores appear on top of a suggested list for each category of item by default. The user may choose to sort the list based on other factors, such as price (ascending or descending), customer review score, newer items first, etc. The AI algorithm may consider item scores even with the new order requested by the user. For example, for two items with a same price, the AI algorithm places the item with a higher item score at a higher position on the list. In some embodiments, items with higher scores have a higher chance to pop up when the user is exploring the 3D environment. FIG. 244 illustrates factors influencing item score, and hence, prioritization during promotion, as described above.

The application may filter and sort products from different vendors based on certain properties. For example, the application may filter for and display chairs with long legs, cotton upholstery, and a green color. Other properties may include price and shipping time. In some embodiments, the AI algorithm recognizes a style, color scheme, layout, circulation, lighting, etc. of a home based on sensor data and generates the suggested item list based on the style of the home. Based on the observed environment and user behaviors, the AI algorithm may suggest different layouts with current furniture of the environment to provide better circulation, the application displaying the suggested layout.

In some embodiments, the processor post-processes the map before the application displays the map. In some embodiments, the map is processed to clean unwanted areas and noise data. In some embodiments, the walls in the map are processed to straighten them (when the data points fall within a certain threshold). Similarly, corners may be processed to form sharp angles. FIG. 245A illustrates an example of generated map of an environment before and after being cleaned. The cleaned-up version of the map may be vectorized before being displayed by the application. FIG. 245B illustrates the generated map before and after vectorizing the map. Vectorizing the map has several benefits: vector data of subjects, such as a map or a room plan, need less space for storage in comparison to a raster version; vector data are resolution independent, therefor are scaled up without loss in quality; and with vector data paths are formed of lines and vertices instead of arrays of pixels, therefore paths may be traced in a variety of ways with different parameters. For example, for a path there is total control over a thickness (e.g., to modify wall thickness in the displayed map), color, texture, style (e.g., continuous, dashed, dotted, etc.), and many more parameters.

In one example, a map corresponds to a particular run (i.e., work session) of the robot. The map includes objects that may vary between runs. Each map may also include debris data, indicating locations with debris accumulation, wherein the position of locations with high accumulation of debris data may vary for each particular time stamp. Depending on sensor observations over some amount of time, the debris data may indicate high, medium, and low debris probability density areas. Each map may also include data indicating increased floor height. Depending on sensor observations over some amount of time, the floor height data may indicate high, medium, and low increased floor height probability density areas. Similarly, based on sensor observations over some amount of time, obstacle data may indicate high, medium, and low obstacle probability density areas. In some embodiments, the processor may inflate a size of observed obstacles to reduce the likelihood of the robot colliding with the obstacle. For example, the processor may detect a skinny obstacle (e.g., table post) based on data from a single sensor and the processor may inflate the size of the obstacle to prevent the robot from colliding with the obstacle.

In some embodiments, the processor stores data in a data tree. FIG. 246 illustrates a map 21400 generated by the processor during a current work session. Portion 21401 is yet to be discovered by the robot. Various previously generated maps are stored in a data tree 21402. Data tree 21402 may store maps of a first floor in branch 21403, a second floor in branch 21404, a third floor in branch 21405, and unclassified maps in branch 21406. Several maps may be stored for each floor. For instance, for the first floor, there are first floor maps 21407 from a first work session, a second work sessions, and so on. In some embodiments, a user notifies the processor of the robot of the floor on which the robot is positioned using an application paired with the robot, a button or the like positioned on the robot, a user interface of the robot, or other means. For example, the user may use the application to choose a previously generated map corresponding with the floor on which the robot is positioned or may choose the floor from a drop down menu or list. In some embodiments, the user may use the application to notify the processor that the robot is positioned in a new environment or the processor of the robot may autonomously recognize it is in a new environment based on sensor data. In some embodiments, the processor performs a search to compare current sensor observations against data of previously generated maps. In some embodiments, the processor may detect a fit between the current sensor observations and data of a previously generated map and therefore determine the area in which the robot is located. However, if the processor cannot immediately detect the location of the robot, the processor builds a new map while continuing to perform work. As the robot continues to work and moves within the environment (e.g., translating and rotating), the likelihood of the search being successful in finding a previous map that fits with the current observations increases as the robot may observe more features that may lead to a successful search. The features observed at a later time may be more pronounced or may be in a brighter environment or may correspond with better examples of the features in the database.

In some embodiments, the processor immediately determines the location of the robot or actuates the robot to only execute actions that are safe until the processor is aware of the location of the robot. In some embodiments, the processor uses the multi-universe method to determine a movement of the robot that is safe in all universes and causes the robot to be another step closer to finishing its job and the processor to have a better understanding of the location of the robot from its new location. The universe in which the robot is inferred to be located in is chosen based on probabilities that constantly change as new information is collected. In cases wherein the saved maps are similar or in areas where there are no features, the processor may determine that the robot has equal probability of being located in all universes.

In some embodiments, the robot includes a camera for capturing images from the environment of the robot. A structured light source may be disposed on either side of the camera and emit structured light onto objects within the environment, wherein the structured light emitted falls within a field of view of the camera. In some embodiments, the robot comprises a single light source adjacent to the camera for illuminating an area in front of the robot. The processor of the robot may identify an object type, an object size, an object position, and/or a depth of an object captured within an image. Examples of identifiable object types include at least a shoe, a wire, fabric, pet waste, a carpet, a book, a pedestal, a dustpan, a scale, a towel, toys, a fan, a table, a chair, a bed, a counter, a fridge, a stove, a TV stand, a TV, stairs, a dresser, a toilet, a bathtub, a sink, a dishwasher, and a sofa. In some embodiments, images captured are processed locally for privacy.

Some embodiments may use at least some of the methods, processes, and/or techniques for classifying objects and identifying an object type of objects described in U.S. Non-Provisional patent application Ser. Nos. 17/494,251, 17/670,277, and 17/990,743, each of which is hereby incorporated herein by reference.

In some embodiments, a light pattern may be emitted onto objects surfaces within the environment. In some embodiments, time division multiplexing may be used for point generation. In some embodiments, an image sensor may capture images of the light pattern projected onto the object surfaces. In some embodiments, the processor of the robot may infer distances to the objects on which the light pattern is projected based on the distortion, sharpness, and size of light points in the light pattern and the distances between the light points in the light pattern in the captured images. In some embodiments, the processor may infer a distance for each pixel in the captured images. In some embodiments, the processor may label and distinguish items in the images (e.g., two dimensional images). In some embodiments, the processor may create a three dimensional image based on the inferred distances to objects in the captured images. Some embodiments may include a light source, such as a laser, positioned at an angle with respect to a horizontal plane and a camera. The light source may emit a light onto surfaces of objects within the environment and the camera may capture images of the light source projected onto the surfaces of objects. In some embodiments, the processor may estimate a distance to the objects based on the position of the light in the captured image. For example, for a light source angled downwards with respect to a horizontal plane, the position of the light in the captured image appears higher relative to the bottom edge of the image when the object is closer to the light source. In some embodiments, the processor may determine the distance by using a table relating position of the light in a captured image to distance to the object on which the light is projected. In some embodiments, using the table comprises finding a match between the observed state and a set of acceptable (or otherwise feasible) values. In embodiments, the size of the projected light on the surface of an object may also change with distance, wherein the projected light may appear smaller when the light source is closer to the object. In some cases, other features may be correlated with distance of the object. The examples provided herein are for the simple case of light projection on a flat object surface, however, in reality object surfaces may be more complex and the projected light may scatter differently in response. To solve such complex situations, optimization may be used to provide a value that is most descriptive of the observation. In some embodiments, the optimization may be performed at the sensor level such that processed data is provided to the higher level AI algorithm. In some embodiments, the raw sensor data may be provided to the higher level AI algorithm and the optimization may be performed by the AI algorithm.

In some embodiments, an emitted structured light may have a particular color and particular color. In some embodiments, more than one structured light may be emitted. In embodiments, this may improve the accuracy of the predicted feature or face. For example, a red IR laser or LED and a green IR laser or LED may emit different structured light patterns onto surfaces of objects within the environment. The green sensor may not detect (or may less intensely detect) the reflected red light and vice versa. In a captured image of the different projected structured lights, the values of pixels corresponding with illuminated object surfaces may indicate the color of the structured light projected onto the object surfaces. For example, a pixel may have three or four values, such as R (red), G (green), B (blue), and I (intensity), that may indicate to which structured light pattern the pixel corresponds to. Structured light patterns may be the same or different color and may be emitted by the same or different light sources. In some cases, sections of the image may capture different structured light patterns at different times. In some cases, the same light source mechanically or electronically generates different structured light patterns at different time slots. In embodiments, images may be divided into any number of sections. In embodiments, the sections of the images may be various different shapes (e.g., diamond, triangle, rectangle, irregular shape, etc.). In embodiments, the sections of the images may be the same or different shapes.

In some embodiments, the processor uses a neural network to determine a distance of objects based on images of one or more laser beams projected on the objects. The neural network may be trained based on training data. Manually predicting all pixel arrangements that are caused by reflection of structured light is difficult and tedious. A lot of manual samples may be gathered and provided to the neural network as training data and the neural network may also learn on its own. In some embodiments, an accurate LIDAR is positioned on a robot and a camera of the robot captures images of laser beams of the LIDAR reflected onto objects within the environment. To train the neural network, the neural network associates pixel combinations in the captured images with depth readings to the objects on which the beams are reflected in the captured images. The processor trains a neural network by associating pixel combinations in the captured images with depth readings to the objects on which the beams are reflected in the captured images. Many training data points may be gathered, such as millions of data points. After training, the processor uses the neural network to determine a distance of objects based on a position of beams reflected on the objects in a captured image and actuates the robot to avoid the objects.

In some embodiments, the distance sensor is used for detecting obstacles in front of the robot. FIG. 247 illustrates (A) a robot 9800 with a distance sensor with a FOV 9801 of less than 90 degrees observing object 9802, (B) the robot 9800 with two distance sensors with non-overlapping FOVs 9803 and 9804 of 90 degrees each observing object 9803, and (C) the robot 9800 with three distance sensors with overlapping FOVs 9805 and 9806 of less than 90 degrees each observing object 9803 and FOV 9807 for measuring distance to a wall for wall following. An imaging sensor captures respective images 9808 of illumination emitted onto a surface of the object 9803 and the presence of the object 9803 and a distance of the object 9803 from the robot 9800 is determined.

In some embodiments, a combination of a short-range line laser distance measurement device and a depth camera are used to locate near range obstacles. FIGS. 248A and 248B illustrate examples of combinations of line laser 8300 and depth cameras 8301, FIG. 248B including two depth cameras 8301. In FIG. 248A, the line laser 8300 is projected onto obstacles within the environment and the camera 8301 captures an image 8302 of the projected line laser. In FIG. 248B, the projected laser line profile 8303 in image 8304 captured by the cameras 8301 is compared to a saved image 8305 of a laser line profile 8306. Laser line profiles may be unique to a particular object on which the laser line was projected and may therefore be used in identifying the particular object. Laser line profiles may also be unique to a particular location within the environment and may therefore be used in localizing the robot. A position of the lines forming the laser line profile within captured images may also be used to determine a distance of the object on which the laser line was projected. For example, for the line lasers 8300 angled downward, lines of the laser line profile 8303 positioned lower relative to a top edge of the image 8304 are further away. A position of a line may be correlated with a true distance to the object one which the line is projected. In embodiments, the combined line laser and depth camera are disposed on the robot. In FIGS. 249A and 249B, the combined line laser and depth camera 8400 is positioned lower than a LIDAR 8401 on robot 8402. In FIG. 249A, the combined line laser and depth camera 8400 is positioned perpendicular to a driving surface of the robot 8402 and in FIG. 249B is positioned at an angle such that the line laser points towards the driving surface.

In some embodiments, the processor of the robot uses triangulation. FIG. 250 illustrates an example of triangulation between a structured illumination 8600, a scene 8601, and an image 8602 of the scene 8601. FIG. 251 illustrates an example of three different triangulations between a structured illumination 8700, a scene 8701, and two images 8702 of the scene 8701, triangulation one and two each having their own constraint. In some cases, structured light illumination may be used with TOF sensors, such as ST micro FlightSense. A TOF sensor provides an accurate (i.e., occlusion free) reading from a single point that has an incident with the surroundings whereas triangulation provides less accurate data for a larger area of the scene. FIG. 252 illustrates structured illumination using structured TOF sensors 8800 instead of structured light, each TOF sensor directly measuring a distance from a scene 8801 with high accuracy. For each reading of the final readings 8802, the highest accuracy is at the peak. FIG. 253 illustrates the accuracy of each distance measurement point in an image 8900 of the scene 8801 with color intensity. After a time step, the accuracy of measured distances decreases. FIG. 254 illustrates a in accuracy after a time step 9000 for TOF sensor measurement points and for measurements derived through triangulation. The decrease in accuracy is illustrated by a reduction in a height of the peaks and increase in a wideness of the peaks. In some embodiments, point measurements use direct pulse modulation. Pulsed light provides a high energy pulse in a short time, permitting light signals to noise ratio, which performs well under ambient light. The light receiver or a stop-watch sets a start of a counter when a pulse is transmitted from an LED or laser diode while waiting for a return signal. The return signal is often heavily attenuated due to surrounding conditions and the nature and material of objects from which the light is reflected. In embodiments, it is unessential for an emitter and a receiver to be a pair in a structured TOF illumination. For example, a single transmitter may be received by multiple receivers. FIG. 255 illustrates a relation between confidence score and a location of transmitters Tx and receiver Rx in an illuminator positioned behind a lowpass filter and optical components and illuminating the scene. Since a transmitter and receiver are only co-located in location 9100, the confidence score of measurement 9101 is increased as the position corresponds to the location 9100. The remaining confidence scores are decreased as they are positioned a distance from the receiver. In some embodiments, continuous wave modulation may use homodyne amplitude modulation to modulate a sinusoidal or square wave.

Given camera virtualization, it may be shown that structured light depth cameras are mathematically equivalent irrespective of the number of cameras used. For instance, one, two, three, or more cameras may be used with a single illumination if the geometrical constraints are arranged properly. Therefore, in the examples provided herein, having one, two or more cameras, are for the purpose of adding clarity to the concept and its implementation. In some embodiments, a depth camera, LIDAR, or TOF measuring device has a maximum measurement range. In cases where walls or obstacles surrounding the robot are further than the maximum range, measurements value may be invalid and not ideal for map building. However, lack of an obstacle may be used by the processor of the robot to identify areas free of obstacles. When there is a wall or obstacle within an area, a reflection of laser or light emitted by a transmitter may be captured by a receiver and used to determine distance to the wall or obstacle. In some embodiments, a number of points of reflection are correlated with distance or angular resolution of the LIDAR or depth camera. The points of reflection may comprise a number of points whose connections form a map of the surroundings including obstacles that are visible from a location of the robot. In cases where the obstacle observed is something other than a wall (i.e., perimeter), the processor of the robot observes behind the obstacle. In some embodiments, a mathematical formula or probabilistic method is used to connect the points. As the robot moves, noise is introduced and some of the points appear off in position after adjusting for the motion of the robot. Therefore, a probabilistic method may be used to connect the points in a way that has a highest chance of being a reflection of the environment. When the robot is displaced or the processor loses a location of the robot in the map or is transported to another floor by a human, escalator, or elevator, the processor may search current surrounding points against one or more previously known maps to rediscover the location of the robot.

Figure 258:
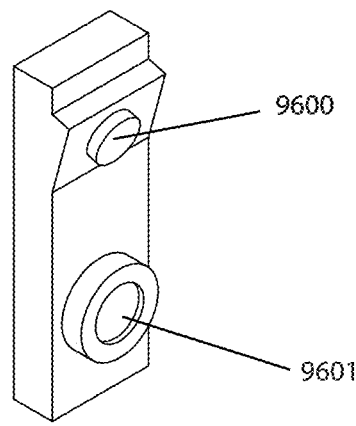
Figure 259:
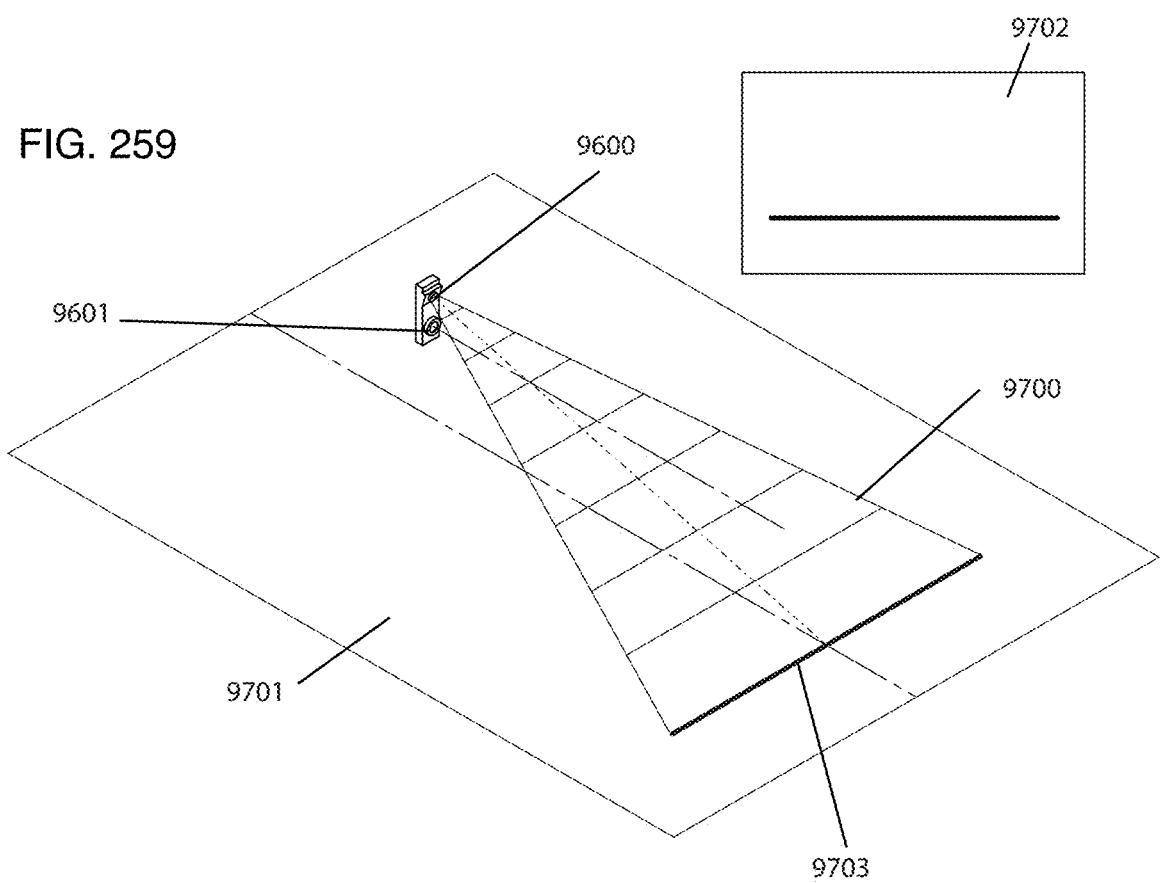
Figure 260:
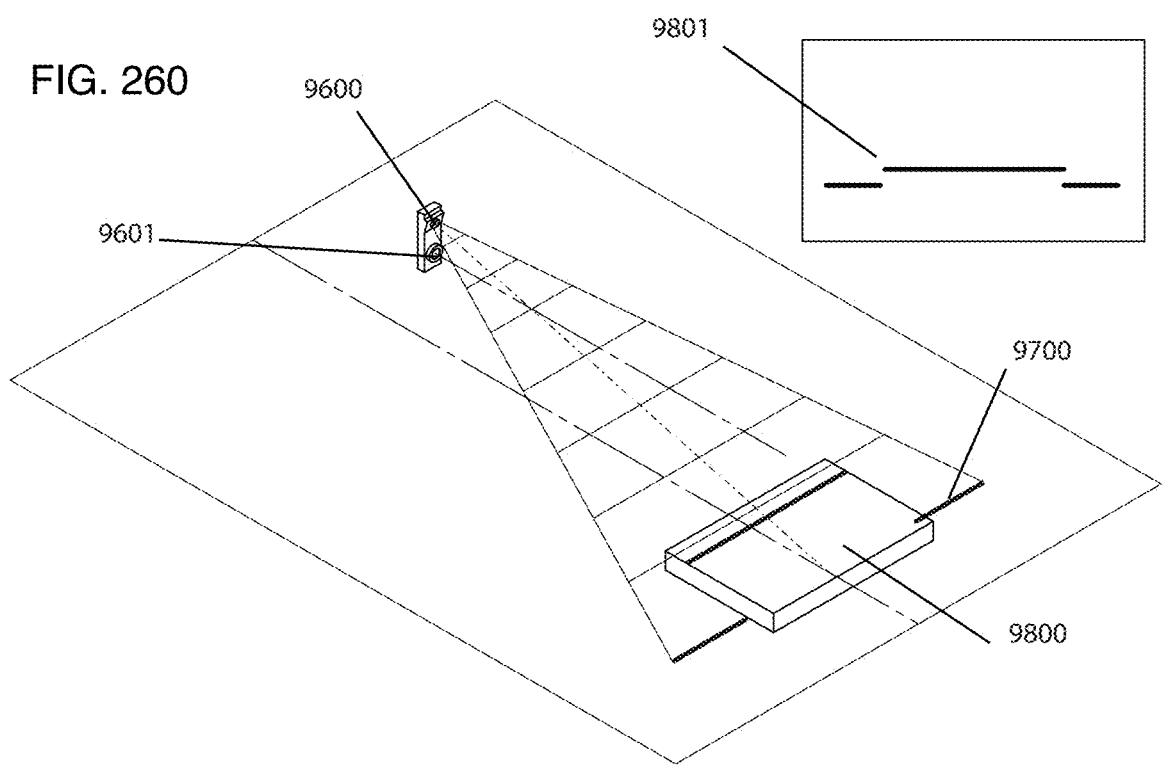
Figure 261:
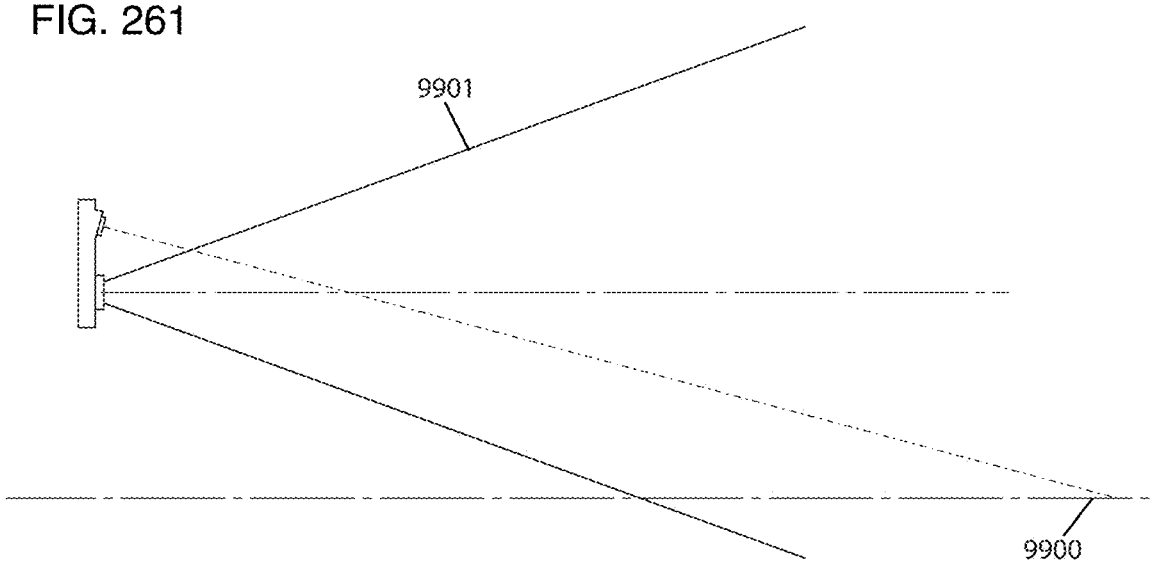
Figure 262:
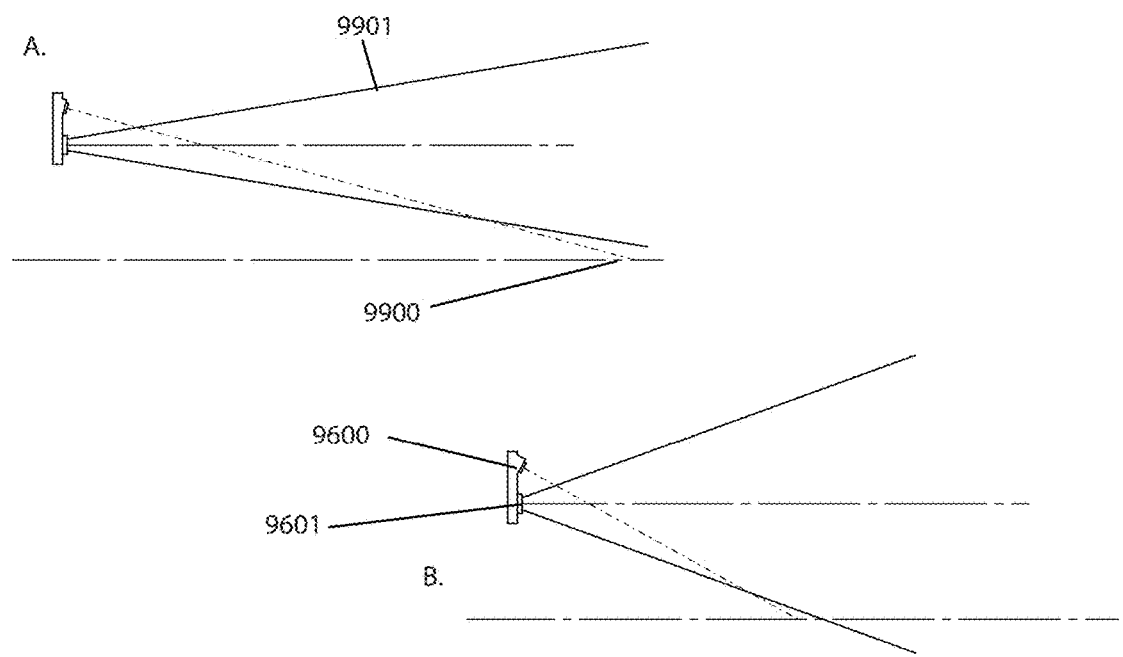

In embodiments, obstacle sensors break a circuit, close a circuit, or send a message to the MCU or the MCU polls the obstacle sensor and reads the information. FIG. 256A illustrates an example of two near range obstacle sensors 9400 disposed on a front portion of a robot 9401 to cover observation in areas 9402 in front of the robot 9401. Each sensor may have one or two image sensors (e.g., cameras) 9403. FIG. 256B illustrates an example of a near range obstacle sensor 9404 disposed on a side portion of the robot 9401 to measure its distance from a wall 9405. FIG. 257 illustrates a robot 9500 with two side brushes 9501 on each side. Both side brushes 9501 may be active at all times and clean walls 9502 depending on the orientation of each side brush 9501 in relation to walls 9502. Having a near range sensor on each side of the robot, such as in FIG. 256B, helps the robot keep a minimum distance from a wall without hitting it during coverage. In some embodiments, a combination of a line laser or a structured light pattern and one or more cameras may be used to detect low height obstacles closer to the robot. In this setup, the line laser is directed towards a floor and projects a line on the floor at a constant distance. The line is captured by one or more cameras, and as long as the line captured in the image is straight, the processor assumes there is no obstacle in an area within a range of the line laser. FIG. 258 illustrates an example of a line laser 9600 and a camera 9601 combined in one module. Note that the line laser 9600 is positioned at an angle relative to the camera 9601 and directed towards a floor. FIG. 259 illustrates a line 9700 projected on a floor 9701 from the line laser 9600 and an image 9702 of the line 9700 captured by the camera 9601. The line 9700 is straight, therefore the processor determines there is no obstacle in area 9703 within a range of the line laser 9600. FIG. 260 illustrates an obstacle 9800 (or a step) entering the area 9702 within the range of the line laser 9600. The image 9801 of the projected line 9700 is broken into segments that appear higher or lower to the camera 9601. (The processor may determine there is an obstacle close by based on the line 9700 no longer being straight. The processor may decide to stop or change a course of the robot to avoid the obstacle 9800. For the camera to capture the line projected onto the floor, the line laser intersection with the floor must fall within the camera FOV. FIG. 261 illustrates the line laser intersection with the floor 9900 within the camera FOV 9901. If the intersection does not fall within the camera FOV, a sharper angle of emission or a camera with a wider FOV may be used. FIG. 262 illustrates (A) the camera FOV 9901 is too narrow to capture the laser line intersection with the floor 9901 and (B) a large angle difference between the camera 9601 and the line laser 9600 resulting in the line laser intersection with the floor 9901 falling behind the camera FOV 9900.

Figure 263:
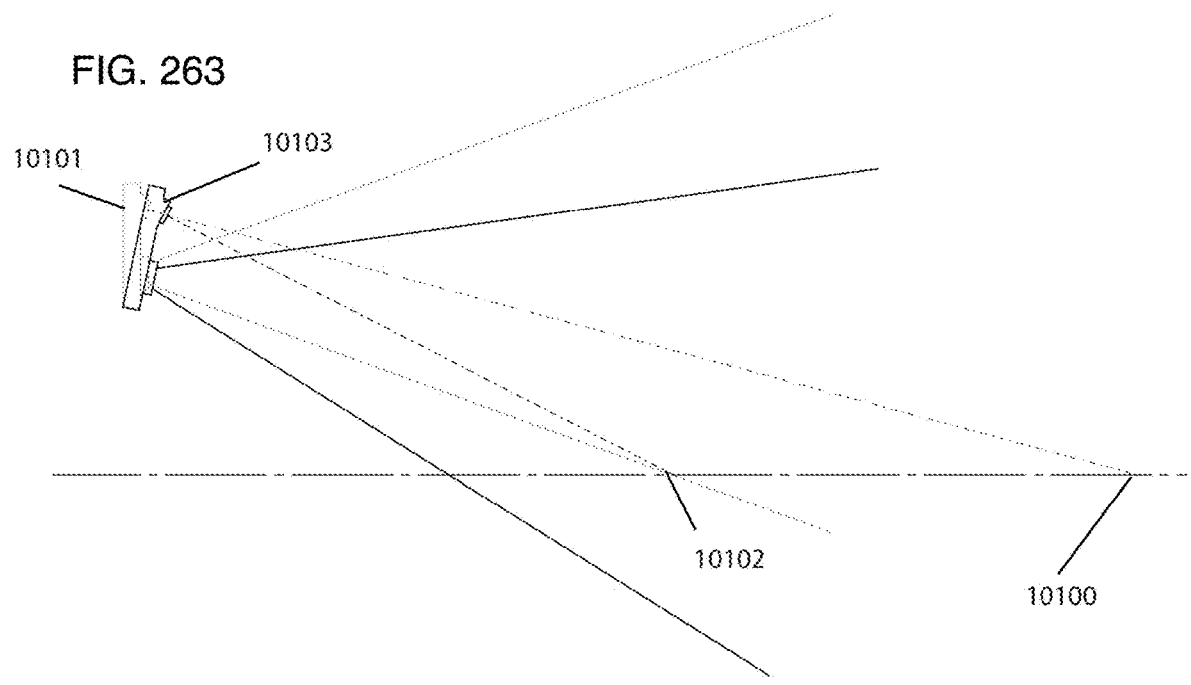
Figure 264:
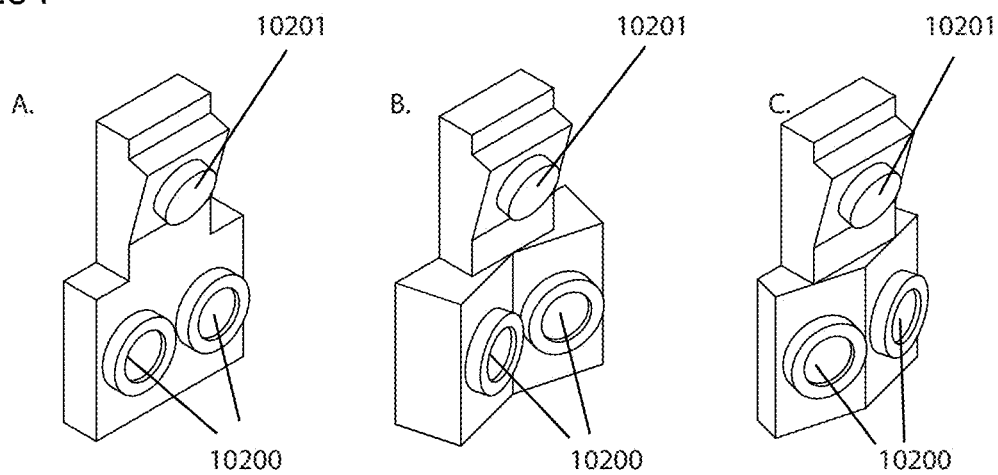
Figure 265:
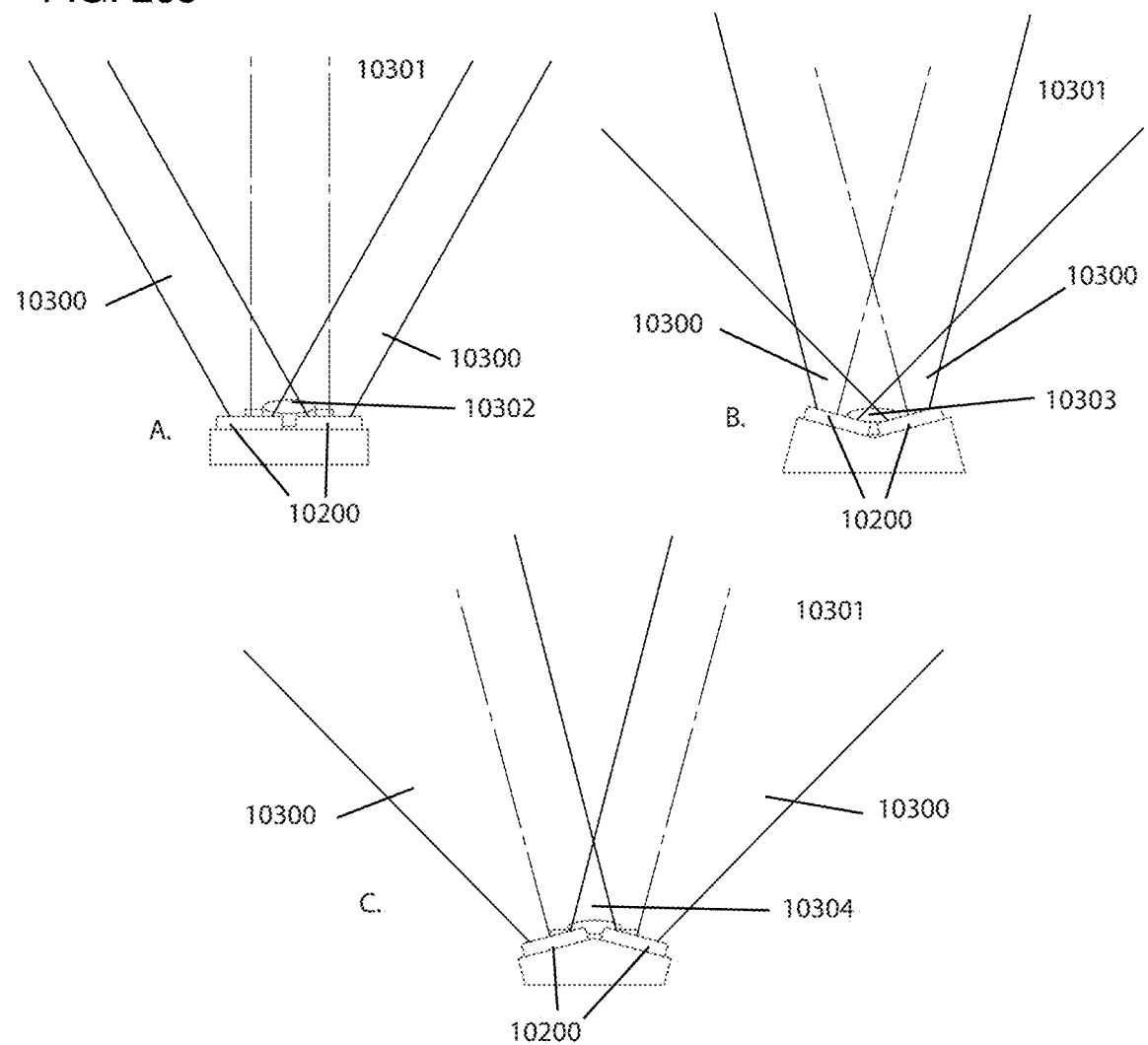

To solve these issues, the camera FOV may be widened such that the line laser intersection with the floor falls within the FOV, however, this may introduce line distortion (mostly towards ends of the line) as wider lenses cause more distortion in the captured image. Or, the angle of the line laser relative to the camera may be adjusted such that the line laser intersection with the floor falls within the FOV, however. this increases a blind spot of the robot in near range as the line laser intersection with the floor is further from the robot. Alternatively, the entire module may be tilted towards the floor to bring the line laser intersection with the floor closer to the robot wherein the camera covers areas of the floor closer to the robot, as illustrated in FIG. 263, wherein the line laser intersection with the floor 10100 of an untilted module 10101 is further from the line laser intersection with the floor 10102 of a tilted module 10103. In some embodiments, two cameras capture a same projected line laser from different angles. Usually, wide angle lenses have more distortion, however, this setup may help increase the FOV of observation by combining the FOVs of two cameras while also reducing the emitted line distortion near the edges of the captured image. FIG. 264 illustrates alternative solutions for covering a wider FOV with less line distortion by using two cameras 10200 with line laser 10201, the two cameras providing a larger combined FOV. The two cameras 10200 may be positioned on the same plane (A) or at an angle in relation to one other (B and C). FIG. 265 illustrates individual FOVs 10300 of cameras 10200 and combined FOVs 10301 of cameras 10200 for modules illustrated in FIG. 264. Assuming the individual FOVs of the cameras remain constant, then for module (A) there is some expansion in the combined FOV given the two cameras are on a same plane, a small blind spot 10302 between the two cameras 10200 that is negligible and a large amount of overlap; for module (B) the combined FOV is narrower for a short distance and wider for further distances given the planes of the two cameras 10200 have less than 180 degrees angle towards each other, a large overlap and an even smaller the blind spot 10303; and for module (C) the combined FOV is larger given the planes of two cameras have greater than 180 degrees angle towards each other, the overlapping area is smaller and the blind spot 10304 is larger but still negligible.

Figure 266:
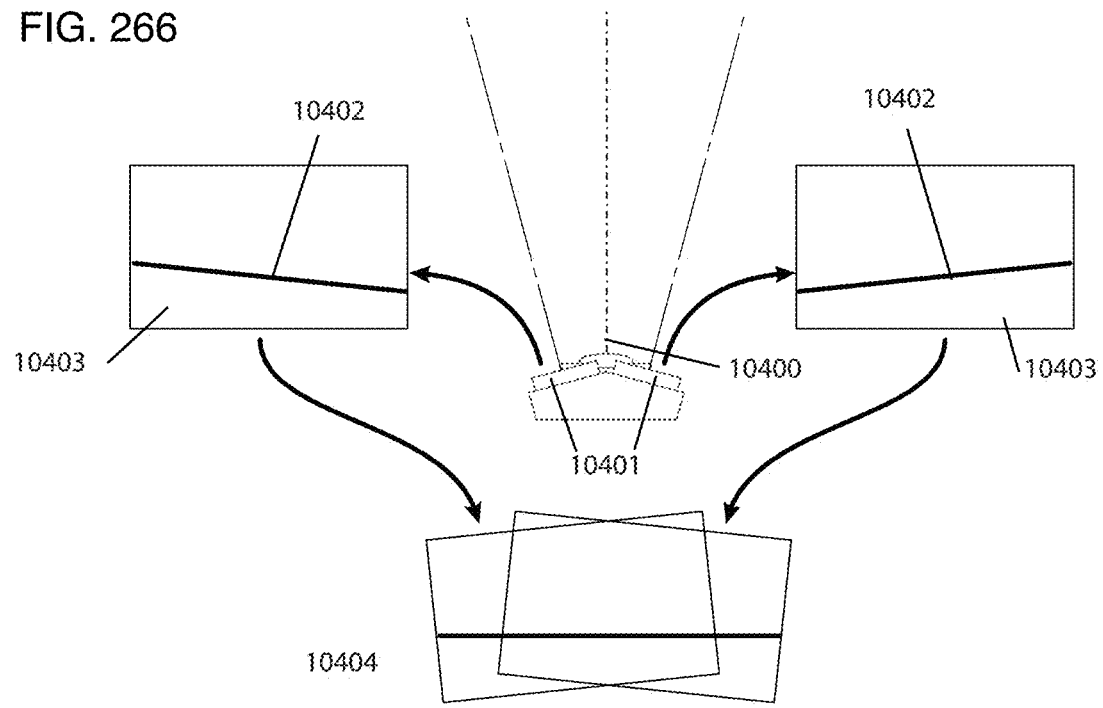
Figure 267:
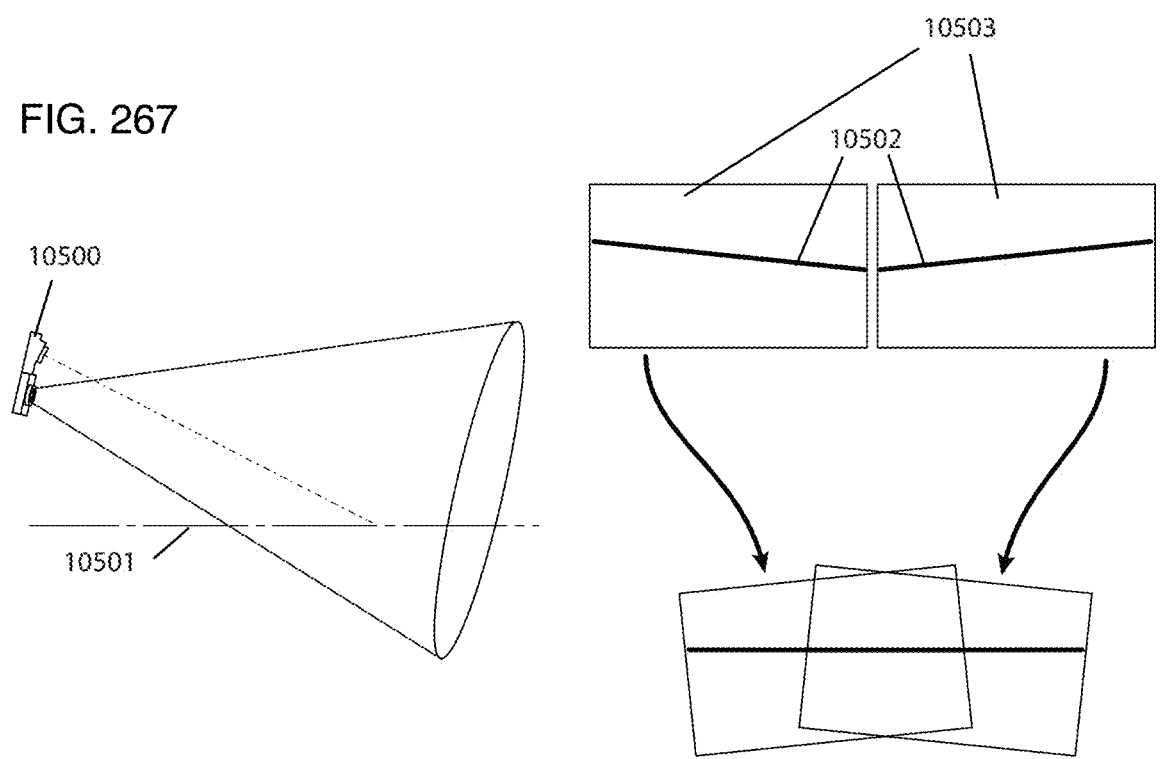

In embodiments, the data captured by each camera is calibrated to compensate for angular deviation, then combined with each other before processing for obstacle detection. FIG. 266 illustrates a bottom view of a line laser 10400 and two cameras 10401. A viewing direction of the cameras 10401 diverge from each other. The projected the line laser 10402 each camera 10401 captures in images 10403 is not perfectly horizontal because the camera viewing direction and the line laser emitting direction are positioned at an angle in relation to one another. The images 10403 captured by each camera 10401 may need to be adjusted before being stitched together 10404. FIG. 267 illustrates a line laser and camera module 10500 tilted towards a floor plane 10501, causing the projected line laser 10502 captured in images 10503 to be positioned higher in relation to a bottom edge of the respective images 10503. The ideal location of the projected line laser is in a middle section of an image as the lens has less distortion and there is room for deviation of the laser line upon encountering an obstacle or a valley.

Figure 268A:
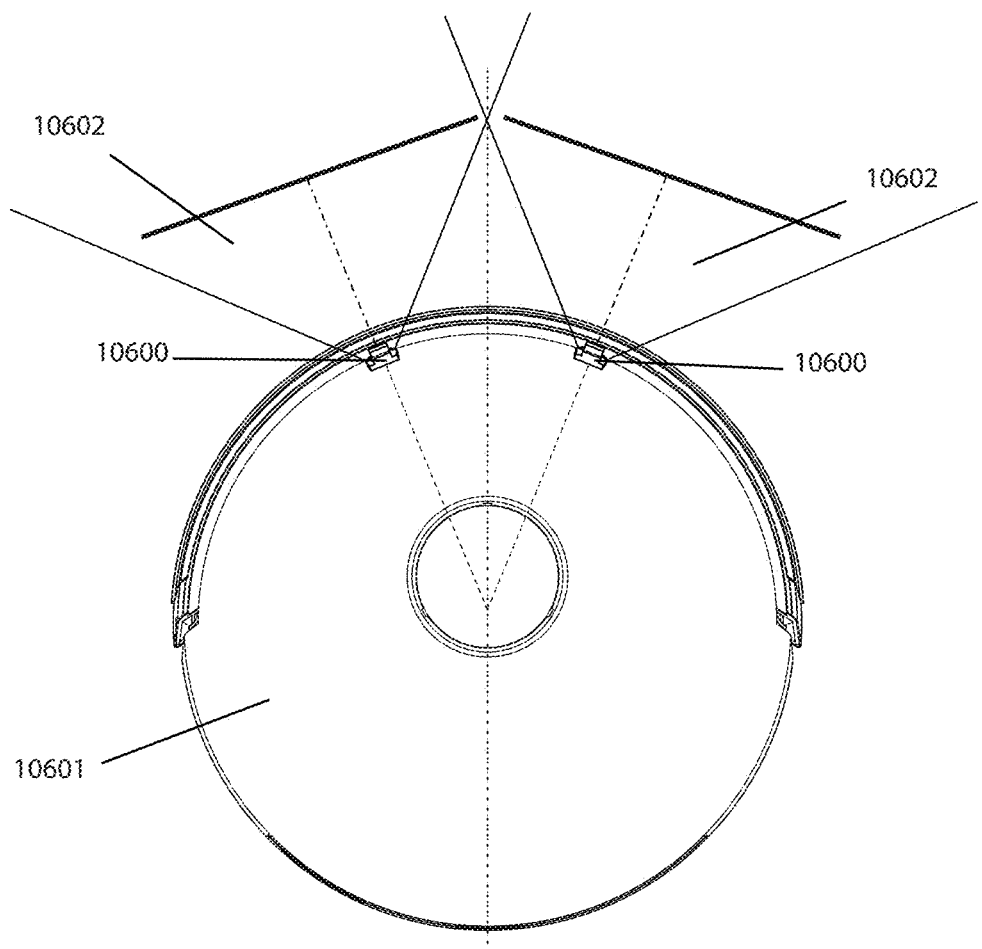
Figure 268B:
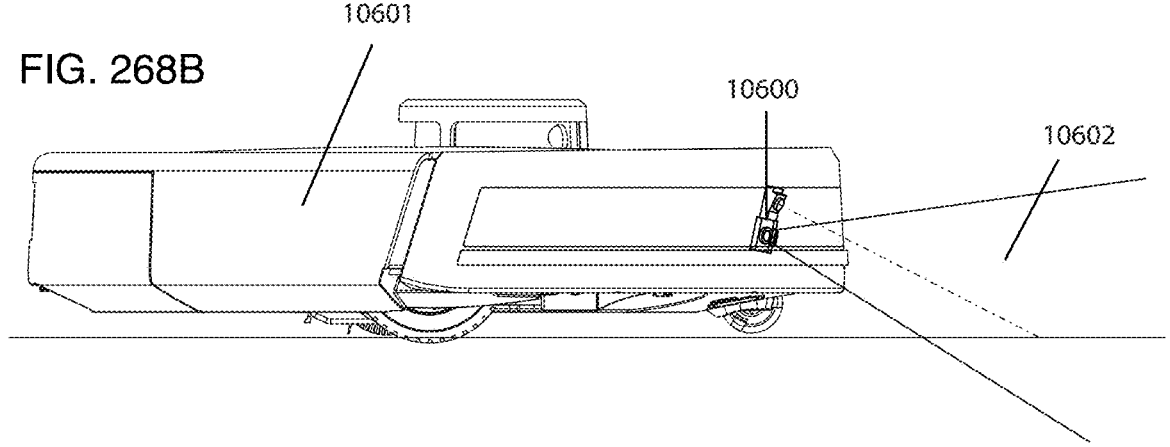
Figure 269A:
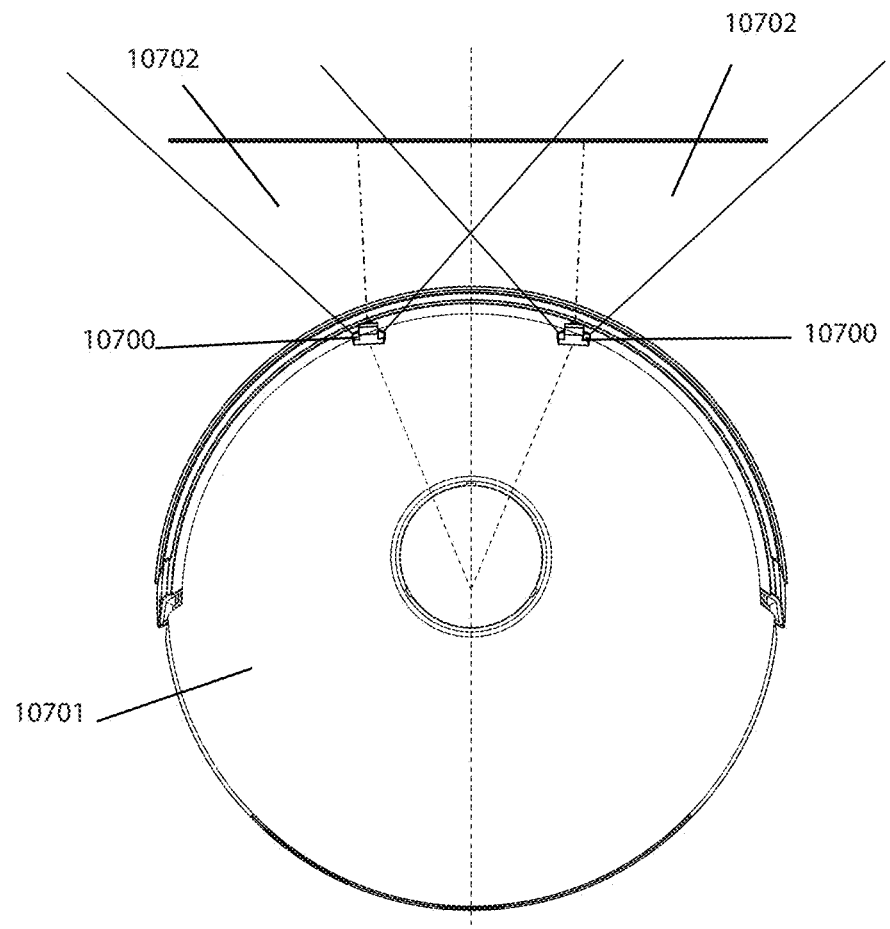
Figure 269B:
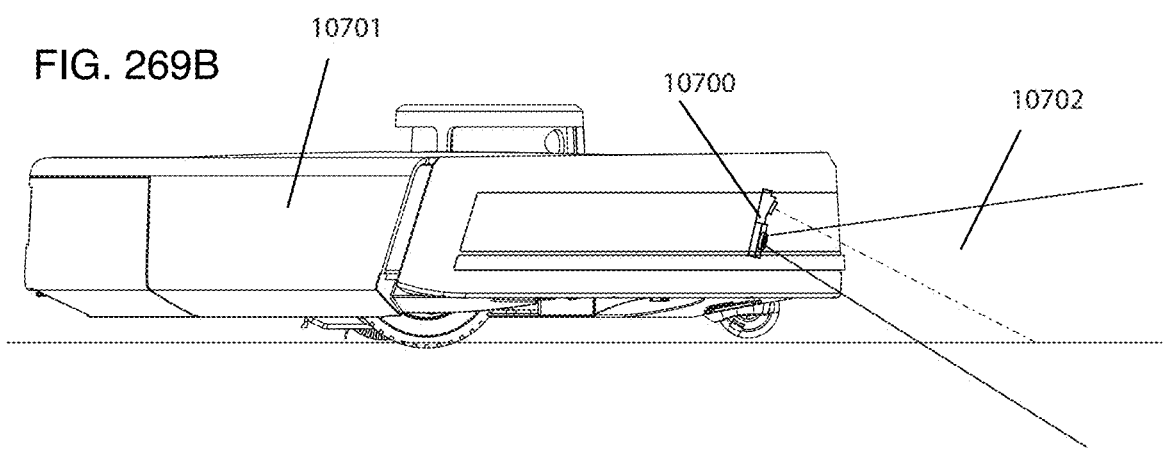
Figure 270:
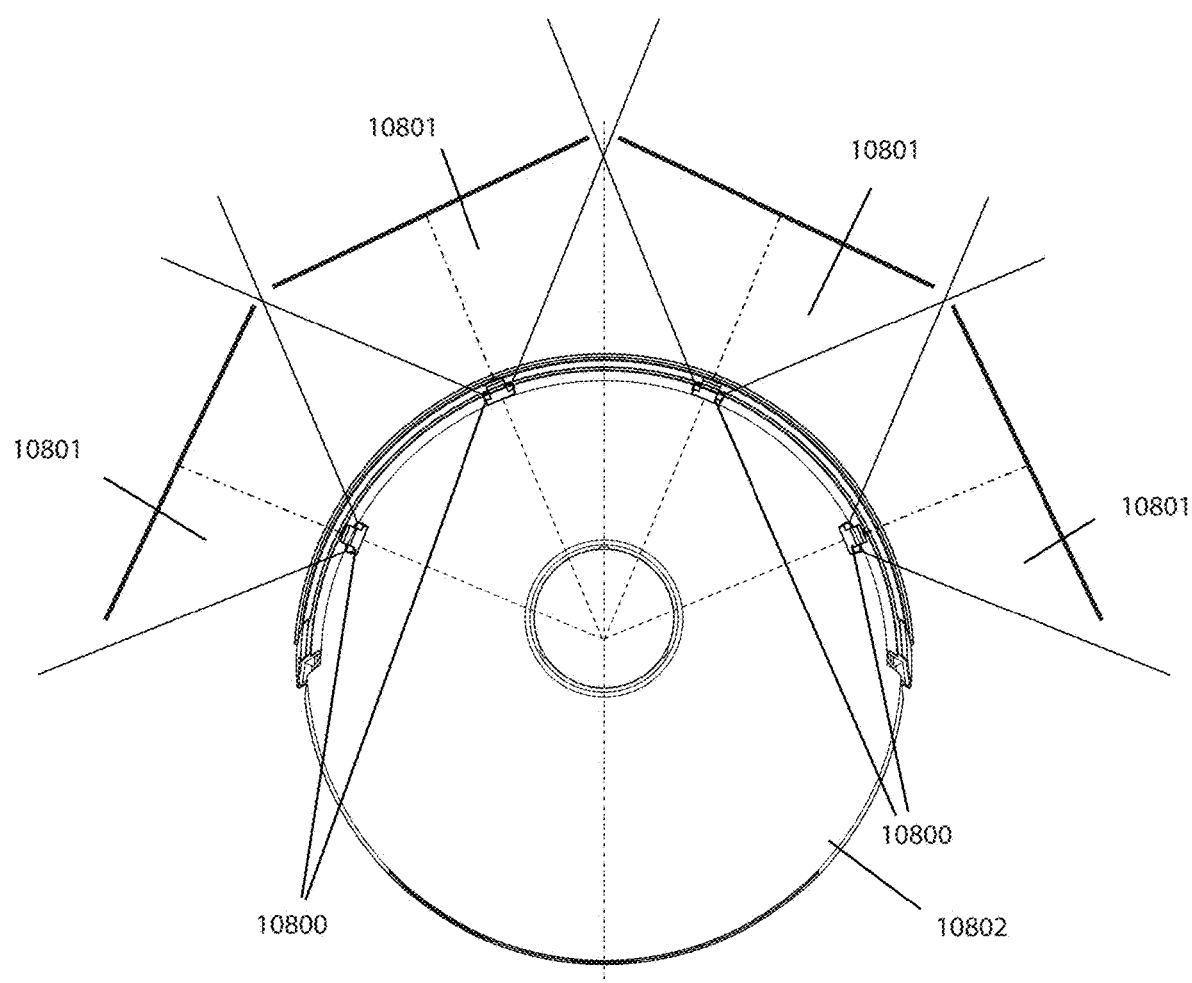
Figure 271:
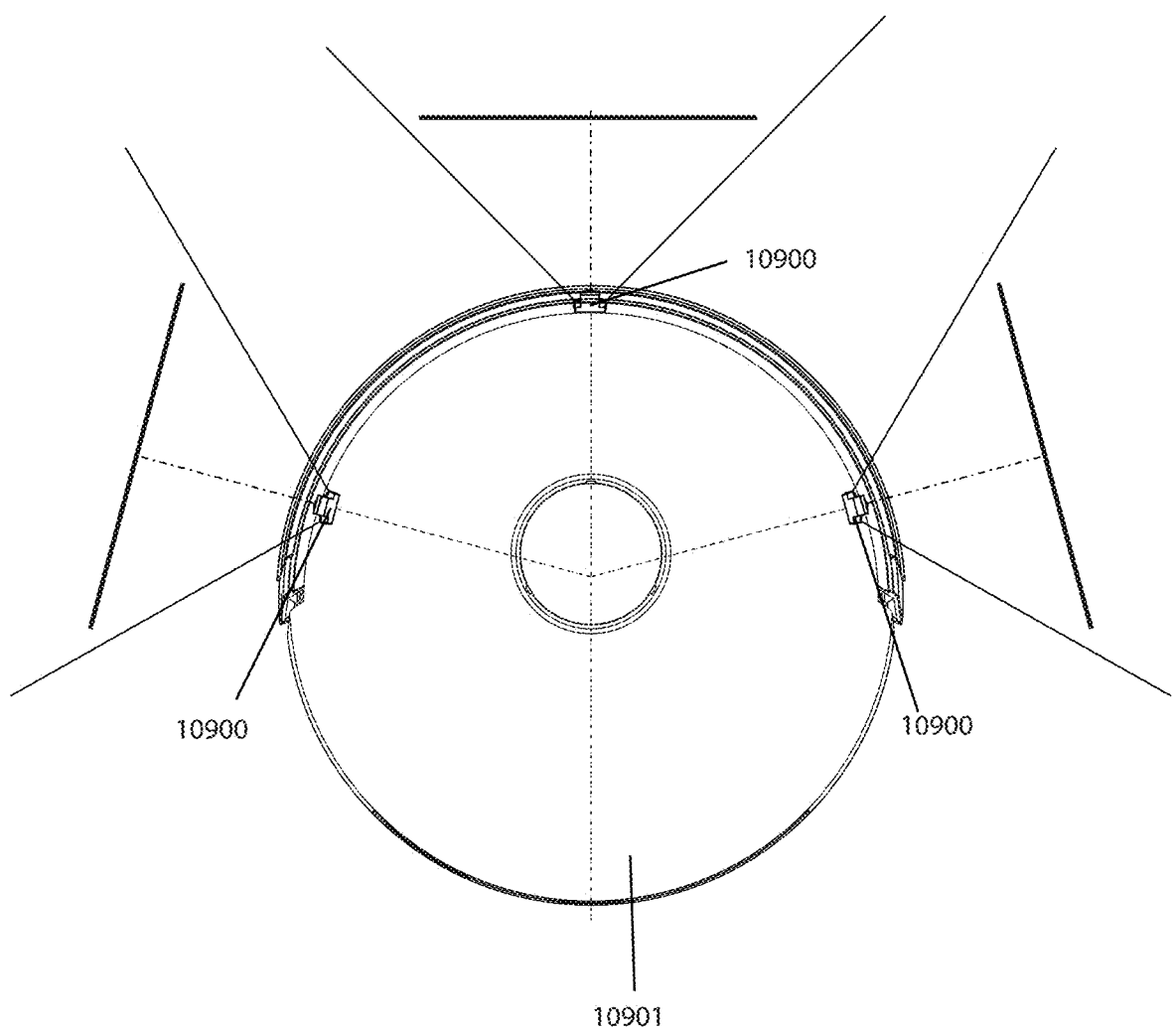

In some embodiments, line laser and camera modules may be disposed along a front perimeter of the robot cover. The camera FOV of each module may overlap with the camera FOV of adjacent modules. The laser of each module may be modified to operate in different frequencies to avoid cross readings between adjacent modules. FIGS. 268A and 268B illustrate a combination of two line laser and camera modules 10600 disposed on a front portion of a robot 10601. The overall laser emitting and camera FOV directions 10602 of the modules 10600 diverge from one another thereby providing a wider FOV. However, the FOV direction of each of the modules 10600 is at an angle in relation to a forward moving direction of the robot 10601. The camera FOVs of the two modules 10600 overlap and the line lasers of each module 10600 are adjusted to have different bandwidths to avoid cross reading. FIGS. 269A and 269B a combination of two line laser and camera modules 10700 disposed on a front portion of a robot 10701. The overall laser emitting and camera FOV directions 10702 of the modules are parallel to each other and a forward moving direction of the robot. However, this setup provides a narrower FOV. FIG. 270 illustrates a combination of four line laser and camera modules 10800 whose FOVs 10801 collectively cover areas in front of a robot 10802 on which they are disposed. Ideally, this setup provides a near range obstacle detecting shield around a front section perimeter of the robot. FIG. 271 illustrates a combination of three line laser and camera modules 10900 disposed on a robot 10901, a module disposed on a front portion, a right side portion and a left side portion of the robot 10901. Upon detecting an obstacle by a camera, another camera disposed on the robot (preferably in a front/center section of the robot) captures a high-quality image of the obstacle and the processor transmits the image to the cloud for image processing and obstacle type detection. FIGS. 272A and 272B illustrate an additional camera 11000 disposed centrally in a front section of a robot 11001 in addition to two line laser and camera modules 11002. FIG. 272A illustrates images 11003 and 11004 of projected laser lines 11005 captured by cameras of the modules 11002. The line 11006 is distorted in the image 11004 due to an obstacle 11006 positioned within a FOV 11007 of the respective camera. FIG. 272B illustrates, upon a processor of the robot 11001 sensing the obstacle 11006 using any or both of the modules 11002, the camera 11000 capturing a high-resolution image 11008 of the obstacle 11006 that is transmitted to the cloud 11009 for further image processing and obstacle recognition 11010. The images captured by modules 11002 may be transmitted to the cloud as well. The line distortion in the images captured by modules 11002 may indicate a location of the obstacle 11006 within the image 11008. Based on the location, only a portion of image 11008 is processed as opposed to the entire image 11008. In some embodiments, the processor executes object classification using neural networks to classify objects captured in images of the environment. In some embodiments, the robot comprises an obstacle avoidance system comprising an array of photon detectors arranged on a single silicon chip that capture spatial information of the environment. In some embodiments, spatial information is captured passively and comprises natural light reflected off of the surroundings and objects. In some embodiments, the spatial information captured includes light that is emitted bounces back.

In some embodiments, the processor of the robot performs fine calibrations upon the robot beginning navigation within the workplace or during a work session. For example, the processor identifies and analyzes disagreements in data collected by different sensors or a same sensor. For instance, a LIDAR sensor may receive bouncing signals from a highly reflective surface (e.g., glass or mirror), causing phantom obstacles to emerge or two sets of perimeter points, a closer point cloud and a further point cloud. The calibration mechanism identifies mismatch in data and filters unrealistic readings. For example, when two sets of perimeter points appear, the processor of the robot observes the perimeter from a different location of the robot or the robot moves closer towards the two sets of perimeter points and existence of the true perimeter is checked using short range sensors or a bumper disposed on the robot. If a location of the set of perimeter points closest to the robot does not coincide with the short range sensor readings or activate the bumper, the processor assumes the set of perimeter points furthest from the robot represent the true perimeter. In some cases, checks an existence and location of the set of perimeter points furthest from the robot using similar methods. In some embodiments, the robot drives along a path configured in a pattern or shape, such as a square, and the processor compares displacement sensor data with displacement of the robot within a map. For example, an OTS sensor disposed on the robot measures one meter of displacement. The processor determines movement of the robot based on the set of perimeter points furthest from the robot is two meters and movement of the robot based on the set of perimeter points closest to the robot is one meter. As such, the processor assumes the perimeter point cloud closest to the robot represent the true perimeter and the perimeter point cloud furthest from the robot is a phantom wall.

In embodiments with limited field of view of sensors of the robot, a frame of reference is constructed in multiple time steps. For example, a robot comprising sensors with a 45 degrees 3D field of view requires multiple time steps to construct a frame of reference. FIG. 273 illustrates an example of a robot 12700 comprising a LIDAR sensor 12701 with a limited field of view 12702, as such a frame of reference is constructed over time steps t1 to t11. In some embodiments, a bounding volume is used to visualize an obstacle. FIG. 274 illustrates a bounding volume 12800 surrounding object 12801 with an uncertainty cloud including mean and variance 12802. The bounding volume inflates or deflates depending on a confidence score of the identified object 12800. In embodiments, inflation or deflation is determined using naive methods or MDP (i.e., reinforcement learning).

In some embodiments, the input data of a neural network comprises spatial correlation with objects in a surrounding environment. In some embodiments, each dimension in a layer is associated with a dimension in the input. In some embodiments, the input data comprises an image or a stream of images. In some embodiments, width and height dimensions may correlate to 2D features of an image. In some embodiments, width, height, and depth dimensions may correlate to 2D features and depth of a depth image. In some embodiments, an area of an image comprising an object of interest is identified and analyzed to determine a likelihood of a presence of the object based on probability scores of the object belonging to various categories or classes of objects. In simulation tools, a boundary box may be used to determine a perimeter of a detected object. In some embodiments, the system is designed to reduce computational cost of detection of objects with no loss of accuracy. In some embodiments, an early determination is made as to whether processing a portion of a high-resolution image is likely to return a spent value.

In some embodiments, network output is based on training and is not hard coded by a human written algorithm. In some embodiments, training is executed on a hardware separate from a hardware implemented in the robot. In some embodiments, a network design is the same for a network executed on the training hardware and the robot hardware. In some embodiments, design of a network layer and their logical operations does not necessitate a separation of hardware or software along logical separations. In some embodiments, training input data comprises examples labeled by a human or an algorithm that automatically generates labeled data or both. In some embodiments, training input data comprises 2D images captured by a camera or depth information captured by a 3D or 2D LIDAR or depth camera. In some embodiments, classification may be executed for 2D images captured by a camera or for 3D or 2D depth data captured by a LIDAR or depth camera. In some embodiments, classification may be executed for images captured by a camera or for 3D or 2D depth data captured by a LIDAR or depth camera, separately or in combination.

In some embodiments, initial processing uses lower resolution to quickly determine if further high-resolution processing is required. This decision may be made in real-time. In some embodiments, upon determining a probability exceeding a threshold that an object of interest is identified in the input data, further processing is executed to return a more accurate prediction. In some embodiments, after initial processing, unnecessary input data is pruned and is not further processed to provide faster processing of select input data. Processing of the select data may occur in real-time. In some embodiments, low accuracy processing requiring lower computational budget is carried out on a wider group of inputs while high accuracy processing requiring higher computational budget is carried out on a select group of inputs. In some embodiments, separation of inputs into high and low computational budgets permits real-time processing of both. In some embodiments, training input data comprises an image with a label of an object within the image, a label of an object within the image and a bounding box defining an area of the image within which the object appears, multiple labels of multiple objects within the image, multiple labels of multiple objects each with a bounding box, or a selection of labels of objects within a bounding box. In some embodiments, training input data comprises multiple channels, one for each color and/or one for grayscale color. In some embodiments, training the network using labeled examples occurs over a series of runs, wherein during each run at least backpropagation is used to decide proper values for parameters. In some embodiments, the final values for parameters are used as a reference model to predict labels and bounding boxes for objects detected in new input data.

In some embodiments, regions in an image corresponds to regions in a spatial proximity of the robot. In some embodiments, a 2D image is illuminated using one of a light, an IR sensor, and a laser, to provide depth information. In some embodiments, the illumination may occur during alternating time slots and/or for alternating images. In some embodiments, a 2D image may include multiple channels, such as R, G, B, depth, and grayscale. In some embodiments, a machine learning network is applied to each of the channels individually, acting as a subsystem, the results of which are combined at the end. In some embodiments, the network may be applied to a combination of channels. In some embodiments, the network may be applied to a group of RGB or greyscale channels as a subsystem and separately applied to depth, the results of which are combined in weighted manner. In some embodiments, illumination on a 2D image may be achieved by a LIDAR that measures depth. In some embodiments, the LIDAR provides depth information that is fed into a separate network of computational nodes independent of a network that receives 2D images as input. In some embodiments, the results obtained from each of the networks independently provides probabilities of existence of an object within a near field or far field vicinity of the robot.

In some embodiments, a first subsystem network validates a result of a second subsystem network to provide a highly reliable system. In some embodiments, a LIDAR projects active illumination, a reflection of which is received by its receiver for depth measurement. In some embodiments, the illumination is simultaneously captured by a 2D camera, the illumination falling within a FOV of the camera and the receiver of the LIDAR. In some embodiments, a neural network of nodes generates a probability score indicating a likelihood that a region in an image includes an object belonging to a category or class of object present in the surroundings of the robot. In some embodiments, objects detected in the surroundings of the robot are stationary or dynamic in nature. In some embodiments, possible trajectories, speed, and direction of movement of dynamic objects are scored to predict their location in a next time slot. A dynamic object may be a pet, a human, a battery powered or unpowered vehicle, or another self-moving object. In some embodiments, probability scores are determined based on training examples rather than pre-coded algorithms. In some embodiments, probability scores obtained based on training examples are used for formulating navigation decisions of the robot. In some embodiments, probability scores and corresponding categorization are transmitted to a remote control center where human assistance is provided to help in making more complicated decisions. In some embodiments, probability scores may be communicated to a user (e.g., driver of a vehicle) via a light, sound, LCD display, or another method. In some embodiments, active illumination sensing is comprised of measuring any of a distance, a turnaround time, a direction, an intensity, and a phase shift reflected from a surface on which an illumination signal is projected.

In some embodiments, as a map is constructed, object bounding boxes emerge and complete over multiple time steps or sensor scans. FIG. 275 illustrates an example of a robot 12900 comprising a LIDAR sensor with a limited field of view 12901. As such, an object bounding box of object 12902 emerges and is completed over multiple time steps t1, t2, and so on. Portions 12903 and 12904 of object 12903 are observed over time steps t1 and t2, respectively. Concurrently, as the processor builds the map, the processor of the robot localizes the robot, the object of interest solidifies, and more characteristics of the object are discovered. Examples of characteristics include size and a distance from the robot and/or relation to a frame of reference of the workspace and/or a logical area unit as a subset of the workspace. As more areas are observed, the object becomes better defined, wherein probabilities of its size, distance, and nature (i.e., an object type of the object) converge to more solid estimations (i.e., estimations with greater confidence). At some point, the object of interest is classified with reasonable accuracy. Similarly, as sensors of the robot scan more areas of the environment, more boundaries and objects within the boundaries are discovered and logical area units (e.g., rooms) are identified. A probability of an area being a logical area unit increases and decreases as a shape of the room (i.e., its borders) are identified and change until a convergence is reached, wherein parameters solidify and a classification or identification of the area is determined.

Upon completion of a map or a first work session, rooms or objects discovered including their proposed labeling are presented to a user using an application of a communication device paired with the robot. The user uses the application to accept or reject the proposed labeling by, for example, swiping right or left or using another gesture on the screen of the communication device or by providing another form of user input. This helps train the algorithm to properly label areas and objects. Some embodiments use training methods. For example, upon the user swiping left to reject room assignments, the application or the processor of the robot re-attempts to identify logical unit areas such as rooms, hallways, etc. and proposes new room assignments. However, upon the user swiping right to accept room assignments, the algorithm reinforces the learning mechanism for future classifications. In another example, the application proposes labeling a discovered object as a shoe. Upon swiping right to indicate a correct classification, the label-object pair is provided as input to the ML or DNN algorithm and the reinforcement is used in improving future classifications. However, upon swiping left to indicate an incorrect classification, the label is removed from the object and is recognized as a misclassification. The information is provided as input to the ML or DNN algorithm to improve future classifications. In some embodiments, another label for the object is proposed to the user using the application based on a next best prediction of an object type of the object. For example, FIG. 276 illustrates an application 13000 of a communication device 13001 displaying an object 13002 and a shoe 13003 as the predicted object type. A user 13004 swipes right indicating a misclassification and the application 13000 displays a vase 13005 as the next most probable object type. The algorithm determines there is a 55% chance the object is a shoe, 35% chance the object is a vase, and 10% chance the object has an unknown classification. When an object type of an object is identified an action is assigned to the object. In some embodiments, a default action assigned to an object type comprises adjusting a path of the robot to avoid the object. In an environment, such as a house, where a same object repetitively appears due to a domain of possibilities being finite, the processor of the robot develops a good sense for recognizing particular objects.

In some embodiments, an action associated with an identified object is rule based and is defined in advance or by example. For instance, during or after a work session run images of objects are shown to the user using the application and the user assigns a task associated with each object. Or, in some instances, the robot plays a sound track that verbally notifies the user of an object being detected and the user verbally responds by commanding the robot to, for example, pick up the object and place it in the toy box. In some embodiments, a voice command is translated to text using algorithms performing speech to text using natural language processing (NLP) to extract the text and an associated meaning or desired action and translate it to a command that is provided to the robot. In some embodiments, the robot provides context when verbally notifying the user of an object being detected. For example, the robot may verbally announce teddy bear detected or what to do with Ted or green toy car detected or green ford fusion detected. As such, the user may provide a more verbally targeted command given more information of the object is known, such as put the object in the toy box or put the object in the living room box, wherein each of the toy box and living room box were previously identified on the application. FIG. 277 illustrates an application 13400 of a communication device 13401 paired with the robot displaying a location of a toy box 13402 and living room box 13403 within a map 13404 of the environment of the robot. In some embodiments, an object, for example a toy box or another type of storage box, is automatically detected by the robot. In a simplest implementation, a QR code helps the robot identify the object, wherein a scanner disposed on the robot identifies the object upon scanning a QR code associated with the object. In another embodiment, the robot recognizes accessories (e.g., storage box such as a toy box or things box) that are sold with or separately from the robot from a same manufacturer of the robot or another manufacturer that designs accessories compatible with the robot. In some embodiments, the robot recognizes a particular object, such as a storage box, based on its shape and dimensions and the items within the storage box. In some embodiments, an image of a particular object is displayed by the application and the user confirms an identification of the particular object. For example, FIG. 278 illustrates an application 13500 of a communication device 13501 displaying an image of object 13502 and awaiting input from a user to confirm whether the object 13502 is a things box. In one instance, the user responds by selecting yes or no 13503 or in another instance, the user responds by swiping left or right 13504 to indicate yes or no. In some embodiments, the robot verbally asks the user in a voice format using text to speech whether the object is a particular accessory, such as a things box. The user verbally responds to the robot using yes or no, which the processor of the robot translates into text and a meaning associated with the text. In some embodiments, the user responds to the robot using a physical gesture that is captured by a camera disposed on the robot or a smart house connected with the robot. The processor of the robot translates the physical gesture into a meaning associated with the gesture.

In some embodiments, upon initiation by the robot, upon the robot asking, or during a training session, the user demonstrates an action the robot is to perform upon identifying a particular object. For example, the user demonstrates an action the robot is to perform upon identifying a teddy bear by physically picking up the teddy bear and placing the teddy bear in a toy box while sensors of the robot observe the actions of the user. In some embodiments, the user demonstrates an action the robot is to perform upon identifying a particular object using virtual reality. For example, in a mixed VR/AR interface, the user selects a manipulator arm with a claw and grabs an object of interest using the claw and places the object where it belongs, thereby demonstrating the action the robot is to perform upon identifying the object as wheel as which manipulator arm (or other tool types for other application) to use. In some embodiments, the user demonstrates an action the robot is to perform upon identifying a particular object using the application. For example, FIG. 279 illustrates selecting a tool 13600 of multiple possible tools of a robot using an application of a communication device. Using the application, the user instructs the robot on how to pick up or handle a particular object (e.g., pick up object from its top, side, bottom, etc., lift or scoop object, push object, etc.).

Collecting objects in one place helps the user clean an area, makes it easier for the user to place the objects back in their correct locations, and makes it easier for the robot to perform other cleaning tasks, such as vacuuming and mapping. As such, a learning mechanism may be comprised of two separate subsystems. One subsystem of the learning mechanism is global and the global training subsystem comprises a large data set of labeled images, wherein the images comprise images labelled by staffed human operators and/or crowd sourced images labelled by users and/or auto-generated labelled images, and/or a combination of the above. The other subsystem of the learning mechanism is local, wherein the local training subsystem includes fewer objects and classes that are typically found in a specific house with more granular labelling. For example, in a specific house a teddy bear is labelled as Ted and a doll is labelled with a particular name (e.g., Tracey or Lisa). In some embodiments, the global training and object classification subsystem is used as an a priori to narrow down an object type of an object, while the local training and object classification subsystem provides further fine tuning in determining the object type. In some embodiments, an unsupervised method is locally used to cluster objects into categories, then a supervised method is applied only a subset of the data (e.g., each category or the images of that category). For example, an unsupervised method separates furniture from toys within a house. The furniture at particular locations within the house is constant and appears substantially the same, as furniture in the house typically remains the same over a reasonably long period of time. FIG. 280 illustrates an autonomous vehicle 13700 disposed with sensors observing objects 13701. Using wireless capabilities 13702 of the vehicle 13700 sensor data corresponding to observed objects 13701 is provided as input to a sever 13703 that executes a ML algorithm 13704 to classify objects 13701 based on the sensor data. A database storage 13705 stores information such as characteristics associated with different object types and other data. A real-time controller 13706 executes on any of target ML, supervised ML, unsupervised ML and real-time classification based on full or partial observability.

In some embodiments, the processor of the robot identifies a particular object based on a visual cue, such as a QR code or an object-specific pattern. For example, the processor of the robot identifies an object as a charging station based on observing a particular QR code or a specific pattern. In some embodiments, the processor of the robot identifies a particular object based on recognizing a 3D structure with an indentation pattern unique to the object using a LIDAR sensor or line laser and image sensor. Visual cues help the robot align with a secondary device in cases where alignment is important and/or space is limited. For example, FIG. 281A illustrates a robot 13800 attempting to dock at a charging station 13801 integrated into a cabinet 13802 of a home. The robot 13800 aligns itself with the charging station 13801 using QR code 13803, an image pattern 13804, or a 3D structure with a unique indentation pattern 13805, any of which is disposed on a front 13806 of the charging station 13801, before attempting to enter the hollow space of the charging station 13801. Alignment of the robot 13800 with the charging station 13801 is particularly important when the robot 13800 docks backwards (e.g., to empty a dustbin of the robot). FIG. 281B illustrates A. the robot 13800 driving in a forward direction 13806 and using any of QR code 13803, an image pattern 13804, or a 3D structure with a unique indentation pattern 13805 to initially align with the charging station 13801. Upon the robot 13800 aligning with the charging station 13801, B. the robot 13800 rotates 180 degrees 13807, then C. moves in a backwards direction 13808 until positioned on the charging station 13801.

Figure 282:
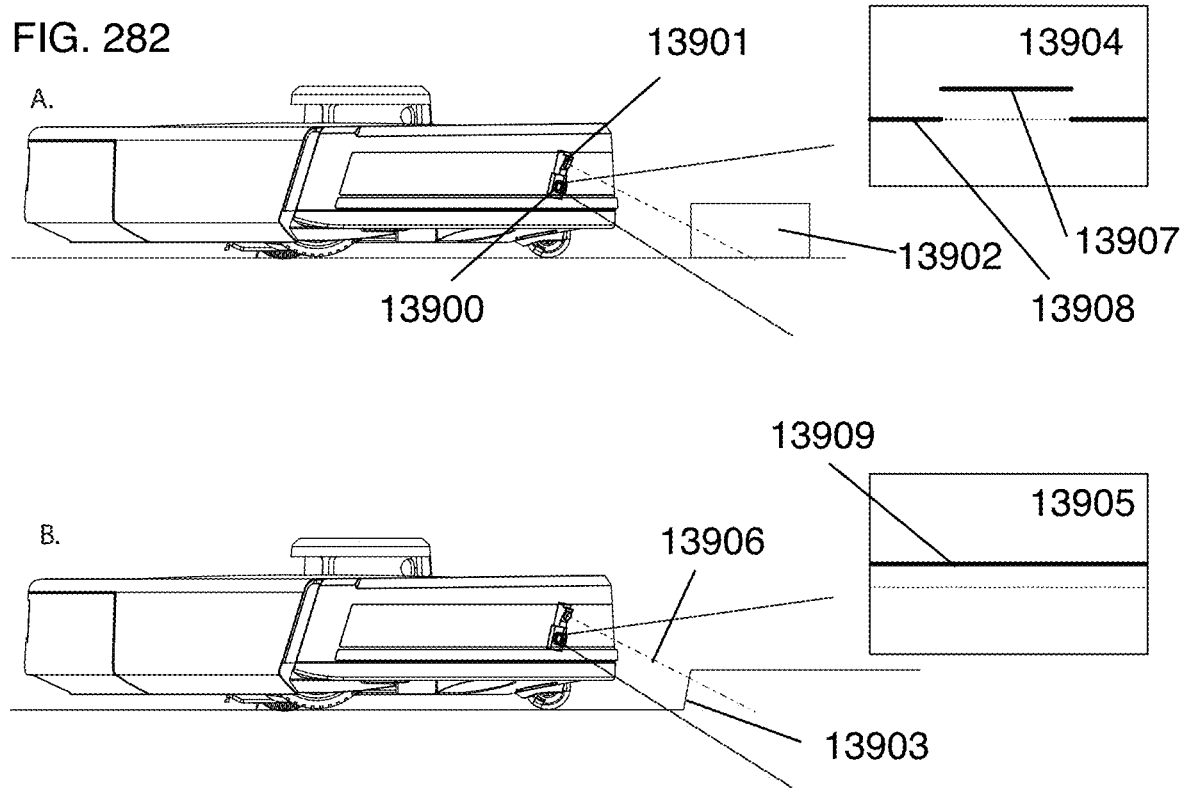
Figure 283:
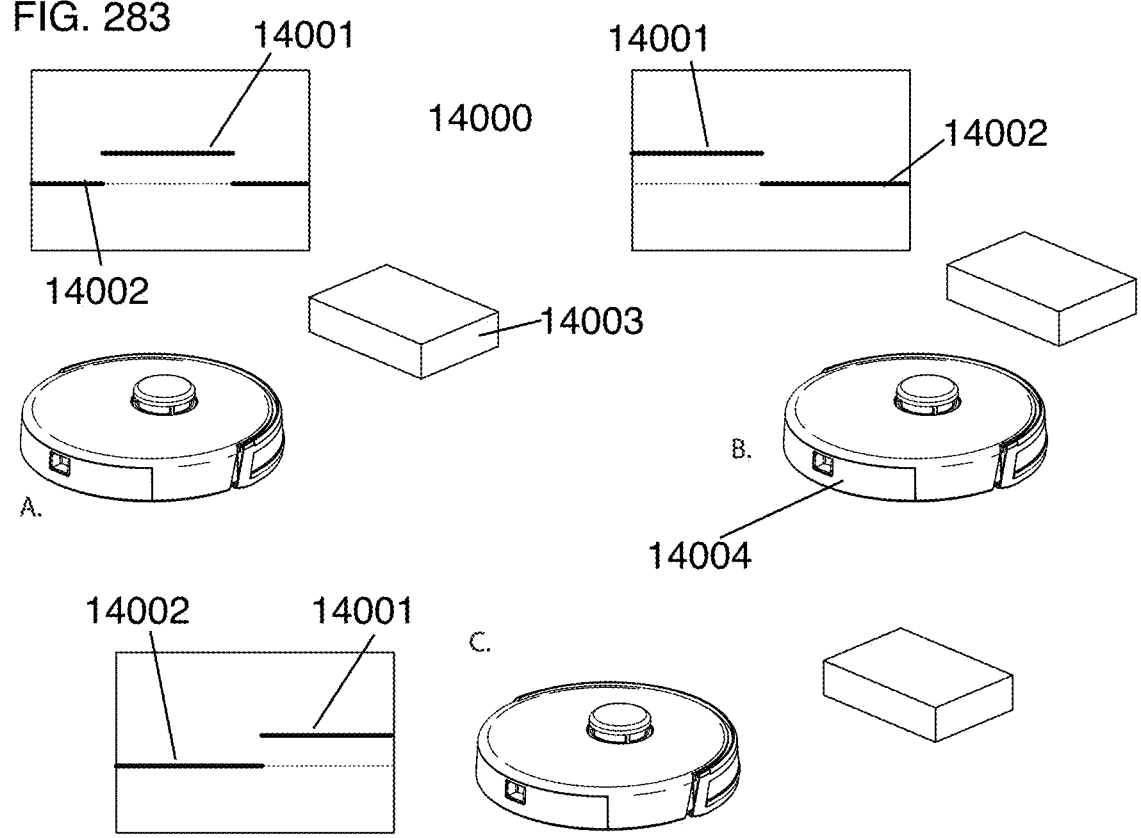
Figure 284:
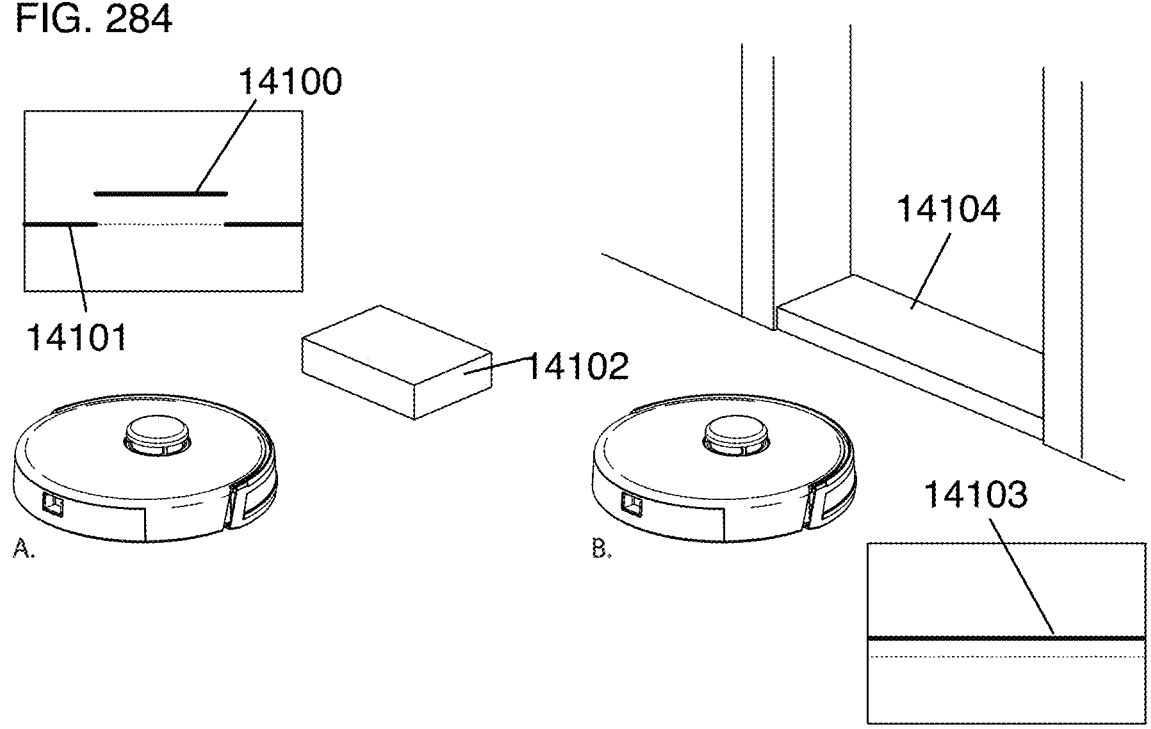
Figure 285:
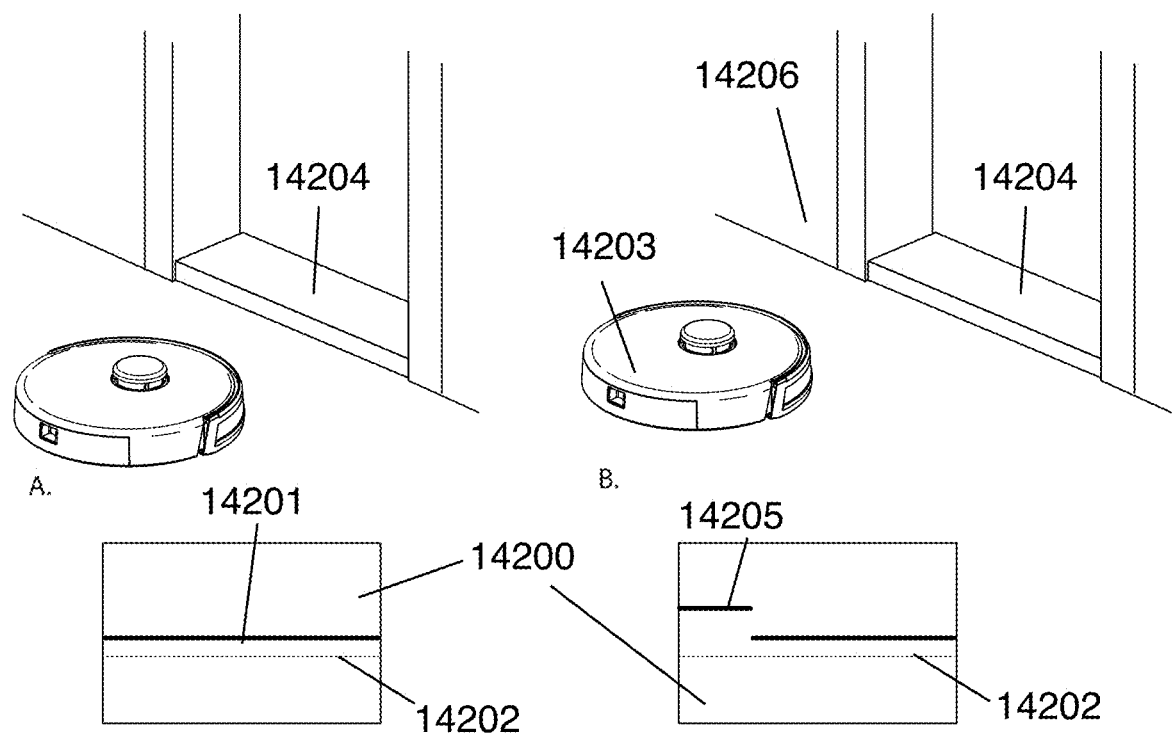

In some embodiments, the processor of the robot detects obstacles using near-range obstacle detection sensors, such as combination of a line laser sensor and an image sensor, based on a vertical shift of a line projected by the line laser captured in images. In some embodiments, the processor determines whether the vertical shift is due to an obstacle or a floor transition. In some embodiments, user input via an application of a communication device paired with the robot helps in distinguishing between obstacles and floor transitions. For example, the user provides an input to the application designating a maximum height for floor transitions. Any vertical shift of the line in the captured images that is greater than the maximum height is an obstacle and any vertical shift below the maximum height is a floor transition. The processor decides a next move of the robot based on this information. FIG. 282 illustrates a robot with a near range obstacle sensor including an image sensor 13900 and line laser 13901 approaching A. an obstacle 13902 and B. a floor transition 13903. Corresponding images 13904 and 13905 of the projected laser line 13906 are captured by the image sensor 13900. A portion 13907 of the laser line 13908 in image 13904 that is vertically shifted due to encountering the obstacle 13902 is not as wide as the laser line 13909 in image 13905 vertically shifted due to encountering the floor transition 13903 because the floor transition 13903 is wide enough to cover the entire field of view of the image sensor 13900. However, a width of the portion of the laser line vertically shifted in an image may not always distinguish an obstacle from a floor transition. FIG. 283 illustrates some examples of images 14000 of laser line distortion due to a vertical shift of at least a portion 14001 of the line 14002 upon encountering an obstacle 14003, when A. the obstacle 14003 is aligned with a centerline of a robot 14004, B. the obstacle 14003 is on a left side of the robot 14004, and C. the obstacle 14003 is on a right side of the robot 14004. The location of the obstacle 14003 relative to the robot 14004 changes a location of the portion 14001 of the line 14002 vertically shifted in the captured images 14000. FIG. 284 illustrates a portion 14100 of a laser line 14101 captured in the image that is vertically shifted due to encountering an obstacle 14102 is not as wide as the laser line 14103 in the captured image that is vertically shifted due to encountering a floor transition 14104 (door threshold), as the floor transition 14104 is wide enough to cover an entire field of view of an image sensor of the robot. FIG. 285 illustrates an example of images 14200 of laser line distortion due to a vertical shift of at least a portion 14201 of the laser line 14202 upon a robot 14203 encountering a floor transition 14204 when A. the robot 14203 is centered with the floor transition 14204 and B. the robot 14203 is further towards a left side of the floor transition 14204, wherein a second portion 14205 of the laser line 14202 is vertically shifted due to a greater height of a wall 14206 detected in a field of view of an image sensor capturing images 14200.

FIG. 286 illustrates an example of a process of object identification. During operation of the robot 14700, the processor determines a current status of the robot, performs an analysis based on input of sensor data of object 14701, selects an object type of object 14701 based on an object database and the sensor data, formulates a plan based on the object type, executes the plan, notifies a user of the object type observed by, for example, displaying an image of the object 14701 via an application of a communication device paired with the robot 14700, and receives validation from the user, via the application, to perform a particular action when the object 14701 is observed. An image of the object 14701 or the object type of the object 14701 and a respective reactive action may be recorded.

In some embodiments, the robot comprises a long range sensor and near range sensor for use while performing work. For example, a LIDAR sensor may be used to observe a presence or a lack of objects, including walls, within a long range while a depth camera or camera may be used for identifying obstacles within a near range or positioned at a height above the floor. FIG. 287 illustrates an example of a robot 14800 including a LIDAR sensor 14801 for observing objects within a long range 14802 and a camera 14803 for observing objects within a near range 14804. In embodiments, the long range and near range sensor data may be used for different purposes and at different levels of criticality. For example, the long range sensor data may be used for global planning and overall coverage decisions while the near range sensor data may be used for obstacle detection, safety, alignment with walls, and improved corner coverage and treatment. Wall alignment and corner coverage may be different based on a shape of the robot. For example, FIG. 288 illustrates a robot 14900 moving in a first direction 1 and a second direction 2 along a wall 14901 and curving 3 to cover a corner 14902. The robot 14900 uses a near range sensor to remain aligned with the wall 14901 and cover the corner 14902. In some embodiments, the near range sensor has a mandatory clearance requirement, a real-time response time requirement, or deterministic response time requirement. Mandatory clearance requirement prevents the robot from moving unless a space in front of the robot is clear of any obstacles. With real-time response, at least a system responsible for applying breaks or stopping the robot from moving is capable of real-time computing. Deterministic response time requires the robot deterministically execute certain actions (e.g., stop) before a predetermined amount of time elapses or the robot moves a certain amount of distance, wherein the requirement is defined using a table dependent on a distance from an obstacle and an angle at which the obstacle appears.

In some embodiments, the robot executes an obstacle avoidance routine. Obstacle avoidance routines may include the robot performing a U-turn, stopping and waiting until an obstacle clears or driving around the obstacle. The action of the robot depends on a size of the obstacle, when obstacle was detected (i.e., how close the obstacle is to the robot), and a distance required between the robot and the obstacle. There may be manual settings in the application and/or learned AI settings (e.g., learned with experience) for controlling the obstacle avoidance routine. FIG. 289 illustrates the obstacle avoidance routine described.

In embodiments, zones within which objects are detected are discovered and traced with different sensors. Zones may partially or fully overlap. For example, FIG. 290 illustrates near range object detection zones 15000 within which near range objects are detected and long range object detection zones 15001 within which long range sensors are detected. Zones 15000 and 15001 partially overlap in areas 15002. FIG. 291 illustrates a robot 15100 with non-overlapping near range object detection zones A and B which overlap with long range object detection zone C. In another case, FIG. 291 illustrates a robot 15101 with overlapping near range object detection zones A and B which does not overlap with long range object detection zone C. In embodiments, near range sensor data and long range sensor data are processed separately or in combination. When near range sensor data and long range sensor data are processed separately, the near range sensor and the long range sensor data processing may include a built in object detection method. Alternatively, only one of the near range sensor and the long range sensor data processing includes object detection. In embodiments, at least one of near range sensor data and the long range sensor data is further processed for object identification and object characteristics which may be used in predicting one or more possible behaviors of the robot for a particular object type identified. For instance, in response to detecting an object that is an obstacle, the robot responds by avoidance of the obstacle.

Since some objects have similar dynamic characteristics, further identification of objects may be required. For example, a human and a pet, such as a cat or another animal, may both move within a certain speed range and have likelihood of suddenly turning 180 degrees. In another example, an object positioned close to a floor is mistakenly assumed to be a transition between rooms while in actuality the object is a cell phone cord. As a result of the incorrect object type assumption, the robot traverses over the object, potentially damaging the cell phone cord. In such cases it is beneficial to determine the type of object such that a correct action may be executed by the robot. For instance, upon identifying the object as the cell phone cord the robot drives around the object or stops operating brushes and drives over the object.

In some embodiments, the processor chooses to classify an object or chooses to wait and keep the object unclassified based on the consequences defined for a wrong classification. For instance, the processor of the robot may be more conservative in classifying objects when a wrong classification results in an assigned punishment, such as a negative reward. In contrast, the processor may be liberal in classifying objects when there are no consequences of misclassification of an object. In some embodiments, different objects may have different consequences for misclassification of the object. For example, a large negative reward may be assigned for misclassifying pet waste as an apple. In some embodiments, the consequences of misclassification of an object depends on the type of the object and the likelihood of encountering the particular type of object during a work session. The chances of encountering a sock, for example, is much more likely than encountering pet waste during a work session. In some embodiments, the likelihood of encountering a particular type of object during a work session is determined based on a collection of past experiences of at least one robot, but preferably, a large number of robots. However, since the likelihood of encountering different types of objects varies for different dwellings, the likelihood of encountering different types of objects may also be determined based on the experiences of the particular robot operating within the respective dwelling.

In some embodiments, the processor of the robot may initially be trained in classification of objects based on a collection of past experiences of at least one robot, but preferably, a large number of robots. In some embodiments, the processor of the robot may further be trained in classification of objects based on the experiences of the robot itself while operating within a particular dwelling. In some embodiments, the processor adjusts the weight given to classification based on the collection of past experiences of robots and classification based on the experiences of the respective robot itself. In some embodiments, the weight is preconfigured. In some embodiments, the weight is adjusted by a user using an application of a communication device paired with the robot. In some embodiments, the processor of the robot is trained in object classification using user feedback. In some embodiments, the user may review object classifications of the processor using the application of the communication device and confirm the classification as correct or reclassify an object misclassified by the processor. In such a manner, the processor may be trained in object classification using reinforcement training.

In some embodiments, the processor classifies the type, size, texture, and nature of objects. In some embodiments, such object classifications are provided as input to the navigational algorithm, which then returns as output a decision on how to handle the object with the particular classifications. For example, a decision for an autonomous car may be very conservative when an object has even the slightest chance of being a living being, and may therefore decide to avoid the object. For a robot cleaner, the robot may be extra conservative in its decision of handling an object when the object has the slightest chance of being pet bodily waste.

In some embodiments, the processor may determine a generalization of an object based on its characteristics and features. For example, a generalization of pears and tangerines may be based on size and roundness (i.e., shape) of the two objects. Using the generalization, the processor may assume objects which fall within a first area of a graph are pears and those that fall within a second area of a graph are tangerines. Generalization of objects may vary depending on the characteristics and features considered in forming the generalization. Due to the curse of dimensionality, there is a limit to the number of characteristics and features that may be used in generalizing an object. Therefore, a set of best features that best represents an object is used in generalizing the object. In embodiments, different objects have differing best features that best represent them. For instance, the best features that best represent a baseball differ from the best features that best represent spilled milk. In some embodiments, determining the best features that best represent an object requires considering the goal of identifying the object; defining the object; and determining which features best represent the object. For example, in determining the best features that best represent an apple it is determined whether the type of fruit is significant or if classification as a fruit in general is enough. In some embodiments, determining the best features that best represents an object and the answers to such considerations depends on the actuation decision of the robot upon encountering the object. For instance, if the actuation upon encountering the object is to simply avoid bumping the object, then details of features of the object may not be necessary and classification of the object as a general type of object (e.g., a fruit or a ball) may suffice. However, other actuation decisions of the robot may be a response to a more detailed classification of an object. For example, an actuation decision to avoid an object may be defined differently depending on the determined classification of the object. Avoiding the object may include one or more actions such as remaining a particular distance from the object; wall-following the object; stopping operation and remaining in place (e.g., upon classifying an object as pet waste); stopping operation and returning to the charging station; marking the area as a no-go zone for future work sessions; asking a user if the area should be marked as a no-go zone for future work sessions; asking the user to classify the object; and adding the classified object to a database for use in future classifications.

In some embodiments, the processor reduces images to features. For example, FIG. 292 illustrates the processor extracting a feature from an incoming image 1800 and performing a search through previously captured images in a database 1801 to find a match to previously observed features captured in the previous images. In some embodiments, the opposite is implemented. For example, FIG. 292 also illustrates the processor creating and indexing features captured in previous images and their variations 1802, and the processor searching an incoming image 1803 to determine if it includes any of the features observed previously in the previous images. The processor may use a frontend algorithm or a backend algorithm to search for a match between features. In a frontend algorithm, a matching test between compared features may be simplified to a binary test, may use reduced resolution, and/or may reduce the features to be tested to only a few strongest features or a strongest feature. A backend algorithm is only useful when performed online. As such, a backend algorithm may concurrently begin a more investigative approach as a backup to the frontend algorithm. If the frontend algorithm fails to find a match, the backend algorithm may find a match, although may take more time in finding the match.

In some embodiments, the processor uses salient features defining elements of a subject to distinguish one target from another. Salient features include key pieces of information distinct enough to be used in recognition of an image, an object, an environment, or a person. Salient features are subjective, meaning different people may recognize different features in a target to distinguish them. Therefore, a target may have several salient features and these features may be sorted into a dictionary. FIGS. 293A-293C illustrate examples of salient features. FIG. 293A illustrates some features of a dog 1900 that may be described as salient features. Using the salient features 1900, the dog may be distinguished from other pets, such as cats 1901 in FIG. 293B. FIG. 293C illustrates different visual properties of different fruits (e.g., color, shape, presence of leaf, etc.) that may be used in sorting and distinguishing the fruits from one another.

In some embodiments, the processor may localize an object. The object localization may comprise a location of the object falling within a FOV of an image sensor and observed by the image sensor (or depth sensor or other type of sensor) in a local or global map frame of reference. In some embodiments, the processor locally localizes the object with respect to a position of the robot. In local object localization, the processor determines a distance or geometrical position of the object in relation to the robot. In some embodiments, the processor globally localizes the object with respect to the frame of reference of the environment. Localizing the object globally with respect to the frame of reference of the environment is important when, for example, the object is to be avoided. For instance, a user may add a boundary around a flower pot in a map of the environment using an application of a communication device paired with the robot. While the boundary is discovered by the local frame of reference with respect to the position of the robot, the boundary must also be localized globally with respect to the frame of reference of the environment.

In embodiments, the objects may be classified or unclassified and may be identified or unidentified. In some embodiments, an object is identified when the processor identifies the object in an image of a stream of images (or video)

captured by an image sensor of the robot. In some embodiments, upon identifying the object the processor has not yet determined a distance of the object, a classification of the object, or distinguished the object in any way. The processor has simply identified the existence of something in the image worth examining. In some embodiments, the processor may mark a region of the image in which the identified object is positioned with, for example, a question mark within a circle. In embodiments, an object may be any object that is not a part of the room, wherein the room may include at least one of the floor, the walls, the furniture, and the appliances. In some embodiments, an object is detected when the processor detects an object of certain shape, size, and/or distance. This provides an additional layer of detail over identifying the object as some vague characteristics of the object are determined. In some embodiments, an object is classified when the actual object type is determined (e.g., bike, toy car, remote control, keys, etc.). In some embodiments, an object is labelled when the processor classifies the object. However, in some cases, a labelled object may not be successfully classified and the object may be labelled as, for example, "other". In some embodiments, an object may be labelled automatically by the processor using a classification algorithm or by a user using an application of a communication device (e.g., by choosing from a list of possible labels or creating new labels such as sock, fridge, table, other, etc.). In some embodiments, the user may customize labels by creating a particular label for an object. For example, a user may label a person named Sam by their actual name such that the classification algorithm may classify the person in a class named Sam upon recognizing them in the environment. In such cases, the classification may classify persons by their actual name without the user manually labelling the persons. In some instance, the processor may successfully determine that several faces observed are alike and belong to one person, however may not know which person. Or the processor may recognize a dog but may not know the name of the dog. In some embodiments, the user may label the faces or the dog with the name of the actual person or dog such that the classification algorithm may classify them by name in the future.

In some embodiments, dynamic obstacles, such as people or pets, may be added to the map by the processor of the robot or a user using the application of the communication device paired with the robot. In some embodiments, dynamic obstacles may have a half-life, wherein a probability of their presence at particular locations within the floor plan reduces over time. In some embodiments, the probability of a presence of all obstacles and walls sensed at particular locations within the floor plan reduces over time unless their existence at the particular locations is fortified or reinforced with newer observations. In using such an approach, the probability of the presence of an obstacle at a particular location in which a moving person was observed but travelled away from reduces to zero with time. In some embodiments, the speed at which the probabilities of presence of obstacles at locations within the floor plan are reduced (i.e., the half-life) may be learned by the processor using reinforcement learning. For example, after an initialization at some seed value, the processor may determine the robot did not bump into an obstacle at a location in which the probability of existence of an obstacle is high, and may therefore reduce the probability of existence of the obstacle at the particular locations faster in relation to time. In places where the processor of the robot observed a bump against an obstacle or existence of an obstacle that was recently faded away, the processor may reduce the rate of reduction in probability of existence of an obstacle in the corresponding places. Over time data is gathered and with repetition convergence is obtained for every different setting. In embodiments, implementation of this method may use deep, shallow, or atomic machine learning and MDP.

In some embodiments, it may be helpful to introduce the processor of the robot to some of the moving objects the robot is likely to encounter within the environment. For example, if the robot operated within a house, it may be helpful to introduce the processor of the robot to the humans and pets occupying the house by capturing images of them using a mobile device or a camera of the robot. It may be beneficial to capture multiple images or a video stream (i.e., a stream of images) from different angles to improve detection of the humans and pets by the processor. For example, the robot may drive around a person while capturing images from various angles using its camera. In another example, a user may capture a video stream while walking around the person using their smartphone. The video stream may be obtained by the processor via an application of the smartphone paired with the robot. The processor of the robot may extract dimensions and features of the humans and pets such that when the extracted features are present in an image captured in a later work session, the processor may interpret the presence of these features as moving objects. Further, the processor of the robot may exclude these extracted features from the background in cases where the features are blocking areas of the environment. Therefore, the processor may have two indications of a presence of dynamic objects, a Bayesian relation of which may be used to obtain a high probability prediction.

In some embodiments, the processor of the robot may recognize a direction of movement of a human or animal or object (e.g., car) based on sensor data (e.g., acoustic sensor, camera sensor, etc.). In some embodiments, the processor may determine a probability of direction of movement of the human or animal for each possible direction. For example, for four different possible directions of a human, a processor of the robot has determined different probabilities 10%, 80%, 7%, and 3%, based on sensor data. For instance, if the processor analyzes acoustic data and determines the acoustics are linearly increasing, the processor may determine that it is likely that the human is moving in a direction towards the robot. In some embodiments, the processor may determine the probability of which direction the person or animal or object will move in next based on current data (e.g., environmental data, acoustics data, etc.) and historical data (e.g., previous movements of similar objects or humans or animals, etc.). For example, the processor may determine the probability of which direction a person will move next based on image data indicating the person is riding a bicycle and road data (e.g., is there a path that would allow the person to drive the bike in a right or left direction).

In some embodiments, the processor may use speed of movement of an object or an amount of movement of an object in captured images to determine if an object is dynamic. Examples of some objects within a house and their corresponding characteristics include a chair with characteristics including very little movement and located within a predetermined radius, a human with characteristic including ability to be located anywhere within the house, and a running child with characteristics of fast movement and small volume. In some embodiments, the processor compares captured images to extract such characteristics of different objects. In some embodiments, the processor identifies the object based on features. The processor may determine an amount of movement of the object over a predetermined amount of time or a speed of the object and may determine whether the object is dynamic or not based on its movement or speed. In some cases, the processor may infer the type of object.

In some embodiments, the processor executes facial recognition based on unique facial features of a person. In some embodiments, the processor executes facial recognition based on unique depth patterns of a face. For instance, a face of a person may have a unique depth pattern when observed. In some embodiments, the processor may first form a hypothesis of who a person is based on a first observation (e.g., physical facial features of the person (e.g., eyebrows, lips, eyes, etc.)). Upon forming the hypothesis, the processor may confirm the hypothesis by a second observation (e.g., the depth pattern of the face of the person). After confirming the hypothesis, the processor may infer who the person is. In some embodiments, the processor may identify a user based on the shape of a face and how features of the face (e.g., eyes, ears, mouth, nose, etc.) relate to one another. Examples of geometrical relations may include distance between any two features of the face, such as distance between the eyes, distance between the ears, distance between an eye and an ear, distance between ends of lips, and distance from the tip of the nose to an eye or ear or lip. Another example of geometrical relations may include the geometrical shape formed by connecting three or more features of the face. In some embodiments, the processor of the robot may identify the eyes of the user and may use real time SLAM to continuously track the eyes of the user. For example, the processor of the robot may track the eyes of a user such that virtual eyes of the robot displayed on a screen of the robot may maintain eye contact with the user during interaction with the user. In some embodiments, a structured light pattern may be emitted within the environment and the processor may recognize a face based on the pattern of the emitted light. In some embodiments, the processor may also identify features of the environment based on the pattern of the emitted light projected onto the surfaces of objects within the environment.

In order to save computational costs, the processor of the robot does not have to identify a face based on all faces of people on the planet. The processor of the robot or AI algorithm may identify the person based on a set of faces observed in data that belongs to people connected to the person (e.g., family and friends). Social connection data may be available through APIs from social networks. Similarly, the processor of the robot may identify objects based on possible objects available within its environment (e.g., home or supermarket). In one instance, a training session may be provided through an application of a communication device or the web to label some objects around the house. The processor of the robot may identify objects and present them to the user to label or classify them. The user may self-initiate and take pictures of objects or rooms within the house and label them using the application. This, combined with large data sets that are pre-provided from the manufacturer during a training phase makes the task of object recognition computationally affordable.

In some embodiments, motion vectors or optical flows in an image stream are used as clues to detect whether an object is moving. Upon classifying an object as a moving object, speed and direction of the object are extracted. In some embodiments, a bounding box defines borders within an image surrounding the moving object. In some embodiments, the image is further processed to yield a velocity and an acceleration relationship between the moving object and the robot or a frame of reference established by the processor of the robot. In some embodiments, further details are extracted from a stream of images, such as object type and object related details (e.g., make and model of the object such as a toy car or a real car, price of the object, owner of the object, etc.).

In embodiments, processing of an image or point cloud includes, but is not limited to, any of object noise reduction, object classification, object identification, object verification, object detection, object feature detection, object recognition, object confirmation, object separation and object depth determination. Such image and/or point cloud processing is used to extract meaningful evidence from noisy sensors to, for example, determine a category of a sensed object, an object type or identification (e.g., human recognition or a type, make, and model of a car), whether an object exists within a vicinity of the robot and how the object is detected from a series of sensed input, which features from sensed data determine existence of objects within the environment, how an object is separated from other spatially sensed data and which borders form the separation, depth of an object, direction of movement of an object, and acceleration or speed of an object.

In some embodiments, obstacles are detected using a short range structured light and camera pair. In some embodiments, obstacles are detected using stereo matching on two cameras. In some embodiments, at least one camera is used for object detection or finding a volume of an object. In some embodiments, two or more cameras are used. In some embodiments, patches of a first image and patches of a second image captured by a first camera and a second camera, respectively, are matched by a sum of absolute differences, a sum of squared differences, cross correlation, census transform and similar methods, bundle adjustment, etc. In some embodiments, the Levenberg Marquardt algorithm is used for optimization. In some embodiments, corners of an object are used as the patch using SIFT. In some embodiments, Harris, Shi Tomasi, SUSAN, MSER, HOG, FAST or other methods are used for detecting and matching patches of images. In some embodiments, SURF and other methods are used to identify a desired patch among multiple patches in each of the images. In some embodiments, features or identified patches are tracked over multiple time steps. In some embodiments, decomposition methods are used to separate localization from feature tracking. In some embodiments, the Lukas-Kanade method is used to assume a constant optical flow in tracking features or patches over time steps. In some embodiments, median filtering or other methods of filtering are used. In some embodiments, convolutional neural networks are used to solve the SLAM problem.

In some embodiments, the robot selects a specific feature (e.g., wall or corner) to calibrate against. For instance, one type of sensor confirms a presence of a feature (e.g., wall or corner) and a second type of sensor validates the presence of the feature. In some embodiments, calibration is based on a comparison between an image and a 3D depth cloud. In some embodiments, calibration is based on a comparison between a 2D planar depth reading and images. In some embodiments, calibration is based on a comparison between stereo images and a 3D point cloud. In some embodiments, calibration is based on a camera and a light source. In some embodiments, the calibration encompasses alignment of a portion of an image comprising the point of interest (e.g., an object) with a depth point cloud such that correct pixels of the image align with correct depth values of the depth point cloud. In some embodiments, the point of interest is deemed a point of attention. In some embodiments, the point of interest is limited with a bounding box or bounding volume. In some embodiments, an object of interest is assigned a location of {(x1 to x2), (y1 to y2), (z1 to z2)} in a coordinate system where x2−x1 is a length of the object, y2−y1 is a height of the object, and z2−z1 is a depth of the object. In some embodiments, x2−x1 is a length of a bounding box, y2−y1 is a height of the bounding box, and z2−z1 is a depth of the bounding box. In some embodiments, the object or the bounding box is associated with a direction in a frame of reference that defines the yaw, pitch, and roll of the object with respect to a volumetric frame of reference. In some embodiments, a volume of the object is defined at its location in a frame of reference, wherein a volumetric radius is drawn from a center of the object to define a boundary of the object. In some embodiments, a central point is extended to (+x, −x), (+y, −y), and (+z, −z) to define a boundary of the object. In some embodiments, a right, a left, a top, a bottom, a top right, a top left, a bottom right, a bottom left, etc. is assigned as a point from which a boundary extends in an x, y, or z direction to define the boundary of the object. In some embodiments, a bounding volume is stretched in a direction of movement. In some embodiments, the bounding box or volume is behind partial or fully occluding objects.

In some embodiments, a LIDAR sensor and camera are used in combination to detect far or near objects. In embodiments, the camera is aligned such that the FOV of the camera falls within a FOV of the LIDAR sensor. In some embodiments, a center of the camera is aligned with a center of the FOV of the LIDAR sensor. In some embodiments, a most left column of the camera aligns with a particular angle of a radial LIDAR sensor. In some embodiments, sensors are calibrated during manufacturing. In some embodiments, sensors are calibrated at run time. In some embodiments, a calibration monitoring module is provisioned for checking calibration data and providing a message or notification when calibration is lost. In some embodiments, an auto calibration module automatically recalibrates the sensors. In some embodiments, a particular ray of LIDAR illumination falls within a particular column, row, or series of pixels within a frame of the camera. When the particular ray of LIDAR illumination is not detected within the particular column, row, or series of pixels within the frame of the camera, calibration is lost. When illumination is detected elsewhere in the FOV of the camera, a transform function adjusts the discrepancies to recalibrate the sensors. In some embodiments, various sensors are time synchronized.

Calibration may be performed at a time of manufacturing the robot at a factory, dynamically each time the robot starts up to perform work, when the robot starts to perform work, or while the robot is in execution of a working mission using ML and AI procedures. Often, a tracker algorithm, such as Lucas Kanade, keeps track of observations captured within one frame at a first time step $t_0$ to a next frame in a next time step $t_1$. For example, FIG. 294 illustrates an example of tracking observations from one frame to the next. Tracking creates correspondences 19600 between features 19601 observed in frames $X_0$, $X_1$, and $X_2$ captured at different time steps, while features 19601 disappear and reappear and new features appear as the robot moves within the environment.

When tracking with two or more cameras that are fixed on a rigid base and geometrically spaced apart from another, more equations are required and the process of tracking becomes more computationally expensive. One way to solve the equation comprises merging camera readings at each time step and comparing them with the merged camera readings of the next time step when making correspondences between features. For example, FIG. 295 illustrates the three cameras 19700, each with a different FOV capturing a frame of readings 19701, 19702, and 19703 at each time step $t_0$, $t_1$, and $t_2$, respectively. FIG. 296 illustrates the three cameras 19700 and the frame of readings 19702, each captured at $t_0$ by a different camera, merged 19705. The frame of readings 19703, each captured at $t_1$ by a different camera, are merged 19706 and compared with the merged 19705 frame of readings 19702 captured at $t_0$ when making correspondences between features. The frame of readings 19704, each captured at $t_2$ by a different camera, are merged 19807 and compared with the merged 19706 frame of readings 19703 captured at $t_1$ when making correspondences between features. In some embodiments, merging may result in a disparity map or multidimensional spatial image. As a result, a disparity map or spatial image composed in a first time step is compared against a next disparity map or spatial image composed in a next time step. At each merging point, a translation function relates an image captured at a first time step to an image captured at a next time step. As new data is obtained, an extended Kalman filter or any flavor of Kalman filter may be used to iteratively make better sense of the environment. Some embodiments employ an alternative method, wherein an output of all the cameras are captured for a predetermined number of time steps and are solved for a best fit. For example, FIG. 297 illustrates, in step 1, the cameras 19700 capturing the frame of readings 19701, 19702, and 19703 for three time steps, and in step 2, the cameras 19700 capturing the frame of readings 19708, 19709, and 19710 for the next three time steps, and so on. The processor of the robot then solves for a best fit. This resembles a graph representation of localization and mapping.

In some embodiments, a depth is associated with every pixel. For example, FIG. 298 illustrates an image 23400 of an environment and a depth image 23401, wherein darker areas have greater depth values. A depth value from the depth image 23401 is associated with a corresponding pixel from the image 23400, as illustrated in three-dimensions 23402, wherein a depth for objects within the environment is shown. Some embodiments include semantic segmentation, wherein each pixel is labeled with an object to which it belongs. Some embodiments include depth segmentation, wherein each pixel is labeled with a depth of the object to which it is associated. As a result, a set of pixels is labelled with a same depth. For example, FIG. 299 illustrates a set of pixels 23500 associated with a same depth 23501. Assigning a depth to each pixel may be computationally intensive. An alternative comprises grouping pixels with a same depth and occupying nearby spaces in the image and assigning a depth class to the group of pixels. Another alternative comprises assigning a volume bounding box to each neighborhood of pixels and labeling each volume bounding box with a depth value. In some embodiments, the bounding box comprises a 2D box applied to a 2D image. FIG. 300 illustrates bounding boxes 23600 of pixels, each of the bounding boxes (and hence the pixels within the bounding boxes 23600) labelled with a depth, 3 and 4 meters.

Some embodiments comprise any of semantic segmentation, object extraction, object labeling, object depth assignment, bounding box depth assignment, tracking of bounding box, continuous depth calculation of bounding box of an object of interest (e.g., a human, a car, or a bike). In some embodiments, a distance or depth to an observer is associated an object. Other properties that may be associated with the object include dimensions and size of the object; surface characteristics of the object (e.g., level of reflectiveness, color, roundness, smoothness, texture, roughness); corners, edges, lines, or blobs of the object; a direction of movement of the object, including absolute movement and relative movement (e.g., in relation to an observer); a direction of acceleration or deceleration; static or dynamic property of the object; sensors of the robot from which the object is hidden; occlusion, partial occlusion, previous occlusion, or approaching occlusion of the object; and a level of influence of environmental factors on the object (e.g., lighting conditions). Some properties associated with the object depend on other observations. For example, absolute depth in relation to a frame of reference depends on processing/rendering of at least a portion of a map. Additionally, there is partial observability while data is gathered for processing/rendering the map, and while there is observance of some values of properties, a lower confidence level is assigned to those values. Probabilistic values or descriptions of one or more properties associated with an object depends on sample data collected at a current time and up to the current time. In cases wherein partial observable data is used, principals of central limit theorem are used, assuming a mean of a large sample population is normally distributed and approaches a mean of the population and a variance of the sample population approaches a variance of the original population divided by a size of the sample.

In some embodiments, the processor of the robot identifies an object type of an object and adds the object to an object database for use in future classification. FIG. 301A illustrates a robot 25200 capturing an image 25201 using a camera disposed on the robot 25200. The processor searches an existing object database to determine an object type of object 25202 in the image 25201. At a same time, the processor determines whether Wi-Fi signals associated with the object 25202 are detected. If no Wi-Fi signals are detected, the processor adds the object 25202, in this case identified as a plug, to the object database. If Wi-Fi signals are detected, the processor adds the plug 25202 to a smart plug database. In another example illustrated in FIG. 301B, the camera of the robot 25200 captures an image of a door 25203 within the environment. The processor uses a similar process as in FIG. 301A to determine whether the door 25203 is IoT enabled. The processor may further determine a state of the door 25203 (e.g., open, closed, etc.), localize against the door 25203, lock/unlock the door 25203 remotely by the robot or an application paired with the robot, transmit a request for control of the door to the application, and recognize a room boundary based on identifying Wi-Fi signals, the particular door frame, knob, or a surface change.

In some embodiments, the robot captures a video of the environment while navigating around the environment. This may be at a same time of constructing the map of the environment. In embodiments, the camera used to capture the video may be a different or a same camera as the one used for SLAM. In some embodiments, the processor may use object recognition to identify different objects in the stream of images and may label objects and associate locations in the map with the labelled objects. In some embodiments, the processor may label dynamic obstacles, such as humans and pets, in the map. In some embodiments, the dynamic obstacles have a half-life that is determined based on a probability of their presence. In some embodiments, the probability of a location being occupied by a dynamic object and/or static object reduces with time. In some embodiments, the probability of the location being occupied by an object does not reduce with time when they are fortified with new sensor data. In such cases, a location in which a moving person was detected and eventually moved away from reduces to zero. In some embodiments, the processor uses reinforcement learning to learn a speed at which to reduce the probability of the location being occupied by the object. For example, after initialization at a seed value, the processor observes whether the robot collides with vanishing objects and may decrease a speed at which the probability of the location being occupied by the object is reduced if the robot collides with vanished objects. With time and repetition this converges for different settings. Some implementations may use deep/shallow or atomic traditional machine learning or Markov decision process.

In some embodiments, the processor of the robot categorizes objects in the environment as fixed or movable based on the nature of the object (e.g., fridge vs. chair) or based on a persistent observation of the object in multiple maps over some period. In some embodiments, the processor classifies some objects as highly dynamic (e.g., a teddy bear on the floor). For fixed objects, a refresh rate may be low as chances of a position of the fixed objects changing is low but may still occur. For a chair, for example, its position may change slightly, therefore the chair may be localized locally within an area within which the chair is expected to remain.

Some embodiments comprise a plenoptic camera for capturing information relating to light rays in the form of a light field. A vector function of a particular light intensity and an angle of inward light describes the flow of light in various directions from a point at which the plenoptic camera is observing. A 5D plenoptic function may describe the magnitude of each possible light ray (radiance) within a space.

Typically, for an image sensor or camera, light or emissions reflected off objects within a 3D workspace pass through an optical center of the image sensor or camera and are projected onto an imaging plane. The imaging plane comprises electrons that then react to the light. In some embodiments, a near field depth map is generated from an optical encoding transmissive diffraction mask (TDM) on a typical CMOS image sensor for generating 2D images. A clear material forms diffraction grating over a microlens array. The directional information is extracted by the TDM through Fresnel diffraction. In some embodiments, a TDM with vertical and horizontal grating is placed on the CMOS image sensor.

In embodiments, depth information may be extracted by angle detecting pixels or phase detecting auto focus pixels. Microlens arrays may be used in combination or as an alternative. A volume within a depth of field of a camera is where an object within a scene appears in focus. Anything outside of the volume is blurred, wherein an aperture of the camera dictates a form of the blur. In some embodiments, depth from defocus is determined based on a geometry of the aperture and the blur.

In some embodiments, a 3D gridded voxel of surfaces and objects within a space is generated. For an indoor space, a base of the voxel may be bound by a floor surface within the space, sides of the voxel may be bound by walls or structural building elements within the space, and a top of the voxel may be bound by a ceiling surface within the space. An object within the real world is synthesized inside a voxel at a grid point corresponding with a location of the object in the real world.

A voxel may be loaded with predetermined dimensions and trimmed to be bound based on physical boundaries. Alternatively, a voxel may be loaded as a small seed value and extend until boundaries are detected. To save computational cost, unfilled voxel points may be unprocessed and only voxels that have information attached to them may be processed. The resulting sparsity provides computational advantages in comparison to processing blank grid cells. As such, cells that are not inspected may be trimmed out of the voxel. 3D ray casting may be used to generate, expand, or trim a voxel.

In embodiments, images of a stream of images are marked with a pose, orientation, and/or coordinate of the image sensor from which the images were recorded. Such information (e.g., pose, orientation, coordinate, etc.) may be captured using data from the same image sensor. For example, pose, orientation, and/or coordinate of an image sensor may be captured by tracking features in previous images captured by the image sensor, using an image sensor with a laser grid point that shines at intervals, and by tracking currently observed features in images captured by the image sensor and comparing them against a previously generated map. In other cases, pose, orientation, and/or coordinate of the image sensor may be captured using a secondary sensor, such as GPS used in outdoor settings, a LIDAR used in indoor or outdoor settings, and an IMU used in hand held devices or wearables.

Metadata may comprise a time stamp of captured data or sensor readings. Other metadata may comprise location data of objects within an image captured. When an object is identified within the image, the location of the object is within a field of view of an image sensor when positioned at a location from which the image was captured. A location of the object within the image may be determined with respect to a floor plan using a transform that connects a bounding box around the object in the image to the position from which the image was captured. The positioning information of the image sensor may be obtained using a LIDAR, similar methods to location services used on a smartphone, data from GPS, Wi-Fi signatures or SSID (e.g., signal strength), previously created vision maps or LIDAR maps, etc. In embodiments, the coordinate system of the floor plan connects to the coordinate system of the robot which connects to the coordinate system of the image sensor FOV. FIG. 302 illustrates a coordinate system 400 of the floor plan 401, connected to a coordinate system of the robot 402, which is connected to a coordinate system of a FOV 403 of an image sensor 404 disposed on the robot 402. Data captured by LIDAR 405 is used in obtaining positioning information of the robot 402. A location 406 of object 407 in image 408 with respect to the floor plan 401 is determined using a transform connecting a bounding box 409 around the object 407 to a position of the image sensor 404 disposed on the robot 402 at the time the image 408 was captured.

Some embodiments may use at least some of the methods, processes, and/or techniques for determining a distance of an object from the robot or a sensor thereof described in U.S. Non-Provisional patent application Ser. Nos. 17/494,251, 17/670,277, and 17/990,743, and U.S. Non-Provisional patent Ser. Nos. 11/768,504, 10/311,590, 11/037,320, 10/408,604, 9/972,098, 10/346,995, 11/069,082, 10/223,793, 10/845,817, and 10/690,757, each of which is hereby incorporated herein by reference.

A subtle distinction exists between object associated localization and spatial localization, whether traditional, contextual (semantic), or when combined with object recognition. Object associated localization dictates a robot behavior relating to the object and the behaviour is maintained despite the object being moved to different locations within the workplace. For example, object associated localization may be used to cause the robot to remain a particular distance from a cat milk bowl whenever the robot observes the cat milk bowl regardless of a position of the cat milk bowl within the workspace. Object associated localization is distinct and different from annotating coordinates within the workspace corresponding to locations of detected objects and statistically driving the robot to particular coordinates when the robot is asked to navigate to a corresponding object (e.g., fridge).

Figure 303:
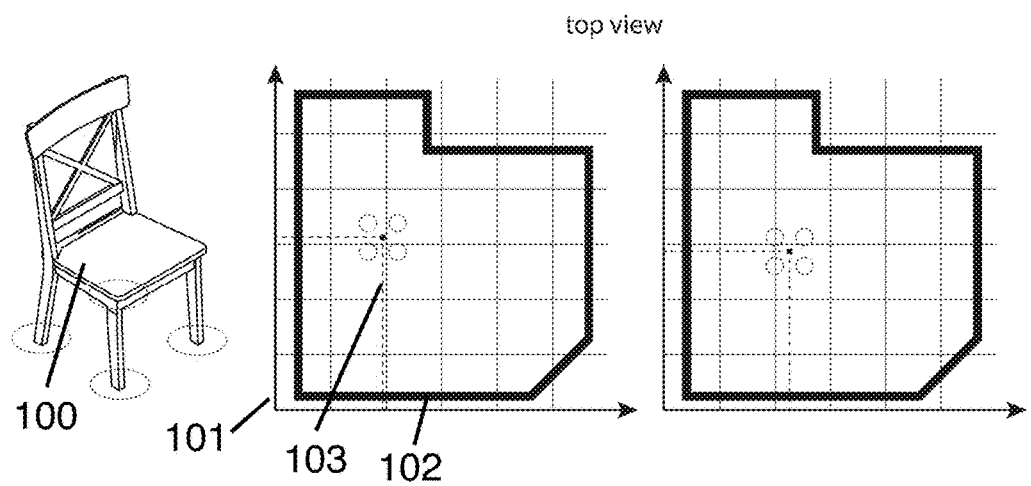
Figure 304:
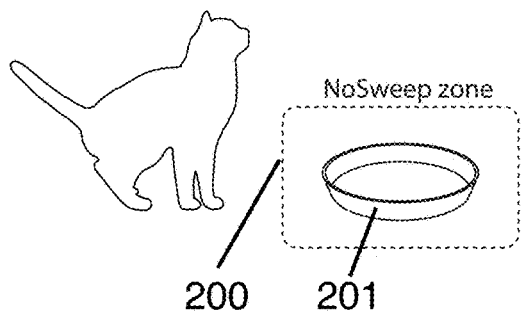
Figure 305:
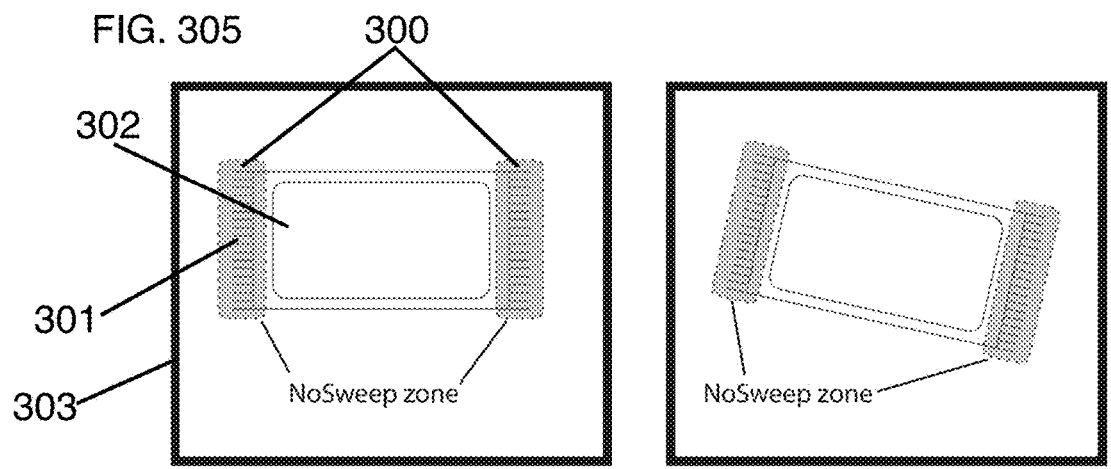

In some embodiments, a behavior or an action of the robot is attached to a coordinate system of an object rather than a coordinate system of the environment of the robot. For example, upon the processor of the robot detecting a chair, the robot is triggered to traverse a particular pattern around the chair. The pattern traversed is in relation to the coordinate system of the chair rather than the coordinate system of the environment as a location of the chair within the environment may change. This ensures the particular pattern traversed around the chair is maintained despite the location of the chair within the environment. FIG. 303 illustrates a chair 100 within a coordinate system 101 of an environment 102. The chair 100 has a coordinate system 103 that is maintained despite its location within the environment 102. FIG. 304 illustrates a no-sweep zone 200 around a kitty bowl 201. The robot is instructed to avoid entering the no-sweep zone 200 upon detecting the kitty bowl 201. A no-sweep zone around the kitty bowl 201 drawn relative to a coordinate system of the environment is not maintained when the kitty bowl 201 is moved. The no-sweep zone 200 is therefore drawn relative to a coordinate system of the kitty bowl 201 such that the no-sweep zone 200 is maintained despite a location of the kitty bowl 201 within the environment. FIG. 305 illustrates another example, wherein no-sweep zones 300 surrounding tassels 301 of rug 302 are drawn relative to a coordinate system of rug 302 such that the no-sweep zones 300 are maintained despite a location of the rug 302 within an environment 303. Another example includes the robot localizing against cables, cords, headphones, etc. as their detection triggers the robot to traverse along a particular pattern or execute a particular behavior, such as avoiding an area surrounding the object. In some embodiments, a no-sweep zone is generated by using an application of a communication device paired with the robot to place virtual objects within a map of the environment, given detection of the virtual object triggers a robot behavior similar to that of a no-sweep zone. For example, a virtual kitty bowl may be placed within the map of the environment at a location of a desired no-sweep zone using the application. The robot remains a distance of 0.5 m from any virtual kitty bowl, thereby creating a similar effect as a no-sweep zone.

Figure 306:
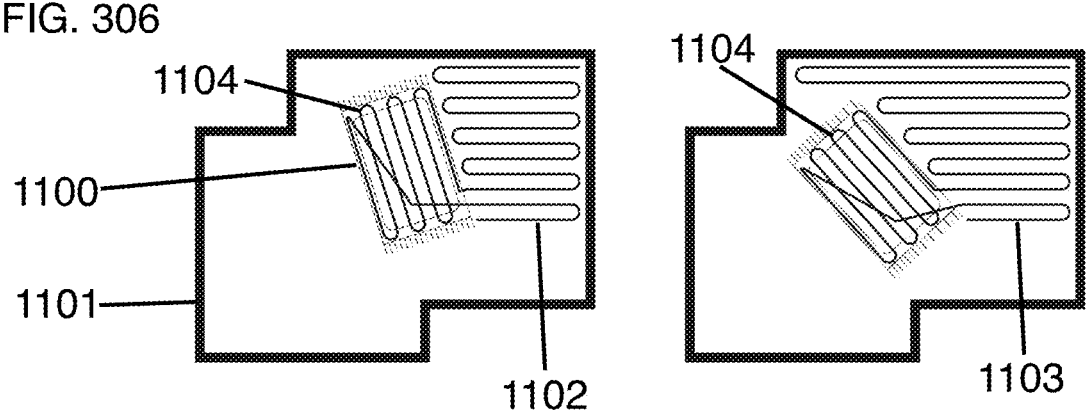

FIG. 306 illustrates an object 1100 identified as a rug within area 1101 during two separate runtimes 1102 and 1103. When the object 1100 is absent, the processor of the robot proceeds to plan a path of the robot according to the boundaries of the area 1101. When the processor of the robot identifies and localizes the object 1100, the processor adjusts a path 1104 of the robot using polymorphic path planning. In both cases 1102 and 1103, the processor cleans the object 1100 as a whole and does not transition on and off of the object 1100 during cleaning. Further, certain robot behaviors or instructions may be attached to the object 1100.

Some embodiments employ semantic object-based localization. For example, FIG. 307 illustrates a rug 23700, around which a no-sweep zone 23701 is established. In A. the no-sweep zone 23701 remains in a same place, despite the rug 23700 being moved. With object-based localization, the rug 23700, is localized such that the no-sweep zone 23701 remains surrounding the rug 23701 despite the position of the rug. In some embodiments, an object is overlaid on a. a top view as a 2D image, a 2D icon, or a 3D construction; b. a 3D reconstruction as a 2D image, a 2D icon, or a 3D construction; and c. an immersive setup as a 2D image, a 2D icon, or a 3D construction. The objects may be presented as an icon, an image, a 3D reconstruction on a grid/floor plan. In some embodiments, the robot generates a time lapse cleaning video and the user may have the option to share the video on social media. Some embodiments employ a polymorphic path planning may be based on object localization, wherein in an absence of an object the processor plans the path of the robot according to the room, and in a presence of the object the object is identified and localized, and the path is planned and adjusted accordingly. For example, FIG. 308 illustrates a path of the robot 23800 with the rug 23801 positioned differently in two scenarios. In each case, the rug 23801 is treated as a singular object and the path of the robot 23802 enters and exits the rug 23801 once. In both cases the robot treats the rug as a whole object and does not go on and off of it. Also, no sweep areas may be attached to object localization. For example, no-sweep for rug tassels changes in each run as the rug's position changes with the frame of reference of the room.

Some embodiments use at least some methods, processes, and/or techniques for object localization described in U.S. Non-Provisional patent application Ser. Nos. 17/494,251, 17/670,277, and 17/990,743, and U.S. Non-Provisional patent Ser. No. 11/768,504, each of which is hereby incorporated herein by reference.

In some embodiments, each data channel is processed for a different clue or feature during image analysis. For example, data output from red, green, and blue (R, G, B) channels are each processed for a specific feature. The green channel is processed for feature 1, wherein feature 1 is detected and tracked from frame to frame using a tracking method, such as Lukas Kanade. In a different channel, such as the red channel, a different feature, feature 2, is dominant and tracked from frame to frame. As such, multiple features are tracked, wherein each channel tracks only one feature. In some embodiments, multiple cameras capture data and corresponding channels are combined based on a geometric association between the cameras defined by a base distance and angle of FOV of the cameras. FIG. 309 illustrates two cameras 15500 positioned a distance from each other. Each camera outputs R, G, and B channels and corresponding channels from each of the cameras 15500 are combined based on a geometric association between the cameras 15500, in this case the distance between the cameras 15500. Each channel tracks a different feature from frame to frame and using a Kalman filter, wherein movement of the tracked features is provided as output. FIG. 310 illustrates the same concept as FIG. 309, however, 2D point cloud data 15501 captured by a 2D LIDAR sensor 15502 is also combined with corresponding R, G, B channels tracking the features based on a geometric association between the cameras 15500 and the LIDAR sensor 15502. FIG. 311 illustrates the same concept as FIG. 309, however, 3D point cloud data 15503 is also combined with corresponding R, G, B tracking the features based on a geometric association between the cameras 15500 and the LIDAR sensor 15504. Different objects or features may naturally be more visible in one channel in comparison to other channels, which may decide the feature tracked by a channel. Alternatively, a feature tracked by a channel is predetermined and preset.

Some embodiments apply segmentation of foreground and background. For example, an image sensor disposed on the robot captures an image of a wall (i.e., a background) and one or more objects such as furniture, socks, a cord, etc. The processor of the robot uses pixel similarities and spatial proximity to separate the image to different segments. Some embodiments partition size of groups with similarity and proximity to cut costs using methods such as K-means clustering, Chan-Vese model energy, wherein a collection of closed curves separates the image into regions, and other clustering methods.

Some embodiments use a graph cut to segment an image. A graph cut splits a directed graph into two or more disconnected graphs. Using a graph cut an image is segmented into two or more regions, wherein similar pixels in close proximity to each other remain in a same segment. In embodiments, cost of a graph cut is determined as a sum of edge weights of the cuts, wherein the cut comprises a subset of all edges. In embodiments, the edges selected are within the cut set such that the sum of the edge weights is minimized. In some embodiments, a source node and sink node (i.e., vertex) are used and only a subset of edges separating the source node and sink node are viable options to form a cut set. Some embodiments employ maximum flow and minimum cut theorem, wherein finding a minimum weight cut is equivalent to finding the maximum flow running between the sink node and the source node. Some embodiments select a sink node such that every pixel node has an outgoing edge to the sink node and select a source node such that every pixel node has an incoming edge from the source node, wherein every pixel node has one incoming edge and one outgoing edge to each of its neighbor pixels. Each pixel connects to the foreground and background (i.e., the source and the sink, respectively), with weights having an equal probability. In some embodiments, pixel similarities are weighted and an algorithm executed by the processor decides a contour of a segment cut. In some embodiments, an online version of a segment cut is combined with a previously trained algorithm. For example, FIG. 312 illustrates an operator 15800 drawing a contour 15801 using an application 15802 of a communication device 15803 during a training session. Alternatively, or in addition, the operator 15800 places an icon 15804 to label an area as background and an icon 15805 to label an area as foreground. Alternatively, or in addition, the operator is presented with a segment cut 15806 and the operator 15800 provides feedback 15807 on the segment cut 15806, as illustrated in FIG. 313, or provides a score reflecting the feedback. Alternatively, or in addition, the segment cut 15806 is presented to the operator 15800 and the operator 15800 provides a correction 15808 to the segment cut 15808, as illustrated in FIG. 314.

Segmentation of foreground and background is easiest when the robot is stationary, however, motion blur occurs as moving objects in the scene cause fluctuating pixel values which influence the spatial and proximity methods described. Some embodiments employ motion compensation using a range of methods, such as phase image differences when the robot moves linearly in relation to the environment or the environment moves linearly in relation to the stationary robot. In cases where the robot moves with constant speed and some objects within the environment move, sensors of the robot observe linear change in relation to the fixed environment but not in relation to the moving objects. Some embodiments employ opposite FOV optical flow analysis to identify and distinguish moving objects from the stationary environment, however, the blur from motion still remains a challenge with the above-described methods. In some embodiments, as a complementary measure, a TOF camera captures distances to objects. Although distance measurements also blur as a result of motion, the additional information contributes to an increasingly crisp separation. In addition, in some embodiments, an illumination light with a modulation frequency emitted and phase shift of the returning signal is measured. When an incoherent IR light is emitted, the frequency is changed at different time stamps and each frequency is compared with the frequency of the respective returned IR light.

While the blur effect worsens at higher robot and/or object speeds, in some embodiments, knowledge of movement of the robot via sensor data helps transpose the pixel values as a function of time, a function of measured motion, or a weighted combination of both functions. In embodiments, a transpose function of raw pixel values of pixels is defined to shift the pixel values linearly and according to a motion model, which is verified with new sensor data input at a next time step. In some embodiments, there is more than one candidate transpose function. In some embodiments, sum of squared differences is used to select the best transpose function from all candidate transpose functions. A transpose function may include a linear component and an angular component. In some embodiments, optical flow is used to estimate the transpose function when the robot is vision-based. During movement, the robot may not end at a location intended by a control system of the robot, however the control commands of the control system may be used to predict a range of possible transpose functions, thereby reducing the search space. In some embodiments, various methods and techniques may be combined, such as multiple phase shift imaging and phase unwrapping methods, or a Fourier transform may be used to model the phase nature of such methods.

Some embodiments use a vector field map generated from associating two consecutive images or a sequence of images describing an evolution of pixels and their relation to displacement, speed, and direction of the robot. FIG. 315 illustrates consecutive images 16100 and 16101, pixels 16102 of the images 16100 and 16101 corresponding to objects at different depths, and vector field map 16103 generated from images 16100 and 16101 from which displacement is determined. Speed is determined based on multiple vector field maps 16104. Some embodiments follow a contour of colors and shapes. Some embodiments separate closed contours from open contours. Some embodiments separate internal contours from external contours. Some embodiments compare a dominance of all closed shapes in terms of vividness, size, and distinct borders, assign a weight to the closed shapes, normalize, and select one closed shape to follow or track. Some embodiments select one or more closed shapes as feasible successors. Some embodiments track feasible successors with lower resolution to reduce computational intensity. For computational purposes, simple geometric shapes may be preferred, such as a square, a blob, a circle, an oval, a rectangle, and a triangle. In some embodiments, a tracking function inspects the contour being followed at intervals to ensure it is not another similar contour belonging to a different object.

Some embodiments use polyadic arrangement of layers, synaptic connection, and homodyne AM modulation. Some embodiments use semantic segmentation, wherein each segment is associated to a specific category of objects. Some embodiments use semantic depth segmentation, wherein each segment is associated to a depth value. Each type of segmentation may be used to enhance the other or used separately for different purposes. Some embodiments use scene segmentation, wherein scene elements are separated from the rest of the image. For example, a grass lawn is separated from the rest of the scene, helping a mowing robot correctly mow the lawn. In another example, a floor of a shopping mall or grocery store is separated to determine presence or absence of an object, person, or a spill. For instance, in a training session, the floor is observed to include particular color characteristics, luminance, and such. When an area of the floor is dirty or has a spill on it during a later session, the floor segmented from a captured image has different pixel values compared to those from images captured during the training session. As such, the processor can infer the area is dirty or a spill occurred. In embodiments, a training session accounts for various lighting conditions within an environment. In some embodiments, a floor is an advantageous color, texture, and material. For example, a factory uses a green floor color as it is advantageous when separating the floor from other objects in the scene.

In the simplest embodiment, a pixel is assigned a probability of belonging to foreground, background, or unclassified. In a more sophisticated embodiment, multiple depth intervals are defined. Each interval is related to the resolution of the distance measurement. The algorithm sweeps through each pixel of the image, determines an associated probability for each pixel, and performs a classification. For better performance and less computational burden, some pixels may be grouped together and analyzed in a batch. In some embodiments, the probability is determined based on at least neighboring pixel values and probabilities and/or distance measurements associated with pixels. In some embodiments, only pixels of importance are examined. For example, pixels subject to motion blur need resolution as to whether they belong to foreground or background. In some embodiments, depth values known for some pixels are extrapolated to other pixels based on color segmentation, contour segmentation, and edge finding. In some embodiments, a depth sensor associates four data elements with each pixel, depth and R, G, B.

As the robot moves, motion blur occurs and the blurry pixels require identification as foreground or background in relation to pixels surrounding them. FIG. 316 illustrates an image with pixel 16200 corresponding to depth of 5 meters and pixels 16201 corresponding to depth of 3 meters. Blurry pixels need to be resolved into one or the other group of pixels. Before or after such resolution occurs, each pixel may have a probabilistic confidence score associated with it. In some embodiments, each pixel is a node in a graph, wherein the edges provide a relation between the connected nodes. In some embodiments, a cost function relates depth values read with color values read. Alternatively, depth values are compared against a combined metric derived from R, G, B, such as grayscale or a more complex metric. Motion blur occurs due to movement of the robot and movement of objects and dynamic obstacles (e.g., people, pets, cars, bikes, etc.). In some embodiments, Gaussian Mixture Model, Bayesian methods, and/or statistical weight assignment, are used in one, two or all four data channels (i.e., depth, R, G, B) for improved segmentation. In some embodiments, an HD map, prior training phase map, and/or a vector field map are created with readings captured during an absence of dynamic obstacles, readings captured with a slow-moving robot, or readings captured with highly accurate sensors. In subsequent work sessions, such as cleaning, inventory, item transportation, etc. work sessions, the processor of the robot uses previously captured readings as a ground truth reference.

Some embodiments use a depth image as a stencil to shape or mold a color image. A depth image may be visualized as a grayscale image, has more clear-cut boundaries, and is unaffected by texture and pattern. Challenges remain in touching objects or depth camouflage. In embodiments, a pixel of a 2D image is associated with R, G, B color values that may be used as an input for various processing algorithms. In embodiments considering depth (d), a six-dimensional data structure is formed, wherein instead of associating R, G, B values to an i, j pixel, R, G, B values are associated with an i, j, and d pixel. When such data is used in creating a map of the environment, an outside frame of reference is used. Therefore, depth is translated into a 3D coordinate system of the environment within which the robot is moving. R, G, B values are associated with the translated depth coordinate in the frame of reference of the environment. This is equivalent to creating a colored map from a colored point cloud. FIG. 317 illustrates an image 16300 captured within an environment of the robot 16301. A pixel 16302 within the image is at a depth d in a frame of reference of the depth sensor. A processor of the robot translates the depth d into a global frame of reference 16303 of the environment and associates the translated depth d with R, G, B values of the pixel 16302.

Clustering may be performed on a pixel for depth, color, or grayscale. Examples of clustering methods include K-means, mean-shift, and spectral clustering. Derivatives and gradient, intensity, and amplitude of depth measurement may be used in understanding how objects in a scene are related or unrelated. For example, FIG. 318 illustrates a sensor 16400 of the robot 16401 capturing point cloud data 16402. The point cloud of object 16403 is analyzed to determine the object 16403 is curved. At any point on the surface, gradient of depth is normal to the surface which may be used in distinguishing the object 16403 from others in the environment. In some embodiments, features are extracted using SIFT, HOG, CANNY, etc. methods and are crafted manually. In some embodiments, a raw image is provided as input to a deep network for pre-processing before classification of pixels. Classification methods such as Randomized Decision Forest, SVM, Conditional Random Field, etc. may be used to categorize pixels into depth categories/depth segmentations, wherein there is a depth value for each pixel and/or an object label for each pixel. In addition to pixels having depth and object labels, other labels, such as dynamic or stationary labels, approaching or moving away labels, speed of approach labels, direction of approach labels may be defined.

Different user interfaces may be used to provide input to the application designating the maximum height for floor transitions. In some embodiments, the maximum height is provided to the application as text using a number with a unit length of mm, cm, inches, etc. In some embodiments, the maximum height is provided to the application using a slider or a dial. In some embodiments, the application displays possible options from which the user chooses.

In some embodiments, the processor of the robot learns to distinguish between floor transitions and obstacles using a neural network and AI. In some embodiments, additional data is used to help recognize obstacles and floor transitions. In addition to the vertical shift of the line in captured images, a width of a detected distortion of the line in the captured images is further indicative of an obstacle or a floor transition. For example, in a case where a vertical shift of 20 mm is indicative of both an obstacle (such as a book on the floor) and a floor transition (such as a door threshold), a width of distortion of the line in the captured images is used to determine whether an obstacle or a floor transition is encountered as line distortion of a door threshold is significantly wider than line distortion of a book. Another helpful indicator for distinguishing an obstacle from a floor transition is an alignment of detected distortion in comparison to a global map. For example, a floor transition, such as a door threshold, is usually aligned with adjacent walls while an obstacle is not always aligned with permanent structural elements. A location of detected distortion is another helpful indicator for distinguishing an obstacle from a floor transition. For example, it is unlikely for a book to be positioned at a doorway while a door threshold is always positioned at a doorway (i.e., a detected opening between two rooms). A probability of the encounter being a floor transition in comparison to an obstacle increases, solely based on the location of the encounter. FIG. 319 illustrates using a location and an alignment of a detected obstacle for determining whether the detected obstacle is a floor transition. In scenario A. the obstacle 14400 is aligned with major walls 14401 of the map 14402, as such there is a chance the obstacle 14400 is part of the permanent structures of the environment. In scenario B. the obstacle 14403 is aligned and co-linear with walls 14404, as such there is a high chance the detected obstacle 14403 is a door threshold. In scenario C. the detected obstacle 14405 is not aligned with any walls 14406 of the map 14407, as such the probability of the obstacle 14405 being part of the permanent structures of the environment is much lower. In scenario D. the obstacle 14408 is aligned and co-linear with walls 14409, therefore, based on the location of the detected obstacle 14408 there is a high chance of the obstacle 14408 being a door threshold. Although it is not aligned with main walls 14410, the obstacle 14408 is aligned with walls 14409. In some embodiments, a user uses the application to choose whether an encounter is an obstacle or floor transition, particularly in cases where the processor is unsure. A camera disposed on the robot captures an image of the obstacle or the floor transition, the application displays the image to the user, and the user provides input to the application indicating an obstacle or a floor transition. FIG. 320 illustrates an image sensor of a robot 14500 capturing and transmitting an image 14501 of an obstacle 14502. Given that a processor of the robot 14500 is confused and is unsure if the obstacle 14502 is an obstacle or a floor transition, the image 14501 is transmitted and displayed by an application 14503 of a communication device 14504 paired with the robot 14500. A user uses the application 14503 to indicate whether the captured image includes an obstacle by selecting yes or no. The response is transmitted to the robot such that the processor may react appropriately to the obstacle 14502. In some embodiments, such user input is provided to the neural network to further learn differences between obstacles and floor transitions. In some embodiments, the captured image of the obstacle or floor transition is transmitted to the cloud for further processing to determine whether an obstacle or floor transition is encountered or an object type of the obstacle, such that the processor may decide a next move of the robot accordingly. FIG. 321 illustrates an image sensor of a robot 14600 capturing and transmitting an image 14601 of an obstacle 14602. Given that a processor of the robot 14600 is confused and is unsure if the obstacle 14602 is an obstacle or a floor transition, the image 14601 is transmitted to the cloud 14603 for further processing. The cloud determines the obstacle in the captured image is an obstacle with an object type of a book. The response is transmitted to the robot such that the processor may react appropriately to the obstacle 14602 and/or object type of the obstacle 14602.

Some robots are equipped with floor sensors for recognizing floor types and floor characteristics. For example, the processor of the robot uses sensor data of the floor sensors to determine if the floor is reflective, such as highly reflective stone, ceramic, and epoxy floor types or vinyl and concrete floor types coated with a reflective coating. In some embodiments, the processor uses changes in floor reflectivity to make inferences. For example, a higher than normal reflectivity of a floor indicates liquid on the floor (e.g., a spill) or a lower than normal reflectivity of a floor indicates an accumulation of dust, dirt and debris on the floor. Other indicators such as a difference in color of a floor, a speed of the wheels of the robot for a particular amount of power, and a specific detected shape of a spot on a floor (e.g., a shoe print) are indicators of a slippery or sticky floor. Recognizing floor types and changes in certain characteristics help the robot perform better. For example, upon detecting sticky areas of a floor or dirt accumulation in certain areas of the floor within a supermarket, a cleaning robot responds by cleaning the areas of the floor that are sticky or dirty more thoroughly and/or pays immediate attention to those areas before dirt spreads.

Some embodiments implement spatial awareness and use of spatial awareness to enhance the driving experience of the robot. For example, a drive surface texture is an important factor in the processor of the robot formulating decisions. In some embodiments, the processor of the robot uses secondary information and sensor data to deduce conclusions and mimic the human operated controls used on different driving surface textures. Some embodiments use a Bayesian network to help in reaching a conclusion (e.g., on the driving surface type) based on signatures of various motor behaviors under different conditions. Strict signal conditioning is required for such inferred information to be reliable enough to use in formulating decisions. For example, an indoor cleaning robot determines which cleaning tools to operate based on the driving surface type, wherein a vacuum is operated on carpet and a wet mop is operated on hardwood or tile.

Some embodiments use at least some methods, processes, and/or techniques for image analysis described in U.S. Non-Provisional patent application Ser. Nos. 17/494,251, 17/670,277, and 17/990,743, and U.S. Non-Provisional patent Ser. No. 11/768,504, each of which is hereby incorporated herein by reference.

In some embodiments, granularization data is used to deduce conclusions on detection of a stall condition of various actuators. In some embodiments, special conditions are detected based on feedback from actuators, which is distinct and different from gathered sensor information. Feedback from actuators and gathered sensor data may be fused together with a Bayesian network. In some embodiments, an impeller motor speed is adjusted based on environmental conditions, such as floor type, a motor jam, a wheel jam, or a stuck state. Some embodiments adjust motor voltages at runtime based on actual battery voltages of the robot in combination with basic fixed pulse width modulation (PWM) frequency. In prior art, electrical current draws are used in formulating conclusions, wherein current drawn by a wheel motor spikes when the robot is operating on a high friction surface. However, electrical current draws provide less reliability as spikes are short lived, inconsistent, show variations, and are not easily detectable with an umbrella one-fits-all strategy. For example, electrical current drawn varies for different types of motors, driving surfaces, etc. and has a different spike duration for different conditions. As such, the wave forms of current exhibited do not generalize well with basic algorithms. In some embodiments, signal signatures are determined during a development phase and used in operation of the robot. Some embodiments use accurate signal conditioning and statistical methods to interpret the minuet behaviors. In some embodiments, a previously extracted baseline of a signal signature is used as a seed value during operation of the robot and is refined in the real time using machine learning. First order and second order derivative data may be used to mark the beginning of a rate change in a signal, after which the incoming data may be examined and compared with the baseline signal signature. Signal signature information may be combined with explicitly sensed data, such as light, sound, and sonar reflections and degree of scatter off of the floor. Baselines and signatures may be established for various types of sensed data. The various types of data may be used independently or in combination within one another, wherein the number of types of data used depends on how mission critical the robot is. The sensor data may be used in other contexts as well, wherein detection of data deviations may indicate a jammed state of a wheel motor or a brush motor, a floor type, and other environmental characteristics of the robot. In another example, the sensor data is used to adjust brush motor voltages at runtime based on actual battery voltages of the robot, rather than using fixed PWM frequency.

In some embodiments, the robot executes an obstacle avoidance routine. FIG. 322 illustrates a flow chart of an obstacle avoidance behavior of the robot. Both manual settings and machine learned setting relating to obstacle avoidance are considered in obstacle avoidance. Additionally, avoidance of an obstacle encountered by the robot depends on various factors, such as the size of the obstacle, when the obstacle was detected (i.e., how close the obstacle is to the robot), and how much distance must be maintained between the robot and the obstacle. Based on obstacle avoidance settings and the above-described factors, the robot executes an obstacle avoidance routine comprising at least one of executing a U-turn and returning to a previous location; stopping and waiting for the obstacle to clear; and maneuvering around the obstacle.

Traditionally, robots may initially execute a 360 degrees rotation and a wall follow during a first run or subsequent runs prior to performing work to build a map of the environment. However, some embodiments of the robot described herein begin performing work immediately during the first run and subsequent runs. FIGS. 323A and 323B illustrate traditional methods used in prior art, wherein the robot 24200 executes a 360 degrees rotation and a wall follow prior to performing work in a boustrophedon pattern, the entire path plan indicated by 24201. FIGS. 323C and 323D illustrate methods used by the robot described herein, wherein the robot 24200 immediately begins performing work by navigating along path 24202 without an initial 360 degrees rotation or wall follow.

In some embodiments, the robot executes a wall follow. However, the wall follow differs from traditional wall follow methods. In some embodiments, the robot may enter a patrol mode during an initial run and the processor of the robot may build a spatial representation of the environment while visiting perimeters. In traditional methods, the robot executes a wall follow by detecting the wall and maintaining a predetermined distance from a wall using a reactive approach that requires continuous sensor data monitoring for detection of the wall and maintaining a particular distance from the wall. In the wall follow method described herein, the robot follows along perimeters in the spatial representation created by the processor of the robot by only using the spatial representation to navigate the path along the perimeters (i.e., without using sensors). This approach reduces the length of the path, and hence the time required to map the environment. For example, FIG. 324A illustrates a spatial representation 24300 of an environment built by the processor of the robot during patrol mode. FIG. 324B illustrates a wall follow path 24301 of the robot generated by the processor based on the perimeters in the spatial representation 24300. FIG. 325A illustrates an example of a complex environment including obstacles 24400. FIG. 325B illustrates a map of the environment created with less than 15% coverage of the environment when using the techniques described herein.

Figure 327C:
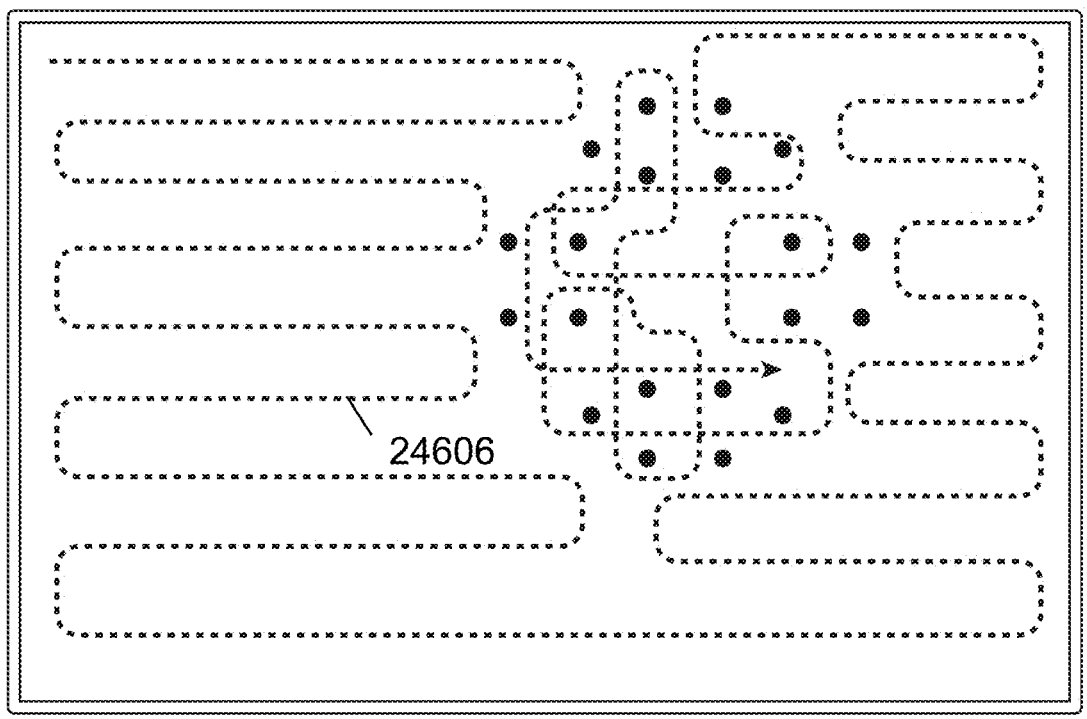
Figure 327D:
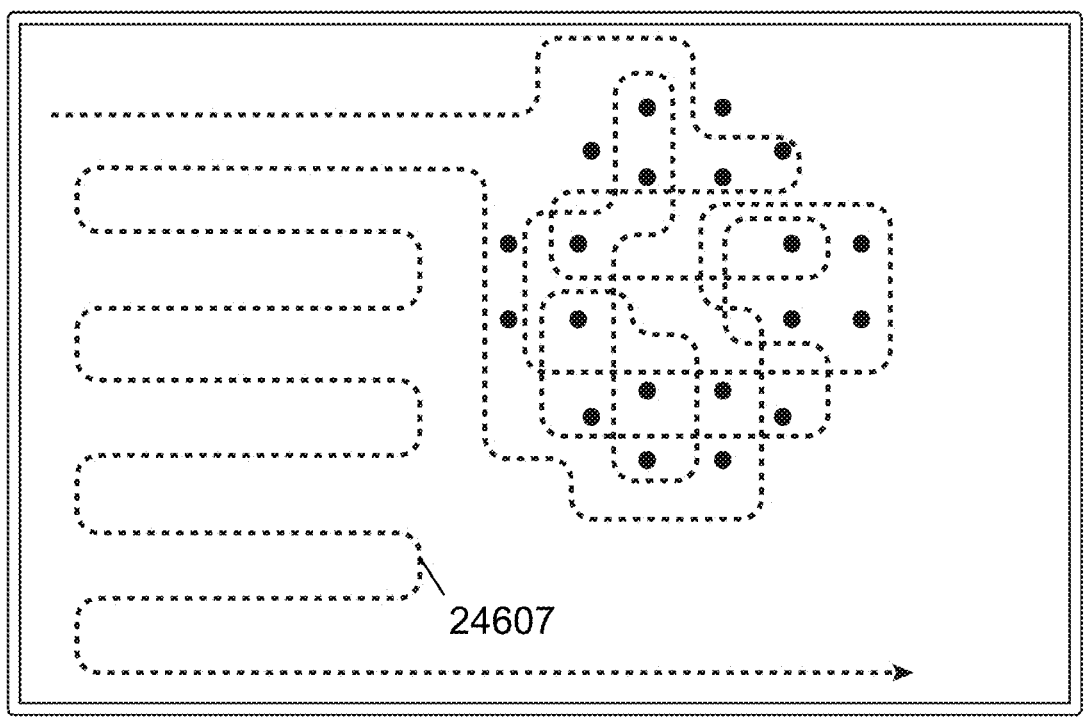
Figure 327E:
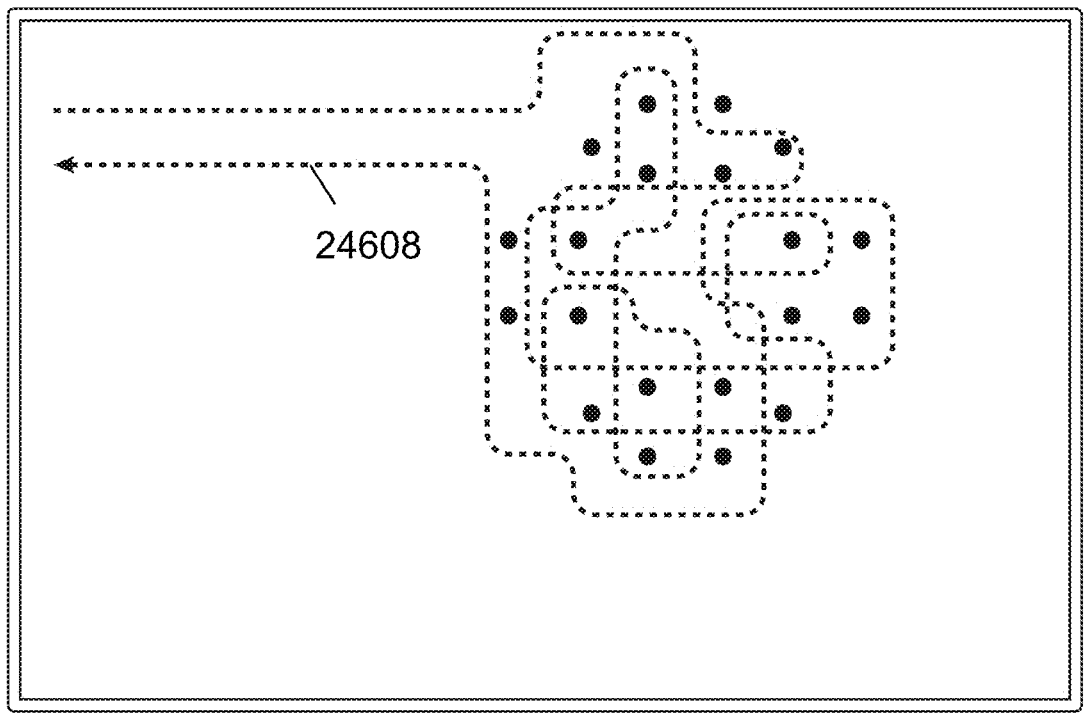
Figure 327F:
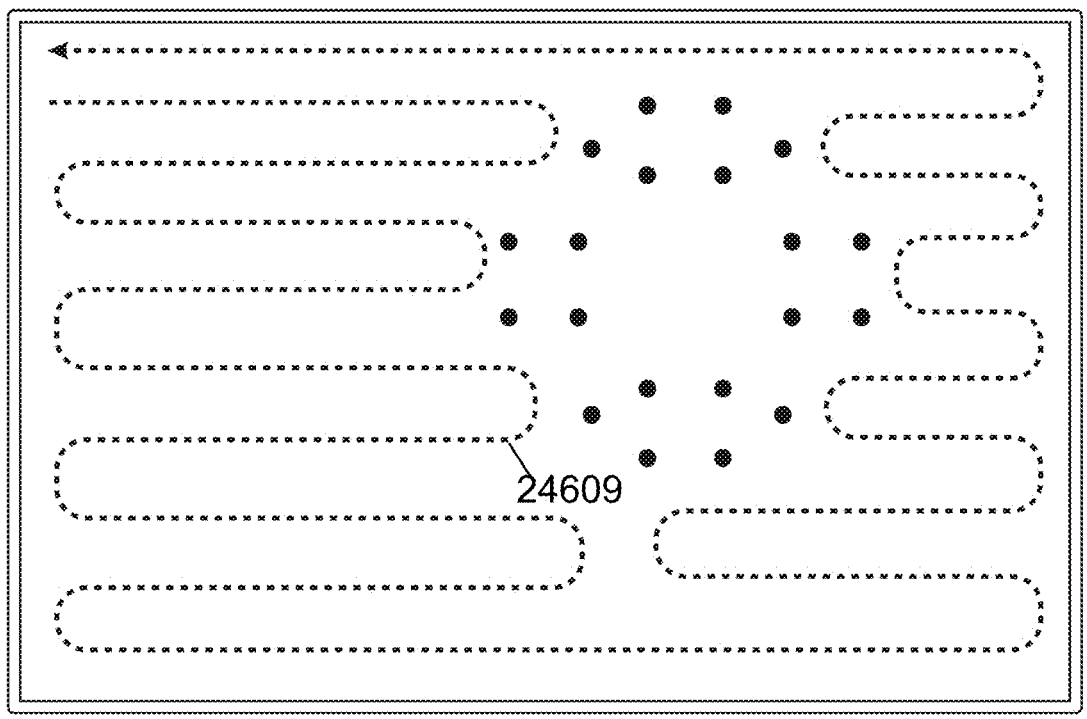

In some embodiments, the robot may initially enter a patrol mode wherein the robot observes the environment and generates a spatial representation of the environment. In some embodiments, the processor of the robot may use a cost function to minimize the length of the path of the robot required to generate the complete spatial representation of the environment. FIG. 326A illustrates an example of a path 24500 of a robot using traditional methods to create a spatial representation of the environment 24501. FIG. 326B illustrates an example of a path 24502 of the robot using a cost function to minimize the length of the path of the robot required to generate the complete spatial representation. The path 24502 is much shorter in length than the path 24500 generated using traditional path planning methods described in prior art. In some cases, path planning methods described in prior art cover open areas and high obstacle density areas simultaneously without distinguishing the two. However, this may result in inefficient coverage as different tactics may be required for covering open areas and high obstacle density areas and the robot may become stuck in the high obstacle density areas, leaving other parts of the environment uncovered. For example, FIG. 327A illustrates an example of an environment including a table 24600 with table legs 24601, four chairs 24602 with chair legs 24603, and a path 24604 generated using traditional path planning methods, wherein the arrowhead indicates a current or end location of the path. The path 24604 covers open areas and high obstacle density areas at the same time. This may result with a large portion of the open areas of the environment uncovered by the time the battery of the robot depletes as covering high obstacle density areas can be time consuming due to all the maneuvers required to move around the obstacles or the robot may become stuck in the high obstacle density areas. In some embodiments, the processor of the robot described herein may identify high obstacle density areas. FIG. 327B illustrates an example of a high obstacle density area 24605 identified by the processor of the robot. In some embodiments, the robot may cover open or low obstacle density areas first then cover high obstacle density areas or vice versa. FIG. 327C illustrates an example of a path 24606 of the robot that covers open or low obstacle density areas first then high obstacle density areas. FIG. 327D illustrates an example of a path 24607 of the robot that covers high obstacle density areas first then open or low obstacle density areas. In some embodiments, the robot may only cover high obstacle density areas. FIG. 327E illustrates an example of a path 24608 of the robot that only covers high obstacle density areas. In some embodiments, the robot may only cover open or low obstacle density areas. FIG. 327F illustrates an example of a path 24609 of the robot that only covers open or low obstacle density areas. FIG. 328A illustrates another example wherein the robot covers the majority of areas 24700 initially, particularly open or low obstacle density areas, leaving high obstacle density areas 24701 uncovered. In FIG. 328B, the robot then executes a wall follow to cover all edges 24702. In FIG. 328C, the robot finally covers high obstacle density areas 24701 (e.g., under tables and chairs). During initial coverage of open or low obstacle density areas, the robot avoids map fences (e.g., fences fencing in high obstacle density areas) but wall follows their perimeter. For example, FIG. 328D illustrates an example of a map including map fences 24703 and a path 24704 of the robot that avoids entering map fences 24703 but wall follows the perimeters of map fences 24703.

In some embodiments, the processor of the robot recognizes rooms and separates them by different colors that may be seen on an application of a communication device, as illustrated in FIG. 329. In some embodiments, the robot cleans an entire room before moving onto a next room. In some embodiments, the robot may use different cleaning strategies depending on the particular area being cleaned. FIG. 330 illustrates a map 25000 including obstacles 25001. The robot may use different strategies based on each zone. For example, a robot vacuum may clean differently in each room. FIG. 330B illustrates different shades in different areas of the map 25000, representing different cleaning strategies. The processor of the robot may load different cleaning strategies depending on the room, zone, floor type, etc. Examples of cleaning strategies may include, for example, mopping for the kitchen, steam cleaning for the toilet, UV sterilization for the baby room, robust coverage under chairs and tables, and regular cleaning for the rest of the house. In UV mode, the robot may drive slowly and may spend 30 minutes covering each square foot.

In some embodiments, the robot may adjust settings or skip an area upon sensing the presence of people. The processor of the robot may sense the presence of people in the room and adjust its performance accordingly. In one example, the processor may reduce its noise level or presence around people. This is illustrated in FIGS. 331A and 331B. In FIG. 331A a noise level 25100 of the robot 25101 is high as no people are observed. When the processor of the robot 25101 observes people 25102 in the room it reduces its noise level to 25103. In FIG. 331B, the robot 25101 cleans an area as no people are observed. However, upon observing people 25102, the processor of the robot 25101 reschedules its cleaning time in the room.

In some embodiments, the user may choose an order of coverage of rooms using the application or by voice command. In some embodiments, the processor may determine which areas to clean or a cleaning path of the robot based on an amount of currently and/or historically sensed dust and debris. For example, FIG. 332A illustrates a path 25500 of the robot, debris 25501 and a distance w between parallel coverage lines of the path 25500. Upon sensing debris 25501 in real time, the processor of the robot adjusts its path 25500 such that the distance between parallel lines of the path 25500 are reduced to w/2, thereby resulting in an increased overlap in coverage by the robot in the area in which debris is sensed. FIG. 332B illustrates a similar example, wherein the processor adjusts the path of the robot for increased coverage in the area in which debris 25501 is sensed by reducing distance between parallel lines to w/2. The processor continues the previously planned path 25500 with distance w in between parallel lines upon detecting a decrease in debris 25500 at location 25502. In FIG. 332C, a similar adjustment to the path 25500 is illustrated, however, the amount of overlap in coverage is increased further to w/4 as the amount of debris sensed is increased. In some embodiments, the processor determines an amount of overlap in coverage based on an amount of debris accumulation sensed.

In some embodiments, the boustrophedon coverage is independent of obstacle coverage. This is shown in FIG.

Figure 334:
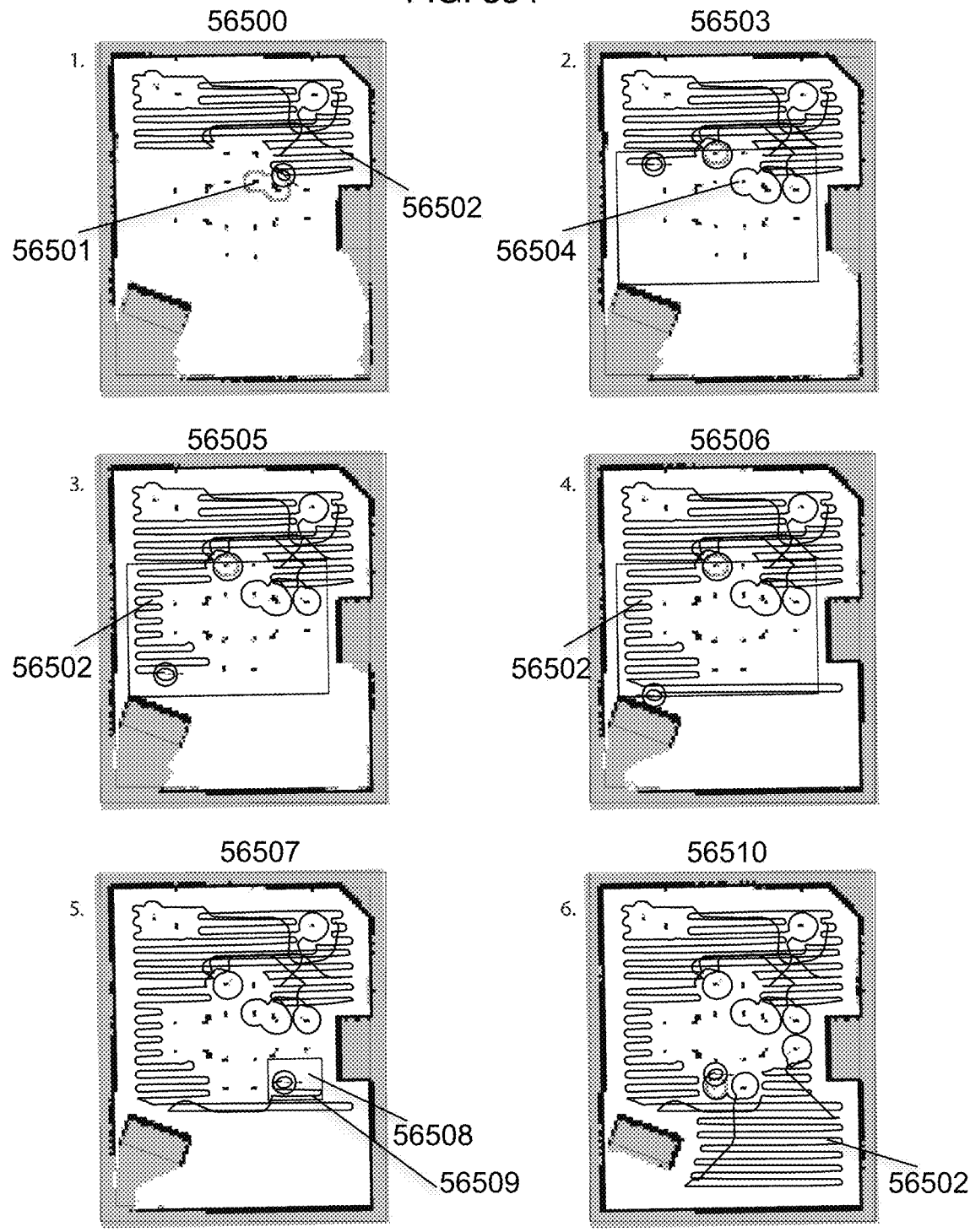
Figure 335:
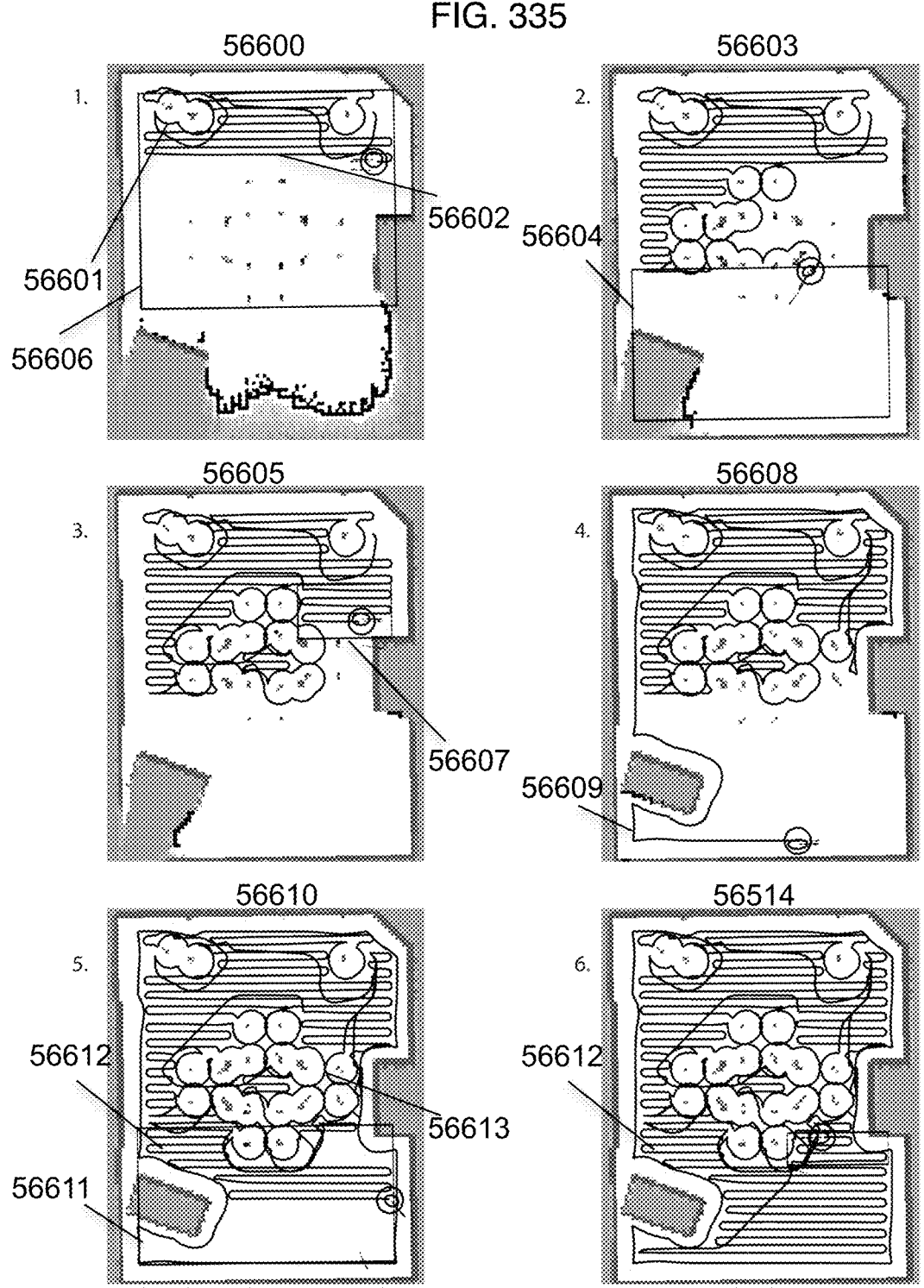

333A, wherein boustrophedon coverage 56400 is independent of obstacle coverage 56401. In some embodiments, the boustrophedon coverage and obstacle coverage occur concurrently. This is shown in FIGS. 333B and 333C, wherein obstacle 56402 are covered during boustrophedon coverage 56403. For example, FIG. 334 illustrates an embodiment of coverage by a robot. In instance 56500, obstacle coverage of obstacles 56501 is independent of boustrophedon coverage 56502. In the instance 56503, boustrophedon coverage starts with coverage of some previously independently covered obstacles 56504. In the instance 56505, boustrophedon coverage 56502 continues, wherein interior obstacles 56501 are avoided and their coverage postponed. In the instance 56506, the boustrophedon coverage 56502 is complete. In the instance 56507, boustrophedon coverage of a sub-area 56508 skipped in the previous pass is resumed as a separate boustrophedon coverage task 56509. In the instance 56510, some obstacle coverage (i.e., obstacle wall following coverage) postponed during the boustrophedon task is resumed as a separate task. FIG. 335 illustrates another example of coverage by a robot. In the instance 56600, obstacle coverage 56601 is included in boustrophedon coverage 56602. In the instance 56603, the system of the robot considers a new boustrophedon box 56604 within which boustrophedon coverage is planned and executed. In the instance 56605, the system of the robot continues obstacle coverage in the first boustrophedon box 56606 and then generates another smaller boustrophedon box 56607 for the remaining area within the first boustrophedon box 56606. In the instance 56608, the robot executes wall follow coverage 56609 before defining another boustrophedon box. In the instance 56610, another boustrophedon box 56611 is created within which boustrophedon coverage 56612 and obstacle coverage 56613 are planned and executed. In the instance 56614, the boustrophedon coverage 56612 is complete.

In some embodiments, the processor of the robot may determine a next coverage area. In some embodiments, the processor may determine the next coverage based on alignment with one or more walls of a room such that the parallel lines of a boustrophedon path of the robot are aligned with the length of the room, resulting in long parallel lines and a minimum number of turns. In some embodiments, the size and location of a coverage area may change as the next area to be covered is chosen. In some embodiments, the processor may avoid coverage in unknown spaces until they have been mapped and explored. In some embodiments, the robot may alternate between exploration and coverage. In some embodiments, the processor of the robot may first build a global map of a first area (e.g., a bedroom) and cover that first area before moving to a next area to map and cover. In some embodiments, a user may use an application of a communication device paired with the robot to view a next zone for coverage or the path of the robot.

The processor of the robot may load different cleaning strategies depending on the room, zone, floor type, etc. Examples of cleaning strategies may include, for example, mopping for the kitchen, steam cleaning for the toilet, UV sterilization for the baby room, robust coverage under chairs and tables, and regular cleaning for the rest of the house. In UV mode, the robot may drive slowly and may spend 30 minutes covering each square foot. In some embodiments, the robot may adjust settings or skip an area upon sensing the presence of people. The processor of the robot may sense the presence of people in the room and adjust its performance accordingly. In one example, the processor may reduce its noise level or presence around people. In some embodiments, the user may choose an order of coverage of rooms using the application or by voice command. In some embodiments, the processor may determine which areas to clean or a cleaning path of the robot based on an amount of currently and/or historically sensed dust and debris. In some embodiments, the processor or the user determines an amount of overlap in coverage based on an amount of debris accumulation sensed.

In some embodiments, the robot performs robust coverage in high object density areas, such as under a table as the chair legs and table legs create a high object density area. In some embodiments, the robot may cover all open and low object density areas first and then cover high object density areas at the end of a work session. In some embodiments, the robot circles around a high object density area and covers the area at the end of a work session. In some embodiments, the processor of the robot identifies a high object density area, particularly an area including chair legs and/or table legs. In some embodiments, the robot cleans the high object density area after a meal. In some embodiments, the robot skips coverage of the high object density area unless a meal occurs. In some embodiments, a user sets a coverage schedule for high object density areas and/or open or low object density areas using the application of the communication device paired with the robot. For example, the user uses the application to schedule coverage of a high object density area on Fridays at 7:00 PM. In some embodiments, different high object density areas have different schedules. For instance, a first high object density area in which a kitchen table and chairs used on a daily basis are disposed and a second high object density area in which a formal dining table and chairs used on a bi-weekly basis are disposed have different cleaning schedules. The user may schedule daily cleaning of the first high object density area at the end of the day at 8:00 PM and bi-weekly cleaning of the second high object density area.

In some applications, the robot performs a task of coverage that reaches all areas of the working environment, wherein perimeter points are covered without bumps. Traditionally, this is achieved via coastal navigation techniques. Coastal navigation is inspired from imagining a blindfolded human walking along a coast by feeling whether water is felt at their feet at each step. When water is felt, the human slightly moves away from the water and vice-versa. The human plans their trajectory such that a balance of both water and dry sand is felt within a time window. Similarly, a near field IR sensor may help the robot feel an existence or absence of a wall. A real-time point swarm (i.e., cloud) perimeter alignment, as opposed to near field IR sensor coastal navigation, may add to capabilities of IR or be implemented on its own. Coastal navigation methods are prone to failure as their planning depends on a sensing that is only reliable when the robot is near a wall. A point swarm sensing has information about a wall long before approaching the wall and therefore devising a better plan with a longer visibility horizon is possible. In coastal navigation methods, particularly for a first map build, the robot must visit perimeter points first and then cover inner areas. In some costal navigation methods, the robot finds a first wall, drives along the first wall, finds a second wall, and drives along the second wall, etc. and eventually closes a rectangular shape that exists within the walls sensed. In some other coastal navigation methods, especially for a coverage robot, the robot does not explicitly follow a wall but discovers the wall when the robot hits the wall (e.g., with a bumper, a tactile sensor, a fork IR bump sensor, etc.) or when the senses the wall (e.g., with an IR sensor or a near field line laser combined with camera in a structured light depth sensing apparatus, or any other kind of near field sensor). After combining wall points sensed (with or without physical contact), the coastal points (i.e., the wall) are discovered. Both of these methods of coastal coverage may be justified for a coverage robot as the coverage robot is expected to visit all points on a surface. In one case, the robot may start with the walls, and in another case, the robot has sufficient time to go back and forth enough number of times to distinguish enough number of coastal points to form the walls. The coastal navigation methods rely on establishing ground truth points by touching, reaching, and/or sensing the walls and does not work well when the task is a patrol mission or point to point travel. For example, when a robot is given the task of going from point 1 to point 2, it would be awkward for the robot to visit the perimeter points before driving to point 2 as the robot is expected to immediately drive to point 2 without the need for establishing ground truth.

Some embodiments employ polymorphic characteristic, wherein the path of the robot is adjusted in real-time based on the observed environment. That is extended by requiring a polymorphic behavior and real-time response time with yet another set of constraints, partial observability, minimized time to cover, and performing all of the listed intuitively. For instance, in prior art or current products on the market, the robot may be observed to abort cleaning a subarea to prefer a portion of a different subarea and then return to the first subarea. In prior art, a selected area is defined by a small number of cells and these small areas are created within another room as a result of adaptive map updates. This disclosure proposes dynamic consolidation of subareas and splitting of areas where it makes sense. For example, if an area or a combination of areas fit within certain criteria, such as the areas all being too small, then the areas are merged and are treated as one. In some circumstances, an area should be split. For example, if the room is of a certain size (e.g., too large) or certain shape (e.g., L shape), the room is split into two or more areas, each of which is treated in order, wherein one area is completed before entering another area. When the robot moves from one subarea to the next, it is desirable that the coverage path is devised such that an end point in one rectangular subarea falls at a beginning point of the next rectangular subarea. In prior art, coverage efficiency is impacted by the robot overdriving during initial exploration of a room. Exploration drives the robot astray from where the robot needs to be for the next subarea, requiring the robot to come to the next subarea. The more unnecessary navigation, the more risk for hitting obstacles or hidden obstacles. This disclosure limits exploration within a boundary that is within where the robot is intuitively expected to perform work. Explicit frontier exploration is prohibited and favors a logic wherein frontiers are explored as a side effect of covered areas being extended. This means exploitation is favored and exploration takes place as a side effect or the robot visits further areas already explored. Only if necessary a frontier exploration is conducted. Also, instead of choosing which zone to cover next at random, a method for choosing an order of zone coverage improves coverage efficiency. In some embodiments, the method comprises choosing a next zone based on diagonal distance between zone centroids, the closest zone being chosen next. In some embodiments, the algorithm chooses the closest plannable area within planning distance. In the prior art, the robot sometimes becomes trapped by hidden obstacles and the algorithm is unable to find a path to the coverage area. This causes a problem, as the algorithm tries to navigate it falls into loop planning. Theoretically, the algorithm exits the loop eventually as it reduces the coverage area size by a few cells during each planning attempt, however, when the area is large this takes a long time. This disclosure adds aborting attempts to plan for an unplannable task and actuates the robot to complete its other remaining tasks. If there are no navigable tasks, the robot fails with a notification passed to a paired mobile application to notify its user. This disclosure blends boustrophedon and wall-follow while keeping their autonomy as fully separate states. In some embodiments, a wall-following and boustrophedon work in tandem, wherein wall-following tasks are scheduled within the boustrophedon coverage rectangle. During boustrophedon coverage, if there is a start point from a wall-follow task in the immediate path of the robot, the robot transitions to that wall-follow task at the end of the current boustrophedon line. In some embodiments, the path planning algorithm includes a heat map showing areas covered and a time tracker for coverage, wall-follow, and navigation.

This disclosure introduces radially outward coverage without the need for periodic loop closure, wherein the map expands gradually and radially outward, and because the coverage method does not follow a rigid structure, the coverage method is dynamic in nature and readily adapts with the position of objects changing or new objects introduced and also deals with the issue of partial observability. In some embodiments, the robot successfully initiates and operates a task of coverage in a continuous state of partial observability, wherein the robot starts working without having steps in the beginning to determine the special structure of the environment. Getting to know the environment happens in the background and is seamless, occurring while the robot performs its actual task with the little information available by the time the robot gets to a starting place of the task. When a full map is not built yet, it is challenging to use the partial information due to the partial observability, in many circumstances, not coinciding with the assumed case. To better explain the issue, consider one driving in extreme fog. A part of area near the car is visible but making a decision based on that area is much more difficult in comparison to when the road is visible on a sunny day. With radially outward mapping, the robot uses the available partial information to make path planning decisions and more areas become observable as the area is expanded due to the radial outward path. In some embodiments, the robot does not have a full map until near the end of the work session, wherein the last parts of the area are discovered. Another requirement requires the path planning to lead to more or faster discovery of unknown areas without having all the information. In some embodiments, the path planning algorithm continuously exports and imports a full robot pose into a buffer bucket of memory which holds the partial and temporary map; plans a path based on areas that are confidently distinguished as traversable; iterates in updating the bucket with new point swarm data, areas covered and areas not covered; and creates a cost function to minimize redundancy to create an optimal path at all times. The same method may be used to store the latest state of the map and coverage, however, instead of using RAM, a kind of non-volatile memory or the cloud is used for exporting to and restoring the data when needed. This includes known areas of the map, ray traced areas, covered areas, and uncovered areas. Old data is continuously cleaned and memory spaces are managed very carefully to keep the operation from growing outside the computational resources that are available. Some embodiments implement a method using a flag, wherein a platform of the robot indicates to the algorithm that the robot wants to resume a previous run, restore coverage area by re-inflating imported coverage, and actuate the robot to resume the previous run.

In some embodiments, boustrophedon coverage is implemented, wherein the robot treats perimeter points seamlessly as they are encountered and coverage is along the paths of perimeter. Any unexpected reset, particularly excluding back to dock, power-OFF/-ON, routine changes (e.g., docking, then invoking cleaning), and cloud request for map reset cases, are treated seamlessly. In some embodiments, the pause state is implemented as a single control machine state and the application paired with the robot is used to pause the robot during a work session.

When a map is not formed yet, planning a coverage may not always succeed but the challenge is to use the areas that are sure to be traversable even though the entire space is unknown. In some of the prior art, a training run before performing work is implemented, these methods being inferior to those disclosed herein. In some of the prior art, a path is planned based on radially inward mapping with periodic loop closure, wherein the robot drives along a rectangle with one or two edges adjacent or aligned to one or two walls, and then starts cleaning or covering inside the rectangle. Herein, the disclosure focuses on how, without having explored a rectangular area or the entire area, the robot makes an educated guess that reliably leads to a correct decision in determining how to successfully plan coverage based on a partially observed and unmapped space. The point swarm data or images from a camera are used to distinguish a guaranteed traversable area for the robot to begin task of coverage based on minimal recognition of the area. This traversable area is a subset of the entire area. The robot moves along a boustrophedon path within the traversable area and simultaneously synthesizes and gradually completes the map by temporal integration of point swarm data or images. SLAM is a substrate of AI, in particular, a form of spatial computation allowing the robot to perceive its surroundings based on sensory input that is often noisy and has minimal meaning when considered individually. Temporal integration of readings while the robot moves allows for the point swarm (generated by an active illumination reflection that is received by a sensor) to be combined in a meaningful way and gradual reconstruction of the environment. The reconstructed environment forms a simulation in which the robot observes its pose as it evolves with time. As the robot moves, its sense of location suffers uncertainties associated with motion. This uncertainty is often modeled by creating multiple simulated robots each having a slightly different trajectory and modeling an instance of the noise that could happen. As such, the robot carries multiple hypothesis and for each calculates a posterior. While this field is the forefront of intersection of science and technology, methods that are common in the field often require massive computational resources, such as a miniaturized desktop PC. However, a desktop PC does not satisfy real-time computing requirements. In this disclosure, probabilistic algorithms that provide the accuracy and sophistication of advanced algorithms while maintaining a lightweight nature are developed. The probabilistic algorithms are suitable for meeting real-time computing and deterministic computation constraint requirements.

In some embodiments, a decomposition in the boustrophedon coverage planner serves multiple purposes including more granular access to boustrophedon box control. A series of boustrophedon boxes may be arranged next to each other in an area to form rectangles of subareas inside an area. In some embodiments, the robot is configured to end at a beginning of the next adjacent line by checking how far the robot is from the next adjacent line and how much the robot still needs to rotate to get to the line. Some embodiments actuate the robot to pre-rotate if the chosen curve radius is not enough to turn the required distance and determines an amount of pre-rotation given the distance to the next adjacent line. When the last line in a boustrophedon box is narrower than a width of the robot, the robot adjusts the boustrophedon box polymorphically. Some embodiments strategize boustrophedon box coverage order such that the robot exits the boustrophedon box at the last line of the boustrophedon. In some embodiments, the algorithm provides polymorphical decomposition with an atomic architecture, wherein if one map or path is invoked, the other layers do not occupy memory space.

In some embodiments, the overall path planner and a next point navigation planner are fused into a series of electric ticks provided to the motors. In some embodiments, the robot takes the same waypoints or meets the same anchor points when navigating in-between zones, whether the robot is tasked to perform a patrol walk, a point-to-point walk, or a coverage task. For example, it may be ideal for the robot to drive from one zone to another in a specific order or for the robot to touch certain points as the robot moves from one area to another. Another example comprises a coverage robot that uses navigation anchors as a highway, wherein the robot goes and comes back along the same path that has once been cleared to ensure the most efficiency. In some embodiments, the algorithm creates anchor points and the robot navigates to the anchor points along a trajectory. In some embodiments, the anchor points are picked within certain areas of the surroundings using a water shed like algorithm, starting from a central point and expanding the radius to include other areas. Along the center of an area with a least amount of course corrections possible is a path that would be desirable for the robot to visit as an anchor point. In practice, a human organically follows a similar pattern. For example, if a person is looking for their lost keys, the person goes to a relatively central point of each room, takes a glance, then leaves the room and goes to another room.

Organic navigation mimics how humans naturally navigate through an area. Humans are unlikely to walk within five centimeters of obstacles or walls by choice and neither should the robot. In some embodiments, a path planning algorithm places navigation anchors in areas at every two meters, preferably in the center of areas, given they are obstacle free. The algorithm plans navigation between the different areas by determining paths between navigation anchors. This is less computationally expensive and faster, as paths and the distances between navigation anchors are pre-computed. In some embodiments, a first map analysis is performed to generate a grid with anchor points, wherein the graph includes nodes that are representative anchors and edges that connect nodes where there is direct and open space for navigable connection between them. The anchor points are at least a robot diameter away from obstacles. When a node is on the x- and y-grid, the algorithm checks all eight neighbors and adds edges accordingly. When the node is on the x-grid but not on the y-grid, the algorithm finds the closest y-grid points and checks the closest six grid positions and adds edges accordingly. The opposite is performed when a node is on the y-grid but not the x-grid. The algorithm also performs a y-sweep along y-lines for each grid x-axis, and if a valid y-segment does not contain an anchor point, adds one. An x-sweep is similarly performed.

In some embodiments, the algorithm is then programmed to plan a route from a start location to a goal location using the graph of anchor points and edges from the map analysis.

To encourage the algorithm to plan paths that travel to nodes and along edges, travel along edges and to nodes causes a decrease in cost in a path planning function. For example, the step cost is discounted 10% for edges, 30% for nodes, 50% for one time repeated node, 70% for second time repeated node. In some embodiments, to discourage the algorithm from planning paths too close to walls, the use of edges that are particularly close to walls cause an increase in cost in the path planning function. In some embodiments, to discourage the algorithm from planning zigzagging paths, nodes that have a different direction than a direction out cause an increase in cost in the function. It is often desired that a robot not only complete a task, but perform the task in a way that a human perceives as reasonable. For example, in an autonomous vehicle, it is possible for the algorithm to avoid any collisions and be totally safe but accelerate and apply the breaks or take turns that are perceived as uncomfortable by a human. Even though a robot is likely to maneuver in certain ways that humans can't and safety is still ensured when the robot drives fast and agile, merely the safety and getting the task done is not enough.

In some embodiments anchor points are developed in navigation to mimic more reasonable seeming performing of the task that adapts to the current environment. In some embodiments, the algorithm causes the robot to navigate to anchor points with multiple use cases. In one example, a human does not walk from one room to another by following along walls at a 10 cm centimeter distance from the walls, although that would be completely safe. If a robot does that, it can be tolerated and the task gets done, however it is perceived as slow, inefficient, inorganic, and dissuades the human from delegating a task to the robot. In prior technologies, coastal navigation is used to navigate from one room to another, of which is improved herein.

In some embodiments, a path planning method generates a grid comprising anchor points strategically placed and used, and together with a uniquely formed cost function, is used in planning routes that travel along a center of an area and away from walls, along straight lines, as opposed to routes with multiple turns and curves, and minimizes course corrections. In spatial computing and semantic context based mapping, it is desirable for the robot to detect the perimeter and devise a plan that appears methodical but also understands desirable concepts understood by humans. A room, for example, easy to identify by a human, does not have any specific geometrical definition though it is expected a coverage robot avoids going back and forth between rooms when performing a task of coverage. However, the definition of a room, rather than being precise and crisp, is a loose one but it is well understood by a human. In order for a robot to exercise room-based navigation, the robot must first be able to identify one. Furthermore, it is desired that a room is distinguished and honored even if the robot is not familiar with the environment. Currently, the prior art is lacking a robot that recognizes a room immediately upon observing one without the robot having completed a first run and having the entire map to divide into areas. As such, the approach is a segmenting algorithm rather than an AI algorithm that can classify a room on-the-fly as soon as an enclosure is observed. Additionally, segmentation approaches are widely inaccurate based on test data.

In some embodiments, the movement pattern of the robot during the mapping and/or coverage process is a boustrophedon movement pattern. This can be advantageous for mapping the environment. For example, if the robot begins in close proximity to a wall of which it is facing and attempts to map the environment by rotating 360 degrees in its initial position, areas close to the robot and those far away may not be observed by the sensors as the areas surrounding the robot are too close and those far away are too far. Minimum and maximum detection distances may be, for example, 30 and 400 centimeters, respectively. Instead, in some embodiments, the robot moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robot, in some embodiments, (or sensor thereon if the sensor is configured to rotate independently of the robot) then rotates 180 degrees to face towards the open space of the environment. In doing so, the sensors observe areas in front of the robot and within the detection range. In some embodiments, the robot does not translate between the backward movement and completion of the 180 degrees turn, or in some embodiments, the turn is executed while the robot translates backward. In some embodiments, the robot completes the 180 degrees turn without pausing, or in some cases, the robot may rotate partially, e.g., degrees, move less than a threshold distance (like less than 10 cm), and then complete the other 90 degrees of the turn.

References to angles should be read as encompassing angles between plus or minus 20 degrees of the listed angle, unless another tolerance is specified, e.g., some embodiments may hold such tolerances within plus or minus 15 degrees, 10 degrees, 5 degrees, or 1 degree of rotation. References to rotation may refer to rotation about a vertical axis normal to a floor or other surface on which the robot is performing a task, like cleaning, mapping, or cleaning and mapping. In some embodiments, the robot's sensor by which a workspace is mapped, at least in part, and from which the forward direction is defined, may have a field of view that is less than 360 degrees in the horizontal plane normal to the axis about which the robot rotates, e.g., less than 270 degrees, less than 180 degrees, less than 90 degrees, or less than 45 degrees. In some embodiments, mapping may be performed in a session in which more than 10%, more than 50%, or all of a room is mapped, and the session may start from a starting position, is where the presently described routines start, and may correspond to a location of a base station or may be a location to which the robot travels before starting the routine.

The robot, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robot by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robot, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robot returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robot makes two 180 degree turns separated by some distance, such that movement of the robot is a boustrophedon pattern, travelling back and forth across the environment. In some embodiments, the robot may not be initially facing a wall of which it is in close proximity with. The robot may begin executing the boustrophedon movement pattern from any area within the environment. In some embodiments, the robot performs other movement patterns besides boustrophedon alone or in combination.

In other embodiments, the boustrophedon movement pattern (or other coverage path pattern) of the robot during the mapping process differs. For example, in some embodiments, the robot is at one end of the environment, facing towards the open space. From here, the robot moves in a first forward direction (from the perspective of the robot as defined above) by some distance then rotates 90 degrees in a clockwise direction. The processor determines the first forward distance by which the robot travels forward by detection of an obstacle by a sensor, such as a wall or furniture. In some embodiments, the first forward distance is predetermined (e.g., and measured by another sensor, like an odometer or by integrating signals from an inertial measurement unit). The robot then moves by some distance in a second forward direction (from the perspective of the room, and which may be the same forward direction from the perspective of the robot, e.g., the direction in which its sensor points after rotating); and rotates another 90 degrees in a clockwise direction. The distance travelled after the first 90-degree rotation may not be particularly large and may be dependent on the amount of desired overlap when cleaning the surface. For example, if the distance is small (e.g., less than the width of the main brush of a robot), as the robot returns back towards the area it began from, the surface being cleaned overlaps with the surface that was already cleaned. In some cases, this may be desirable. If the distance is too large (e.g., greater than the width of the main brush) some areas of the surface may not be cleaned. For example, for small robots, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robots brush size can be between 50-60 cm. The robot then moves by some third distance in forward direction back towards the area of its initial starting position, the processor determining the third forward distance by detection of an obstacle by a sensor, such as a wall or furniture. In some embodiments, the third forward distance is predetermined. In some embodiments, this back and forth movement described is repeated wherein the robot repeatedly makes two 90-degree turns separated by some distance before travelling in the opposite direction, such that movement of the robot is a boustrophedon pattern, travelling back and forth across the environment. In other embodiments, the directions of rotations are opposite to what is described in this exemplary embodiment. In some embodiments, the robot may not be initially facing a wall of which it is in close proximity. The robot may begin executing the boustrophedon movement pattern from any area within the environment. In some embodiments, the robot performs other movement patterns besides boustrophedon alone or in combination.

This disclosure explains an improvement over prior art, wherein the AI algorithm detects an enclosure and classifies the enclosure as room when it makes sense to do so and early on when the robot reaches the enclosure, similar to a human. Based on such detection, the robot completes coverage of one room before entering another. With semi-observability of the area and point swarm data, an enclosure that is a room candidate is detected and adjusted for accordingly. The robot starts in a room with a seed graph color, and then the second room is a second node in a graph identified with a second graph color, and so on. In some embodiments, a data format is defined and used to identify rooms, wherein zero indicates no room and all other numbers are numerical identifiers for rooms. Random ordering of room IDs is supported and a function that suggests a next room to cover is implemented. Room identification identifies areas and enclosures as rooms in real-time using a wave expansion technique rather than segmenting a given complete map, as is done in prior art. In some embodiments, a first room is chosen for coverage by checking if there is a room that is partially cleaned, and if so, setting it as the initial room for coverage. Then a closest room from a list of room IDs is picked by determining a diagonal distance to a map centroid of each room and choosing the closest one to the robot, wherein a closest uncleaned room is selected for cleaning next and a second closest room is selected as a next candidate for cleaning. In some embodiments, the algorithm manages room based coverage by implementing a data object containing past, current and future cleaning zones, a zone manager that handles switching of cleaning zones (i.e., when the robot is done cleaning a zone the manager moves the zone from current to past), and a map analysis tool that identifies current and future cleaning zones.

In some embodiments, the algorithm manages parameter settings (e.g., cleaning intensity) for a current room of a robot by using sensor data and building a map to attempt to identify the current room of the robot. If the room is identified, the room parameters are set to the current room parameters saved, otherwise, the room parameters are set to the default parameters. If the room is unidentified, the room parameters are set to the default parameters. In some cases, a robot begins scheduled work and aborts partway through due to low battery. To maintain a same planned order of room coverage and room settings as prior to aborting the session, the algorithm exports a location of the robot prior to aborting, covered areas, room settings, and an order of room IDs for room coverage to the cloud. After recharging, the algorithm actuates the robot to resume the session by restoring the exported data. Further, to ensure all areas are covered after room based coverage, the algorithm actuates the robot to wall follow the perimeter of each room after coverage of the respective room, identifies any remaining uncovered areas at the end of a session, and actuates the robot to perform a robust coverage of those uncovered areas.

There exists many instances that the rooms are not perfectly separated or the logical separation does not align with human intuition. As the robot goes about performing the task of coverage, partial observability gradually becomes closer to full observation by the end of a session. The newly found information is accounted for and the robot amends or fixes its initial mistakes in identifying a room, given that the entire area is now observed. The new information is merged and an initial finding is reconsidered. The path planning algorithm further supports user initiated resegmentation of a map into rooms using a user interface. Graph theory is used to identify each room as a node and the path to its neighbors as a link. A room manager for high-level management that maintains a room state, the room state encoding different rooms and their neighbors, is devised as well as a zone manager for high-level tracking of rooms to be covered and order of room coverage. The path planning algorithm further supports user initiated resegmentation of a map into rooms via the cloud. The features include the following: map re-segmentation, wherein the user requests resegmentation, causing the algorithm to clear all current rooms and repartition the map into a new set of rooms; room division, wherein the user selects a room and splits the room as desired by positioning a line, causing the algorithm to repartition the room based on the line; and room merge, wherein the user selects two rooms to merge, causing the algorithm to merge the two rooms into a single room. The three functions implemented in the algorithm perform resegmentation, merging, and dividing of rooms prior to pushing the information to the mobile application for display. For a user to select rooms, the mobile application includes a room manager for high-level management that maintains a room state, the room state encoding different rooms and their neighbors; a zone manager for high-level tracking of rooms to be covered and order of room coverage, wherein the room manager neighbor graph is used to determine a coverage order; and an analysis component room detector that reuses current room state from the room manager to conservatively update the rooms (e.g., when a map slightly changes or during a map build) and notify the zone manager if a room significantly changes (e.g., to reconsider for coverage).

In some embodiments, the robot immediately starts cleans after turning on. In some embodiments, the processor discovers more areas of the environment as the robot cleans and collects sensor data. Some areas, however, may remain as blind spots. These may be discovered at a later time point as the robot covers more discovered areas of the environment. In embodiments, the processor of the robot builds the complete map of the environment using sensor data while the robot concurrently cleans. By discovering areas of the environment as the robot cleans, the robot is able to being performing work immediately, as opposed to driving around the environment prior to beginning work. In some embodiments, the application of the communication device paired with the robot displays the map as it is being built by the processor of the robot. In some embodiments, the processor improves the map after a work session such that at a next work session the coverage plan of the robot is more efficient than the prior coverage plan executed. For instance, the processor of the robot may create areas in real time during a first work session. After the first work session, the processor may combine some of the areas discovered, to allow for an improved coverage plan of the environment.

In some embodiments, the processor of the robot identifies a room. In some embodiments, the processor identifies rooms in real time during a first work session. For instances, during the first work session the robot may enter a second room after mapping a first room and as soon as the robot enters the second room, the processor may know the second room is not the same room as the first room. The processor of the robot may then identify the first room if the robot so happens to enter the first room again during the first work session. After discovering each room, the processor of the robot can identify each room during the same work session or future work sessions. In some embodiments, the processor of the robot combines smaller areas into rooms after a first work session to improve coverage in a next work session. In some embodiments, the robot cleans each room before going to a next room.

In some embodiments, the processor of the robot detects rooms in real time. In some embodiments, the processor predicts a room within which the robot is in based on a comparison between real time data collected and map data. For example, the processor may detect a particular room upon identifying a particular feature known to be present within the particular room. In some embodiments, the processor of the robot uses room detection to perform work in one room at a time. In some embodiments, the processor determines a logical segmentation of rooms based on any of sensor data and user input received by the application designating rooms in the map. In some embodiments, rooms segmented by the processor or the user using the application are different shapes and sizes and are not limited to being a rectangular shape.

In embodiments, the processor of the robot observes the robot within a first room and actuates the robot to begin covering the room based on sensor data, such as sensor scan information and point cloud information, used in building a small portion of a map within the first room. While the robot performs work, the processor executes an exploration algorithm. The exploration may be executed concurrently with coverage or the processor may switch a mode of the robot to solely exploration for further exploration into unknown areas without coverage. Upon observing an area that may be enclosed into a second room, the processor assigns a color to the second room and discovers the first area as the first room. As opposed to some prior art, the robot performs work using partial observability prior to the processor creating the map of the environment using real-time information collected up until that particular point in time. As the robot moves along a path during coverage, the processor of the robot creates a snail trail of where the robot has been and has covered. FIG. 336 illustrates a path 27100 of a robot 27101 and a snail trail 27102 of the robot 27101. As the robot moves along its path, the processor of the robot determines and stores in memory areas with a high chance of object entanglement with the robot, areas with high obstacle density, floor types of areas, amounts of debris accumulation in areas, and plans a better path for future runs. The processor of the robot does not often have to replan several times before reaching an acceptable coverage. In most areas and environments, one reroute of the path and maintenance of the map suffices to provide a satisfactory coverage. Maintenance of map or reroute may be executed at an end of a session, a beginning of a new session, or when the robot is fully charged, momentarily wakes up and cleans up its map. A user can trigger a map clean up, a path reroute, or a room assignment manually using an application of a communication device paired with the robot. The user may enter information manually or may choose the robot automatically perform the task, such as rerunning a room assignment for a map. The processor of the robot may rerun the room assignment using different parameters for the room assignment algorithm. For instance, the processor may use a total area covered by the robot and a number of rooms to adjust room discovery. For example, given an entire area is estimated to be 700 square feet and initial room assignment discovered two rooms, upon rerunning room assignment using the application, the room assignment algorithm may be less conservative and define more of the separations as rooms. However, based on knowledge of room sizes, the room assignment algorithm is not likely to discover less rooms and identify the entire area as one room instead of the initial two rooms. A similar situation occurs when a small area is discovered to be a room. For example, given an area of 80 square feet is identified as a room, upon rerunning room assignment using the application, the room assignment algorithm may merge the area of 80 square feet with a larger adjacent area.

Training the room assignment algorithm in advance may be useful in determining what a good room division and a poor room division of an environment, assuming training examples can be provided. Training may be executed before real-environment use by a user or using examples of environment room divisions received from one or more users. To train the room assignment algorithm in advance, a set of floor plans are provided as input into the algorithm so that it may learn division of different environments into rooms. The room assignment algorithm then outputs division of each floor plan and a human classifies the output as a good room division or a poor room division, from which the algorithm learns what classifies as a good room division. In a more sophisticated algorithm, the human classifying may further split areas in the output and provide it back to the algorithm as input. For example. FIG. 337 illustrates an initial room assignment 27200 of rooms 27201 and 27202. The human classifying may split room 27201 into two rooms A and B and provide the information as input to the algorithm as an acceptable room separation for further learning of room assignment.

In some embodiments, the room assignment algorithm is trained using machine learning, which serves as ground truth data. The training may be based on input into the algorithm and human classification, where the input is gathered from sources other than the end user. This training is often executed prior to runtime or the robot being deployed to perform work. However, training the room assignment algorithm goes beyond training executed prior to deployment of the robot. While the robot performs work, data gathered by sensor of the robot provide more insight and training evolves as new data is used to further train the room assignment algorithm, which also evolves the ground truth for other robots or future runs of the same robot. The room assignment algorithm may also continue to learn from actions of users, such as when users choose to split or merge rooms or request rerunning the room assignment.

Some embodiments may use at least some of the methods, processes, and/or techniques for determining a route of the robot or coverage by the robot described in U.S. Non-Provisional patent application Ser. Nos. 17/494,251, 17/670,277, and 17/990,743, and U.S. Non-Provisional patent Ser. Nos. 11/768,504, 10/207,408, 11/077,555, 9/764,472, 10/386,847, 11/119,216, 10/810,427, 10/353,399, 10/613,541, 9/701,020, and 11/119,496, each of which is hereby incorporated herein by reference. Some embodiments may use at least some of the methods, processes, and/or techniques for dividing an environment for coverage by the robot described in U.S. Non-Provisional patent Ser. Nos. 9/701,020 and 11/119,496, each of which is hereby incorporated herein by reference.

Some embodiments include sensors capturing measurements of the environment, the processor of the robot finding a match between currently observed perimeter points and a premade representation of the workspace including the boundaries thereof, the processor of the robot localizing the robot in the workspace and the digital representation of the environment, and the robot avoiding crossing boundaries of zones defined by the user. Some embodiments include the processor loading a premade representation of the workplace in memory, the representation consisting of boundaries discovered using sensors disposed on the robot and boundaries added by the user to the representation of the environment previously generated, sensors capturing measurements (i.e., readings) in real-time and the processor of the robot finding perimeter points that coincide with the new measurements, the processor of the robot finding a location of the robot in relation to the coincident points, the processor inferring a position of the robot in the workspace and the digital representation, and the robot avoiding crossing boundaries added by the user. Some embodiments include, upon start of the work session, the processor of the robot relocalizing the robot by comparing current readings from a sensor with a premade representation of the workplace, the robot performing a task of coverage while honoring boundaries that were added into the premade representation by the user using the application. In some embodiments, the robot starts with a radially outward mapping. The robot covers a discovered bounding area, then moves on to explore far reaching areas, and at intervals, upon a perimeter aligned navigator being invoked, the robot covers along perimeter areas. Managing the balance between exploration, coverage, perimeter aligned coverage, and a series of local optimizations based on observations heuristically leads to an optimal coverage.

Enhancing localization in more rigorous circumstances requires the robot to survive situations wherein the processor of the robot loses track of the robot by falling back to alternative navigation mode or best effort tracking until the processor recovers and relocalizes the robot. Some embodiments implement Markov localization. Markov localization uses a probabilistic framework, wherein a probability density over all possible robot positions in a position space is maintained throughout navigation. Initially, the position of the robot is represented by a uniform distribution, given the location of the robot is unknown, or a Gaussian distribution, given the location of the robot is known with high certainty. When the sensor data lacks landmarks or the robot is reset or teleported and loses the landmark, localization is prone to failure. In some embodiments, the iterative nature of optimization is encoded as cycles that evolve with time, like a wave function that is carried forward in a phase space, inspired by Schrodinger's equation of motion. In embodiments, robot localization survives dynamic environments, wherein obstacles move or sensor readings are intermittent or blocked from observing landmarks for extended periods of time. Carrying forward a wave function with time allows for sensor information to be used as its received, with intermittent and dynamic loop closure or bundle adjustment. An adjustment may be seen as a collapse of a wave function upon observation. Upon failing to localize the robot, a robot reset may be triggered.

In embodiments, the processor of the robot relocalizes the robot after a reset or an unexpected teleport. Embodiments herein disclose methods for the robot to survive a reset, wherein a previous map against which the robot is relocalized disappears. For instance, suppose a previous map of the environment is saved locally or on the cloud and is reinstated upon startup of the robot. A difference between a temporary map generated upon startup and the saved map is measured to be below a predetermined threshold, as such the processor of the robot relocalizes the robot based on its current surroundings matching the saves map and the robot resumes its task. In some embodiments, a LIDAR data reliability qualification metric is used to prevent offset in the map caused by false positive matches between a temporary map and a saved map. Some embodiments employ a seamless real-time relocalization of the robot. In some embodiments, a delay factor in loading a map and data integration when a reset is triggered is added for incoming data to stabilize before integrating the data into the map. This delay may be proportional to data mismatch, for example, when rate of wheel rotation is not proportional to driving speed. The delay factor helps prevent map warping. In some embodiments, the algorithm loops a number of predetermined times or for a predetermined number of seconds. When the robot boots up in a previously unknown environment, the processor of the robot starts building a temporary map. When the robot enters a previously known environment the processor detects the known environment and appends newly discovered areas to the previously known environment.

Global localization techniques may be enhanced to accommodate scenarios with a lack of landmarks or matches between currently observed data and previously observed data. When data has a lack of landmarks or the processor of the robot cannot find a match between currently observed landmarks and landmarks in the saved map, the processor concludes the robot is in a new environment and creates a new map. The new map may be temporary and later merged with an older saved map. The processor of the robot constantly checks for matches and upon finding a match, stitches the sensed data with the saved map at overlapping points. However, when a previously detected feature is undetected initially but detected later, appending an already discovered area to the map causes an invalid extension to the map.

At startup of the robot, an algorithm executed by the processor of the robot starts building a new map while performing repeated exploration and frequently attempting to match the new map with the persistent (i.e., saved) map in storage a predetermined number of times. In some embodiments, exploration is implemented by triggering a frontier exploration. When the algorithm is successful in matching the new map with the persistent map, the algorithm successfully merges the new map with the persistent map, relocalizes the robot, and continues to a next state. When the algorithm is unsuccessful in matching the new map with the persistent map, the algorithm continues to build the new map or exits with a 'cannot relocalize' message when there are restricted zones, cleaning settings, etc. When a map is initially undistinguished but later distinguished, the algorithm merges the new map with the persistent map at points of overlap. The algorithm may apply a transform to the new map to align the new map with the persistent map, merge data from the new map with the persistent map, and use the persistent map for navigation thereafter. A mathematical fusion strategy using probabilities may be used for cases of an unassigned cell from the persistent map and the new map to determine the fused value. In some cases, relocalization fails when the algorithm cannot find a match between the new map and the persistent map. Upon failure of finding a match, the algorithm continues to build the new map and the robot navigates using the new map. Relocalization failure may also during the algorithm successfully finding a match between the new map and the persistent map, correctly rotating the new map by +45 degrees to match the coordinate system of the persistent map, fusing the two maps together, and correcting the pose of the robot in the fused map. Reloclization failure may also occur when the processor does not initially relocalize the robot, but relocalizes the robot sometime during the work session, after starting to build a map. Another example of relocalization failure includes the processor incorrectly identifying an area as a place previously observed (i.e., a false positive match between newly observed features and previously observed stored features).

In some embodiments, disruption of sensors or manipulation of the surroundings prevents the algorithm from relocalizing the robot or adds unrealistic extensions to an otherwise perfect map. In some embodiments, at startup, the algorithm starts building a new map and attempts to import the persistent map data from the persistent memory to check for a match with the new map by rotating the new map and filling in the persistent map. After this step, the algorithm determines a failure to build the merged map, a failure to match the persistent map with the new map or starts exporting the successfully merged maps back to the persistent memory. Some embodiments implement a method for the algorithm to recover from incorrectly determining the robot is starting work in a previously seen environment, in which case the processor optimizes the path of the robot based on the previous map. Some embodiments implement a method for the algorithm to recover from incorrectly determining the robot is starting work in a new environment, in which case the algorithm builds a map. In some embodiments, a score is implemented for distinguishing a previously seen environment from a newly discovered environment to aid in preventing misinterpretation of data or situation or to recover from misinterpretation early on, before further damaging the map. In some embodiments, the algorithm monitors runs in two instantiations, in tandem, for continuously comparing a previously stored map with a new map, tracing potential mismatches between the two maps, forming new hypothetical maps from the two maps, and keeping a score based on viability of the previous map being a distinct entity from the current new map. The intent is to avoid false feature association and corruption of a perfect persistent map with the merging of irrelevant data pertaining to an environment other than that of the persistent map.

In some embodiments, localization of the robot is lost due to the robot becoming stuck and relocalization is required. To determine context from sensor readings, such as a stuck state of the robot, sensor data captured by IMU, accelerometer, odometer, and LIDAR are compared, validated, then fused to improve inference of context, such as a stuck state. For example, when odometer data indicates significant acceleration of the wheels but the IMU data indicates no such spike, a linear stuck state is concluded. Or when there is a strong mismatch between odometer angular rate and gyroscope z-axis data, an angular stuck state is concluded. In some embodiments, the ratios of change have different meanings when measured translational movement of the robot contradicts the actual movement of the robot, whereby the degree of incorrect estimation of the location of the robot varies and is used to extract context. For instance, it is determined that the robot is an angular stuck state when the angular rate from the odometer data and gyroscope z-axis are mismatched. When there is a consistent mismatch, the angular traction estimate is provided. To determine linear traction, the algorithm determines whether the robot is idle, accelerating, decelerating, or driving based on the IMU sensor data. The robot is assumed idle when all recent samples are below a certain magnitude; accelerating when short-term integration is above a +5 cm/s difference or recent data contains at least two more acceleration spikes (threshold 1 m/s$^2$) than deceleration spikes; decelerating when the opposite of the accelerating logic above occurs; and driving in all other cases. In some embodiments, the algorithm identifies sharp acceleration/deceleration phases based on odometer data. The robot experiences a sharp acceleration when a single difference of at least 7.5 cm/s is detected and nearby measured samples have a difference greater than −2 cm/s; and a sharp deceleration when a single difference of −7.5 cm/s is detected and nearby measured samples have a difference less than 2 cm/s. In some embodiments, the algorithm reports a linear stuck state when the odometer data indicates acceleration/deceleration but the IMU data does not. In some embodiments, the robot frees itself from a stuck state upon detection of the stuck state by, for example, executing a 30 degrees rotation, and if the robot times out a first time, driving forwards 8 cm to 18 cm, and if the robot times out a second time, driving backwards 8 cm to 18 cm. In some embodiments, wherein the robot is stuck under a chair and during the past 25 seconds there was less than 0.2 m diagonal direction movement or 90 degrees rotation, the robot attempts to free itself by executing a curated first curved backup (e.g., at 10 cm/s speed and 5 cm radius) with a distance less than the previous backup distance, rotating in place, and if the rotation does not return the reached goal for the curved backup, executing a second curved backup in an opposite direction to the first curved backup.

In some embodiments, a solid state depth camera using structured light or TOF principals or a combination of both is used to extract odometry information. Odometry information may also be extracted from data captured by a camera or a solid state depth camera using structured light. Or TOF principals at interleaved time stamps may act as a camera and capture images from which odometry data may be calculated. In some embodiments, a camera disposed on the robot captures a stream of images and the processor of the robot compares a previous image captured with a next image captured and infers a certain displacement of the robot. This complements and improves an encoder measurement that relies on counting wheel rotations as encoders are unreliable when the wheels of the robot continue to rotate but the robot is not actually moving or the wheels of the robot rotate at a slower rate than expected. Odometry data may be compared with other types of sensor data to detect when the robot is stuck and the wheels of the robot slip, thereby improving detection of a stuck state or wheel slippage. Temporal image comparison may use a 3D or 2D approach. A key point may be detected with or without a descriptor. A tracking method may be used to take advantage of optical flow with the assumption that the flow is constant. An estimated rotation and translation based on a set of detected features and their position in two images is achieved by extracting and matching the features between the raw images, estimating relative rotation and translation (up to scale) between the two image frames, and triangulating features to obtain 3D world points. In some embodiments, computing pose from a 3D-to-2D or 2D-to-2D match using the triangulated features from a last iteration is used. In some embodiments, triangulation based on features from multiple image frames is used.

In some embodiments, seamless on-the-fly relocalization of the robot using SLAM technology capable of lightweight computing is required for a true embedded solution. In some embodiments, the robot is configured to execute a fail-safe behavior or reset when a sensor is covered. A range of unexpected teleportation of the robot may be used to examine localization resilience. In embodiments, wherein the robot resets the previous map used is expected to remain accessible. In embodiments, the algorithm builds a temporary map of the surroundings of the robot and uses the new map temporarily when there is no previous map data to compare the new map against. When there is previous map available to compare the new map against and a comparison returns a match, the new map is superimposed on the previous map with which the match was found. A previous map of the environment may be saved locally and/or on the cloud and is reinstated upon startup of the robot. A difference between the temporary new map and a particular map saved is measured and at a predetermined threshold, the robot is relocalized. Relocalization of the robot (based on its current surroundings matching the particular previous map) resumes the current task based on a previously observed map, overcoming challenges of partial observability. When relocalization occurs, user set boundaries and preferences are respected and accounted for. In some cases, an unexpected high electric voltage applied to the robot causes the robot to reset and lose localization. In current state of the art, a sudden change as such causes the processor of the robot to generate an offset in the map and the robot continues working using the incorrect map. This means the robot may attempt to enter places that the offset map incorrectly shows as uncovered space, which in fact is space that does not exist. Such situations cause the robot to perform coverage in an unhomogenized manner, repeating coverage in some areas more than other areas.

In some cases, a false positive match between the temporary map and a saved map occurs. Herein, methods disclose minimizing false positive matches by using a LIDAR data reliability qualification metric. A dynamic algorithm speeds up map filling in known areas and avoids high rejection rates of map filling when the robot is driving towards unknown areas, consequently reducing the risk of losing localization. A dynamic map filling increases the aggressiveness of map filling during ideal times while maintaining a stable map by reducing the aggressiveness of map filling in uncertain areas. For example, when the robot is unexpectedly shifted, a lower LIDAR data reliability qualification metric prevents the LIDAR data from corrupting the map. In another example, the LIDAR data reliability qualification metric changes when the wheels of the robot are spinning and acceleration is not proportional to driving speed or there is a mismatch (temporary or continuous). In some embodiments, a delay or lag in loading a map after a map pull is implemented. In some embodiments, a decay factor is implemented. In some embodiments, the algorithm loops a number of predetermined times or seconds or a dynamic number of times or seconds. When the robot sensor is occluded for a time period and then unoccluded, a relocalization on-the-fly occurs, in a similar manner to when the robot boots up in a previously unknown environment. In some embodiments, the algorithm starts building a map based on visited locations and a footprint of the robot or tracked footprint coverage of the robot in a last known good map when the sensor is occluded. When the sensor is unoccluded, the algorithm resolves offsets built during occlusion of the sensor. When the robot enters a previously known environment, the algorithm recognizes the known environment and appends the mapped newly discovered area to the mapped previously known area.

In some embodiments, global localization techniques use Markov localization. Markov localization is iterative in nature and may be modeled or encoded in a cyclic data structure. In some embodiments, a Fourier transform is used in conjunction with a probabilistic framework, wherein a probability density over all possible robot positions in a position space is maintained throughout navigation. Initially, the position of the robot is represented by a uniform distribution if the location of the robot is unknown or by Gaussian distribution at times when the location of the robot is known with a degree of certainty. A cyclic counter may determine a degree of confidence as it increases or decreases with time. At startup, the algorithm starts building a new map with repeated exploration and frequently attempts to match the new map with a saved map loaded from storage. When data does not contain any landmarks, the algorithm concludes that it is in a new environment and at intervals checks for known landmarks such that the algorithm knows the robot has entered a previously known environment and stitches the new temporary map to a previous map to which a match was found based on overlapping points or features. The algorithm may attempt to find a match a predetermined number of times or at intervals. The interval may be longer as time passes. A frontier exploration may be used to help find a match if the algorithm fails to find a match initially. When a match is found, the new map is merged and superimposed with the previous persistent map with which a match was found. The algorithm may successfully merge the new map with the persistent map, relocalize the robot, and continue to a next state. If the algorithm is unsuccessful in finding a match, the algorithm continues to build the new map or exits with a cannot relocalize message when there are restricted zones, cleaning settings, etc. In its literal sense, SLAM techniques are used to generate or update a map of the environment of the robot while simultaneously keeping track of the location of the robot within the map. However, in a broader sense, the goal is not to only create a map, but also contextual understanding and situational awareness of the robot in the workspace and reacting to situations or making decisions to prevent undesirable scenarios. While the literal aspect of SLAM technology is largely resolved in prior art, the broader expectation of the technology is still the forefront challenge in the robotics field and SLAM.

Odometer data, from which movement is inferred, may be misleading to a certain degree. In such case, data from a gyroscope may provide more context by providing angular movement of the robot or an accelerometer may be used to add color to odometer readings. Similarly, when point swarm data indicate the coordinate of the robot is stationary, the respective rate of discrepancy creates clues that are used to deduce conclusions and act on them. In some embodiments, context from sensor readings to detect a stuck state of the robot is created by fusing sensor data captured by a gyroscope, accelerometer, odometer, and point swarm when they resonate and eliminating such sensor data when they contradict one another (along with creating a hypothesis according to the nature of contradiction). Each type of sensor data may create a different signature, such as the systems used in signal conditioning or network intrusion systems. For example, a type of context is a stuck state. Some embodiments employ a dynamic algorithm to detect a linear stuck state when odometer data indicates a significant acceleration of the wheels but IMU data indicates no such spike, a linear stuck state can be concluded and an angular stuck state when there is a strong mismatch between odometer angular rate extracted from the odometer data and gyroscope z-axis data extracted from the IMU data. The details and rations of sensor recordings within a single sensor and multiple sensors may infer different meanings. If there is a consistent mismatch between two types of sensor data, a second or third data source may be used as an arbitrator. If the mismatch is a spike or momentary, an angular traction or linear traction may be detected. In some embodiments, after detecting the stuck state of the robot, the robots frees itself from the stuck state as described above. In some embodiments, the detection of a stuck state is improved by monitoring a requested and an actual (derived from an encoder sensor) speed of a side wheel of the robot. The algorithm may report a stuck state upon detecting a mismatch.

In some embodiments, the processor of the robot may track the position of the robot as the robot moves from a known state to a next discrete state. The next discrete state may be a state within one or more layers of superimposed Cartesian (or other type) coordinate system, wherein some ordered pairs may be marked as possible obstacles. In some embodiments, the processor may use an inverse measurement model when filling obstacle data into the coordinate system to indicate obstacle occupancy, free space, or probability of obstacle occupancy. In some embodiments, the processor of the robot may determine an uncertainty of the pose of the robot and the state space surrounding the robot. In some embodiments, the processor of the robot may use a Markov assumption, wherein each state is a complete summary of the past and used to determine the next state of the robot. In some embodiments, the processor may use a probability distribution to estimate a state of the robot since state transitions occur by actuations that are subject to uncertainties, such as slippage (e.g., slippage while driving on carpet, low-traction flooring, slopes, and over obstacles such as cords and cables). In some embodiments, the probability distribution may be determined based on readings collected by sensors of the robot. In some embodiments, the processor may use an Extended Kalman Filter for non-linear problems. In some embodiments, the processor of the robot may use an ensemble consisting of a large number of virtual copies of the robot, each virtual copy representing a possible state that the real robot is in. In embodiments, the processor may maintain, increase, or decrease the size of the ensemble as needed. In embodiments, the processor may renew, weaken, or strengthen the virtual copy members of the ensemble. In some embodiments, the processor may identify a most feasible member and one or more feasible successors of the most feasible member. In some embodiments, the processor may use maximum likelihood methods to determine the most likely member to correspond with the real robot at each point in time. In some embodiments, the processor determines and adjusts the ensemble based on sensor readings. In some embodiments, the processor may reject distance measurements and features that are surprisingly small or large, images that are warped or distorted and do not fit well with images captured immediately before and after, and other sensor data that appears to be an outlier. For instance, optical components or the limitation of manufacturing them or combing them with illumination assemblies may cause warped or curved images or warped or curved illumination within the images. For example, a line emitted by a line laser emitter captured by a CCD camera may appear curved or partially curved in the captured image. In some cases, the processor may use a lookup table, regression methods, or AI or ML methods to create a correlation and translate a warped line into a straight line. Such correction may be applied to the entire image or to particular features within the image.

In some embodiments, the processor may correct uncertainties as they accumulate during localization. In some embodiments, the processor may use second, third, fourth, etc. different type of measurements to make corrections at every state. For instance, measurements for a LIDAR, depth camera, or CCD camera may be used to correct for drift caused by errors in the reading stream of a first type of sensing. While the method by which corrections are made may be dependent on the type of sensing, the overall concept of correcting an uncertainty caused by actuation using at least one other type of sensing remains the same. For example, measurements collected by a distance sensor may indicate a change in distance measurement to a perimeter or obstacle, while measurements by a camera may indicate a change between two captured frames. While the two types of sensing differ, they may both be used to correct one another for movement. In some embodiments, some readings may be time multiplexed. For example, two or more IR or TOF sensors operating in the same light spectrum may be time multiplexed to avoid cross-talk. In some embodiments, the processor may combine spatial data indicative of the position of the robot within the environment into a block and may process the spatial data as a block. This may be similarly done with a stream of data indicative of movement of the robot. In some embodiments, the processor may use data binning to reduce the effects of minor observation errors and/or reduce the amount of data to be processed. The processor may replace original data values that fall into a given small interval, i.e. a bin, by a value representative of that bin (e.g., the central value). In image data processing, binning may entail combining a cluster of pixels into a single larger pixel, thereby reducing the number of pixels. This may reduce the amount of data to be processed and may reduce the impact of noise.

In some embodiments, the processor may obtain a first stream of spatial data from a first sensor indicative of the position of the robot within the environment. In some embodiments, the processor may obtain a second stream of spatial data from a second sensor indicative of the position of the robot within the environment. In some embodiments, the processor may determine that the first sensor is impaired or inoperative. In response to determining the first sensor is impaired or inoperative, the processor may decrease, relative to prior to the determination that the first sensor is impaired or inoperative, influence of the first stream of spatial data on determinations of the position of the robot within the environment or mapping of dimensions of the environment. In response to determining the first sensor is impaired or inoperative, the processor may increase, relative to prior to the determination that the first sensor is impaired or inoperative, influence of the second stream of spatial data on determinations of the position of the robot within the environment or mapping of dimensions of the environment.

In some embodiments, the processor associates properties with each room as the robot discovers rooms one by one. In some embodiments, the properties are stored in a graph or a stack, such the processor of the robot may regain localization if the robot becomes lost within a room. For example, if the processor of the robot loses localization within a room, the robot may have to restart coverage within that room, however as soon as the robot exits the room, assuming it exits from the same door it entered, the processor may know the previous room based on the stack structure and thus regain localization. In some embodiments, the processor of the robot may lose localization within a room but still have knowledge of which room it is within. In some embodiments, the processor may execute a new relocalization with respect to the room without performing a new re-localization for the entire environment. In such scenarios, the robot may perform a new complete coverage within the room. Some overlap with previously covered areas within the room may occur, however, after coverage of the room is complete the robot may continue to cover other areas of the environment purposefully. In some embodiments, the processor of the robot may determine if a room is known or unknown. In some embodiments, the processor may compare characteristics of the room against characteristics of known rooms. For example, location of a door in relation to a room, size of a room, or other characteristics may be used to determine if the robot has been in an area or not. In some embodiments, the processor adjusts the orientation of the map prior to performing comparisons. In some embodiments, the processor may use various map resolutions of a room when performing comparisons. For example, possible candidates may be short listed using a low resolution map to allow for fast match finding then may be narrowed down further using higher resolution maps. In some embodiments, a full stack including a room identified by the processor as having been previously visited may be candidates of having been previously visited as well. In such a case, the processor may use a new stack to discover new areas. In some instances, graph theory allows for in depth analytics of these situations.

In some embodiments, the robot may be unexpectedly pushed while executing a movement path. In some embodiments, the robot senses the beginning of the push and moves towards the direction of the push as opposed to resisting the push. In this way, the robot reduces its resistance against the push. In some embodiments, as a result of the push, the processor may lose localization of the robot and the path of the robot may be linearly translated and rotated. In some embodiments, increasing the IMU noise in the localization algorithm such that large fluctuations in the IMU data are acceptable may prevent an incorrect heading after being pushed. Increasing the IMU noise may allow large fluctuations in angular velocity generated from a push to be accepted by the localization algorithm, thereby resulting in the robot resuming its same heading prior to the push. In some embodiments, determining slippage of the robot may prevent linear translation in the path after being pushed. In some embodiments, an algorithm executed by the processor may use optical tracking sensor data to determine slippage of the robot during the push by determining an offset between consecutively captured images of the driving surface. The localization algorithm may receive the slippage as input and account for the push when localizing the robot. In some embodiments, the processor of the robot may relocalize the robot after the push by matching currently observed features with features within a local or global map.

In some embodiments, the processor may localize the robot by localizing against the dominant color in each area. In some embodiments, the processor may use region labeling or region coloring to identify parts of an image that have a logical connection to each other or belong to a certain object/scene. In some embodiments, sensitivity may be adjusted to be more inclusive or more exclusive. In some embodiments, the processor may use a recursive method, an iterative depth-first method, an iterative breadth-first search method, or another method to find an unmarked pixel. In some embodiments, the processor may compare surrounding pixel values with the value of the respective unmarked pixel. If the pixel values fall within a threshold of the value of the unmarked pixel, the processor may mark all the pixels as belonging to the same category and may assign a label to all the pixels. The processor may repeat this process, beginning by searching for an unmarked pixel again. In some embodiments, the processor may repeat the process until there are no unmarked areas.

In some embodiments, the processor may infer that the robot is located in different areas based on image data of a camera at the robot navigates to different locations. For example, FIG. 338 illustrates observations 23100 of a camera of a robot at a first location 23101 at a first time point, a second location 23102 at a second time point, and a third location 23103 at a third time point. Based on the observations 23100 collected at the locations 23101, 23102, and 23103, the processor may infer the observations correspond to different areas. However, as the robot continues to operate and new image data is collected, the processor may recognize that new image data is an extension of the previously mapped areas based previous observations 23100. Eventually, the processor integrates the new image data with the previous image data and closes the loop of the spatial representation.

In some embodiments, the processor infers a location of the robot based on features observed in previously visited areas. For example, FIG. 339 illustrates observations 23200 of a camera of a robot at a first time point t0, at a second time point t1, and at a third time point t1. At the first time point t0, the processor observes a chair 23201 based on image data. At the second time point t1, the processor does not observe the chair 23201 but rather observes a window 23202 based on image data. At the third time point t2, the processor does not observe the window 23202 but rather observes a corner 23203 based on image data. As the robot operates, the processor may recognize an area as previously visited based on observing features 23201, 23202, and 23203 that were previously observed. The processor may use such features to localize the robot. The processor may apply the concept to determine on which floor of an environment the robot is located. For instance, sensors of the robot may capture information and the processor may compare the information against data of previously saved maps to determine a floor of the environment on which the robot is located based on overlap between the information and data of previously saved maps of different floors. In some embodiments, the processor may load the map of the floor on which the robot is located upon determining the correct floor. In some embodiments, the processor of the robot may not recognize the floor on which the robot is located. In such cases, the processor may build a new floor plan based on newly collected sensor data and save the map as a newly discovered area. In some cases, the processor may recognize the floor as a previously visited location while building a new floor plan, at which point the processor may appropriately categorize the data as belonging to the previously visited area.

In some embodiments, the processor loses localizations of the robot. For example, localization may be lost when the robot is unexpectedly moved, a sensor malfunctions, or due to other reasons. In some embodiments, during relocalization the processor examines the prior few localizations performed to determine if there are any similarities between the data captured from the current location of the robot and the data corresponding with the locations of the prior few localizations of the robot. In some embodiments, the search during relocalization may be optimized. Depending on the speed of the robot and change of scenery observed by the processor, the processor may leave bread crumbs at intervals wherein the processor observes a significant enough change in the scenery observed. In some embodiments, the processor determines if there is significant enough change in the scenery observed using Chi square test or other methods. FIG. 340 illustrates the robot 23400 and a trajectory 23401 of the robot 23400. At a first time point t0, the processor observes area 23402. Since the data collected corresponding to observed area 23402 is significantly different from any other data collected, the location of the robot 23400 at the first time point t0 is marked as a first rendezvous point and the processor leaves a bread crumb. At a second time point t1, the processor observes area 23403. There is some overlap between areas 23402 and 23403 observed from the location of the robot at first and time points t0 and t1, respectively. In determining an approximate location of the robot, the processor may determine that robot is approximately in a same location at the first and second time points t0 and t1 and the data collected corresponding to observed area 23403 is therefore redundant. The processor may determine that the data collected from the first time point t0 corresponding to observed area 23402 does not provide enough information to relocalize the robot. In such a case, the processor may therefore determine it is unlikely that the data collected from the next immediate location provides enough information to relocalize the robot. At a third time point t2, the processor observes area 23404. Since the data collected corresponding to observed area 23404 is significantly different from other data collected the location of the robot at the third time point t2 is marked as a second rendezvous point and the processor leaves a bread crumb. During relocalization, the processor of the robot 23400 may search rendezvous points first to determine a location of the robot 23400. Such an approach in relocalization of the robot is advantageous as the processor performs a quick search in different areas rather than spending a lot of time in a single area which may not produce any result. If there are no results from any of the quick searches, the processor may perform more detailed search in the different areas.

In some embodiments, the processor generates a new map when the processor does not recognize a location of the robot. In some embodiments, the processor compares newly collected data against data previously captured and used in forming previous maps. Upon finding a match, the processor merges the newly collected data with the previously captured data to close the loop of the map. In some embodiments, the processor compares the newly collected data against data of the map corresponding with rendezvous points as opposed the entire map as it is computationally less expensive. In embodiments, rendezvous points are highly confident. In some embodiments, a rendezvous point is the point of intersection between the most diverse and most confident data. For example, FIG. 341 illustrates confidence in the map/localization 23500, change in the scenery data observed 23501 and intersection 23502 of the confidence 23500 and the change in data observed 23501. Intersection point 23502 is the rendezvous point. In some embodiments, rendezvous points may be used by the processor of the robot where there are multiple floors in a building. It is likely that each floor has a different layout, color profile, arrangement, decoration, etc. These differences in characteristics create a different landscape and may be good rendezvous points to search for initially. For example, when a robot takes an elevator and goes to another floor of a 12-floor building, the entry point to the floor may be used as a rendezvous point. Instead of searching through all the images, all the floor plans, all LIDAR readings, etc., the processor may simply search through 12 rendezvous points associated with 12 entrance points for a 12-floor building. While each of the 12 rendezvous points may have more than one image and/or profile to search through, it can be seen how this method reduces the load to localize the robot immediately within a correct floor. In some embodiments, a blind folded robot (e.g., a robot with malfunctioning image sensors) or a robot that only know a last localization may use its sensors to go back to a last known rendezvous point to try to relocalize based on observations from the surrounding area. In some embodiments, the processor of the robot may try other relocalization methods and techniques prior returning to a last known rendezvous point for relocalization.

Figure 342A:
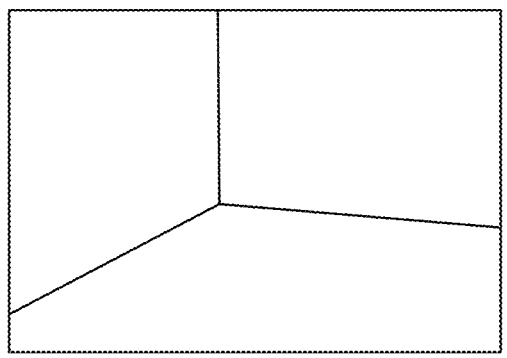
Figure 342B:
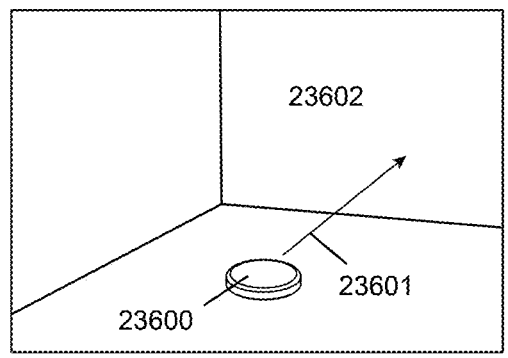
Figure 342C:
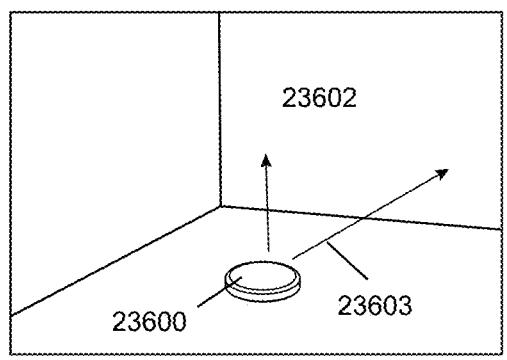
Figure 343A:
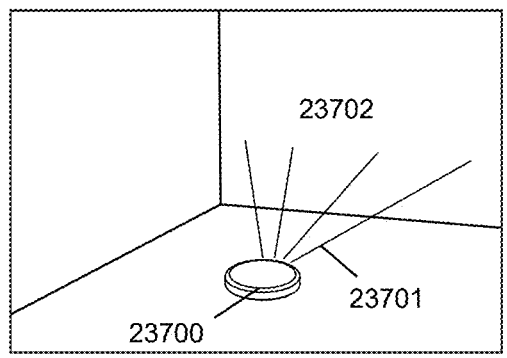
Figure 343B:
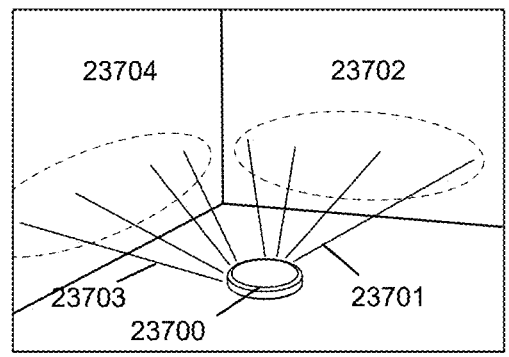
Figure 343C:
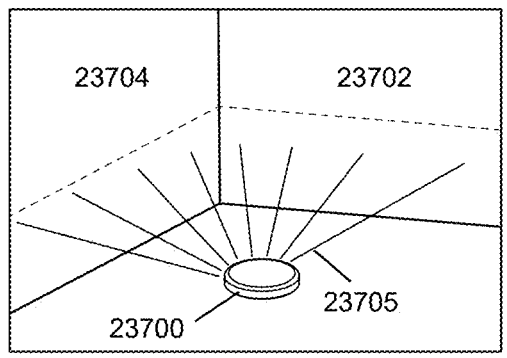

In some embodiments, the processor of the robot may use depth measurements and/or depth color measurements in identifying an area of an environment or in identifying its location within the environment. In some embodiments, depth color measurements include pixel values. The more depth measurements taken, the more accurate the estimation may be. For example, FIG. 342A illustrates an area of an environment. FIG. 342B illustrates the robot 23600 taking a single depth measurement 23601 to a wall 23602. FIG. 342C illustrates the robot 23600 taking two depth measurements 23603 to the wall 23602. Any estimation made by the processor based on the depth measurements may be more accurate with increasing depth measurements, as in the case shown in FIG. 342C as compared to FIG. 342B. To further increase the accuracy of estimation, both depth measurements and depth color measurements may be used. For example, FIG. 343A illustrates a robot 23700 taking depth measurements 23701 to a wall 23702 of an environment. An estimate based on depth measurements 23701 may be adequate, however, to improve accuracy depth color measurements 23703 of wall 23704 may also be taken, as illustrated in FIG. 343B. In some embodiments, the processor may take the derivative of depth measurements 23701 and the derivative of depth color measurements 23703. In some embodiments, the processor may use a Bayesian approach, wherein the processor may form a hypothesis based on a first observation (e.g., derivative of depth color measurements) and confirm the hypothesis by a second observation (e.g., derivative of depth measurements) before making any estimation or prediction. In some cases, measurements 23705 are taken in three dimensions, as illustrated in FIG. 343C.

In some embodiments, the processor of the robot may use visual clues and features extracted from 2D image streams for local localization. These local localizations may be integrated together to produce global localization. However, during operation of the robot, streams of images coming in may suffer from quality issues arising from a dark environment or relatively long continuous stream of featureless images arising due to a plain and featureless environment. Some embodiments may prevent the SLAM algorithm from detecting and tracking the continuity of an image stream due to the FOV of the camera being blocked by some object or an unfamiliar environment captured in the images as a result of moving objects around, etc. These issues may prevent a robot from closing the loop properly in a global localization sense. Therefore, the processor may use depth readings for global localization and mapping and feature detection for local SLAM or vice versa. It is less likely that both sets of readings are impacted by the same environmental factors at the same time whether the sensors capturing the data are the same or different. However, the environmental factors may have different impacts on the two sets of readings. For example, the robot may include an illuminated depth camera and a TOF sensor. If the environment is featureless for a period of time, depth sensor data may be used to keep track of localization as the depth sensor is not severely impacted by a featureless environment. As such, the robot may pursue coastal navigation for a period of time until reaching an area with features.

In embodiments, regaining localization may be different for different data structures. While an image search performed in a featureless scene due lost localization may not yield desirable results, a depth search may quickly help the processor regain localization of the robot and vice versa. For example, depth readings impacted by short readings caused by dust, particles, human legs, pet legs, a feature that is located at a different height, or an angle, may remain reasonably intact within the timeframe in which the depth readings were unclear. When trying to relocalize the robot, the first guess of the processor may comprise where the processor predicts the location of the robot to be. Based on control commands issued to the robot to execute a planned path, the processor may predict the vicinity in which the robot is located. In some embodiments, a best guess of a location of the robot may include a last known localization. In some embodiments, determining a next best guess of the location of the robot may include a search of other last known places of the robot, otherwise known as rendezvous points (RP). In some embodiments, the processor may use various methods in parallel to determine or predict a location of the robot.

FIG. 344 illustrates an example of a corner 23800 that may be detected by a processor of a robot based on sensor data and used to localize the robot. For instance, a camera positioned on the robot 23801 captures a first image 23802 of the environment and detects a corner 23803 at a first time point t0. At a second time point t1, the camera captures a second image 23804 and detects a new position of the corner 23802. The difference in position 23805 between the position of corner 23802 in the first image 23803 and the second image 23804 may be used in determining an amount of movement of the robot and localization. In some embodiments, the processor detects the corner based on change in pixel intensity, as the rate of change in pixel intensity increases in the three directions that intersect to form the corner.

In some embodiments, the displacement of the robot may be related to the geometric setup of the camera and its angle in relation to the environment. When localized from multiple sources and/or data types, there may be differences in the inferences concluded based on the different data sources and each corresponding relocalization conclusion may have a different confidence. An arbitrator may choose and select a best relocalization. For example, FIG. 345 illustrates an arbitrator proposing four different localization scenarios, the first proposal (proposal 1) having the highest confidence in the relocalization proposed and the last proposal (proposal 4) having the lowest confidence in the relocalization proposed. In embodiments, the proposal having the highest confidence in the relocalization of the robot may be chosen by the arbitrator.

In some embodiments, the processor of the robot may keep a bread crumb path or a coastal path to its last known rendezvous point. For example, FIG. 346A illustrates a path 24000 of the robot, beginning at a charging station 24001 and ending at 24002, wherein the processor of the robot has lost localization. A last known rendezvous point 24003 is known by the processor. The processor also kept a bread crumb path 24005 to the charging station 24001 and a break crumb path 24006 to the rendezvous point 24003. FIG. 346B illustrates a safe bread crumb path 24007 that the robot follows back to the charging station 24001. The bread crumb path 24007 generally remains in a middle area of the environment to prevent the robot from collisions or becoming stuck. FIG. 346C illustrates a coastal path 24008 that the robot may follow to return to the charging station 24001. FIG. 346D illustrates a coastal path 24009 that the robot may follow to last known point 24010 in which a reliable localization was determined. Although in going back to the last known location 24010 the robot may not have functionality of its original sensors, the processor may use data from other sensors to follow a path back to its last known good localization as best as possible because the processor kept a bread crumb path, a safe path (in the middle of the space), and a coastal path. In embodiments, the processor may be any of a bread crumb path, a safe path (in the middle of the space), and a coastal path. In embodiments, any of the bread crumb path, the safe path (in the middle of the space), and the coastal path comprise a path back to a last known good localized point, one point to a last known good localized point, two, three or more points to a last known good localized point, and to the start. In executing any of these paths back to a last known good localization point, the robot may drift as it does not have all of its sensors available and may therefore not be able to exactly follow a trajectory as planned. However, because the last known good localized point may not be too far, the robot is likely to succeed. The robot may also succeed in reaching the last known good localized point as the processor may use other methods to follow a coastal localization and/or because the processor may select to navigate in areas that are wide such that even if the robot drifts it may succeed.

FIG. 347 illustrates an example of a flowchart illustrating methods implemented in a localization arbitrator algorithm. The localization arbitrator algorithm constantly determines confidence level of localization and examines alternative localization candidates to converge to a best prediction. The localization arbitrator algorithm also initiates relocalization and chooses a next action of the robot in such scenarios.

Figure 348A:
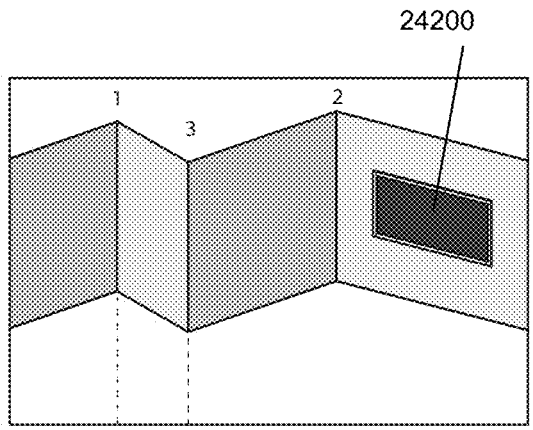
Figure 348B:
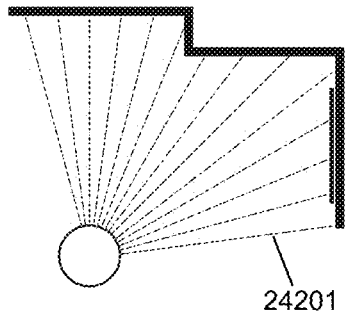
Figure 348C:
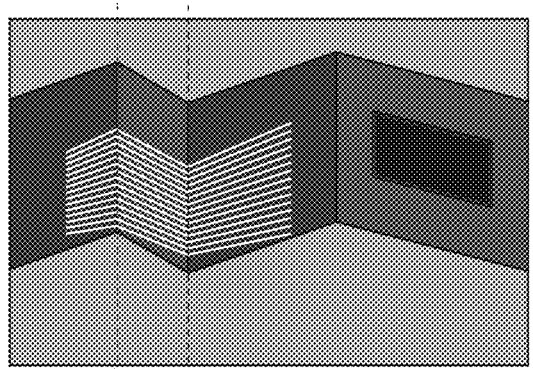
Figure 348D:
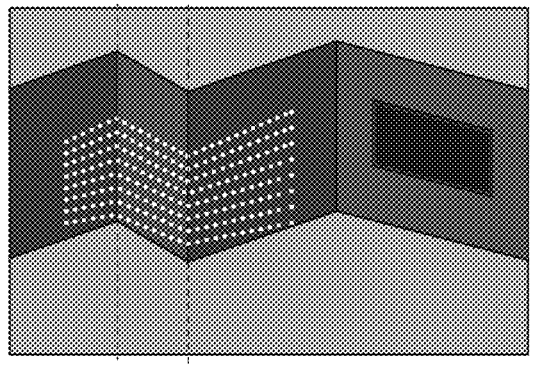
Figure 348E:
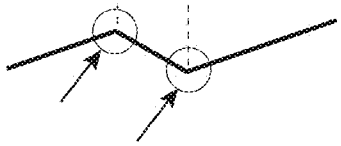

In yet another example, a RGB camera is set up with a structured light such that it is time multiplexed and synched. For instance, the camera at 30 FPS may illuminate 15 images of the 30 images captured in one second with structured light. At a first timestamp, an RGB image may be captured. In FIG. 348A, the processor of the robot detects a set of corners 1, 2 and 3 and TV 24200 as features based on sensor data. In FIG. 348B, a next time slot, the area is illuminated and the processor of the robot extracts L2 norm distances 24201 to a plane. With more sophistication, this may be performed with 3D data. In addition to the use of structured light in extracting distance, the structured light may provide an enhanced clear indication of corners. For instance, a grid like structured light projected onto a wall with corners is distorted at the corners. This is illustrated in FIGS. 348C and 348D, wherein the distortion is shown to correlate with the corners shown in FIGS. 348A and 348E. In a close-up image of the structured light, FIG. 348F illustrates the structured light when projected on a flat wall 24202 in comparison to the distorted structured light when projected on a wall with a corner 24203. The distorted structured light extracted from the RGB image based on examining a change of intensity and filters correlates with corners. Because of this correspondence, the illumination and depth may be used to keep the robot localized or help regain localization in cases where image feature extraction fails to localize the robot.

In some embodiments, an image may be segmented to areas and a feature may be selected from each segment. In some embodiments, the processor uses the feature in localizing the robot. In embodiments, images may be divided into high entropy areas and low entropy areas. In some embodiments, an image may be segmented based on geometrical settings of the robot. FIG. 349 illustrates various types of image segmentations. For instance, image segmentation for feature extraction based on entropy segmentation 24300, exposure segmentation 24301, and geometry segmentation 24302 based on geometrical settings of the robot. In embodiments, the processor of the robot may extract a different number of features from different segmented areas of an image. In some embodiments, the processor dynamically determines the number of features to track based on a normalized trust value that depends on quality, size, and distinguishability of the feature. For example, if the normalized trust value for five features are 0.4, 0.3, 0.1, 0.05, and 0.15, only features corresponding with 0.4 and 0.3 trust values are selected and tracked. In such a way, only the best features are tracked.

Figure 351A:
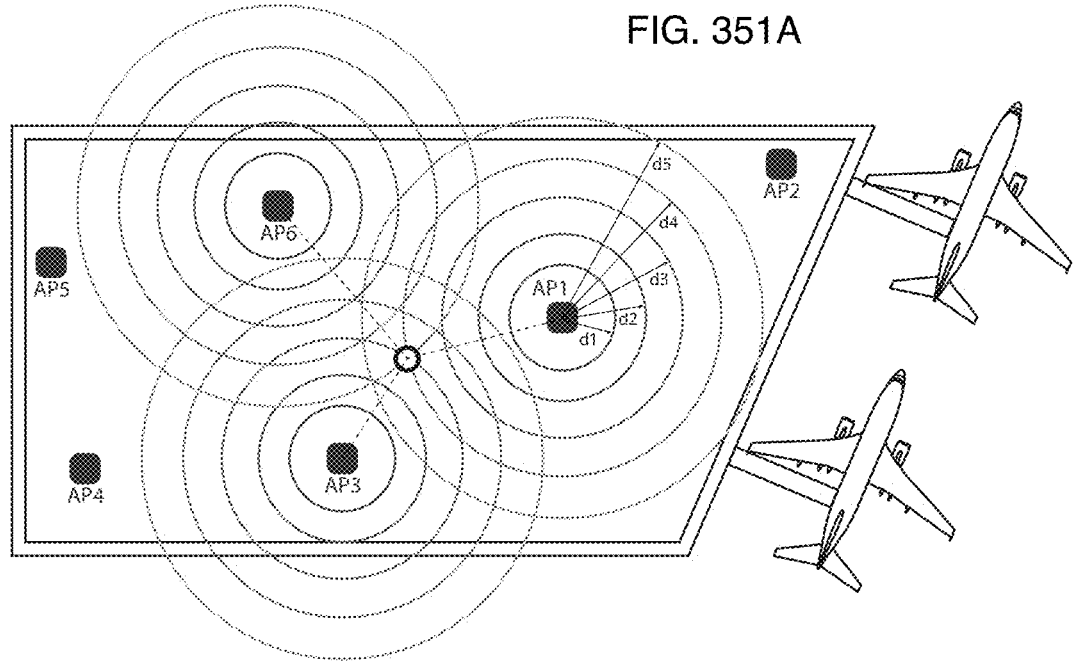
Figure 351B:
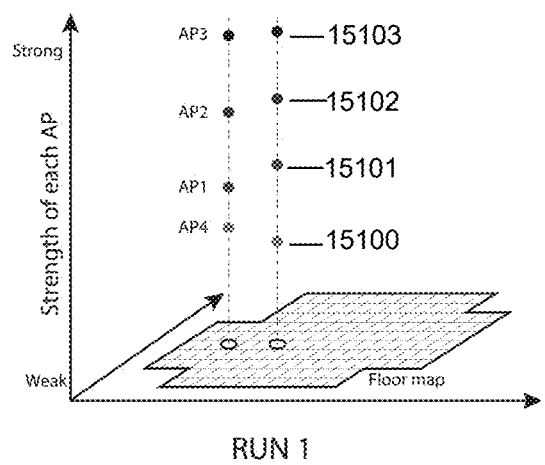
Figure 351C:
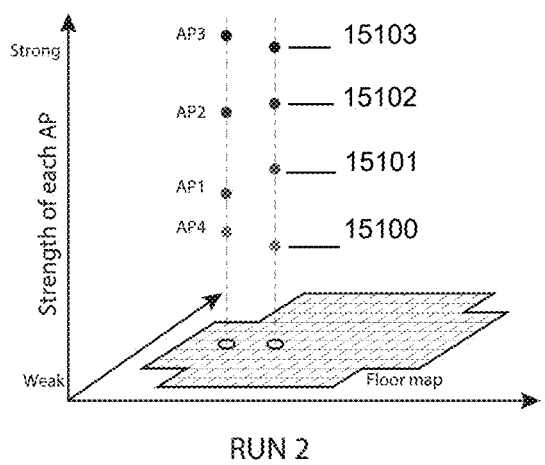

In another example, neural networks may be used in localization to approximate a location of the robot based on wireless signal data. In a large indoor area with a symmetrical layout, such as airports or multi-floor buildings with a similar layout on all or some floors, the processor of the robot may connect the robot to a strongest Wi-Fi router (assuming each floor has one or more Wi-Fi routers). The Wi-Fi router the robot connects to may be used by the processor as an indication of where the robot is. In consumer homes and commercial establishments, wireless routers may be replaced by a mesh of wireless/Wi-Fi repeaters/routers. For example, FIG. 350 illustrates wireless/Wi-Fi repeaters/routers 15000 at various levels within a home. In large establishments such as shopping malls or airports they may be access points. For example, FIG. 351A illustrates an example of an airport with six access points (AP1 to AP6). The processor of the robot may use a neural network to approximate a location of the robot based on a strength of signals measured from different APs. For instance, distance d1, d2, d3, d4, and d5 are approximately correlated to strength of the signal that is received by the robot which is constantly changing as the robot gets farther from some APs and closer to others. At timestamp t0, the robot may be at a distance d4 from AP1, a distance d3 from AP3, and a distance d5 from AP6. At timestamp t1, the processor of the robot determines the robot is at a distance d3 from AP1, a distance d5 from AP3, and a distance d5 from AP6. As the robot moves within the environment and this information is fed into the network, a direction of movement and location of the robot emerges. Over time, the approximation in direction of movement and location of the robot based on the signal strength data provided to the network increases in accuracy as the network learns. Several methods such as least square methods or other methods may also be used. In some embodiments, approximation may be organized in a simple atomic way or multiple atoms may work together in a neural network, each activated based on the training executed prior to runtime and/or fine-tuned during runtime. Such Wi-Fi mapping may not yield accurate results for certain applications, but may be as sufficient as GPS data is for an autonomous car when used for indoor mobile robots (e.g., a commercial airport floor scrubber). In a similar manner, autonomous cars may use 5G network data to provide more accurate localization than previous cellular generations.

In some embodiments, wherein the accuracy of approximations is low, the approximations may be enhanced using a deep architecture that converges over a period of training time. Over time, the processor of the robot determines a strength of signal received from each AP at different locations within the floor map. This is shown for two different runs in FIGS. 351B and 351C, wherein the signal strength from AP1 to AP4 is determined for different locations within the floor map. In the first run, sensors of the robot observe signal strengths from APs as a function of time and a location of the robot. In the first run, as the robot moved from position 1 to position 2, signal 15100 weakened a little, signal 15101 strengthened and signals 15102 and 15103 remained substantially the same. In the second run, the robot moves from position 1 to position 2. Note trajectory does not have to be the same as long as the processor obtains measurements from each position. Sensors of the robot may collect multiple measurements from each position in the same run. Although the places of the APs are fixed, because of different noise factors and other variables, the signal strengths are not deterministic. In the second run, the signal strength 15102 at position 1 remained almost the same but at position 2 reduced in strength by a minimal amount. Signal 15103 slightly increased in strength in moving from position 1 to 2 at a faster pace than in run 1. The same was observed with signal 15101while the signal strength of 15100 remained substantially the same. FIG. 351D illustrates run 1 to run n combined. Eventually, the data collected on signal strength at different locations are combined to provide better estimates of a location of the robot based on the signal strengths from different APs received. In embodiments, stronger signals translate to less deviation and more certainty. In some embodiments, the AP signal strength data collected by sensors of the robot are fed into the deep neural network model along with accurate LIDAR measurements. In some embodiments, the LIDAR data and AP signal strength data are combined into a data structure then provided to the neural network such that a pattern may be learned and the processor may infer probabilities of a location of the robot based on the AP signal strength data collected, as shown in FIG. 352.

Some embodiments execute a search to determine a location of the robot, wherein a number of distances to points visible to the robot may be chosen to be searched against available maps (e.g., maps of different floors) to locate the robot. The denser the population of distances, the higher the confidence, however, more computational resources become at stake. A low resolution search based on a subset of distances may initially be executed to determine areas with a high probability of matching that may be searched in more detail during a next step. FIG. 353 illustrates an example of a process of relocalizing a robot based on partial data of an existing map, wherein (A) the robot 9200 uses sensors to measure distances 9201 to walls 9202 of the environment 9203, the measurement device hitting the wall in some areas 9204 and missing contact with an object in other areas 9205. A processor of the robot observes (B) a partial map 9206, based on the distance measurements 9201. The processor may (C) perform a search in a low resolution version of a previous map 9207 of the environment 9203 to determine areas with a high probability of matching the partial map 9206 then performs a detailed search within those areas. During the search, the processor may (D) rotate the partial map 9206 to see if it fits with different the previous map 9207 after being rotated. In some embodiments, the processor may not find a match between current surroundings and a first previous map. In such cases, the processor may begin searching for a match with other previously generated floorplans. In some embodiments, distinct features extracted from the distance readings may be searched for in previous maps. If the distances indicate a planar wall in a 3D scan or a line in 2D scan, too many matches are possible and a proper search result is not yielded. When the processor is unable to localize the robot or a confidence score is below a predetermined threshold, the robot moves to a secondary position to gather more distance measurements and repeat the process. In some cases, in moving to the secondary point, the robot may not follow restrictive instructions provided by the user. For example, the robot may enter a no-go zone without the processor knowing as the location of the robot is unknown until the processor relocalizes the robot. As the robot moves to the secondary location, data is gathered along the way to the secondary location and at certain points the robot may rotate to scan the surroundings.

In some embodiments, the robot starts performing work (e.g., cleaning coverage) while the processor tries to relocalize. In some embodiments, the processor spends a predetermined amount of time/effort to relocalize before attempting to perform work. If the processor does not find a match to or an association of its current surroundings to a previous map, it builds a new map. In some embodiments, a new map building process starts as soon as the robot turns on and continues while the processor attempts to relocalize the robot. If relocalization or finding a match with the proper map fails, the processor loads and adapts the newly built map. This way, the processor does not have to start the map building process only after its attempts to relocalize the robot fails. The processor may load and adapt the areas mapped so far at any point when it is determined or discovered that the newly built map matches with a previous map or is an extension of the previous map. In the event of the latter, the processor merges the new map with the previous map at overlapping points. In one example, a robot may begin working in a room within an environment of which the processor of the robot has a map of. However, the map does not include the room as the robot has not previously visited the room due to a door of the room being consistently closed. FIG. 354A illustrates the robot 9300 within the environment 9301 beginning work at point A. A door 9302 to room 9303 is closed during the first few runs of the robot 9300, therefore, the processor does not observe or map room 9303. FIG. 354B illustrates the robot 9300 in a later run. The robot 9300 is initially placed in room 9303, however, the processor cannot relocalize as the room 9303 has not been previously mapped. In the meantime, the processor begins building a new map. As a result of failed relocalization, the robot drive to position C and the processor scans the area and attempts to relocalize. Upon failing to relocalize again, the processor loads the new map it has been creating since point A and the robot 9300 starts working by covering the entire room 9303. The robot 9303 then drives outside of the room 9303 as it continues to work. At position E, the processor discovers that room 9303 is an extension to a previously known floorplan and modifies the map to include room 9303. This may prompt a confirmation or notification from a user on an application or other user interface confirming the addition of room 9303 to the map.

In some embodiments, the processor of the robot uses visual clues and features extracted from 2D image streams for local localization. These local localizations are integrated together to produce global localization. For example, FIG. 355 illustrates data captured by a first camera, a second camera, an odometer, and an IMU. The image captured by the second camera is compared with the image captured by the first camera to determine a displacement that is fed, together with data from the odometer and the IMU, to an online matching engine that matches the last few data captured by the three sources. The output of the matching engine and the first camera are used in calculating a first displacement from a last known position of the robot. The displacement is stored in a database with time stamp and is used to calculate a next actuation of the robot to remain on a planned path. Within the database, key frames for association are identified. A sparsifying engine receives the image captured by the first camera and the next actuation of the robot. Key features from the 3D point cloud are identified. As more data is captured associations between frames become denser. Upon completion of a work session, the processor solves for relations and closes the loop. When offline, larger sets are matched 22112. FIG. 356 illustrates a stack of masks.

During operation of the robot, streams of images may suffer from quality issues caused by dark environments; relatively long, continuous featureless images in cases where large areas of the environment are plain and featureless, preventing the SLAM algorithm from detecting and tracking continuity in the stream of images; a dynamic obstacle blocking the FOV of a camera long enough to prevent the SLAM algorithm from detecting and tracking continuity of the stream of images; and a rearrangement of objects within the environment resulting in the environment appearing unfamiliar. When the processor of the robot loses localization of the robot, or otherwise discovers that current readings (e.g., distance or image readings) do not match what is expected based on the map, the processor needs to regain localization of the robot. The processor searches for neighboring points within the map (e.g., distances to neighboring points or images pertaining to neighboring points) to discover a match, then uses the matching point or image as a current location of the robot. In some embodiments, the processor combines new sensor data corresponding with newly discovered areas to sensor data corresponding with previously discovered areas based on overlap between sensor data. FIG. 357A illustrates a workspace 18200. Area 18201 is the mapped area, area 18202 is the area that has been covered by the robot, and area 18203 is the undiscovered area. After covering area 18202, the processor of the robot may cease to receive information from a sensor used in SLAM at a location 18204. The processor may use sensor data from other sensors to continue operation. The sensor may become operable again and the processor may begin receiving information from the sensor at a location 18205, at which point the processor observes a different part of the workspace 18200 than what was observed at location 18204. FIG. 357B illustrates the workspace 18200, area observed by the processor 18206, remaining undiscovered area 18203, and unseen area 18207. The area of overlap 18208 between the mapped areas 18201 and the area observed 18206 may be used by the processor to combine sensor data from the different areas and relocalize the robot. The processor may use least square method, local or global search methods, or other methods to combine information corresponding to different areas of the workspace 18200. In some cases, the processor may not immediately recognize any overlap between previously collected sensor data and newly observed sensor data. For example, FIG. 358 illustrates a position of the robot at a first time point t0 and second time point t1. A LIDAR of the robot becomes impaired at second time point t1, at which point the processor has already observed area 18300. The robot continues to operate after the impairment of the sensor. At a third time point t2, the sensor becomes operable again and observes area 18301. In this example, other sensory information was impaired and/or was not enough to maintain localization of the robot due minimal amount of data collected prior to the sensor becoming impaired and the extended time and large space traveled by the robot after impairment of the sensor. The area 18301 observed by the processor appears different than the workspace previously observed in area 18300. Despite that, the robot continues to operate from the location at third time point t2 and sensors continue to collect new information. At a particular point, the processor recognizes newly collected sensor data that overlaps with sensor data corresponding to area 18300 and integrates all the previously collected data with the sensor data corresponding with area 18301 at overlapping points such that there are no duplicate areas in the most updated map.

After building the map, it is easier for the processor of the robot to relocalize the robot within the environment. Under normal circumstances and a relatively static environment, the processor gains high confidence in a location of the robot upon initial relocalization. Therefore, there is no need for the robot to move much for the processor to gain enough confidence to consider the robot relocalized within the map. However, when the environment is changing (e.g., with dynamic obstacles, movement of the charging station, or accidental bumping of the robot), the robot may move a longer distance to increase the confidence level and before the processor approves the map. In this particular situation, an initial move of the robot may be in a direction of a virtual barrier if the virtual barrier is placed too close to an initiation point of the robot and the robot may cross the virtual barrier during its attempt to relocalize. The robot may turn back to a correct side of the virtual barrier after the processor realizes (i.e., upon relocalization) that the robot is in a restricted area. FIG. 359 illustrates a robot 4500 crossing a virtual barrier 4501 into a restricted zone 4502 during relocalization 4503 and leaving the restricted zone 4502 after relocalization 4503. This behavior may be configured based on a preference of the user.

Some embodiments employ resilient real-time teleporting tracing. For example, the processor of the robot uses QSLAM to successfully relocalize after being forcibly displaced by three meters. FIG. 360 illustrates a table of various robot brands and a number of successful relocalizing attempts after being forcibly displaced by one, two, and three meters. In some embodiments, the processor of the robot uses data from an imaging device or distance measuring device to perform volumetric localization. FIG. 361 illustrates an example of an HD depth map formed using data from a depth sensor and an HD map formed using data from an image sensor.

In embodiments, tracking failures or sudden displacements are detected and recovered while maintaining map integrity. In embodiments, displacements are detected and accounted for in real-time, on the fly. While some SLAM systems provide a degree of robustness, the SLAM system disclosed herein provides tolerance to much larger displacements with much higher percentage of success. For example, the robot disclosed herein provides 100% seamless recovery of pose with no map corruption after two meters of displacement. In some embodiments, the robot travels throughout the environment while successive swarm points are captured by sensors from different poses. In some embodiments, the processor of the robot uses image frames concurrently captured from different poses to identify locations of persistent physical objects within the environment. The processor may also use the image frames to identify non-persistent objects on a floor of the environment, the identification of the objects potentially triggering an avoidance maneuver or a particular avoidance mechanism. In some embodiments, Riemannian geometry is used for Levenberg- Marquardt, Newton method, Gauss Newton method, Trust region method, QR and Cholesky decomposition graph optimization. In some embodiments, real-time resilience of the processor tracks a sudden displacement of the robot of up to one meter with more than 95% certainty, a sudden displacement of the robot of up to one and a half meters with more than 90% certainty, a sudden displacement of the robot of up to two meters with more than 85% certainty, a sudden displacement of the robot of up to two and a half meters with more than 80% certainty, and a sudden displacement of the robot of up to three meters with more than 70% certainty.

In some embodiments, the processor begins a search for a position of the robot when the displacement is large or tracking fails. FIG. 362 illustrates a sliding window 1700 sliding through the map. The processor selects and orders corner locations based on how distinguishable the corners are. The strongest corner location is used for a search of a position of the robot. In some embodiments, the processor of the robot recovers from tracking failure by searching an immediate observation of a sensor in a database of sorted prior established features with map associations. Observation data may be captured by both primary and secondary sensors, each comprising cameras and/or LIDAR.

In some embodiments, a first sensor captures depth and a second sensor captures an image. Using depth data and image data, each pixel or group of pixels are associated with a depth value. FIG. 363 illustrates a FOV 22900 of an image sensor capturing an image of a scene. Groups of pixels 22901 of an image are each associated with different depth values. In some embodiments, image data and depth data are combined to form a map wherein each pixel is associated with a depth value in a particular frame of reference. In some embodiments, the processor localizes the robot depth-wise and pixel-wise in a vertical direction and horizontal direction. In some embodiments, multiple camera and depth measuring units simultaneously capture images and depth information for generating a high dimension map for high dimension localization. When multiple devices capable of high dimensional mapping and localization are used in combination for mapping and localization, a hyper dimensional map is created and evolves over time. FIG. 364 illustrates an example of a process for navigation of a robot, wherein the process determines whether a feature and measured distance are a match. If there is a match, a processor of the robot uses the information to navigate. If there is no match, the process is repeated. FIG. 365 illustrates an example of a process for navigation of a robot, wherein data from two sensor types are fused, from which a position of the robot is inferred and a map is determined. The process then checks for blind spots, if there are no blind spots the robot continues. If there is a blind spot the robot slows down such that the blind spot is eliminated and the blind spot is filled in from inferred information. FIG. 366 illustrates an example of a process for localizing a robot, wherein sensor data is fused, from which a processor of the robot localizes against a coordinate system and updates a reference coordinate system. The process is continuously repeated. FIG. 367 illustrates an example of a process for localizing a robot, wherein a feature is extracted from captured sensor data and an attempt to match the feature to known features within an environment is made. If there is a match, the robot is localized, and if not, the process is repeated.

FIG. 368 illustrates a process of SLAM, wherein 1. a first runtime at a certain time is executed by the robot, wherein the processor uses visual odometry in real-time and obstacle avoidance to produce a low resolution map with relaxed state estimation requirements and by ignoring drift as the robot performs best effort coverage; 2. the first runtime finishes; 3. the robot docks and the processor of the robot recalculates the state estimation with recorded data with high resolution and tightened requirements; 4. the processor of the robot produces a high resolution map; 5. during a next run, the processor of the robot uses the high resolution map to avoid dealing with the backend or spatial uncertainty estimation and the processor only relocalizes the robot within the high resolution map; and 6. localization resolution or localization frequency is reduced or localization frequency is dynamic (e.g., at times the robot is localized within the high resolution map and at times localization resolution or accuracy is adoptively reduced). In some embodiments, loop closure is executed incrementally and trajectory drift and map misalignment are corrected at each point of loop closure. In some embodiments, a frontend estimates a current movement state of the robot, updates the movement state incrementally during runtime based on new data, and determines a postponed batch state estimation after the run is complete and the robot unengaged with activities such that plenty of computational power is available for slow processing. In some embodiments, some or all batch state estimation is performed on the cloud. In some embodiments, batch state estimation is performed during runtime at lower intervals to keep drift and error in control during the runtime. In some embodiments, batch state estimation is performed during runtime at lower resolution. In some embodiments, some or all batch state estimation is performed on the cloud. In embodiments, postponement of a portion of batch state estimation and reduced interval or resolution of batch state estimation provides a reduction of computational intensity during runtime. In some embodiments, incremental state estimation comprises the use of least square methods to solve maximum likelihood MAP/MLE problems. In a preferred embodiment, the least square methods are replaced by a Theil-Sen estimator to improve computational efficiency in comparison to RANSAC and other methods used in the art, wherein the Theil-Sen estimator fits a line to sample points. Theil-Sen estimator also provides advantages in terms of robustness against outliers and provides high asymptotic efficiency in comparison with least square estimation. Advantages in robustness and efficiency gains provided through the use of Theil-Sen estimation offsets the downside effects of postponing at least a portion of batch state estimation to after the completion of the run or reducing frequency of batch state estimation. Reducing the frequency of backend computations provides processing at a higher level of computational hierarchy.

Loop closure frequency, a size of loop to be closed, and nature of loop closure impact performance, consistency of the map, and accuracy of localization. FIG. 369 illustrates closing the loop during rigid box mapping and coverage 6800 within certain sized boxes 6801. Although consecutive boxes 6801 are not exactly the same size and conform to the environmental boundaries, they are restricted to a minimum and maximum size and certain shapes (i.e., rectangle and square). In some embodiments, loop closure occurs in the background while the robot performs coverage. In such a case, there is no observable behavior to an outside viewer (e.g., consumer) identifiable as loop closure. Seamless loop closure may also be used by robots performing tasks other than coverage. For instance, during polymorphic path planning, wherein a path is planned in real-time based on real-time observation of the environment, loop closure is dynamic in real-time and morphs into any shape (unrestricted to rectangles or squares) depending on environmental characteristics. For example, a boustrophedon path of a robot covering a room morphs into the shape of the room. In a room comprising a hard floor and soft carpeted floor, the robot covers the soft floor coherently and then the hard floor coherently. This is especially desirable when the work performed or settings are dependent on a type of floor. For example, speed of brush motors may be dependent on a type of flooring. Floor types may be detected by a camera, an ultrasound sensor, an optoelectronic sensor, an electrical current sensor, provided as input to an application paired with the robot by drawing zones within a map displayed by the application, or combination of the above. FIG. 370 illustrates a dynamic and real-time boustrophedon path 6900 of a robot when a floor type of environment 6901 is the same everywhere and dynamic and real-time boustrophedon paths 6902 and 6903 when environment 6901 has hard floor and carpet, respectively. The robot executes path 6902 then path 6903.

In some embodiments, a new capture of sensor data is combined with a group of previously captured sensor data. In some embodiments, new sensor data is combined with all previously captured sensor data. In some embodiments, a new capture of sensor data is combined with a group of previously captured sensor data having a different weight than all previously captured sensor data. In some embodiments, a new capture of sensor data is combined with a different weight than a group of previously captured sensor data. In some embodiments, some previously captured sensor data is excluded from being combined with newly captured sensor data. Integration of new data with older data may undergo a filtering mechanism or additive, multiplicative, or convolution integration. Integration of new data with older data may depend on a confidence score, time stamp, nature, and resolution of the sensor capturing the data. For example, given a highly confident map, a new low confident reading is rejected to avoid destruction of a good map. In contrast, a new high confidence reading improves a low confident map, thus integration of the new reading is allowed. Integration of data as described may be applied in other cases, for example, an obstacle, an object, etc.

In some embodiments, the map is divided into small, medium and large tiles. For example, each large tile of the map is divided into a number of smaller tiles. This concept is similar to multiple resolution maps. In a multiple resolution map, the processor of the robot determines which large tile the robot is positioned on, then determines which small tile from a subset of tiles that form the large tile the robot is positioned on. FIG. 371 illustrates a subset of small tiles 24000 on which a robot 24001 is positioned. Upon determining a large tile on which the robot is positioned, a processor of the robot 24000 determines which small tiles 24001 the robot is positioned on. In some embodiments, the processor of the robot determines one or more tiles the robot is positioned on with a certain probability. In embodiments, tile size is determined based on a need for performing timely control measures. In one example, the desired probability of the one or more tiles on which the robot is positioned is 95%. Depending on measurement noise and reading accuracy, a certain minimum number of readings (n) are required. To solve an equation with n inputs, a certain amount of computational time is required. However, during the certain amount of computational time the robot moves onto another tile. As a result, the objective of having a control measure based on tile size is not met. A constraint of accurate estimation (e.g., maximum tile size) is a contribution to the estimation being obsolete by the time the estimation is completed. Even in tightening the constraint and using a smaller tile size, the robot leaves the tile faster while more time is required for the processor to estimate which tile the robot was positioned on at the time the process of estimation started. Rather than reducing the tile size or tightening the constraints, constraints are loosened, requiring a certain probability (e.g., %95) of the tile on which the robot is positioned, and a larger tile is used, such as tile 24100 the robot 24001 is positioned on in FIG. 372. Assuming measurement accuracy and noise are the same as the previously described scenario, a smaller number of readings, and therefore, a smaller number of equations and computational time are required to estimate to localize the robot on a larger tile. With less computational time passing from a beginning of the estimation process until the output estimate, the robot moves less and the estimation is more relevant. It is more likely the robot is still positioned on the estimated tile at an end of the estimation process in a case where tiles are larger and robot speed is constant. However, knowing the tile on which the robot is positioned does not fully solve the problem but is a step towards the solution. Though a smaller number of inputs are required for estimating a location of the robot, the inputs are chosen intelligently. Readings that fit a certain criterion of being different from others are selected, thereby preventing a waste of computational time on counting redundant measurements.

Once the processor of the robot estimates which large tile the robot is positioned on, the processor uses new incoming measurements to determine which small tile from a set of small tiles the robot is positioned on. New incoming measurements are compared against observation of the surroundings corresponding with different small tiles to determine which observations fits well with the new incoming measurement. FIG. 373 illustrates a set of small tiles 24200 within a large tile 24201. The observations of the surroundings corresponding with a position of the robot 24202 on tile a does not fit well with the newly coming measurements and is an even worse fit with a position of the robot on tile b. With a simple search in a small state space, the processor determines a location of the robot within the small tile map. This second step may be performed using multiple approaches, such as a statistical ensemble, simulation method, or search. In one instance, a particle filter method imagines a number of robots, each robot positioned on a different small tile and each observing a respective map corresponding with their location. Multiple particles are carried forward, reducing a number of particles needed. In another instance, a simple search or comparative validation continuously localizes the robot for a small tile criteria of a set of tiles forming a larger tile robot is estimated to be positioned on (determined in the first step). As such, in some embodiments, a multivariate estimation problem with highly dense data points necessary to meet a high certainty/accuracy requirement is decomposed to a lower resolution requirement in a fort step followed by a comparative search to achieve the required resolution. A coarse to fine localization allows for quick localization with minimal computation time and refinement after. This decomposition is not specific to a grid map localization and further allows multithreading.

As explained herein, in multi-type landmark extraction, observation of a sophisticated type of landmark may be used sparsely and at intervals to determine which group of clusters of primal landmarks to search for in order to find a match. In some embodiments, images are clustered to reduce the search domain, as explained elsewhere herein. In some embodiments, content-based image retrieval is used to match similar images in a large database. Similarity may be defined based on color, texture, objects, primal shapes, etc. In some embodiments, a query image is captured in real-time and the processor determines which image in a database the query image correlates to. In some embodiments, a vector space model is used to create visual words from local descriptors, such as SIFT, wherein a visual vocabulary is the database of previously captured images. A subset of images may include objects of interest or a detected object. In some embodiments, images are indexed in a database. The localization methods described herein are not restricted to one implementation of SLAM. For example, a first type of landmark may be a visual type (e.g., primal shape in an image), a second type of landmark may be a grid map type, a third type of landmark may be an object detected in image, and a fourth type of landmark may be an enclosure in a 2D representation of the map (e.g., a room).

When an object to be observed by the robot or another device is known, or when a landmark is repeatedly observed, the association problem is reduced to a hierarchical search problem. For example, in the case of tracing a user trajectory, each camera is not required to perform facial recognition to identify the user from a database of possibly a billion users. In traditional facial recognition, with no a priori, facial features are extracted then a comparison of the features with features of all possible persons in a database is performed. However, when the user is identified by facial recognition in a first image captured by a first camera, a nearby second camera knows or infers that the identified person is likely to be in a second image captured by the second camera. The second camera extracts the features of a user captured in the second image and compares them directly to the features of the person identified by facial recognition in the first image captured by the first camera. In this way, the second camera only needs to determine if the features of the user in the second image match the expected set of features of the identified person in the first image. This approach may also be used with landmark association. When the processor of the robot has previously extracted a set of landmarks, the processor does not need to search and determine whether a newly observed landmark is associated with all previously observed landmarks. The processor only needs to run a search against landmarks expected to be observed within the vicinity of the robot.

In a first run, landmarks that are extracted from a laser scan or camera data are compared against any number of landmarks that have been observed a sufficient amount of times to determine if the newly observed landmarks are newly observed landmarks or previously observed and identified landmarks. When a landmark observation undergoes probabilistic criteria and is categorized as a previously observed and identified landmark, the landmark is categorized in a same category set as the previously observed landmark to which it matches. The category set then has one more variation of the landmark wherein the observation may be captured from a different angle, under different lighting conditions, etc. When no match to a previously observed landmark is found, the observed landmark becomes a first element of a new category set. As more observations are collected, a number of elements within the category set increases. When a number of elements in a category set is large enough, the landmark is considered highly observable. The larger the category set is, the more important the landmark is. In some embodiments, only category sets with a number of elements above a predetermined threshold are used for comparison against a landmark observation when determining the category. When a landmark is observed, the robot evaluates its own position and orientation in relation to the landmark with a probability of error.

In some prior art, landmarks are not identified, as extracting an edge or a line connecting a ceiling or floor to a wall was sufficient. However, with advancement of object recognition and algorithms, landmarks are identified as context associated with landmarks provides useful information. For example, instead of a line, an arch, or a blob on a ceiling, context oriented features are extracted and used as landmarks. For example, a TV, a fridge, a door frame, a window, a power socket, a bed, a dining table, a kitchen cabinet, may be observed as objects and their object types identified. A landmark database may include labels associated with different types of objects. In some embodiments, labels are probability based, wherein upon repeated observation and recognition of a same object type the probability of the object type increases to reach a confidence level. As identified objects may not constitute a sufficient number of landmarks, the identified landmarks may be used in addition to more primitive landmarks in legacy visual SLAM systems. While not all the landmark objects may be identified to have a human classification associated with them, the mere process of extracting a more sophisticated shape than just an arc, circle, blob, line, edge provides significantly more certainty upon repeated observation. For instance, a primal shape, such as a blob, can be easily mistaken. The blob may pertain to a light bulb or a white decorative object on a dark wall. A particular object, such as a power outlet, has a very distinctive shape with a degree of sophistication that prevents the object from being confused with other shapes or objects. Even in a case where the classification algorithm fails to identify the particular object type of the object, extraction of such a sophisticated shape without the particular object type still provides a degree of certainty when it is observed again. A downside of extracting an object without any further knowledge on context is repetition throughout the surroundings. Therefore, contextual visual localization is required, as proposed herein as a superior method over the prior art. For example, FIG. 374 illustrates a robot 24900 observing a power outlet 24901 and unidentifiable sophistically shaped objects 24902 in close proximity to the power outlet 24901 at a first time step 24903. At a later time step 24904, the robot 24900 detects the same power outlet 24901, however, this time the sophistically shaped objects 24902 are not observed and instead a differently shaped object 24905 is extracted and categorized as a new landmark.

As the robot travels within the environment, the processor uses EKF to estimate a position and an orientation of the robot from contextual landmarks. The position and orientation of the robot is iteratively updated, based on displacement of the robot, new observations of previously observed contextual landmarks, and new observation of previously unobserved contextual landmarks. When a landmark is categorized, the landmark may have a hierarchical importance value. For example, a primitive shape, such as an edge, a line, a blob, or an arc, may be found more often and at shorter distances while more sophisticated objects, such as a TV, a window frame, or a door frame, may be detected less frequently but are distinct. Covariance of two variables provides an indication of an existence or strength of correlation or linear dependence of the variables. A covariance matrix in the current state of the art provides a single type of landmark, while herein multiple types of landmarks (e.g., primal landmarks, sophisticated landmarks such as furniture) are provided. In the proposed method, covariance between a robot state and a first type of landmark is different and distinguished from a covariance between a robot state and second type of landmark. While a first type of landmark may be more densely present or frequently observed in the surroundings in comparison to a second type of landmark that may be scarcer or difficult to detect, the second type of landmark provides higher confidence and helps close the loop in larger environments. FIG. 375 illustrates an example of a mapped environment 25000. A robot 25001 observes primal landmarks 25002 and sophisticated landmark 25003 comprising a television and stand. FIG. 376 illustrates an example of three types of landmarks, primal, semi-sophisticated, and sophisticated landmarks. There are many primal landmarks, some semi-sophisticated landmarks, and few sophisticated landmarks. The more sophisticated landmarks provide higher confidence during SLAM. There is no requirement of a specific number of primal landmarks per sophisticated landmark. In some cases, the robot may not encounter multiple types of landmarks, such as when cleaning a small and relatively empty room.

FIG. 377 illustrates a diagram of camera object and camera state vector extraction. In the frontend, features are extracted and matched with features within a dictionary, and based on a match, the features are labelled as an object type. This provides sparse, high quality annotated objects. In the backend, a 3D position vector and orientation quaternion are used in determining linear and angular velocity and displacement. This provides a dense, temporal set of primal features.

Though a detected primal feature may be unlabeled or unidentified the feature may provide enough clues for online requirements. Optical flow and visual odometry require feature detections such as basic shapes, edges, and corners, or otherwise a key point and a descriptor. In some embodiments, object recognition is used as a secondary and more reliable landmark to localize against, in particular stationary and structural objects. Identification of these objects relies on detecting a series of primal features in a specific arrangement. In some embodiments, a structure is first identified, then labeled. Even if the structure is labeled incorrectly, the mere identification of the features in a specific arrangement may still be used as a landmark for localization as localization is solely based on recognizing the particular features in the specific arrangement, the label being unnecessary. For example, as long as the structure is captured in an image and a localization algorithm detects the features in a specific arrangement forming the structure, a loop may be closed. Labeling the structure depends on existing data sets, examples of the structure, lighting conditions, and such. A user may label examples of structures captured in images using the application paired with the robot to improve local recognition success results. Structures labelled by the user may be given more weight within a home as a same structure is likely to be encountered repetitively. User labelling may also improve global recognition success as users collectively provide a large amount of labelling, providing both labeling volume and labeling diversity (important for objects and situations that are very difficult to artificially stage and ask operators to label).

For both structural object identification and labeling, illumination, depth measurement, and a sequence of images are useful. Illumination is helpful as the addition of some artificial light to the environment reduces the impact of the ambient environment. Illumination may be employed at intervals and illuminated images may be interleaved with non-illuminated images. Depth measurements may be captured with a depth camera, built-in TOF sensors, a separate TOF coupled to the robot, a structural light, or a separate measurement device for depth based object recognition. A sequence of images may also improve object identification and labeling success rate. For example, an image with illumination followed by an image without illumination may provide better insight than images without any illumination. A sequence of two, three, five, six, ten or another number of frames captured one after another as the robot is moving captures the structure of the object from slightly different angles. This provides more data, thereby reducing false positives or false negatives. The number of image frames used may be fixed in a sliding window fashion or dynamic in a dynamic window fashion.

In some embodiments, clustering and K-means algorithm are used to group similar images together. Similarity may be based on a gray scale image or may be based on type 1 features (primal structures) or type 2 features (sophisticated structures). In either case, an estimate of localization and organization of images in a grid reduces the search space drastically. Inside the grid or a group of grids, clustering may be used to further organize the proposal domain into a structured system wherein creative search methods may be used to match a current run input with pre-saved data (such as an image). Some embodiments use search methods implementing a K-d tree or a Chou-Liu hierarchy. As opposed to prior art that use a simple tree, a two (or more) type feature detection may interleave feature types or create separate trees for each feature type with sparse or dense association with other feature types. When a search is performed for a type 2 feature the search domain is small, however, the search phrase is complex and comprises a structure formed of primal features. For a match to occur, a more sophisticated criterion is required. For a type 1 feature, the search domain is small and the term is simple. Several matches are likely to be found quickly, however, false positives are more likely. An example data set may be previously generated and available or may be built during a run (e.g., a cartography run or a subsequent run). The example data set does not have to be labeled, although a labeled data set may be used.

In embodiments, the different types of landmark may have geometric relations, topological relations, or graph relations with one another (direct or indirect). The relations between different types of landmarks may be perceived, extracted gradually, or may remain unknown to the SLAM algorithm. It is not necessary for all relations to be discovered for SLAM. As relations are discovered they are used where beneficial and when undiscovered, the SLAM continues to operate under circumstances of partial observability. The SLAM algorithm is always in a state of partial observability, even as more observations are made and relations are inferred. FIG. 378 illustrates a correlation between observability and computation needs. A real-time system suffers as constraints are added, especially during occasions of peak processing. As a result, some embodiments process basic SLAM at a low level. In some embodiments, features are extracted to provide a degree of sparsity rather than directly tracking a point cloud or pixels. For example, RANSAC extracts a line or edge from a point cloud and Haar extracts a line or edge from an image. In embodiments, the processor of the robot executes pose estimation and tracking serially or in parallel. Multi-threading is most advantageous when a multicore architecture is used.

When the processor approximately knows a location of the robot, the processor does not have to search through all images within the database to localize the robot at a next time step. To match a feature observed in a newly captured image with the environment, the processor searches for the feature within a subset of images associated with (x, y, Θ). FIG. 379A illustrates the robot 24400 located at (x, y, Θ), captured images 24401, and database 24402 with location index. The processor attempts to find a match at location (x, y). FIG. 379B illustrates an image database 24403 indexed with pose 24404 as well. When a match to the feature is not found at (x, y, Θ) then the processor attempts to find a match at (x±1, y±1, Θ±1). In some cases, the database may not have entries for all possible poses or cells within the map. In such cases, ML algorithms select nearest neighbors that have a highest chance of matching the observed feature. Near may be defined based on Euclidean or Mahalanobis or is defined probabilistically. For a highest chance of success in matching the feature, matches occur in parallel, wherein a group of images are matched against another group of images. The algorithm may sort through a database and propose a set of potential matching images. FIG. 380 illustrates an example of a process of localizing the robot. Based on localization information, a small subset of the database with relevant images are provided to the proposal system which sorts through the subset and proposes a set of potential matches. Features are extracted from images captured by a live camera and compared against the images with a high likelihood of matching. If there is a match, the robot is localized, otherwise another subset of the database corresponding to areas close to the first considered subset are provided to the proposal system to find a match. For example, FIG. 381 illustrates a first set of potential matches 24600 from a subset 24601 of the database of which there is no match found. As such, a set of k-nearest neighbors 24602 are a second set of potential matches to examine. For each cell, there may be multiple poses, depending on an angular resolution. For example, a cell may have 12 poses, angles Θ1 to Θ12, each 30 degrees apart. Matching features using such a process helps with detecting absence of an object and categorization of objects that are potentially movable. In some embodiments, a distinction between dynamic objects (e.g., a person, a bike, a pet) and static objects that may be removed from a part of a scene is created. For example, a food sampling station may be set up for a month to give out samples of a new product upon its launch and is no longer present after the month passes. Detection of absence of an object in a scene is also an important part of simultaneous localization, mapping and object tracking.

In some embodiments, the database is not pre-sorted or has inaccuracies. K-means clustering may be used to create K clusters, wherein K is a possible number of poses of the robot (including coordinate and heading). Sum of squared distance may be used to create an elbow curve. Hierarchical clustering may be used to create a dendrogram and identify distinct groups. In some embodiments, the first two images close to one another (based on a distance of their histograms or plotted pixel densities), wherein distance may be Mahalanobis or Euclidean, are representative of a cluster. In embodiments, a vertical height of a dendrogram represents such distance.

When localization information is used in creating a proposal image, a region of interest may be identified in the image. The feature matching algorithm may analyze a region containing a feature of interest. For example, the algorithm only compares a portion of an image containing a floor of an environment with a previous reference image in cases where a goal is to detect objects for object avoidance or liquids/spills for cleanup. A camera positioned underneath the robot captures images used to check for debris and sticky floors. The processor of the robot processes images. Images are compared against images of a clean floor to detect debris or sticky floors or with an ultrasonic floor type detection in a Bayesian network. Upon detecting debris or spill the user may be notified to clean or the robot or another may clean the dirty area. In another example, the algorithm discards pixels likely related to a floor of an environment in cases where a goal is localization of the robot using images of walls or a ceiling. In another example, the algorithm discards pixels likely related to all regions a particular object or obstacle is unlikely to be located in cases where a goal is to determine a distance to the particular object or distinguish an obstacle to avoid a transition to a climb. FIG. 382 illustrates images 24700 and 24701 of a line laser emitted within an environment, the line laser indicating a likely location of an obstacle and a transition, respectively. Regions 24702 of the images 24700 and 24701 are not processed as the obstacle and transition are not likely located within regions 24702.

Clustering may be used to organize previously captured images and/or depth readings when creating a proposal of images to match a new reading against. Clustering comprises an assigning a label to each data element when a previous labeling is non-existent. While labeling may have been performed for places visited by the robot in a previous session, the labelling may not work well or may not be practical for all parts of a workspace or for all workspaces. In some embodiments, clustering is combined with chronicle labeling of a previous session or a current session. For instance, $X=\{x_1, x_2, \ldots, x_i, \ldots, x_n\}$ is a set of N data elements and cluster $C_1, C_2, \ldots C_k$ is a subset of set X, wherein each C is disjoint from the others and has elements presented by one of the elements in the subset of set X. Algorithms, such as Lloyd's algorithm, may be used to cluster a given set of data elements. Some embodiments use soft K-means clustering, wherein a soft max function is used. Once soft assignments are computed, centroids may be found using a weighted average. Some embodiments use a latent variable model to observe hidden variables indirectly from their impact on the observable variables. An example is a Gaussian mixture model wherein an expectation-maximization is employed to compute the MLE.

In some embodiments, the processor of the robot finds an enclosure, such as a room in a house, based on data captured by a camera, depth camera, a LIDAR, a TOF camera, a structured light in combination with a camera or a LIDAR, a distance sensor, etc. As the robot moves within the environment, sensors disposed on the robot capture readings sequentially from different positions. In some embodiments, the processor of the robot uses detection of particular features in a sequence of captured images and a change in position of those features to extract depth values from a volumetric function or a cross section of a volume in a plane parallel to a driving surface of the robot. In some embodiments, features are detected directly within a captured image. In some embodiments, the processor generates a point cloud using captured depth readings. In some embodiments, the processor detects particular features within the point cloud. In some embodiments, the processor uses a combination of captured images and depth readings. In some embodiments, structured light is used as it eases detection of features. In some embodiments, a structured light highlights corners to ease their identification. In some embodiments, a reflection of structured light captured by a camera is used to detect corners of the environment. In some embodiments, depth is extracted from reflection of structured light. FIG. 383 illustrates a robot 21900 emitting a structured light 21901 towards a corner 21902 and an image 21903 captured by a camera disposed on the robot 21900. The structured light emitted 21901 causes the corner 21902 to be highlighted in the captured image 21903 and thus be easily detected. In some embodiments, corners detected using structured light and a camera are compared with corners detected using depth readings. FIG. 384 illustrates (a) a robot 22000 emitting structured light 22001 towards a corner 22002 and an image 22003 captured of the structured light 22001 emitted towards corner 22002. A processor of the robot uses the captured images of corners to build a structure of a room with no scale. To obtain a scale ray tracing may be used. FIG. 384 also illustrates (b) the robot 22000 capturing depth readings 22004 to a same corner 22002. A table is used to extract depths based on a location of the point readings 22005 within a captured image 22006. The processor uses RANSAC to fit a line to the depths from which the corner connecting the two lines is detected. Approach (b) may be used by the processor to build an initial map of the environment to scale. Approach (b) may be used in conjunction with approach (a) or with computer vision based feature detection at intervals, wherein illumination is not emitted into the environment. For relocalization within a completed map, approach (a) may be sufficient. In some embodiments, approach (a) is used in conjunction with approach (b), wherein approach (b) is used at a lower frequency or interval. A training run of the robot may use approach (b) or both approach (a) and (b) for mapping, however, after the training run a subset of approaches (a) and (b) may be used.

In one embodiment, wherein the robot performs coverage in a boustrophedon pattern, depth is extracted from a monocular camera based on viewing a feature observation at each alternating row as a binocular observation, with a base that is twice the distance between each row. FIG. 385 illustrates a boustrophedon coverage path 22100 of a robot and a feature 22101 observed. A base size 22102 increases with a number of rows, resulting in a higher accuracy extraction of distance. With a growing base distance and adding feature observations at a base distance to legacy methods of forming an image pyramid, high resolution depth is achieved. This overcomes a maximum base distance that is possible on the robot based on a size of the robot (i.e., the base distance cannot exceed a physical size of the robot). In some embodiments, a bundle adjustment is applied to incorporate readings captured in a previous row, multiple previous rows, or all rows with a same direction of robot movement. In some embodiments, a confidence score dynamically prunes undesired data. In some embodiments, a loop closure mechanism is applied at the end of each row or at the end of each boustrophedon box (i.e., the box within which the boustrophedon path is executed). In some embodiments, sequences of images captured from a first direction of robot movement are bundled and sequences of images captured from a direction of robot movement opposite the first direction are bundled separately. In some embodiments, the processor uses two directions of robot movement and creates two sets of bundles or uses multiple directions of robot movement and creates multiple bundles that match each direction. In an occasional situation, wherein an image incorrectly falls into a wrong image set of a particular angular orientation, outlier detection may fix the issue by removing the unmatching image from the image set. In some embodiments, clustering methods adjust the bundling or verify the bundling. In some embodiments, an angular position of the robot at the end of each boustrophedon line is determined. In some embodiments, an angular degree of rotation of the robot is determined using a gyroscope or an IMU. In some embodiments, the angular degree of rotation of the robot is determined using visual methods and an error function and comparing pixels of consecutive images to find overlaps. In some embodiments, features are detected before comparing two consecutive images. It is unworthy to feed a prior depth extraction (such as from a previous row) or depth derived from a first row (e.g., using a camera angled to a horizon) and optical flow into a network as an input to get fine-tuned in a next stage. As more time steps pass, more samples are captured and fed into a 2D or 3D CNN, or alternatively, a sparser convolution wherein a LSTM is used.

Similar to fine-tuning depth extraction with a sequence of captured images, object recognition may be enhanced using a sequence of images and depth information. Depth information may be extracted from a sequence of images passively from which a point cloud is formed. A sequence of point clouds arranged in a data structure like an image forms a data cube. The point cloud and depth information do not need to be extracted from passive images. Active illumination, whether in an optical method (such as structured light) or in a TOF method, may separately add accuracy, density, and dimension to the passive method. A temporal tuning of a depth extraction or object recognition over a sequence of readings captured from a single point of view or from a moving source (such as the robot equipped with an encoder, gyroscope, optical tracking sensor, IMU, etc.) increases density and improves the likelihood of a better depth extraction or object recognition. A depth may be associated with a recognized feature in an image or a point cloud may be featurized by overlaying two readings. In some embodiments, a biholomorphic map is written as a transformation w=f(z) which preserves angles. Conversely, an isogonal map preserves the magnitude of angles but not the orientation. When the condition of orientation preservation of local angles is met, conformal mapping or a biholomorphic map is achieved. A similarity transformation is a conformal mapping that transforms objects in space to similar objects, wherein mathematically A and A' are similar matrices and $A'=BAB^{-1}$. A similarity transformation allows uniform scaling with at least one more degree of freedom than Euclidean transformation. The transformation is an affine transformation when the condition of preserving collinearity is met, wherein all points on a line still form a line after an affine transform and ratios of distances remain preserved. Affine transformation may be decomposed to rotations, translation, dilations, and shears. FIGS. 386 and 387 illustrate affine transformations decomposed to rotation 22200, scale 22201, shear 22202, and translation 22203 and the variable in the matrix 22204 applying the transformation. FIG. 388 illustrates a translation in 2D described as a shear in 3D. FIG. 389 illustrates preservations of lines and parallelism in affine transformation. FIG. 390 illustrates translation relating different perspectives within the affine space. FIG. 391 illustrates transformation 22700 of $P_1$ and $P_2$ captured in image 22701 by a camera 22702 disposed on a robot 22703 after rotation and translation of the camera 22702 and the robot 22703.

In some embodiments, active illumination helps with feature association, whereas in embodiments with no illumination, image associations between two time steps relies on brute-force matching and sorting the matches based on a metric such as Euclidean distance and hamming distance. As an alternative to active illumination, the search domain may be reduced based on real-time localization information obtained from a point cloud/distance data or a previous run. Motion estimation may also be used to reduce a search domain. In some embodiments, methods such as clustering are used to organize images. Methods such as ICP and PnP, discussed in detail elsewhere herein, may be used. In some embodiments, a mono-camera setup is used to add an active illumination point to enhance and ease key point extraction by reducing the search space. A neighborhood surrounded by the illumination may be used to extract descriptors, which often demands high computational resources, and in the prior art, may be discarded. However, with the number of key points heavily reduced due to a high reliability of key points (through the use of illumination), descriptors may be preserved. Further, active illumination improves sparse optical flow algorithms such as Lucas-Kanade that traditionally suffer from constant grayscale assumption. In a preferred embodiment, an effect of ambience light is automatically reduced as active illumination impacts image brightness. In some embodiments, a coarse to fine optical flow is traced in a pyramid scheme of image arrangement.

For localization within a previously generated map, computational requirements are eased as boundaries within the environment are already mapped. In subsequent runs, a new measurement captured that agrees with a previous measurement to within a predetermined threshold localizes the robot. Cases where the new measurement does not agree with previous measurements of the map indicate the robot is not localized correctly or, if it is determined the robot is localized correctly, the environment has changed. The environment may have changed due to permanent changes or a dynamic/temporary obstacle. The dynamic/temporary obstacle may cause interruptions in measurements used for determining size, shape, and nature of dynamic obstacles for navigation planning. In some embodiments, an image of the dynamic obstacle or a digital icon representing the dynamic obstacle is displayed within the map of the environment using the application of the communication device. In some embodiments, during the training run, multiple approaches are used to confirm a physical boundary. An example of an approach includes the robot moving around the environment and observing the physical boundary with a second set of sensors, such as a near field IR sensor or a tactile sensor. In some embodiments, the processor determines the dynamic nature of obstacles using opposite direction optical flow comparison and extraction of moving obstacles from the structural boundaries. In some embodiments, the disagreement between the new measurement and previous measurements of the map is due to a previously unobserved area, such as a closed off room inaccessible during a training run that is now accessible and observed in the new measurement. In some embodiments, the application of the communication device prompts the user to confirm a map generated at an end of a training run, a first run, or subsequent runs until the user confirms the map. In some embodiments, computational saving methods are applied only after confirmation of the map. In some embodiments, a newly discovered area is added to the previously generated map even after computational savings were already implemented. In some embodiments, the map is updated to amend disagreements between new measurements and previous measurements of the map. In some embodiments, disagreements are not amended when the disagreement is due to a dynamic obstacle. In some embodiments, a coordinate descent iteratively minimizes a multivariate function along a direction of a first variable followed by a direction of a next variable in a cyclic manner such that each variable is treated one at a time before the first variable is treated again.

In a monocular observation setup, a pose graph is created at each coordinate where an observation is made and an essential matrix is synthesized to relate observations at each coordinate. For each straight trajectory with an approach to a feature, temporal triangulation provides consecutive readings that may be tracked as an optical flow. In some embodiments, RANSAC is used to find a best perspective transform when corresponding sets of points are ambiguous, imperfect, or missing. When coplanar points are not available, the essential matrix may be used to associate any sets of points in one image to another image as long as a same camera is used in capturing the images and intrinsic matrices are constant. Fundamental matrices may be used where intrinsic matrices are not constant.

Some embodiments formulate the problem as a real-time front end component with a contextual filler component running in the back end. The problem may be simplified by decoupling the temporal clock of the front end and the back end and relaxing the contextual filler to be as sparse or dense as computationally possible. A coarse to fine approach provides landmark contexts to fill first and refinements to occur later.

Semantic SLAM may be formulated as a graph including vertices representing poses of the robot or observed landmarks and edges representing available observations, wherein some features in isolation or in combination provide context other than just the spatial type. For example, the context may be provided by classification of objects based on instant observations using a trained network or an offline classification using a trained network. In some embodiments, explicit identification of features as known objects increases chances of loop closure. An increase in computational needs is required to execute classification which may be limited by scalability as the number of features and the number of identified objects increase. In some embodiments, an identified object replaces a set of unidentified features in a neighborhood of identified objects and therefore reduces the number of features that need to be tracked. With more objects identified in a workspace, the requirement to track unidentified features reduces. A balance may be maintained in tracking an ideal number of identified objects and unidentified features by keeping a lower count and a sparser set of identified features in comparison to unidentified features, allowing operation at high frame rates while maintaining real-time computational expenditure under check.

In some embodiments, a quad tree (Q-tree) is used as a data structure to house features and motion, wherein each cell splits when the cell reaches a capacity threshold, the tree directory follows spatial decomposition of space into adaptable cells, and a node in the tree has exactly four child nodes or no child nodes at all (i.e., a beaf node). A constraint may be used to narrow solutions down to an optimal range. For example, orthogonality constraints may be used in algorithms that intend to reduce dimensionality. Dimensionality is often achieved by using statistical methods to project data in a higher dimensional space to a lower dimensional space by maximizing the variance of each dimension. In some embodiments, observations are arranged as rows in a matrix and features are arranged as columns in the matrix, wherein variable space has a number of dimensions that is equal to the number of features. Each feature is plotted on a coordinate axis after being scaled to a unified unit. The maximum variance direction in the plot is a direction of a first line that fits along a longest stretch of data (shape of plot) and is a first principal component. A direction of a second longest line along a next stretch of data is chosen from a direction perpendicular to the direction of the first line.

Maximum likelihood estimation is often used in solving non-convex, non-linear problems, such as pose graph estimation (e.g., for camera or LIDAR) or bundle adjustment. Usually, a global optimality is unguaranteed unless the observation noise or motion recording is kept on strict check using, for example, Newtonian trust region and equivalent methods. These methods apply to 3D or 2D point swarms, image streams, and a synchronized RGB+D input or object label placement on an already synchronized spatial map.

FIG. 392 illustrates a sequence of incoming point swarm data 1200. In some embodiments, pose estimation of a moving computing device is decomposed to a predicting system. The predicting system may be based on motion measurements constrained or molded by training data, with a goal of minimizing a prediction error. Training with labeled and unlabeled data may be used to help finding a next pose or a bundle adjustment of previous data to serve as a frame or constraint to variance. In prior art, the robot is often localized by estimating a location of the robot in a coordinate system of a workspace as a probability distribution of a guess space. The guess space may span all locations within the workspace.

Feature enhanced grid mapping may have applications other than semantic mapping, such as SLAM and navigation. In some embodiments, other features are visually detected (e.g., with a camera) and are added manually or automatically. For example, the robot may operate in a house with more than one Wi-Fi node for providing a better distribution of a signal. With the robot detecting signal presence and a signal power of each signal, the robot hops from one Wi-Fi node to another based on localization of the robot. Robots in prior art are often unable to take advantage of hopping from one wireless node to another seamlessly. A first level of seamlessness proposed includes the robot automatically switching from a weak signal source to a stronger signal source upon sensing in the moment the current signal is weak, a better signal is available, or based on the current signal strength falling below a predetermined signal strength threshold. The reactive switch may be a switch from 2.4 GHz and 5 GHz and vice versa. A second level of seamlessness may be achieved based on discoveries of a previous cartography run, some prior runs, all prior runs, recent prior runs, etc. The second level of seamlessness proposed includes the robot anticipating entrance into an area where the signal is weak. Before communication suffers from the weak signal, the robot proactively searches for a better signal or the robot proactively knows which node is the best to connect to depending on where the robot plans to go. Each of the nodes has a signal coverage area, and while from a certain location two or more of the nodes may have a similar signal strength, one may be advantageous depending on where the robot plans to be in a next series of time steps.

In some embodiments, the robot proactively switches from one node in a mesh network to another based on localization information, its planned path, and instantaneous measurement of a received signal strength. As such, the robot switches nodes before a low measurement is received, thereby avoiding transmission sufferings associated with low signal strength. In some robotic missions, the processor of the robot plans a path around an area historically known to have poor signal strength and poorly covered by Wi-Fi nodes to avoid a potential loss of communication. In some embodiments, a baseline strength map of signal strengths is useful in inferring intrusion, change in occupancy, or other undesired changes. In some embodiments, a deviation may indicate presence of an intruder when the deviation is above a particular threshold. In some embodiments, a pattern of deviation may indicate a trajectory of movement of an intruder. FIG. 393 illustrates (a) an uninterrupted signal baseline; (b) a signal interruption caused by a person 23300 at a time $t_1$; (c) a signal interruption caused by the person 23300 at a time $t_2$; (d) temporal overlaid data from $t_1$ to $t_4$; and (e) a trajectory of interruption 23301 from $t_1$ to $t_4$. The interruption data may serve as a priori to other available data, such as a window opening, a door opening, or a frame captured by a camera. For example, FIG. 394 illustrates a camera first camera 23402 capturing a frame 23403 of person 23400, a second camera 23404 capturing a frame 23405 of person 23400, and a third camera 23406 capturing a frame 23407 of person 23400. The interruption data obtained from signal strength data fills in a blank 23408 of person 23400 caused by RSSI interruption.

In some embodiments, the robot may interrupt the RSSI values as it moves. Therefore, participating nodes may record data during all times including times the robot moves around and all the data may be compiled. A neural network or a basic ML algorithm may be employed and a signature profile may be created for various influencers. For example, a cat creates a different signature than a robot and a human based on differences in a height, a speed, trajectory, and other characteristics of the cat, the robot, and the human. A properly trained ML neural network may distinguish one signature from another. FIG. 395 illustrates an example wherein an area 23500 within which a cat 23501 moves, determined based on a trajectory 23502 of the cat, is cleaned by a cleaning robot 23503 by following along trajectory 23504 after the cat 23501 leaves the area 23500. The cleaning may be performed with a delay such that the cat 23501 is not followed by the robot 23503. FIG. 396 illustrates another example wherein snail trail trajectories 23600 of persons 1, 2 and 2 within a supermarket 23601 are overlaid to create an area 23602 requiring cleaning. A robot may be instructed to perform any of the instructions 1-6 listed. In another example, the robot may be instructed to avoid areas that are currently occupied by humans based on their snail trails. The robot may take a detour to avoid the areas currently occupied by persons. This may be desirable in houses, supermarkets, and in general in all places. The area occupied by persons may be dynamic, no-sweep, no-clean, no-cover area for a window of time. A dampening method may reduce the time window while a new detection of a person within the area may increase the time window.

In some embodiments, the processor of the robot uses a modified version of Robbins-Monro algorithm to find a critical point of a cost function. The Robbins-Monro algorithm or second order optimization algorithms (e.g., Newton-Gauss algorithm) may be applied to an embedding of choice, such as a coordinate system on a Euclidean space or a Reimannian manifold. In some embodiments, the processor of the robot uses a series of observations (obtained serially or in batches) to create an approximate cost function that may be difficult to compute. At each step a single observation or a batch of observations are processed. In some embodiments, given a matrix of preferences associated with a user based on their prior ratings, purchases, or interactions, a personalized recommendation is provided to the user (e.g., via an application of a computing device). Since the number of ranked examples is generally small, a matrix of preferences is sparsely filled. To overcome the underlying sparsity, constraints may be placed on the state space to narrow criteria options. In some embodiments, a Reimannian metric is used in each gradient step, wherein a tangent vector is in the direction of maximum descent. In cases where the manifold is Euclidean, $R^n$ space, the geodesic steps reduce to line steps in the direction of steepest descent, encoding a declining signal strength into a value that infers moving further away from a source of the signal. When stereo signals separated by a base distance are captured by one or two receivers, a value of a first signal of a pair of signals may be different from a value of a second signal of the pair of signals. In some embodiments, a cost function is implemented to minimize the difference in value of the first signal and the second signal with time and in a series of time steps. The signals may take the form of pulses or may be continuous. In some embodiments, the Robbins-Monro algorithm or similar optimization methods allow the use of a differential function in a series of state transitions where predictions and/or estimated states apply a nonlinear control to a current state. In some embodiments, a state variance matrix models estimation errors. In some embodiments, a process variance matrix models noise occurring in the process or movement. In some embodiments, measurement samples are used for a correction step. To solve the differential function, a Jacobian matrix of partial derivatives may be used as a data structure. A Hessian matrix is often used as a second order estimation. In some embodiments, the above processes are applied to a Cartesian coordinate system on a Euclidean space or a manifold. In some embodiments, computation of the essential matrix and translation and rotation concatenation are performed on a Euclidean space or a manifold. In some embodiments, the manifold is a Reimannian manifold.

In some embodiments, robotic motion control on a manifold comprises a geodesic connecting a starting point and an end point of a position and orientation of the robot at each time step. A positioning sensor may be used in determining the position and orientation of the robot. In a $R^n$ manifold with Euclidean properties, the geodesic reduces to an arc or a line drawn on a plane. In some embodiments, prediction labels comprising multivariate data values point to a location coordinate the robot is intended to reach. The location coordinate may be a coordinate superimposed on a manifold or a Euclidean plane. In some embodiments, a prediction loss is defined by a regression loss. In some embodiments, a projection into a set of neighboring cells in a coordinate system is made, wherein a weight applies to each cell that the robot may end up reaching at an end of a movement. These methods may be applied to a sensor network comprising stationary sensors installed in various locations of an indoor environment and/or mobile sensors, with a goal of sensor localization. An example of a single mobile sensor localization comprises retrieving structure from motion or synthesizing sensor trajectory from a monocular camera disposed on a robot in a work environment. Temporal triangulation on a manifold using a monocular camera requires creating associations between tangent spaces at coordinate points of a start and an end of a trajectory at each time step. Temporal triangulation using stereo vision requires creating associates between tangent spaces of two points at a base distance on a manifold.

A manifold M with n dimensions is a space (first order) that when locally approximated by its tangent space results in a Euclidean space $R^n$. $R^n$ itself may be viewed as a simple manifold with n dimensions, wherein the curvature is zero. In some embodiments, spatial dropout regularization uses dropout functions to prevent overfitting and memorizing data, which affects generalization negatively in unseen data. In some embodiments, an ensemble of models and their classification output are combined. A dropout may be implemented after the convolution layer. A generalization may be referred to as tight because choosing Euclidean space as a kind of Reimannian manifold yields the same algorithms and regret bounds as those that are already known.

In some embodiments, a Newton Riemannian trust region is used to approximate second order functions for (1) fundamental matrix and (2) essential matrix, wherein the essential matrix requires five correspondences and the fundamental matrix requires seven or eight. Estimating the essential matrix from 3D key points may be more reliable than that of 2D key points. In some embodiments, data observation is viewed as points on a manifold rather than a Euclidean plane. Some embodiments employ Latent Dirichlet Allocation (LDA) or Dirichlet distribution, a distribution of distributions. LDA describes documents that are a distribution of topics, which are themselves a distribution of words.

FIG. 397 illustrates various types of wireless communication that may be used including single input single output (SISO), single input multiple output (SIMO), multiple input multiple output (MIMO), and multiple input single output (MISO).

FIG. 398 illustrates an example of a front end, a back end, and an offline portion of a robot.

A combination of methods and algorithms may be used to perform tasks. Unsupervised methods may help cluster data locally. The clustering or hierarchical clustering may lead to a classification and categorization or a regression/prediction. Some algorithms widely used are K-means, K-medoids, C-means algorithms. Unsupervised clustering may reduce the need for a large data set and may be computationally feasible on a local device to complement a backend supervised model using a neural network in combination with traditional ML, such as SVM, nearest neighbor, discriminant analysis, etc. for classifications.

Some embodiments may use at least some of the methods, processes, and/or techniques for determining a location of the robot described in U.S. Non-Provisional patent application Ser. Nos. 17/494,251, 17/670,277, and 17/990,743, and U.S. Non-Provisional patent Ser. Nos. 11/768,504, 9/970,770, 10/436,810, and 11/241,791, each of which is hereby incorporated herein by reference.

In some embodiments, clues are placed within the environment for the robot to follow a particular instruction or localize within the environment. In some embodiments, detection of a surface indentation pattern of an object may trigger the robot to execute a specific instruction. For example, depth captured by a laser scan of a LIDAR may include a specific pattern in the depth values, such as rising and lowering values. Specific patterns may be unique to each distance from which the respective readings are captured. FIG. 399 illustrates an example of an object 17600 with a unique indentation pattern. A laser line 17601 is emitted onto a surface of object 17600 and a camera 17602 captures an image 17603 of the laser line 17601 projected onto the surface of object 17600. A processor of the robot 17604 extracts the laser lines 17605 from the image 17603. The pattern of the laser lines 17605 may be associated with a particular instruction, such as an instruction to turn to avoid an area surrounding the object 17600. Alternatively, the processor may determine a distance from the robot to the surface of the object 17600 associated with each segment of the laser lines 17605, wherein a laser line 17605 closer to a bottom edge of the image 17603 are associated with a further distance to the surface of the object 17600 than a laser line further from the bottom edge of the image 17603. A pattern of the distances associated with each segment may be associated with a particular instruction for the robot 17604 to execute. FIG. 400 illustrates a similar concept, wherein a LIDAR 17700 disposed on a robot 17701 emits light 17702 onto a surface of object 17703. Detection of a particular pattern of distances resulting from the indentation pattern of the surface of object 17703 triggers the robot 17701 to execute a particular instruction. For each distance, the corresponding pattern may indicate a different instruction or information. As the robot gets closer to an object, a particular pattern in depth values is associated with a particular closer distance from which the measurement is taken. FIG. 401 illustrates a robot 17800 positioned at different distances 20 cm, 15 cm, 10 cm, 5 cm from an object 17801 with a particular surface indentation pattern. For each distance, a detected corresponding pattern 17802 may indicate a different instruction or information. A step between distances (e.g., 1 cm, 2 cm, 3 cm, or 5 cm, 10 cm, 15 cm, or 10 cm, 20 cm, 30 cm) may depend on a desired resolution and how quickly the robot needs to react upon observing the pattern. For example, with a step of 1 cm, each cm of distance from the object has a corresponding depth value pattern. As the robot approaches 10 cm, the pattern corresponding to a distance of 10 cm from the object may not exactly match, however, the processor of the robot determines a probabilistic assumption which increases as the robot approaches 7 cm, 8 cm, 9 cm and the confidence of the match increases as patterns at a distance of 7 cm, 8 cm, 9 cm match.

In some embodiments, the robot detects a QR code or a barcode associated with a particular instruction. For example, upon detecting a barcode, a message is transmitted to the robot. The barcode may be read using a laser scanner. Laser scanners often operate in a same IR range as a LIDAR sensor or a depth camera. A camera may be used to read a barcode, a QR code, or surface indentations of objects. QR codes are used for various purposes. For example, a QR code may be generated by an application for a purpose of easily pairing the robot with a smartphone executing the application and transferring parameters to join a network. In another example, a schedule of the robot is transferred to the robot using a QR code generated by the application. In one example, a charging station communicates with the robot using a QR code. For example, the robot may use a QR code positioned in front of the robot on a charging station to align itself to the charging station. For example, in a case of a built-in robot cleaner, the robot must enter an enclosed docking station for charging. FIG. 402 illustrates a robot 17900 with a built-in docking station 17901. A QR code 17902 is strategically positioned within the docking station 17901 to help the robot 17900 align during docking. In such an environment, IR signals may bounce off of the surrounding enclosure and confuse the robot. The problem is present regardless of whether the robot is configured to transmit the IR signals or receive the IR signals during docking. FIG. 403 illustrates an enclosed docking station 18000 including a transmitter 18001 and a robot 18002 including receivers 18003 and vice versa. IR signals of the transmitter, in either case, bounce off of the enclosure, creating false signals and confusing the robot 18002 during alignment for docking. By placing QR codes strategically the robot may be guided along a path to dock properly. A camera of the robot captures images and determines locations of QR codes. The robot may be configured to approach the QR code such that the QR code is centrally aligned with the robot. FIGS. 404 and 405 illustrate QR codes 18100 strategically positioned on an enclosed docking station 18101. A robot 18102 uses a camera to capture the QR codes 18100 within its FOV 18103 for help in aligning during docking. Images indicate whether the robot 18102 is centrally aligned with the docking station 18101. For instance, image 18104 of a single QR code centrally positioned within the docking station 18101 (as in FIG. 405) indicates the robot 18102 is not centrally aligned with the docking station 18101. Images 18105 and 18106 of centrally and peripherally positioned QR codes (as in FIG. 404) or solely peripherally positioned QR codes indicate the robot 18102 is centrally aligned with the docking station 18101. FIG. 406 illustrates an example of a process of docking using QR codes. A camera of a robot captures an image, a processor extracts the QR code, performs adjustments to the image, determines where in the image the QR code is positioned, and based on the position of the QR code actuates the robot to move forward or left or right.

Figure 407:
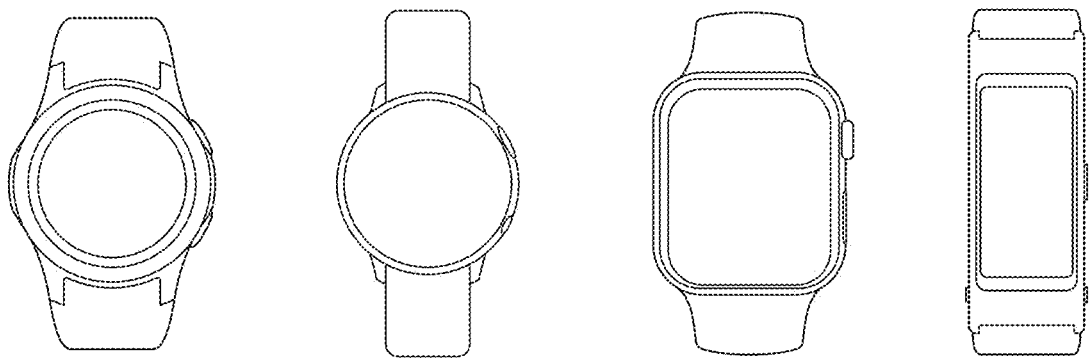
Figure 408:
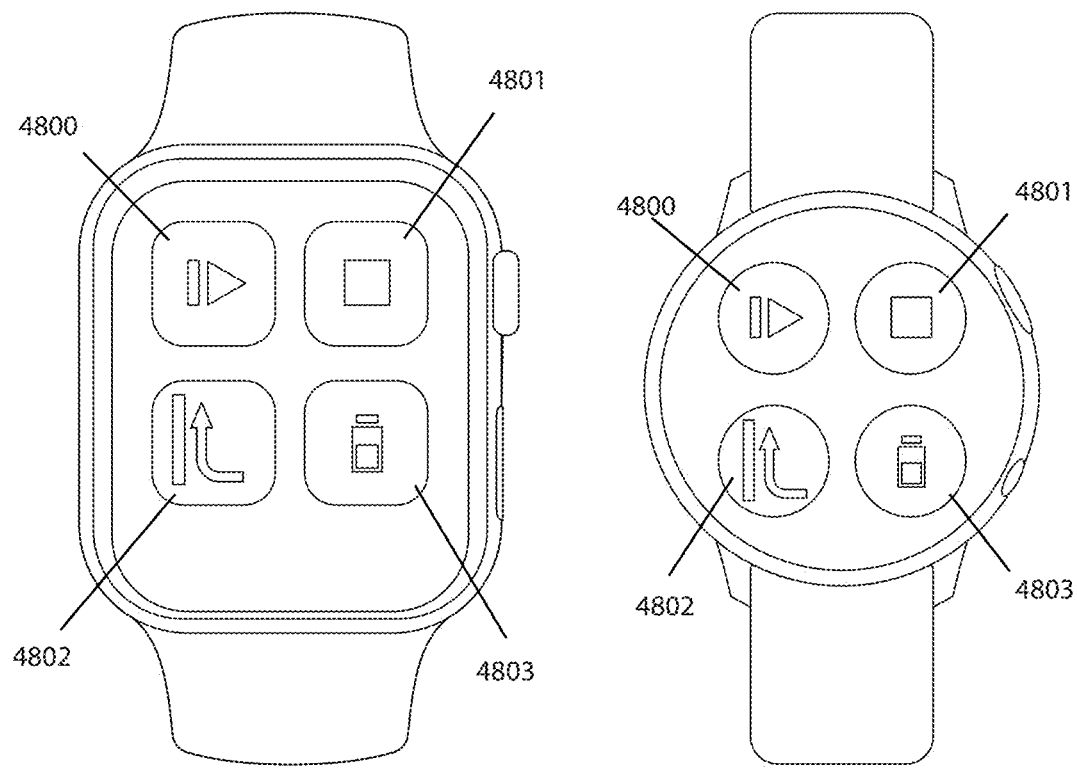
Figure 409:
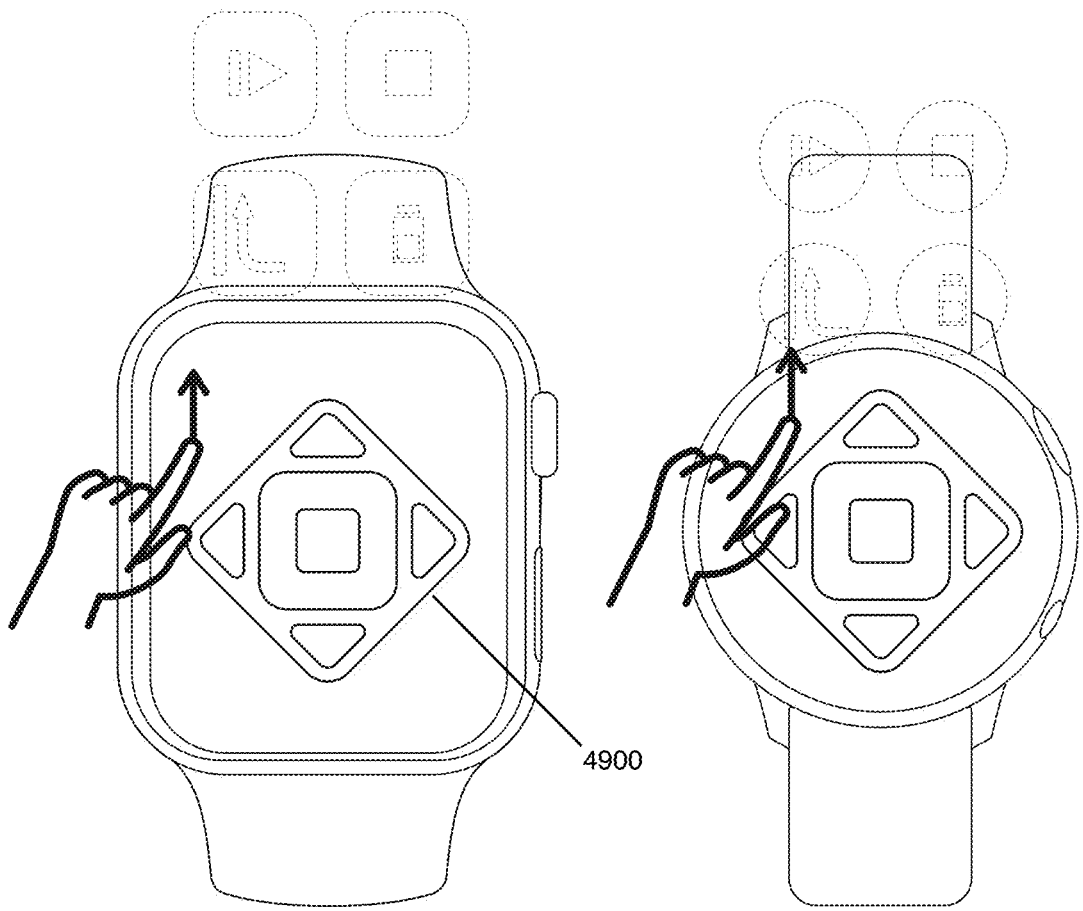
Figure 410:
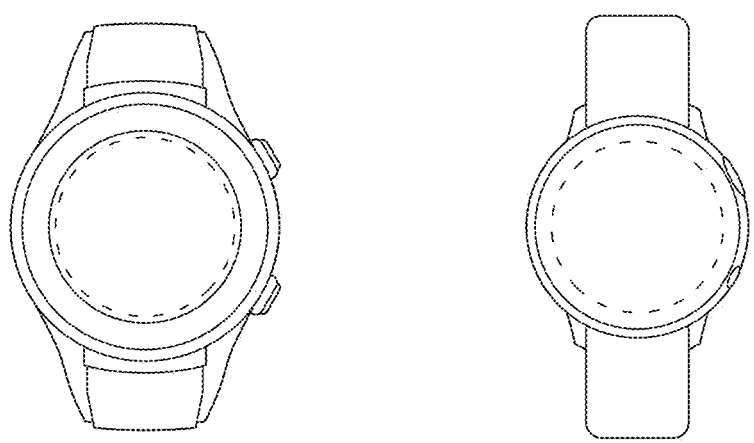
Figure 411:
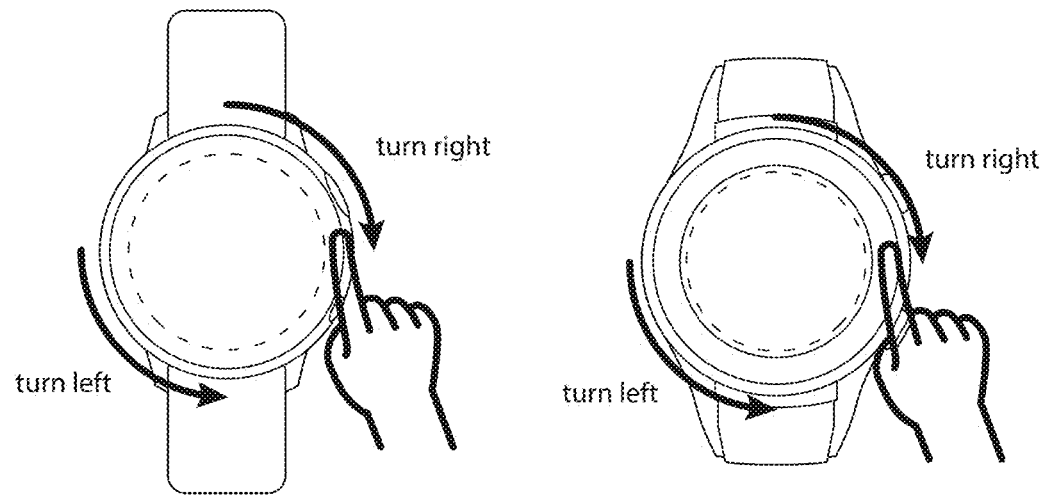
Figure 412:
Figure 413:
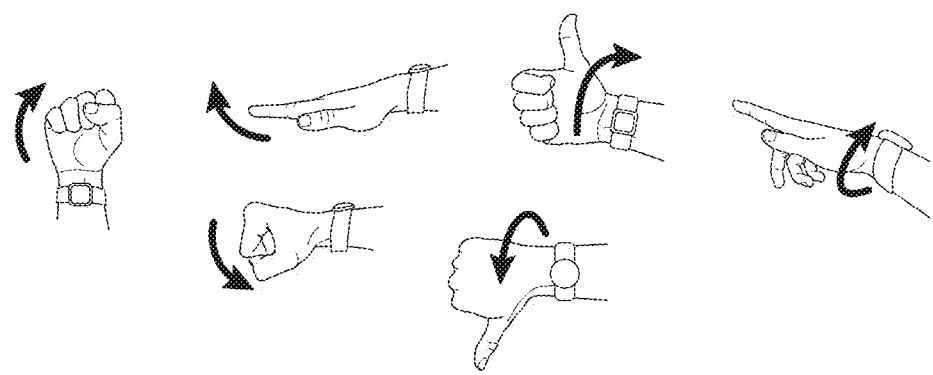

In embodiments, a user may control the robot using wearable devices, including but are not limited to, smart watches and virtual, augmented, or mixed reality headsets, gloves, etc. Due to the nature of these wearable devices and their differences in ergonomics and possibilities, user interaction differs for each wearable device. Smart watches may be vastly different from one other and may comprise different combinations of hardware and software-enabled controls that the user may use in interacting with the smart watches. For smart watches, the concept of customization based on the wearable device is important. FIG. 407 illustrates different variations of smart watches. There may be various options to control the robot using a smart watch. FIG. 408 illustrates essential controls displayed on the smart watches as a main interface, including start 4800, stop 4801, pause 4802, and charge 4803. FIG. 409 illustrates another interface displayed on the smart watches by swiping a screen of the smart watch, the interface displaying movement controls 4900. Some watches have a bezel (physical or digital) around their screen, as illustrated in FIG. 410, which may be used to command the robot to turn, speed up or slow down, etc., as illustrated in FIG. 411. Using dials and bezels of smart watches, the user may have access to more options such as scheduling, notifications, coverage report, etc. FIG. 412 illustrates the use of a voice assistant (e.g., Siri, Google, Bixby, Alexa, etc.) of the smart watches to verbally command the robot to execute different tasks via an AI assistant. Since most smart watches comprise a gyroscope or three-axes accelerometer sensor to recognize rotation of the arm, gestures of varying wrist motions may be used to command the robot. FIG. 413 illustrates examples of different wrist motions that may each be programmed to instruct the robot to execute a particular action, such as stop, start, speed up, slow down, etc.

In embodiments, processing occurs on the same controller or MCU that sensing and actuating occur on, eliminating the physical distance between the point of data collection and data processing. Some embodiments implement a method for reducing the computational intensity of SLAM by use of a microcontroller or MCU for information processing at the source instead of a CPU that must be distanced from corresponding sensors and actuators.

In some embodiments, all processes run on a single MCU including the user interface, Wi-Fi, etc. In some embodiments, the UI is offloaded to a separate MCU to allow more comprehensive and detailed user interaction as well as capacitive touch sensing and finger slide sensing. In some embodiments, the same single MCU controls SLAM, sensing and actuation, PID control, applications that control a brush, a water pump, a UV light, a side brush, a fan motor, and other components of the robot.

Some embodiments use a MCU (e.g., SAM70S MC) including built in 300 MHz clock, 8 MB Random Access Memory (RAM), and 2 MB flash memory. In some embodiments, the internal flash memory may be split into two or more blocks. For example, a lower block may be used as default storage for program code and constant data. In some embodiments, the static RAM (SRAM) may be split into two or more blocks. FIG. 414 provides a visualization of multitasking in real time on an ARM Cortex M7 MCU, model SAM70 from Atmel. Each task is scheduled to run on the MCU. Information is received from sensors and is used in real time by algorithms. Decisions actuate the robot without buffer delays based on the real time information. Examples of sensors include, but are not limited to, IMU, gyroscope, OTS, depth camera, obstacle sensor, floor sensor, edge detection sensor, debris sensor, acoustic sensor, speech recognition, camera, image sensor, TOF sensor, TSOP sensor, laser sensor, light sensor, electric current sensor, optical encoder, accelerometer, compass, speedometer, proximity sensor, range finder, LIDAR, LADAR, radar sensor, ultrasonic sensor, piezoresistive strain gauge, capacitive force sensor, electric force sensor, piezoelectric force sensor, optical force sensor, capacitive touch-sensitive surface or other intensity sensors, GPS, etc.

In embodiments, the MCU reads data from sensors such as obstacle sensors or IR transmitters and receivers on the robot or a dock or a remote device, reads data from an odometer and/or encoder, reads data from a gyroscope and/or IMU, reads input data provided to a user interface, selects a mode of operation, automatically turns various components on and off or per user request, receives signals from remote or wireless devices and send output signals to remote or wireless devices using Wi-Fi, radio, etc., self-diagnoses the robot system, operates the PID controller, controls pulses to motors, controls voltage to motors, controls the robot battery and charging, controls the fan motor, sweep motor, etc., controls robot speed, and executes the coverage algorithm. FIG. 415 illustrates an example of an MCU of the robot and various tasks executed by the MCU.

Some embodiments use at least some components, methods, processes, and/or techniques for processing data required in operating the robot described in U.S. Non-Provisional patent application Ser. Nos. 17/494,251, 17/670,277, and 17/990,743, and U.S. Non-Provisional patent Ser. No. 11/768,504, each of which is hereby incorporated herein by reference.

The methods and techniques described herein may be implemented as a process, as a method, in an apparatus, in a system, in a device, in a computer readable medium (e.g., a computer readable medium storing computer readable instructions or computer program code that may be executed by a processor to effectuate robotic operations), or in a computer program product including a computer usable medium with computer readable program code embedded therein.

While this invention has been described in terms of several embodiments, there are alterations, permutations, and equivalents, which fall within the scope of this invention. It should also be noted that there are many alternative ways of implementing the methods, devices and apparatuses of the present invention. Furthermore, unless explicitly stated, any method embodiments described herein are not constrained to a particular order or sequence. Further the Abstract is provided herein for convenience and should not be employed to construe or limit the overall invention, which is expressed in the claims. It is therefore intended that the following appended claims to be interpreted as including all such alterations, permutations, and equivalents as fall within the true spirit and scope of the present invention.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A system for cleaning maintenance of a floor surface of a workspace, comprising:
    an autonomously navigating cleaning robot, comprising:
        a chassis;
        a set of wheels coupled to the chassis;
        a plurality of sensors;
        at least a Light Detection and Ranger (LIDAR);
        a processor;
        a sweeping and vacuuming tool comprising at least a main brush, a side brush, and a dust bin;
        a mopping tool comprising at least a mopping cloth, a liquid container, a mechanism to dispense liquid, and a mechanism to move a mopping pad of the mopping tool downwards to engage the mopping cloth with the floor surface in order to absorb dirt from the floor surface while engaged, and to move the mopping pad of the mopping tool upwards to disengage the mopping cloth from the floor surface;
        a navigation mechanism, comprising:
            a non-transitory machine-readable media storing instructions that when executed by the processor of the cleaning robot effectuate operations, comprising:
                capturing, with at least the LIDAR, data of the workspace as the cleaning robot moves within the workspace;
                creating or maintaining, with the processor of the cleaning robot, a floor map of the workspace of the cleaning robot; and
                actuating, with the processor of the cleaning robot and based on the data from the LIDAR, the cleaning robot to engage the mopping cloth in specific areas of the floor surface according to a user preference entered in an application of a paired smartphone displaying the floor map of the workspace and to disengage the mopping cloth of the cleaning robot in other areas of the floor surface or when a carpeted floor is detected based on sensor data;
            and wherein the cleaning robot autonomously navigates to return back to a station at least to refill the liquid container of the cleaning robot;
    the station, comprising:
        a mechanism to at least clean the mopping cloth of the cleaning robot;
        a clean liquid container to store clean liquid, a waste liquid container to store waste liquid, at least one electric pump to circulate liquid;
        a mechanism to refill the liquid container of the cleaning robot with liquid from the clean liquid container of the station, wherein the liquid comprises clean water, a cleaning solution, or detergent;
        wherein the station performs operations, comprising:

applying clean liquid from the clean liquid container of the station to clean the mopping cloth of the cleaning robot and collecting waste liquid;

wherein:
the clean liquid container of the station is filled with clean liquid;
and in each episode of cleaning the mopping cloth of the cleaning robot, an amount of clean liquid stored in the clean liquid container of the station depletes in a decrement, and an amount of waste liquid stored in the waste liquid container of the station increases in an increment.

2. The system of claim 1, wherein:
the clean liquid container and the waste liquid container of the station are removable from the station for refilling the clean liquid container and emptying the waste liquid container.

3. The system of claim 1, wherein:
the waste liquid container of the station is smaller than the clean liquid container of the station.

4. The system of claim 1, wherein the station further comprises:
a heating mechanism for heating liquids.

5. The system of claim 1, wherein the station further comprises:
a plate on which the cleaning robot climbs to park at the station.

6. The system of claim 5, wherein the plate is ramped, angled, or is in a wedge form.

7. The system of claim 6, wherein the plate has at least two wheel pockets, and the cleaning robot drives up the ramp until left and right wheels of the cleaning robot are positioned in the at least two wheel pockets of the station.

8. The system of claim 5, wherein the plate is separable from the station.

9. The system of claim 1, wherein the operations of the station further comprise:
creating a scrubbing action to release the dirt absorbed from the floor surface off of the mopping cloth of the cleaning robot by:
moving the mopping cloth of the cleaning robot against a component of the station.

10. The system of claim 9, wherein the component of the station is a moving component to enhance the scrubbing action.

11. The system of claim 9, wherein the component of the station is a stationary component.

12. The system of claim 9, wherein the moving of the mopping cloth is at least partially actuated by the movement of the cleaning robot.

13. The system of claim 9, wherein the movement of the mopping cloth comprises:
a rotation actuated by a rotation of the mopping pad of the mopping tool.

14. The system of claim 13, wherein the rotation of the mopping pad of the mopping tool further activates a rotation of the component of the station in order to clean the station.

15. The system of claim 13, wherein a rotation axis of the rotating mopping pad of the mopping tool is vertical in relation to the floor surface.

16. The system of claim 13, wherein a rotation axis of the rotating mopping pad of the mopping tool is horizontal in relation to the floor surface.

17. The system of claim 1, the operations of the station further comprise:
creating a scrubbing action to release the dirt absorbed from the floor surface off of the mopping cloth of the cleaning robot by:
moving a component of the station against the mopping cloth of the cleaning robot.

18. The system of claim 17, wherein the mopping cloth of the cleaning robot is moved to enhance the scrubbing action.

19. The system of claim 1, wherein:
upon refilling, the cleaning robot resumes cleaning from a last location where the cleaning robot cleaned prior to returning to the station; and
the cleaning robot determines the last location based on the floor map of the workspace wherein upon returning to the last location where the cleaning robot cleaned before returning to the station, the cleaning robot performs a coverage path forming a boustrophedon pattern.

20. The system of claim 1, wherein the processor of the cleaning robot effectuates operations further comprising:
applying, with the mechanism of the mopping tool of the cleaning robot, a downward pressure onto the mopping cloth when the mopping cloth is engaged with the floor surface such that the scrubbing action between the mopping cloth and the floor surface is enhanced.

21. The system of claim 1, wherein a granular control of user preferences for specific areas of the floor surface is provided by the application of the smartphone via the displayed floor map of the workspace, wherein:
the granular control comprises receiving an instruction for turning on, turning off, or adjusting an intensity of liquid dispensing, an instruction for the cleaning robot to vacuum first then mop, an instruction for the cleaning robot to vacuum and mop, an instruction for the cleaning robot to vacuum only, an instruction for the cleaning robot to mop only, an instruction to enable a quiet mode of the cleaning robot, an instruction for creating a virtual confinement within the floor map of the workspace, a favorite cleaning schedule, a start and stop time within which the cleaning robot is to recharge, an instruction to enable a deep cleaning by the cleaning robot, an instruction for the cleaning robot to clean in a particular direction, an instruction to move the cleaning robot in a particular direction, a start and a stop time during which the cleaning robot is to not operate, and a cleaning robot voice.

22. The system of claim 21, wherein the floor map of the workspace comprises autonomously created areas pertaining to spaces within the workspace, and the granular control of user preferences further allows a merger of areas within the floor map of the workspace, a division of two areas within the floor map of the workspace, and an order in which the cleaning robot is to clean areas within the floor map of the workspace.

23. The system of claim 1, wherein a granular control of user preferences is provided by the application of the smartphone, wherein:
the granular control comprises an instruction for the cleaning robot to create a floor map of the workspace before cleaning for a first time.

24. The system of claim 1, wherein:
the station is connected to a plumbing system of the workspace of the cleaning robot;
the clean liquid container of the station is directly refilled with clean liquid from the plumbing system of the workspace; and the waste liquid stored in the waste liquid container of the station is directly discarded into the plumbing system of the workspace.

25. The system of claim 1, wherein the operations further comprises:

generating air flow to dry at least a part of the mopping mopping pad of the cleaning robot.

26. A system, comprising a cleaning robotic device to clean a floor, a stationary station to service the cleaning robotic device, and an application on a paired smartphone to receive user preferences in association with operations of the system, wherein:

the stationary station comprises an attachable plate for the cleaning robotic device to park on in order to receive the services to the cleaning robotic device, wherein the cleaning robotic device navigates to clean a surface area of a workspace specified by a user input entered in relation to a floor map created by the cleaning robotic device and displayed on the application of the smartphone, wherein the cleaning robotic device cleans the specified surface area by actuating at least a downward motion of a mopping pad of the cleaning robotic device to engage a mopping pad with a downward pressure with the surface area while dispensing liquid from a liquid container of the cleaning robotic device to facilitate absorbing dirt with the mopping pad from the surface area, wherein:

the stationary station comprises:
 a connection to a power source, and a mechanism to recharge a battery of the cleaning robotic device;
 a clean liquid container to store clean liquid;
 at least one electric pump to circulate liquid;
wherein the stationary station is configured to perform service operations on the cleaning robotic device, comprising:
 filling the liquid container of the cleaning robotic device by transferring clean liquid from the clean liquid container of the stationary station to the liquid container of the cleaning robotic device, wherein during a filling episode, an amount of clean liquid stored in the clean liquid container of the stationary station depletes in a decrement;
and the service operations of the stationary station further comprising:
 transferring a mopping pad used by the cleaning robotic device to absorb dirt to a container of the stationary station that stores used mopping pads; and
 transferring a clean mopping pad from a container of the stationary station that stores clean mopping pads to be used by the cleaning robotic device as a replacement for the used mopping pad, wherein a user refills the clean mopping pad container of the stationary station with clean mopping pads and empties used mopping pads from the used mopping pad container of the stationary station.

27. A method of a stationary device working in collaboration with a robotic cleaner and an application of a paired smartphone to clean a workspace autonomously according to preferences of a user, wherein the preferences of the user is at least partly received through the application of the smartphone and in relation to a floor map of the workspace created by the robotic cleaner and displayed by the application of the smartphone, wherein the user specifies an area of the workspace to be cleaned by the robotic cleaner by actuating at least a downward motion of a mopping pad of the robotic cleaner to engage a cloth or fabric material with the floor surface while applying a downward pressure and dispensing liquid from a liquid container of the robotic cleaner to provide a moisture required for absorbing dirt from the floor surface by at least a mopping cloth of the mopping tool of the robotic cleaner, wherein the robotic cleaner docks into the stationary device to at least refill the liquid container of the robotic cleaner, where the stationary device comprises:

a connection to a power source, and a mechanism to recharge a battery of the robotic cleaner;
a clean liquid container to store clean liquid;
at least one electric pump to circulate liquid;
a connection to a plumbing system of the workspace;
wherein the stationary device is configured to perform operations, comprising:
 filling the liquid container of the robotic cleaner by transferring clean liquid from the clean liquid container of the stationary device to the liquid container of the robotic cleaner, wherein during a filling episode, an amount of clean liquid stored in the clean liquid container of the stationary device depletes in a decrement and the clean liquid container of the stationary device is refilled autonomously from the connection to the plumbing system of the workspace.

28. A system, comprising a stationary device and a robotic device working in tandem to maintain a floor of a workspace clean, wherein the stationary device refills a liquid container of the robotic device upon the liquid in the liquid container of the robotic device being depleted, wherein the liquid is used to remove absorbed dirt from a cloth or fabric based pad of a mopping tool of the robotic device, wherein the cloth or fabric based pad of the mopping tool of the robotic device is configured to absorb dirt from the floor of the workspace when actuated with a downward motion to engage with the floor and apply a downward pressure, wherein the stationary device comprises:

a connection to a power source, a power management system to operate the stationary device, and a mechanism to recharge a battery of the robotic device;
a clean liquid container to store clean liquid;
at least one electric pump to circulate liquid;
a connection to a plumbing system of the workspace;
wherein the refilling the liquid container of the robotic device by the stationary device comprises:
 transferring clean liquid from the clean liquid container of the stationary device to the clean liquid container of the robotic device, wherein during a filling episode, an amount of clean liquid stored in the clean liquid container of the stationary device depletes in a decrement and the clean liquid container of the stationary device is refilled autonomously from the connection to the plumbing system of the workspace; and
wherein the robotic device navigates to the areas of the floor of the workspace that are specified by a user to be mopped based on a user input received by an application of a paired smartphone displaying a floor map of the workspace or based on sensory input determining a floor type of the floor, wherein the robotic device docks into the stationary device to at least refill the liquid container of the robotic device.

* * * * *